United States Patent [19]

Ward et al.

[11] Patent Number: 4,849,913

[45] Date of Patent: Jul. 18, 1989

[54] METHOD FOR THE DESIGN AND CONSTRUCTION OF COMPOSITE PARTS

[75] Inventors: William E. Ward, Issaquah; Jack R. Gumm, Jr., Auburn, both of Wash.

[73] Assignee: The Boeing Company, Seattle, Wash.

[21] Appl. No.: 37,141

[22] Filed: Apr. 10, 1987

[51] Int. Cl.[4] ........................ G06F 15/46; B32B 31/00

[52] U.S. Cl. .................................... 364/468; 156/264; 364/188; 364/474.24; 364/512

[58] Field of Search ................................ 364/191-193, 364/468, 474, 475, 512, 300, 188, 189; 156/250, 252, 253, 256, 260, 264, 265, 58, 59, 64, 297, 378, 379.8

[56] References Cited

U.S. PATENT DOCUMENTS

| | | | |
|---|---|---|---|
| 4,534,813 | 8/1985 | Williamson et al. | 156/265 X |
| 4,554,635 | 11/1985 | Levine | 364/512 X |
| 4,654,805 | 3/1987 | Shoup, II | 364/167 X |
| 4,666,546 | 5/1987 | Treber | 156/264 |
| 4,697,240 | 9/1987 | Cedar et al. | 364/474 |

*Primary Examiner*—Joseph Ruggiero
*Attorney, Agent, or Firm*—Seed and Berry

[57] ABSTRACT

An improved system and method are designed to take engineering composite drawings released in a computer-aided design (CAD) data set, determine the attributes of each of the plies into its composite drawing, and pass the information on to using orgnizations. In preferred embodiments, the system logically determines the geometric definitions for each ply contained in a composite part and reports any errors to the user. Analysis of the physical properties of a part is also provided. Computation of the total part weight and centroid location is performed by the system. Additionally, the present invention creates detailed engineering models of each composite ply and passes information directly to manufacturing.

4 Claims, 30 Drawing Sheets

MAIN FLOW

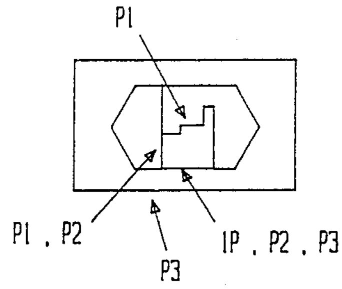
FIG.5B
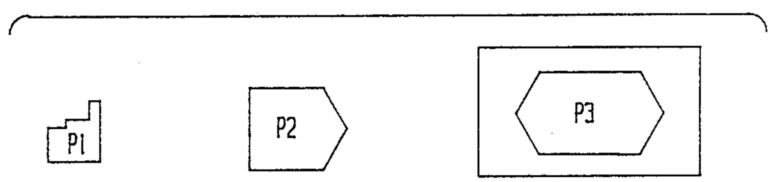
FIG.5C
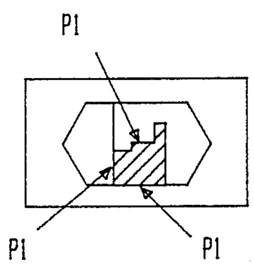
FIG.5D
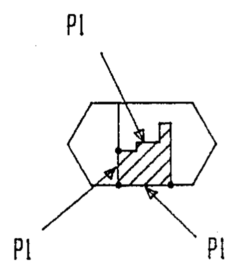
FIG.5E
FIG.5F
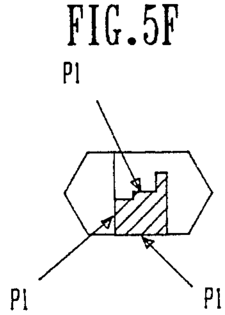
FIG.5G
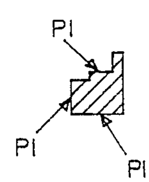

(L)
PART DEFINITION OUTPUT

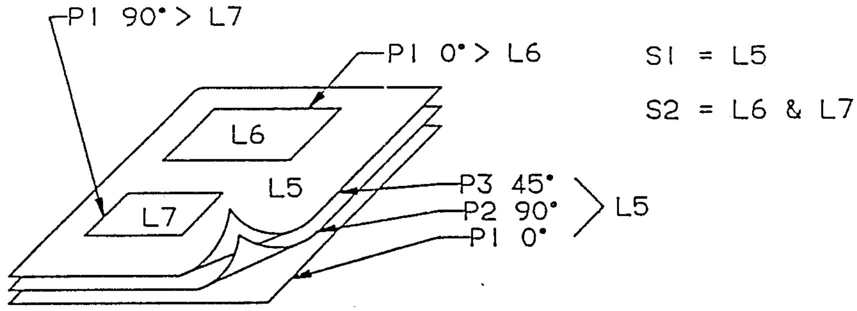
FIG. 14
PLY, LAYUP, SEQUENCE
FIG. 15B
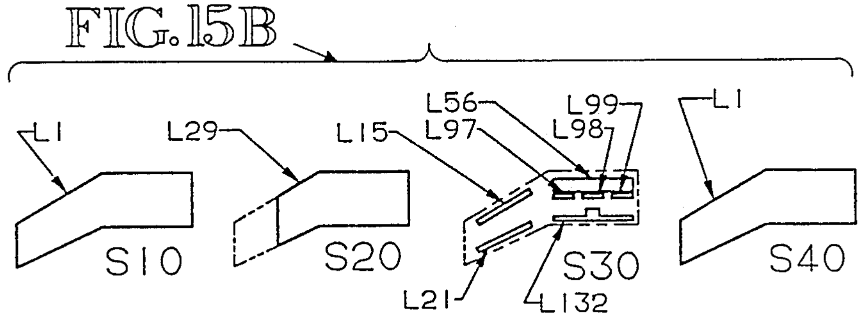
SEQUENCES
FIG. 16
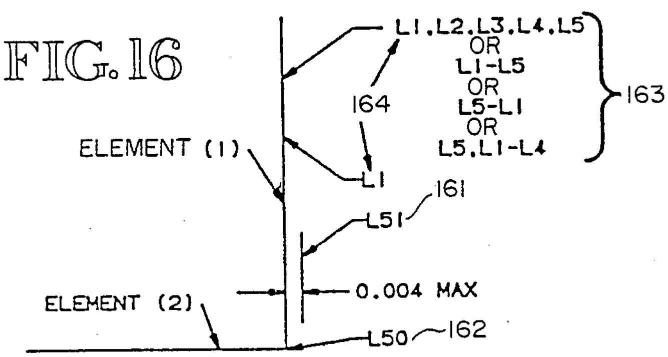
ARROWHEADS

PLY TABLE:-101 PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

PLY TABLE:-102 OPPOSITE PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | ∓22.5° | P1 | 50XX | | | A |
| | | | | | | | |

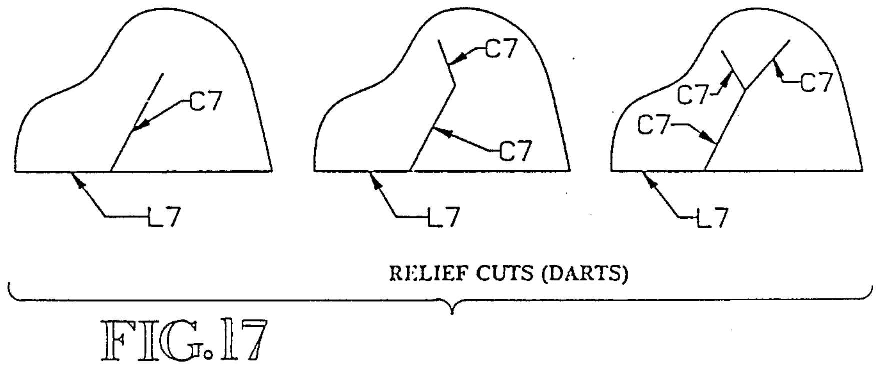
FIG. 17
FIG. 18
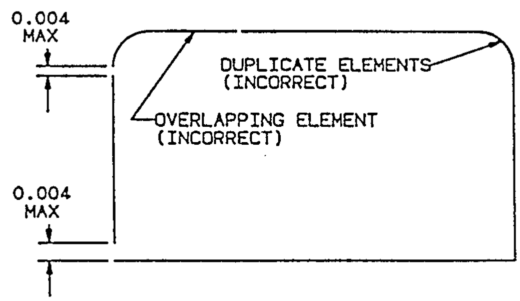
DUPLICATE ELEMENTS

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 7201 | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 7202 | | | A |

195 194 197 198 202 199 200 201

PLY TABLE

191

PLY TABLE:-102 OPPOSITE PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15, L21 | 0° | P1 | 7202 | | | |
| | | 90° | P2 | | | | |
| | L56 | 0° | P1 | 7201 | | | |
| | L97, L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 7202 | | | A |
| | | | | | | | |
| | | | | | | | |
| | | | | | | | |
| | | | | | | | |
| | | | | | | | |

196

| Field | Units |
| --- | --- |
| MATERIAL CODE | |
| MATERIAL DESCRIPTION | |
| MATERIAL DEFINITION | |
| MATERIAL WIDTH | (in) |
| MATERIAL GRADE | |
| MATERIAL STYLE | |
| THICKNESS | t (in) |
| YOUNG'S MODULUS IN THE GRAIN DIRECTION | $E_1$ (lb/in$^2$) |
| YOUNG'S MODULUS IN THE TRANSVERSE DIRECTION | $E_2$ (lb/in$^2$) |
| POISSON'S RATIO | $\nu_{12}$ (in/in) |
| SHEAR MODULUS IN THE 1-2 PLANE | $G_{12}$ (lb/in$^2$) |
| SHEAR MODULUS IN THE 1-3 PLANE | $G_{13}$ (lb/in$^2$) |
| SHEAR MODULUS IN THE 2-3 PLANE | $G_{23}$ (lb/in$^2$) |
| DENSITY | (lb/in$^3$) |
| COEFFICIENT OF THERMAL EXPANSION IN GRAIN DIRECTION | $\alpha_1$ (in/in/°F) |
| COEFFICIENT OF THERMAL EXPANSION IN TRANSVERSE DIRECTION | $\alpha_2$ (in/in/°F) |

| Approval | |
| --- | --- |
| MATERIAL | DATE |
| SPECIFICATIONS | DATE |
| WEIGHTS | DATE |
| STRESS | DATE |
| TECH STAFF APPROVAL | DATE |

MATERIAL DEFINITION

FIG. 20

CHAIN LOGIC

CHAIN LOGIC

CHAIN LOGIC

DESIRED GEOMETRY

MULTIPLE ARROW/TEXT CALLOUTS

TWO ELEMENTS

LOGICS

PROGRAM LOGIC

LOGIC TABLE STEP 1

LOGIC TABLE STEP 2

LOGIC TABLE STEP 3

MULTI-SHEET DRAWING

MULTI-SHEET DRAWING

FLAT PATTERNS

ERROR MODEL DISPLAY

ARROWHEAD ERROR TABLE

PLY TABLE ERROR DISPLAY

LAYUP DISPLAY

SEQUENCE OVERLAP ERRORS

| | | | | | | | |
|---|---|---|---|---|---|---|---|
| 690 | 85 | 510TE0001ILYUP010102 | 14 | 664.337 | -0.000 | -12.108 | 7202 |
| 700 | 86 | 510TE0001ILYUP010102 | 15 | 931.679 | -0.000 | -12.000 | 7202 |
| 710 | 87 | 510TE0001ILYUP010102 | 16 | 675.929 | -0.000 | -12.110 | 7202 |
| 720 | 88 | 510TE0001ILYUP010102 | 5 | 931.679 | -0.000 | -12.000 | 7202 |
| 730 | 89 | 510TE0001ILYUP010102 | 17 | 931.679 | -0.000 | -12.000 | 7202 |
| 740 | 90 | 510TE0001ILYUP010101 | 5 | 931.679 | -0.000 | -12.000 | 7202 |
| 750 | 91 | 510TE0001ILYUP010102 | 18 | 687.395 | -0.000 | -12.111 | 7202 |
| 760 | 92 | 510TE0001ILYUP010101 | 25 | 931.679 | -0.000 | -12.000 | 7202 |
| 770 | 93 | 510TE0001ILYUP010102 | 19 | 931.679 | -0.000 | -12.000 | 7202 |
| 780 | 94 | 510TE0001ILYUP010102 | 20 | 475.740 | 0.000 | -12.164 | 7202 |
| 790 | 95 | 510TE0001ILYUP010102 | 17 | 931.679 | -0.000 | -12.000 | 7202 |
| | | | TOTAL | 46481.367 | | | |
| | | | | MASS | -0.000 | -12.044 | |

| MATERIAL | TOTAL AREA | TOTAL WEIGHT |
|---|---|---|
| 7250 | 931.679 | 0.391 |
| 7202 | 45549.691 | 18.876 |

FIG. 40

INFORMATION MODEL

| | | | |
|---|---|---|---|
| 0.275 | 4.916 | 0.0. | |
| 0.386 | 6.894 | -45.0. | |
| 0.280 | 5.002 | 0.0. | |
| 0.386 | 6.894 | 45.0. | |
| 0.386 | 6.894 | 0.0. | |
| 0.386 | 6.894 | -45.0. | |
| 0.285 | 5.087 | 0.0. | |
| 0.386 | 6.894 | 0.0. | |
| 0.386 | 6.894 | 45.0. | |
| 0.197 | 3.520 | 0.0. | |
| 0.386 | 6.894 | 90.0. | |
| 19.267 | 344.05 | | |

PLY TABLE:-101 PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

PLY TABLE:-102 OPPOSITE PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15, L21 | 0° | P1 | 7202 | | | |
| | | 90° | P2 | | | | |
| | L56 | 0° | P1 | 60XX | | | |
| | L97, L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 50XX | | | A |
| | | | | | | | |

VIEW PV
SCALE = 1/2

INTERACTIVE POINT MODEL

PLY TABLE:-102 OPPOSITE PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 50XX | | | A |

PLY TABLE:-101 PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

PIERCE MODEL DISPLAYS

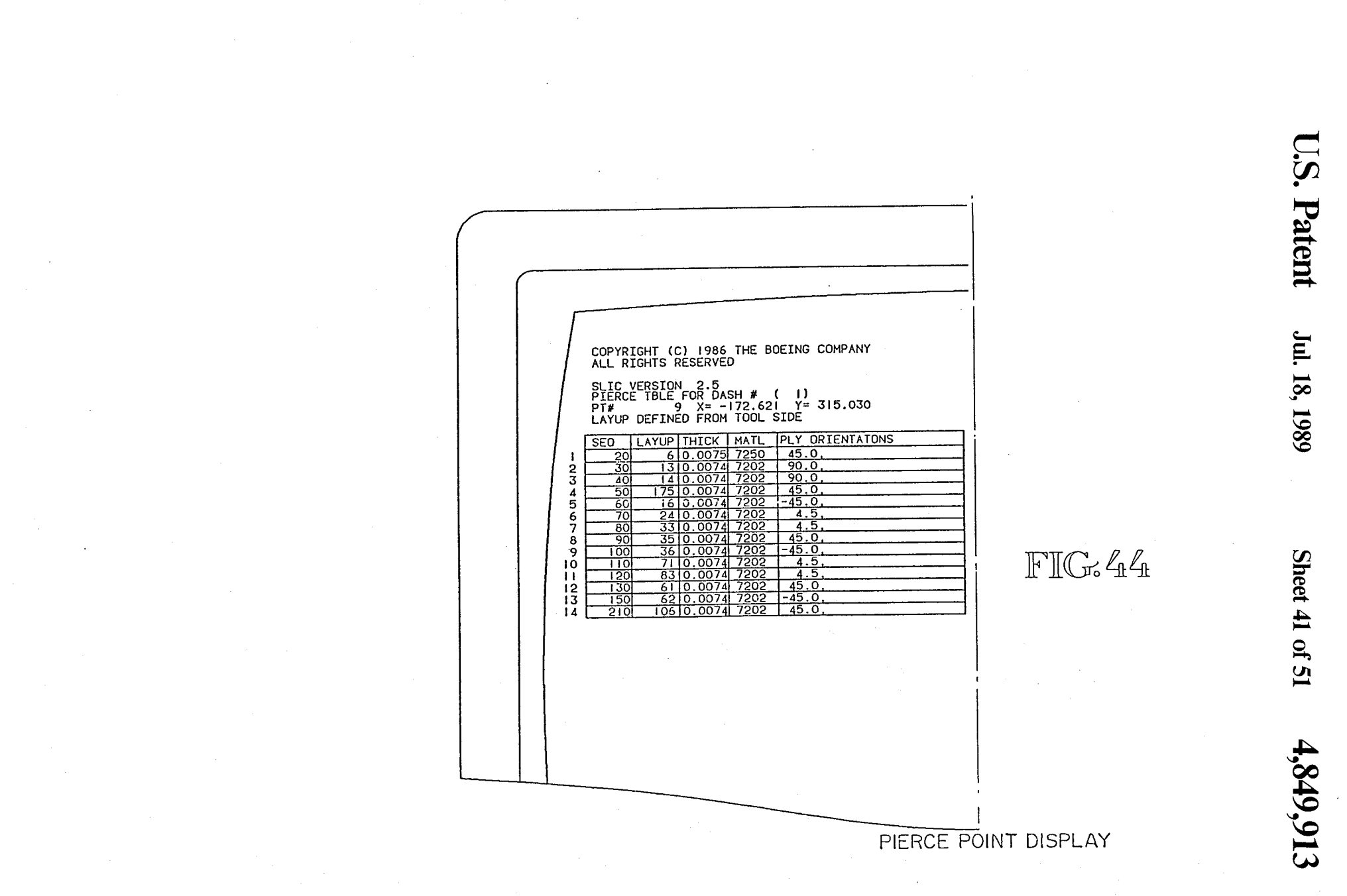

COPYRIGHT (C) 1986 THE BOEING COMPANY
ALL RIGHTS RESERVED

SLIC VERSION 2.5
PIERCE TBLE FOR DASH # ( 1)
PT# 9 X= -172.621 Y= 315.030
LAYUP DEFINED FROM TOOL SIDE

| | SEQ | LAYUP | THICK | MATL | PLY ORIENTATONS |
|---|---|---|---|---|---|
| 1 | 20 | 6 | 0.0075 | 7250 | 45.0, |
| 2 | 30 | 13 | 0.0074 | 7202 | 90.0, |
| 3 | 40 | 14 | 0.0074 | 7202 | 90.0, |
| 4 | 50 | 175 | 0.0074 | 7202 | 45.0, |
| 5 | 60 | 16 | 0.0074 | 7202 | -45.0, |
| 6 | 70 | 24 | 0.0074 | 7202 | 4.5, |
| 7 | 80 | 33 | 0.0074 | 7202 | 4.5, |
| 8 | 90 | 35 | 0.0074 | 7202 | 45.0, |
| 9 | 100 | 36 | 0.0074 | 7202 | -45.0, |
| 10 | 110 | 71 | 0.0074 | 7202 | 4.5, |
| 11 | 120 | 83 | 0.0074 | 7202 | 4.5, |
| 12 | 130 | 61 | 0.0074 | 7202 | 45.0, |
| 13 | 150 | 62 | 0.0074 | 7202 | -45.0, |
| 14 | 210 | 106 | 0.0074 | 7202 | 45.0, |

FIG. 44

PIERCE POINT DISPLAY

```
ET = (EX * T)                          =  0.5397E+07
TOTAL THICKNESS                        = 0.5625 IN
LONGITUDINAL MODULUS (E1) EX           =  0.9595D+07 PSI
TRANSVERSE MODULUS   (E2) EY           =  0.4805D+07 PSI
SHEAR MODULUS       (G12) GXY          =  0.3655D+07 PSI
POISSON'S RATIO    (NU12) VXY          = .5572
POISSON'S RATIO    (NU21) VYX          = .2791
LONGITUDINAL C.T.E. ALPHA  X           =  0.2851D-06 IN/IN/DE
TRANSVERSE C.T.E.   ALPHA  Y           =  0.4811D-06 IN/IN/DE
APPARENT SHR C.T.E. ALPHA XY           = -0.4350D-07 IN/IN/DE
```

| A | B |
|---|---|
| B | D |

THE ELEMENTS IN THE STIFFNESS MATRIX ARE:

| | | | | | |
|---|---|---|---|---|---|
| 0.6391D+07 | 0.1783D+07 | 0.3778D+06 | 0.2342D+04 | 0.1541D+04 | 0.1018D+05 |
| 0.1783D+07 | 0.3201D+07 | 0.1947D+06 | 0.1541D+04 | 0.2183D+04 | 0.1017D+05 |
| 0.3778D+06 | 0.1947D+06 | 0.2056D+07 | 0.1018D+05 | 0.1017D+05 | 0.2056D+04 |
| 0.2342D+04 | 0.1541D+04 | 0.1018D+05 | 0.1481D+06 | 0.4485D+05 | 0.1127D+05 |
| 0.1541D+04 | 0.2183D+04 | 0.1017D+05 | 0.4485D+05 | 0.1078D+06 | 0.5839D+04 |
| 0.1018D+05 | 0.1017D+05 | 0.2056D+04 | 0.1127D+05 | 0.5839D+04 | 0.5194D+05 |

```
TOTAL PLYS BY ORIENTATION
   45.0 =   26  34.2%        TOTAL =   76
   90.0 =    4   5.3%
  -45.0 =   20  26.3%
    4.5 =   18  23.7%
    0.0 =    8  10.5%
```

FIG. 44 CONT.

PIERCE POINT COORDINATE SYSTEM

```
//JOB CARD
//*
//*
//*SLIC
//SLIC EXEC PGM=SLIC,TIME=10,REGION=6000K
//         PARM='TABLE,BPERCE'
//STEPLIB     DD DISP=SHR,DSN=P.CADM.GEOM.BATCH.LOAD
//SYSPRINT    DD DUMMY
//SYSUDUMP    DD SYSOUT=A
//SYSOUT   DD   SYSOUT=A
//SORTWK01 DD UNIT=SYSDA,SPACE=(TRK,(60),,CONTIG)
//SORTWK02 DD UNIT=SYSDA,SPACE=(TRK,(60),,CONTIG)
//SORTWK03 DD UNIT=SYSDA,SPACE=(TRK,(60),,CONTIG)
//FT05F001    DD DDNAME=SYSIN
//FT06F001    DD SYSOUT=A
//FT09F001    DD SYSOUT=A                     OUTPUT DIAGNOSTICS FOR BATCH PIERCE
//*
//FT10F001    DD DSN=XXX.XXX,DISP=(OLD,KEEP) OUTPUT MAT CARDS FOR BATCH PIERCE
//*
//FT11F001 DD DSN=XXXX.XXXX,DISP=SHR    INPUT CARDS
//*
//                                      GENERIC OUTPUT
//DRAWFILE DD DSN=CADAM.DRAWFILE.GGGG.DRAW,DISP=SHR
//INDEX    DD DSN=CADAM.DRAWFILE.GGGG.VTOC,DISP=SHR
//SYSIN       DD *
GGGG UUUUUU   W510-12345****0101--
GGGG UUUUUU   W510-12345****0102--
GGGG UUUUUU   W510-12345****0103--
/*

            USER       MODEL IDS          GROUP

----+----1----+----2----+----3----+----4----+----5----+----6----+----7----+----8
                 └COLUMN 15
       └COLUMN 6
 └COLUMN 1
```

JOB CONTROL LANGUAGE

FIG. 46

PREPARED SEQUENCE FORMAT MODEL

FIG. 50 SLIC SEQUENCE PAGES
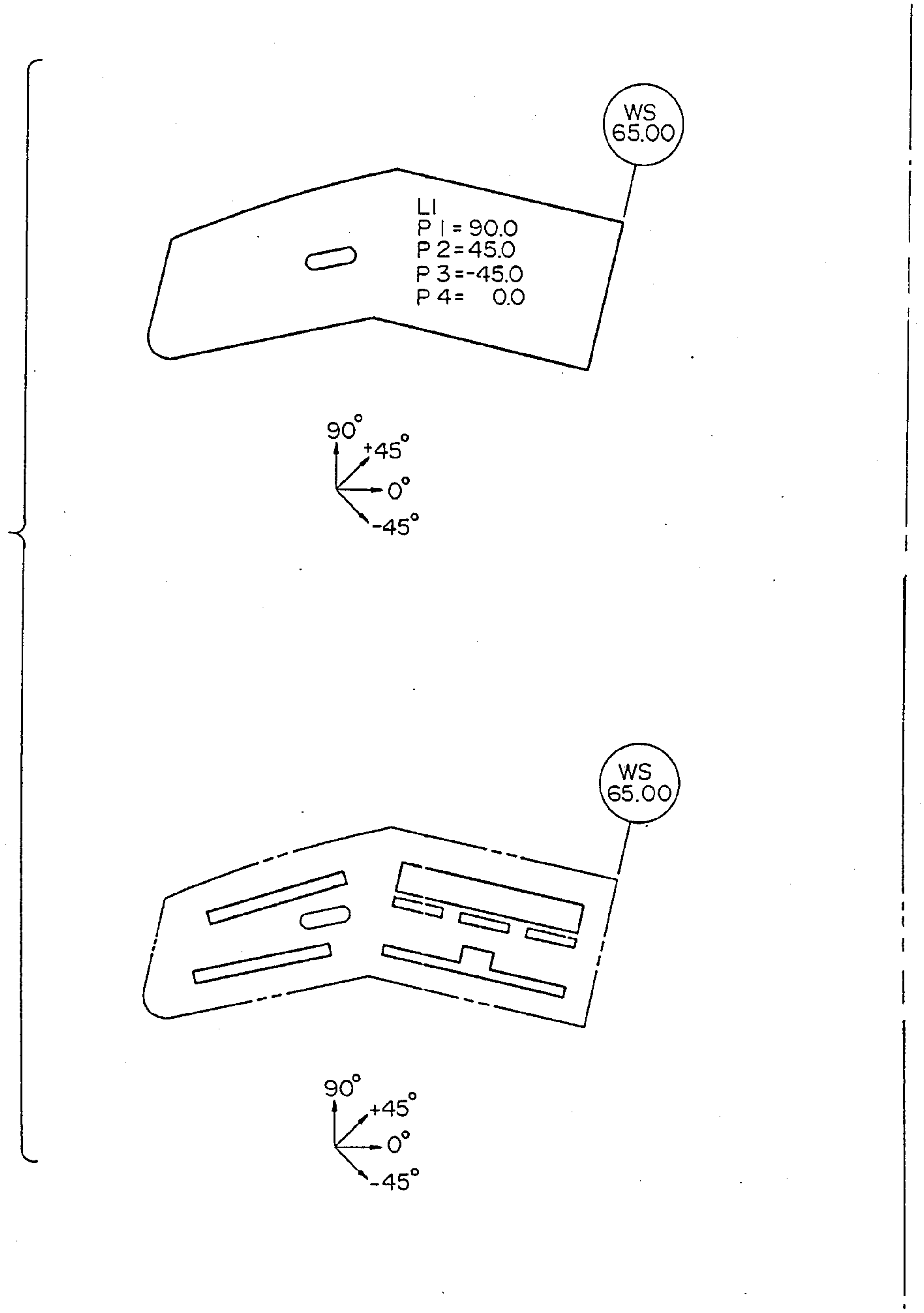

METHOD FOR THE DESIGN AND CONSTRUCTION OF COMPOSITE PARTS

TECHNICAL FIELD

This invention relates to improved methods and systems for the design and construction of composite parts, and more particularly, to an automated system for integrating the design, analysis and manufacture of composite parts.

BACKGROUND ART

In certain applications, parts composed primarily of composite materials have significant advantages. A composite airplane wing, for example, can provide twice the life of a conventional metal wing with no increased weight, and, at the same time, provide increased operational capabilities.

Composite parts are fabricated using several layers of composite materials, or plies, that are assembled and cured to form a laminate. The composite material is commonly a fabric or tape that is comprised of fibers having a common orientation. Each layer of this material will have a set fiber orientation along an orientation axis with structural properties that vary in accordance with the relationship to the orientation axis.

The designer of a composite part can combine layers of this material in defined orientations to produce the desired structural properties for the part. Additional layers of material can be added at locations requiring increased strength and the layers can be oriented to maximize resistance in critical load directions.

Thus, each ply of material has several attributes that must be specified by the designer;

(1) the geometric boundary or perimeter shape of the ply must be defined;

(2) the orientation of the fibers for each ply must be defined;

(3) the position of the ply with respect to the other plies in the part (sometimes called the "stacking position") must be defined. A composite part, such as an airplane wing segment, for example, may be defined by more than 2,000 unique plies.

The design of composite parts is much more complex than designing parts to be fabricated from a homogeneous material, such as metal. Currently, the time required to design, iterate, analyze and program composite parts for fabrication is very high. Because of this complexity, neither human intervention nor manual input can assure that the part will be manufactured as designed.

DISCLOSURE OF THE INVENTION

It is an object of the present invention to provide a method and system for automatically generating a sequence book illustrating how to lay down plies during construction of a composite part.

It is another object of this invention to provide a method and system allowing improved structural interrogation of composite parts at various "pierce points."

It is a further object of this invention to provide an improved method and system for automatically feeding data on composite parts into a finite element modeler.

It is another object of this invention to provide an improved method and system for automatically calculating and tabulating the ply weights for individually plies of a composite part and the total weight and centroid of such parts.

It is another object of the invention to provide an improved method and system for reviewing cross sections of composite parts at selected locations and generating corresponding layer and thickness plots.

It is another object of this invention to provide an improved method and system for automatically generating tool paths to cut out the plies of a composite part from sheets of ply material.

It is another object of this invention to provide such an improved method and system which will interface with existing nesting products, such as PINS by Precision Nesting Systems, Inc., of Demarest, N.J.

These and other objects of the invention, which will become more apparent as the invention is described more fully below, are obtained by providing an improved system and method. In a preferred embodiment, a System Logic for Integrated Composites (SLIC) system is designed to take engineering composite drawings released in a computer-aided design (CAD) data set, determine the attributes of each of the plies into its composite drawing, and pass the information on to using organizations.

Not only does the information need to be released to all operations organizations, but it also needs to be communicated within engineering groups, such as stress analysis groups. SLIC bridges the gap between engineering, manufacturing, and quality assurance disciplines.

In preferred embodiments, such as SLIC, the system logically determines the geometric definitions for each ply contained in a composite part. If a ply is not completely defined, SLIC reports the error to the user. Automatic error checking assures the designer that the design is of the quality required to meet downstream operations data requirements.

Analysis of the physical properties of a part is also provided to the technical engineering staff. This analysis data may be passed directly from SLIC to NASTRAN, which is an engineering stress analysis system provided by The Mac Neal-Schwendler Corporation of Los Angeles, Calif. Computation of the total part weight and centroid location is performed by the system.

Additionally, SLIC creates detailed engineering models of each composite ply, based upon the complete composite design. SLIC interprets the design and passes it directly to manufacturing, thus automating the design/build process. Because SLIC forces the designer to correct all geometric definitions, there is a resultant savings in time and money because of reduced errors passed from engineering to manufacturing.

SLIC generates an enormous amount of valuable data that can save thousands of person-hours on a design and build project. Examples of useful data include pierce point data that presents the thickness and properties of the part at any specific location; creation of a table that defines the area, weight and centroid of each ply; a sequence book that supplies the geometry and the order in which the plies are to be placed on a cutting tool; a section view at any location on the part; and point-to-point information to drive numerical control machines in the factory. This information can be used to drive fabric cutters, such as a Gerber knife, laser inspection machines, and other tools.

BRIEF DESCRIPTION OF THE DRAWINGS

FIG. 5B is an illustration of several unique ply shapes on a common drawing.

FIG. 5C is an illustration of the plies of FIG. 5B, as determined by visual interrogation.

FIG. 5D illustrates the plies of FIG. 5B with ply 1 highlighted.

FIG. 5E is an illustration of FIG. 5E after step 1 of the Build Ply logic has been applied.

FIG. 5F is an illustration of FIG. 5E after step 2 of the logic has been applied.

FIG. 5G is an illustration of FIG. 5F after step 3 of the logic has been applied.

FIG. 14 is an isometric view illustrating a typical poly, layup, and sequence.

FIG. 16 is an illustration of arrowheads on elements in a composite drawing.

FIG. 17 is an illustration of relief cuts in a layup.

FIG. 18 is an illustration of duplicate elements, overlapping elements, and gaps between elements.

FIG. 20 is an illustration of a material definition sheet.

FIG. 44 illustrates a screen display for pierce points.

FIG. 46 illustrates proper drop job control language.

BEST MODE FOR CARRYING OUT THE INVENTION

A preferred embodiment of the present invention is implemented on an IBM 4381 Series computer using the MVS.XA Operating System in conjunction with CADAM Version II, Release 20.0, and above by means of a software system known as "System Logic for Integrated Composites," or "SLIC." An object code listing for SLIC is provided in Table I of this application. The CADAM system is available from Cadam, Inc., of Burbank, Calif. The SLIC system also calls routines from the "BCS LIB-Math/Stat/Utility Subprogram Library," available from Boeing Computer Services of Bellevue, Wash. SLIC calls the following routines (and any supporting routines) from BCS LIB: ISRCHV; ISRCH; KOMPRV; HGTIME; HGDATE; HQRWZERO; PROOT; HDGELE; MWGETP; and CHARFL.

Figure 51:
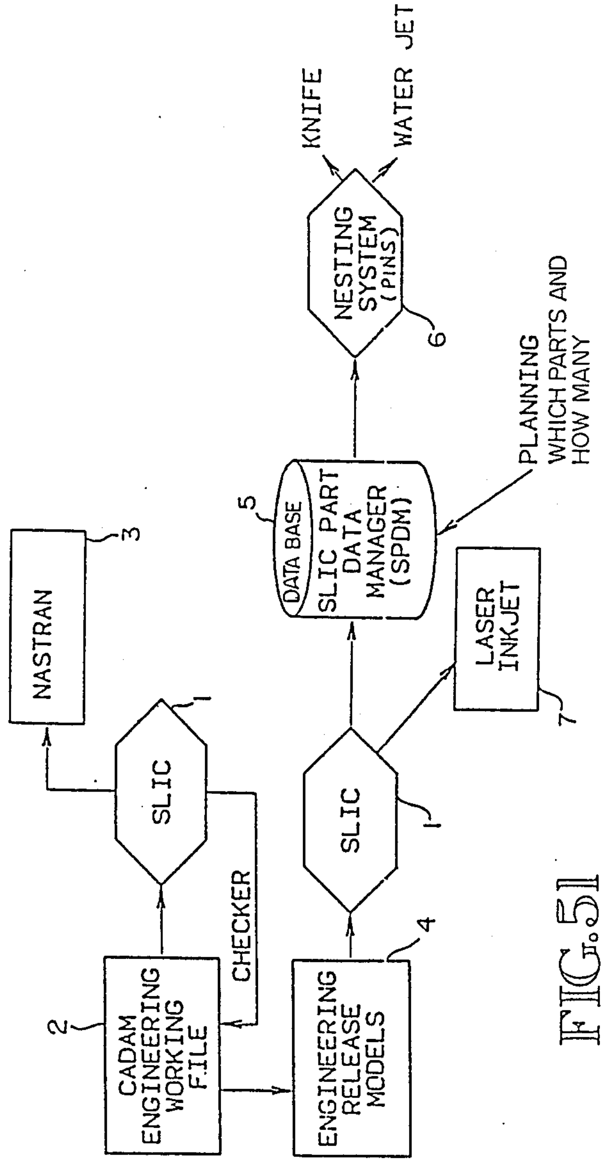
FIG. 51 is a flow chart illustrating the SLIC system as it interfaces with other systems.

The interface of SLIC with existing systems is illustrated in FIG. 51. SCIC 1 takes data from the CADAM Engineering Work File 2 and checks it for accuracy. Data from SLIC can be passed on to NASTRAN 3 for finite element analysis of composite parts. Composite part models 4 that have been released by engineering or other design groups are taken by SLIC and used to generate additional information, as discussed in more detail below. SLIC will calculate part information which is stored in a SLIC part data base manager 5, where it can be used by existing nesting systems, such as PINS 6. Data generated by SLIC can interface with a laser, inkjet or other numerical control equipment 7.

Figure 1:
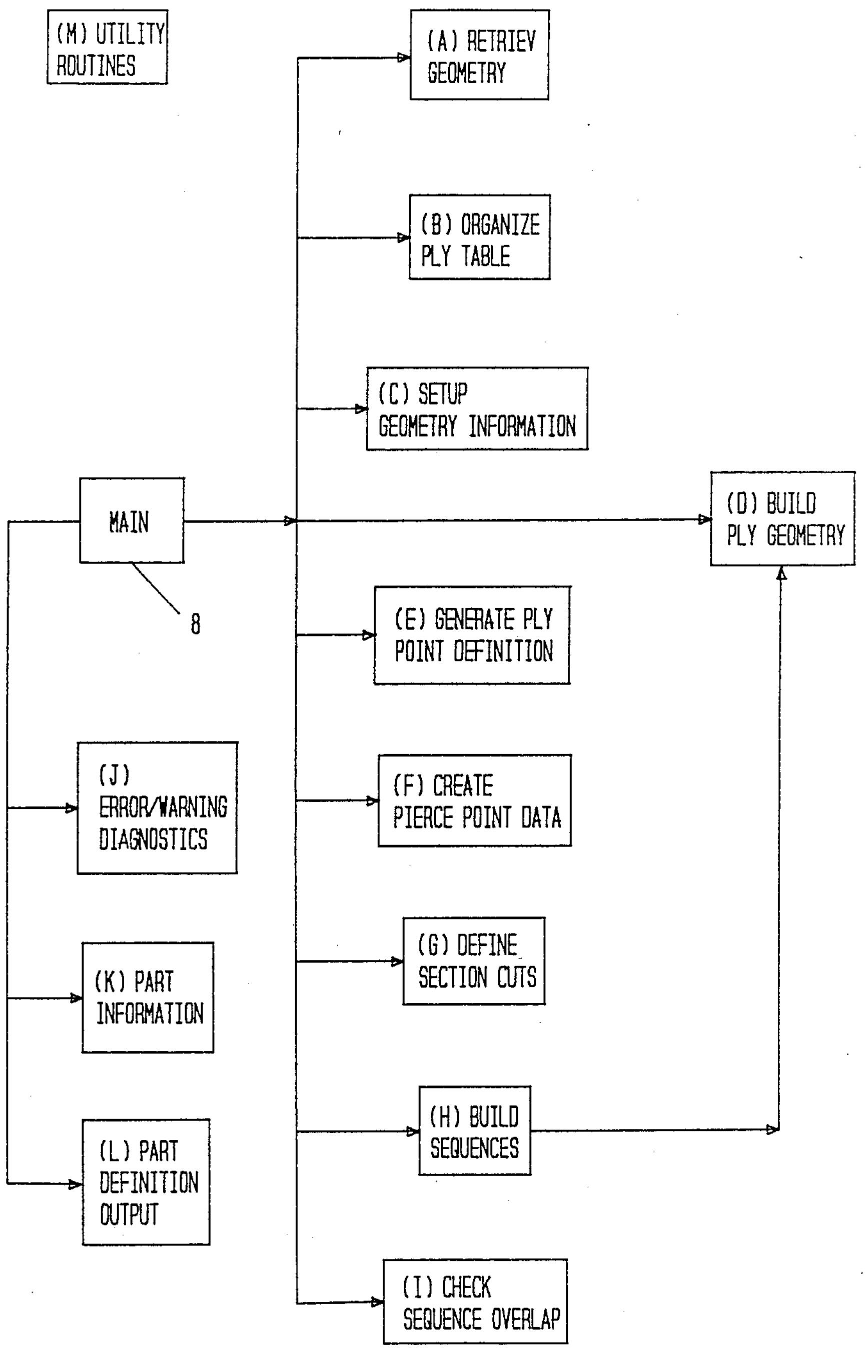
FIG. 1 is a flow diagram illustrating the operation of the routines within the SLIC system.
Figure 2:
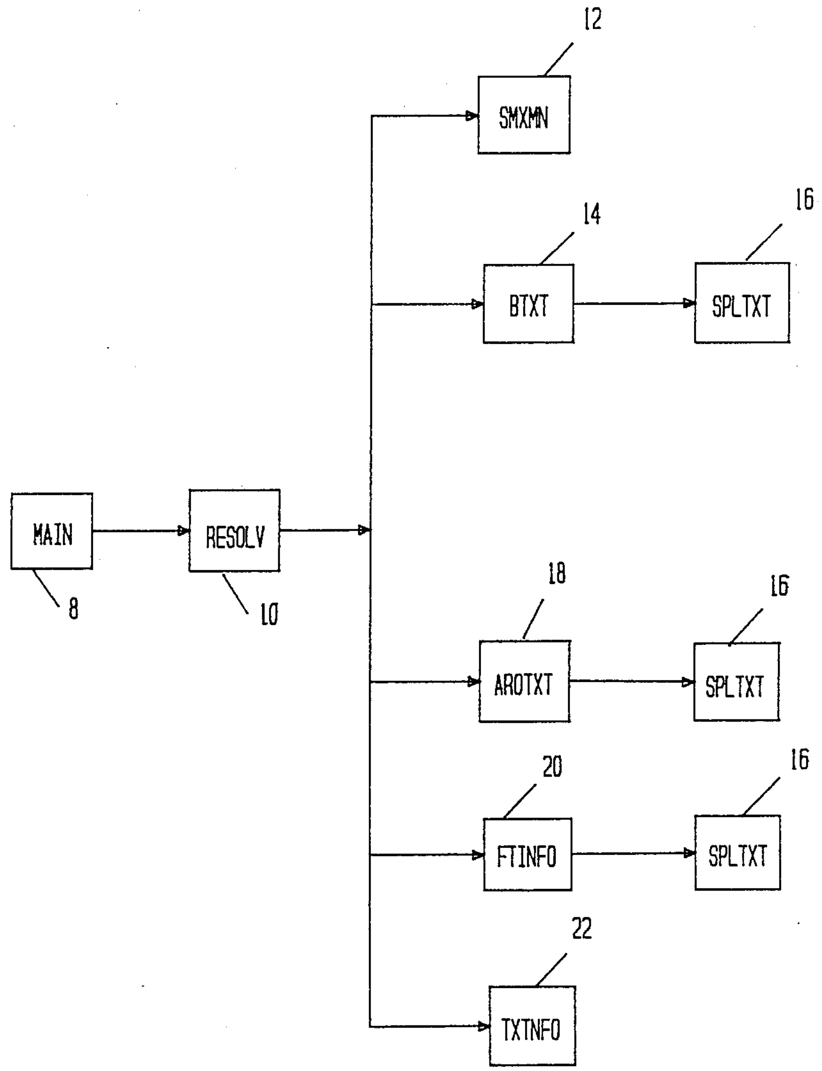
FIG. 2 is a flow diagram illustrating the operation of the Retrieve Geometry routine.
Figure 3:
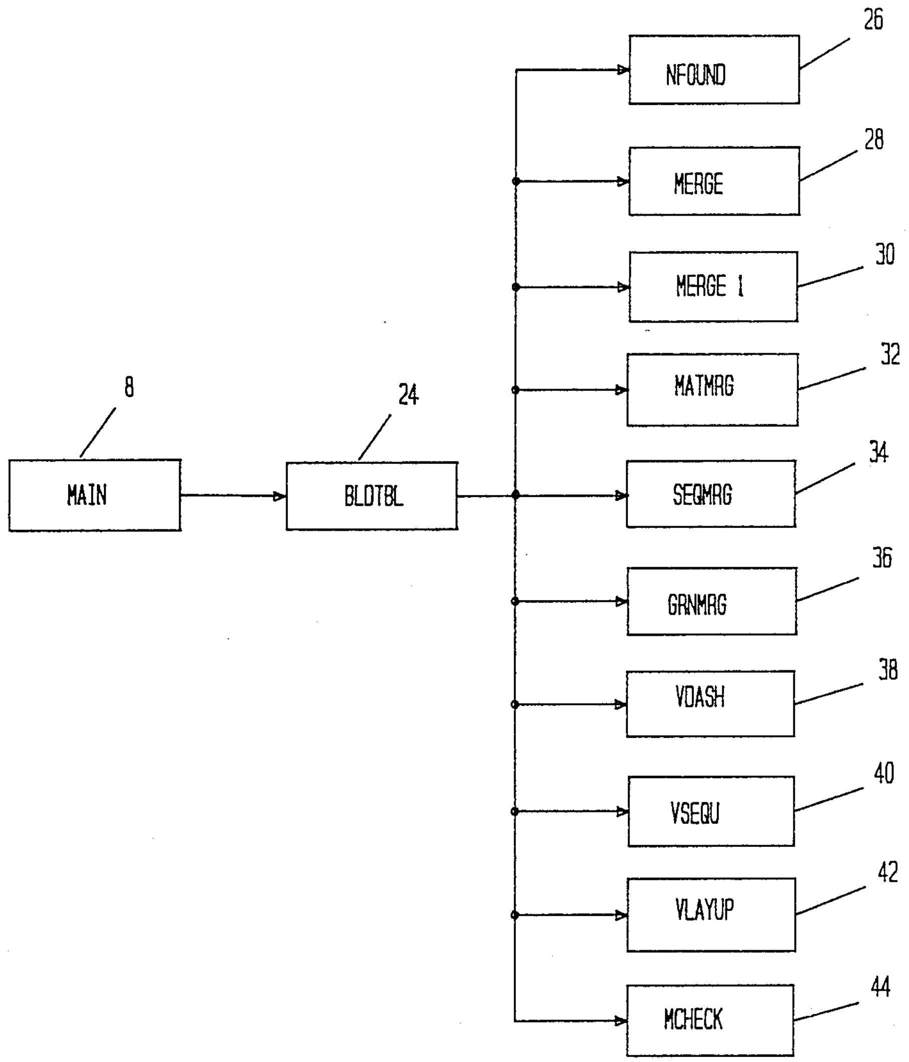
FIG. 3 is a flow diagram illustrating the operation of the Organize Ply Table routine.
Figure 4:
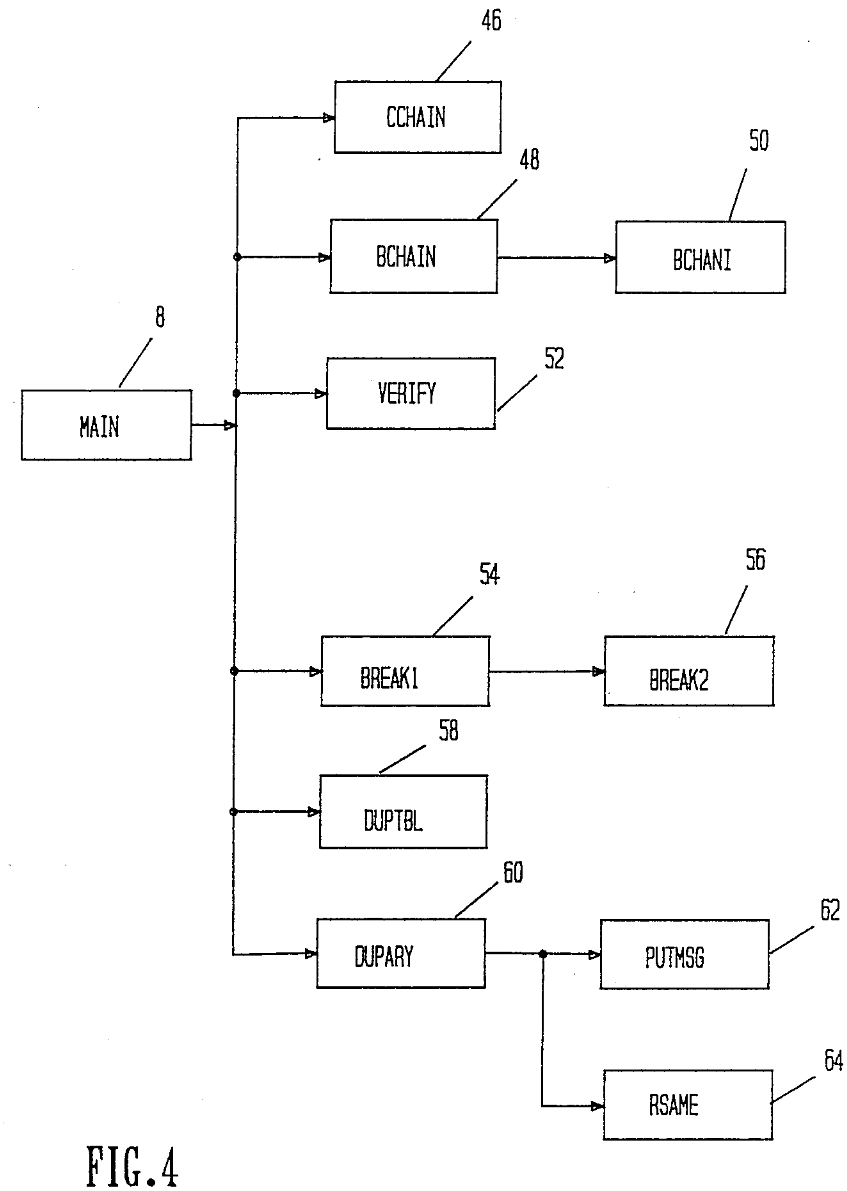
FIG. 4 is a flow diagram illustrating the operation of the SET Up Geometry Information routine.

The overall design and operation of SLIC is illustrated in the flow chart of FIG. 1. Function blocks of SLIC have been labeled A–M, with corresponding flow charts for each block illustrated in FIGS. 2–13. The Main routine 8 is the main routine for the entire SLIC system. This routine calls all of the driver routines described below. The total area and centroid of a part is calculated in the Main routine.

A. RETRIEVE GEOMETRY (FIG. 2)

These routines are used to retrieve and store geometry and text information. This information is formatted and used downstream by the various SLIC routines to output the required data. The information is stored in FORTRAN arrays.

Routine RESOLV (10). SLIC interacts with the CADAM model retrieving and storing information. An understanding of this process can be found in the CADAM Geometry Interface Installation Guide. RESOLV contains several FORTRAN entry points which receive information, such as geometric and text data, from the CADAM model. This information is stored in several arrays to be used by SLIC.

Routine SMXMN (12). This routine calculates the maximum and minimum XY values of a CADAM spline. The maximum and minimum values for each bay in the spline are also calculated. This information is used downstream by the break routines to determine if an element's end points break the spline.

Routine BTXT (14). This routine analyzes text from the ply table, breaks it up, and places it in the proper arrays. The array information will be used in other routines to determine the proper format of the ply table.

Routine SPLTXT (16). This routine splits up the text passed to it. If a dash (−) is found between two values, the range of numbers will be generated (i.e., L1–L4 will generate, 1, 2, 3, 4). The numbers generated will be placed in a return array.

Routine AROTXT (18). This routine breaks up the text found on CADAM arrow heads. Arrowheads are used to define the logical path of the geometry on the engineering drawing. Arrowheads are also used to define pierce points. This routine will determine what kind of information has been found and place it in the proper arrays.

Routine FTINFO (20). This routine analyzes text in the sequence format model and stores the data in the proper arrays. This information will be used in the routines that build sequence pages. An explanation of the kind of text found in the sequence format models can be found in the Using SLIC section below.

Routine TXTNFO (22). This routine analyzes and breaks up the attribute text found on the section cut lines. An explanation of section cuts can be found in the Using SLIC section below.

(B) ORGANIZE PLY TABLE (FIG. 3)

These routines will organize the standard ply table information in a format to be used in SLIC. If the information has been improperly defined, error messages will be generated.

Routine BLDTBL (24). This routine is the driver routine for formatting or merging all of the information into standard ply tables. The location of notes is critical to the building of the table. Each dash number/page number note will determine the grouping for each ply table page. If a ply table information note is placed too far away from a dash number/page number note an ERROR message will be generated. This distance can vary depending on the width of the ply table page desired. A sample picture and a brief explanation of the ply table can be found in the Using SLIC section, below. The Users' Manual also defines the ERROR messages that may be generated by these routines.

The ply table is important to SLIC because it defines how the composite part is to be built on the tool.

Ply Table Note Definitions

The ply table notes for SLIC have been placed in a separate CADAM view to avoid confusion with notes in other views.

Ply Table:-101 page 1

Ply Table:-102 opposite page 1

This note is used to define each ply table page. The word "opposite" used in the second note shown tells SLIC that an opposite hand part is being defined.

S20. This note is used to define each sequence number.

L10. This note is used to define each layup number.

45. This note is used to define orientation associated with a layup number. The value of the orientation must be followed by a degree symbol.

7250. This note is used to define the material code. This note must be four numberic characters.

Routine NFOUND (26). This routine will determine if no ply chart information was found in the CADAM models flagged for the SLIC run. For example, if sequence numbers are not defined or placed in the proper view, an ERROR message will be generated.

Routine MERGE (28). This routine will merge the sequence numbers, orientations, and material codes into all the ply table pages. Once the information is merged it will be sorted in Y decending order.

Routine MERGE1 (30). This routine will merge the layup numbers into all the ply table pages. Once the information is merged it will be sorted in Y Y descending order.

Routine MATMRG (32). This routine will match or merge the material codes with the proper layup number for each ply table page.

Routine SEQMRG (34). This routine will match or merge the sequence numbers with the proper layup number for each ply table page.

Routine GRNMRG (36). This routine will match or merge the orientations with the proper layup number for each ply table page.

Routine VDASH (38). This routine will verify that dash number information has been defined properly. For example, page 1 may have been used more than once for a given dash number. ERROR messages will be generated if errors are found.

Routine VSEQU (40). This routine will verify the sequence information to make sure valid values have been obtained.

If a duplicate sequence of numbers for a dash number is found, an ERROR message will be generated.

Routine VLAYUP (42). This routine will verify the layup information to make sure valid values have been obtained. If a duplicate layup for a dash is found, a WARNING message will be generated. If duplicate layup is found for a dash with different material and/or rotations, an ERROR message will be generated. If a layup number is defined in the same sequence, an ERROR message will also be generated.

Routine MCHECK (44). This routine checks the material code defined to see if that material has been defined to SLIC. The actual material code properties are defined in a routine called DEFINE.

If a material is not defined in SLIC, then a message will be generated.

(C) SET UP GEOMETRY INFORMATION (FIG. 4)

The information received from the RETRIEVE routines (Section (A)) is put in the arrays in a random fashion. These routines organize the arrays and set up additional arrays so that processing of the data can be accomplished by other sections.

Routines CCHAIN (46), BCHAIN (48), BCHAN1 (50).

These routines will order the array that contains the elements into groups of chained sections. A pointer array is set up that points to each section of chained elements. A section is considered chained when the end points chain to more than one element or do not chain to any elements.

Routine VERIFY (52). This routine will look at all the arrow heads and find the element that the arrow head lies on. Then the chained section the arrowhead belongs to is identified and stored in an array. This routine assumes that the elements have been chained into sections by the chain routines. It also assumes the array containing the arrowheads has been sorted so all the arrowheads that are in the same location are next to each other in the arrowhead array.

Routine BREAK1 (54), BREAK2 (56). These routines look through all the elements in the element array and determine if an element is a breaker element. If it is, a flag is placed on it. A breaker element is defined as an element that has one of its endpoints that lies on another element. This routine is only called once. By looping through all the elements once and placing flags on them, the process of breaking elements in the BLDPLY logic section (D) is greatly reduced. This is because all the elements don't need to be checked for breaking each time, only the ones with flags placed on them by these routines.

Routines DUPTBL (58), DUPARY (60), PUTMSG (62), RSAME (64). These routines set up an array that points to the section of arrowheads that define a ply. When the main routine builds a specific ply, this array is searched by routine DUPARY and all plys that have arrowheads that point to the same sections are determined to have the same geometry. This saves reprocessing the plies that are identical.

(D) BUILD PLY GEOMETRY (FIG. 5)

These routines are called to build the geometry definitions for each of the plies. When engineering drawings are designed on a computer, the mathematical definitions for the plies can be extracted automatically and used for processes that need the definitions, such as planning, quality, numerical control (NC), programming, and engineering organizations like weights and the technical staff. The problem then is to identify all and only the elements that define the ply boundaries.

Build Ply Geometry operates using a process that, given the original input of geometry and arrowheads placed at logical positions so a person can visually determine where a ply is defined, a ply definition of elements limited to the actual edge of the closed boundary will result, thus producing a definition that can be used for all the disciplines requiring the ply definition. The exammple is a simple example to illustrate the concept, but the process will work on very complex ply definitions.

Figure 5A:
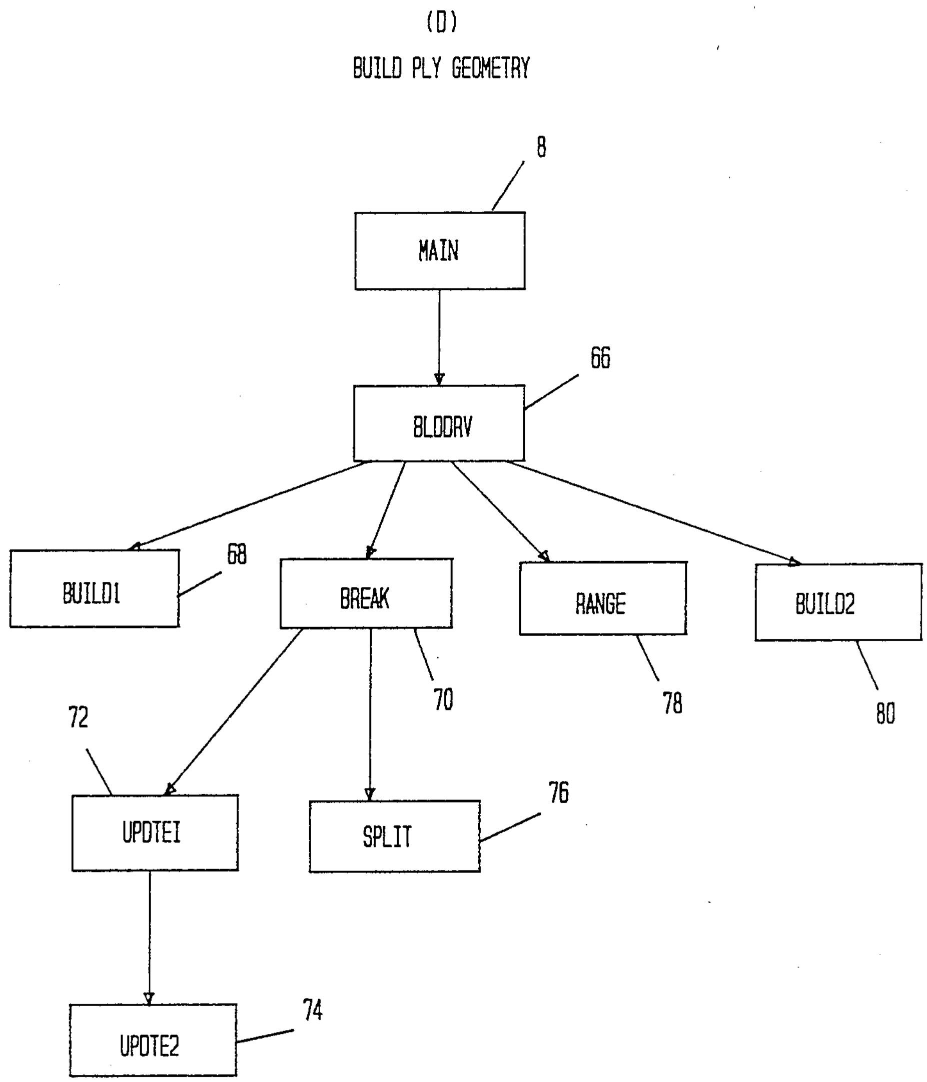
FIG. 5A is a flow diagram illustrating the operation of the Build Ply Geometry routine.
Figure 6:
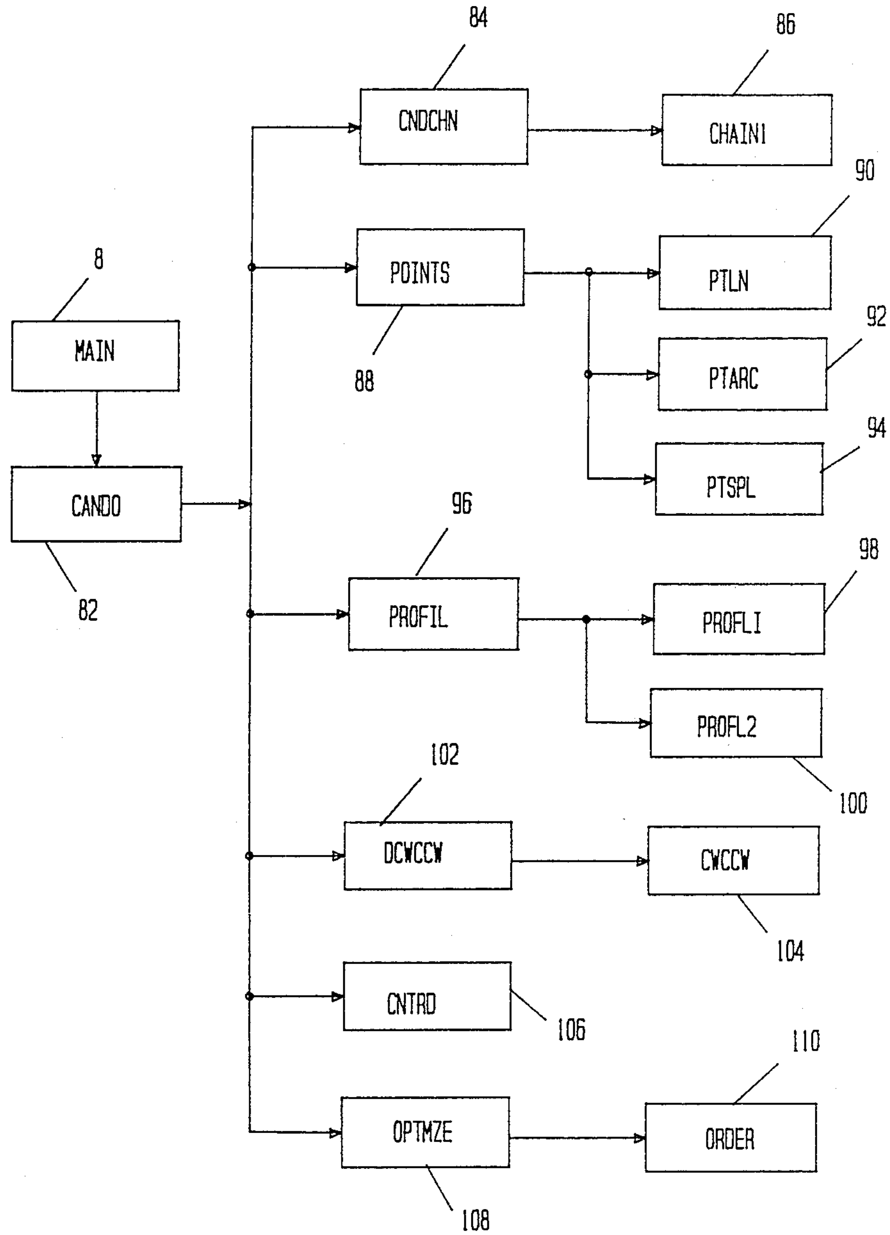
FIG. 6 is a flow chart illustrating the operation of the Generate Ply Point Definition routine.
Figure 7:
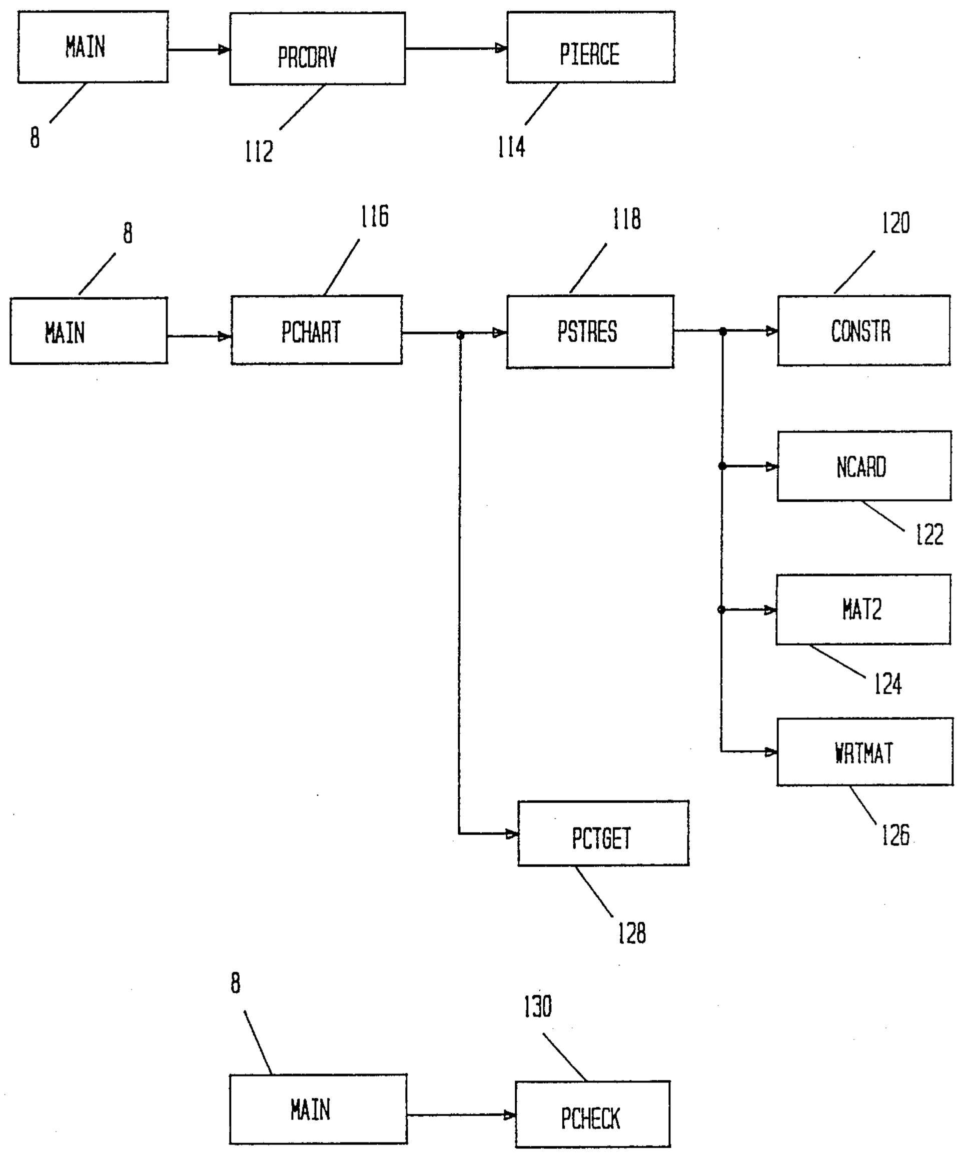
FIG. 7 is a flow chart illustrating the operation of the Create Pierce Point Definition routine.
Figure 8:
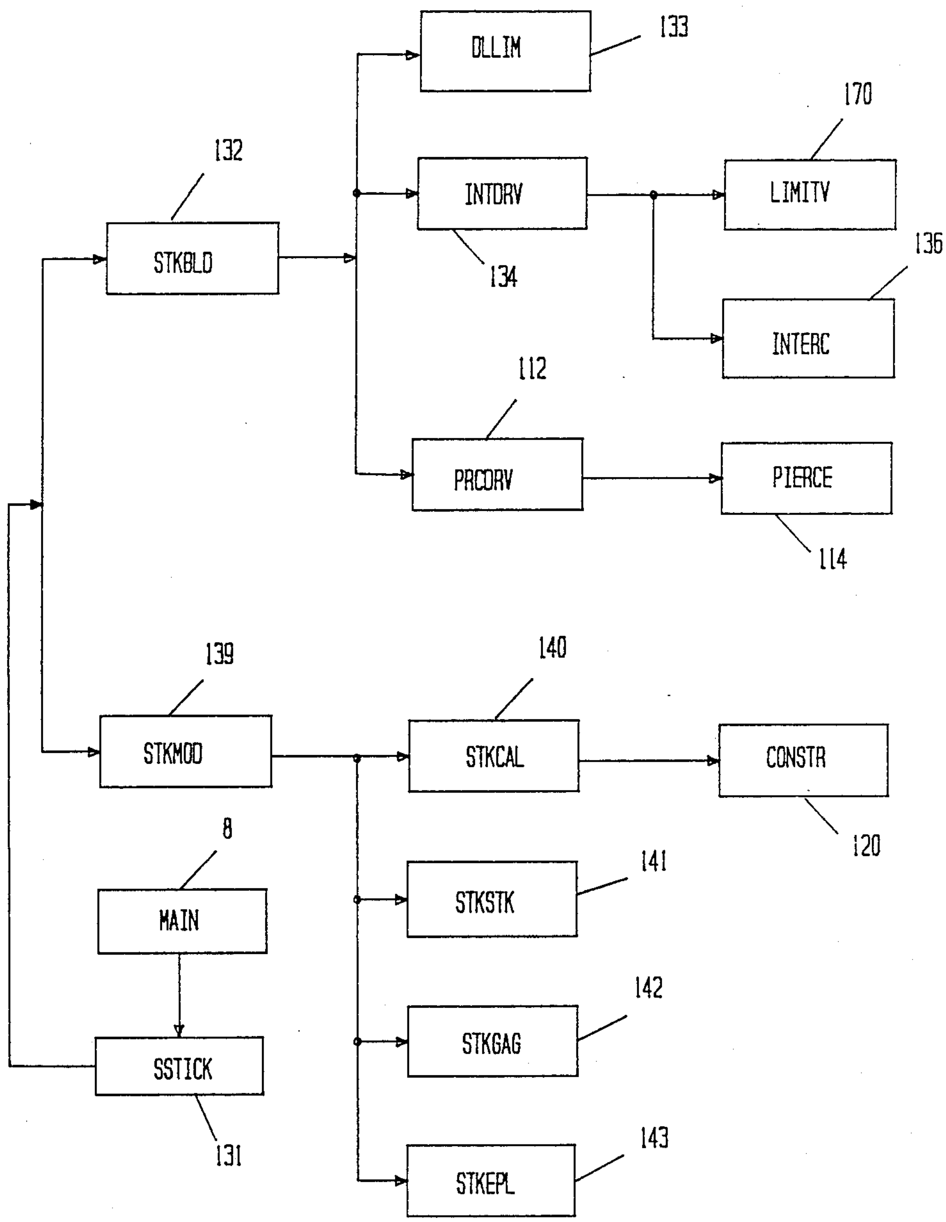
FIG. 8 is a flow chart illustrating the operation of the Define Section Cuts routine.
Figure 9:
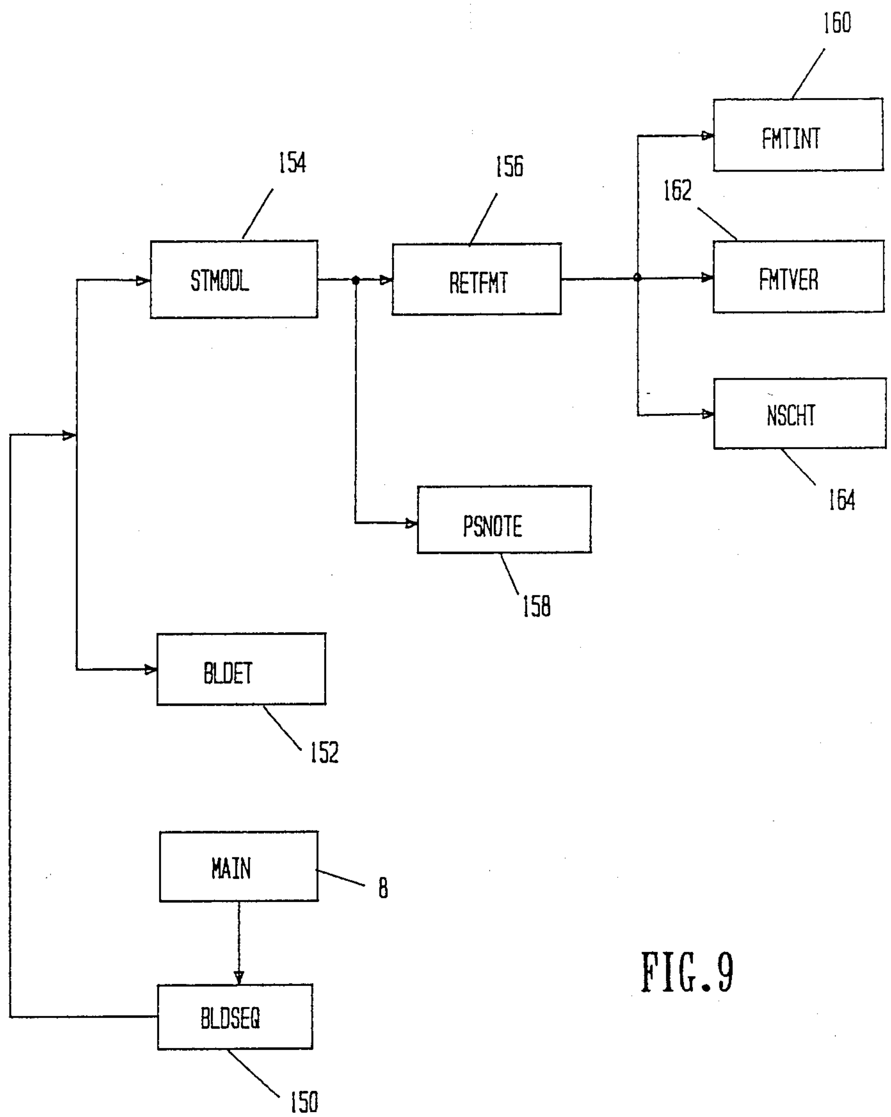
FIG. 9 is a flow chart illustrating the operation of the Build Sequences routine.
Figure 10:
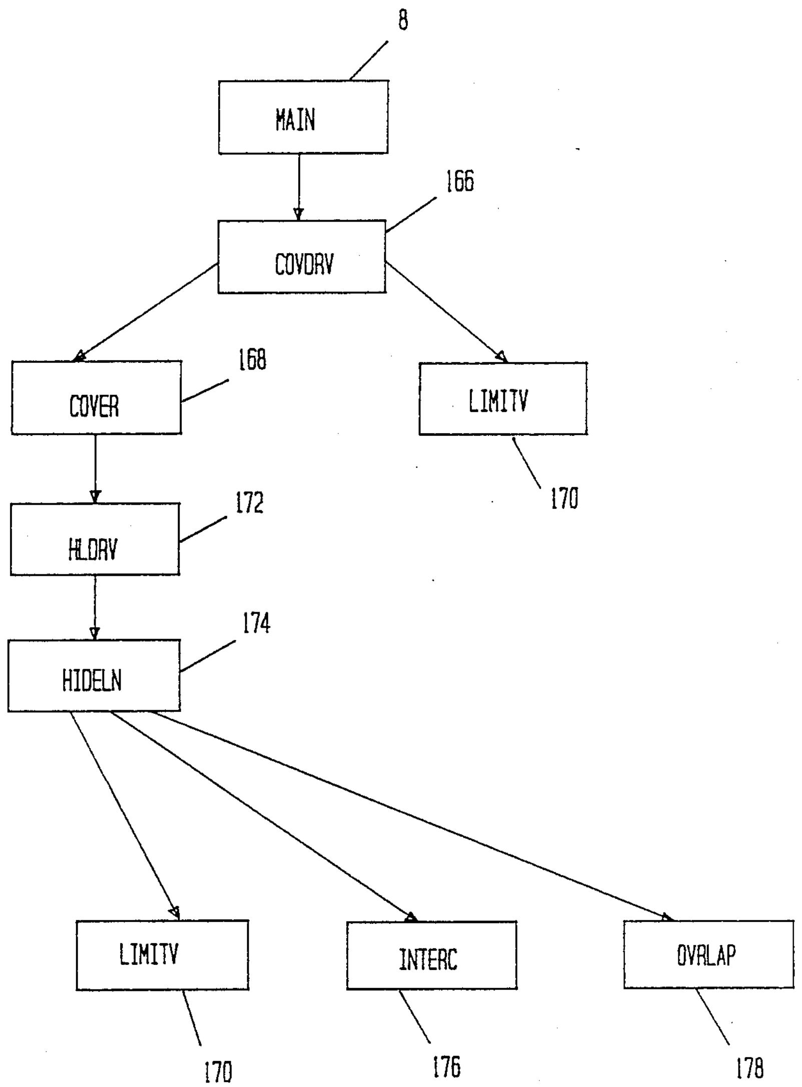
FIG. 10 is a flow chart illustrating the operation of the Sequence Overlap routine.
Figure 11:
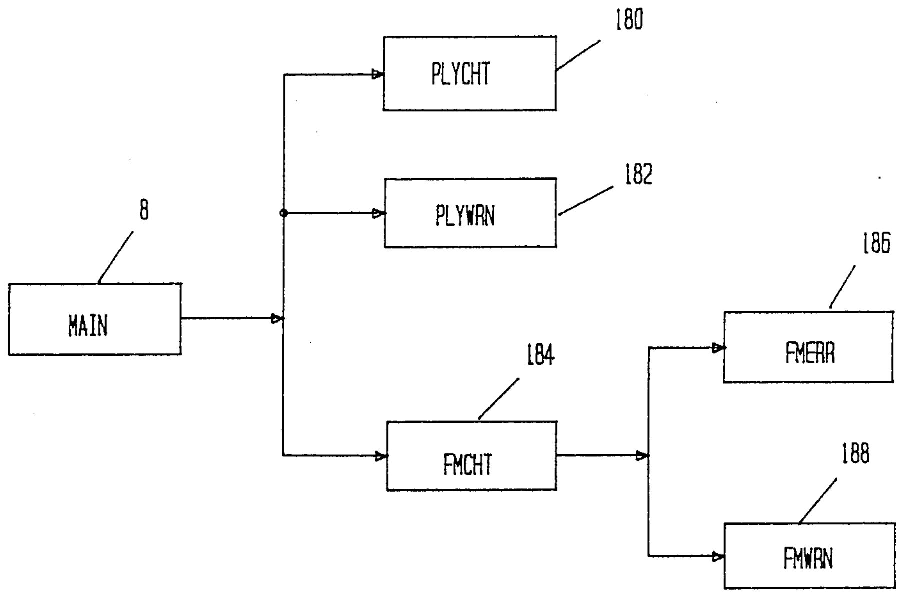
FIG. 11 is a flow chart illustrating the operation of the Error Diagnostic routine.
Figure 12:
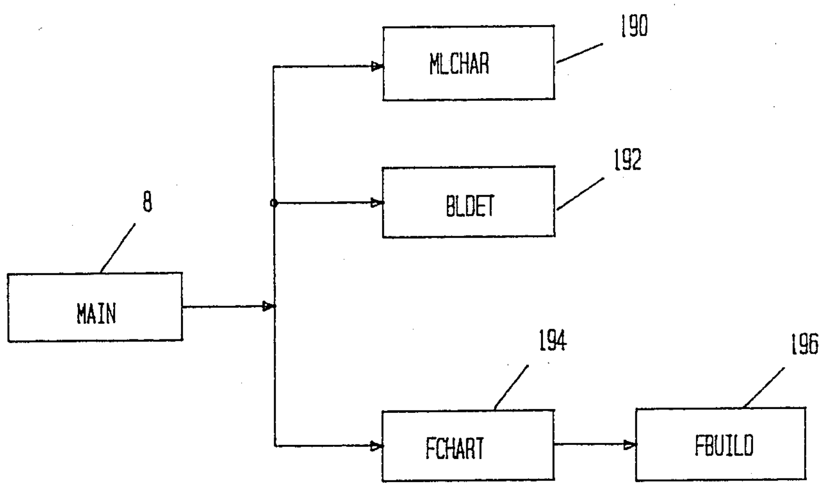
FIG. 12 is a flow chart illustrating the operation of the Part Information routine.
Figure 13:
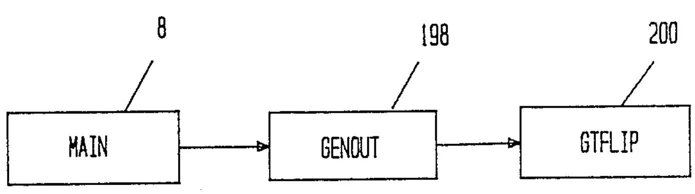
FIG. 13 is a flow chart illustrating the operation of the Part Definition Output routine.

FIG. 5B defines three unique ply shapes. FIG. 5C shows the ply definitions that would result from visual interrogation. The process for this invention will now be predented to illustrate the same results for ply 1 (FIG. 5D):

Step 1. The first step will identify each arrowhead for the ply with an element. Then those elements are chained together on each end point until the end point does not chain or chains to more than one element. This will result in the elements shown in FIG. 5E.

Step 2. Every element that is broken by the endpoint of another is then separated into two elements. For example: the vertical line will be broken (or divided) into two lines (FIG. 5F).

Step 3. The last step is almost identical to step 1 except because of the elements being broken the result will be a group of elements only defining ply 1 (FIG. 5G).

Several of the routines in the section are needed only to handle the arrays that are used in SLIC. The logic could be executed in various ways. The main routines for this section are BLDDRV, BUILD1, BREAK, BUILD2.

Routine BLDDRV (66). This routine is the main driver for executing the build ply logic. The ply number that is to be built is passed in and an array of all the elements that make up the ply boundaries is returned. This routine assumes all the arrays have been set up previously by the Set Up Geometry routines described in section (C) above.

Routine BUILD1 (68). This routine executes the first step of the build ply logic. All arrowheads for the specific ply are identified and connected to one of the elements in the model. Then the connecting elements to each end of the arrowhead elements are found until a branch or no chain is found. All these elements are placed in a table with pointers and flags to keep track of where they came from and what chained section they belong to. (See decription of Step 1, FIG. 5E, above).

Routine BREAK (70). This routine finds the elements that are to be broken and breaks the element by creating two elements in the table instead of one. The routine BREAK calls other routines that handle pointers and flags on the new elements. (See description of step 2, FIG. 5F, above).

Routine UPDTE1 (72), UPDTE2 (74), SPLIT (76), RANGE (78) These routines are used for handling pointers and flags on elements. They are specific to the methods used to store the elements in the arrays and could be dependent on the various data array structures.

Routine BUILD2 (80). This routine looks at the new sections that have been created by breaking elements. It determines what sections still have arrowheads on them and builds the final array of the elements making up the ply definition. It then passes the array back to the calling routine. (See description of step 3, FIG. 5G, above).

(E) GENERATE PLY POINT DEFINITION (FIG. 6)

This section of routines will generate strings of XY points that will define the shape of each layup or ply within a part. These points can be used for several applications, such as tracing or cutting the part on a numerical control machine.

Routine CANDO (82). Routine CANDO is the main driver for generating the GOTO points for defining each layup or ply. This routine assumes the geometry for defining the plies has already been defined.

Routine CNDCHN (84). This is the driver routine for routine CHAIN1. This routine will group all profile geometry together. If all geometry does not chain, the element end points where the chaining error is found will be tagged with a note.

At this point, the closed shapes have been grouped or chained together in their element form (lines, arcs, splines).

Routine CHAIN1 (86). Routine CHAIN1 will chain the geometry by its end points. The array will be sorted in the order the geometry is chained. The first element to be chained should be at the top of the array. The array will be processed until the beginning point in the array is found again or until the end of the array is reached. If the end of the array is found before all the geometry chains, an ERROR message will be generated.

Routine POINTS (88). This routine will break up the individual elements (lines, arcs, splines) into GOTO points. The GOTO points will be generated according to their chained order. The number of GOTO points generated is dependent on the cord height tolerance defined. Arrays will be set up to point to each set of GOTO points that define a profile or closed shape. The points stored in a GOTO point table will later be sent to routines to order the points in clockwise or counterclockwise order.

Routine PTLN (90). Routine PTLN put the line end points into the GOTO point array.

Routine PTARC (92). This routine breaks up the arc into GOTO points based upon the cutting cord height tolerance.

Routine PTSPL (94). Routine PTSPL breaks up spline into GOTO points based upon the cutting cord height tolerance.

Routine PROFIL (96). This routine will calculate the XMIN, XMAX, YMIN, YMAX of each of the closed shapes or profiles in the GOTO point table. The pointers to the largest pocket are moved to the beginning of the table that points to each profile. The largest profile is considered the outside profile. Routines will be called to make sure the smaller shapes are completely contained by the outside profile.

Routine PROFLL1 (98). This routine will call pierce for the points on the internal cutouts to determine if all the cutouts are contained within the exterior profile.

Routine PROFL2 (100). This routine will determine if internal cutouts overlap or are inside the other cutout (illegal cutout).

Routine DCWCCW (102). DCWCCW is a driver routine for CWCCW. Each pocket's GOTO points will be passed to routine CWCCW to see if the points are going clockwise or counterclockwise. The outside profile should be ordered clockwise and the internal cutouts should be counterclockwise. If the internal pockets or outside profile are not ordered properly DCWCCW will reorder the GOTO points in their proper order.

Routine CWCCW (104). CWCCW will analyze an array of XY points to determine if they are in clockwise or counterclockwise order and return the answer. Routine CNTRD (106). This routine will calculate the AREA1 and the CENTROID for a given set of points.

Formula: ABS (Summation X(I)*Y(I+1)=Y(1)*X-(I+1))/2

Formula for CENTROID uses a trapezodial method.

This routine assumes the array of XY points close and the first and last points are the same in the array.

Routine OPTMZE (108). Routine OPTMZE will optimize the GOTO points based upon the starting load point or XLOAD, YLOAD. The routine searches for the closest point in the internal and external profiles and reorders the GOTO points. This will minimize machine time by generating a more efficient tool path. Routine ORDER is called to reorder the GOTO points array.

Routine ORDER (110). This routine is called by OPTMZE to reorder a string of XY GOTO points by passing the starting location to begin reordering.

(F) CREATE PIERCE POINT DEFINITION (FIG. 7)

These routines are used to determine all the plies a pierce point penetrates. Calculations of the laminate at the pierce point are also done. An explanation of pierce points found in the "Using SLIC" section below.

Routine PRCDRV (112). This routine will take a string of points defining a ply and determine if a given point lies within the boundary definition or outside of it. It also handles internal cutouts. This routine is actually a driver for routine PIERCE.

Routine PIERCE (114). This routine will determine if a point lies within a closed polygon shape. Routine PRCDRV determines if the polygon is a cutout or the outside boundary.

Routine PCHART (116). This routine is the driver routine for calculating and creating information for each pierce point that was identified by the user.

Routine PSTRES (118). Subroutine PSTRES creates the actual pierce chart or output data for each pierce point. It calls routines for calculating the information.

Routine CONSTR (120). This routine computes the (A), (D), (B), (S) matrices for a laminate given the following information for each ply of material in the laminate: bias or grain direction, material properties, and location within the laminate. The calculation of the properties are based upon the laminate plate theory.

Routine NCARD (122). This routine prepares NASTRAN, PSHELL and MAT2 cards for interface to NASTRAN.

Routine MAT2 (124). This routine prints out NASTRAN MAT2 cards.

Routine WRTMAT (126). Subroutine WRTMAT will write out the material arrays. This routine is used to provide a standard output file for the material properties. It is called when a list of the properties are wanted for interface to other programs.

Routine PCTGET (128). This routine will retrieve the array of all the plies a particular pointed pierced. This information is retrieved before PCHART calls PSTRES.

Routine PCHECK (130). This routine will read in all the pierce point data into a pierce point array. This is done before the ply definitions are created. This routine also checks for duplicate point data.

(G) DEFINE SECTION CUTS (FIG. 8)

These routines will generate defined cross section cuts through a series of layups comprising a composite part. A brief explanation of section cuts can be found in the "Using SLIC" section below.

Routine SSTICK (131). This routine is the driver routine for taking cross section cuts through the composite part. This routine will loop through each section cut line and then call other routines to generate the cross section data.

Routine STKBLD (132). This routine builds an array of information for each ply that is cut by the section line cut. The distance and order of the cut will be stored.

Routine DLLIM (133). This routine will determine the limits (XY minimums and maximums) of a line given its XY end points.

Routine INTDRV (134). This routine finds all intersecting points for a section cut line, given strings of points defining the layup or ply.

Routine LIMITV (170). This routine checks the limits (XY minimums and maximums) of two closed profiles to see if they overlap. This is the same routine called in the CHECK SEQUENCE OVERLAP logic described in section I below.

Routine INTERC (136). This routine will calculate the intersection point for two lines. The point of intersection is returned. An alternate return will occur if the lines are parallel.

Routines PRCDRV (112) and PIERCE (114). These routines create pierce point data, as explained in the CREATE PIERCE POINT DEFINITION, section F, above.

Routine STKMOD (139). This mode is a driver routine for creating section cut drawings or CADAM models. Stick figures, gage data or thickness plots, and (E×T) models will be generated. This routine will create separate models for each section cut line.

Routine STKCAL (140). This routine will calculate all the information to build a stick figure model. Each line of the stick figure will display the layup number, sequence number, orientation and material code of each layup cut.

Routine CONSTR (120). This routine computes (A), (D), (B), (S) matrices for a laminate given the following information for each ply of material in the laminate: bias or grain direction, material properties, location within the laminate. The calculation of the properties is based upon laminate plate theory.

This routine computes the (A), (D), (B), (S) matrices for a laminate as well as the thermal load vectors AT, BT, DT. An average density PMO is also computed.

$$\text{Let } Q = \begin{pmatrix} Q11 & Q21 & 0 \\ Q12 & Q21 & 0 \\ 0 & 0 & Q33 \end{pmatrix}$$

where
Q11 = E1/(1−NU12*NU21)
Q22 = E2/(1−NU12*NU21)
Q12 = NU12*E2/(1−NU12*NU21)
Q66 = G12

Note that NU12*E2 = NU21*E1.

$$\text{Let } T = \begin{pmatrix} C*C & S*S & -2SC \\ S*S & C*C & 2SC \\ S*C & -S*C & C*C-S*S \end{pmatrix}$$

where
S = Sin(theta)
C = Cos(theta)

The transformed matrix is then:
Q-BAR = T-TRANSPOSE * Q * T $$\text{Let } S = \begin{pmatrix} G13 & 0 \\ 0 & G23 \end{pmatrix} \text{ and } TS = \begin{pmatrix} C & -S \\ S & C \end{pmatrix}$$

The transformed shear matrix is:
S-BAR = TS-TRANSPOSE * S * TS (A) = SUMMATION Q-BAR * (Z1 − Z0)
over each layer - bottom to top (B) = SUMMATION Q-BAR * (Z1² − Z0²)/2
over each layer - bottom to top (D) = SUMMATION Q-BAR * (Z1³ − Z0³)/3
over each layer - bottom to top -continued (S) = SUMMATION Q-BAR * (Z1 − Z0)
over each layer - bottom to top (PMO) = SUMMATION RHO * (Z1 − Z0)
over each layer - bottom to top The average density is then PMO/total thickness.

The thermal expansion coefficients A1 and A2 are transformed to laminate coordinates by:

A-X=C*C*A1+S*S*A2

A-Y=S*S*A1+C*C*A2

0.5A-XY=2*S*C*(A1−A2)

Let A-BAR denote the column vector of transformed coefficients. Then the thermal load vectors are computed by:

(AT) = SUMMATION Q-BAR*A-BAR * (Z1 − Z0)
over each layer - bottom to top (BT) = SUMMATION Q-BAR*A-BAR * (Z1² − Z0²)/2
over each layer - bottom to top (DT) = SUMMATION Q-BAR*A-BAR * (Z1³ − Z0³)/3
over each layer - bottom to top Routine STKSTK (141). This routine takes all the information compiled in routine STKCAL and generates the actual stick figure model.

Routine STKGAG (142). This routine will build S gage or thickness plot of the section cut. This will be built in the same model below the stick figure plot.

Routine STKEPL (143). This routine will build the plot for modules of elasticity (E) and the modules of elasticity times thickness (E×T) along the section cut.

(H) BUILD SEQUENCES (FIG. 9)

These routines are used to build a book of all the ply sequences in a part. This book can be used by engineering for part visibility. Planning can also use the book for a planning tool.

Routine BLDSEQ (150). This routine is the main driver for creating sequence drawings. A sequence model for each sequence within a given part/dash number will be generated.

Routine BLDET (152). This routine will generate geometry defining each layup on a separate page for each layup. For sequence models all the layups for a given sequence will be generated and dittoed on the main drawing area.

Routine STMODL (154). This routine will start a model with the proper root name and the sequence number inbedded in the name. The model started will be used by SLIC to write out the geometry and text information for the sequence being built.

Routine RETFMT (156). This routine will call CADET to initialize the model to be used for that sequence. The routine will then look and see if a sequence format model has been created and, if so, load it into model common.

If CADET is called, format notes will be analyzed to see if special notes with the proper values have been placed in the sequence format model. An explanation of the sequence format model and the special notes required can be found in the "Using SLIC" section below.

Additional SLIC information will be placed on the NOSHOW page in view PV for each sequence drawing built.

Routine PSNOTE (158). This routine will place text on the sequence model being created. This text is the page number, which will be incremented for each new page, and the sequence number which is obtained from the standard ply table information. The notes will be placed at the locations defined on the sequence format model by the special notes.

Routine FMTINT (160). This routine will initialize the values for the format notes. If the format notes are not found, these values will not be updated, causing a sequence format model error.

Routine FMTVER (162). This routine will verify if valid values on the special notes in the format models were defined. If invalid notes or vaues have been defined, an ERROR message will be generated.

An example format model and an explanation of the special notes can be found in the "Using SLIC" section below.

Routine NSCHT (164). This routine will write out SLIC version number, date and time of run, and models flagged to create part. This chart will be placed on the NOSHOW page on every sequence page generated by SLIC. The CADAM group and user in which the models were flagged will also be given. This information will be used as accountability and traceability information.

(I) SEQUENCE OVERLAP (FIG. 10)

This segment of routines will look at all the shapes on a given sequence and determine if any of the shapes overlap. This is important to SLIC because the sequence has been improperly defined if overlap occurs.

Routine COVDRV (166). This routine compares two shapes that can have internal cutouts and determines if they have any common overlapping or cover. The shapes are in the form of strings of XY points.

Initially the XY limits of the shapes will be checked to see if they overlap. Routines will be called to determine if the first shape completely covers, partially covers, or does not cover the second shape.

Routine COVER (168). This routine takes two strings of ordered, closed-shaped XY points and determines if they have any common overlap or cover.

Information will be returned to tell how or if the first string overlaps the second string, and how or if the second string overlaps the first.

Routine LIMITV (170). This routine checks the limits (XY minimums and maximums) of two closed profiles to see if they overlap.

Routine HLDRV (172). This routine is the driver routine for routine HIDELN. This routine will compile how the lines in the first profile string relate to the lines in the second profile string. This information will be used down stream by routine COVER.

Routine HIDELN (174). This routine will determine how a line is hidden or covered with respect to a string of points.

Routine INTERC (176). This routine will calculate the intersection point for two lines.

The point of intersection is returned.

An alternate return will occur if the lines are parallel.

Routine OVRLAP (178). This routine will determine how much of the first line is covered by the second line. The percentage of overlap is returned. It is assumed the two lines are parallel. The first check in the routine will determine if the lines are colinear.

(J) ERROR DIAGNOSTICS (FIG. 11)

These routines output various error and warning messages to an error file. The actual messages are generated in several routines which will be discussed in the various sections.

Routine PLYCHT (180). This routine will write out the ply chart error messages to the error file. An example of the error file and an explanation of each message can be found in the "Using SLIC" section below.

Routine PLYWRN (182). This routine will write out the ply chart warning messages to the error file. An example of the warning file and an explanation of each message can be found in the "Using SLIC" section below.

Routine FMCHT (184). This routine is a driver routine for adding sequence format error and warning messages to the error file. An example of the error and warning messages and an explanation of each can be found in the "Using SLIC" section below.

Routine FMERR (186). This routine will write out the format chart error messages to the error file.

Routine FMWRN (188). This routine will write out the format chart warning messages to the error file.

(K) PART INFORMATION (FIG. 12)

These routines generate the layup (LYUP) and information (INFO) CADAM models or files. This information describes the part in detail by detailing each ply's weight, area, etc., as well as the geometric information of each ply.

Routine MLCHAR (190). This routine will write out a chart of all the layup pages that are built in each CADAM file. A sample layup chart can be found in the "Using SLIC" section below.

Routine BLDET (192). This routine will generate geometry defining each layup on a separate page for each layup. These pages are in a CADAM model or file. The designer can view the layup geometry to make sure that the desired results were obtained.

Routine FCHART (194). Routine FCHART is the driver routine for formatting the part information and calling routine FBUILD to generate a chart to generate part information. This information is found in the CADAM INFO model or file. A sample INFO file and an explanation of its contents can be found in the "Using SLIC" section below.

Routine FBUILD (196). Routine FBUILD will build the information chart for a part number. It is called "FCHART."

(L) PART DEFINITION OUTPUT (FIG. 13A)

These routines output a part definition or generic file of all the information about the part. This information can be used to feed to other programs, systems, machines, etc. An explanation of the routines and the generic output will be given.

Routine GENOUT (198). This routine will loop through the part information and generate generic output for all the layups in the part. Opposite hand part XY points will be flipped.

Routine GTFLIP (200). This routine will flip a string of XY points about the Y axis.

(M) UTILITIES ROUTINES (FIG. 13B)

These routines are utility routines that are used in several routines in SLIC.

Routine UNIT. This routine will unitize a vector (A, B, C).

Routine UNITD. This subroutine will unitize a vector in double precision. A, B, C=direction cosines.

Routine ICNTER. Returns the number of characters in a character string. The character count is determined by scanning the string from right to left for the first non-blank character.

Routine CONVTI. Converts an integer to a character string.

Routine MVCHRL. This routine uses the IBM "MOVE CHARACTER LONG" (MVCL) routine to transfer data from one storage location to another. The length is limited only by the MVCL instruction.

Routine PROJLN. This routine will determine if a point lies on a line.

Routing PROJAR. This routine will determine if a point lies on an arc.

Routine PROJSP. This routine will determine if a point lies on a spline.

Routine CMPRSS. This routine compresses a text array by eliminating all blanks.

Routine MODSRT. This routine will create the model name for the different models in SLIC. It can be modified by each installation for desired model names.

Routine LIMIT. This is a routine that determines if a point X, Y lies within the defined limits XY maximums and minimums.

Routine DEFINE. This routine defines the material properties for each of the material codes. If a material code is placed in the standard ply table and not defined by this routine, an error message will be generatd by SLIC. An example of the information for each material that is input into SLIC can be found in the "Using SLIC" section below.

Routine GTPRM. This routine will read the parameter on PARM card on the SLIC execute step in the Job Control Language (JCL). A list and explanation of each option will be given.

SLIC PARM OPTIONS

When SLIC is executed, there are several options that can be specified. If no options are specified, SLIC will break apart the layup geometry and build LYUP model(s). This is a good method to use to debug geometry and arrowhead errors. The following are options that can be specified in the PARM field.

CHTOL. CHTOL is the chaining tolerance used to chain geometry and determine if arrowheads are on elements. The tolerance set in SLIC is 0.004. Example: Chaining tolerance=0.005. PARM="CHTOL=0.005" The default can also be changed and linked into SLIC in block data.

CUTOL. This parameter is the chord height tolerance used for breaking up arcs and splines into a string of points. The default in SLIC is 0.01. Example: Cutting tolerance=0.05 PARM="CUTOL=0.05" This default can also be changed and linked into SLIC in block data.

TABLE. This option will turn on the option for SLIC to read the ply table and create output charts in the INFO model(s). The remainder of the options all require this option to be turned on. Example: PARM="TABLE"

PIERCE. This will create pierce data in the PRCE model(s) if there are pierce points called out in the layup model(s). Example: PARM="TABLE, PIERCE"

SEQUNC. SEQUNC will produce sequence drawings for the dash numbers that have a start sequence format. Example: PARM="TABLE, SEQUNC"

PLEFT. This option will cause pierce points to pierce the part in the left-hand coordinate system. Example: PARM="TABLE, PIERCE, PLEFT"

BPERCE. This will read pierce points from an input file and create NASTRAN cards for each of the pierce points. For an example of the input format, see the "Using SLIC" section below. Example: PARM="TABLE, BPERCE"

GENERIC. If this option is turned on, generic output will be generated. The generic output defines all the layups for the part. The output for the layups is unformatted, variable-length records. Example: PARM="TABLE, GENERIC" The DD card that must be allocated with this option is FT12F001, with the data set being a variable block, unformatted record. Example: FT12F001 DD DSN+&&GENERIC,-DISP+(,PASS),VOL=SER=, UNIT=3380,-SPACE=(TRK,(5,5), DCB=(RECFM=VBS,-LRECL=32752,BLKSIZE=32756)

The following is an explanation of the generic output and the read statements required to obtain the information for each layup.

GENERIC OUTPUT

```
LOGICAL *1   PART (20)
REAL *4      ROT(8),XLPT(2),CENTRF(2),RLIM(4),POINTS(2,1000)
INTEGER      IDASH,ISEQ,LAYUP,MCODE,IROT,NPTS
DIMENSION    EMPNO(2),DATE(2),FMODEL(20,20)
READ (XX,END=1000)IFMOD, ((FMODEL(I,J),I=1,20),J=1,IFMOD),
*  IDASH,ISEQ,LAYUP,MCODE,IROT,
*  (ROT(I),I=1,IROT),AREA,WEIGHT,VOLUME,
*  (XLPT(1),I=1,2),(CENTRD(I),I=1,2),GRUP,
*  (EMPNO(I),I=1,2),(DATE(I)=1,2),VERSN,NPOC,NDLAY
```

-continued

```
DO 100 K = 1, NPOC
        READ (XX) ((RLIM(I),I=1,4),NPTS)
        READ (XX) ((POINTS(J,I,J=1,2),I=1NPTS))
100 CONTINUE
```

The profile for the layup is output first, followed by cutouts.

All layups are in sequence order for the part.

USING SLIC

Introduction

This section provides the requirements and information to access and operate SLIC. An overview of the purpose of SLIC is given as well as an explanation of its operation. The requirements and logic used are explained and outlined. A method for executing SLIC is presented.

SLIC is an advanced application program for use by operators with training and experience in using CADAM systems.

OVERVIEW

Software Logic for Integrated Composites (SLIC) is a program written specifically for use with flat developed part definitions for composites. It is executed against models generated from the CADAM Graphics System. The program has access to CADAM models by use of CADCD and CADET, which are modules of the geometry interface package of CADAM.

SLIC reads a CADAM model or set of models and creates additional models that contain complete definitions for each part or layup separate from all other parts or layups. The program uses a function of CADAM called "detail pages." A new detail page is created for each individual part or layup geometry. CADAM has a limited amount of detail pages per model and a limited model size. Because of this, an additional model will be created when the SLIC model reaches 50 details or approximately 10K of model size. An error model is also created that contains diagnostics if arrowheads used for geometry definitions are not placed on elements. The error model also contains ply table errors, and a warning chart for possible errors.

Sequence of layup is controlled by a ply table. This table has been structured to allow rapid revision of the table and requires only that the seequences be numerically in order. The table itself may be out of order. This table will permit automatic generation and plotting of sequence drawings.

SLIC also permits pierce of the geometry at any interactively defined point(s). Through batch, any large number of points may be transmitted to a data set for printed output or interface with analysis programs such as NASTRAN. The pierce output data is described further in this document.

Upon satisfactory completion of a model which passes the SLIC checks, data can be passed to a SLIC Part Data Manager which permits the planning department to execute special manufacturing routines. These routines will interface with nesting software to nest parts with common materials and output centerline data for automatic knife cutting of composites.

DEFINITIONS

"Arrowhead text" means a specific CADAM element that allows text to be attached to an arrowhead.

"Chaining tolerance" means the tolerance between the end points of elements. SLIC uses a tolerance of +0.004. This tolerance can be easily modified.

"Elements" means the geometric entities on CADAM, such as lines, circles, ellipses, and splines.

A "layup" may consist of 1 to 8 plies, provided they have the same geometry, same material, and are mated. Grain direction of the plies which make up the layup may vary, but must be identified in the ply table. If the thickness of raw material, type of material, or geometry is not the same, the layup number must be different. If any other layup resides between geometrically and materially identical layups, these may be assigned the same layup identity, provided they reside in different sequences. The "layup" definition is shown in FIG. 14.

"Ply" means an individual piece of material. Several plies may be laid together to make a layup and/or a part.

"Sequence" may be synonymous with "level." An example of a sequence with one or more layups is shown in FIG. 15B.

Figure 19:
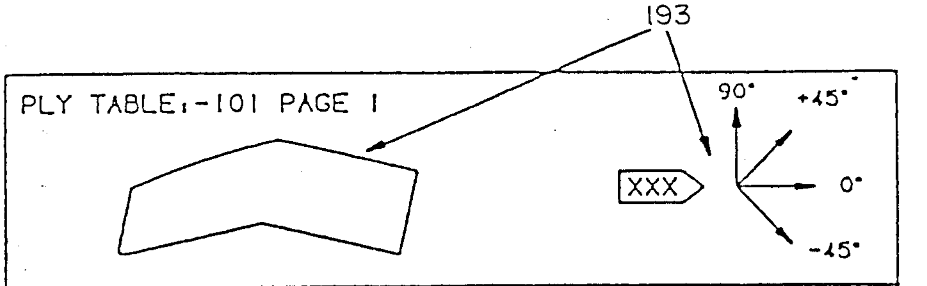
FIG. 19 is an illustration of a ply table from a CADAM Standard Library.
Figure 19:
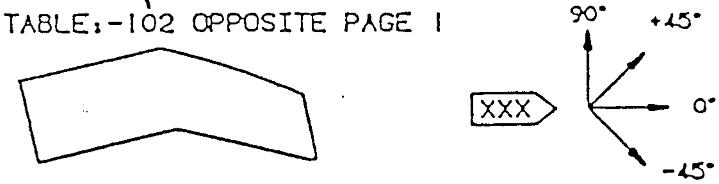

"Ply tables" are shown and clarified in FIG. 19.

INPUT REQUIREMENTS

CADAM Geometry Identification Rules

Figure 15:
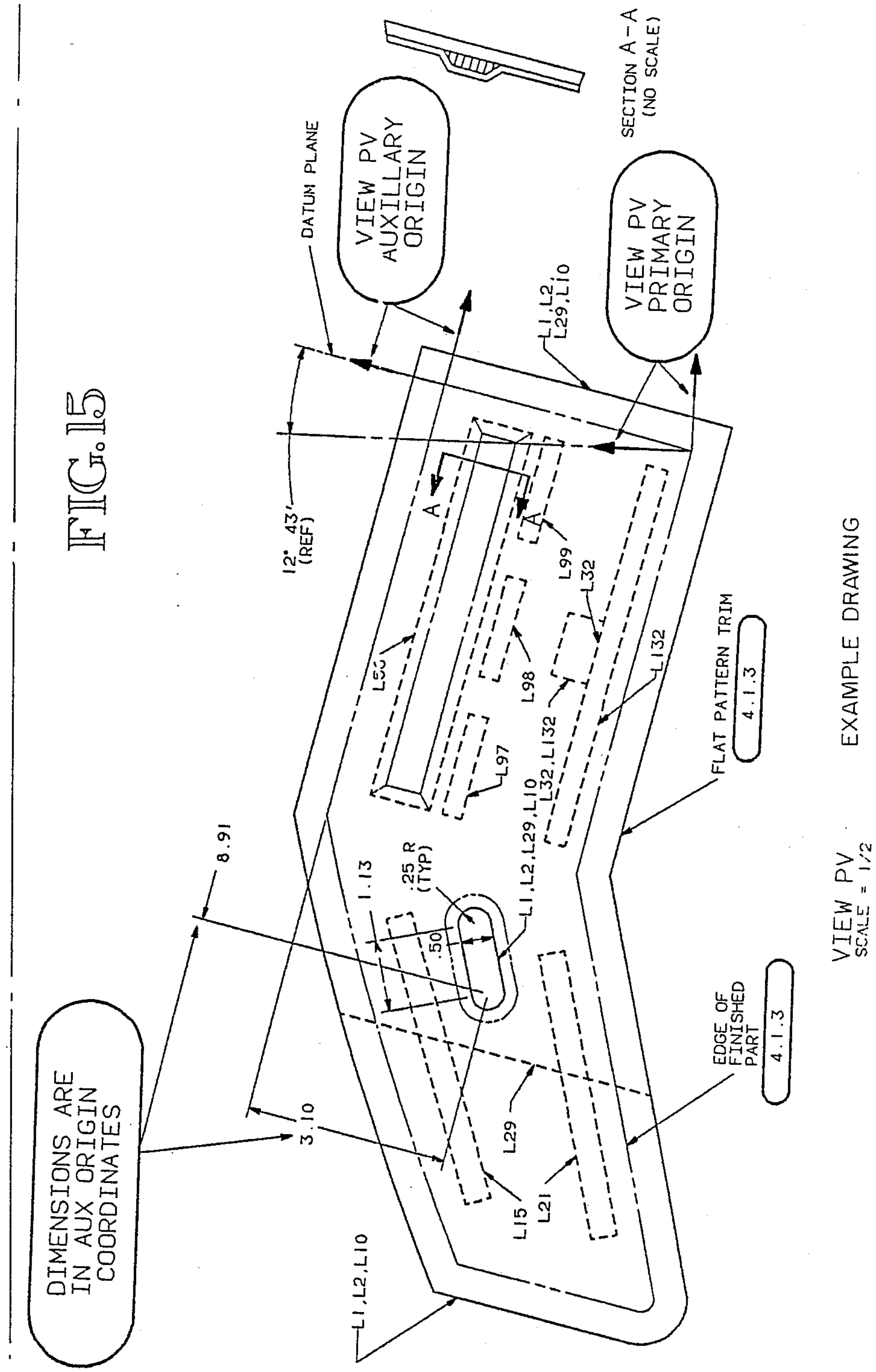
FIG. 15A is a drawing illustrating several sequences.
FIG. 15B is sample composite drawing.
Figure 15A:
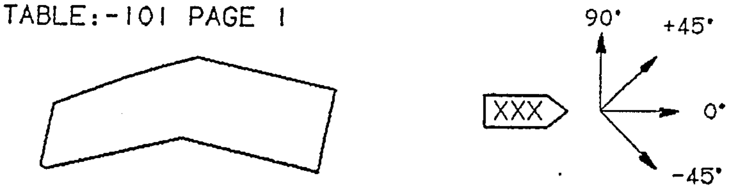
Figure 15A:
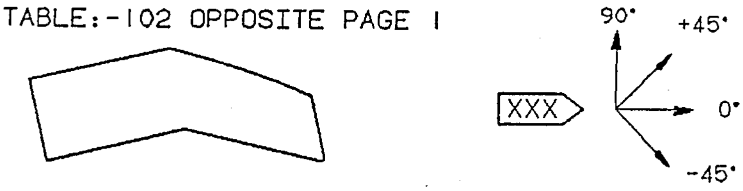

For the purpose of explanation and instruction of SLIC, a small composite is used as an example. The example design drawing is shown in FIG. 15A.

Note that the View PV axis corresponds with the desired 0° (3 o'clock) position of ply orientation. Positive angles are counterclockwise, and negative angles are clockwise from the 3 o'clock position. This correlation of the PV axis is critical for downstream output.

Define Layups in View PV

All layups must be defined in CADAM View PV. All other views are ignored for geometry. View PV was chosen as the view to use because SLIC presently deals only with 2-D projections or flat patterns of parts. For the merging of several models, the common view selected by SLIC is View PV.

PV Views Must Coordinate

SLIC can be executed on several models at a time. When more than one model is selected, the PV views in the models are overlaid on each other. Therefore, an element in one model that ends at a location and chains to another element in a different model must analyze the same in both models. The results of running SLIC on several models is as if all View PVs had been merged together. The detail page created for a layup may have elements copied from separate models. This multiple model capability allows unlimited part size. View PV may be input to any CADAM view scale. SLIC reads the full size values of the geometry.

Line Types

Elements defining layups must be solid or dashed line types. Phantom, Center, NC, or Break line types will be ignored by SLIC for layup definitions.

Arrowheads on Elements

When defining the edge of a layup, an arrow is used with text information. The end of the arrowhead must lie within 0.004 of the element defining the layup. To accomplish this, the terminal operator selects /ARW/ under Function Key MISC. To put the arrowhead on the element, the terminal operator selects the element and indicates. The second indicate will establish the tail. The text is then typed in, followed by a third indicate for the positioning of the text. See FIG. 16, reference number 161.

Arrowheads on End Points

Do not place identifying arrowheads on the end point of an element. SLIC gives an arrowhead error if placed on end points. See FIG. 16, reference number 162.

Layup Edges Must Be "ARROW/TEXT" Defined

The text defining layups must be created under MISC.Function/ARW/.arrowhead test. SLIC will not read standard text at the end of the arrows.

Valid Layup Callouts in "ARROW/TEXT"

The examples in FIG. 16, reference number 163, identify the element as belonging to layups 1 through 5.

Unique Layups

Layup numbers may be duplicated in the ply table, provided the duplicate layup number resides in a different sequence. For example, there can be only one geometric boundary definition for L1. SLIC provides no method for distinguishing different boundaries for the same L number. In FIG. 16, three identical layups (L97, L98 & L99) are shown (see reference number 164). Even though their internal geometry and material are the same, each must have a separate L number. Conversely, S10 and S40 both use L1.

Relief Cuts

Relief cuts (darts) will be arrow defined as "C#" as opposed to "L#." Each element of a cut must be arrow defined under this rule. See FIG. 17. This capability has not yet been implemented.

No Duplicate or Overlapping Elements

Multiple elements will cause the program to identify chaining errors. All elements must be relimited end to end and not be overlapped. Also, two identically duplicated elements will cause SLIC to report chaining errors. See FIG. 18.

Gaps Between Elements

Elements must connect with 0.004, or a chaining error will be identified by SLIC. See FIG. 18. This option can be changed for each installation.

Ply Table

The ply table is one of the most important parts of SLIC input. For accurate operation, this table must follow specific rules. FIG. 19 shows the ply table. The ply table is supplied and available in the CADAM Standard Library (STDLIB). The ply tables may reside as details of the model. It is recommended that all editing be accomplished in the CADAM Detail Function and be displayed as a DITTO(s).

Ply Table Drawing Sheet

The ply table may reside on any sheet or multiple sheets of a drawing, but must reside in CADAM AUX View 98 of that model. View 98 will not be used for any other purpose throughout the CADAM data base. Any models not requiring the SLIC ply tables will also not use View 98. The view used by your installation for ply tables can be modified in SLIC.

Part Numbers

Each part number (dash number of a drawing) must have its own ply table. This includes opposite parts. Geometry must be noted as opposite if the geometry is to be flipped. Any change to the ply table requires that the dash number be changed or that a new and additional ply table be generated appropriate to the change. See FIG. 19, reference number 191.

Ply Table Entries

The terminal operator may input notes to the ply table at the locations provided. Do not move the start location of the notes. Any individual note within a location must be continuous. The CADAM "$" may be used within the note where required. Commas and dashes are used as layup delimiters similar to geometry identification, as shown in FIG. 19, reference number 192.

Ply Table Part Sketch

A small sketch of the part shall be placed in the location shown at reference number 193. The rosette shall also be shown in this area. The rosette must not reside in View 98 with the table. View 99 is suggested for rosette placement. A note or ditto in View 98 which has a degree sign will be interpreted as a legitimate ply orientation and cause a SLIC error. See FIG. 19, reference number 194.

Sequence Numbers

The sequence numbers shall be originally entered in increments of ten (10). This permits additions during interative process without renumbering the entire table. Note in FIG. 19 how sequence "S31" has been added without necessity of revising the table. SLIC will place the sequence between S30 and S40 for all output data. A sequence number may not be repeated without causing a SLIC error. The lowest numerical sequence is nearest the tool and progresses away from the tool. See reference number 195, FIG. 19.

Layup Numbers

Layup numbers may be repeated if the L# is used in different sequences. However, the number of plies and orientations must be the same if the L# is used more than once. This was noted in the paragraph on unique layups. See FIG. 19, reference number 196.

Ply Orientation

This column presents ply orientations within specific layups. For example, S30, L15 and L21 have unlike geometry but have the same material and orientation. Also, sequences S30, L15 and L56 have different rotations and material. SLIC provides for every hundredth of a degree (0.01°) of orientation relative to the rosette.

The ply orientation is to be input and read from top to bottom, progressing away from the tool. See FIG. 19, reference number 197.

Ply Numbers

Ply numbers are input to this column 198. Ply numbers may not be repeated within a layup but may be repeated if the layup number differs. This column is not read by SLIC.

Notes

This space is provided for a flag note only. This space is not read by SLIC. See FIG. 19, reference number 199.

Splice Control

This space is provided for flag notes related to splice control only. This space is not read by SLIC. See FIG. 19, reference number 200.

Ply Table Revision

This column is provided to account for changes to the ply table. The revision letter should correspond with the drawing change letter under which the change was made. This space is not read by SLIC. See FIG. 19, reference number 201.

Material Callout

Materials are identified by a four-digit integer, as shown in FIG. 19, reference number 202. Each layup must have a material code which has been entered into the SLIC Part Data Manager database. The data about any given material must include the data shown in FIG. 20.

Material Definition

FIG. 20 shows the input required for full SLIC definition of the material. Materials which have not been entered with all of the required data will cause SLIC to report incorrect or no data. This data must be approved by appropriate technology staff representatives and defined to the SLIC program. Materials may include any composite sheet, tape, cloth, honeycomb, sheet metal, and bonding materials, such as glue or cements, which are to be manufactured by laminating, routing or 2 AXIS machining. Any material not defined will not be accounted for by the SLIC program. Undefined material codes will cause SLIC to generate an error message and stop further processing. For all composites, the data shall be in the cured conditions.

SLIC GEOMETRY LOGIC

Geometry Input Logic

This section explains the logic used by SLIC and the rules to be followed by the user for model preparation. The majority of model preparation is to use good drafting standards. Arrowheads should be placed on elements. Text defining layups is to be ARROW/TEXT, use proper cornering, etc. There are a few logic cases where some additional model preparation is necessary. the following rules are concerned with only one layup. Each layup in the part must follow the same rules. The examples use lines for explanations. All rules apply to lines, circles arcs, splines, offset splines and ellipses.

ARROW/TEXT and Chain Logic

Figure 21:
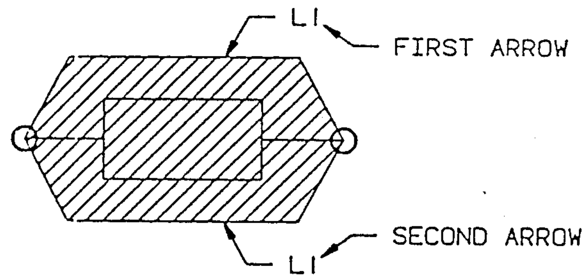
FIGS. 21–23 are illustrations of chain logic in the SLIC system.

SLIC requires every logical section of chained element to contain an arrowhead identifying the layup. This means that were more than one element chains to an end point, an arrowhead must be placed in the next section of the layup. An example is shown in FIG. 21.

Figure 22:
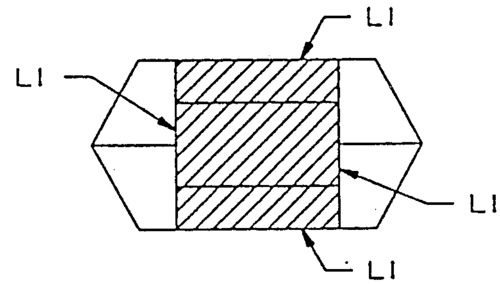

For the first arrow only, the top section will be identified by SLIC. To completely define the layup, an arrow must be placed somewhere on the section after the three elements chain at the circled points. SLIC will logically chain at end points. If the layup drops off before the end point of an element, an arrow must be used to identify the drop off. An example is shown in FIG. 22.

Figure 23:
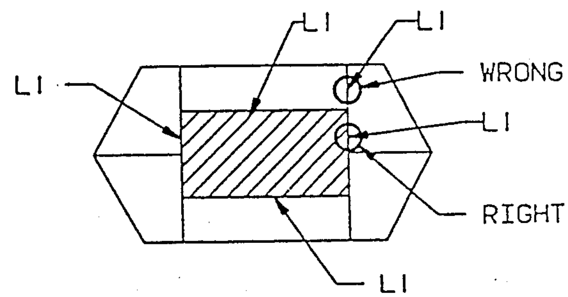
Figure 24:
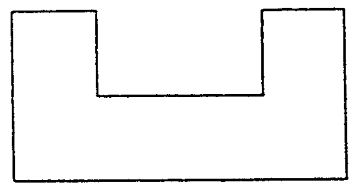
FIG. 24 illustrates a desired ply shape.
Figure 25:
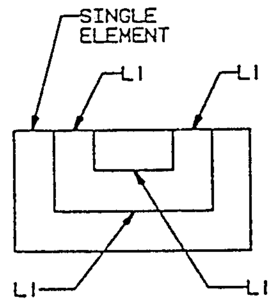
FIG. 25 illustrates a method of defining that ply shape using arrowheads and text callout.

The top and bottom arrows will identify the top and bottom sections. If the ply is to be the center section, the additional arrows are needed. Where drop-offs occur, the arrowhead location is placed on the section of element to be used. See FIG. 23.

It is acceptable to use more than one ARROW/TEXT callout on one element to produce the desired geometry.

Figure 26:
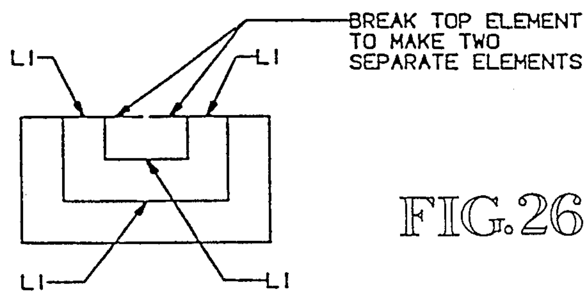
FIG. 26 illustrates an alternate method to produce the desired shape of FIG. 24.
Figure 27:
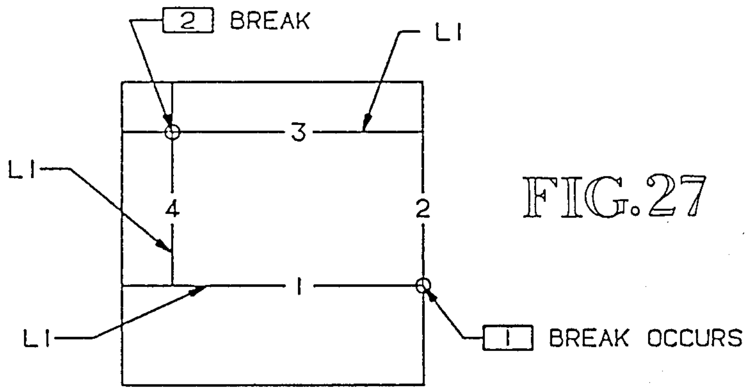
Figure 28:
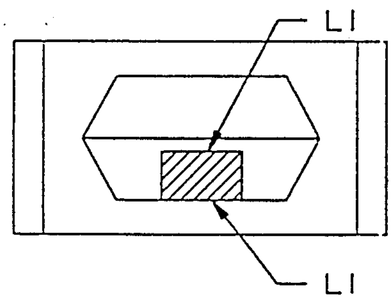
FIGS. 28–31 illustrate the logical operations to define ply elements using SLIC.

Another method to produce the desired geometry would be to use two elements, as shown in FIG. 26.

The logic for creating layup geometry breaks elements apart when an end point lies on the element to be broken. For example, in the first location, element 2 will be broken by element 1. At the second location, 3 and 4 cannot break each other because neither line has an end point on the other. To enable layup 1 to branch in the correct direction at location 2, either line 3 or 4 must be broken and relimited back to the other line. Only one of the lines should be done, not both.

Program Logic

This section is an explanation of the process SLIC uses to determine a layup. The explanation is given to help in debugging parts. There are three main steps which SLIC uses to determine where a layup to be defined. The steps are the same for all layups.

(Step 1) For each layup, SLIC creates chained sections that go with each arrowhead. The section chains until it chains to more than one element or doesn't chain at all.

Figure 29:
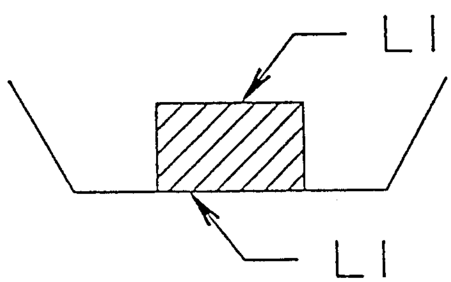

For the example in FIG. 29, there are only two elements. The end points are chained until an end point connects to more than one element. These intersecting elements are also placed in the table. After Step 1, the group would appear as shown.

Figure 30:
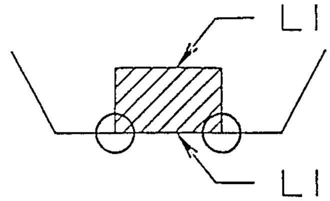

(Step 2) Every element that has the end point of another element on it is then broken into two elements. The table looks the same, except the bottom line is now three lines. It will be broken at the indicated points shown in FIG. 30.

Figure 31:
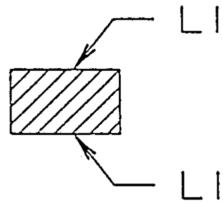

(Step 3) The chaining logic is again executed to build the final table. Now the layup can chain in the middle of the bottom element. The final group of chained elements is considered a layup and will be put on a detail page of the appropriate SLIC constructed model, as shown in FIG. 31.

The geometry for the layups is found on detail pages of a SLIC-constructed LAYUP model. Each detail page will contain the geometry defining that layup. Lines and arcs are created exactly the same as they are in the original model. Splines, offset splines, and ellipses are created with some differences.

SPLINE CREATION

Splines

Splines are defined using the original defining points. Only that section of the spline needed for the layup geometry is created on the detail page. The defining spline points will actually be used for approximately six inches from the drop-off or to the end of the original parent spline. This is to allow the splines to be relimited for manufacturing excess purposes.

Offset Splines

Offset splines cannot be recreated as parent splines. Therefore, an offset must be created to carry the mathematical definition. SLIC will create the parent spline on the NOSHOW page and create the relimited offset spline on the show page.

Ellipses

Ellipses are converted into parent splines using the same CADAM logic for conversion of ellipses under the function key spline.

Flange Angle Splines

Flange angle splines are treated like normal splines. The splines created on the layup models do not carry flange angle data on this version of SLIC. This feature could be added if the need arises.

MODEL ARRANGEMENT

The type of part defined as well as the size of the part may dictate various drawing sheet arrangements. This section addresses some of these arrangement combinations.

Drawing Sheets

Figure 32:
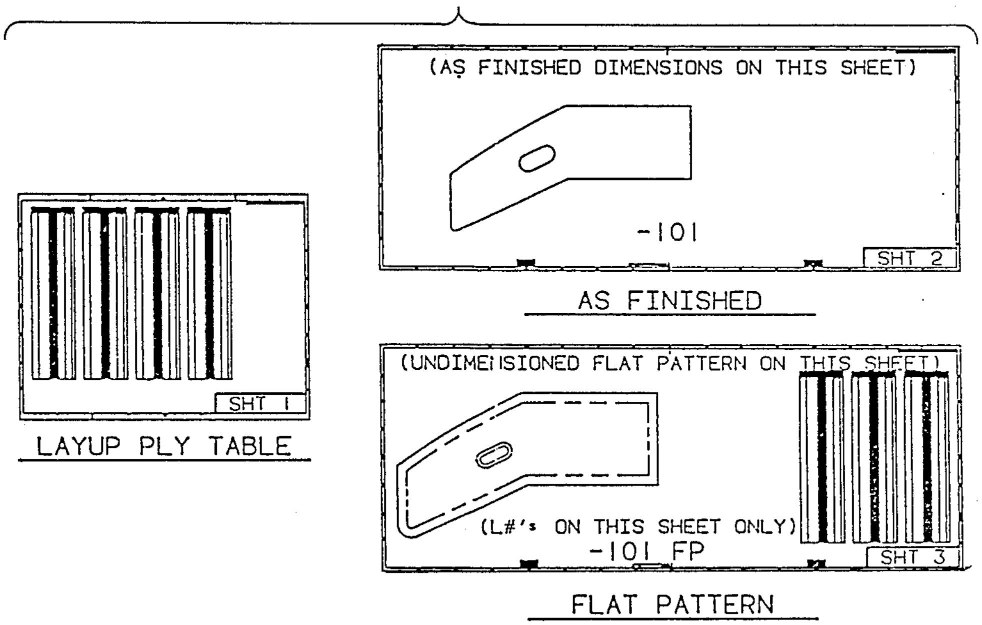
FIG. 32 illustrates a multi-sheet drawing of a ply.

SLIC can be executed against one or more sheets of a drawing. A single sheet drawing is depicted in FIG. 15. In this example, the primary geometry is in CADAM View PV and the ply table in View 98. FIG. 32 shows a multisheet drawing where one sheet is for the ply table, a second set is for the finished part, and a third sheet is for the flat pattern of the part. In this example, SLIC would be executed against sheets 1 and 3 only. Sheet 2 describes the finished part and does not define the layups.

Figure 33:
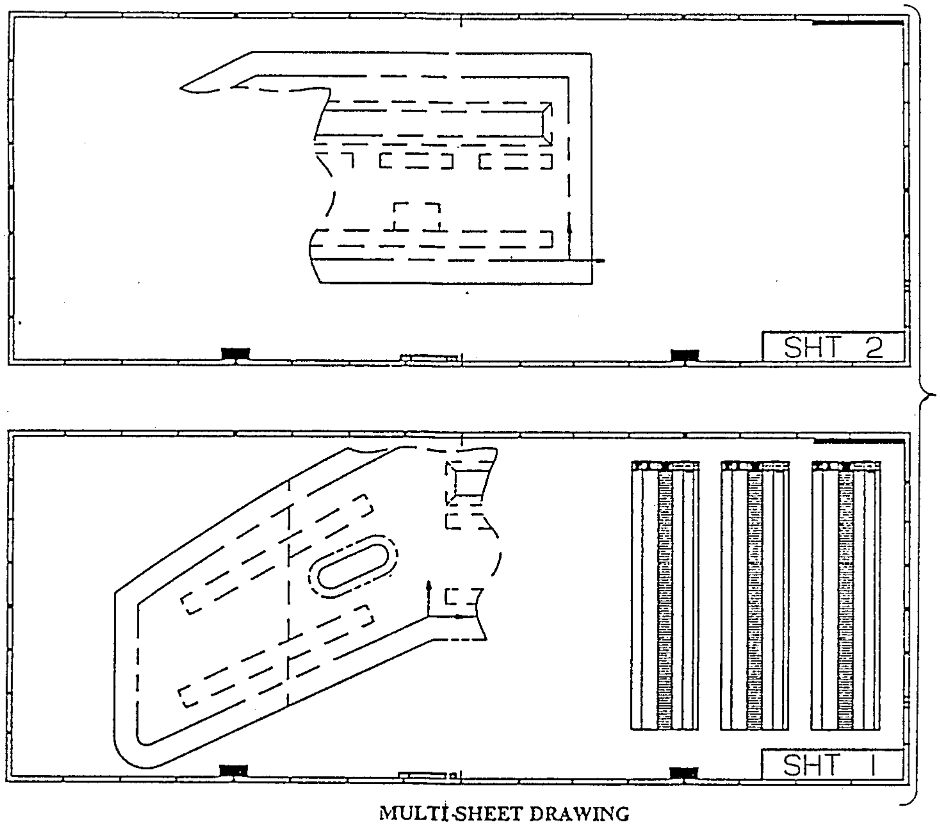
FIG. 33 illustrates another multi-sheet drawing of a ply.

FIG. 33 presents a multi-sheet drawing where the geometry is too large for placement on one sheet. To aid in sheet reduction, CADAM View PV may be scaled. Any combination of multi-sheet and CADAM multi-models within a sheet may be intermixed satisfactorily, provided all geometry and ply table rules are strictly adhered to.

Panels

Panels, whether flat or contoured, may be input as shown in FIG. 15. Note that manufacturing excess is provided around the outside edges. The amount of excess depends upon the manufacturing method and should be determined by planning during the design development.

Flat Patterns

Figure 34:
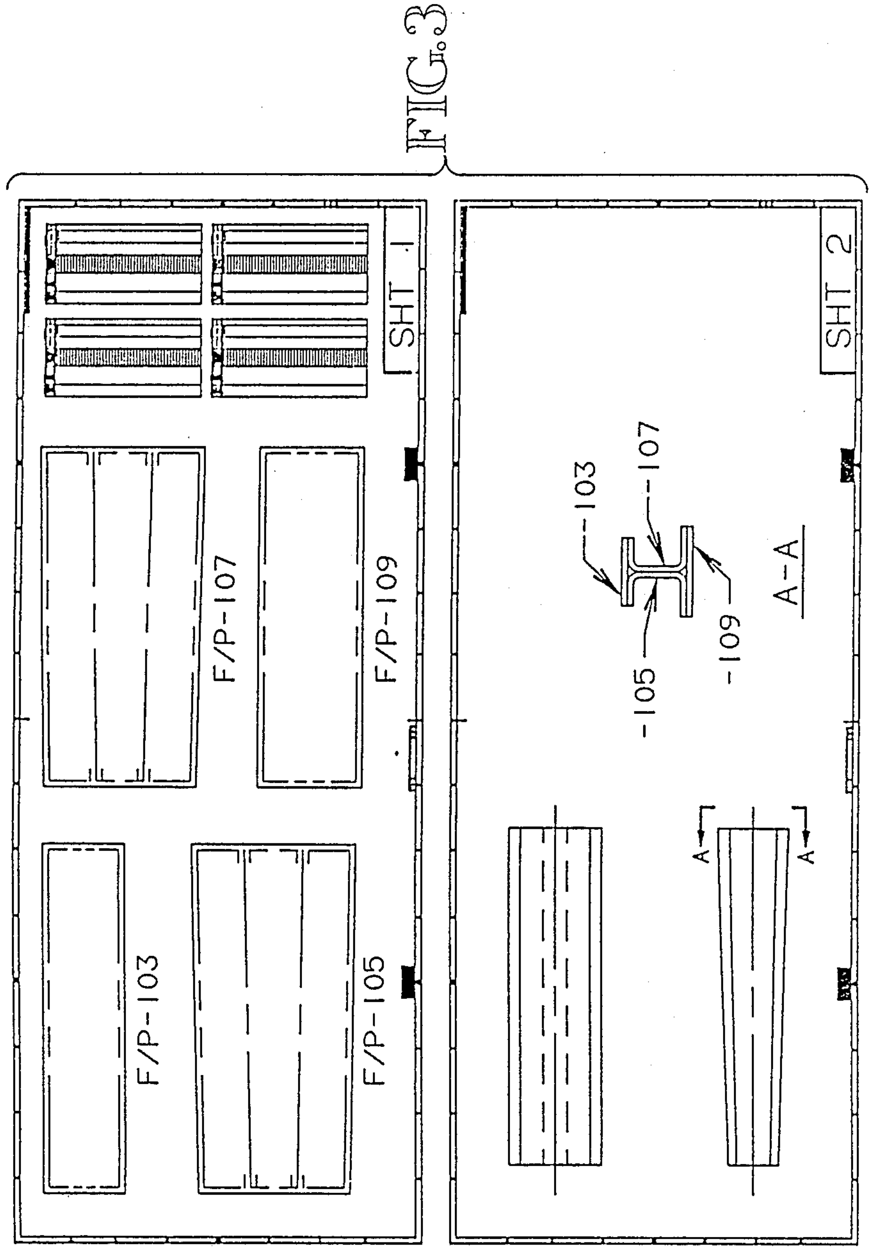
FIG. 34 illustrates several flat patterns for plies.

When flat patterns must be developed to produce parts similar to extrusions or sheet metal flat patterns, certain rules must be followed. The flat patterns must all reside in View PV of their drawing and include excess peripheral material for exterior edge trim. Also, each flat pattern must have a unique ply table. A ply table is not required for the assembly drawing of these layups. As with panels, the view containing the geometry may be scaled. Again, the flat panels do not require dimensioning. FIG. 34 presents this concept.

ERRORS

Executing SLIC will result in error reporting by creation of a model which reports arrowhead errors, ply table errors, format chart errors, format chart warnings, and a caution chart. In addition, SLIC will display geometric errors when it constructs layup geometry models.

Figure 35:
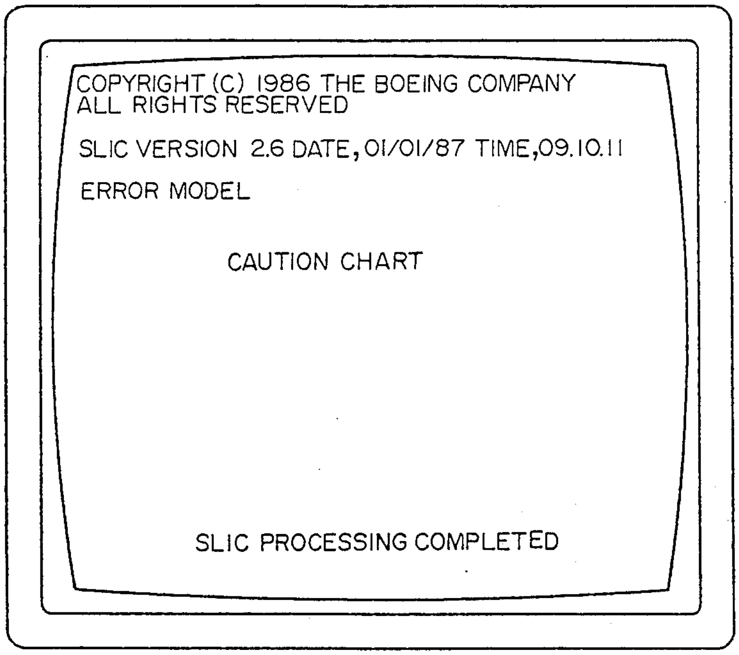
FIG. 35 illustrates an error model display for the SLIC system.

Upon execution of SLIC, a CADAM model will be generated which will modify the 11th through 14th model identification characters to read "EROR." When the user calls his model, the display may be as shown in FIG. 35. The figure shows the five potential error tables which may be generated. Any combination of the five presentations may display. If the heading is not displayed, errors of that kind do not exist. The time and date when SLIC was executed are updated, and this new model overwrites any previous Error Model with the same number. Upon completion of the job, the message "SLIC PROCESSING COMPLETED" will appear on the error model.

The terminal operator may select any of the five error tables shown while in the DETAIL function. The selection will determine which of the following tables will be presented.

Arrowhead Error Table

Figure 36:
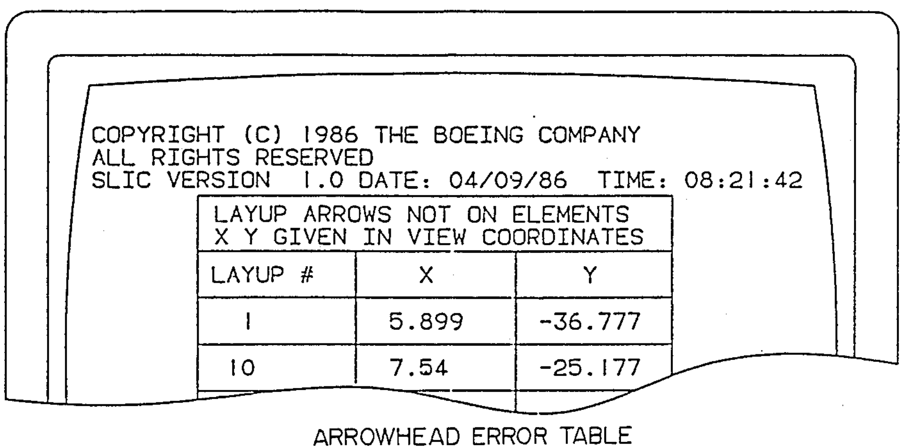
FIG. 36 illustrates the screen display for an arrowhead error table.

If arrowheads are not placed correctly on elements, their x-y location will be placed in the Arrowhead Error Table. If an arrowhead has several layups defined on it, only one of the layups will appear in the chart. This table will reside on a detail page of the error model constructed by the program. The detail page generated is shown in FIG. 36 and will be identified as noted.

Ply Table Errors

Figure 37:
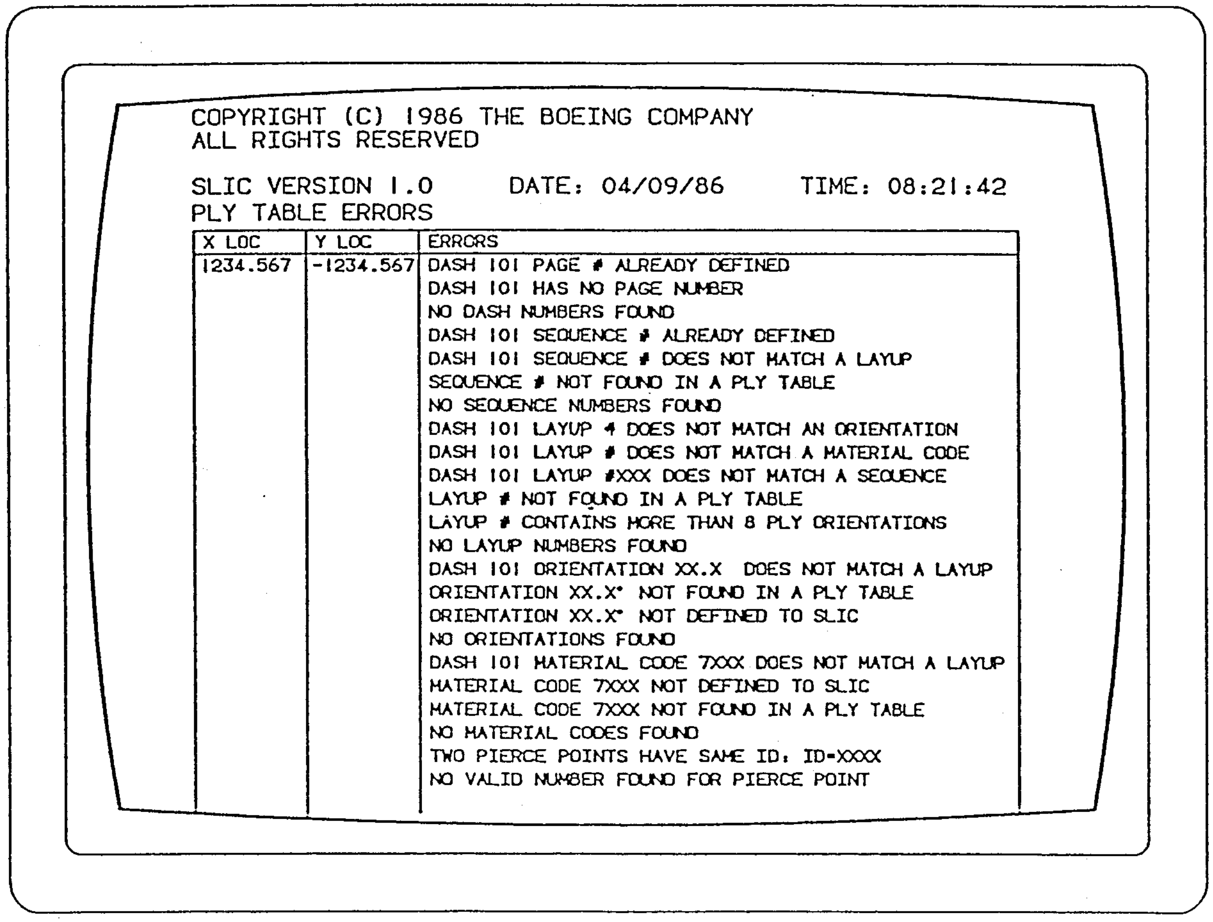
FIG. 37 illustrates a ply table error display.

Selection of ply table errors per FIG. 35 will display the table shown in FIG. 37. A brief description of the errors follows the figure.

Dash 101 Page # Already Defined

The same page number exists for the particular dash (part) number. If the dash number requires more than one ply table, the new table must have a different page number.

Dash 101 Has No Page Number

A dash number has been found without a page number attached.

No Dash Number Found

View 98 does not contain dash number callouts.

Dash 101 Sequence #XXX Already Defined

The sequence number appears more than once in the ply tables for a given dash number. This is not allowed for planning purposes.

Dash 101 Sequence # Does Not Match a Layup

The sequence number was unable to find associated layup numbers in the ply table. The layup note either has not been added or is placed in the ply table incorrectly.

Sequence 3 Is Not Found in a Ply Table

A sequence number was found, but it is not in the bounds of any ply table.

No Sequence Numbers Found

View 98 does not contain any sequence number callouts.

Dash 101 Layup #XXX Does Not Match an Orientation

The layup number was unable to find an orientation in the ply table to assign to it.

Dash 101 Layup #XXX Does Not Match Material

The layup number was unable to find an associated material code in the ply table.

Layup #XXX Not Found in a Ply Table

A layup number was found but is not in the bounds of any ply table.

Layup #XXX Contains More Than 8 Ply Orientations

Manufacturing limitations presently require that a maximum of eight plies be related to a unique layup.

No Layup Numbers Found

View 98 does not contain layup number callouts.

Dash 101 Orientation XX.XX° Does Not Match a Layup

The orientation was unable to find a layup number in the ply table to assign to it.

Orientation XXX.XX Not Found in a Ply Table

The orientation is not identified in a ply table.

Orientation XX.XX Not Within Limits of SLIC

Presentations must be greater than or equal to −88.99° and less than or equal to 90.0°.

No Orientations Found

View 98 does not contain orientation callouts.

Dash 101 Material Code 70XX Does Not Match a Layup

The material code was unable to find a layup in the ply table to assign to it.

Material Code 70XX Not Defined

The material information per section 4.3 has not been input to the system.

Material Code 70XX Not Found in a Ply Table

A material code was found but is not in the bounds of any ply table.

No Material Codes Found

View 98 does not contain material code callouts.

Dash 101 Layup #XXX Already Defined, Same Sequence

A layup is defined more than once within the same sequence.

Dash 101 Sequence 20 Overlapping Piles: L1, L2

Layup 1 and layup 2 overlap each other on sequence 20. This error is not related to the ply table, but will be placed in the ply table error chart.

Unable to Chain

End points on the part geometry did not chain together on all the layups. This error is not related to the ply table, but will be placed in the ply table error chart.

Illegal Cutout

Cutouts were found within or overlapping other cutouts on the same layup. This error is not related to the ply table, but will be placed in the ply table error chart.

Exterior Undefined

Unable to find a profile for a given layup number that would contain all other profiles defined in that layup. This error is not related to the ply table, but will be placed in the ply table error chart.

No Geometry in View PV

Models were flagged for the SLIC run that do not contain geometry in view PV. This error is not related to the ply table, but will be placed in the ply table error chart.

No Arrowheads in View PV

Models were flagged for the SLIC run that do not contain arrowheads in View PV defining the plies. This error is not related to the ply table, but will be placed in the ply table error chart.

Two Pierce Points Have Same ID: ID+XXXX

Two pierce points have been called out on the CADAM drawing with the same ID, or value. The xy location on each point will be given so one of the values can be changed. This error is not related to the ply table, but will be placed in the ply table error chart.

No Valid Number Found for Pierce Point

A pierce point has been called out on the CADAM drawing without a numeric value attached. This error is not related to the ply table, but will be placed in the ply table error chart.

Caution Chart

Selection of the caution chart will provide a display which warns the user of potential problems.

Dash 101 Layup #XXX Already Defined

A layup number can be defined more than once in a ply table, as long as it occurs in separate sequence numbers. This is only a warning message for the user that did not want to revise a layup number.

Format Chart Errors

If the sequence format model is missing information, error messages will be generated on the Format Error Chart. See discussion of Sequence Format Models in this section for more information on SLIC sequence models.

SEQ # Not Found for Dash 101 Format

The SEQ # note was not found in View 99 of the Sequence Format Model.

PG # Not Found for Dash 101 Format

The PG 3 note was not found in View 99 of the Sequence Format Model.

Sheet # Not Found for Dash 101 Format

The sheet number note was not found in View 99 of the Sequence Format Model.

Rev Not Found for Dash 101 Format

The revision note was not found in View 99 of the Sequence Format Model.

Format Chart Warnings

The Format Warning Chart will have message warning of possible problems.

Format Model Not Found for Dash 101

The sequence option has been selected, but a sequence format model was not found for the given dash number. Sequence models will not be generated for this dash number.

Geometry Errors

Figure 38:
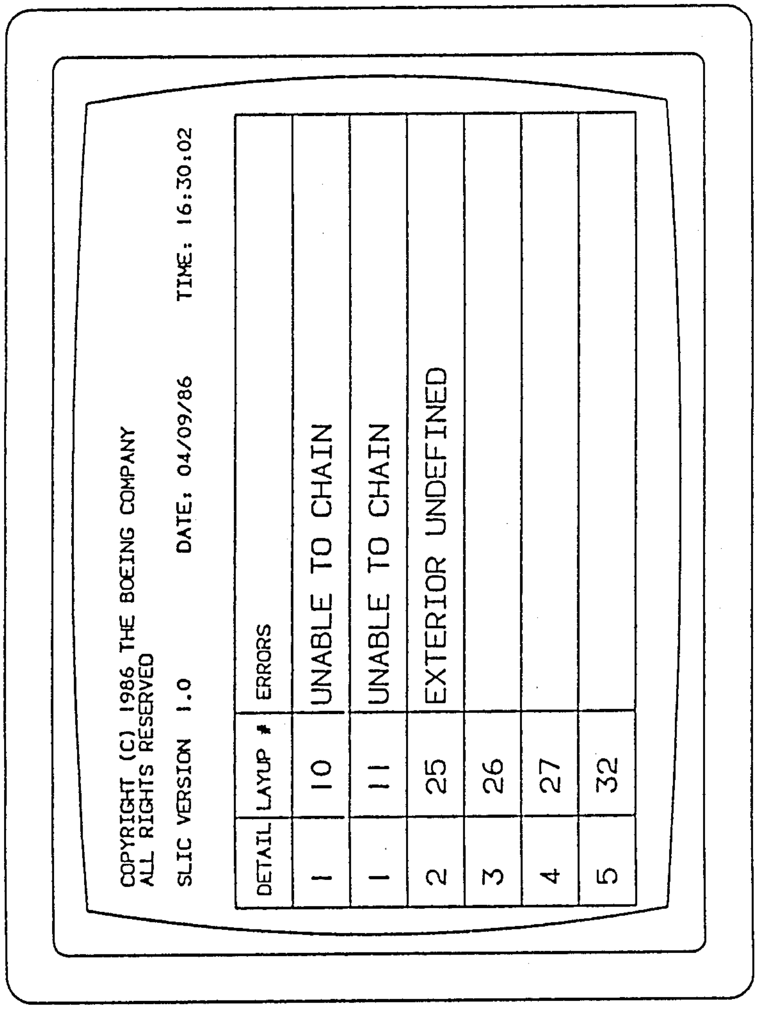
FIG. 38 illustrates the screen display for a layup.

When all ARROW/TEXT and ply table errors have been corrected, SLIC will produce one or more CADAM models as required to produce CADAM details, each defining the geometry of a unique layup. These details are full size and include geometry joined from multi-sheets to define the enire layup. A maximum of fifty details or the maximum CADAM model size identified at installation time are used and then a second model of details is created. The parent model identification will be used to identify these models, except that the 11th through 14th characters will be changed to "LYUP" and the 17th and 18th characters will identify the numerical identity of the model where multi-models are required for layup details. Selecting a LYUP model will display the table shown in FIG. 38.

This table reports each layup which resides in the model, which detail page it is on, and geometry errors. By displaying a detail which reports an error, it can be noted where the error resides so that it can be corrected on the parent model. Correcting the detail does not correct the parent model. The operator should note all errors, correct them on the parent model, and re-execute SLIC. Corrected and newly created LYUP models will overfile (replace) the previous LYUP models.

These cycles must continue until all errors are corrected. If any errors, whether ARROW/TEXT, ply table or LYUP, exist, the downstream output of SLIC will not be generated.

The LYUP models automatically contain plot data for plotting the error chart.

Sequence Overlap Errors

Figure 39:
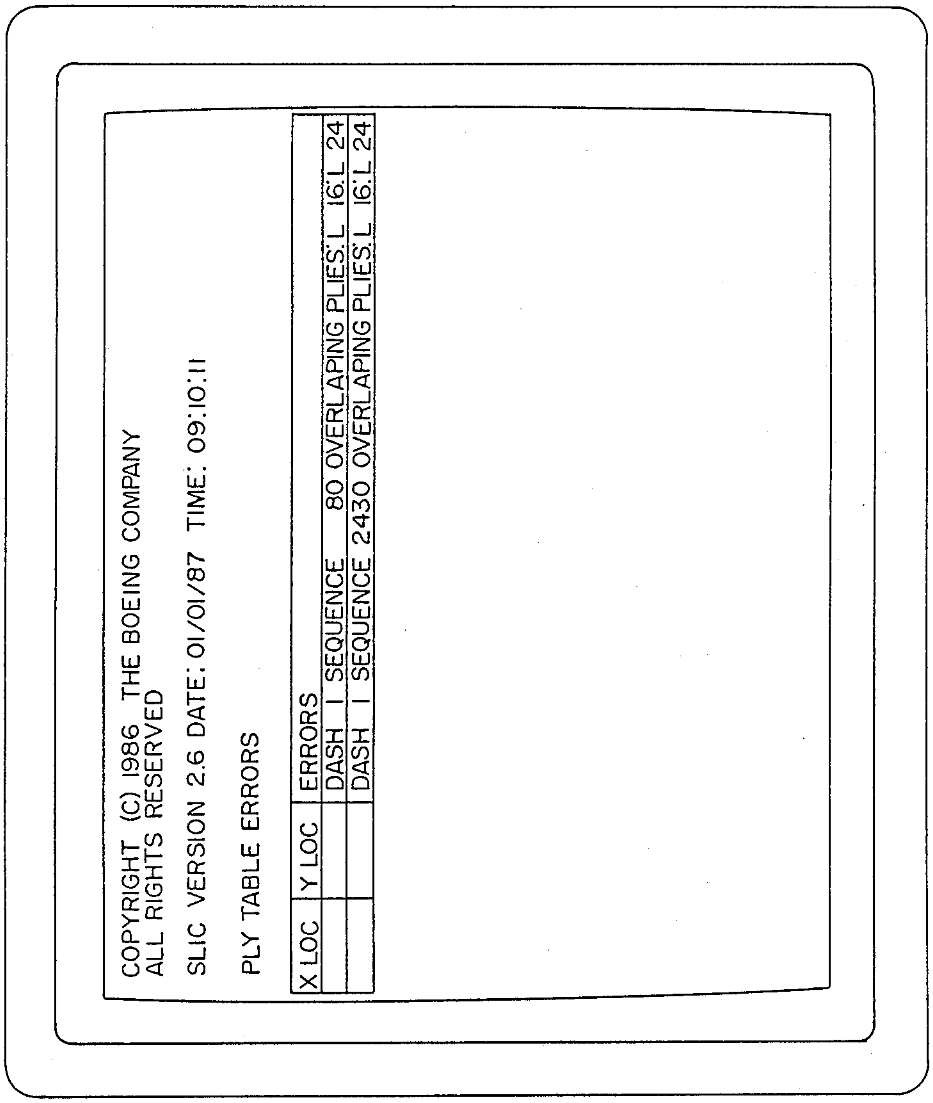
FIG. 39 illustrates the screen display for sequence overlap errors.

If L numbers on any given sequence overlap each other, an error will result. See FIG. 39.

TECHNOLOGY OUTPUT

SLIC will output a variety of data to support technology applications such as design, stress and weights. These include an output table which reports the sequences, layups and plies in proper order, including certain properties. This information table can report raw material requirements and properties or, with minor modifications of the design model, it can report this data for the finished part. A SLIC function called "PIERCE" permits interactive or batch pierce of the designed part and provides strength data about the part. The batch pierce will allow interface to programs such as NASTRAN.

Output Report

Once all errors have been corrected, as discussed in the Errors portion of this section, SLIC will construct a CADAM model which reports data about the designed part. This model is identified by revising the 11th through 14th identification characters to read "INFO." This information model is shown in FIG. 40.

Weights and Center of Gravity

Figure 41:
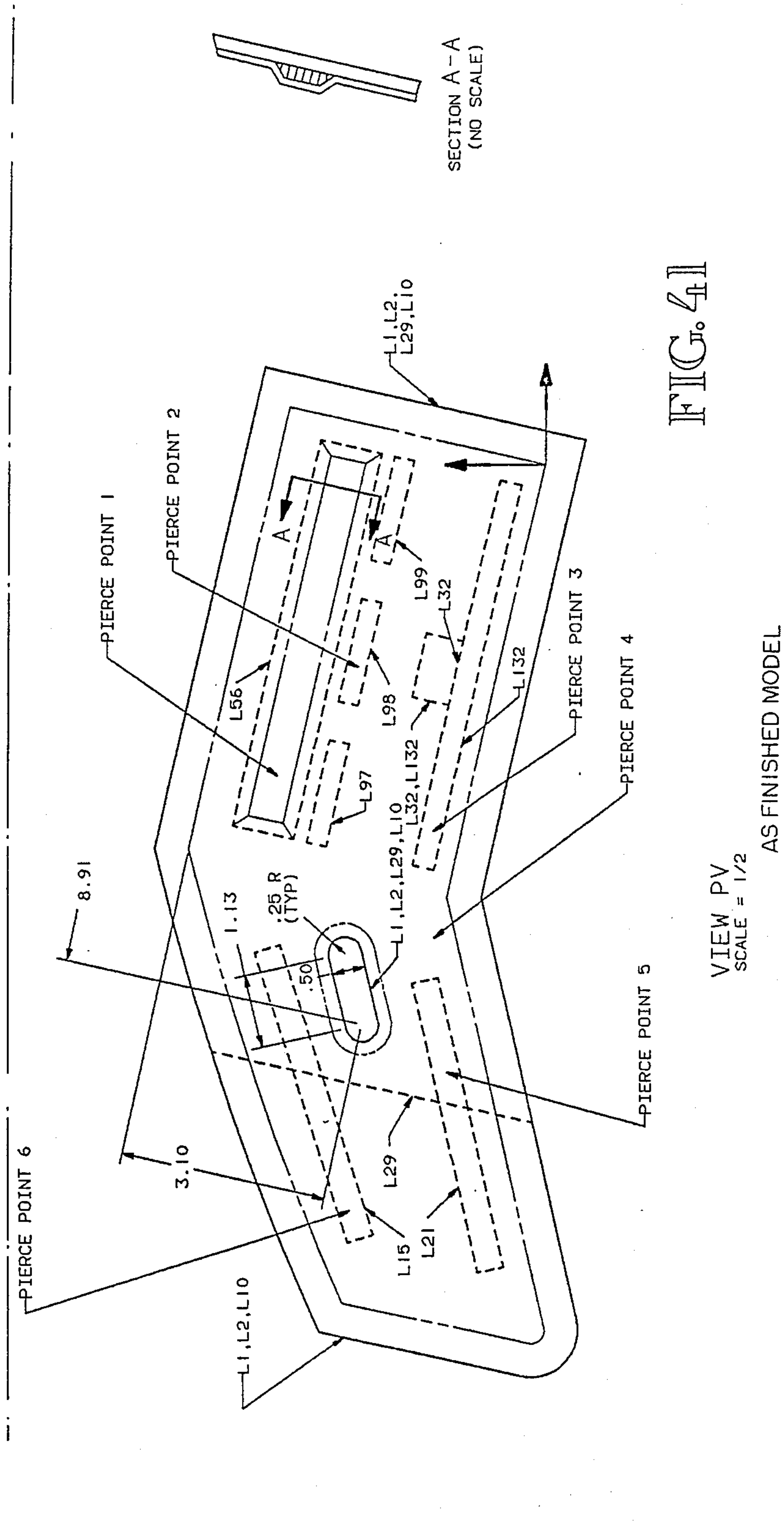
FIG. 41 illustrates a finished model part after the operation of SLIC.
Figure 41:
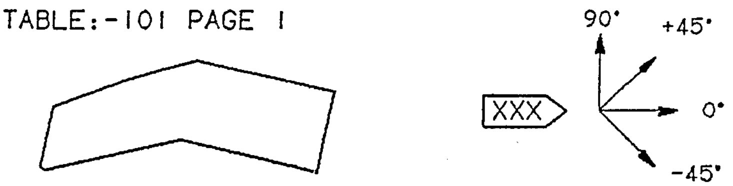
Figure 41:
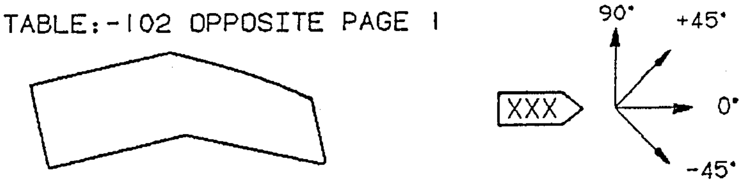

At this time, SLIC will report the weight and CG of the identified layup numbers. These data are included in the INFO model. Because the basic model may show excess material, the data may not reflect the weight and CG of the finished flat pattern. To obtain the data for an as-finished flat pattern, the user should first copy and file the model in the weights CADAM Group. Next, the excess material lines should be erased and the as-finished part periphery defined with solid lines. Next, the layup ARROW/TEXT for the periphery must point to these elements. Upon executing SLIC, the INFO model will present data about the as-finished part. See FIG. 41.

Figure 40:
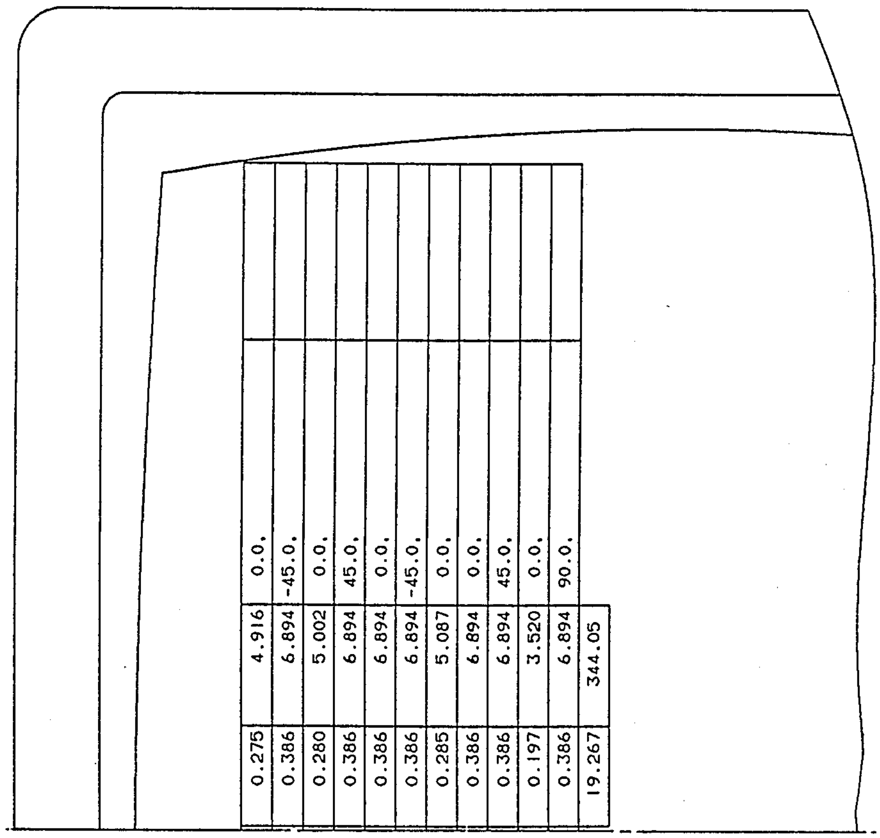
FIG. 40 illustrates the screen display for an information model.

FIG. 40 shows the original INFO model from the part as constructed in FIG. 15, which included excess peripheral material.

Pierce

SLIC will allow a pierce of the composite layups. There are two methods for pierce input and output. The methods are Interactive and Batch. For Pierce to execute, no errors can exist (see Errors portion of this section.)

Interactive Pierce

Figure 42:
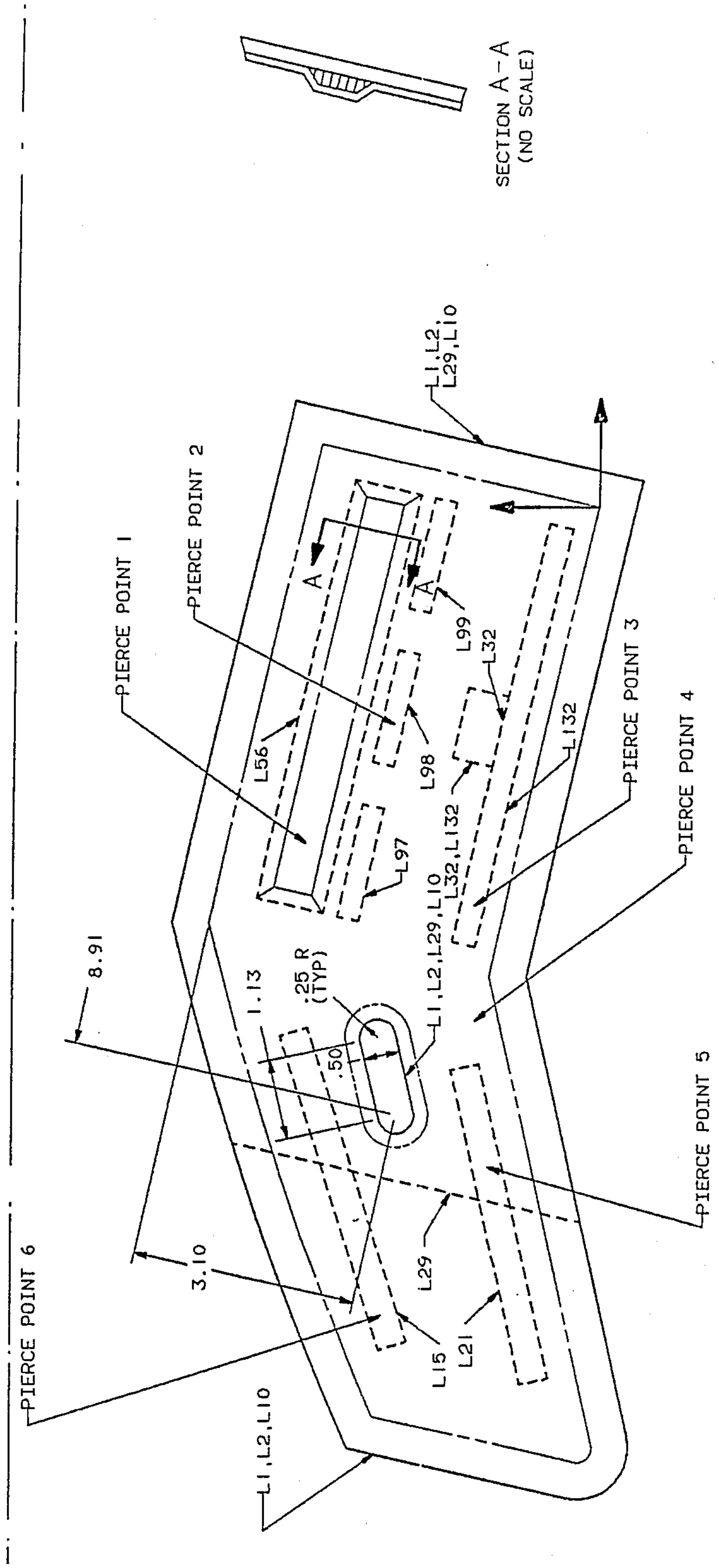
FIG. 42 illustrates an interactive point model.
Figure 42:
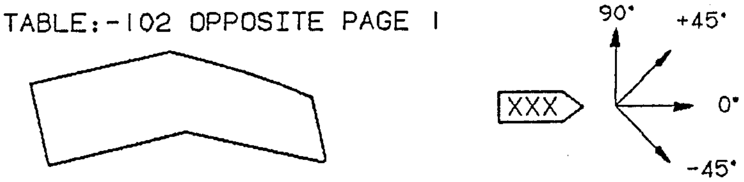
Figure 42:
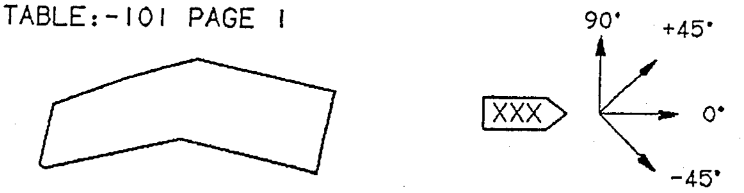

For interactive pierce, ARROW/TEXT must be used. FIG. 42 shows several pierce points on a drawing. These must be input on CADAM View PV and use ARROW/TEXT. Also, the text must be explicit. It must be keyed in "PIERCE POINT." The text contains the pierce point number followed by an optional local rotation. For example: "Pierce Point" will create properties of the laminate using the rotation values exactly as they are in the ply table. "Pierce Point 2,11" will create properties using the values in the ply table minus 11 degrees. This enables a user to calculate properties at various load direction angles on the laminate. A pierce point number may not be repeated.

Figure 43:
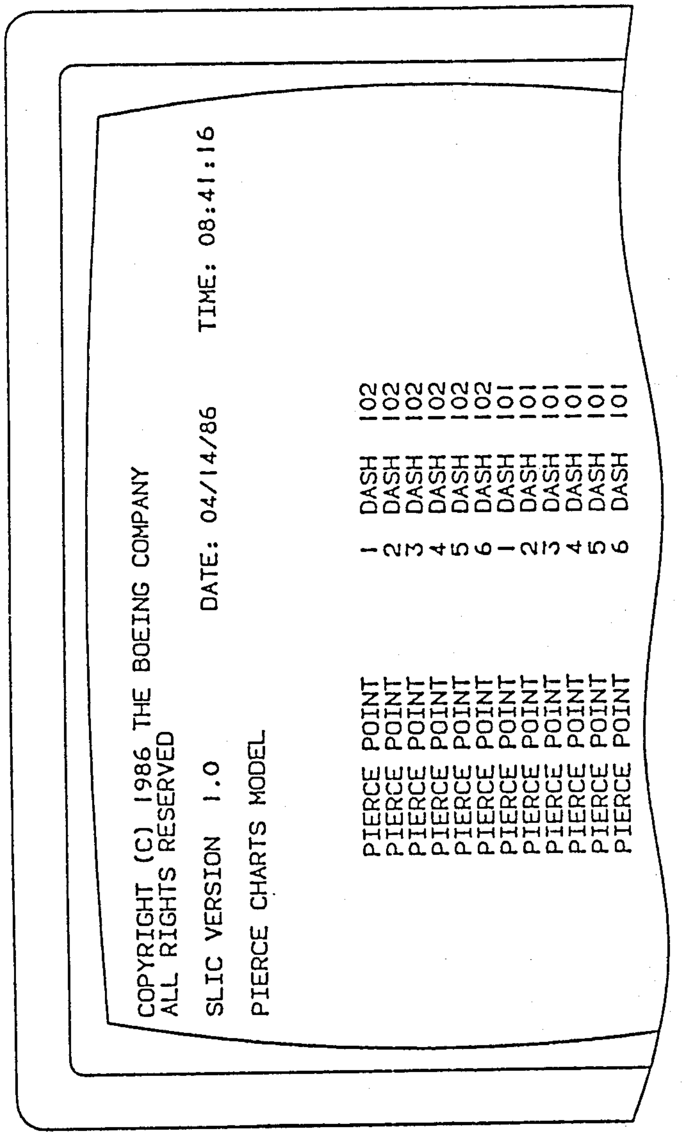
FIG. 43 illustrates screen displays when using a pierce model in the SLIC system.

To operate this SLIC capability, the CADAM model must filed with the pierce points and SLIC re-executed. This will produce a CADAM model where the 11th through 14th characters of the model identification are changed to "PRCE." This model will construct CADAM details of the pierce data. Upon selecting the PRCE model, the display in FIG. 43 will be presented. This model contains the plot data necessary to plot all the pierce charts.

While in the detail function, the pierce point desired for review can be selected, and SLIC will display the appropriate data for that pierce point, as shown in FIG. 44.

The data presented by SLIC Pierce is totally dependent upon a model which has all errors corrected as discussed in this section and also upon approved input of material data per the Material Callout portion of this section.

Batch Pierce

The batch pierce option is available for generation of input cards to NASTRAN. This option is run batch from a TSO terminal. The user is required to supply:
(1) CADAM group and user.
(2) A list of models comprising the part.
(3) A list of pierce points.

The models should be verified that they are SLIC compatible.

Figure 45:
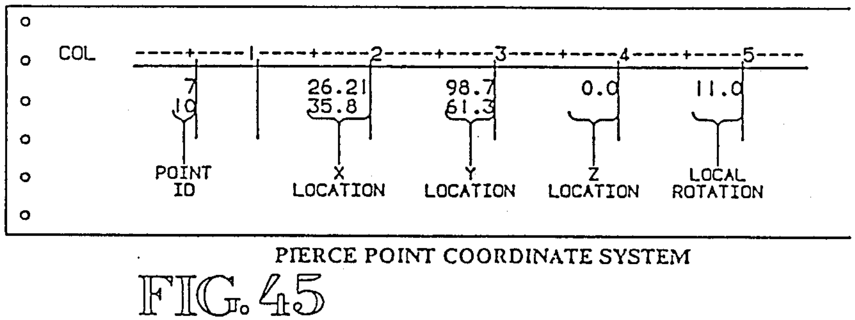
FIG. 45 illustrates a pierce point coordinate system printout.

The pierce points should be in the same coordinate system as the models. They are in the format shown in FIG. 45. The points are read in free field. If the local rotation is zero, it needs to be input as 0.0. The point ID is limited to 6 numeric digits.

Job Control Language (JCL), as illustrated in FIG. 46, is submitted.

The input points are in file FT11F001. The diagnostic messages appear in file FT09F001. The NASTRAN input cards appear in file FT10F001.

PLEFT Option

This is a option in which all angles within the layup are multiplied by −1 before the properties are computed. This was done so that laminate properties could be taken directly from the SLIC model and input to a NASTRAN Finite Element Model.

Section Cuts

The SLIC program has the capability to generate section cuts through properly defined parts. The section cuts models produced contain both stick figures, plots of thickness, ply count, and moduli of the desired cut. In order to obtain this information option, attribute under FK/Group needs to be utilized to define the location of the cut. A line needs to be defined in the location where the desired section cut is desired; this can be on the same model as the part or a separate model. If a new model is created for this, the PV origins must be the same in both models. When assigning attribute data, three requirements exist:

(1) Attribute number 650 is assigned to all section cut lines.

(2) Part dash numbers must be assigned to all section cut attributes.

(3) User-defined identification numbers must be assigned to all sectiin cut attributes. The dash number and section cut identification number are input as attribute data and should be input per the CADAM user's manual. The only requirement on this attribute data is that it be put in as follows: "n,m."

n=integer defining unique section cut line.

m=integer defining part dash number. The direction (or perspective) of the section cut obeys the right-hand rule. A line cannot be used for a section line and geometry definition.

Figure 47:
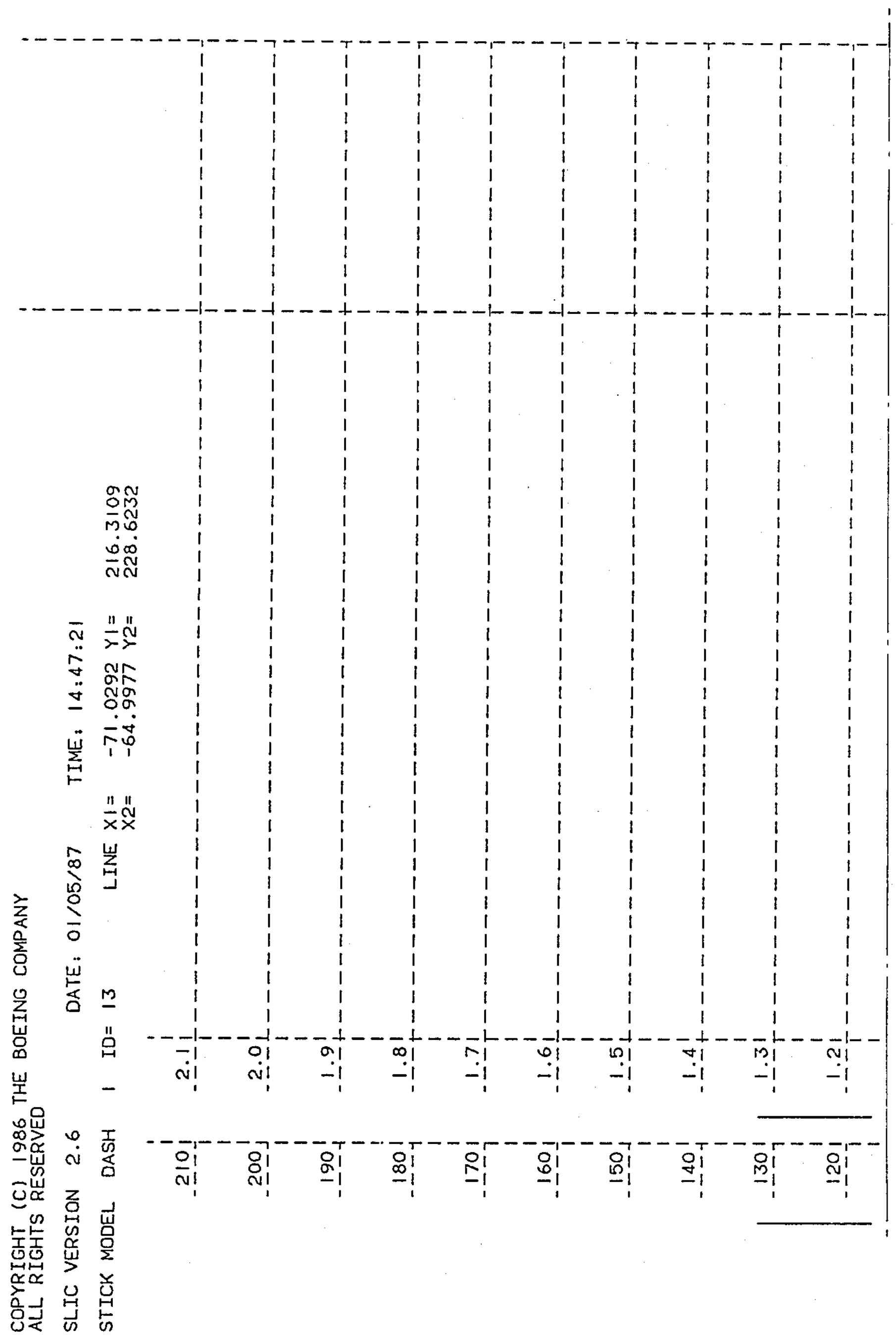
FIG. 47 illustrates the program output for section cuts.
Figure 47:
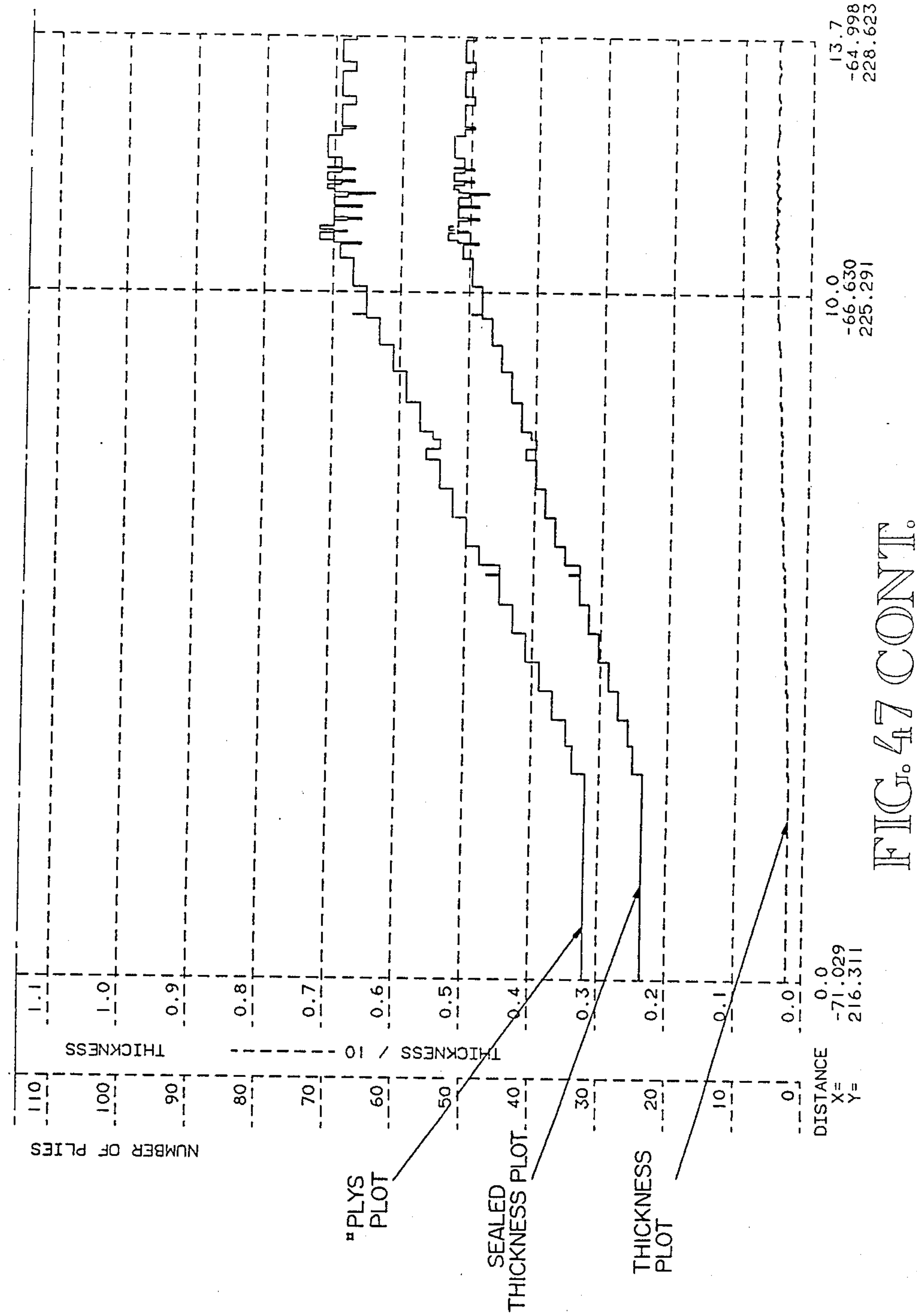

Upon execution of the section cut option, two models will be created for each cut line. One model will contain gauge data as in FIG. 47. The other model will contain E and E*T plots.

SEQUENCE DRAWINGS

Sequence Format Models

Figure 48:
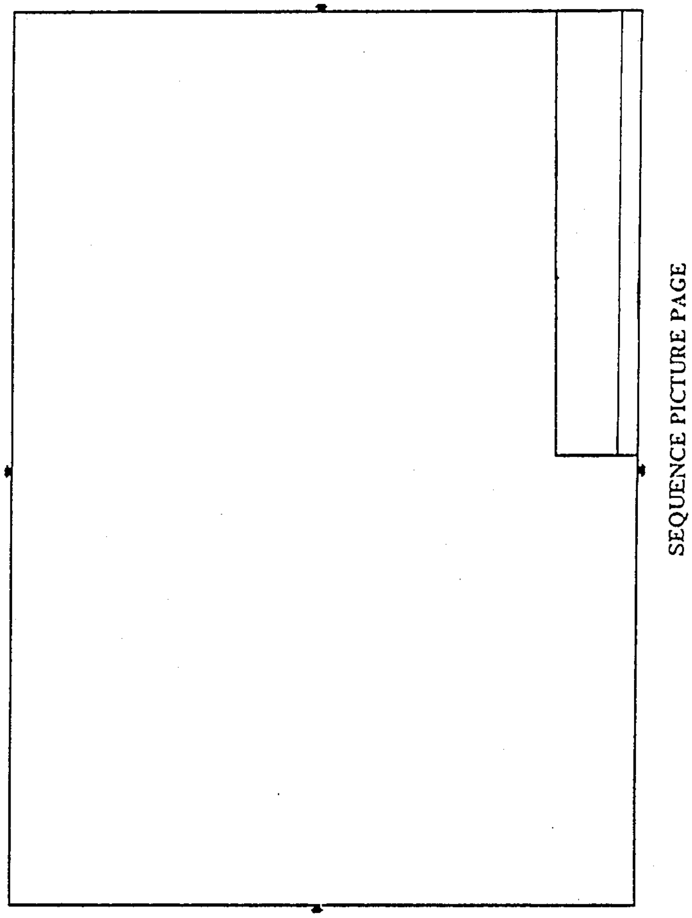
FIG. 48 illustrates a sequence picture page.

Sequence drawings are presented in the size furnished by the Sequence Format Model. The user creates the model which is copied into each SLIC-created sequence models when SLIC runs, as shown, for example, in FIG. 48.

The Start Format for the Sequence Format shall be obtained from the STDLIB. This format must be used with some explicit rules. The View PV Origin must correspond with the Origin of View PV of the parent model. For this document example, FIG. 14 shows this orientation.

The user shall then copy and transfer any peripheral geometry to View PV of the Sequence Format Model, View Scale PV, and/or the Format View, and move as required to obtain the proper orientation of the format to the picture. Add any location identifiers and change all picture lines to phantom or center, as desired. Any notes which are constant across all Sequence models may be added to this format.

Figure 49:
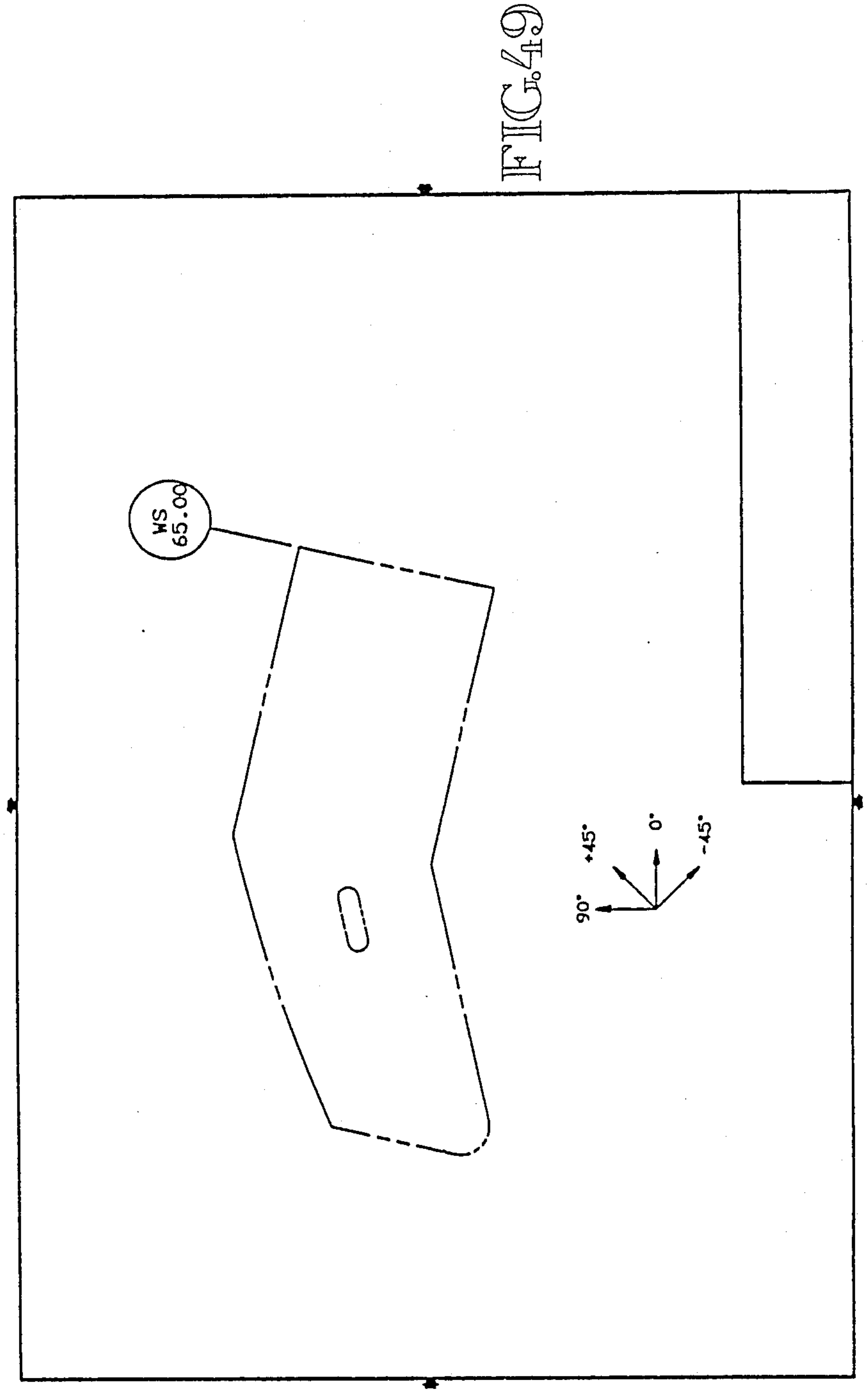
FIG. 49 illustrates a prepared sequence format model.

The Drawing Number, Sheet Number, and Revision Letter shall be edited. The Sequence number shall be NO-SHOwn. The page number shall be edited to contain the page number of the first Sequence Page. This not is then "NO-SHOwn." Do not erase these two entries as they are required by SLIC. The rosette shall be added where the user determines clarity is best served. Plot data should be added to this model at this time so that all picture models constructed by SLIC will include this data. See FIG. 49 for a Prepared Sequence Format Model.

Picture Format Model ID

The sequence format model will be filed by the operator. This model will be retrieved in SLIC when sequences are run. The user does not include this model in his run. SLIC will look for the model and run the sequences for the dash numbers for which a sequence format model exists. Because SLIC will look for the model, it is important that the sequence picture page model name be exact. The name will be as follows:

(1) The first through tenth characters shall contain the same characters as the parent model.

(2) The eleventh through fourteenth characters will be revised to read "SEQ0" (last character is zero).

(3) The fifteenth through eighteenth characters will be revised to designate dash number. The dash will always reside in the fifteenth character. A single digit dash number will have the number in the eighteenth character, leaving the sixteenth and seventeenth characters blank.

Example: 1234567890SEQ0, —, 1, —
SLIC would generate models:
1234567890S002,03,01, —
1234567890S003,03,01, —
1234567890S004,03,01, — etc.

Sequence Output

Figure 50:
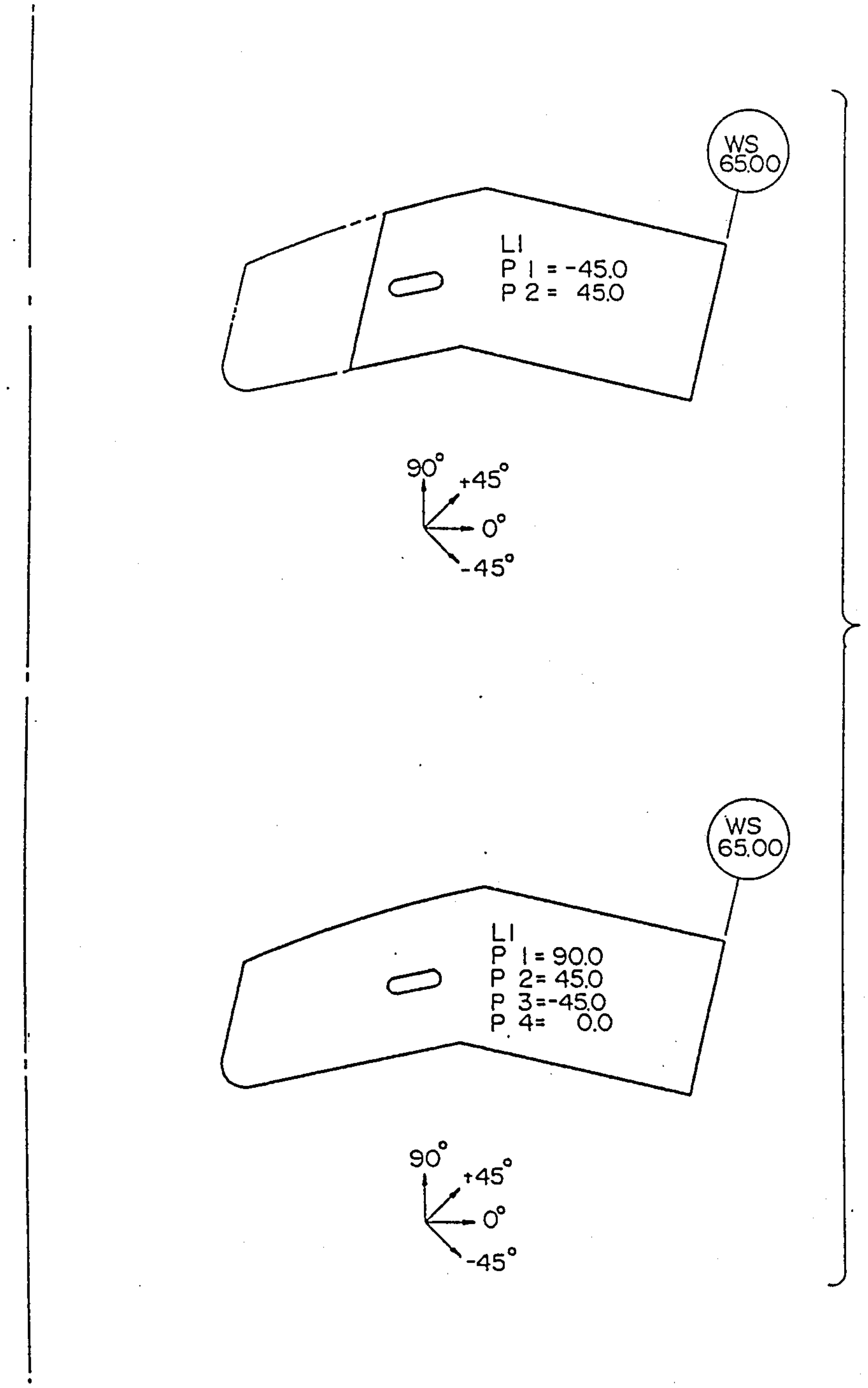
FIG. 50 illustrates sequence pages for SLIC sequence output.

Upon executing Sequences, SLIC will construct Sequence page 2 and on, as shown in FIG. 50. These pages should be plotted and checked for errors. If geometry errors exist, they should be corrected on the parent sheets (geometry ply tables and formats) and Sequences re-executed.

Each layup of the sequence is presented by CADAM heavy lines as a CADAM DITTO. The layup will include:

| | |
|---|---|
| Layup Numbers | L1 |
| Each Ply and Orientation | P1 = 90.0 |
| | P2 = 0.0 |

Due to space limitations, the data from one layup may overlie the data for another layup. The data may be moved on the detail page which represents the layup. If all sequence models do not get created, check CADAM drawfile size.

SLIC generates additional information on the NO-SHOW page of the sequences for traceability.

EXECUTING SLIC

The method an installation determines the run SLIC can vary. In order for SLIC to run the model IDs, group and user must be supplied to the JCL that runs SLIC. The following is a recommended method that allows a user the capability to run SLIC from a CADAM terminal and get results back in a short time period. This method requires a job to be set up in the IJPTABLE for submittal of SLIC.

In this case, three options exist from the terminal. The following are the required steps:

Access the user listing where the models reside.

Select /2/ on the menu.

Key in a VOLID. The operator may key in up to six characters to identify the job. Each operator should use caution not to repeat a VOLID to assure that two active tasks on the computer do not have the same ID. Once a job is complete on the system, a particular VOLID may be reused.

Select those CADAM models against which SLIC is to be executed. These models must before a particular drawing set. One should not attempt to execute SLIC against unassociated models under a single VOLID.

Press the Y/N Key when all models have been selected. This removes the M on the left and actually places the VOLID on the models.

Select /MENU 1/.

Select /RETURN/ to access a CADAM model.

Select /DATA-M/.

Select /IJP/.

Display will provide three SLIC options. Select the desired SLIC program from the batch job table.

SLIC-WITHOUT PLY TABLE

SLIC-WITH PLY TABLE, PIERCE

SLIC-SEQUENCES

Select /SCHEDULE/ on the menu.

Key in the VOLID placed on the models.

Key in the name of the operator submitting the job.

Press the Y/N Function Key to begin execution.

Select /MENU 1/ to exit.

The operator may then proceed to other CADAM tasks and periodically check the user listing for the completion of the job. Depending on the size of the SLIC task, the completion of the job can take from a mere instant up to several minutes.

"SLIC-WITHOUT PLY TABLE"

This option will create models which describe ARROW/TEXT errors, and when no errors exist, models of each layup geometry entity for correction of geometric errors. This output is described in the Errors portions of this section.

"SLIC-WITH PLY TABLE, PIERCE"

This option executes all capabilities described in the Errors and Technology Output portions of this section.

"SLIC-SEQUENCES"

This option executes the capabilities described in the Sequence Drawings portion of this section.

Section Cuts

This option executes all capabilities described in the Technology Output portion of this section.

Although the present invention has been described herein primarily in terms of its embodiment in SLIC, it should be understood that the invention is not limited to this preferred embodiment, but rather includes all equivalent embodiments.

TABLE I

```
MEMBER NAME  CONVTI
02C5E2C4  40404040  40400010  40400001  C3D6D5E5  E3C94040  00000000
000000C9  40404040  40404040  40404040  40404040  40404040  40404040
40404040  40404040  40404040  40404040  F0F0F0F0  F0F0F0F1*
02E3E7E3  40000000  40400038  40400001  47F0F00C  06C3D6D5  E5E3C900
90ECD00C  4510F05C  00000000  00000000  00000000  00000000  00000000
00000000  00000000  00000000  00000000  F0F0F0F0  F0F0F0F2*
02E3E7E3  40000038  40400038  40400001  00000000  00000000  00000000
00000000  00000000  00000000  00000000  00000000  00000000  18ED501E
000850E1  000418D1  98E1E00C  98561000  F0F0F0F0  F0F0F0F3*
02E3E7E3  40000070  40400038  40400001  58550000  4E50D09C  D207D0AC
D0A4DE07  D0ACD0A0  9540D0B0  4770D082  D203D0B0  D0B147F0  D0705850
D0B05056  000058DD  000498EC  D00C9601  F0F0F0F0  F0F0F0F4*
02E3E7E3  400000A8  40400008  40400001  D00F41F0  000007FE  40404040
40404040  40404040  40404040  40404040  40404040  40404040  40404040
40404040  40404040  40404040  40404040  F0F0F0F0  F0F0F0F5*
02E3E7E3  400000B8  40400008  40400001  40202020  20202120  40404040
40404040  40404040  40404040  40404040  40404040  40404040  40404040
40404040  40404040  40404040  40404040  F0F0F0F0  F0F0F0F6*
```

```
02E3E7E3  400000C8  40400001  40400001  40404040  40404040  40404040
40404040  40404040  40404040  40404040  40404040  40404040  40404040
40404040  40404040  40404040  40404040  F0F0F0F0  F0F0F0F7*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F8**

MEMBER NAME  MVCHRL
02C5E2C4  40404040  40400010  40400001  D4E5C3C8  D9D34040  00000000
00000020  40404040  40404040  40404040  40404040  40404040  40404040
40404040  40404040  40404040  40404040  F0F0F0F0  F0F0F0F1*
02E3E7E3  40000000  4040001E  40400001  90ECD00C  58210004  58310000
58410008  58330000  18530E24  98ECD00C  07FE4040  40404040  40404040
40404040  40404040  40404040  40404040  F0F0F0F0  F0F0F0F2*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F3**

MEMBER NAME  ICNTER
02C5E2C4  40404040  40400010  40400001  C9C3D5E3  C5D94040  00000000
00000034  40404040  40404040  40404040  40404040  40404040  40404040
40404040  40404040  40404040  40404040  F0F0F0F0  F0F0F0F1*
02E3E7E3  40000000  4040002C  40400001  90ECD00C  98231000  58430000
41524000  5B50F030  95405000  4770F020  4640F010  180498EF  D00C981C
D01807FE  40404040  40404040  40404040  F0F0F0F0  F0F0F0F2*
02E3E7E3  40000030  40400004  40400001  00000001  40404040  40404040
40404040  40404040  40404040  40404040  40404040  40404040  40404040
40404040  40404040  40404040  40404040  F0F0F0F0  F0F0F0F3*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F4**

MEMBER NAME  FSORT
02C5E2C4  40404040  40400030  40400001  C6E2D6D9  E3404040  00000000
00000194  C6D5C4C2  D3D5D240  02000000  40404040  C5F1F540  40404040
00000198  000000A4  40404040  40404040  F0F0F0F0  F0F0F0F1*
02C5E2C4  40404040  40400030  40400004  C5F3F540  40404040  00000240
000000BC  C6D5C4C2  D3D5D240  00000300  000000A8  C6C9D5C4  C2404040
01000300  40000005  40404040  40404040  F0F0F0F0  F0F0F0F2*
02C5E2C4  40404040  40400030  40400006  C6E2C5D5  C4404040  000003A8
00000118  C6E2C7C5  E3404040  000004C0  0000017A  C6E2D7E4  E3404040
00000640  00000160  40404040  40404040  F0F0F0F0  F0F0F0F3*
02C5E2C4  40404040  40400020  40400009  E2E3D4D9  C5E7C9E3  000007A0
00000070  C4C1E3C1  40404040  00000810  00000070  40404040  40404040
40404040  40404040  40404040  40404040  F0F0F0F0  F0F0F0F4*
02E3E7E3  40000000  40400024  40400001  47F0F00A  05C6E2D6  D9E390EC
D00C50D0  F0284120  F0245020  D00858C0  F1900700  45D0F06C  40404040
40404040  40404040  40404040  40404040  F0F0F0F0  F0F0F0F5*
02E3E7E3  4000006C  40400038  40400001  98241000  5040C03C  D503C044
C0044770  D12C5020  C0504122  000C0700  47F0D06C  00000000  5020D078
4110D078  47F0D07C  00000000  58F0D068  F0F0F0F0  F0F0F0F6*
02E3E7E3  400000A4  40400038  40400001  05EF1210  4740D136  1A215020
C0545030  C0584133  000C0700  47F0D0A0  00000000  5030D0AC  4110D0AC
47F0D0B0  00000000  58F0D09C  05EF1210  F0F0F0F0  F0F0F0F7*
02E3E7E3  400000DC  40400038  40400001  4740D136  1A315030  C05CD203
D164C004  4110C048  41F0D0D4  47F0F048  00000114  00000000  80000828
00000000  00000000  00000000  00000000  F0F0F0F0  F0F0F0F8*
02E3E7E3  40000114  40400038  40400001  E2D6D9E3  40404040  00000000
00000000  00000000  00000000  00000048  00000000  00010000  00000000
00000000  0A2A5010  C04412FF  4770D140  F0F0F0F0  F0F0F0F9*
```

```
02E3E7E3  4000014C  40400038  40400001  47F0D14A  D203D164  C00847F0
D14AD203  D164C00C  47F0D14A  D203D164  C01047F0  D14A5810  C03CD203
1000D164  58D0D004  98ECD00C  41F00000  F0F0F0F0  F0F0F1F0**
02E3E7E3  40000184  40400002  40400001  07FE4040  40404040  40404040
40404040  40404040  40404040  40404040  40404040  40404040  40404040
40404040  40404040  40404040  40404040  F0F0F0F0  F0F0F1F1*
02E3E7E3  40000190  40400004  40400001  00000810  40404040  40404040
40404040  40404040  40404040  40404040  40404040  40404040  40404040
40404040  40404040  40404040  40404040  F0F0F0F0  F0F0F1F2*
02E3E7E3  40000198  40400020  40400003  47F0F008  03C5F1F5  90ECD00C
50D0F024  4120F020  5020D008  58C0F0A0  45D0F068  40404040  40404040
40404040  40404040  40404040  40404040  F0F0F0F0  F0F0F1F3*
02E3E7E3  40000200  40400032  40400003  1B004110  C01C0A02  4110C028
41000001  0A0158F0  C02841FF  0000D203  C028C004  5810C040  58D0D004
58ED000C  982CD01C  07FE4040  40404040  F0F0F0F0  F0F0F1F4*
02E3E7E3  40000238  40400004  40400003  00000810  40404040  40404040
40404040  40404040  40404040  40404040  40404040  40404040  40404040
40404040  40404040  40404040  40404040  F0F0F0F0  F0F0F1F5*
02E3E7E3  40000240  40400020  40400004  47F0F008  03C5F3F5  90ECD00C
50D0F024  4120F020  5020D008  58C0F0B8  45D0F068  40404040  40404040
40404040  40404040  40404040  40404040  F0F0F0F0  F0F0F1F6*
02E3E7E3  400002A8  40400038  40400004  58510000  5050C040  12554770
D0644100  00034110  C0200A02  47F0D06C  1B004110  C0200A02  4110C024
41000001  0A0158F0  C02441FF  0000D203  F0F0F0F0  F0F0F1F7*
02E3E7E3  400002E0  40400012  40400004  C024C004  58D0D004  58ED000C
982CD01C  07FE4040  40404040  40404040  40404040  40404040  40404040
40404040  40404040  40404040  40404040  F0F0F0F0  F0F0F1F8*
02E3E7E3  400002F8  40400004  40400004  00000810  40404040  40404040
40404040  40404040  40404040  40404040  40404040  40404040  40404040
40404040  40404040  40404040  40404040  F0F0F0F0  F0F0F1F9*
02E3E7E3  40000300  40400024  40400005  47F0F00A  05C6C9D5  C4C290EC

MEMBER NAME  FSORT
D00C50D0  F0284120  F0245020  D00858C0  F0A00700  45D0F06C  40404040
40404040  40404040  40404040  40404040  F0F0F0F0  F0F0F2F0**
02E3E7E3  4000036C  40400032  40400005  58210000  1B334150  00FE9540
20004780  D06A4133  00014122  00014650  D0525830  D0801803  58D0D004
98EFD00C  981CD018  07FE4040  40404040  F0F0F0F0  F0F0F2F1*
02E3E7E3  400003A0  40400008  40400005  00000810  FFFFFFFF  40404040
40404040  40404040  40404040  40404040  40404040  40404040  40404040
40404040  40404040  40404040  40404040  F0F0F0F0  F0F0F2F2*
02E3E7E3  400003A8  40400024  40400006  47F0F00A  05C6E2C5  D5C490EC
D00C50D0  F0284120  F0245020  D00858C0  F1100700  45D0F06C  40404040
40404040  40404040  40404040  40404040  F0F0F0F0  F0F0F2F3*
02E3E7E3  40000414  40400038  40400006  58210000  D2032000  C004D203
C01CC004  5830C020  D203C020  C004D203  C028C004  D203C030  C004D203
C034C004  D203C038  C004D203  C02CC004  F0F0F0F0  F0F0F2F4*
02E3E7E3  4000044C  40400038  40400006  D503C044  C0044780  D0CA4133
00005930  C0104770  D0A04110  C0184100  00010A01  4110C044  0A3ED203
C044C004  5830C018  D203C018  C004D203  F0F0F0F0  F0F0F2F5*
02E3E7E3  40000484  40400038  40400006  C024C004  41330000  12334770
D0D447F0  D0DED203  2000C008  47F0D0DE  D2032000  C00C47F0  D0DE58D0
D00498EC  D00C41F0  000007FE  00000810  F0F0F0F0  F0F0F2F6*
02E3E7E3  400004BC  40400004  40400006  00000000  40404040  40404040
40404040  40404040  40404040  40404040  40404040  40404040  40404040
40404040  40404040  40404040  40404040  F0F0F0F0  F0F0F2F7*
02E3E7E3  400004C0  40400024  40400007  47F0F00A  05C6E2C7  C5E390EC
D00C50D0  F0284120  F0245020  D00858C0  F1680700  45D0F06C  40404040
40404040  40404040  40404040  40404040  F0F0F0F0  F0F0F2F8*
02E3E7E3  4000052C  40400038  40400007  98241000  D203C034  C0045040
C03CD203  4000C004  D503C02C  C0084770  D070D203  4000D148  47F0D134
```

```
D503C044  C0044780  D1205833  00000630  F0F0F0F0  F0F0F2F9*
02E3E7E3  40000564  40400038  40400007  9140C018  4710D12A  D503C030
C0044770  D0A8D203  C030C008  D203C040  C0044100  00084110  C0280A02
5850D14C  4110C000  18F54100  00938900  F0F0F0F0  F0F0F3F0**
02E3E7E3  4000059C  40400038  40400007  00180A2F  4110C020  41000001
0A01D503  C034C004  4770D12A  41100001  0A2E5810  C0204111  00005910
C0104770  D1045840  C03CD203  4000D148  F0F0F0F0  F0F0F3F1*
02E3E7E3  400005D4  40400038  40400007  D203C02C  C0084100  00084110
C0240A02  47F0D134  D203C020  C0045850  C0404430  D1504100  00044110
C0240A02  47F0D134  D2034000  C00847F0  F0F0F0F0  F0F0F3F2*
02E3E7E3  4000060C  4040001A  40400007  D134D203  4000C00C  47F0D134
58D0D004  98ECD00C  41F00000  07FE4040  40404040  40404040  40404040
40404040  40404040  40404040  40404040  F0F0F0F0  F0F0F3F3*
02E3E7E3  40000628  40400012  40400007  00000810  FFFFFFFF  000007A0
D2002000  50004040  40404040  40404040  40404040  40404040  40404040
40404040  40404040  40404040  40404040  F0F0F0F0  F0F0F3F4*
02E3E7E3  40000640  40400024  40400008  47F0F00A  05C6E2D7  E4E390EC
D00C50D0  F0284120  F0245020  D00858C0  F1580700  45D0F06C  40404040
40404040  40404040  40404040  40404040  F0F0F0F0  F0F0F3F5*
02E3E7E3  400006AC  40400038  40400008  98241000  D203C034  C0045040
C03CD203  4000C004  D503C044  C0044780  D1029140  C0184710  D10CD503
C030C004  4770D116  D503C038  C0044770  F0F0F0F0  F0F0F3F6*
02E3E7E3  400006E4  40400038  40400008  D0BCD203  C038C008  5850D138
4110C000  18F54100  00938900  00180A2F  4110C01C  41000001  0A01D203
C01CC004  D503C034  C0044770  D10C4110  F0F0F0F0  F0F0F3F7*
02E3E7E3  4000071C  40400038  40400008  00010A2E  5020C040  4100000C
4110C028  0A025850  D1384110  C00018F5  41000093  89000018  0A2F4110
C01C4100  00010A01  D203C01C  C004D503  F0F0F0F0  F0F0F3F8*
02E3E7E3  40000754  40400038  40400008  C034C004  4770D10C  41100001
0A2E47F0  D124D203  4000C008  47F0D124  D2034000  C00C47F0  D124D203

MEMBER NAME  FSORT
4000C010  47F0D124  47F0D124  58D0D004  F0F0F0F0  F0F0F3F9*
02E3E7E3  4000078C  4040000A  40400008  98ECD00C  41F00000  07FE4040
40404040  40404040  40404040  40404040  40404040  40404040  40404040
40404040  40404040  40404040  40404040  F0F0F0F0  F0F0F4F0**
02E3E7E3  40000798  40400008  40400008  00000810  000007A0  40404040
40404040  40404040  40404040  40404040  40404040  40404040  40404040
40404040  40404040  40404040  40404040  F0F0F0F0  F0F0F4F1*
02E3E7E3  400007A0  40400038  40400009  47F0F00E  08E2E3D4  D9C5E7C9
E30090EC  D00C05B0  58C0B054  9140C018  4710B024  5850B058  4110C000
18F54100  00938900  00180A2F  47F0B048  F0F0F0F0  F0F0F4F2*
02E3E7E3  400007D8  4040002A  40400009  D203C034  C008D503  C030C004
4770B040  1B004110  C01C0A02  47F0B048  1B004110  C0200A02  98ECD00C
07FE4040  40404040  40404040  40404040  F0F0F0F0  F0F0F4F3*
02E3E7E3  40000808  40400008  40400009  00000810  000007A0  40404040
40404040  40404040  40404040  40404040  40404040  40404040  40404040
40404040  40404040  40404040  40404040  F0F0F0F0  F0F0F4F4*
02E3E7E3  40000810  40400038  4040000A  00001770  00000000  00000001
00000002  00000003  00000004  00000000  00000000  00000000  00000000
00000000  00000000  00000000  00000000  F0F0F0F0  F0F0F4F5*
02E3E7E3  40000848  40400004  4040000A  00000000  40404040  40404040
40404040  40404040  40404040  40404040  40404040  40404040  40404040
40404040  40404040  40404040  40404040  F0F0F0F0  F0F0F4F6*
02E3E7E3  40000850  40400030  4040000A  00000000  00000000  8000085E
07000020  00000000  00000000  00000000  00000000  00000198  00000240
00030D40  FF4DC95D  40404040  40404040  F0F0F0F0  F0F0F4F7*
02D9D3C4  40404040  40400038  40404040  00010001  0C0000F8  00020001
1D00008C  1C0000C0  000A0001  0D000100  0C000190  000A0003  0C000238
000A0004  0C0002F8  000A0005  0C0003A0  F0F0F0F0  F0F0F4F8*
02D9D3C4  40404040  40400038  40404040  000A0006  0C0004B8  00090007
```

```
0C000630  000A0007  0C000628  00090008  0C00079C  000A0008  0C000798
00090009  0C00080C  000A0009  0C000808  F0F0F0F0  F0F0F4F9*
02D9D3C4  40404040  40400018  40404040  0003000A  0C000870  0004000A
0C000874  000A000A  08000859  40404040  40404040  40404040  40404040
40404040  40404040  40404040  40404040  F0F0F0F0  F0F0F5F0**
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F5F1**
```

MEMBER NAME MODSIZ30

```
02C5E2C4  40404040  40400020  40400001  D4D6C4E2  C9E94040  00000000
00000008  40404040  40404040  05000000  0001DCF8  40404040  40404040
40404040  40404040  40404040  40404040  F0F0F0F0  F0F0F0F1*
02E3E7E3  40000000  40400008  40400001  00007530  0000773E  40404040
40404040  40404040  40404040  40404040  40404040  40404040  40404040
40404040  40404040  40404040  40404040  F0F0F0F0  F0F0F0F2*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F3**
```

MEMBER NAME AROTXT

```
02C5E2C4  40404040  40400010  40400001  C1D9D6E3  E7E34040  00000000
40000000  40404040  40404040  40404040  40404040  40404040  40404040
40404040  40404040  40404040  40404040  C1D9D6E3  F0F0F0F1*
02E3E7E3  40000000  40400038  40400001  47F0F00C  07C1D9D6  E3E7E340
90ECD00C  184D98CD  F0205040  D00450D0  400807FC  40404040  40404040
020A0803  18010A08  0318011A  2740D5D6  C1D9D6E3  F0F0F0F2*
02E3E7E3  40000038  40400038  40400001  40E5C1D3  C9C440D5  E4D4C2C5
D940C6D6  E4D5C440  C6D6D940  D7C9C5D9  C3C540D7  D6C9D5E3  18322202
06481401  22021A25  40C5D9D9  D6D940C9  C1D9D6E3  F0F0F0F3*
02E3E7E3  40000070  4040001E  40400001  D540C2C3  E2D3C9C2  40C9D540
C1D9D6E3  E7E340E2  E4C2D9D6  E4E3C9D5  C5224040  40404040  40404040
40404040  40404040  40404040  40404040  C1D9D6E3  F0F0F0F4*
02E3E7E3  40000090  40400038  40400001  40404040  40404040  F9404040
40404040  F0404040  40404040  60404040  40404040  D3404040  40404040
6B404040  40404040  E3404040  40404040  C1D9D6E3  F0F0F0F5*
02E3E7E3  400000C8  40400018  40400001  D7C9C5D9  C3C5D7D6  C9D5E340
40404040  40404040  40404040  40404040  40404040  40404040  40404040
40404040  40404040  40404040  40404040  C1D9D6E3  F0F0F0F6*
02E3E7E3  40000258  40400038  40400001  00000000  00000000  4F080000
00000000  00000000  00000000  00000000  00000001  00000001  00000002
00000003  00000004  0000000B  0000000C  C1D9D6E3  F0F0F0F7*
02C5E2C4  40404040  40400010  40400002  D7E3C1C2  D3C54040  05000000
40125768  40404040  40404040  40404040  40404040  40404040  40404040
40404040  40404040  40404040  40404040  C1D9D6E3  F0F0F0F8*
02E3E7E3  40000290  40400020  40400001  00000010  00000014  00000018
00000048  00000100  41100000  00000000  00000000  40404040  40404040
40404040  40404040  40404040  40404040  C1D9D6E3  F0F0F0F9*
02C5E2C4  40404040  40400010  40400003  D7D7D6C9  D5E34040  05000000
40013884  40404040  40404040  40404040  40404040  40404040  40404040
40404040  40404040  40404040  40404040  C1D9D6E3  F0F0F1F0**
02C5E2C4  40404040  40400010  40400004  D7C3C5D9  D9404040  05000000
40003844  40404040  40404040  40404040  40404040  40404040  40404040
40404040  40404040  40404040  40404040  C1D9D6E3  F0F0F1F1*
02C5E2C4  40404040  40400010  40400005  D6D7E3C9  D6D54040  05000000
40000020  40404040  40404040  40404040  40404040  40404040  40404040
40404040  40404040  40404040  40404040  C1D9D6E3  F0F0F1F2*
02C5E2C4  40404040  40400010  40400006  C6D3E340  40404040  02000000
40000000  40404040  40404040  40404040  40404040  40404040  40404040
40404040  40404040  40404040  40404040  C1D9D6E3  F0F0F1F3*
02E3E7E3  40000428  40400020  40400001  FFFFFFEC  00058600  000B0444
```

```
00108298  FFFFFFF0  FFFFFFBB  00000000  00000000  40404040  40404040
40404040  40404040  40404040  40404040  C1D9D6E3  F0F0F1F4*
02D9D3C4  40404040  40400038  40404040  00020001  0C000428  00020001
0C00042C  00020001  0C000430  00020001  0C000434  00030001  0C000438
00040001  0C00043C  00050001  0C000440  C1D9D6E3  F0F0F1F5*
02E3E7E3  40000448  40400004  40400001  00000000  40404040  40404040
40404040  40404040  40404040  40404040  40404040  40404040  40404040
40404040  40404040  40404040  40404040  C1D9D6E3  F0F0F1F6*
02C5E2C4  40404040  40400010  40400007  C9E2D9C3  C8404040  02000000
40000000  40404040  40404040  40404040  40404040  40404040  40404040
40404040  40404040  40404040  40404040  C1D9D6E3  F0F0F1F7*
02E3E7E3  40000450  40400004  40400001  00000000  40404040  40404040
40404040  40404040  40404040  40404040  40404040  40404040  40404040
40404040  40404040  40404040  40404040  C1D9D6E3  F0F0F1F8*
02C5E2C4  40404040  40400010  40400008  D4E5C3C8  D9404040  02000000
40000000  40404040  40404040  40404040  40404040  40404040  40404040
40404040  40404040  40404040  40404040  C1D9D6E3  F0F0F1F9*
02C5E2C4  40404040  40400010  40400009  C3D4D7D9  E2E24040  02000000

MEMBER NAME  AROTXT
40000000  40404040  40404040  40404040  40404040  40404040  40404040
40404040  40404040  40404040  40404040  C1D9D6E3  F0F0F2F0**
02C5E2C4  40404040  40400010  4040000A  C9C2C3D6  D47B4040  02000000
40000000  40404040  40404040  40404040  40404040  40404040  40404040
40404040  40404040  40404040  40404040  C1D9D6E3  F0F0F2F1*
02C5E2C4  40404040  40400010  4040000B  C9E2D9C3  C8E54040  02000000
40000000  40404040  40404040  40404040  40404040  40404040  40404040
40404040  40404040  40404040  40404040  C1D9D6E3  F0F0F2F2*
02C5E2C4  40404040  40400010  4040000C  D2D6D4D7  D9E54040  02000000
40000000  40404040  40404040  40404040  40404040  40404040  40404040
40404040  40404040  40404040  40404040  C1D9D6E3  F0F0F2F3*
02C5E2C4  40404040  40400010  4040000D  E2D7D3E3  E7E34040  02000000
40000000  40404040  40404040  40404040  40404040  40404040  40404040
40404040  40404040  40404040  40404040  C1D9D6E3  F0F0F2F4*
02E3E7E3  40000458  4040001C  40400001  00000000  00000000  00000000
00000000  00000000  00000000  00000000  40404040  40404040  40404040
40404040  40404040  40404040  40404040  C1D9D6E3  F0F0F2F5*
02D9D3C4  40404040  40400038  40404040  00060001  1C000444  00070001
1C000458  00080001  1C00045C  00090001  1C000460  000A0001  1C000464
000B0001  1C000468  000C0001  1C00046C  C1D9D6E3  F0F0F2F6*
02E3E7E3  400002E4  40400004  40400001  000000C8  40404040  40404040
40404040  40404040  40404040  40404040  40404040  40404040  40404040
40404040  40404040  40404040  40404040  C1D9D6E3  F0F0F2F7*
02E3E7E3  40000480  40400038  40400001  5890D368  58A0D35C  58B0D358
5860D1AC  58F0D354  5800F008  4000D342  58F0D380  4110D084  05EF41E0
000415FE  4720D3D6  58EFD04C  07FE5820  C1D9D6E3  F0F0F2F8*
02E3E7E3  400004B8  40400038  40400001  D1F45A20  D1985020  D1E45920
D1C04730  D41C1882  58B0D1C0  4108D22F  5000D098  58F0D37C  4110D094
05EF5A80  D198198B  47C0D3F0  58B0D358  C1D9D6E3  F0F0F2F9*
02E3E7E3  400004F0  40400038  40400001  47F0D41C  1BFF58E0  D00007FE
58F0D360  5800F010  1BFF870F  D56E5800  D1F45900  D1A84750  D56E58F0
D3884110  D0A005EF  41E00004  15FE4720  C1D9D6E3  F0F0F3F0**
02E3E7E3  40000528  40400038  40400001  D45058EF  D05407FE  5800D1DC
12004780  D56E58F0  D3904110  D0B805EF  5800D208  12004730  D4D85800
A0455900  D20447A0  D4D85850  A0455A50  C1D9D6E3  F0F0F3F1*
02E3E7E3  40000560  40400038  40400001  D1985050  A04558F0  D3841800
45E0F004  00000000  00000028  45E0F008  04709004  45E0F008  04709008
45E0F010  58F0D384  45E0F000  00000000  C1D9D6E3  F0F0F3F2*
02E3E7E3  40000598  40400038  40400001  0000005F  5C40D1BC  45E0F134
00010000  0125A001  01000048  00000001  45E0F010  5820B010  5A20D198
5020B010  7820D344  89200004  7022B004  C1D9D6E3  F0F0F3F3*
```

| | | | | | | |
|---|---|---|---|---|---|---|
| 02E3E7E3 | 400005D0 | 40400038 | 40400001 | 78209004 | 7022B008 | 78209008 |
| 7022B00C | 7800D190 | 7002B010 | 58F0D378 | 4110D0CC | 05EF41E0 | 000415FE |
| 4720D522 | 58EFD05C | 07FE5800 | D1DC1200 | C1D9D6E3 | F0F0F3F4* | |
| 02E3E7E3 | 40000608 | 40400038 | 40400001 | 4770D534 | 1BFF58E0 | D00007FE |
| 5800D1F4 | 5B00D1DC | 5000D1F0 | 58E0D1DC | 410ED230 | 5000D0E0 | 58F0D364 |
| 4110D0E0 | 05EF5820 | B0108920 | 00047800 | C1D9D6E3 | F0F0F3F5* | |
| 02E3E7E3 | 40000640 | 40400038 | 40400001 | D1F87002 | B0101BFF | 58E0D000 |
| 07FE5800 | D1985000 | D1EC5800 | D1945000 | D2185800 | D1885000 | D22C5890 |
| D1C858A0 | D19858B0 | D3545880 | D3685800 | C1D9D6E3 | F0F0F3F6* | |
| 02E3E7E3 | 40000678 | 40400038 | 40400001 | D1EC5900 | D1F447C0 | D5B65890 |
| D36858A0 | D35C58B0 | D3581BFF | 58E0D000 | 07FE58F0 | D3784110 | D0EC05EF |
| 41E00004 | 15FE4720 | D5D058EF | D06407FE | C1D9D6E3 | F0F0F3F7* | |
| 02E3E7E3 | 400006B0 | 40400038 | 40400001 | 5800D1D4 | 12004770 | D5EE5890 |
| D36858A0 | D35C58B0 | D3581BFF | 58E0D000 | 07FE5800 | D2188609 | D6685800 |
| D22C8609 | D67058F0 | D3784110 | D10005EF | C1D9D6E3 | F0F0F3F8* | |
| 02E3E7E3 | 400006E8 | 40400038 | 40400001 | 41E00004 | 15FE4720 | D61858EF |
| D06C07FE | 5830D1D4 | 1B3A5030 | D1E05930 | D1DC4130 | 00014760 | D6301B33 |

MEMBER NAME AROTXT

| | | | | | | |
|---|---|---|---|---|---|---|
| 5030D394 | 5800D1DC | 5900D18C | 41200001 | C1D9D6E3 | F0F0F3F9* | |
| 02E3E7E3 | 40000720 | 40400038 | 40400001 | 4780D646 | 1B221623 | 5020D398 |
| 8729D658 | 5800D194 | 5000D218 | 5800D398 | 8609D670 | 5800D194 | 5000D22C |
| 5800D188 | 5000D218 | 5820D1D4 | 1A2A5020 | C1D9D6E3 | F0F0F4F0** | |
| 02E3E7E3 | 40000758 | 40400038 | 40400001 | D2005830 | D18C5030 | D1F01879 |
| 5890D18C | 18A318B2 | 410BD22F | 5000D114 | 58F0D38C | 4110D114 | 05EF50A0 |
| D1F041E0 | 000415FE | 4720D6B2 | 58EFD074 | C1D9D6E3 | F0F0F4F1* | |
| 02E3E7E3 | 40000790 | 40400038 | 40400001 | 07FE410B | D22F5000 | D12C58F0 |
| D38C4110 | D12C05EF | 50A0D1F0 | 41E00004 | 15FE4720 | D6D858EF | D07C07FE |
| 5990D224 | 41200001 | 4720D6E6 | 1B225990 | C1D9D6E3 | F0F0F4F2* | |
| 02E3E7E3 | 400007C8 | 40400038 | 40400001 | D2284130 | 00014740 | D6F41B33 |
| 162319A9 | 41300001 | 4780D702 | 1B331423 | 8727D710 | 50A0D1F0 | 47F0D890 |
| 5800D224 | 120047A0 | D72250A0 | D1F047F0 | C1D9D6E3 | F0F0F4F3* | |
| 02E3E7E3 | 40000800 | 40400038 | 40400001 | D75E5800 | D2281200 | 47C0D734 |
| 50A0D1F0 | 47F0D75E | 5AA0D198 | 410AD32F | 5000D148 | 410BD22F | 5000D14C |
| 9280D14C | 58F0D37C | 4110D144 | 05EF5AB0 | C1D9D6E3 | F0F0F4F4* | |
| 02E3E7E3 | 40000838 | 40400038 | 40400001 | D19847F0 | D68C58B0 | D35458A0 |
| D1985890 | D1C87800 | D1F87000 | D21C58F0 | D3644110 | D15005EF | 5850B00C |
| 1A5A5050 | B00C2B00 | 7800D1F8 | 6A00D180 | C1D9D6E3 | F0F0F4F5* | |
| 02E3E7E3 | 40000870 | 40400038 | 40400001 | 6000D178 | 5820D17C | 5020D210 |
| 4020D340 | 1C464105 | B0045000 | D16058F0 | D37C4110 | D15C05EF | 78208004 |
| 18565C40 | B00C7025 | B0087820 | 80087025 | C1D9D6E3 | F0F0F4F6* | |
| 02E3E7E3 | 400008A8 | 40400038 | 40400001 | B00C5800 | D2188609 | D8B05800 |
| D22C8709 | D8B02B00 | 7800D21C | 6A00D180 | 6000D178 | 5830D17C | 5030D39C |
| 1A3A5030 | D20C1802 | 1B0A5000 | D1E87800 | C1D9D6E3 | F0F0F4F7* | |
| 02E3E7E3 | 400008E0 | 40400038 | 40400001 | D21C7900 | D1F847C0 | D8101A2A |
| 5020D20C | 7800D21C | 7900D1F8 | 47C0D826 | 5800D39C | 1B0A5000 | D1E87820 |
| D1F87B20 | D21C3022 | 7920D1C4 | 4780D884 | C1D9D6E3 | F0F0F4F8* | |
| 02E3E7E3 | 40000918 | 40400038 | 40400001 | 5880D20C | 58B0D1E8 | 5890D354 |
| 5870D368 | 4080D340 | 5830900C | 1A3A5030 | 900C1C26 | 41039004 | 5000D160 |
| 58F0D37C | 4110D15C | 05EF7820 | 70041836 | C1D9D6E3 | F0F0F4F9* | |
| 02E3E7E3 | 40000950 | 40400038 | 40400001 | 5C20900C | 70239008 | 78207008 |
| 7023900C | 878AD848 | 5880D368 | 58B0D354 | 5890D1C8 | 58B0D354 | 58A0D198 |
| 5890D1C8 | 5800D188 | 5000D22C | 5800D194 | C1D9D6E3 | F0F0F5F0** | |
| 02E3E7E3 | 40000988 | 40400038 | 40400001 | 5000D218 | 47F0D8B8 | 5800D188 |
| 5000D218 | 188A58B0 | D1F04108 | D32F5000 | D16C58F0 | D37C4110 | D16805EF |
| 5A80D198 | 198B47C0 | D8BE5880 | D36858B0 | C1D9D6E3 | F0F0F5F1* | |
| 02E3E7E3 | 400009C0 | 40400038 | 40400001 | D3545800 | D1F05A00 | D2005000 |
| D1EC47F0 | D5965890 | D36858A0 | D35C58B0 | D35858F0 | D3841800 | 45E0F004 |
| 00000006 | 00000065 | 45E0F010 | 58F0D384 | C1D9D6E3 | F0F0F5F2* | |
| 02E3E7E3 | 400009F8 | 40400038 | 40400001 | 45E0F034 | 05404040 | F1F558A0 |
| D00458E0 | A00C58B0 | A0185810 | B0045820 | D2145020 | 100018DA | 92FFA00C |

```
982CA01C  07FE9878  10045820  70005020  C1D9D6E3  F0F0F5F3*
02E3E7E3  40000A30  40400036  40400001  D2145820  10004130  20004150
00011B25  5020D370  5030D374  5030D084  58201008  41302000  41500004
1B255020  D3685030  D36C47F0  D3A04040  C1D9D6E3  F0F0F5F4*
02E3E7E3  40000020  40400008  40400001  00000A26  000000E0  40404040
40404040  40404040  40404040  40404040  40404040  40404040  40404040
40404040  40404040  40404040  40404040  C1D9D6E3  F0F0F5F5*
02E3E7E3  400000E0  40400004  40400001  00000A02  40404040  40404040
40404040  40404040  40404040  40404040  40404040  40404040  40404040
40404040  40404040  40404040  40404040  C1D9D6E3  F0F0F5F6*
02E3E7E3  4000012C  40400004  40400001  000004B6  40404040  40404040
40404040  40404040  40404040  40404040  40404040  40404040  40404040
40404040  40404040  40404040  40404040  C1D9D6E3  F0F0F5F7*
02D9D3C4  40404040  40400038  40404040  000D0001  1C000470  00010001
0C000574  00010001  0C000598  00010001  0C0009EC  00010001  0C000020
00010001  0C000024  00010001  0C0000E0  C1D9D6E3  F0F0F5F8*

MEMBER NAME  AROTXT
02E3E7E3  40000130  4040001C  40400001  000004F4  00000530  000009D2
00000602  000009D2  000006B0  000009D2  40404040  40404040  40404040
40404040  40404040  40404040  40404040  C1D9D6E3  F0F0F5F9*
02D9D3C4  40404040  40400038  40404040  00010001  0C00012C  00010001
0C000130  00010001  0C000134  00010001  0C000138  00010001  0C00013C
00010001  0C000140  00010001  0C000144  C1D9D6E3  F0F0F6F0**
02E3E7E3  4000014C  40400018  40400001  000006F8  000009D2  00000792
000009D2  000007B8  000009D2  40404040  40404040  40404040  40404040
40404040  40404040  40404040  40404040  C1D9D6E3  F0F0F6F1*
02E3E7E3  40000168  40400004  40400001  000002F4  40404040  40404040
40404040  40404040  40404040  40404040  40404040  40404040  40404040
40404040  40404040  40404040  40404040  C1D9D6E3  F0F0F6F2*
02D9D3C4  40404040  40400038  40404040  00010001  0C000148  00010001
0C00014C  00010001  0C000150  00010001  0C000154  00010001  0C000158
00010001  0C00015C  00010001  0C000160  C1D9D6E3  F0F0F6F3*
02E3E7E3  4000016C  4040000C  40400001  00000310  800002D4  00000278
40404040  40404040  40404040  40404040  40404040  40404040  40404040
40404040  40404040  40404040  40404040  C1D9D6E3  F0F0F6F4*
02E3E7E3  4000017C  40400010  40400001  800000D8  00000310  00000278
000000C8  40404040  40404040  40404040  40404040  40404040  40404040
40404040  40404040  40404040  40404040  C1D9D6E3  F0F0F6F5*
02D9D3C4  40404040  40400038  40404040  00010001  0C000168  00010001
0C00016C  00010001  0C000170  00010001  0C000174  00010001  0C00017C
00010001  0C000180  00010001  0C000184  C1D9D6E3  F0F0F6F6*
02E3E7E3  4000018C  4040001C  40400001  000002D4  00000288  800002BC
00000310  000002D4  000000C0  00000424  40404040  40404040  40404040
40404040  40404040  40404040  40404040  C1D9D6E3  F0F0F6F7*
02D9D3C4  40404040  40400038  40404040  00010001  0C000188  00010001
0C00018C  00010001  0C000190  00010001  0C000194  00010001  0C000198
00010001  0C00019C  00010001  0C0001A0  C1D9D6E3  F0F0F6F8*
02E3E7E3  400001A8  40400018  40400001  800002E8  00000310  00000278
000002D4  000000B8  800002BC  40404040  40404040  40404040  40404040
40404040  40404040  40404040  40404040  C1D9D6E3  F0F0F6F9*
02E3E7E3  400001C4  40400004  40400001  000002D0  40404040  40404040
40404040  40404040  40404040  40404040  40404040  40404040  40404040
40404040  40404040  40404040  40404040  C1D9D6E3  F0F0F7F0**
02D9D3C4  40404040  40400038  40404040  00010001  0C0001A4  00010001
0C0001A8  00010001  0C0001AC  00010001  0C0001B0  00010001  0C0001B4
00010001  0C0001B8  00010001  0C0001BC  C1D9D6E3  F0F0F7F1*
02E3E7E3  400001C8  4040001C  40400001  800002D8  00000310  000002CC
000002D4  000000B0  800002B4  00000310  40404040  40404040  40404040
40404040  40404040  40404040  40404040  C1D9D6E3  F0F0F7F2*
02D9D3C4  40404040  40400038  40404040  00010001  0C0001C4  00010001
```

```
0C0001C8  00010001  0C0001CC  00010001  0C0001D0  00010001  0C0001D4
00010001  0C0001D8  00010001  0C0001DC  C1D9D6E3  F0F0F7F3*
02E3E7E3  400001E4  40400010  40400001  000002CC  000002D4  000000A8
800002BC  40404040  40404040  40404040  40404040  40404040  40404040
40404040  40404040  40404040  40404040  C1D9D6E3  F0F0F7F4*
02E3E7E3  400001F8  4040000C  40400001  00000278  000000A0  00000278
40404040  40404040  40404040  40404040  40404040  40404040  40404040
40404040  40404040  40404040  40404040  C1D9D6E3  F0F0F7F5*
02D9D3C4  40404040  40400038  40404040  00010001  0C0001E0  00010001
0C0001E4  00010001  0C0001E8  00010001  0C0001EC  00010001  0C0001F0
00010001  0C0001F8  00010001  0C0001FC  C1D9D6E3  F0F0F7F6*
02E3E7E3  40000204  40400008  40400001  00000278  80000304  40404040
40404040  40404040  40404040  40404040  40404040  40404040  40404040
40404040  40404040  40404040  40404040  C1D9D6E3  F0F0F7F7*
02E3E7E3  40000210  40400014  40400001  00000278  00000098  00000278

MEMBER NAME  AROTXT
00000278  80000308  40404040  40404040  40404040  40404040  40404040
40404040  40404040  40404040  40404040  C1D9D6E3  F0F0F7F8*
02D9D3C4  40404040  40400038  40404040  00010001  0C000200  00010001
0C000204  00010001  0C000208  00010001  0C000210  00010001  0C000214
00010001  0C000218  00010001  0C00021C  C1D9D6E3  F0F0F7F9*
02E3E7E3  40000224  40400004  40400001  00000278  40404040  40404040
40404040  40404040  40404040  40404040  40404040  40404040  40404040
40404040  40404040  40404040  40404040  C1D9D6E3  F0F0F8F0**
02E3E7E3  4000022C  40400014  40400001  80000000  00000410  000002D0
800002D8  00000284  40404040  40404040  40404040  40404040  40404040
40404040  40404040  40404040  40404040  C1D9D6E3  F0F0F8F1*
02E3E7E3  40000244  40400008  40400001  80000420  00000278  40404040
40404040  40404040  40404040  40404040  40404040  40404040  40404040
40404040  40404040  40404040  40404040  C1D9D6E3  F0F0F8F2*
02D9D3C4  40404040  40400038  40404040  00010001  0C000220  00010001
0C000224  00010001  0C000230  00010001  0C000234  00010001  0C000238
00010001  0C00023C  00010001  0C000244  C1D9D6E3  F0F0F8F3*
02E3E7E3  40000250  40400004  40400001  80000090  40404040  40404040
40404040  40404040  40404040  40404040  40404040  40404040  40404040
40404040  40404040  40404040  40404040  C1D9D6E3  F0F0F8F4*
02E3E7E3  40000474  4040000C  40400001  00000000  00000000  00000000
40404040  40404040  40404040  40404040  40404040  40404040  40404040
40404040  40404040  40404040  40404040  C1D9D6E3  F0F0F8F5*
02D9D3C4  40404040  40400010  40404040  00010001  0C000248  00010001
0C000250  40404040  40404040  40404040  40404040  40404040  40404040
40404040  40404040  40404040  40404040  C1D9D6E3  F0F0F8F6*
02C5D5C4  40404040  40404040  40404040  40404040  40404040  40404040
00000A66  F1F5F7F3  F460C6D6  F34040F0  F2F0F2F8  F7F0F9F8  40F0F84B
F1F14BF4  F4404040  C1D9D6E3  E7E34040  C1D9D6E3  F0F0F8F7**

MEMBER NAME  BCHAN1
02C5E2C4  40404040  40400010  40400001  C2C3C8C1  D5F14040  00000000
40000000  40404040  40404040  40404040  40404040  40404040  40404040
40404040  40404040  40404040  40404040  C2C3C8C1  F0F0F0F1*
02E3E7E3  40000000  40400028  40400001  47F0F00C  07C2C3C8  C1D5F140
90ECD00C  184D98CD  F0205040  D00450D0  400807FC  40404040  40404040
40404040  40404040  40404040  40404040  C2C3C8C1  F0F0F0F2*
02E3E7E3  40000078  40400038  40400001  00000000  00000000  4F080000
00000000  00000000  00000001  00000001  00000002  00000003  00000004
00000005  00000006  0000000E  00000000  C2C3C8C1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C2C3C8C1  F0F0F0F4*
02E3E7E3  400000B0  40400004  40400001  00000000  40404040  40404040
```

```
40404040  40404040  40404040  40404040  40404040  40404040  40404040
40404040  40404040  40404040  40404040  C2C3C8C1  F0F0F0F5*
02E3E7E3  400000F0  40400008  40400001  00000000  00000000  40404040
40404040  40404040  40404040  40404040  40404040  40404040  40404040
40404040  40404040  40404040  40404040  C2C3C8C1  F0F0F0F6*
02E3E7E3  400000FC  40400004  40400001  00000000  40404040  40404040
40404040  40404040  40404040  40404040  40404040  40404040  40404040
40404040  40404040  40404040  40404040  C2C3C8C1  F0F0F0F7*
02E3E7E3  40000104  40400004  40400001  00000000  40404040  40404040
40404040  40404040  40404040  40404040  40404040  40404040  40404040
40404040  40404040  40404040  40404040  C2C3C8C1  F0F0F0F8*
02E3E7E3  40000154  40400038  40400001  5860D0CC  58A0D0C8  58B0D0D4
5800D060  5000D090  5800D108  5000D0E4  5800D110  5000D0F4  7800B004
7000D0EC  5800D114  5000D0F8  7800B008  C2C3C8C1  F0F0F0F9*
02E3E7E3  4000018C  40400038  40400001  7000D0F0  5800D118  5000D0FC
5800D11C  5000D104  5870D118  5880D114  5890D068  58B0D0DC  5990D0A4
4780D2D4  58586000  5050D0B8  58076000  C2C3C8C1  F0F0F1F0**
02E3E7E3  400001C4  40400038  40400001  5000D098  5C40D110  5050D0E8
18355A30  D10C2B00  7803B000  6A00D058  6000D050  5820D054  5920D0B0
4770D2D4  18255A20  D0E47842  B0007B40  C2C3C8C1  F0F0F1F1*
02E3E7E3  400001FC  40400038  40400001  D0EC3064  18255A20  D1147822
B0007B20  D0F03022  7020D0A0  7960A004  47A0D200  7920A004  47A0D200
47F0D2C0  5820D0E8  5A20D118  7842B000  C2C3C8C1  F0F0F1F2*
02E3E7E3  40000234  40400038  40400001  7B40D0EC  30645820  D0E85A20
D11C7822  B0007B20  D0F03022  7020D0A0  7960A004  47A0D23C  7920A004
47A0D23C  47F0D2C0  5850D098  5C40D0F4  C2C3C8C1  F0F0F1F3*
02E3E7E3  4000026C  40400038  40400001  5050D100  18255A20  D0E47842
B0007B40  D0EC3064  18255A20  D0F87822  B0007B20  D0F03022  7020D0A0
7960A004  47A0D280  7920A004  47A0D280  C2C3C8C1  F0F0F1F4*
02E3E7E3  400002A4  40400038  40400001  47F0D2C0  5820D100  5A20D0FC
7842B000  7B40D0EC  30645820  D1005A20  D1047822  B0007B20  D0F03022
7020D0A0  7960A004  47A0D2BC  7920A004  C2C3C8C1  F0F0F1F5*
02E3E7E3  400002DC  40400038  40400001  47A0D2BC  47F0D2C0  47F0D2D4
58B0D0D4  5800D064  5000D090  1BFF58E0  D00007FE  5A90D068  5A70D108
5A80D108  5990D0B4  47C0D188  58B0D0D4  C2C3C8C1  F0F0F1F6*
02E3E7E3  40000314  40400038  40400001  1BFF58E0  D00007FE  58A0D004
58E0A00C  58B0A018  5810B01C  5820D090  50201000  18DA92FF  A00C982C
A01C07FE  987B1008  58207000  5020D094  C2C3C8C1  F0F0F1F7*
02E3E7E3  4000034C  40400038  40400001  58209000  5020D0B4  5820A000
5020D0A4  5820B000  5020D0B0  5870101C  58207000  5020D090  58201000
41302000  41500004  1B255020  D0D45030  C2C3C8C1  F0F0F1F8*
02E3E7E3  40000384  40400038  40400001  D0D85820  10044130  20004150
00041B25  5C40D080  1B255020  D0DC5030  D0E05820  100C4130  20004150
00041B25  5C40D070  1B255020  D0CC5030  C2C3C8C1  F0F0F1F9*
02E3E7E3  400003BC  40400006  40400001  D0D047F0  D12C4040  40404040

MEMBER NAME  BCHAN1
40404040  40404040  40404040  40404040  40404040  40404040  40404040
40404040  40404040  40404040  40404040  C2C3C8C1  F0F0F2F0**
02E3E7E3  40000020  4040000C  40400001  00000340  00000028  0000031C
40404040  40404040  40404040  40404040  40404040  40404040  40404040
40404040  40404040  40404040  40404040  C2C3C8C1  F0F0F2F1*
02E3E7E3  4000010C  40400038  40400001  00000000  00000000  00000000
00000000  00000000  00000000  00000000  00000000  00000000  0000000C
00000008  00000038  00000010  00000014  C2C3C8C1  F0F0F2F2*
02E3E7E3  40000144  40400010  40400001  00000018  00000000  00000000
00000000  40404040  40404040  40404040  40404040  40404040  40404040
40404040  40404040  40404040  40404040  C2C3C8C1  F0F0F2F3*
02D9D3C4  40404040  40400020  40404040  00020001  0C0000F0  00010001
0C000020  00010001  0C000024  00010001  0C000028  40404040  40404040
40404040  40404040  40404040  40404040  C2C3C8C1  F0F0F2F4*
```

```
02C5D5C4  40404040  40404040  40404040  40404040  40404040  40404040
000003C2  F1F5F7F3  F460C6D6  F34040F0  F2F0F2F8  F7F0F9F8  40F0F84B
F1F14BF4  F9404040  C2C3C8C1  D5F14040  C2C3C8C1  F0F0F2F5**

MEMBER NAME  BCHAIN
02C5E2C4  40404040  40400010  40400001  C2C3C8C1  C9D54040  00000000
40000000  40404040  40404040  40404040  40404040  40404040  40404040
40404040  40404040  40404040  40404040  C2C3C8C1  F0F0F0F1*
02E3E7E3  40000000  40400028  40400001  47F0F00C  07C2C3C8  C1C9D540
90ECD00C  184D98CD  F0205040  D00450D0  400807FC  40404040  40404040
40404040  40404040  40404040  40404040  C2C3C8C1  F0F0F0F2*
02E3E7E3  40000098  40400038  40400001  00000000  00000000  4E000000
00000000  4F080000  00000000  4E000000  80000000  00000001  00000002
00000003  00000004  00000005  00000006  C2C3C8C1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C2C3C8C1  F0F0F0F4*
02E3E7E3  400000D0  40400010  40400001  0000000D  0000000E  00000000
00000000  40404040  40404040  40404040  40404040  40404040  40404040
40404040  40404040  40404040  40404040  C2C3C8C1  F0F0F0F5*
02C5E2C4  40404040  40400010  40400003  C2C3C8C1  D5F14040  02000000
40000000  40404040  40404040  40404040  40404040  40404040  40404040
40404040  40404040  40404040  40404040  C2C3C8C1  F0F0F0F6*
02E3E7E3  40000118  40400008  40400001  00000000  00000000  40404040
40404040  40404040  40404040  40404040  40404040  40404040  40404040
40404040  40404040  40404040  40404040  C2C3C8C1  F0F0F0F7*
02E3E7E3  40000124  40400008  40400001  00000000  00000000  40404040
40404040  40404040  40404040  40404040  40404040  40404040  40404040
40404040  40404040  40404040  40404040  C2C3C8C1  F0F0F0F8*
02E3E7E3  400001BC  40400038  40400001  58B0D184  58A0D188  5890D18C
5880D190  5800D090  5000D0B8  5800D178  5000D108  5800D17C  5000D10C
50B0D118  50A0D130  5090D138  50B0D148  C2C3C8C1  F0F0F0F9*
02E3E7E3  400001F4  40400038  40400001  50A0D150  5090D158  58B0D100
58A0D0F0  5890D0F4  5850D0B8  5C40D178  18255A20  D09C5872  90005070
D0E41825  5A20D17C  58529000  5050D0C4  C2C3C8C1  F0F0F1F0**
02E3E7E3  4000022C  40400038  40400001  18251B27  5A20D090  5020D0C8
5920D090  4780D604  5920D094  4730D452  5C60D180  5070D120  18275A20
D1087842  B0007040  D1107040  D0E81827  C2C3C8C1  F0F0F1F1*
02E3E7E3  40000264  40400038  40400001  5A20D184  7822B000  7020D11C
7020D0EC  18275A20  D10C5020  D1242B00  7802B000  6A00D080  6000D070
5800D074  5000D0DC  5C40D180  5050D114  C2C3C8C1  F0F0F1F2*
02E3E7E3  4000029C  40400038  40400001  18255A20  D1085020  D1287B42
B0003044  18255A20  D1845020  D12C7B22  B0003022  7020D0D0  7940A004
47A0D2A8  7920A004  4750D2E4  5820D114  C2C3C8C1  F0F0F1F3*
02E3E7E3  400002D4  40400038  40400001  5A20D188  7840D110  7B42B000
30445820  D1145A20  D18C7820  D11C7B22  B0003022  7020D0D0  7940A004
47A0D2E0  7920A004  4750D2E4  47F0D348  C2C3C8C1  F0F0F1F4*
02E3E7E3  4000030C  40400038  40400001  58F0D0FC  4110D04C  05EF4120
00015720  D0BC1BFF  862FD348  5800D0D8  5700D08C  5000D07C  6820D078
6B20D088  5820D120  1A287022  B0005800  C2C3C8C1  F0F0F1F5*
02E3E7E3  40000344  40400038  40400001  D0D85700  D08C5000  D07C6820
D0786B20  D0885820  D1141A28  7022B000  5800D0D8  5A00D090  5000D0D8
47F0D604  5820D120  5A20D188  7842B000  C2C3C8C1  F0F0F1F6*
02E3E7E3  4000037C  40400038  40400001  7040D134  7040D0E8  5820D120
5A20D18C  7822B000  7020D13C  7020D0EC  58E0D124  2B00780E  B0006A00
D0806000  D0705800  D0745000  D0DC58E0  C2C3C8C1  F0F0F1F7*
02E3E7E3  400003B4  40400038  40400001  D1287B4E  B0003044  58E0D12C
7B2EB000  30227020  D0D07940  A00447A0  D3B27920  A0044750  D3EE5820
D1145A20  D1307840  D1347B42  B0003044  C2C3C8C1  F0F0F1F8*
02E3E7E3  400003EC  40400038  40400001  5820D114  5A20D138  7820D13C
7B22B000  30227020  D0D07940  A00447A0  D3EA7920  A0044750  D3EE47F0
```

```
D60458F0  D0FC4110  D04C05EF  41200001  C2C3C8C1  F0F0F1F9*
02E3E7E3  40000424  40400038  40400001  5720D0BC  1BFF862F  D6045800

MEMBER NAME  BCHAIN
D0D85700  D08C5000  D07C6820  D0786B20  D0885820  D1201A28  7022B000
5800D0D8  5700D08C  5000D07C  6820D078  C2C3C8C1  F0F0F2F0**
02E3E7E3  4000045C  40400038  40400001  6B20D088  5820D114  1A287022
B0005800  D0D85A00  D0905000  D0D847F0  D6045830  D0E45C20  D1805030
D1541843  5A40D108  7844B000  7040D140  C2C3C8C1  F0F0F2F1*
02E3E7E3  40000494  40400038  40400001  7040D0E8  18435A40  D1847824
B0007020  D14C7020  D0EC5A30  D10C2B00  7803B000  6A00D080  6000D070
5820D074  5020D0DC  5020D15C  5850D0C4  C2C3C8C1  F0F0F2F2*
02E3E7E3  400004CC  40400038  40400001  5C40D180  5050D144  18255A20
D1087862  B0007060  D1603B46  30441825  5A20D184  7862B000  7060D164
3B263022  7020D0D0  7940A004  47A0D4E4  C2C3C8C1  F0F0F2F3*
02E3E7E3  40000504  40400038  40400001  7920A004  4750D5A4  5820D144
5A20D188  7842B000  7040D16C  33447A40  D1403044  5820D144  5A20D18C
7822B000  7020D174  33227A20  D14C3022  C2C3C8C1  F0F0F2F4*
02E3E7E3  4000053C  40400038  40400001  7020D0D0  7940A004  47A0D528
7920A004  4750D5A4  5820D154  5A20D150  7842B000  7040D168  7040D0E8
5820D154  5A20D158  7822B000  7020D170  C2C3C8C1  F0F0F2F5*
02E3E7E3  40000574  40400038  40400001  7020D0EC  5800D15C  5000D0DC
7B40D160  30447B20  D1643022  7020D0D0  7940A004  47A0D578  7920A004
4750D5A4  7840D168  7B40D16C  30447820  C2C3C8C1  F0F0F2F6*
02E3E7E3  400005AC  40400038  40400001  D1707B20  D1743022  7020D0D0
7940A004  47A0D5A0  7920A004  4750D5A4  47F0D604  58F0D0FC  4110D04C
05EF4120  00015720  D0BC1BFF  862FD604  C2C3C8C1  F0F0F2F7*
02E3E7E3  400005E4  40400038  40400001  5800D0D8  5700D08C  5000D07C
6820D078  6B20D088  5820D154  1A287022  B0005800  D0D85700  D08C5000
D07C6820  D0786B20  D0885820  D1441A28  C2C3C8C1  F0F0F2F8*
02E3E7E3  4000061C  40400038  40400001  7022B000  5800D0D8  5A00D090
5000D0D8  5820D0B8  5A20D090  5020D0B8  5920D0E0  47C0D1E0  58B0D184
58A0D188  5890D18C  1BFF58E0  D00007FE  C2C3C8C1  F0F0F2F9*
02E3E7E3  40000654  40400038  40400001  58A0D004  58E0A00C  58B0A018
5810B004  5820D0C0  50201000  5830B00C  5840D0E0  50403000  5850B010
5860D0D8  50605000  18DA92FF  A00C982C  C2C3C8C1  F0F0F3F0**
02E3E7E3  4000068C  40400038  40400001  A01C07FE  987A1004  58207000
5020D0C0  58209000  5020D0E0  5820A000  5020D0D8  58201000  41302000
41500004  1B255C40  D0AC1B25  5020D100  C2C3C8C1  F0F0F3F1*
02E3E7E3  400006C4  4040002C  40400001  5030D104  5030D050  58201008
41302000  41500004  1B255C40  D0981B25  5020D0F4  5030D0F8  5030D058
47F0D194  40404040  40404040  40404040  C2C3C8C1  F0F0F3F2*
02E3E7E3  40000020  4040000C  40400001  00000690  00000028  00000654
40404040  40404040  40404040  40404040  40404040  40404040  40404040
40404040  40404040  40404040  40404040  C2C3C8C1  F0F0F3F3*
02E3E7E3  40000074  40400004  40400001  00000110  40404040  40404040
40404040  40404040  40404040  40404040  40404040  40404040  40404040
40404040  40404040  40404040  40404040  C2C3C8C1  F0F0F3F4*
02E3E7E3  4000007C  40400004  40400001  000000E8  40404040  40404040
40404040  40404040  40404040  40404040  40404040  40404040  40404040
40404040  40404040  40404040  40404040  C2C3C8C1  F0F0F3F5*
02E3E7E3  40000084  40400004  40400001  00000108  40404040  40404040
40404040  40404040  40404040  40404040  40404040  40404040  40404040
40404040  40404040  40404040  40404040  C2C3C8C1  F0F0F3F6*
02D9D3C4  40404040  40400038  40404040  00020001  0C000118  00030001
1C000124  00010001  0C000020  00010001  0C000024  00010001  0C000028
00010001  0C000074  00010001  0C00007C  C2C3C8C1  F0F0F3F7*
02E3E7E3  40000088  4040000C  40400001  000000E0  00000104  800000E4
40404040  40404040  40404040  40404040  40404040  40404040  40404040
40404040  40404040  40404040  40404040  C2C3C8C1  F0F0F3F8*
02E3E7E3  40000130  40400038  40400001  00000000  00000000  00000000
```

```
00000000  00000000  00000000  00000000  00000000  00000000  00000000

MEMBER NAME  BCHAIN
00000000  00000000  00000000  00000000  C2C3C8C1  F0F0F3F9*
02E3E7E3  40000168  40400038  40400001  00000000  00C00004  00000000
01B40005  00000000  00B00006  00000000  00880006  01A80006  00000000
00A80007  00940007  00980007  00000000  C2C3C8C1  F0F0F4F0**
02E3E7E3  400001A0  4040001C  40400001  0000000C  00000008  00000038
00000010  00000014  00000018  00000034  40404040  40404040  40404040
40404040  40404040  40404040  40404040  C2C3C8C1  F0F0F4F1*
02D9D3C4  40404040  40400020  40404040  00010001  0C000084  00010001
0C000088  00010001  0C00008C  00010001  0C000090  40404040  40404040
40404040  40404040  40404040  40404040  C2C3C8C1  F0F0F4F2*
02C5D5C4  40404040  40404040  40404040  40404040  40404040  40404040
000006F0  F1F5F7F3  F460C6D6  F34040F0  F2F0F2F8  F7F0F9F8  40F0F84B
F1F14BF5  F3404040  C2C3C8C1  C9D54040  C2C3C8C1  F0F0F4F3**

MEMBER NAME  GENOUT
02C5E2C4  40404040  40400010  40400001  C7C5D5D6  E4E34040  00000000
40000000  40404040  40404040  40404040  40404040  40404040  40404040
40404040  40404040  40404040  40404040  C7C5D5D6  F0F0F0F1*
02E3E7E3  40000000  40400028  40400001  47F0F00C  07C7C5D5  D6E4E340
90ECD00C  184D98CD  F0205040  D00450D0  400807FC  40404040  40404040
40404040  40404040  40404040  40404040  C7C5D5D6  F0F0F0F2*
02E3E7E3  400000B8  40400038  40400001  00000000  00000000  4F080000
00000000  00000000  00000000  00000001  00000002  00000003  00000004
00000005  00000006  00000008  0000000A  C7C5D5D6  F0F0F0F3*
02E3E7E3  400000F0  40400028  40400001  0000000C  0000000D  00000010
00000014  00000015  00000016  00000058  00000BB8  00000000  00000000
40404040  40404040  40404040  40404040  C7C5D5D6  F0F0F0F4*
02C5E2C4  40404040  40400010  40400002  C7D9E4D7  40404040  05000000
4000000C  40404040  40404040  40404040  40404040  40404040  40404040
40404040  40404040  40404040  40404040  C7C5D5D6  F0F0F0F5*
02C5E2C4  40404040  40400010  40400003  D9D4D6C4  C5D34040  05000000
40000018  40404040  40404040  40404040  40404040  40404040  40404040
40404040  40404040  40404040  40404040  C7C5D5D6  F0F0F0F6*
02C5E2C4  40404040  40400010  40400004  C6D4D6C4  C5D34040  05000000
400001F8  40404040  40404040  40404040  40404040  40404040  40404040
40404040  40404040  40404040  40404040  C7C5D5D6  F0F0F0F7*
02C5E2C4  40404040  40400010  40400005  D7D4C1E3  D3404040  05000000
40001134  40404040  40404040  40404040  40404040  40404040  40404040
40404040  40404040  40404040  40404040  C7C5D5D6  F0F0F0F8*
02C5E2C4  40404040  40400010  40400006  C4C5D9D6  E3404040  02000000
40000000  40404040  40404040  40404040  40404040  40404040  40404040
40404040  40404040  40404040  40404040  C7C5D5D6  F0F0F0F9*
02E3E7E3  40004FE8  40400020  40400001  00003058  00000000  FFFFFFFF
FFFFFFEB  FFFFFFA0  00001130  00000000  00000000  40404040  40404040
40404040  40404040  40404040  40404040  C7C5D5D6  F0F0F1F0**
02E3E7E3  4000500C  40400004  40400001  00000000  40404040  40404040
40404040  40404040  40404040  40404040  40404040  40404040  40404040
40404040  40404040  40404040  40404040  C7C5D5D6  F0F0F1F1*
02C5E2C4  40404040  40400010  40400007  D4E5C3C8  D9404040  02000000
40000000  40404040  40404040  40404040  40404040  40404040  40404040
40404040  40404040  40404040  40404040  C7C5D5D6  F0F0F1F2*
02E3E7E3  40005014  40400004  40400001  00000000  40404040  40404040
40404040  40404040  40404040  40404040  40404040  40404040  40404040
40404040  40404040  40404040  40404040  C7C5D5D6  F0F0F1F3*
02E3E7E3  4000501C  40400004  40400001  00000000  40404040  40404040
40404040  40404040  40404040  40404040  40404040  40404040  40404040
40404040  40404040  40404040  40404040  C7C5D5D6  F0F0F1F4*
02D9D3C4  40404040  40400038  40404040  00010001  0C004FE8  00020001
```

| | | | | | | |
|---|---|---|---|---|---|---|
| 0C004FEC | 00030001 | 0C004FF0 | 00040001 | 0C004FF4 | 00050001 | 0C004FF8 |
| 00050001 | 0C004FFC | 00060001 | 1C005000 | C7C5D5D6 | F0F0F1F5* | |
| 02C5E2C4 | 40404040 | 40400010 | 40400008 | C7E3C6D3 | C9D74040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F6* | |
| 02E3E7E3 | 40005020 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F1F7* | |
| 02C5E2C4 | 40404040 | 40400010 | 40400009 | C8C7C4C1 | E3C54040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F8* | |
| 02C5E2C4 | 40404040 | 40400010 | 4040000A | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F9* | |
| 02E3E7E3 | 40005028 | 4040000C | 40400001 | 00000000 | 00000000 | 00000000 |

MEMBER NAME GENOUT

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C7C5D5D6 | F0F0F2F0** | |
| 02E3E7E3 | 40000178 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F2F1* | |
| 02E3E7E3 | 400050B8 | 40400038 | 40400001 | 58A0C000 | 58B0C00C | 5890D0A8 |
| 5880D0C0 | 58F0C044 | 4110D04C | 05EF5090 | D1405090 | D10C58F0 | C0481800 |
| 45E0F018 | 0000000C | 45E0F01C | 0450B1A5 | C7C5D5D6 | F0F0F2F2* | |
| 02E3E7E3 | 400050F0 | 40400038 | 40400001 | 45E0F134 | 00020000 | 0120B015 |
| 01000014 | 00000001 | 020000D0 | 00000190 | 000000D0 | 00000014 | 45E0F024 |
| 5080C0C4 | 5800D0E0 | 5000C0C8 | 5080C074 | C7C5D5D6 | F0F0F2F3* | |
| 02E3E7E3 | 40005128 | 40400038 | 40400001 | 5880D0D0 | 58A0D0E0 | 58B0C038 |
| 5800D140 | 5900D144 | 47C0C15C | 47F0C66C | 185A5C40 | D1401825 | 5A20D0C0 |
| 7802B000 | 7000D108 | 58A0C0C0 | 58B0D0B4 | C7C5D5D6 | F0F0F2F4* | |
| 02E3E7E3 | 40005160 | 40400038 | 40400001 | 410BD150 | 5000D054 | 4100D150 |
| 5000D058 | 9280D058 | 58F0C034 | 4110D050 | 05EF5AB0 | D0B419BA | 47C0C178 |
| 58B0C038 | 58A0D0E0 | 5800D10C | 5900D144 | C7C5D5D6 | F0F0F2F5* | |
| 02E3E7E3 | 40005198 | 40400038 | 40400001 | 4730C204 | 5850D10C | 5C40C0C8 |
| 5050C0CC | 18255A20 | C0C47800 | D1087902 | B0004770 | C2041825 | 1A282B00 |
| 7802B000 | 6A00D098 | 6000D090 | 5830D094 | C7C5D5D6 | F0F0F2F6* | |
| 02E3E7E3 | 400051D0 | 40400038 | 40400001 | 89300002 | 4823D150 | 1A294023 |
| D1505800 | D10C1A09 | 5000D10C | 47F0C1A0 | 5850D10C | 1B595050 | D10C183A |
| 5C20D140 | 5030C070 | 1C4A5050 | C0985030 | C7C5D5D6 | F0F0F2F7* | |
| 02E3E7E3 | 40005208 | 40400038 | 40400001 | C0941803 | 5A00C07C | 5000C09C |
| 18035A00 | D0C05000 | C0781803 | 5A00D0C8 | 5000C0A0 | 18031A08 | 5000C0A4 |
| 18035A00 | C0805000 | C0A81803 | 5A00C084 | C7C5D5D6 | F0F0F2F8* | |
| 02E3E7E3 | 40005240 | 40400038 | 40400001 | 5000C0AC | 18035A00 | C0885000 |
| C0B01803 | 5A00D0D4 | 5000C0B4 | 18035A00 | C08C5000 | C0B85A30 | C0905030 |
| C0BC5890 | C0005880 | C0044100 | D14C5000 | C7C5D5D6 | F0F0F2F9* | |
| 02E3E7E3 | 40005278 | 40400038 | 40400001 | D05458E0 | C09C410E | B0005000 |
| D0589280 | D05858F0 | C0344110 | D05005EF | 4830D14C | 5030D148 | 4820D14E |
| 5020D11C | 1A235B20 | D0A85020 | D12858E0 | C7C5D5D6 | F0F0F3F0** | |
| 02E3E7E3 | 400052B0 | 40400038 | 40400001 | C0782B00 | 780EB000 | 6A00D098 |
| 6000D090 | 5820D094 | 10225020 | D12458E0 | C0A02B00 | 780EB000 | 6A00D098 |
| 6000D090 | 5800D094 | 5000D114 | 58E0C0A4 | C7C5D5D6 | F0F0F3F1* | |
| 02E3E7E3 | 400052E8 | 40400038 | 40400001 | 2B00780E | B0006A00 | D0986000 |
| D0905820 | D0945020 | D12C58E0 | C0A82B00 | 780EB000 | 6A00D098 | 6000D090 |
| 5850D094 | 1C4A58F0 | C0106825 | F0502B00 | C7C5D5D6 | F0F0F3F2* | |
| 02E3E7E3 | 40005320 | 40400038 | 40400001 | 38026A00 | D0986000 | D0905800 |
| D0945000 | D1305020 | D1188920 | 00025020 | C06C4802 | D1505000 | D1344802 |
| D1525900 | D0A84770 | C3725800 | D0A05000 | C7C5D5D6 | F0F0F3F3* | |
| 02E3E7E3 | 40005358 | 40400038 | 40400001 | D13458E0 | C06C5800 | D0A8400E |
| D15258E0 | C0AC410E | B0005000 | D05C58F0 | C0184110 | D05C05EF | 41009048 |
| 5000D06C | 58E0C0B0 | 410EB000 | 5000D070 | C7C5D5D6 | F0F0F3F4* | |

```
02E3E7E3  40005390  40400038  40400001  9280D070  58F0C034  4110D068
05EF58E0  C078780E  B0003200  4730C3CE  78209048  33027000  904858F0
C0481800  45E0F018  0000000C  45E0F01C  C7C5D5D6  F0F0F3F5*
02E3E7E3  400053C8  40400034  40400001  0450D124  45E0F01C  0450D114
45E0F01C  0450D12C  45E0F01C  0450D130  45E0F01C  0450D110  45E0F134
00010000  04709004  020000D0  40404040  C7C5D5D6  F0F0F3F6*
02D9D3C4  40404040  40400038  40404040  00070001  1C00501C  00080001
1C005028  00090001  1C00502C  000A0001  1C005030  00010001  08005105
00040001  08005109  00010001  0800510D  C7C5D5D6  F0F0F3F7*
02E3E7E3  400053FC  40400038  40400001  00000138  000000D0  00000004
5810C0B4  45E0F01C  0471B000  5810C0B8  45E0F01C  0471B000  5810C0BC
45E0F01C  0471B000  45E0F134  00010000  C7C5D5D6  F0F0F3F8*
02E3E7E3  40005434  40400038  40400001  04709040  01000002  00000004
45E0F134  00010000  04709048  01000002  00000004  45E0F01C  04708000

MEMBER NAME  GENOUT
45E0F134  00010000  04708004  01000002  C7C5D5D6  F0F0F3F9*
02E3E7E3  4000546C  40400038  40400001  00000004  45E0F134  00010000
04509028  01000002  00000004  5820C008  45E0F01C  04702015  45E0F01C
0450D11C  45E0F01C  0450D134  45E0F024  C7C5D5D6  F0F0F4F0**
02E3E7E3  400054A4  40400038  40400001  5800C094  5A00D0C0  5000C04C
5850D148  5C40D0C0  5810D128  5C00D0D0  5010C058  5870D148  5C60D0D0
18355A30  D0B45A50  D0C05050  C0605850  C7C5D5D6  F0F0F4F1*
02E3E7E3  400054DC  40400038  40400001  C0585A50  D0B45050  C0681847
5A40D0B4  188418A3  5870C01C  5860C02C  5820C024  585A2000  58E0C060
580E2000  5000D120  5C40D0C0  18355A30  C7C5D5D6  F0F0F4F2*
02E3E7E3  40005514  40400038  40400001  D0B44103  70005000  D0744108
60005000  D07C58E0  C04C410E  B0005000  D08058F0  C0404110  D07405EF
58F0C048  45E0F018  0000000C  45E0F134  C7C5D5D6  F0F0F4F3*
02E3E7E3  4000554C  40400038  40400001  00010000  04709030  01000004
00000004  45E0F01C  0450D120  45E0F024  58F0C048  45E0F018  0000000C
45E0F134  00020000  04709050  01000002  C7C5D5D6  F0F0F4F4*
02E3E7E3  40005584  40400038  40400001  00000004  020000D0  00000148
000000D0  00000008  45E0F024  5800C060  5A00D0C0  5000C060  5AA0D0C0
5A80D0D0  5980C068  47C0C510  5880C004  C7C5D5D6  F0F0F4F5*
02E3E7E3  400055BC  40400038  40400001  58A0D0E0  5800C0BC  1A0A5000
C0BC5800  C0B81A0A  5000C0B8  5800C0B4  1A0A5000  C0B45800  C0B01A0A
5000C0B0  5800C0AC  1A0A5000  C0AC5800  C7C5D5D6  F0F0F4F6*
02E3E7E3  400055F4  40400038  40400001  C0A81A0A  5000C0A8  5800C0A4
1A0A5000  C0A45800  C0A01A0A  5000C0A0  5800C078  1A0A5000  C0785800
C09C1A0A  5000C09C  5820C094  1A2A5020  C7C5D5D6  F0F0F4F7*
02E3E7E3  4000562C  40400038  40400001  C0945920  C09847C0  C28A58A0
D0E05890  D0A85880  D0D05820  D10C1A29  5020D140  5020D10C  47F0C14C
58A0C000  58B0C00C  5890D0A8  5880D0C0  C7C5D5D6  F0F0F4F8*
02E3E7E3  40005664  40400038  40400001  1BFF58E0  D00007FE  58D0D004
58E0D00C  92FFD00C  982CD01C  07FE58C0  D048987B  10045820  70005020
D1005820  A0005020  D1385870  10185820  C7C5D5D6  F0F0F4F9*
02E3E7E3  4000569C  40400038  40400001  70005020  D1445820  10004130
20004150  00041B25  5C40D0AC  1B255020  C01C5030  C0205820  10084130
20004150  00041B25  5C40D0AC  1B255020  C7C5D5D6  F0F0F5F0**
02E3E7E3  400056D4  40400038  40400001  C0245030  C0285820  100C4130
20004150  00041B25  5C40D0B4  1B255020  C02C5030  C0305820  10144130
20004150  00041B25  5C40D0DC  1B255020  C7C5D5D6  F0F0F5F1*
02E3E7E3  4000570C  4040000A  40400001  C0385030  C03C47F0  C0D04040
40404040  40404040  40404040  40404040  40404040  40404040  40404040
40404040  40404040  40404040  40404040  C7C5D5D6  F0F0F5F2*
02E3E7E3  40000020  40400008  40400001  0000567E  00000028  40404040
40404040  40404040  40404040  40404040  40404040  40404040  40404040
40404040  40404040  40404040  40404040  C7C5D5D6  F0F0F5F3*
02D9D3C4  40404040  40400038  40404040  00010001  080053F9  00010001
080053FD  00010001  08005401  00010001  08005589  00010001  0800558D
```

00010001 08005591 00010001 0C000020 C7C5D5D6 F0F0F5F4*
02E3E7E3 40000028 40400004 40400001 0000566C 40404040 40404040
40404040 40404040 40404040 40404040 40404040 40404040 40404040
40404040 40404040 40404040 40404040 C7C5D5D6 F0F0F5F5*
02E3E7E3 40000070 4040000C 40400001 00004FE8 80003080 000000DC
40404040 40404040 40404040 40404040 40404040 40404040 40404040
40404040 40404040 40404040 40404040 C7C5D5D6 F0F0F5F6*
02E3E7E3 40000080 40400004 40400001 80000000 40404040 40404040
40404040 40404040 40404040 40404040 40404040 40404040 40404040
40404040 40404040 40404040 40404040 C7C5D5D6 F0F0F5F7*
02E3E7E3 40000088 4040000C 40400001 0000305C 80000138 000000E8
40404040 40404040 40404040 40404040 40404040 40404040 40404040
40404040 40404040 40404040 40404040 C7C5D5D6 F0F0F5F8*

MEMBER NAME GENOUT
02D9D3C4 40404040 40400038 40404040 00010001 0C000024 00010001
0C000028 00010001 0C000070 00010001 0C000074 00010001 0C000078
00010001 0C000088 00010001 0C00008C C7C5D5D6 F0F0F5F9*
02E3E7E3 40000098 40400004 40400001 80000000 40404040 40404040
40404040 40404040 40404040 40404040 40404040 40404040 40404040
40404040 40404040 40404040 40404040 C7C5D5D6 F0F0F6F0**
02E3E7E3 400000A0 40400004 40400001 00000148 40404040 40404040
40404040 40404040 40404040 40404040 40404040 40404040 40404040
40404040 40404040 40404040 40404040 C7C5D5D6 F0F0F6F1*
02E3E7E3 400000AC 40400008 40400001 000030A8 80003088 40404040
40404040 40404040 40404040 40404040 40404040 40404040 40404040
40404040 40404040 40404040 40404040 C7C5D5D6 F0F0F6F2*
02E3E7E3 40005034 40400038 40400001 00000000 00000000 00000000
00000000 00000000 00000000 00000000 00000000 00000000 00000000
00000000 00000000 00000054 00000018 C7C5D5D6 F0F0F6F3*
02E3E7E3 4000506C 40400038 40400001 00000040 00000028 00000030
00000034 00000000 00000000 00000000 00000000 00000000 00000000
00000000 00000000 00000000 00000000 C7C5D5D6 F0F0F6F4*
02E3E7E3 400050A4 40400014 40400001 00000000 00002EE0 00000000
00000000 00000000 40404040 40404040 40404040 40404040 40404040
40404040 40404040 40404040 40404040 C7C5D5D6 F0F0F6F5*
02D9D3C4 40404040 40400020 40404040 00010001 0C000090 00010001
0C0000A0 00010001 0C0000AC 00010001 0C0000B0 40404040 40404040
40404040 40404040 40404040 40404040 C7C5D5D6 F0F0F6F6*
02C5D5C4 40404040 40404040 40404040 40404040 40404040 40404040
00005716 F1F5F7F3 F460C6D6 F34040F0 F2F0F2F8 F7F0F9F8 40F0F84B
F1F14BF5 F8404040 C7C5D5D6 E4E34040 C7C5D5D6 F0F0F6F7**

MEMBER NAME BLDDRV
02C5E2C4 40404040 40400010 40400001 C2D3C4C4 D9E54040 00000000
40000000 40404040 40404040 40404040 40404040 40404040 40404040
40404040 40404040 40404040 40404040 C2D3C4C4 F0F0F0F1*
02E3E7E3 40000000 40400028 40400001 47F0F00C 07C2D3C4 C4D9E540
90ECD00C 184D98CD F0205040 D00450D0 400807FC 40404040 40404040
40404040 40404040 40404040 40404040 C2D3C4C4 F0F0F0F2*
02E3E7E3 40000100 4040002C 40400001 00000000 00000001 00000004
0000000B 0000000C 0000000E 00000014 0000002C 00000038 00000000
00000000 40404040 40404040 40404040 C2D3C4C4 F0F0F0F3*
02C5E2C4 40404040 40400010 40400002 C5D3D4E3 C2D34040 05000000
400D7D28 40404040 40404040 40404040 40404040 40404040 40404040
40404040 40404040 40404040 40404040 C2D3C4C4 F0F0F0F4*
02C5E2C4 40404040 40400010 40400003 C9D7D5E3 D9404040 05000000
4000EA68 40404040 40404040 40404040 40404040 40404040 40404040
40404040 40404040 40404040 40404040 C2D3C4C4 F0F0F0F5*
02C5E2C4 40404040 40400010 40400004 C2D9C5C1 D2404040 02000000
40000000 40404040 40404040 40404040 40404040 40404040 40404040

```
40404040  40404040  40404040  40404040  C2D3C4C4  F0F0F0F6*
02C5E2C4  40404040  40400010  40400005  C2E2D6D9  E3404040  02000000
40000000  40404040  40404040  40404040  40404040  40404040  40404040
40404040  40404040  40404040  40404040  C2D3C4C4  F0F0F0F7*
02C5E2C4  40404040  40400010  40400006  D4E5C3C8  D9404040  02000000
40000000  40404040  40404040  40404040  40404040  40404040  40404040
40404040  40404040  40404040  40404040  C2D3C4C4  F0F0F0F8*
02E3E7E3  40003528  40400020  40400001  00002D38  FFFFFFC8  000CD118
FFFFFFF4  0000EA64  00000000  00000000  00000000  40404040  40404040
40404040  40404040  40404040  40404040  C2D3C4C4  F0F0F0F9*
02D9D3C4  40404040  40400038  40404040  00010001  0C003528  00020001
0C00352C  00020001  0C003530  00030001  0C003534  00030001  0C003538
00040001  1C00353C  00050001  1C003540  C2D3C4C4  F0F0F1F0**
02C5E2C4  40404040  40400010  40400007  D9C1D5C7  C5404040  02000000
40000000  40404040  40404040  40404040  40404040  40404040  40404040
40404040  40404040  40404040  40404040  C2D3C4C4  F0F0F1F1*
02C5E2C4  40404040  40400010  40400008  C2E4C9D3  C4F14040  02000000
40000000  40404040  40404040  40404040  40404040  40404040  40404040
40404040  40404040  40404040  40404040  C2D3C4C4  F0F0F1F2*
02C5E2C4  40404040  40400010  40400009  C2E4C9D3  C4F24040  02000000
40000000  40404040  40404040  40404040  40404040  40404040  40404040
40404040  40404040  40404040  40404040  C2D3C4C4  F0F0F1F3*
02E3E7E3  40003548  40400010  40400001  00000000  00000000  00000000
00000000  40404040  40404040  40404040  40404040  40404040  40404040
40404040  40404040  40404040  40404040  C2D3C4C4  F0F0F1F4*
02E3E7E3  4000355C  40400004  40400001  00000000  40404040  40404040
40404040  40404040  40404040  40404040  40404040  40404040  40404040
40404040  40404040  40404040  40404040  C2D3C4C4  F0F0F1F5*
02E3E7E3  40000150  40400038  40400001  00000031  00000004  C6D34040
C1404040  00000035  00000004  C6D34040  C1404040  00000029  00000004
C6D34040  C1404040  0000002D  00000004  C2D3C4C4  F0F0F1F6*
02E3E7E3  40000188  40400008  40400001  C6D34040  C1404040  40404040
40404040  40404040  40404040  40404040  40404040  40404040  40404040
40404040  40404040  40404040  40404040  C2D3C4C4  F0F0F1F7*
02E3E7E3  40003570  40400038  40400001  5860C034  5870C00C  5880C008
5890C004  58A0C02C  58B0C000  5800D0DC  5000D10C  5000D118  5000D108
5800D0D8  5000D120  5850D114  5A50D124  C2D3C4C4  F0F0F1F8*
02E3E7E3  400035A8  40400038  40400001  5B50D0DC  5830D124  5C40D0F8
5C20D0F8  18655870  D0DC5880  D1205890  D0D818B3  58A0C004  1A875A90
D0F84109  D1305000  D050410B  A0045000  C2D3C4C4  F0F0F1F9*
02E3E7E3  400035E0  40400038  40400001  D0549280  D05458F0  C01C4110

MEMBER NAME  BLDDRV
D04C05EF  5AB0D0F8  19B647C0  C0A45080  D1205860  C0345870  C00C5880
C0085890  C00458A0  C02C58B0  C00058F0  C2D3C4C4  F0F0F2F0**
02E3E7E3  40003618  40400038  40400001  C0184110  D05805EF  58F0C024
4110D06C  05EF58F0  C0144110  D0A405EF  58F0C020  4110D0C8  05EF58F0
C0284110  D0C805EF  1BFF58E0  D00007FE  C2D3C4C4  F0F0F2F1*
02E3E7E3  40003650  40400038  40400001  58A0D004  58E0A00C  58B0A018
5810B004  5820D10C  50201000  5830B00C  5840D118  50403000  18DA92FF
A00C982C  A01C07FE  58C0D048  987B1004  C2D3C4C4  F0F0F2F2*
02E3E7E3  40003688  40400038  40400001  58207000  5020D10C  58209000
5020D118  5820A000  5020D124  5820B000  5020D114  58201000  41302000
41500004  1B255C40  D0EC1B25  5020C02C  C2D3C4C4  F0F0F2F3*
02E3E7E3  400036C0  40400038  40400001  5030C030  5030D07C  5030D0A4
5030D0C8  58201008  41302000  41500004  1B255C40  D0E41B25  5020C034
5030C038  5030D084  5030D0AC  47F0C048  C2D3C4C4  F0F0F2F4*
02E3E7E3  40000020  4040000C  40400001  00003680  00000028  00003650
40404040  40404040  40404040  40404040  40404040  40404040  40404040
40404040  40404040  40404040  40404040  C2D3C4C4  F0F0F2F5*
02E3E7E3  40000070  40400004  40400001  00003528  40404040  40404040
```

40404040 40404040 40404040 40404040 40404040 40404040 40404040
40404040 40404040 40404040 40404040 C2D3C4C4 F0F0F2F6*
02D9D3C4 40404040 40400038 40404040 00060001 1C003544 00070001
1C003548 00080001 1C00354C 00090001 1C003550 00010001 0C000020
00010001 0C000024 00010001 0C000028 C2D3C4C4 F0F0F2F7*
02E3E7E3 40000074 40400004 40400001 00000120 40404040 40404040
40404040 40404040 40404040 40404040 40404040 40404040 40404040
40404040 40404040 40404040 40404040 C2D3C4C4 F0F0F2F8*
02E3E7E3 4000007C 4040001C 40400001 80000000 00000150 00000108
00000190 00000120 80000148 00000004 40404040 40404040 40404040
40404040 40404040 40404040 40404040 C2D3C4C4 F0F0F2F9*
02D9D3C4 40404040 40400038 40404040 00010001 0C000070 00010001
0C000074 00010001 0C000080 00010001 0C000084 00010001 0C000088
00010001 0C00008C 00010001 0C000090 C2D3C4C4 F0F0F3F0**
02E3E7E3 40000098 4040000C 40400001 00000000 000CD148 000CD144
40404040 40404040 40404040 40404040 40404040 40404040 40404040
40404040 40404040 40404040 40404040 C2D3C4C4 F0F0F3F1*
02E3E7E3 400000A8 40400004 40400001 00000134 40404040 40404040
40404040 40404040 40404040 40404040 40404040 40404040 40404040
40404040 40404040 40404040 40404040 C2D3C4C4 F0F0F3F2*
02E3E7E3 400000B0 4040000C 40400001 00000140 00000004 00000000
40404040 40404040 40404040 40404040 40404040 40404040 40404040
40404040 40404040 40404040 40404040 C2D3C4C4 F0F0F3F3*
02D9D3C4 40404040 40400038 40404040 00020001 0C000094 00020001
0C000098 00020001 0C00009C 00020001 0C0000A0 00010001 0C0000A8
00010001 0C0000B0 00030001 0C0000B4 C2D3C4C4 F0F0F3F4*
02E3E7E3 400000BC 40400010 40400001 00002D50 00000130 00000190
80000148 40404040 40404040 40404040 40404040 40404040 40404040
40404040 40404040 40404040 40404040 C2D3C4C4 F0F0F3F5*
02E3E7E3 400000D0 40400004 40400001 00000134 40404040 40404040
40404040 40404040 40404040 40404040 40404040 40404040 40404040
40404040 40404040 40404040 40404040 C2D3C4C4 F0F0F3F6*
02E3E7E3 400000D8 40400008 40400001 00000140 00002D50 40404040
40404040 40404040 40404040 40404040 40404040 40404040 40404040
40404040 40404040 40404040 40404040 C2D3C4C4 F0F0F3F7*
02D9D3C4 40404040 40400038 40404040 00030001 0C0000B8 00010001
0C0000BC 00010001 0C0000C0 00010001 0C0000C4 00010001 0C0000C8
00010001 0C0000D0 00010001 0C0000D8 C2D3C4C4 F0F0F3F8*
02E3E7E3 400000E0 40400010 40400001 00000130 0000EA64 00000190
80000148 40404040 40404040 40404040 40404040 40404040 40404040

MEMBER NAME BLDDRV
40404040 40404040 40404040 40404040 C2D3C4C4 F0F0F3F9*
02E3E7E3 400000F4 4040000C 40400001 00000134 00002D50 80000130
40404040 40404040 40404040 40404040 40404040 40404040 40404040
40404040 40404040 40404040 40404040 C2D3C4C4 F0F0F4F0**
02D9D3C4 40404040 40400038 40404040 00010001 0C0000DC 00010001
0C0000E0 00030001 0C0000E4 00010001 0C0000E8 00010001 0C0000EC
00010001 0C0000F4 00010001 0C0000F8 C2D3C4C4 F0F0F4F1*
02E3E7E3 40003564 4040000C 40400001 00000000 00000000 00000000
40404040 40404040 40404040 40404040 40404040 40404040 40404040
40404040 40404040 40404040 40404040 C2D3C4C4 F0F0F4F2*
02D9D3C4 40404040 40400008 40404040 00010001 0C0000FC 40404040
40404040 40404040 40404040 40404040 40404040 40404040 40404040
40404040 40404040 40404040 40404040 C2D3C4C4 F0F0F4F3*
02C5D5C4 40404040 40404040 40404040 40404040 40404040 40404040
000036F8 F1F5F7F3 F460C6D6 F34040F0 F2F0F2F8 F7F0F9F8 40F0F84B
F1F24BF0 F3404040 C2D3C4C4 D9E54040 C2D3C4C4 F0F0F4F4**

MEMBER NAME BLDET
02C5E2C4 40404040 40400010 40400001 C2D3C4C5 E3404040 00000000

```
40000000 40404040 40404040 40404040 40404040 40404040 40404040
40404040 40404040 40404040 40404040 C2D3C4C5 F0F0F0F1*
02E3E7E3 40000000 40400038 40400001 47F0F00C 07C2D3C4 C5E34040
90ECD00C 184D98CD F0205040 D00450D0 400807FC 40404040 40404040
021A2C40 4040C5D9 D9D6D940 C9D540C5 C2D3C4C5 F0F0F0F2*
02E3E7E3 40000038 40400038 40400001 D3C5D4C5 D5E340E3 E8D7C540
C9D540E2 E4C2D9D6 E4E3C9D5 C540C2D3 C4C5E30A 0A052202 1A1740C5
D9D9D6D9 40C9D540 C3C1D3D3 40E3D640 C2D3C4C5 F0F0F0F3*
02E3E7E3 40000070 40400038 40400001 C3C1C4D3 D522021A 1840C5D9
D9D6D940 C9D540C3 C1D3D340 E3D640C3 C1C4C3C9 D922021A 1840C5D9
D9D6D940 C9D540C3 C1D3D340 E3D640C3 C2D3C4C5 F0F0F0F4*
02E3E7E3 400000A8 40400038 40400001 C1C4C1D9 C322021A 1FC5D9D9
D6D940C9 D540C2D3 C4C5E340 6040C3C1 D3D340E3 D640E2D7 D3D6C6C6
22021A1F C5D9D9D6 D940C9D5 40C2D3C4 C2D3C4C5 F0F0F0F5*
02E3E7E3 400000E0 40400038 40400001 C5E34060 40C3C1D3 D340E3D6
40C3C1C4 E2D7F422 021A1DC5 D9D9D6D9 40C9D540 C2D3C4C5 E3406040
C3C1D3D3 40E3D640 D5C1D4C5 22021A1F C2D3C4C5 F0F0F0F6*
02E3E7E3 40000118 40400020 40400001 C5D9D9D6 D940C9D5 40C2D3C4
C5E34060 40C3C1D3 D340E3D6 40C3C1C4 D5E2C822 40404040 40404040
40404040 40404040 40404040 40404040 C2D3C4C5 F0F0F0F7*
02E3E7E3 40000238 40400038 40400001 00000000 00000000 4F080000
00000000 00000000 00000001 00000002 00000003 00000004 00000005
00000006 00000007 00000008 00000009 C2D3C4C5 F0F0F0F8*
02C5E2C4 40404040 40400010 40400002 40404040 40404040 05000000
40000640 40404040 40404040 40404040 40404040 40404040 40404040
40404040 40404040 40404040 40404040 C2D3C4C5 F0F0F0F9*
02E3E7E3 40000270 40400030 40400001 0000000B 0000000E 00000014
3E418937 41100000 41200000 41300000 41400000 41500000 41600000
00000000 00000000 40404040 40404040 C2D3C4C5 F0F0F1F0**
02C5E2C4 40404040 40400010 40400003 E2D7D3D7 E3E24040 05000000
40030D44 40404040 40404040 40404040 40404040 40404040 40404040
40404040 40404040 40404040 40404040 C2D3C4C5 F0F0F1F1*
02C5E2C4 40404040 40400010 40400004 D5C1D4C5 40404040 02000000
40000000 40404040 40404040 40404040 40404040 40404040 40404040
40404040 40404040 40404040 40404040 C2D3C4C5 F0F0F1F2*
02C5E2C4 40404040 40400010 40400005 E2D8D9E3 40404040 02000000
40000000 40404040 40404040 40404040 40404040 40404040 40404040
40404040 40404040 40404040 40404040 C2D3C4C5 F0F0F1F3*
02C5E2C4 40404040 40400010 40400006 C3C1C4D3 D5404040 02000000
40000000 40404040 40404040 40404040 40404040 40404040 40404040
40404040 40404040 40404040 40404040 C2D3C4C5 F0F0F1F4*
02C5E2C4 40404040 40400010 40400007 D4E5C3C8 D9404040 02000000
40000000 40404040 40404040 40404040 40404040 40404040 40404040
40404040 40404040 40404040 40404040 C2D3C4C5 F0F0F1F5*
02C5E2C4 40404040 40400010 40400008 C3C1C4C1 D9C34040 02000000
40000000 40404040 40404040 40404040 40404040 40404040 40404040
40404040 40404040 40404040 40404040 C2D3C4C5 F0F0F1F6*
02C5E2C4 40404040 40400010 40400009 C3C1C4C2 D9D24040 02000000
40000000 40404040 40404040 40404040 40404040 40404040 40404040
40404040 40404040 40404040 40404040 C2D3C4C5 F0F0F1F7*
02E3E7E3 40000FC0 40400020 40400001 FFFFFFFC FFFFFFEC 00000000
00000000 00000000 00000000 00000000 00000000 40404040 40404040
40404040 40404040 40404040 40404040 C2D3C4C5 F0F0F1F8*
02D9D3C4 40404040 40400038 40404040 00020001 0C000FC0 00030001
0C000FC4 00040001 1C000FC8 00050001 1C000FCC 00060001 1C000FD0
00070001 1C000FD4 00080001 1C000FD8 C2D3C4C5 F0F0F1F9*
02C5E2C4 40404040 40400010 4040000A C3C1C4C3 C9D94040 02000000

MEMBER NAME  BLDET
40000000 40404040 40404040 40404040 40404040 40404040 40404040
40404040 40404040 40404040 40404040 C2D3C4C5 F0F0F2F0**
```

| | | | | | | |
|---|---|---|---|---|---|---|
| 02C5E2C4 | 40404040 | 40400010 | 4040000B | C3C1C4D5 | E2C84040 | 02000000 |
| 40000000 | 40404040 | 40404040 | 40404040 | 40404040 | 40404040 | 40404040 |
| 40404040 | 40404040 | 40404040 | 40404040 | C2D3C4C5 | F0F0F2F1* | |
| 02C5E2C4 | 40404040 | 40400010 | 4040000C | C3C1C4E2 | D7F44040 | 02000000 |
| 40000000 | 40404040 | 40404040 | 40404040 | 40404040 | 40404040 | 40404040 |
| 40404040 | 40404040 | 40404040 | 40404040 | C2D3C4C5 | F0F0F2F2* | |
| 02C5E2C4 | 40404040 | 40400010 | 4040000D | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C2D3C4C5 | F0F0F2F3* | |
| 02E3E7E3 | 40000FE0 | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | C2D3C4C5 | F0F0F2F4* | |
| 02C5E2C4 | 40404040 | 40400010 | 4040000E | D9C5D3E2 | D7D34040 | 02000000 |
| 40000000 | 40404040 | 40404040 | 40404040 | 40404040 | 40404040 | 40404040 |
| 40404040 | 40404040 | 40404040 | 40404040 | C2D3C4C5 | F0F0F2F5* | |
| 02C5E2C4 | 40404040 | 40400010 | 4040000F | E2D7D3D6 | C6C64040 | 02000000 |
| 40000000 | 40404040 | 40404040 | 40404040 | 40404040 | 40404040 | 40404040 |
| 40404040 | 40404040 | 40404040 | 40404040 | C2D3C4C5 | F0F0F2F6* | |
| 02E3E7E3 | 40000FF4 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | C2D3C4C5 | F0F0F2F7* | |
| 02E3E7E3 | 40001004 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4C5 | F0F0F2F8* | |
| 02E3E7E3 | 400010CC | 40400038 | 40400001 | 58B0DF70 | 58A0DF74 | 5890DF78 |
| 5880D140 | 7800D144 | 7000D1BC | 5800D114 | 5000D168 | 5800D120 | 5000DEE4 |
| 5800DF08 | 5000DEF4 | 5800DF1C | 5000DEFC | C2D3C4C5 | F0F0F2F9* | |
| 02E3E7E3 | 40001104 | 40400038 | 40400001 | 5080DF00 | 7800D144 | 33007000 |
| DF245800 | DF6C5000 | DEEC50B0 | DF2850A0 | DF2C5090 | DF305800 | DF7C5000 |
| DF3450B0 | DF3850A0 | DF3C5090 | DF4050A0 | C2D3C4C5 | F0F0F3F0** | |
| 02E3E7E3 | 4000113C | 40400038 | 40400001 | DF4450B0 | DF485090 | DF4C5090 |
| DF505800 | DF805000 | DF545800 | DF7C5000 | DF5850B0 | DF5C5800 | DF845000 |
| DF6050A0 | DF645800 | DF885000 | DF6858A0 | C2D3C4C5 | F0F0F3F1* | |
| 02E3E7E3 | 40001174 | 40400038 | 40400001 | DF0458B0 | DEB45890 | DEC458E0 |
| DEEC782E | B0007020 | DEE87920 | D1484780 | C0A07920 | D14C4780 | C1687920 |
| D1504780 | C1CC7920 | D1544780 | C2FC7920 | C2D3C4C5 | F0F0F3F2* | |
| 02E3E7E3 | 400011AC | 40400018 | 40400001 | D1584780 | C73C58F0 | DEBC1800 |
| 45E0F004 | 00000006 | 00000028 | 40404040 | 40404040 | 40404040 | 40404040 |
| 40404040 | 40404040 | 40404040 | 40404040 | C2D3C4C5 | F0F0F3F3* | |
| 02D9D3C4 | 40404040 | 40400038 | 40404040 | 00090001 | 1C000FDC | 000A0001 |
| 1C000FE0 | 000B0001 | 1C000FE4 | 000C0001 | 1C000FE8 | 000D0001 | 1C000FF4 |
| 000E0001 | 1C000FF8 | 000F0001 | 1C001004 | C2D3C4C5 | F0F0F3F4* | |
| 02E3E7E3 | 400011C4 | 40400038 | 40400001 | 5810DEEC | 45E0F008 | 0471B000 |
| 45E0F010 | 47F0C73C | 4100DE74 | 5000D0A0 | 58E0DF28 | 410EB000 | 5000D0A4 |
| 9280D0A4 | 58F0DE9C | 4110D09C | 05EF4100 | C2D3C4C5 | F0F0F3F5* | |
| 02E3E7E3 | 400011FC | 40400038 | 40400001 | DE7C5000 | D0A058E0 | DF2C410E |
| B0005000 | D0A49280 | D0A458F0 | DE9C4110 | D09C05EF | 5800D1D4 | 1BFF870F |
| C1027820 | DE743302 | 7000DE74 | 7820DE7C | C2D3C4C5 | F0F0F3F6* | |
| 02E3E7E3 | 40001234 | 40400038 | 40400001 | 33027000 | DE7C5800 | D1841BFF |
| 860FC126 | 58F0DE98 | 4110D0A8 | 05EF41E0 | 000415FE | 4720C126 | 58EFD04C |
| 07FE5800 | D1841BFF | 870FC14A | 58F0DEA4 | C2D3C4C5 | F0F0F3F7* | |
| 02E3E7E3 | 4000126C | 40400038 | 40400001 | 4110D0A8 | 05EF41E0 | 000415FE |
| 4720C14A | 58EFD054 | 07FE47F0 | C73C58F0 | DEBC1800 | 45E0F004 | 00000006 |
| 0000005B | 45E0F010 | 47F0C73C | 4100D828 | C2D3C4C5 | F0F0F3F8* | |
| 02E3E7E3 | 400012A4 | 40400038 | 40400001 | 5000D0A0 | 58E0DF30 | 410EB000 |
| 5000D0A4 | 9280D0A4 | 58F0DE9C | 4110D09C | 05EF58E0 | DF34782E | B0007020 |

MEMBER NAME BLDET

| | | | | | | |
|---|---|---|---|---|---|---|
| D83058F0 | DEA84110 | D0B005EF | 41E00004 | C2D3C4C5 | F0F0F3F9* | |
| 02E3E7E3 | 400012DC | 40400038 | 40400001 | 15FE4720 | C1B058EF | D05C07FE |
| 47F0C73C | 58F0DEBC | 45E0F004 | 00000006 | 00000076 | 45E0F010 | 47F0C73C |

```
5800D1D4  1BFF860F  C2404100  DE745000  C2D3C4C5  F0F0F4F0**
02E3E7E3  40001314  40400038  40400001  D0A058E0  DF38410E  B0005000
D0A49280  D0A458F0  DE9C4110  D09C05EF  4100DE7C  5000D0A0  58E0DF3C
410EB000  5000D0A4  9280D0A4  58F0DE9C  C2D3C4C5  F0F0F4F1*
02E3E7E3  4000134C  40400038  40400001  4110D09C  05EF4100  D8285000
D0A058E0  DF40410E  B0005000  D0A49280  D0A458F0  DE9C4110  D09C05EF
47F0C2C4  4100DE74  5000D0A0  58E0DF44  C2D3C4C5  F0F0F4F2*
02E3E7E3  40001384  40400038  40400001  410EB000  5000D0A4  9280D0A4
58F0DE9C  4110D09C  05EF7820  DE743302  7000DE74  4100DE7C  5000D0A0
58E0DF48  410EB000  5000D0A4  9280D0A4  C2D3C4C5  F0F0F4F3*
02E3E7E3  400013BC  40400038  40400001  58F0DE9C  4110D09C  05EF7820
DE7C3302  7000DE7C  4100D828  5000D0A0  58E0DF4C  410EB000  5000D0A4
9280D0A4  58F0DE9C  4110D09C  05EF7820  C2D3C4C5  F0F0F4F4*
02E3E7E3  400013F4  40400038  40400001  D8283302  7000D828  58F0DEA0
4110D0B4  05EF41E0  000415FE  4720C2DE  58EFD064  07FE47F0  C73C58F0
DEBC1800  45E0F004  00000006  00000092  C2D3C4C5  F0F0F4F5*
02E3E7E3  4000142C  40400038  40400001  45E0F010  47F0C73C  58E0DF50
2B00780E  B0006A00  D1086000  D1005850  D1045050  D1C458E0  DF542B00
780EB000  6A00D108  6000D100  5820D104  C2D3C4C5  F0F0F4F6*
02E3E7E3  40001464  40400038  40400001  1A255B20  D1145020  D19C58E0
DF582B00  780EB000  6A00D108  6000D100  5870D104  5070D198  5C60DF18
5070DEF8  18275A20  DEE42B00  78029000  C2D3C4C5  F0F0F4F7*
02E3E7E3  4000149C  40400038  40400001  6A00D108  6000D100  5840D104
5040D1B4  18275A20  D1302B00  78029000  6A00D108  6000D100  5800D104
5000D1B0  58E0DF5C  780EB000  7000D17C  C2D3C4C5  F0F0F4F8*
02E3E7E3  400014D4  40400038  40400001  58E0DF60  780EB000  7000D180
1A455B40  D1141824  1B255020  D1941834  5040D178  19454780  C4221813
1C085010  DED05850  DEE05860  DED01873  C2D3C4C5  F0F0F4F9*
02E3E7E3  4000150C  40400038  40400001  5890D114  58A0D114  18B25880
DE8C7820  D17C7B26  80043C22  7840D180  7B468008  3C443A24  7020DF8C
58F0DE94  4110D0C0  05EF7900  D15C4750  C2D3C4C5  F0F0F5F0**
02E3E7E3  40001544  40400038  40400001  C4165070  D17847F0  C4221B7A
1A65879A  C3E25070  D1785890  DEC458B0  DEB458A0  DF045880  D1405850
D1C45050  D1E05800  D1785000  D1C41B05  C2D3C4C5  F0F0F5F1*
02E3E7E3  4000157C  40400038  40400001  5000D190  58E0DF64  780EB000
7000D17C  58E0DF68  780EB000  7000D180  5A50D1B0  5050D1AC  18255050
D1741C48  18651878  189258A0  D11458B0  C2D3C4C5  F0F0F5F2*
02E3E7E3  400015B4  40400038  40400001  D19C5880  DE8C7820  D17C7B26
80043C22  7840D180  7B468008  3C443A24  7020DF8C  58F0DE94  4110D0C4
05EF3820  7000D188  199B4770  C4BA5090  C2D3C4C5  F0F0F5F3*
02E3E7E3  400015EC  40400038  40400001  D17447F0  C4D47920  D15C4750
C4CA5090  D17447F0  C4D41A67  879AC482  5090D174  5890DEC4  58B0DEB4
58A0DF04  5880D140  5800D110  5000D1A0  C2D3C4C5  F0F0F5F4*
02E3E7E3  40001624  40400038  40400001  18185C00  D1745010  DEDC1838
5C20D1C4  5840D114  5850D1A0  5870D110  188358A0  D14058B0  D1605890
DE8C1A54  5A70D130  18674107  D82C5000  C2D3C4C5  F0F0F5F5*
02E3E7E3  4000165C  40400038  40400001  D0A04108  90045000  D0A49280
D0A458F0  DE9C4110  D09C05EF  4107D1E0  5000D0A0  4108900C  5000D0A4
9280D0A4  58F0DE9C  4110D09C  05EF5800  C2D3C4C5  F0F0F5F6*
02E3E7E3  40001694  40400038  40400001  D1D4870B  C5767826  D82C3302
7006D82C  7826D1E0  33027006  D1E01A8A  5980DEDC  47C0C516  5050D1A0
5890DEC4  58B0DEB4  58A0DF04  5880D140  C2D3C4C5  F0F0F5F7*
02E3E7E3  400016CC  40400038  40400001  58F0DEB0  4110D0C8  05EF41E0
000415FE  4720C5AE  58EFD06C  07FE5800  D1B45B00  D1905000  D1CC5800
D1B05B00  D1905000  D1C85830  D1B45A30  C2D3C4C5  F0F0F5F8*

MEMBER NAME  BLDET
02E3E7E3  40001704  40400038  40400001  D1E05B30  D1141C28  58F0DE8C
7823F014  5820DEF8  5A20DEF4  7C229000  7020D1DC  5830D1AC  5B30D114
1C287823  F0145820  DEF85A20  DEFC7C22  C2D3C4C5  F0F0F5F9*
02E3E7E3  4000173C  40400038  40400001  90007020  D1D85820  DEF85A20
```

```
DF007822  90007020  D1E47920  D1BC4730  C6527920  DF244750  C65258F0
DE904110  D0D405EF  41E00004  15FE4720  C2D3C4C5  F0F0F6F0**
02E3E7E3  40001774  40400038  40400001  C64458EF  D07407FE  58F0DEC0
4110D0D8  05EF47F0  C73C58F0  DE904110  D0D405EF  41E00004  15FE4720
C66C58EF  D07C07FE  58F0DEAC  4110D0EC  C2D3C4C5  F0F0F6F1*
02E3E7E3  400017AC  40400038  40400001  05EF41E0  000415FE  4720C686
58EFD084  07FE5800  D1D41BFF  870FC69A  7800D1E4  33007000  D1E458F0
DECC4110  D0F405EF  41E00004  15FE4720  C2D3C4C5  F0F0F6F2*
02E3E7E3  400017E4  40400038  40400001  C6B458EF  D08C07FE  58F0DE90
4110D0D4  05EF41E0  000415FE  4720C6CE  58EFD094  07FE58F0  DEC04110
D0D805EF  47F0C73C  58F0DEBC  45E0F004  C2D3C4C5  F0F0F6F3*
02E3E7E3  4000181C  40400038  40400001  00000006  000000AE  45E0F010
47F0C73C  58F0DEBC  45E0F004  00000006  000000D1  45E0F010  47F0C73C
58F0DEBC  45E0F004  00000006  000000F4  C2D3C4C5  F0F0F6F4*
02E3E7E3  40001854  40400018  40400001  45E0F010  47F0C73C  58F0DEBC
45E0F004  00000006  00000115  40404040  40404040  40404040  40404040
40404040  40404040  40404040  40404040  C2D3C4C5  F0F0F6F5*
02D9D3C4  40404040  40400038  40404040  00010001  0C0011C0  00010001
0C001294  00010001  0C0012F8  00010001  0C001428  00010001  0C001820
00010001  0C001838  00010001  0C001850  C2D3C4C5  F0F0F6F6*
02E3E7E3  4000186C  40400038  40400001  45E0F010  47F0C73C  5820D168
5A20D114  5020D168  5800DF68  1A0A5000  DF685800  DF641A0A  5000DF64
5800DF60  1A0A5000  DF605800  DF5C1A0A  C2D3C4C5  F0F0F6F7*
02E3E7E3  400018A4  40400038  40400001  5000DF5C  5800DF58  1A0A5000
DF585800  DF541A0A  5000DF54  5800DF50  1A0A5000  DF505800  DF4C1A0A
5000DF4C  5800DF48  1A0A5000  DF485800  C2D3C4C5  F0F0F6F8*
02E3E7E3  400018DC  40400038  40400001  DF441A0A  5000DF44  5800DF40
1A0A5000  DF405800  DF3C1A0A  5000DF3C  5800DF38  1A0A5000  DF385800
DF341A0A  5000DF34  5800DF30  1A0A5000  C2D3C4C5  F0F0F6F9*
02E3E7E3  40001914  40400038  40400001  DF305800  DF2C1A0A  5000DF2C
5800DF28  1A0A5000  DF285800  DEEC1A0A  5000DEEC  5920D18C  47C0C046
58B0DF70  58A0DF74  5890DF78  5880D140  C2D3C4C5  F0F0F7F0**
02E3E7E3  4000194C  40400038  40400001  1BFF58E0  D00007FE  58D0D004
58E0D00C  92FFD00C  982CD01C  07FE58C0  D048987B  10045820  70005020
D18C5820  90005020  D1A45820  A0005020  C2D3C4C5  F0F0F7F1*
02E3E7E3  40001984  40400038  40400001  D1D45820  B0005020  D1845820
10004130  20004150  00041B25  5C40D13C  1B255020  DEB45030  DEB85820
10084130  20004150  00041B25  5C40D138  C2D3C4C5  F0F0F7F2*
02E3E7E3  400019BC  4040000E  40400001  1B255020  DEC45030  DEC847F0
DF944040  40404040  40404040  40404040  40404040  40404040  40404040
40404040  40404040  40404040  40404040  C2D3C4C5  F0F0F7F3*
02E3E7E3  40000020  40400008  40400001  00001966  00000138  40404040
40404040  40404040  40404040  40404040  40404040  40404040  40404040
40404040  40404040  40404040  40404040  C2D3C4C5  F0F0F7F4*
02E3E7E3  40000138  40400004  40400001  00001954  40404040  40404040
40404040  40404040  40404040  40404040  40404040  40404040  40404040
40404040  40404040  40404040  40404040  C2D3C4C5  F0F0F7F5*
02E3E7E3  40000180  40400010  40400001  00001138  0000125E  00001286
00001282  40404040  40404040  40404040  40404040  40404040  40404040
40404040  40404040  40404040  40404040  C2D3C4C5  F0F0F7F6*
02D9D3C4  40404040  40400038  40404040  00010001  0C001868  00010001
0C000020  00010001  0C000024  00010001  0C000138  00010001  0C000180
00010001  0C000184  00010001  0C000188  C2D3C4C5  F0F0F7F7*
02E3E7E3  40000190  4040001C  40400001  00001286  000012E8  000012EC

MEMBER NAME  BLDET
00001416  0000141A  000016E6  0000182C  40404040  40404040  40404040
40404040  40404040  40404040  40404040  C2D3C4C5  F0F0F7F8*
02D9D3C4  40404040  40400038  40404040  00010001  0C00018C  00010001
0C000190  00010001  0C000194  00010001  0C000198  00010001  0C00019C
00010001  0C0001A0  00010001  0C0001A4  C2D3C4C5  F0F0F7F9*
```

| | | | | | | |
|---|---|---|---|---|---|---|
| 02E3E7E3 | 400001AC | 4040001C | 40400001 | 0000177C | 00001844 | 000017A4 |
| 00001844 | 000017BE | 0000185C | 000017EC | 40404040 | 40404040 | 40404040 |
| 40404040 | 40404040 | 40404040 | 40404040 | C2D3C4C5 | F0F0F8F0** | |
| 02D9D3C4 | 40404040 | 40400038 | 40404040 | 00010001 | 0C0001A8 | 00010001 |
| 0C0001AC | 00010001 | 0C0001B0 | 00010001 | 0C0001B4 | 00010001 | 0C0001B8 |
| 00010001 | 0C0001BC | 00010001 | 0C0001C0 | C2D3C4C5 | F0F0F8F1* | |
| 02E3E7E3 | 400001C8 | 40400010 | 40400001 | 00001814 | 00001806 | 00001844 |
| 00000268 | 40404040 | 40404040 | 40404040 | 40404040 | 40404040 | 40404040 |
| 40404040 | 40404040 | 40404040 | 40404040 | C2D3C4C5 | F0F0F8F2* | |
| 02E3E7E3 | 400001DC | 40400010 | 40400001 | 80000000 | 00000FAC | 80000FB4 |
| 80000960 | 40404040 | 40404040 | 40404040 | 40404040 | 40404040 | 40404040 |
| 40404040 | 40404040 | 40404040 | 40404040 | C2D3C4C5 | F0F0F8F3* | |
| 02D9D3C4 | 40404040 | 40400038 | 40404040 | 00010001 | 0C0001C4 | 00010001 |
| 0C0001C8 | 00010001 | 0C0001CC | 00010001 | 0C0001D0 | 00010001 | 0C0001D4 |
| 00010001 | 0C0001E0 | 00010001 | 0C0001E4 | C2D3C4C5 | F0F0F8F4* | |
| 02E3E7E3 | 400001EC | 4040001C | 40400001 | 00000FAC | 00000FB4 | 80000960 |
| 800010C4 | 800010C4 | 0000096C | 000002D8 | 40404040 | 40404040 | 40404040 |
| 40404040 | 40404040 | 40404040 | 40404040 | C2D3C4C5 | F0F0F8F5* | |
| 02D9D3C4 | 40404040 | 40400038 | 40404040 | 00010001 | 0C0001E8 | 00010001 |
| 0C0001EC | 00010001 | 0C0001F0 | 00010001 | 0C0001F4 | 00010001 | 0C0001F8 |
| 00010001 | 0C0001FC | 00010001 | 0C000200 | C2D3C4C5 | F0F0F8F6* | |
| 02E3E7E3 | 40000208 | 4040001C | 40400001 | 80000320 | 800002F0 | 000002F0 |
| 00000304 | 00000300 | 00000314 | 80000310 | 40404040 | 40404040 | 40404040 |
| 40404040 | 40404040 | 40404040 | 40404040 | C2D3C4C5 | F0F0F8F7* | |
| 02D9D3C4 | 40404040 | 40400038 | 40404040 | 00010001 | 0C000204 | 00010001 |
| 0C000208 | 00010001 | 0C00020C | 00010001 | 0C000210 | 00010001 | 0C000214 |
| 00010001 | 0C000218 | 00010001 | 0C00021C | C2D3C4C5 | F0F0F8F8* | |
| 02E3E7E3 | 40000224 | 40400010 | 40400001 | 000002F0 | 800002F0 | 000002F0 |
| 8000031C | 40404040 | 40404040 | 40404040 | 40404040 | 40404040 | 40404040 |
| 40404040 | 40404040 | 40404040 | 40404040 | C2D3C4C5 | F0F0F8F9* | |
| 02E3E7E3 | 40001008 | 40400038 | 40400001 | 00000000 | 00000000 | 00000000 |
| 00000000 | FFFFFFEC | 00000000 | 00000000 | 00000000 | 00000000 | 00000000 |
| 00000000 | 00000000 | 00000000 | 00000038 | C2D3C4C5 | F0F0F9F0** | |
| 02E3E7E3 | 40001040 | 40400038 | 40400001 | 0000000C | 0000001C | 00000024 |
| 00000020 | 0000002C | 00000010 | 00000018 | 00000000 | 00000000 | 00000000 |
| 00000000 | 00000000 | 00D8000D | 00000000 | C2D3C4C5 | F0F0F9F1* | |
| 02E3E7E3 | 40001078 | 40400038 | 40400001 | 0000000D | 00E4000F | 00E8000F |
| 00000000 | 0000000F | 00F40011 | 00F80011 | 00000000 | 00000011 | 01040013 |
| 01080013 | 0000003C | 00000044 | 0000004C | C2D3C4C5 | F0F0F9F2* | |
| 02E3E7E3 | 400010B0 | 4040001C | 40400001 | 00000054 | 0000005C | 00000058 |
| 00000048 | 00000050 | 01340017 | 01380017 | 40404040 | 40404040 | 40404040 |
| 40404040 | 40404040 | 40404040 | 40404040 | C2D3C4C5 | F0F0F9F3* | |
| 02D9D3C4 | 40404040 | 40400028 | 40404040 | 00010001 | 0C000220 | 00010001 |
| 0C000224 | 00010001 | 0C000228 | 00010001 | 0C00022C | 00010001 | 0C000230 |
| 40404040 | 40404040 | 40404040 | 40404040 | C2D3C4C5 | F0F0F9F4* | |
| 02C5D5C4 | 40404040 | 40404040 | 40404040 | 40404040 | 40404040 | 40404040 |
| 000019CA | F1F5F7F3 | F460C6D6 | F34040F0 | F2F0F2F8 | F7F0F9F8 | 40F0F84B |
| F1F24BF0 | F7404040 | C2D3C4C5 | E3404040 | C2D3C4C5 | F0F0F9F5** | |

MEMBER NAME BLDMFG

| | | | | | | |
|---|---|---|---|---|---|---|
| 02C5E2C4 | 40404040 | 40400010 | 40400001 | C2D3C4D4 | C6C74040 | 00000000 |
| 40000000 | 40404040 | 40404040 | 40404040 | 40404040 | 40404040 | 40404040 |
| 40404040 | 40404040 | 40404040 | 40404040 | C2D3C4D4 | F0F0F0F1* | |
| 02E3E7E3 | 40000000 | 40400038 | 40400001 | 47F0F00C | 07C2D3C4 | D4C6C740 |
| 90ECD00C | 184D98CD | F0205040 | D00450D0 | 400807FC | 40404040 | 40404040 |
| 021A3440 | C5D9D9D6 | D940C6D6 | E4D5C440 | C2D3C4D4 | F0F0F0F2* | |
| 02E3E7E3 | 40000038 | 40400038 | 40400001 | C9D540D7 | D9D6C3C5 | E2E2C9D5 |
| C740C1D9 | D9D6E6C8 | C5C1C4E2 | 40D6D940 | D7D3E8E3 | C1C2D3C5 | 40404022 |
| 021A0140 | 06481401 | 22021812 | 1A23405C | C2D3C4D4 | F0F0F0F3* | |
| 02E3E7E3 | 40000070 | 40400038 | 40400001 | 5C5C5C40 | E4D5C1C2 | D3C540E3 |
| D640C3C8 | C1C9D540 | C7C5D6D4 | C5E3D9E8 | 405C5C5C | 5C183222 | 02064814 |

```
01220218  121A1D40  5C5C5C5C  40C5E7E3  C2D3C4D4  F0F0F0F4*
02E3E7E3  400000A8  40400038  40400001  C5D9C9D6  D940E4D5  C4C5C6C9
D5C5C440  5C5C5C5C  18322202  18121A1A  405C5C5C  5C40E4D5  C1C2D3C5
40E3D640  D6D9C4C5  D9405C5C  5C5C1832  C2D3C4D4  F0F0F0F5*
02E3E7E3  400000E0  40400038  40400001  22021812  1A19405C  5C5C5C40
C9D3D3C5  C7C1D340  C3E4E3D6  E4E3405C  5C5C5C18  3222021A  0FD9C5C6
C9D3C540  C5D9D9D6  D9407E40  10031A0A  C2D3C4D4  F0F0F0F6*
02E3E7E3  40000118  40400038  40400001  40C9D540  C2D3C4D4  C6C72202
1A2F4040  C5D9D9D6  D940C9D5  40C140C3  C1C4C1D4  40D9D6E4  E3C9D5C5
40C9D540  C2D3C4D4  C6C740E2  E4C2D9D6  C2D3C4D4  F0F0F0F7*
02E3E7E3  40000150  40400038  40400001  E4E3C9D5  C522021A  2140D4D6
C4C5D340  C6E4D3D3  40D6D940  E5C9C5E6  61C4C5E3  C1C9D340  C6E4D3D3
4B401A0C  D4D6C4C5  D340E2D7  C1C3C57E  C2D3C4D4  F0F0F0F8*
02E3E7E3  40000188  40400013  40400001  10061A0C  4040D5C5  E7E340E5
C9C5E67E  10062240  40404040  40404040  40404040  40404040  40404040
40404040  40404040  40404040  40404040  C2D3C4D4  F0F0F0F9*
02E3E7E3  400004A8  40400038  40400001  00000000  00000000  4E000000
00000000  4F080000  00000000  4E000000  80000000  00000000  00000000
00000000  00000001  00000001  00000002  C2D3C4D4  F0F0F1F0**
02E3E7E3  400004E0  40400038  40400001  00000003  00000004  00000005
00000008  00000009  0000000A  0000000B  0000000C  0000000E  0000000F
00000010  00000014  00000015  00000018  C2D3C4D4  F0F0F1F1*
02E3E7E3  40000518  40400038  40400001  0000002A  0000002C  00000038
00000048  00000049  00000058  0000005D  00000070  00000080  00000098
00000BB8  401DF3B6  4029FBE7  403EF9DB  C2D3C4D4  F0F0F1F2*
02E3E7E3  40000550  40400018  40400001  41100000  4145BE77  414F70A4
41F00000  00000000  00000000  40404040  40404040  40404040  40404040
40404040  40404040  40404040  40404040  C2D3C4D4  F0F0F1F3*
02C5E2C4  40404040  40400010  40400002  D4E2C9E9  C5404040  05000000
4000000C  40404040  40404040  40404040  40404040  40404040  40404040
40404040  40404040  40404040  40404040  C2D3C4D4  F0F0F1F4*
02C5E2C4  40404040  40400010  40400003  E2E3C1C3  D2404040  05000000
40040744  40404040  40404040  40404040  40404040  40404040  40404040
40404040  40404040  40404040  40404040  C2D3C4D4  F0F0F1F5*
02C5E2C4  40404040  40400010  40400004  D7C3C5D9  D9404040  05000000
40003844  40404040  40404040  40404040  40404040  40404040  40404040
40404040  40404040  40404040  40404040  C2D3C4D4  F0F0F1F6*
02C5E2C4  40404040  40400010  40400005  D7D7D6C9  D5E34040  05000000
40013884  40404040  40404040  40404040  40404040  40404040  40404040
40404040  40404040  40404040  40404040  C2D3C4D4  F0F0F1F7*
02C5E2C4  40404040  40400010  40400006  E2C5D9D9  D6D94040  05000000
40000004  40404040  40404040  40404040  40404040  40404040  40404040
40404040  40404040  40404040  40404040  C2D3C4D4  F0F0F1F8*
02C5E2C4  40404040  40400010  40400007  C5D3D4E3  C2D34040  05000000
400D7D28  40404040  40404040  40404040  40404040  40404040  40404040
40404040  40404040  40404040  40404040  C2D3C4D4  F0F0F1F9*
02E3E7E3  40006230  40400020  40400001  00002688  00005F10  00000000

MEMBER NAME  BLDMFG
FFFFFFA8  FFFFFFBB  FFFFFFF0  00000000  FFFFFFC8  40404040  40404040
40404040  40404040  40404040  40404040  C2D3C4D4  F0F0F2F0**
02D9D3C4  40404040  40400038  40404040  00010001  0C006230  00010001
0C006234  00020001  0C006238  00030001  0C00623C  00040001  0C006240
00050001  0C006244  00060001  0C006248  C2D3C4D4  F0F0F2F1*
02C5E2C4  40404040  40400010  40400008  C9D7D5E3  D9404040  05000000
4000EA68  40404040  40404040  40404040  40404040  40404040  40404040
40404040  40404040  40404040  40404040  C2D3C4D4  F0F0F2F2*
02C5E2C4  40404040  40400010  40400009  C4C5E3C1  C2D34040  05000000
40015950  40404040  40404040  40404040  40404040  40404040  40404040
40404040  40404040  40404040  40404040  C2D3C4D4  F0F0F2F3*
02C5E2C4  40404040  40400010  4040000A  C9C4E4D7  C5404040  05000000
```

| | | | | | | |
|---|---|---|---|---|---|---|
| 40008CA4 | 40404040 | 40404040 | 40404040 | 40404040 | 40404040 | 40404040 |
| 40404040 | 40404040 | 40404040 | 40404040 | C2D3C4D4 | F0F0F2F4* | |
| 02C5E2C4 | 40404040 | 40400010 | 4040000B | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | C2D3C4D4 | F0F0F2F5* | |
| 02E3E7E3 | 40006250 | 4040001C | 40400001 | 000CD118 | FFFFFFF4 | 0000EA64 |
| FFFFFFC4 | 000147F0 | FFFFFFF4 | FFFFFFFF | 40404040 | 40404040 | 40404040 |
| 40404040 | 40404040 | 40404040 | 40404040 | C2D3C4D4 | F0F0F2F6* | |
| 02D9D3C4 | 40404040 | 40400038 | 40404040 | 00070001 | 0C00624C | 00070001 |
| 0C006250 | 00080001 | 0C006254 | 00080001 | 0C006258 | 00090001 | 0C00625C |
| 00090001 | 0C006260 | 000A0001 | 0C006264 | C2D3C4D4 | F0F0F2F7* | |
| 02C5E2C4 | 40404040 | 40400010 | 4040000C | C7D9E4D7 | 40404040 | 05000000 |
| 4000000C | 40404040 | 40404040 | 40404040 | 40404040 | 40404040 | 40404040 |
| 40404040 | 40404040 | 40404040 | 40404040 | C2D3C4D4 | F0F0F2F8* | |
| 02C5E2C4 | 40404040 | 40400010 | 4040000D | D6D7E3C9 | D6D54040 | 05000000 |
| 40000020 | 40404040 | 40404040 | 40404040 | 40404040 | 40404040 | 40404040 |
| 40404040 | 40404040 | 40404040 | 40404040 | C2D3C4D4 | F0F0F2F9* | |
| 02C5E2C4 | 40404040 | 40400010 | 4040000E | 40404040 | 40404040 | 05000000 |
| 400007D0 | 40404040 | 40404040 | 40404040 | 40404040 | 40404040 | 40404040 |
| 40404040 | 40404040 | 40404040 | 40404040 | C2D3C4D4 | F0F0F3F0** | |
| 02C5E2C4 | 40404040 | 40400010 | 4040000F | D7E3C1C2 | D3C54040 | 05000000 |
| 40125768 | 40404040 | 40404040 | 40404040 | 40404040 | 40404040 | 40404040 |
| 40404040 | 40404040 | 40404040 | 40404040 | C2D3C4D4 | F0F0F3F1* | |
| 02E3E7E3 | 4000626C | 4040001C | 40400001 | 00000000 | 00000000 | FFFFFFFC |
| FFFFFFEC | 00058600 | 000B0444 | 00108298 | 40404040 | 40404040 | 40404040 |
| 40404040 | 40404040 | 40404040 | 40404040 | C2D3C4D4 | F0F0F3F2* | |
| 02D9D3C4 | 40404040 | 40400038 | 40404040 | 000B0001 | 0C006268 | 000C0001 |
| 0C00626C | 000D0001 | 0C006270 | 000E0001 | 0C006274 | 000F0001 | 0C006278 |
| 000F0001 | 0C00627C | 000F0001 | 0C006280 | C2D3C4D4 | F0F0F3F3* | |
| 02C5E2C4 | 40404040 | 40400010 | 40400010 | C2D3C4C5 | E3404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F3F4* | |
| 02C5E2C4 | 40404040 | 40400010 | 40400011 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F3F5* | |
| 02C5E2C4 | 40404040 | 40400010 | 40400012 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F3F6* | |
| 02C5E2C4 | 40404040 | 40400010 | 40400013 | C3C1D5C4 | D6404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F3F7* | |
| 02C5E2C4 | 40404040 | 40400010 | 40400014 | C4C9E3E3 | D6404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F3F8* | |
| 02C5E2C4 | 40404040 | 40400010 | 40400015 | C6E2D6D9 | E3404040 | 02000000 |
| 40000000 | 40404040 | 40404040 | 40404040 | 40404040 | 40404040 | 40404040 |

MEMBER NAME BLDMFG

| | | | | | | |
|---|---|---|---|---|---|---|
| 40404040 | 40404040 | 40404040 | 40404040 | C2D3C4D4 | F0F0F3F9* | |
| 02E3E7E3 | 40006288 | 4040001C | 40400001 | 00111ED4 | 00000000 | 00000000 |
| 00000000 | 00000000 | 00000000 | 00000000 | 40404040 | 40404040 | 40404040 |
| 40404040 | 40404040 | 40404040 | 40404040 | C2D3C4D4 | F0F0F4F0** | |
| 02D9D3C4 | 40404040 | 40400038 | 40404040 | 000F0001 | 0C006284 | 000F0001 |
| 0C006288 | 00100001 | 1C00628C | 00110001 | 1C006290 | 00120001 | 1C006294 |
| 00130001 | 1C006298 | 00140001 | 1C00629C | C2D3C4D4 | F0F0F4F1* | |
| 02C5E2C4 | 40404040 | 40400010 | 40400016 | C6E2D7E4 | E3404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F4F2* | |
| 02C5E2C4 | 40404040 | 40400010 | 40400017 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C2D3C4D4 | F0F0F4F3* | |

```
02C5E2C4  40404040  40400010  40400018  C2C3C8C1  C9D54040  02000000
40000000  40404040  40404040  40404040  40404040  40404040  40404040
40404040  40404040  40404040  40404040  C2D3C4D4  F0F0F4F4*
02C5E2C4  40404040  40400010  40400019  C2C5C7C4  C5E34040  02000000
40000000  40404040  40404040  40404040  40404040  40404040  40404040
40404040  40404040  40404040  40404040  C2D3C4D4  F0F0F4F5*
02C5E2C4  40404040  40400010  4040001A  C2D3C4C4  D9E54040  02000000
40000000  40404040  40404040  40404040  40404040  40404040  40404040
40404040  40404040  40404040  40404040  C2D3C4D4  F0F0F4F6*
02C5E2C4  40404040  40400010  4040001B  C2D3C4E3  C2D34040  02000000
40000000  40404040  40404040  40404040  40404040  40404040  40404040
40404040  40404040  40404040  40404040  C2D3C4D4  F0F0F4F7*
02C5E2C4  40404040  40400010  4040001C  C2D9C5C1  D2F14040  02000000
40000000  40404040  40404040  40404040  40404040  40404040  40404040
40404040  40404040  40404040  40404040  C2D3C4D4  F0F0F4F8*
02E3E7E3  400062A4  4040001C  40400001  00000000  00000000  00000000
00000000  00000000  00000000  00000000  40404040  40404040  40404040
40404040  40404040  40404040  40404040  C2D3C4D4  F0F0F4F9*
02D9D3C4  40404040  40400038  40404040  00150001  1C0062A0  00160001
1C0062A4  00170001  1C0062A8  00180001  1C0062AC  00190001  1C0062B0
001A0001  1C0062B4  001B0001  1C0062B8  C2D3C4D4  F0F0F5F0**
02C5E2C4  40404040  40400010  4040001D  C3C1C4C6  C9D34040  02000000
40000000  40404040  40404040  40404040  40404040  40404040  40404040
40404040  40404040  40404040  40404040  C2D3C4D4  F0F0F5F1*
02C5E2C4  40404040  40400010  4040001E  C3C1C4D5  E2C84040  02000000
40000000  40404040  40404040  40404040  40404040  40404040  40404040
40404040  40404040  40404040  40404040  C2D3C4D4  F0F0F5F2*
02C5E2C4  40404040  40400010  4040001F  C3C1C4E2  D7C34040  02000000
40000000  40404040  40404040  40404040  40404040  40404040  40404040
40404040  40404040  40404040  40404040  C2D3C4D4  F0F0F5F3*
02C5E2C4  40404040  40400010  40400020  C3C1C4E2  E4D74040  02000000
40000000  40404040  40404040  40404040  40404040  40404040  40404040
40404040  40404040  40404040  40404040  C2D3C4D4  F0F0F5F4*
02C5E2C4  40404040  40400010  40400021  C3C3C8C1  C9D54040  02000000
40000000  40404040  40404040  40404040  40404040  40404040  40404040
40404040  40404040  40404040  40404040  C2D3C4D4  F0F0F5F5*
02C5E2C4  40404040  40400010  40400022  C3C8C7D4  D6C44040  02000000
40000000  40404040  40404040  40404040  40404040  40404040  40404040
40404040  40404040  40404040  40404040  C2D3C4D4  F0F0F5F6*
02C5E2C4  40404040  40400010  40400023  C4E4D7C1  D9E84040  02000000
40000000  40404040  40404040  40404040  40404040  40404040  40404040
40404040  40404040  40404040  40404040  C2D3C4D4  F0F0F5F7*
02E3E7E3  400062C0  4040001C  40400001  00000000  00000000  00000000
00000000  00000000  00000000  00000000  40404040  40404040  40404040
40404040  40404040  40404040  40404040  C2D3C4D4  F0F0F5F8*

MEMBER NAME  BLDMFG
02D9D3C4  40404040  40400038  40404040  001C0001  1C0062BC  001D0001
1C0062C0  001E0001  1C0062C4  001F0001  1C0062C8  00200001  1C0062CC
00210001  1C0062D0  00220001  1C0062D4  C2D3C4D4  F0F0F5F9*
02C5E2C4  40404040  40400010  40400024  C4E4D7E3  C2D34040  02000000
40000000  40404040  40404040  40404040  40404040  40404040  40404040
40404040  40404040  40404040  40404040  C2D3C4D4  F0F0F6F0**
02C5E2C4  40404040  40400010  40400025  C5D5C4C4  C5E34040  02000000
40000000  40404040  40404040  40404040  40404040  40404040  40404040
40404040  40404040  40404040  40404040  C2D3C4D4  F0F0F6F1*
02C5E2C4  40404040  40400010  40400026  C8C7C4C1  E3C54040  02000000
40000000  40404040  40404040  40404040  40404040  40404040  40404040
40404040  40404040  40404040  40404040  C2D3C4D4  F0F0F6F2*
02C5E2C4  40404040  40400010  40400027  C8C7E3C9  D4C54040  02000000
40000000  40404040  40404040  40404040  40404040  40404040  40404040
```

```
40404040  40404040  40404040  40404040  C2D3C4D4  F0F0F6F3*
02C5E2C4  40404040  40400010  40400028  C9C2C3D6  D47B4040  02000000
40000000  40404040  40404040  40404040  40404040  40404040  40404040
40404040  40404040  40404040  40404040  C2D3C4D4  F0F0F6F4*
02C5E2C4  40404040  40400010  40400029  C9C3D5E3  C5D94040  02000000
40000000  40404040  40404040  40404040  40404040  40404040  40404040
40404040  40404040  40404040  40404040  C2D3C4D4  F0F0F6F5*
02C5E2C4  40404040  40400010  4040002A  D4D3C3C8  C1D94040  02000000
40000000  40404040  40404040  40404040  40404040  40404040  40404040
40404040  40404040  40404040  40404040  C2D3C4D4  F0F0F6F6*
02E3E7E3  400062DC  4040001C  40400001  00000000  00000000  00000000
00000000  00000000  00000000  00000000  40404040  40404040  40404040
40404040  40404040  40404040  40404040  C2D3C4D4  F0F0F6F7*
02D9D3C4  40404040  40400038  40404040  00230001  1C0062D8  00240001
1C0062DC  00250001  1C0062E0  00260001  1C0062E4  00270001  1C0062E8
00280001  1C0062EC  00290001  1C0062F0  C2D3C4D4  F0F0F6F8*
02C5E2C4  40404040  40400010  4040002B  D4D6C4E2  D9E34040  02000000
40000000  40404040  40404040  40404040  40404040  40404040  40404040
40404040  40404040  40404040  40404040  C2D3C4D4  F0F0F6F9*
02C5E2C4  40404040  40400010  4040002C  D7D3E8C3  C8E34040  02000000
40000000  40404040  40404040  40404040  40404040  40404040  40404040
40404040  40404040  40404040  40404040  C2D3C4D4  F0F0F7F0**
02C5E2C4  40404040  40400010  4040002D  D7D3E8E6  D9D54040  02000000
40000000  40404040  40404040  40404040  40404040  40404040  40404040
40404040  40404040  40404040  40404040  C2D3C4D4  F0F0F7F1*
02C5E2C4  40404040  40400010  4040002E  D7D9C3C4  D9E54040  02000000
40000000  40404040  40404040  40404040  40404040  40404040  40404040
40404040  40404040  40404040  40404040  C2D3C4D4  F0F0F7F2*
02C5E2C4  40404040  40400010  4040002F  D7D9C5C2  D9D24040  02000000
40000000  40404040  40404040  40404040  40404040  40404040  40404040
40404040  40404040  40404040  40404040  C2D3C4D4  F0F0F7F3*
02C5E2C4  40404040  40400010  40400030  E5C5D9C9  C6E84040  02000000
40000000  40404040  40404040  40404040  40404040  40404040  40404040
40404040  40404040  40404040  40404040  C2D3C4D4  F0F0F7F4*
02E3E7E3  400062F8  40400018  40400001  00000000  00000000  00000000
00000000  00000000  00000000  40404040  40404040  40404040  40404040
40404040  40404040  40404040  40404040  C2D3C4D4  F0F0F7F5*
02E3E7E3  400005C4  40400004  40400001  000000C8  40404040  40404040
40404040  40404040  40404040  40404040  40404040  40404040  40404040
40404040  40404040  40404040  40404040  C2D3C4D4  F0F0F7F6*
02E3E7E3  400060CC  40400030  40400001  00000025  00000004  C6D34040
C1404040  00000031  00000004  C6D34040  C1404040  00000035  00000004
C6D34040  C1404040  40404040  40404040  C2D3C4D4  F0F0F7F7*
02E3E7E3  40006104  40400010  40400001  00000000  00000000  00000000

MEMBER NAME  BLDMFG
00000000  40404040  40404040  40404040  40404040  40404040  40404040
40404040  40404040  40404040  40404040  C2D3C4D4  F0F0F7F8*
02E3E7E3  40006140  40400038  40400001  40D9C5C3  D6D9C440  D3C5D5C7
E3C87EF1  F66BE3E8  D7C57EC6  40404040  40404040  40E2D6D9  E340C6C9
C5D3C4E2  7E4DF16B  F46BC2C9  6BC16BF5  C2D3C4D4  F0F0F7F9*
02E3E7E3  40006178  40400038  40400001  6BF46BC2  C96BC16B  F96BF46B
C2C96BC1  5D404040  40404040  C3D6D7E8  D9C9C7C8  E3404DC3  5D40F1F9
F8F640E3  C8C540C2  D6C5C9D5  C740C3D6  C2D3C4D4  F0F0F8F0**
02E3E7E3  400061B0  40400038  40400001  D4D7C1D5  E85BC1D3  D340D9C9
C7C8E3E2  40D9C5E2  C5D9E5C5  C45B5BE2  D3C9C340  E5C5D9E2  C9D6D540
E7E7E7E7  40404040  40404040  4040C4C1  C2D3C4D4  F0F0F8F1*
02E3E7E3  400061E8  40400038  40400001  E3C57A40  E7E761E7  E761E7E7
40404040  40E3C9D4  C57A40E7  E77AE7E7  7AE7E740  5B5BC5D9  D9D6D940
D4D6C4C5  D3404040  40404040  40404040  C2D3C4D4  F0F0F8F2*
02E3E7E3  40006220  40400008  40400001  40404040  40404040  40404040
```

```
40404040  40404040  40404040  40404040  40404040  40404040  40404040
40404040  40404040  40404040  40404040  C2D3C4D4  F0F0F8F3*
02E3E7E3  40006334  40400038  40400001  5860C034  5880C024  5890C01C
58A0C010  58B0C004  5870D3C0  58F0C008  5800F008  5A00D3A0  5000D42C
5800D32C  5000D438  5800D328  5000D430  C2D3C4D4  F0F0F8F4*
02E3E7E3  4000636C  40400038  40400001  5800D32C  5000D44C  58F0C0B8
4110D0BC  05EF58F0  C0B44110  D0C005EF  4100B2DC  5000D0C8  4100B01C
5000D0CC  9280D0CC  58F0C078  4110D0C4  C2D3C4D4  F0F0F8F5*
02E3E7E3  400063A4  40400038  40400001  05EF4100  B2EF5000  D0C84100
B0245000  D0CC9280  D0CC58F0  C0784110  D0C405EF  4100B2C8  5000D0D4
58F0C078  4110D0D0  05EF7800  D3BC7000  C2D3C4D4  F0F0F8F6*
02E3E7E3  400063DC  40400038  40400001  B21C7800  D3307000  B2207800
D3BC7000  B2247800  D3307000  B22858F0  C0C84110  D0DC05EF  58F0C078
4110D0FC  05EF58F0  C0784110  D10805EF  C2D3C4D4  F0F0F8F7*
02E3E7E3  40006414  40400038  40400001  58F0C064  4110D114  05EF58F0
C0944110  D12005EF  41E00004  15FE4720  C20858EF  D04C07FE  58F0C0C0
4110D128  05EF5000  D4047800  D3B43300  C2D3C4D4  F0F0F8F8*
02E3E7E3  4000644C  40400038  40400001  7000C0FC  58F0C09C  4110D130
05EF41E0  000415FE  4720C23A  58EFD054  07FE5800  90385900  D3384130
000147C0  C24C1B33  58F0C054  5800F00C  C2D3C4D4  F0F0F8F9*
02E3E7E3  40006484  40400038  40400001  5900D338  41200001  4740C262
1B221623  8727C270  1BFF58E0  D00007FE  58F0C040  5800F00C  8707C286
58F0C088  4110D178  05EF58F0  C0405800  C2D3C4D4  F0F0F9F0**
02E3E7E3  400064BC  40400038  40400001  F00C8707  C38C5800  A0455900
D32C4120  00014780  C2A41B22  8727C2B4  58F0C040  5800F00C  8607C314
5800D334  58F0C018  5000F000  58F0C080  C2D3C4D4  F0F0F9F1*
02E3E7E3  400064F4  40400038  40400001  1B1105EF  41E00004  15FE4720
C2D858EF  D05C07FE  58F0C0CC  1B1105EF  58F0C0B0  4110D180  05EF41E0
000415FE  4720C2FA  58EFD064  07FE58F0  C2D3C4D4  F0F0F9F2*
02E3E7E3  4000652C  40400038  40400001  C06C4110  D19405EF  41E00004
15FE4720  C31458EF  D06C07FE  5800D44C  5900D32C  41200001  4780C326
1B228727  C33658F0  C0405800  F00C8607  C2D3C4D4  F0F0F9F3*
02E3E7E3  40006564  40400038  40400001  C38C58F0  C0801B11  05EF41E0
000415FE  4720C34E  58EFD074  07FE58F0  C0D04110  D17805EF  58F0C0B0
4110D180  05EF41E0  000415FE  4720C372  C2D3C4D4  F0F0F9F4*
02E3E7E3  4000659C  40400038  40400001  58EFD07C  07FE58F0  C06C4110
D19405EF  41E00004  15FE4720  C38C58EF  D08407FE  5800D338  5000800C
58F0C0A0  4110D1A4  05EF5800  D33858F0  C2D3C4D4  F0F0F9F5*
02E3E7E3  400065D4  40400038  40400001  C0285000  F00058F0  C07C4110
D1B405EF  58009038  5000D448  58F0C080  1B1105EF  41E00004  15FE4720
C3D458EF  D08C07FE  58F0C0DC  4110D1C8  C2D3C4D4  F0F0F9F6*
02E3E7E3  4000660C  40400038  40400001  05EF58F0  C0B04110  D18005EF
41E00004  15FE4720  C3F858EF  D09407FE  5800D3F8  12004780  C41C58F0

MEMBER NAME  BLDMFG
C06C4110  D19405EF  41E00004  15FE4720  C2D3C4D4  F0F0F9F7*
02E3E7E3  40006644  40400038  40400001  C41C58EF  D09C07FE  5860D338
58A0D344  18B75060  D45458F0  C0405800  F008860B  C44058F0  C0904110
D1D405EF  59A0D454  4780C426  5860C034  C2D3C4D4  F0F0F9F8*
02E3E7E3  4000667C  40400038  40400001  58A0C010  58B0C004  5800D454
5900D338  4770CBCC  5800A045  12004770  C4745800  D3F81200  4780C4F2
58F0C0BC  45E0F004  00000006  00000028  C2D3C4D4  F0F0F9F9*
02D9D3C4  40404040  40400038  40404040  002A0001  1C0062F4  002B0001
1C0062F8  002C0001  1C0062FC  002D0001  1C006300  002E0001  1C006304
002F0001  1C006308  00300001  1C00630C  C2D3C4D4  F0F1F0F0**
02E3E7E3  400066B4  40400038  40400001  45E0F010  5800A045  12004780
C4D45830  A0455C20  D3845880  D38458A0  D38418B3  5890C010  58F0C0BC
45E0F004  00000006  00000060  45E0F134  C2D3C4D4  F0F1F0F1*
02E3E7E3  400066EC  40400038  40400001  00010000  01289001  01000048
00000001  45E0F010  878AC4A8  5880C024  5890C01C  58A0C010  58B0C004
58F0C0BC  45E0F034  05404040  F2F358F0  C2D3C4D4  F0F1F0F2*
```

| | | | | | | |
|---|---|---|---|---|---|---|
| 02E3E7E3 | 40006724 | 40400038 | 40400001 | C0D84110 | D1A405EF | 58F0C08C |
| 4110D1E0 | 05EF5800 | 90385B00 | D4485000 | D4005830 | D4485A30 | D3385C20 |
| D3804103 | 90045000 | D1F058F0 | C0604110 | C2D3C4D4 | F0F1F0F3* | |
| 02E3E7E3 | 4000675C | 40400038 | 40400001 | D1E805EF | 5800D338 | 5000600C |
| 41039004 | 5000D1FC | 58F0C0AC | 4110D1FC | 05EF5800 | D3385000 | D3FC58F0 |
| C0A44110 | D21005EF | 58F0C014 | 5800F010 | C2D3C4D4 | F0F1F0F4* | |
| 02E3E7E3 | 40006794 | 40400038 | 40400001 | 12004780 | C5A058F0 | C0704110 |
| D21405EF | 5800D3D0 | 12004780 | C58C58F0 | C0BC45E0 | F0340540 | 4040F2F5 |
| 5800D338 | 58F0C054 | 5000F008 | 5800D32C | C2D3C4D4 | F0F1F0F5* | |
| 02E3E7E3 | 400067CC | 40400038 | 40400001 | 5000F00C | 5800D338 | 5000D418 |
| 5000D41C | 5860D338 | 58B0C034 | 58A0C054 | 5890C004 | 5880C02C | 5870C030 |
| 5830D41C | 5C20D35C | 5030C0F4 | 5963B00C | C2D3C4D4 | F0F1F0F6* | |
| 02E3E7E3 | 40006804 | 40400038 | 40400001 | 4780C9DA | 58F0C098 | 4110D220 |
| 05EF41E0 | 000415FE | 4720C5F2 | 58EFD0A4 | 07FE5800 | D3D85900 | D42C4750 |
| C60A5800 | D3DC5900 | D3504770 | C63058F0 | C2D3C4D4 | F0F1F0F7* | |
| 02E3E7E3 | 4000683C | 40400038 | 40400001 | C0BC1800 | 45E0F004 | 00000006 |
| 00000156 | 45E0F008 | 0450D3D8 | 45E0F008 | 0450D3DC | 45E0F010 | 5800D3D8 |
| 5900D42C | 4750C648 | 5800D3DC | 5900D350 | C2D3C4D4 | F0F1F0F8* | |
| 02E3E7E3 | 40006874 | 40400038 | 40400001 | 4770C652 | 58F0C0C4 | 4110D228 |
| 05EF5800 | D3D85900 | D42C4750 | C66A5800 | D3DC5900 | D3504770 | C67458F0 |
| C0A44110 | D21005EF | 5060D3F0 | 5060D428 | C2D3C4D4 | F0F1F0F9* | |
| 02E3E7E3 | 400068AC | 40400038 | 40400001 | 58E0C0F4 | 410EB004 | 5000D240 |
| 410EB008 | 5000D244 | 9280D244 | 58F0C084 | 4110D230 | 05EF58F0 | C0801B11 |
| 05EF41E0 | 000415FE | 4720C6B6 | 58EFD0AC | C2D3C4D4 | F0F1F1F0** | |
| 02E3E7E3 | 400068E4 | 40400038 | 40400001 | 07FE5820 | A00C5020 | D4581842 |
| 1A468940 | 00035830 | A00C1A36 | 89300004 | 4104A008 | 5000D26C | 58F0C058 |
| 4103F004 | 5000D270 | 58F0C068 | 4110D248 | C2D3C4D4 | F0F1F1F1* | |
| 02E3E7E3 | 4000691C | 40400038 | 40400001 | 05EF1322 | 5A20A00C | 5020D40C |
| 5800D328 | 5000D3E4 | 5800D444 | 120047C0 | C7125800 | D3345000 | D3E458F0 |
| C05C4110 | D27C05EF | 58F0C0A8 | 4110D294 | C2D3C4D4 | F0F1F1F2* | |
| 02E3E7E3 | 40006954 | 40400038 | 40400001 | 05EF5800 | D4441200 | 47C0C73C |
| 5800D334 | 58F0C018 | 5000F000 | 5800D444 | 120047C0 | C7525820 | D4448920 |
| 00025062 | 91F05820 | D4581A26 | 5020C0F8 | C2D3C4D4 | F0F1F1F3* | |
| 02E3E7E3 | 4000698C | 40400038 | 40400001 | 40209016 | 5800D40C | 40009018 |
| 5800D418 | 12004780 | C7B65820 | D4188920 | 00025880 | D34418B2 | 5870C00C |
| 58389028 | 10335C20 | D38C4103 | 70545000 | C2D3C4D4 | F0F1F1F4* | |
| 02E3E7E3 | 400069C4 | 40400038 | 40400001 | D2CC4100 | 90165000 | D2D09280 |
| D2D058F0 | C0784110 | D2C805EF | 5A80D344 | 198B47C0 | C7845870 | C0305880 |
| C02C58B0 | C0345800 | D4181200 | 4780C8FE | C2D3C4D4 | F0F1F1F5* | |
| 02E3E7E3 | 400069FC | 40400038 | 40400001 | 58F0C014 | 5800F010 | 12004780 |
| C8FE58F0 | C0185800 | F0001BFF | 860FC8FE | 5800C0F8 | 89000003 | 5000C0E8 |
| 5800D418 | 89000002 | 5000C0E4 | 5800D368 | C2D3C4D4 | F0F1F1F6* | |

MEMBER NAME BLDMFG

| | | | | | | |
|---|---|---|---|---|---|---|
| 02E3E7E3 | 40006A34 | 40400038 | 40400001 | 5000C0EC | 5870D344 | 18BA58A0 |
| C0145880 | C04858E0 | C0EC782E | A0087020 | 9204782E | A00C7020 | 920858E0 |
| C0E8410E | B0085000 | D2E058F0 | C0D44110 | C2D3C4D4 | F0F1F1F7* | |
| 02E3E7E3 | 40006A6C | 40400038 | 40400001 | D2D405EF | 5800D3EC | 5900D33C |
| 4770C8D6 | 188718A7 | 58B0C0E4 | 5870C00C | 58289028 | 10221852 | 5C40D38C |
| 2B007805 | 70086A00 | D3186000 | D3085830 | C2D3C4D4 | F0F1F1F8* | |
| 02E3E7E3 | 40006AA4 | 40400038 | 40400001 | D30C5030 | 920C5060 | 92102B00 |
| 7805700C | 6A00D318 | 6000D308 | 5830D30C | 50309214 | 50209218 | 58F0C074 |
| 4110D2EC | 05EF5800 | D3D01200 | 4780C8D2 | C2D3C4D4 | F0F1F1F9* | |
| 02E3E7E3 | 40006ADC | 40400038 | 40400001 | 5860C034 | 5880C024 | 5890C01C |
| 58A0C010 | 58B0C004 | 5870D3C0 | 58F0C0BC | 45E0F034 | 05404040 | F2F5878A |
| C8585880 | C04858A0 | C01458B0 | C0545870 | C2D3C4D4 | F0F1F2F0** | |
| 02E3E7E3 | 40006B14 | 40400038 | 40400001 | D3445A60 | D3385800 | C0EC5A00 |
| D3685000 | C0EC5960 | A01047C0 | C8165870 | C0305880 | C02C58A0 | C05458B0 |
| C0345860 | D3385800 | D4181200 | 4780C9A8 | C2D3C4D4 | F0F1F2F1* | |
| 02E3E7E3 | 40006B4C | 40400038 | 40400001 | 5800D444 | 5700D324 | 5000D314 |
| 6800D310 | 6B00D320 | 7000C0F0 | 5820D418 | 89200002 | 5850D444 | 5890D344 |

```
58A0D344  18B27840  D4107860  D3E05880  C2D3C4D4  F0F1F2F2*
02E3E7E3  40006B84  40400038  40400001  C0045870  C00C5860  C0445839
80281033  5C20D38C  5030C0E0  580065E0  5700D324  5000D314  6820D310
6B20D320  30227023  70387800  C0F07003  C2D3C4D4  F0F1F2F3*
02E3E7E3  40006BBC  40400038  40400001  703C1255  4770C9A4  70637014
70437028  7800D414  7003702C  879AC95E  5870C030  5880C02C  5890C004
58A0C054  58B0C034  5860D338  58F0C0B0  C2D3C4D4  F0F1F2F4*
02E3E7E3  40006BF4  40400038  40400001  4110D180  05EF41E0  000415FE
4720C9DA  58EFD0B4  07FE5820  D41C1A26  5020D41C  5920B00C  47C0C5C4
5860C034  5880C024  5890C01C  58A0C010  C2D3C4D4  F0F1F2F5*
02E3E7E3  40006C2C  40400038  40400001  58B0C004  5870D3C0  58F0C018
5800F000  8707CB90  5800B1F4  5900D338  4770CA70  5850A045  5A50D338
5050A045  5950D424  47A0CB90  58F0C0BC  C2D3C4D4  F0F1F2F6*
02E3E7E3  40006C64  40400038  40400001  45E0F004  00000000  00000069
45E0F010  58F0C0BC  45E0F000  00000000  00000094  5C40D384  45E0F134
00010000  0125A001  01000048  00000001  C2D3C4D4  F0F1F2F7*
02E3E7E3  40006C9C  40400038  40400001  45E0F010  5800B1F8  5900D338
4770CAD0  5850A045  5A50D338  5050A045  5950D424  47A0CB90  58F0C0BC
45E0F004  00000000  0000009A  45E0F010  C2D3C4D4  F0F1F2F8*
02E3E7E3  40006CD4  40400038  40400001  58F0C0BC  45E0F000  00000000
00000094  5C40D384  45E0F134  00010000  0125A001  01000048  00000001
45E0F010  5800B1FC  5900D338  4770CB30  C2D3C4D4  F0F1F2F9*
02E3E7E3  40006D0C  40400024  40400001  5850A045  5A50D338  5050A045
5950D424  47A0CB90  58F0C0BC  45E0F004  00000000  000000BF  40404040
40404040  40404040  40404040  40404040  C2D3C4D4  F0F1F3F0**
02D9D3C4  40404040  40400038  40404040  00010001  0C0066B0  00010001
0C0066E4  00010001  0C006848  00010001  0C006C6C  00010001  0C006C80
00010001  0C006CCC  00010001  0C006CE0  C2D3C4D4  F0F1F3F1*
02E3E7E3  40006D30  40400038  40400001  45E0F010  58F0C0BC  45E0F000
00000000  00000094  5C40D384  45E0F134  00010000  0125A001  01000048
00000001  45E0F010  5800B200  5900D338  C2D3C4D4  F0F1F3F2*
02E3E7E3  40006D68  40400038  40400001  4770CB90  5850A045  5A50D338
5050A045  5950D424  47A0CB90  58F0C0BC  45E0F004  00000000  000000E1
45E0F010  58F0C0BC  45E0F000  00000000  C2D3C4D4  F0F1F3F3*
02E3E7E3  40006DA0  40400038  40400001  00000094  5C40D384  45E0F134
00010000  0125A001  01000048  00000001  45E0F010  58F0C0C4  4110D228
05EF5800  D3385000  D45458F0  C0405800  C2D3C4D4  F0F1F3F4*
02E3E7E3  40006DD8  40400038  40400001  F0088607  CBB858F0  C0904110
D2F805EF  5800D454  5900D338  4770CBCC  1BFF58E0  D00007FE  58F0C0BC
45E0F004  00000006  00000102  45E0F008  C2D3C4D4  F0F1F3F5*
02E3E7E3  40006E10  40400038  40400001  0450D454  45E0F010  58F0C0BC

MEMBER NAME  BLDMFG
45E0F034  05404040  F1F15860  C0345880  C0245890  C01C58A0  C01058B0
C0045870  D3C058F0  C0BC1800  45E0F004  C2D3C4D4  F0F1F3F6*
02E3E7E3  40006E48  40400034  40400001  00000006  00000123  45E0F010
58F0C0BC  45E0F034  05404040  F1F558D0  D00458E0  D00C92FF  D00C982C
D01C07FE  58C0D048  47F0C104  40404040  C2D3C4D4  F0F1F3F7*
02E3E7E3  40000020  40400008  40400001  00006E74  000001A0  40404040
40404040  40404040  40404040  40404040  40404040  40404040  40404040
40404040  40404040  40404040  40404040  C2D3C4D4  F0F1F3F8*
02D9D3C4  40404040  40400038  40404040  00010001  0C006D2C  00010001
0C006D40  00010001  0C006D8C  00010001  0C006DA0  00010001  0C006E08
00010001  0C006E4C  00010001  0C000020  C2D3C4D4  F0F1F3F9*
02E3E7E3  400001A0  40400004  40400001  00006E62  40404040  40404040
40404040  40404040  40404040  40404040  40404040  40404040  40404040
40404040  40404040  40404040  40404040  C2D3C4D4  F0F1F4F0**
02E3E7E3  400001E8  40400018  40400001  00006230  00006438  00006438
0000646A  000064A0  00006508  40404040  40404040  40404040  40404040
40404040  40404040  40404040  40404040  C2D3C4D4  F0F1F4F1*
02D9D3C4  40404040  40400038  40404040  00010001  0C000024  00010001
```

```
0C0001A0  00010001  0C0001E8  00010001  0C0001EC  00010001  0C0001F0
00010001  0C0001F4  00010001  0C0001F8  C2D3C4D4  F0F1F4F2*
02E3E7E3  40000200  4040001C  40400001  00006544  0000652A  00006544
00006544  00006544  0000657E  000065BC  40404040  40404040  40404040
40404040  40404040  40404040  40404040  C2D3C4D4  F0F1F4F3*
02D9D3C4  40404040  40400038  40404040  00010001  0C0001FC  00010001
0C000200  00010001  0C000204  00010001  0C000208  00010001  0C00020C
00010001  0C000210  00010001  0C000214  C2D3C4D4  F0F1F4F4*
02E3E7E3  4000021C  4040001C  40400001  000065A2  000065BC  000065BC
000065BC  00006604  00006604  00006628  40404040  40404040  40404040
40404040  40404040  40404040  40404040  C2D3C4D4  F0F1F4F5*
02D9D3C4  40404040  40400038  40404040  00010001  0C000218  00010001
0C00021C  00010001  0C000220  00010001  0C000224  00010001  0C000228
00010001  0C00022C  00010001  0C000230  C2D3C4D4  F0F1F4F6*
02E3E7E3  40000238  4040001C  40400001  00006628  0000664C  0000664C
00006822  00006E26  000068E6  00006E26  40404040  40404040  40404040
40404040  40404040  40404040  40404040  C2D3C4D4  F0F1F4F7*
02D9D3C4  40404040  40400038  40404040  00010001  0C000234  00010001
0C000238  00010001  0C00023C  00010001  0C000240  00010001  0C000244
00010001  0C000248  00010001  0C00024C  C2D3C4D4  F0F1F4F8*
02E3E7E3  40000254  40400014  40400001  00006C0A  00006E26  80005F34
80005F2C  000004EC  40404040  40404040  40404040  40404040  40404040
40404040  40404040  40404040  40404040  C2D3C4D4  F0F1F4F9*
02E3E7E3  4000026C  40400008  40400001  80000000  000004E4  40404040
40404040  40404040  40404040  40404040  40404040  40404040  40404040
40404040  40404040  40404040  40404040  C2D3C4D4  F0F1F5F0**
02E3E7E3  40000278  40400004  40400001  80000014  40404040  40404040
40404040  40404040  40404040  40404040  40404040  40404040  40404040
40404040  40404040  40404040  40404040  C2D3C4D4  F0F1F5F1*
02D9D3C4  40404040  40400038  40404040  00010001  0C000250  00010001
0C000254  00010001  0C000258  00010001  0C00025C  00010001  0C000260
00010001  0C000264  00010001  0C000270  C2D3C4D4  F0F1F5F2*
02E3E7E3  4000027C  4040001C  40400001  000004DC  000005A0  00000000
000007D4  000005C0  000005F0  000005FC  40404040  40404040  40404040
40404040  40404040  40404040  40404040  C2D3C4D4  F0F1F5F3*
02D9D3C4  40404040  40400038  40404040  000B0001  0C000278  00010001
0C00027C  00010001  0C000280  000F0001  0C000284  000F0001  0C000288
00010001  0C00028C  00010001  0C000290  C2D3C4D4  F0F1F5F4*
02E3E7E3  40000298  4040001C  40400001  80005F11  000004E4  00000588
80000000  000004EC  000060FC  80000004  40404040  40404040  40404040

MEMBER NAME  BLDMFG
40404040  40404040  40404040  40404040  C2D3C4D4  F0F1F5F5*
02D9D3C4  40404040  40400038  40404040  00010001  0C000294  00010001
0C000298  00010001  0C00029C  00010001  0C0002A0  000C0001  0C0002A4
00010001  0C0002A8  00010001  0C0002AC  C2D3C4D4  F0F1F5F6*
02E3E7E3  400002B4  4040001C  40400001  00005F11  000060FC  80000588
00000538  80000538  00006190  8000053C  40404040  40404040  40404040
40404040  40404040  40404040  40404040  C2D3C4D4  F0F1F5F7*
02D9D3C4  40404040  40400038  40404040  000C0001  0C0002B0  00010001
0C0002B4  00010001  0C0002B8  00010001  0C0002BC  00010001  0C0002C0
00010001  0C0002C4  00010001  0C0002C8  C2D3C4D4  F0F1F5F8*
02E3E7E3  400002D0  4040001C  40400001  0000632C  00000558  000004CC
000005A4  00000548  00000544  00006190  40404040  40404040  40404040
40404040  40404040  40404040  40404040  C2D3C4D4  F0F1F5F9*
02D9D3C4  40404040  40400038  40404040  00010001  0C0002CC  00010001
0C0002D0  00010001  0C0002D4  00010001  0C0002D8  00010001  0C0002DC
00010001  0C0002E0  00010001  0C0002E4  C2D3C4D4  F0F1F6F0**
02E3E7E3  400002EC  4040001C  40400001  000004CC  000004CC  000004CC
000004CC  000004D8  000004E0  000004CC  40404040  40404040  40404040
40404040  40404040  40404040  40404040  C2D3C4D4  F0F1F6F1*
```

| | | | | | | |
|---|---|---|---|---|---|---|
| 02D9D3C4 | 40404040 | 40400038 | 40404040 | 00010001 | 0C0002E8 | 00010001 |
| 0C0002EC | 00010001 | 0C0002F0 | 00010001 | 0C0002F4 | 00010001 | 0C0002F8 |
| 00010001 | 0C0002FC | 00010001 | 0C000300 | C2D3C4D4 | F0F1F6F2* | |
| 02E3E7E3 | 40000308 | 4040001C | 40400001 | 000004CC | 00000548 | 0000054C |
| 800004CC | 000026D1 | 800005EC | 000004D0 | 40404040 | 40404040 | 40404040 |
| 40404040 | 40404040 | 40404040 | 40404040 | C2D3C4D4 | F0F1F6F3* | |
| 02D9D3C4 | 40404040 | 40400038 | 40404040 | 00010001 | 0C000304 | 00010001 |
| 0C000308 | 00010001 | 0C00030C | 00010001 | 0C000310 | 00010001 | 0C000314 |
| 00010001 | 0C000318 | 00010001 | 0C00031C | C2D3C4D4 | F0F1F6F4* | |
| 02E3E7E3 | 40000324 | 4040001C | 40400001 | 000004D0 | 000004D0 | 000004D0 |
| 800005DC | 0000612C | 00006134 | 000005DC | 40404040 | 40404040 | 40404040 |
| 40404040 | 40404040 | 40404040 | 40404040 | C2D3C4D4 | F0F1F6F5* | |
| 02D9D3C4 | 40404040 | 40400038 | 40404040 | 00010001 | 0C000320 | 00010001 |
| 0C000324 | 00010001 | 0C000328 | 00010001 | 0C00032C | 00010001 | 0C000330 |
| 00010001 | 0C000334 | 00010001 | 0C000338 | C2D3C4D4 | F0F1F6F6* | |
| 02E3E7E3 | 40000340 | 4040001C | 40400001 | 80000550 | 00000004 | 00000000 |
| 00000004 | 80000000 | 00000004 | 00000000 | 40404040 | 40404040 | 40404040 |
| 40404040 | 40404040 | 40404040 | 40404040 | C2D3C4D4 | F0F1F6F7* | |
| 02D9D3C4 | 40404040 | 40400038 | 40404040 | 00010001 | 0C00033C | 00010001 |
| 0C000340 | 00070001 | 0C000344 | 00070001 | 0C000348 | 00080001 | 0C00034C |
| 00080001 | 0C000350 | 00070001 | 0C000354 | C2D3C4D4 | F0F1F6F8* | |
| 02E3E7E3 | 4000035C | 4040001C | 40400001 | 00000004 | 00000000 | 8000EA64 |
| 00000004 | 00000000 | 80000598 | 000004DC | 40404040 | 40404040 | 40404040 |
| 40404040 | 40404040 | 40404040 | 40404040 | C2D3C4D4 | F0F1F6F9* | |
| 02D9D3C4 | 40404040 | 40400038 | 40404040 | 00070001 | 0C000358 | 00080001 |
| 0C00035C | 00080001 | 0C000360 | 00080001 | 0C000364 | 00080001 | 0C000368 |
| 00080001 | 0C00036C | 00010001 | 0C000370 | C2D3C4D4 | F0F1F7F0** | |
| 02E3E7E3 | 40000378 | 40400018 | 40400001 | 000005F4 | 800005E0 | 00000004 |
| 80000000 | 000060CC | 000004E0 | 40404040 | 40404040 | 40404040 | 40404040 |
| 40404040 | 40404040 | 40404040 | 40404040 | C2D3C4D4 | F0F1F7F1* | |
| 02E3E7E3 | 40000394 | 40400004 | 40400001 | 00000520 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F7F2* | |
| 02D9D3C4 | 40404040 | 40400038 | 40404040 | 00010001 | 0C000374 | 00010001 |
| 0C000378 | 00010001 | 0C00037C | 00080001 | 0C000380 | 00080001 | 0C000384 |
| 00010001 | 0C000388 | 00010001 | 0C00038C | C2D3C4D4 | F0F1F7F3* | |
| 02E3E7E3 | 40000398 | 40400004 | 40400001 | 800005A0 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F7F4* | |

MEMBER NAME BLDMFG

| | | | | | | |
|---|---|---|---|---|---|---|
| 02E3E7E3 | 400003A0 | 40400018 | 40400001 | 000005A0 | 000005E8 | 00000004 |
| 80000000 | 8000059C | 00006160 | 40404040 | 40404040 | 40404040 | 40404040 |
| 40404040 | 40404040 | 40404040 | 40404040 | C2D3C4D4 | F0F1F7F5* | |
| 02D9D3C4 | 40404040 | 40400038 | 40404040 | 00010001 | 0C000394 | 00010001 |
| 0C000398 | 00010001 | 0C0003A0 | 00010001 | 0C0003A4 | 000A0001 | 0C0003A8 |
| 000A0001 | 0C0003AC | 00010001 | 0C0003B0 | C2D3C4D4 | F0F1F7F6* | |
| 02E3E7E3 | 400003B8 | 4040001C | 40400001 | 00006140 | 80000570 | 00000578 |
| 8000057C | 000005FE | 800005D8 | 00000000 | 40404040 | 40404040 | 40404040 |
| 40404040 | 40404040 | 40404040 | 40404040 | C2D3C4D4 | F0F1F7F7* | |
| 02D9D3C4 | 40404040 | 40400038 | 40404040 | 00010001 | 0C0003B4 | 00010001 |
| 0C0003B8 | 00010001 | 0C0003BC | 00010001 | 0C0003C0 | 00010001 | 0C0003C4 |
| 00010001 | 0C0003C8 | 00010001 | 0C0003CC | C2D3C4D4 | F0F1F7F8* | |
| 02E3E7E3 | 400003D4 | 4040000C | 40400001 | 00000590 | 00014820 | 000005C8 |
| 40404040 | 40404040 | 40404040 | 40404040 | 40404040 | 40404040 | 40404040 |
| 40404040 | 40404040 | 40404040 | 40404040 | C2D3C4D4 | F0F1F7F9* | |
| 02E3E7E3 | 400003E4 | 40400014 | 40400001 | 80000000 | 00000000 | 00000590 |
| 00014820 | 000005C8 | 40404040 | 40404040 | 40404040 | 40404040 | 40404040 |
| 40404040 | 40404040 | 40404040 | 40404040 | C2D3C4D4 | F0F1F8F0** | |
| 02D9D3C4 | 40404040 | 40400038 | 40404040 | 00090001 | 0C0003D0 | 00010001 |
| 0C0003D4 | 00090001 | 0C0003D8 | 00010001 | 0C0003DC | 00090001 | 0C0003E8 |

```
00010001  0C0003EC  00090001  0C0003F0  C2D3C4D4  F0F1F8F1*
02E3E7E3  400003F8  40400014  40400001  00000580  000005B0  000005B4
00000000  001082A0  40404040  40404040  40404040  40404040  40404040
40404040  40404040  40404040  40404040  C2D3C4D4  F0F1F8F2*
02E3E7E3  40000414  40400008  40400001  001082A4  800005E4  40404040
40404040  40404040  40404040  40404040  40404040  40404040  40404040
40404040  40404040  40404040  40404040  C2D3C4D4  F0F1F8F3*
02D9D3C4  40404040  40400038  40404040  00010001  0C0003F4  00010001
0C0003F8  00010001  0C0003FC  00010001  0C000400  000F0001  0C000404
000F0001  0C000408  000F0001  0C000414  C2D3C4D4  F0F1F8F4*
02E3E7E3  4000041C  4040001C  40400001  00000000  00000590  00014820
000005C8  000005D0  80000584  00000004  40404040  40404040  40404040
40404040  40404040  40404040  40404040  C2D3C4D4  F0F1F8F5*
02D9D3C4  40404040  40400038  40404040  00010001  0C000418  00090001
0C00041C  00010001  0C000420  00090001  0C000424  00010001  0C000428
00010001  0C00042C  00010001  0C000430  C2D3C4D4  F0F1F8F6*
02E3E7E3  40000438  4040001C  40400001  00000000  00000004  00000000
00000004  00000000  000005FE  000005D8  40404040  40404040  40404040
40404040  40404040  40404040  40404040  C2D3C4D4  F0F1F8F7*
02D9D3C4  40404040  40400038  40404040  00070001  0C000434  00070001
0C000438  00030001  0C00043C  00030001  0C000440  000A0001  0C000444
000A0001  0C000448  00010001  0C00044C  C2D3C4D4  F0F1F8F8*
02E3E7E3  40000454  40400018  40400001  000005E4  0000059C  000005BC
00005F3C  800005B8  000004E4  40404040  40404040  40404040  40404040
40404040  40404040  40404040  40404040  C2D3C4D4  F0F1F8F9*
02E3E7E3  40000470  40400008  40400001  80000000  00006114  40404040
40404040  40404040  40404040  40404040  40404040  40404040  40404040
40404040  40404040  40404040  40404040  C2D3C4D4  F0F1F9F0**
02D9D3C4  40404040  40400038  40404040  00010001  0C000450  00010001
0C000454  00010001  0C000458  00010001  0C00045C  00010001  0C000460
00010001  0C000464  00010001  0C000468  C2D3C4D4  F0F1F9F1*
02E3E7E3  40000478  40400008  40400001  00000000  001082A0  40404040
40404040  40404040  40404040  40404040  40404040  40404040  40404040
40404040  40404040  40404040  40404040  C2D3C4D4  F0F1F9F2*
02E3E7E3  40000484  40400014  40400001  000005AC  8000058C  0000611C
00000508  80000570  40404040  40404040  40404040  40404040  40404040
40404040  40404040  40404040  40404040  C2D3C4D4  F0F1F9F3*
02D9D3C4  40404040  40400038  40404040  00010001  0C000474  000F0001

MEMBER NAME  BLDMFG
0C000478  000F0001  0C00047C  00010001  0C000484  00010001  0C000488
00010001  0C00048C  00010001  0C000490  C2D3C4D4  F0F1F9F4*
02E3E7E3  40000498  4040000C  40400001  000004DC  000005F4  80000594
40404040  40404040  40404040  40404040  40404040  40404040  40404040
40404040  40404040  40404040  40404040  C2D3C4D4  F0F1F9F5*
02E3E7E3  40006310  40400024  40400001  00000000  00000000  00000000
00000000  00000000  00000000  00000000  00000000  00000000  40404040
40404040  40404040  40404040  40404040  C2D3C4D4  F0F1F9F6*
02D9D3C4  40404040  40400020  40404040  00010001  0C000494  00010001
0C000498  00010001  0C00049C  00010001  0C0004A0  40404040  40404040
40404040  40404040  40404040  40404040  C2D3C4D4  F0F1F9F7*
02C5D5C4  40404040  40404040  40404040  40404040  40404040  40404040
00006E7C  F1F5F7F3  F460C6D6  F34040F0  F2F0F2F8  F7F0F9F8  40F0F84B
F1F24BF1  F3404040  C2D3C4D4  C6C74040  C2D3C4D4  F0F1F9F8**

MEMBER NAME  BLDSEQ
02C5E2C4  40404040  40400010  40400001  C2D3C4E2  C5D84040  00000000
40000000  40404040  40404040  40404040  40404040  40404040  40404040
40404040  40404040  40404040  40404040  C2D3C4E2  F0F0F0F1*
02E3E7E3  40000000  40400038  40400001  47F0F00C  07C2D3C4  E2C5D840
90ECD00C  184D98CD  F0205040  D00450D0  400807FC  40404040  40404040
```

```
021A01D3  10040408  1A025BD7  10011A03  C2D3C4E2  F0F0F0F2*
02E3E7E3  40000038  4040000E  40400001  407E400A  06021C22  02066414
01224040  40404040  40404040  40404040  40404040  40404040  40404040
40404040  40404040  40404040  40404040  C2D3C4E2  F0F0F0F3*
02E3E7E3  400001B0  40400038  40400001  00000000  00000000  4F080000
00000000  00000000  00000000  00000000  00000001  00000001  00000002
00000003  00000004  00000005  00000006  C2D3C4E2  F0F0F0F4*
02E3E7E3  400001E8  40400038  40400001  00000007  00000008  0000000A
0000000B  0000000C  00000010  00000011  00000016  0000001D  00000029
0000002C  00000035  00000038  00000041  C2D3C4E2  F0F0F0F5*
02C5E2C4  40404040  40400010  40400002  C5D3D4E3  C2D34040  05000000
400D7D28  40404040  40404040  40404040  40404040  40404040  40404040
40404040  40404040  40404040  40404040  C2D3C4E2  F0F0F0F6*
02E3E7E3  40000220  40400024  40400001  0000004D  00000059  00000065
40122D0E  4019999A  402624DD  41100000  00000000  00000000  40404040
40404040  40404040  40404040  40404040  C2D3C4E2  F0F0F0F7*
02C5E2C4  40404040  40400010  40400003  C9D7D5E3  D9404040  05000000
4000EA68  40404040  40404040  40404040  40404040  40404040  40404040
40404040  40404040  40404040  40404040  C2D3C4E2  F0F0F0F8*
02C5E2C4  40404040  40400010  40400004  C4C5E3C1  C2D34040  05000000
40015950  40404040  40404040  40404040  40404040  40404040  40404040
40404040  40404040  40404040  40404040  C2D3C4E2  F0F0F0F9*
02C5E2C4  40404040  40400010  40400005  C9C4E4D7  C5404040  05000000
40008CA4  40404040  40404040  40404040  40404040  40404040  40404040
40404040  40404040  40404040  40404040  C2D3C4E2  F0F0F1F0**
02C5E2C4  40404040  40400010  40400006  C3C4E3C3  D6D44040  05000000
4000008C  40404040  40404040  40404040  40404040  40404040  40404040
40404040  40404040  40404040  40404040  C2D3C4E2  F0F0F1F1*
02E3E7E3  400003A0  40400020  40400001  FFFFFFC8  000CD118  FFFFFFF4
0000EA64  FFFFFFC4  000147F0  FFFFFFF4  00000000  40404040  40404040
40404040  40404040  40404040  40404040  C2D3C4E2  F0F0F1F2*
02D9D3C4  40404040  40400038  40404040  00020001  0C0003A0  00020001
0C0003A4  00030001  0C0003A8  00030001  0C0003AC  00040001  0C0003B0
00040001  0C0003B4  00050001  0C0003B8  C2D3C4E2  F0F0F1F3*
02C5E2C4  40404040  40400010  40400007  E5F9F940  40404040  05000000
4000003C  40404040  40404040  40404040  40404040  40404040  40404040
40404040  40404040  40404040  40404040  C2D3C4E2  F0F0F1F4*
02C5E2C4  40404040  40400010  40400008  C2D3C4C5  E3404040  02000000
40000000  40404040  40404040  40404040  40404040  40404040  40404040
40404040  40404040  40404040  40404040  C2D3C4E2  F0F0F1F5*
02C5E2C4  40404040  40400010  40400009  C3C1C4D3  E3404040  02000000
40000000  40404040  40404040  40404040  40404040  40404040  40404040
40404040  40404040  40404040  40404040  C2D3C4E2  F0F0F1F6*
02C5E2C4  40404040  40400010  4040000A  C4C5D9D6  E3404040  02000000
40000000  40404040  40404040  40404040  40404040  40404040  40404040
40404040  40404040  40404040  40404040  C2D3C4E2  F0F0F1F7*
02C5E2C4  40404040  40400010  4040000B  C4C9E3E3  D6404040  02000000
40000000  40404040  40404040  40404040  40404040  40404040  40404040
40404040  40404040  40404040  40404040  C2D3C4E2  F0F0F1F8*
02C5E2C4  40404040  40400010  4040000C  D4E5C3C8  D9404040  02000000
40000000  40404040  40404040  40404040  40404040  40404040  40404040
40404040  40404040  40404040  40404040  C2D3C4E2  F0F0F1F9*
02C5E2C4  40404040  40400010  4040000D  C2C5C7C4  C5E34040  02000000

MEMBER NAME  BLDSEQ
40000000  40404040  40404040  40404040  40404040  40404040  40404040
40404040  40404040  40404040  40404040  C2D3C4E2  F0F0F2F0**
02E3E7E3  400003C0  4040001C  40400001  FFFFFFFC  00000000  00000000
00000000  00000000  00000000  00000000  40404040  40404040  40404040
40404040  40404040  40404040  40404040  C2D3C4E2  F0F0F2F1*
02E3E7E3  400003E0  40400004  40400001  00000000  40404040  40404040
```

```
40404040  40404040  40404040  40404040  40404040  40404040  40404040
40404040  40404040  40404040  40404040  C2D3C4E2  F0F0F2F2*
02D9D3C4  40404040  40400038  40404040  00060001  0C0003BC  00070001
0C0003C0  00080001  1C0003C4  00090001  1C0003C8  000A0001  1C0003CC
000B0001  1C0003D0  000C0001  1C0003D4  C2D3C4E2  F0F0F2F3*
02C5E2C4  40404040  40400010  4040000E  C2D3C4C4  D9E54040  02000000
40000000  40404040  40404040  40404040  40404040  40404040  40404040
40404040  40404040  40404040  40404040  C2D3C4E2  F0F0F2F4*
02C5E2C4  40404040  40400010  4040000F  C3C1C4E2  E4D74040  02000000
40000000  40404040  40404040  40404040  40404040  40404040  40404040
40404040  40404040  40404040  40404040  C2D3C4E2  F0F0F2F5*
02C5E2C4  40404040  40400010  40400010  C5D5C4C4  C5E34040  02000000
40000000  40404040  40404040  40404040  40404040  40404040  40404040
40404040  40404040  40404040  40404040  C2D3C4E2  F0F0F2F6*
02C5E2C4  40404040  40400010  40400011  C9C2C3D6  D47B4040  02000000
40000000  40404040  40404040  40404040  40404040  40404040  40404040
40404040  40404040  40404040  40404040  C2D3C4E2  F0F0F2F7*
02C5E2C4  40404040  40400010  40400012  E2E3D4D6  C4D34040  02000000
40000000  40404040  40404040  40404040  40404040  40404040  40404040
40404040  40404040  40404040  40404040  C2D3C4E2  F0F0F2F8*
02E3E7E3  400003E4  40400014  40400001  00000000  00000000  00000000
00000000  00000000  40404040  40404040  40404040  40404040  40404040
40404040  40404040  40404040  40404040  C2D3C4E2  F0F0F2F9*
02E3E7E3  4000043C  40400038  40400001  5870D378  5880D390  58B0D374
58A0D3DC  5890D3E0  5860D178  5800D188  5000B004  5800D17C  5000B008
5800D184  50007034  5060D220  5060D208  C2D3C4E2  F0F0F3F0**
02E3E7E3  40000474  40400038  40400001  7800D180  7000D33C  7800D180
7000D340  7800D180  7000D344  7800D180  7000D348  2B00780A  80006A00
D1706000  D1685830  D16C5030  D2102B00  C2D3C4E2  F0F0F3F1*
02E3E7E3  400004AC  40400038  40400001  78098000  6A00D170  6000D168
5820D16C  5020D21C  5030D23C  5020D240  58F0D3AC  4110D06C  05EF5800
D1885000  D1FC50A0  D3C45090  D3C85800  C2D3C4E2  F0F0F3F2*
02E3E7E3  400004E4  40400038  40400001  D3E45000  D3CC5800  D3E85000
D3D05800  D3EC5000  D3D45800  D3F05000  D3D858B0  D3B858A0  D3685890
D36C5860  D37058E0  D3C42B00  780E8000  C2D3C4E2  F0F0F3F3*
02E3E7E3  4000051C  40400038  40400001  6A00D170  6000D168  5820D16C
5020D210  5800D178  5000D22C  122247A0  D4FA5800  D1845000  D22C58E0
D3C82B00  780E8000  6A00D170  6000D168  C2D3C4E2  F0F0F3F4*
02E3E7E3  40000554  40400038  40400001  5820D16C  5020D21C  58E0D3CC
2B00780E  80006A00  D1706000  D1685800  D16C5000  D2145800  D2105900
D23C4770  D7AE5800  D2201BFF  860FD7D6  C2D3C4E2  F0F0F3F5*
02E3E7E3  4000058C  40400038  40400001  5920D240  4770D78E  5800D188
5000D20C  5000D224  5850D214  5C40D1B0  41056004  5000D08C  41056008
5000D090  9280D090  58F0D39C  4110D07C  C2D3C4E2  F0F0F3F6*
02E3E7E3  400005C4  40400038  40400001  05EF58F0  D3981B11  05EF41E0
000415FE  4720D596  58EFD04C  07FE58F0  D3804110  D09405EF  58F0D37C
4110D098  05EF58F0  D3804110  D0B005EF  C2D3C4E2  F0F0F3F7*
02E3E7E3  400005FC  40400038  40400001  58E0D3D0  410E8000  5000D0BC
9280D0BC  58F0D38C  4110D0B4  05EF58F0  D3844110  D0C005EF  58F0D3A8
45E0F004  00000000  00000028  45E0F008  C2D3C4E2  F0F0F3F8*
02E3E7E3  40000634  40400038  40400001  0450D214  5800D188  5000D200
5830D194  5890D194  58A0D188  18B345E0  F0080450  D20045E0  F008047B

MEMBER NAME  BLDSEQ
D2A85830  D2001A3A  5030D200  1AB95930  C2D3C4E2  F0F0F3F9*
02E3E7E3  4000066C  40400028  40400001  D21847C0  D6065890  D36C58A0
D36858B0  D3B845E0  F01058F0  D3A81800  45E0F000  00000000  00000040
40404040  40404040  40404040  40404040  C2D3C4E2  F0F0F4F0**
02D9D3C4  40404040  40400038  40404040  000D0001  1C0003E0  000E0001
1C0003E4  000F0001  1C0003E8  00100001  1C0003EC  00110001  1C0003F0
00120001  1C0003F4  00010001  0C00062C  C2D3C4E2  F0F0F4F1*
```

```
02E3E7E3  40000694  40400038  40400001  45E0F00C  00000290  01200064
45E0F010  58E0D3D4  782E8000  7020D234  5800D22C  1BFF870F  D6783322
7020D234  5800D218  5900D188  4770D68C  C2D3C4E2  F0F0F4F2*
02E3E7E3  400006CC  40400038  40400001  5800D1B8  5000D228  5800D218
5900D18C  4770D6A0  5800D1C0  5000D228  5800D218  5900D190  4770D6B4
5800D1C4  5000D228  5800D218  5900D194  C2D3C4E2  F0F0F4F3*
02E3E7E3  40000704  40400038  40400001  4770D6C8  5800D1CC  5000D228
5800D218  5900D198  4770D6DC  5800D1D4  5000D228  5800D218  5900D19C
4770D6F0  5800D1D8  5000D228  5800D218  C2D3C4E2  F0F0F4F4*
02E3E7E3  4000073C  40400038  40400001  5900D1A0  4770D704  5800D1DC
5000D228  5800D218  5900D1A4  4770D718  5800D1E0  5000D228  58E0D3D8
410E8000  5000D0D0  58F0D3A0  4110D0CC  C2D3C4E2  F0F0F4F5*
02E3E7E3  40000774  40400038  40400001  05EF41E0  000415FE  4720D73E
58EFD054  07FE58F0  D3A44110  D11405EF  41E00004  15FE4720  D75858EF
D05C07FE  78207014  7A20701C  7020D344  C2D3C4E2  F0F0F4F6*
02E3E7E3  400007AC  40400038  40400001  78207018  7A207020  7020D348
58F0D388  4110D128  05EF41E0  000415FE  4720D78A  58EFD064  07FE47F0
D7D65800  D21C5000  D24058F0  D3AC4110  C2D3C4E2  F0F0F4F7*
02E3E7E3  400007E4  40400038  40400001  D13805EF  5800D220  1BFF860F
D7D647F0  D54C5800  D2105000  D23C5800  D21C5000  D24058F0  D3AC4110
D14805EF  5800D220  1BFF860F  D7D647F0  C2D3C4E2  F0F0F4F8*
02E3E7E3  4000081C  40400038  40400001  D54C5820  D1FC5A20  D1885020
D1FC5800  D3D81A0B  5000D3D8  5800D3D4  1A0B5000  D3D45800  D3D01A0B
5000D3D0  5800D3CC  1A0B5000  D3CC5800  C2D3C4E2  F0F0F4F9*
02E3E7E3  40000854  40400038  40400001  D3C81A0B  5000D3C8  5800D3C4
1A0B5000  D3C45920  D24447C0  D4CA58B0  D37458A0  D3DC5890  D3E05860
D1784120  00015720  D2201BFF  872FD84E  C2D3C4E2  F0F0F5F0**
02E3E7E3  4000088C  40400038  40400001  58F0D3AC  4110D158  05EF1BFF
58E0D000  07FE58D0  D00458E0  D00C92FF  D00C982C  D01C07FE  58701004
58207000  5020D244  58201000  41302000  C2D3C4E2  F0F0F5F1*
02E3E7E3  400008C4  40400018  40400001  41500004  1B255C40  D1BC1B25
5020D390  5030D394  47F0D3F4  40404040  40404040  40404040  40404040
40404040  40404040  40404040  40404040  C2D3C4E2  F0F0F5F2*
02E3E7E3  40000020  40400008  40400001  000008B0  00000048  40404040
40404040  40404040  40404040  40404040  40404040  40404040  40404040
40404040  40404040  40404040  40404040  C2D3C4E2  F0F0F5F3*
02E3E7E3  40000048  40400004  40400001  0000089E  40404040  40404040
40404040  40404040  40404040  40404040  40404040  40404040  40404040
40404040  40404040  40404040  40404040  C2D3C4E2  F0F0F5F4*
02E3E7E3  40000094  4040000C  40400001  000005DE  000005DE  00000786
40404040  40404040  40404040  40404040  40404040  40404040  40404040
40404040  40404040  40404040  40404040  C2D3C4E2  F0F0F5F5*
02D9D3C4  40404040  40400038  40404040  00010001  0C000690  00010001
0C000698  00010001  0C000020  00010001  0C000024  00010001  0C000048
00010001  0C000094  00010001  0C000098  C2D3C4E2  F0F0F5F6*
02E3E7E3  400000A0  4040001C  40400001  00000786  000007A0  000007B8
000007D2  000007D2  00000264  00000258  40404040  40404040  40404040
40404040  40404040  40404040  40404040  C2D3C4E2  F0F0F5F7*
02D9D3C4  40404040  40400038  40404040  00010001  0C00009C  00010001
0C0000A0  00010001  0C0000A4  00010001  0C0000A8  00010001  0C0000AC
00010001  0C0000B0  00010001  0C0000B4  C2D3C4E2  F0F0F5F8*

MEMBER NAME  BLDSEQ
02E3E7E3  400000BC  40400018  40400001  000001D0  80000268  00000000
00000254  00014820  0000026C  40404040  40404040  40404040  40404040
40404040  40404040  40404040  40404040  C2D3C4E2  F0F0F5F9*
02E3E7E3  400000D8  40400008  40400001  80000000  800001D4  40404040
40404040  40404040  40404040  40404040  40404040  40404040  40404040
40404040  40404040  40404040  40404040  C2D3C4E2  F0F0F6F0**
02D9D3C4  40404040  40400038  40404040  00010001  0C0000B8  00010001
0C0000BC  00010001  0C0000C0  00040001  0C0000C4  00010001  0C0000C8
```

```
00040001  0C0000CC  00010001  0C0000D0  C2D3C4E2  F0F0F6F1*
02E3E7E3  400000E0  4040001C  40400001  00000000  00000254  00014820
0000026C  00000274  80000250  800001C4  40404040  40404040  40404040
40404040  40404040  40404040  40404040  C2D3C4E2  F0F0F6F2*
02D9D3C4  40404040  40400038  40404040  00010001  0C0000DC  00040001
0C0000E0  00010001  0C0000E4  00040001  0C0000E8  00010001  0C0000EC
00010001  0C0000F0  00010001  0C0000F4  C2D3C4E2  F0F0F6F3*
02E3E7E3  400000FC  4040001C  40400001  000001FC  00000374  80000000
00000374  000002F4  80000260  0000027C  40404040  40404040  40404040
40404040  40404040  40404040  40404040  C2D3C4E2  F0F0F6F4*
02E3E7E3  4000011C  40400004  40400001  000001C4  40404040  40404040
40404040  40404040  40404040  40404040  40404040  40404040  40404040
40404040  40404040  40404040  40404040  C2D3C4E2  F0F0F6F5*
02D9D3C4  40404040  40400038  40404040  00010001  0C0000F8  00010001
0C0000FC  00010001  0C000100  00010001  0C000108  00010001  0C00010C
00010001  0C000110  00010001  0C000114  C2D3C4E2  F0F0F6F6*
02E3E7E3  40000120  4040001C  40400001  00000270  00000230  0000022C
00000290  000001C4  000001C4  000001C4  40404040  40404040  40404040
40404040  40404040  40404040  40404040  C2D3C4E2  F0F0F6F7*
02D9D3C4  40404040  40400038  40404040  00010001  0C00011C  00010001
0C000120  00010001  0C000124  00010001  0C000128  00010001  0C00012C
00010001  0C000130  00010001  0C000134  C2D3C4E2  F0F0F6F8*
02E3E7E3  4000013C  4040001C  40400001  000001D0  000001D4  000001D4
000001C4  000001C4  00000230  00000234  40404040  40404040  40404040
40404040  40404040  40404040  40404040  C2D3C4E2  F0F0F6F9*
02D9D3C4  40404040  40400038  40404040  00010001  0C000138  00010001
0C00013C  00010001  0C000140  00010001  0C000144  00010001  0C000148
00010001  0C00014C  00010001  0C000150  C2D3C4E2  F0F0F7F0**
02E3E7E3  40000158  4040001C  40400001  800001C4  000001C8  000001C8
00000238  000001C8  80000280  00000010  40404040  40404040  40404040
40404040  40404040  40404040  40404040  C2D3C4E2  F0F0F7F1*
02D9D3C4  40404040  40400038  40404040  00010001  0C000154  00010001
0C000158  00010001  0C00015C  00010001  0C000160  00010001  0C000164
00010001  0C000168  00010001  0C00016C  C2D3C4E2  F0F0F7F2*
02E3E7E3  40000174  4040001C  40400001  0000038C  00000280  80000020
00000264  00000258  000001D4  80000268  40404040  40404040  40404040
40404040  40404040  40404040  40404040  C2D3C4E2  F0F0F7F3*
02D9D3C4  40404040  40400038  40404040  00070001  0C000170  00010001
0C000174  00010001  0C000178  00070001  0C00017C  00010001  0C000180
00010001  0C000184  00010001  0C000188  C2D3C4E2  F0F0F7F4*
02E3E7E3  40000190  4040001C  40400001  00000264  00000258  000001D8
80000268  00000264  00000258  000001DC  40404040  40404040  40404040
40404040  40404040  40404040  40404040  C2D3C4E2  F0F0F7F5*
02D9D3C4  40404040  40400038  40404040  00010001  0C00018C  00010001
0C000190  00010001  0C000194  00010001  0C000198  00010001  0C00019C
00010001  0C0001A0  00010001  0C0001A4  C2D3C4E2  F0F0F7F6*
02E3E7E3  400001AC  40400004  40400001  80000268  40404040  40404040
40404040  40404040  40404040  40404040  40404040  40404040  40404040
40404040  40404040  40404040  40404040  C2D3C4E2  F0F0F7F7*
02E3E7E3  400003F8  40400038  40400001  00000000  00000000  00000058

MEMBER NAME  BLDSEQ
00000040  00000028  00000000  00000000  00000000  00000000  00000000
00000000  00000060  00000064  00000068  C2D3C4E2  F0F0F7F8*
02E3E7E3  40000430  4040000C  40400001  00000098  00000080  00000084
40404040  40404040  40404040  40404040  40404040  40404040  40404040
40404040  40404040  40404040  40404040  C2D3C4E2  F0F0F7F9*
02D9D3C4  40404040  40400010  40404040  00010001  0C0001A8  00010001
0C0001AC  40404040  40404040  40404040  40404040  40404040  40404040
40404040  40404040  40404040  40404040  C2D3C4E2  F0F0F8F0**
02C5D5C4  40404040  40404040  40404040  40404040  40404040  40404040
```

```
000008DC  F1F5F7F3  F460C6D6  F34040F0  F2F0F2F8  F7F0F9F8  40F0F84B
F1F24BF2  F0404040  C2D3C4E2  C5D84040  C2D3C4E2  F0F0F8F1**

MEMBER NAME  BLDTBL
02C5E2C4  40404040  40400010  40400001  C2D3C4E3  C2D34040  00000000
40000000  40404040  40404040  40404040  40404040  40404040  40404040
40404040  40404040  40404040  40404040  C2D3C4E3  F0F0F0F1*
02E3E7E3  40000000  40400028  40400001  47F0F00C  07C2D3C4  E3C2D340
90ECD00C  184D98CD  F0205040  D00450D0  400807FC  40404040  40404040
40404040  40404040  40404040  40404040  C2D3C4E3  F0F0F0F2*
02E3E7E3  40000158  40400038  40400001  00000000  00000001  00000002
00000003  00000005  00000006  00000007  00000008  0000000C  00000014
00000018  00000048  00000058  40266666  C2D3C4E3  F0F0F0F3*
02C5E2C4  40404040  40400010  40400002  D7E3C1C2  D3C54040  05000000
40125768  40404040  40404040  40404040  40404040  40404040  40404040
40404040  40404040  40404040  40404040  C2D3C4E3  F0F0F0F4*
02E3E7E3  40000190  40400008  40400001  00000000  00000000  40404040
40404040  40404040  40404040  40404040  40404040  40404040  40404040
40404040  40404040  40404040  40404040  C2D3C4E3  F0F0F0F5*
02C5E2C4  40404040  40400010  40400003  E2E3C1C3  D2404040  05000000
40040744  40404040  40404040  40404040  40404040  40404040  40404040
40404040  40404040  40404040  40404040  C2D3C4E3  F0F0F0F6*
02C5E2C4  40404040  40400010  40400004  D7C3C5D9  D9404040  05000000
40003844  40404040  40404040  40404040  40404040  40404040  40404040
40404040  40404040  40404040  40404040  C2D3C4E3  F0F0F0F7*
02C5E2C4  40404040  40400010  40400005  C2E2D6D9  E3404040  02000000
40000000  40404040  40404040  40404040  40404040  40404040  40404040
40404040  40404040  40404040  40404040  C2D3C4E3  F0F0F0F8*
02C5E2C4  40404040  40400010  40400006  D4C5D9C7  C5404040  02000000
40000000  40404040  40404040  40404040  40404040  40404040  40404040
40404040  40404040  40404040  40404040  C2D3C4E3  F0F0F0F9*
02E3E7E3  40000508  40400020  40400001  FFFFFFEC  00058600  000B0444
00108298  FFFFFFA8  FFFFFFBB  00000000  00000000  40404040  40404040
40404040  40404040  40404040  40404040  C2D3C4E3  F0F0F1F0**
02D9D3C4  40404040  40400038  40404040  00020001  0C000508  00020001
0C00050C  00020001  0C000510  00020001  0C000514  00030001  0C000518
00040001  0C00051C  00050001  1C000520  C2D3C4E3  F0F0F1F1*
02C5E2C4  40404040  40400010  40400007  E5C4C1E2  C8404040  02000000
40000000  40404040  40404040  40404040  40404040  40404040  40404040
40404040  40404040  40404040  40404040  C2D3C4E3  F0F0F1F2*
02E3E7E3  40000528  40400004  40400001  00000000  40404040  40404040
40404040  40404040  40404040  40404040  40404040  40404040  40404040
40404040  40404040  40404040  40404040  C2D3C4E3  F0F0F1F3*
02C5E2C4  40404040  40400010  40400008  E5E2C5D8  E4404040  02000000
40000000  40404040  40404040  40404040  40404040  40404040  40404040
40404040  40404040  40404040  40404040  C2D3C4E3  F0F0F1F4*
02C5E2C4  40404040  40400010  40400009  C7D9D5D4  D9C74040  02000000
40000000  40404040  40404040  40404040  40404040  40404040  40404040
40404040  40404040  40404040  40404040  C2D3C4E3  F0F0F1F5*
02C5E2C4  40404040  40400010  4040000A  D4C1E3D4  D9C74040  02000000
40000000  40404040  40404040  40404040  40404040  40404040  40404040
40404040  40404040  40404040  40404040  C2D3C4E3  F0F0F1F6*
02C5E2C4  40404040  40400010  4040000B  D4C3C8C5  C3D24040  02000000
40000000  40404040  40404040  40404040  40404040  40404040  40404040
40404040  40404040  40404040  40404040  C2D3C4E3  F0F0F1F7*
02C5E2C4  40404040  40400010  4040000C  D4C5D9C7  C5F14040  02000000
40000000  40404040  40404040  40404040  40404040  40404040  40404040
40404040  40404040  40404040  40404040  C2D3C4E3  F0F0F1F8*
02C5E2C4  40404040  40400010  4040000D  D5C6D6E4  D5C44040  02000000
40000000  40404040  40404040  40404040  40404040  40404040  40404040
40404040  40404040  40404040  40404040  C2D3C4E3  F0F0F1F9*
```

```
02E3E7E3  40000530  4040001C  40400001  00000000  00000000  00000000

MEMBER NAME  BLDTBL
00000000  00000000  00000000  00000000  40404040  40404040  40404040
40404040  40404040  40404040  40404040  C2D3C4E3  F0F0F2F0**
02D9D3C4  40404040  40400038  40404040  00060001  1C000524  00070001
1C000530  00080001  1C000534  00090001  1C000538  000A0001  1C00053C
000B0001  1C000540  000C0001  1C000544  C2D3C4E3  F0F0F2F1*
02C5E2C4  40404040  40400010  4040000E  E2C5D8D4  D9C74040  02000000
40000000  40404040  40404040  40404040  40404040  40404040  40404040
40404040  40404040  40404040  40404040  C2D3C4E3  F0F0F2F2*
02C5E2C4  40404040  40400010  4040000F  E5D3C1E8  E4D74040  02000000
40000000  40404040  40404040  40404040  40404040  40404040  40404040
40404040  40404040  40404040  40404040  C2D3C4E3  F0F0F2F3*
02E3E7E3  4000054C  40400008  40400001  00000000  00000000  40404040
40404040  40404040  40404040  40404040  40404040  40404040  40404040
40404040  40404040  40404040  40404040  C2D3C4E3  F0F0F2F4*
02E3E7E3  40000348  40400030  40400001  00000005  00000004  C6D34040
C1404040  00000009  00000004  C6D34040  C1404040  0000000D  00000004
C6D34040  C1404040  40404040  40404040  C2D3C4E3  F0F0F2F5*
02E3E7E3  40000568  40400038  40400001  5830D4E4  5890D4F0  58A0D4E0
58B0D4F4  5880D14C  5800B045  5000D17C  58F0D520  4110D04C  05EF5800
A0141200  47C0D57A  58F0D508  4110D054  C2D3C4E3  F0F0F2F6*
02E3E7E3  400005A0  40400038  40400001  05EF5800  B0455900  D17C47C0
D58E1BFF  58E0D000  07FE58F0  D4FC4110  D06405EF  58F0D4FC  4110D080
05EF58F0  D4FC4110  D09C05EF  5800B045  C2D3C4E3  F0F0F2F7*
02E3E7E3  400005D8  40400038  40400001  5900D17C  47C0D5C0  1BFF58E0
D00007FE  58F0D51C  4110D0B8  05EF5800  D1345000  D1785080  D5385080
D53C5830  D13458F0  D4E85890  F01818A8  C2D3C4E3  F0F0F2F8*
02E3E7E3  40000610  40400038  40400001  58B0D4E8  5990D178  47A0D5F8
47F0D6AC  5820D130  5020D188  58E0D538  5800D178  500ED188  18825890
D1781A83  18A91AA3  59A0B018  47C0D62C  C2D3C4E3  F0F0F2F9*
02E3E7E3  40000648  40400038  40400001  5080D188  5090D178  47F0D676
18795C60  D1585070  D530185A  5C40D158  5050D534  7827B014  7925B014
4780D658  5080D188  5090D178  47F0D676  C2D3C4E3  F0F0F3F0**
02E3E7E3  40000680  40400038  40400001  7827B018  7925B018  4780D670
5080D188  5090D178  47F0D676  189A47F0  D61258A0  D14C5890  B0185800
D1781A03  5000D178  58E0D53C  5800D188  C2D3C4E3  F0F0F3F1*
02E3E7E3  400006B8  40400038  40400001  500ED18C  5800D53C  1A0A5000
D53C5800  D5381A0A  5000D538  47F0D5EC  5830D4E4  5890D4F0  58A0D4E0
58B0D4F4  5880D14C  5800D134  5000D178  C2D3C4E3  F0F0F3F2*
02E3E7E3  400006F0  40400038  40400001  5000D180  5080D538  5080D53C
5830D134  58909058  18A858B0  D4F05990  D17847A0  D6EE47F0  D7AC5820
D1305020  D18858E0  D5385800  D178500E  C2D3C4E3  F0F0F3F3*
02E3E7E3  40000728  40400038  40400001  D3481882  5890D178  1A8318A9
1AA359A0  B05847C0  D7225080  D1885090  D17847F0  D76C1879  5C60D160
5070D530  185A5C40  D1605050  D5347827  C2D3C4E3  F0F0F3F4*
02E3E7E3  40000760  40400038  40400001  B0087925  B0084780  D74E5080
D1885090  D17847F0  D76C7827  B01C7925  B01C4780  D7665080  D1885090
D17847F0  D76C189A  47F0D708  58A0D14C  C2D3C4E3  F0F0F3F5*
02E3E7E3  40000798  40400038  40400001  5890B058  5800D178  1A035000
D17858E0  D53C5800  D188500E  D34C5800  D1801A03  5000D180  5800D53C
1A0A5000  D53C5800  D5381A0A  5000D538  C2D3C4E3  F0F0F3F6*
02E3E7E3  400007D0  40400038  40400001  47F0D6E2  5830D4E4  5890D4F0
58A0D4E0  58B0D4F4  5880D14C  5820D180  5B20D134  89200003  189818A8
18B25880  D4F45870  D4E85860  D4F05859  C2D3C4E3  F0F0F3F7*
02E3E7E3  40000808  40400038  40400001  D1885C40  D1585839  D3485C20
D1604105  70045000  D0D04109  D18C5000  D0D44103  60045000  D0D84109
D34C5000  D0DC58F0  D5144110  D0D005EF  C2D3C4E3  F0F0F3F8*
02E3E7E3  40000840  40400038  40400001  879AD7DE  5830D4E4  5890D4F0
58A0D4E0  58B0D4F4  5880D14C  5800D134  5000D178  5000D180  5080D538
```

```
MEMBER NAME  BLDTBL
5080D53C  5830D134  5890A7E8  18A858B0  C2D3C4E3  F0F0F3F9*
02E3E7E3  40000878  40400038  40400001  D4E05990  D17847A0  D85E47F0
D91C5820  D1305020  D18858E0  D5385800  D178500E  D1881882  5890D178
1A8318A9  1AA359A0  B7E847C0  D8925080  C2D3C4E3  F0F0F4F0**
02E3E7E3  400008B0  40400038  40400001  D1885090  D17847F0  D8DC1879
5C60D158  5070D530  185A5C40  D1585050  D5347827  B7E47925  B7E44780
D8BE5080  D1885090  D17847F0  D8DC7827  C2D3C4E3  F0F0F4F1*
02E3E7E3  400008E8  40400038  40400001  B7E87925  B7E84780  D8D65080
D1885090  D17847F0  D8DC189A  47F0D878  58A0D14C  5890B7E8  5800D178
1A035000  D17858E0  D53C5800  D188500E  C2D3C4E3  F0F0F4F2*
02E3E7E3  40000920  40400038  40400001  D18C5800  D1801A03  5000D180
5800D53C  1A0A5000  D53C5800  D5381A0A  5000D538  47F0D852  5830D4E4
5890D4F0  58A0D4E0  58B0D4F4  5880D14C  C2D3C4E3  F0F0F4F3*
02E3E7E3  40000958  40400038  40400001  5820D180  5B20D134  89200003
189818A8  18B25880  D4F45870  D4E05860  D4F05859  D1885C40  D1585839
D3485C20  D1604105  77D45000  D0D04109  C2D3C4E3  F0F0F4F4*
02E3E7E3  40000990  40400038  40400001  D18C5000  D0D44103  60045000
D0D84109  D34C5000  D0DC58F0  D5244110  D0D005EF  879AD94E  5830D4E4
5890D4F0  58A0D4E0  58B0D4F4  5880D14C  C2D3C4E3  F0F0F4F5*
02E3E7E3  400009C8  40400038  40400001  5800D134  5000D178  5000D180
5080D538  5080D53C  5830D134  58F0D4E4  5890F018  18A858B0  D4E45990
D17847A0  D9D247F0  DA905820  D1305020  C2D3C4E3  F0F0F4F6*
02E3E7E3  40000A00  40400038  40400001  D18858E0  D5385800  D178500E
D1881882  5890D178  1A8318A9  1AA359A0  B01847C0  DA065080  D1885090
D17847F0  DA501879  5C60D158  5070D530  C2D3C4E3  F0F0F4F7*
02E3E7E3  40000A38  40400038  40400001  185A5C40  D1585050  D5347827
B0147925  B0144780  DA325080  D1885090  D17847F0  DA507827  B0187925
B0184780  DA4A5080  D1885090  D17847F0  C2D3C4E3  F0F0F4F8*
02E3E7E3  40000A70  40400038  40400001  DA50189A  47F0D9EC  58A0D14C
5890B018  5800D178  1A035000  D17858E0  D53C5800  D188500E  D18C5800
D1801A03  5000D180  5800D53C  1A0A5000  C2D3C4E3  F0F0F4F9*
02E3E7E3  40000AA8  40400038  40400001  D53C5800  D5381A0A  5000D538
47F0D9C6  5830D4E4  5890D4F0  58A0D4E0  58B0D4F4  5880D14C  5820D180
5B20D134  89200003  189818A8  18B25880  C2D3C4E3  F0F0F5F0**
02E3E7E3  40000AE0  40400038  40400001  D4F41873  5860D4F0  5859D188
5C40D158  5839D348  5C20D160  41057004  5000D0D0  4109D18C  5000D0D4
41036004  5000D0D8  4109D34C  5000D0DC  C2D3C4E3  F0F0F5F1*
02E3E7E3  40000B18  40400038  40400001  58F0D510  4110D0D0  05EF879A
DAC05830  D4E45890  D4F058A0  D4E058B0  D4F45880  D14C5800  B0451200
4730DB3A  58F0D50C  4110D0E8  05EF58F0  C2D3C4E3  F0F0F5F2*
02E3E7E3  40000B50  40400038  40400001  D5284110  D0F805EF  58F0D518
4110D108  05EF58F0  D4F84110  D11805EF  1BFF58E0  D00007FE  58A0D004
58E0A00C  58B0A018  5810B004  5820D18C  C2D3C4E3  F0F0F5F3*
02E3E7E3  40000B88  40400038  40400001  50201000  18DA92FF  A00C982C
A01C07FE  58701004  58207000  5020D18C  58201000  41302000  41500001
1B255C40  D15C1B25  5020D500  5030D504  C2D3C4E3  F0F0F5F4*
02E3E7E3  40000BC0  40400008  40400001  5030D100  47F0D540  40404040
40404040  40404040  40404040  40404040  40404040  40404040  40404040
40404040  40404040  40404040  40404040  C2D3C4E3  F0F0F5F5*
02E3E7E3  40000020  4040000C  40400001  00000B98  00000028  00000B74
40404040  40404040  40404040  40404040  40404040  40404040  40404040
40404040  40404040  40404040  40404040  C2D3C4E3  F0F0F5F6*
02E3E7E3  40000074  40400008  40400001  00000004  80000000  40404040
40404040  40404040  40404040  40404040  40404040  40404040  40404040
40404040  40404040  40404040  40404040  C2D3C4E3  F0F0F5F7*
02D9D3C4  40404040  40400038  40404040  000D0001  1C000548  000E0001
1C00054C  000F0001  1C000550  00010001  0C000020  00010001  0C000024
00010001  0C000028  00040001  0C000074  C2D3C4E3  F0F0F5F8*
```

```
MEMBER NAME  BLDTBL
02E3E7E3  4000007C  4040001C  40400001  00000004  00000000  00000004
80000000  00000004  00000000  000007D8  40404040  40404040  40404040
40404040  40404040  40404040  40404040  C2D3C4E3  F0F0F5F9*
02D9D3C4  40404040  40400038  40404040  00040001  0C000078  00020001
0C00007C  00020001  0C000080  00040001  0C000084  00040001  0C000088
00020001  0C00008C  00020001  0C000090  C2D3C4E3  F0F0F6F0**
02E3E7E3  40000098  4040001C  40400001  000007D4  0000015C  00000004
80000000  00000004  00000000  0005861C  40404040  40404040  40404040
40404040  40404040  40404040  40404040  C2D3C4E3  F0F0F6F1*
02D9D3C4  40404040  40400038  40404040  00020001  0C000094  00020001
0C000098  00010001  0C00009C  00040001  0C0000A0  00040001  0C0000A4
00020001  0C0000A8  00020001  0C0000AC  C2D3C4E3  F0F0F6F2*
02E3E7E3  400000B4  4040001C  40400001  00058618  00000160  00000004
80000000  00000004  00000000  000B0460  40404040  40404040  40404040
40404040  40404040  40404040  40404040  C2D3C4E3  F0F0F6F3*
02D9D3C4  40404040  40400038  40404040  00020001  0C0000B0  00020001
0C0000B4  00010001  0C0000B8  00040001  0C0000BC  00040001  0C0000C0
00020001  0C0000C4  00020001  0C0000C8  C2D3C4E3  F0F0F6F4*
02E3E7E3  400000D0  4040001C  40400001  000B045C  00000164  00000004
80000000  00000004  00000000  00000004  40404040  40404040  40404040
40404040  40404040  40404040  40404040  C2D3C4E3  F0F0F6F5*
02D9D3C4  40404040  40400038  40404040  00020001  0C0000CC  00020001
0C0000D0  00010001  0C0000D4  00040001  0C0000D8  00040001  0C0000DC
00020001  0C0000E0  00020001  0C0000E4  C2D3C4E3  F0F0F6F6*
02E3E7E3  400000EC  4040000C  40400001  00000000  00000004  80000000
40404040  40404040  40404040  40404040  40404040  40404040  40404040
40404040  40404040  40404040  40404040  C2D3C4E3  F0F0F6F7*
02E3E7E3  40000108  40400010  40400001  00000004  80000000  000007D8
000007D4  40404040  40404040  40404040  40404040  40404040  40404040
40404040  40404040  40404040  40404040  C2D3C4E3  F0F0F6F8*
02D9D3C4  40404040  40400038  40404040  00030001  0C0000E8  00030001
0C0000EC  00040001  0C0000F0  00040001  0C0000F4  00040001  0C000108
00040001  0C00010C  00020001  0C000110  C2D3C4E3  F0F0F6F9*
02E3E7E3  40000118  40400010  40400001  00000004  80000000  00000004
00000000  40404040  40404040  40404040  40404040  40404040  40404040
40404040  40404040  40404040  40404040  C2D3C4E3  F0F0F7F0**
02E3E7E3  4000012C  4040000C  40400001  800001B4  00000004  00000000
40404040  40404040  40404040  40404040  40404040  40404040  40404040
40404040  40404040  40404040  40404040  C2D3C4E3  F0F0F7F1*
02D9D3C4  40404040  40400038  40404040  00020001  0C000114  00040001
0C000118  00040001  0C00011C  00030001  0C000120  00030001  0C000124
00010001  0C00012C  00030001  0C000130  C2D3C4E3  F0F0F7F2*
02E3E7E3  40000138  4040001C  40400001  00000004  80000000  00000348
00000164  00000004  00000188  80000000  40404040  40404040  40404040
40404040  40404040  40404040  40404040  C2D3C4E3  F0F0F7F3*
02D9D3C4  40404040  40400038  40404040  00030001  0C000134  00040001
0C000138  00040001  0C00013C  00010001  0C000140  00010001  0C000144
00030001  0C000148  00010001  0C00014C  C2D3C4E3  F0F0F7F4*
02E3E7E3  40000554  40400014  40400001  00000000  00000000  00000000
00000000  00000000  40404040  40404040  40404040  40404040  40404040
40404040  40404040  40404040  40404040  C2D3C4E3  F0F0F7F5*
02D9D3C4  40404040  40400008  40404040  00030001  0C000150  40404040
40404040  40404040  40404040  40404040  40404040  40404040  40404040
40404040  40404040  40404040  40404040  C2D3C4E3  F0F0F7F6*
02C5D5C4  40404040  40404040  40404040  40404040  40404040  40404040
00000BC8  F1F5F7F3  F460C6D6  F34040F0  F2F0F2F8  F7F0F9F8  40F0F84B
F1F24BF2  F5404040  C2D3C4E3  C2D34040  C2D3C4E3  F0F0F7F7**

MEMBER NAME  BLOCK
02C5E2C4  40404040  40400010  40400001  E3D6D3C5  D9404040  00000000
```

```
4000000C  40404040  40404040  40404040  40404040  40404040  40404040
40404040  40404040  40404040  40404040  C2D3D2C4  F0F0F0F1*
02C5E2C4  40404040  40400010  40400002  D4E2C9E9  C5404040  00000000
4000000C  40404040  40404040  40404040  40404040  40404040  40404040
40404040  40404040  40404040  40404040  C2D3D2C4  F0F0F0F2*
02C5E2C4  40404040  40400010  40400003  D6D7E3C9  D6D54040  00000000
40000020  40404040  40404040  40404040  40404040  40404040  40404040
40404040  40404040  40404040  40404040  C2D3D2C4  F0F0F0F3*
02C5E2C4  40404040  40400010  40400004  C4E5C9C5  E6E24040  00000000
40000004  40404040  40404040  40404040  40404040  40404040  40404040
40404040  40404040  40404040  40404040  C2D3D2C4  F0F0F0F4*
02C5E2C4  40404040  40400010  40400005  C9E2C1E3  E3404040  00000000
40000004  40404040  40404040  40404040  40404040  40404040  40404040
40404040  40404040  40404040  40404040  C2D3D2C4  F0F0F0F5*
02E3E7E3  40000000  4040000C  40400001  3F28F5C3  3F10624E  3C10C6F8
40404040  40404040  40404040  40404040  40404040  40404040  40404040
40404040  40404040  40404040  40404040  C2D3D2C4  F0F0F0F6*
02E3E7E3  40000000  40400008  40400002  00004E20  00007530  40404040
40404040  40404040  40404040  40404040  40404040  40404040  40404040
40404040  40404040  40404040  40404040  C2D3D2C4  F0F0F0F7*
02E3E7E3  40000000  40400020  40400003  00000000  00000000  00000000
00000000  00000000  00000000  00000000  00000000  40404040  40404040
40404040  40404040  40404040  40404040  C2D3D2C4  F0F0F0F8*
02E3E7E3  40000000  40400004  40400004  F9F8F9F9  40404040  40404040
40404040  40404040  40404040  40404040  40404040  40404040  40404040
40404040  40404040  40404040  40404040  C2D3D2C4  F0F0F0F9*
02E3E7E3  40000000  40400004  40400005  0000028A  40404040  40404040
40404040  40404040  40404040  40404040  40404040  40404040  40404040
40404040  40404040  40404040  40404040  C2D3D2C4  F0F0F1F0**
02C5D5C4  40404040  40404040  40404040  40404040  40404040  40404040
40404040  F1F5F7F3  F460C6D6  F34040F0  F2F0F2F8  F7F0F9F8  40F0F84B
F1F24BF3  F1404040  C2D3D2C4  0001748E  C2D3D2C4  F0F0F1F1**

MEMBER NAME  BLOCK1
02C5E2C4  40404040  40400010  40400001  C3C4E3C3  D6D44040  00000000
4000008C  40404040  40404040  40404040  40404040  40404040  40404040
40404040  40404040  40404040  40404040  C2D3D2C4  F0F0F0F1*
02C5E2C4  40404040  40400010  40400002  E2E8D4E3  C2404040  00000000
40007D10  40404040  40404040  40404040  40404040  40404040  40404040
40404040  40404040  40404040  40404040  C2D3D2C4  F0F0F0F2*
02C5E2C4  40404040  40400010  40400003  C5D3C3D6  D4404040  00000000
40000004  40404040  40404040  40404040  40404040  40404040  40404040
40404040  40404040  40404040  40404040  C2D3D2C4  F0F0F0F3*
02C5E2C4  40404040  40400010  40400004  D7D4C1E3  D3404040  00000000
40001134  40404040  40404040  40404040  40404040  40404040  40404040
40404040  40404040  40404040  40404040  C2D3D2C4  F0F0F0F4*
02C5E2C4  40404040  40400010  40400005  C5D3D4E3  C2D34040  00000000
400D7D28  40404040  40404040  40404040  40404040  40404040  40404040
40404040  40404040  40404040  40404040  C2D3D2C4  F0F0F0F5*
02C5E2C4  40404040  40400010  40400006  E2D7D3D7  E3E24040  00000000
40030D44  40404040  40404040  40404040  40404040  40404040  40404040
40404040  40404040  40404040  40404040  C2D3D2C4  F0F0F0F6*
02C5E2C4  40404040  40400010  40400007  D7E3C1C2  D3C54040  00000000
40125768  40404040  40404040  40404040  40404040  40404040  40404040
40404040  40404040  40404040  40404040  C2D3D2C4  F0F0F0F7*
02C5E2C4  40404040  40400010  40400008  E2E3C1C3  D2404040  00000000
40040744  40404040  40404040  40404040  40404040  40404040  40404040
40404040  40404040  40404040  40404040  C2D3D2C4  F0F0F0F8*
02C5E2C4  40404040  40400010  40400009  C7D9E4D7  40404040  00000000
4000000C  40404040  40404040  40404040  40404040  40404040  40404040
40404040  40404040  40404040  40404040  C2D3D2C4  F0F0F0F9*
```

| | | | | | | |
|---|---|---|---|---|---|---|
| 02C5E2C4 | 40404040 | 40400010 | 4040000A | D9D4D6C4 | C5D34040 | 00000000 |
| 40000018 | 40404040 | 40404040 | 40404040 | 40404040 | 40404040 | 40404040 |
| 40404040 | 40404040 | 40404040 | 40404040 | C2D3D2C4 | F0F0F1F0** | |
| 02C5E2C4 | 40404040 | 40400010 | 4040000B | C6D4D6C4 | C5D34040 | 00000000 |
| 400001F8 | 40404040 | 40404040 | 40404040 | 40404040 | 40404040 | 40404040 |
| 40404040 | 40404040 | 40404040 | 40404040 | C2D3D2C4 | F0F0F1F1* | |
| 02C5E2C4 | 40404040 | 40400010 | 4040000C | D7C3C5D9 | D9404040 | 00000000 |
| 40003844 | 40404040 | 40404040 | 40404040 | 40404040 | 40404040 | 40404040 |
| 40404040 | 40404040 | 40404040 | 40404040 | C2D3D2C4 | F0F0F1F2* | |
| 02C5E2C4 | 40404040 | 40400010 | 4040000D | D7D7D6C9 | D5E34040 | 00000000 |
| 40013884 | 40404040 | 40404040 | 40404040 | 40404040 | 40404040 | 40404040 |
| 40404040 | 40404040 | 40404040 | 40404040 | C2D3D2C4 | F0F0F1F3* | |
| 02C5E2C4 | 40404040 | 40400010 | 4040000E | E2C5D9D9 | D6D94040 | 00000000 |
| 40000004 | 40404040 | 40404040 | 40404040 | 40404040 | 40404040 | 40404040 |
| 40404040 | 40404040 | 40404040 | 40404040 | C2D3D2C4 | F0F0F1F4* | |
| 02C5E2C4 | 40404040 | 40400010 | 4040000F | E5F9F940 | 40404040 | 00000000 |
| 4000003C | 40404040 | 40404040 | 40404040 | 40404040 | 40404040 | 40404040 |
| 40404040 | 40404040 | 40404040 | 40404040 | C2D3D2C4 | F0F0F1F5* | |
| 02C5E2C4 | 40404040 | 40400010 | 40400010 | C6D4E3C5 | D9D94040 | 00000000 |
| 40002D58 | 40404040 | 40404040 | 40404040 | 40404040 | 40404040 | 40404040 |
| 40404040 | 40404040 | 40404040 | 40404040 | C2D3D2C4 | F0F0F1F6* | |
| 02C5E2C4 | 40404040 | 40400010 | 40400011 | E2D3C9D5 | C5E24040 | 00000000 |
| 40001C24 | 40404040 | 40404040 | 40404040 | 40404040 | 40404040 | 40404040 |
| 40404040 | 40404040 | 40404040 | 40404040 | C2D3D2C4 | F0F0F1F7* | |
| 02E3E7E3 | 40000004 | 40400008 | 40400001 | 00000001 | 00000001 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F1F8* | |
| 02E3E7E3 | 40000010 | 40400004 | 40400001 | 00000006 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F1F9* | |
| 02E3E7E3 | 40000068 | 40400024 | 40400001 | C1D3D340 | 00000000 | 00000000 |

MEMBER NAME BLOCK1

| | | | | | | |
|---|---|---|---|---|---|---|
| 00000000 | 00000000 | 00000000 | 00000000 | 00000000 | 00000000 | 40404040 |
| 40404040 | 40404040 | 40404040 | 40404040 | C2D3D2C4 | F0F0F2F0** | |
| 02E3E7E3 | 40000000 | 40400004 | 40400002 | 00001F40 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F1* | |
| 02E3E7E3 | 40000000 | 40400004 | 40400003 | 00000006 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F2* | |
| 02E3E7E3 | 40000000 | 40400004 | 40400005 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F3* | |
| 02E3E7E3 | 400CD144 | 40400004 | 40400005 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F4* | |
| 02E3E7E3 | 40000000 | 40400004 | 40400006 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F5* | |
| 02E3E7E3 | 40000000 | 40400004 | 40400007 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F6* | |
| 02E3E7E3 | 400007D4 | 40400004 | 40400007 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F7* | |
| 02E3E7E3 | 40058618 | 40400004 | 40400007 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3D2C4 | F0F0F2F8* | |
| 02E3E7E3 | 400B045C | 40400004 | 40400007 | 00000000 | 40404040 | 40404040 |
| 40404040 | 40404040 | 40404040 | 40404040 | 40404040 | 40404040 | 40404040 |

```
40404040  40404040  40404040  40404040  C2D3D2C4  F0F0F2F9*
02E3E7E3  401082A0  40400008  40400007  00000000  00000000  40404040
40404040  40404040  40404040  40404040  40404040  40404040  40404040
40404040  40404040  40404040  40404040  C2D3D2C4  F0F0F3F0**
02E3E7E3  40000000  40400004  40400008  00000000  40404040  40404040
40404040  40404040  40404040  40404040  40404040  40404040  40404040
40404040  40404040  40404040  40404040  C2D3D2C4  F0F0F3F1*
02E3E7E3  40000014  40400004  4040000A  40F24BF7  40404040  40404040
40404040  40404040  40404040  40404040  40404040  40404040  40404040
40404040  40404040  40404040  40404040  C2D3D2C4  F0F0F3F2*
02E3E7E3  40000190  40400004  4040000B  00000000  40404040  40404040
40404040  40404040  40404040  40404040  40404040  40404040  40404040
40404040  40404040  40404040  40404040  C2D3D2C4  F0F0F3F3*
02E3E7E3  40000000  40400004  4040000C  00000000  40404040  40404040
40404040  40404040  40404040  40404040  40404040  40404040  40404040
40404040  40404040  40404040  40404040  C2D3D2C4  F0F0F3F4*
02E3E7E3  40000000  40400004  4040000D  00000000  40404040  40404040
40404040  40404040  40404040  40404040  40404040  40404040  40404040
40404040  40404040  40404040  40404040  C2D3D2C4  F0F0F3F5*
02E3E7E3  40000000  40400004  4040000E  00000000  40404040  40404040
40404040  40404040  40404040  40404040  40404040  40404040  40404040
40404040  40404040  40404040  40404040  C2D3D2C4  F0F0F3F6*
02E3E7E3  40000030  40400004  4040000F  00000000  40404040  40404040
40404040  40404040  40404040  40404040  40404040  40404040  40404040
40404040  40404040  40404040  40404040  C2D3D2C4  F0F0F3F7*
02E3E7E3  40002580  40400004  40400010  00000000  40404040  40404040
40404040  40404040  40404040  40404040  40404040  40404040  40404040
40404040  40404040  40404040  40404040  C2D3D2C4  F0F0F3F8*
02E3E7E3  40002D54  40400004  40400010  00000000  40404040  40404040
40404040  40404040  40404040  40404040  40404040  40404040  40404040

MEMBER NAME  BLOCK1
40404040  40404040  40404040  40404040  C2D3D2C4  F0F0F3F9*
02E3E7E3  40001C20  40400004  40400011  00000000  40404040  40404040
40404040  40404040  40404040  40404040  40404040  40404040  40404040
40404040  40404040  40404040  40404040  C2D3D2C4  F0F0F4F0**
02C5D5C4  40404040  40404040  40404040  40404040  40404040  40404040
40404040  F1F5F7F3  F460C6D6  F34040F0  F2F0F2F8  F7F0F9F8  40F0F84B
F1F24BF3  F4404040  C2D3D2C4  0001748E  C2D3D2C4  F0F0F4F1**

MEMBER NAME  BLDRESOL
02C5E2C4  40404040  40400010  40400001  D9C5E2D6  D3E54040  00000000
40000000  40404040  40404040  40404040  40404040  40404040  40404040
40404040  40404040  40404040  40404040  D9C5E2D6  F0F0F0F1*
02E3E7E3  40000000  40400038  40400001  47F0F00C  07D9C5E2  D6D3E540
90ECD00C  9823F024  184D58D0  F02C9034  D00050D0  400807F2  40404040
40404040  40404040  021A1240  E2D7D3D7  D9C5E2D6  F0F0F0F2*
02E3E7E3  40000038  40400038  40400001  E3E240C1  D9D9C1E8  40C6E4D3
D322021A  1240E2C5  D3D4E3C2  40C1D9D9  C1E840C6  E4D3D322  021A2540
C5D9D9D6  D940C9D5  40C2C3E2  D3C9C240  D9C5E2D6  F0F0F0F3*
02E3E7E3  40000070  40400015  40400001  C9D540D9  C5E2D6D3  E540E2E4
C2D9D6E4  E3C9D5C5  22404040  40404040  40404040  40404040  40404040
40404040  40404040  40404040  40404040  D9C5E2D6  F0F0F0F4*
02E3E7E3  40000260  40400038  40400001  00000000  00000000  4E000000
00000000  4F080000  00000000  4E000000  80000000  41100000  00000000
41200000  00000000  42B40000  00000000  D9C5E2D6  F0F0F0F5*
02E3E7E3  40000298  40400038  40400001  00000000  00000000  00000000
00000001  00000001  00000002  00000003  00000004  00000005  00000006
00000007  00000008  00000009  0000000A  D9C5E2D6  F0F0F0F6*
02C5E2C4  40404040  40400010  40400002  C3C4E3C3  D6D44040  05000000
4000008C  40404040  40404040  40404040  40404040  40404040  40404040
```

```
                                                            D9C5E2D6  F0F0F0F7*
40404040  40404040  40404040  40404040
02E3E7E3  400002D0  40400038  40400001  0000000B  0000000C  00000010
00000014  00000018  00000020  0000002C  00000038  000003E8  00002710
41100000  41400000  00000000  00000000  D9C5E2D6  F0F0F0F8*
02C5E2C4  40404040  40400010  40400003  E2D7D3D7  E3E24040  05000000
40030D44  40404040  40404040  40404040  40404040  40404040  40404040
40404040  40404040  40404040  40404040  D9C5E2D6  F0F0F0F9*
02C5E2C4  40404040  40400010  40400004  E3D6D3C5  D9404040  05000000
4000000C  40404040  40404040  40404040  40404040  40404040  40404040
40404040  40404040  40404040  40404040  D9C5E2D6  F0F0F1F0**
02C5E2C4  40404040  40400010  40400005  C5D3D4E3  C2D34040  05000000
400D7D28  40404040  40404040  40404040  40404040  40404040  40404040
40404040  40404040  40404040  40404040  D9C5E2D6  F0F0F1F1*
02C5E2C4  40404040  40400010  40400006  D7E3C1C2  D3C54040  05000000
40125768  40404040  40404040  40404040  40404040  40404040  40404040
40404040  40404040  40404040  40404040  D9C5E2D6  F0F0F1F2*
02E3E7E3  400009C0  40400020  40400001  00000000  FFFFFFEC  00000000
FFFFFFC8  000CD118  FFFFFFEC  00058600  000B0444  40404040  40404040
40404040  40404040  40404040  40404040  D9C5E2D6  F0F0F1F3*
02D9D3C4  40404040  40400038  40404040  00020001  0C0009C0  00030001
0C0009C4  00040001  0C0009C8  00050001  0C0009CC  00050001  0C0009D0
00060001  0C0009D4  00060001  0C0009D8  D9C5E2D6  F0F0F1F4*
02C5E2C4  40404040  40400010  40400007  E5F9F840  40404040  05000000
40000004  40404040  40404040  40404040  40404040  40404040  40404040
40404040  40404040  40404040  40404040  D9C5E2D6  F0F0F1F5*
02C5E2C4  40404040  40400010  40400008  E5F9F940  40404040  05000000
4000003C  40404040  40404040  40404040  40404040  40404040  40404040
40404040  40404040  40404040  40404040  D9C5E2D6  F0F0F1F6*
02C5E2C4  40404040  40400010  40400009  C4E5C9C5  E6E24040  05000000
40000004  40404040  40404040  40404040  40404040  40404040  40404040
40404040  40404040  40404040  40404040  D9C5E2D6  F0F0F1F7*
02C5E2C4  40404040  40400010  4040000A  C9E2C1E3  E3404040  05000000
40000004  40404040  40404040  40404040  40404040  40404040  40404040
40404040  40404040  40404040  40404040  D9C5E2D6  F0F0F1F8*
02C5E2C4  40404040  40400010  4040000B  E2D3C9D5  C5E24040  05000000
40001C24  40404040  40404040  40404040  40404040  40404040  40404040
40404040  40404040  40404040  40404040  D9C5E2D6  F0F0F1F9*
02E3E7E3  400009E0  4040001C  40400001  00108298  00000000  FFFFFFFC

MEMBER NAME  BLDRESOL
00000000  00000000  FFFFFFE4  00001C20  40404040  40404040  40404040
40404040  40404040  40404040  40404040  D9C5E2D6  F0F0F2F0**
02D9D3C4  40404040  40400038  40404040  00060001  0C0009DC  00060001
0C0009E0  00070001  0C0009E4  00080001  0C0009E8  00090001  0C0009EC
000A0001  0C0009F0  000B0001  0C0009F4  D9C5E2D6  F0F0F2F1*
02E3E7E3  400009FC  40400004  40400001  00000000  40404040  40404040
40404040  40404040  40404040  40404040  40404040  40404040  40404040
40404040  40404040  40404040  40404040  D9C5E2D6  F0F0F2F2*
02E3E7E3  40000A04  40400004  40400001  00000000  40404040  40404040
40404040  40404040  40404040  40404040  40404040  40404040  40404040
40404040  40404040  40404040  40404040  D9C5E2D6  F0F0F2F3*
02E3E7E3  40000A0C  40400004  40400001  00000000  40404040  40404040
40404040  40404040  40404040  40404040  40404040  40404040  40404040
40404040  40404040  40404040  40404040  D9C5E2D6  F0F0F2F4*
02E3E7E3  40000A14  40400004  40400001  00000000  40404040  40404040
40404040  40404040  40404040  40404040  40404040  40404040  40404040
40404040  40404040  40404040  40404040  D9C5E2D6  F0F0F2F5*
02E3E7E3  40000A1C  40400004  40400001  00000000  40404040  40404040
40404040  40404040  40404040  40404040  40404040  40404040  40404040
40404040  40404040  40404040  40404040  D9C5E2D6  F0F0F2F6*
02E3E7E3  40000A24  40400004  40400001  00000000  40404040  40404040
```

```
40404040  40404040  40404040  40404040  40404040  40404040  40404040
40404040  40404040  40404040  40404040  D9C5E2D6  F0F0F2F7*
02E3E7E3  40000A2C  40400004  40400001  00000000  40404040  40404040
40404040  40404040  40404040  40404040  40404040  40404040  40404040
40404040  40404040  40404040  40404040  D9C5E2D6  F0F0F2F8*
02E3E7E3  40000A34  40400004  40400001  00000000  40404040  40404040
40404040  40404040  40404040  40404040  40404040  40404040  40404040
40404040  40404040  40404040  40404040  D9C5E2D6  F0F0F2F9*
02E3E7E3  40000A3C  40400004  40400001  00000000  40404040  40404040
40404040  40404040  40404040  40404040  40404040  40404040  40404040
40404040  40404040  40404040  40404040  D9C5E2D6  F0F0F3F0**
02E3E7E3  40000A44  40400004  40400001  00000000  40404040  40404040
40404040  40404040  40404040  40404040  40404040  40404040  40404040
40404040  40404040  40404040  40404040  D9C5E2D6  F0F0F3F1*
02E3E7E3  40000A4C  40400004  40400001  00000000  40404040  40404040
40404040  40404040  40404040  40404040  40404040  40404040  40404040
40404040  40404040  40404040  40404040  D9C5E2D6  F0F0F3F2*
02E3E7E3  40000A54  40400004  40400001  00000000  40404040  40404040
40404040  40404040  40404040  40404040  40404040  40404040  40404040
40404040  40404040  40404040  40404040  D9C5E2D6  F0F0F3F3*
02E3E7E3  40000A5C  40400004  40400001  00000000  40404040  40404040
40404040  40404040  40404040  40404040  40404040  40404040  40404040
40404040  40404040  40404040  40404040  D9C5E2D6  F0F0F3F4*
02E3E7E3  40000A64  40400004  40400001  00000000  40404040  40404040
40404040  40404040  40404040  40404040  40404040  40404040  40404040
40404040  40404040  40404040  40404040  D9C5E2D6  F0F0F3F5*
02E3E7E3  40000A6C  40400004  40400001  00000000  40404040  40404040
40404040  40404040  40404040  40404040  40404040  40404040  40404040
40404040  40404040  40404040  40404040  D9C5E2D6  F0F0F3F6*
02E3E7E3  40000A74  40400004  40400001  00000000  40404040  40404040
40404040  40404040  40404040  40404040  40404040  40404040  40404040
40404040  40404040  40404040  40404040  D9C5E2D6  F0F0F3F7*
02C5E2C4  40404040  40400010  4040000C  C2E3E7E3  40404040  02000000
40000000  40404040  40404040  40404040  40404040  40404040  40404040
40404040  40404040  40404040  40404040  D9C5E2D6  F0F0F3F8*
02E3E7E3  40000A7C  40400004  40400001  00000000  40404040  40404040
40404040  40404040  40404040  40404040  40404040  40404040  40404040

MEMBER NAME  BLDRESOL
40404040  40404040  40404040  40404040  D9C5E2D6  F0F0F3F9*
02C5E2C4  40404040  40400010  4040000D  C4C3D6E2  40404040  02000000
40000000  40404040  40404040  40404040  40404040  40404040  40404040
40404040  40404040  40404040  40404040  D9C5E2D6  F0F0F4F0**
02C5E2C4  40404040  40400010  4040000E  C4E2C9D5  40404040  02000000
40000000  40404040  40404040  40404040  40404040  40404040  40404040
40404040  40404040  40404040  40404040  D9C5E2D6  F0F0F4F1*
02E3E7E3  40000A84  40400010  40400001  00000000  00000000  00000000
00000000  40404040  40404040  40404040  40404040  40404040  40404040
40404040  40404040  40404040  40404040  D9C5E2D6  F0F0F4F2*
02C5E2C4  40404040  40400010  4040000F  E4D5C9E3  40404040  02000000
40000000  40404040  40404040  40404040  40404040  40404040  40404040
40404040  40404040  40404040  40404040  D9C5E2D6  F0F0F4F3*
02E3E7E3  40000A98  40400004  40400001  00000000  40404040  40404040
40404040  40404040  40404040  40404040  40404040  40404040  40404040
40404040  40404040  40404040  40404040  D9C5E2D6  F0F0F4F4*
02E3E7E3  40000AA0  40400008  40400001  00000000  00000000  40404040
40404040  40404040  40404040  40404040  40404040  40404040  40404040
40404040  40404040  40404040  40404040  D9C5E2D6  F0F0F4F5*
02E3E7E3  40000AAC  40400004  40400001  00000000  40404040  40404040
40404040  40404040  40404040  40404040  40404040  40404040  40404040
40404040  40404040  40404040  40404040  D9C5E2D6  F0F0F4F6*
```

```
02E3E7E3  40000AB4  40400004  40400001  00000000  40404040  40404040
40404040  40404040  40404040  40404040  40404040  40404040  40404040
40404040  40404040  40404040  40404040  D9C5E2D6  F0F0F4F7*
02E3E7E3  40000ABC  40400004  40400001  00000000  40404040  40404040
40404040  40404040  40404040  40404040  40404040  40404040  40404040
40404040  40404040  40404040  40404040  D9C5E2D6  F0F0F4F8*
02C5E2C4  40404040  40400010  40400010  D4E5C3C8  D9404040  02000000
40000000  40404040  40404040  40404040  40404040  40404040  40404040
40404040  40404040  40404040  40404040  D9C5E2D6  F0F0F4F9*
02E3E7E3  40000AC4  40400004  40400001  00000000  40404040  40404040
40404040  40404040  40404040  40404040  40404040  40404040  40404040
40404040  40404040  40404040  40404040  D9C5E2D6  F0F0F5F0**
02C5E2C4  40404040  40400010  40400011  E2D4E7D4  D5404040  02000000
40000000  40404040  40404040  40404040  40404040  40404040  40404040
40404040  40404040  40404040  40404040  D9C5E2D6  F0F0F5F1*
02E3E7E3  40000ACC  4040000C  40400001  00000000  00000000  00000000
40404040  40404040  40404040  40404040  40404040  40404040  40404040
40404040  40404040  40404040  40404040  D9C5E2D6  F0F0F5F2*
02E3E7E3  40000ADC  40400004  40400001  00000000  40404040  40404040
40404040  40404040  40404040  40404040  40404040  40404040  40404040
40404040  40404040  40404040  40404040  D9C5E2D6  F0F0F5F3*
02E3E7E3  40000AE4  40400004  40400001  00000000  40404040  40404040
40404040  40404040  40404040  40404040  40404040  40404040  40404040
40404040  40404040  40404040  40404040  D9C5E2D6  F0F0F5F4*
02C5E2C4  40404040  40400010  40400012  C1D9D6E3  E7E34040  02000000
40000000  40404040  40404040  40404040  40404040  40404040  40404040
40404040  40404040  40404040  40404040  D9C5E2D6  F0F0F5F5*
02E3E7E3  40000AEC  40400004  40400001  00000000  40404040  40404040
40404040  40404040  40404040  40404040  40404040  40404040  40404040
40404040  40404040  40404040  40404040  D9C5E2D6  F0F0F5F6*
02E3E7E3  40000AF4  40400004  40400001  00000000  40404040  40404040
40404040  40404040  40404040  40404040  40404040  40404040  40404040
40404040  40404040  40404040  40404040  D9C5E2D6  F0F0F5F7*
02D9D3C4  40404040  40400038  40404040  000B0001  0C0009F8  000C0001
1C000A84  000D0001  1C000A88  000E0001  1C000A8C  000F0001  1C000AA0
00100001  1C000ACC  00110001  1C000AD0  D9C5E2D6  F0F0F5F8*

MEMBER NAME  BLDRESOL
02C5E2C4  40404040  40400010  40400013  C1E3E3D9  C9C24040  02000000
40000000  40404040  40404040  40404040  40404040  40404040  40404040
40404040  40404040  40404040  40404040  D9C5E2D6  F0F0F5F9*
02C5E2C4  40404040  40400010  40400014  C3C4E3C1  D9C34040  02000000
40000000  40404040  40404040  40404040  40404040  40404040  40404040
40404040  40404040  40404040  40404040  D9C5E2D6  F0F0F6F0**
02C5E2C4  40404040  40400010  40400015  C4C1D9C3  D6E24040  02000000
40000000  40404040  40404040  40404040  40404040  40404040  40404040
40404040  40404040  40404040  40404040  D9C5E2D6  F0F0F6F1*
02C5E2C4  40404040  40400010  40400016  C5D3D3C3  E5E34040  02000000
40000000  40404040  40404040  40404040  40404040  40404040  40404040
40404040  40404040  40404040  40404040  D9C5E2D6  F0F0F6F2*
02E3E7E3  40000AF8  40400010  40400001  00000000  00000000  00000000
00000000  40404040  40404040  40404040  40404040  40404040  40404040
40404040  40404040  40404040  40404040  D9C5E2D6  F0F0F6F3*
02C5E2C4  40404040  40400010  40400017  C5D3D5C1  D4C54040  02000000
40000000  40404040  40404040  40404040  40404040  40404040  40404040
40404040  40404040  40404040  40404040  D9C5E2D6  F0F0F6F4*
02E3E7E3  40000B0C  4040000C  40400001  00000000  00000000  00000000
40404040  40404040  40404040  40404040  40404040  40404040  40404040
40404040  40404040  40404040  40404040  D9C5E2D6  F0F0F6F5*
02C5E2C4  40404040  40400010  40400018  C6E3C9D5  C6D64040  02000000
40000000  40404040  40404040  40404040  40404040  40404040  40404040
```

```
40404040  40404040  40404040  40404040  D9C5E2D6  F0F0F6F6*
02E3E7E3  40000B1C  40400004  40400001  00000000  40404040  40404040
40404040  40404040  40404040  40404040  40404040  40404040  40404040
40404040  40404040  40404040  40404040  D9C5E2D6  F0F0F6F7*
02C5E2C4  40404040  40400010  40400019  C9C2C3D6  D47B4040  02000000
40000000  40404040  40404040  40404040  40404040  40404040  40404040
40404040  40404040  40404040  40404040  D9C5E2D6  F0F0F6F8*
02E3E7E3  40000B24  40400008  40400001  00000000  00000000  40404040
40404040  40404040  40404040  40404040  40404040  40404040  40404040
40404040  40404040  40404040  40404040  D9C5E2D6  F0F0F6F9*
02D9D3C4  40404040  40400038  40404040  00120001  1C000AF4  00130001
1C000AF8  00140001  1C000AFC  00150001  1C000B00  00160001  1C000B0C
00170001  1C000B10  00180001  1C000B24  D9C5E2D6  F0F0F7F0**
02C5E2C4  40404040  40400010  4040001A  D2D6D4D7  D9E54040  02000000
40000000  40404040  40404040  40404040  40404040  40404040  40404040
40404040  40404040  40404040  40404040  D9C5E2D6  F0F0F7F1*
02C5E2C4  40404040  40400010  4040001B  D9C5E3D9  C5E54040  02000000
40000000  40404040  40404040  40404040  40404040  40404040  40404040
40404040  40404040  40404040  40404040  D9C5E2D6  F0F0F7F2*
02C5E2C4  40404040  40400010  4040001C  E3E7E3D5  C6D64040  02000000
40000000  40404040  40404040  40404040  40404040  40404040  40404040
40404040  40404040  40404040  40404040  D9C5E2D6  F0F0F7F3*
02E3E7E3  40000B2C  4040000C  40400001  00000000  00000000  00000000
40404040  40404040  40404040  40404040  40404040  40404040  40404040
40404040  40404040  40404040  40404040  D9C5E2D6  F0F0F7F4*
02E3E7E3  40000B3C  40400008  40400001  00000000  00000000  40404040
40404040  40404040  40404040  40404040  40404040  40404040  40404040
40404040  40404040  40404040  40404040  D9C5E2D6  F0F0F7F5*
02E3E7E3  40000B48  40400004  40400001  00000000  40404040  40404040
40404040  40404040  40404040  40404040  40404040  40404040  40404040
40404040  40404040  40404040  40404040  D9C5E2D6  F0F0F7F6*
02E3E7E3  40000B50  40400004  40400001  00000000  40404040  40404040
40404040  40404040  40404040  40404040  40404040  40404040  40404040
40404040  40404040  40404040  40404040  D9C5E2D6  F0F0F7F7*
02E3E7E3  400008FC  40400028  40400001  00000000  00000000  00000000

MEMBER NAME  BLDRESOL
00000000  00000000  00000000  00000000  00000000  00000000  00000000
40404040  40404040  40404040  40404040  D9C5E2D6  F0F0F7F8*
02E3E7E3  40000B94  40400038  40400001  5880D93C  5890D948  58A0D944
1BFF58E0  D00007FE  5880D93C  5890D948  58A0D944  5800D220  5000D4BC
1BFF58E0  D00007FE  5880D93C  5890D948  D9C5E2D6  F0F0F7F9*
02E3E7E3  40000BCC  40400038  40400001  58A0D944  5800D214  5000D284
1BFF58E0  D00007FE  5880D93C  5890D948  58A0D944  1BFF58E0  D00007FE
5880D93C  5890D948  58A0D944  5800D210  D9C5E2D6  F0F0F8F0**
02E3E7E3  40000C04  40400038  40400001  58F0D95C  5000F000  58F0D960
5000F028  5800D224  5000D3A8  5800D220  5000D2B4  5800D2DC  12004770
DBCE5800  D2145000  D2B47800  D35858F0  D9C5E2D6  F0F0F8F1*
02E3E7E3  40000C3C  40400038  40400001  D9607000  F02458F0  DA444110
D06405EF  58F0DA44  4110D070  05EF58F0  DAA44110  D07C05EF  41E00004
15FE4720  DBE858EF  D04C07FE  5800D4E8  D9C5E2D6  F0F0F8F2*
02E3E7E3  40000C74  40400038  40400001  12004770  DBFA5800  D2145000
D2B45800  D4E81200  4770DC10  5800D21C  58F0D95C  5000F000  58F0D960
5800F034  1BFF860F  DC261BFF  58E0D000  D9C5E2D6  F0F0F8F3*
02E3E7E3  40000CAC  40400038  40400001  07FE58F0  DAA44110  D09405EF
41E00004  15FE4720  DC4058EF  D05407FE  5800D4E8  12004780  DC521BFF
58E0D000  07FE5800  D2145000  D2B458F0  D9C5E2D6  F0F0F8F4*
02E3E7E3  40000CE4  40400038  40400001  DA444110  D0AC05EF  5800D220
5000D3A8  5800D21C  58F0D960  5000F028  1BFF58E0  D00007FE  5880D93C
5890D948  58A0D944  1BFF58E0  D00007FE  D9C5E2D6  F0F0F8F5*
02E3E7E3  40000D1C  40400038  40400001  5880D93C  5890D948  58A0D944
```

```
1BFF58E0  D00007FE  5880D93C  5890D948  58A0D944  58F0D95C  5800F000
1BFF870F  DCCA1BFF  58E0D000  07FE58F0  D9C5E2D6  F0F0F8F6*
02E3E7E3  40000D54  40400038  40400001  D9605800  F0281BFF  870FDCE0
1BFF58E0  D00007FE  58F0DA88  4110D0B8  05EF5800  D34C5000  D34458F0
DA704110  D0C805EF  5800D4FC  58F0D968  D9C5E2D6  F0F0F8F7*
02E3E7E3  40000D8C  40400038  40400001  5900F000  4770DDA4  5800D4EC
12004770  DD1E1BFF  58E0D000  07FE58F0  DAB44110  D0F405EF  41E00004
15FE4720  DD3858EF  D05C07FE  58F0D970  D9C5E2D6  F0F0F8F8*
02E3E7E3  40000DC4  40400038  40400001  5830F000  5A30D220  5030F000
58F0D984  7820F004  5C20D258  58F0D96C  7023F004  58F0D984  7820F008
58F0D96C  7023F008  58F0D98C  7820F004  D9C5E2D6  F0F0F8F9*
02E3E7E3  40000DFC  40400038  40400001  58F0D96C  7023F00C  58F0D98C
7820F008  58F0D96C  7023F010  7820D86C  7023F014  7820D870  7023F018
1BFF58E0  D00007FE  5800D2B8  5900D230  D9C5E2D6  F0F0F9F0**
02E3E7E3  40000E34  40400038  40400001  4750DDB8  1BFF58E0  D00007FE
5830A038  5A30D220  5030A038  5C20D264  7800D270  7003A004  58F0D958
5800F008  5700D1F4  5000D1E4  6820D1E0  D9C5E2D6  F0F0F9F1*
02E3E7E3  40000E6C  40400038  40400001  6B20D1F0  7023A008  58F0D984
7820F004  7023A00C  7820F008  7023A010  58F0D98C  7820F004  7023A014
7820F008  7023A018  4103A01C  5000D104  D9C5E2D6  F0F0F9F2*
02E3E7E3  40000EA4  40400038  40400001  58F0DA44  4110D100  05EF1BFF
58E0D000  07FE5880  D93C5890  D94858A0  D9441BFF  58E0D000  07FE5880
D93C5890  D94858A0  D94458F0  D95C5800  D9C5E2D6  F0F0F9F3*
02E3E7E3  40000EDC  40400038  40400001  F0001BFF  870FDE64  1BFF58E0
D00007FE  58F0D960  5800F028  1BFF870F  DE7A1BFF  58E0D000  07FE5800
D2B85900  D2304750  DE8E1BFF  58E0D000  D9C5E2D6  F0F0F9F4*
02E3E7E3  40000F14  40400038  40400001  07FE58F0  D9847820  F0047A20
D2F458F0  D98C7020  F00458F0  D9847820  F00858F0  D98C7020  F00858F0
D9847820  F0047B20  D2F47020  D8607820  D9C5E2D6  F0F0F9F5*
02E3E7E3  40000F4C  40400038  40400001  F0087020  D86458F0  DA744110
D10C05EF  58F0DA74  4110D11C  05EF1BFF  58E0D000  07FE5880  D93C5890
D94858A0  D94458F0  D95C5800  F0001BFF  D9C5E2D6  F0F0F9F6*
02E3E7E3  40000F84  40400038  40400001  870FDF08  1BFF58E0  D00007FE
58F0D960  5800F028  1BFF870F  DF1E1BFF  58E0D000  07FE5800  D2B85900

MEMBER NAME  BLDRESOL
D2304750  DF321BFF  58E0D000  07FE5800  D9C5E2D6  F0F0F9F7*
02E3E7E3  40000FBC  40400038  40400001  D3B85B00  D2205000  D3BC5800
D2205000  D2845880  D2205890  D9EC5850  D9585800  D2841A08  5000D288
5830A038  1A385030  A0385C20  D2647800  D9C5E2D6  F0F0F9F8*
02E3E7E3  40000FF4  40400038  40400001  D2707003  A0045800  50085700
D1F45000  D1E46820  D1E06B20  D1F07023  A0085870  D2845C60  D24C1847
5A40D22C  78249000  7023A00C  5870D284  D9C5E2D6  F0F0F9F9*
02E3E7E3  4000102C  40400038  40400001  5C60D24C  18475A40  D23C7824
90007023  A0105870  D2885C60  D24C1847  5A40D22C  78249000  7023A014
5870D288  5C60D24C  18475A40  D23C7824  D9C5E2D6  F0F1F0F0**
02E3E7E3  40001064  40400038  40400001  90007023  A0184103  A01C5000
D10458F0  DA444110  D10005EF  5800D284  1A085000  D2845900  D3BC47C0
DF525880  D93C5890  D9481BFF  58E0D000  D9C5E2D6  F0F1F0F1*
02E3E7E3  4000109C  40400038  40400001  07FE5880  D93C5890  D94858A0
D94458F0  D95C5800  F0001BFF  870FC038  1BFF58E0  D00007FE  58F0D960
5800F028  1BFF870F  C04E1BFF  58E0D000  D9C5E2D6  F0F1F0F2*
02E3E7E3  400010D4  40400038  40400001  07FE5800  D2B85900  D2304750
C0621BFF  58E0D000  07FE5870  D3B85A70  D2205850  D3B85A50  D2245050
D4D45830  A0385A30  D2205030  A0385C20  D9C5E2D6  F0F1F0F3*
02E3E7E3  4000110C  40400038  40400001  D2647800  D2747003  A00458F0
D9585800  F0085700  D1F45000  D1E46820  D1E06B20  D1F07023  A0085C60
D24C5820  D22C1A27  58F0D9BC  7802F000  D9C5E2D6  F0F1F0F4*
02E3E7E3  40001144  40400038  40400001  7000D2A0  5800D23C  5000DAD4
18401A47  7804F000  7000D2A4  5830D24C  1A377803  F0007000  D2A858F0
DA184110  D12C05EF  7820D510  7C20D2A4  D9C5E2D6  F0F1F0F5*
```

```
02E3E7E3  4000117C  40400038  40400001  58F0D9EC  33227A22  F0005830
A0385C20  D2647023  A00C7820  D5107C20  D2A07A24  F0007023  A0105C40
D24C5820  D22C1A25  58F0D9BC  7802F000  D9C5E2D6  F0F1F0F6*
02E3E7E3  400011B4  40400038  40400001  7000D2A0  5800D23C  1A055000
DAD858E0  DAD8780E  F0007000  D2A45830  D24C1A35  7803F000  7000D2A8
58F0DA18  4110D12C  05EF5810  A0385C00  D9C5E2D6  F0F1F0F7*
02E3E7E3  400011EC  40400038  40400001  D2645010  DAD07820  D5107C20
D2A458F0  D9EC3322  7A22F000  58E0DAD0  702EA014  7820D510  7C20D2A0
58E0DAD8  58F0D9EC  7A2EF000  58E0DAD0  D9C5E2D6  F0F1F0F8*
02E3E7E3  40001224  40400038  40400001  702EA018  58208014  5A20D220
50208014  18025700  D1F45000  D1E46820  D1E06B20  D1F058E0  DAD0702E
A01C5800  D3B85700  D1F45000  D1E46820  D9C5E2D6  F0F1F0F9*
02E3E7E3  4000125C  40400038  40400001  D1E06B20  D1F058E0  DAD0702E
A0205820  902C5A20  D2205020  902C1802  5700D1F4  5000D1E4  6820D1E0
6B20D1F0  58E0DAD0  702EA024  410EA028  D9C5E2D6  F0F1F1F0**
02E3E7E3  40001294  40400038  40400001  5000D13C  58F0DA44  4110D138
05EF5800  80145B00  D2205000  80145800  D2205000  D28418A8  5890D99C
5880D9BC  5830D9EC  5850A014  5A50D220  D9C5E2D6  F0F1F1F1*
02E3E7E3  400012CC  40400038  40400001  5050A014  5C40D254  5870D284
5C60D24C  18275A20  D22C4105  A0045000  D1484102  30005000  D14C9280
D14C58F0  DA444110  D14405EF  5850A014  D9C5E2D6  F0F1F1F2*
02E3E7E3  40001304  40400038  40400001  5C40D254  5870D284  5C60D24C
18275A20  D22C4105  A00C5000  D1484102  80005000  D14C9280  D14C58F0
DA444110  D14405EF  5850A014  5C40D254  D9C5E2D6  F0F1F1F3*
02E3E7E3  4000133C  40400038  40400001  5820D284  89200002  4105A014
5000D154  41029000  5000D158  9280D158  58F0DA44  4110D150  05EF5800
D2845A00  D2205000  D2845900  D3B847C0  D9C5E2D6  F0F1F1F4*
02E3E7E3  40001374  40400038  40400001  C23C5880  D93C5890  D94858A0
D9445800  80145900  D26C47C0  C32A58F0  DAA01800  45E0F004  00000006
00000030  45E0F010  58F0DAA0  45E0F034  D9C5E2D6  F0F1F1F5*
02E3E7E3  400013AC  40400038  40400001  05404040  F4F45800  902C5900
D26847C0  C35A58F0  DAA01800  45E0F004  00000006  00000046  45E0F010
58F0DAA0  45E0F034  05404040  F4F45820  D9C5E2D6  F0F1F1F6*

MEMBER NAME  BLDRESOL
02E3E7E3  400013E4  40400038  40400001  D3B85A20  D2208920  000258F0
D99C7842  F0005820  D3388920  00027D42  F0005820  D3B85A20  D2248920
00027822  F0005820  D3348920  00027D22  D9C5E2D6  F0F1F1F7*
02E3E7E3  4000141C  40400038  40400001  F0005830  A0385C20  D2642B00
7803A01C  6A00D1E8  6000D1D8  5800D1DC  5000D4DC  2B007803  A0206A00
D1E86000  D1D85800  D1DC5000  D4D85810  D9C5E2D6  F0F1F1F8*
02E3E7E3  40001454  40400038  40400001  902C5C00  D2605010  DADC5800
D3385700  D1F45000  D1E46860  D1E06B60  D1F058E0  DADC706E  90045800
D3345700  D1F45000  D1E46860  D1E06B60  D9C5E2D6  F0F1F1F9*
02E3E7E3  4000148C  40400038  40400001  D1F058E0  DADC706E  9008704E
900C702E  90107800  D218700E  90145800  D3405900  D2284750  C43658E0
DADC7800  D510700E  90145830  D3385A30  D9C5E2D6  F0F1F2F0**
02E3E7E3  400014C4  40400038  40400001  D4DC5B30  D2205820  D3345B20
D3385A20  D2245020  D3505C20  D2544103  80045000  D15C58F0  DA484110
D15C05EF  5830902C  5C20D260  7800D380  D9C5E2D6  F0F1F2F1*
02E3E7E3  400014FC  40400038  40400001  70039018  7800D37C  7003901C
7800D388  70039020  7800D384  70039024  7800D218  70039028  7800D218
7003902C  1BFF58E0  D00007FE  5880D93C  D9C5E2D6  F0F1F2F2*
02E3E7E3  40001534  40400038  40400001  5890D948  58A0D944  58F0D95C
5800F000  1BFF870F  C4CC58F0  D9FC4110  D17805EF  58F0D960  5800F028
1BFF860F  C4E21BFF  58E0D000  07FE58F0  D9C5E2D6  F0F1F2F3*
02E3E7E3  4000156C  40400038  40400001  D9605800  F0341BFF  860FC4F8
1BFF58E0  D00007FE  58F0DA9C  4110D178  05EF1BFF  58E0D000  07FE5880
D93C5890  D94858A0  D94458F0  D95C5800  D9C5E2D6  F0F1F2F4*
02E3E7E3  400015A4  40400038  40400001  F0001BFF  870FC52C  1BFF58E0
D00007FE  58F0D960  5800F028  1BFF870F  C5421BFF  58E0D000  07FE5800
D2B85900  D2304750  C5561BFF  58E0D000  D9C5E2D6  F0F1F2F5*
```

```
02E3E7E3  400015DC  40400038  40400001  07FE58F0  DA884110  D18405EF
58F0DAA8  4110D194  05EF6800  D1F82300  6000DAF8  58F0DA78  4110D1A4
05EF6000  DB006000  D5302B22  7820D2C0  D9C5E2D6  F0F1F2F6*
02E3E7E3  40001614  40400038  40400001  6C20DB00  6D20D208  6020D538
58F0D984  2B227820  F0046020  D8A02B22  7820F008  6020D8A8  58F0DA00
4110D1A8  05EF6000  DAF82B22  7820D300  D9C5E2D6  F0F1F2F7*
02E3E7E3  4000164C  40400038  40400001  6C20DAF8  6D20D200  6020D8C8
58F0DA04  4110D1A8  05EF6000  DAF82B22  7820D300  6C20DAF8  6D20D200
6020D8D0  6820DB00  6D20D200  6A20D538  D9C5E2D6  F0F1F2F8*
02E3E7E3  40001684  40400038  40400001  6020DAF8  58F0DA00  4110D1AC
05EF6000  DB002B22  7820D304  6C20DB00  6D20D200  6020D8D8  58F0DA04
4110D1B0  05EF6000  DB002B22  7820D304  D9C5E2D6  F0F1F2F9*
02E3E7E3  400016BC  40400038  40400001  6C20DB00  6D20D200  6020D8E0
4100D8B8  5000D1B4  9280D1B4  58F0DA00  4110D1B4  05EF7000  D3084100
D8B85000  D1B49280  D1B458F0  DA044110  D9C5E2D6  F0F1F3F0**
02E3E7E3  400016F4  40400038  40400001  D1B405EF  28407000  D35C2B00
7800D308  6000DAE0  6820D8C8  6C20DAE0  6A20D8A0  2B003804  6000DAE8
6840D8D8  6C40DAE8  2A247020  D3D46840  D9C5E2D6  F0F1F3F1*
02E3E7E3  4000172C  40400038  40400001  D8D06C40  DAE06A40  D8A86860
D8E06C60  DAE82A46  58F0D98C  7B20F004  30227B40  F0083044  7040D368
58F0D940  7920F004  47A0C6E8  7800D368  D9C5E2D6  F0F1F3F2*
02E3E7E3  40001764  40400038  40400001  58F0D940  7900F004  4750C700
6820D8B8  6A20D530  6020D8B8  6820D8C0  6A20D530  6020D8C0  58F0DA84
4110D1B8  05EF5830  A0385A30  D2205030  D9C5E2D6  F0F1F3F3*
02E3E7E3  4000179C  40400038  40400001  A0385C20  D2647800  D2747003
A00458F0  D9585800  F0085700  D1F45000  D1E46820  D1E06B20  D1F07023
A0087820  D7207023  A00C7820  D7247023  D9C5E2D6  F0F1F3F4*
02E3E7E3  400017D4  40400038  40400001  A0105840  D28C8940  00037824
D7187023  A0147824  D71C7023  A0185840  80145A40  D2205040  80141804
5700D1F4  5000D1E4  6820D1E0  6B20D1F0  D9C5E2D6  F0F1F3F5*
02E3E7E3  4000180C  40400038  40400001  7023A01C  5800D28C  5700D1F4

MEMBER NAME  BLDRESOL
5000D1E4  6800D1E0  6B00D1F0  7000DAF0  7800DAF0  7003A020  5840902C
5A40D220  5040902C  18045700  D1F45000  D9C5E2D6  F0F1F3F6*
02E3E7E3  40001844  40400038  40400001  D1E46820  D1E06B20  D1F07023
A0244103  A0285000  D13C58F0  DA444110  D13805EF  58008014  5B00D220
50008014  5800D220  5000D284  5880D28C  D9C5E2D6  F0F1F3F7*
02E3E7E3  4000187C  40400038  40400001  5890D220  58A0D93C  5850A014
1A595050  A0145C40  D2545820  D2848920  00034105  A0045000  D1484102
D7185000  D14C9280  D14C58F0  DA444110  D9C5E2D6  F0F1F3F8*
02E3E7E3  400018B4  40400038  40400001  D14405EF  5850A014  5C40D254
5820D284  89200003  4105A00C  5000D148  4102D538  5000D14C  9280D14C
58F0DA44  4110D144  05EF5850  A0145C40  D9C5E2D6  F0F1F3F9*
02E3E7E3  400018EC  40400038  40400001  D2545820  D2848920  00024105
A0145000  D1544102  D67C5000  D1589280  D15858F0  DA444110  D15005EF
5800D284  1A095000  D2841908  47C0C7FC  D9C5E2D6  F0F1F4F0**
02E3E7E3  40001924  40400038  40400001  5880D93C  5890D948  58A0D944
5850A038  5C40D264  2B007805  A01C6A00  D1E86000  D1D85830  D1DC2B00
7805A020  6A00D1E8  6000D1D8  5820D1DC  D9C5E2D6  F0F1F4F1*
02E3E7E3  4000195C  40400038  40400001  5850902C  5C40D260  7800D270
70059004  7820DAF0  3B207025  90087800  D2187005  900C7800  D2707005
90107800  D2187005  90147000  D5105020  D9C5E2D6  F0F1F4F2*
02E3E7E3  40001994  40400038  40400001  D3505C20  D2544103  80045000
D15C58F0  DA484110  D15C05EF  5830902C  5C20D260  7800D380  70039018
7800D37C  7003901C  7800D388  70039020  D9C5E2D6  F0F1F4F3*
02E3E7E3  400019CC  40400038  40400001  7800D384  70039024  7800D218
70039028  7800D218  7003902C  1BFF58E0  D00007FE  5880D93C  5890D948
58A0D944  1BFF58E0  D00007FE  5880D93C  D9C5E2D6  F0F1F4F4*
02E3E7E3  40001A04  40400038  40400001  5890D948  58A0D944  1BFF58E0
D00007FE  5880D93C  5890D948  58A0D944  5800D214  5000D328  1BFF58E0
```

```
D00007FE  5880D93C  5890D948  58A0D944  D9C5E2D6  F0F1F4F5*
02E3E7E3  40001A3C  40400038  40400001  1BFF58E0  D00007FE  5880D93C
5890D948  58A0D944  58F0D95C  5800F000  1BFF870F  C9DE1BFF  58E0D000
07FE5800  D3B41200  4770C9F0  1BFF58E0  D9C5E2D6  F0F1F4F6*
02E3E7E3  40001A74  40400038  40400001  D00007FE  58F0DA6C  4110D1CC
05EF1BFF  58E0D000  07FE5880  D93C5890  D94858A0  D9441BFF  58E0D000
07FE5880  D93C5890  D94858A0  D9441BFF  D9C5E2D6  F0F1F4F7*
02E3E7E3  40001AAC  40400038  40400001  58E0D000  07FE5880  D93C5890
D94858A0  D9441BFF  58E0D000  07FE5880  D93C5890  D94858A0  D9441BFF
58E0D000  07FE5880  D93C5890  D94858A0  D9C5E2D6  F0F1F4F8*
02E3E7E3  40001AE4  40400038  40400001  D9441BFF  58E0D000  07FE5880
D93C5890  D94858A0  D9445800  D2145000  D4BC1BFF  58E0D000  07FE5880
D93C5890  D94858A0  D9441BFF  58E0D000  D9C5E2D6  F0F1F4F9*
02E3E7E3  40001B1C  40400038  40400001  07FE5880  D93C5890  D94858A0
D9441BFF  58E0D000  07FE5880  D93C5890  D94858A0  D9441BFF  58E0D000
07FE5880  D93C5890  D94858A0  D9441BFF  D9C5E2D6  F0F1F5F0**
02E3E7E3  40001B54  40400038  40400001  58E0D000  07FE5880  D93C5890
D94858A0  D9441BFF  58E0D000  07FE5880  D93C5890  D94858A0  D9441BFF
58E0D000  07FE5880  D93C5890  D94858A0  D9C5E2D6  F0F1F5F1*
02E3E7E3  40001B8C  40400038  40400001  D9441BFF  58E0D000  07FE5880
D93C5890  D94858A0  D9441BFF  58E0D000  07FE58F0  DAA01800  45E0F004
00000006  0000005C  45E0F010  1BFF58E0  D9C5E2D6  F0F1F5F2*
02C5E2C4  40404040  40400010  40404040  C3C4E3E2  E3404040  01001BE4
40000001  40404040  40404040  40404040  40404040  40404040  40404040
40404040  40404040  40404040  40404040  D9C5E2D6  F0F1F5F3*
02E3E7E3  40001BC4  4040001E  40400001  D00007FE  58D0D004  58E0D00C
92FFD00C  982CD01C  07FE58C0  D04847F0  DB0C4040  40404040  40404040
40404040  40404040  40404040  40404040  D9C5E2D6  F0F1F5F4*
02E3E7E3  40001BE4  40400020  40400001  47F0F00C  07C3C4E3  E2E34040
90ECD00C  9823F020  58F0F01C  47F0F014  00000000  40404040  40404040

MEMBER NAME  BLDRESOL
40404040  40404040  40404040  40404040  D9C5E2D6  F0F1F5F5*
02D9D3C4  40404040  40400038  40404040  00190001  1C000B28  001A0001
1C000B2C  001B0001  1C000B30  001C0001  1C000B3C  00010001  0C00139C
00010001  0C0013CC  00010001  0C001BB8  D9C5E2D6  F0F1F5F6*
02E3E7E3  40001C08  40400016  40400001  00001C0C  58D0D004  58E0D00C
92FFD00C  982CD01C  07FE4040  40404040  40404040  40404040  40404040
40404040  40404040  40404040  40404040  D9C5E2D6  F0F1F5F7*
02E3E7E3  40001C04  40400004  40400001  00001C1E  40404040  40404040
40404040  40404040  40404040  40404040  40404040  40404040  40404040
40404040  40404040  40404040  40404040  D9C5E2D6  F0F1F5F8*
02E3E7E3  40001C1E  40400038  40400001  58C0D048  98781008  58207000
5020D4CC  58208000  5020D320  58201000  41302000  41500004  1B255020
DA345030  DA385820  10044130  20004150  D9C5E2D6  F0F1F5F9*
02C5E2C4  40404040  40400010  40404040  C3C4E3C4  E3D64040  01001C68
40000001  40404040  40404040  40404040  40404040  40404040  40404040
40404040  40404040  40404040  40404040  D9C5E2D6  F0F1F6F0**
02E3E7E3  40001C56  40400010  40400001  00041B25  5020DA08  5030DA0C
47F0DB0C  40404040  40404040  40404040  40404040  40404040  40404040
40404040  40404040  40404040  40404040  D9C5E2D6  F0F1F6F1*
02E3E7E3  40001C68  40400020  40400001  47F0F00C  07C3C4E3  C4E3D640
90ECD00C  9823F020  58F0F01C  47F0F014  00000000  40404040  40404040
40404040  40404040  40404040  40404040  D9C5E2D6  F0F1F6F2*
02E3E7E3  40001C8C  40400034  40400001  00001C90  58A0D004  58E0A00C
58B0A018  5810B014  5820D4BC  50201000  5830B018  5840D2B8  50403000
18DA92FF  A00C982C  A01C07FE  40404040  D9C5E2D6  F0F1F6F3*
02E3E7E3  40001C88  40400004  40400001  00001CC0  40404040  40404040
40404040  40404040  40404040  40404040  40404040  40404040  40404040
40404040  40404040  40404040  40404040  D9C5E2D6  F0F1F6F4*
02E3E7E3  40001CC0  40400038  40400001  58C0D048  987B1008  58207000
```

```
5020D318  78208000  7020D358  58209000  5020D4AC  5820A000  5020D4BC
5820B000  5020D2B8  58201000  41302000  D9C5E2D6  F0F1F6F5*
02C5E2C4  40404040  40400010  40404040  C3C4E3C2  C7C44040  01001D30
40000001  40404040  40404040  40404040  40404040  40404040  40404040
40404040  40404040  40404040  40404040  D9C5E2D6  F0F1F6F6*
02E3E7E3  40001CF8  40400038  40400001  41500004  1B255020  D9845030
D9885030  D10C5030  D11C5820  10044130  20004150  00041B25  5020D98C
5030D990  5030D110  5030D124  47F0DB20  D9C5E2D6  F0F1F6F7*
02E3E7E3  40001D30  40400020  40400001  47F0F00C  07C3C4E3  C2C7C440
90ECD00C  9823F020  58F0F01C  47F0F014  00000000  40404040  40404040
40404040  40404040  40404040  40404040  D9C5E2D6  F0F1F6F8*
02E3E7E3  40001D54  40400004  40400001  00001D58  40404040  40404040
40404040  40404040  40404040  40404040  40404040  40404040  40404040
40404040  40404040  40404040  40404040  D9C5E2D6  F0F1F6F9*
02D9D3C4  40404040  40400038  40404040  00010001  0C001C00  00010001
0C001C08  00010001  0C001C04  00010001  0C001C84  00010001  0C001C8C
00010001  0C001C88  00010001  0C001D4C  D9C5E2D6  F0F1F7F0**
02E3E7E3  40001D58  40400024  40400001  58A0D004  58E0A00C  58B0A018
5810B004  5820D284  50201000  18DA92FF  A00C982C  A01C07FE  40404040
40404040  40404040  40404040  40404040  D9C5E2D6  F0F1F7F1*
02E3E7E3  40001D50  40400004  40400001  00001D7C  40404040  40404040
40404040  40404040  40404040  40404040  40404040  40404040  40404040
40404040  40404040  40404040  40404040  D9C5E2D6  F0F1F7F2*
02C5E2C4  40404040  40400010  40404040  C3C4E3C5  C4E34040  01001D98
40000001  40404040  40404040  40404040  40404040  40404040  40404040
40404040  40404040  40404040  40404040  D9C5E2D6  F0F1F7F3*
02E3E7E3  40001D7C  40400038  40400001  58C0D048  98781000  58207000
5020D2DC  58208000  5020D284  47F0DB3C  47F0F00C  07C3C4E3  C5C4E340
90ECD00C  9823F020  58F0F01C  47F0F014  D9C5E2D6  F0F1F7F4*

MEMBER NAME  BLDRESOL
02E3E7E3  40001DB4  40400004  40400001  00000000  40404040  40404040
40404040  40404040  40404040  40404040  40404040  40404040  40404040
40404040  40404040  40404040  40404040  D9C5E2D6  F0F1F7F5*
02E3E7E3  40001DBC  40400028  40400001  00001DC0  58A0D004  58E0A00C
58B0A018  5810B010  5820D284  50201000  18DA92FF  A00C982C  A01C07FE
40404040  40404040  40404040  40404040  D9C5E2D6  F0F1F7F6*
02E3E7E3  40001DB8  40400004  40400001  00001DE4  40404040  40404040
40404040  40404040  40404040  40404040  40404040  40404040  40404040
40404040  40404040  40404040  40404040  D9C5E2D6  F0F1F7F7*
02C5E2C4  40404040  40400010  40404040  C3C4E3C2  E5E44040  01001E18
40000001  40404040  40404040  40404040  40404040  40404040  40404040
40404040  40404040  40404040  40404040  D9C5E2D6  F0F1F7F8*
02E3E7E3  40001DE4  40400038  40400001  58C0D048  987B1000  78207000
7020D290  78208000  7020D294  78209000  7020D298  7820A000  7020D29C
5820B000  5020D284  47F0DB58  47F0F00C  D9C5E2D6  F0F1F7F9*
02E3E7E3  40001E1C  4040001C  40400001  07C3C4E3  C2E5E440  90ECD00C
9823F020  58F0F01C  47F0F014  00000000  40404040  40404040  40404040
40404040  40404040  40404040  40404040  D9C5E2D6  F0F1F8F0**
02E3E7E3  40001E3C  40400038  40400001  00001E40  58A0D004  58E0A00C
58B0A018  5810B004  4820D280  40201000  5830B008  5840D3A8  50403000
5850B00C  5860D2B4  50605000  18DA92FF  D9C5E2D6  F0F1F8F1*
02E3E7E3  40001E74  40400008  40400001  A00C982C  A01C07FE  40404040
40404040  40404040  40404040  40404040  40404040  40404040  40404040
40404040  40404040  40404040  40404040  D9C5E2D6  F0F1F8F2*
02E3E7E3  40001E38  40400004  40400001  00001E7C  40404040  40404040
40404040  40404040  40404040  40404040  40404040  40404040  40404040
40404040  40404040  40404040  40404040  D9C5E2D6  F0F1F8F3*
02D9D3C4  40404040  40400038  40404040  00010001  0C001D54  00010001
0C001D50  00010001  0C001DB4  00010001  0C001DBC  00010001  0C001DB8
00010001  0C001E34  00010001  0C001E3C  D9C5E2D6  F0F1F8F4*
```

| | | | | | | |
|---|---|---|---|---|---|---|
| 02E3E7E3 | 40001E7C | 40400038 | 40400001 | 58C0D048 | 987B1000 | 58207000 |
| 5020D2DC | 48208000 | 4020D280 | 58209000 | 5020D3A8 | 5820A000 | 5020D2B4 |
| 58701020 | 78207000 | 7020D358 | 58201010 | D9C5E2D6 | F0F1F8F5* | |
| 02E3E7E3 | 40001EB4 | 40400038 | 40400001 | 41302000 | 41500004 | 1B255020 |
| DA2C5030 | DA305820 | 10144130 | 20004150 | 00041B25 | 5020D984 | 5030D988 |
| 5030D10C | 5030D11C | 58201018 | 41302000 | D9C5E2D6 | F0F1F8F6* | |
| 02E3E7E3 | 40001EEC | 40400038 | 40400001 | 41500004 | 1B255020 | D9745030 |
| D9785030 | D06C9280 | D06C5820 | 101C4130 | 20004150 | 00041B25 | 5020D97C |
| 5030D980 | 5030D078 | 9280D078 | 5030D0B4 | D9C5E2D6 | F0F1F8F7* | |
| 02C5E2C4 | 40404040 | 40400010 | 40404040 | C3C4E3C5 | E5E44040 | 01001F2C |
| 40000001 | 40404040 | 40404040 | 40404040 | 40404040 | 40404040 | 40404040 |
| 40404040 | 40404040 | 40404040 | 40404040 | D9C5E2D6 | F0F1F8F8* | |
| 02E3E7E3 | 40001F24 | 40400028 | 40400001 | 9280D0B4 | 47F0DB6C | 47F0F00C |
| 07C3C4E3 | C5E5E440 | 90ECD00C | 9823F020 | 58F0F01C | 47F0F014 | 00000000 |
| 40404040 | 40404040 | 40404040 | 40404040 | D9C5E2D6 | F0F1F8F9* | |
| 02E3E7E3 | 40001F50 | 40400016 | 40400001 | 00001F54 | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F1F9F0** | |
| 02E3E7E3 | 40001F4C | 40400004 | 40400001 | 00001F66 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F1F9F1* | |
| 02C5E2C4 | 40404040 | 40400010 | 40404040 | C3C4E3C5 | D5C44040 | 01001F7C |
| 40000001 | 40404040 | 40404040 | 40404040 | 40404040 | 40404040 | 40404040 |
| 40404040 | 40404040 | 40404040 | 40404040 | D9C5E2D6 | F0F1F9F2* | |
| 02E3E7E3 | 40001F66 | 40400014 | 40400001 | 58C0D048 | 58701000 | 58207000 |
| 5020D2DC | 47F0DC80 | 40404040 | 40404040 | 40404040 | 40404040 | 40404040 |
| 40404040 | 40404040 | 40404040 | 40404040 | D9C5E2D6 | F0F1F9F3* | |
| 02E3E7E3 | 40001F7C | 40400020 | 40400001 | 47F0F00C | 07C3C4E3 | C5D5C440 |

MEMBER NAME BLDRESOL

| | | | | | | |
|---|---|---|---|---|---|---|
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F1F9F4* | |
| 02E3E7E3 | 40001FA0 | 40400016 | 40400001 | 00001FA4 | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F1F9F5* | |
| 02E3E7E3 | 40001F9C | 40400004 | 40400001 | 00001FB6 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F1F9F6* | |
| 02C5E2C4 | 40404040 | 40400010 | 40404040 | C3C4E3D3 | D5404040 | 01001FEC |
| 40000001 | 40404040 | 40404040 | 40404040 | 40404040 | 40404040 | 40404040 |
| 40404040 | 40404040 | 40404040 | 40404040 | D9C5E2D6 | F0F1F9F7* | |
| 02E3E7E3 | 40001FB6 | 40400034 | 40400001 | 58C0D048 | 58201000 | 41302000 |
| 41500004 | 1B255020 | DA345030 | DA385820 | 10044130 | 20004150 | 00041B25 |
| 5020DA08 | 5030DA0C | 47F0DC94 | 40404040 | D9C5E2D6 | F0F1F9F8* | |
| 02E3E7E3 | 40001FEC | 40400020 | 40400001 | 47F0F00C | 07C3C4E3 | D3D54040 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F1F9F9* | |
| 02D9D3C4 | 40404040 | 40400038 | 40404040 | 00010001 | 0C001E38 | 00010001 |
| 0C001F48 | 00010001 | 0C001F50 | 00010001 | 0C001F4C | 00010001 | 0C001F98 |
| 00010001 | 0C001FA0 | 00010001 | 0C001F9C | D9C5E2D6 | F0F2F0F0** | |
| 02E3E7E3 | 40002010 | 40400028 | 40400001 | 00002014 | 58A0D004 | 58E0A00C |
| 58B0A018 | 5810B008 | 5820D2B8 | 50201000 | 18DA92FF | A00C982C | A01C07FE |
| 40404040 | 40404040 | 40404040 | 40404040 | D9C5E2D6 | F0F2F0F1* | |
| 02E3E7E3 | 4000200C | 40400004 | 40400001 | 00002038 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F0F2* | |
| 02E3E7E3 | 40002038 | 40400038 | 40400001 | 58C0D048 | 58701008 | 58207000 |
| 5020D2B8 | 58201000 | 41302000 | 41500004 | 1B255020 | D9845030 | D9885030 |
| D10C5030 | D11C5820 | 10044130 | 20004150 | D9C5E2D6 | F0F2F0F3* | |
| 02C5E2C4 | 40404040 | 40400010 | 40404040 | C3C4E3D7 | E3404040 | 01002088 |
| 40000001 | 40404040 | 40404040 | 40404040 | 40404040 | 40404040 | 40404040 |

```
40404040  40404040  40404040  40404040  D9C5E2D6  F0F2F0F4*
02E3E7E3  40002070  40400038  40400001  00041B25  5020D98C  5030D990
5030D110  5030D124  47F0DCA8  47F0F00C  07C3C4E3  D7E34040  90ECD00C
9823F020  58F0F01C  47F0F014  00000000  D9C5E2D6  F0F2F0F5*
02E3E7E3  400020AC  40400028  40400001  000020B0  58A0D004  58E0A00C
58B0A018  5810B004  5820D2B8  50201000  18DA92FF  A00C982C  A01C07FE
40404040  40404040  40404040  40404040  D9C5E2D6  F0F2F0F6*
02E3E7E3  400020A8  40400004  40400001  000020D4  40404040  40404040
40404040  40404040  40404040  40404040  40404040  40404040  40404040
40404040  40404040  40404040  40404040  D9C5E2D6  F0F2F0F7*
02C5E2C4  40404040  40400010  40404040  C3C4E3C3  C9D94040  01002108
40000001  40404040  40404040  40404040  40404040  40404040  40404040
40404040  40404040  40404040  40404040  D9C5E2D6  F0F2F0F8*
02E3E7E3  400020D4  40400032  40400001  58C0D048  58701004  58207000
5020D2B8  58201000  41302000  41500004  1B255020  D9845030  D9885030
D10C5030  D11C47F0  DE2E4040  40404040  D9C5E2D6  F0F2F0F9*
02E3E7E3  40002108  40400020  40400001  47F0F00C  07C3C4E3  C3C9D940
90ECD00C  9823F020  58F0F01C  47F0F014  00000000  40404040  40404040
40404040  40404040  40404040  40404040  D9C5E2D6  F0F2F1F0**
02E3E7E3  4000212C  40400004  40400001  00002130  40404040  40404040
40404040  40404040  40404040  40404040  40404040  40404040  40404040
40404040  40404040  40404040  40404040  D9C5E2D6  F0F2F1F1*
02D9D3C4  40404040  40400038  40404040  00010001  0C002008  00010001
0C002010  00010001  0C00200C  00010001  0C0020A4  00010001  0C0020AC
00010001  0C0020A8  00010001  0C002124  D9C5E2D6  F0F2F1F2*
02E3E7E3  40002130  40400024  40400001  58A0D004  58E0A00C  58B0A018
5810B008  5820D2B8  50201000  18DA92FF  A00C982C  A01C07FE  40404040

MEMBER NAME  BLDRESOL
40404040  40404040  40404040  40404040  D9C5E2D6  F0F2F1F3*
02E3E7E3  40002128  40400004  40400001  00002154  40404040  40404040
40404040  40404040  40404040  40404040  40404040  40404040  40404040
40404040  40404040  40404040  40404040  D9C5E2D6  F0F2F1F4*
02E3E7E3  40002154  40400038  40400001  58C0D048  98781004  78207000
7020D2F4  58208000  5020D2B8  58201000  41302000  41500004  1B255020
D9845030  D9885030  D10C5030  D11C47F0  D9C5E2D6  F0F2F1F5*
02C5E2C4  40404040  40400010  40404040  C3C4E3D4  D7D34040  01002190
40000001  40404040  40404040  40404040  40404040  40404040  40404040
40404040  40404040  40404040  40404040  D9C5E2D6  F0F2F1F6*
02E3E7E3  4000218C  40400002  40400001  DE424040  40404040  40404040
40404040  40404040  40404040  40404040  40404040  40404040  40404040
40404040  40404040  40404040  40404040  D9C5E2D6  F0F2F1F7*
02E3E7E3  40002190  40400020  40400001  47F0F00C  07C3C4E3  D4D7D340
90ECD00C  9823F020  58F0F01C  47F0F014  00000000  40404040  40404040
40404040  40404040  40404040  40404040  D9C5E2D6  F0F2F1F8*
02E3E7E3  400021B4  40400038  40400001  000021B8  58A0D004  58E0A00C
58B0A018  5810B004  5820D3B8  50201000  5830B008  7820D510  70203000
5840B00C  5850D2B8  50504000  18DA92FF  D9C5E2D6  F0F2F1F9*
02E3E7E3  400021EC  40400008  40400001  A00C982C  A01C07FE  40404040
40404040  40404040  40404040  40404040  40404040  40404040  40404040
40404040  40404040  40404040  40404040  D9C5E2D6  F0F2F2F0**
02E3E7E3  400021B0  40400004  40400001  000021F4  40404040  40404040
40404040  40404040  40404040  40404040  40404040  40404040  40404040
40404040  40404040  40404040  40404040  D9C5E2D6  F0F2F2F1*
02E3E7E3  400021F4  40400038  40400001  58C0D048  987B1004  58207000
5020D3B8  78208000  7020D510  58209000  5020D2B8  5820A000  5020D4C8
5820B000  5020D330  58201000  41302000  D9C5E2D6  F0F2F2F2*
02C5E2C4  40404040  40400010  40404040  C3C4E3E2  D7D34040  01002244
40000001  40404040  40404040  40404040  40404040  40404040  40404040
40404040  40404040  40404040  40404040  D9C5E2D6  F0F2F2F3*
02E3E7E3  4000222C  40400038  40400001  41500004  1B255C40  D2281B25
```

```
5020D9EC  5030D9F0  47F0DEE6  47F0F00C  07C3C4E3  E2D7D340  90ECD00C
9823F020  58F0F01C  47F0F014  00000000  D9C5E2D6  F0F2F2F4*
02E3E7E3  40002268  40400038  40400001  0000226C  58A0D004  58E0A00C
58B0A018  5810B000  5820D3B8  50201000  5830B01C  7820D510  70203000
5840B020  5850D338  50504000  5860B024  D9C5E2D6  F0F2F2F5*
02E3E7E3  400022A0  40400020  40400001  5870D334  50706000  5880B028
5890D2B8  50908000  18DA92FF  A00C982C  A01C07FE  40404040  40404040
40404040  40404040  40404040  40404040  D9C5E2D6  F0F2F2F6*
02E3E7E3  40002264  40400004  40400001  000022C0  40404040  40404040
40404040  40404040  40404040  40404040  40404040  40404040  40404040
40404040  40404040  40404040  40404040  D9C5E2D6  F0F2F2F7*
02D9D3C4  40404040  40400038  40404040  00010001  0C00212C  00010001
0C002128  00010001  0C0021AC  00010001  0C0021B4  00010001  0C0021B0
00010001  0C002260  00010001  0C002268  D9C5E2D6  F0F2F2F8*
02E3E7E3  400022C0  40400038  40400001  58C0D048  987B1000  58207000
5020D3B8  58208000  5020D340  987B101C  78207000  7020D510  58208000
5020D338  58209000  5020D334  5820A000  D9C5E2D6  F0F2F2F9*
02E3E7E3  400022F8  40400038  40400001  5020D2B8  5820B000  5020D4C8
98781030  78207000  7020D2F8  78208000  7020D2FC  58201008  41302000
41500004  1B255C40  D2281B25  5020D9EC  D9C5E2D6  F0F2F3F0**
02E3E7E3  40002330  40400038  40400001  5030D9F0  5820100C  41302000
41500004  1B255C40  D2281B25  5020D9BC  5030D9C0  58201010  41302000
41500004  1B255020  D99C5030  D9A05820  D9C5E2D6  F0F2F3F1*
02C5E2C4  40404040  40400010  40404040  C3C4E3E3  E7E34040  01002398
40000001  40404040  40404040  40404040  40404040  40404040  40404040
40404040  40404040  40404040  40404040  D9C5E2D6  F0F2F3F2*

MEMBER NAME  BLDRESOL
02E3E7E3  40002368  4040002E  40400001  10144130  20004150  00041B25
5020DA8C  5030DA90  58201018  41302000  41500004  1B255020  DA945030
DA9847F0  C0164040  40404040  40404040  D9C5E2D6  F0F2F3F3*
02E3E7E3  40002398  40400020  40400001  47F0F00C  07C3C4E3  E3E7E340
90ECD00C  9823F020  58F0F01C  47F0F014  00000000  40404040  40404040
40404040  40404040  40404040  40404040  D9C5E2D6  F0F2F3F4*
02E3E7E3  400023BC  40400028  40400001  000023C0  58A0D004  58E0A00C
58B0A018  5810B008  5820D3B4  50201000  18DA92FF  A00C982C  A01C07FE
40404040  40404040  40404040  40404040  D9C5E2D6  F0F2F3F5*
02E3E7E3  400023B8  40400004  40400001  000023E4  40404040  40404040
40404040  40404040  40404040  40404040  40404040  40404040  40404040
40404040  40404040  40404040  40404040  D9C5E2D6  F0F2F3F6*
02E3E7E3  400023E4  40400038  40400001  58C0D048  987B1004  78207000
7020D2C0  58208000  5020D3B4  78209000  7020D494  7820A000  7020D498
58201000  41302000  41500004  1B255020  D9C5E2D6  F0F2F3F7*
02C5E2C4  40404040  40400010  40404040  C3C4E3E2  E4D74040  0100244C
40000001  40404040  40404040  40404040  40404040  40404040  40404040
40404040  40404040  40404040  40404040  D9C5E2D6  F0F2F3F8*
02E3E7E3  4000241C  40400038  40400001  DA4C5030  DA505030  D1809280
D1805820  10144130  20004150  00041B25  5020DA10  5030DA14  5030D178
5030D1CC  47F0C4A8  47F0F00C  07C3C4E3  D9C5E2D6  F0F2F3F9*
02E3E7E3  40002454  40400018  40400001  E2E4D740  90ECD00C  9823F020
58F0F01C  47F0F014  00000000  40404040  40404040  40404040  40404040
40404040  40404040  40404040  40404040  D9C5E2D6  F0F2F4F0**
02E3E7E3  40002470  40400028  40400001  00002474  58A0D004  58E0A00C
58B0A018  5810B008  5820D3B4  50201000  18DA92FF  A00C982C  A01C07FE
40404040  40404040  40404040  40404040  D9C5E2D6  F0F2F4F1*
02E3E7E3  4000246C  40400004  40400001  00002498  40404040  40404040
40404040  40404040  40404040  40404040  40404040  40404040  40404040
40404040  40404040  40404040  40404040  D9C5E2D6  F0F2F4F2*
02E3E7E3  40002498  40400038  40400001  58C0D048  987B1004  78207000
7020D2C0  58208000  5020D3B4  78209000  7020D494  7820A000  7020D498
987B1018  58207000  5020D314  58208000  D9C5E2D6  F0F2F4F3*
```

| | | | | | | |
|---|---|---|---|---|---|---|
| 02E3E7E3 | 400024D0 | 40400038 | 40400001 | 5020D3C8 | 58209000 | 5020D36C |
| 5820A000 | 5020D33C | 5820B000 | 5020D3A0 | 987B102C | 58207000 | 5020D378 |
| 78208000 | 7020D3CC | 58209000 | 5020D360 | D9C5E2D6 | F0F2F4F4* | |
| 02E3E7E3 | 40002508 | 40400038 | 40400001 | 7820A000 | 7020D4A4 | 7820B000 |
| 7020D524 | 98781040 | 78207000 | 7020D4F0 | 58208000 | 5020D4B8 | 58201000 |
| 41302000 | 41500004 | 1B255020 | DA4C5030 | D9C5E2D6 | F0F2F4F5* | |
| 02C5E2C4 | 40404040 | 40400010 | 40404040 | C3C4E3D5 | E3C54040 | 0100256C |
| 40000001 | 40404040 | 40404040 | 40404040 | 40404040 | 40404040 | 40404040 |
| 40404040 | 40404040 | 40404040 | 40404040 | D9C5E2D6 | F0F2F4F6* | |
| 02E3E7E3 | 40002540 | 40400038 | 40400001 | DA505030 | D1809280 | D1805820 |
| 10144130 | 20004150 | 00041B25 | 5020DA10 | 5030DA14 | 5030D178 | 5030D1CC |
| 47F0C4A8 | 47F0F00C | 07C3C4E3 | D5E3C540 | D9C5E2D6 | F0F2F4F7* | |
| 02E3E7E3 | 40002578 | 40400014 | 40400001 | 90ECD00C | 9823F020 | 58F0F01C |
| 47F0F014 | 00000000 | 40404040 | 40404040 | 40404040 | 40404040 | 40404040 |
| 40404040 | 40404040 | 40404040 | 40404040 | D9C5E2D6 | F0F2F4F8* | |
| 02D9D3C4 | 40404040 | 40400038 | 40404040 | 00010001 | 0C002264 | 00010001 |
| 0C0023B4 | 00010001 | 0C0023BC | 00010001 | 0C0023B8 | 00010001 | 0C002468 |
| 00010001 | 0C002470 | 00010001 | 0C00246C | D9C5E2D6 | F0F2F4F9* | |
| 02E3E7E3 | 40002590 | 40400028 | 40400001 | 00002594 | 58A0D004 | 58E0A00C |
| 58B0A018 | 5810B004 | 5820D3B4 | 50201000 | 18DA92FF | A00C982C | A01C07FE |
| 40404040 | 40404040 | 40404040 | 40404040 | D9C5E2D6 | F0F2F5F0** | |
| 02E3E7E3 | 4000258C | 40400004 | 40400001 | 000025B8 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F5F1* | |
| 02E3E7E3 | 400025B8 | 40400038 | 40400001 | 58C0D048 | 987B1004 | 58207000 |

MEMBER NAME BLDRESOL

| | | | | | | |
|---|---|---|---|---|---|---|
| 5020D3B4 | 58209000 | 5020D354 | 7820A000 | 7020D3E0 | 7820B000 | 7020D520 |
| 58201000 | 41302000 | 41500004 | 1B255020 | D9C5E2D6 | F0F2F5F2* | |
| 02C5E2C4 | 40404040 | 40400010 | 40404040 | C3C4E3C5 | D7E24040 | 01002620 |
| 40000001 | 40404040 | 40404040 | 40404040 | 40404040 | 40404040 | 40404040 |
| 40404040 | 40404040 | 40404040 | 40404040 | D9C5E2D6 | F0F2F5F3* | |
| 02E3E7E3 | 400025F0 | 40400038 | 40400001 | DA4C5030 | DA505030 | D1809280 |
| D1805820 | 10084130 | 20004150 | 00041B25 | 5020DA10 | 5030DA14 | 5030D178 |
| 5030D1CC | 47F0C4A8 | 47F0F00C | 07C3C4E3 | D9C5E2D6 | F0F2F5F4* | |
| 02E3E7E3 | 40002628 | 40400018 | 40400001 | C5D7E240 | 90ECD00C | 9823F020 |
| 58F0F01C | 47F0F014 | 00000000 | 40404040 | 40404040 | 40404040 | 40404040 |
| 40404040 | 40404040 | 40404040 | 40404040 | D9C5E2D6 | F0F2F5F5* | |
| 02E3E7E3 | 40002644 | 40400028 | 40400001 | 00002648 | 58A0D004 | 58E0A00C |
| 58B0A018 | 5810B018 | 5820D2B8 | 50201000 | 18DA92FF | A00C982C | A01C07FE |
| 40404040 | 40404040 | 40404040 | 40404040 | D9C5E2D6 | F0F2F5F6* | |
| 02E3E7E3 | 40002640 | 40400004 | 40400001 | 0000266C | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F5F7* | |
| 02E3E7E3 | 4000266C | 40400038 | 40400001 | 58C0D048 | 987A100C | 78207000 |
| 7020D300 | 78208000 | 7020D304 | 78209000 | 7020D2C0 | 5820A000 | 5020D2B8 |
| 58201000 | 41302000 | 41500004 | 1B255020 | D9C5E2D6 | F0F2F5F8* | |
| 02E3E7E3 | 400026A4 | 40400038 | 40400001 | D9845030 | D9885030 | D10C5030 |
| D11C5820 | 10044130 | 20004150 | 00041B25 | 5020D98C | 5030D990 | 5030D110 |
| 5030D124 | 58201008 | 41302000 | 41500004 | D9C5E2D6 | F0F2F5F9* | |
| 02C5E2C4 | 40404040 | 40400010 | 40404040 | C3C4E3C4 | D6E34040 | 010026EC |
| 40000001 | 40404040 | 40404040 | 40404040 | 40404040 | 40404040 | 40404040 |
| 40404040 | 40404040 | 40404040 | 40404040 | D9C5E2D6 | F0F2F6F0** | |
| 02E3E7E3 | 400026DC | 4040000E | 40400001 | 1B255020 | D9945030 | D99847F0 |
| C50A4040 | 40404040 | 40404040 | 40404040 | 40404040 | 40404040 | 40404040 |
| 40404040 | 40404040 | 40404040 | 40404040 | D9C5E2D6 | F0F2F6F1* | |
| 02E3E7E3 | 400026EC | 40400020 | 40400001 | 47F0F00C | 07C3C4E3 | C4D6E340 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F2F6F2* | |
| 02E3E7E3 | 40002710 | 40400004 | 40400001 | 00002714 | 40404040 | 40404040 |
| 40404040 | 40404040 | 40404040 | 40404040 | 40404040 | 40404040 | 40404040 |

```
40404040  40404040  40404040  40404040  D9C5E2D6  F0F2F6F3*
02D9D3C4  40404040  40400038  40404040  00010001  0C002588  00010001
0C002590  00010001  0C00258C  00010001  0C00263C  00010001  0C002644
00010001  0C002640  00010001  0C002708  D9C5E2D6  F0F2F6F4*
02E3E7E3  40002714  40400024  40400001  58A0D004  58E0A00C  58B0A018
5810B008  5820D2B8  50201000  18DA92FF  A00C982C  A01C07FE  40404040
40404040  40404040  40404040  40404040  D9C5E2D6  F0F2F6F5*
02E3E7E3  4000270C  40400004  40400001  00002738  40404040  40404040
40404040  40404040  40404040  40404040  40404040  40404040  40404040
40404040  40404040  40404040  40404040  D9C5E2D6  F0F2F6F6*
02E3E7E3  40002738  40400038  40400001  58C0D048  98781004  78207000
7020D298  58208000  5020D2B8  58201000  41302000  41500004  1B255020
D9845030  D9885030  D10C5030  D11C47F0  D9C5E2D6  F0F2F6F7*
02C5E2C4  40404040  40400010  40404040  C3C4E3E3  D9C94040  01002774
40000001  40404040  40404040  40404040  40404040  40404040  40404040
40404040  40404040  40404040  40404040  D9C5E2D6  F0F2F6F8*
02E3E7E3  40002770  40400002  40400001  C9644040  40404040  40404040
40404040  40404040  40404040  40404040  40404040  40404040  40404040
40404040  40404040  40404040  40404040  D9C5E2D6  F0F2F6F9*
02E3E7E3  40002774  40400020  40400001  47F0F00C  07C3C4E3  E3D9C940
90ECD00C  9823F020  58F0F01C  47F0F014  00000000  40404040  40404040
40404040  40404040  40404040  40404040  D9C5E2D6  F0F2F7F0**
02E3E7E3  40002798  40400028  40400001  0000279C  58A0D004  58E0A00C
58B0A018  5810B00C  5820D2B8  50201000  18DA92FF  A00C982C  A01C07FE

MEMBER NAME  BLDRESOL
40404040  40404040  40404040  40404040  D9C5E2D6  F0F2F7F1*
02E3E7E3  40002794  40400004  40400001  000027C0  40404040  40404040
40404040  40404040  40404040  40404040  40404040  40404040  40404040
40404040  40404040  40404040  40404040  D9C5E2D6  F0F2F7F2*
02E3E7E3  400027C0  40400038  40400001  58C0D048  5870100C  58207000
5020D2B8  58201000  41302000  41500004  1B255020  D9845030  D9885030
D10C5030  D11C5820  10044130  20004150  D9C5E2D6  F0F2F7F3*
02C5E2C4  40404040  40400010  40404040  C3C4E3D9  C5C34040  01002828
40000001  40404040  40404040  40404040  40404040  40404040  40404040
40404040  40404040  40404040  40404040  D9C5E2D6  F0F2F7F4*
02E3E7E3  400027F8  4040002E  40400001  00041B25  5020D98C  5030D990
5030D110  5030D124  58201008  41302000  41500004  1B255020  D9945030
D99847F0  C9644040  40404040  40404040  D9C5E2D6  F0F2F7F5*
02E3E7E3  40002828  40400020  40400001  47F0F00C  07C3C4E3  D9C5C340
90ECD00C  9823F020  58F0F01C  47F0F014  00000000  40404040  40404040
40404040  40404040  40404040  40404040  D9C5E2D6  F0F2F7F6*
02E3E7E3  4000284C  40400028  40400001  00002850  58A0D004  58E0A00C
58B0A018  5810B00C  5820D2B8  50201000  18DA92FF  A00C982C  A01C07FE
40404040  40404040  40404040  40404040  D9C5E2D6  F0F2F7F7*
02E3E7E3  40002848  40400004  40400001  00002874  40404040  40404040
40404040  40404040  40404040  40404040  40404040  40404040  40404040
40404040  40404040  40404040  40404040  D9C5E2D6  F0F2F7F8*
02D9D3C4  40404040  40400038  40404040  00010001  0C002710  00010001
0C00270C  00010001  0C002790  00010001  0C002798  00010001  0C002794
00010001  0C002844  00010001  0C00284C  D9C5E2D6  F0F2F7F9*
02E3E7E3  40002874  40400038  40400001  58C0D048  987A1004  78207000
7020D2AC  78208000  7020D2B0  58209000  5020D2B8  58201000  41302000
41500004  1B255020  D9845030  D9885030  D9C5E2D6  F0F2F8F0**
02C5E2C4  40404040  40400010  40404040  C3C4E3D9  E5E34040  010028CC
40000001  40404040  40404040  40404040  40404040  40404040  40404040
40404040  40404040  40404040  40404040  D9C5E2D6  F0F2F8F1*
02E3E7E3  400028AC  40400038  40400001  D10C5030  D11C5820  10104130
20004150  00041B25  5020D9CC  5030D9D0  47F0C964  47F0F00C  07C3C4E3
D9E5E340  90ECD00C  9823F020  58F0F01C  D9C5E2D6  F0F2F8F2*
02E3E7E3  400028E4  40400008  40400001  47F0F014  00000000  40404040
```

```
40404040  40404040  40404040  40404040  40404040  40404040  40404040
40404040  40404040  40404040  40404040  D9C5E2D6  F0F2F8F3*
02E3E7E3  400028F0  40400016  40400001  000028F4  58D0D004  58E0D00C
92FFD00C  982CD01C  07FE4040  40404040  40404040  40404040  40404040
40404040  40404040  40404040  40404040  D9C5E2D6  F0F2F8F4*
02E3E7E3  400028EC  40400004  40400001  00002906  40404040  40404040
40404040  40404040  40404040  40404040  40404040  40404040  40404040
40404040  40404040  40404040  40404040  D9C5E2D6  F0F2F8F5*
02E3E7E3  40002906  40400038  40400001  58C0D048  58701008  78207000
7020D30C  58201000  41302000  41500004  1B255020  D9845030  D9885030
D10C5030  D11C5820  10044130  20004150  D9C5E2D6  F0F2F8F6*
02C5E2C4  40404040  40400010  40404040  C3C4E3C4  C9D44040  01002958
40000001  40404040  40404040  40404040  40404040  40404040  40404040
40404040  40404040  40404040  40404040  D9C5E2D6  F0F2F8F7*
02E3E7E3  4000293E  40400018  40400001  00041B25  5020D98C  5030D990
5030D110  5030D124  47F0C978  40404040  40404040  40404040  40404040
40404040  40404040  40404040  40404040  D9C5E2D6  F0F2F8F8*
02E3E7E3  40002958  40400020  40400001  47F0F00C  07C3C4E3  C4C9D440
90ECD00C  9823F020  58F0F01C  47F0F014  00000000  40404040  40404040
40404040  40404040  40404040  40404040  D9C5E2D6  F0F2F8F9*
02E3E7E3  4000297C  40400034  40400001  00002980  58A0D004  58E0A00C
58B0A018  5810B004  5820D328  50201000  5830B008  5840D2B8  50403000
18DA92FF  A00C982C  A01C07FE  40404040  D9C5E2D6  F0F2F9F0**

MEMBER NAME  BLDRESOL
02E3E7E3  40002978  40400004  40400001  000029B0  40404040  40404040
40404040  40404040  40404040  40404040  40404040  40404040  40404040
40404040  40404040  40404040  40404040  D9C5E2D6  F0F2F9F1*
02C5E2C4  40404040  40400010  40404040  C3C4E3C2  D9D24040  010029DC
40000001  40404040  40404040  40404040  40404040  40404040  40404040
40404040  40404040  40404040  40404040  D9C5E2D6  F0F2F9F2*
02E3E7E3  400029B0  40400038  40400001  58C0D048  987A1000  58207000
5020D2D8  58208000  5020D328  58209000  5020D2B8  5820A000  5020D4B4
47F0C98C  47F0F00C  07C3C4E3  C2D9D240  D9C5E2D6  F0F2F9F3*
02E3E7E3  400029E8  40400014  40400001  90ECD00C  9823F020  58F0F01C
47F0F014  00000000  40404040  40404040  40404040  40404040  40404040
40404040  40404040  40404040  40404040  D9C5E2D6  F0F2F9F4*
02D9D3C4  40404040  40400038  40404040  00010001  0C002848  00010001
0C0028E8  00010001  0C0028F0  00010001  0C0028EC  00010001  0C002974
00010001  0C00297C  00010001  0C002978  D9C5E2D6  F0F2F9F5*
02E3E7E3  40002A00  40400016  40400001  00002A04  58D0D004  58E0D00C
92FFD00C  982CD01C  07FE4040  40404040  40404040  40404040  40404040
40404040  40404040  40404040  40404040  D9C5E2D6  F0F2F9F6*
02E3E7E3  400029FC  40400004  40400001  00002A16  40404040  40404040
40404040  40404040  40404040  40404040  40404040  40404040  40404040
40404040  40404040  40404040  40404040  D9C5E2D6  F0F2F9F7*
02E3E7E3  40002A16  40400038  40400001  58C0D048  987A1008  78207000
7020D30C  78208000  7020D3E4  78209000  7020D528  5820A000  5020D3B0
58201000  41302000  41500004  1B255020  D9C5E2D6  F0F2F9F8*
02C5E2C4  40404040  40400010  40404040  C3C4E3C1  D9D64040  01002A78
40000001  40404040  40404040  40404040  40404040  40404040  40404040
40404040  40404040  40404040  40404040  D9C5E2D6  F0F2F9F9*
02E3E7E3  40002A4E  40400028  40400001  D9DC5030  D9E05030  D1D49280
D1D45820  10044130  20004150  00041B25  5020D9E4  5030D9E8  47F0C9A8
40404040  40404040  40404040  40404040  D9C5E2D6  F0F3F0F0**
02E3E7E3  40002A78  40400020  40400001  47F0F00C  07C3C4E3  C1D9D640
90ECD00C  9823F020  58F0F01C  47F0F014  00000000  40404040  40404040
40404040  40404040  40404040  40404040  D9C5E2D6  F0F3F0F1*
02E3E7E3  40002A9C  40400028  40400001  00002AA0  58A0D004  58E0A00C
58B0A018  5810B008  5820D3B4  50201000  18DA92FF  A00C982C  A01C07FE
40404040  40404040  40404040  40404040  D9C5E2D6  F0F3F0F2*
```

| | | | | | | |
|---|---|---|---|---|---|---|
| 02E3E7E3 | 40002A98 | 40400004 | 40400001 | 00002AC4 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F0F3* | |
| 02E3E7E3 | 40002AC4 | 40400038 | 40400001 | 58C0D048 | 987B1008 | 58207000 |
| 5020D3B4 | 98781018 | 78207000 | 7020D3E0 | 78208000 | 7020D520 | 58201000 |
| 41302000 | 41500004 | 1B255020 | D9DC5030 | D9C5E2D6 | F0F3F0F4* | |
| 02E3E7E3 | 40002AFC | 40400038 | 40400001 | D9E05030 | D1D49280 | D1D45820 |
| 10044130 | 20004150 | 00041B25 | 5020D9E4 | 5030D9E8 | 5820100C | 41302000 |
| 41500004 | 1B255020 | DA105030 | DA145030 | D9C5E2D6 | F0F3F0F5* | |
| 02E3E7E3 | 40002B34 | 40400038 | 40400001 | D1785030 | D1CC5820 | 10104130 |
| 20004150 | 00041B25 | 5020DA4C | 5030DA50 | 5030D180 | 9280D180 | 58201014 |
| 41302000 | 41500004 | 1B255020 | D9845030 | D9C5E2D6 | F0F3F0F6* | |
| 02C5E2C4 | 40404040 | 40400010 | 40404040 | C3C4E3E2 | C3E34040 | 01002B7C |
| 40000001 | 40404040 | 40404040 | 40404040 | 40404040 | 40404040 | 40404040 |
| 40404040 | 40404040 | 40404040 | 40404040 | D9C5E2D6 | F0F3F0F7* | |
| 02E3E7E3 | 40002B6C | 4040000E | 40400001 | D9885030 | D10C5030 | D11C47F0 |
| C9BC4040 | 40404040 | 40404040 | 40404040 | 40404040 | 40404040 | 40404040 |
| 40404040 | 40404040 | 40404040 | 40404040 | D9C5E2D6 | F0F3F0F8* | |
| 02E3E7E3 | 40002B7C | 40400020 | 40400001 | 47F0F00C | 07C3C4E3 | E2C3E340 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F3F0F9* | |
| 02E3E7E3 | 40002BA0 | 40400004 | 40400001 | 00002BA4 | 40404040 | 40404040 |

MEMBER NAME BLDRESOL

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | D9C5E2D6 | F0F3F1F0** | |
| 02D9D3C4 | 40404040 | 40400038 | 40404040 | 00010001 | 0C0029F8 | 00010001 |
| 0C002A00 | 00010001 | 0C0029FC | 00010001 | 0C002A94 | 00010001 | 0C002A9C |
| 00010001 | 0C002A98 | 00010001 | 0C002B98 | D9C5E2D6 | F0F3F1F1* | |
| 02E3E7E3 | 40002BA4 | 40400012 | 40400001 | 58D0D004 | 58E0D00C | 92FFD00C |
| 982CD01C | 07FE4040 | 40404040 | 40404040 | 40404040 | 40404040 | 40404040 |
| 40404040 | 40404040 | 40404040 | 40404040 | D9C5E2D6 | F0F3F1F2* | |
| 02E3E7E3 | 40002B9C | 40400004 | 40400001 | 00002BB6 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F1F3* | |
| 02E3E7E3 | 40002BB6 | 40400038 | 40400001 | 58C0D048 | 58201000 | 41302000 |
| 41500004 | 1B255020 | D9DC5030 | D9E05030 | D1D49280 | D1D45820 | 10044130 |
| 20004150 | 00041B25 | 5020D9E4 | 5030D9E8 | D9C5E2D6 | F0F3F1F4* | |
| 02E3E7E3 | 40002BEE | 40400038 | 40400001 | 58201008 | 41302000 | 41500004 |
| 1B255020 | D9845030 | D9885030 | D10C5030 | D11C5820 | 100C4130 | 20004150 |
| 00041B25 | 5020D98C | 5030D990 | 5030D110 | D9C5E2D6 | F0F3F1F5* | |
| 02C5E2C4 | 40404040 | 40400010 | 40404040 | C3C4E3C3 | E4E34040 | 01002C44 |
| 40000001 | 40404040 | 40404040 | 40404040 | 40404040 | 40404040 | 40404040 |
| 40404040 | 40404040 | 40404040 | 40404040 | D9C5E2D6 | F0F3F1F6* | |
| 02E3E7E3 | 40002C26 | 40400038 | 40400001 | 5030D124 | 58201010 | 41302000 |
| 41500004 | 1B255020 | D9945030 | D99847F0 | CA0247F0 | F00C07C3 | C4E3C3E4 |
| E34090EC | D00C9823 | F02058F0 | F01C47F0 | D9C5E2D6 | F0F3F1F7* | |
| 02E3E7E3 | 40002C5E | 40400006 | 40400001 | F0140000 | 00004040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F1F8* | |
| 02E3E7E3 | 40002C68 | 40400016 | 40400001 | 00002C6C | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F3F1F9* | |
| 02E3E7E3 | 40002C64 | 40400004 | 40400001 | 00002C7E | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F2F0** | |
| 02E3E7E3 | 40002C7E | 40400038 | 40400001 | 58C0D048 | 98781008 | 78207000 |
| 7020D3DC | 78208000 | 7020D49C | 58201000 | 41302000 | 41500004 | 1B255020 |
| D9DC5030 | D9E05030 | D1D49280 | D1D45820 | D9C5E2D6 | F0F3F2F1* | |
| 02C5E2C4 | 40404040 | 40400010 | 40404040 | C3C4E3C4 | D3E34040 | 01002CD0 |
| 40000001 | 40404040 | 40404040 | 40404040 | 40404040 | 40404040 | 40404040 |

| | | | | | | |
|---|---|---|---|---|---|---|
| 40404040 | 40404040 | 40404040 | 40404040 | D9C5E2D6 | F0F3F2F2* | |
| 02E3E7E3 | 40002CB6 | 40400018 | 40400001 | 10044130 | 20004150 | 00041B25 |
| 5020D9CC | 5030D9D0 | 47F0CA16 | 40404040 | 40404040 | 40404040 | 40404040 |
| 40404040 | 40404040 | 40404040 | 40404040 | D9C5E2D6 | F0F3F2F3* | |
| 02E3E7E3 | 40002CD0 | 40400020 | 40400001 | 47F0F00C | 07C3C4E3 | C4D3E340 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F3F2F4* | |
| 02E3E7E3 | 40002CF4 | 40400028 | 40400001 | 00002CF8 | 58A0D004 | 58E0A00C |
| 58B0A018 | 5810B004 | 5820D3B4 | 50201000 | 18DA92FF | A00C982C | A01C07FE |
| 40404040 | 40404040 | 40404040 | 40404040 | D9C5E2D6 | F0F3F2F5* | |
| 02E3E7E3 | 40002CF0 | 40400004 | 40400001 | 00002D1C | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F2F6* | |
| 02D9D3C4 | 40404040 | 40400038 | 40404040 | 00010001 | 0C002BA0 | 00010001 |
| 0C002B9C | 00010001 | 0C002C60 | 00010001 | 0C002C68 | 00010001 | 0C002C64 |
| 00010001 | 0C002CEC | 00010001 | 0C002CF4 | D9C5E2D6 | F0F3F2F7* | |
| 02E3E7E3 | 40002D1C | 40400038 | 40400001 | 58C0D048 | 987B1004 | 58207000 |
| 5020D3B4 | 7820A000 | 7020D3E0 | 7820B000 | 7020D520 | 58201000 | 41302000 |
| 41500004 | 1B255020 | D9DC5030 | D9E05030 | D9C5E2D6 | F0F3F2F8* | |
| 02E3E7E3 | 40002D54 | 40400038 | 40400001 | D1D49280 | D1D45820 | 10084130 |
| 20004150 | 00041B25 | 5020DA10 | 5030DA14 | 5030D178 | 5030D1CC | 5820100C |

MEMBER NAME BLDRESOL

| | | | | | | |
|---|---|---|---|---|---|---|
| 41302000 | 41500004 | 1B255020 | D9E45030 | D9C5E2D6 | F0F3F2F9* | |
| 02E3E7E3 | 40002D8C | 40400038 | 40400001 | D9E85820 | 10184130 | 20004150 |
| 00041B25 | 5020D9B4 | 5030D9B8 | 5820101C | 41302000 | 41500004 | 1B255020 |
| D9C45030 | D9C85820 | 10204130 | 20004150 | D9C5E2D6 | F0F3F3F0** | |
| 02E3E7E3 | 40002DC4 | 40400038 | 40400001 | 00041B25 | 5020DA7C | 5030DA80 |
| 58201024 | 41302000 | 41500004 | 1B255020 | D9A45030 | D9A85820 | 10284130 |
| 20004150 | 00041B25 | 5020D9AC | 5030D9B0 | D9C5E2D6 | F0F3F3F1* | |
| 02C5E2C4 | 40404040 | 40400010 | 40404040 | C3C4E3C2 | D3D54040 | 01002E00 |
| 40000001 | 40404040 | 40404040 | 40404040 | 40404040 | 40404040 | 40404040 |
| 40404040 | 40404040 | 40404040 | 40404040 | D9C5E2D6 | F0F3F3F2* | |
| 02E3E7E3 | 40002DFC | 40400024 | 40400001 | 47F0CA2A | 47F0F00C | 07C3C4E3 |
| C2D3D540 | 90ECD00C | 9823F020 | 58F0F01C | 47F0F014 | 00000000 | 40404040 |
| 40404040 | 40404040 | 40404040 | 40404040 | D9C5E2D6 | F0F3F3F3* | |
| 02E3E7E3 | 40002E24 | 40400028 | 40400001 | 00002E28 | 58A0D004 | 58E0A00C |
| 58B0A018 | 5810B004 | 5820D3B4 | 50201000 | 18DA92FF | A00C982C | A01C07FE |
| 40404040 | 40404040 | 40404040 | 40404040 | D9C5E2D6 | F0F3F3F4* | |
| 02E3E7E3 | 40002E20 | 40400004 | 40400001 | 00002E4C | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F3F5* | |
| 02E3E7E3 | 40002E4C | 40400038 | 40400001 | 58C0D048 | 987B1004 | 58207000 |
| 5020D3B4 | 78209000 | 7020D2F4 | 98781014 | 78207000 | 7020D3E0 | 78208000 |
| 7020D520 | 58201000 | 41302000 | 41500004 | D9C5E2D6 | F0F3F3F6* | |
| 02E3E7E3 | 40002E84 | 40400038 | 40400001 | 1B255020 | D9DC5030 | D9E05030 |
| D1D49280 | D1D45820 | 10084130 | 20004150 | 00041B25 | 5020DA10 | 5030DA14 |
| 5030D178 | 5030D1CC | 58201010 | 41302000 | D9C5E2D6 | F0F3F3F7* | |
| 02C5E2C4 | 40404040 | 40400010 | 40404040 | C3C4E3E3 | E7D34040 | 01002ED0 |
| 40000001 | 40404040 | 40404040 | 40404040 | 40404040 | 40404040 | 40404040 |
| 40404040 | 40404040 | 40404040 | 40404040 | D9C5E2D6 | F0F3F3F8* | |
| 02E3E7E3 | 40002EBC | 40400012 | 40400001 | 41500004 | 1B255020 | D9E45030 |
| D9E847F0 | CA3E4040 | 40404040 | 40404040 | 40404040 | 40404040 | 40404040 |
| 40404040 | 40404040 | 40404040 | 40404040 | D9C5E2D6 | F0F3F3F9* | |
| 02E3E7E3 | 40002ED0 | 40400020 | 40400001 | 47F0F00C | 07C3C4E3 | E3E7D340 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F3F4F0** | |
| 02E3E7E3 | 40002EF4 | 40400028 | 40400001 | 00002EF8 | 58A0D004 | 58E0A00C |
| 58B0A018 | 5810B00C | 5820D3B4 | 50201000 | 18DA92FF | A00C982C | A01C07FE |
| 40404040 | 40404040 | 40404040 | 40404040 | D9C5E2D6 | F0F3F4F1* | |
| 02E3E7E3 | 40002EF0 | 40400004 | 40400001 | 00002F1C | 40404040 | 40404040 |

40404040 40404040 40404040 40404040 40404040 40404040 40404040
40404040 40404040 40404040 40404040 D9C5E2D6 F0F3F4F2*
02E3E7E3 40002F1C 40400038 40400001 58C0D048 987B100C 58207000
5020D3B4 58208000 5020D4E0 7820A000 7020D3E0 7820B000 7020D520
58201000 41302000 41500004 1B255020 D9C5E2D6 F0F3F4F3*
02E3E7E3 40002F54 40400038 40400001 D9DC5030 D9E05030 D1D49280
D1D45820 10044130 20004150 00041B25 5020DA4C 5030DA50 5030D180
9280D180 58201008 41302000 41500004 D9C5E2D6 F0F3F4F4*
02E3E7E3 40002F8C 40400038 40400001 1B255020 D9E45030 D9E85820
10144130 20004150 00041B25 5020DA10 5030DA14 5030D178 5030D1CC
58201020 41302000 41500004 1B255020 D9C5E2D6 F0F3F4F5*
02C5E2C4 40404040 40400010 40404040 C3C4E3E2 E8D44040 01002FF4
40000001 40404040 40404040 40404040 40404040 40404040 40404040
40404040 40404040 40404040 40404040 D9C5E2D6 F0F3F4F6*
02E3E7E3 40002FC4 40400038 40400001 D9845030 D9885030 D10C5030
D11C5820 10244130 20004150 00041B25 5020D98C 5030D990 5030D110
5030D124 47F0CA52 47F0F00C 07C3C4E3 D9C5E2D6 F0F3F4F7*
02E3E7E3 40002FFC 40400018 40400001 E2E8D440 90ECD00C 9823F020
58F0F01C 47F0F014 00000000 40404040 40404040 40404040 40404040
40404040 40404040 40404040 40404040 D9C5E2D6 F0F3F4F8*

MEMBER NAME BLDRESOL
02D9D3C4 40404040 40400038 40404040 00010001 0C002CF0 00010001
0C002E1C 00010001 0C002E24 00010001 0C002E20 00010001 0C002EEC
00010001 0C002EF4 00010001 0C002EF0 D9C5E2D6 F0F3F4F9*
02E3E7E3 40003018 40400028 40400001 0000301C 58A0D004 58E0A00C
58B0A018 5810B01C 5820D4BC 50201000 18DA92FF A00C982C A01C07FE
40404040 40404040 40404040 40404040 D9C5E2D6 F0F3F5F0**
02E3E7E3 40003014 40400004 40400001 00003040 40404040 40404040
40404040 40404040 40404040 40404040 40404040 40404040 40404040
40404040 40404040 40404040 40404040 D9C5E2D6 F0F3F5F1*
02E3E7E3 40003040 40400038 40400001 58C0D048 987B1008 78207000
7020D358 58208000 5020D348 58209000 5020D32C 5820A000 5020D2D0
5820B000 5020D4A8 5870101C 58207000 D9C5E2D6 F0F3F5F2*
02E3E7E3 40003078 40400038 40400001 5020D4BC 58201000 41302000
41500004 1B255020 D9DC5030 D9E05030 D1D49280 D1D45820 10044130
20004150 00041B25 5020D9CC 5030D9D0 D9C5E2D6 F0F3F5F3*
02C5E2C4 40404040 40400010 40404040 C3C4E3D7 D3E34040 010030B4
40000001 40404040 40404040 40404040 40404040 40404040 40404040
40404040 40404040 40404040 40404040 D9C5E2D6 F0F3F5F4*
02E3E7E3 400030B0 40400024 40400001 47F0CA66 47F0F00C 07C3C4E3
D7D3E340 90ECD00C 9823F020 58F0F01C 47F0F014 00000000 40404040
40404040 40404040 40404040 40404040 D9C5E2D6 F0F3F5F5*
02E3E7E3 400030D8 40400016 40400001 000030DC 58D0D004 58E0D00C
92FFD00C 982CD01C 07FE4040 40404040 40404040 40404040 40404040
40404040 40404040 40404040 40404040 D9C5E2D6 F0F3F5F6*
02E3E7E3 400030D4 40400004 40400001 000030EE 40404040 40404040
40404040 40404040 40404040 40404040 40404040 40404040 40404040
40404040 40404040 40404040 40404040 D9C5E2D6 F0F3F5F7*
02E3E7E3 400030EE 40400038 40400001 58C0D048 987B1004 78207000
7020D2C0 78208000 7020D358 78209000 7020D310 7820A000 7020D39C
987B1018 78207000 7020D2C4 78208000 D9C5E2D6 F0F3F5F8*
02E3E7E3 40003126 40400038 40400001 7020D2C8 58209000 5020D4C4
5820A000 5020D4B0 7820B000 7020D2CC 5870102C 58207000 5020D324
58201000 41302000 41500004 1B255020 D9C5E2D6 F0F3F5F9*
02C5E2C4 40404040 40400010 40404040 C3C4E3C7 E2D54040 01003190
40000001 40404040 40404040 40404040 40404040 40404040 40404040
40404040 40404040 40404040 40404040 D9C5E2D6 F0F3F6F0**
02E3E7E3 4000315E 40400030 40400001 D98C5030 D9905030 D1105030
D1245820 10144130 20004150 00041B25 5020D974 5030D978 5030D06C
9280D06C 47F0CA82 40404040 40404040 D9C5E2D6 F0F3F6F1*

```
02E3E7E3 40003190 40400020 40400001 47F0F00C 07C3C4E3 C7E2D540
90ECD00C 9823F020 58F0F01C 47F0F014 00000000 40404040 40404040
40404040 40404040 40404040 40404040 D9C5E2D6 F0F3F6F2*
02E3E7E3 400031B4 40400004 40400001 000031B8 40404040 40404040
40404040 40404040 40404040 40404040 40404040 40404040 40404040
40404040 40404040 40404040 40404040 D9C5E2D6 F0F3F6F3*
02D9D3C4 40404040 40400038 40404040 00010001 0C003010 00010001
0C003018 00010001 0C003014 00010001 0C0030D0 00010001 0C0030D8
00010001 0C0030D4 00010001 0C0031AC D9C5E2D6 F0F3F6F4*
02E3E7E3 400031B8 40400024 40400001 58A0D004 58E0A00C 58B0A018
5810B008 5820D2B4 50201000 18DA92FF A00C982C A01C07FE 40404040
40404040 40404040 40404040 40404040 D9C5E2D6 F0F3F6F5*
02E3E7E3 400031B0 40400004 40400001 000031DC 40404040 40404040
40404040 40404040 40404040 40404040 40404040 40404040 40404040
40404040 40404040 40404040 40404040 D9C5E2D6 F0F3F6F6*
02C5E2C4 40404040 40400010 40404040 C3C4E3C5 E2C54040 01003200
40000001 40404040 40404040 40404040 40404040 40404040 40404040
40404040 40404040 40404040 40404040 D9C5E2D6 F0F3F6F7*
02E3E7E3 400031DC 40400038 40400001 58C0D048 98791000 78207000

MEMBER NAME  BLDRESOL
7020D3D0 58208000 5020D4E4 58209000 5020D2B4 47F0CA96 47F0F00C
07C3C4E3 C5E2C540 90ECD00C 9823F020 D9C5E2D6 F0F3F6F8*
02E3E7E3 40003214 4040000C 40400001 58F0F01C 47F0F014 00000000
40404040 40404040 40404040 40404040 40404040 40404040 40404040
40404040 40404040 40404040 40404040 D9C5E2D6 F0F3F6F9*
02E3E7E3 40003224 40400028 40400001 00003228 58A0D004 58E0A00C
58B0A018 5810B008 5820D2B4 50201000 18DA92FF A00C982C A01C07FE
40404040 40404040 40404040 40404040 D9C5E2D6 F0F3F7F0**
02E3E7E3 40003220 40400004 40400001 0000324C 40404040 40404040
40404040 40404040 40404040 40404040 40404040 40404040 40404040
40404040 40404040 40404040 40404040 D9C5E2D6 F0F3F7F1*
02C5E2C4 40404040 40400010 40404040 C3C4E3C7 C6D54040 01003270
40000001 40404040 40404040 40404040 40404040 40404040 40404040
40404040 40404040 40404040 40404040 D9C5E2D6 F0F3F7F2*
02E3E7E3 4000324C 40400038 40400001 58C0D048 98791000 78207000
7020D3D0 58208000 5020D4E4 58209000 5020D2B4 47F0CAAA 47F0F00C
07C3C4E3 C7C6D540 90ECD00C 9823F020 D9C5E2D6 F0F3F7F3*
02E3E7E3 40003284 4040000C 40400001 58F0F01C 47F0F014 00000000
40404040 40404040 40404040 40404040 40404040 40404040 40404040
40404040 40404040 40404040 40404040 D9C5E2D6 F0F3F7F4*
02E3E7E3 40003294 40400028 40400001 00003298 58A0D004 58E0A00C
58B0A018 5810B008 5820D2B4 50201000 18DA92FF A00C982C A01C07FE
40404040 40404040 40404040 40404040 D9C5E2D6 F0F3F7F5*
02E3E7E3 40003290 40400004 40400001 000032BC 40404040 40404040
40404040 40404040 40404040 40404040 40404040 40404040 40404040
40404040 40404040 40404040 40404040 D9C5E2D6 F0F3F7F6*
02D9D3C4 40404040 40400038 40404040 00010001 0C0031B4 00010001
0C0031B0 00010001 0C00321C 00010001 0C003224 00010001 0C003220
00010001 0C00328C 00010001 0C003294 D9C5E2D6 F0F3F7F7*
02E3E7E3 400032BC 40400038 40400001 58C0D048 987A1000 78207000
7020D3D0 58208000 5020D4E4 58209000 5020D2B4 5820100C 41302000
41500001 1B255020 DAAC5030 DAB047F0 D9C5E2D6 F0F3F7F8*
02C5E2C4 40404040 40400010 40404040 C3C4E3C5 C6C54040 010032F8
40000001 40404040 40404040 40404040 40404040 40404040 40404040
40404040 40404040 40404040 40404040 D9C5E2D6 F0F3F7F9*
02E3E7E3 400032F4 40400002 40400001 CABE4040 40404040 40404040
40404040 40404040 40404040 40404040 40404040 40404040 40404040
40404040 40404040 40404040 40404040 D9C5E2D6 F0F3F8F0**
02E3E7E3 400032F8 40400020 40400001 47F0F00C 07C3C4E3 C5C6C540
90ECD00C 9823F020 58F0F01C 47F0F014 00000000 40404040 40404040
```

```
40404040  40404040  40404040  40404040  D9C5E2D6  F0F3F8F1*
02E3E7E3  4000331C  40400028  40400001  00003320  58A0D004  58E0A00C
58B0A018  5810B008  5820D2B4  50201000  18DA92FF  A00C982C  A01C07FE
40404040  40404040  40404040  40404040  D9C5E2D6  F0F3F8F2*
02E3E7E3  40003318  40400004  40400001  00003344  40404040  40404040
40404040  40404040  40404040  40404040  40404040  40404040  40404040
40404040  40404040  40404040  40404040  D9C5E2D6  F0F3F8F3*
02C5E2C4  40404040  40400010  40404040  C3C4E3F3  C4E24040  01003368
40000001  40404040  40404040  40404040  40404040  40404040  40404040
40404040  40404040  40404040  40404040  D9C5E2D6  F0F3F8F4*
02E3E7E3  40003344  40400038  40400001  58C0D048  98791000  78207000
7020D3D0  58208000  5020D4E4  58209000  5020D2B4  47F0CAD2  47F0F00C
07C3C4E3  F3C4E240  90ECD00C  9823F020  D9C5E2D6  F0F3F8F5*
02E3E7E3  4000337C  4040000C  40400001  58F0F01C  47F0F014  00000000
40404040  40404040  40404040  40404040  40404040  40404040  40404040
40404040  40404040  40404040  40404040  D9C5E2D6  F0F3F8F6*
02E3E7E3  4000338C  40400034  40400001  00003390  58A0D004  58E0A00C
58B0A018  5810B000  5820D3B8  50201000  5830B020  5840D2B8  50403000

MEMBER NAME  BLDRESOL
18DA92FF  A00C982C  A01C07FE  40404040  D9C5E2D6  F0F3F8F7*
02E3E7E3  40003388  40400004  40400001  000033C0  40404040  40404040
40404040  40404040  40404040  40404040  40404040  40404040  40404040
40404040  40404040  40404040  40404040  D9C5E2D6  F0F3F8F8*
02E3E7E3  400033C0  40400038  40400001  58C0D048  987B1000  58207000
5020D3B8  58208000  5020D2E4  58209000  5020D2BC  5820A000  5020D4F4
98781020  58207000  5020D2B8  58208000  D9C5E2D6  F0F3F8F9*
02E3E7E3  400033F8  40400038  40400001  5020D2E8  58201010  41302000
41500004  1B255C40  D2281B25  5020D9EC  5030D9F0  58201014  41302000
41500004  1B255C40  D2281B25  5020D9BC  D9C5E2D6  F0F3F9F0**
02E3E7E3  40003430  40400038  40400001  5030D9C0  58201018  41302000
41500004  1B255B20  D24C5020  D9F45030  D9F85820  101C4130  20004150
00041B25  5B20D250  5020DA3C  5030DA40  D9C5E2D6  F0F3F9F1*
02C5E2C4  40404040  40400010  40404040  C3C4E3C2  C3C24040  0100346C
40000001  40404040  40404040  40404040  40404040  40404040  40404040
40404040  40404040  40404040  40404040  D9C5E2D6  F0F3F9F2*
02E3E7E3  40003468  40400024  40400001  47F0CAE6  47F0F00C  07C3C4E3
C2C3C240  90ECD00C  9823F020  58F0F01C  47F0F014  00000000  40404040
40404040  40404040  40404040  40404040  D9C5E2D6  F0F3F9F3*
02D9D3C4  40404040  40400038  40404040  00010001  0C003290  00010001
0C003314  00010001  0C00331C  00010001  0C003318  00010001  0C003384
00010001  0C00338C  00010001  0C003388  D9C5E2D6  F0F3F9F4*
02E3E7E3  40003490  40400028  40400001  00003494  58A0D004  58E0A00C
58B0A018  5810B014  5820D2B8  50201000  18DA92FF  A00C982C  A01C07FE
40404040  40404040  40404040  40404040  D9C5E2D6  F0F3F9F5*
02E3E7E3  4000348C  40400004  40400001  000034B8  40404040  40404040
40404040  40404040  40404040  40404040  40404040  40404040  40404040
40404040  40404040  40404040  40404040  D9C5E2D6  F0F3F9F6*
02E3E7E3  400034B8  40400038  40400001  58C0D048  98781010  78207000
7020D38C  58208000  5020D2B8  58201000  41302000  41500004  1B255C40
D2281B25  5020D9EC  5030D9F0  58201004  D9C5E2D6  F0F3F9F7*
02E3E7E3  400034F0  40400038  40400001  41302000  41500004  1B255B20
D24C5020  DA1C5030  DA205820  10084130  20004150  00041B25  5B20D24C
5020DA24  5030DA28  5820100C  41302000  D9C5E2D6  F0F3F9F8*
02C5E2C4  40404040  40400010  40404040  C3C4E3D9  C5E54040  01003540
40000001  40404040  40404040  40404040  40404040  40404040  40404040
40404040  40404040  40404040  40404040  D9C5E2D6  F0F3F9F9*
02E3E7E3  40003528  40400016  40400001  41500004  1B255B20  D24C5020
DA545030  DA5847F0  CAE64040  40404040  40404040  40404040  40404040
40404040  40404040  40404040  40404040  D9C5E2D6  F0F4F0F0**
02E3E7E3  40003540  40400020  40400001  47F0F00C  07C3C4E3  D9C5E540
```

```
90ECD00C  9823F020  58F0F01C  47F0F014  00000000  40404040  40404040
40404040  40404040  40404040  40404040  D9C5E2D6  F0F4F0F1*
02E3E7E3  40003564  40400034  40400001  00003568  58A0D004  58E0A00C
58B0A018  5810B004  5820D3B8  50201000  5830B030  5840D2B8  50403000
18DA92FF  A00C982C  A01C07FE  40404040  D9C5E2D6  F0F4F0F2*
02E3E7E3  40003560  40400004  40400001  00003598  40404040  40404040
40404040  40404040  40404040  40404040  40404040  40404040  40404040
40404040  40404040  40404040  40404040  D9C5E2D6  F0F4F0F3*
02E3E7E3  40003598  40400038  40400001  58C0D048  987B1000  78207000
7020D3C4  58208000  5020D3B8  58209000  5020D2E4  5820A000  5020D2BC
5820B000  5020D4F4  987B1024  58207000  D9C5E2D6  F0F4F0F4*
02E3E7E3  400035D0  40400038  40400001  5020D500  78209000  7020D2C0
5820A000  5020D2B8  5820B000  5020D2E8  58201014  41302000  41500004
1B255C40  D2281B25  5020D9EC  5030D9F0  D9C5E2D6  F0F4F0F5*
02E3E7E3  40003608  40400038  40400001  58201018  41302000  41500004
1B255C40  D2281B25  5020D9BC  5030D9C0  5820101C  41302000  41500004
1B255B20  D24C5020  D9F45030  D9F85820  D9C5E2D6  F0F4F0F6*

MEMBER NAME  BLDRESOL
02C5E2C4  40404040  40400010  40404040  C3C4E3D9  E4D34040  01003674
40000001  40404040  40404040  40404040  40404040  40404040  40404040
40404040  40404040  40404040  40404040  D9C5E2D6  F0F4F0F7*
02E3E7E3  40003640  40400032  40400001  10204130  20004150  00041B25
5B20D250  5020DA3C  5030DA40  58201028  41302000  41500004  1B255020
DA2C5030  DA3047F0  CAE64040  40404040  D9C5E2D6  F0F4F0F8*
02E3E7E3  40003674  40400020  40400001  47F0F00C  07C3C4E3  D9E4D340
90ECD00C  9823F020  58F0F01C  47F0F014  00000000  40404040  40404040
40404040  40404040  40404040  40404040  D9C5E2D6  F0F4F0F9*
02E3E7E3  40003698  40400004  40400001  0000369C  40404040  40404040
40404040  40404040  40404040  40404040  40404040  40404040  40404040
40404040  40404040  40404040  40404040  D9C5E2D6  F0F4F1F0**
02D9D3C4  40404040  40400038  40404040  00010001  0C003488  00010001
0C003490  00010001  0C00348C  00010001  0C00355C  00010001  0C003564
00010001  0C003560  00010001  0C003690  D9C5E2D6  F0F4F1F1*
02E3E7E3  4000369C  40400030  40400001  58A0D004  58E0A00C  58B0A018
5810B000  5820D3B8  50201000  5830B020  5840D2B8  50403000  18DA92FF
A00C982C  A01C07FE  40404040  40404040  D9C5E2D6  F0F4F1F2*
02E3E7E3  40003694  40400004  40400001  000036CC  40404040  40404040
40404040  40404040  40404040  40404040  40404040  40404040  40404040
40404040  40404040  40404040  40404040  D9C5E2D6  F0F4F1F3*
02E3E7E3  400036CC  40400038  40400001  58C0D048  987B1000  58207000
5020D3B8  58208000  5020D2E4  58209000  5020D2BC  5820A000  5020D4F4
987B1020  58207000  5020D2B8  58208000  D9C5E2D6  F0F4F1F4*
02E3E7E3  40003704  40400038  40400001  5020D3C0  58209000  5020D2EC
5820A000  5020D2E8  5820B000  5020D2F0  58201010  41302000  41500004
1B255C40  D2281B25  5020D9EC  5030D9F0  D9C5E2D6  F0F4F1F5*
02E3E7E3  4000373C  40400038  40400001  58201014  41302000  41500004
1B255C40  D2281B25  5020D9BC  5030D9C0  58201018  41302000  41500004
1B255B20  D24C5020  D9F45030  D9F85820  D9C5E2D6  F0F4F1F6*
02C5E2C4  40404040  40400010  40404040  C3C4E3F3  C4C34040  01003790
40000001  40404040  40404040  40404040  40404040  40404040  40404040
40404040  40404040  40404040  40404040  D9C5E2D6  F0F4F1F7*
02E3E7E3  40003774  40400038  40400001  101C4130  20004150  00041B25
5B20D250  5020DA3C  5030DA40  47F0CAE6  47F0F00C  07C3C4E3  F3C4C340
90ECD00C  9823F020  58F0F01C  47F0F014  D9C5E2D6  F0F4F1F8*
02E3E7E3  400037AC  40400004  40400001  00000000  40404040  40404040
40404040  40404040  40404040  40404040  40404040  40404040  40404040
40404040  40404040  40404040  40404040  D9C5E2D6  F0F4F1F9*
02E3E7E3  400037B4  40400028  40400001  000037B8  58A0D004  58E0A00C
58B0A018  5810B014  5820D2B8  50201000  18DA92FF  A00C982C  A01C07FE
40404040  40404040  40404040  40404040  D9C5E2D6  F0F4F2F0**
```

```
02E3E7E3   400037B0   40400004   40400001   000037DC   40404040   40404040
40404040   40404040   40404040   40404040   40404040   40404040   40404040
40404040   40404040   40404040   40404040   D9C5E2D6   F0F4F2F1*
02E3E7E3   400037DC   40400038   40400001   58C0D048   987B100C   78207000
7020D290   78208000   7020D294   58209000   5020D2B8   5820A000   5020D3A4
98781024   78207000   7020D300   78208000   D9C5E2D6   F0F4F2F2*
02E3E7E3   40003814   40400038   40400001   7020D304   58201000   41302000
41500004   1B255020   D9845030   D9885030   D10C5030   D11C5820   10044130
20004150   00041B25   5020D98C   5030D990   D9C5E2D6   F0F4F2F3*
02E3E7E3   4000384C   40400038   40400001   5030D110   5030D124   58201008
41302000   41500004   1B255020   D9945030   D9985820   101C4130   20004150
00041B25   5020D9DC   5030D9E0   5030D1D4   D9C5E2D6   F0F4F2F4*
02C5E2C4   40404040   40400010   40404040   C3C4E3D7   D3D54040   010038A4
40000001   40404040   40404040   40404040   40404040   40404040   40404040
40404040   40404040   40404040   40404040   D9C5E2D6   F0F4F2F5*
02E3E7E3   40003884   4040001E   40400001   9280D1D4   58201020   41302000

MEMBER NAME  BLDRESOL
41500004   1B255020   D9E45030   D9E847F0   CAFA4040   40404040   40404040
40404040   40404040   40404040   40404040   D9C5E2D6   F0F4F2F6*
02E3E7E3   400038A4   40400020   40400001   47F0F00C   07C3C4E3   D7D3D540
90ECD00C   9823F020   58F0F01C   47F0F014   00000000   40404040   40404040
40404040   40404040   40404040   40404040   D9C5E2D6   F0F4F2F7*
02E3E7E3   400038C8   40400016   40400001   000038CC   58D0D004   58E0D00C
92FFD00C   982CD01C   07FE4040   40404040   40404040   40404040   40404040
40404040   40404040   40404040   40404040   D9C5E2D6   F0F4F2F8*
02E3E7E3   400038C4   40400004   40400001   000038DE   40404040   40404040
40404040   40404040   40404040   40404040   40404040   40404040   40404040
40404040   40404040   40404040   40404040   D9C5E2D6   F0F4F2F9*
02D9D3C4   40404040   40400038   40404040   00010001   0C003698   00010001
0C003694   00010001   0C0037AC   00010001   0C0037B4   00010001   0C0037B0
00010001   0C0038C0   00010001   0C0038C8   D9C5E2D6   F0F4F3F0**
02C5E2C4   40404040   40400010   40404040   C3C4E3F3   C4D74040   010038FC
40000001   40404040   40404040   40404040   40404040   40404040   40404040
40404040   40404040   40404040   40404040   D9C5E2D6   F0F4F3F1*
02E3E7E3   400038DE   40400038   40400001   58C0D048   58201000   41302000
41500004   1B255020   D9A45030   D9A847F0   CAFA47F0   F00C07C3   C4E3F3C4
D74090EC   D00C9823   F02058F0   F01C47F0   D9C5E2D6   F0F4F3F2*
02E3E7E3   40003916   40400006   40400001   F0140000   00004040   40404040
40404040   40404040   40404040   40404040   40404040   40404040   40404040
40404040   40404040   40404040   40404040   D9C5E2D6   F0F4F3F3*
02E3E7E3   40003920   40400028   40400001   00003924   58A0D004   58E0A00C
58B0A018   5810B004   5820D288   50201000   18DA92FF   A00C982C   A01C07FE
40404040   40404040   40404040   40404040   D9C5E2D6   F0F4F3F4*
02E3E7E3   4000391C   40400004   40400001   00003948   40404040   40404040
40404040   40404040   40404040   40404040   40404040   40404040   40404040
40404040   40404040   40404040   40404040   D9C5E2D6   F0F4F3F5*
02C5E2C4   40404040   40400010   40404040   C3C4E3F3   C4C44040   0100397C
40000001   40404040   40404040   40404040   40404040   40404040   40404040
40404040   40404040   40404040   40404040   D9C5E2D6   F0F4F3F6*
02E3E7E3   40003948   40400032   40400001   58C0D048   58701004   58207000
5020D288   58201000   41302000   41500004   1B255020   D9DC5030   D9E05030
D1D49280   D1D447F0   CAFA4040   40404040   D9C5E2D6   F0F4F3F7*
02E3E7E3   4000397C   40400020   40400001   47F0F00C   07C3C4E3   F3C4C440
90ECD00C   9823F020   58F0F01C   47F0F014   00000000   40404040   40404040
40404040   40404040   40404040   40404040   D9C5E2D6   F0F4F3F8*
02E3E7E3   400039A0   40400028   40400001   000039A4   58A0D004   58E0A00C
58B0A018   5810B008   5820D2B8   50201000   18DA92FF   A00C982C   A01C07FE
40404040   40404040   40404040   40404040   D9C5E2D6   F0F4F3F9*
02E3E7E3   4000399C   40400004   40400001   000039C8   40404040   40404040
40404040   40404040   40404040   40404040   40404040   40404040   40404040
```

```
40404040  40404040  40404040  40404040  D9C5E2D6  F0F4F4F0**
02E3E7E3  400039C8  40400038  40400001  58C0D048  98781004  78207000
7020D2F4  58208000  5020D2B8  58201000  41302000  41500004  1B255020
D9DC5030  D9E05030  D1D49280  D1D447F0  D9C5E2D6  F0F4F4F1*
02C5E2C4  40404040  40400010  40404040  C3C4E3F3  C4D34040  01003A04
40000001  40404040  40404040  40404040  40404040  40404040  40404040
40404040  40404040  40404040  40404040  D9C5E2D6  F0F4F4F2*
02E3E7E3  40003A00  40400002  40400001  CAFA4040  40404040  40404040
40404040  40404040  40404040  40404040  40404040  40404040  40404040
40404040  40404040  40404040  40404040  D9C5E2D6  F0F4F4F3*
02E3E7E3  40003A04  40400020  40400001  47F0F00C  07C3C4E3  F3C4D340
90ECD00C  9823F020  58F0F01C  47F0F014  00000000  40404040  40404040
40404040  40404040  40404040  40404040  D9C5E2D6  F0F4F4F4*
02D9D3C4  40404040  40400038  40404040  00010001  0C0038C4  00010001
0C003918  00010001  0C003920  00010001  0C00391C  00010001  0C003998

MEMBER NAME  BLDRESOL
00010001  0C0039A0  00010001  0C00399C  D9C5E2D6  F0F4F4F5*
02E3E7E3  40003A28  40400028  40400001  00003A2C  58A0D004  58E0A00C
58B0A018  5810B008  5820D2B8  50201000  18DA92FF  A00C982C  A01C07FE
40404040  40404040  40404040  40404040  D9C5E2D6  F0F4F4F6*
02E3E7E3  40003A24  40400004  40400001  00003A50  40404040  40404040
40404040  40404040  40404040  40404040  40404040  40404040  40404040
40404040  40404040  40404040  40404040  D9C5E2D6  F0F4F4F7*
02E3E7E3  40003A50  40400038  40400001  58C0D048  58701008  58207000
5020D2B8  58201000  41302000  41500004  1B255020  D9DC5030  D9E05030
D1D49280  D1D45820  10044130  20004150  D9C5E2D6  F0F4F4F8*
02C5E2C4  40404040  40400010  40404040  C3C4E3F3  C4C14040  01003A98
40000001  40404040  40404040  40404040  40404040  40404040  40404040
40404040  40404040  40404040  40404040  D9C5E2D6  F0F4F4F9*
02E3E7E3  40003A88  40400030  40400001  00041B25  5020D9E4  5030D9E8
47F0CAFA  47F0F00C  07C3C4E3  F3C4C140  90ECD00C  9823F020  58F0F01C
47F0F014  00000000  40404040  40404040  D9C5E2D6  F0F4F5F0**
02E3E7E3  40003ABC  40400028  40400001  00003AC0  58A0D004  58E0A00C
58B0A018  5810B008  5820D2B8  50201000  18DA92FF  A00C982C  A01C07FE
40404040  40404040  40404040  40404040  D9C5E2D6  F0F4F5F1*
02E3E7E3  40003AB8  40400004  40400001  00003AE4  40404040  40404040
40404040  40404040  40404040  40404040  40404040  40404040  40404040
40404040  40404040  40404040  40404040  D9C5E2D6  F0F4F5F2*
02E3E7E3  40003AE4  40400038  40400001  58C0D048  58701008  58207000
5020D2B8  58201000  41302000  41500004  1B255020  D9DC5030  D9E05030
D1D49280  D1D45820  10044130  20004150  D9C5E2D6  F0F4F5F3*
02C5E2C4  40404040  40400010  40404040  C3C4E3C8  C2D74040  01003B2C
40000001  40404040  40404040  40404040  40404040  40404040  40404040
40404040  40404040  40404040  40404040  D9C5E2D6  F0F4F5F4*
02E3E7E3  40003B1C  40400030  40400001  00041B25  5020D9E4  5030D9E8
47F0CAFA  47F0F00C  07C3C4E3  C8C2D740  90ECD00C  9823F020  58F0F01C
47F0F014  00000000  40404040  40404040  D9C5E2D6  F0F4F5F5*
02E3E7E3  40003B50  40400004  40400001  00003B54  40404040  40404040
40404040  40404040  40404040  40404040  40404040  40404040  40404040
40404040  40404040  40404040  40404040  D9C5E2D6  F0F4F5F6*
02D9D3C4  40404040  40400038  40404040  00010001  0C003A20  00010001
0C003A28  00010001  0C003A24  00010001  0C003AB4  00010001  0C003ABC
00010001  0C003AB8  00010001  0C003B48  D9C5E2D6  F0F4F5F7*
02E3E7E3  40003B54  40400024  40400001  58A0D004  58E0A00C  58B0A018
5810B000  5820D288  50201000  18DA92FF  A00C982C  A01C07FE  40404040
40404040  40404040  40404040  40404040  D9C5E2D6  F0F4F5F8*
02E3E7E3  40003B4C  40400004  40400001  00003B78  40404040  40404040
40404040  40404040  40404040  40404040  40404040  40404040  40404040
40404040  40404040  40404040  40404040  D9C5E2D6  F0F4F5F9*
02C5E2C4  40404040  40400010  40404040  C3C4E3C7  D9C44040  01003BA8
```

```
40000001  40404040  40404040  40404040  40404040  40404040  40404040
40404040  40404040  40404040  40404040  D9C5E2D6  F0F4F6F0**
02E3E7E3  40003B78  4040002E  40400001  58C0D048  98781000  58207000
5020D288  58201004  41302000  41500004  1B255B20  D2505020  D9D45030
D9D847F0  CAFA4040  40404040  40404040  D9C5E2D6  F0F4F6F1*
02E3E7E3  40003BA8  40400020  40400001  47F0F00C  07C3C4E3  C7D9C440
90ECD00C  9823F020  58F0F01C  47F0F014  00000000  40404040  40404040
40404040  40404040  40404040  40404040  D9C5E2D6  F0F4F6F2*
02E3E7E3  40003BCC  40400016  40400001  00003BD0  58D0D004  58E0D00C
92FFD00C  982CD01C  07FE4040  40404040  40404040  40404040  40404040
40404040  40404040  40404040  40404040  D9C5E2D6  F0F4F6F3*
02E3E7E3  40003BC8  40400004  40400001  00003BE2  40404040  40404040
40404040  40404040  40404040  40404040  40404040  40404040  40404040
40404040  40404040  40404040  40404040  D9C5E2D6  F0F4F6F4*

MEMBER NAME  BLDRESOL
02E3E7E3  40003BE2  40400038  40400001  58C0D048  987B1000  58207000
5020D518  58208000  5020D51C  58209000  5020D4A0  987A1018  58207000
5020D504  58208000  5020D50C  5820100C  D9C5E2D6  F0F4F6F5*
02E3E7E3  40003C1A  40400038  40400001  41302000  41500004  1B255020
DAC85030  DACC5820  10104130  20004150  00041B25  5020DAB8  5030DABC
58201014  41302000  41500004  1B255020  D9C5E2D6  F0F4F6F6*
02E3E7E3  40003C52  40400036  40400001  DAC05030  DAC45820  10204130
20004150  00041B25  5020DA5C  5030DA60  58201024  41302000  41500004
1B255020  DA645030  DA6847F0  CB0E4040  D9C5E2D6  F0F4F6F7*
02E3E7E3  40000024  40400004  40400001  00001BDA  40404040  40404040
40404040  40404040  40404040  40404040  40404040  40404040  40404040
40404040  40404040  40404040  40404040  D9C5E2D6  F0F4F6F8*
02E3E7E3  4000002C  40400004  40400001  00000088  40404040  40404040
40404040  40404040  40404040  40404040  40404040  40404040  40404040
40404040  40404040  40404040  40404040  D9C5E2D6  F0F4F6F9*
02E3E7E3  40000028  40400004  40400001  00001BC8  40404040  40404040
40404040  40404040  40404040  40404040  40404040  40404040  40404040
40404040  40404040  40404040  40404040  D9C5E2D6  F0F4F7F0**
02D9D3C4  40404040  40400038  40404040  00010001  0C003B50  00010001
0C003B4C  00010001  0C003BC4  00010001  0C003BCC  00010001  0C003BC8
00010001  0C000024  00010001  0C00002C  D9C5E2D6  F0F4F7F1*
02E3E7E3  400000D0  4040001C  40400001  00001088  00000C70  00001BAA
00000CC8  00001BAA  00000DC0  00000E24  40404040  40404040  40404040
40404040  40404040  40404040  40404040  D9C5E2D6  F0F4F7F2*
02D9D3C4  40404040  40400038  40404040  00010001  0C000028  00010001
0C0000D0  00010001  0C0000D4  00010001  0C0000D8  00010001  0C0000DC
00010001  0C0000E0  00010001  0C0000E4  D9C5E2D6  F0F4F7F3*
02E3E7E3  400000EC  40400008  40400001  000002C4  00000010  40404040
40404040  40404040  40404040  40404040  40404040  40404040  40404040
40404040  40404040  40404040  40404040  D9C5E2D6  F0F4F7F4*
02E3E7E3  400000F8  40400008  40400001  000002C4  00000018  40404040
40404040  40404040  40404040  40404040  40404040  40404040  40404040
40404040  40404040  40404040  40404040  D9C5E2D6  F0F4F7F5*
02E3E7E3  40000104  4040000C  40400001  00000308  000002A8  00000000
40404040  40404040  40404040  40404040  40404040  40404040  40404040
40404040  40404040  40404040  40404040  D9C5E2D6  F0F4F7F6*
02D9D3C4  40404040  40400038  40404040  00010001  0C0000E8  00010001
0C0000EC  00080001  0C0000F0  00010001  0C0000F8  00080001  0C0000FC
00010001  0C000104  00010001  0C000108  D9C5E2D6  F0F4F7F7*
02E3E7E3  40000110  4040001C  40400001  000002A8  000002AC  80000570
00000308  000002A8  00000002  000002A8  40404040  40404040  40404040
40404040  40404040  40404040  40404040  D9C5E2D6  F0F4F7F8*
02D9D3C4  40404040  40400038  40404040  00090001  0C00010C  00010001
0C000110  00010001  0C000114  00010001  0C000118  00010001  0C00011C
00010001  0C000120  00090001  0C000124  D9C5E2D6  F0F4F7F9*
```

```
02E3E7E3  4000012C  40400010  40400001  000002AC  80000570  000002C4
00000028  40404040  40404040  40404040  40404040  40404040  40404040
40404040  40404040  40404040  40404040  D9C5E2D6  F0F4F8F0**
02E3E7E3  40000140  4040000C  40400001  000003D4  00000548  00000580
40404040  40404040  40404040  40404040  40404040  40404040  40404040
40404040  40404040  40404040  40404040  D9C5E2D6  F0F4F8F1*
02D9D3C4  40404040  40400038  40404040  00010001  0C000128  00010001
0C00012C  00010001  0C000130  00010001  0C000134  00080001  0C000138
00010001  0C000140  00010001  0C000144  D9C5E2D6  F0F4F8F2*
02E3E7E3  4000014C  4040001C  40400001  80000368  000003CC  00000590
00000584  00000434  00000574  00000970  40404040  40404040  40404040
40404040  40404040  40404040  40404040  D9C5E2D6  F0F4F8F3*
02D9D3C4  40404040  40400038  40404040  00010001  0C000148  00010001

MEMBER NAME  BLDRESOL
0C00014C  00010001  0C000150  00010001  0C000154  00010001  0C000158
00010001  0C00015C  00010001  0C000160  D9C5E2D6  F0F4F8F4*
02E3E7E3  40000168  4040001C  40400001  00000970  00000970  00000970
00000970  80000368  00000970  00000574  40404040  40404040  40404040
40404040  40404040  40404040  40404040  D9C5E2D6  F0F4F8F5*
02D9D3C4  40404040  40400038  40404040  00010001  0C000164  00010001
0C000168  00010001  0C00016C  00010001  0C000170  00010001  0C000174
00010001  0C000178  00010001  0C00017C  D9C5E2D6  F0F4F8F6*
02E3E7E3  40000184  40400008  40400001  800008F4  000002E4  40404040
40404040  40404040  40404040  40404040  40404040  40404040  40404040
40404040  40404040  40404040  40404040  D9C5E2D6  F0F4F8F7*
02E3E7E3  40000190  40400004  40400001  800008FC  40404040  40404040
40404040  40404040  40404040  40404040  40404040  40404040  40404040
40404040  40404040  40404040  40404040  D9C5E2D6  F0F4F8F8*
02E3E7E3  4000019C  40400008  40400001  000008E8  80000340  40404040
40404040  40404040  40404040  40404040  40404040  40404040  40404040
40404040  40404040  40404040  40404040  D9C5E2D6  F0F4F8F9*
02E3E7E3  400001A8  40400004  40400001  000008E8  40404040  40404040
40404040  40404040  40404040  40404040  40404040  40404040  40404040
40404040  40404040  40404040  40404040  D9C5E2D6  F0F4F9F0**
02E3E7E3  400001B0  40400004  40400001  80000340  40404040  40404040
40404040  40404040  40404040  40404040  40404040  40404040  40404040
40404040  40404040  40404040  40404040  D9C5E2D6  F0F4F9F1*
02D9D3C4  40404040  40400038  40404040  00010001  0C000180  00010001
0C000184  00010001  0C000188  00010001  0C000190  00010001  0C00019C
00010001  0C0001A0  00010001  0C0001A8  D9C5E2D6  F0F4F9F2*
02E3E7E3  400001B4  40400010  40400001  00000328  0000032C  80000330
000002DC  40404040  40404040  40404040  40404040  40404040  40404040
40404040  40404040  40404040  40404040  D9C5E2D6  F0F4F9F3*
02E3E7E3  400001C8  40400008  40400001  800008FC  000002C4  40404040
40404040  40404040  40404040  40404040  40404040  40404040  40404040
40404040  40404040  40404040  40404040  D9C5E2D6  F0F4F9F4*
02E3E7E3  400001D4  40400008  40400001  80000000  000002B4  40404040
40404040  40404040  40404040  40404040  40404040  40404040  40404040
40404040  40404040  40404040  40404040  D9C5E2D6  F0F4F9F5*
02D9D3C4  40404040  40400038  40404040  00010001  0C0001B0  00010001
0C0001B4  00010001  0C0001B8  00010001  0C0001BC  00010001  0C0001C0
00010001  0C0001C8  00010001  0C0001CC  D9C5E2D6  F0F4F9F6*
02E3E7E3  400001E0  40400004  40400001  80000000  40404040  40404040
40404040  40404040  40404040  40404040  40404040  40404040  40404040
40404040  40404040  40404040  40404040  D9C5E2D6  F0F4F9F7*
02E3E7E3  400001E8  40400018  40400001  000003D8  00000598  00000408
00000410  00000404  8000040C  40404040  40404040  40404040  40404040
40404040  40404040  40404040  40404040  D9C5E2D6  F0F4F9F8*
02E3E7E3  40000204  40400004  40400001  0000043C  40404040  40404040
40404040  40404040  40404040  40404040  40404040  40404040  40404040
```

```
40404040  40404040  40404040  40404040  D9C5E2D6  F0F4F9F9*
02D9D3C4  40404040  40400038  40404040  00010001  0C0001D8  00010001
0C0001E8  00010001  0C0001EC  00010001  0C0001F0  00010001  0C0001F4
00010001  0C0001F8  00010001  0C0001FC  D9C5E2D6  F0F5F0F0**
02E3E7E3  4000020C  4040001C  40400001  000003A4  00000548  00000580
80000368  000003A4  000002A8  000002C8  40404040  40404040  40404040
40404040  40404040  40404040  40404040  D9C5E2D6  F0F5F0F1*
02D9D3C4  40404040  40400038  40404040  00010001  0C000204  00010001
0C00020C  00010001  0C000210  00010001  0C000214  00010001  0C000218
00010001  0C00021C  00010001  0C000220  D9C5E2D6  F0F5F0F2*
02E3E7E3  40000228  40400020  40400001  80000928  80000B80  800005C0
80000B80  80000B80  80000000  00000928  000007A8  40404040  40404040

MEMBER NAME  BLDRESOL
40404040  40404040  40404040  40404040  D9C5E2D6  F0F5F0F3*
02D9D3C4  40404040  40400038  40404040  00010001  0C000224  00010001
0C000228  00010001  0C00022C  00010001  0C000230  00010001  0C000234
00010001  0C000238  00010001  0C000240  D9C5E2D6  F0F5F0F4*
02E3E7E3  40000248  4040000C  40400001  000005C8  00000708  80000314
40404040  40404040  40404040  40404040  40404040  40404040  40404040
40404040  40404040  40404040  40404040  D9C5E2D6  F0F5F0F5*
02E3E7E3  40000258  40400004  40400001  0000043C  40404040  40404040
40404040  40404040  40404040  40404040  40404040  40404040  40404040
40404040  40404040  40404040  40404040  D9C5E2D6  F0F5F0F6*
02E3E7E3  40000B58  40400038  40400001  00000000  00000000  00000000
00000000  00000000  00000000  00000000  00000000  00000000  00000000
00000000  00000000  00000000  00000000  D9C5E2D6  F0F5F0F7*
02E3E7E3  40000B90  40400004  40400001  00000000  40404040  40404040
40404040  40404040  40404040  40404040  40404040  40404040  40404040
40404040  40404040  40404040  40404040  D9C5E2D6  F0F5F0F8*
02D9D3C4  40404040  40400028  40404040  00010001  0C000244  00010001
0C000248  00010001  0C00024C  00010001  0C000250  00010001  0C000258
40404040  40404040  40404040  40404040  D9C5E2D6  F0F5F0F9*
02C5D5C4  40404040  40404040  40404040  40404040  40404040  40404040
00003C88  F1F5F7F3  F460C6D6  F34040F0  F2F0F2F8  F7F0F9F8  40F0F84B
F1F24BF3  F7404040  D9C5E2D6  D3E54040  D9C5E2D6  F0F5F1F0**

MEMBER NAME  BREAK
02C5E2C4  40404040  40400010  40400001  C2D9C5C1  D2404040  00000000
40000000  40404040  40404040  40404040  40404040  40404040  40404040
40404040  40404040  40404040  40404040  C2D9C5C1  F0F0F0F1*
02E3E7E3  40000000  40400038  40400001  47F0F00C  07C2D9C5  C1D24040
90ECD00C  184D98CD  F0205040  D00450D0  400807FC  40404040  40404040
021A24C9  D4D7D9D6  D7C5D940  C5D3C5D4  C2D9C5C1  F0F0F0F2*
02E3E7E3  40000038  4040001A  40400001  D5E340E3  E8D7C540  C6D6E4D5
C440C9D5  40C2D9C5  C1D24010  04224040  40404040  40404040  40404040
40404040  40404040  40404040  40404040  C2D9C5C1  F0F0F0F3*
02E3E7E3  40000150  40400038  40400001  00000000  00000000  4F080000
00000000  00000000  00000000  00000000  00000001  00000001  00000002
00000003  00000004  00000005  00000006  C2D9C5C1  F0F0F0F4*
02C5E2C4  40404040  40400010  40400002  E2D7D3D7  E3E24040  05000000
40030D44  40404040  40404040  40404040  40404040  40404040  40404040
40404040  40404040  40404040  40404040  C2D9C5C1  F0F0F0F5*
02E3E7E3  40000188  40400020  40400001  00000007  00000008  00000009
0000000B  0000000E  00000014  00000000  00000000  40404040  40404040
40404040  40404040  40404040  40404040  C2D9C5C1  F0F0F0F6*
02C5E2C4  40404040  40400010  40400003  E2D7D3C9  E3404040  02000000
40000000  40404040  40404040  40404040  40404040  40404040  40404040
40404040  40404040  40404040  40404040  C2D9C5C1  F0F0F0F7*
02E3E7E3  40000218  40400008  40400001  FFFFFFEC  00000000  40404040
40404040  40404040  40404040  40404040  40404040  40404040  40404040
```

40404040 40404040 40404040 40404040 C2D9C5C1 F0F0F0F8*
02C5E2C4 40404040 40400010 40400004 C9C2C3D6 D47B4040 02000000
40000000 40404040 40404040 40404040 40404040 40404040 40404040
40404040 40404040 40404040 40404040 C2D9C5C1 F0F0F0F9*
02E3E7E3 40000224 40400008 40400001 00000000 00000000 40404040
40404040 40404040 40404040 40404040 40404040 40404040 40404040
40404040 40404040 40404040 40404040 C2D9C5C1 F0F0F1F0**
02C5E2C4 40404040 40400010 40400005 D7D9D6D1 C1D94040 02000000
40000000 40404040 40404040 40404040 40404040 40404040 40404040
40404040 40404040 40404040 40404040 C2D9C5C1 F0F0F1F1*
02E3E7E3 40000230 40400008 40400001 00000000 00000000 40404040
40404040 40404040 40404040 40404040 40404040 40404040 40404040
40404040 40404040 40404040 40404040 C2D9C5C1 F0F0F1F2*
02C5E2C4 40404040 40400010 40400006 D7D9D6D1 D3D54040 02000000
40000000 40404040 40404040 40404040 40404040 40404040 40404040
40404040 40404040 40404040 40404040 C2D9C5C1 F0F0F1F3*
02C5E2C4 40404040 40400010 40400007 D7D9D6D1 E2D74040 02000000
40000000 40404040 40404040 40404040 40404040 40404040 40404040
40404040 40404040 40404040 40404040 C2D9C5C1 F0F0F1F4*
02C5E2C4 40404040 40400010 40400008 E4D7C4E3 C5F14040 02000000
40000000 40404040 40404040 40404040 40404040 40404040 40404040
40404040 40404040 40404040 40404040 C2D9C5C1 F0F0F1F5*
02E3E7E3 4000023C 40400010 40400001 00000000 00000000 00000000
00000000 40404040 40404040 40404040 40404040 40404040 40404040
40404040 40404040 40404040 40404040 C2D9C5C1 F0F0F1F6*
02E3E7E3 40000250 40400004 40400001 00000000 40404040 40404040
40404040 40404040 40404040 40404040 40404040 40404040 40404040
40404040 40404040 40404040 40404040 C2D9C5C1 F0F0F1F7*
02E3E7E3 400002AC 40400038 40400001 5800D10C 5000D1A4 5800D180
5000D1AC 5800D17C 5000D1A8 5800D124 5000D200 58B0D118 58B0D118
5800D1A4 1A0B5000 D1A45800 D1145000 C2D9C5C1 F0F0F1F8*
02E3E7E3 400002E4 40400038 40400001 D18C18AB 58B0D1D0 5890D1DC
5880D1C4 47F0D2DE 5800D198 1BFF870F D2B458F0 D1F84110 D06805EF
5800D198 1BFF870F D2C85800 D1A81A0A C2D9C5C1 F0F0F1F9*
02E3E7E3 4000031C 40400038 40400001 5000D1A8 5800D18C 1BFF860F

MEMBER NAME BREAK
D2D647F0 D2785800 D1085000 D18C5800 D1AC5000 D1805800 D1085000
D1985800 D1A45900 D18047C0 D2FE47F0 C2D9C5C1 F0F0F2F0**
02E3E7E3 40000354 40400038 40400001 D7385850 D1A45C40 D2085050
D2501825 5A20D134 7802B000 32004770 D31E47F0 D2785800 D18C1BFF
870FD336 18255A20 D20C7822 B0007020 C2D9C5C1 F0F0F2F1*
02E3E7E3 4000038C 40400038 40400001 D1B45800 D18C1BFF 870FD350
5820D250 5A20D210 7822B000 7020D1B8 5800D18C 1BFF860F D36A5820
D2505A20 D1447822 B0007020 D1B45800 C2D9C5C1 F0F0F2F2*
02E3E7E3 400003C4 40400038 40400001 D18C1BFF 860FD384 5820D250
5A20D214 7822B000 7020D1B8 50A0D154 5800D214 5000D248 5800D218
5000D24C 5880D208 189A58B0 D14458A0 C2D9C5C1 F0F0F2F3*
02E3E7E3 400003FC 40400038 40400001 D1DC58E0 D248585E A00058E0
D24C580E A0005000 D1841835 5050D150 1C481825 5A20D124 18055A00
D20C5000 D2281805 5A00D210 5000D22C C2D9C5C1 F0F0F2F4*
02E3E7E3 40000434 40400038 40400001 18051A0B 5000D230 18055A00
D2145000 D2341805 5A00D218 5000D238 18055A00 D21C5000 D23C5A50
D2205050 D24018A3 18B25890 D1D059A0 C2D9C5C1 F0F0F2F5*
02E3E7E3 4000046C 40400038 40400001 D1A44780 D69A2B00 780B9000
6A00D100 6000D0F8 5830D0FC 5030D168 5930D118 4780D480 5930D11C
4770D448 50A0D150 47F0D522 5930D120 C2D9C5C1 F0F0F2F6*
02E3E7E3 400004A4 40400024 40400001 4780D536 5930D124 4780D5B4
5930D128 4780D69A 58F0D1D8 45E0F004 00000006 00000028 40404040
40404040 40404040 40404040 40404040 C2D9C5C1 F0F0F2F7*
02D9D3C4 40404040 40400038 40404040 00020001 0C000218 00030001

```
1C000224  00040001  1C000230  00050001  1C00023C  00060001  1C000240
00070001  1C000244  00080001  1C000250  C2D9C5C1  F0F0F2F8*
02E3E7E3  400004C8  40400038  40400001  45E0F008  0450D168  45E0F010
47F0D69A  58E0D228  780E9000  7000D158  58E0D22C  780E9000  7000D160
58E0D230  780E9000  7000D15C  58E0D234  C2D9C5C1  F0F0F2F9*
02E3E7E3  40000500  40400038  40400001  780E9000  7000D164  58F0D1E8
4110D084  05EF50A0  D15041E0  000815FE  4720D4CE  58EFD04C  07FE47F0
D69A5880  D1C45890  D1DC58B0  D1D058A0  C2D9C5C1  F0F0F3F0**
02E3E7E3  40000538  40400038  40400001  D1185800  D1AC1A0A  5000D1AC
5800D114  5000D198  5800D150  5900D1A4  47A0D50A  5800D1A4  1A0A5000
D1A458F0  D1CC4110  D09805EF  5800D1A8  C2D9C5C1  F0F0F3F1*
02E3E7E3  40000570  40400038  40400001  1A0A5000  D1A847F0  D2A05880
D1C45890  D1DC58B0  D1D058A0  D11847F0  D2A0410B  90005000  D0D49280
D0D458F0  D1E44110  D0D005EF  50A0D150  C2D9C5C1  F0F0F3F2*
02E3E7E3  400005A8  40400038  40400001  41E00004  15FE4720  D56058EF
D05807FE  47F0D69A  5880D1C4  5890D1DC  58B0D1D0  58A0D118  5800D1AC
1A0A5000  D1AC5800  D1145000  D1985800  C2D9C5C1  F0F0F3F3*
02E3E7E3  400005E0  40400038  40400001  D1505900  D1A447A0  D59C5800
D1A41A0A  5000D1A4  58F0D1CC  4110D098  05EF5800  D1A81A0A  5000D1A8
47F0D2A0  58E0D238  2B00780E  90006A00  C2D9C5C1  F0F0F3F4*
02E3E7E3  40000618  40400038  40400001  D1006000  D0F85850  D0FC58E0
D23C2B00  780E9000  6A00D100  6000D0F8  5800D0FC  5000D174  58E0D240
2B00780E  90006A00  D1006000  D0F85870  C2D9C5C1  F0F0F3F5*
02E3E7E3  40000650  40400038  40400001  D0FC5C40  D1445C60  D2241827
5A20D200  410B9000  5000D0DC  58F0D1C0  4105F004  5000D0E0  58F0D1F0
4102F000  5000D0E8  58F0D1EC  4110D0D8  C2D9C5C1  F0F0F3F6*
02E3E7E3  40000688  40400038  40400001  05EF50A0  D15041E0  000415FE
4720D646  58EFD060  07FE47F0  D69A5880  D1C45890  D1DC58B0  D1D058A0
D1185800  D1AC1A0A  5000D1AC  5800D114  C2D9C5C1  F0F0F3F7*
02E3E7E3  400006C0  40400038  40400001  5000D198  5800D150  5900D1A4
47A0D682  5800D1A4  1A0A5000  D1A458F0  D1CC4110  D09805EF  5800D1A8
1A0A5000  D1A847F0  D2A05800  D2401A08  C2D9C5C1  F0F0F3F8*
02E3E7E3  400006F8  40400038  40400001  5000D240  5800D23C  1A085000
D23C5800  D2381A08  5000D238  5800D234  1A085000  D2345800  D2301A08

MEMBER NAME  BREAK
5000D230  5800D22C  1A085000  D22C5800  C2D9C5C1  F0F0F3F9*
02E3E7E3  40000730  40400038  40400001  D2281A08  5000D228  1AB85AA0
D11859A0  D18447C0  D41250A0  D15058A0  D1DC58B0  D1445890  D1185820
D1541A29  5020D154  5800D24C  1A0B5000  C2D9C5C1  F0F0F4F0**
02E3E7E3  40000768  40400038  40400001  D24C5800  D2481A0B  5000D248
5920D16C  47C0D3A6  5880D1C4  5890D1DC  58B0D1D0  58A0D118  47F0D2A0
1BFF58E0  D00007FE  58A0D004  58E0A00C  C2D9C5C1  F0F0F4F1*
02E3E7E3  400007A0  40400038  40400001  58B0A018  5810B004  5820D180
50201000  5830B00C  5840D1A0  50403000  5850B014  5860D16C  50605000
5870B020  5880D1B0  50807000  18DA92FF  C2D9C5C1  F0F0F4F2*
02E3E7E3  400007D8  40400038  40400001  A00C982C  A01C07FE  987B1004
58207000  5020D180  58209000  5020D1A0  987A1014  58207000  5020D16C
58208000  5020D17C  5820A000  5020D1B0  C2D9C5C1  F0F0F4F3*
02E3E7E3  40000810  40400038  40400001  58201000  41302000  41500004
1B255C40  D1401B25  5020D1D0  5030D1D4  5030D06C  5030D0A0  58201008
41302000  41500004  1B255C40  D13C1B25  C2D9C5C1  F0F0F4F4*
02E3E7E3  40000848  40400038  40400001  5020D1F0  5030D1F4  5030D0A8
58201010  41302000  41500004  1B255C40  D1281B25  5020D1DC  5030D1E0
5030D078  5030D0B0  5820101C  41302000  C2D9C5C1  F0F0F4F5*
02E3E7E3  40000880  4040001C  40400001  41500004  1B255C40  D1401B25
5020D1C4  5030D1C8  5030D0C8  47F0D254  40404040  40404040  40404040
40404040  40404040  40404040  40404040  C2D9C5C1  F0F0F4F6*
02E3E7E3  40000020  40400008  40400001  000007E0  00000058  40404040
40404040  40404040  40404040  40404040  40404040  40404040  40404040
40404040  40404040  40404040  40404040  C2D9C5C1  F0F0F4F7*
```

| | | | | | | |
|---|---|---|---|---|---|---|
| 02E3E7E3 | 40000058 | 40400004 | 40400001 | 00000798 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F4F8* | |
| 02E3E7E3 | 400000A4 | 40400010 | 40400001 | 00000526 | 0000052A | 00000526 |
| 000005B8 | 40404040 | 40404040 | 40404040 | 40404040 | 40404040 | 40404040 |
| 40404040 | 40404040 | 40404040 | 40404040 | C2D9C5C1 | F0F0F4F9* | |
| 02D9D3C4 | 40404040 | 40400038 | 40404040 | 00010001 | 0C0004C4 | 00010001 |
| 0C000020 | 00010001 | 0C000024 | 00010001 | 0C000058 | 00010001 | 0C0000A4 |
| 00010001 | 0C0000A8 | 00010001 | 0C0000AC | C2D9C5C1 | F0F0F5F0** | |
| 02E3E7E3 | 400000B4 | 40400010 | 40400001 | 000005BC | 0000069E | 000006A2 |
| 0000020C | 40404040 | 40404040 | 40404040 | 40404040 | 40404040 | 40404040 |
| 40404040 | 40404040 | 40404040 | 40404040 | C2D9C5C1 | F0F0F5F1* | |
| 02E3E7E3 | 400000C8 | 40400008 | 40400001 | 000001D8 | 000001FC | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F5F2* | |
| 02E3E7E3 | 400000D4 | 40400004 | 40400001 | 000001C4 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F5F3* | |
| 02D9D3C4 | 40404040 | 40400038 | 40404040 | 00010001 | 0C0000B0 | 00010001 |
| 0C0000B4 | 00010001 | 0C0000B8 | 00010001 | 0C0000BC | 00010001 | 0C0000C0 |
| 00010001 | 0C0000C8 | 00010001 | 0C0000CC | C2D9C5C1 | F0F0F5F4* | |
| 02E3E7E3 | 400000D8 | 4040001C | 40400001 | 80000200 | 0000020C | 000001B0 |
| 000001B8 | 000001B4 | 800001BC | 000001A8 | 40404040 | 40404040 | 40404040 |
| 40404040 | 40404040 | 40404040 | 40404040 | C2D9C5C1 | F0F0F5F5* | |
| 02D9D3C4 | 40404040 | 40400038 | 40404040 | 00010001 | 0C0000D4 | 00010001 |
| 0C0000D8 | 00010001 | 0C0000DC | 00010001 | 0C0000E0 | 00010001 | 0C0000E4 |
| 00010001 | 0C0000E8 | 00010001 | 0C0000EC | C2D9C5C1 | F0F0F5F6* | |
| 02E3E7E3 | 400000F4 | 40400004 | 40400001 | 000001AC | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F5F7* | |
| 02E3E7E3 | 400000FC | 40400004 | 40400001 | 000001D8 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F5F8* | |

MEMBER NAME BREAK

| | | | | | | |
|---|---|---|---|---|---|---|
| 02E3E7E3 | 40000104 | 40400004 | 40400001 | 000001F8 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F5F9* | |
| 02E3E7E3 | 4000010C | 40400010 | 40400001 | 000001C4 | 0000020C | 000001D0 |
| 000001E8 | 40404040 | 40404040 | 40404040 | 40404040 | 40404040 | 40404040 |
| 40404040 | 40404040 | 40404040 | 40404040 | C2D9C5C1 | F0F0F6F0** | |
| 02D9D3C4 | 40404040 | 40400038 | 40404040 | 00010001 | 0C0000F0 | 00010001 |
| 0C0000F4 | 00010001 | 0C0000FC | 00010001 | 0C000104 | 00010001 | 0C00010C |
| 00010001 | 0C000110 | 00010001 | 0C000114 | C2D9C5C1 | F0F0F6F1* | |
| 02E3E7E3 | 4000011C | 40400004 | 40400001 | 00000200 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F6F2* | |
| 02E3E7E3 | 40000124 | 40400010 | 40400001 | 80000208 | 0000020C | 80000000 |
| 0000020C | 40404040 | 40404040 | 40404040 | 40404040 | 40404040 | 40404040 |
| 40404040 | 40404040 | 40404040 | 40404040 | C2D9C5C1 | F0F0F6F3* | |
| 02E3E7E3 | 4000013C | 40400004 | 40400001 | 000001CC | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F6F4* | |
| 02E3E7E3 | 40000144 | 40400008 | 40400001 | 000001D0 | 800001E8 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F6F5* | |
| 02D9D3C4 | 40404040 | 40400038 | 40404040 | 00010001 | 0C000118 | 00010001 |
| 0C00011C | 00010001 | 0C000124 | 00010001 | 0C000128 | 00010001 | 0C000130 |
| 00010001 | 0C00013C | 00010001 | 0C000144 | C2D9C5C1 | F0F0F6F6* | |
| 02E3E7E3 | 40000254 | 40400038 | 40400001 | 00000000 | 00000000 | 00000000 |
| 00000038 | 0000000C | 00000010 | 00000018 | 0000001C | 00000020 | 00000024 |

```
0000002C  00000000  00000000  00000000  C2D9C5C1  F0F0F6F7*
02E3E7E3  4000028C  40400020  40400001  0104000D  00000000  0000000E
00F8000F  00000000  0000000F  0140000F  0130000F  40404040  40404040
40404040  40404040  40404040  40404040  C2D9C5C1  F0F0F6F8*
02D9D3C4  40404040  40400008  40404040  00010001  0C000148  40404040
40404040  40404040  40404040  40404040  40404040  40404040  40404040
40404040  40404040  40404040  40404040  C2D9C5C1  F0F0F6F9*
02C5D5C4  40404040  40404040  40404040  40404040  40404040  40404040
0000089C  F1F5F7F3  F460C6D6  F34040F0  F2F0F2F8  F7F0F9F8  40F0F84B
F1F24BF4  F6404040  C2D9C5C1  D2404040  C2D9C5C1  F0F0F7F0**

MEMBER NAME  BREAK1
02C5E2C4  40404040  40400010  40400001  C2D9C5C1  D2F14040  00000000
40000000  40404040  40404040  40404040  40404040  40404040  40404040
40404040  40404040  40404040  40404040  C2D9C5C1  F0F0F0F1*
02E3E7E3  40000000  40400028  40400001  47F0F00C  07C2D9C5  C1D2F140
90ECD00C  184D98CD  F0205040  D00450D0  400807FC  40404040  40404040
40404040  40404040  40404040  40404040  C2D9C5C1  F0F0F0F2*
02C5E2C4  40404040  40400010  40400002  C5D3D4E3  C2D34040  05000000
400D7D28  40404040  40404040  40404040  40404040  40404040  40404040
40404040  40404040  40404040  40404040  C2D9C5C1  F0F0F0F3*
02E3E7E3  40000088  40400034  40400001  00000000  00000000  00000001
00000002  00000003  00000004  00000005  00000006  0000002C  00000038
41100000  00000000  00000000  40404040  C2D9C5C1  F0F0F0F4*
02C5E2C4  40404040  40400010  40400003  C2D9C5C1  D2F24040  02000000
40000000  40404040  40404040  40404040  40404040  40404040  40404040
40404040  40404040  40404040  40404040  C2D9C5C1  F0F0F0F5*
02E3E7E3  400000E8  4040000C  40400001  FFFFFFC8  000CD118  00000000
40404040  40404040  40404040  40404040  40404040  40404040  40404040
40404040  40404040  40404040  40404040  C2D9C5C1  F0F0F0F6*
02E3E7E3  400000F8  40400004  40400001  00000000  40404040  40404040
40404040  40404040  40404040  40404040  40404040  40404040  40404040
40404040  40404040  40404040  40404040  C2D9C5C1  F0F0F0F7*
02E3E7E3  40000120  40400038  40400001  58A0D0C8  5890D084  5880D068
5870D08C  5800D0F0  5000D0E4  5800D0F4  5000D0E8  5840D0EC  185858B0
D0D85804  A0001200  4780D1D0  58E0D0E4  C2D9C5C1  F0F0F0F8*
02E3E7E3  40000158  40400038  40400001  583EA000  58E0D0E8  586EA000
5030D094  58B0D0C0  18395C20  D0947800  D0647003  B0087823  B00C7020
D0B07823  B0107020  D0B458F0  D0D04110  C2D9C5C1  F0F0F0F9*
02E3E7E3  40000190  40400038  40400001  D04C05EF  5800D09C  8707D182
18395C20  D0947800  D0887003  B0085800  D09C8607  D1C01839  5C20D094
7823B014  7020D0B0  7823B018  7020D0B4  C2D9C5C1  F0F0F1F0**
02E3E7E3  400001C8  40400038  40400001  58F0D0D0  4110D04C  05EF5800
D09C8707  D1C01839  5C20D094  7800D088  7003B008  5820D094  1A285020
D0941926  47C0D144  58B0D0D8  1A585800  C2D9C5C1  F0F0F1F1*
02E3E7E3  40000200  40400038  40400001  D0E81A0B  5000D0E8  5800D0E4
1A0B5000  D0E41A4B  5950D0A8  47C0D122  1BFF58E0  D00007FE  58A0D004
58E0A00C  58B0A018  5810B004  5820D0A8  C2D9C5C1  F0F0F1F2*
02E3E7E3  40000238  40400038  40400001  50201000  18DA92FF  A00C982C
A01C07FE  58701004  58207000  5020D0A8  58201000  41302000  41500004
1B255C40  D0701B25  5020D0C8  5030D0CC  C2D9C5C1  F0F0F1F3*
02E3E7E3  40000270  40400008  40400001  5030D050  47F0D0F8  40404040
40404040  40404040  40404040  40404040  40404040  40404040  40404040
40404040  40404040  40404040  40404040  C2D9C5C1  F0F0F1F4*
02E3E7E3  40000020  4040000C  40400001  00000248  00000028  00000224
40404040  40404040  40404040  40404040  40404040  40404040  40404040
40404040  40404040  40404040  40404040  C2D9C5C1  F0F0F1F5*
02E3E7E3  40000074  40400004  40400001  000000D8  40404040  40404040
40404040  40404040  40404040  40404040  40404040  40404040  40404040
40404040  40404040  40404040  40404040  C2D9C5C1  F0F0F1F6*
02E3E7E3  4000007C  40400004  40400001  000000D0  40404040  40404040
```

```
40404040  40404040  40404040  40404040  40404040  40404040  40404040
40404040  40404040  40404040  40404040  C2D9C5C1  F0F0F1F7*
02D9D3C4  40404040  40400038  40404040  00020001  0C0000E8  00020001
0C0000EC  00030001  1C0000F8  00010001  0C000020  00010001  0C000024
00010001  0C000028  00010001  0C000074  C2D9C5C1  F0F0F1F8*
02E3E7E3  40000080  40400008  40400001  000000BC  800000C4  40404040
40404040  40404040  40404040  40404040  40404040  40404040  40404040
40404040  40404040  40404040  40404040  C2D9C5C1  F0F0F1F9*
02E3E7E3  400000FC  40400024  40400001  00000000  0000000C  00000008

MEMBER NAME  BREAK1
00000000  00000000  00000000  00000018  00000010  00000014  40404040
40404040  40404040  40404040  40404040  C2D9C5C1  F0F0F2F0**
02D9D3C4  40404040  40400018  40404040  00010001  0C00007C  00010001
0C000080  00010001  0C000084  40404040  40404040  40404040  40404040
40404040  40404040  40404040  40404040  C2D9C5C1  F0F0F2F1*
02C5D5C4  40404040  40404040  40404040  40404040  40404040  40404040
00000278  F1F5F7F3  F460C6D6  F34040F0  F2F0F2F8  F7F0F9F8  40F0F84B
F1F24BF5  F2404040  C2D9C5C1  D2F14040  C2D9C5C1  F0F0F2F2**

MEMBER NAME  BREAK2
02C5E2C4  40404040  40400010  40400001  C2D9C5C1  D2F24040  00000000
40000000  40404040  40404040  40404040  40404040  40404040  40404040
40404040  40404040  40404040  40404040  C2D9C5C1  F0F0F0F1*
02E3E7E3  40000000  40400038  40400001  47F0F00C  07C2D9C5  C1D2F240
90ECD00C  184D98CD  F0205040  D00450D0  400807FC  40404040  40404040
021A25C9  D4D7D9D6  D7C5D940  C5D3C5D4  C2D9C5C1  F0F0F0F2*
02E3E7E3  40000038  40400026  40400001  D5E340E3  E8D7C540  C6D6E4D5
C440C9D5  40C2D9C5  C1D2F240  10061A07  C5D3C5D4  C5D5E310  06224040
40404040  40404040  40404040  40404040  C2D9C5C1  F0F0F0F3*
02E3E7E3  40000100  40400038  40400001  00000000  00000000  4F080000
00000000  00000000  00000000  00000001  00000001  00000002  00000003
00000004  00000005  00000006  00000007  C2D9C5C1  F0F0F0F4*
02C5E2C4  40404040  40400010  40400002  C5D3D4E3  C2D34040  05000000
400D7D28  40404040  40404040  40404040  40404040  40404040  40404040
40404040  40404040  40404040  40404040  C2D9C5C1  F0F0F0F5*
02E3E7E3  40000138  4040001C  40400001  00000008  00000009  00000014
0000002C  00000038  00000000  00000000  40404040  40404040  40404040
40404040  40404040  40404040  40404040  C2D9C5C1  F0F0F0F6*
02C5E2C4  40404040  40400010  40400003  E2D7D3D7  E3E24040  05000000
40030D44  40404040  40404040  40404040  40404040  40404040  40404040
40404040  40404040  40404040  40404040  C2D9C5C1  F0F0F0F7*
02E3E7E3  400001A8  40400010  40400001  FFFFFFC8  000CD118  FFFFFFEC
00000000  40404040  40404040  40404040  40404040  40404040  40404040
40404040  40404040  40404040  40404040  C2D9C5C1  F0F0F0F8*
02C5E2C4  40404040  40400010  40400004  C9C2C3D6  D47B4040  02000000
40000000  40404040  40404040  40404040  40404040  40404040  40404040
40404040  40404040  40404040  40404040  C2D9C5C1  F0F0F0F9*
02E3E7E3  400001BC  40400004  40400001  00000000  40404040  40404040
40404040  40404040  40404040  40404040  40404040  40404040  40404040
40404040  40404040  40404040  40404040  C2D9C5C1  F0F0F1F0**
02C5E2C4  40404040  40400010  40400005  D7D9D6D1  C1D94040  02000000
40000000  40404040  40404040  40404040  40404040  40404040  40404040
40404040  40404040  40404040  40404040  C2D9C5C1  F0F0F1F1*
02C5E2C4  40404040  40400010  40400006  D7D9D6D1  D3D54040  02000000
40000000  40404040  40404040  40404040  40404040  40404040  40404040
40404040  40404040  40404040  40404040  C2D9C5C1  F0F0F1F2*
02C5E2C4  40404040  40400010  40400007  D7D9D6D1  E2D74040  02000000
40000000  40404040  40404040  40404040  40404040  40404040  40404040
40404040  40404040  40404040  40404040  C2D9C5C1  F0F0F1F3*
02E3E7E3  400001C4  40400010  40400001  00000000  00000000  00000000
```

```
00000000  40404040  40404040  40404040  40404040  40404040  40404040
40404040  40404040  40404040  40404040  C2D9C5C1  F0F0F1F4*
02E3E7E3  400001F4  40400038  40400001  5880D150  5800D0B0  5000D10C
5800D0BC  5000D0F8  5800D18C  5000D180  5800D190  5000D184  5800D0E0
5000D188  5890D0BC  58A0D17C  58B0D154  C2D9C5C1  F0F0F1F5*
02E3E7E3  4000022C  40400038  40400001  58E0D180  580EB000  12004780
D39C58E0  D184582E  B00058E0  D188580E  B0005000  D1245020  D0F458B0
D14858A0  D15C5890  D14C5800  D0F45900  C2D9C5C1  F0F0F1F6*
02E3E7E3  40000264  40400038  40400001  D1104780  D3885850  D0F45C40
D0E85050  D1742B00  7805B004  6A00D0A8  6000D0A0  5830D0A4  5030D114
5930D0BC  4780D27C  5930D0C0  4780D388  C2D9C5C1  F0F0F1F7*
02E3E7E3  4000029C  40400028  40400001  5930D0C4  4780D2BE  5930D0C8
4780D2EC  5930D0CC  4780D388  58F0D164  45E0F004  00000006  00000028
40404040  40404040  40404040  40404040  C2D9C5C1  F0F0F1F8*
02D9D3C4  40404040  40400038  40404040  00020001  0C0001A8  00020001
0C0001AC  00030001  0C0001B0  00040001  1C0001C4  00050001  1C0001C8
00060001  1C0001CC  00070001  1C0001D0  C2D9C5C1  F0F0F1F9*
02E3E7E3  400002C4  40400038  40400001  45E0F008  0450D114  45E0F008

MEMBER NAME  BREAK2
0450D0F4  45E0F010  47F0D388  58E0D174  780EB00C  7000D0FC  780EB010
7000D104  780EB014  7000D100  780EB018  C2D9C5C1  F0F0F2F0**
02E3E7E3  400002FC  40400038  40400001  7000D108  58F0D16C  4110D068
05EF41E0  000815FE  4720D2BA  58EFD04C  07FE47F0  D38858E0  D174410E
B0045000  D0809280  D08058F0  D1684110  C2D9C5C1  F0F0F2F1*
02E3E7E3  40000334  40400038  40400001  D07C05EF  41E00004  15FE4720
D2E858EF  D05807FE  47F0D388  58E0D174  2B00780E  B01C6A00  D0A86000
D0A05870  D0A458E0  D1742B00  780EB020  C2D9C5C1  F0F0F2F2*
02E3E7E3  4000036C  40400038  40400001  6A00D0A8  6000D0A0  5800D0A4
5000D11C  58E0D174  2B00780E  B0246A00  D0A86000  D0A05860  D0A41857
5C40D0E0  18365C20  D0E458E0  D174410E  C2D9C5C1  F0F0F2F3*
02E3E7E3  400003A4  40400038  40400001  B0045000  D0884105  80045000
D08C4103  90045000  D09458F0  D1704110  D08405EF  41E00004  15FE4720
D37458EF  D06007FE  47F0D388  5800D0B8  C2D9C5C1  F0F0F2F4*
02E3E7E3  400003DC  40400038  40400001  5000D10C  1BFF58E0  D00007FE
5820D0F4  5A20D0BC  5020D0F4  5920D124  47C0D1FE  58B0D154  58A0D17C
5890D0BC  5820D0F8  1A295020  D0F85800  C2D9C5C1  F0F0F2F5*
02E3E7E3  40000414  40400038  40400001  D1881A0A  5000D188  5800D184
1A0A5000  D1845800  D1801A0A  5000D180  5920D134  47C0D1CC  1BFF58E0
D00007FE  58A0D004  58E0A00C  58B0A018  C2D9C5C1  F0F0F2F6*
02E3E7E3  4000044C  40400038  40400001  5810B010  5820D10C  50201000
18DA92FF  A00C982C  A01C07FE  98791008  58207000  5020D134  58208000
5020D110  58209000  5020D10C  58201000  C2D9C5C1  F0F0F2F7*
02E3E7E3  40000484  40400038  40400001  41302000  41500004  1B255020
D15C5030  D1605030  D0685030  D07C5030  D0845820  10044130  20004150
00041B25  5C40D0C4  1B255020  D1545030  C2D9C5C1  F0F0F2F8*
02E3E7E3  400004BC  40400006  40400001  D15847F0  D1944040  40404040
40404040  40404040  40404040  40404040  40404040  40404040  40404040
40404040  40404040  40404040  40404040  C2D9C5C1  F0F0F2F9*
02E3E7E3  40000020  40400008  40400001  00000464  00000060  40404040
40404040  40404040  40404040  40404040  40404040  40404040  40404040
40404040  40404040  40404040  40404040  C2D9C5C1  F0F0F3F0**
02E3E7E3  40000060  40400004  40400001  00000440  40404040  40404040
40404040  40404040  40404040  40404040  40404040  40404040  40404040
40404040  40404040  40404040  40404040  C2D9C5C1  F0F0F3F1*
02E3E7E3  400000AC  40400010  40400001  0000031A  000003D8  0000031A
00000348  40404040  40404040  40404040  40404040  40404040  40404040
40404040  40404040  40404040  40404040  C2D9C5C1  F0F0F3F2*
02D9D3C4  40404040  40400038  40404040  00010001  0C0002C0  00010001
0C000020  00010001  0C000024  00010001  0C000060  00010001  0C0000AC
00010001  0C0000B0  00010001  0C0000B4  C2D9C5C1  F0F0F3F3*
```

02E3E7E3 400000BC 4040000C 40400001 000003D8 000003D4 000003D8
40404040 40404040 40404040 40404040 40404040 40404040 40404040
40404040 40404040 40404040 40404040 C2D9C5C1 F0F0F3F4*
02E3E7E3 400000CC 40400010 40400001 0000015C 00000164 00000160
80000168 40404040 40404040 40404040 40404040 40404040 40404040
40404040 40404040 40404040 40404040 C2D9C5C1 F0F0F3F5*
02D9D3C4 40404040 40400038 40404040 00010001 0C0000B8 00010001
0C0000BC 00010001 0C0000C0 00010001 0C0000C4 00010001 0C0000CC
00010001 0C0000D0 00010001 0C0000D4 C2D9C5C1 F0F0F3F6*
02E3E7E3 400000E0 40400004 40400001 80000000 40404040 40404040
40404040 40404040 40404040 40404040 40404040 40404040 40404040
40404040 40404040 40404040 40404040 C2D9C5C1 F0F0F3F7*
02E3E7E3 400000F0 40400004 40400001 0000017C 40404040 40404040
40404040 40404040 40404040 40404040 40404040 40404040 40404040
40404040 40404040 40404040 40404040 C2D9C5C1 F0F0F3F8*
02E3E7E3 400000F8 40400008 40400001 00000180 8000018C 40404040
40404040 40404040 40404040 40404040 40404040 40404040 40404040

MEMBER NAME BREAK2

40404040 40404040 40404040 40404040 C2D9C5C1 F0F0F3F9*
02E3E7E3 400001D4 40400020 40400001 00000000 00000000 0000000C
00000000 00000000 00000000 00000018 00000010 40404040 40404040
40404040 40404040 40404040 40404040 C2D9C5C1 F0F0F4F0**
02D9D3C4 40404040 40400020 40404040 00010001 0C0000D8 00010001
0C0000F0 00010001 0C0000F8 00010001 0C0000FC 40404040 40404040
40404040 40404040 40404040 40404040 C2D9C5C1 F0F0F4F1*
02C5D5C4 40404040 40404040 40404040 40404040 40404040 40404040
000004C2 F1F5F7F3 F460C6D6 F34040F0 F2F0F2F8 F7F0F9F8 40F0F84B
F1F24BF5 F6404040 C2D9C5C1 D2F24040 C2D9C5C1 F0F0F4F2**

MEMBER NAME BTXT

02C5E2C4 40404040 40400010 40400001 C2E3E7E3 40404040 00000000
40000000 40404040 40404040 40404040 40404040 40404040 40404040
40404040 40404040 40404040 40404040 C2E3E7E3 F0F0F0F1*
02E3E7E3 40000000 40400038 40400001 47F0F00C 07C2E3E7 E3404040
90ECD00C 184D98CD F0205040 D00450D0 400807FC 40404040 40404040
021A2F40 5C5C5C5C 5C4040C7 D9C1C9D5 C2E3E7E3 F0F0F0F2*
02E3E7E3 40000038 40400038 40400001 40E3C1C2 D3C540C8 C1E240D9
C5C1C3C8 C5C440C9 E3E240F1 F5F0F0F0 40D3C9D4 C9E32202 1A2E405C
5C5C5C5C 4040E2E3 C1C3D240 C1D9D9C1 C2E3E7E3 F0F0F0F3*
02E3E7E3 40000070 40400038 40400001 E840C8C1 E240D9C5 C1C3C8C5
C440C9E3 E240F3F0 F0F040D3 C9D4C9E3 22021A2C 405C5C5C 5C5C4040
C4C1E2C8 40C1D9D9 C1E840C8 C1E240D9 C2E3E7E3 F0F0F0F4*
02E3E7E3 400000A8 40400038 40400001 C5C1C3C8 C5C440C9 E3E240F1
F0F040D3 C9D4C9E3 22021A2E 405C5C5C 5C5C4040 E2C5D8E4 40C1D9D9
C1E840C8 C1E240D9 C5C1C3C8 C5C440C9 C2E3E7E3 F0F0F0F5*
02E3E7E3 400000E0 40400038 40400001 E3E240F1 F5F0F0F0 40D3C9D4
C9E32202 1A2F405C 5C5C5C5C 4040D7D3 D4C1E340 C1D9D9C1 E840C8C1
E240D9C5 C1C3C8C5 C440C9E3 E240F1F5 C2E3E7E3 F0F0F0F6*
02E3E7E3 40000118 40400038 40400001 F0F0F040 D3C9D4C9 E322021A
2C40C5D9 D9D6D97A 40C9D540 C2C3E2D3 C9C240D9 D6E4E3C9 D5C540C9
D540C2E3 E7E340E2 E4C2D9D6 E4E3C9D5 C2E3E7E3 F0F0F0F7*
02E3E7E3 40000150 40400002 40400001 C5224040 40404040 40404040
40404040 40404040 40404040 40404040 40404040 40404040 40404040
40404040 40404040 40404040 40404040 C2E3E7E3 F0F0F0F8*
02E3E7E3 40000158 40400038 40400001 F9404040 40404040 F0404040
40404040 E2404040 40404040 F9404040 40404040 F0404040 40404040
E2404040 40404040 C5404040 40404040 C2E3E7E3 F0F0F0F9*
02E3E7E3 40000190 40400038 40400001 D7C1C7C5 40404040 D6D7D7D6
E2C9E3C5 60404040 40404040 60404040 40404040 D7D3E8E3 C1C2D3C5
D3404040 40404040 F9404040 40404040 C2E3E7E3 F0F0F1F0**

```
02E3E7E3  400001C8  40400018  40400001  F0404040  40404040  D3404040
40404040  40404040  40404040  40404040  40404040  40404040  40404040
40404040  40404040  40404040  40404040  C2E3E7E3  F0F0F1F1*
02E3E7E3  40000488  40400038  40400001  4E000000  00000000  4E000000
80000000  00000000  00000000  00000001  00000002  00000003  00000004
00000005  00000008  00000009  0000000C  C2E3E7E3  F0F0F1F2*
02C5E2C4  40404040  40400010  40400002  D7E3C1C2  D3C54040  05000000
40125768  40404040  40404040  40404040  40404040  40404040  40404040
40404040  40404040  40404040  40404040  C2E3E7E3  F0F0F1F3*
02E3E7E3  400004C0  40400024  40400001  00000014  00000018  00000058
00000064  00000100  00000BB8  00003A98  00000000  00000000  40404040
40404040  40404040  40404040  40404040  C2E3E7E3  F0F0F1F4*
02C5E2C4  40404040  40400010  40400003  E2E3C1C3  D2404040  05000000
40040744  40404040  40404040  40404040  40404040  40404040  40404040
40404040  40404040  40404040  40404040  C2E3E7E3  F0F0F1F5*
02C5E2C4  40404040  40400010  40400004  D6D7E3C9  D6D54040  05000000
40000020  40404040  40404040  40404040  40404040  40404040  40404040
40404040  40404040  40404040  40404040  C2E3E7E3  F0F0F1F6*
02C5E2C4  40404040  40400010  40400005  C6D3E340  40404040  02000000
40000000  40404040  40404040  40404040  40404040  40404040  40404040
40404040  40404040  40404040  40404040  C2E3E7E3  F0F0F1F7*
02E3E7E3  40000CC0  40400020  40400001  FFFFFFEC  00058600  000B0444
00108298  FFFFFFA8  00000000  00000000  00000000  40404040  40404040
40404040  40404040  40404040  40404040  C2E3E7E3  F0F0F1F8*
02C5E2C4  40404040  40400010  40400006  C9E2D9C3  C8404040  02000000
40000000  40404040  40404040  40404040  40404040  40404040  40404040
40404040  40404040  40404040  40404040  C2E3E7E3  F0F0F1F9*
02E3E7E3  40000CE4  40400004  40400001  00000000  40404040  40404040

MEMBER NAME  BTXT
40404040  40404040  40404040  40404040  40404040  40404040  40404040
40404040  40404040  40404040  40404040  C2E3E7E3  F0F0F2F0**
02E3E7E3  40000CEC  40400004  40400001  00000000  40404040  40404040
40404040  40404040  40404040  40404040  40404040  40404040  40404040
40404040  40404040  40404040  40404040  C2E3E7E3  F0F0F2F1*
02D9D3C4  40404040  40400038  40404040  00020001  0C000CC0  00020001
0C000CC4  00020001  0C000CC8  00020001  0C000CCC  00030001  0C000CD0
00040001  0C000CD4  00050001  1C000CD8  C2E3E7E3  F0F0F2F2*
02C5E2C4  40404040  40400010  40400007  D4E5C3C8  D9404040  02000000
40000000  40404040  40404040  40404040  40404040  40404040  40404040
40404040  40404040  40404040  40404040  C2E3E7E3  F0F0F2F3*
02C5E2C4  40404040  40400010  40400008  C3D4D7D9  E2E24040  02000000
40000000  40404040  40404040  40404040  40404040  40404040  40404040
40404040  40404040  40404040  40404040  C2E3E7E3  F0F0F2F4*
02C5E2C4  40404040  40400010  40400009  C9C2C3D6  D47B4040  02000000
40000000  40404040  40404040  40404040  40404040  40404040  40404040
40404040  40404040  40404040  40404040  C2E3E7E3  F0F0F2F5*
02C5E2C4  40404040  40400010  4040000A  C9E2D9C3  C8E54040  02000000
40000000  40404040  40404040  40404040  40404040  40404040  40404040
40404040  40404040  40404040  40404040  C2E3E7E3  F0F0F2F6*
02C5E2C4  40404040  40400010  4040000B  D2D6D4D7  D9E54040  02000000
40000000  40404040  40404040  40404040  40404040  40404040  40404040
40404040  40404040  40404040  40404040  C2E3E7E3  F0F0F2F7*
02C5E2C4  40404040  40400010  4040000C  E2D7D3E3  E7E34040  02000000
40000000  40404040  40404040  40404040  40404040  40404040  40404040
40404040  40404040  40404040  40404040  C2E3E7E3  F0F0F2F8*
02E3E7E3  40000CF0  40400018  40400001  00000000  00000000  00000000
00000000  00000000  00000000  40404040  40404040  40404040  40404040
40404040  40404040  40404040  40404040  C2E3E7E3  F0F0F2F9*
02E3E7E3  400004E4  40400002  40400001  DB5A4040  40404040  40404040
40404040  40404040  40404040  40404040  40404040  40404040  40404040
```

```
40404040  40404040  40404040  40404040  C2E3E7E3  F0F0F3F0**
02E3E7E3  40000C5C  40400038  40400001  00000000  00000000  00000000
00000000  00000000  00000000  00000000  00000000  00000000  00000000
00000000  00000000  00000000  00000000  C2E3E7E3  F0F0F3F1*
02E3E7E3  40000C94  40400020  40400001  00000000  00000000  00000000
00000000  00000000  00000000  00000000  00000000  40404040  40404040
40404040  40404040  40404040  40404040  C2E3E7E3  F0F0F3F2*
02E3E7E3  40000D10  40400038  40400001  5840DAE0  5870DAFC  5890DAEC
58A0DAE8  58B0DAE4  5850D2F4  58F0DAF4  5800F00C  1BFF860F  DB5E1BFF
58E0D000  07FE58F0  DB144110  D0C405EF  C2E3E7E3  F0F0F3F3*
02E3E7E3  40000D48  40400038  40400001  41E00004  15FE4720  DB7858EF
D04C07FE  5820D320  5A20D2C0  5020D318  5920D2F0  4730DBC2  58A0D2F0
18B2410B  D33B5000  D0D858F0  DB104110  C2E3E7E3  F0F0F3F4*
02E3E7E3  40000D80  40400038  40400001  D0D405EF  5AB0D2C0  19BA47C0
DB9258A0  DAE858B0  DAE447F0  DBC21BFF  58E0D000  07FE58F0  DB0C4110
D0E005EF  41E00004  15FE4720  DBDC58EF  C2E3E7E3  F0F0F3F5*
02E3E7E3  40000DB8  40400038  40400001  D05407FE  58F0DB0C  4110D0F4
05EF41E0  000415FE  4720DBF6  58EFD05C  07FE5800  D3101200  4770DC0A
5800D30C  12004780  DCB05800  D3205B00  C2E3E7E3  F0F0F3F6*
02E3E7E3  40000DF0  40400034  40400001  D2C05000  D31C58F0  DAF84110
D10805EF  5820B018  5A20D2C0  5020B018  5920D2F8  47C0DC56  58F0DB18
45E0F004  00000006  00000028  40404040  C2E3E7E3  F0F0F3F7*
02D9D3C4  40404040  40400038  40404040  00060001  1C000CEC  00070001
1C000CF0  00080001  1C000CF4  00090001  1C000CF8  000A0001  1C000CFC
000B0001  1C000D00  000C0001  1C000D04  C2E3E7E3  F0F0F3F8*
02E3E7E3  40000E24  40400038  40400001  45E0F010  58F0DB18  45E0F034
05404040  F4F45830  B0185C20  D2E44103  B0045000  D11858F0  DB104110

MEMBER NAME  BTXT
D11405EF  58009008  5700D2B4  5000D2AC  C2E3E7E3  F0F0F3F9*
02E3E7E3  40000E5C  40400038  40400001  6820D2A8  6B20D2B0  5830B018
5C20D2E4  7023B004  7800D324  7003B008  78207004  7023B00C  78207008
7023B010  1BFF58E0  D00007FE  58F0DB0C  C2E3E7E3  F0F0F4F0**
02E3E7E3  40000E94  40400038  40400001  4110D120  05EF41E0  000415FE
4720DCCA  58EFD064  07FE5800  D3101200  4780DF70  5820D310  5A20D2C0
5020D310  4102D33B  5000D134  58F0DB20  C2E3E7E3  F0F0F4F1*
02E3E7E3  40000ECC  40400038  40400001  4110D134  05EF41E0  000415FE
4720DD02  58EFD06C  07FE4102  D33B5000  D14C58F0  DB204110  D14C05EF
41E00004  15FE4720  DD2458EF  D07407FE  C2E3E7E3  F0F0F4F2*
02E3E7E3  40000F04  40400038  40400001  5800D334  12004750  DE085800
D3381200  4730DE08  58F0DB24  4110D164  05EF5820  D32C8920  00025860
D2C05880  D2CC58A0  D2CC18B2  5890DAF0  C2E3E7E3  F0F0F4F3*
02E3E7E3  40000F3C  40400038  40400001  58209058  1A265020  90581925
47C0DD9A  5890DAEC  58A0DAE8  58B0DAE4  58F0DB18  45E0F004  00000006
0000005B  45E0F010  58F0DB18  45E0F034  C2E3E7E3  F0F0F4F4*
02E3E7E3  40000F74  40400038  40400001  05404040  F4F45830  90585C20
D2E84103  90045000  D17C58F0  DB104110  D17805EF  58F0DAEC  5800F008
5700D2B4  5000D2AC  6820D2A8  6B20D2B0  C2E3E7E3  F0F0F4F5*
02E3E7E3  40000FAC  40400038  40400001  58309058  5C20D2E8  70239004
7828D438  70239010  78207004  70239020  78207008  70239024  878ADD5C
5890DAEC  58A0DAE8  58B0DAE4  1BFF58E0  C2E3E7E3  F0F0F4F6*
02E3E7E3  40000FE4  40400038  40400001  D00007FE  58F0DB1C  4110D184
05EF41E0  000415FE  4720DE22  58EFD07C  07FE5800  D3101200  4770DE34
1BFF58E0  D00007FE  58F0DB0C  4110D19C  C2E3E7E3  F0F0F4F7*
02E3E7E3  4000101C  40400038  40400001  05EF41E0  000415FE  4720DE4E
58EFD084  07FE5800  D3101200  4770DE60  1BFF58E0  D00007FE  58F0DB24
4110D1B0  05EF58F0  DB1C4110  D1C405EF  C2E3E7E3  F0F0F4F8*
02E3E7E3  40001054  40400038  40400001  41E00004  15FE4720  DE8458EF
D08C07FE  5800D310  12004780  DE987820  D43C3302  7000D43C  58F0DB1C
4110D1DC  05EF41E0  000415FE  4720DEB2  C2E3E7E3  F0F0F4F9*
02E3E7E3  4000108C  40400038  40400001  58EFD094  07FE7800  D43C7000
```

```
D3287800  D2BC7000  D43C5800  D3101200  4780DED6  58F0DB24  4110D1F4
05EF5820  40145A20  D2C05020  40145920  C2E3E7E3  F0F0F5F0**
02E3E7E3  400010C4  40400038  40400001  D2EC47C0  DF0E58F0  DB181800
45E0F004  00000006  0000008D  45E0F010  58F0DB18  45E0F034  05404040
F4F45830  40145C20  D2E04103  40045000  C2E3E7E3  F0F0F5F1*
02E3E7E3  400010FC  40400038  40400001  D20C58F0  DB104110  D20805EF
58009008  5700D2B4  5000D2AC  6820D2A8  6B20D2B0  58304014  5C20D2E0
70234004  7800D328  70034008  78207004  C2E3E7E3  F0F0F5F2*
02E3E7E3  40001134  40400038  40400001  7023400C  78207008  70234010
7820D43C  70234014  1BFF58E0  D00007FE  58F0DB0C  4110D214  05EF41E0
000415FE  4720DF8A  58EFD09C  07FE5800  C2E3E7E3  F0F0F5F3*
02E3E7E3  4000116C  40400038  40400001  D3101200  4780C09C  5820D310
5A20D2C0  5020D310  4102D33B  5000D228  58F0DB20  4110D228  05EF41E0
000415FE  4720DFC2  58EFD0A4  07FE4102  C2E3E7E3  F0F0F5F4*
02E3E7E3  400011A4  40400038  40400001  D33B5000  D24058F0  DB204110
D24005EF  41E00004  15FE4720  DFE458EF  D0AC07FE  5800D334  12004750
DFF85800  D3381200  47C0C000  1BFF58E0  C2E3E7E3  F0F0F5F5*
02E3E7E3  400011DC  40400038  40400001  D00007FE  58F0DB24  4110D258
05EF5820  47E85A20  D2C05020  47E85920  D2F847C0  C04258F0  DB181800
45E0F004  00000006  000000BD  45E0F010  C2E3E7E3  F0F0F5F6*
02E3E7E3  40001214  40400038  40400001  58F0DB18  45E0F034  05404040
F4F45830  47E85C20  D2E44103  47D45000  D11858F0  DB104110  D11405EF
58009008  5700D2B4  5000D2AC  6820D2A8  C2E3E7E3  F0F0F5F7*
02E3E7E3  4000124C  40400038  40400001  6B20D2B0  583047E8  5C20D2E4
702347D4  7820D43C  702347D8  78207004  702347DC  78207008  702347E0
1BFF58E0  D00007FE  5800D320  5900D2CC  C2E3E7E3  F0F0F5F8*

MEMBER NAME  BTXT
02E3E7E3  40001284  40400038  40400001  4780C0B0  1BFF58E0  D00007FE
58A0D320  58B0D2C0  410BD33B  5000D26C  58F0DB20  4110D26C  05EF41E0
000415FE  4720C0DA  58EFD0B4  07FE410B  C2E3E7E3  F0F0F5F9*
02E3E7E3  400012BC  40400038  40400001  D33B5000  D28458F0  DB204110
D28405EF  41E00004  15FE4720  C0FC58EF  D0BC07FE  5800D334  120047A0
C10A47F0  C1145800  D3381200  47C0C124  C2E3E7E3  F0F0F6F0**
02E3E7E3  400012F4  40400038  40400001  58A0DAE8  58B0DAE4  1BFF58E0
D00007FE  5AB0D2C0  19BA47C0  C0B858A0  DAE858B0  DAE458F0  DAF84110
D29C05EF  5820A018  5A20D2C0  5020A018  C2E3E7E3  F0F0F6F1*
02E3E7E3  4000132C  40400038  40400001  5920D2F8  47C0C176  58F0DB18
45E0F004  00000006  000000EF  45E0F010  58F0DB18  45E0F034  05404040
F4F45830  A0185C20  D2E44103  A0045000  C2E3E7E3  F0F0F6F2*
02E3E7E3  40001364  40400038  40400001  D11858F0  DB104110  D11405EF
58009008  5700D2B4  5000D2AC  6820D2A8  6B20D2B0  5830A018  5C20D2E4
7023A004  7800D324  7003A008  78207004  C2E3E7E3  F0F0F6F3*
02E3E7E3  4000139C  40400038  40400001  7023A00C  78207008  7023A010
1BFF58E0  D00007FE  58A0DAE8  58B0DAE4  58F0DB18  45E0F004  00000006
00000122  45E0F010  1BFF58E0  D00007FE  C2E3E7E3  F0F0F6F4*
02E3E7E3  400013D4  40400038  40400001  58A0D004  58E0A00C  58B0A018
5810B004  5820D330  50201000  18DA92FF  A00C982C  A01C07FE  58C0D048
98781004  58207000  5020D330  58201000  C2E3E7E3  F0F0F6F5*
02E3E7E3  4000140C  40400030  40400001  41302000  41500001  1B255020
DB045030  DB085030  D0C45820  10084130  20004150  00041B25  5020DAFC
5030DB00  47F0DB30  40404040  40404040  C2E3E7E3  F0F0F6F6*
02E3E7E3  40000020  40400008  40400001  000013F8  000001E0  40404040
40404040  40404040  40404040  40404040  40404040  40404040  40404040
40404040  40404040  40404040  40404040  C2E3E7E3  F0F0F6F7*
02D9D3C4  40404040  40400038  40404040  00010001  0C000E20  00010001
0C000F64  00010001  0C0010D8  00010001  0C00120C  00010001  0C001340
00010001  0C0013C4  00010001  0C000020  C2E3E7E3  F0F0F6F8*
02E3E7E3  400001E0  40400004  40400001  000013D4  40404040  40404040
40404040  40404040  40404040  40404040  40404040  40404040  40404040
40404040  40404040  40404040  40404040  C2E3E7E3  F0F0F6F9*
```

```
02E3E7E3  40000228  40400018  40400001  000011E0  00000D58  00000D9A
00000DBC  000013A8  00000DD6  40404040  40404040  40404040  40404040
40404040  40404040  40404040  40404040  C2E3E7E3  F0F0F7F0**
02D9D3C4  40404040  40400038  40404040  00010001  0C000024  00010001
0C0001E0  00010001  0C000228  00010001  0C00022C  00010001  0C000230
00010001  0C000234  00010001  0C000238  C2E3E7E3  F0F0F7F1*
02E3E7E3  40000240  4040001C  40400001  000013A8  00000EAA  000013A8
00000EE2  000013B0  00000F04  000013B0  40404040  40404040  40404040
40404040  40404040  40404040  40404040  C2E3E7E3  F0F0F7F2*
02D9D3C4  40404040  40400038  40404040  00010001  0C00023C  00010001
0C000240  00010001  0C000244  00010001  0C000248  00010001  0C00024C
00010001  0C000250  00010001  0C000254  C2E3E7E3  F0F0F7F3*
02E3E7E3  4000025C  4040001C  40400001  00001002  000013A8  0000102E
000013A8  00001064  000013A8  00001092  40404040  40404040  40404040
40404040  40404040  40404040  40404040  C2E3E7E3  F0F0F7F4*
02D9D3C4  40404040  40400038  40404040  00010001  0C000258  00010001
0C00025C  00010001  0C000260  00010001  0C000264  00010001  0C000268
00010001  0C00026C  00010001  0C000270  C2E3E7E3  F0F0F7F5*
02E3E7E3  40000278  4040001C  40400001  000013A8  0000116A  000013A8
000011A2  000013B0  000011C4  000013B0  40404040  40404040  40404040
40404040  40404040  40404040  40404040  C2E3E7E3  F0F0F7F6*
02D9D3C4  40404040  40400038  40404040  00010001  0C000274  00010001
0C000278  00010001  0C00027C  00010001  0C000280  00010001  0C000284
00010001  0C000288  00010001  0C00028C  C2E3E7E3  F0F0F7F7*
02E3E7E3  40000294  40400010  40400001  000012BA  000013B0  000012DC
```

MEMBER NAME BTXT

```
000013B0  40404040  40404040  40404040  40404040  40404040  40404040
40404040  40404040  40404040  40404040  C2E3E7E3  F0F0F7F8*
02E3E7E3  400002A8  4040000C  40400001  00000510  0000051C  80000500
40404040  40404040  40404040  40404040  40404040  40404040  40404040
40404040  40404040  40404040  40404040  C2E3E7E3  F0F0F7F9*
02D9D3C4  40404040  40400038  40404040  00010001  0C000290  00010001
0C000294  00010001  0C000298  00010001  0C00029C  00010001  0C0002A0
00010001  0C0002A8  00010001  0C0002AC  C2E3E7E3  F0F0F8F0**
02E3E7E3  400002B4  40400004  40400001  000004A0  40404040  40404040
40404040  40404040  40404040  40404040  40404040  40404040  40404040
40404040  40404040  40404040  40404040  C2E3E7E3  F0F0F8F1*
02E3E7E3  400002BC  40400018  40400001  800001D8  0000051C  000004A0
00000500  000004E4  800004F0  40404040  40404040  40404040  40404040
40404040  40404040  40404040  40404040  C2E3E7E3  F0F0F8F2*
02D9D3C4  40404040  40400038  40404040  00010001  0C0002B0  00010001
0C0002B4  00010001  0C0002BC  00010001  0C0002C0  00010001  0C0002C4
00010001  0C0002C8  00010001  0C0002CC  C2E3E7E3  F0F0F8F3*
02E3E7E3  400002D4  4040001C  40400001  0000051C  000004A0  00000500
000004E5  800004EC  0000051C  000004FC  40404040  40404040  40404040
40404040  40404040  40404040  40404040  C2E3E7E3  F0F0F8F4*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  C2E3E7E3  F0F0F8F5*
02E3E7E3  400002F0  40400008  40400001  80000504  000004C4  40404040
40404040  40404040  40404040  40404040  40404040  40404040  40404040
40404040  40404040  40404040  40404040  C2E3E7E3  F0F0F8F6*
02E3E7E3  400002FC  40400014  40400001  80000C5C  0000051C  000004A0
00000500  000001D0  40404040  40404040  40404040  40404040  40404040
40404040  40404040  40404040  40404040  C2E3E7E3  F0F0F8F7*
02D9D3C4  40404040  40400038  40404040  00010001  0C0002EC  00010001
0C0002F0  00010001  0C0002F4  00010001  0C0002FC  00010001  0C000300
00010001  0C000304  00010001  0C000308  C2E3E7E3  F0F0F8F8*
02E3E7E3  40000310  40400004  40400001  800004F0  40404040  40404040
40404040  40404040  40404040  40404040  40404040  40404040  40404040
```

```
40404040  40404040  40404040  40404040  C2E3E7E3  F0F0F8F9*
02E3E7E3  40000318  40400014  40400001  000004A0  000001C8  000004A0
000004A0  80000514  40404040  40404040  40404040  40404040  40404040
40404040  40404040  40404040  40404040  C2E3E7E3  F0F0F9F0**
02E3E7E3  40000330  40400004  40400001  000004A0  40404040  40404040
40404040  40404040  40404040  40404040  40404040  40404040  40404040
40404040  40404040  40404040  40404040  C2E3E7E3  F0F0F9F1*
02D9D3C4  40404040  40400038  40404040  00010001  0C00030C  00010001
0C000310  00010001  0C000318  00010001  0C00031C  00010001  0C000320
00010001  0C000324  00010001  0C000328  C2E3E7E3  F0F0F9F2*
02E3E7E3  40000334  4040001C  40400001  000001C0  000004A0  000004A0
80000518  0000051C  00000500  000001B8  40404040  40404040  40404040
40404040  40404040  40404040  40404040  C2E3E7E3  F0F0F9F3*
02D9D3C4  40404040  40400038  40404040  00010001  0C000330  00010001
0C000334  00010001  0C000338  00010001  0C00033C  00010001  0C000340
00010001  0C000344  00010001  0C000348  C2E3E7E3  F0F0F9F4*
02E3E7E3  40000350  4040000C  40400001  0000061C  8000050C  000004C8
40404040  40404040  40404040  40404040  40404040  40404040  40404040
40404040  40404040  40404040  40404040  C2E3E7E3  F0F0F9F5*
02E3E7E3  40000360  40400010  40400001  80000C5C  0000051C  000004A0
000001B0  40404040  40404040  40404040  40404040  40404040  40404040
40404040  40404040  40404040  40404040  C2E3E7E3  F0F0F9F6*
02D9D3C4  40404040  40400038  40404040  00010001  0C00034C  00010001
0C000350  00010001  0C000354  00010001  0C000358  00010001  0C000360

MEMBER NAME  BTXT
00010001  0C000364  00010001  0C000368  C2E3E7E3  F0F0F9F7*
02E3E7E3  40000370  4040001C  40400001  00000500  000004B4  800004F0
0000051C  000004A0  00000500  000001A8  40404040  40404040  40404040
40404040  40404040  40404040  40404040  C2E3E7E3  F0F0F9F8*
02D9D3C4  40404040  40400038  40404040  00010001  0C00036C  00010001
0C000370  00010001  0C000374  00010001  0C000378  00010001  0C00037C
00010001  0C000380  00010001  0C000384  C2E3E7E3  F0F0F9F9*
02E3E7E3  4000038C  4040001C  40400001  800004F0  0000051C  00000500
000001A0  0000061C  8000050C  0000051C  40404040  40404040  40404040
40404040  40404040  40404040  40404040  C2E3E7E3  F0F1F0F0**
02D9D3C4  40404040  40400038  40404040  00010001  0C000388  00010001
0C00038C  00010001  0C000390  00010001  0C000394  00010001  0C000398
00010001  0C00039C  00010001  0C0003A0  C2E3E7E3  F0F1F0F1*
02E3E7E3  400003A8  4040001C  40400001  000004A0  00000198  00000500
000004B4  800004F0  0000051C  000004A0  40404040  40404040  40404040
40404040  40404040  40404040  40404040  C2E3E7E3  F0F1F0F2*
02D9D3C4  40404040  40400038  40404040  00010001  0C0003A4  00010001
0C0003A8  00010001  0C0003AC  00010001  0C0003B0  00010001  0C0003B4
00010001  0C0003B8  00010001  0C0003BC  C2E3E7E3  F0F1F0F3*
02E3E7E3  400003C4  4040001C  40400001  00000190  00000500  000004AC
800004F0  0000051C  00000500  00000188  40404040  40404040  40404040
40404040  40404040  40404040  40404040  C2E3E7E3  F0F1F0F4*
02D9D3C4  40404040  40400038  40404040  00010001  0C0003C0  00010001
0C0003C4  00010001  0C0003C8  00010001  0C0003CC  00010001  0C0003D0
00010001  0C0003D4  00010001  0C0003D8  C2E3E7E3  F0F1F0F5*
02E3E7E3  400003E0  4040000C  40400001  0000061C  8000050C  000004C0
40404040  40404040  40404040  40404040  40404040  40404040  40404040
40404040  40404040  40404040  40404040  C2E3E7E3  F0F1F0F6*
02E3E7E3  400003F0  40400010  40400001  80000C5C  0000051C  000004A0
00000500  40404040  40404040  40404040  40404040  40404040  40404040
40404040  40404040  40404040  40404040  C2E3E7E3  F0F1F0F7*
02D9D3C4  40404040  40400038  40404040  00010001  0C0003DC  00010001
0C0003E0  00010001  0C0003E4  00010001  0C0003E8  00010001  0C0003F0
00010001  0C0003F4  00010001  0C0003F8  C2E3E7E3  F0F1F0F8*
02E3E7E3  40000400  40400008  40400001  00000180  800004F0  40404040
```

```
40404040  40404040  40404040  40404040  40404040  40404040  40404040
40404040  40404040  40404040  40404040  C2E3E7E3  F0F1F0F9*
02E3E7E3  4000040C  40400014  40400001  000004A0  00000178  000004A0
000004A0  80000514  40404040  40404040  40404040  40404040  40404040
40404040  40404040  40404040  40404040  C2E3E7E3  F0F1F1F0**
02D9D3C4  40404040  40400038  40404040  00010001  0C0003FC  00010001
0C000400  00010001  0C000404  00010001  0C00040C  00010001  0C000410
00010001  0C000414  00010001  0C000418  C2E3E7E3  F0F1F1F1*
02E3E7E3  40000424  4040001C  40400001  000004A0  00000170  000004A0
000004A0  80000518  0000051C  00000500  40404040  40404040  40404040
40404040  40404040  40404040  40404040  C2E3E7E3  F0F1F1F2*
02D9D3C4  40404040  40400038  40404040  00010001  0C00041C  00010001
0C000424  00010001  0C000428  00010001  0C00042C  00010001  0C000430
00010001  0C000434  00010001  0C000438  C2E3E7E3  F0F1F1F3*
02E3E7E3  40000440  4040000C  40400001  00000168  0000061C  8000050C
40404040  40404040  40404040  40404040  40404040  40404040  40404040
40404040  40404040  40404040  40404040  C2E3E7E3  F0F1F1F4*
02E3E7E3  40000450  40400010  40400001  000004A0  00000160  000004A0
000004A0  40404040  40404040  40404040  40404040  40404040  40404040
40404040  40404040  40404040  40404040  C2E3E7E3  F0F1F1F5*
02D9D3C4  40404040  40400038  40404040  00010001  0C00043C  00010001
0C000440  00010001  0C000444  00010001  0C000448  00010001  0C000450
00010001  0C000454  00010001  0C000458  C2E3E7E3  F0F1F1F6*

MEMBER NAME  BTXT
02E3E7E3  40000460  40400004  40400001  80000514  40404040  40404040
40404040  40404040  40404040  40404040  40404040  40404040  40404040
40404040  40404040  40404040  40404040  C2E3E7E3  F0F1F1F7*
02E3E7E3  40000468  40400018  40400001  000004A0  00000158  000004A0
000004A0  80000518  0000051C  40404040  40404040  40404040  40404040
40404040  40404040  40404040  40404040  C2E3E7E3  F0F1F1F8*
02D9D3C4  40404040  40400038  40404040  00010001  0C00045C  00010001
0C000460  00010001  0C000468  00010001  0C00046C  00010001  0C000470
00010001  0C000474  00010001  0C000478  C2E3E7E3  F0F1F1F9*
02E3E7E3  40000480  40400008  40400001  00000500  80000504  40404040
40404040  40404040  40404040  40404040  40404040  40404040  40404040
40404040  40404040  40404040  40404040  C2E3E7E3  F0F1F2F0**
02E3E7E3  40000D08  40400008  40400001  00000000  00000000  40404040
40404040  40404040  40404040  40404040  40404040  40404040  40404040
40404040  40404040  40404040  40404040  C2E3E7E3  F0F1F2F1*
02D9D3C4  40404040  40400018  40404040  00010001  0C00047C  00010001
0C000480  00010001  0C000484  40404040  40404040  40404040  40404040
40404040  40404040  40404040  40404040  C2E3E7E3  F0F1F2F2*
02C5D5C4  40404040  40404040  40404040  40404040  40404040  40404040
0000143C  F1F5F7F3  F460C6D6  F34040F0  F2F0F2F8  F7F0F9F8  40F0F84B
F1F34BF0  F0404040  C2E3E7E3  40404040  C2E3E7E3  F0F1F2F3**

MEMBER NAME  BUILD1
02C5E2C4  40404040  40400010  40400001  C2E4C9D3  C4F14040  00000000
40000000  40404040  40404040  40404040  40404040  40404040  40404040
40404040  40404040  40404040  40404040  C2E4C9D3  F0F0F0F1*
02E3E7E3  40000000  40400028  40400001  47F0F00C  07C2E4C9  D3C4F140
90ECD00C  184D98CD  F0205040  D00450D0  400807FC  40404040  40404040
40404040  40404040  40404040  40404040  C2E4C9D3  F0F0F0F2*
02E3E7E3  40000090  40400038  40400001  00000000  00000000  4E000000
00000000  4F080000  00000000  4E000000  80000000  00000000  00000001
00000002  00000003  00000004  00000005  C2E4C9D3  F0F0F0F3*
02E3E7E3  400000C8  4040002C  40400001  00000009  0000000A  0000000B
0000000D  0000000E  0000002C  00000038  41100000  41400000  00000000
00000000  40404040  40404040  40404040  C2E4C9D3  F0F0F0F4*
02E3E7E3  40000148  40400004  40400001  00000000  40404040  40404040
```

```
40404040  40404040  40404040  40404040  40404040  40404040  40404040
40404040  40404040  40404040  40404040  C2E4C9D3  F0F0F0F5*
02C5E2C4  40404040  40400010  40400002  D4E5C3C8  D9404040  02000000
40000000  40404040  40404040  40404040  40404040  40404040  40404040
40404040  40404040  40404040  40404040  C2E4C9D3  F0F0F0F6*
02E3E7E3  40000150  40400004  40400001  00000000  40404040  40404040
40404040  40404040  40404040  40404040  40404040  40404040  40404040
40404040  40404040  40404040  40404040  C2E4C9D3  F0F0F0F7*
02E3E7E3  40000158  40400008  40400001  00000000  00000000  40404040
40404040  40404040  40404040  40404040  40404040  40404040  40404040
40404040  40404040  40404040  40404040  C2E4C9D3  F0F0F0F8*
02E3E7E3  40000164  40400004  40400001  00000000  40404040  40404040
40404040  40404040  40404040  40404040  40404040  40404040  40404040
40404040  40404040  40404040  40404040  C2E4C9D3  F0F0F0F9*
02E3E7E3  4000016C  40400004  40400001  00000000  40404040  40404040
40404040  40404040  40404040  40404040  40404040  40404040  40404040
40404040  40404040  40404040  40404040  C2E4C9D3  F0F0F1F0**
02E3E7E3  40000174  40400004  40400001  00000000  40404040  40404040
40404040  40404040  40404040  40404040  40404040  40404040  40404040
40404040  40404040  40404040  40404040  C2E4C9D3  F0F0F1F1*
02E3E7E3  4000017C  40400004  40400001  00000000  40404040  40404040
40404040  40404040  40404040  40404040  40404040  40404040  40404040
40404040  40404040  40404040  40404040  C2E4C9D3  F0F0F1F2*
02E3E7E3  400001F0  40400038  40400001  58B0D088  58A0D0B8  50B0D0E0
50B0D0F4  50B0D0D8  5800D098  5000D160  5860D1B8  5870D08C  5890D1BC
58B0D14C  58A0D154  5880D120  2B007806  C2E4C9D3  F0F0F1F3*
02E3E7E3  40000228  40400038  40400001  80006A00  D0786000  D0685820
D06C5920  D0984770  D27E2B00  78098000  6A00D078  6000D068  5850D06C
5800D0F4  5A00D08C  5000D0F4  18305C20  C2E4C9D3  F0F0F1F4*
02E3E7E3  40000260  40400038  40400001  D0B45A30  D1605C40  D0B41825
5A20D160  4103A000  5000D050  4102B000  5000D054  9280D054  58F0D130
4110D04C  05EF5800  D0F45700  D0845000  C2E4C9D3  F0F0F1F5*
02E3E7E3  40000298  40400038  40400001  D0746820  D0706B20  D0807029
80005A70  D08C5A90  D0B85A60  D0B85970  D10047C0  D1FC58B0  D08858A0
D0B85800  D08C5000  D1045800  D1985000  C2E4C9D3  F0F0F1F6*
02E3E7E3  400002D0  40400038  40400001  D18850A0  D1845820  D1A05020
D17C5800  D19C5000  D1805800  D1A45000  D1785800  D0985000  D16050A0
D15C5800  D1A05000  D1945800  D1A85000  C2E4C9D3  F0F0F1F7*
02E3E7E3  40000308  40400038  40400001  D1905800  D1C05000  D18C5800
D1C45000  D1B4189A  18A258B0  D1445880  D12058E0  D18C2B00  780E8000
6A00D078  6000D068  5820D06C  5020D0F0  C2E4C9D3  F0F0F1F8*
02E3E7E3  40000340  40400038  40400001  58E0D1B4  2B00780E  80006A00
D0786000  D0685800  D06C5000  D0E85800  D0D81200  4780D352  5850D0D8
5C40D1A0  18355A30  D19C5923  B0004780  C2E4C9D3  F0F0F1F9*
02E3E7E3  40000378  40400038  40400001  D4FC5800  D0D85A00  D08C5000

MEMBER NAME  BUILD1
D0D85820  D0E05A20  D08C5850  D0D85C40  D1A01835  5A30D098  5023B000
5870D0F0  5C60D19C  18275A20  D09858F0  C2E4C9D3  F0F0F2F0**
02E3E7E3  400003B0  40400038  40400001  D1285852  F0001827  5A20D1A4
5832F000  1C291C49  5A30D098  5030D174  18255A20  D09818A2  58B0D134
5890D13C  5880D14C  5800D0E0  5A00D08C  C2E4C9D3  F0F0F2F1*
02E3E7E3  400003E8  40400038  40400001  5000D0E0  18505C40  D0B81825
5A20D098  4102B000  5000D05C  410A9000  5000D060  9280D060  58F0D130
4110D058  05EF5850  D0E05C40  D0B81825  C2E4C9D3  F0F0F2F2*
02E3E7E3  40000420  40400038  40400001  5A20D098  7802B000  7900D0C0
4770D492  5800D0F4  5A00D08C  5000D0F4  5850D0E0  5C40D15C  18255A20
D1642B00  7802B000  6A00D078  6000D068  C2E4C9D3  F0F0F2F3*
02E3E7E3  40000458  40400038  40400001  5850D06C  5800D0F4  5700D084
5000D074  6820D070  6B20D080  5870D0E0  5C60D15C  18275A20  D1647022
B0005830  D0F45C20  D0B45A30  D1605C40  C2E4C9D3  F0F0F2F4*
```

```
02E3E7E3  40000490  40400038  40400001  D0B41825  5A20D160  58F0D154
4103F000  5000D050  41028000  5000D054  9280D054  58F0D130  4110D04C
05EF5AA0  D0B859A0  D17447C0  D3B85880  C2E4C9D3  F0F0F2F5*
02E3E7E3  400004C8  40400038  40400001  D12058B0  D14458A0  D17C5890
D0B8185A  5C40D0D8  18255A20  D1785800  D0E05002  B000185A  5C40D0D8
18255A20  D1805800  D0F05002  B000185A  C2E4C9D3  F0F0F2F6*
02E3E7E3  40000500  40400038  40400001  5C40D0D8  18255A20  D1A85800
D0885002  B000185A  5C40D0D8  18251A2A  5800D088  5002B000  5850D0D8
5C40D1A0  18255A20  D0985852  B0005A50  C2E4C9D3  F0F0F2F7*
02E3E7E3  40000538  40400038  40400001  D0E85B50  D08C5C40  D1841825
5A20D1AC  7800D0BC  58F0D134  7002F000  5800D0D8  5700D084  5000D074
6820D070  6B20D080  58E0D18C  702E8000  C2E4C9D3  F0F0F2F8*
02E3E7E3  40000570  40400038  40400001  5850D0D8  5C40D1A0  18255A20
D1A85802  B0001200  4770D576  5850D0D8  5C40D194  18255A20  D1905800
D1045002  B0005830  D0D85C20  D1945A30  C2E4C9D3  F0F0F2F9*
02E3E7E3  400005A8  40400038  40400001  D1945823  B0005A20  D08C5850
D0D85C40  D1941835  5A30D194  5023B000  5820D104  5A20D08C  5020D104
5800D1B4  1A095000  D1B45800  D18C1A09  C2E4C9D3  F0F0F3F0**
02E3E7E3  400005E0  40400038  40400001  5000D18C  5920D100  47C0D2FE
58B0D088  58A0D0B8  1BFF58E0  D00007FE  58A0D004  58E0A00C  58B0A018
5810B014  5820D0E0  50201000  5830B01C  C2E4C9D3  F0F0F3F1*
02E3E7E3  40000618  40400038  40400001  5840D0F4  50403000  5850B02C
5860D0D8  50605000  18DA92FF  A00C982C  A01C07FE  987B1004  58207000
5020D0FC  58209000  5020D110  987B1014  C2E4C9D3  F0F0F3F2*
02E3E7E3  40000650  40400038  40400001  58207000  5020D0E0  58209000
5020D0F4  987B1024  58207000  5020D10C  58209000  5020D0D8  58701034
58207000  5020D100  58201000  41302000  C2E4C9D3  F0F0F3F3*
02E3E7E3  40000688  40400038  40400001  41500004  1B255C40  D0B01B25
5020D13C  5030D140  58201008  41302000  41500004  1B255C40  D0A81B25
5020D14C  5030D150  58201010  41302000  C2E4C9D3  F0F0F3F4*
02E3E7E3  400006C0  40400038  40400001  41500004  1B255C40  D0B01B25
5020D134  5030D138  58201018  41302000  41500004  1B255C40  D0A81B25
5020D154  5030D158  58201020  41302000  C2E4C9D3  F0F0F3F5*
02E3E7E3  400006F8  40400038  40400001  41500004  1B255C40  D0941B25
5020D128  5030D12C  58201028  41302000  41500004  1B255C40  D09C1B25
5020D144  5030D148  58201030  41302000  C2E4C9D3  F0F0F3F6*
02E3E7E3  40000730  40400018  40400001  41500004  1B255C40  D0B01B25
5020D120  5030D124  47F0D1C8  40404040  40404040  40404040  40404040
40404040  40404040  40404040  40404040  C2E4C9D3  F0F0F3F7*
02E3E7E3  40000020  4040000C  40400001  00000638  00000028  000005FC
40404040  40404040  40404040  40404040  40404040  40404040  40404040
40404040  40404040  40404040  40404040  C2E4C9D3  F0F0F3F8*
02E3E7E3  40000074  40400004  40400001  000000DC  40404040  40404040
40404040  40404040  40404040  40404040  40404040  40404040  40404040

MEMBER NAME  BUILD1
40404040  40404040  40404040  40404040  C2E4C9D3  F0F0F3F9*
02E3E7E3  4000007C  40400008  40400001  80000000  000000E0  40404040
40404040  40404040  40404040  40404040  40404040  40404040  40404040
40404040  40404040  40404040  40404040  C2E4C9D3  F0F0F4F0**
02E3E7E3  40000088  40400004  40400001  80000000  40404040  40404040
40404040  40404040  40404040  40404040  40404040  40404040  40404040
40404040  40404040  40404040  40404040  C2E4C9D3  F0F0F4F1*
02E3E7E3  40000184  40400038  40400001  00000000  00000000  00000024
00000000  00000000  00000000  00000000  00000000  00000000  00000000
00000000  00000000  00000000  00000000  C2E4C9D3  F0F0F4F2*
02E3E7E3  400001BC  40400034  40400001  00000000  00000034  0000000C
00000014  00000008  00000010  00000028  00000000  00000000  0000003C
0000005C  0000006C  00000070  40404040  C2E4C9D3  F0F0F4F3*
02D9D3C4  40404040  40400030  40404040  00020001  1C000158  00010001
0C000020  00010001  0C000024  00010001  0C000028  00010001  0C000074
```

```
00010001  0C000080  40404040  40404040  C2E4C9D3  F0F0F4F4*
02C5D5C4  40404040  40404040  40404040  40404040  40404040  40404040
00000748  F1F5F7F3  F460C6D6  F34040F0  F2F0F2F8  F7F0F9F8  40F0F84B
F1F34BF0  F6404040  C2E4C9D3  C4F14040  C2E4C9D3  F0F0F4F5**

MEMBER NAME  BUILD2
02C5E2C4  40404040  40400010  40400001  C2E4C9D3  C4F24040  00000000
40000000  40404040  40404040  40404040  40404040  40404040  40404040
40404040  40404040  40404040  40404040  C2E4C9D3  F0F0F0F1*
02E3E7E3  40000000  40400028  40400001  47F0F00C  07C2E4C9  D3C4F240
90ECD00C  184D98CD  F0205040  D00450D0  400807FC  40404040  40404040
40404040  40404040  40404040  40404040  C2E4C9D3  F0F0F0F2*
02C5E2C4  40404040  40400010  40400002  C2E2D6D9  E3404040  02000000
40000000  40404040  40404040  40404040  40404040  40404040  40404040
40404040  40404040  40404040  40404040  C2E4C9D3  F0F0F0F3*
02E3E7E3  40000098  40400030  40400001  00000000  00000000  00000001
00000001  00000002  00000005  0000000A  0000000E  00000014  00000038
00000000  00000000  40404040  40404040  C2E4C9D3  F0F0F0F4*
02E3E7E3  40000100  40400008  40400001  00000000  00000000  40404040
40404040  40404040  40404040  40404040  40404040  40404040  40404040
40404040  40404040  40404040  40404040  C2E4C9D3  F0F0F0F5*
02C5E2C4  40404040  40400010  40400003  D4E5C3C8  D9D34040  02000000
40000000  40404040  40404040  40404040  40404040  40404040  40404040
40404040  40404040  40404040  40404040  C2E4C9D3  F0F0F0F6*
02E3E7E3  4000010C  40400004  40400001  00000000  40404040  40404040
40404040  40404040  40404040  40404040  40404040  40404040  40404040
40404040  40404040  40404040  40404040  C2E4C9D3  F0F0F0F7*
02E3E7E3  40000114  40400004  40400001  00000000  40404040  40404040
40404040  40404040  40404040  40404040  40404040  40404040  40404040
40404040  40404040  40404040  40404040  C2E4C9D3  F0F0F0F8*
02E3E7E3  400000F0  40400010  40400001  00000001  00000004  C9D54040
C1404040  40404040  40404040  40404040  40404040  40404040  40404040
40404040  40404040  40404040  40404040  C2E4C9D3  F0F0F0F9*
02E3E7E3  40000150  40400038  40400001  58B0D0E4  5800D07C  5000D0B4
58F0D0D8  4110D04C  05EF5800  D07C5000  D0A05800  D1145000  D10C5800
D1185000  D1045800  D1205000  D1105800  C2E4C9D3  F0F0F1F0**
02E3E7E3  40000188  40400038  40400001  D1245000  D1085880  D0905890
D09458B0  D0DC58A0  D0E458E0  D110585E  A00058E0  D108587E  A0001C69
1C491827  5A20D0F0  18355A30  D0F05850  C2E4C9D3  F0F0F1F1*
02E3E7E3  400001C0  40400038  40400001  D0985860  D0785880  D0701893
58A0D094  18B25870  D0DC7809  70003200  4780D1BA  18868785  D1C247F0
D1DA879A  D1AE58A0  D0E458B0  D0DC5890  C2E4C9D3  F0F0F1F2*
02E3E7E3  400001F8  40400038  40400001  D0945880  D09047F0  D24858A0
D0E458B0  D0DC5890  D0945880  D09058E0  D108582E  A00058E0  D110583E
A0001852  1B535A50  D07C1C49  5050D0B8  C2E4C9D3  F0F0F1F3*
02E3E7E3  40000230  40400038  40400001  18595C40  D0B45A50  D10C1873
1C691847  5A40D10C  4105B000  5000D064  4104B000  5000D068  9280D068
58F0D0EC  4110D060  05EF5A20  D0B41B23  C2E4C9D3  F0F0F1F4*
02E3E7E3  40000268  40400038  40400001  5A20D07C  5020D0B4  5820D0A0
5A20D07C  5020D0A0  5800D108  1A085000  D1085800  D1101A08  5000D110
5920D0A8  47C0D176  58B0D0E4  5800D0B4  C2E4C9D3  F0F0F1F5*
02E3E7E3  400002A0  40400038  40400001  5B00D07C  5000D0AC  1BFF58E0
D00007FE  58A0D004  58E0A00C  58B0A018  5810B004  5820D0AC  50201000
5830B00C  5840D0A8  50403000  18DA92FF  C2E4C9D3  F0F0F1F6*
02E3E7E3  400002D8  40400038  40400001  A00C982C  A01C07FE  98791004
58207000  5020D0AC  58209000  5020D0A8  58201000  41302000  41500004
1B255C40  D08C1B25  5020D0DC  5030D0E0  C2E4C9D3  F0F0F1F7*
02E3E7E3  40000310  40400024  40400001  58201008  41302000  41500004
1B255C40  D0841B25  5020D0E4  5030D0E8  5030D054  47F0D128  40404040
40404040  40404040  40404040  40404040  C2E4C9D3  F0F0F1F8*
02E3E7E3  40000020  4040000C  40400001  000002E0  00000028  000002B0
```

```
40404040  40404040  40404040  40404040  40404040  40404040  40404040
40404040  40404040  40404040  40404040  C2E4C9D3  F0F0F1F9*
02E3E7E3  40000074  40400008  40400001  000000F0  000000A4  40404040

MEMBER NAME  BUILD2
40404040  40404040  40404040  40404040  40404040  40404040  40404040
40404040  40404040  40404040  40404040  C2E4C9D3  F0F0F2F0**
02E3E7E3  40000080  40400004  40400001  000000B8  40404040  40404040
40404040  40404040  40404040  40404040  40404040  40404040  40404040
40404040  40404040  40404040  40404040  C2E4C9D3  F0F0F2F1*
02D9D3C4  40404040  40400038  40404040  00020001  1C000100  00030001
1C000114  00010001  0C000020  00010001  0C000024  00010001  0C000028
00010001  0C000074  00010001  0C000078  C2E4C9D3  F0F0F2F2*
02E3E7E3  40000084  40400008  40400001  800000D0  000000E0  40404040
40404040  40404040  40404040  40404040  40404040  40404040  40404040
40404040  40404040  40404040  40404040  C2E4C9D3  F0F0F2F3*
02E3E7E3  40000090  40400004  40400001  80000000  40404040  40404040
40404040  40404040  40404040  40404040  40404040  40404040  40404040
40404040  40404040  40404040  40404040  C2E4C9D3  F0F0F2F4*
02E3E7E3  40000118  40400038  40400001  00000028  00000000  00000000
00000000  00000000  00000000  00000000  00000000  00000000  00000004
00000008  00000000  00000018  0000001C  C2E4C9D3  F0F0F2F5*
02D9D3C4  40404040  40400018  40404040  00010001  0C000080  00010001
0C000084  00010001  0C000088  40404040  40404040  40404040  40404040
40404040  40404040  40404040  40404040  C2E4C9D3  F0F0F2F6*
02C5D5C4  40404040  40404040  40404040  40404040  40404040  40404040
00000334  F1F5F7F3  F460C6D6  F34040F0  F2F0F2F8  F7F0F9F8  40F0F84B
F1F34BF1  F0404040  C2E4C9D3  C4F24040  C2E4C9D3  F0F0F2F7**

MEMBER NAME  CADLN1
02C5E2C4  40404040  40400010  40400001  C3C1C4D3  D5F14040  00000000
40000000  40404040  40404040  40404040  40404040  40404040  40404040
40404040  40404040  40404040  40404040  C3C1C4D3  F0F0F0F1*
02E3E7E3  40000000  40400028  40400001  47F0F00C  07C3C1C4  D3D5F140
90ECD00C  184D98CD  F0205040  D00450D0  400807FC  40404040  40404040
40404040  40404040  40404040  40404040  C3C1C4D3  F0F0F0F2*
02C5E2C4  40404040  40400010  40400002  C3C1C4D3  D5404040  02000000
40000000  40404040  40404040  40404040  40404040  40404040  40404040
40404040  40404040  40404040  40404040  C3C1C4D3  F0F0F0F3*
02E3E7E3  40000088  40400010  40400001  00000001  00000002  00000000
00000000  40404040  40404040  40404040  40404040  40404040  40404040
40404040  40404040  40404040  40404040  C3C1C4D3  F0F0F0F4*
02E3E7E3  400000C0  40400038  40400001  00000000  7800D070  7000D084
7800D078  7000D088  7800D074  7000D08C  7800D07C  7000D090  58F0D098
4110D054  05EF41E0  000415FE  4720D0D6  C3C1C4D3  F0F0F0F5*
02E3E7E3  400000F8  40400038  40400001  58EFD04C  07FE1BFF  58E0D000
07FE58D0  D00458E0  D00C92FF  D00C982C  D01C07FE  987A1000  78207000
7020D070  78208000  7020D078  78209000  C3C1C4D3  F0F0F0F6*
02E3E7E3  40000130  40400010  40400001  7020D074  7820A000  7020D07C
47F0D09C  40404040  40404040  40404040  40404040  40404040  40404040
40404040  40404040  40404040  40404040  C3C1C4D3  F0F0F0F7*
02E3E7E3  40000020  4040000C  40400001  00000118  00000028  00000106
40404040  40404040  40404040  40404040  40404040  40404040  40404040
40404040  40404040  40404040  40404040  C3C1C4D3  F0F0F0F8*
02E3E7E3  40000074  40400010  40400001  000000FE  000000FE  000000AC
800000B4  40404040  40404040  40404040  40404040  40404040  40404040
40404040  40404040  40404040  40404040  C3C1C4D3  F0F0F0F9*
02D9D3C4  40404040  40400038  40404040  00020001  1C0000C0  00010001
0C000020  00010001  0C000024  00010001  0C000028  00010001  0C000074
00010001  0C000078  00010001  0C00007C  C3C1C4D3  F0F0F1F0**
02D9D3C4  40404040  40400008  40404040  00010001  0C000080  40404040
```

```
40404040  40404040  40404040  40404040  40404040  40404040  40404040
40404040  40404040  40404040  40404040  C3C1C4D3  F0F0F1F1*
02C5D5C4  40404040  40404040  40404040  40404040  40404040  40404040
00000140  F1F5F7F3  F460C6D6  F34040F0  F2F0F2F8  F7F0F9F8  40F0F84B
F1F34BF1  F5404040  C3C1C4D3  D5F14040  C3C1C4D3  F0F0F1F2**

MEMBER NAME  CANDO
02C5E2C4  40404040  40400010  40400001  C3C1D5C4  D6404040  00000000
40000000  40404040  40404040  40404040  40404040  40404040  40404040
40404040  40404040  40404040  40404040  C3C1D5C4  F0F0F0F1*
02E3E7E3  40000000  40400038  40400001  47F0F00C  07C3C1D5  C4D64040
90ECD00C  184D98CD  F0205040  D00450D0  400807FC  40404040  40404040
021A1940  C5D9D9D6  D9407A40  C7E3D7E3  C3C1D5C4  F0F0F0F2*
02E3E7E3  40000038  4040002A  40400001  E240C1D9  D9C1E840  C6E4D3D3
22021A19  40C5D9D9  D6D9407A  40C9D7D9  D6C640C1  D9D9C1E8  40C6E4D3
D3224040  40404040  40404040  40404040  C3C1D5C4  F0F0F0F3*
02E3E7E3  40000160  40400038  40400001  00000000  00000000  00000001
00000002  00000003  00000004  0000000B  0000000E  00000014  00001388
00021054  40800000  40B504F4  00000000  C3C1D5C4  F0F0F0F4*
02C5E2C4  40404040  40400010  40400002  E2D7D3D7  E3E24040  05000000
40030D44  40404040  40404040  40404040  40404040  40404040  40404040
40404040  40404040  40404040  40404040  C3C1D5C4  F0F0F0F5*
02E3E7E3  40000198  40400004  40400001  00000000  40404040  40404040
40404040  40404040  40404040  40404040  40404040  40404040  40404040
40404040  40404040  40404040  40404040  C3C1D5C4  F0F0F0F6*
02C5E2C4  40404040  40400010  40400003  C3D5E3D9  C4404040  02000000
40000000  40404040  40404040  40404040  40404040  40404040  40404040
40404040  40404040  40404040  40404040  C3C1D5C4  F0F0F0F7*
02E3E7E3  400001F0  4040000C  40400001  FFFFFFEC  00000000  00000000
40404040  40404040  40404040  40404040  40404040  40404040  40404040
40404040  40404040  40404040  40404040  C3C1D5C4  F0F0F0F8*
02E3E7E3  40000200  40400004  40400001  00000000  40404040  40404040
40404040  40404040  40404040  40404040  40404040  40404040  40404040
40404040  40404040  40404040  40404040  C3C1D5C4  F0F0F0F9*
02E3E7E3  40000208  40400004  40400001  00000000  40404040  40404040
40404040  40404040  40404040  40404040  40404040  40404040  40404040
40404040  40404040  40404040  40404040  C3C1D5C4  F0F0F1F0**
02C5E2C4  40404040  40400010  40400004  C3C1C4D9  E5E34040  02000000
40000000  40404040  40404040  40404040  40404040  40404040  40404040
40404040  40404040  40404040  40404040  C3C1D5C4  F0F0F1F1*
02E3E7E3  40000210  40400004  40400001  00000000  40404040  40404040
40404040  40404040  40404040  40404040  40404040  40404040  40404040
40404040  40404040  40404040  40404040  C3C1D5C4  F0F0F1F2*
02C5E2C4  40404040  40400010  40400005  C3D5C4C3  C8D54040  02000000
40000000  40404040  40404040  40404040  40404040  40404040  40404040
40404040  40404040  40404040  40404040  C3C1D5C4  F0F0F1F3*
02C5E2C4  40404040  40400010  40400006  C4C3E6C3  C3E64040  02000000
40000000  40404040  40404040  40404040  40404040  40404040  40404040
40404040  40404040  40404040  40404040  C3C1D5C4  F0F0F1F4*
02C5E2C4  40404040  40400010  40400007  C9C2C3D6  D47B4040  02000000
40000000  40404040  40404040  40404040  40404040  40404040  40404040
40404040  40404040  40404040  40404040  C3C1D5C4  F0F0F1F5*
02E3E7E3  40000218  40400010  40400001  00000000  00000000  00000000
00000000  40404040  40404040  40404040  40404040  40404040  40404040
40404040  40404040  40404040  40404040  C3C1D5C4  F0F0F1F6*
02C5E2C4  40404040  40400010  40400008  D6D7E3D4  E9C54040  02000000
40000000  40404040  40404040  40404040  40404040  40404040  40404040
40404040  40404040  40404040  40404040  C3C1D5C4  F0F0F1F7*
02C5E2C4  40404040  40400010  40400009  D7D6C9D5  E3E24040  02000000
40000000  40404040  40404040  40404040  40404040  40404040  40404040
40404040  40404040  40404040  40404040  C3C1D5C4  F0F0F1F8*
```

```
02E3E7E3  4000022C  4040000C  40400001  00000000  00000000  00000000
40404040  40404040  40404040  40404040  40404040  40404040  40404040
40404040  40404040  40404040  40404040  C3C1D5C4  F0F0F1F9*
02D9D3C4  40404040  40400038  40404040  00020001  0C0001F0  00030001

MEMBER NAME  CANDO
1C0001F4  00040001  1C000218  00050001  1C00021C  00060001  1C000220
00070001  1C00022C  00080001  1C000230  C3C1D5C4  F0F0F2F0**
02C5E2C4  40404040  40400010  4040000A  D7D9D6C6  C9D34040  02000000
40000000  40404040  40404040  40404040  40404040  40404040  40404040
40404040  40404040  40404040  40404040  C3C1D5C4  F0F0F2F1*
02E3E7E3  40000238  40400004  40400001  00000000  40404040  40404040
40404040  40404040  40404040  40404040  40404040  40404040  40404040
40404040  40404040  40404040  40404040  C3C1D5C4  F0F0F2F2*
02E3E7E3  40000260  40400038  40400001  5870D190  5880D1A0  5890D198
58A0D188  58B0D1BC  5860D1D4  5800D0F8  5000D15C  5000D13C  5800D10C
5000D1E4  5820D1F0  5020D1E8  4102B000  C3C1D5C4  F0F0F2F3*
02E3E7E3  40000298  40400038  40400001  5000D070  58F0D1B4  4110D070
05EF41E0  000415FE  4720D24E  58EFD04C  07FE4102  B0005000  D08058F0
D1CC4110  D08005EF  58F0D1D0  4110D0A8  C3C1D5C4  F0F0F2F4*
02E3E7E3  400002D0  40400038  40400001  05EF41E0  000815FE  4720D27A
58EFD054  07FE58F0  D1B84110  D0A805EF  41E00004  15FE4720  D29458EF
D06007FE  7800D0FC  7000D168  7000D16C  C3C1D5C4  F0F0F2F5*
02E3E7E3  40000308  40400038  40400001  7000D154  5800D13C  5900D104
4750D324  18365C20  D13C5850  D10C5860  D1185880  D1F458A0  D1D418B3
183A5C26  90001A35  18281A2A  41037000  C3C1D5C4  F0F0F2F6*
02E3E7E3  40000340  40400038  40400001  5000D0BC  41029000  5000D0C4
58F0D18C  4110D0BC  05EF7800  D1547B00  D1647000  D1547820  D1647C20
D1403322  7A20D168  7020D168  7820D164  C3C1D5C4  F0F0F2F7*
02E3E7E3  40000378  40400038  40400001  7C20D144  33227A20  D16C7020
D16C1A6A  878AD2C8  5880D1A0  58A0D188  58B0D1BC  5860D1D4  5820D1E4
1A261856  5C429000  5820D1E4  1A254102  C3C1D5C4  F0F0F2F8*
02E3E7E3  400003B0  40400038  40400001  70005000  D0BC58E0  D1F4410E
90005000  D0C458F0  D18C4110  D0BC05EF  7800D154  7A00D164  7000D154
7840D164  7C40D140  7A40D168  7820D164  C3C1D5C4  F0F0F2F9*
02E3E7E3  400003E8  40400038  40400001  7C20D144  7A20D16C  38047D00
D1547000  D1403802  7D00D154  7000D144  7800D140  7000D178  7800D144
7000D17C  7800D128  7000D170  7800D128  C3C1D5C4  F0F0F3F0**
02E3E7E3  40000420  40400038  40400001  7000D174  58F0D1B0  4110D0DC
05EF41E0  000415FE  4720D3D6  58EFD068  07FE5800  D1605900  D12047C0
D40658F0  D1C41800  45E0F004  00000006  C3C1D5C4  F0F0F3F1*
02E3E7E3  40000458  40400038  40400001  00000028  45E0F010  58F0D1C4
45E0F034  05404040  F4F458F0  D1C84110  D0E805EF  5800D13C  5A00D158
5000D158  5900D11C  4730D42C  1BFF58E0  C3C1D5C4  F0F0F3F2*
02E3E7E3  40000490  40400038  40400001  D00007FE  58F0D1C4  45E0F004
00000006  00000045  45E0F010  58F0D1C4  45E0F034  05404040  F4F45800
D1005000  D15C1BFF  58E0D000  07FE5800  C3C1D5C4  F0F0F3F3*
02E3E7E3  400004C8  40400038  40400001  D1045000  D15C1BFF  58E0D000
07FE5800  D1085000  D15C1BFF  58E0D000  07FE5800  D10C5000  D15C1BFF
58E0D000  07FE58A0  D00458E0  A00C58B0  C3C1D5C4  F0F0F3F4*
02E3E7E3  40000500  40400038  40400001  A0185810  B0045820  D1385020
10005830  B00C5840  D1505040  30005850  B0107820  D1547020  50005860
B0147840  D1407040  60005870  B0187860  C3C1D5C4  F0F0F3F5*
02E3E7E3  40000538  40400038  40400001  D1447060  70005880  B0205890
D1605090  80005810  B02C5820  D1585020  10005830  B0305840  D15C5040
300018DA  92FFA00C  982CA01C  07FE987B  C3C1D5C4  F0F0F3F6*
02E3E7E3  40000570  40400038  40400001  10045820  70005020  D1385820
90005020  D1507820  A0007020  D1547820  B0007020  D140987B  10187820
70007020  D1445820  90005020  D1609878  C3C1D5C4  F0F0F3F7*
02E3E7E3  400005A8  40400038  40400001  102C5820  70005020  D1585820
80005020  D15C5820  10004130  20004150  00041B25  5C40D114  1B255020
```

```
D1BC5030  D1C05820  10084130  20004150  C3C1D5C4  F0F0F3F8*
02E3E7E3  400005E0  40400038  40400001  00041B25  5C40D110  1B255020
D1A85030  D1AC5030  D0885820  101C4130  20004150  00041B25  5C40D104

MEMBER NAME  CANDO
1B255020  D1905030  D1945030  D0A05030  C3C1D5C4  F0F0F3F9*
02E3E7E3  40000618  40400038  40400001  D0A85030  D0E85820  10244130
20004150  00041B25  5C40D104  1B255020  D1985030  D19C5030  D07C9280
D07C5030  D0905030  D0B05030  D0F05820  C3C1D5C4  F0F0F4F0**
02E3E7E3  40000650  40400026  40400001  10284130  20004150  00041B25
5C40D10C  1B255020  D1A05030  D1A45030  D0B89280  D0B847F0  D1F84040
40404040  40404040  40404040  40404040  C3C1D5C4  F0F0F4F1*
02E3E7E3  40000020  40400008  40400001  0000056E  00000068  40404040
40404040  40404040  40404040  40404040  40404040  40404040  40404040
40404040  40404040  40404040  40404040  C3C1D5C4  F0F0F4F2*
02E3E7E3  40000068  40400004  40400001  000004F6  40404040  40404040
40404040  40404040  40404040  40404040  40404040  40404040  40404040
40404040  40404040  40404040  40404040  C3C1D5C4  F0F0F4F3*
02E3E7E3  400000B4  40400004  40400001  000002B6  40404040  40404040
40404040  40404040  40404040  40404040  40404040  40404040  40404040
40404040  40404040  40404040  40404040  C3C1D5C4  F0F0F4F4*
02D9D3C4  40404040  40400038  40404040  00090001  1C000234  000A0001
1C000238  00010001  0C000458  00010001  0C0004A0  00010001  0C000020
00010001  0C000024  00010001  0C000068  C3C1D5C4  F0F0F4F5*
02E3E7E3  400000B8  4040001C  40400001  000004B6  000002E2  000004C6
000004E6  000002FC  000004D6  0000043E  40404040  40404040  40404040
40404040  40404040  40404040  40404040  C3C1D5C4  F0F0F4F6*
02D9D3C4  40404040  40400038  40404040  00010001  0C0000B4  00010001
0C0000B8  00010001  0C0000BC  00010001  0C0000C0  00010001  0C0000C4
00010001  0C0000C8  00010001  0C0000CC  C3C1D5C4  F0F0F4F7*
02E3E7E3  400000D4  40400004  40400001  0000043E  40404040  40404040
40404040  40404040  40404040  40404040  40404040  40404040  40404040
40404040  40404040  40404040  40404040  C3C1D5C4  F0F0F4F8*
02E3E7E3  400000DC  40400008  40400001  000001A0  000001A4  40404040
40404040  40404040  40404040  40404040  40404040  40404040  40404040
40404040  40404040  40404040  40404040  C3C1D5C4  F0F0F4F9*
02E3E7E3  400000EC  40400004  40400001  000001A0  40404040  40404040
40404040  40404040  40404040  40404040  40404040  40404040  40404040
40404040  40404040  40404040  40404040  C3C1D5C4  F0F0F5F0**
02E3E7E3  400000F4  40400004  40400001  000001B8  40404040  40404040
40404040  40404040  40404040  40404040  40404040  40404040  40404040
40404040  40404040  40404040  40404040  C3C1D5C4  F0F0F5F1*
02E3E7E3  400000FC  40400008  40400001  000001A4  00000004  40404040
40404040  40404040  40404040  40404040  40404040  40404040  40404040
40404040  40404040  40404040  40404040  C3C1D5C4  F0F0F5F2*
02D9D3C4  40404040  40400038  40404040  00010001  0C0000D0  00010001
0C0000D4  00010001  0C0000DC  00010001  0C0000E0  00010001  0C0000EC
00010001  0C0000F4  00010001  0C0000FC  C3C1D5C4  F0F0F5F3*
02E3E7E3  40000104  40400004  40400001  00000000  40404040  40404040
40404040  40404040  40404040  40404040  40404040  40404040  40404040
40404040  40404040  40404040  40404040  C3C1D5C4  F0F0F5F4*
02E3E7E3  4000010C  40400004  40400001  800001C8  40404040  40404040
40404040  40404040  40404040  40404040  40404040  40404040  40404040
40404040  40404040  40404040  40404040  C3C1D5C4  F0F0F5F5*
02E3E7E3  40000114  40400004  40400001  000001C8  40404040  40404040
40404040  40404040  40404040  40404040  40404040  40404040  40404040
40404040  40404040  40404040  40404040  C3C1D5C4  F0F0F5F6*
02E3E7E3  4000011C  40400004  40400001  000001A4  40404040  40404040
40404040  40404040  40404040  40404040  40404040  40404040  40404040
40404040  40404040  40404040  40404040  C3C1D5C4  F0F0F5F7*
02E3E7E3  40000128  40400004  40400001  0000016C  40404040  40404040
```

```
40404040  40404040  40404040  40404040  40404040  40404040  40404040
40404040  40404040  40404040  40404040  C3C1D5C4  F0F0F5F8*

MEMBER NAME  CANDO
02E3E7E3  40000130  40400008  40400001  00000168  0000016C  40404040
40404040  40404040  40404040  40404040  40404040  40404040  40404040
40404040  40404040  40404040  40404040  C3C1D5C4  F0F0F5F9*
02D9D3C4  40404040  40400038  40404040  00020001  0C000100  00020001
0C000104  00010001  0C00010C  00010001  0C000114  00010001  0C00011C
00010001  0C000128  00010001  0C000130  C3C1D5C4  F0F0F6F0**
02E3E7E3  40000138  40400018  40400001  000001CC  000001A8  800001AC
000001E0  000001D8  8000018C  40404040  40404040  40404040  40404040
40404040  40404040  40404040  40404040  C3C1D5C4  F0F0F6F1*
02E3E7E3  40000154  40400004  40400001  0000019C  40404040  40404040
40404040  40404040  40404040  40404040  40404040  40404040  40404040
40404040  40404040  40404040  40404040  C3C1D5C4  F0F0F6F2*
02D9D3C4  40404040  40400038  40404040  00010001  0C000134  00010001
0C000138  00010001  0C00013C  00010001  0C000140  00010001  0C000144
00010001  0C000148  00010001  0C00014C  C3C1D5C4  F0F0F6F3*
02E3E7E3  4000015C  40400004  40400001  800001A4  40404040  40404040
40404040  40404040  40404040  40404040  40404040  40404040  40404040
40404040  40404040  40404040  40404040  C3C1D5C4  F0F0F6F4*
02E3E7E3  4000023C  40400024  40400001  00000008  00000000  00000000
00000000  00000000  00000000  00000038  0000003C  00000010  40404040
40404040  40404040  40404040  40404040  C3C1D5C4  F0F0F6F5*
02D9D3C4  40404040  40400010  40404040  00010001  0C000154  00010001
0C00015C  40404040  40404040  40404040  40404040  40404040  40404040
40404040  40404040  40404040  40404040  C3C1D5C4  F0F0F6F6*
02C5D5C4  40404040  40404040  40404040  40404040  40404040  40404040
00000676  F1F5F7F3  F460C6D6  F34040F0  F2F0F2F8  F7F0F9F8  40F0F84B
F1F34BF1  F9404040  C3C1D5C4  D6404040  C3C1D5C4  F0F0F6F7**

MEMBER NAME  CDTARC
02C5E2C4  40404040  40400010  40400001  C3C4E3C1  D9C34040  00000000
40000000  40404040  40404040  40404040  40404040  40404040  40404040
40404040  40404040  40404040  40404040  C3C4E3C1  F0F0F0F1*
02E3E7E3  40000000  40400028  40400001  47F0F00C  07C3C4E3  C1D9C340
90ECD00C  184D98CD  F0205040  D00450D0  400807FC  40404040  40404040
40404040  40404040  40404040  40404040  C3C4E3C1  F0F0F0F2*
02E3E7E3  40000088  40400038  40400001  4E000000  00000000  4E000000
80000000  00000001  00000002  00000003  00000004  00000005  00000006
00000007  00000008  00000009  0000000A  C3C4E3C1  F0F0F0F3*
02C5E2C4  40404040  40400010  40400002  D7E3C1C2  D3C54040  05000000
40125768  40404040  40404040  40404040  40404040  40404040  40404040
40404040  40404040  40404040  40404040  C3C4E3C1  F0F0F0F4*
02E3E7E3  400000C0  40400020  40400001  0000000C  00000014  00000018
0000002C  00000038  41300000  00000000  00000000  40404040  40404040
40404040  40404040  40404040  40404040  C3C4E3C1  F0F0F0F5*
02C5E2C4  40404040  40400010  40400003  C5D3D4E3  C2D34040  05000000
400D7D28  40404040  40404040  40404040  40404040  40404040  40404040
40404040  40404040  40404040  40404040  C3C4E3C1  F0F0F0F6*
02C5E2C4  40404040  40400010  40400004  E5F9F840  40404040  05000000
40000004  40404040  40404040  40404040  40404040  40404040  40404040
40404040  40404040  40404040  40404040  C3C4E3C1  F0F0F0F7*
02C5E2C4  40404040  40400010  40400005  E5F9F940  40404040  05000000
4000003C  40404040  40404040  40404040  40404040  40404040  40404040
40404040  40404040  40404040  40404040  C3C4E3C1  F0F0F0F8*
02E3E7E3  40000108  40400020  40400001  FFFFFFEC  00058600  000B0444
00108298  FFFFFFC8  000CD118  00000000  FFFFFFFC  40404040  40404040
40404040  40404040  40404040  40404040  C3C4E3C1  F0F0F0F9*
02D9D3C4  40404040  40400038  40404040  00020001  0C000108  00020001
```

```
0C00010C  00020001  0C000110  00020001  0C000114  00030001  0C000118
00030001  0C00011C  00040001  0C000120  C3C4E3C1  F0F0F1F0**
02E3E7E3  40000128  40400004  40400001  00000000  40404040  40404040
40404040  40404040  40404040  40404040  40404040  40404040  40404040
40404040  40404040  40404040  40404040  C3C4E3C1  F0F0F1F1*
02E3E7E3  40000130  40400004  40400001  00000000  40404040  40404040
40404040  40404040  40404040  40404040  40404040  40404040  40404040
40404040  40404040  40404040  40404040  C3C4E3C1  F0F0F1F2*
02C5E2C4  40404040  40400010  40400006  E2D8D9E3  40404040  02000000
40000000  40404040  40404040  40404040  40404040  40404040  40404040
40404040  40404040  40404040  40404040  C3C4E3C1  F0F0F1F3*
02E3E7E3  40000138  40400004  40400001  00000000  40404040  40404040
40404040  40404040  40404040  40404040  40404040  40404040  40404040
40404040  40404040  40404040  40404040  C3C4E3C1  F0F0F1F4*
02C5E2C4  40404040  40400010  40400007  D4E5C3C8  D9404040  02000000
40000000  40404040  40404040  40404040  40404040  40404040  40404040
40404040  40404040  40404040  40404040  C3C4E3C1  F0F0F1F5*
02E3E7E3  40000140  40400008  40400001  00000000  00000000  40404040
40404040  40404040  40404040  40404040  40404040  40404040  40404040
40404040  40404040  40404040  40404040  C3C4E3C1  F0F0F1F6*
02E3E7E3  400000F4  40400014  40400001  00000000  00000000  00000000
00000000  00000000  40404040  40404040  40404040  40404040  40404040
40404040  40404040  40404040  40404040  C3C4E3C1  F0F0F1F7*
02E3E7E3  40000150  40400038  40400001  5840D0FC  5850D0F8  5860D0EC
5880D110  5890D108  58A0D100  58B0D0F0  5870D0B0  58005000  8707D158
1BFF58E0  D00007FE  58004028  8707D168  C3C4E3C1  F0F0F1F8*
02E3E7E3  40000188  40400038  40400001  1BFF58E0  D00007FE  5800D0C0
5900D080  4750D17C  1BFF58E0  D00007FE  5830B038  5A30D070  5030B038
5C20D0A8  7800D0AC  7003B004  58006008  C3C4E3C1  F0F0F1F9*
02E3E7E3  400001C0  40400038  40400001  5700D06C  5000D064  6820D060

MEMBER NAME  CDTARC
6B20D068  7023B008  78209004  7023B00C  78409008  7040D120  7043B010
78408004  7043B014  78408008  7043B018  C3C4E3C1  F0F0F2F0**
02E3E7E3  400001F8  40400038  40400001  7840A004  7043B01C  7860A008
7063B020  3B247840  D1203B46  3C223C44  3A247020  D12058F0  D1184110
D04C05EF  7003B024  4103B028  5000D054  C3C4E3C1  F0F0F2F1*
02E3E7E3  40000230  40400038  40400001  58F0D11C  4110D050  05EF1BFF
58E0D000  07FE58D0  D00458E0  D00C92FF  D00C982C  D01C07FE  5870100C
58207000  5020D0C0  58201000  41302000  C3C4E3C1  F0F0F2F2*
02E3E7E3  40000268  40400038  40400001  41500004  1B255020  D1005030
D1045820  10044130  20004150  00041B25  5020D108  5030D10C  58201008
41302000  41500004  1B255020  D1105030  C3C4E3C1  F0F0F2F3*
02E3E7E3  400002A0  40400006  40400001  D11447F0  D1284040  40404040
40404040  40404040  40404040  40404040  40404040  40404040  40404040
40404040  40404040  40404040  40404040  C3C4E3C1  F0F0F2F4*
02E3E7E3  40000020  4040000C  40400001  00000254  00000028  00000242
40404040  40404040  40404040  40404040  40404040  40404040  40404040
40404040  40404040  40404040  40404040  C3C4E3C1  F0F0F2F5*
02E3E7E3  40000074  40400008  40400001  80000148  000000C4  40404040
40404040  40404040  40404040  40404040  40404040  40404040  40404040
40404040  40404040  40404040  40404040  C3C4E3C1  F0F0F2F6*
02D9D3C4  40404040  40400038  40404040  00050001  0C000124  00060001
1C000140  00070001  1C000144  00010001  0C000020  00010001  0C000024
00010001  0C000028  00010001  0C000074  C3C4E3C1  F0F0F2F7*
02E3E7E3  40000080  40400004  40400001  800000F4  40404040  40404040
40404040  40404040  40404040  40404040  40404040  40404040  40404040
40404040  40404040  40404040  40404040  C3C4E3C1  F0F0F2F8*
02E3E7E3  40000148  40400008  40400001  00000000  00000000  40404040
40404040  40404040  40404040  40404040  40404040  40404040  40404040
40404040  40404040  40404040  40404040  C3C4E3C1  F0F0F2F9*
```

```
02D9D3C4  40404040  40400010  40404040  00010001  0C000078  00010001
0C000080  40404040  40404040  40404040  40404040  40404040  40404040
40404040  40404040  40404040  40404040  C3C4E3C1  F0F0F3F0**
02C5D5C4  40404040  40404040  40404040  40404040  40404040  40404040
000002A6  F1F5F7F3  F460C6D6  F34040F0  F2F0F2F8  F7F0F9F8  40F0F84B
F1F34BF2  F4404040  C3C4E3C1  D9C34040  C3C4E3C1  F0F0F3F1**

MEMBER NAME  CCHAIN
02C5E2C4  40404040  40400010  40400001  C3C3C8C1  C9D54040  00000000
40000000  40404040  40404040  40404040  40404040  40404040  40404040
40404040  40404040  40404040  40404040  C3C3C8C1  F0F0F0F1*
02E3E7E3  40000000  40400028  40400001  47F0F00C  07C3C3C8  C1C9D540
90ECD00C  184D98CD  F0205040  D00450D0  400807FC  40404040  40404040
40404040  40404040  40404040  40404040  C3C3C8C1  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C3C3C8C1  F0F0F0F3*
02E3E7E3  40000080  40400034  40400001  00000000  00000000  00000001
00000001  00000002  00000003  00000004  00000005  00000006  0000000E
00000038  00000000  00000000  40404040  C3C3C8C1  F0F0F0F4*
02C5E2C4  40404040  40400010  40400003  D4E5C3C8  D9404040  02000000
40000000  40404040  40404040  40404040  40404040  40404040  40404040
40404040  40404040  40404040  40404040  C3C3C8C1  F0F0F0F5*
02E3E7E3  40000188  40400008  40400001  00000000  00000000  40404040
40404040  40404040  40404040  40404040  40404040  40404040  40404040
40404040  40404040  40404040  40404040  C3C3C8C1  F0F0F0F6*
02E3E7E3  40000194  40400008  40400001  00000000  00000000  40404040
40404040  40404040  40404040  40404040  40404040  40404040  40404040
40404040  40404040  40404040  40404040  C3C3C8C1  F0F0F0F7*
02E3E7E3  40000270  40400038  40400001  5890D170  5800D064  5000D0A0
5000D0BC  5820D1B4  5020D234  5800D1B0  5000D230  5800D1C0  5000D238
5800D1C4  5000D240  5800D080  5000D21C  C3C3C8C1  F0F0F0F8*
02E3E7E3  400002A8  40400038  40400001  5880D064  18A258B0  D1645800
D0A05000  D0B01850  5C40D080  18255A20  D1B47822  90007020  D0DC1825
5A20D1BC  78229000  7020D0E0  18255A20  C3C3C8C1  F0F0F0F9*
02E3E7E3  400002E0  40400038  40400001  D1B07822  90007020  D0E41825
5A20D1C0  5020D23C  78229000  7020D0D0  18255A20  D1C45020  D2447822
90007020  D0D45850  D0BC5C40  D1B41825  C3C3C8C1  F0F0F1F0**
02E3E7E3  40000318  40400038  40400001  5A20D070  5800D0A0  5002B000
7800D0D0  7000D228  7800D0D4  7000D22C  18A858B0  D1B45880  D1607840
D2287B40  D0DC3044  7820D22C  7B20D0E0  C3C3C8C1  F0F0F1F1*
02E3E7E3  40000350  40400038  40400001  30227020  D0A87940  80044730
D3987920  80044730  D39858B0  D16458A0  D2345880  D064185A  5C40D0BC
18255A20  D2305800  D0A05002  B000185A  C3C3C8C1  F0F0F1F2*
02E3E7E3  40000388  40400038  40400001  5C40D0BC  18251A2A  5800D05C
5002B000  5820D0A0  1A285020  D0A05920  D09847C0  D38A1BFF  58E0D000
07FE5800  D0BC1A08  5000D0BC  47F0D28A  C3C3C8C1  F0F0F1F3*
02E3E7E3  400003C0  40400038  40400001  5800D058  5000D0AC  5820D0A0
1A2A5020  D0C05920  D09847C0  D3B647F0  D7687800  D0E47000  D2105800
D1B05000  D17C50B0  D1807800  D0DC7000  C3C3C8C1  F0F0F1F4*
02E3E7E3  400003F8  40400038  40400001  D1FC5800  D1BC5000  D1847800
D0E07000  D2001872  5C60D080  18075A00  D1B05000  D1901807  1A0B5000
D1941807  5A00D1BC  5000D198  18575A50  C3C3C8C1  F0F0F1F5*
02E3E7E3  40000430  40400038  40400001  D1C01847  5A40D1C4  5050D1A4
5040D1A8  18341845  5850D198  5860D194  5870D190  18A258B0  D0807827
90007020  D2047920  D2104770  D4F07846  C3C3C8C1  F0F0F1F6*
02E3E7E3  40000468  40400038  40400001  90007040  D2087B40  D1FC3064
78259000  7020D20C  7B20D200  30227020  D0A87960  800447A0  D46E7920
80044750  D49A7844  90007B40  D1FC3064  C3C3C8C1  F0F0F1F7*
02E3E7E3  400004A0  40400038  40400001  78239000  7B20D200  30227020
D0A87960  800447A0  D4967920  80044750  D4BE47F0  D4F058E0  D1A4782E
```

```
90007020  D0C458E0  D1A8782E  90007020  C3C3C8C1  F0F0F1F8*
02E3E7E3  400004D8  40400038  40400001  D0C87800  D2047000  D0CC47F0
D4D67800  D2087000  D0C47800  D20C7000  D0C87800  D2047000  D0CC5800
D0AC1BFF  870FD4E4  47F0D768  50A0D0B8  C3C3C8C1  F0F0F1F9*
02E3E7E3  40000510  40400038  40400001  5800D060  5000D0AC  5AA0D064

MEMBER NAME  CCHAIN
5800D1A8  1A0B5000  D1A85800  D1A41A0B  5000D1A4  1A3B1A4B  1A5B1A6B
1A7B59A0  D09847C0  D42E58B0  D1B458A0  C3C3C8C1  F0F0F2F0**
02E3E7E3  40000548  40400038  40400001  D0645800  D0AC1BFF  860FD530
47F0D768  5830D0BC  1B3A5030  D094193A  4750D6C8  7800D210  7000D1E0
5800D1B0  5000D184  5800D070  5000D17C  C3C3C8C1  F0F0F2F1*
02E3E7E3  40000580  40400038  40400001  50B0D178  5800D080  5000D194
7800D1FC  7000D1D4  5800D1BC  5000D198  7800D200  7000D1D8  5800D1C0
5000D19C  5800D1C4  5000D1A4  1C2B5030  C3C3C8C1  F0F0F2F2*
02E3E7E3  400005B8  40400038  40400001  D1A85860  D1BC187B  5830D164
58B63000  185B5C40  D0805050  D1801825  5A20D1B0  7800D1E0  79029000
4770D6B8  18255A20  D1787842  90007B40  C3C3C8C1  F0F0F2F3*
02E3E7E3  400005F0  40400038  40400001  D1D43064  18255A20  D1BC7822
90007B20  D1D83022  7020D0A8  79608004  47A0D5F4  79208004  47A0D5F4
47F0D768  5820D180  5A20D1C0  78429000  C3C3C8C1  F0F0F2F4*
02E3E7E3  40000628  40400038  40400001  7B40D1D4  30645820  D1805A20
D1C47822  90007B20  D1D83022  7020D0A8  79608004  47A0D630  79208004
47A0D630  47F0D768  18275A20  D18458A2  C3C3C8C1  F0F0F2F5*
02E3E7E3  40000660  40400038  40400001  3000185A  5C40D194  5050D1A0
18255A20  D1787842  90007B40  D1D43064  18255A20  D1987822  90007B20
D1D83022  7020D0A8  79608004  47A0D67C  C3C3C8C1  F0F0F2F6*
02E3E7E3  40000698  40400038  40400001  79208004  47A0D67C  47F0D768
5820D1A0  5A20D19C  78429000  7B40D1D4  30645820  D1A05A20  D1A47822
90007B20  D1D83022  7020D0A8  79608004  C3C3C8C1  F0F0F2F7*
02E3E7E3  400006D0  40400038  40400001  47A0D6B8  79208004  47A0D6B8
47F0D768  5A60D1B4  5A70D1B4  5970D1A8  47C0D59C  58B0D1B4  58A0D064
5830D0B8  5C20D080  5A30D070  4100D0E8  C3C3C8C1  F0F0F2F8*
02E3E7E3  40000708  40400038  40400001  5000D050  41039000  5000D054
9280D054  58F0D16C  4110D04C  05EF5850  D0C05C40  D0801825  5A20D070
41039000  5000D050  41029000  5000D054  C3C3C8C1  F0F0F2F9*
02E3E7E3  40000740  40400038  40400001  9280D054  58F0D16C  4110D04C
05EF4102  90005000  D0504100  D0E85000  D0549280  D05458F0  D16C4110
D04C05EF  5800D0C0  5000D0A0  7820D0C4  C3C3C8C1  F0F0F3F0**
02E3E7E3  40000778  40400038  40400001  7020D0DC  7820D0C8  7020D0E0
7820D0CC  7020D0E4  47F0D316  58B0D164  58A0D234  5880D064  7820D0DC
7020D0D0  7820D0E0  7020D0D4  58E0D23C  C3C3C8C1  F0F0F3F1*
02E3E7E3  400007B0  40400038  40400001  782E9000  7020D0DC  58E0D244
782E9000  7020D0E0  185A5C40  D0BC1825  5A20D230  5800D0A0  5002B000
185A5C40  D0BC1825  1A2A5800  D05C5002  C3C3C8C1  F0F0F3F2*
02E3E7E3  400007E8  40400038  40400001  B0007800  D0D07000  D2147800
D0D47000  D2185800  D1C45000  D1AC5830  D0A05C20  D0805030  D2205A30
D0705030  D22418A8  58B0D1B4  5880D160  C3C3C8C1  F0F0F3F3*
02E3E7E3  40000820  40400038  40400001  7840D214  7B40D0DC  30447820
D2187B20  D0E03022  7020D0A8  79408004  4730D87A  79208004  4730D87A
58B0D164  58A0D234  5880D064  185A5C40  C3C3C8C1  F0F0F3F4*
02E3E7E3  40000858  40400038  40400001  D0BC1825  5A20D230  5800D0A0
5002B000  185A5C40  D0BC1825  1A2A5800  D05C5002  B0005820  D0A01A28
5020D0A0  5920D098  47C0D86C  1BFF58E0  C3C3C8C1  F0F0F3F5*
02E3E7E3  40000890  40400038  40400001  D00007FE  5800D0BC  1A085000
D0BC47F0  D28A5800  D0585000  D0AC5820  D0A01A2A  5020D0C0  5920D098
47C0D898  47F0DCF6  7800D0E4  7000D1F8  C3C3C8C1  F0F0F3F6*
02E3E7E3  400008C8  40400038  40400001  5800D1B0  5000D17C  50B0D180
7800D0DC  7000D1E4  5800D1BC  5000D184  7800D0E0  7000D1E8  18725C60
D0801807  5A00D1B0  5000D190  18071A0B  C3C3C8C1  F0F0F3F7*
02E3E7E3  40000900  40400038  40400001  5000D194  18075A00  D1BC5000
```

```
D1981857  5A50D1C0  18475A40  D1C45050  D1A45040  D1A81834  18455850
D1985860  D1945870  D19018A2  58B0D080  C3C3C8C1  F0F0F3F8*
02E3E7E3  40000938  40400038  40400001  78279000  7020D1EC  7920D1F8
4770D9D2  78469000  7040D1F0  7B40D1E4  30647825  90007020  D1F47B20

MEMBER NAME  CCHAIN
D1E83022  7020D0A8  79608004  47A0D950  C3C3C8C1  F0F0F3F9*
02E3E7E3  40000970  40400038  40400001  79208004  4750D97C  78449000
7B40D1E4  30647823  90007B20  D1E83022  7020D0A8  79608004  47A0D978
79208004  4750D9A0  47F0D9D2  58E0D1A4  C3C3C8C1  F0F0F4F0**
02E3E7E3  400009A8  40400038  40400001  782E9000  7020D0C4  58E0D1A8
782E9000  7020D0C8  7800D1EC  7000D0CC  47F0D9B8  7800D1F0  7000D0C4
7800D1F4  7000D0C8  7800D1EC  7000D0CC  C3C3C8C1  F0F0F4F1*
02E3E7E3  400009E0  40400038  40400001  5800D0AC  1BFF870F  D9C647F0
DCF650A0  D0B85800  D0605000  D0AC5AA0  D0645800  D1A81A0B  5000D1A8
5800D1A4  1A0B5000  D1A41A3B  1A4B1A5B  C3C3C8C1  F0F0F4F2*
02E3E7E3  40000A18  40400038  40400001  1A6B1A7B  59A0D098  47C0D910
58B0D1B4  58A0D064  5800D0AC  1BFF860F  DA1247F0  DCF65830  D0BC1B3A
5030D094  193A4750  DBA27800  D1F87000  C3C3C8C1  F0F0F4F3*
02E3E7E3  40000A50  40400038  40400001  D1B85800  D1B05000  D1905800
D0705000  D17C50B0  D1785800  D0805000  D1987800  D1E47000  D1885800
D1BC5000  D19C7800  D1E87000  D18C5800  C3C3C8C1  F0F0F4F4*
02E3E7E3  40000A88  40400038  40400001  D1C05000  D1A01C2B  5030D1C8
5860D1BC  187B5830  D16458B6  3000185B  5C40D080  5050D184  18255A20
D1B07800  D1B87902  90004770  DB921825  C3C3C8C1  F0F0F4F5*
02E3E7E3  40000AC0  40400038  40400001  5A20D178  78429000  7B40D188
30641825  5A20D1BC  78229000  7B20D18C  30227020  D0A87960  800447A0
DACE7920  800447A0  DACE47F0  DCF65820  C3C3C8C1  F0F0F4F6*
02E3E7E3  40000AF8  40400038  40400001  D1845A20  D1C07842  90007B40
D1883064  5820D184  5A20D1C4  78229000  7B20D18C  30227020  D0A87960
800447A0  DB0A7920  800447A0  DB0A47F0  C3C3C8C1  F0F0F4F7*
02E3E7E3  40000B30  40400038  40400001  DCF61827  5A20D190  58A23000
185A5C40  D1985050  D1A81825  5A20D178  78429000  7B40D188  30641825
5A20D19C  78229000  7B20D18C  30227020  C3C3C8C1  F0F0F4F8*
02E3E7E3  40000B68  40400038  40400001  D0A87960  800447A0  DB567920
800447A0  DB5647F0  DCF65820  D1A85A20  D1A07842  90007B40  D1883064
5820D1A8  5A20D1AC  78229000  7B20D18C  C3C3C8C1  F0F0F4F9*
02E3E7E3  40000BA0  40400038  40400001  30227020  D0A87960  800447A0
DB927920  800447A0  DB9247F0  DCF65A60  D1B45A70  D1B45970  D1C847C0
DA7658B0  D1B458A0  D0645830  D0B85C20  C3C3C8C1  F0F0F5F0**
02E3E7E3  40000BD8  40400038  40400001  D0805A30  D0704100  D0E85000
D0504103  90005000  D0549280  D05458F0  D16C4110  D04C05EF  5850D0C0
5C40D080  18255A20  D0704103  90005000  C3C3C8C1  F0F0F5F1*
02E3E7E3  40000C10  40400038  40400001  D0504102  90005000  D0549280
D05458F0  D16C4110  D04C05EF  185B5C40  D0BC1825  5A20D070  58F0D164
5852F000  5830D0A0  5C20D080  5C40D080  C3C3C8C1  F0F0F5F2*
02E3E7E3  40000C48  40400038  40400001  5A30D070  18255A20  D07018A3
18B24100  D1205000  D050410B  90005000  D0549280  D05458F0  D16C4110
D04C05EF  410B9000  5000D050  4100D0E8  C3C3C8C1  F0F0F5F3*
02E3E7E3  40000C80  40400038  40400001  5000D054  9280D054  58F0D16C
4110D04C  05EF4100  D0E85000  D0504100  D1205000  D0549280  D05458F0
D16C4110  D04C05EF  5AB0D080  19BA47C0  C3C3C8C1  F0F0F5F4*
02E3E7E3  40000CB8  40400038  40400001  DC2E58B0  D1B458A0  D0645800
D0A01A0A  5000D0A0  5800D220  5A00D21C  5000D220  5820D224  5A20D21C
5020D224  41029000  5000D050  4100D0E8  C3C3C8C1  F0F0F5F5*
02E3E7E3  40000CF0  40400038  40400001  5000D054  9280D054  58F0D16C
4110D04C  05EF7820  D0C47020  D0DC7820  D0C87020  D0E07820  D0CC7020
D0E447F0  D7F858B0  D16458A0  D2345880  C3C3C8C1  F0F0F5F6*
02E3E7E3  40000D28  40400038  40400001  D064185A  5C40D0BC  18255A20
D2305800  D0A05002  B000185A  5C40D0BC  18251A2A  5800D05C  5002B000
5820D0A0  1A285020  D0A05920  D09847C0  C3C3C8C1  F0F0F5F7*
```

| | | | | | | |
|---|---|---|---|---|---|---|
| 02E3E7E3 | 40000D60 | 40400038 | 40400001 | DD421BFF | 58E0D000 | 07FE5800 |
| D0BC1A08 | 5000D0BC | 47F0D28A | 58A0D004 | 58E0A00C | 58B0A018 | 5810B00C |
| 5820D0BC | 50201000 | 18DA92FF | A00C982C | C3C3C8C1 | F0F0F5F8* | |

MEMBER NAME CCHAIN

| | | | | | | |
|---|---|---|---|---|---|---|
| 02E3E7E3 | 40000D98 | 40400038 | 40400001 | A01C07FE | 98791004 | 58207000 |
| 5020D098 | 58209000 | 5020D0BC | 58201000 | 41302000 | 41500004 | 1B255C40 |
| D07C1B25 | 5020D170 | 5030D174 | 58201008 | C3C3C8C1 | F0F0F5F9* | |
| 02E3E7E3 | 40000DD0 | 4040001C | 40400001 | 41302000 | 41500004 | 1B255C40 |
| D06C1B25 | 5020D164 | 5030D168 | 47F0D248 | 40404040 | 40404040 | 40404040 |
| 40404040 | 40404040 | 40404040 | 40404040 | C3C3C8C1 | F0F0F6F0** | |
| 02E3E7E3 | 40000020 | 4040000C | 40400001 | 00000D9C | 00000028 | 00000D78 |
| 40404040 | 40404040 | 40404040 | 40404040 | 40404040 | 40404040 | 40404040 |
| 40404040 | 40404040 | 40404040 | 40404040 | C3C3C8C1 | F0F0F6F1* | |
| 02E3E7E3 | 40000074 | 40400004 | 40400001 | 000000A8 | 40404040 | 40404040 |
| 40404040 | 40404040 | 40404040 | 40404040 | 40404040 | 40404040 | 40404040 |
| 40404040 | 40404040 | 40404040 | 40404040 | C3C3C8C1 | F0F0F6F2* | |
| 02E3E7E3 | 4000007C | 40400004 | 40400001 | 80000000 | 40404040 | 40404040 |
| 40404040 | 40404040 | 40404040 | 40404040 | 40404040 | 40404040 | 40404040 |
| 40404040 | 40404040 | 40404040 | 40404040 | C3C3C8C1 | F0F0F6F3* | |
| 02E3E7E3 | 400001A0 | 40400038 | 40400001 | 00000000 | 00000000 | 00000000 |
| 00000000 | 00000000 | 00000000 | 00000000 | 00000000 | 00000000 | 00000000 |
| 00000000 | 00000000 | 00000000 | 00000000 | C3C3C8C1 | F0F0F6F4* | |
| 02E3E7E3 | 400001D8 | 40400038 | 40400001 | 00000008 | 0000000C | 00000000 |
| 00000010 | 00000014 | 00000018 | 00000000. | 00000000 | 00000000 | 00000000 |
| 00000000 | 00000000 | 00000000 | 00000000 | C3C3C8C1 | F0F0F6F5* | |
| 02E3E7E3 | 40000210 | 40400038 | 40400001 | 00000000 | 00000000 | 00940007 |
| 00D80008 | 00000000 | 00A00009 | 012C0009 | 00A4000A | 00A8000A | 00AC000A |
| 00B0000B | 00B4000B | 00B8000B | 00F4000C | C3C3C8C1 | F0F0F6F6* | |
| 02E3E7E3 | 40000248 | 40400028 | 40400001 | 00C0000C | 00C4000C | 00C8000D |
| 00CC000D | 00D0000D | 00F0000E | 0194000E | 00DC000E | 0124000F | 0128000F |
| 40404040 | 40404040 | 40404040 | 40404040 | C3C3C8C1 | F0F0F6F7* | |
| 02D9D3C4 | 40404040 | 40400030 | 40404040 | 00020001 | 0C000188 | 00030001 |
| 1C000194 | 00010001 | 0C000020 | 00010001 | 0C000024 | 00010001 | 0C000028 |
| 00010001 | 0C000074 | 40404040 | 40404040 | C3C3C8C1 | F0F0F6F8* | |
| 02C5D5C4 | 40404040 | 40404040 | 40404040 | 40404040 | 40404040 | 40404040 |
| 00000DEC | F1F5F7F3 | F460C6D6 | F34040F0 | F2F0F2F8 | F7F0F9F8 | 40F0F84B |
| F1F34BF2 | F8404040 | C3C3C8C1 | C9D54040 | C3C3C8C1 | F0F0F6F9** | |

MEMBER NAME CHAIN1

| | | | | | | |
|---|---|---|---|---|---|---|
| 02C5E2C4 | 40404040 | 40400010 | 40400001 | C3C8C1C9 | D5F14040 | 00000000 |
| 40000000 | 40404040 | 40404040 | 40404040 | 40404040 | 40404040 | 40404040 |
| 40404040 | 40404040 | 40404040 | 40404040 | C3C8C1C9 | F0F0F0F1* | |
| 02E3E7E3 | 40000000 | 40400028 | 40400001 | 47F0F00C | 07C3C8C1 | C9D5F140 |
| 90ECD00C | 184D98CD | F0205040 | D00450D0 | 400807FC | 40404040 | 40404040 |
| 40404040 | 40404040 | 40404040 | 40404040 | C3C8C1C9 | F0F0F0F2* | |
| 02E3E7E3 | 40000098 | 40400018 | 40400001 | 00000000 | 00000001 | 00000002 |
| 00000004 | 00000000 | 00000000 | 40404040 | 40404040 | 40404040 | 40404040 |
| 40404040 | 40404040 | 40404040 | 40404040 | C3C8C1C9 | F0F0F0F3* | |
| 02C5E2C4 | 40404040 | 40400010 | 40400002 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C3C8C1C9 | F0F0F0F4* | |
| 02E3E7E3 | 40000148 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3C8C1C9 | F0F0F0F5* | |
| 02E3E7E3 | 40000150 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C3C8C1C9 | F0F0F0F6* | |
| 02E3E7E3 | 40000170 | 40400038 | 40400001 | 5890D120 | 58B0D12C | 5880D074 |
| 5800D0B0 | 89000002 | 5000D0C8 | 5820D094 | 1A285020 | D09C5830 | D0981A38 |
| 5030D0A0 | 5840D0A8 | 1B485040 | D0AC5850 | C3C8C1C9 | F0F0F0F7* | |

```
02E3E7E3  400001A8  40400038  40400001  D0988950  00025870  D0B08970
00021C68  1A577805  B0007000  D0BC8930  00025030  D1445870  D0B08970
00021C68  18531A57  7805B000  7000D0C0  C3C8C1C9  F0F0F0F8*
02E3E7E3  400001E0  40400038  40400001  5850D094  89500002  5870D0B0
89700002  1C681A57  7825B000  70209004  89200002  5020D140  5870D0B0
89700002  1C681852  1A577825  B0007020  C3C8C1C9  F0F0F0F9*
02E3E7E3  40000218  40400038  40400001  90081244  4780D4E2  5080D088
18631872  58A0D07C  5820D088  1A285020  D08C5020  D09018A2  78409004
5820D094  89200002  5850D0B0  89500002  C3C8C1C9  F0F0F1F0**
02E3E7E3  40000250  40400038  40400001  1C4A1A25  38247B22  B0003062
7960D0B8  4730D32E  78209008  5850D0B0  89500002  1C4A1825  1A277B22
B0003062  7960D0B8  4730D32E  50A0D090  C3C8C1C9  F0F0F1F1*
02E3E7E3  40000288  40400038  40400001  58A0D07C  5820D098  89200002
5850D0B0  89500002  5C40D090  1A257822  B0007020  90045850  D0B08950
00025C40  D0901825  1A267822  B0007020  C3C8C1C9  F0F0F1F2*
02E3E7E3  400002C0  40400038  40400001  90085800  D0905900  D08C4780
D4565850  D0B08950  00025C40  D08C1825  1A2A4102  B0005000  D0549280
D05458F0  D1284110  D04C05EF  5830D0B0  C3C8C1C9  F0F0F1F3*
02E3E7E3  400002F8  40400038  40400001  89300002  5C20D08C  1A3A5850
D0B08950  00025C40  D0901825  1A2A4103  B0005000  D05C4102  B0005000
D0609280  D06058F0  D1284110  D05805EF  C3C8C1C9  F0F0F1F4*
02E3E7E3  40000330  40400038  40400001  5850D0B0  89500002  5C40D090
18251A2A  4102B000  5000D068  58F0D128  4110D064  05EF47F0  D4565820
D0988920  00025850  D0B08950  00021C4A  C3C8C1C9  F0F0F1F5*
02E3E7E3  40000368  40400038  40400001  1A253824  7B22B000  30627960
D0B84730  D4447820  90085850  D0B08950  00021C4A  18251A26  7B22B000
30627960  D0B84730  D44450A0  D09058A0  C3C8C1C9  F0F0F1F6*
02E3E7E3  400003A0  40400038  40400001  D07C5820  D0948920  00025850
D0B08950  00025C40  D0901A25  7822B000  70209004  5850D0B0  89500002
5C40D090  18251A27  7822B000  70209008  C3C8C1C9  F0F0F1F7*
02E3E7E3  400003D8  40400038  40400001  5800D090  5900D08C  4780D456
5850D0B0  89500002  5C40D08C  18251A2A  4102B000  5000D054  9280D054
58F0D128  4110D04C  05EF5830  D0B08930  C3C8C1C9  F0F0F1F8*
02E3E7E3  40000410  40400038  40400001  00025C20  D08C1A3A  5850D0B0
89500002  5C40D090  18251A2A  4103B000  5000D05C  4102B000  5000D060
9280D060  58F0D128  4110D058  05EF5850  C3C8C1C9  F0F0F1F9*
02E3E7E3  40000448  40400038  40400001  D0B08950  00025C40  D0901825

MEMBER NAME  CHAIN1
1A2A4102  B0005000  D06858F0  D1284110  D06405EF  47F0D456  1AA859A0
D0A847C0  D21450A0  D09047F0  D4C27820  C3C8C1C9  F0F0F2F0**
02E3E7E3  40000480  40400038  40400001  90047B20  D0BC3022  7920D0B8
4730D47E  78209008  7B20D0C0  30227920  D0B84730  D47E47F0  D4B25800
D08C5000  D0885900  D0AC47C0  D2047820  C3C8C1C9  F0F0F2F1*
02E3E7E3  400004B8  40400038  40400001  90047B20  D0BC3022  7920D0B8
4730D4D0  78209008  7B20D0C0  30227920  D0B84730  D4D05800  D08C5000
D0B41BFF  58E0D000  07FE5800  D08C1B08  C3C8C1C9  F0F0F2F2*
02E3E7E3  400004F0  40400038  40400001  5000D0B4  47F0D4D8  5800D08C
5000D0B4  41F00004  58E0D000  07FE5080  D0B441F0  000458E0  D00007FE
58A0D004  58E0A00C  58B0A018  5810B00C  C3C8C1C9  F0F0F2F3*
02E3E7E3  40000528  40400038  40400001  5820D0B4  50201000  5830B010
5840D094  50403000  5850B014  5860D098  50605000  18DA92FF  A00C982C
A01C07FE  987B1004  58207000  5020D0B0  C3C8C1C9  F0F0F2F4*
02E3E7E3  40000560  40400038  40400001  58208000  5020D0A8  58209000
5020D0B4  5820A000  5020D094  5820B000  5020D098  98781018  78207000
7020D0B8  58201000  41302000  41500004  C3C8C1C9  F0F0F2F5*
02E3E7E3  40000598  4040002A  40400001  1B255C40  D0B01B25  5020D12C
5030D130  5820101C  41302000  41500004  1B255020  D1205030  D12447F0
D1484040  40404040  40404040  40404040  C3C8C1C9  F0F0F2F6*
02E3E7E3  40000020  4040000C  40400001  00000554  00000028  00000518
40404040  40404040  40404040  40404040  40404040  40404040  40404040
```

```
40404040  40404040  40404040  40404040  C3C8C1C9  F0F0F2F7*
02E3E7E3  40000074  40400010  40400001  000000F0  000000F4  80000000
000000F0  40404040  40404040  40404040  40404040  40404040  40404040
40404040  40404040  40404040  40404040  C3C8C1C9  F0F0F2F8*
02E3E7E3  40000088  40400008  40400001  80000000  000000F0  40404040
40404040  40404040  40404040  40404040  40404040  40404040  40404040
40404040  40404040  40404040  40404040  C3C8C1C9  F0F0F2F9*
02D9D3C4  40404040  40400038  40404040  00020001  1C000150  00010001
0C000020  00010001  0C000024  00010001  0C000028  00010001  0C000074
00010001  0C000078  00010001  0C000080  C3C8C1C9  F0F0F3F0**
02E3E7E3  40000094  40400004  40400001  800000F4  40404040  40404040
40404040  40404040  40404040  40404040  40484040  40404040  40404040
40404040  40404040  40404040  40404040  C3C8C1C9  F0F0F3F1*
02E3E7E3  4000015C  40400014  40400001  00000000  00000000  00000000
00000000  00000000  40404040  40404040  40404040  40404040  40404040
40404040  40404040  40404040  40404040  C3C8C1C9  F0F0F3F2*
02D9D3C4  40404040  40400010  40404040  00010001  0C00008C  00010001
0C000094  40404040  40404040  40404040  40404040  40404040  40404040
40404040  40404040  40404040  40404040  C3C8C1C9  F0F0F3F3*
02C5D5C4  40404040  40404040  40404040  40404040  40404040  40404040
000005C2  F1F5F7F3  F460C6D6  F34040F0  F2F0F2F8  F7F0F9F8  40F0F84B
F1F34BF3  F4404040  C3C8C1C9  D5F14040  C3C8C1C9  F0F0F3F4**

MEMBER NAME  CHECK
02C5E2C4  40404040  40400010  40400001  C3C8C5C3  D2404040  00000000
40000000  40404040  40404040  40404040  40404040  40404040  40404040
40404040  40404040  40404040  40404040  C3C8C5C3  F0F0F0F1*
02E3E7E3  40000000  40400028  40400001  47F0F00C  07C3C8C5  C3D24040
90ECD00C  184D98CD  F0205040  D00450D0  400807FC  40404040  40404040
40404040  40404040  40404040  40404040  C3C8C5C3  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C3C8C5C3  F0F0F0F3*
02E3E7E3  40000078  40400020  40400001  00000000  00000001  00000003
00000004  00000005  00000006  00000000  00000000  40404040  40404040
40404040  40404040  40404040  40404040  C3C8C5C3  F0F0F0F4*
02E3E7E3  400000A8  40400008  40400001  00000000  00000000  40404040
40404040  40404040  40404040  40404040  40404040  40404040  40404040
40404040  40404040  40404040  40404040  C3C8C5C3  F0F0F0F5*
02E3E7E3  400000B4  40400004  40400001  00000000  40404040  40404040
40404040  40404040  40404040  40404040  40404040  40404040  40404040
40404040  40404040  40404040  40404040  C3C8C5C3  F0F0F0F6*
02E3E7E3  400000C8  40400038  40400001  58A0D08C  58B0D084  58F0D080
7840F004  5890D050  5880D054  5090D070  7820A00C  7020D094  33227A20
B00C3062  39644730  D0E27820  B0107B20  C3C8C5C3  F0F0F0F7*
02E3E7E3  40000100  40400038  40400001  A0103062  396447C0  D15C7820
B0147020  D0987B20  D0943062  39644730  D1067820  B0187B20  A0103062
396447C0  D15C7820  A0147020  D09C3322  C3C8C5C3  F0F0F0F8*
02E3E7E3  40000138  40400038  40400001  7A20D098  30623964  4730D12C
7820B018  7B20A018  30623964  47C0D15C  7820B00C  7B20D09C  30623964
47C0D144  1BFF58E0  D00007FE  7820B010  C3C8C5C3  F0F0F0F9*
02E3E7E3  40000170  40400038  40400001  7B20A018  30623964  47C0D15C
1BFF58E0  D00007FE  5080D070  1BFF58E0  D00007FE  58A0D004  58E0A00C
58B0A018  5810B008  5820D070  50201000  C3C8C5C3  F0F0F1F0**
02E3E7E3  400001A8  40400038  40400001  18DA92FF  A00C982C  A01C07FE
58701008  58207000  5020D070  58201000  41302000  41500004  1B255020
D0845030  D0885820  10044130  20004150  C3C8C5C3  F0F0F1F1*
02E3E7E3  400001E0  40400010  40400001  00041B25  5020D08C  5030D090
47F0D0A0  40404040  40404040  40404040  40404040  40404040  40404040
40404040  40404040  40404040  40404040  C3C8C5C3  F0F0F1F2*
02E3E7E3  40000020  4040000C  40400001  000001B4  00000028  00000190
```

```
40404040  40404040  40404040  40404040  40404040  40404040  40404040
40404040  40404040  40404040  40404040  C3C8C5C3  F0F0F1F3*
02E3E7E3  400000BC  4040000C  40400001  00000000  00000000  00000000
40404040  40404040  40404040  40404040  40404040  40404040  40404040
40404040  40404040  40404040  40404040  C3C8C5C3  F0F0F1F4*
02D9D3C4  40404040  40400020  40404040  00020001  0C0000A8  00010001
0C000020  00010001  0C000024  00010001  0C000028  40404040  40404040
40404040  40404040  40404040  40404040  C3C8C5C3  F0F0F1F5*
02C5D5C4  40404040  40404040  40404040  40404040  40404040  40404040
000001F0  F1F5F7F3  F460C6D6  F34040F0  F2F0F2F8  F7F0F9F8  40F0F84B
F1F34BF3  F9404040  C3C8C5C3  D2404040  C3C8C5C3  F0F0F1F6**

MEMBER NAME  CHGMOD
02C5E2C4  40404040  40400010  40400001  C3C8C7D4  D6C44040  00000000
40000000  40404040  40404040  40404040  40404040  40404040  40404040
40404040  40404040  40404040  40404040  C3C8C7D4  F0F0F0F1*
02E3E7E3  40000000  40400038  40400001  47F0F00C  07C3C8C7  D4D6C440
90ECD00C  184D98CD  F0205040  D00450D0  400807FC  40404040  40404040
021A0FD9  C5C6C9D3  C540C5D9  D9D6D940  C3C8C7D4  F0F0F0F2*
02E3E7E3  40000038  40400011  40400001  7E401003  1A0A40C9  D540C3C8
C7D4D6C4  22404040  40404040  40404040  40404040  40404040  40404040
40404040  40404040  40404040  40404040  C3C8C7D4  F0F0F0F3*
02C5E2C4  40404040  40400010  40400002  D6D7E3C9  D6D54040  05000000
40000020  40404040  40404040  40404040  40404040  40404040  40404040
40404040  40404040  40404040  40404040  C3C8C7D4  F0F0F0F4*
02E3E7E3  40000100  4040001C  40400001  00000001  00000002  00000004
00000008  00000080  00000000  00000000  40404040  40404040  40404040
40404040  40404040  40404040  40404040  C3C8C7D4  F0F0F0F5*
02C5E2C4  40404040  40400010  40400003  C7D9E4D7  40404040  05000000
4000000C  40404040  40404040  40404040  40404040  40404040  40404040
40404040  40404040  40404040  40404040  C3C8C7D4  F0F0F0F6*
02C5E2C4  40404040  40400010  40400004  C3C1C4E2  E3404040  02000000
40000000  40404040  40404040  40404040  40404040  40404040  40404040
40404040  40404040  40404040  40404040  C3C8C7D4  F0F0F0F7*
02C5E2C4  40404040  40400010  40400005  D4E5C3C8  D9404040  02000000
40000000  40404040  40404040  40404040  40404040  40404040  40404040
40404040  40404040  40404040  40404040  C3C8C7D4  F0F0F0F8*
02C5E2C4  40404040  40400010  40400006  C3C1C4C6  C9D34040  02000000
40000000  40404040  40404040  40404040  40404040  40404040  40404040
40404040  40404040  40404040  40404040  C3C8C7D4  F0F0F0F9*
02C5E2C4  40404040  40400010  40400007  C3C1C4D5  E2C84040  02000000
40000000  40404040  40404040  40404040  40404040  40404040  40404040
40404040  40404040  40404040  40404040  C3C8C7D4  F0F0F1F0**
02C5E2C4  40404040  40400010  40400008  C9C2C3D6  D47B4040  02000000
40000000  40404040  40404040  40404040  40404040  40404040  40404040
40404040  40404040  40404040  40404040  C3C8C7D4  F0F0F1F1*
02C5E2C4  40404040  40400010  40400009  D4D6C4E2  D9E34040  02000000
40000000  40404040  40404040  40404040  40404040  40404040  40404040
40404040  40404040  40404040  40404040  C3C8C7D4  F0F0F1F2*
02E3E7E3  40000168  40400020  40400001  00000000  00000000  00000000
00000000  00000000  00000000  00000000  00000000  40404040  40404040
40404040  40404040  40404040  40404040  C3C8C7D4  F0F0F1F3*
02D9D3C4  40404040  40400038  40404040  00020001  0C000168  00030001
0C00016C  00040001  1C000170  00050001  1C000174  00060001  1C000178
00070001  1C00017C  00080001  1C000180  C3C8C7D4  F0F0F1F4*
02E3E7E3  40000188  40400038  40400001  58B0D11C  58A0D0B0  5890D0C4
59A0D0CC  4780D17A  50A0D0EC  58F0D118  5800F008  8609D166  58F0D128
4110D054  05EF5800  D0EC5900  D0B84780  C3C8C7D4  F0F0F1F5*
02E3E7E3  400001C0  40400038  40400001  D14C59A0  D0EC4770  D1E258F0
D1344110  D06005EF  58F0D124  4110D080  05EF4100  D1085000  D0904100
B0045000  D0949280  D09458F0  D1244110  C3C8C7D4  F0F0F1F6*
```

02E3E7E3 400001F8 40400038 40400001 D08C05EF 58F0D120 4110D098
05EF58F0 D12C4110 D0A405EF 41E00004 15FE4720 D1D058EF D04C07FE
5800D0CC 1A0A5000 D0CC1BFF 58E0D000 C3C8C7D4 F0F0F1F7*
02E3E7E3 40000230 40400038 40400001 07FE58F0 D1301800 45E0F004
00000006 00000028 45E0F008 0450D0EC 45E0F010 58F0D130 45E0F034
05404040 F1F158A0 D00458E0 A00C58B0 C3C8C7D4 F0F0F1F8*
02E3E7E3 40000268 4040002A 40400001 A0185810 B0005820 D0CC5020
100018DA 92FFA00C 982CA01C 07FE5870 10005820 70005020 D0CC47F0
D1384040 40404040 40404040 40404040 C3C8C7D4 F0F0F1F9*
02E3E7E3 40000020 40400008 40400001 00000282 00000050 40404040

MEMBER NAME CHGMOD
40404040 40404040 40404040 40404040 40404040 40404040 40404040
40404040 40404040 40404040 40404040 C3C8C7D4 F0F0F2F0**
02E3E7E3 40000050 40400004 40400001 0000025E 40404040 40404040
40404040 40404040 40404040 40404040 40404040 40404040 40404040
40404040 40404040 40404040 40404040 C3C8C7D4 F0F0F2F1*
02E3E7E3 4000009C 4040000C 40400001 00000220 00000220 00000104
40404040 40404040 40404040 40404040 40404040 40404040 40404040
40404040 40404040 40404040 40404040 C3C8C7D4 F0F0F2F2*
02D9D3C4 40404040 40400038 40404040 00090001 1C000184 00010001
0C000240 00010001 0C000020 00010001 0C000024 00010001 0C000050
00010001 0C00009C 00010001 0C0000A0 C3C8C7D4 F0F0F2F3*
02E3E7E3 400000A8 4040001C 40400001 0000013C 80000134 00000108
0000011C 00000128 00000120 0000012C 40404040 40404040 40404040
40404040 40404040 40404040 40404040 C3C8C7D4 F0F0F2F4*
02D9D3C4 40404040 40400038 40404040 00010001 0C0000A4 00010001
0C0000A8 00010001 0C0000AC 00010001 0C0000B0 00010001 0C0000B4
00010001 0C0000B8 00010001 0C0000BC C3C8C7D4 F0F0F2F5*
02E3E7E3 400000C4 4040001C 40400001 00000138 00000140 80000142
00000108 00000124 80000000 0000010C 40404040 40404040 40404040
40404040 40404040 40404040 40404040 C3C8C7D4 F0F0F2F6*
02D9D3C4 40404040 40400038 40404040 00010001 0C0000C0 00010001
0C0000C4 00010001 0C0000C8 00010001 0C0000CC 00010001 0C0000D0
00010001 0C0000D4 00030001 0C0000D8 C3C8C7D4 F0F0F2F7*
02E3E7E3 400000E4 40400018 40400001 80000000 00000142 00000158
80000000 00000110 80000110 40404040 40404040 40404040 40404040
40404040 40404040 40404040 40404040 C3C8C7D4 F0F0F2F8*
02D9D3C4 40404040 40400030 40404040 00010001 0C0000DC 00010001
0C0000E8 00010001 0C0000EC 00030001 0C0000F0 00010001 0C0000F4
00010001 0C0000F8 40404040 40404040 C3C8C7D4 F0F0F2F9*
02C5D5C4 40404040 40404040 40404040 40404040 40404040 40404040
00000292 F1F5F7F3 F460C6D6 F34040F0 F2F0F2F8 F7F0F9F8 40F0F84B
F1F34BF4 F3404040 C3C8C7D4 D6C44040 C3C8C7D4 F0F0F3F0**

MEMBER NAME CHORDY
02C5E2C4 40404040 40400010 40400001 C3C8D6D9 C4E84040 00000000
40000000 40404040 40404040 40404040 40404040 40404040 40404040
40404040 40404040 40404040 40404040 C3C8D6D9 F0F0F0F1*
02E3E7E3 40000000 40400028 40400001 47F0F00C 07C3C8D6 D9C4E840
90ECD00C 184D98CD F0205040 D00450D0 400807FC 40404040 40404040
40404040 40404040 40404040 40404040 C3C8D6D9 F0F0F0F2*
02C5E2C4 40404040 40400010 40400002 C4E2D8D9 E3404040 02000000
40000000 40404040 40404040 40404040 40404040 40404040 40404040
40404040 40404040 40404040 40404040 C3C8D6D9 F0F0F0F3*
02E3E7E3 40000078 40400018 40400001 00000001 00000002 00000003
00000004 00000000 00000000 40404040 40404040 40404040 40404040
40404040 40404040 40404040 40404040 C3C8D6D9 F0F0F0F4*
02E3E7E3 400000B8 40400008 40400001 00000000 00000000 40404040
40404040 40404040 40404040 40404040 40404040 40404040 40404040
40404040 40404040 40404040 40404040 C3C8D6D9 F0F0F0F5*

| | | | | | | |
|---|---|---|---|---|---|---|
| 02E3E7E3 | 400000D4 | 40400038 | 40400001 | 58B0D094 | 6820B018 | 6B20B008 |
| 6020D070 | 6840B020 | 6B40B010 | 6040D078 | 28042D02 | 6000D088 | 2C222C44 |
| 2A246020 | D0A058F0 | D0904110 | D04C05EF | C3C8D6D9 | F0F0F0F6* | |
| 02E3E7E3 | 4000010C | 40400038 | 40400001 | 6000D080 | 1BFF58E0 | D00007FE |
| 58A0D004 | 58E0A00C | 58B0A018 | 5810B004 | 6820D088 | 60201000 | 5820B008 |
| 6840D080 | 60402000 | 18DA92FF | A00C982C | C3C8D6D9 | F0F0F0F7* | |
| 02E3E7E3 | 40000144 | 40400032 | 40400001 | A01C07FE | 98781004 | 68207000 |
| 6020D088 | 68208000 | 6020D080 | 58201000 | 41302000 | 41500008 | 1B255020 |
| D0945030 | D09847F0 | D0AC4040 | 40404040 | C3C8D6D9 | F0F0F0F8* | |
| 02E3E7E3 | 40000020 | 4040000C | 40400001 | 00000148 | 00000028 | 00000118 |
| 40404040 | 40404040 | 40404040 | 40404040 | 40404040 | 40404040 | 40404040 |
| 40404040 | 40404040 | 40404040 | 40404040 | C3C8D6D9 | F0F0F0F9* | |
| 02E3E7E3 | 40000074 | 40400004 | 40400001 | 800000C8 | 40404040 | 40404040 |
| 40404040 | 40404040 | 40404040 | 40404040 | 40404040 | 40404040 | 40404040 |
| 40404040 | 40404040 | 40404040 | 40404040 | C3C8D6D9 | F0F0F1F0** | |
| 02E3E7E3 | 400000C4 | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | C3C8D6D9 | F0F0F1F1* | |
| 02D9D3C4 | 40404040 | 40400028 | 40404040 | 00020001 | 1C0000B8 | 00010001 |
| 0C000020 | 00010001 | 0C000024 | 00010001 | 0C000028 | 00010001 | 0C000074 |
| 40404040 | 40404040 | 40404040 | 40404040 | C3C8D6D9 | F0F0F1F2* | |
| 02C5D5C4 | 40404040 | 40404040 | 40404040 | 40404040 | 40404040 | 40404040 |
| 00000176 | F1F5F7F3 | F460C6D6 | F34040F0 | F2F0F2F8 | F7F0F9F8 | 40F0F84B |
| F1F34BF4 | F7404040 | C3C8D6D9 | C4E84040 | C3C8D6D9 | F0F0F1F3** | |

MEMBER NAME CONSTR

| | | | | | | |
|---|---|---|---|---|---|---|
| 02C5E2C4 | 40404040 | 40400010 | 40400001 | C3D6D5E2 | E3D94040 | 00000000 |
| 40000000 | 40404040 | 40404040 | 40404040 | 40404040 | 40404040 | 40404040 |
| 40404040 | 40404040 | 40404040 | 40404040 | C3D6D5E2 | F0F0F0F1* | |
| 02E3E7E3 | 40000000 | 40400028 | 40400001 | 47F0F00C | 07C3D6D5 | E2E3D940 |
| 90ECD00C | 184D98CD | F0205040 | D00450D0 | 400807FC | 40404040 | 40404040 |
| 40404040 | 40404040 | 40404040 | 40404040 | C3D6D5E2 | F0F0F0F2* | |
| 02E3E7E3 | 400000D8 | 40400038 | 40400001 | 00000000 | 00000000 | 37119799 |
| 812DEA11 | 3D68DB8B | AC710CB3 | 41100000 | 00000000 | 41200000 | 00000000 |
| 41300000 | 00000000 | 00000000 | 00000001 | C3D6D5E2 | F0F0F0F3* | |
| 02C5E2C4 | 40404040 | 40400010 | 40400002 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | C3D6D5E2 | F0F0F0F4* | |
| 02E3E7E3 | 40000110 | 40400038 | 40400001 | 00000002 | 00000003 | 00000004 |
| 00000005 | 00000006 | 00000007 | 00000008 | 00000009 | 0000000A | 0000000B |
| 00000018 | 00000058 | 00000000 | 00000000 | C3D6D5E2 | F0F0F0F5* | |
| 02E3E7E3 | 400002C0 | 4040000C | 40400001 | FFFFFFA0 | 00001130 | 00000000 |
| 40404040 | 40404040 | 40404040 | 40404040 | 40404040 | 40404040 | 40404040 |
| 40404040 | 40404040 | 40404040 | 40404040 | C3D6D5E2 | F0F0F0F6* | |
| 02E3E7E3 | 400002D0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D6D5E2 | F0F0F0F7* | |
| 02E3E7E3 | 400002D8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D6D5E2 | F0F0F0F8* | |
| 02E3E7E3 | 400002E0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D6D5E2 | F0F0F0F9* | |
| 02E3E7E3 | 400002E8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D6D5E2 | F0F0F1F0** | |
| 02E3E7E3 | 400002F0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D6D5E2 | F0F0F1F1* | |
| 02E3E7E3 | 400002F8 | 40400004 | 40400001 | 00000000 | 40404040 | 40404040 |
| 40404040 | 40404040 | 40404040 | 40404040 | 40404040 | 40404040 | 40404040 |

40404040 40404040 40404040 40404040 C3D6D5E2 F0F0F1F2*
02C5E2C4 40404040 40400010 40400003 C4C3D6E2 40404040 02000000
40000000 40404040 40404040 40404040 40404040 40404040 40404040
40404040 40404040 40404040 40404040 C3D6D5E2 F0F0F1F3*
02E3E7E3 40000300 40400004 40400001 00000000 40404040 40404040
40404040 40404040 40404040 40404040 40404040 40404040 40404040
40404040 40404040 40404040 40404040 C3D6D5E2 F0F0F1F4*
02C5E2C4 40404040 40400010 40400004 C4E2C9D5 40404040 02000000
40000000 40404040 40404040 40404040 40404040 40404040 40404040
40404040 40404040 40404040 40404040 C3D6D5E2 F0F0F1F5*
02E3E7E3 40000308 4040000C 40400001 00000000 00000000 00000000
40404040 40404040 40404040 40404040 40404040 40404040 40404040
40404040 40404040 40404040 40404040 C3D6D5E2 F0F0F1F6*
02C5E2C4 40404040 40400010 40400005 C8C4C7C5 D3C54040 02000000
40000000 40404040 40404040 40404040 40404040 40404040 40404040
40404040 40404040 40404040 40404040 C3D6D5E2 F0F0F1F7*
02E3E7E3 40000318 40400004 40400001 00000000 40404040 40404040
40404040 40404040 40404040 40404040 40404040 40404040 40404040
40404040 40404040 40404040 40404040 C3D6D5E2 F0F0F1F8*
02E3E7E3 40000320 40400004 40400001 00000000 40404040 40404040
40404040 40404040 40404040 40404040 40404040 40404040 40404040
40404040 40404040 40404040 40404040 C3D6D5E2 F0F0F1F9*
02E3E7E3 400001A0 40400008 40400001 42394BB8 348F53C5 40404040

MEMBER NAME CONSTR
40404040 40404040 40404040 40404040 40404040 40404040 40404040
40404040 40404040 40404040 40404040 C3D6D5E2 F0F0F2F0**
02E3E7E3 400003D4 40400038 40400001 58B0D100 58A0D0E4 6800D0B0
6000D190 182A5830 D0F05850 D1145860 D0F01873 188A18B2 58A0D298
5890D2E8 18355C27 90006800 D1906A03 C3D6D5E2 F0F0F2F1*
02E3E7E3 4000040C 40400038 40400001 A0586000 D1901AB8 1A7659B0
D14C47C0 D3D858B0 D10058A0 D0E46820 D1906D20 D0D02322 6020D188
50A0D120 5800D110 5000D30C 50B0D318 C3D6D5E2 F0F0F2F2*
02E3E7E3 40000444 40400038 40400001 185B5860 D11058B0 D0EC6860
D0B05890 D2C05880 D2C85870 D2D05840 D2A858E0 D318606E 9000606E
8000606E 700059B0 D1204100 00014780 C3D6D5E2 F0F0F2F3*
02E3E7E3 4000047C 40400038 40400001 D4581B00 5000D304 18365A30
D3181826 5A20D318 187A1883 18925850 D2A05830 D2B0197B 41200001
4780D482 1B225620 D3041BFF 862FD494 C3D6D5E2 F0F0F2F4*
02E3E7E3 400004B4 40400038 40400001 58F0D2B8 6068F000 60695000
60694000 60693000 1A961A86 877AD476 5870D2D0 5880D2C8 5890D2C0
5850D100 5800D318 1A055000 D3185820 C3D6D5E2 F0F0F2F5*
02E3E7E3 400004EC 40400038 40400001 D1201A2A 5020D120 192B47C0
D43A58B0 D1006800 D0B06000 D17050A0 D12C5800 D0F05000 D38C50B0
D390188A 5890D110 18AB58B0 D2986800 C3D6D5E2 F0F0F2F6*
02E3E7E3 40000524 40400038 40400001 D0B06000 D1F06800 D0B06000
D1F86800 D0B06000 D1D06800 D0B06000 D1E858E0 D38C58F0 D2E8583E
F0005030 D1305C20 D1145030 D3746823 C3D6D5E2 F0F0F2F7*
02E3E7E3 4000055C 40400038 40400001 B0206020 D2006843 B0186040
D3982C44 6863B010 2C466823 B0082D42 23446A40 D0C82D24 6020D1C0
28262D24 6020D1E0 6820D398 2C262D24 C3D6D5E2 F0F0F2F8*
02E3E7E3 40000594 40400038 40400001 6020D1C8 6020D1D8 58E0D390
58F0D2F0 680EF000 6D00D178 6000D150 58F0D2E0 4110D04C 05EF6000
D3986000 D15858F0 D2E44110 D04C05EF C3D6D5E2 F0F0F2F9*
02E3E7E3 400005CC 40400038 40400001 6000D3A0 6000D160 6820D398
2C226020 D3206020 D2506020 D2706840 D3A02C44 6040D328 6040D268
6040D258 6860D398 6C60D3A0 6060D280 C3D6D5E2 F0F0F3F0**
02E3E7E3 40000604 40400038 40400001 23066000 D2886860 D2886C60
D0D06060 D2606860 D2806C60 D0D06060 D2782B24 6020D290 50A0D31C
18696860 D0B05800 D31C1A06 5000D35C C3D6D5E2 F0F0F3F1*
02E3E7E3 4000063C 40400038 40400001 18065A00 D31C5000 D3641856

```
5880D31C  5890D358  58E0D364  606ED1E8  18751A78  18B51AB6  183A1A35
5880D35C  18936828  D1A06C29  D2306A27  C3D6D5E2  F0F0F3F2*
02E3E7E3  40000674  40400038  40400001  D1E86027  D1E81A86  879AD642
5890D358  5880D31C  5800D364  1A065000  D3641A56  195947C0  D6285820
D31C1A2A  5020D31C  192647C0  D60A58B0  C3D6D5E2  F0F0F3F3*
02E3E7E3  400006AC  40400038  40400001  D2985890  D1105880  D0E450A0
D3105090  D3005890  D35858B0  D1106860  D0B05800  D3001A0A  5000D314
182B5A20  D310183B  184B1852  18895890  C3D6D5E2  F0F0F3F4*
02E3E7E3  400006E4  40400038  40400001  D3106065  D1A01873  1A791863
5880D314  189A18B4  6828D230  18291A26  6C22D1E8  6A27D1A0  6027D1A0
1A8A879A  D6D05890  D3105880  D3581A54  C3D6D5E2  F0F0F3F5*
02E3E7E3  4000071C  40400038  40400001  1A341938  47C0D6BE  5890D358
5800D310  1A0A5000  D3105820  D3001A2B  5020D300  192947C0  D6A258B0
D2985890  D1105880  D0E458E0  D374682E  C3D6D5E2  F0F0F3F6*
02E3E7E3  40000754  40400038  40400001  B0282862  6C60D158  6C60D158
684EB030  28046C00  D1606C00  D1602A60  6060D208  28622B64  6C60D160
6C60D158  6060D210  6060D220  6C20D160  C3D6D5E2  F0F0F3F7*
02E3E7E3  4000078C  40400038  40400001  6C20D160  6C40D158  6C40D158
2A246020  D228682E  B0406020  D3986C20  D1586C20  D158686E  B0482846
6C40D160  28046C00  D1602A20  6020D250  C3D6D5E2  F0F0F3F8*
02E3E7E3  400007C4  40400038  40400001  6820D398  6C20D160  28026C00
D1606000  D3982806  6C00D158  6C00D158  6860D398  2A606060  D2586C20

MEMBER NAME  CONSTR
D1586C40  D1582B24  6C20D0D0  6020D260  C3D6D5E2  F0F0F3F9*
02E3E7E3  400007FC  40400038  40400001  6820D1C0  6C20D250  6840D1D8
6C40D258  2A246840  D1F06C40  D2602A24  6020D268  6820D1C8  6C20D250
6840D1E0  6C40D258  2A246840  D1F86C40  C3D6D5E2  F0F0F4F0**
02E3E7E3  40000834  40400038  40400001  D2602A24  6020D270  6820D1D0
6C20D250  6840D1E8  6C40D258  2A246840  D2006C40  D2602A24  6020D278
58E0D374  684EB058  6820D188  2A246020  C3D6D5E2  F0F0F4F1*
02E3E7E3  4000086C  40400038  40400001  D1882344  2A426040  D1805080
D1202802  2B046000  D3682862  2C622804  2C046000  D3982300  2A066000
D3782C62  6060D3A0  6800D398  2C046820  C3D6D5E2  F0F0F4F2*
02E3E7E3  400008A4  40400038  40400001  D3A02B20  6020D380  6800D368
6000D338  28606000  D3406840  D3786040  D3486020  D3505090  D30C50A0
D318185A  186918A8  58B0D0EC  5890D2C0  C3D6D5E2  F0F0F4F3*
02E3E7E3  400008DC  40400038  40400001  5880D2C8  5870D2D0  5840D2B0
58E0D318  682ED260  28426C40  D3686A4E  9000604E  90002842  6C40D378
6D40D0D0  6A4E8000  604E8000  6C20D380  C3D6D5E2  F0F0F4F4*
02E3E7E3  40000914  40400038  40400001  6D20D0D8  6A2E7000  602E7000
59B0D120  41000001  4780D906  1B005000  D3041836  5A30D318  18265A20
D318187A  18831892  5860D2A0  5850D2A8  C3D6D5E2  F0F0F4F5*
02E3E7E3  4000094C  40400038  40400001  5830D2B8  197B4120  00014780
D9341B22  5620D304  1BFF862F  D94E6828  D1E86C20  D3386A28  30006028
30006869  D1A02846  6C40D340  6A496000  C3D6D5E2  F0F0F4F6*
02E3E7E3  40000984  40400038  40400001  60496000  28466C40  D3486D40
D0D06A49  50006049  50002826  6C20D350  6D20D0D8  6A294000  60294000
5A90D110  5A80D110  877AD928  5870D2D0  C3D6D5E2  F0F0F4F7*
02E3E7E3  400009BC  40400038  40400001  5880D2C8  5890D2C0  5860D110
5850D100  5800D318  1A055000  D3185820  D1201A2A  5020D120  192B47C0
D8C058B0  D29858A0  D1005890  D1105880  C3D6D5E2  F0F0F4F8*
02E3E7E3  400009F4  40400038  40400001  D0E458E0  D374682E  B0386C20
D3686800  D1702A02  6000D170  5820D12C  1A285020  D12C5800  D3901A0A
5000D390  5800D38C  5A00D0F0  5000D38C  C3D6D5E2  F0F0F4F9*
02E3E7E3  40000A2C  40400038  40400001  5920D14C  47C0D4FA  58B0D100
58A0D0E4  6800D170  6D00D190  6000D170  182B5850  D358186B  188258A0
D1106840  D0B86860  D0B058B0  D2C85890  C3D6D5E2  F0F0F5F0**
02E3E7E3  40000A64  40400038  40400001  D2D05870  D2C05840  D2B06828
70002022  292447A0  DA566068  70006828  B0002022  292447A0  DA666068
B0006828  90002022  292447A0  DA766068  C3D6D5E2  F0F0F5F1*
```

```
02E3E7E3  40000A9C  40400038  40400001  90001828  1A25183A  1A381893
18B26840  D0C05860  D2A05850  D2A86829  60002022  292447A0  DA9E6069
60006829  40002022  292447A0  DAAE6069  C3D6D5E2  F0F0F5F2*
02E3E7E3  40000AD4  40400038  40400001  40006829  50002022  292447A0
DABE6069  5000879A  DA8E5890  D2D058B0  D2C86840  D0B85860  D1005850
D3581A86  198A47C0  DA4658B0  D10058A0  C3D6D5E2  F0F0F5F3*
02E3E7E3  40000B0C  40400038  40400001  D0E4182B  5850D370  186B5870
D3881882  58A0D110  6840D0C0  6860D0B0  5840D2B8  18B81AB5  183A1A38
18931834  68293000  20222924  47A0DB20  C3D6D5E2  F0F0F5F4*
02E3E7E3  40000B44  40400038  40400001  60693000  879ADB10  8786DB04
58B0D100  58A0D0E4  5800D0E0  5000D13C  182B184B  5850D388  18725880
D370189A  58A0D110  18B71AB8  183A1A37  C3D6D5E2  F0F0F5F5*
02E3E7E3  40000B7C  40400038  40400001  18635830  D2B86806  30002200
4780DB68  5090D13C  876ADB5A  8774DB4C  58B0D100  58A0D0E4  5800D0E0
5000D134  5000D140  182B184B  1872188A  C3D6D5E2  F0F0F5F6*
02E3E7E3  40000BB4  40400038  40400001  58A0D110  6840D0B0  5890D2C0
5860D2C8  5850D2D0  69479000  41200001  4760DBAE  1B226947  60004130
00014760  DBBC1B33  16326947  50004120  C3D6D5E2  F0F0F5F7*
02E3E7E3  40000BEC  40400038  40400001  00014760  DBCC1B22  16231BFF
872FDBD8  5080D140  18B75AB0  D358183A  1A371863  5890D2A0  5850D2A8
5840D2B0  68269000  6026D1A0  68264000  C3D6D5E2  F0F0F5F8*

MEMBER NAME  CONSTR
02E3E7E3  40000C24  40400038  40400001  6026D1E8  68665000  6066D230
22664780  DC125080  D134876A  DBF05850  D2D05860  D2C85890  D2C05840
D1001A74  197A47C0  DBA058B0  D10058A0  C3D6D5E2  F0F0F5F9*
02E3E7E3  40000C5C  40400038  40400001  D0E45800  D1401200  4770DC48
1BFF58E0  D00007FE  58F0D2D8  5800F004  12004780  DC6058F0  D2F84110
D05005EF  58F0D2D8  5800F008  12004780  C3D6D5E2  F0F0F6F0**
02E3E7E3  40000C94  40400038  40400001  DC7858F0  D2F84110  D07005EF
5800D134  12004780  DC8C58F0  D2F84110  D09005EF  1BFF58E0  D00007FE
58A0D004  58E0A00C  58B0A018  5810B02C  C3D6D5E2  F0F0F6F1*
02E3E7E3  40000CCC  40400038  40400001  6820D170  60201000  5820B030
6840D190  60402000  5830B034  5840D13C  50403000  5850B038  5860D134
50605000  5870B03C  5880D140  50807000  C3D6D5E2  F0F0F6F2*
02E3E7E3  40000D04  40400038  40400001  18DA92FF  A00C982C  A01C07FE
987B1008  58207000  5020D14C  987B102C  68207000  6020D170  68208000
6020D190  58209000  5020D13C  5820A000  C3D6D5E2  F0F0F6F3*
02E3E7E3  40000D3C  40400038  40400001  5020D134  5820B000  5020D140
58201000  41302000  41500008  1B255020  D2F05030  D2F45820  10044130
20004150  00041B25  5020D2E8  5030D2EC  C3D6D5E2  F0F0F6F4*
02E3E7E3  40000D74  40400038  40400001  5820100C  41302000  41500004
1B255020  D2D85030  D2DC5820  10104130  20004150  00081B25  5B20D110
5020D2A0  5030D2A4  58201014  41302000  C3D6D5E2  F0F0F6F5*
02E3E7E3  40000DAC  40400038  40400001  41500008  1B255B20  D1105020
D2A85030  D2AC5820  10184130  20004150  00081B25  5B20D110  5020D2B0
5030D2B4  5820101C  41302000  41500008  C3D6D5E2  F0F0F6F6*
02E3E7E3  40000DE4  40400038  40400001  1B255B20  D1105020  D2B85030
D2BC5820  10204130  20004150  00081B25  5020D2C0  5030D2C4  5030D05C
58201024  41302000  41500008  1B255020  C3D6D5E2  F0F0F6F7*
02E3E7E3  40000E1C  40400028  40400001  D2C85030  D2CC5030  D09C5820
10284130  20004150  00081B25  5020D2D0  5030D2D4  5030D07C  47F0D3AC
40404040  40404040  40404040  40404040  C3D6D5E2  F0F0F6F8*
02E3E7E3  40000020  4040000C  40400001  00000D10  00000028  00000CBC
40404040  40404040  40404040  40404040  40404040  40404040  40404040
40404040  40404040  40404040  40404040  C3D6D5E2  F0F0F6F9*
02D9D3C4  40404040  40400038  40404040  00020001  0C0002C0  00020001
0C0002C4  00030001  1C000308  00040001  1C00030C  00050001  1C000320
00010001  0C000020  00010001  0C000024  C3D6D5E2  F0F0F7F0**
02E3E7E3  40000074  40400010  40400001  80000178  000001E8  00000114
00000114  40404040  40404040  40404040  40404040  40404040  40404040
```

```
40404040  40404040  40404040  40404040  C3D6D5E2  F0F0F7F1*
02E3E7E3  40000088  4040000C  40400001  000001C0  00000130  0000016C
40404040  40404040  40404040  40404040  40404040  40404040  40404040
40404040  40404040  40404040  40404040  C3D6D5E2  F0F0F7F2*
02D9D3C4  40404040  40400038  40404040  00010001  0C000028  00010001
0C000074  00010001  0C000078  00010001  0C00007C  00010001  0C000080
00010001  0C000088  00010001  0C00008C  C3D6D5E2  F0F0F7F3*
02E3E7E3  40000094  40400010  40400001  80000160  00000230  00000114
00000114  40404040  40404040  40404040  40404040  40404040  40404040
40404040  40404040  40404040  40404040  C3D6D5E2  F0F0F7F4*
02E3E7E3  400000A8  4040000C  40400001  000001C0  00000130  0000016C
40404040  40404040  40404040  40404040  40404040  40404040  40404040
40404040  40404040  40404040  40404040  C3D6D5E2  F0F0F7F5*
02D9D3C4  40404040  40400038  40404040  00010001  0C000090  00010001
0C000094  00010001  0C000098  00010001  0C00009C  00010001  0C0000A0
00010001  0C0000A8  00010001  0C0000AC  C3D6D5E2  F0F0F7F6*
02E3E7E3  400000B4  40400010  40400001  80000160  00000278  00000114
00000114  40404040  40404040  40404040  40404040  40404040  40404040
40404040  40404040  40404040  40404040  C3D6D5E2  F0F0F7F7*
02E3E7E3  400000C8  4040000C  40400001  000001C0  00000130  0000016C

MEMBER NAME  CONSTR
40404040  40404040  40404040  40404040  40404040  40404040  40404040
40404040  40404040  40404040  40404040  C3D6D5E2  F0F0F7F8*
02D9D3C4  40404040  40400038  40404040  00010001  0C0000B0  00010001
0C0000B4  00010001  0C0000B8  00010001  0C0000BC  00010001  0C0000C0
00010001  0C0000C8  00010001  0C0000CC  C3D6D5E2  F0F0F7F9*
02E3E7E3  400000D4  40400004  40400001  80000160  40404040  40404040
40404040  40404040  40404040  40404040  40404040  40404040  40404040
40404040  40404040  40404040  40404040  C3D6D5E2  F0F0F8F0**
02E3E7E3  40000324  40400038  40400001  00000000  00000000  00000000
00000000  00000000  00000000  00000000  00000000  00000000  00000000
00000000  00000000  00000000  00000000  C3D6D5E2  F0F0F8F1*
02E3E7E3  4000035C  40400038  40400001  00000000  00000000  00000000
00000000  00000000  00000000  00000000  00000000  00000000  00000048
00000000  00D40006  00000000  00000006  C3D6D5E2  F0F0F8F2*
02E3E7E3  40000394  40400038  40400001  01540007  00000030  08280008
00000000  01F00009  00000000  03240009  00000010  02B00009  00000000
0504000A  00000000  0160000A  00000000  C3D6D5E2  F0F0F8F3*
02E3E7E3  400003CC  40400008  40400001  021C000A  00000000  40404040
40404040  40404040  40404040  40404040  40404040  40404040  40404040
40404040  40404040  40404040  40404040  C3D6D5E2  F0F0F8F4*
02D9D3C4  40404040  40400010  40404040  00010001  0C0000D0  00010001
0C0000D4  40404040  40404040  40404040  40404040  40404040  40404040
40404040  40404040  40404040  40404040  C3D6D5E2  F0F0F8F5*
02C5D5C4  40404040  40404040  40404040  40404040  40404040  40404040
00000E44  F1F5F7F3  F460C6D6  F34040F0  F2F0F2F8  F7F0F9F8  40F0F84B
F1F34BF5  F1404040  C3D6D5E2  E3D94040  C3D6D5E2  F0F0F8F6**

MEMBER NAME  COVDRV
02C5E2C4  40404040  40400010  40400001  C3D6E5C4  D9E54040  00000000
40000000  40404040  40404040  40404040  40404040  40404040  40404040
40404040  40404040  40404040  40404040  C3D6E5C4  F0F0F0F1*
02E3E7E3  40000000  40400028  40400001  47F0F00C  07C3D6E5  C4D9E540
90ECD00C  184D98CD  F0205040  D00450D0  400807FC  40404040  40404040
40404040  40404040  40404040  40404040  C3D6E5C4  F0F0F0F2*
02C5E2C4  40404040  40400010  40400002  C3D6E5C5  D9404040  02000000
40000000  40404040  40404040  40404040  40404040  40404040  40404040
40404040  40404040  40404040  40404040  C3D6E5C4  F0F0F0F3*
02E3E7E3  400000B0  40400020  40400001  00000000  00000001  00000002
00000003  00000004  00000005  00000000  00000000  40404040  40404040
```

```
40404040  40404040  40404040  40404040  C3D6E5C4  F0F0F0F4*
02E3E7E3  40000110  40400008  40400001  00000000  00000000  40404040
40404040  40404040  40404040  40404040  40404040  40404040  40404040
40404040  40404040  40404040  40404040  C3D6E5C4  F0F0F0F5*
02E3E7E3  4000011C  40400004  40400001  00000000  40404040  40404040
40404040  40404040  40404040  40404040  40404040  40404040  40404040
40404040  40404040  40404040  40404040  C3D6E5C4  F0F0F0F6*
02C5E2C4  40404040  40400010  40400003  D3C9D4C9  E3E54040  02000000
40000000  40404040  40404040  40404040  40404040  40404040  40404040
40404040  40404040  40404040  40404040  C3D6E5C4  F0F0F0F7*
02E3E7E3  40000124  40400004  40400001  00000000  40404040  40404040
40404040  40404040  40404040  40404040  40404040  40404040  40404040
40404040  40404040  40404040  40404040  C3D6E5C4  F0F0F0F8*
02E3E7E3  4000012C  40400004  40400001  00000000  40404040  40404040
40404040  40404040  40404040  40404040  40404040  40404040  40404040
40404040  40404040  40404040  40404040  C3D6E5C4  F0F0F0F9*
02E3E7E3  400001B0  40400038  40400001  5880D0F4  58B0D0FC  58A0D110
5890D114  5800D088  5000D0CC  5800D0DC  5900D0E0  4780DBF0  5800D098
5000D170  187A5C60  D0DC5A70  D0985090  C3D6E5C4  F0F0F1F0**
02E3E7E3  400001E8  40400038  40400001  D174183A  5C20D0DC  1A395030
D178183A  5C20D0DC  5A30D118  5030D180  183A5C20  D0DC186A  1A63185A
5C40D0E0  5A50D098  183A5C20  D0E01849  C3D6E5C4  F0F0F1F1*
02E3E7E3  40000220  40400038  40400001  1A43183A  5C20D0E0  5A30D118
181A5C00  D0E0182A  1A214107  B0005000  D04C58E0  D178410E  B0005000
D05058E0  D180410E  B0005000  D0544106  C3D6E5C4  F0F0F1F2*
02E3E7E3  40000258  40400038  40400001  B0005000  D0584105  B0005000
D05C4104  B0005000  D0604103  B0005000  D0644102  B0005000  D06858F0
D1044110  D04C05EF  5800D0C8  12004770  C3D6E5C4  F0F0F1F3*
02E3E7E3  40000290  40400038  40400001  D2721BFF  58E0D000  07FE5850
D0DC5C40  D1745820  D1701A25  58528000  5C40D174  5A50D170  5830D0DC
5C20D174  5840D174  1A435830  D0E05C20  C3D6E5C4  F0F0F1F4*
02E3E7E3  400002C8  40400038  40400001  D1745860  D1701A63  58368000
5C20D174  5A30D170  5870D0E0  5C60D174  5820D174  1A2758F0  D0EC4105
F0005000  D0704104  80005000  D07458F0  C3D6E5C4  F0F0F1F5*
02E3E7E3  40000300  40400038  40400001  D0EC4103  F0005000  D0784102
80005000  D07C58F0  D0E84110  D07005EF  5800D0BC  5900D098  4770D308
1BFF58E0  D00007FE  5800D0BC  5900D090  C3D6E5C4  F0F0F1F6*
02E3E7E3  40000338  40400038  40400001  4780DC00  5800D0BC  5900D08C
4780D338  5800D0BC  5900D094  4780D770  5800D0BC  5900D09C  4780D9EC
5800D0C4  5900D08C  4780DBF0  5850D0E0  C3D6E5C4  F0F0F1F7*
02E3E7E3  40000370  40400038  40400001  5A50D08C  5820D0C4  1A255B20
D0905020  D0D85840  D0DC5A40  D08C5040  D0B45820  D0C01A24  5B20D090
5020D0D4  5050D0AC  5800D098  5000D144  C3D6E5C4  F0F0F1F8*
02E3E7E3  400003A8  40400038  40400001  5090D148  5800D098  5000D108
5090D10C  18341C2A  5030D14C  5090D138  18141C09  5010D150  5A30D098
5030D154  18351C2A  5030D158  5090D15C  C3D6E5C4  F0F0F1F9*
02E3E7E3  400003E0  40400038  40400001  18151C09  5010D160  5030D164

MEMBER NAME  COVDRV
1C495050  D1685A30  D0985030  D16C18BA  58A0D0EC  5890D0FC  187B5C60
D0DC5A70  D098183B  5C20D0DC  5A30D114  C3D6E5C4  F0F0F2F0**
02E3E7E3  40000418  40400038  40400001  5030D178  183B5C20  D0DC1863
5A60D118  185B5C40  D0DC1A5B  5840D158  5A40D114  5830D158  5A30D118
5820D158  1A2B4107  90005000  D04C58E0  C3D6E5C4  F0F0F2F1*
02E3E7E3  40000450  40400038  40400001  D178410E  90005000  D0504106
90005000  D0544105  90005000  D05858E0  D16C410E  90005000  D05C4104
90005000  D0604103  90005000  D0644102  C3D6E5C4  F0F0F2F2*
02E3E7E3  40000488  40400038  40400001  90005000  D06858F0  D1044110
D04C05EF  5800D0C8  12004780  D70E5850  D0DC5C40  D1481825  5A20D144
58528000  5C40D148  5A50D144  5830D0DC  C3D6E5C4  F0F0F2F3*
02E3E7E3  400004C0  40400038  40400001  5C20D148  18435A40  D1485860
```

```
D1605A60  D1445836  80005C20  D1485A30  D1445820  D1605A20  D1484105
A0005000  D0704104  80005000  D0744103  C3D6E5C4  F0F0F2F4*
02E3E7E3  400004F8  40400038  40400001  A0005000  D0784102  80005000
D07C58F0  D0E84110  D07005EF  5800D0BC  5900D08C  4770D508  58B0D0FC
58A0D110  5890D114  1BFF58E0  D00007FE  C3D6E5C4  F0F0F2F5*
02E3E7E3  40000530  40400038  40400001  5800D0BC  5900D090  4770D518
47F0DC00  5800D0BC  5900D094  4770D538  58B0D0FC  58A0D110  5890D114
1BFF58E0  D00007FE  5800D0BC  5900D098  C3D6E5C4  F0F0F2F6*
02E3E7E3  40000568  40400038  40400001  4780D70E  5800D0C0  5900D08C
4770D554  47F0DC00  5800D0B4  5000D0A8  5800D164  5A00D098  5000D11C
5800D164  5A00D114  5000D120  5800D164  C3D6E5C4  F0F0F2F7*
02E3E7E3  400005A0  40400038  40400001  5A00D118  5000D124  5800D164
1A0B5000  D1285800  D1685A00  D0985000  D12C5800  D1685A00  D1145000
D1305800  D1545000  D14058A0  D15058B0  C3D6E5C4  F0F0F2F8*
02E3E7E3  400005D8  40400038  40400001  D14C5850  D0EC184B  5A40D114
183B5A30  D118182B  5A20D110  58E0D140  410E9000  5000D04C  41049000
5000D050  41039000  5000D054  41029000  C3D6E5C4  F0F0F2F9*
02E3E7E3  40000610  40400038  40400001  5000D058  58E0D11C  410E9000
5000D05C  58E0D120  410E9000  5000D060  58E0D124  410E9000  5000D064
58E0D128  410E9000  5000D068  58F0D104  C3D6E5C4  F0F0F3F0**
02E3E7E3  40000648  40400038  40400001  4110D04C  05EF5800  D0C81200
4780D6D6  184A5A40  D1085834  80005C20  D10C1843  5A40D108  183A5A30
D10C58E0  D12C587E  80005C60  D10C1827  C3D6E5C4  F0F0F3F1*
02E3E7E3  40000680  40400038  40400001  5A20D108  41045000  5000D070
41038000  5000D074  41025000  5000D078  58E0D130  410E8000  5000D07C
58F0D0E8  4110D070  05EF5800  D0BC5900  C3D6E5C4  F0F0F3F2*
02E3E7E3  400006B8  40400038  40400001  D08C4770  D69A47F0  DC005800
D0BC5900  D0904770  D6AA47F0  DC005800  D0BC5900  D0944770  D6BA47F0
D70E5800  D0BC5900  D0984780  D6D65800  C3D6E5C4  F0F0F3F3*
02E3E7E3  400006F0  40400038  40400001  D0BC5900  D09C4770  D6D647F0
D70E5AA0  D1385AB0  D1105800  D1405A00  D1105000  D1405820  D0A85A20
D08C5020  D0A85920  D0D447C0  D5B658B0  C3D6E5C4  F0F0F3F4*
02E3E7E3  40000728  40400038  40400001  D0FC58A0  D1105890  D11447F0
DC0058A0  D0EC58B0  D1105800  D1685A00  D1145000  D1685800  D1641A0B
5000D164  5800D160  5A00D15C  5000D160  C3D6E5C4  F0F0F3F5*
02E3E7E3  40000760  40400038  40400001  5800D158  1A0B5000  D1585800
D16C1A0B  5000D16C  5820D0AC  5A20D08C  5020D0AC  5920D0D8  47C0D3DC
58B0D0FC  58A0D110  5890D114  47F0DBF0  C3D6E5C4  F0F0F3F6*
02E3E7E3  40000798  40400038  40400001  5800D0C4  5900D08C  4780DBF0
5800D0C0  5900D08C  4780DC00  5850D0E0  5A50D08C  5830D0C4  1A355B30
D0905820  D0DC5A20  D08C5020  D0B45840  C3D6E5C4  F0F0F3F7*
02E3E7E3  400007D0  40400038  40400001  D0C01A42  5B40D090  5040D0D4
5800D098  5000D108  5090D10C  18721C6A  5070D144  5090D138  18121C09
5010D148  5A70D098  5070D14C  18151C0A  C3D6E5C4  F0F0F3F8*
02E3E7E3  40000808  40400038  40400001  5010D150  1C295030  D1581C49
5050D154  18735880  D118189A  58A0D098  58B0D114  5800D150  1A0A5000

MEMBER NAME  COVDRV
D11C5800  D1501A0B  5000D120  5800D150  C3D6E5C4  F0F0F3F9*.
02E3E7E3  40000840  40400038  40400001  1A085000  D1245800  D1501A09
5000D128  5800D154  1A0A5000  D12C5800  D1541A0B  5000D130  5800D14C
5000D140  5860D144  58A0D0B4  58B0D148  C3D6E5C4  F0F0F4F0**
02E3E7E3  40000878  40400038  40400001  5890D0FC  5880D0F4  5870D0EC
18465A40  D1141836  5A30D118  18265A20  D11058E0  D11C410E  90005000
D04C58E0  D120410E  90005000  D05058E0  C3D6E5C4  F0F0F4F1*
02E3E7E3  400008B0  40400038  40400001  D124410E  90005000  D05458E0
D128410E  90005000  D05858E0  D140410E  90005000  D05C4104  90005000
D0604103  90005000  D0644102  90005000  C3D6E5C4  F0F0F4F2*
02E3E7E3  400008E8  40400038  40400001  D06858F0  D1044110  D04C05EF
5800D0C8  12004780  D97A58E0  D12C583E  80005C20  D10C1843  5A40D108
185B5A50  D1085835  80005C20  D10C5A30  C3D6E5C4  F0F0F4F3*
```

```
02E3E7E3  40000920  40400038  40400001  D108182B  5A20D10C  41047000
5000D070  58E0D130  410E8000  5000D074  41037000  5000D078  41028000
5000D07C  58F0D0E8  4110D070  05EF5800  C3D6E5C4  F0F0F4F4*
02E3E7E3  40000958  40400038  40400001  D0BC5900  D08C4770  D93E47F0
D9AA5800  D0BC5900  D0904770  D94E47F0  DC005800  D0BC5900  D0944770
D95E47F0  D9AA5800  D0BC5900  D0984780  C3D6E5C4  F0F0F4F5*
02E3E7E3  40000990  40400038  40400001  D97A5800  D0BC5900  D09C4770
D97A47F0  DC005AB0  D1385A60  D1105800  D1405A00  D1105000  D1405AA0
D08C59A0  D0D447C0  D85C58B0  D0FC58A0  C3D6E5C4  F0F0F4F6*
02E3E7E3  400009C8  40400038  40400001  D1105890  D11447F0  DC0058B0
D11458A0  D0985890  D1105880  D1185870  D1585800  D1501A09  5000D150
5820D154  1A2B5020  D1541927  47C0D800  C3D6E5C4  F0F0F4F7*
02E3E7E3  40000A00  40400038  40400001  5880D0F4  58B0D0FC  58A0D110
5890D114  47F0DBF0  5800D0C0  5900D08C  4780DC00  5850D0DC  5A50D08C
5820D0C0  1A255B20  D0905020  D0D45050  C3D6E5C4  F0F0F4F8*
02E3E7E3  40000A38  40400038  40400001  D0AC5800  D0985000  D1085090
D10C1835  1C2A5030  D11C5090  D1201C49  5050D124  5A30D098  5030D128
58B0D0EC  5890D0FC  187A5C60  D0E05A70  C3D6E5C4  F0F0F4F9*
02E3E7E3  40000A70  40400038  40400001  D098183A  5C20D0E0  5A30D114
5030D178  183A5C20  D0E01863  5A60D118  185A5C40  D0E01A5A  5840D11C
5A40D114  5830D11C  5A30D118  5820D11C  C3D6E5C4  F0F0F5F0**
02E3E7E3  40000AA8  40400038  40400001  1A2A4107  90005000  D04C58E0
D178410E  90005000  D0504106  90005000  D0544105  90005000  D05858E0
D128410E  90005000  D05C4104  90005000  C3D6E5C4  F0F0F5F1*
02E3E7E3  40000AE0  40400038  40400001  D0604103  90005000  D0644102
90005000  D06858F0  D1044110  D04C05EF  5800D0C8  12004780  DBB05850
D0E05C40  D10C1825  5A20D108  58528000  C3D6E5C4  F0F0F5F2*
02E3E7E3  40000B18  40400038  40400001  5C40D10C  5A50D108  5830D0E0
5C20D10C  18435A40  D10C5860  D1245A60  D1085836  80005C20  D10C5A30
D1085820  D1245A20  D10C4105  B0005000  C3D6E5C4  F0F0F5F3*
02E3E7E3  40000B50  40400038  40400001  D0704104  80005000  D0744103
B0005000  D0784102  80005000  D07C58F0  D0E84110  D07005EF  5800D0BC
5900D08C  4770DB68  58B0D0FC  5890D114  C3D6E5C4  F0F0F5F4*
02E3E7E3  40000B88  40400038  40400001  1BFF58E0  D00007FE  5800D0BC
5900D090  4770DB78  47F0DC00  5800D0BC  5900D094  4770DB94  58B0D0FC
5890D114  1BFF58E0  D00007FE  5800D0BC  C3D6E5C4  F0F0F5F5*
02E3E7E3  40000BC0  40400038  40400001  5900D098  4780DBB0  5800D0BC
5900D09C  4770DBB0  47F0DC00  5800D124  5A00D120  5000D124  5800D11C
1A0A5000  D11C5800  D1281A0A  5000D128  C3D6E5C4  F0F0F5F6*
02E3E7E3  40000BF8  40400038  40400001  5820D0AC  5A20D08C  5020D0AC
5920D0D4  47C0DA40  58B0D0FC  5890D114  47F0DC00  5800D08C  5000D0CC
1BFF58E0  D00007FE  58B0D0FC  58A0D110  C3D6E5C4  F0F0F5F7*
02E3E7E3  40000C30  40400038  40400001  5890D114  5800D090  5000D0CC
1BFF58E0  D00007FE  58A0D004  58E0A00C  58B0A018  5810B014  5820D0DC
50201000  5830B01C  5840D0E0  50403000  C3D6E5C4  F0F0F5F8*

MEMBER NAME  COVDRV
02E3E7E3  40000C68  40400038  40400001  5850B024  5860D0CC  50605000
18DA92FF  A00C982C  A01C07FE  987B1004  58207000  5020D0B0  58209000
5020D0D0  987B1014  58207000  5020D0DC  C3D6E5C4  F0F0F5F9*
02E3E7E3  40000CA0  40400038  40400001  58208000  5020D0C0  58209000
5020D0E0  5820A000  5020D0C4  5820B000  5020D0CC  58201000  41302000
41500004  1B255C40  D0901B25  5020D0EC  C3D6E5C4  F0F0F6F0**
02E3E7E3  40000CD8  40400038  40400001  5030D0F0  58201008  41302000
41500004  1B255C40  D0901B25  5020D0F4  5030D0F8  58201010  41302000
41500004  1B255C40  D0981B25  5020D0FC  C3D6E5C4  F0F0F6F1*
02E3E7E3  40000D10  40400008  40400001  5030D100  47F0D188  40404040
40404040  40404040  40404040  40404040  40404040  40404040  40404040
40404040  40404040  40404040  40404040  C3D6E5C4  F0F0F6F2*
02E3E7E3  40000020  4040000C  40400001  00000C80  00000028  00000C44
40404040  40404040  40404040  40404040  40404040  40404040  40404040
```

```
40404040  40404040  40404040  40404040  C3D6E5C4  F0F0F6F3*
02E3E7E3  40000094  40400004  40400001  800000F0  40404040  40404040
40404040  40404040  40404040  40404040  40404040  40404040  40404040
40404040  40404040  40404040  40404040  C3D6E5C4  F0F0F6F4*
02E3E7E3  400000A8  40400004  40400001  800000E4  40404040  40404040
40404040  40404040  40404040  40404040  40404040  40404040  40404040
40404040  40404040  40404040  40404040  C3D6E5C4  F0F0F6F5*
02E3E7E3  40000130  40400038  40400001  00000000  00000000  00000010
00000008  0000000C  00000000  00000000  00000000  00000000  00000003
00E40003  006C0003  008C0004  00000004  C3D6E5C4  F0F0F6F6*
02E3E7E3  40000168  40400038  40400001  04E80005  00900006  00B00006
00000000  01480006  00000000  019C0008  00940008  00980008  009C0008
00A00008  00A40008  00A80008  00AC0008  C3D6E5C4  F0F0F6F7*
02E3E7E3  400001A0  40400010  40400001  00E80008  00B40008  00B80008
00BC0008  40404040  40404040  40404040  40404040  40404040  40404040
40404040  40404040  40404040  40404040  C3D6E5C4  F0F0F6F8*
02D9D3C4  40404040  40400038  40404040  00020001  1C000110  00030001
1C00012C  00010001  0C000020  00010001  0C000024  00010001  0C000028
00010001  0C000094  00010001  0C0000A8  C3D6E5C4  F0F0F6F9*
02C5D5C4  40404040  40404040  40404040  40404040  40404040  40404040
00000D18  F1F5F7F3  F460C6D6  F34040F0  F2F0F2F8  F7F0F9F8  40F0F84B
F1F34BF5  F8404040  C3D6E5C4  D9E54040  C3D6E5C4  F0F0F7F0**

MEMBER NAME  COVSEQ
02C5E2C4  40404040  40400010  40400001  C3D6E5E2  C5D84040  00000000
40000000  40404040  40404040  40404040  40404040  40404040  40404040
40404040  40404040  40404040  40404040  C3D6E5E2  F0F0F0F1*
02E3E7E3  40000000  40400038  40400001  47F0F00C  07C3D6E5  E2C5D840
90ECD00C  184D98CD  F0205040  D00450D0  400807FC  40404040  40404040
0218121A  05C4C1E2  C8401003  1A0A40E2  C3D6E5E2  F0F0F0F2*
02E3E7E3  40000038  40400030  40400001  C5D8E4C5  D5C3C540  10041A13
40D6E5C5  D9D3C1D7  C9D5C740  D7D3C9C5  E25ED310  041A026B  D3100418
32220206  48140122  40404040  40404040  C3D6E5E2  F0F0F0F3*
02E3E7E3  400000E8  40400038  40400001  00000000  00000000  4F080000
00000000  00000000  00000001  00000002  00000003  00000004  00000015
00000016  00000048  00000000  00000000  C3D6E5E2  F0F0F0F4*
02E3E7E3  40000178  40400004  40400001  00000000  40404040  40404040
40404040  40404040  40404040  40404040  40404040  40404040  40404040
40404040  40404040  40404040  40404040  C3D6E5E2  F0F0F0F5*
02E3E7E3  40000180  40400004  40400001  00000000  40404040  40404040
40404040  40404040  40404040  40404040  40404040  40404040  40404040
40404040  40404040  40404040  40404040  C3D6E5E2  F0F0F0F6*
02C5E2C4  40404040  40400010  40400002  D4E5C3C8  D9404040  02000000
40000000  40404040  40404040  40404040  40404040  40404040  40404040
40404040  40404040  40404040  40404040  C3D6E5E2  F0F0F0F7*
02E3E7E3  40000188  40400004  40400001  00000000  40404040  40404040
40404040  40404040  40404040  40404040  40404040  40404040  40404040
40404040  40404040  40404040  40404040  C3D6E5E2  F0F0F0F8*
02E3E7E3  40000190  40400008  40400001  00000000  00000000  40404040
40404040  40404040  40404040  40404040  40404040  40404040  40404040
40404040  40404040  40404040  40404040  C3D6E5E2  F0F0F0F9*
02C5E2C4  40404040  40400010  40400003  C3D6E5C4  D9E54040  02000000
40000000  40404040  40404040  40404040  40404040  40404040  40404040
40404040  40404040  40404040  40404040  C3D6E5E2  F0F0F1F0**
02E3E7E3  4000019C  40400004  40400001  00000000  40404040  40404040
40404040  40404040  40404040  40404040  40404040  40404040  40404040
40404040  40404040  40404040  40404040  C3D6E5E2  F0F0F1F1*
02C5E2C4  40404040  40400010  40400004  C9C2C3D6  D47B4040  02000000
40000000  40404040  40404040  40404040  40404040  40404040  40404040
40404040  40404040  40404040  40404040  C3D6E5E2  F0F0F1F2*
02E3E7E3  400001A4  40400008  40400001  00000000  00000000  40404040
```

```
40404040  40404040  40404040  40404040  40404040  40404040  40404040
40404040  40404040  40404040  40404040  C3D6E5E2  F0F0F1F3*
02E3E7E3  40000150  40400004  40400001  000000C8  40404040  40404040
40404040  40404040  40404040  40404040  40404040  40404040  40404040
40404040  40404040  40404040  40404040  C3D6E5E2  F0F0F1F4*
02E3E7E3  400001D4  40400038  40400001  58B0D148  5800D090  5000D0D4
50B0D168  5890D094  18AB58B0  D1345820  D0D41A29  5020D0C4  5920D104
4750D1A4  58B0D148  1BFF58E0  D00007FE  C3D6E5E2  F0F0F1F5*
02E3E7E3  4000020C  40400038  40400001  185A5C40  D0C41825  5A20D144
2B007802  B0006A00  D0886000  D0805840  D0845040  D1005830  D0C45030
D0D41873  1C6A1827  5A20D144  185A1864  C3D6E5E2  F0F0F1F6*
02E3E7E3  40000244  40400038  40400001  187918A3  18B25880  D1341AA7
1AB52B00  780B8000  6A00D088  6000D080  5890D084  19694780  D20A50A0
D0D447F0  D20E47F0  D1E658B0  D13458A0  C3D6E5E2  F0F0F1F7*
02E3E7E3  4000027C  40400038  40400001  D1485890  D0945820  D0D41B29
5020D0D4  5920D0C4  4780D186  5850D0C4  5C40D168  18255A20  D1544102
B0005000  D0549280  D05458F0  D1284110  C3D6E5E2  F0F0F1F8*
02E3E7E3  400002B4  40400038  40400001  D04C05EF  4800D108  5000D0EC
4800D10A  5000D0C8  5830D0C4  1A395030  D0C45930  D0D44730  D1861853
1B591C4A  5A50D158  5050D150  181A5C00  C3D6E5E2  F0F0F1F9*
02E3E7E3  400002EC  40400038  40400001  D0D45010  D1601C2A  18435A40

MEMBER NAME  COVSEQ
D1541864  187358A0  D1105890  D1185880  D1204106  B0005000  D0549280
D05458F0  D1284110  D04C05EF  4800D108  C3D6E5E2  F0F0F2F0**
02E3E7E3  40000324  40400038  40400001  5000D0F0  4800D10A  5000D0CC
58F0D13C  4110D058  05EF58E0  D1502B00  780EB000  6A00D088  6000D080
5800D084  5000D0DC  18375A30  D1582B00  C3D6E5E2  F0F0F2F1*
02E3E7E3  4000035C  40400038  40400001  7803B000  6A00D088  6000D080
5800D084  5000D0E0  5800D0D8  12004780  D3C25800  D0F85A00  D0945000
D0F85900  D0E847A0  D3C21847  5A40D15C  C3D6E5E2  F0F0F2F2*
02E3E7E3  40000394  40400038  40400001  2B007804  B0006A00  D0886000
D0805830  D0841033  5030D0D0  58F0D140  45E0F004  00000000  00000028
45E0F008  0450D0D0  45E0F008  0450D100  C3D6E5E2  F0F0F2F3*
02E3E7E3  400003CC  40400038  40400001  45E0F008  0450D0DC  45E0F008
0450D0E0  45E0F010  58F0D140  45E0F000  00000000  00000062  5890D094
58A0D094  58B0D0AC  5880D12C  185B5C40  C3D6E5E2  F0F0F2F4*
02E3E7E3  40000404  40400038  40400001  D0F81839  1A3545E0  F0080123
8000879A  D3985880  D1205890  D11858A0  D11058B0  D13445E0  F0105A60
D1485A70  D1485970  D16047C0  D2A258B0  C3D6E5E2  F0F0F2F5*
02E3E7E3  4000043C  40400038  40400001  D13458A0  D1485890  D09447F0
D22C58A0  D00458E0  A00C58B0  A0185810  B00C5820  D0C05020  10005830
B0145840  D0E45040  30005850  B0205860  C3D6E5E2  F0F0F2F6*
02E3E7E3  40000474  40400038  40400001  D0F85060  500018DA  92FFA00C
982CA01C  07FE987B  10045820  70005020  D1045820  90005020  D0C0987A
10145820  70005020  D0E45820  A0005020  C3D6E5E2  F0F0F2F7*
02E3E7E3  400004AC  40400038  40400001  D0F85820  10004130  20004150
00041B25  5C40D0A8  1B255020  D1345030  D1385820  10084130  20004150
00041B25  5C40D098  1B255020  D1105030  C3D6E5E2  F0F0F2F8*
02E3E7E3  400004E4  40400038  40400001  D1145030  D0585820  10104130
20004150  00041B25  5C40D098  1B255020  D1185030  D11C5030  D0605820
10184130  20004150  00041B25  5C40D0A0  C3D6E5E2  F0F0F2F9*
02E3E7E3  4000051C  4040002E  40400001  1B255020  D1205030  D1245030
D0685820  101C4130  20004150  00011B25  5C40D0AC  1B255020  D12C5030
D13047F0  D16C4040  40404040  40404040  C3D6E5E2  F0F0F3F0**
02E3E7E3  40000020  40400008  40400001  00000486  00000068  40404040
40404040  40404040  40404040  40404040  40404040  40404040  40404040
40404040  40404040  40404040  40404040  C3D6E5E2  F0F0F3F1*
02E3E7E3  40000068  40400004  40400001  0000044A  40404040  40404040
40404040  40404040  40404040  40404040  40404040  40404040  40404040
40404040  40404040  40404040  40404040  C3D6E5E2  F0F0F3F2*
```

```
02D9D3C4  40404040  40400038  40404040  00020001  1C000190  00030001
1C0001A4  00040001  1C0001A8  00010001  0C0003B8  00010001  0C0003EC
00010001  0C000020  00010001  0C000024  C3D6E5E2  F0F0F3F3*
02E3E7E3  400000B4  4040000C  40400001  00000108  00000170  80000000
40404040  40404040  40404040  40404040  40404040  40404040  40404040
40404040  40404040  40404040  40404040  C3D6E5E2  F0F0F3F4*
02E3E7E3  400000C4  40400004  40400001  00000128  40404040  40404040
40404040  40404040  40404040  40404040  40404040  40404040  40404040
40404040  40404040  40404040  40404040  C3D6E5E2  F0F0F3F5*
02E3E7E3  400000CC  40400004  40400001  0000014C  40404040  40404040
40404040  40404040  40404040  40404040  40404040  40404040  40404040
40404040  40404040  40404040  40404040  C3D6E5E2  F0F0F3F6*
02E3E7E3  400000D4  4040000C  40400001  00000154  00000130  00000158
40404040  40404040  40404040  40404040  40404040  40404040  40404040
40404040  40404040  40404040  40404040  C3D6E5E2  F0F0F3F7*
02D9D3C4  40404040  40400038  40404040  00010001  0C000068  00010001
0C0000B4  00010001  0C0000B8  00010001  0C0000C4  00010001  0C0000CC
00010001  0C0000D4  00010001  0C0000D8  C3D6E5E2  F0F0F3F8*
02E3E7E3  400000E0  40400008  40400001  00000134  80000140  40404040
40404040  40404040  40404040  40404040  40404040  40404040  40404040

MEMBER NAME  COVSEQ
40404040  40404040  40404040  40404040  C3D6E5E2  F0F0F3F9*
02E3E7E3  400001AC  40400028  40400001  0000000C  00000058  00000000
00000000  00000054  00000010  00000008  00000000  00000000  00000000
40404040  40404040  40404040  40404040  C3D6E5E2  F0F0F4F0**
02D9D3C4  40404040  40400018  40404040  00010001  0C0000DC  00010001
0C0000E0  00010001  0C0000E4  40404040  40404040  40404040  40404040
40404040  40404040  40404040  40404040  C3D6E5E2  F0F0F4F1*
02C5D5C4  40404040  40404040  40404040  40404040  40404040  40404040
0000054A  F1F5F7F3  F460C6D6  F34040F0  F2F0F2F8  F7F0F9F8  40F0F84B
F1F44BF0  F3404040  C3D6E5E2  C5D84040  C3D6E5E2  F0F0F4F2**

MEMBER NAME  COVER
02C5E2C4  40404040  40400010  40400001  C3D6E5C5  D9404040  00000000
40000000  40404040  40404040  40404040  40404040  40404040  40404040
40404040  40404040  40404040  40404040  C3D6E5C5  F0F0F0F1*
02E3E7E3  40000000  40400038  40400001  47F0F00C  07C3D6E5  C5D94040
90ECD00C  184D98CD  F0205040  D00450D0  400807FC  40404040  40404040
021A0C40  404040C3  D6C4C540  7E40F122  C3D6E5C5  F0F0F0F2*
02E3E7E3  40000038  40400038  40400001  021A0C40  404040C3  D6C4C540
7E40F222  021A0C40  404040C3  D6C4C540  7E40F322  021A0C40  404040C3
D6C4C540  7E40F422  021A0C40  404040C3  C3D6E5C5  F0F0F0F3*
02E3E7E3  40000070  40400038  40400001  D6C4C540  7E40F522  021A0C40
404040C3  D6C4C540  7E40F622  021A2A40  D3D6C7C9  C340C5D9  D9D6D940
C9D540D9  D6E4E3C9  D5C540C3  D6E5C5D9  C3D6E5C5  F0F0F0F4*
02E3E7E3  400000A8  40400038  40400001  6B40C6C9  D9E2E340  C3C8C5C3
D222021A  2B40C3C8  C5C3D240  D3D6C7C9  C340C9D5  40D9D6E4  E3C9D5C5
40C3D6E5  C5D96B40  D6D7E3C9  D6D5404D  C3D6E5C5  F0F0F0F5*
02E3E7E3  400000E0  40400038  40400001  F361F55D  22021A2B  40C3C8C5
C3D240D3  D6C7C9C3  40C9D540  D9D6E4E3  C9D5C540  C3D6E5C5  D96B40D6
D7E3C9D6  D5404DF3  61F35D22  021A2B40  C3D6E5C5  F0F0F0F6*
02E3E7E3  40000118  4040002B  40400001  C3C8C5C3  D240D3D6  C7C9C340
C9D540D9  D6E4E3C9  D5C540C3  D6E5C5D9  6B40D6D7  E3C9D6D5  404DF461
F55D2240  40404040  40404040  40404040  C3D6E5C5  F0F0F0F7*
02C5E2C4  40404040  40400010  40400002  C8D3C4D9  E5404040  02000000
40000000  40404040  40404040  40404040  40404040  40404040  40404040
40404040  40404040  40404040  40404040  C3D6E5C5  F0F0F0F8*
02E3E7E3  400001C0  40400020  40400001  00000001  00000002  00000003
00000004  00000005  00000006  00000000  00000000  40404040  40404040
40404040  40404040  40404040  40404040  C3D6E5C5  F0F0F0F9*
```

```
02C5E2C4  40404040  40400010  40400003  C9C2C3D6  D47B4040  02000000
40000000  40404040  40404040  40404040  40404040  40404040  40404040
40404040  40404040  40404040  40404040  C3D6E5C5  F0F0F1F0**
02E3E7E3  40000208  4040000C  40400001  00000000  00000000  00000000
40404040  40404040  40404040  40404040  40404040  40404040  40404040
40404040  40404040  40404040  40404040  C3D6E5C5  F0F0F1F1*
02E3E7E3  40000218  40400004  40400001  00000000  40404040  40404040
40404040  40404040  40404040  40404040  40404040  40404040  40404040
40404040  40404040  40404040  40404040  C3D6E5C5  F0F0F1F2*
02E3E7E3  4000023C  40400038  40400001  58A0D0D0  58B0D0C8  5890D090
5880D084  58F0D0C0  4110D04C  05EF5800  D0AC8609  D2B45850  D0A85830
D0B01435  8639D2B4  5820D0B8  14258629  C3D6E5C5  F0F0F1F3*
02E3E7E3  40000274  40400038  40400001  D2B45840  D0A85830  D0B41434
8639D2A4  5820D0BC  14248629  D2A45800  D0A88609  D2A45820  D0B05020
D0E05830  D0BC1432  8639D2B4  5420D0B8  C3D6E5C5  F0F0F1F4*
02E3E7E3  400002AC  40400038  40400001  8629D1D4  5870D0B0  5860D0B4
18361437  8639D2D4  8679D228  5820D0B8  14265420  D0BC8629  D2B45820
D0B45020  D0EC5830  D0BC1432  8639D2A4  C3D6E5C5  F0F0F1F5*
02E3E7E3  400002E4  40400038  40400001  5420D0B8  8629D264  5800D0B4
8609D2C4  5800D0B8  8609D2E0  58F0D0C4  45E0F004  00000006  00000088
45E0F010  5080D098  1BFF58E0  D00007FE  C3D6E5C5  F0F0F1F6*
02E3E7E3  4000031C  40400038  40400001  58F0D0C0  4110D060  05EF5800
D0BC8609  D2E05800  D0A88609  D2E05820  D0B45020  D0F05830  D0B01432
8639D2D4  5420D0B8  8629D2D4  58F0D0C4  C3D6E5C5  F0F0F1F7*
02E3E7E3  40000354  40400038  40400001  45E0F004  00000006  000000B6
45E0F010  5080D098  1BFF58E0  D00007FE  58F0D0C0  4110D060  05EF5800
D0B08609  D2D45800  D0A88609  D2E058F0  C3D6E5C5  F0F0F1F8*
02E3E7E3  4000038C  40400038  40400001  D0C41800  45E0F004  00000006
000000E5  45E0F010  5080D098  1BFF58E0  D00007FE  58F0D0C0  4110D060
05EF5800  D0A88609  D2E05820  D0B05420  C3D6E5C5  F0F0F1F9*
02E3E7E3  400003C4  40400038  40400001  D0B48629  D2D458F0  D0C41800

MEMBER NAME  COVER
45E0F004  00000006  00000114  45E0F010  5080D098  1BFF58E0  D00007FE
5800D078  5000D098  1BFF58E0  D00007FE  C3D6E5C5  F0F0F2F0**
02E3E7E3  400003FC  40400038  40400001  5800D07C  5000D098  1BFF58E0
D00007FE  5800D080  5000D098  1BFF58E0  D00007FE  5080D098  1BFF58E0
D00007FE  5800D088  5000D098  1BFF58E0  C3D6E5C5  F0F0F2F1*
02E3E7E3  40000434  40400038  40400001  D00007FE  58A0D004  58E0A00C
58B0A018  5810B004  5820D0A0  50201000  5830B00C  5840D0A4  50403000
5850B010  5860D098  50605000  18DA92FF  C3D6E5C5  F0F0F2F2*
02E3E7E3  4000046C  40400038  40400001  A00C982C  A01C07FE  987A1004
58207000  5020D0A0  58209000  5020D0A4  5820A000  5020D098  58201000
41302000  41500004  1B255C40  D07C1B25  C3D6E5C5  F0F0F2F3*
02E3E7E3  400004A4  40400038  40400001  5020D0C8  5030D0CC  5030D04C
5030D068  58201008  41302000  41500004  1B255C40  D07C1B25  5020D0D0
5030D0D4  5030D054  5030D060  47F0D0F4  C3D6E5C5  F0F0F2F4*
02E3E7E3  40000020  40400008  40400001  00000474  00000148  40404040
40404040  40404040  40404040  40404040  40404040  40404040  40404040
40404040  40404040  40404040  40404040  C3D6E5C5  F0F0F2F5*
02D9D3C4  40404040  40400038  40404040  00020001  1C000208  00030001
1C00020C  00010001  0C000308  00010001  0C00035C  00010001  0C000398
00010001  0C0003D8  00010001  0C000020  C3D6E5C5  F0F0F2F6*
02E3E7E3  40000148  40400004  40400001  00000438  40404040  40404040
40404040  40404040  40404040  40404040  40404040  40404040  40404040
40404040  40404040  40404040  40404040  C3D6E5C5  F0F0F2F7*
02E3E7E3  40000198  40400004  40400001  000001E8  40404040  40404040
40404040  40404040  40404040  40404040  40404040  40404040  40404040
40404040  40404040  40404040  40404040  C3D6E5C5  F0F0F2F8*
02E3E7E3  400001A0  40400008  40400001  000001EC  800001F0  40404040
40404040  40404040  40404040  40404040  40404040  40404040  40404040
```

```
40404040  40404040  40404040  40404040  C3D6E5C5  F0F0F2F9*
02E3E7E3  400001AC  40400004  40400001  000001EC  40404040  40404040
40404040  40404040  40404040  40404040  40404040  40404040  40404040
40404040  40404040  40404040  40404040  C3D6E5C5  F0F0F3F0**
02E3E7E3  400001B4  40400008  40400001  000001E8  800001F0  40404040
40404040  40404040  40404040  40404040  40404040  40404040  40404040
40404040  40404040  40404040  40404040  C3D6E5C5  F0F0F3F1*
02D9D3C4  40404040  40400038  40404040  00010001  0C000024  00010001
0C000148  00010001  0C000198  00010001  0C0001A0  00010001  0C0001A4
00010001  0C0001AC  00010001  0C0001B4  C3D6E5C5  F0F0F3F2*
02E3E7E3  40000220  4040001C  40400001  00000000  00000000  00000000
00000000  00000000  005C0003  00000000  40404040  40404040  40404040
40404040  40404040  40404040  40404040  C3D6E5C5  F0F0F3F3*
02D9D3C4  40404040  40400008  40404040  00010001  0C0001B8  40404040
40404040  40404040  40404040  40404040  40404040  40404040  40404040
40404040  40404040  40404040  40404040  C3D6E5C5  F0F0F3F4*
02C5D5C4  40404040  40404040  40404040  40404040  40404040  40404040
000004DC  F1F5F7F3  F460C6D6  F34040F0  F2F0F2F8  F7F0F9F8  40F0F84B
F1F44BF0  F8404040  C3D6E5C5  D9404040  C3D6E5C5  F0F0F3F5**

MEMBER NAME  CNDCHN
02C5E2C4  40404040  40400010  40400001  C3D5C4C3  C8D54040  00000000
40000000  40404040  40404040  40404040  40404040  40404040  40404040
40404040  40404040  40404040  40404040  C3D5C4C3  F0F0F0F1*
02E3E7E3  40000000  40400038  40400001  47F0F00C  07C3D5C4  C3C8D540
90ECD00C  184D98CD  F0205040  D00450D0  400807FC  40404040  40404040
E4D5C1C2  D3C540E3  D640C3C8  C1C9D540  C3D5C4C3  F0F0F0F2*
02E3E7E3  40000130  40400038  40400001  00000000  00000000  00000001
00000001  00000002  00000003  00000005  00000006  00000008  0000000E
0000000F  0000083F  401DF3B6  4029FBE7  C3D5C4C3  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C3D5C4C3  F0F0F0F4*
02E3E7E3  40000168  40400014  40400001  403EF9DB  40400000  41100000
00000000  00000000  40404040  40404040  40404040  40404040  40404040
40404040  40404040  40404040  40404040  C3D5C4C3  F0F0F0F5*
02C5E2C4  40404040  40400010  40400003  C3C1C4D7  E3404040  02000000
40000000  40404040  40404040  40404040  40404040  40404040  40404040
40404040  40404040  40404040  40404040  C3D5C4C3  F0F0F0F6*
02C5E2C4  40404040  40400010  40400004  D4E5C3C8  D9404040  02000000
40000000  40404040  40404040  40404040  40404040  40404040  40404040
40404040  40404040  40404040  40404040  C3D5C4C3  F0F0F0F7*
02E3E7E3  40000510  4040000C  40400001  00000000  00000000  00000000
40404040  40404040  40404040  40404040  40404040  40404040  40404040
40404040  40404040  40404040  40404040  C3D5C4C3  F0F0F0F8*
02C5E2C4  40404040  40400010  40400005  C3C1C4C3  C9D94040  02000000
40000000  40404040  40404040  40404040  40404040  40404040  40404040
40404040  40404040  40404040  40404040  C3D5C4C3  F0F0F0F9*
02E3E7E3  40000520  40400008  40400001  00000000  00000000  40404040
40404040  40404040  40404040  40404040  40404040  40404040  40404040
40404040  40404040  40404040  40404040  C3D5C4C3  F0F0F1F0**
02C5E2C4  40404040  40400010  40400006  C3C1C4E2  E4D74040  02000000
40000000  40404040  40404040  40404040  40404040  40404040  40404040
40404040  40404040  40404040  40404040  C3D5C4C3  F0F0F1F1*
02C5E2C4  40404040  40400010  40400007  C3C8C1C9  D5F14040  02000000
40000000  40404040  40404040  40404040  40404040  40404040  40404040
40404040  40404040  40404040  40404040  C3D5C4C3  F0F0F1F2*
02E3E7E3  4000052C  4040000C  40400001  00000000  00000000  00000000
40404040  40404040  40404040  40404040  40404040  40404040  40404040
40404040  40404040  40404040  40404040  C3D5C4C3  F0F0F1F3*
02E3E7E3  40000584  40400038  40400001  58B0D104  7800D138  7000D1A8
```

| | | | | | | |
|---|---|---|---|---|---|---|
| 5800D0F8 | 5000D194 | 5800D11C | 5000D170 | 5800D10C | 5000D154 | 5800D110 |
| 5000D158 | 50B0D150 | 5800D168 | 5000D15C | C3D5C4C3 | F0F0F1F4* | |
| 02E3E7E3 | 400005BC | 40400038 | 40400001 | 5800D0FC | 5000D17C | 18205000 |
| D1907800 | D1347000 | D1885800 | D5445000 | D53C5800 | D5485000 | D5405870 |
| D510189B | 18B258A0 | D4EC5880 | D4D85800 | C3D5C4C3 | F0F0F1F5* | |
| 02E3E7E3 | 400005F4 | 40400038 | 40400001 | D17C5900 | D1684750 | D5CE50B0 |
| D19047F0 | D8C85850 | D1505C40 | D5145050 | D52C1825 | 5A20D534 | 4102A000 |
| 5000D06C | 58F0D4FC | 4110D06C | 05EF41E0 | C3D5C4C3 | F0F0F1F6* | |
| 02E3E7E3 | 4000062C | 40400038 | 40400001 | 000415FE | 4720D602 | 58EFD04C |
| 07FE47F0 | D8625800 | D1005000 | D19412BB | 4780D80C | 5850D150 | 5C40D514 |
| 18251A27 | 7802A000 | 7000D518 | 18255A20 | C3D5C4C3 | F0F0F1F7* | |
| 02E3E7E3 | 40000664 | 40400038 | 40400001 | D51C7802 | A0007000 | D5205820 |
| D1185860 | D1181889 | 189258A0 | D10458F0 | D4D87840 | F0041878 | 7820D518 |
| 7B29D1A4 | 30623964 | 4730D688 | 7820D520 | C3D5C4C3 | F0F0F1F8* | |
| 02E3E7E3 | 4000069C | 40400038 | 40400001 | 7B29D1A8 | 30623964 | 4730D688 |
| 5070D174 | 5880D4D8 | 58A0D4EC | 5890D104 | 5870D510 | 47F0D6D2 | 1A96878A |
| D64E5070 | D1745880 | D4D858A0 | D4EC5890 | C3D5C4C3 | F0F0F1F9* | |
| 02E3E7E3 | 400006D4 | 40400038 | 40400001 | D1045870 | D5101AB9 | 183B8930 |

MEMBER NAME CNDCHN

| | | | | | | |
|---|---|---|---|---|---|---|
| 00035820 | D52C1A27 | 4103D1A4 | 5000D090 | 4102A000 | 5000D094 | 9280D094 |
| 58F0D4E8 | 4110D08C | 05EF47F0 | D71A59B0 | C3D5C4C3 | F0F0F2F0** | |
| 02E3E7E3 | 4000070C | 40400038 | 40400001 | D1744780 | D718182B | 5B20D174 |
| 89200003 | 5020D16C | 5830D174 | 89300003 | 5820D174 | 1A298920 | 00034103 |
| D1A45000 | D09C4102 | D1A45000 | D0A09280 | C3D5C4C3 | F0F0F2F1* | |
| 02E3E7E3 | 40000744 | 40400038 | 40400001 | D0A058F0 | D4E84110 | D09805EF |
| 1BB97800 | D1987000 | D5047800 | D19C7000 | D5085820 | D1185860 | D1181889 |
| 189258A0 | D10458F0 | D4D87840 | F0041878 | C3D5C4C3 | F0F0F2F2* | |
| 02E3E7E3 | 4000077C | 40400038 | 40400001 | 7820D504 | 7B29D1A4 | 30623964 |
| 4730D77C | 7820D508 | 7B29D1A8 | 30623964 | 4730D77C | 5070D174 | 5880D4D8 |
| 58A0D4EC | 5890D104 | 5870D510 | 47F0D7C0 | C3D5C4C3 | F0F0F2F3* | |
| 02E3E7E3 | 400007B4 | 40400038 | 40400001 | 1A96878A | D7425070 | D1745880 |
| D4D858A0 | D4EC5890 | D1045870 | D5101AB9 | 182B8920 | 00034102 | D1A45000 |
| D0904100 | D1985000 | D0949280 | D09458F0 | C3D5C4C3 | F0F0F2F4* | |
| 02E3E7E3 | 400007EC | 40400038 | 40400001 | D4E84110 | D08C05EF | 47F0D8A0 |
| 59B0D174 | 4780D806 | 182B5B20 | D1748920 | 00035020 | D16C5830 | D1748930 |
| 00035820 | D1741A29 | 89200003 | 4103D1A4 | C3D5C4C3 | F0F0F2F5* | |
| 02E3E7E3 | 40000824 | 40400038 | 40400001 | 5000D09C | 4102D1A4 | 5000D0A0 |
| 9280D0A0 | 58F0D4E8 | 4110D098 | 05EF1BB9 | 47F0D8A0 | 1AB9184B | 89400003 |
| 5830D52C | 1A374104 | D1A45000 | D0904103 | C3D5C4C3 | F0F0F2F6* | |
| 02E3E7E3 | 4000085C | 40400038 | 40400001 | A0005000 | D0949280 | D09458F0 |
| D4E84110 | D08C05EF | 1AB9182B | 89200003 | 4102D1A4 | 5000D090 | 4100D198 |
| 5000D094 | 9280D094 | 58F0D4E8 | 4110D08C | C3D5C4C3 | F0F0F2F7* | |
| 02E3E7E3 | 40000894 | 40400038 | 40400001 | 05EF47F0 | D8A058E0 | D53C5800 |
| D15058F0 | D4E0500E | F00058E0 | D5405800 | D184500E | F0005800 | D5405A00 |
| D1185000 | D5405800 | D53C5A00 | D1185000 | C3D5C4C3 | F0F0F2F8* | |
| 02E3E7E3 | 400008CC | 40400038 | 40400001 | D53C5800 | D1781A09 | 5000D178 |
| 5800D15C | 5B00D184 | 5000D15C | 5800D17C | 5A00D184 | 5000D17C | 5800D150 |
| 5A00D184 | 5000D150 | 47F0D5BA | 58B0D104 | C3D5C4C3 | F0F0F2F9* | |
| 02E3E7E3 | 40000904 | 40400038 | 40400001 | 5800D194 | 1BFF860F | D8DE1BFF |
| 58E0D000 | 07FE185B | 186B5870 | D1085880 | D11858A0 | D1187808 | D1A47000 |
| D5247808 | D1A87000 | D52858B0 | D19089B0 | C3D5C4C3 | F0F0F3F0** | |
| 02E3E7E3 | 4000093C | 40400038 | 40400001 | 00031837 | 89300003 | 18937840 |
| D1887820 | D5247B29 | D1A43062 | 39644730 | D9367820 | D5287B29 | D1A83062 |
| 39644730 | D93647F0 | D950879A | D9125970 | C3D5C4C3 | F0F0F3F1* | |
| 02E3E7E3 | 40000974 | 40400038 | 40400001 | D1904770 | D94647F0 | D9AA1A56 |
| 1A8A1A76 | 47F0D8EE | 5840D190 | 1B461804 | 89000003 | 5000D16C | 18351A36 |
| 89300003 | 4108D1A4 | 5000D09C | 4103D1A4 | C3D5C4C3 | F0F0F3F2* | |
| 02E3E7E3 | 400009AC | 40400038 | 40400001 | 5000D0A0 | 9280D0A0 | 58F0D4E8 |
| 4110D098 | 05EF5970 | D1904770 | D99247F0 | D99C1824 | 5040D190 | 47F0D8EE |
| 58B0D104 | 5800D190 | 1B0B5000 | D19058B0 | C3D5C4C3 | F0F0F3F3* | |

| | | | | | | |
|---|---|---|---|---|---|---|
| 02E3E7E3 | 400009E4 | 40400038 | 40400001 | D1045820 | D1908920 | 00035890 |
| D11818B2 | 4109D1A4 | 5000D0A4 | 4109D1A8 | 5000D0A8 | 58F0D4F8 | 4110D0A4 |
| 05EF41E0 | 000415FE | 4720D9E6 | 58EFD054 | C3D5C4C3 | F0F0F3F4* | |
| 02E3E7E3 | 40000A1C | 40400038 | 40400001 | 07FE4100 | D1A05000 | D0904109 |
| D1A45000 | D0949280 | D09458F0 | D4E84110 | D08C05EF | 58F0D4F4 | 4110D0EC |
| 05EF41E0 | 000415FE | 4720DA1E | 58EFD05C | C3D5C4C3 | F0F0F3F5* | |
| 02E3E7E3 | 40000A54 | 40400038 | 40400001 | 07FE58F0 | D4DC4110 | D0F005EF |
| 41E00004 | 15FE4720 | DA3858EF | D06407FE | 5A90D118 | 199B47C0 | D9BC58B0 |
| D10441F0 | 000458E0 | D00007FE | 58A0D004 | C3D5C4C3 | F0F0F3F6* | |
| 02E3E7E3 | 40000A8C | 40400038 | 40400001 | 58E0A00C | 58B0A018 | 5810B008 |
| 5820D178 | 50201000 | 18DA92FF | A00C982C | A01C07FE | 98791004 | 58207000 |
| 5020D168 | 58208000 | 5020D178 | 58201000 | C3D5C4C3 | F0F0F3F7* | |
| 02E3E7E3 | 40000AC4 | 40400038 | 40400001 | 41302000 | 41500004 | 1B255C40 |
| D11C1B25 | 5020D4EC | 5030D4F0 | 5820100C | 41302000 | 41500004 | 1B255C40 |
| D1081B25 | 5020D4E0 | 5030D4E4 | 47F0D54C | C3D5C4C3 | F0F0F3F8* | |
| 02E3E7E3 | 40000020 | 40400008 | 40400001 | 00000AAC | 00000038 | 40404040 |
| 40404040 | 40404040 | 40404040 | 40404040 | 40404040 | 40404040 | 40404040 |

MEMBER NAME CNDCHN

| | | | | | | |
|---|---|---|---|---|---|---|
| 40404040 | 40404040 | 40404040 | 40404040 | C3D5C4C3 | F0F0F3F9* | |
| 02D9D3C4 | 40404040 | 40400038 | 40404040 | 00020001 | 0C000510 | 00030001 |
| 1C000514 | 00040001 | 1C000520 | 00050001 | 1C00052C | 00060001 | 1C000530 |
| 00070001 | 1C000534 | 00010001 | 0C000020 | C3D5C4C3 | F0F0F4F0** | |
| 02E3E7E3 | 40000038 | 40400004 | 40400001 | 00000A88 | 40404040 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F1* | |
| 02E3E7E3 | 40000084 | 40400018 | 40400001 | 0000063A | 0000063E | 00000A1E |
| 00000A70 | 00000A56 | 00000A70 | 40404040 | 40404040 | 40404040 | 40404040 |
| 40404040 | 40404040 | 40404040 | 40404040 | C3D5C4C3 | F0F0F4F2* | |
| 02D9D3C4 | 40404040 | 40400038 | 40404040 | 00010001 | 0C000024 | 00010001 |
| 0C000038 | 00010001 | 0C000084 | 00010001 | 0C000088 | 00010001 | 0C00008C |
| 00010001 | 0C000090 | 00010001 | 0C000094 | C3D5C4C3 | F0F0F4F3* | |
| 02E3E7E3 | 4000009C | 40400008 | 40400001 | 00000A70 | 00000A70 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F4* | |
| 02E3E7E3 | 400000A8 | 40400014 | 40400001 | 000001A8 | 00000194 | 000001BC |
| 0000018C | 00000190 | 40404040 | 40404040 | 40404040 | 40404040 | 40404040 |
| 40404040 | 40404040 | 40404040 | 40404040 | C3D5C4C3 | F0F0F4F5* | |
| 02D9D3C4 | 40404040 | 40400038 | 40404040 | 00010001 | 0C000098 | 00010001 |
| 0C00009C | 00010001 | 0C0000A0 | 00010001 | 0C0000A8 | 00010001 | 0C0000AC |
| 00010001 | 0C0000B0 | 00010001 | 0C0000B4 | C3D5C4C3 | F0F0F4F6* | |
| 02E3E7E3 | 400000BC | 4040000C | 40400001 | 00000004 | 800001D0 | 00000150 |
| 40404040 | 40404040 | 40404040 | 40404040 | 40404040 | 40404040 | 40404040 |
| 40404040 | 40404040 | 40404040 | 40404040 | C3D5C4C3 | F0F0F4F7* | |
| 02E3E7E3 | 400000CC | 40400008 | 40400001 | 80000000 | 000001A4 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F8* | |
| 02E3E7E3 | 400000D8 | 40400004 | 40400001 | 80000000 | 40404040 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F9* | |
| 02E3E7E3 | 400000E4 | 4040000C | 40400001 | 00000134 | 00000158 | 00000164 |
| 40404040 | 40404040 | 40404040 | 40404040 | 40404040 | 40404040 | 40404040 |
| 40404040 | 40404040 | 40404040 | 40404040 | C3D5C4C3 | F0F0F5F0** | |
| 02D9D3C4 | 40404040 | 40400038 | 40404040 | 00010001 | 0C0000B8 | 00020001 |
| 0C0000BC | 00010001 | 0C0000C0 | 00010001 | 0C0000C4 | 00010001 | 0C0000D0 |
| 00010001 | 0C0000E4 | 00010001 | 0C0000E8 | C3D5C4C3 | F0F0F5F1* | |
| 02E3E7E3 | 400000F0 | 4040001C | 40400001 | 00000160 | 00000028 | 00000134 |
| 00000134 | 00000134 | 00000134 | 0000013C | 40404040 | 40404040 | 40404040 |
| 40404040 | 40404040 | 40404040 | 40404040 | C3D5C4C3 | F0F0F5F2* | |
| 02D9D3C4 | 40404040 | 40400038 | 40404040 | 00010001 | 0C0000EC | 00010001 |
| 0C0000F0 | 00010001 | 0C0000F4 | 00010001 | 0C0000F8 | 00010001 | 0C0000FC |

```
00010001  0C000100  00010001  0C000104  C3D5C4C3  F0F0F5F3*
02E3E7E3  4000010C  4040001C  40400001  00000144  00000134  00000134
00000164  00000168  80000134  800001D8  40404040  40404040  40404040
40404040  40404040  40404040  40404040  C3D5C4C3  F0F0F5F4*
02D9D3C4  40404040  40400038  40404040  00010001  0C000108  00010001
0C00010C  00010001  0C000110  00010001  0C000114  00010001  0C000118
00010001  0C00011C  00010001  0C000120  C3D5C4C3  F0F0F5F5*
02E3E7E3  40000128  40400008  40400001  00000140  800001D8  40404040
40404040  40404040  40404040  40404040  40404040  40404040  40404040
40404040  40404040  40404040  40404040  C3D5C4C3  F0F0F5F6*
02E3E7E3  40000538  40400038  40400001  00000000  00000000  00000000
00000000  00000014  00000038  00000000  00000018  00000000  00000000
00000000  00CC000F  00000000  00000004  C3D5C4C3  F0F0F5F7*
02E3E7E3  40000570  40400014  40400001  00000000  03A40011  03380012
0000000C  00000010  40404040  40404040  40404040  40404040  40404040
40404040  40404040  40404040  40404040  C3D5C4C3  F0F0F5F8*

MEMBER NAME  CNDCHN
02D9D3C4  40404040  40400018  40404040  00010001  0C000124  00010001
0C000128  00010001  0C00012C  40404040  40404040  40404040  40404040
40404040  40404040  40404040  40404040  C3D5C4C3  F0F0F5F9*
02C5D5C4  40404040  40404040  40404040  40404040  40404040  40404040
00000AFC  F1F5F7F3  F460C6D6  F34040F0  F2F0F2F8  F7F0F9F8  40F0F84B
F1F44BF1  F2404040  C3D5C4C3  C8D54040  C3D5C4C3  F0F0F6F0**

MEMBER NAME  CNTRD
02C5E2C4  40404040  40400010  40400001  C3D5E3D9  C4404040  00000000
40000000  40404040  40404040  40404040  40404040  40404040  40404040
40404040  40404040  40404040  40404040  C3D5E3D9  F0F0F0F1*
02E3E7E3  40000000  40400028  40400001  47F0F00C  07C3D5E3  D9C44040
90ECD00C  184D98CD  F0205040  D00450D0  400807FC  40404040  40404040
40404040  40404040  40404040  40404040  C3D5E3D9  F0F0F0F2*
02E3E7E3  40000078  40400038  40400001  41100000  00000000  00000000
00000000  41200000  00000000  41600000  00000000  00000000  00000001
00000002  00000006  41100000  41200000  C3D5E3D9  F0F0F0F3*
02E3E7E3  400000B0  40400008  40400001  00000000  00000000  40404040
40404040  40404040  40404040  40404040  40404040  40404040  40404040
40404040  40404040  40404040  40404040  C3D5E3D9  F0F0F0F4*
02E3E7E3  40000110  40400004  40400001  00000000  40404040  40404040
40404040  40404040  40404040  40404040  40404040  40404040  40404040
40404040  40404040  40404040  40404040  C3D5E3D9  F0F0F0F5*
02E3E7E3  40000134  40400038  40400001  58B0D0E8  5880D074  5820D0C0
89200002  5850D0AC  89500002  1C481A25  7822B000  7020D0E0  5820D0C4
89200002  5850D0AC  89500002  1C481A25  C3D5E3D9  F0F0F0F6*
02E3E7E3  4000016C  40400038  40400001  7822B000  7020D0E4  6800D058
6000D0D8  6000D0D0  6000D0C8  5870D0A8  1B781828  7800D0E0  7000D0F4
7800D0E4  7000D0F8  18925820  D0C08920  C3D5E3D9  F0F0F0F7*
02E3E7E3  400001A4  40400038  40400001  00025850  D0AC8950  00021C49
1A257842  B0007B40  D0F47040  D0985830  D0C08930  000218A9  1AA85850
D0AC8950  00021C4A  1A357803  B0007B00  C3D5E3D9  F0F0F0F8*
02E3E7E3  400001DC  40400038  40400001  D0F47000  D09C5830  D0C48930
00025850  D0AC8950  00021C49  1A357863  B0007B60  D0F87060  D0A05830
D0C48930  00025850  D0AC8950  00021C4A  C3D5E3D9  F0F0F0F9*
02E3E7E3  40000214  40400038  40400001  1A357823  B0007B20  D0F83C42
7040D0FC  2B003804  28406A40  D0D86040  D1007840  D09C3C46  7040D108
2B003804  28406860  D1002B64  6060D0D8  C3D5E3D9  F0F0F1F0**
02E3E7E3  4000024C  40400038  40400001  7840D09C  7A40D098  7040D100
7800D0FC  7B00D108  7000D0FC  7840D100  3C402B00  38042840  6A40D0C8
6040D0C8  7A20D0A0  7C20D0FC  2B003802  C3D5E3D9  F0F0F1F1*
02E3E7E3  40000284  40400038  40400001  28206A20  D0D06020  D0D0189A
19A747C0  D1766860  D0D86D60  D0606060  D0D86C60  D0686840  D0C82D46
```

```
2B227820  D0F42804  2A027000  D0B06840  C3D5E3D9  F0F0F1F2*
02E3E7E3  400002BC  40400038  40400001  D0D02D46  2B667860  D0F82804
2A067000  D0B46820  D0D82022  28026C00  D0507000  D0B81BFF  58E0D000
07FE58A0  D00458E0  A00C58B0  A0185810  C3D5E3D9  F0F0F1F3*
02E3E7E3  400002F4  40400038  40400001  B0147820  D0B87020  10005820
B0187840  D0B07040  20005830  B01C7860  D0B47060  300018DA  92FFA00C
982CA01C  07FE987B  10045820  70005020  C3D5E3D9  F0F0F1F4*
02E3E7E3  4000032C  40400038  40400001  D0AC5820  80005020  D0A85820
90005020  D0C05820  A0005020  D0C47820  B0007020  D0B89878  10187820
70007020  D0B07820  80007020  D0B45820  C3D5E3D9  F0F0F1F5*
02E3E7E3  40000364  4040001E  40400001  10004130  20004150  00041B25
5C40D0AC  1B255020  D0E85030  D0EC47F0  D10C4040  40404040  40404040
40404040  40404040  40404040  40404040  C3D5E3D9  F0F0F1F6*
02E3E7E3  40000020  4040000C  40400001  00000322  00000028  000002E6
40404040  40404040  40404040  40404040  40404040  40404040  40404040
40404040  40404040  40404040  40404040  C3D5E3D9  F0F0F1F7*
02E3E7E3  40000118  4040001C  40400001  00000000  00000000  00000000
00000000  00000000  00000000  00000000  40404040  40404040  40404040
40404040  40404040  40404040  40404040  C3D5E3D9  F0F0F1F8*
02D9D3C4  40404040  40400018  40404040  00010001  0C000020  00010001
0C000024  00010001  0C000028  40404040  40404040  40404040  40404040
40404040  40404040  40404040  40404040  C3D5E3D9  F0F0F1F9*
02C5D5C4  40404040  40404040  40404040  40404040  40404040  40404040

MEMBER NAME  CNTRD
00000382  F1F5F7F3  F460C6D6  F34040F0  F2F0F2F8  F7F0F9F8  40F0F84B
F1F44BF1  F7404040  C3D5E3D9  C4404040  C3D5E3D9  F0F0F2F0**

MEMBER NAME  CMPRSS
02C5E2C4  40404040  40400010  40400001  C3D4D7D9  E2E24040  00000000
40000000  40404040  40404040  40404040  40404040  40404040  40404040
40404040  40404040  40404040  40404040  C3D4D7D9  F0F0F0F1*
02E3E7E3  40000000  40400038  40400001  47F0F00C  07C3D4D7  D9E2E240
90ECD00C  184D98CD  F0205040  D00450D0  400807FC  40404040  40404040
021A2540  C5D9D9D6  D940C9D5  40C2C3E2  C3D4D7D9  F0F0F0F2*
02E3E7E3  40000038  40400019  40400001  D3C9C240  C9D540C3  D4D7D9E2
E240E2E4  C2D9D6E4  E3C9D5C5  22404040  40404040  40404040  40404040
40404040  40404040  40404040  40404040  C3D4D7D9  F0F0F0F3*
02E3E7E3  40000058  40400008  40400001  40404040  40404040  40404040
40404040  40404040  40404040  40404040  40404040  40404040  40404040
40404040  40404040  40404040  40404040  C3D4D7D9  F0F0F0F4*
02E3E7E3  400000D8  40400010  40400001  00000000  00000001  00000000
00000000  40404040  40404040  40404040  40404040  40404040  40404040
40404040  40404040  40404040  40404040  C3D4D7D9  F0F0F0F5*
02C5E2C4  40404040  40400010  40400002  D4E5C3C8  D9404040  02000000
40000000  40404040  40404040  40404040  40404040  40404040  40404040
40404040  40404040  40404040  40404040  C3D4D7D9  F0F0F0F6*
02E3E7E3  40000100  40400004  40400001  00000000  40404040  40404040
40404040  40404040  40404040  40404040  40404040  40404040  40404040
40404040  40404040  40404040  40404040  C3D4D7D9  F0F0F0F7*
02C5E2C4  40404040  40400010  40400003  C9C2C3D6  D47B4040  02000000
40000000  40404040  40404040  40404040  40404040  40404040  40404040
40404040  40404040  40404040  40404040  C3D4D7D9  F0F0F0F8*
02E3E7E3  40000108  40400008  40400001  00000000  00000000  40404040
40404040  40404040  40404040  40404040  40404040  40404040  40404040
40404040  40404040  40404040  40404040  C3D4D7D9  F0F0F0F9*
02C5E2C4  40404040  40400010  40400004  D2D6D4D7  D9E54040  02000000
40000000  40404040  40404040  40404040  40404040  40404040  40404040
40404040  40404040  40404040  40404040  C3D4D7D9  F0F0F1F0**
02E3E7E3  40000114  40400038  40400001  00000000  00000000  5890D0AC
58B0D0A0  5880D07C  5870D078  5070D08C  18A8410A  B0005000  D05458F0
```

```
D0B84110  D05405EF  41E00004  15FE4720  C3D4D7D9  F0F0F1F1*
02E3E7E3  4000014C  40400038  40400001  D0F458EF  D04C07FE  5800D098
12004780  D12C5800  D08C5A00  D07C5000  D08C58E0  D08C410E  90005000
D070410A  B0005000  D0749280  D07458F0  C3D4D7D9  F0F0F1F2*
02E3E7E3  40000184  40400038  40400001  D0A84110  D06C05EF  5AA0D07C
59A0D090  47C0D0D2  5800D08C  12004770  D14C41F0  000458E0  D00007FE
1BFF58E0  D00007FE  58F0D0B4  45E0F004  C3D4D7D9  F0F0F1F3*
02E3E7E3  400001BC  40400038  40400001  00000006  00000028  45E0F010
1BFF58E0  D00007FE  58A0D004  58E0A00C  58B0A018  5810B00C  5820D08C
50201000  18DA92FF  A00C982C  A01C07FE  C3D4D7D9  F0F0F1F4*
02E3E7E3  400001F4  40400038  40400001  98791004  58207000  5020D090
58209000  5020D08C  58201000  41302000  41500001  1B255020  D0A05030
D0A45820  10084130  20004150  00011B25  C3D4D7D9  F0F0F1F5*
02E3E7E3  4000022C  4040000C  40400001  5020D0AC  5030D0B0  47F0D0BC
40404040  40404040  40404040  40404040  40404040  40404040  40404040
40404040  40404040  40404040  40404040  C3D4D7D9  F0F0F1F6*
02E3E7E3  40000020  40400008  40400001  000001F4  00000060  40404040
40404040  40404040  40404040  40404040  40404040  40404040  40404040
40404040  40404040  40404040  40404040  C3D4D7D9  F0F0F1F7*
02E3E7E3  40000060  40400004  40400001  000001D0  40404040  40404040
40404040  40404040  40404040  40404040  40404040  40404040  40404040
40404040  40404040  40404040  40404040  C3D4D7D9  F0F0F1F8*
02E3E7E3  400000AC  40400004  40400001  00000154  40404040  40404040
40404040  40404040  40404040  40404040  40404040  40404040  40404040
40404040  40404040  40404040  40404040  C3D4D7D9  F0F0F1F9*
02D9D3C4  40404040  40400038  40404040  00020001  1C000108  00030001

MEMBER NAME  CMPRSS
1C000114  00040001  1C000118  00010001  0C0001C0  00010001  0C000020
00010001  0C000024  00010001  0C000060  C3D4D7D9  F0F0F2F0**
02E3E7E3  400000B0  40400004  40400001  000001B4  40404040  40404040
40404040  40404040  40404040  40404040  40404040  40404040  40404040
40404040  40404040  40404040  40404040  C3D4D7D9  F0F0F2F1*
02E3E7E3  400000B8  40400018  40400001  000000DC  00000058  000000DC
000000DC  800000F8  000000DC  40404040  40404040  40404040  40404040
40404040  40404040  40404040  40404040  C3D4D7D9  F0F0F2F2*
02D9D3C4  40404040  40400038  40404040  00010001  0C0000AC  00010001
0C0000B0  00010001  0C0000B8  00010001  0C0000BC  00010001  0C0000C0
00010001  0C0000C4  00010001  0C0000C8  C3D4D7D9  F0F0F2F3*
02E3E7E3  400000D4  40400004  40400001  80000000  40404040  40404040
40404040  40404040  40404040  40404040  40404040  40404040  40404040
40404040  40404040  40404040  40404040  C3D4D7D9  F0F0F2F4*
02D9D3C4  40404040  40400008  40404040  00010001  0C0000CC  40404040
40404040  40404040  40404040  40404040  40404040  40404040  40404040
40404040  40404040  40404040  40404040  C3D4D7D9  F0F0F2F5*
02C5D5C4  40404040  40404040  40404040  40404040  40404040  40404040
00000238  F1F5F7F3  F460C6D6  F34040F0  F2F0F2F8  F7F0F9F8  40F0F84B
F1F44BF2  F1404040  C3D4D7D9  E2E24040  C3D4D7D9  F0F0F2F6**

MEMBER NAME  CWCCW
02C5E2C4  40404040  40400010  40400001  C3E6C3C3  E6404040  00000000
40000000  40404040  40404040  40404040  40404040  40404040  40404040
40404040  40404040  40404040  40404040  C3E6C3C3  F0F0F0F1*
02E3E7E3  40000000  40400038  40400001  47F0F00C  07C3E6C3  C3E64040
90ECD00C  184D98CD  F0205040  D00450D0  400807FC  40404040  40404040
021A2B40  C140F1F8  F040C4C5  C7D9C5C5  C3E6C3C3  F0F0F0F2*
02E3E7E3  40000038  40400038  40400001  40C1D5C7  D3C540C6  D6E4D5C4
40C9D540  D9D6E4E3  C9D5C540  C3E6C3C3  E64B2202  1A1C40E4  D5C1C2D3
C540E3D6  40D6D9C4  C5D940D7  D6C3D2C5  C3E6C3C3  F0F0F0F3*
02E3E7E3  40000070  40400014  40400001  E340E740  7E400A0A  061A0540
E8407E40  0A0A0622  40404040  40404040  40404040  40404040  40404040
```

```
40404040  40404040  40404040  40404040  C3E6C3C3  F0F0F0F4*
02E3E7E3  400000F0  40400020  40400001  00000000  00000000  00000001
00000002  41100000  41200000  00000000  00000000  40404040  40404040
40404040  40404040  40404040  40404040  C3E6C3C3  F0F0F0F5*
02C5E2C4  40404040  40400010  40400002  E2D8D9E3  40404040  02000000
40000000  40404040  40404040  40404040  40404040  40404040  40404040
40404040  40404040  40404040  40404040  C3E6C3C3  F0F0F0F6*
02E3E7E3  40000160  40400004  40400001  00000000  40404040  40404040
40404040  40404040  40404040  40404040  40404040  40404040  40404040
40404040  40404040  40404040  40404040  C3E6C3C3  F0F0F0F7*
02C5E2C4  40404040  40400010  40400003  C1D9C3D6  E2404040  02000000
40000000  40404040  40404040  40404040  40404040  40404040  40404040
40404040  40404040  40404040  40404040  C3E6C3C3  F0F0F0F8*
02C5E2C4  40404040  40400010  40400004  C9C2C3D6  D47B4040  02000000
40000000  40404040  40404040  40404040  40404040  40404040  40404040
40404040  40404040  40404040  40404040  C3E6C3C3  F0F0F0F9*
02E3E7E3  40000168  4040000C  40400001  00000000  00000000  00000000
40404040  40404040  40404040  40404040  40404040  40404040  40404040
40404040  40404040  40404040  40404040  C3E6C3C3  F0F0F1F0**
02E3E7E3  40000178  40400004  40400001  00000000  40404040  40404040
40404040  40404040  40404040  40404040  40404040  40404040  40404040
40404040  40404040  40404040  40404040  C3E6C3C3  F0F0F1F1*
02E3E7E3  4000019C  40400038  40400001  58A0D0D8  58B0D070  5880D0FC
7800D078  33007000  D10C58F0  D0E44110  D04C05EF  7000D110  7000D098
7800D06C  7000D094  7000D09C  5800D0C0  C3E6C3C3  F0F0F1F2*
02E3E7E3  400001D4  40400038  40400001  1B0B5000  D0B87820  D07C7C20
D1107020  D1007020  D1047020  D1087020  D0F4189B  58B0D0E8  18A95AA0
D070183A  5A30D070  5990D0B8  4750D188  C3E6C3C3  F0F0F1F3*
02E3E7E3  4000020C  40400038  40400001  5830D074  187A1C68  18275A20
D0F87862  B0001859  1C481825  5A20D0F8  38267B22  B0007020  D0A81827
1A287842  B0007040  D10C1825  1A287B42  C3E6C3C3  F0F0F1F4*
02E3E7E3  40000244  40400038  40400001  B0007040  D0B01853  1C481825
5A20D0F8  33667A62  B0007060  D0AC1825  1A287862  B0007B60  D10C7060
D0B43C22  3C447040  D10C3A24  7020D110  C3E6C3C3  F0F0F1F5*
02E3E7E3  4000027C  40400038  40400001  58F0D0E0  4110D050  05EF7820
D0A83D20  7020D0A8  3C227A20  D10C7020  D10C58F0  D0E04110  D05405EF
7000D110  7800D0B0  7D00D110  7000D0B0  C3E6C3C3  F0F0F1F6*
02E3E7E3  400002B4  40400038  40400001  7820D0AC  3C227840  D0B43C44
7040D10C  3A247020  D11058F0  D0E04110  D05805EF  7820D0AC  3D207020
D0AC3C22  7A20D10C  7020D10C  58F0D0E0  C3E6C3C3  F0F0F1F7*
02E3E7E3  400002EC  40400038  40400001  4110D05C  05EF7000  D1107800
D0B47D00  D1107000  D0B458F0  D0E44110  D06005EF  7000D0D0  58F0D0E4
4110D064  05EF7000  D0D47800  D0B03200  C3E6C3C3  F0F0F1F8*
02E3E7E3  40000324  40400038  40400001  47A0D2AC  7800D100  7B00D0D0
7000D0D0  7800D0B4  320047A0  D2C27800  D1047B00  D0D47000  D0D47820
D0D47B20  D0D07020  D0C847A0  D2DA7A20  C3E6C3C3  F0F0F1F9*
02E3E7E3  4000035C  40400038  40400001  D1087020  D0C87800  D0C87900

MEMBER NAME  CWCCW
D09847C0  D3027800  D0C87900  D0F447A0  D3027820  D0F47B20  D0C87A20
D0947020  D0947800  D0C83200  47C0D324  C3E6C3C3  F0F0F2F0**
02E3E7E3  40000394  40400038  40400001  7800D0C8  7900D098  47A0D324
7800D09C  7A00D0C8  7000D09C  7800D0C8  7900D098  4770D344  58F0D0F0
45E0F004  00000006  00000028  45E0F010  C3E6C3C3  F0F0F2F1*
02E3E7E3  400003CC  40400038  40400001  189A59A0  D0B847C0  D17058A0
D0D858B0  D0707800  D0947900  D09C47C0  D36A5800  D0685000  D0BC7800
D09C7900  D09447C0  D37A50B0  D0BC7820  C3E6C3C3  F0F0F2F2*
02E3E7E3  40000404  40400038  40400001  D09C3022  7840D094  30443B24
30227840  D1007B40  D0783924  47A0D39E  130B5000  D0BC133B  5930D0BC
4770D3D4  58F0D0F0  45E0F004  00000006  C3E6C3C3  F0F0F2F3*
02E3E7E3  4000043C  40400014  40400001  00000057  180005E0  5800D0DC
```

```
5000E00C  45E0F00C  40404040  40404040  40404040  40404040  40404040
40404040  40404040  40404040  40404040  C3E6C3C3  F0F0F2F4*
02E3E7E3  40000454  40400038  40400001  04700002  45E0F010  1BFF58E0
D00007FE  58A0D004  58E0A00C  58B0A018  5810B00C  5820D0BC  50201000
18DA92FF  A00C982C  A01C07FE  98791004  C3E6C3C3  F0F0F2F5*
02E3E7E3  4000048C  40400038  40400001  58207000  5020D0C0  58209000
5020D0BC  58201000  41302000  41500004  1B255C40  D0741B25  5020D0E8
5030D0EC  58201008  41302000  41500004  C3E6C3C3  F0F0F2F6*
02E3E7E3  400004C4  4040000E  40400001  1B255020  D0D85030  D0DC47F0
D1144040  40404040  40404040  40404040  40404040  40404040  40404040
40404040  40404040  40404040  40404040  C3E6C3C3  F0F0F2F7*
02E3E7E3  40000020  40400008  40400001  00000488  00000088  40404040
40404040  40404040  40404040  40404040  40404040  40404040  40404040
40404040  40404040  40404040  40404040  C3E6C3C3  F0F0F2F8*
02E3E7E3  40000088  40400004  40400001  00000464  40404040  40404040
40404040  40404040  40404040  40404040  40404040  40404040  40404040
40404040  40404040  40404040  40404040  C3E6C3C3  F0F0F2F9*
02D9D3C4  40404040  40400038  40404040  00020001  1C000168  00030001
1C00016C  00040001  1C000178  00010001  0C0003C4  00010001  0C00043C
00010001  0C000020  00010001  0C000024  C3E6C3C3  F0F0F3F0**
02E3E7E3  400000D4  4040001C  40400001  80000194  80000198  80000194
80000198  80000194  80000130  80000134  40404040  40404040  40404040
40404040  40404040  40404040  40404040  C3E6C3C3  F0F0F3F1*
02D9D3C4  40404040  40400038  40404040  00010001  0C000088  00010001
0C0000D4  00010001  0C0000D8  00010001  0C0000DC  00010001  0C0000E0
00010001  0C0000E4  00010001  0C0000E8  C3E6C3C3  F0F0F3F2*
02E3E7E3  4000017C  40400020  40400001  00000000  00000004  00000008
00000000  00000000  00000000  00000000  00000000  40404040  40404040
40404040  40404040  40404040  40404040  C3E6C3C3  F0F0F3F3*
02D9D3C4  40404040  40400008  40404040  00010001  0C0000EC  40404040
40404040  40404040  40404040  40404040  40404040  40404040  40404040
40404040  40404040  40404040  40404040  C3E6C3C3  F0F0F3F4*
02C5D5C4  40404040  40404040  40404040  40404040  40404040  40404040
000004D2  F1F5F7F3  F460C6D6  F34040F0  F2F0F2F8  F7F0F9F8  40F0F84B
F1F44BF2  F5404040  C3E6C3C3  E6404040  C3E6C3C3  F0F0F3F5**

MEMBER NAME  DCWCCW
02C5E2C4  40404040  40400010  40400001  C4C3E6C3  C3E64040  00000000
40000000  40404040  40404040  40404040  40404040  40404040  40404040
40404040  40404040  40404040  40404040  C4C3E6C3  F0F0F0F1*
02E3E7E3  40000000  40400038  40400001  47F0F00C  07C4C3E6  C3C3E640
90ECD00C  184D98CD  F0205040  D00450D0  400807FC  40404040  40404040
021A2340  E2E4D7C5  D940E3C5  E7E340C5  C4C3E6C3  F0F0F0F2*
02E3E7E3  40000038  40400017  40400001  D9D9D6D9  40C9D540  D9D6E4E3
C9D5C540  C4C3E6C3  C3E62240  40404040  40404040  40404040  40404040
40404040  40404040  40404040  40404040  C4C3E6C3  F0F0F0F3*
02E3E7E3  40000050  40400020  40400001  E4D5C1C2  D3C540E3  D640D6D9
C4C5D940  E4D5C1C2  D3C540E3  D640D6D9  C4C5D940  40404040  40404040
40404040  40404040  40404040  40404040  C4C3E6C3  F0F0F0F4*
02C5E2C4  40404040  40400010  40400002  C3E6C3C3  E6404040  02000000
40000000  40404040  40404040  40404040  40404040  40404040  40404040
40404040  40404040  40404040  40404040  C4C3E6C3  F0F0F0F5*
02E3E7E3  40000178  40400038  40400001  00000000  00000000  00000001
00000001  00000002  00000003  00000004  00000008  0000000F  401DF3B6
4029FBE7  403EF9DB  00000000  00000000  C4C3E6C3  F0F0F0F6*
02E3E7E3  400001F8  40400008  40400001  00000000  00000000  40404040
40404040  40404040  40404040  40404040  40404040  40404040  40404040
40404040  40404040  40404040  40404040  C4C3E6C3  F0F0F0F7*
02E3E7E3  40000204  40400004  40400001  00000000  40404040  40404040
40404040  40404040  40404040  40404040  40404040  40404040  40404040
40404040  40404040  40404040  40404040  C4C3E6C3  F0F0F0F8*
```

| | | | | | | |
|---|---|---|---|---|---|---|
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F0F9* | |
| 02E3E7E3 | 4000020C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F1F0** | |
| 02C5E2C4 | 40404040 | 40400010 | 40400004 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F1F1* | |
| 02C5E2C4 | 40404040 | 40400010 | 40400005 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F1F2* | |
| 02E3E7E3 | 40000214 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | C4C3E6C3 | F0F0F1F3* | |
| 02E3E7E3 | 40000248 | 40400038 | 40400001 | 5890D18C | 58B0D194 | 58A0D124 |
| 5880D120 | 5800D108 | 5000D148 | 5800D164 | 5900D114 | 4780D3A4 | 5800D118 |
| 5000D140 | 5800D114 | 13005000 | D1B85800 | C4C3E6C3 | F0F0F1F4* | |
| 02E3E7E3 | 40000280 | 40400038 | 40400001 | D1CC5000 | D1C05800 | D1D05000 |
| D1C418BA | 58A0D194 | 58E0D1C0 | 587EA000 | 5070D154 | 58E0D1C4 | 580EA000 |
| 5000D168 | 18571C4B | 18251A28 | 78229000 | C4C3E6C3 | F0F0F1F5* | |
| 02E3E7E3 | 400002B8 | 40400038 | 40400001 | 7020D174 | 18351A3B | 78239000 |
| 7020D178 | 41029000 | 5000D05C | 58F0D188 | 4110D05C | 05EF5800 | D15C5900 |
| D1144780 | D37C5800 | D15C5900 | D1B84780 | C4C3E6C3 | F0F0F1F6* | |
| 02E3E7E3 | 400002F0 | 40400038 | 40400001 | D3325820 | D1688E20 | 00205D20 |
| D1185070 | D1601C6B | 18471A48 | 5860D114 | 5870D168 | 188458A0 | D11418B3 |
| 18575A50 | D1601835 | 1B3A4100 | D17C5000 | C4C3E6C3 | F0F0F1F7* | |
| 02E3E7E3 | 40000328 | 40400038 | 40400001 | D0704108 | 90005000 | D0749280 |
| D07458F0 | D1A44110 | D06C05EF | 18535C40 | D1241825 | 5A20D120 | 41089000 |
| 5000D070 | 41029000 | 5000D074 | 9280D074 | C4C3E6C3 | F0F0F1F8* | |
| 02E3E7E3 | 40000360 | 40400038 | 40400001 | 58F0D1A4 | 4110D06C | 05EF4102 |
| 90005000 | D0704100 | D17C5000 | D0749280 | D07458F0 | D1A44110 | D06C05EF |
| 5A80D124 | 1B7A876A | D2A858A0 | D19458B0 | C4C3E6C3 | F0F0F1F9* | |
| 02E3E7E3 | 40000398 | 40400038 | 40400001 | D1245880 | D12047F0 | D37C5800 |

MEMBER NAME DCWCCW

| | | | | | | |
|---|---|---|---|---|---|---|
| D1105000 | D1484100 | D1745000 | D0784100 | D1785000 | D07C58F0 | D1A84110 |
| D07805EF | 41E00004 | 15FE4720 | D36458EF | C4C3E6C3 | F0F0F2F0** | |
| 02E3E7E3 | 400003D0 | 40400038 | 40400001 | D04C07FE | 47F0D37C | 58F0D1AC |
| 45E0F004 | 00000006 | 00000028 | 45E0F010 | 5820D140 | 5A20D114 | 5020D140 |
| 5800D1C4 | 1A0B5000 | D1C45800 | D1C01A0B | C4C3E6C3 | F0F0F2F1* | |
| 02E3E7E3 | 40000408 | 40400038 | 40400001 | 5000D1C0 | 5920D164 | 47C0D224 |
| 58B0D194 | 58A0D124 | 5880D120 | 58E0D1D4 | 587EB000 | 5070D154 | 58E0D1C8 |
| 580EB000 | 5000D168 | 18571C4A | 18281A25 | C4C3E6C3 | F0F0F2F2* | |
| 02E3E7E3 | 40000440 | 40400038 | 40400001 | 78229000 | 7020D174 | 183A1A35 |
| 78239000 | 7020D178 | 41029000 | 5000D05C | 58F0D188 | 4110D05C | 05EF5800 |
| D15C1200 | 4780D508 | 5820D114 | 13225920 | C4C3E6C3 | F0F0F2F3* | |
| 02E3E7E3 | 40000478 | 40400038 | 40400001 | D15C4780 | D4BE5820 | D1688E20 |
| 00205D20 | D1185070 | D1601C6A | 18471A48 | 5860D114 | 5870D168 | 188458A0 |
| D11418B3 | 18575A50 | D1601835 | 1B3A4100 | C4C3E6C3 | F0F0F2F4* | |
| 02E3E7E3 | 400004B0 | 40400038 | 40400001 | D17C5000 | D0704108 | 90005000 |
| D0749280 | D07458F0 | D1A44110 | D06C05EF | 18535C40 | D1241825 | 5A20D120 |
| 41089000 | 5000D070 | 41029000 | 5000D074 | C4C3E6C3 | F0F0F2F5* | |
| 02E3E7E3 | 400004E8 | 40400038 | 40400001 | 9280D074 | 58F0D1A4 | 4110D06C |
| 05EF4102 | 90005000 | D0704100 | D17C5000 | D0749280 | D07458F0 | D1A44110 |
| D06C05EF | 5A80D124 | 1B7A876A | D43458B0 | C4C3E6C3 | F0F0F2F6* | |
| 02E3E7E3 | 40000520 | 40400038 | 40400001 | D19458A0 | D1245880 | D12047F0 |
| D5085800 | D1105000 | D1484100 | D1745000 | D0C04100 | D1785000 | D0C458F0 |
| D1A84110 | D0C005EF | 41E00004 | 15FE4720 | C4C3E6C3 | F0F0F2F7* | |
| 02E3E7E3 | 40000558 | 40400038 | 40400001 | D4F058EF | D05407FE | 47F0D508 |
| 58F0D1AC | 45E0F004 | 00000006 | 00000028 | 45E0F010 | 5800D148 | 1BFF860F |

```
D51A1BFF   58E0D000   07FE41F0   000458E0   C4C3E6C3   F0F0F2F8*
02E3E7E3   40000590   40400038   40400001   D00007FE   58D0D004   58E0D00C
92FFD00C   982CD01C   07FE987A   10045820   70005020   D14C5820   90005020
D1645820   10004130   20004150   00041B25   C4C3E6C3   F0F0F2F9*
02E3E7E3   400005C8   40400038   40400001   5C40D118   1B255020   D18C5030
D1905820   10084130   20004150   00041B25   5C40D118   1B255020   D1945030
D1985820   10104130   20004150   00041B25   C4C3E6C3   F0F0F3F0**
02E3E7E3   40000600   40400012   40400001   5C40D120   1B255020   D19C5030
D1A047F0   D1D84040   40404040   40404040   40404040   40404040   40404040
40404040   40404040   40404040   40404040   C4C3E6C3   F0F0F3F1*
02E3E7E3   40000020   40400008   40400001   000005A6   00000070   40404040
40404040   40404040   40404040   40404040   40404040   40404040   40404040
40404040   40404040   40404040   40404040   C4C3E6C3   F0F0F3F2*
02D9D3C4   40404040   40400038   40404040   00020001   1C0001F8   00030001
1C000214   00040001   1C000218   00050001   1C00021C   00010001   0C0003E4
00010001   0C000570   00010001   0C000020   C4C3E6C3   F0F0F3F3*
02E3E7E3   40000070   40400004   40400001   00000594   40404040   40404040
40404040   40404040   40404040   40404040   40404040   40404040   40404040
40404040   40404040   40404040   40404040   C4C3E6C3   F0F0F3F4*
02E3E7E3   400000BC   40400010   40400001   000003D4   000003D8   00000560
00000564   40404040   40404040   40404040   40404040   40404040   40404040
40404040   40404040   40404040   40404040   C4C3E6C3   F0F0F3F5*
02E3E7E3   400000D0   40400008   40400001   000001D8   000001E4   40404040
40404040   40404040   40404040   40404040   40404040   40404040   40404040
40404040   40404040   40404040   40404040   C4C3E6C3   F0F0F3F6*
02D9D3C4   40404040   40400038   40404040   00010001   0C000024   00010001
0C000070   00010001   0C0000BC   00010001   0C0000C0   00010001   0C0000C4
00010001   0C0000C8   00010001   0C0000D0   C4C3E6C3   F0F0F3F7*
02E3E7E3   400000D8   40400008   40400001   800001CC   00000194   40404040
40404040   40404040   40404040   40404040   40404040   40404040   40404040
40404040   40404040   40404040   40404040   C4C3E6C3   F0F0F3F8*
02E3E7E3   400000E4   40400004   40400001   80000000   40404040   40404040
40404040   40404040   40404040   40404040   40404040   40404040   40404040

MEMBER NAME  DCWCCW
40404040   40404040   40404040   40404040   C4C3E6C3   F0F0F3F9*
02E3E7E3   400000F0   40400014   40400001   0000017C   00000198   000001A0
0000019C   00000060   40404040   40404040   40404040   40404040   40404040
40404040   40404040   40404040   40404040   C4C3E6C3   F0F0F4F0**
02D9D3C4   40404040   40400038   40404040   00010001   0C0000D4   00010001
0C0000D8   00010001   0C0000DC   00010001   0C0000F0   00010001   0C0000F4
00010001   0C0000F8   00010001   0C0000FC   C4C3E6C3   F0F0F4F1*
02E3E7E3   40000104   4040001C   40400001   0000017C   0000017C   0000017C
0000017C   00000184   0000018C   0000017C   40404040   40404040   40404040
40404040   40404040   40404040   40404040   C4C3E6C3   F0F0F4F2*
02D9D3C4   40404040   40400038   40404040   00010001   0C000100   00010001
0C000104   00010001   0C000108   00010001   0C00010C   00010001   0C000110
00010001   0C000114   00010001   0C000118   C4C3E6C3   F0F0F4F3*
02E3E7E3   40000120   40400010   40400001   0000017C   000001A0   000001A4
8000017C   40404040   40404040   40404040   40404040   40404040   40404040
40404040   40404040   40404040   40404040   C4C3E6C3   F0F0F4F4*
02E3E7E3   40000138   4040000C   40400001   0000017C   00000198   000001A0
40404040   40404040   40404040   40404040   40404040   40404040   40404040
40404040   40404040   40404040   40404040   C4C3E6C3   F0F0F4F5*
02D9D3C4   40404040   40400038   40404040   00010001   0C00011C   00010001
0C000120   00010001   0C000124   00010001   0C000128   00010001   0C00012C
00010001   0C000138   00010001   0C00013C   C4C3E6C3   F0F0F4F6*
02E3E7E3   40000144   4040001C   40400001   0000019C   00000050   0000017C
0000017C   0000017C   0000017C   00000184   40404040   40404040   40404040
40404040   40404040   40404040   40404040   C4C3E6C3   F0F0F4F7*
02D9D3C4   40404040   40400038   40404040   00010001   0C000140   00010001
```

```
0C000144  00010001  0C000148  00010001  0C00014C  00010001  0C000150
00010001  0C000154  00010001  0C000158  C4C3E6C3  F0F0F4F8*
02E3E7E3  40000160  40400018  40400001  0000018C  0000017C  0000017C
000001A0  000001A4  8000017C  40404040  40404040  40404040  40404040
40404040  40404040  40404040  40404040  C4C3E6C3  F0F0F4F9*
02E3E7E3  40000220  40400028  40400001  00000000  00000000  00000000
00000000  00000000  00000000  00000010  00000014  00000018  0000000C
40404040  40404040  40404040  40404040  C4C3E6C3  F0F0F5F0**
02D9D3C4  40404040  40400038  40404040  00010001  0C00015C  00010001
0C000160  00010001  0C000164  00010001  0C000168  00010001  0C00016C
00010001  0C000170  00010001  0C000174  C4C3E6C3  F0F0F5F1*
02C5D5C4  40404040  40404040  40404040  40404040  40404040  40404040
00000612  F1F5F7F3  F460C6D6  F34040F0  F2F0F2F8  F7F0F9F8  40F0F84B
F1F44BF3  F0404040  C4C3E6C3  C3E64040  C4C3E6C3  F0F0F5F2**

MEMBER NAME  DEFINE
02C5E2C4  40404040  40400010  40400001  C4C5C6C9  D5C54040  00000000
40000000  40404040  40404040  40404040  40404040  40404040  40404040
40404040  40404040  40404040  40404040  C4C5C6C9  F0F0F0F1*
02E3E7E3  40000000  40400028  40400001  47F0F00C  07C4C5C6  C9D5C540
90ECD00C  184D98CD  F0205040  D00450D0  400807FC  40404040  40404040
40404040  40404040  40404040  40404040  C4C5C6C9  F0F0F0F2*
02E3E7E3  40000078  40400038  40400001  00000000  00000000  3B431BDE
82D7B635  3C1853B3  DC3AFEDA  3C1AD7F2  9ABCAF48  3C573DD4  76E539AB
3C5C4651  F3E89A89  3C706847  E7F61DFF  C4C5C6C9  F0F0F0F3*
02E3E7E3  400000B0  40400038  40400001  3F126E97  8D4FDF3B  3F147AE1
47AE147B  3F1E4F76  5FD8ADAC  3F1EB851  EB851EB8  3F20C49B  A5E353F8
3F28F5C2  8F5C28F6  3F3126E9  78D4FDF4  C4C5C6C9  F0F0F0F4*
02E3E7E3  400000E8  40400038  40400001  3FAAAE29  7396D091  3FB1C432
CA57A787  3FCCCCCC  CCCCCCCD  3FE56041  89374BC7  3FE978D4  FDF3B646
3FF5C28F  5C28F5C3  4010A3D7  0A3D70A4  C4C5C6C9  F0F0F0F5*
02E3E7E3  40000120  40400038  40400001  401126E9  78D4FDF4  4012599E
D7C6FBD2  401C28F5  C28F5C29  40333333  33333333  404CCCCC  CCCCCCCD
40570A3D  70A3D70A  441C2100  00000000  C4C5C6C9  F0F0F0F6*
02E3E7E3  40000158  40400038  40400001  441C2200  00000000  441C5200
00000000  441C5D00  00000000  441CDF00  00000000  441CE000  00000000
441CE100  00000000  441CFD00  00000000  C4C5C6C9  F0F0F0F7*
02E3E7E3  40000190  40400038  40400001  441CFE00  00000000  441D4D00
00000000  441F4000  00000000  451D4C00  00000000  45493E00  00000000
457A1200  00000000  45927C00  00000000  C4C5C6C9  F0F0F0F8*
02E3E7E3  400001C8  40400038  40400001  45C35000  00000000  45E7EF00
00000000  46149970  00000000  462C4020  00000000  462F4D60  00000000
4630D400  00000000  46632EA0  00000000  C4C5C6C9  F0F0F0F9*
02E3E7E3  40000200  40400038  40400001  468DE820  00000000  471406F4
00000000  00000001  00000002  00000003  00000004  00000005  00000006
00000007  00000008  00000009  0000000A  C4C5C6C9  F0F0F1F0**
02C5E2C4  40404040  40400010  40400002  D7D4C1E3  D3404040  05000000
40001134  40404040  40404040  40404040  40404040  40404040  40404040
40404040  40404040  40404040  40404040  C4C5C6C9  F0F0F1F1*
02E3E7E3  40000238  40400010  40400001  0000000B  00000058  00000000
00000000  40404040  40404040  40404040  40404040  40404040  40404040
40404040  40404040  40404040  40404040  C4C5C6C9  F0F0F1F2*
02E3E7E3  40000250  40400038  40400001  FFFFFFA0  00001130  58B0D228
6860D180  6840D198  6820D1A0  5890D20C  6800D1E0  6000B060  6800D1B0
6000B068  6800D120  6000B070  6800D1A8  C4C5C6C9  F0F0F1F3*
02E3E7E3  40000288  40400038  40400001  6000B078  6800D1A8  6000B080
6800D1A8  6000B088  6800D0D8  6000B090  6800D058  6000B098  6800D060
6000B0A0  6800D128  6000B0A8  6800D098  C4C5C6C9  F0F0F1F4*
02E3E7E3  400002C0  40400038  40400001  6000B0B0  6800D1E0  6000B0B8
6800D1B0  6000B0C0  6800D120  6000B0C8  6800D1A8  6000B0D0  6800D1A8
6000B0D8  6800D1A8  6000B0E0  6800D0D8  C4C5C6C9  F0F0F1F5*
```

| | | | | | | |
|---|---|---|---|---|---|---|
| 02E3E7E3 | 400002F8 | 40400038 | 40400001 | 6000B0E8 | 6800D058 | 6000B0F0 |
| 6800D060 | 6000B0F8 | 6800D130 | 6000B100 | 6800D098 | 6000B108 | 6800D1D8 |
| 6000B110 | 6800D1D8 | 6000B118 | 6800D0E8 | C4C5C6C9 | F0F0F1F6* | |
| 02E3E7E3 | 40000330 | 40400038 | 40400001 | 6000B120 | 6020B128 | 6020B130 |
| 6020B138 | 6800D0D8 | 6000B140 | 6800D068 | 6000B148 | 6800D068 | 6000B150 |
| 6800D140 | 6000B158 | 6800D0A0 | 6000B160 | C4C5C6C9 | F0F0F1F7* | |
| 02E3E7E3 | 40000368 | 40400038 | 40400001 | 6800D1B8 | 6000B168 | 6800D1B8 |
| 6000B170 | 6800D110 | 6000B178 | 6040B180 | 6040B188 | 6040B190 | 6800D0E0 |
| 6000B198 | 6800D080 | 6000B1A0 | 6800D078 | C4C5C6C9 | F0F0F1F8* | |
| 02E3E7E3 | 400003A0 | 40400038 | 40400001 | 6000B1A8 | 6800D148 | 6000B1B0 |
| 6800D088 | 6000B1B8 | 6800D1C0 | 6000B1C0 | 6800D1C0 | 6000B1C8 | 6800D110 |
| 6000B1D0 | 6040B1D8 | 6040B1E0 | 6040B1E8 | C4C5C6C9 | F0F0F1F9* | |
| 02E3E7E3 | 400003D8 | 40400038 | 40400001 | 6800D0F0 | 6000B1F0 | 6800D080 |

MEMBER NAME DEFINE

| | | | | | | |
|---|---|---|---|---|---|---|
| 6000B1F8 | 6800D078 | 6000B200 | 6800D150 | 6000B208 | 6800D0B0 | 6000B210 |
| 6800D188 | 6000B218 | 6800D188 | 6000B220 | C4C5C6C9 | F0F0F2F0** | |
| 02E3E7E3 | 40000410 | 40400038 | 40400001 | 6800D118 | 6000B228 | 6060B230 |
| 6060B238 | 6060B240 | 6800D0C0 | 6000B248 | 6800D050 | 6000B250 | 6800D050 |
| 6000B258 | 6800D160 | 6000B260 | 6800D090 | C4C5C6C9 | F0F0F2F1* | |
| 02E3E7E3 | 40000448 | 40400038 | 40400001 | 6000B268 | 6800D188 | 6000B270 |
| 6800D188 | 6000B278 | 6800D118 | 6000B280 | 6060B288 | 6060B290 | 6060B298 |
| 6800D0C8 | 6000B2A0 | 6800D050 | 6000B2A8 | C4C5C6C9 | F0F0F2F2* | |
| 02E3E7E3 | 40000480 | 40400038 | 40400001 | 6800D050 | 6000B2B0 | 6800D168 |
| 6000B2B8 | 6800D0A8 | 6000B2C0 | 6800D1D0 | 6000B2C8 | 6800D1D0 | 6000B2D0 |
| 6800D0D0 | 6000B2D8 | 6800D178 | 6000B2E0 | C4C5C6C9 | F0F0F2F3* | |
| 02E3E7E3 | 400004B8 | 40400038 | 40400001 | 6800D178 | 6000B2E8 | 6800D178 |
| 6000B2F0 | 6800D100 | 6000B2F8 | 6800D070 | 6000B300 | 6800D070 | 6000B308 |
| 6800D170 | 6000B310 | 6800D0B8 | 6000B318 | C4C5C6C9 | F0F0F2F4* | |
| 02E3E7E3 | 400004F0 | 40400038 | 40400001 | 6800D1D8 | 6000B320 | 6800D1D8 |
| 6000B328 | 6800D0E8 | 6000B330 | 6020B338 | 6020B340 | 6020B348 | 6800D0D8 |
| 6000B350 | 6800D068 | 6000B358 | 6800D068 | C4C5C6C9 | F0F0F2F5* | |
| 02E3E7E3 | 40000528 | 40400038 | 40400001 | 6000B360 | 6800D138 | 6000B368 |
| 6800D0A0 | 6000B370 | 6800D1C8 | 6000B378 | 6800D1B8 | 6000B380 | 6800D108 |
| 6000B388 | 6800D190 | 6000B390 | 6800D190 | C4C5C6C9 | F0F0F2F6* | |
| 02E3E7E3 | 40000560 | 40400038 | 40400001 | 6000B398 | 6800D190 | 6000B3A0 |
| 6800D0F8 | 6000B3A8 | 6800D078 | 6000B3B0 | 6800D080 | 6000B3B8 | 6800D158 |
| 6000B3C0 | 6800D0B0 | 6000B3C8 | 18A958F0 | C4C5C6C9 | F0F0F2F7* | |
| 02E3E7E3 | 40000598 | 40400024 | 40400001 | D22C50A0 | F0001BFF | 58E0D000 |
| 07FE58D0 | D00458E0 | D00C92FF | D00C982C | D01C07FE | 47F0D230 | 40404040 |
| 40404040 | 40404040 | 40404040 | 40404040 | C4C5C6C9 | F0F0F2F8* | |
| 02E3E7E3 | 40000020 | 4040000C | 40400001 | 000005B8 | 00000028 | 000005A6 |
| 40404040 | 40404040 | 40404040 | 40404040 | 40404040 | 40404040 | 40404040 |
| 40404040 | 40404040 | 40404040 | 40404040 | C4C5C6C9 | F0F0F2F9* | |
| 02D9D3C4 | 40404040 | 40400028 | 40404040 | 00020001 | 0C000250 | 00020001 |
| 0C000254 | 00010001 | 0C000020 | 00010001 | 0C000024 | 00010001 | 0C000028 |
| 40404040 | 40404040 | 40404040 | 40404040 | C4C5C6C9 | F0F0F3F0** | |
| 02C5D5C4 | 40404040 | 40404040 | 40404040 | 40404040 | 40404040 | 40404040 |
| 000005BC | F1F5F7F3 | F460C6D6 | F34040F0 | F2F0F2F8 | F7F0F9F8 | 40F0F84B |
| F1F44BF3 | F5404040 | C4C5C6C9 | D5C54040 | C4C5C6C9 | F0F0F3F1** | |

MEMBER NAME DEROT

| | | | | | | |
|---|---|---|---|---|---|---|
| 02C5E2C4 | 40404040 | 40400010 | 40400001 | C4C5D9D6 | E3404040 | 00000000 |
| 40000000 | 40404040 | 40404040 | 40404040 | 40404040 | 40404040 | 40404040 |
| 40404040 | 40404040 | 40404040 | 40404040 | C4C5D9D6 | F0F0F0F1* | |
| 02E3E7E3 | 40000000 | 40400028 | 40400001 | 47F0F00C | 07C4C5D9 | D6E34040 |
| 90ECD00C | 184D98CD | F0205040 | D00450D0 | 400807FC | 40404040 | 40404040 |
| 40404040 | 40404040 | 40404040 | 40404040 | C4C5D9D6 | F0F0F0F2* | |
| 02E3E7E3 | 40000080 | 40400034 | 40400001 | 4E000000 | 00000000 | 4E000000 |
| 80000000 | 00000000 | 00000000 | 00000001 | 00000008 | 00000010 | 000003E8 |
| 42640000 | 00000000 | 00000000 | 40404040 | C4C5D9D6 | F0F0F0F3* | |

```
02C5E2C4 40404040 40400010 40400002 D4E5C3C8 D9404040 02000000
40000000 40404040 40404040 40404040 40404040 40404040 40404040
40404040 40404040 40404040 40404040 C4C5D9D6 F0F0F0F4*
02E3E7E3 400000E0 40400004 40400001 00000000 40404040 40404040
40404040 40404040 40404040 40404040 40404040 40404040 40404040
40404040 40404040 40404040 40404040 C4C5D9D6 F0F0F0F5*
02E3E7E3 400000E8 40400008 40400001 00000000 00000000 40404040
40404040 40404040 40404040 40404040 40404040 40404040 40404040
40404040 40404040 40404040 40404040 C4C5D9D6 F0F0F0F6*
02E3E7E3 400000FC 40400038 40400001 5850D0C4 5880D0B8 58A0D0CC
5870D07C 5860D070 5840D068 58F0D0C0 4110D04C 05EF5040 D090189A
58B0D078 7840D080 7860D06C 18364C39 C4C5D9D6 F0F0F0F7*
02E3E7E3 40000134 40400038 40400001 D09A5030 D0981233 4770D11C
47F0D166 5800D090 1A065000 D0901937 4770D138 5820D090 89200002
70628000 5970D098 4780D162 5800D098 C4C5D9D6 F0F0F0F8*
02E3E7E3 4000016C 40400038 40400001 5700D064 5000D05C 6820D058
6B20D060 3D245820 D0908920 00027022 8000879A D1081BFF 58E0D000
07FE58A0 D00458E0 A00C58B0 A0185810 C4C5D9D6 F0F0F0F9*
02E3E7E3 400001A4 40400038 40400001 B0085820 D0905020 100018DA
92FFA00C 982CA01C 07FE5870 10085820 70005020 D0905820 10004130
20004150 00041B25 5020D0C4 5030D0C8 C4C5D9D6 F0F0F1F0**
02E3E7E3 400001DC 40400022 40400001 5030D054 9280D054 58201004
41302000 41500004 1B255020 D0B85030 D0BC47F0 D0D44040 40404040
40404040 40404040 40404040 40404040 C4C5D9D6 F0F0F1F1*
02E3E7E3 40000020 4040000C 40400001 000001BA 00000028 00000196
40404040 40404040 40404040 40404040 40404040 40404040 40404040
40404040 40404040 40404040 40404040 C4C5D9D6 F0F0F1F2*
02E3E7E3 40000074 40400008 40400001 000000A0 000000C4 40404040
40404040 40404040 40404040 40404040 40404040 40404040 40404040
40404040 40404040 40404040 40404040 C4C5D9D6 F0F0F1F3*
02E3E7E3 400000F4 40400008 40400001 00000002 00000000 40404040
40404040 40404040 40404040 40404040 40404040 40404040 40404040
40404040 40404040 40404040 40404040 C4C5D9D6 F0F0F1F4*
02D9D3C4 40404040 40400030 40404040 00020001 1C0000E8 00010001
0C000020 00010001 0C000024 00010001 0C000028 00010001 0C000074
00010001 0C000078 40404040 40404040 C4C5D9D6 F0F0F1F5*
02C5D5C4 40404040 40404040 40404040 40404040 40404040 40404040
000001FE F1F5F7F3 F460C6D6 F34040F0 F2F0F2F8 F7F0F9F8 40F0F84B
F1F44BF4 F0404040 C4C5D9D6 E3404040 C4C5D9D6 F0F0F1F6**

MEMBER NAME  DIST
02C5E2C4 40404040 40400010 40400001 C4C9E2E3 40404040 00000000
40000000 40404040 40404040 40404040 40404040 40404040 40404040
40404040 40404040 40404040 40404040 C4C9E2E3 F0F0F0F1*
02E3E7E3 40000000 40400028 40400001 47F0F00C 07C4C9E2 E3404040
90ECD00C 184D98CD F0205040 D00450D0 400807FC 40404040 40404040
40404040 40404040 40404040 40404040 C4C9E2E3 F0F0F0F2*
02C5E2C4 40404040 40400010 40400002 C4E2D8D9 E3404040 02000000
40000000 40404040 40404040 40404040 40404040 40404040 40404040
40404040 40404040 40404040 40404040 C4C9E2E3 F0F0F0F3*
02E3E7E3 40000078 4040001C 40400001 00000000 00000001 00000002
00000003 00000004 00000000 00000000 40404040 40404040 40404040
40404040 40404040 40404040 40404040 C4C9E2E3 F0F0F0F4*
02E3E7E3 40000100 40400008 40400001 00000000 00000000 40404040
40404040 40404040 40404040 40404040 40404040 40404040 40404040
40404040 40404040 40404040 40404040 C4C9E2E3 F0F0F0F5*
02E3E7E3 4000010C 40400004 40400001 00000000 40404040 40404040
40404040 40404040 40404040 40404040 40404040 40404040 40404040
40404040 40404040 40404040 40404040 C4C9E2E3 F0F0F0F6*
02E3E7E3 4000012C 40400038 40400001 58A0D0DC 58B0D0E4 5890D054
5880D050 5080D070 6800B008 6000D090 6860B010 6060D0A0 6840B018
```

```
6040D098  6820B020  6800A008  6000D0C0  C4C9E2E3  F0F0F0F7*
02E3E7E3  40000164  40400038  40400001  6800A010  6000D0C8  2B626060
D0786B40  D0906860  D0902C62  6060D0F0  6800D098  6C00D0A0  6820D0F0
2B206020  D0886860  D0786C60  D0C02804  C4C9E2E3  F0F0F0F8*
02E3E7E3  4000019C  40400038  40400001  6C00D0C8  2A606A60  D0886060
D0F06820  D0782C22  2C442A24  6020D0F8  58F0D0D8  4110D04C  05EF6820
D0F02D20  20226920  D0B847A0  D1B21BFF  C4C9E2E3  F0F0F0F9*
02E3E7E3  400001D4  40400038  40400001  58E0D000  07FE5090  D0701BFF
58E0D000  07FE58A0  D00458E0  A00C58B0  A0185810  B00C5820  D0705020
100018DA  92FFA00C  982CA01C  07FE9878  C4C9E2E3  F0F0F1F0**
02E3E7E3  4000020C  40400038  40400001  10086820  70006020  D0B85820
80005020  D0705820  10004130  20004150  00081B25  5020D0DC  5030D0E0
58201004  41302000  41500008  1B255020  C4C9E2E3  F0F0F1F1*
02E3E7E3  40000244  4040000A  40400001  D0E45030  D0E847F0  D1044040
40404040  40404040  40404040  40404040  40404040  40404040  40404040
40404040  40404040  40404040  40404040  C4C9E2E3  F0F0F1F2*
02E3E7E3  40000020  4040000C  40400001  0000020A  00000028  000001E6
40404040  40404040  40404040  40404040  40404040  40404040  40404040
40404040  40404040  40404040  40404040  C4C9E2E3  F0F0F1F3*
02E3E7E3  40000074  40400004  40400001  80000120  40404040  40404040
40404040  40404040  40404040  40404040  40404040  40404040  40404040
40404040  40404040  40404040  40404040  C4C9E2E3  F0F0F1F4*
02E3E7E3  40000114  40400018  40400001  00000000  00000000  00000000
00000000  00000000  00000000  40404040  40404040  40404040  40404040
40404040  40404040  40404040  40404040  C4C9E2E3  F0F0F1F5*
02D9D3C4  40404040  40400028  40404040  00020001  1C000100  00010001
0C000020  00010001  0C000024  00010001  0C000028  00010001  0C000074
40404040  40404040  40404040  40404040  C4C9E2E3  F0F0F1F6*
02C5D5C4  40404040  40404040  40404040  40404040  40404040  40404040
0000024E  F1F5F7F3  F460C6D6  F34040F0  F2F0F2F8  F7F0F9F8  40F0F84B
F1F44BF4  F4404040  C4C9E2E3  40404040  C4C9E2E3  F0F0F1F7**

MEMBER NAME  DLLIM
02C5E2C4  40404040  40400010  40400001  C4D3D3C9  D4404040  00000000
40000000  40404040  40404040  40404040  40404040  40404040  40404040
40404040  40404040  40404040  40404040  C4D3D3C9  F0F0F0F1*
02E3E7E3  40000000  40400028  40400001  47F0F00C  07C4D3D3  C9D44040
90ECD00C  184D98CD  F0205040  D00450D0  400807FC  40404040  40404040
40404040  40404040  40404040  40404040  C4D3D3C9  F0F0F0F2*
02E3E7E3  40000078  40400008  40400001  00000000  00000000  40404040
40404040  40404040  40404040  40404040  40404040  40404040  40404040
40404040  40404040  40404040  40404040  C4D3D3C9  F0F0F0F3*
02E3E7E3  400000A8  40400038  40400001  7800D058  7900D05C  4750D0A0
7800D05C  7000D06C  7800D058  7000D068  47F0D0B0  7800D058  7000D06C
7800D05C  7000D068  7800D060  7900D064  C4D3D3C9  F0F0F0F4*
02E3E7E3  400000E0  40400038  40400001  4750D0D0  7800D064  7000D074
7800D060  7000D070  47F0D0E0  7800D060  7000D074  7800D064  7000D070
1BFF58E0  D00007FE  58A0D004  58E0A00C  C4D3D3C9  F0F0F0F5*
02E3E7E3  40000118  40400038  40400001  58B0A018  5810B010  7820D06C
70201000  5820B014  7840D068  70402000  5830B018  7860D074  70603000
5840B01C  7800D070  70004000  18DA92FF  C4D3D3C9  F0F0F0F6*
02E3E7E3  40000150  40400038  40400001  A00C982C  A01C07FE  987B1000
78207000  7020D058  78208000  7020D060  78209000  7020D05C  7820A000
7020D064  7820B000  7020D06C  98791014  C4D3D3C9  F0F0F0F7*
02E3E7E3  40000188  4040001C  40400001  78207000  7020D068  78208000
7020D074  78209000  7020D070  47F0D080  40404040  40404040  40404040
40404040  40404040  40404040  40404040  C4D3D3C9  F0F0F0F8*
02E3E7E3  40000020  4040000C  40400001  00000158  00000028  00000110
40404040  40404040  40404040  40404040  40404040  40404040  40404040
40404040  40404040  40404040  40404040  C4D3D3C9  F0F0F0F9*
02D9D3C4  40404040  40400018  40404040  00010001  0C000020  00010001
```

```
0C000024  00010001  0C000028  40404040  40404040  40404040  40404040
40404040  40404040  40404040  40404040  C4D3D3C9  F0F0F1F0**
02C5D5C4  40404040  40404040  40404040  40404040  40404040  40404040
000001A4  F1F5F7F3  F460C6D6  F34040F0  F2F0F2F8  F7F0F9F8  40F0F84B
F1F44BF4  F8404040  C4D3D3C9  D4404040  C4D3D3C9  F0F0F1F1**

MEMBER NAME  DUPTBL
02C5E2C4  40404040  40400010  40400001  C4E4D7E3  C2D34040  00000000
40000000  40404040  40404040  40404040  40404040  40404040  40404040
40404040  40404040  40404040  40404040  C4E4D7E3  F0F0F0F1*
02E3E7E3  40000000  40400028  40400001  47F0F00C  07C4E4D7  E3C2D340
90ECD00C  184D98CD  F0205040  D00450D0  400807FC  40404040  40404040
40404040  40404040  40404040  40404040  C4E4D7E3  F0F0F0F2*
02E3E7E3  40000078  40400030  40400001  00000000  00000000  4F080000
00000000  00000000  00000001  00000002  00000003  0000000A  0000000E
00000000  00000000  40404040  40404040  C4E4D7E3  F0F0F0F3*
02E3E7E3  400000C8  40400004  40400001  00000000  40404040  40404040
40404040  40404040  40404040  40404040  40404040  40404040  40404040
40404040  40404040  40404040  40404040  C4E4D7E3  F0F0F0F4*
02E3E7E3  400000D0  40400004  40400001  00000000  40404040  40404040
40404040  40404040  40404040  40404040  40404040  40404040  40404040
40404040  40404040  40404040  40404040  C4E4D7E3  F0F0F0F5*
02E3E7E3  40000100  40400038  40400001  5870D0A8  58B0D0A0  58A0D0D4
5890D0C0  5880D064  5080D08C  18385080  D084782A  70002B00  38026A00
D0586000  D0505800  D0545000  D0941828  C4E4D7E3  F0F0F0F6*
02E3E7E3  40000138  40400038  40400001  5800D0B8  5000D0B0  186A1873
18A23842  5800D094  5900D08C  4770D13E  58F0D0A8  7866F000  39464770
D15A47F0  D1BC1859  5C40D08C  18251A29  C4E4D7E3  F0F0F0F7*
02E3E7E3  40000170  40400038  40400001  5082B000  5800D08C  1A085000
D08C47F0  D1201827  5A20D09C  18595C40  D08C1835  5A30D0C4  5023B000
182A1B27  18595C40  D08C1835  5A30D0C8  C4E4D7E3  F0F0F0F8*
02E3E7E3  400001A8  40400038  40400001  5023B000  18595C40  D08C1825
1A295800  D0605002  B0005800  D08C1A08  5000D08C  187A3846  2B003806
6A00D058  6000D050  5800D054  5000D094  C4E4D7E3  F0F0F0F9*
02E3E7E3  400001E0  40400038  40400001  47F0D120  1AA85A60  D0BC59A0
D09047C0  D1205070  D0845870  D0A858A0  D0D45820  D0845A20  D09C1859
5C40D08C  5830D0C4  1A355023  B0005820  C4E4D7E3  F0F0F1F0**
02E3E7E3  40000218  40400038  40400001  D0905B20  D0841A28  18595C40
D08C5830  D0C81A35  5023B000  18595C40  D08C1829  1A255800  D0605002
B0001BFF  58E0D000  07FE58A0  D00458E0  C4E4D7E3  F0F0F1F1*
02E3E7E3  40000250  40400038  40400001  A00C58B0  A0185810  B0105820
D08C5020  100018DA  92FFA00C  982CA01C  07FE987A  10045820  70005020
D0905820  80005020  D09C5820  A0005020  C4E4D7E3  F0F0F1F2*
02E3E7E3  40000288  40400038  40400001  D08C5820  10004130  20004150
00041B25  5C40D074  1B255020  D0A85030  D0AC5820  100C4130  20004150
00041B25  5C40D06C  1B255020  D0A05030  C4E4D7E3  F0F0F1F3*
02E3E7E3  400002C0  40400006  40400001  D0A447F0  D0D84040  40404040
40404040  40404040  40404040  40404040  40404040  40404040  40404040
40404040  40404040  40404040  40404040  C4E4D7E3  F0F0F1F4*
02E3E7E3  40000020  4040000C  40400001  0000026E  00000028  0000024A
40404040  40404040  40404040  40404040  40404040  40404040  40404040
40404040  40404040  40404040  40404040  C4E4D7E3  F0F0F1F5*
02E3E7E3  400000D8  40400028  40400001  00000000  00000000  00000028
00000038  0000000C  00000004  00000008  00000000  00000000  00000060
40404040  40404040  40404040  40404040  C4E4D7E3  F0F0F1F6*
02D9D3C4  40404040  40400018  40404040  00010001  0C000020  00010001
0C000024  00010001  0C000028  40404040  40404040  40404040  40404040
40404040  40404040  40404040  40404040  C4E4D7E3  F0F0F1F7*
02C5D5C4  40404040  40404040  40404040  40404040  40404040  40404040
000002C6  F1F5F7F3  F460C6D6  F34040F0  F2F0F2F8  F7F0F9F8  40F0F84B
F1F44BF5  F2404040  C4E4D7E3  C2D34040  C4E4D7E3  F0F0F1F8**
```

MEMBER NAME DUPARY

```
02C5E2C4  40404040  40400010  40400001  C4E4D7C1  D9E84040  00000000
40000000  40404040  40404040  40404040  40404040  40404040  40404040
40404040  40404040  40404040  40404040  C4E4D7C1  F0F0F0F1*
02E3E7E3  40000000  40400028  40400001  47F0F00C  07C4E4D7  C1D9E840
90ECD00C  184D98CD  F0205040  D00450D0  400807FC  40404040  40404040
40404040  40404040  40404040  40404040  C4E4D7C1  F0F0F0F2*
02E3E7E3  40000108  40400038  40400001  4E000000  00000000  4E000000
80000000  00000000  00000000  00000001  00000002  00000003  00000004
00000008  0000000E  00000016  0000002A  C4E4D7C1  F0F0F0F3*
02C5E2C4  40404040  40400010  40400002  D6D7E3C9  D6D54040  05000000
40000020  40404040  40404040  40404040  40404040  40404040  40404040
40404040  40404040  40404040  40404040  C4E4D7C1  F0F0F0F4*
02E3E7E3  40000140  4040001C  40400001  401DF3B6  4029FBE7  403EF9DB
40800000  41100000  00000000  00000000  40404040  40404040  40404040
40404040  40404040  40404040  40404040  C4E4D7C1  F0F0F0F5*
02C5E2C4  40404040  40400010  40400003  40404040  40404040  05000000
400007D0  40404040  40404040  40404040  40404040  40404040  40404040
40404040  40404040  40404040  40404040  C4E4D7C1  F0F0F0F6*
02E3E7E3  400001B0  4040000C  40400001  00000000  FFFFFFFC  00000000
40404040  40404040  40404040  40404040  40404040  40404040  40404040
40404040  40404040  40404040  40404040  C4E4D7C1  F0F0F0F7*
02E3E7E3  400001C0  40400004  40400001  00000000  40404040  40404040
40404040  40404040  40404040  40404040  40404040  40404040  40404040
40404040  40404040  40404040  40404040  C4E4D7C1  F0F0F0F8*
02C5E2C4  40404040  40400010  40400004  D4E5C3C8  D9404040  02000000
40000000  40404040  40404040  40404040  40404040  40404040  40404040
40404040  40404040  40404040  40404040  C4E4D7C1  F0F0F0F9*
02E3E7E3  400001C8  40400004  40400001  00000000  40404040  40404040
40404040  40404040  40404040  40404040  40404040  40404040  40404040
40404040  40404040  40404040  40404040  C4E4D7C1  F0F0F1F0**
02C5E2C4  40404040  40400010  40400005  D9E2C1D4  C5404040  02000000
40000000  40404040  40404040  40404040  40404040  40404040  40404040
40404040  40404040  40404040  40404040  C4E4D7C1  F0F0F1F1*
02C5E2C4  40404040  40400010  40400006  C3C1C4E2  E4D74040  02000000
40000000  40404040  40404040  40404040  40404040  40404040  40404040
40404040  40404040  40404040  40404040  C4E4D7C1  F0F0F1F2*
02E3E7E3  400001D0  4040000C  40400001  00000000  00000000  00000000
40404040  40404040  40404040  40404040  40404040  40404040  40404040
40404040  40404040  40404040  40404040  C4E4D7C1  F0F0F1F3*
02C5E2C4  40404040  40400010  40400007  C3D6D5E5  E3C94040  02000000
40000000  40404040  40404040  40404040  40404040  40404040  40404040
40404040  40404040  40404040  40404040  C4E4D7C1  F0F0F1F4*
02C5E2C4  40404040  40400010  40400008  D7E4E3D4  E2C74040  02000000
40000000  40404040  40404040  40404040  40404040  40404040  40404040
40404040  40404040  40404040  40404040  C4E4D7C1  F0F0F1F5*
02E3E7E3  400001E0  4040000C  40400001  00000000  00000000  00000000
40404040  40404040  40404040  40404040  40404040  40404040  40404040
40404040  40404040  40404040  40404040  C4E4D7C1  F0F0F1F6*
02E3E7E3  400001F0  40400004  40400001  00000000  40404040  40404040
40404040  40404040  40404040  40404040  40404040  40404040  40404040
40404040  40404040  40404040  40404040  C4E4D7C1  F0F0F1F7*
02E3E7E3  400001A0  40400008  40400001  4040D340  40404040  40404040
40404040  40404040  40404040  40404040  40404040  40404040  40404040
40404040  40404040  40404040  40404040  C4E4D7C1  F0F0F1F8*
02E3E7E3  40000224  40400038  40400001  5800D0F0  5000D154  7800D0F4
7000D170  7800D0F4  7000D174  5800D158  5000D138  5820D1EC  5020D1E4
18A258B0  D1A05890  D1985880  D1C05870  C4E4D7C1  F0F0F1F9*
02E3E7E3  4000025C  40400038  40400001  D1385C60  D1EC5070  D1E81827
```

MEMBER NAME DUPARY

```
5A20D1EC  5802B000  5900D0F8  4780D3FC  5800D138  5900D158  4780D2B6
```

```
185A5C40  D1585A50  D104183A  5C20D158  C4E4D7C1  F0F0F2F0**
02E3E7E3  40000294  40400038  40400001  18435A40  D1081837  5A30D104
18275A20  D1084105  B0005000  D05C4104  B0005000  D0604103  B0005000
D0644102  B0005000  D06858F0  D1AC4110  C4E4D7C1  F0F0F2F1*
02E3E7E3  400002CC  40400038  40400001  D05405EF  41200001  5720D13C
1BFF862F  D3FC58F0  D1BC4110  D07005EF  4100D17C  5000D07C  58F0D1A8
4110D078  05EF4100  D1705000  D0844100  C4E4D7C1  F0F0F2F2*
02E3E7E3  40000304  40400038  40400001  D1745000  D08858F0  D1B84110
D08405EF  41E00004  15FE4720  D2FC58EF  D04C07FE  7820D174  7B20D124
7020D174  185A5C40  D1381825  1A2A5800  C4E4D7C1  F0F0F2F3*
02E3E7E3  4000033C  40400038  40400001  D0F85002  B0005800  D1385700
D0EC5000  D0E46800  D0E06B00  D0E87000  D15058F0  D18C5800  F5E01000
5000D140  58F0D1C8  4110D0CC  05EF58F0  C4E4D7C1  F0F0F2F4*
02E3E7E3  40000374  40400038  40400001  D1885800  F00C1BFF  870FD3EC
5820D0F8  5840D0F8  5850D1F8  5860D1D4  5870D1F4  5880D1F0  18B27840
D1287860  D15058A0  D1905890  D1B07968  C4E4D7C1  F0F0F2F5*
02E3E7E3  400003AC  40400038  40400001  90004770  D3DC5800  D1541A04
5000D154  18208920  000250B2  A0007807  90003200  47A0D3C2  5830D154
89300002  5823A000  5830D154  89300002  C4E4D7C1  F0F0F2F6*
02E3E7E3  400003E4  40400038  40400001  13025003  A0005800  D1485700
D0EC5000  D0E46820  D0E06B20  D0E83B24  70259000  1AB41A56  1A761A86
59B0D16C  47C0D382  5880D1C0  5890D198  C4E4D7C1  F0F0F2F7*
02E3E7E3  4000041C  40400038  40400001  58B0D1A0  58A0D1E4  5820D138
5A20D0F8  5020D138  5920D144  47C0D232  1BFF58E0  D00007FE  58A0D004
58E0A00C  58B0A018  5810B004  5820D164  C4E4D7C1  F0F0F2F8*
02E3E7E3  40000454  40400038  40400001  50201000  5830B01C  5840D160
50403000  5850B020  5860D168  50605000  5870B024  5880D148  50807000
5890B028  5800D158  50009000  5810B030  C4E4D7C1  F0F0F2F9*
02E3E7E3  4000048C  40400038  40400001  5820D154  50201000  18DA92FF
A00C982C  A01C07FE  987B1004  58207000  5020D164  58209000  5020D16C
987B1014  58207000  5020D144  58209000  C4E4D7C1  F0F0F3F0**
02E3E7E3  400004C4  40400038  40400001  5020D160  5820A000  5020D168
5820B000  5020D148  98791028  58207000  5020D158  58209000  5020D154
58201000  41302000  41500004  1B255C40  C4E4D7C1  F0F0F3F1*
02E3E7E3  400004FC  40400038  40400001  D10C1B25  5020D1C0  5030D1C4
5030D054  58201008  41302000  41500004  1B255C40  D1101B25  5020D1B0
5030D1B4  58201010  41302000  41500004  C4E4D7C1  F0F0F3F2*
02E3E7E3  40000534  40400038  40400001  1B255C40  D1001B25  5020D1A0
5030D1A4  58201018  41302000  41500001  1B255C40  D1141B25  5020D198
5030D19C  5030D0D8  5820102C  41302000  C4E4D7C1  F0F0F3F3*
02E3E7E3  4000056C  40400012  40400001  41500004  1B255020  D1905030
D19447F0  D1FC4040  40404040  40404040  40404040  40404040  40404040
40404040  40404040  40404040  40404040  C4E4D7C1  F0F0F3F4*
02E3E7E3  40000020  40400004  40400001  000004A0  40404040  40404040
40404040  40404040  40404040  40404040  40404040  40404040  40404040
40404040  40404040  40404040  40404040  C4E4D7C1  F0F0F3F5*
02D9D3C4  40404040  40400038  40404040  00020001  0C0001B0  00030001
0C0001B4  00040001  1C0001D0  00050001  1C0001D4  00060001  1C0001E0
00070001  1C0001E4  00080001  1C0001F0  C4E4D7C1  F0F0F3F6*
02E3E7E3  40000024  40400008  40400001  00000028  00000440  40404040
40404040  40404040  40404040  40404040  40404040  40404040  40404040
40404040  40404040  40404040  40404040  C4E4D7C1  F0F0F3F7*
02E3E7E3  40000074  40400008  40400001  00000324  00000324  40404040
40404040  40404040  40404040  40404040  40404040  40404040  40404040
40404040  40404040  40404040  40404040  C4E4D7C1  F0F0F3F8*
02E3E7E3  40000080  40400004  40400001  0000018C  40404040  40404040
40404040  40404040  40404040  40404040  40404040  40404040  40404040

MEMBER NAME  DUPARY
40404040  40404040  40404040  40404040  C4E4D7C1  F0F0F3F9*
02E3E7E3  40000094  40400008  40400001  80000164  00000160  40404040
```

```
40404040  40404040  40404040  40404040  40404040  40404040  40404040
40404040  40404040  40404040  40404040  C4E4D7C1  F0F0F4F0**
02D9D3C4  40404040  40400038  40404040  00010001  0C000020  00010001
0C000024  00010001  0C000028  00010001  0C000074  00010001  0C000078
00010001  0C000080  00010001  0C000094  C4E4D7C1  F0F0F4F1*
02E3E7E3  4000009C  40400008  40400001  80000174  0000012C  40404040
40404040  40404040  40404040  40404040  40404040  40404040  40404040
40404040  40404040  40404040  40404040  C4E4D7C1  F0F0F4F2*
02E3E7E3  400000A8  40400004  40400001  80000174  40404040  40404040
40404040  40404040  40404040  40404040  40404040  40404040  40404040
40404040  40404040  40404040  40404040  C4E4D7C1  F0F0F4F3*
02E3E7E3  400000B4  40400010  40400001  00000118  00000130  00000144
00000140  40404040  40404040  40404040  40404040  40404040  40404040
40404040  40404040  40404040  40404040  C4E4D7C1  F0F0F4F4*
02D9D3C4  40404040  40400038  40404040  00010001  0C000098  00010001
0C00009C  00010001  0C0000A0  00010001  0C0000A8  00010001  0C0000B4
00010001  0C0000B8  00010001  0C0000BC  C4E4D7C1  F0F0F4F5*
02E3E7E3  400000C4  4040001C  40400001  000001A0  00000118  00000118
00000118  00000118  00000120  00000128  40404040  40404040  40404040
40404040  40404040  40404040  40404040  C4E4D7C1  F0F0F4F6*
02D9D3C4  40404040  40400038  40404040  00010001  0C0000C0  00010001
0C0000C4  00010001  0C0000C8  00010001  0C0000CC  00010001  0C0000D0
00010001  0C0000D4  00010001  0C0000D8  C4E4D7C1  F0F0F4F7*
02E3E7E3  400000E0  4040001C  40400001  00000118  00000118  00000144
00000148  80000118  00000190  00000168  40404040  40404040  40404040
40404040  40404040  40404040  40404040  C4E4D7C1  F0F0F4F8*
02D9D3C4  40404040  40400038  40404040  00010001  0C0000DC  00010001
0C0000E0  00010001  0C0000E4  00010001  0C0000E8  00010001  0C0000EC
00010001  0C0000F0  00010001  0C0000F4  C4E4D7C1  F0F0F4F9*
02E3E7E3  400000FC  40400004  40400001  00000160  40404040  40404040
40404040  40404040  40404040  40404040  40404040  40404040  40404040
40404040  40404040  40404040  40404040  C4E4D7C1  F0F0F5F0**
02E3E7E3  40000104  40400004  40400001  80000188  40404040  40404040
40404040  40404040  40404040  40404040  40404040  40404040  40404040
40404040  40404040  40404040  40404040  C4E4D7C1  F0F0F5F1*
02E3E7E3  400001F4  40400030  40400001  00000000  00000010  00000058
00000000  00000000  00000000  00000000  00000000  0000000C  00000068
00000060  0000005C  40404040  40404040  C4E4D7C1  F0F0F5F2*
02D9D3C4  40404040  40400018  40404040  00010001  0C0000F8  00010001
0C0000FC  00010001  0C000104  40404040  40404040  40404040  40404040
40404040  40404040  40404040  40404040  C4E4D7C1  F0F0F5F3*
02C5D5C4  40404040  40404040  40404040  40404040  40404040  40404040
0000057E  F1F5F7F3  F460C6D6  F34040F0  F2F0F2F8  F7F0F9F8  40F0F84B
F1F44BF5  F6404040  C4E4D7C1  D9E84040  C4E4D7C1  F0F0F5F4**

MEMBER NAME  ELMPNT
02C5E2C4  40404040  40400010  40400001  C5D3D4D7  D5E34040  00000000
40000000  40404040  40404040  40404040  40404040  40404040  40404040
40404040  40404040  40404040  40404040  C5D3D4D7  F0F0F0F1*
02E3E7E3  40000000  40400038  40400001  47F0F00C  07C5D3D4  D7D5E340
90ECD00C  184D98CD  F0205040  D00450D0  400807FC  40404040  40404040
021A335C  5C5C5C5C  5C5C5C5C  5C5C5C5C  C5D3D4D7  F0F0F0F2*
02E3E7E3  40000038  40400038  40400001  5C5C5C5C  5C5C5C5C  5C5C5C5C
5C5C5C5C  5C5C5C5C  5C5C5C5C  5C5C5C5C  5C5C5C5C  5C5C5C5C  5C5C1E1A
335C5C5C  5C5C5C5C  5C5C5C5C  5C5C5C40  C5D3D4D7  F0F0F0F3*
02E3E7E3  40000070  40400038  40400001  40C5D3C5  D4C5D5E3  404040E3
C1C2D3C5  40405C5C  5C5C5C5C  5C5C5C5C  5C5C5C5C  5C5C5C5C  1E1A335C
5C5C5C5C  5C5C5C5C  5C5C5C5C  5C5C5C5C  C5D3D4D7  F0F0F0F4*
02E3E7E3  400000A8  40400038  40400001  5C5C5C5C  5C5C5C5C  5C5C5C5C
5C5C5C5C  5C5C5C5C  5C5C5C5C  5C5C5C5C  5C5C5C5C  5C5C1E1A  21404040
40404040  40404040  40404040  C7C5D5C5  C5D3D4D7  F0F0F0F5*
```

| | | | | | | |
|---|---|---|---|---|---|---|
| 02E3E7E3 | 400000E0 | 40400038 | 40400001 | D9C9C340 | 7E40F140 | 7E40D3C9 |
| D5C51E1A | 23404040 | 40404040 | 40404040 | 40404040 | C7C5D5C5 | D9C9C340 |
| 7E40F240 | 7E40C3C9 | D9C3D3C5 | 1E1A2040 | C5D3D4D7 | F0F0F0F6* | |
| 02E3E7E3 | 40000118 | 40400038 | 40400001 | 40404040 | 40404040 | 40404040 |
| 4040C7C5 | D5C5D9C9 | C3407E40 | F3407E40 | C1D9C31E | 1A234040 | 40404040 |
| 40404040 | 40404040 | 40C7C5D5 | C5D9C9C3 | C5D3D4D7 | F0F0F0F7* | |
| 02E3E7E3 | 40000150 | 40400038 | 40400001 | 407E40F4 | 407E40E2 | D7D3C9D5 |
| C51E1A24 | 40404040 | 40404040 | 40404040 | 404040C7 | C5D5C5D9 | C9C3407E |
| 40F5407E | 40C5D3D3 | C9D7E2C5 | 1E1A335C | C5D3D4D7 | F0F0F0F8* | |
| 02E3E7E3 | 40000188 | 40400038 | 40400001 | 5C5C5C5C | 5C5C5C5C | 5C5C5C5C |
| 5C5C5C5C | 5C5C5C5C | 5C5C5C5C | 5C5C5C5C | 5C5C5C5C | 5C5C5C5C | 5C5C5C5C |
| 5C5C5C5C | 5C5C5C5C | 5C5C1E1A | 2E40C7C5 | C5D3D4D7 | F0F0F0F9* | |
| 02E3E7E3 | 400001C0 | 40400038 | 40400001 | D5C5D9C9 | C3404F40 | D3E3404F |
| 4040E74D | F15D404F | 4040E84D | F15D404F | 4040E74D | F25D404F | 4040E84D |
| F25D401A | 314F4040 | 40C3E740 | 404F4040 | C5D3D4D7 | F0F0F1F0** | |
| 02E3E7E3 | 400001F8 | 40400038 | 40400001 | 40C3E840 | 404FD9C1 | C440C1E7 |
| C9E24F40 | C4C5E37B | 404F40D4 | C1D1D6D9 | 404F40D4 | C9D5D6D9 | 404F1A0F |
| 40F1F340 | 404F4040 | 40F1F440 | 40404F1E | C5D3D4D7 | F0F0F1F1* | |
| 02E3E7E3 | 40000230 | 40400038 | 40400001 | 1A2E4040 | 40404040 | 4040404F |
| 40404040 | 4F404040 | 40404040 | 4F404040 | 40404040 | 4F404040 | 40404040 |
| 4F404040 | 40404040 | 1A314F40 | 40404040 | C5D3D4D7 | F0F0F1F2* | |
| 02E3E7E3 | 40000268 | 40400038 | 40400001 | 40404F40 | 40404040 | 40404F40 |
| 40404040 | 4040404F | 40404040 | 40404F40 | 40404040 | 40404F40 | 40404040 |
| 40404F1A | 0F4F4040 | 40404F40 | 40404040 | C5D3D4D7 | F0F0F1F3* | |
| 02E3E7E3 | 400002A0 | 40400038 | 40400001 | 4040404F | 22021A03 | 40404010 |
| 041A0440 | 404F4010 | 021A0140 | 04071A01 | 4F0A0702 | 1C1A0340 | 4F401003 |
| 1A034040 | 4F0A0702 | 1A014F0A | 07021A01 | C5D3D4D7 | F0F0F1F4* | |
| 02E3E7E3 | 400002D8 | 40400038 | 40400001 | 4F0A0702 | 1A014F0A | 07021A01 |
| 4F22021A | 34404040 | 40E2D7D3 | C9D5C540 | C4C1E3C1 | 4040404F | 40404040 |
| 40E74040 | 4040404F | 40404040 | 40E84040 | C5D3D4D7 | F0F0F1F5* | |
| 02E3E7E3 | 40000310 | 40400036 | 40400001 | 40404F40 | 404040C1 | 40404040 |
| 4F1A0A40 | 404040C2 | 40404040 | 4F22021A | 12404040 | 40404040 | 40404040 |
| 40404040 | 40404004 | 040A0B05 | 1C224040 | C5D3D4D7 | F0F0F1F6* | |
| 02E3E7E3 | 40000398 | 40400038 | 40400001 | 00000000 | 00000000 | 4F080000 |
| 00000000 | 00000000 | 00000001 | 00000002 | 00000003 | 00000004 | 00000005 |
| 00000006 | 00000007 | 00000008 | 00000009 | C5D3D4D7 | F0F0F1F7* | |
| 02E3E7E3 | 400003D0 | 4040001C | 40400001 | 0000000A | 0000000B | 0000000C |
| 0000000D | 0000000E | 00000000 | 00000000 | 40404040 | 40404040 | 40404040 |
| 40404040 | 40404040 | 40404040 | 40404040 | C5D3D4D7 | F0F0F1F8* | |
| 02E3E7E3 | 40000448 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F1F9* | |
| 02C5E2C4 | 40404040 | 40400010 | 40400002 | C9C2C3D6 | D47B4040 | 02000000 |

MEMBER NAME ELMPNT

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | C5D3D4D7 | F0F0F2F0** | |
| 02E3E7E3 | 40000450 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F2F1* | |
| 02E3E7E3 | 40000458 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F2F2* | |
| 02E3E7E3 | 4000049C | 40400038 | 40400001 | 58A0D064 | 5880D114 | 58F0D110 |
| 45E0F004 | 00000006 | 00000028 | 45E0F010 | 50A0D0E0 | 5890D070 | 58B0D108 |
| 5870D0E0 | 5C60D130 | 18471A49 | 2B007804 | C5D3D4D7 | F0F0F2F3* | |
| 02E3E7E3 | 400004D4 | 40400038 | 40400001 | B0006A00 | D0586000 | D0505830 |
| D0545030 | D0B81847 | 5A40D080 | 2B007804 | B0006A00 | D0586000 | D0505800 |
| D0545000 | D0BC1847 | 5A40D090 | 7804B000 | C5D3D4D7 | F0F0F2F4* | |
| 02E3E7E3 | 4000050C | 40400038 | 40400001 | 7000D0C0 | 18475A40 | D1187804 |
| B0007000 | D0C81847 | 1A487804 | B0007000 | D0C41847 | 5A40D134 | 7804B000 |

```
7000D0CC  18475A40  D1387804  B0007000  C5D3D4D7  F0F0F2F5*
02E3E7E3  40000544  40400038  40400001  D0B01847  5A40D13C  7804B000
7000D0B4  18475A40  D1407804  B0007000  D0D81847  5A40D144  2B007804
B0006A00  D0586000  D0505800  D0545000  C5D3D4D7  F0F0F2F6*
02E3E7E3  4000057C  40400038  40400001  D0D01847  5A40D148  7804B000
7000D0E4  18475A40  D14C7804  B0007000  D0E858F0  D1101800  45E0F004
00000006  000002A5  45E0F008  0450D0E0  C5D3D4D7  F0F0F2F7*
02E3E7E3  400005B4  40400038  40400001  45E0F008  0450D0BC  45E0F008
0470D0C0  45E0F008  0470D0C8  45E0F008  0470D0C4  45E0F008  0470D0CC
45E0F008  0470D0B0  45E0F008  0470D0B4  C5D3D4D7  F0F0F2F8*
02E3E7E3  400005EC  40400038  40400001  45E0F008  0470D0D8  45E0F008
0450D0D0  45E0F008  0470D0E4  45E0F008  0470D0E8  18475A40  D15045E0
F0080474  B0001847  5A40D130  45E0F008  C5D3D4D7  F0F0F2F9*
02E3E7E3  40000624  40400038  40400001  0474B000  45E0F010  5800D0D4
12004780  D3AA1939  4770D3AA  58F0D110  45E0F004  00000006  000002E6
45E0F010  2B007800  D0B06A00  D0586000  C5D3D4D7  F0F0F3F0**
02E3E7E3  4000065C  40400038  40400001  D0505870  D0542B00  7800D0B4
6A00D058  6000D050  5800D054  5000D0A8  1C681807  1A095000  D1201807
5A00D080  5000D124  18575A50  D0901837  C5D3D4D7  F0F0F3F1*
02E3E7E3  40000694  40400038  40400001  5A30D118  18455850  D1245860
D120187A  18B35890  D10058F0  D1101800  45E0F004  00000006  0000032A
45E0F008  04769000  45E0F008  04759000  C5D3D4D7  F0F0F3F2*
02E3E7E3  400006CC  40400038  40400001  45E0F008  04749000  45E0F008
047B9000  45E0F010  1AB81A48  1A581A68  1A7A5970  D0A847C0  D36258B0
D1085890  D0705820  D0E01A2A  5020D0E0  C5D3D4D7  F0F0F3F3*
02E3E7E3  40000704  40400038  40400001  5920D0DC  47C0D17C  1BFF58E0
D00007FE  58D0D004  58E0D00C  92FFD00C  982CD01C  07FE987A  10045820
70005020  D0DC5820  90005020  D0F05820  C5D3D4D7  F0F0F3F4*
02E3E7E3  4000073C  40400038  40400001  A0005020  D0D45820  10004130
20004150  00041B25  5C40D098  1B255020  D1085030  D10C5820  10084130
20004150  00041B25  5C40D074  1B255020  C5D3D4D7  F0F0F3F5*
02E3E7E3  40000774  4040000A  40400001  D1005030  D10447F0  D1544040
40404040  40404040  40404040  40404040  40404040  40404040  40404040
40404040  40404040  40404040  40404040  C5D3D4D7  F0F0F3F6*
02E3E7E3  40000020  40400008  40400001  00000726  00000348  40404040
40404040  40404040  40404040  40404040  40404040  40404040  40404040
40404040  40404040  40404040  40404040  C5D3D4D7  F0F0F3F7*
02E3E7E3  40000348  40400004  40400001  00000714  40404040  40404040
40404040  40404040  40404040  40404040  40404040  40404040  40404040
40404040  40404040  40404040  40404040  C5D3D4D7  F0F0F3F8*
02D9D3C4  40404040  40400038  40404040  00020001  1C000458  00010001
0C0004B0  00010001  0C0005A8  00010001  0C000648  00010001  0C0006B8

MEMBER NAME  ELMPNT
00010001  0C000020  00010001  0C000024  C5D3D4D7  F0F0F3F9*
02E3E7E3  4000045C  40400038  40400001  00000014  00000010  00000000
00000000  00000000  00000000  00000000  00000038  00000018  0000001C
00000020  00000024  00000028  0000002C  C5D3D4D7  F0F0F4F0**
02E3E7E3  40000494  40400008  40400001  00000030  00000034  40404040
40404040  40404040  40404040  40404040  40404040  40404040  40404040
40404040  40404040  40404040  40404040  C5D3D4D7  F0F0F4F1*
02D9D3C4  40404040  40400008  40404040  00010001  0C000348  40404040
40404040  40404040  40404040  40404040  40404040  40404040  40404040
40404040  40404040  40404040  40404040  C5D3D4D7  F0F0F4F2*
02C5D5C4  40404040  40404040  40404040  40404040  40404040  40404040
0000077E  F1F5F7F3  F460C6D6  F34040F0  F2F0F2F8  F7F0F9F8  40F0F84B
F1F54BF0  F0404040  C5D3D4D7  D5E34040  C5D3D4D7  F0F0F4F3**

MEMBER NAME  ELLCVT
02C5E2C4  40404040  40400010  40400001  C5D3D3C3  E5E34040  00000000
40000000  40404040  40404040  40404040  40404040  40404040  40404040
```

```
40404040  40404040  40404040  40404040  C5D3D3C3  F0F0F0F1*
02E3E7E3  40000000  40400028  40400001  47F0F00C  07C5D3D3  C3E5E340
90ECD00C  184D98CD  F0205040  D00450D0  400807FC  40404040  40404040
40404040  40404040  40404040  40404040  C5D3D3C3  F0F0F0F2*
02E3E7E3  40000088  40400038  40400001  00000000  00000000  4E000000
00000000  4F080000  00000000  4E000000  80000000  3FCCCCCC  CCCCCCCD
41100000  00000000  42120000  00000000  C5D3D3C3  F0F0F0F3*
02E3E7E3  400000C0  4040002C  40400001  00000000  00000001  00000002
00000004  00000005  00000006  00000007  00000008  00000009  00000000
00000000  40404040  40404040  40404040  C5D3D3C3  F0F0F0F4*
02E3E7E3  40000150  40400004  40400001  00000000  40404040  40404040
40404040  40404040  40404040  40404040  40404040  40404040  40404040
40404040  40404040  40404040  40404040  C5D3D3C3  F0F0F0F5*
02E3E7E3  40000158  40400004  40400001  00000000  40404040  40404040
40404040  40404040  40404040  40404040  40404040  40404040  40404040
40404040  40404040  40404040  40404040  C5D3D3C3  F0F0F0F6*
02C5E2C4  40404040  40400010  40400002  C4C3D6E2  40404040  02000000
40000000  40404040  40404040  40404040  40404040  40404040  40404040
40404040  40404040  40404040  40404040  C5D3D3C3  F0F0F0F7*
02E3E7E3  40000160  40400004  40400001  00000000  40404040  40404040
40404040  40404040  40404040  40404040  40404040  40404040  40404040
40404040  40404040  40404040  40404040  C5D3D3C3  F0F0F0F8*
02C5E2C4  40404040  40400010  40400003  C4E2C9D5  40404040  02000000
40000000  40404040  40404040  40404040  40404040  40404040  40404040
40404040  40404040  40404040  40404040  C5D3D3C3  F0F0F0F9*
02E3E7E3  40000168  40400008  40400001  00000000  00000000  40404040
40404040  40404040  40404040  40404040  40404040  40404040  40404040
40404040  40404040  40404040  40404040  C5D3D3C3  F0F0F1F0**
02C5E2C4  40404040  40400010  40400004  E2D8D9E3  40404040  02000000
40000000  40404040  40404040  40404040  40404040  40404040  40404040
40404040  40404040  40404040  40404040  C5D3D3C3  F0F0F1F1*
02C5E2C4  40404040  40400010  40400005  C4C1D9C3  D6E24040  02000000
40000000  40404040  40404040  40404040  40404040  40404040  40404040
40404040  40404040  40404040  40404040  C5D3D3C3  F0F0F1F2*
02E3E7E3  40000174  4040000C  40400001  00000000  00000000  00000000
40404040  40404040  40404040  40404040  40404040  40404040  40404040
40404040  40404040  40404040  40404040  C5D3D3C3  F0F0F1F3*
02E3E7E3  400001C8  40400038  40400001  5890D138  58A0D128  58B0D144
5860D09C  5850D0A4  5830D0B4  6800D088  23006000  D19058F0  D1544110
D04C05EF  6000D198  6840B020  6040D118  C5D3D3C3  F0F0F1F4*
02E3E7E3  40000200  40400038  40400001  6820B028  6020D0F8  2B246020
D1082022  6C20D090  6D20D198  6A20D080  28026A00  D0706000  D0605820
D0645020  D0CC1926  47A0D210  5060D0CC  C5D3D3C3  F0F0F1F5*
02E3E7E3  40000238  40400038  40400001  5800D0CC  1A065000  D0C85800
D0CC5700  D07C5000  D06C6820  D0686B20  D0786800  D1082D02  6000D100
6800D118  6000D0D0  5060D0C4  6800B008  C5D3D3C3  F0F0F1F6*
02E3E7E3  40000270  40400038  40400001  6000D168  6800B030  6000D160
6800B040  6000D170  6800B010  6000D180  6800B038  6000D178  6800B048
6000D188  18231845  18745880  D0C418B2  C5D3D3C3  F0F0F1F7*
02E3E7E3  400002A8  40400038  40400001  58A0D130  5840D128  5980D0C8
4770D298  6800D0F8  6000D0D0  58F0D140  4110D050  05EF6000  D19058F0
D14C4110  D05005EF  6000D198  6820D190  C5D3D3C3  F0F0F1F8*
02E3E7E3  400002E0  40400038  40400001  6C20D160  6A20D168  6840D198
6C40D170  2A24702B  90046820  D1906C20  D1786A20  D1806840  D1986C40
D1882A24  702B9008  6820D190  6C20D170  C5D3D3C3  F0F0F1F9*
02E3E7E3  40000318  40400038  40400001  6840D198  6C40D160  2B24702B

MEMBER NAME  ELLCVT
A0046820  D1906C20  D1886840  D1986C40  D1782B24  702BA008  782BA004
7020D190  3C22784B  A0083C44  3A247020  C5D3D3C3  F0F0F2F0**
02E3E7E3  40000350  40400038  40400001  D19458F0  D1504110  D05405EF
```

```
7000D198  2B447840  D1982B22  7820D190  2D24702B  A0042B22  782BA008
2D24702B  A0081986  4780D398  782B9004  C5D3D3C3  F0F0F2F1*
02E3E7E3  40000388  40400038  40400001  18281B26  89200003  7B229004
3C22784B  90087B42  90083C44  3A247020  D19058F0  D1504110  D05805EF
7000D194  18271B25  7800D194  70024000  C5D3D3C3  F0F0F2F2*
02E3E7E3  400003C0  40400038  40400001  6800D0D0  6A00D100  6000D0D0
1A861A75  1AB35980  D0C847C0  D28858A0  D12858B0  D1445820  D0C88920
00027800  D0987002  A0001BFF  58E0D000  C5D3D3C3  F0F0F2F3*
02E3E7E3  400003F8  40400038  40400001  07FE58A0  D00458E0  A00C58B0
A0185810  B0105820  D0C85020  100018DA  92FFA00C  982CA01C  07FE5870
10105820  70005020  D0C85820  10004130  C5D3D3C3  F0F0F2F4*
02E3E7E3  40000430  40400038  40400001  20004150  00081B25  5020D144
5030D148  58201004  41302000  41500004  1B255B20  D0B45020  D1385030
D13C5820  10084130  20004150  00041B25  C5D3D3C3  F0F0F2F5*
02E3E7E3  40000468  40400026  40400001  5B20D0B4  5020D130  5030D134
5820100C  41302000  41500004  1B255020  D1285030  D12C47F0  D1A04040
40404040  40404040  40404040  40404040  C5D3D3C3  F0F0F2F6*
02E3E7E3  40000020  4040000C  40400001  0000041E  00000028  000003FA
40404040  40404040  40404040  40404040  40404040  40404040  40404040
40404040  40404040  40404040  40404040  C5D3D3C3  F0F0F2F7*
02E3E7E3  40000074  40400004  40400001  800001B8  40404040  40404040
40404040  40404040  40404040  40404040  40404040  40404040  40404040
40404040  40404040  40404040  40404040  C5D3D3C3  F0F0F2F8*
02D9D3C4  40404040  40400038  40404040  00020001  1C000168  00030001
1C000174  00040001  1C000178  00050001  1C00017C  00010001  0C000020
00010001  0C000024  00010001  0C000028  C5D3D3C3  F0F0F2F9*
02E3E7E3  40000078  4040000C  40400001  800000F8  800001BC  800001B8
40404040  40404040  40404040  40404040  40404040  40404040  40404040
40404040  40404040  40404040  40404040  C5D3D3C3  F0F0F3F0**
02E3E7E3  40000180  40400038  40400001  00000000  00000000  00000000
00000000  00000000  00000000  00000000  00000000  00000000  00000000
00000000  00000000  00000000  00000000  C5D3D3C3  F0F0F3F1*
02E3E7E3  400001B8  40400010  40400001  00000000  00000000  00000000
00000000  40404040  40404040  40404040  40404040  40404040  40404040
40404040  40404040  40404040  40404040  C5D3D3C3  F0F0F3F2*
02D9D3C4  40404040  40400020  40404040  00010001  0C000074  00010001
0C000078  00010001  0C00007C  00010001  0C000080  40404040  40404040
40404040  40404040  40404040  40404040  C5D3D3C3  F0F0F3F3*
02C5D5C4  40404040  40404040  40404040  40404040  40404040  40404040
0000048E  F1F5F7F3  F460C6D6  F34040F0  F2F0F2F8  F7F0F9F8  40F0F84B
F1F54BF0  F4404040  C5D3D3C3  E5E34040  C5D3D3C3  F0F0F3F4**

MEMBER NAME  FBUILD
02C5E2C4  40404040  40400010  40400001  C6C2E4C9  D3C44040  00000000
40000000  40404040  40404040  40404040  40404040  40404040  40404040
40404040  40404040  40404040  40404040  C6C2E4C9  F0F0F0F1*
02E3E7E3  40000000  40400038  40400001  47F0F00C  07C6C2E4  C9D3C440
90ECD00C  184D98CD  F0205040  D00450D0  400807FC  40404040  40404040
02100422  02060414  0122020A  08031801  C6C2E4C9  F0F0F0F2*
02E3E7E3  40000038  40400038  40400001  0A080318  011A05C4  C1E2C840
10031A07  40D3C1E8  E4D74010  041A1B40  D5D6E340  C3C1D3D3  C5C440D6
E4E340C9  D540C7C5  D6D4C5E3  D9E81832  C6C2E4C9  F0F0F0F3*
02E3E7E3  40000070  40400038  40400001  22020648  14012202  0A05011A
016B2202  06061401  22021004  18011004  18020614  14011801  10041801
0A0A0318  010A0903  18010A09  03180110  C6C2E4C9  F0F0F0F4*
02E3E7E3  400000A8  40400038  40400001  0418010A  08031801  0A0A0318
01061814  01220206  84140122  020A0501  1A016B22  02060614  0122021A
07E3D6E3  C1D34040  0A0B0318  1A0A0803  C6C2E4C9  F0F0F0F5*
02E3E7E3  400000E0  40400038  40400001  18010A0A  03220206  3E140122
021A0AD4  C1E2E240  40404040  400A0903  18010A09  03180A22  02061E14
01220218  02100418  040A0B03  18050A08  C6C2E4C9  F0F0F0F6*
```

```
02E3E7E3  40000118  40400038  40400001  03220206  22140122  D4C1E3C5
D9C9C1D3  4040E3D6  E3C1D340  C1D9C5C1  4040E3D6  E3C1D340  E6C5C9C7
C8E34040  40404040  40404040  40404040  C6C2E4C9  F0F0F0F7*
02E3E7E3  40000150  40400038  40400001  40404040  40404040  40404040
40404040  40404040  40404040  C9D3D3C5  C7C1D340  C3E4E3D6  E4E34040
E4D5C1C2  D3C540E3  D640D6D9  C4C5D940  C6C2E4C9  F0F0F0F8*
02E3E7E3  40000188  40400038  40400001  C5E7E3C5  D9C9D6D9  40E4D5C4
C5C64B40  E4D5C1C2  D3C540E3  D640C3C8  C1C9D540  40404040  40404040
40404040  40404040  40404040  40404040  C6C2E4C9  F0F0F0F9*
02E3E7E3  400001C0  40400010  40400001  D6D7D740  40404040  40404040
40404040  40404040  40404040  40404040  40404040  40404040  40404040
40404040  40404040  40404040  40404040  C6C2E4C9  F0F0F1F0**
02E3E7E3  40000820  40400038  40400001  00000000  00000000  4E000000
00000000  4F080000  00000000  4E000000  80000000  00000000  00000000
00000000  00000001  00000001  00000002  C6C2E4C9  F0F0F1F1*
02E3E7E3  40000858  40400038  40400001  00000003  00000004  00000005
00000006  00000007  00000008  00000009  0000000A  0000000B  0000000C
0000000D  0000000E  0000000F  00000010  C6C2E4C9  F0F0F1F2*
02E3E7E3  40000890  40400038  40400001  00000014  00000016  00000018
0000001E  00000022  00000028  0000003E  00000048  00000049  00000058
0000005D  0000005E  00000070  00000075  C6C2E4C9  F0F0F1F3*
02E3E7E3  400008C8  40400038  40400001  00000076  0000007B  00000084
0000008F  00000098  000007D0  4010624E  40170A3D  401C28F6  40200000
402147AE  402288CE  40400000  40600000  C6C2E4C9  F0F0F1F4*
02E3E7E3  40000900  40400038  40400001  40800000  4095A858  40C3B646
4111999A  41126666  4114CCCD  41164DD3  41180000  411A9FBE  41200000
4121999A  4124CCCD  412620C5  41278106  C6C2E4C9  F0F0F1F5*
02E3E7E3  40000938  40400038  40400001  412A72B0  412BE354  4131A5E3
41348659  413EB852  4140D331  4141251C  41433333  41454E12  41459FFD
4148AC08  414F9DB2  414FDF3B  41587EFA  C6C2E4C9  F0F0F1F6*
02C5E2C4  40404040  40400010  40400002  C7D9E4D7  40404040  05000000
4000000C  40404040  40404040  40404040  40404040  40404040  40404040
40404040  40404040  40404040  40404040  C6C2E4C9  F0F0F1F7*
02E3E7E3  40000970  40400010  40400001  415E3D71  415FB1BA  00000000
00000000  40404040  40404040  40404040  40404040  40404040  40404040
40404040  40404040  40404040  40404040  C6C2E4C9  F0F0F1F8*
02C5E2C4  40404040  40400010  40400003  D9D4D6C4  C5D34040  05000000
40000018  40404040  40404040  40404040  40404040  40404040  40404040
40404040  40404040  40404040  40404040  C6C2E4C9  F0F0F1F9*
02C5E2C4  40404040  40400010  40400004  D7D4C1E3  D3404040  05000000

MEMBER NAME  FBUILD
40001134  40404040  40404040  40404040  40404040  40404040  40404040
40404040  40404040  40404040  40404040  C6C2E4C9  F0F0F2F0**
02C5E2C4  40404040  40400010  40400005  D7C3C5D9  D9404040  05000000
40003844  40404040  40404040  40404040  40404040  40404040  40404040
40404040  40404040  40404040  40404040  C6C2E4C9  F0F0F2F1*
02C5E2C4  40404040  40400010  40400006  D4E2C9E9  C5404040  05000000
4000000C  40404040  40404040  40404040  40404040  40404040  40404040
40404040  40404040  40404040  40404040  C6C2E4C9  F0F0F2F2*
02C5E2C4  40404040  40400010  40400007  C4C5D9D6  E3404040  02000000
40000000  40404040  40404040  40404040  40404040  40404040  40404040
40404040  40404040  40404040  40404040  C6C2E4C9  F0F0F2F3*
02C5E2C4  40404040  40400010  40400008  D4E5C3C8  D9404040  02000000
40000000  40404040  40404040  40404040  40404040  40404040  40404040
40404040  40404040  40404040  40404040  C6C2E4C9  F0F0F2F4*
02E3E7E3  40000EF8  40400020  40400001  00000000  FFFFFFFF  FFFFFFA0
00001130  FFFFFFBB  00000000  00000000  00000000  40404040  40404040
40404040  40404040  40404040  40404040  C6C2E4C9  F0F0F2F5*
02D9D3C4  40404040  40400038  40404040  00020001  0C000EF8  00030001
0C000EFC  00040001  0C000F00  00040001  0C000F04  00050001  0C000F08
```

```
00060001 0C000F0C 00070001 1C000F10 C6C2E4C9 F0F0F2F6*
02C5E2C4 40404040 40400010 40400009 C3C1C4D3 D5F14040 02000000
40000000 40404040 40404040 40404040 40404040 40404040 40404040
40404040 40404040 40404040 40404040 C6C2E4C9 F0F0F2F7*
02E3E7E3 40000F18 40400004 40400001 00000000 40404040 40404040
40404040 40404040 40404040 40404040 40404040 40404040 40404040
40404040 40404040 40404040 40404040 C6C2E4C9 F0F0F2F8*
02C5E2C4 40404040 40400010 4040000A C3C1C4E2 D7C34040 02000000
40000000 40404040 40404040 40404040 40404040 40404040 40404040
40404040 40404040 40404040 40404040 C6C2E4C9 F0F0F2F9*
02C5E2C4 40404040 40400010 4040000B C3C1C4E2 E4D74040 02000000
40000000 40404040 40404040 40404040 40404040 40404040 40404040
40404040 40404040 40404040 40404040 C6C2E4C9 F0F0F3F0**
02C5E2C4 40404040 40400010 4040000C C3C8C1D9 C6D34040 02000000
40000000 40404040 40404040 40404040 40404040 40404040 40404040
40404040 40404040 40404040 40404040 C6C2E4C9 F0F0F3F1*
02C5E2C4 40404040 40400010 4040000D C8C7C4C1 E3C54040 02000000
40000000 40404040 40404040 40404040 40404040 40404040 40404040
40404040 40404040 40404040 40404040 C6C2E4C9 F0F0F3F2*
02C5E2C4 40404040 40400010 4040000E C8C7E3C9 D4C54040 02000000
40000000 40404040 40404040 40404040 40404040 40404040 40404040
40404040 40404040 40404040 40404040 C6C2E4C9 F0F0F3F3*
02C5E2C4 40404040 40400010 4040000F C9C2C3D6 D47B4040 02000000
40000000 40404040 40404040 40404040 40404040 40404040 40404040
40404040 40404040 40404040 40404040 C6C2E4C9 F0F0F3F4*
02E3E7E3 40000F20 4040001C 40400001 00000000 00000000 00000000
00000000 00000000 00000000 00000000 40404040 40404040 40404040
40404040 40404040 40404040 40404040 C6C2E4C9 F0F0F3F5*
02D9D3C4 40404040 40400038 40404040 00080001 1C000F14 00090001
1C000F20 000A0001 1C000F24 000B0001 1C000F28 000C0001 1C000F2C
000D0001 1C000F30 000E0001 1C000F34 C6C2E4C9 F0F0F3F6*
02C5E2C4 40404040 40400010 40400010 C9C3D5E3 C5D94040 02000000
40000000 40404040 40404040 40404040 40404040 40404040 40404040
40404040 40404040 40404040 40404040 C6C2E4C9 F0F0F3F7*
02C5E2C4 40404040 40400010 40400011 D4D6C4E2 D9E34040 02000000
40000000 40404040 40404040 40404040 40404040 40404040 40404040
40404040 40404040 40404040 40404040 C6C2E4C9 F0F0F3F8*
02E3E7E3 40000F3C 40400008 40400001 00000000 00000000 40404040
40404040 40404040 40404040 40404040 40404040 40404040 40404040

MEMBER NAME  FBUILD
40404040 40404040 40404040 40404040 C6C2E4C9 F0F0F3F9*
02E3E7E3 400009F4 40400004 40400001 000000C8 40404040 40404040
40404040 40404040 40404040 40404040 40404040 40404040 40404040
40404040 40404040 40404040 40404040 C6C2E4C9 F0F0F4F0**
02E3E7E3 40000DD8 40400038 40400001 E2C5D840 4040D340 7B4040D4
D6C4C5D3 40C9C4C5 D5E34040 40404040 40404040 C4C5E340 4040C1D9
C5C14040 40404040 E740C2C1 D9404040 C6C2E4C9 F0F0F4F1*
02E3E7E3 40000E10 40400038 40400001 4040E8C2 C1D94040 40404040
D4C1E3D3 40E6C5C9 C7C8E340 4040E5D6 D3E4D4C5 40404040 40D6D9C9
C5D5E3C1 E3C9D6D5 E2404040 40404040 C6C2E4C9 F0F0F4F2*
02E3E7E3 40000E48 40400038 40400001 40404040 4040C5D9 D9D6D9E2
40404040 C3D6D7E8 D9C9C7C8 E3404DC3 5D40F1F9 F8F640E3 C8C540C2
D6C5C9D5 C740C3D6 D4D7C1D5 E85BC1D3 C6C2E4C9 F0F0F4F3*
02E3E7E3 40000E80 40400038 40400001 D340D9C9 C7C8E3E2 40D9C5E2
C5D9E5C5 C45B5BE2 D3C9C340 E5C5D9E2 C9D6D540 E7E7E7E7 40404040
40404040 4040C4C1 E3C57A40 E7E761E7 C6C2E4C9 F0F0F4F4*
02E3E7E3 40000EB8 40400038 40400001 E761E7E7 40404040 40E3C9D4
C57A40E7 E77AE7E7 7AE7E740 40404040 40404040 40404040 404040C4
C1E2C840 40604040 40404040 40404040 C6C2E4C9 F0F0F4F5*
02E3E7E3 40001004 40400038 40400001 5870DD48 58A0D6AC 5890D7A8
```

| | | | | | | |
|---|---|---|---|---|---|---|
| 5880D6C8 | 5860D6E4 | 5820DD3C | 58002008 | 5A00D70C | 5000D82C | 58F0DD64 |
| 4110D0D4 | 05EF58F0 | DD604110 | D0D805EF | C6C2E4C9 | F0F0F4F6* | |
| 02E3E7E3 | 4000103C | 40400038 | 40400001 | 4100DCE4 | 5000D0E0 | 4100D97C |
| 5000D0E4 | 9280D0E4 | 58F0DD44 | 4110D0DC | 05EF4100 | DCF75000 | D0E04100 |
| D9A45000 | D0E49280 | D0E458F0 | DD444110 | C6C2E4C9 | F0F0F4F7* | |
| 02E3E7E3 | 40001074 | 40400038 | 40400001 | D0DC05EF | 4100DCD0 | 5000D0EC |
| 58F0DD44 | 4110D0E8 | 05EF5800 | D69C5000 | DDF45060 | DDFC58E0 | DE1C782E |
| 70007020 | DDF82B00 | 38026A00 | D6606000 | C6C2E4C9 | F0F0F4F8* | |
| 02E3E7E3 | 400010AC | 40400038 | 40400001 | D6505830 | D6541033 | 5030D7C0 |
| 58F0DD68 | 45E0F004 | 00000000 | 00000028 | 45E0F008 | 0450D7C0 | 45E0F010 |
| 58F0DD68 | 45E0F000 | 00000000 | 0000002C | C6C2E4C9 | F0F0F4F9* | |
| 02E3E7E3 | 400010E4 | 40400038 | 40400001 | 45E0F00C | 00000A4C | 01200004 |
| 45E0F010 | 58F0DD5C | 4110D0F4 | 05EF41E0 | 000415FE | 4720DF3E | 58EFD04C |
| 07FE58F0 | DD444110 | D10405EF | 7800DDF8 | C6C2E4C9 | F0F0F5F0** | |
| 02E3E7E3 | 4000111C | 40400038 | 40400001 | 320047A0 | DF644100 | D8A05000 |
| D11458F0 | DD444110 | D11005EF | 4100DD16 | 5000D120 | 58F0DD44 | 4110D11C |
| 05EF5800 | D7DC8709 | DFC45800 | D67C5000 | C6C2E4C9 | F0F0F5F1* | |
| 02E3E7E3 | 40001154 | 40400038 | 40400001 | D8347800 | D6787000 | D8307000 |
| D83C7000 | D8407000 | D8387000 | D86C5800 | D6805000 | D8281828 | 5A20DDFC |
| 78227000 | 7020D9AC | 7800D678 | 7000D9B0 | C6C2E4C9 | F0F0F5F2* | |
| 02E3E7E3 | 4000118C | 40400038 | 40400001 | 7800D678 | 7000D9B4 | 58F0DD6C |
| 4110D128 | 05EF5000 | D7FC7800 | D7A03300 | 7000DE00 | 7000DE04 | 58F0DD58 |
| 4110D130 | 05EF41E0 | 000415FE | 4720DFFA | C6C2E4C9 | F0F0F5F3* | |
| 02E3E7E3 | 400011C4 | 40400038 | 40400001 | 58EFD054 | 07FE58F0 | DD584110 |
| D17805EF | 41E00004 | 15FE4720 | C01458EF | D05C07FE | 7800D78C | 7000D814 |
| 7800D7A4 | 33007000 | D8447800 | D7A47000 | C6C2E4C9 | F0F0F5F4* | |
| 02E3E7E3 | 400011FC | 40400038 | 40400001 | D8785800 | D7DC8709 | C03E5800 |
| D6805000 | D8505800 | D6745000 | D8647800 | DE207000 | D8487800 | DE047000 |
| D9747800 | D7787000 | D9785800 | D6745000 | C6C2E4C9 | F0F0F5F5* | |
| 02E3E7E3 | 40001234 | 40400038 | 40400001 | D8545800 | D8505000 | D7F05080 |
| DD88181A | 5C00D828 | 5010DDB0 | 18365C20 | D8505030 | DD841803 | 1A0A5000 |
| DDB81803 | 5A00D6BC | 5000DDBC | 18035A00 | C6C2E4C9 | F0F0F5F6* | |
| 02E3E7E3 | 4000126C | 40400038 | 40400001 | D68C5000 | DDC01803 | 5A00DD90 |
| 5000DDC4 | 18035A00 | D6D45000 | DDC81803 | 5A00DD94 | 5000DDCC | 18031A08 |
| 5000DD8C | 18035A00 | DD985000 | DDD01803 | C6C2E4C9 | F0F0F5F7* | |
| 02E3E7E3 | 400012A4 | 40400038 | 40400001 | 5A00D6C0 | 5000DDD4 | 18435A40 |
| DD9C5040 | DDD81803 | 5A00DDA0 | 5000DDDC | 18035A00 | DDA45000 | DDE01803 |
| 5A00DDA8 | 5000DDE4 | 18035A00 | DDAC5000 | C6C2E4C9 | F0F0F5F8* | |

MEMBER NAME FBUILD

| | | | | | | |
|---|---|---|---|---|---|---|
| 02E3E7E3 | 400012DC | 40400038 | 40400001 | DDE85040 | DDEC1A38 | 5030DDF0 |
| 186A5890 | D6E418A7 | 5880DD38 | 5870DD30 | 5800D854 | 5A00D680 | 5000D854 |
| 58F0DD5C | 4110D1C0 | 05EF41E0 | 000415FE | C6C2E4C9 | F0F0F5F9* | |
| 02E3E7E3 | 40001314 | 40400038 | 40400001 | 4720C14E | 58EFD064 | 07FE58E0 |
| DDB82B00 | 780EA000 | 6A00D660 | 6000D650 | 5800D654 | 5000D7F8 | 58E0DDBC |
| 2B00780E | A0006A00 | D6606000 | D6505800 | C6C2E4C9 | F0F0F6F0** | |
| 02E3E7E3 | 4000134C | 40400038 | 40400001 | D6545000 | D7E458E0 | DDC02B00 |
| 780EA000 | 6A00D660 | 6000D650 | 5800D654 | 5000D81C | 58E0DDC4 | 2B00780E |
| A0006A00 | D6606000 | D6505800 | D6545000 | C6C2E4C9 | F0F0F6F1* | |
| 02E3E7E3 | 40001384 | 40400038 | 40400001 | D7E058E0 | DDC8780E | A0007000 |
| D80858E0 | DDCC780E | A0007000 | D80C58E0 | DD8C2B00 | 780EA000 | 6A00D660 |
| 6000D650 | 5850D654 | 1C496825 | 70502B00 | C6C2E4C9 | F0F0F6F2* | |
| 02E3E7E3 | 400013BC | 40400038 | 40400001 | 38026A00 | D6606000 | D6505800 |
| D6545000 | D7E858F0 | DD5C4110 | D1D005EF | 41E00004 | 15FE4720 | C21858EF |
| D06C07FE | 58E0DDD0 | 410EA000 | 5000D1E0 | C6C2E4C9 | F0F0F6F3* | |
| 02E3E7E3 | 400013F4 | 40400038 | 40400001 | 58F0DD40 | 4110D1E0 | 05EF5800 |
| D7F45700 | D66C5000 | D65C6820 | D6586B20 | D66858E0 | DDD47C2E | A0007020 |
| D7D83222 | 4730C2E4 | 58E0DDD8 | 780EA000 | C6C2E4C9 | F0F0F6F4* | |
| 02E3E7E3 | 4000142C | 40400038 | 40400001 | 32004730 | C2E45800 | 80455900 |
| D82447A0 | C2E45850 | 80455A50 | D6805050 | 804558F0 | DD681800 | 45E0F004 |
| 00000000 | 00000032 | 5810DDDC | 45E0F008 | C6C2E4C9 | F0F0F6F5* | |
| 02E3E7E3 | 40001464 | 40400034 | 40400001 | 0471A000 | 5810DDE0 | 45E0F008 |

| | | | | | | |
|---|---|---|---|---|---|---|
| 0471A000 | 45E0F008 | 0450D7C0 | 45E0F008 | 0450D7E4 | 45E0F010 | 58F0DD68 |
| 45E0F000 | 00000000 | 00000071 | 40404040 | C6C2E4C9 | F0F0F6F6* | |
| 02D9D3C4 | 40404040 | 40400038 | 40404040 | 000F0001 | 1C000F38 | 00100001 |
| 1C000F3C | 00110001 | 1C000F40 | 00010001 | 0C0010C4 | 00010001 | 0C0010E0 |
| 00010001 | 0C0010E8 | 00010001 | 0C001458 | C6C2E4C9 | F0F0F6F7* | |
| 02E3E7E3 | 40001498 | 40400038 | 40400001 | 5C40D6DC | 45E0F134 | 00010000 |
| 01258001 | 01000048 | 00000001 | 45E0F010 | 2B227820 | D7D858E0 | DD8C2B00 |
| 780EA000 | 6A00D660 | 6000D650 | 5830D654 | C6C2E4C9 | F0F0F6F8* | |
| 02E3E7E3 | 400014D0 | 40400038 | 40400001 | 1C296C23 | 70587020 | D8702B44 |
| 38426C43 | 70387040 | D87458E0 | DDE4704E | A00058E0 | DDE8702E | A0005800 |
| D6805000 | D7CC5800 | D7F45000 | D7EC5900 | C6C2E4C9 | F0F0F6F9* | |
| 02E3E7E3 | 40001508 | 40400038 | 40400001 | D68C47C0 | C3465800 | D68C5000 |
| D7EC5830 | D7EC8930 | 00025820 | D68C5860 | D6905870 | D6805880 | D68C1893 |
| 18A258F0 | DD681800 | 45E0F004 | 00000000 | C6C2E4C9 | F0F0F7F0** | |
| 02E3E7E3 | 40001540 | 40400038 | 40400001 | 00000077 | 45E0F008 | 047AD980 |
| 45E0F010 | 5800D7CC | 1A065000 | D80058F0 | DD681800 | 45E0F000 | 00000000 |
| 0000007F | 5810D7CC | 45E0F134 | 00010000 | C6C2E4C9 | F0F0F7F1* | |
| 02E3E7E3 | 40001578 | 40400038 | 40400001 | 0121D881 | 0200099C | 000009D0 |
| 00000850 | 00000001 | 45E0F010 | 5800D800 | 1A075000 | D7CC87A8 | C3625870 |
| DD305880 | DD3858A0 | DD485890 | D6E45860 | C6C2E4C9 | F0F0F7F2* | |
| 02E3E7E3 | 400015B0 | 40400038 | 40400001 | D6AC58E0 | DDEC2B00 | 780EA000 |
| 6A00D660 | 6000D650 | 5820D654 | 5020D7C4 | 12224780 | C40A5800 | D6705000 |
| D8345800 | D7C41200 | 4770C512 | 7800D7D8 | C6C2E4C9 | F0F0F7F3* | |
| 02E3E7E3 | 400015E8 | 40400038 | 40400001 | 7A00D830 | 7000D830 | 7840D83C |
| 7C40D838 | 7820D808 | 7C20D874 | 3A427820 | D8387A20 | D8743D42 | 7040D83C |
| 7840D840 | 7C40D838 | 7860D80C | 7C60D874 | C6C2E4C9 | F0F0F7F4* | |
| 02E3E7E3 | 40001620 | 40400038 | 40400001 | 3A463D42 | 7040D840 | 7020D838 |
| 7800D86C | 7A00D870 | 7000D86C | 5820D680 | 5020D7B8 | 58E0DDF0 | 782EA000 |
| 18361873 | 5880D680 | 5890D828 | 18A23862 | C6C2E4C9 | F0F0F7F5* | |
| 02E3E7E3 | 40001658 | 40400038 | 40400001 | 7967D9A0 | 4770C4C6 | 50A0D7B8 |
| 5870DD30 | 5880DD38 | 58A0DD48 | 5890D6E4 | 18365C20 | D7B87823 | D9A47A20 |
| D7D87023 | D9A47823 | D9A87A20 | D8747023 | C6C2E4C9 | F0F0F7F6* | |
| 02E3E7E3 | 40001690 | 40400038 | 40400001 | D9A847F0 | C5121A76 | 87A8C488 |
| 50A0D7B8 | 5870DD30 | 5880DD38 | 58A0DD48 | 5890D6E4 | 5800D828 | 5A00D680 |
| 5000D828 | 5820DDB0 | 1A265020 | DDB058E0 | C6C2E4C9 | F0F0F7F7* | |
| 02E3E7E3 | 400016C8 | 40400038 | 40400001 | DD8C782E | A0007022 | D9A07800 |

MEMBER NAME FBUILD

| | | | | | | |
|---|---|---|---|---|---|---|
| D7D87002 | D9A47800 | D8747002 | D9A858F0 | DD704110 | D1EC05EF | 58F0DD68 |
| 45E0F004 | 00000000 | 00000085 | 45E0F008 | C6C2E4C9 | F0F0F7F8* | |
| 02E3E7E3 | 40001700 | 40400038 | 40400001 | 0450D7F8 | 45E0F008 | 0450D7E4 |
| 45E0F134 | 00010000 | 0120D95F | 01000014 | 00000001 | 45E0F008 | 0450D7E0 |
| 45E0F008 | 0470D7D8 | 45E0F008 | 0470D808 | C6C2E4C9 | F0F0F7F9* | |
| 02E3E7E3 | 40001738 | 40400028 | 40400001 | 45E0F008 | 0470D80C | 45E0F008 |
| 0450D7E8 | 45E0F008 | 0470D874 | 45E0F008 | 0470D870 | 45E0F00C | 00000A52 |
| 40404040 | 40404040 | 40404040 | 40404040 | C6C2E4C9 | F0F0F8F0** | |
| 02D9D3C4 | 40404040 | 40400038 | 40404040 | 00010001 | 0C001494 | 00010001 |
| 0C001540 | 00010001 | 0C001568 | 00010001 | 0800157D | 00010001 | 08001581 |
| 00010001 | 08001585 | 00010001 | 0C0016F8 | C6C2E4C9 | F0F0F8F1* | |
| 02E3E7E3 | 40001760 | 40400038 | 40400001 | 01200018 | 45E0F010 | 58F0DD68 |
| 45E0F000 | 00000000 | 000000BA | 45E0F00C | 00000AAB | 01200084 | 45E0F010 |
| 4100D94F | 5000D20C | 58F0DD5C | 4110D20C | C6C2E4C9 | F0F0F8F2* | |
| 02E3E7E3 | 40001798 | 40400038 | 40400001 | 05EF41E0 | 000415FE | 4720C5DA |
| 58EFD074 | 07FE5800 | D7C41200 | 4780C65C | 5800D7C4 | 5900D680 | 4770C602 |
| 4100D950 | 5000D220 | 58F0DD44 | 4110D21C | C6C2E4C9 | F0F0F8F3* | |
| 02E3E7E3 | 400017D0 | 40400038 | 40400001 | 05EF5800 | D7C45900 | D6844770 |
| C6204100 | D9505000 | D22C58F0 | DD444110 | D22805EF | 5800D7C4 | 5900D688 |
| 4770C63E | 4100D950 | 5000D238 | 58F0DD44 | C6C2E4C9 | F0F0F8F4* | |
| 02E3E7E3 | 40001808 | 40400038 | 40400001 | 4110D234 | 05EF5800 | D7C45900 |
| D68C4770 | C65C4100 | D9505000 | D24458F0 | DD444110 | D24005EF | 58F0DD6C |
| 4110D24C | 05EF5000 | D7FC4100 | D9745000 | C6C2E4C9 | F0F0F8F5* | |

```
02E3E7E3  40001840  40400038  40400001  D2544100  D9785000  D25858F0
DD584110  D25405EF  41E00004  15FE4720  C69458EF  D07C07FE  7820D978
7B20D728  7020D978  58F0DD50  4110D29C  C6C2E4C9  F0F0F8F6*
02E3E7E3  40001878  40400038  40400001  05EF7800  D8487B00  D7287000
D8485800  D7F45900  D68C47C0  C8385840  D8545850  D6905860  D6905880
D68C58A0  D7F4195A  47C0C6E4  5040D854  C6C2E4C9  F0F0F8F7*
02E3E7E3  400018B0  40400038  40400001  47F0C838  58F0DD5C  4110D2AC
05EF41E0  000415FE  4720C6FE  58EFD084  07FE58F0  DD5C4110  D2BC05EF
41E00004  15FE4720  C71858EF  D08C07FE  C6C2E4C9  F0F0F8F8*
02E3E7E3  400018E8  40400038  40400001  5A40D680  5800D680  5000D7CC
182A1B25  5A20D680  5020D7EC  192847C0  C73A5080  D7EC5830  D7EC1A35
5B30D680  5030D7EC  18938990  00021825  C6C2E4C9  F0F0F8F9*
02E3E7E3  40001920  40400038  40400001  89200002  5870D680  18A258F0
DD681800  45E0F004  00000000  000000C0  45E0F008  047AD980  45E0F010
5800D7CC  1A065000  D80058F0  DD681800  C6C2E4C9  F0F0F9F0**
02E3E7E3  40001958  40400028  40400001  45E0F000  00000000  000000C8
5810D7CC  45E0F134  00010000  0121D881  0200099C  000009D0  00000850
40404040  40404040  40404040  40404040  C6C2E4C9  F0F0F9F1*
02D9D3C4  40404040  40400038  40404040  00010001  0C00175C  00010001
0C001774  00010001  0C00177C  00010001  0C001938  00010001  0C001960
00010001  08001975  00010001  08001979  C6C2E4C9  F0F0F9F2*
02E3E7E3  40001980  40400038  40400001  00000001  45E0F010  5800D800
1A075000  D7CC87A8  C75A58A0  D7F44100  D9385000  D2D04100  D8825000
D2D49280  D2D458F0  DD444110  D2CC05EF  C6C2E4C9  F0F0F9F3*
02E3E7E3  400019B8  40400038  40400001  58F0DD6C  4110D24C  05EF5000
D7FC4100  D9745000  D2544100  D9785000  D25858F0  DD584110  D25405EF
41E00004  15FE4720  C82058EF  D09407FE  C6C2E4C9  F0F0F9F4*
02E3E7E3  400019F0  40400038  40400001  7820D978  7B20D728  7020D978
5850D7EC  5A50D680  47F0C6D6  5870DD30  5880DD38  58A0DD48  5890D6E4
5860D6AC  5820D864  5A20D680  5020D864  C6C2E4C9  F0F0F9F5*
02E3E7E3  40001A28  40400038  40400001  5920D6D4  4750C8B6  5820D85C
5B20D7F0  5920D6C0  47C0C8B6  58F0DD54  4110D2D8  05EF41E0  000415FE
4720C88A  58EFD09C  07FE5800  D7D05900  C6C2E4C9  F0F0F9F6*
02E3E7E3  40001A60  40400038  40400001  D82C4730  C8B65870  DD4858A0
D6AC5890  D7A85880  D6C85860  D6E45800  D6705000  D7DC47F0  C9865820

MEMBER NAME  FBUILD
D7F05A20  D6805020  D7F05800  DDF01A09  C6C2E4C9  F0F0F9F7*
02E3E7E3  40001A98  40400038  40400001  5000DDF0  5800DDEC  1A095000
DDEC5800  DDE81A09  5000DDE8  5800DDE4  1A095000  DDE45800  DDE01A09
5000DDE0  5800DDDC  1A095000  DDDC5800  C6C2E4C9  F0F0F9F8*
02E3E7E3  40001AD0  40400038  40400001  DDD81A09  5000DDD8  5800DDD4
1A095000  DDD45800  DDD01A09  5000DDD0  5800DD8C  1A095000  DD8C5800
DDCC1A09  5000DDCC  5800DDC8  1A095000  C6C2E4C9  F0F0F9F9*
02E3E7E3  40001B08  40400038  40400001  DDC85800  DDC41A09  5000DDC4
5800DDC0  1A095000  DDC05800  DDBC1A09  5000DDBC  5800DDB8  1A095000
DDB85920  D85C47C0  C1285870  DD4858A0  C6C2E4C9  F0F1F0F0**
02E3E7E3  40001B40  40400038  40400001  D6AC5890  D7A85880  D6C85860
D6E45800  D67C5000  D7DC5800  D7DC8709  C9965800  D8348609  C9B85800
D8545700  D66C5000  D65C6820  D6586B20  C6C2E4C9  F0F1F0F1*
02E3E7E3  40001B78  40400038  40400001  D6687C20  D7287800  D7443A02
7000D804  5800D7DC  8709C9F0  5800D834  8709C9F0  5820D828  5A20D854
18025700  D66C5000  D65C6820  D6586B20  C6C2E4C9  F0F1F0F2*
02E3E7E3  40001BB0  40400038  40400001  D6687C20  D7287800  D75C3A02
7000D804  5800D7F0  5A00D680  5000D850  5800D854  5700D66C  5000D65C
6820D658  6B20D668  7C20D728  33227A20  C6C2E4C9  F0F1F0F3*
02E3E7E3  40001BE8  40400038  40400001  D77C7020  D8105800  D8348709
CB765800  D7DC8709  CB7658F0  DD5C4110  D2E005EF  41E00004  15FE4720
CA4858EF  D0A407FE  58F0DD68  45E0F004  C6C2E4C9  F0F1F0F4*
02E3E7E3  40001C20  40400038  40400001  00000000  000000CE  45E0F008
0470D830  45E0F008  0470D838  45E0F008  0470D86C  45E0F010  58F0DD68
```

```
45E0F000  00000000  000000E6  45E0F00C  C6C2E4C9  F0F1F0F5*
02E3E7E3  40001C58  40400038  40400001  00000A6A  01200041  45E0F010
58F0DD6C  4110D2F0  05EF5000  D7FC7800  D7743300  7000DE24  7800D810
7B00D71C  7000DE28  58F0DD58  4110D2F8  C6C2E4C9  F0F1F0F6*
02E3E7E3  40001C90  40400038  40400001  05EF41E0  000415FE  4720CAD2
58EFD0AC  07FE58F0  DD5C4110  D34005EF  41E00004  15FE4720  CAEC58EF
D0B407FE  58F0DD68  45E0F004  00000000  C6C2E4C9  F0F1F0F7*
02E3E7E3  40001CC8  40400038  40400001  000000EC  45E0F008  0470D83C
45E0F008  0470D840  45E0F010  58F0DD68  45E0F000  00000000  00000104
45E0F134  00010000  0120D89A  0100001E  C6C2E4C9  F0F1F0F8*
02E3E7E3  40001D00  40400038  40400001  00000001  45E0F010  58F0DD6C
4110D350  05EF5000  D7FC7800  D7643300  7000DE24  7800D810  7B00D72C
7000DE28  58F0DD58  4110D358  05EF41E0  C6C2E4C9  F0F1F0F9*
02E3E7E3  40001D38  40400038  40400001  000415FE  4720CB76  58EFD0BC
07FE58F0  DD504110  D3A005EF  58F0DD50  4110D3B0  05EF58F0  DD504110
D3C005EF  58F0DD50  4110D3D0  05EF58F0  C6C2E4C9  F0F1F1F0**
02E3E7E3  40001D70  40400038  40400001  DD504110  D3E005EF  58F0DD50
4110D3F0  05EF7800  D79C3300  7000DE24  58F0DD50  4110D400  05EF7800
D7983300  7000DE24  58F0DD50  4110D410  C6C2E4C9  F0F1F1F1*
02E3E7E3  40001DA8  40400038  40400001  05EF7800  D7703300  7000DE24
58F0DD50  4110D420  05EF7800  D7683300  7000DE24  58F0DD50  4110D430
05EF7800  D7383300  7000DE08  7000DE0C  C6C2E4C9  F0F1F1F2*
02E3E7E3  40001DE0  40400038  40400001  58F0DD50  4110D440  05EF58F0
DD504110  D45005EF  58F0DD50  4110D460  05EF5800  D7DC8609  CC6C7800
D7503300  7000DE24  58F0DD50  4110D470  C6C2E4C9  F0F1F1F3*
02E3E7E3  40001E18  40400038  40400001  05EF58F0  DD504110  D48005EF
58F0DD50  4110D490  05EF58F0  DD504110  D4A005EF  47F0CCD6  7800D76C
33007000  DE247800  D8107B00  D7287000  C6C2E4C9  F0F1F1F4*
02E3E7E3  40001E50  40400038  40400001  DE2858F0  DD504110  D4B005EF
7800D750  33007000  DE247800  D8107B00  D7307000  DE2858F0  DD504110
D4C005EF  7800D810  7B00D728  7000DE24  C6C2E4C9  F0F1F1F5*
02E3E7E3  40001E88  40400038  40400001  58F0DD50  4110D4D0  05EF58F0
DD504110  D4E005EF  58F0DD50  4110D4F0  05EF5800  D7DC8609  CCE61BFF
58E0D000  07FE7800  D76C3300  7000DE24  C6C2E4C9  F0F1F1F6*

MEMBER NAME  FBUILD
02E3E7E3  40001EC0  40400038  40400001  7800D810  7B00D728  7000DE28
58F0DD50  4110D500  05EF7800  D7503300  7000DE24  7800D810  7B00D730
7000DE2C  58F0DD50  4110D510  05EF58F0  C6C2E4C9  F0F1F1F7*
02E3E7E3  40001EF8  40400038  40400001  DD504110  D52005EF  58F0DD50
4110D530  05EF58F0  DD504110  D54005EF  5800D834  8609CD54  1BFF58E0
D00007FE  7820D810  7B20D74C  7020D814  C6C2E4C9  F0F1F1F8*
02E3E7E3  40001F30  40400038  40400001  7020D848  5820D828  5A20D680
18025700  D66C5000  D65C6840  D6586B40  D6687C40  D7283344  3A427040
D8107800  D7543300  7000D974  7B20D71C  C6C2E4C9  F0F1F1F9*
02E3E7E3  40001F68  40400038  40400001  7020D978  7800D758  33007000
DE107000  DE1858F0  DD504110  D55005EF  7800D848  7B00D728  7000D848
58F0DD50  4110D560  05EF7800  D8487B00  C6C2E4C9  F0F1F2F0**
02E3E7E3  40001FA0  40400038  40400001  D7287000  D8487800  D7543300
7000DE14  4100D978  5000D574  58F0DD58  4110D570  05EF41E0  000415FE
4720CE02  58EFD0C4  07FE7820  D9787B20  C6C2E4C9  F0F1F2F1*
02E3E7E3  40001FD8  40400038  40400001  D7287020  D9787800  DE107000
DD7C7800  DE147000  DD80185A  5C40D828  182A188A  189518A2  5870DD30
58F0DD50  4110D5B8  05EF7800  D8487B00  C6C2E4C9  F0F1F2F2*
02E3E7E3  40002010  40400038  40400001  D7287000  D8482B00  780AD9A0
6A00D660  6000D650  5850D654  1C466805  70506A00  D6606000  D6505800
D6545000  D86858F0  DD681800  45E0F004  C6C2E4C9  F0F1F2F3*
02E3E7E3  40002048  40400034  40400001  00000000  0000010A  45E0F008
0450D868  45E0F008  047AD9A4  45E0F008  047AD9A8  45E0F010  58F0DD68
45E0F000  00000000  0000011A  40404040  C6C2E4C9  F0F1F2F4*
02D9D3C4  40404040  40400038  40404040  00010001  0800197D  00010001
```

```
0C001C24  00010001  0C001C50  00010001  0C001C58  00010001  0C001CC8
00010001  0C001CEC  00010001  0C00204C  C6C2E4C9  F0F1F2F5*
02E3E7E3  4000207C  40400038  40400001  45E0F134  00010000  0120D89A
01000022  00000001  45E0F010  4100D978  5000D5CC  58F0DD58  4110D5C8
05EF41E0  000415FE  4720CEE6  58EFD0CC  C6C2E4C9  F0F1F2F6*
02E3E7E3  400020B4  40400038  40400001  07FE7820  D9787B20  D7287020
D97887A8  CE305870  DD4858A0  D6AC5890  D7A85880  D6C858F0  DD504110
D61005EF  7800D740  33007000  DE2458F0  C6C2E4C9  F0F1F2F7*
02E3E7E3  400020EC  40400038  40400001  DD504110  D62005EF  7800D718
33007000  DE2458F0  DD504110  D63005EF  58F0DD50  4110D640  05EF1BFF
58E0D000  07FE58A0  D00458E0  A00C58B0  C6C2E4C9  F0F1F2F8*
02E3E7E3  40002124  40400038  40400001  A0185810  B0087820  D8047020
10005820  B00C5830  D7DC5030  200018DA  92FFA00C  982CA01C  07FE58C0
D0489879  10045820  70005020  D85C7820  C6C2E4C9  F0F1F2F9*
02E3E7E3  4000215C  4040002E  40400001  80007020  D8045820  90005020
D7DC5820  10004130  20004150  00041B25  5C40D6C4  1B255020  DD485030
DD4C47F0  DE344040  40404040  40404040  C6C2E4C9  F0F1F3F0**
02E3E7E3  40000020  40400008  40400001  0000214A  000001D0  40404040
40404040  40404040  40404040  40404040  40404040  40404040  40404040
40404040  40404040  40404040  40404040  C6C2E4C9  F0F1F3F1*
02E3E7E3  400001D0  40400004  40400001  0000211A  40404040  40404040
40404040  40404040  40404040  40404040  40404040  40404040  40404040
40404040  40404040  40404040  40404040  C6C2E4C9  F0F1F3F2*
02E3E7E3  40000218  40400010  40400001  000011D0  0000110E  0000110E
000011CA  40404040  40404040  40404040  40404040  40404040  40404040
40404040  40404040  40404040  40404040  C6C2E4C9  F0F1F3F3*
02D9D3C4  40404040  40400038  40404040  00010001  0C002078  00010001
0C000020  00010001  0C000024  00010001  0C0001D0  00010001  0C000218
00010001  0C00021C  00010001  0C000220  C6C2E4C9  F0F1F3F4*
02E3E7E3  40000228  4040001C  40400001  000011CA  000011E4  000011FE
0000131E  0000131E  000013E8  000013E8  40404040  40404040  40404040
40404040  40404040  40404040  40404040  C6C2E4C9  F0F1F3F5*
02D9D3C4  40404040  40400038  40404040  00010001  0C000224  00010001

MEMBER NAME  FBUILD
0C000228  00010001  0C00022C  00010001  0C000230  00010001  0C000234
00010001  0C000238  00010001  0C00023C  C6C2E4C9  F0F1F3F6*
02E3E7E3  40000244  4040001C  40400001  000017AA  000017AA  00001864
00001864  000018CE  000018CE  000018E8  40404040  40404040  40404040
40404040  40404040  40404040  40404040  C6C2E4C9  F0F1F3F7*
02D9D3C4  40404040  40400038  40404040  00010001  0C000240  00010001
0C000244  00010001  0C000248  00010001  0C00024C  00010001  0C000250
00010001  0C000254  00010001  0C000258  C6C2E4C9  F0F1F3F8*
02E3E7E3  40000260  4040001C  40400001  000018E8  000019F0  000019F0
00001A5A  00001A66  00001C18  00001D46  40404040  40404040  40404040
40404040  40404040  40404040  40404040  C6C2E4C9  F0F1F3F9*
02D9D3C4  40404040  40400038  40404040  00010001  0C00025C  00010001
0C000260  00010001  0C000264  00010001  0C000268  00010001  0C00026C
00010001  0C000270  00010001  0C000274  C6C2E4C9  F0F1F4F0**
02E3E7E3  4000027C  4040001C  40400001  00001CA2  00001CBC  00001CBC
00001CBC  00001D46  00001D46  00001FD2  40404040  40404040  40404040
40404040  40404040  40404040  40404040  C6C2E4C9  F0F1F4F1*
02D9D3C4  40404040  40400038  40404040  00010001  0C000278  00010001
0C00027C  00010001  0C000280  00010001  0C000284  00010001  0C000288
00010001  0C00028C  00010001  0C000290  C6C2E4C9  F0F1F4F2*
02E3E7E3  40000298  40400018  40400001  00001FDE  000020B6  000020C2
80000B74  80000B4C  0000086C  40404040  40404040  40404040  40404040
40404040  40404040  40404040  40404040  C6C2E4C9  F0F1F4F3*
02E3E7E3  400002B4  40400008  40400001  80000000  0000085C  40404040
40404040  40404040  40404040  40404040  40404040  40404040  40404040
40404040  40404040  40404040  40404040  C6C2E4C9  F0F1F4F4*
```

| | | | | | | |
|---|---|---|---|---|---|---|
| 02D9D3C4 | 40404040 | 40400038 | 40404040 | 00010001 | 0C000294 | 00010001 |
| 0C000298 | 00010001 | 0C00029C | 00010001 | 0C0002A0 | 00010001 | 0C0002A4 |
| 00010001 | 0C0002A8 | 00010001 | 0C0002AC | C6C2E4C9 | F0F1F4F5* | |
| 02E3E7E3 | 400002C0 | 4040001C | 40400001 | 80000014 | 00000A6A | 00000850 |
| 00000874 | 800001C8 | 0000085C | 00000A6A | 40404040 | 40404040 | 40404040 |
| 40404040 | 40404040 | 40404040 | 40404040 | C6C2E4C9 | F0F1F4F6* | |
| 02D9D3C4 | 40404040 | 40400038 | 40404040 | 00010001 | 0C0002B8 | 00030001 |
| 0C0002C0 | 00010001 | 0C0002C4 | 00010001 | 0C0002C8 | 00010001 | 0C0002CC |
| 00010001 | 0C0002D0 | 00010001 | 0C0002D4 | C6C2E4C9 | F0F1F4F7* | |
| 02E3E7E3 | 400002DC | 40400008 | 40400001 | 80000A4C | 00000858 | 40404040 |
| 40404040 | 40404040 | 40404040 | 40404040 | 40404040 | 40404040 | 40404040 |
| 40404040 | 40404040 | 40404040 | 40404040 | C6C2E4C9 | F0F1F4F8* | |
| 02E3E7E3 | 400002E8 | 40400008 | 40400001 | 800001C0 | 00000874 | 40404040 |
| 40404040 | 40404040 | 40404040 | 40404040 | 40404040 | 40404040 | 40404040 |
| 40404040 | 40404040 | 40404040 | 40404040 | C6C2E4C9 | F0F1F4F9* | |
| 02E3E7E3 | 400002F4 | 4040000C | 40400001 | 80000A6A | 00000E58 | 800008D8 |
| 40404040 | 40404040 | 40404040 | 40404040 | 40404040 | 40404040 | 40404040 |
| 40404040 | 40404040 | 40404040 | 40404040 | C6C2E4C9 | F0F1F5F0** | |
| 02D9D3C4 | 40404040 | 40400038 | 40404040 | 00010001 | 0C0002D8 | 00010001 |
| 0C0002DC | 00010001 | 0C0002E0 | 00010001 | 0C0002E8 | 00010001 | 0C0002EC |
| 00010001 | 0C0002F4 | 00010001 | 0C0002F8 | C6C2E4C9 | F0F1F5F1* | |
| 02E3E7E3 | 40000300 | 4040001C | 40400001 | 00000FD0 | 00000964 | 00000844 |
| 000009CC | 000008E4 | 000008E0 | 00000E58 | 40404040 | 40404040 | 40404040 |
| 40404040 | 40404040 | 40404040 | 40404040 | C6C2E4C9 | F0F1F5F2* | |
| 02D9D3C4 | 40404040 | 40400038 | 40404040 | 00010001 | 0C0002FC | 00010001 |
| 0C000300 | 00010001 | 0C000304 | 00010001 | 0C000308 | 00010001 | 0C00030C |
| 00010001 | 0C000310 | 00010001 | 0C000314 | C6C2E4C9 | F0F1F5F3* | |
| 02E3E7E3 | 4000031C | 4040001C | 40400001 | 00000844 | 00000844 | 00000844 |
| 00000844 | 00000850 | 00000858 | 00000844 | 40404040 | 40404040 | 40404040 |
| 40404040 | 40404040 | 40404040 | 40404040 | C6C2E4C9 | F0F1F5F4* | |
| 02D9D3C4 | 40404040 | 40400038 | 40404040 | 00010001 | 0C000318 | 00010001 |
| 0C00031C | 00010001 | 0C000320 | 00010001 | 0C000324 | 00010001 | 0C000328 |

MEMBER NAME FBUILD

| | | | | | | |
|---|---|---|---|---|---|---|
| 00010001 | 0C00032C | 00010001 | 0C000330 | C6C2E4C9 | F0F1F5F5* | |
| 02E3E7E3 | 40000338 | 4040001C | 40400001 | 00000844 | 000008E4 | 000008F0 |
| 80000844 | 00000FD0 | 00000954 | 00000844 | 40404040 | 40404040 | 40404040 |
| 40404040 | 40404040 | 40404040 | 40404040 | C6C2E4C9 | F0F1F5F6* | |
| 02D9D3C4 | 40404040 | 40400038 | 40404040 | 00010001 | 0C000334 | 00010001 |
| 0C000338 | 00010001 | 0C00033C | 00010001 | 0C000340 | 00010001 | 0C000344 |
| 00010001 | 0C000348 | 00010001 | 0C00034C | C6C2E4C9 | F0F1F5F7* | |
| 02E3E7E3 | 40000354 | 4040001C | 40400001 | 000008CC | 000008E4 | 000008E0 |
| 00000DD8 | 00000844 | 00000844 | 00000844 | 40404040 | 40404040 | 40404040 |
| 40404040 | 40404040 | 40404040 | 40404040 | C6C2E4C9 | F0F1F5F8* | |
| 02D9D3C4 | 40404040 | 40400038 | 40404040 | 00010001 | 0C000350 | 00010001 |
| 0C000354 | 00010001 | 0C000358 | 00010001 | 0C00035C | 00010001 | 0C000360 |
| 00010001 | 0C000364 | 00010001 | 0C000368 | C6C2E4C9 | F0F1F5F9* | |
| 02E3E7E3 | 40000370 | 4040001C | 40400001 | 00000844 | 00000850 | 00000858 |
| 00000844 | 00000844 | 000008E4 | 000008F0 | 40404040 | 40404040 | 40404040 |
| 40404040 | 40404040 | 40404040 | 40404040 | C6C2E4C9 | F0F1F6F0** | |
| 02D9D3C4 | 40404040 | 40400038 | 40404040 | 00010001 | 0C00036C | 00010001 |
| 0C000370 | 00010001 | 0C000374 | 00010001 | 0C000378 | 00010001 | 0C00037C |
| 00010001 | 0C000380 | 00010001 | 0C000384 | C6C2E4C9 | F0F1F6F1* | |
| 02E3E7E3 | 4000038C | 4040001C | 40400001 | 80000844 | 00000AAB | 00000850 |
| 000008D0 | 800001B8 | 00000A52 | 00000850 | 40404040 | 40404040 | 40404040 |
| 40404040 | 40404040 | 40404040 | 40404040 | C6C2E4C9 | F0F1F6F2* | |
| 02D9D3C4 | 40404040 | 40400038 | 40404040 | 00010001 | 0C000388 | 00010001 |
| 0C00038C | 00010001 | 0C000390 | 00010001 | 0C000394 | 00010001 | 0C000398 |
| 00010001 | 0C00039C | 00010001 | 0C0003A0 | C6C2E4C9 | F0F1F6F3* | |
| 02E3E7E3 | 400003A8 | 40400008 | 40400001 | 00000898 | 800001B0 | 40404040 |
| 40404040 | 40404040 | 40404040 | 40404040 | 40404040 | 40404040 | 40404040 |

```
40404040  40404040  40404040  40404040  C6C2E4C9  F0F1F6F4*
02E3E7E3  400003B4  40400014  40400001  00000B54  800009C4  0000085C
000009EC  000009E8  40404040  40404040  40404040  40404040  40404040
40404040  40404040  40404040  40404040  C6C2E4C9  F0F1F6F5*
02D9D3C4  40404040  40400038  40404040  00010001  0C0003A4  00010001
0C0003A8  00010001  0C0003AC  00010001  0C0003B4  00010001  0C0003B8
00010001  0C0003BC  00010001  0C0003C0  C6C2E4C9  F0F1F6F6*
02E3E7E3  400003C8  40400014  40400001  000009C8  000009F0  00000A28
00000A50  80000B2F  40404040  40404040  40404040  40404040  40404040
40404040  40404040  40404040  40404040  C6C2E4C9  F0F1F6F7*
02E3E7E3  400003E0  40400008  40400001  00000850  0000088C  40404040
40404040  40404040  40404040  40404040  40404040  40404040  40404040
40404040  40404040  40404040  40404040  C6C2E4C9  F0F1F6F8*
02D9D3C4  40404040  40400038  40404040  00010001  0C0003C4  00010001
0C0003C8  00010001  0C0003CC  00010001  0C0003D0  00010001  0C0003D4
00010001  0C0003D8  00010001  0C0003E0  C6C2E4C9  F0F1F6F9*
02E3E7E3  400003E8  40400008  40400001  800001A8  00000888  40404040
40404040  40404040  40404040  40404040  40404040  40404040  40404040
40404040  40404040  40404040  40404040  C6C2E4C9  F0F1F7F0**
02E3E7E3  400003F4  40400008  40400001  80000198  00000888  40404040
40404040  40404040  40404040  40404040  40404040  40404040  40404040
40404040  40404040  40404040  40404040  C6C2E4C9  F0F1F7F1*
02E3E7E3  40000400  40400008  40400001  80000188  00000888  40404040
40404040  40404040  40404040  40404040  40404040  40404040  40404040
40404040  40404040  40404040  40404040  C6C2E4C9  F0F1F7F2*
02E3E7E3  4000040C  40400004  40400001  80000178  40404040  40404040
40404040  40404040  40404040  40404040  40404040  40404040  40404040
40404040  40404040  40404040  40404040  C6C2E4C9  F0F1F7F3*
02D9D3C4  40404040  40400038  40404040  00010001  0C0003E4  00010001
0C0003E8  00010001  0C0003EC  00010001  0C0003F4  00010001  0C0003F8
00010001  0C000400  00010001  0C000404  C6C2E4C9  F0F1F7F4*

MEMBER NAME  FBUILD
02E3E7E3  40000410  40400004  40400001  00000888  40404040  40404040
40404040  40404040  40404040  40404040  40404040  40404040  40404040
40404040  40404040  40404040  40404040  C6C2E4C9  F0F1F7F5*
02E3E7E3  40000418  4040000C  40400001  80000168  00000AAB  800008D0
40404040  40404040  40404040  40404040  40404040  40404040  40404040
40404040  40404040  40404040  40404040  C6C2E4C9  F0F1F7F6*
02E3E7E3  4000042C  4040000C  40400001  00000844  000009CC  000008E4
40404040  40404040  40404040  40404040  40404040  40404040  40404040
40404040  40404040  40404040  40404040  C6C2E4C9  F0F1F7F7*
02D9D3C4  40404040  40400038  40404040  00010001  0C00040C  00010001
0C000410  00010001  0C000418  00010001  0C00041C  00010001  0C000420
00010001  0C00042C  00010001  0C000430  C6C2E4C9  F0F1F7F8*
02E3E7E3  40000438  4040001C  40400001  000008E0  00000AAB  00000844
00000844  00000844  00000844  00000850  40404040  40404040  40404040
40404040  40404040  40404040  40404040  C6C2E4C9  F0F1F7F9*
02D9D3C4  40404040  40400038  40404040  00010001  0C000434  00010001
0C000438  00010001  0C00043C  00010001  0C000440  00010001  0C000444
00010001  0C000448  00010001  0C00044C  C6C2E4C9  F0F1F8F0**
02E3E7E3  40000454  4040001C  40400001  00000858  00000844  00000844
000008E4  000008F0  80000844  00000A14  40404040  40404040  40404040
40404040  40404040  40404040  40404040  C6C2E4C9  F0F1F8F1*
02D9D3C4  40404040  40400038  40404040  00010001  0C000450  00010001
0C000454  00010001  0C000458  00010001  0C00045C  00010001  0C000460
00010001  0C000464  00010001  0C000468  C6C2E4C9  F0F1F8F2*
02E3E7E3  40000470  4040001C  40400001  00000A18  00000A48  80000A18
00000AAB  00000850  000008D0  80000160  40404040  40404040  40404040
40404040  40404040  40404040  40404040  C6C2E4C9  F0F1F8F3*
02D9D3C4  40404040  40400038  40404040  00010001  0C00046C  00010001
```

| | | | | | | |
|---|---|---|---|---|---|---|
| 0C000470 | 00010001 | 0C000474 | 00010001 | 0C000478 | 00010001 | 0C00047C |
| 00010001 | 0C000480 | 00010001 | 0C000484 | C6C2E4C9 | F0F1F8F4* | |
| 02E3E7E3 | 4000048C | 40400014 | 40400001 | 00000A52 | 00000850 | 00000898 |
| 80000158 | 00000898 | 40404040 | 40404040 | 40404040 | 40404040 | 40404040 |
| 40404040 | 40404040 | 40404040 | 40404040 | C6C2E4C9 | F0F1F8F5* | |
| 02E3E7E3 | 400004A4 | 4040000C | 40400001 | 80000000 | 000009A0 | 800009A4 |
| 40404040 | 40404040 | 40404040 | 40404040 | 40404040 | 40404040 | 40404040 |
| 40404040 | 40404040 | 40404040 | 40404040 | C6C2E4C9 | F0F1F8F6* | |
| 02D9D3C4 | 40404040 | 40400038 | 40404040 | 00010001 | 0C000488 | 00010001 |
| 0C00048C | 00010001 | 0C000490 | 00010001 | 0C000494 | 00010001 | 0C000498 |
| 00010001 | 0C00049C | 00010001 | 0C0004A8 | C6C2E4C9 | F0F1F8F7* | |
| 02E3E7E3 | 400004B0 | 4040001C | 40400001 | 00000A6A | 00000850 | 000008A8 |
| 80000150 | 00000A6A | 800008A8 | 00000FF4 | 40404040 | 40404040 | 40404040 |
| 40404040 | 40404040 | 40404040 | 40404040 | C6C2E4C9 | F0F1F8F8* | |
| 02D9D3C4 | 40404040 | 40400038 | 40404040 | 00010001 | 0C0004AC | 00010001 |
| 0C0004B0 | 00010001 | 0C0004B4 | 00010001 | 0C0004B8 | 00010001 | 0C0004BC |
| 00010001 | 0C0004C0 | 00010001 | 0C0004C4 | C6C2E4C9 | F0F1F8F9* | |
| 02E3E7E3 | 400004CC | 4040001C | 40400001 | 00000FF8 | 00000844 | 000009CC |
| 000008E4 | 000008E0 | 00000A6A | 00000844 | 40404040 | 40404040 | 40404040 |
| 40404040 | 40404040 | 40404040 | 40404040 | C6C2E4C9 | F0F1F9F0** | |
| 02D9D3C4 | 40404040 | 40400038 | 40404040 | 00010001 | 0C0004C8 | 00010001 |
| 0C0004CC | 00010001 | 0C0004D0 | 00010001 | 0C0004D4 | 00010001 | 0C0004D8 |
| 00010001 | 0C0004DC | 00010001 | 0C0004E0 | C6C2E4C9 | F0F1F9F1* | |
| 02E3E7E3 | 400004E8 | 4040001C | 40400001 | 00000844 | 00000844 | 00000844 |
| 00000850 | 00000858 | 00000844 | 00000844 | 40404040 | 40404040 | 40404040 |
| 40404040 | 40404040 | 40404040 | 40404040 | C6C2E4C9 | F0F1F9F2* | |
| 02D9D3C4 | 40404040 | 40400038 | 40404040 | 00010001 | 0C0004E4 | 00010001 |
| 0C0004E8 | 00010001 | 0C0004EC | 00010001 | 0C0004F0 | 00010001 | 0C0004F4 |
| 00010001 | 0C0004F8 | 00010001 | 0C0004FC | C6C2E4C9 | F0F1F9F3* | |
| 02E3E7E3 | 40000504 | 4040001C | 40400001 | 000008E4 | 000008F0 | 80000844 |

MEMBER NAME FBUILD

| | | | | | | |
|---|---|---|---|---|---|---|
| 00000A6A | 00000850 | 000008A8 | 80000148 | 40404040 | 40404040 | 40404040 |
| 40404040 | 40404040 | 40404040 | 40404040 | C6C2E4C9 | F0F1F9F4* | |
| 02D9D3C4 | 40404040 | 40400038 | 40404040 | 00010001 | 0C000500 | 00010001 |
| 0C000504 | 00010001 | 0C000508 | 00010001 | 0C00050C | 00010001 | 0C000510 |
| 00010001 | 0C000514 | 00010001 | 0C000518 | C6C2E4C9 | F0F1F9F5* | |
| 02E3E7E3 | 40000520 | 4040001C | 40400001 | 00000A6A | 8000089C | 00000FF4 |
| 00000FF8 | 00000844 | 000009CC | 000008E4 | 40404040 | 40404040 | 40404040 |
| 40404040 | 40404040 | 40404040 | 40404040 | C6C2E4C9 | F0F1F9F6* | |
| 02D9D3C4 | 40404040 | 40400038 | 40404040 | 00010001 | 0C00051C | 00010001 |
| 0C000520 | 00010001 | 0C000524 | 00010001 | 0C000528 | 00010001 | 0C00052C |
| 00010001 | 0C000530 | 00010001 | 0C000534 | C6C2E4C9 | F0F1F9F7* | |
| 02E3E7E3 | 4000053C | 4040001C | 40400001 | 000008E0 | 00000A6A | 00000844 |
| 00000844 | 00000844 | 00000844 | 00000850 | 40404040 | 40404040 | 40404040 |
| 40404040 | 40404040 | 40404040 | 40404040 | C6C2E4C9 | F0F1F9F8* | |
| 02D9D3C4 | 40404040 | 40400038 | 40404040 | 00010001 | 0C000538 | 00010001 |
| 0C00053C | 00010001 | 0C000540 | 00010001 | 0C000544 | 00010001 | 0C000548 |
| 00010001 | 0C00054C | 00010001 | 0C000550 | C6C2E4C9 | F0F1F9F9* | |
| 02E3E7E3 | 40000558 | 4040001C | 40400001 | 00000858 | 00000844 | 00000844 |
| 000008E4 | 000008F0 | 80000844 | 00000A14 | 40404040 | 40404040 | 40404040 |
| 40404040 | 40404040 | 40404040 | 40404040 | C6C2E4C9 | F0F2F0F0** | |
| 02D9D3C4 | 40404040 | 40400038 | 40404040 | 00010001 | 0C000554 | 00010001 |
| 0C000558 | 00010001 | 0C00055C | 00010001 | 0C000560 | 00010001 | 0C000564 |
| 00010001 | 0C000568 | 00010001 | 0C00056C | C6C2E4C9 | F0F2F0F1* | |
| 02E3E7E3 | 40000574 | 4040001C | 40400001 | 0000095C | 00000A48 | 8000095C |
| 00000A14 | 00000958 | 00000A48 | 80000958 | 40404040 | 40404040 | 40404040 |
| 40404040 | 40404040 | 40404040 | 40404040 | C6C2E4C9 | F0F2F0F2* | |
| 02D9D3C4 | 40404040 | 40400038 | 40404040 | 00010001 | 0C000570 | 00010001 |
| 0C000574 | 00010001 | 0C000578 | 00010001 | 0C00057C | 00010001 | 0C000580 |
| 00010001 | 0C000584 | 00010001 | 0C000588 | C6C2E4C9 | F0F2F0F3* | |

| | | | | | | |
|---|---|---|---|---|---|---|
| 02E3E7E3 | 40000590 | 4040001C | 40400001 | 00000A14 | 00000950 | 00000A48 |
| 80000950 | 00000A14 | 0000094C | 00000A48 | 40404040 | 40404040 | 40404040 |
| 40404040 | 40404040 | 40404040 | 40404040 | C6C2E4C9 | F0F2F0F4* | |
| 02D9D3C4 | 40404040 | 40400038 | 40404040 | 00010001 | 0C00058C | 00010001 |
| 0C000590 | 00010001 | 0C000594 | 00010001 | 0C000598 | 00010001 | 0C00059C |
| 00010001 | 0C0005A0 | 00010001 | 0C0005A4 | C6C2E4C9 | F0F2F0F5* | |
| 02E3E7E3 | 400005AC | 4040001C | 40400001 | 8000094C | 00000A14 | 000009E4 |
| 00000A14 | 800009E0 | 00000A48 | 000009E4 | 40404040 | 40404040 | 40404040 |
| 40404040 | 40404040 | 40404040 | 40404040 | C6C2E4C9 | F0F2F0F6* | |
| 02D9D3C4 | 40404040 | 40400038 | 40404040 | 00010001 | 0C0005A8 | 00010001 |
| 0C0005AC | 00010001 | 0C0005B0 | 00010001 | 0C0005B4 | 00010001 | 0C0005B8 |
| 00010001 | 0C0005BC | 00010001 | 0C0005C0 | C6C2E4C9 | F0F2F0F7* | |
| 02E3E7E3 | 400005C8 | 4040001C | 40400001 | 00000A48 | 800009E0 | 00000FF4 |
| 000009E4 | 00000FF4 | 800009E0 | 00000FF4 | 40404040 | 40404040 | 40404040 |
| 40404040 | 40404040 | 40404040 | 40404040 | C6C2E4C9 | F0F2F0F8* | |
| 02D9D3C4 | 40404040 | 40400038 | 40404040 | 00010001 | 0C0005C4 | 00010001 |
| 0C0005C8 | 00010001 | 0C0005CC | 00010001 | 0C0005D0 | 00010001 | 0C0005D4 |
| 00010001 | 0C0005D8 | 00010001 | 0C0005DC | C6C2E4C9 | F0F2F0F9* | |
| 02E3E7E3 | 400005E4 | 4040001C | 40400001 | 000009E4 | 00000FF4 | 800009E0 |
| 00000FF4 | 000009E4 | 00000FF4 | 800009E0 | 40404040 | 40404040 | 40404040 |
| 40404040 | 40404040 | 40404040 | 40404040 | C6C2E4C9 | F0F2F1F0** | |
| 02D9D3C4 | 40404040 | 40400038 | 40404040 | 00010001 | 0C0005E0 | 00010001 |
| 0C0005E4 | 00010001 | 0C0005E8 | 00010001 | 0C0005EC | 00010001 | 0C0005F0 |
| 00010001 | 0C0005F4 | 00010001 | 0C0005F8 | C6C2E4C9 | F0F2F1F1* | |
| 02E3E7E3 | 40000600 | 4040001C | 40400001 | 00000FF4 | 000009E4 | 00000FF4 |
| 800009E0 | 00000FD8 | 000009E4 | 00000FD8 | 40404040 | 40404040 | 40404040 |
| 40404040 | 40404040 | 40404040 | 40404040 | C6C2E4C9 | F0F2F1F2* | |
| 02D9D3C4 | 40404040 | 40400038 | 40404040 | 00010001 | 0C0005FC | 00010001 |
| 0C000600 | 00010001 | 0C000604 | 00010001 | 0C000608 | 00010001 | 0C00060C |

MEMBER NAME FBUILD

| | | | | | | |
|---|---|---|---|---|---|---|
| 00010001 | 0C000610 | 00010001 | 0C000614 | C6C2E4C9 | F0F2F1F3* | |
| 02E3E7E3 | 4000061C | 4040001C | 40400001 | 800009E0 | 000008F4 | 000009E4 |
| 000008F4 | 800009E0 | 00000960 | 000009E4 | 40404040 | 40404040 | 40404040 |
| 40404040 | 40404040 | 40404040 | 40404040 | C6C2E4C9 | F0F2F1F4* | |
| 02D9D3C4 | 40404040 | 40400038 | 40404040 | 00010001 | 0C000618 | 00010001 |
| 0C00061C | 00010001 | 0C000620 | 00010001 | 0C000624 | 00010001 | 0C000628 |
| 00010001 | 0C00062C | 00010001 | 0C000630 | C6C2E4C9 | F0F2F1F5* | |
| 02E3E7E3 | 40000638 | 4040001C | 40400001 | 00000960 | 800009E0 | 00000FF4 |
| 000009E4 | 00000FF4 | 800009E0 | 00000904 | 40404040 | 40404040 | 40404040 |
| 40404040 | 40404040 | 40404040 | 40404040 | C6C2E4C9 | F0F2F1F6* | |
| 02D9D3C4 | 40404040 | 40400038 | 40404040 | 00010001 | 0C000634 | 00010001 |
| 0C000638 | 00010001 | 0C00063C | 00010001 | 0C000640 | 00010001 | 0C000644 |
| 00010001 | 0C000648 | 00010001 | 0C00064C | C6C2E4C9 | F0F2F1F7* | |
| 02E3E7E3 | 40000654 | 4040001C | 40400001 | 000009E4 | 00000904 | 800009E0 |
| 00000918 | 000009E4 | 00000918 | 800009E0 | 40404040 | 40404040 | 40404040 |
| 40404040 | 40404040 | 40404040 | 40404040 | C6C2E4C9 | F0F2F1F8* | |
| 02D9D3C4 | 40404040 | 40400038 | 40404040 | 00010001 | 0C000650 | 00010001 |
| 0C000654 | 00010001 | 0C000658 | 00010001 | 0C00065C | 00010001 | 0C000660 |
| 00010001 | 0C000664 | 00010001 | 0C000668 | C6C2E4C9 | F0F2F1F9* | |
| 02E3E7E3 | 40000670 | 4040001C | 40400001 | 00000930 | 000009E4 | 00000930 |
| 800009E0 | 00000FF4 | 000009E0 | 00000FF4 | 40404040 | 40404040 | 40404040 |
| 40404040 | 40404040 | 40404040 | 40404040 | C6C2E4C9 | F0F2F2F0** | |
| 02D9D3C4 | 40404040 | 40400038 | 40404040 | 00010001 | 0C00066C | 00010001 |
| 0C000670 | 00010001 | 0C000674 | 00010001 | 0C000678 | 00010001 | 0C00067C |
| 00010001 | 0C000680 | 00010001 | 0C000684 | C6C2E4C9 | F0F2F2F1* | |
| 02E3E7E3 | 4000068C | 4040001C | 40400001 | 80000FF8 | 00000FF4 | 000009E4 |
| 00000FF4 | 80000FF8 | 00000904 | 000009E4 | 40404040 | 40404040 | 40404040 |
| 40404040 | 40404040 | 40404040 | 40404040 | C6C2E4C9 | F0F2F2F2* | |
| 02D9D3C4 | 40404040 | 40400038 | 40404040 | 00010001 | 0C000688 | 00010001 |
| 0C00068C | 00010001 | 0C000690 | 00010001 | 0C000694 | 00010001 | 0C000698 |

```
00010001  0C00069C  00010001  0C0006A0  C6C2E4C9  F0F2F2F3*
02E3E7E3  400006A8  4040001C  40400001  00000904  80000FF4  00000918
000009E4  00000918  80000FF4  00000930  40404040  40404040  40404040
40404040  40404040  40404040  40404040  C6C2E4C9  F0F2F2F4*
02D9D3C4  40404040  40400038  40404040  00010001  0C0006A4  00010001
0C0006A8  00010001  0C0006AC  00010001  0C0006B0  00010001  0C0006B4
00010001  0C0006B8  00010001  0C0006BC  C6C2E4C9  F0F2F2F5*
02E3E7E3  400006C4  4040001C  40400001  000009E4  00000930  80000FF4
00000FF4  00000FF8  000008F4  80000FF8  40404040  40404040  40404040
40404040  40404040  40404040  40404040  C6C2E4C9  F0F2F2F6*
02D9D3C4  40404040  40400038  40404040  00010001  0C0006C0  00010001
0C0006C4  00010001  0C0006C8  00010001  0C0006CC  00010001  0C0006D0
00010001  0C0006D4  00010001  0C0006D8  C6C2E4C9  F0F2F2F7*
02E3E7E3  400006E0  4040001C  40400001  00000FF4  00000FFC  000008F4
80000FFC  00000904  00000FF8  00000930  40404040  40404040  40404040
40404040  40404040  40404040  40404040  C6C2E4C9  F0F2F2F8*
02D9D3C4  40404040  40400038  40404040  00010001  0C0006DC  00010001
0C0006E0  00010001  0C0006E4  00010001  0C0006E8  00010001  0C0006EC
00010001  0C0006F0  00010001  0C0006F4  C6C2E4C9  F0F2F2F9*
02E3E7E3  400006FC  4040001C  40400001  80000FF8  000008F4  00000FF8
000008F4  80000FFC  00000FD8  00000FF8  40404040  40404040  40404040
40404040  40404040  40404040  40404040  C6C2E4C9  F0F2F3F0**
02D9D3C4  40404040  40400038  40404040  00010001  0C0006F8  00010001
0C0006FC  00010001  0C000700  00010001  0C000704  00010001  0C000708
00010001  0C00070C  00010001  0C000710  C6C2E4C9  F0F2F3F1*
02E3E7E3  40000718  4040001C  40400001  00000FDC  80000FFC  00000FE0
00000A18  0000090C  80000A18  00000FE0  40404040  40404040  40404040
40404040  40404040  40404040  40404040  C6C2E4C9  F0F2F3F2*

MEMBER NAME  FBUILD
02D9D3C4  40404040  40400038  40404040  00010001  0C000714  00010001
0C000718  00010001  0C00071C  00010001  0C000720  00010001  0C000724
00010001  0C000728  00010001  0C00072C  C6C2E4C9  F0F2F3F3*
02E3E7E3  40000734  40400010  40400001  00000A18  0000090C  80000A18
00000FE4  40404040  40404040  40404040  40404040  40404040  40404040
40404040  40404040  40404040  40404040  C6C2E4C9  F0F2F3F4*
02E3E7E3  40000748  4040000C  40400001  00000844  000008A0  000008E4
40404040  40404040  40404040  40404040  40404040  40404040  40404040
40404040  40404040  40404040  40404040  C6C2E4C9  F0F2F3F5*
02D9D3C4  40404040  40400038  40404040  00010001  0C000730  00010001
0C000734  00010001  0C000738  00010001  0C00073C  00010001  0C000740
00010001  0C000748  00010001  0C00074C  C6C2E4C9  F0F2F3F6*
02E3E7E3  40000754  4040001C  40400001  000008E0  00000120  00000844
00000844  00000844  00000844  00000850  40404040  40404040  40404040
40404040  40404040  40404040  40404040  C6C2E4C9  F0F2F3F7*
02D9D3C4  40404040  40400038  40404040  00010001  0C000750  00010001
0C000754  00010001  0C000758  00010001  0C00075C  00010001  0C000760
00010001  0C000764  00010001  0C000768  C6C2E4C9  F0F2F3F8*
02E3E7E3  40000770  4040001C  40400001  00000858  00000844  00000844
000008E4  000008F0  80000844  00000F4C  40404040  40404040  40404040
40404040  40404040  40404040  40404040  C6C2E4C9  F0F2F3F9*
02D9D3C4  40404040  40400038  40404040  00010001  0C00076C  00010001
0C000770  00010001  0C000774  00010001  0C000778  00010001  0C00077C
00010001  0C000780  00010001  0C000784  C6C2E4C9  F0F2F4F0**
02E3E7E3  4000078C  40400010  40400001  00000A18  0000090C  80000A18
00000F50  40404040  40404040  40404040  40404040  40404040  40404040
40404040  40404040  40404040  40404040  C6C2E4C9  F0F2F4F1*
02E3E7E3  400007A0  4040000C  40400001  00000844  000008A0  000008E4
40404040  40404040  40404040  40404040  40404040  40404040  40404040
40404040  40404040  40404040  40404040  C6C2E4C9  F0F2F4F2*
02D9D3C4  40404040  40400038  40404040  00010001  0C000788  00010001
```

```
0C00078C  00010001  0C000790  00010001  0C000794  00010001  0C000798
00010001  0C0007A0  00010001  0C0007A4  C6C2E4C9  F0F2F4F3*
02E3E7E3  400007AC  4040001C  40400001  000008E0  00000A6A  00000844
00000844  00000844  00000844  00000850  40404040  40404040  40404040
40404040  40404040  40404040  40404040  C6C2E4C9  F0F2F4F4*
02D9D3C4  40404040  40400038  40404040  00010001  0C0007A8  00010001
0C0007AC  00010001  0C0007B0  00010001  0C0007B4  00010001  0C0007B8
00010001  0C0007BC  00010001  0C0007C0  C6C2E4C9  F0F2F4F5*
02E3E7E3  400007C8  4040001C  40400001  00000858  00000844  00000844
000008E4  000008F0  80000844  00000FE8  40404040  40404040  40404040
40404040  40404040  40404040  40404040  C6C2E4C9  F0F2F4F6*
02D9D3C4  40404040  40400038  40404040  00010001  0C0007C4  00010001
0C0007C8  00010001  0C0007CC  00010001  0C0007D0  00010001  0C0007D4
00010001  0C0007D8  00010001  0C0007DC  C6C2E4C9  F0F2F4F7*
02E3E7E3  400007E4  4040001C  40400001  000009E4  00000FE8  800009E0
00000FF4  000009E4  00000FF4  800009E0  40404040  40404040  40404040
40404040  40404040  40404040  40404040  C6C2E4C9  F0F2F4F8*
02D9D3C4  40404040  40400038  40404040  00010001  0C0007E0  00010001
0C0007E4  00010001  0C0007E8  00010001  0C0007EC  00010001  0C0007F0
00010001  0C0007F4  00010001  0C0007F8  C6C2E4C9  F0F2F4F9*
02E3E7E3  40000800  4040001C  40400001  00000FF4  000009E4  00000FF4
800009E0  0000090C  000009E4  0000090C  40404040  40404040  40404040
40404040  40404040  40404040  40404040  C6C2E4C9  F0F2F5F0**
02D9D3C4  40404040  40400038  40404040  00010001  0C0007FC  00010001
0C000800  00010001  0C000804  00010001  0C000808  00010001  0C00080C
00010001  0C000810  00010001  0C000814  C6C2E4C9  F0F2F5F1*
02E3E7E3  4000081C  40400004  40400001  800009E0  40404040  40404040

MEMBER NAME  FBUILD
40404040  40404040  40404040  40404040  40404040  40404040  40404040
40404040  40404040  40404040  40404040  C6C2E4C9  F0F2F5F2*
02E3E7E3  40000F44  40400038  40400001  00000000  00000000  00000000
00000000  00000000  00000000  00000000  00000038  0000002C  00000040
0000003C  00000020  00000024  00000030  C6C2E4C9  F0F2F5F3*
02E3E7E3  40000F7C  40400038  40400001  00000034  00000000  00000000
00000000  00000000  00000000  0000007C  05D4007E  05DC007E  05E8007F
05EC007F  0000007F  0838007F  05F40080  C6C2E4C9  F0F2F5F4*
02E3E7E3  40000FB4  40400038  40400001  05F80080  06540080  0B900081
089C0081  06640081  00000000  00000083  00000083  00000000  00000083
06380083  00000000  00000083  00000000  C6C2E4C9  F0F2F5F5*
02E3E7E3  40000FEC  40400018  40400001  00000060  413CD331  06440083
00000000  00000084  00000084  40404040  40404040  40404040  40404040
40404040  40404040  40404040  40404040  C6C2E4C9  F0F2F5F6*
02D9D3C4  40404040  40400010  40404040  00010001  0C000818  00010001
0C00081C  40404040  40404040  40404040  40404040  40404040  40404040
40404040  40404040  40404040  40404040  C6C2E4C9  F0F2F5F7*
02C5D5C4  40404040  40404040  40404040  40404040  40404040  40404040
0000218A  F1F5F7F3  F460C6D6  F34040F0  F2F0F2F8  F7F0F9F8  40F0F84B
F1F54BF0  F9404040  C6C2E4C9  D3C44040  C6C2E4C9  F0F2F5F8**

MEMBER NAME  FCHART
02C5E2C4  40404040  40400010  40400001  C6C3C8C1  D9E34040  00000000
40000000  40404040  40404040  40404040  40404040  40404040  40404040
40404040  40404040  40404040  40404040  C6C3C8C1  F0F0F0F1*
02E3E7E3  40000000  40400038  40400001  47F0F00C  07C6C3C8  C1D9E340
90ECD00C  184D98CD  F0205040  D00450D0  400807FC  40404040  40404040
021A15C9  D5C6D6D9  D4C1E3C9  D6D540C6  C6C3C8C1  F0F0F0F2*
02E3E7E3  40000038  40400038  40400001  D6D940C4  C1E2C840  1005180A
2202061E  14012202  1A2F4040  C5D9D9D6  D940C9D5  40C140C3  C1C4C1D4
40D9D6E4  E3C9D5C5  40C9D540  C6C3C8C1  C6C3C8C1  F0F0F0F3*
02E3E7E3  40000070  4040002E  40400001  D9E340E2  E4C2D9D6  E4E3C9D5
```

```
C522021A  0ED9C5C6  C9D3C540  C5D9D9D6  D97E4010  031A0A40  C9D540C6
C3C8C1D9  E3224040  40404040  40404040  C6C3C8C1  F0F0F0F4*
02E3E7E3  400000A0  40400020  40400001  D4D6C4C5  D3E240C6  D3C1C7C7
C5C440C6  D6D940E2  D3C9C340  D9E4D540  40404040  40404040  40404040
40404040  40404040  40404040  40404040  C6C3C8C1  F0F0F0F5*
02E3E7E3  40000378  40400038  40400001  00000000  00000000  4F080000
00000000  00000000  00000000  00000001  00000001  00000002  00000003
00000004  00000005  00000008  00000009  C6C3C8C1  F0F0F0F6*
02E3E7E3  400003B0  40400038  40400001  00000014  00000016  0000001B
0000001E  00000049  0000005D  00000070  00000080  00000098  00000BB8
401DF3B6  4029FBE7  4029FFD6  403D70A4  C6C3C8C1  F0F0F0F7*
02E3E7E3  400003E8  40400038  40400001  403EF9DB  40400000  40A41893
41100000  4110A7F0  41200000  4133D70A  413B70A4  4145BE77  414F70A4
4159999A  4165999A  41C00000  41CCCCCD  C6C3C8C1  F0F0F0F8*
02E3E7E3  40000420  4040000C  40400001  41F00000  00000000  00000000
40404040  40404040  40404040  40404040  40404040  40404040  40404040
40404040  40404040  40404040  40404040  C6C3C8C1  F0F0F0F9*
02C5E2C4  40404040  40400010  40400002  D9D4D6C4  C5D34040  05000000
40000018  40404040  40404040  40404040  40404040  40404040  40404040
40404040  40404040  40404040  40404040  C6C3C8C1  F0F0F1F0**
02C5E2C4  40404040  40400010  40400003  C6D4D6C4  C5D34040  05000000
400001F8  40404040  40404040  40404040  40404040  40404040  40404040
40404040  40404040  40404040  40404040  C6C3C8C1  F0F0F1F1*
02C5E2C4  40404040  40400010  40400004  C7D9E4D7  40404040  05000000
4000000C  40404040  40404040  40404040  40404040  40404040  40404040
40404040  40404040  40404040  40404040  C6C3C8C1  F0F0F1F2*
02C5E2C4  40404040  40400010  40400005  D6D7E3C9  D6D54040  05000000
40000020  40404040  40404040  40404040  40404040  40404040  40404040
40404040  40404040  40404040  40404040  C6C3C8C1  F0F0F1F3*
02C5E2C4  40404040  40400010  40400006  D4D6C4C9  D5C34040  05000000
40000024  40404040  40404040  40404040  40404040  40404040  40404040
40404040  40404040  40404040  40404040  C6C3C8C1  F0F0F1F4*
02C5E2C4  40404040  40400010  40400007  D4E2C9E9  C5404040  05000000
4000000C  40404040  40404040  40404040  40404040  40404040  40404040
40404040  40404040  40404040  40404040  C6C3C8C1  F0F0F1F5*
02C5E2C4  40404040  40400010  40400008  C1D9C3D6  E2404040  02000000
40000000  40404040  40404040  40404040  40404040  40404040  40404040
40404040  40404040  40404040  40404040  C6C3C8C1  F0F0F1F6*
02E3E7E3  40001550  40400020  40400001  00001488  FFFFFFFF  FFFFFFEB
00000000  00000000  FFFFFFFF  00000000  00000000  40404040  40404040
40404040  40404040  40404040  40404040  C6C3C8C1  F0F0F1F7*
02D9D3C4  40404040  40400038  40404040  00010001  0C001550  00020001
0C001554  00030001  0C001558  00040001  0C00155C  00050001  0C001560
00060001  0C001564  00070001  0C001568  C6C3C8C1  F0F0F1F8*
02C5E2C4  40404040  40400010  40400009  C3C1C4E2  E3404040  02000000
40000000  40404040  40404040  40404040  40404040  40404040  40404040
40404040  40404040  40404040  40404040  C6C3C8C1  F0F0F1F9*
02C5E2C4  40404040  40400010  4040000A  C4C9E3E3  D6404040  02000000

MEMBER NAME  FCHART
40000000  40404040  40404040  40404040  40404040  40404040  40404040
40404040  40404040  40404040  40404040  C6C3C8C1  F0F0F2F0**
02C5E2C4  40404040  40400010  4040000B  D4E5C3C8  D9404040  02000000
40000000  40404040  40404040  40404040  40404040  40404040  40404040
40404040  40404040  40404040  40404040  C6C3C8C1  F0F0F2F1*
02C5E2C4  40404040  40400010  4040000C  C2C5C7C4  C5E34040  02000000
40000000  40404040  40404040  40404040  40404040  40404040  40404040
40404040  40404040  40404040  40404040  C6C3C8C1  F0F0F2F2*
02E3E7E3  40001570  40400010  40400001  00000000  00000000  00000000
00000000  40404040  40404040  40404040  40404040  40404040  40404040
40404040  40404040  40404040  40404040  C6C3C8C1  F0F0F2F3*
```

```
02C5E2C4 40404040 40400010 4040000D C3C1C4C6 C9D34040 02000000
40000000 40404040 40404040 40404040 40404040 40404040 40404040
40404040 40404040 40404040 40404040 C6C3C8C1 F0F0F2F4*
02C5E2C4 40404040 40400010 4040000E C3C1C4D5 D7C44040 02000000
40000000 40404040 40404040 40404040 40404040 40404040 40404040
40404040 40404040 40404040 40404040 C6C3C8C1 F0F0F2F5*
02C5E2C4 40404040 40400010 4040000F C3C1C4D5 E2C84040 02000000
40000000 40404040 40404040 40404040 40404040 40404040 40404040
40404040 40404040 40404040 40404040 C6C3C8C1 F0F0F2F6*
02E3E7E3 40001584 40400010 40400001 00000000 00000000 00000000
00000000 40404040 40404040 40404040 40404040 40404040 40404040
40404040 40404040 40404040 40404040 C6C3C8C1 F0F0F2F7*
02D9D3C4 40404040 40400038 40404040 00080001 1C00156C 00090001
1C001570 000A0001 1C001574 000B0001 1C001578 000C0001 1C001584
000D0001 1C001588 000E0001 1C00158C C6C3C8C1 F0F0F2F8*
02C5E2C4 40404040 40400010 40400010 C3C1C4E2 D7C34040 02000000
40000000 40404040 40404040 40404040 40404040 40404040 40404040
40404040 40404040 40404040 40404040 C6C3C8C1 F0F0F2F9*
02C5E2C4 40404040 40400010 40400011 C3C1C4E2 E4D74040 02000000
40000000 40404040 40404040 40404040 40404040 40404040 40404040
40404040 40404040 40404040 40404040 C6C3C8C1 F0F0F3F0**
02C5E2C4 40404040 40400010 40400012 C5D5C4C4 C5E34040 02000000
40000000 40404040 40404040 40404040 40404040 40404040 40404040
40404040 40404040 40404040 40404040 C6C3C8C1 F0F0F3F1*
02C5E2C4 40404040 40400010 40400013 C6C2E4C9 D3C44040 02000000
40000000 40404040 40404040 40404040 40404040 40404040 40404040
40404040 40404040 40404040 40404040 C6C3C8C1 F0F0F3F2*
02C5E2C4 40404040 40400010 40400014 C8C7C4C1 E3C54040 02000000
40000000 40404040 40404040 40404040 40404040 40404040 40404040
40404040 40404040 40404040 40404040 C6C3C8C1 F0F0F3F3*
02C5E2C4 40404040 40400010 40400015 C8C7E3C9 D4C54040 02000000
40000000 40404040 40404040 40404040 40404040 40404040 40404040
40404040 40404040 40404040 40404040 C6C3C8C1 F0F0F3F4*
02C5E2C4 40404040 40400010 40400016 C9C2C3D6 D47B4040 02000000
40000000 40404040 40404040 40404040 40404040 40404040 40404040
40404040 40404040 40404040 40404040 C6C3C8C1 F0F0F3F5*
02E3E7E3 40001594 4040001C 40400001 00000000 00000000 00000000
00000000 00000000 00000000 00000000 40404040 40404040 40404040
40404040 40404040 40404040 40404040 C6C3C8C1 F0F0F3F6*
02D9D3C4 40404040 40400038 40404040 000F0001 1C001590 00100001
1C001594 00110001 1C001598 00120001 1C00159C 00130001 1C0015A0
00140001 1C0015A4 00150001 1C0015A8 C6C3C8C1 F0F0F3F7*
02C5E2C4 40404040 40400010 40400017 C9C3D5E3 C5D94040 02000000
40000000 40404040 40404040 40404040 40404040 40404040 40404040
40404040 40404040 40404040 40404040 C6C3C8C1 F0F0F3F8*
02C5E2C4 40404040 40400010 40400018 D4D6C4E2 D9E34040 02000000
40000000 40404040 40404040 40404040 40404040 40404040 40404040

MEMBER NAME  FCHART
40404040 40404040 40404040 40404040 C6C3C8C1 F0F0F3F9*
02E3E7E3 400015B0 40400008 40400001 00000000 00000000 40404040
40404040 40404040 40404040 40404040 40404040 40404040 40404040
40404040 40404040 40404040 40404040 C6C3C8C1 F0F0F4F0**
02E3E7E3 400014B0 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 C6C3C8C1 F0F0F4F1*
02E3E7E3 400014E8 40400038 40400001 C45B5BE2 D3C9C340 E5C5D9E2
C9D6D540 E7E7E7E7 40404040 40404040 4040C4C1 E3C57A40 E7E761E7
E761E7E7 40404040 40E3C9D4 C57A40E7 C6C3C8C1 F0F0F4F2*
02E3E7E3 40001520 40400028 40400001 E77AE7E7 7AE7E740 5B5BC9D5
C6D6D9D4 C1E3C9D6 D540D4D6 C4C5D340 40404040 40404040 40404040
```

```
40404040  40404040  40404040  40404040  C6C3C8C1  F0F0F4F3*
02E3E7E3  400015E8  40400038  40400001  58B0C000  58A0D2D4  5800D2D0
5000D37C  7800D334  33007000  C09058F0  C01C4110  D0A405EF  7D00D33C
7000D3A0  58F0C018  5800F008  5A00D314  C6C3C8C1  F0F0F4F4*
02E3E7E3  40001620  40400038  40400001  5000D3B4  59A0D3D0  47C0C0E4
1BFF58E0  D00007FE  58F0C058  4110D0A8  05EF58F0  C0544110  D0AC05EF
4100B084  5000D0B4  4100D418  5000D0B8  C6C3C8C1  F0F0F4F5*
02E3E7E3  40001658  40400038  40400001  9280D0B8  58F0C028  4110D0B0
05EF4100  B0975000  D0B44100  D4205000  D0B89280  D0B858F0  C0284110
D0B005EF  4100B070  5000D0C0  58F0C028  C6C3C8C1  F0F0F4F6*
02E3E7E3  40001690  40400038  40400001  4110D0BC  05EF50A0  D42850A0
D38858E0  C08C2B00  58F0C02C  780EF000  6A00D2C0  6000D2B8  5830D2BC
50A0D428  182A5800  D2E85000  C068184A  C6C3C8C1  F0F0F4F7*
02E3E7E3  400016C8  40400038  40400001  5850D388  18635870  D2E81892
58A0C08C  58B0D2E8  2B0058F0  C02C780A  F0006A00  D2C06000  D2B85880
D2BC1986  4780C1C2  18395B3B  D420503B  C6C3C8C1  F0F0F4F8*
02E3E7E3  40001700  40400038  40400001  D4241A54  5A70D2E8  5AB0D2E8
5097D420  18681A94  5AA0C078  5990D3D0  47C0C18C  5050D388  58B0C000
58A0D2D4  5830D388  89300003  5820D3D0  C6C3C8C1  F0F0F4F9*
02E3E7E3  40001738  40400038  40400001  5B23D420  1A2A5023  D4245800
D2C858F0  C0145000  F02150A0  D3A87820  D3583322  7020C070  7020C074
7800D348  33007000  C06C5800  D2E85000  C6C3C8C1  F0F0F5F0**
02E3E7E3  40001770  40400038  40400001  C07C58B0  C01458A0  C00C5890
C02C5880  C0005800  B0215A00  D2D45000  B02158F0  C0644110  D0C805EF
58F0C028  4110D0E8  05EF58F0  C0284110  C6C3C8C1  F0F0F5F1*
02E3E7E3  400017A8  40400038  40400001  D0F405EF  58F0C028  4110D100
05EF58F0  C0204110  D10C05EF  58F0C040  4110D118  05EF41E0  000415FE
4720C28A  58EFD04C  07FE58F0  C0484110  C6C3C8C1  F0F0F5F2*
02E3E7E3  400017E0  40400038  40400001  D12005EF  41E00004  15FE4720
C2A458EF  D05407FE  7800D340  7000D39C  5890D2D4  58A0D2F0  58B0C008
410AB001  5000D168  58F0C060  4110D168  C6C3C8C1  F0F0F5F3*
02E3E7E3  40001818  40400038  40400001  05EF5000  D3B8410A  B0015000
D18858F0  C0484110  D17005EF  41E00004  15FE4720  C2F058EF  D05C07FE
7800D39C  7B00D324  7000D39C  5A90D2D4  C6C3C8C1  F0F0F5F4*
02E3E7E3  40001850  40400038  40400001  5AA0D2F0  5990B1A5  47C0C2B8
5890C02C  58A0C00C  58B0C014  7800D360  7000D394  7800D2CC  7000800C
7800C070  70008010  7800D2CC  70008014  C6C3C8C1  F0F0F5F5*
02E3E7E3  40001888  40400038  40400001  7800C074  70008018  7800D358
7000D3BC  58F0C060  4110D1B8  05EF5000  D39058F0  C0484110  D1C005EF
41E00004  15FE4720  C37058EF  D06407FE  C6C3C8C1  F0F0F5F6*
02E3E7E3  400018C0  40400038  40400001  58F0C034  1B1105EF  41E00004
15FE4720  C38858EF  D06C07FE  58E0C07C  585ED420  5C40C078  18355A30
D2E04103  90005000  D208410E  D4245000  C6C3C8C1  F0F0F5F7*
02E3E7E3  400018F8  40400038  40400001  D20C58F0  C0504110  D20805EF
58E0C07C  587ED420  5C60C078  18475A40  D2E82B00  78049000  6A00D2C0
6000D2B8  5830D2BC  10335030  D3A458F0  C6C3C8C1  F0F0F5F8*
```

MEMBER NAME  FCHART

```
02E3E7E3  40001930  40400038  40400001  C05C1800  45E0F004  00000000
00000028  45E0F008  0450D3A4  45E0F010  58F0C05C  45E0F000  00000000
00000045  45E0F134  00010000  0120D3DA  C6C3C8C1  F0F0F5F9*
02E3E7E3  40001968  40400038  40400001  0100001E  00000001  45E0F010
58F0C048  4110D218  05EF41E0  000415FE  4720C43E  58EFD074  07FE7820
D3947A20  D3987A20  D33C7B20  D32C7020  C6C3C8C1  F0F0F6F0**
02E3E7E3  400019A0  40400038  40400001  D39458F0  C04C4110  D26005EF
41E00004  15FE4720  C46C58EF  D07C07FE  58F0C024  4110D274  05EF41E0
000415FE  4720C486  58EFD084  07FE5800  C6C3C8C1  F0F0F6F1*
02E3E7E3  400019D8  40400038  40400001  D37C1BFF  870FC4A8  5800D3A8
5A00D2D4  5000D3A8  5800C07C  5A00D2E8  5000C07C  78208010  7B20D398
7B20D33C  70208010  78208018  7B20D398  C6C3C8C1  F0F0F6F2*
02E3E7E3  40001A10  40400038  40400001  7B20D33C  70208018  7820D398
```

| | | | | | | |
|---|---|---|---|---|---|---|
| 7A20D3BC | 7A20D33C | 7020D3BC | 5800D3A8 | 5900D388 | 47C0C4E8 | 47F0C586 |
| 41200001 | 5720D37C | 1BFF862F | C52C58F0 | C6C3C8C1 | F0F0F6F3* | |
| 02E3E7E3 | 40001A48 | 40400038 | 40400001 | C0444110 | D28405EF | 41E00004 |
| 15FE4720 | C51058EF | D08C07FE | 5800D374 | 5900D3B4 | 4750C52C | 5800D378 |
| 5900D2EC | 4780C52C | 47F0C370 | 5800D2D4 | C6C3C8C1 | F0F0F6F4* | |
| 02E3E7E3 | 40001A80 | 40400038 | 40400001 | 5000D3D4 | 58F0C03C | 4110D28C |
| 05EF41E0 | 000415FE | 4720C54E | 58EFD094 | 07FE58F0 | C0105800 | F0081BFF |
| 860FC566 | 58F0C038 | 4110D2AC | 05EF5800 | C6C3C8C1 | F0F0F6F5* | |
| 02E3E7E3 | 40001AB8 | 40400038 | 40400001 | D3D45900 | D2E04780 | C54E5800 |
| D3D45900 | D2D44780 | C58247F0 | C60447F0 | C23258B0 | C00058A0 | D2D450A0 |
| D3D458F0 | C03C4110 | D28C05EF | 41E00004 | C6C3C8C1 | F0F0F6F6* | |
| 02E3E7E3 | 40001AF0 | 40400038 | 40400001 | 15FE4720 | C5AC58EF | D09C07FE |
| 58F0C010 | 5800F008 | 1BFF860F | C5C458F0 | C0384110 | D2AC05EF | 5800D3D4 |
| 5900D2E0 | 4780C5AC | 59A0D3D4 | 4770C604 | C6C3C8C1 | F0F0F6F7* | |
| 02E3E7E3 | 40001B28 | 40400038 | 40400001 | 1BFF58E0 | D00007FE | 58B0C000 |
| 58A0D2D4 | 58F0C05C | 45E0F004 | 00000006 | 0000004B | 45E0F010 | 1BFF58E0 |
| D00007FE | 58B0C000 | 58A0D2D4 | 58F0C05C | C6C3C8C1 | F0F0F6F8* | |
| 02E3E7E3 | 40001B60 | 40400038 | 40400001 | 45E0F004 | 00000006 | 0000007E |
| 45E0F008 | 0450D3D4 | 45E0F010 | 58F0C05C | 45E0F034 | 05404040 | F1F158D0 |
| D00458E0 | D00C92FF | D00C982C | D01C07FE | C6C3C8C1 | F0F0F6F9* | |
| 02E3E7E3 | 40001B98 | 40400030 | 40400001 | 58C0D048 | 58701004 | 58207000 |
| 5020D3D0 | 58201000 | 41302000 | 41500004 | 1B255C40 | D2F41B25 | 5020C02C |
| 5030C030 | 47F0C098 | 40404040 | 40404040 | C6C3C8C1 | F0F0F7F0** | |
| 02E3E7E3 | 40000020 | 40400004 | 40400001 | 00001B98 | 40404040 | 40404040 |
| 40404040 | 40404040 | 40404040 | 40404040 | 40404040 | 40404040 | 40404040 |
| 40404040 | 40404040 | 40404040 | 40404040 | C6C3C8C1 | F0F0F7F1* | |
| 02D9D3C4 | 40404040 | 40400038 | 40404040 | 00160001 | 1C0015AC | 00170001 |
| 1C0015B0 | 00180001 | 1C0015B4 | 00010001 | 0C00193C | 00010001 | 0C001958 |
| 00010001 | 0C001B44 | 00010001 | 0C001B68 | C6C3C8C1 | F0F0F7F2* | |
| 02E3E7E3 | 40000024 | 40400004 | 40400001 | 000000C0 | 40404040 | 40404040 |
| 40404040 | 40404040 | 40404040 | 40404040 | 40404040 | 40404040 | 40404040 |
| 40404040 | 40404040 | 40404040 | 40404040 | C6C3C8C1 | F0F0F7F3* | |
| 02E3E7E3 | 400000C0 | 40400004 | 40400001 | 00001B86 | 40404040 | 40404040 |
| 40404040 | 40404040 | 40404040 | 40404040 | 40404040 | 40404040 | 40404040 |
| 40404040 | 40404040 | 40404040 | 40404040 | C6C3C8C1 | F0F0F7F4* | |
| 02E3E7E3 | 40000108 | 40400014 | 40400001 | 00001550 | 000017DA | 000017DA |
| 000017F4 | 000017FC | 40404040 | 40404040 | 40404040 | 40404040 | 40404040 |
| 40404040 | 40404040 | 40404040 | 40404040 | C6C3C8C1 | F0F0F7F5* | |
| 02D9D3C4 | 40404040 | 40400038 | 40404040 | 00010001 | 0C000020 | 00010001 |
| 0C000024 | 00010001 | 0C0000C0 | 00010001 | 0C000108 | 00010001 | 0C00010C |
| 00010001 | 0C000110 | 00010001 | 0C000114 | C6C3C8C1 | F0F0F7F6* | |
| 02E3E7E3 | 4000011C | 4040001C | 40400001 | 00001840 | 0000184C | 000018C0 |
| 000018C0 | 000018D8 | 000018D8 | 0000198E | 40404040 | 40404040 | 40404040 |
| 40404040 | 40404040 | 40404040 | 40404040 | C6C3C8C1 | F0F0F7F7* | |
| 02D9D3C4 | 40404040 | 40400038 | 40404040 | 00010001 | 0C000118 | 00010001 |

MEMBER NAME FCHART

| | | | | | | |
|---|---|---|---|---|---|---|
| 0C00011C | 00010001 | 0C000120 | 00010001 | 0C000124 | 00010001 | 0C000128 |
| 00010001 | 0C00012C | 00010001 | 0C000130 | C6C3C8C1 | F0F0F7F8* | |
| 02E3E7E3 | 40000138 | 4040001C | 40400001 | 0000198E | 000019BC | 000019D6 |
| 000019D6 | 000019D6 | 00001A60 | 00001B30 | 40404040 | 40404040 | 40404040 |
| 40404040 | 40404040 | 40404040 | 40404040 | C6C3C8C1 | F0F0F7F9* | |
| 02D9D3C4 | 40404040 | 40400038 | 40404040 | 00010001 | 0C000134 | 00010001 |
| 0C000138 | 00010001 | 0C00013C | 00010001 | 0C000140 | 00010001 | 0C000144 |
| 00010001 | 0C000148 | 00010001 | 0C00014C | C6C3C8C1 | F0F0F8F0** | |
| 02E3E7E3 | 40000154 | 4040001C | 40400001 | 00001A9E | 00001A9E | 00001AFC |
| 00001AFC | 800015E0 | 800004E0 | 800004D8 | 40404040 | 40404040 | 40404040 |
| 40404040 | 40404040 | 40404040 | 40404040 | C6C3C8C1 | F0F0F8F1* | |
| 02D9D3C4 | 40404040 | 40400038 | 40404040 | 00010001 | 0C000150 | 00010001 |
| 0C000154 | 00010001 | 0C000158 | 00010001 | 0C00015C | 00010001 | 0C000160 |
| 00010001 | 0C000164 | 00010001 | 0C000168 | C6C3C8C1 | F0F0F8F2* | |

```
02E3E7E3  40000170  40400004  40400001  000003A8  40404040  40404040
40404040  40404040  40404040  40404040  40404040  40404040  40404040
40404040  40404040  40404040  40404040  C6C3C8C1  F0F0F8F3*
02E3E7E3  40000178  40400008  40400001  80000000  000003A0  40404040
40404040  40404040  40404040  40404040  40404040  40404040  40404040
40404040  40404040  40404040  40404040  C6C3C8C1  F0F0F8F4*
02E3E7E3  40000184  40400014  40400001  80000014  00000394  00000020
00000464  0000044C  40404040  40404040  40404040  40404040  40404040
40404040  40404040  40404040  40404040  C6C3C8C1  F0F0F8F5*
02D9D3C4  40404040  40400038  40404040  00010001  0C00016C  00010001
0C000170  00010001  0C00017C  00020001  0C000184  00010001  0C000188
00060001  0C00018C  00010001  0C000190  C6C3C8C1  F0F0F8F6*
02E3E7E3  40000198  4040001C  40400001  00000470  0000048C  00000498
80000000  000003A0  00000440  80000000  40404040  40404040  40404040
40404040  40404040  40404040  40404040  C6C3C8C1  F0F0F8F7*
02D9D3C4  40404040  40400038  40404040  00010001  0C000194  00010001
0C000198  00010001  0C00019C  00010001  0C0001A0  00060001  0C0001A4
00010001  0C0001A8  00010001  0C0001AC  C6C3C8C1  F0F0F8F8*
02E3E7E3  400001B4  4040001C  40400001  000003A8  0000148C  80000004
000003A8  00000014  80000004  00000000  40404040  40404040  40404040
40404040  40404040  40404040  40404040  C6C3C8C1  F0F0F8F9*
02D9D3C4  40404040  40400038  40404040  00040001  0C0001B0  00010001
0C0001B4  00010001  0C0001B8  00040001  0C0001BC  00010001  0C0001C0
00060001  0C0001C4  00040001  0C0001C8  C6C3C8C1  F0F0F9F0**
02E3E7E3  400001D0  4040001C  40400001  0000148C  80000440  000003CC
800003CC  000003F0  00000404  00000388  40404040  40404040  40404040
40404040  40404040  40404040  40404040  C6C3C8C1  F0F0F9F1*
02D9D3C4  40404040  40400038  40404040  00060001  0C0001CC  00010001
0C0001D0  00010001  0C0001D4  00010001  0C0001D8  00010001  0C0001DC
00010001  0C0001E0  00010001  0C0001E4  C6C3C8C1  F0F0F9F2*
02E3E7E3  400001EC  4040001C  40400001  000003B8  000003DC  000003D8
000000A0  00000388  00000388  00000388  40404040  40404040  40404040
40404040  40404040  40404040  40404040  C6C3C8C1  F0F0F9F3*
02D9D3C4  40404040  40400038  40404040  00010001  0C0001E8  00010001
0C0001EC  00010001  0C0001F0  00010001  0C0001F4  00010001  0C0001F8
00010001  0C0001FC  00010001  0C000200  C6C3C8C1  F0F0F9F4*
02E3E7E3  40000208  4040001C  40400001  00000388  00000394  0000039C
00000388  00000388  000003DC  000003E8  40404040  40404040  40404040
40404040  40404040  40404040  40404040  C6C3C8C1  F0F0F9F5*
02D9D3C4  40404040  40400038  40404040  00010001  0C000204  00010001
0C000208  00010001  0C00020C  00010001  0C000210  00010001  0C000214
00010001  0C000218  00010001  0C00021C  C6C3C8C1  F0F0F9F6*
02E3E7E3  40000224  40400004  40400001  80000388  40404040  40404040
40404040  40404040  40404040  40404040  40404040  40404040  40404040

MEMBER NAME  FCHART
40404040  40404040  40404040  40404040  C6C3C8C1  F0F0F9F7*
02E3E7E3  4000022C  40400018  40400001  800003B0  000003F8  0000045C
00000388  00000478  000003DC  40404040  40404040  40404040  40404040
40404040  40404040  40404040  40404040  C6C3C8C1  F0F0F9F8*
02D9D3C4  40404040  40400038  40404040  00010001  0C000220  00010001
0C000224  00010001  0C00022C  00010001  0C000230  00010001  0C000234
00010001  0C000238  00010001  0C00023C  C6C3C8C1  F0F0F9F9*
02E3E7E3  40000244  40400004  40400001  000003D8  40404040  40404040
40404040  40404040  40404040  40404040  40404040  40404040  40404040
40404040  40404040  40404040  40404040  C6C3C8C1  F0F1F0F0**
02E3E7E3  4000024C  40400018  40400001  00000388  00000388  00000388
00000388  00000394  0000039C  40404040  40404040  40404040  40404040
40404040  40404040  40404040  40404040  C6C3C8C1  F0F1F0F1*
02D9D3C4  40404040  40400038  40404040  00010001  0C000240  00010001
0C000244  00010001  0C00024C  00010001  0C000250  00010001  0C000254
```

```
00010001  0C000258  00010001  0C00025C  C6C3C8C1  F0F1F0F2*
02E3E7E3  40000264  4040001C  40400001  00000388  00000388  000003DC
000003E8  80000388  000014B0  800003D0  40404040  40404040  40404040
40404040  40404040  40404040  40404040  C6C3C8C1  F0F1F0F3*
02D9D3C4  40404040  40400038  40404040  00010001  0C000260  00010001
0C000264  00010001  0C000268  00010001  0C00026C  00010001  0C000270
00010001  0C000274  00010001  0C000278  C6C3C8C1  F0F1F0F4*
02E3E7E3  40000280  4040001C  40400001  000015BC  0000040C  00000388
00000450  000003DC  000003D8  000014B0  40404040  40404040  40404040
40404040  40404040  40404040  40404040  C6C3C8C1  F0F1F0F5*
02D9D3C4  40404040  40400038  40404040  00010001  0C00027C  00010001
0C000280  00010001  0C000284  00010001  0C000288  00010001  0C00028C
00010001  0C000290  00010001  0C000294  C6C3C8C1  F0F1F0F6*
02E3E7E3  4000029C  4040001C  40400001  00000388  00000388  00000388
00000388  00000394  0000039C  00000388  40404040  40404040  40404040
40404040  40404040  40404040  40404040  C6C3C8C1  F0F1F0F7*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  C6C3C8C1  F0F1F0F8*
02E3E7E3  400002B8  40400010  40400001  00000388  000003DC  000003E8
80000388  40404040  40404040  40404040  40404040  40404040  40404040
40404040  40404040  40404040  40404040  C6C3C8C1  F0F1F0F9*
02E3E7E3  400002D0  4040000C  40400001  00000458  8000043C  000015BC
40404040  40404040  40404040  40404040  40404040  40404040  40404040
40404040  40404040  40404040  40404040  C6C3C8C1  F0F1F1F0**
02D9D3C4  40404040  40400038  40404040  00010001  0C0002B4  00010001
0C0002B8  00010001  0C0002BC  00010001  0C0002C0  00010001  0C0002C4
00010001  0C0002D0  00010001  0C0002D4  C6C3C8C1  F0F1F1F1*
02E3E7E3  400002DC  4040001C  40400001  00000454  00000388  000003BC
000003DC  000003D8  0000049A  00000388  40404040  40404040  40404040
40404040  40404040  40404040  40404040  C6C3C8C1  F0F1F1F2*
02D9D3C4  40404040  40400038  40404040  00010001  0C0002D8  00010001
0C0002DC  00010001  0C0002E0  00010001  0C0002E4  00010001  0C0002E8
00010001  0C0002EC  00010001  0C0002F0  C6C3C8C1  F0F1F1F3*
02E3E7E3  400002F8  4040001C  40400001  00000388  00000388  00000388
00000394  0000039C  00000388  00000388  40404040  40404040  40404040
40404040  40404040  40404040  40404040  C6C3C8C1  F0F1F1F4*
02D9D3C4  40404040  40400038  40404040  00010001  0C0002F4  00010001
0C0002F8  00010001  0C0002FC  00010001  0C000300  00010001  0C000304
00010001  0C000308  00010001  0C00030C  C6C3C8C1  F0F1F1F5*
02E3E7E3  40000314  4040001C  40400001  000003DC  000003E8  80000388
0000038C  0000038C  0000038C  0000038C  40404040  40404040  40404040
40404040  40404040  40404040  40404040  C6C3C8C1  F0F1F1F6*

MEMBER NAME  FCHART
02D9D3C4  40404040  40400038  40404040  00010001  0C000310  00010001
0C000314  00010001  0C000318  00010001  0C00031C  00010001  0C000320
00010001  0C000324  00010001  0C000328  C6C3C8C1  F0F1F1F7*
02E3E7E3  40000330  4040001C  40400001  80000484  00001494  0000149C
00000484  800003F4  00000434  80000438  40404040  40404040  40404040
40404040  40404040  40404040  40404040  C6C3C8C1  F0F1F1F8*
02D9D3C4  40404040  40400038  40404040  00010001  0C00032C  00010001
0C000330  00010001  0C000334  00010001  0C000338  00010001  0C00033C
00010001  0C000340  00010001  0C000344  C6C3C8C1  F0F1F1F9*
02E3E7E3  4000034C  4040001C  40400001  00000414  00000410  00000460
000003F4  000003F4  000003E0  0000041C  40404040  40404040  40404040
40404040  40404040  40404040  40404040  C6C3C8C1  F0F1F2F0**
02D9D3C4  40404040  40400038  40404040  00010001  0C000348  00010001
0C00034C  00010001  0C000350  00010001  0C000354  00010001  0C000358
00010001  0C00035C  00010001  0C000360  C6C3C8C1  F0F1F2F1*
02E3E7E3  40000368  40400010  40400001  8000047C  00000398  00000494
```

```
80000488  40404040  40404040  40404040  40404040  40404040  40404040
40404040  40404040  40404040  40404040  C6C3C8C1  F0F1F2F2*
02E3E7E3  400015B8  40400030  40400001  00000000  00000000  00000000
00000000  00000058  00000000  00000000  00000000  00000000  00000060
00000000  00000000  40404040  40404040  C6C3C8C1  F0F1F2F3*
02D9D3C4  40404040  40400028  40404040  00010001  0C000364  00010001
0C000368  00010001  0C00036C  00010001  0C000370  00010001  0C000374
40404040  40404040  40404040  40404040  C6C3C8C1  F0F1F2F4*
02C5D5C4  40404040  40404040  40404040  40404040  40404040  40404040
00001BC8  F1F5F7F3  F460C6D6  F34040F0  F2F0F2F8  F7F0F9F8  40F0F84B
F1F54BF1  F6404040  C6C3C8C1  D9E34040  C6C3C8C1  F0F1F2F5**

MEMBER NAME   FMCHT
02C5E2C4  40404040  40400010  40400001  C6D4C3C8  E3404040  00000000
40000000  40404040  40404040  40404040  40404040  40404040  40404040
40404040  40404040  40404040  40404040  C6D4C3C8  F0F0F0F1*
02E3E7E3  40000000  40400028  40400001  47F0F00C  07C6D4C3  C8E34040
90ECD00C  184D98CD  F0205040  D00450D0  400807FC  40404040  40404040
40404040  40404040  40404040  40404040  C6D4C3C8  F0F0F0F2*
02C5E2C4  40404040  40400010  40400002  C6D4E3C5  D9D94040  05000000
40002D58  40404040  40404040  40404040  40404040  40404040  40404040
40404040  40404040  40404040  40404040  C6D4C3C8  F0F0F0F3*
02E3E7E3  400000F0  4040002C  40400001  00000000  00000000  00000001
00000002  00000032  0000003C  00000048  41100000  41F00000  00000000
00000000  40404040  40404040  40404040  C6D4C3C8  F0F0F0F4*
02C5E2C4  40404040  40400010  40400003  D7C3C5D9  D9404040  05000000
40003844  40404040  40404040  40404040  40404040  40404040  40404040
40404040  40404040  40404040  40404040  C6D4C3C8  F0F0F0F5*
02C5E2C4  40404040  40400010  40400004  C4C9E3E3  D6404040  02000000
40000000  40404040  40404040  40404040  40404040  40404040  40404040
40404040  40404040  40404040  40404040  C6D4C3C8  F0F0F0F6*
02C5E2C4  40404040  40400010  40400005  C6D4C5D9  D9404040  02000000
40000000  40404040  40404040  40404040  40404040  40404040  40404040
40404040  40404040  40404040  40404040  C6D4C3C8  F0F0F0F7*
02C5E2C4  40404040  40400010  40400006  C6D4E6D9  D5404040  02000000
40000000  40404040  40404040  40404040  40404040  40404040  40404040
40404040  40404040  40404040  40404040  C6D4C3C8  F0F0F0F8*
02C5E2C4  40404040  40400010  40400007  C2C5C7C4  C5E34040  02000000
40000000  40404040  40404040  40404040  40404040  40404040  40404040
40404040  40404040  40404040  40404040  C6D4C3C8  F0F0F0F9*
02C5E2C4  40404040  40400010  40400008  C5D5C4C4  C5E34040  02000000
40000000  40404040  40404040  40404040  40404040  40404040  40404040
40404040  40404040  40404040  40404040  C6D4C3C8  F0F0F1F0**
02E3E7E3  40000140  40400020  40400001  FFFFFFC3  00002551  FFFFFFBB
00000000  00000000  00000000  00000000  00000000  40404040  40404040
40404040  40404040  40404040  40404040  C6D4C3C8  F0F0F1F1*
02D9D3C4  40404040  40400038  40404040  00020001  0C000140  00020001
0C000144  00030001  0C000148  00040001  1C00014C  00050001  1C000150
00060001  1C000154  00070001  1C000158  C6D4C3C8  F0F0F1F2*
02C5E2C4  40404040  40400010  40400009  D7D3E8C3  C8E34040  02000000
40000000  40404040  40404040  40404040  40404040  40404040  40404040
40404040  40404040  40404040  40404040  C6D4C3C8  F0F0F1F3*
02E3E7E3  40000160  40400038  40400001  00000000  58A0D118  58B0D11C
7800D0E8  7000D0FC  7800D0CC  7000D100  7800D0E8  7000D104  7800D0CC
7000D108  5800B02F  12004780  D1C458F0  C6D4C3C8  F0F0F1F4*
02E3E7E3  40000198  40400038  40400001  D1301B11  05EF41E0  000415FE
4720D186  58EFD04C  07FE58F0  D1284110  D09405EF  58F0D134  4110D09C
05EF41E0  000415FE  4720D1AA  58EFD054  C6D4C3C8  F0F0F1F5*
02E3E7E3  400001D0  40400038  40400001  07FE58F0  D1244110  D0B005EF
41E00004  15FE4720  D1C458EF  D05C07FE  5800B803  12004780  D22458F0
D1301B11  05EF41E0  000415FE  4720D1E6  C6D4C3C8  F0F0F1F6*
```

```
02E3E7E3  40000208  40400038  40400001  58EFD064  07FE58F0  D12C4110
D0C005EF  58F0D134  4110D09C  05EF41E0  000415FE  4720D20A  58EFD06C
07FE58F0  D1244110  D0B005EF  41E00004  C6D4C3C8  F0F0F1F7*
02E3E7E3  40000240  40400038  40400001  15FE4720  D22458EF  D07407FE
58F0D120  5800F045  12004780  D28658F0  D1301B11  05EF41E0  000415FE
4720D24A  58EFD07C  07FE58F0  D1381B11  C6D4C3C8  F0F0F1F8*
02E3E7E3  40000278  40400038  40400001  05EF58F0  D1344110  D09C05EF
41E00004  15FE4720  D26C58EF  D08407FE  58F0D124  4110D0B0  05EF41E0
000415FE  4720D286  58EFD08C  07FE1BFF  C6D4C3C8  F0F0F1F9*
02E3E7E3  400002B0  4040001C  40400001  58E0D000  07FE58D0  D00458E0
```

MEMBER NAME FMCHT

```
D00C92FF  D00C982C  D01C07FE  47F0D13C  40404040  40404040  40404040
40404040  40404040  40404040  40404040  C6D4C3C8  F0F0F2F0**
02E3E7E3  40000020  4040000C  40400001  000002C8  00000028  000002B6
40404040  40404040  40404040  40404040  40404040  40404040  40404040
40404040  40404040  40404040  40404040  C6D4C3C8  F0F0F2F1*
02E3E7E3  40000074  4040000C  40400001  000001AE  000001EC  000001D2
40404040  40404040  40404040  40404040  40404040  40404040  40404040
40404040  40404040  40404040  40404040  C6D4C3C8  F0F0F2F2*
02D9D3C4  40404040  40400038  40404040  00080001  1C00015C  00090001
1C000160  00010001  0C000020  00010001  0C000024  00010001  0C000028
00010001  0C000074  00010001  0C000078  C6D4C3C8  F0F0F2F3*
02E3E7E3  40000080  4040001C  40400001  000001EC  000001EC  000001EC
0000020E  0000024C  00000232  0000024C  40404040  40404040  40404040
40404040  40404040  40404040  40404040  C6D4C3C8  F0F0F2F4*
02D9D3C4  40404040  40400038  40404040  00010001  0C00007C  00010001
0C000080  00010001  0C000084  00010001  0C000088  00010001  0C00008C
00010001  0C000090  00010001  0C000094  C6D4C3C8  F0F0F2F5*
02E3E7E3  4000009C  4040001C  40400001  0000024C  0000024C  00000272
000002AE  00000294  000002AE  000002AE  40404040  40404040  40404040
40404040  40404040  40404040  40404040  C6D4C3C8  F0F0F2F6*
02D9D3C4  40404040  40400038  40404040  00010001  0C000098  00010001
0C00009C  00010001  0C0000A0  00010001  0C0000A4  00010001  0C0000A8
00010001  0C0000AC  00010001  0C0000B0  C6D4C3C8  F0F0F2F7*
02E3E7E3  400000B8  4040001C  40400001  000002AE  00000000  80002580
000000F4  000000F4  000000F4  000000F4  40404040  40404040  40404040
40404040  40404040  40404040  40404040  C6D4C3C8  F0F0F2F8*
02D9D3C4  40404040  40400038  40404040  00010001  0C0000B4  00010001
0C0000B8  00020001  0C0000BC  00020001  0C0000C0  00010001  0C0000C4
00010001  0C0000C8  00010001  0C0000CC  C6D4C3C8  F0F0F2F9*
02E3E7E3  400000D4  4040001C  40400001  80000120  00000124  0000012C
00000120  8000010C  00002584  80002D54  40404040  40404040  40404040
40404040  40404040  40404040  40404040  C6D4C3C8  F0F0F3F0**
02D9D3C4  40404040  40400038  40404040  00010001  0C0000D0  00010001
0C0000D4  00010001  0C0000D8  00010001  0C0000DC  00010001  0C0000E0
00010001  0C0000E4  00020001  0C0000E8  C6D4C3C8  F0F0F3F1*
02D9D3C4  40404040  40400008  40404040  00020001  0C0000EC  40404040
40404040  40404040  40404040  40404040  40404040  40404040  40404040
40404040  40404040  40404040  40404040  C6D4C3C8  F0F0F3F2*
02C5D5C4  40404040  40404040  40404040  40404040  40404040  40404040
000002CC  F1F5F7F3  F460C6D6  F34040F0  F2F0F2F8  F7F0F9F8  40F0F84B
F1F54BF2  F2404040  C6D4C3C8  E3404040  C6D4C3C8  F0F0F3F3**
```

MEMBER NAME FMERR

```
02C5E2C4  40404040  40400010  40400001  C6D4C5D9  D9404040  00000000
40000000  40404040  40404040  40404040  40404040  40404040  40404040
40404040  40404040  40404040  40404040  C6D4C5D9  F0F0F0F1*
02E3E7E3  40000000  40400038  40400001  47F0F00C  07C6D4C5  D9D94040
90ECD00C  184D98CD  F0205040  D00450D0  400807FC  40404040  40404040
021A1C40  C5D9D9D6  D940C9D5  40C6D4C5  C6D4C5D9  F0F0F0F2*
```

```
02E3E7E3  40000038  40400038  40400001  D9D9404D  E2E4D7C5  D940E3C5
E7E35D22  C6D6D9D4  C1E340C3  C8C1D9E3  40C5D9D9  D6D9E240  40404040
C6D6D9D4  C1E340C5  D9D9D6D9  40D4C5E2  C6D4C5D9  F0F0F0F3*
02E3E7E3  40000070  40400020  40400001  E2C1C7C5  E2404040  C6D6D9D4
C1E340C3  C8C1D9E3  40C5D9D9  D6D9E240  40404040  40404040  40404040
40404040  40404040  40404040  40404040  C6D4C5D9  F0F0F0F4*
02E3E7E3  400002B8  40400038  40400001  00000000  00000001  00000003
00000004  00000013  00000015  0000003C  00000049  00000078  401DF3B6
4029FBE7  403EF9DB  40800000  41180000  C6D4C5D9  F0F0F0F5*
02C5E2C4  40404040  40400010  40400002  D9D4D6C4  C5D34040  05000000
40000018  40404040  40404040  40404040  40404040  40404040  40404040
40404040  40404040  40404040  40404040  C6D4C5D9  F0F0F0F6*
02E3E7E3  400002F0  40400034  40400001  41200000  41280000  412C0000
41300000  41400000  41473333  41480000  4154353F  415C353F  415E6666
42110000  00000000  00000000  40404040  C6D4C5D9  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  C6D4C5D9  F0F0F0F8*
02E3E7E3  400003E0  40400008  40400001  FFFFFFFF  00000000  40404040
40404040  40404040  40404040  40404040  40404040  40404040  40404040
40404040  40404040  40404040  40404040  C6D4C5D9  F0F0F0F9*
02C5E2C4  40404040  40400010  40400004  C3C1C4D3  D5F14040  02000000
40000000  40404040  40404040  40404040  40404040  40404040  40404040
40404040  40404040  40404040  40404040  C6D4C5D9  F0F0F1F0**
02C5E2C4  40404040  40400010  40400005  C3C1C4E2  E4D74040  02000000
40000000  40404040  40404040  40404040  40404040  40404040  40404040
40404040  40404040  40404040  40404040  C6D4C5D9  F0F0F1F1*
02C5E2C4  40404040  40400010  40400006  C8C7C4C1  E3C54040  02000000
40000000  40404040  40404040  40404040  40404040  40404040  40404040
40404040  40404040  40404040  40404040  C6D4C5D9  F0F0F1F2*
02C5E2C4  40404040  40400010  40400007  C8C7E3C9  D4C54040  02000000
40000000  40404040  40404040  40404040  40404040  40404040  40404040
40404040  40404040  40404040  40404040  C6D4C5D9  F0F0F1F3*
02C5E2C4  40404040  40400010  40400008  C9C2C3D6  D47B4040  02000000
40000000  40404040  40404040  40404040  40404040  40404040  40404040
40404040  40404040  40404040  40404040  C6D4C5D9  F0F0F1F4*
02C5E2C4  40404040  40400010  40400009  C9C3D5E3  C5D94040  02000000
40000000  40404040  40404040  40404040  40404040  40404040  40404040
40404040  40404040  40404040  40404040  C6D4C5D9  F0F0F1F5*
02E3E7E3  400003EC  4040001C  40400001  00000000  00000000  00000000
00000000  00000000  00000000  00000000  40404040  40404040  40404040
40404040  40404040  40404040  40404040  C6D4C5D9  F0F0F1F6*
02D9D3C4  40404040  40400038  40404040  00020001  0C0003E0  00030001
1C0003EC  00040001  1C0003F0  00050001  1C0003F4  00060001  1C0003F8
00070001  1C0003FC  00080001  1C000400  C6D4C5D9  F0F0F1F7*
02E3E7E3  40000360  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  C6D4C5D9  F0F0F1F8*
02E3E7E3  40000398  40400038  40400001  C45B5BE2  D3C9C340  E5C5D9E2
C9D6D540  E7E74BE7  40404040  40404040  4040C4C1  E3C57A40  E7E761E7
E761E7E7  40404040  4040E3C9  D4C57A40  C6D4C5D9  F0F0F1F9*
02E3E7E3  400003D0  40400008  40400001  E7E77AE7  E77AE7E7  40404040

MEMBER NAME  FMERR
40404040  40404040  40404040  40404040  40404040  40404040  40404040
40404040  40404040  40404040  40404040  C6D4C5D9  F0F0F2F0**
02E3E7E3  4000041C  40400038  40400001  5880D350  58B0D354  5870D380
4100D318  5000D078  58F0D35C  4110D074  05EF58F0  D36C4110  D08005EF
58F0D368  4110D084  05EF7800  D27C3300  C6D4C5D9  F0F0F2F1*
02E3E7E3  40000454  40400038  40400001  7000D2BC  7800D284  33007000
D2987800  D2743300  7000D2A0  7800D26C  33007000  D2A47800  D2847000
```

```
D29C7800  D2687000  D2A87800  D2787000  C6D4C5D9  F0F0F2F2*
02E3E7E3  4000048C  40400038  40400001  D2B058F0  D3644110  D08805EF
41E00004  15FE4720  D41858EF  D04C07FE  7800D26C  7000D2B0  7800D270
33007000  D38458F0  D3644110  D0D005EF  C6D4C5D9  F0F0F2F3*
02E3E7E3  400004C4  40400038  40400001  41E00004  15FE4720  D44458EF
D05407FE  7800D264  7000D2B0  58F0D364  4110D118  05EF41E0  000415FE
4720D466  58EFD05C  07FE7800  D2A87000  C6D4C5D9  F0F0F2F4*
02E3E7E3  400004FC  40400038  40400001  D2AC58F0  D3604110  D16005EF
7800D2AC  7B00D258  7000D2AC  58F0D360  4110D160  05EF7800  D2607000
D2B05800  D2C01200  4780D510  5890D22C  C6D4C5D9  F0F0F2F5*
02E3E7E3  40000534  40400038  40400001  18A7410A  B0005000  D17058F0
D3744110  D17005EF  5000D2B8  410AB000  5000D190  58F0D364  4110D178
05EF41E0  000415FE  4720D4DE  58EFD064  C6D4C5D9  F0F0F2F6*
02E3E7E3  4000056C  40400038  40400001  07FE7800  D2B07B00  D2587000
D2B07800  D2AC7B00  D2587000  D2AC58F0  D3604110  D16005EF  5A90D22C
5AA0D240  5990D2C0  47C0D4A6  58F0D360  C6D4C5D9  F0F0F2F7*
02E3E7E3  400005A4  40400038  40400001  4110D1C0  05EF58F0  D3604110
D1D005EF  7800D288  33007000  D38458F0  D3644110  D1E005EF  41E00004
15FE4720  D54858EF  D06C07FE  1BFF58E0  C6D4C5D9  F0F0F2F8*
02E3E7E3  400005DC  40400038  40400001  D00007FE  58F0D370  45E0F004
00000006  00000028  45E0F010  1BFF58E0  D00007FE  58D0D004  58E0D00C
92FFD00C  982CD01C  07FE5870  10045820  C6D4C5D9  F0F0F2F9*
02E3E7E3  40000614  40400026  40400001  70005020  D2C05820  10004130
20004150  00011B25  5C40D240  1B255020  D3545030  D35847F0  D38C4040
40404040  40404040  40404040  40404040  C6D4C5D9  F0F0F3F0**
02E3E7E3  40000020  40400008  40400001  0000060E  00000090  40404040
40404040  40404040  40404040  40404040  40404040  40404040  40404040
40404040  40404040  40404040  40404040  C6D4C5D9  F0F0F3F1*
02E3E7E3  40000090  40400004  40400001  000005FC  40404040  40404040
40404040  40404040  40404040  40404040  40404040  40404040  40404040
40404040  40404040  40404040  40404040  C6D4C5D9  F0F0F3F2*
02E3E7E3  400000DC  4040000C  40400001  000004A8  000005E0  000004D4
40404040  40404040  40404040  40404040  40404040  40404040  40404040
40404040  40404040  40404040  40404040  C6D4C5D9  F0F0F3F3*
02D9D3C4  40404040  40400038  40404040  00090001  1C000404  00010001
0C0005EC  00010001  0C000020  00010001  0C000024  00010001  0C000090
00010001  0C0000DC  00010001  0C0000E0  C6D4C5D9  F0F0F3F4*
02E3E7E3  400000E8  4040001C  40400001  000005E0  000004F6  000005E0
0000056E  000005E0  000005D8  000005E0  40404040  40404040  40404040
40404040  40404040  40404040  40404040  C6D4C5D9  F0F0F3F5*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  C6D4C5D9  F0F0F3F6*
02E3E7E3  40000104  40400004  40400001  000002C4  40404040  40404040
40404040  40404040  40404040  40404040  40404040  40404040  40404040
40404040  40404040  40404040  40404040  C6D4C5D9  F0F0F3F7*
02E3E7E3  4000010C  40400018  40400001  80000014  800003D0  800003BC
0000034C  00000340  000002B8  40404040  40404040  40404040  40404040
40404040  40404040  40404040  40404040  C6D4C5D9  F0F0F3F8*
02D9D3C4  40404040  40400038  40404040  00010001  0C000100  00010001
0C000104  00020001  0C00010C  00010001  0C000110  00010001  0C000114

MEMBER NAME  FMERR
00010001  0C000118  00010001  0C00011C  C6D4C5D9  F0F0F3F9*
02E3E7E3  40000124  4040001C  40400001  000002D8  000002E0  000002DC
00000360  000002B8  000002B8  000002B8  40404040  40404040  40404040
40404040  40404040  40404040  40404040  C6D4C5D9  F0F0F4F0**
02D9D3C4  40404040  40400038  40404040  00010001  0C000120  00010001
0C000124  00010001  0C000128  00010001  0C00012C  00010001  0C000130
00010001  0C000134  00010001  0C000138  C6D4C5D9  F0F0F4F1*
02E3E7E3  40000140  4040001C  40400001  000002B8  000002BC  000002C0
```

000002B8 000002B8 000002E0 000002E4 40404040 40404040 40404040
40404040 40404040 40404040 40404040 C6D4C5D9 F0F0F4F2*
02D9D3C4 40404040 40400038 40404040 00010001 0C00013C 00010001
0C000140 00010001 0C000144 00010001 0C000148 00010001 0C00014C
00010001 0C000150 00010001 0C000154 C6D4C5D9 F0F0F4F3*
02E3E7E3 4000015C 4040001C 40400001 800002B8 00000414 00000340
000002B8 000002C8 000002E0 000002DC 40404040 40404040 40404040
40404040 40404040 40404040 40404040 C6D4C5D9 F0F0F4F4*
02D9D3C4 40404040 40400038 40404040 00010001 0C000158 00010001
0C00015C 00010001 0C000160 00010001 0C000164 00010001 0C000168
00010001 0C00016C 00010001 0C000170 C6D4C5D9 F0F0F4F5*
02E3E7E3 40000178 4040001C 40400001 00000078 000002B8 000002B8
000002B8 000002B8 000002BC 000002C0 40404040 40404040 40404040
40404040 40404040 40404040 40404040 C6D4C5D9 F0F0F4F6*
02D9D3C4 40404040 40400038 40404040 00010001 0C000174 00010001
0C000178 00010001 0C00017C 00010001 0C000180 00010001 0C000184
00010001 0C000188 00010001 0C00018C C6D4C5D9 F0F0F4F7*
02E3E7E3 40000194 4040001C 40400001 000002B8 000002B8 000002E0
000002E4 800002B8 0000034C 00000340 40404040 40404040 40404040
40404040 40404040 40404040 40404040 C6D4C5D9 F0F0F4F8*
02D9D3C4 40404040 40400038 40404040 00010001 0C000190 00010001
0C000194 00010001 0C000198 00010001 0C00019C 00010001 0C0001A0
00010001 0C0001A4 00010001 0C0001A8 C6D4C5D9 F0F0F4F9*
02E3E7E3 400001B0 4040001C 40400001 000002B8 000002CC 000002E0
000002DC 00000060 000002B8 000002B8 40404040 40404040 40404040
40404040 40404040 40404040 40404040 C6D4C5D9 F0F0F5F0**
02D9D3C4 40404040 40400038 40404040 00010001 0C0001AC 00010001
0C0001B0 00010001 0C0001B4 00010001 0C0001B8 00010001 0C0001BC
00010001 0C0001C0 00010001 0C0001C4 C6D4C5D9 F0F0F5F1*
02E3E7E3 400001CC 4040001C 40400001 000002B8 000002B8 000002BC
000002C0 000002B8 000002B8 000002E0 40404040 40404040 40404040
40404040 40404040 40404040 40404040 C6D4C5D9 F0F0F5F2*
02D9D3C4 40404040 40400038 40404040 00010001 0C0001C8 00010001
0C0001CC 00010001 0C0001D0 00010001 0C0001D4 00010001 0C0001D8
00010001 0C0001DC 00010001 0C0001E0 C6D4C5D9 F0F0F5F3*
02E3E7E3 400001E8 40400018 40400001 000002E4 800002B8 00000328
0000033C 0000032C 8000033C 40404040 40404040 40404040 40404040
40404040 40404040 40404040 40404040 C6D4C5D9 F0F0F5F4*
02E3E7E3 40000204 40400004 40400001 800002D0 40404040 40404040
40404040 40404040 40404040 40404040 40404040 40404040 40404040
40404040 40404040 40404040 40404040 C6D4C5D9 F0F0F5F5*
02D9D3C4 40404040 40400038 40404040 00010001 0C0001E4 00010001
0C0001E8 00010001 0C0001EC 00010001 0C0001F0 00010001 0C0001F4
00010001 0C0001F8 00010001 0C0001FC C6D4C5D9 F0F0F5F6*
02E3E7E3 40000208 40400018 40400001 0000034C 00000340 000002B8
00000348 000002E0 000002DC 40404040 40404040 40404040 40404040
40404040 40404040 40404040 40404040 C6D4C5D9 F0F0F5F7*
02E3E7E3 40000224 40400004 40400001 000002B8 40404040 40404040
40404040 40404040 40404040 40404040 40404040 40404040 40404040
40404040 40404040 40404040 40404040 C6D4C5D9 F0F0F5F8*

MEMBER NAME FMERR
02D9D3C4 40404040 40400038 40404040 00010001 0C000204 00010001
0C000208 00010001 0C00020C 00010001 0C000210 00010001 0C000214
00010001 0C000218 00010001 0C00021C C6D4C5D9 F0F0F5F9*
02E3E7E3 40000228 4040001C 40400001 000002B8 000002B8 000002B8
000002BC 000002C0 000002B8 000002B8 40404040 40404040 40404040
40404040 40404040 40404040 40404040 C6D4C5D9 F0F0F6F0**
02D9D3C4 40404040 40400038 40404040 00010001 0C000224 00010001
0C000228 00010001 0C00022C 00010001 0C000230 00010001 0C000234
00010001 0C000238 00010001 0C00023C C6D4C5D9 F0F0F6F1*

```
02E3E7E3  40000244  4040001C  40400001  000002E0  000002E4  800002B8
00000328  00000338  00000328  8000033C  40404040  40404040  40404040
40404040  40404040  40404040  40404040  C6D4C5D9  F0F0F6F2*
02D9D3C4  40404040  40400038  40404040  00010001  0C000240  00010001
0C000244  00010001  0C000248  00010001  0C00024C  00010001  0C000250
00010001  0C000254  00010001  0C000258  C6D4C5D9  F0F0F6F3*
02E3E7E3  40000260  4040001C  40400001  0000032C  00000338  0000032C
8000033C  00000414  000002EC  000002B8  40404040  40404040  40404040
40404040  40404040  40404040  40404040  C6D4C5D9  F0F0F6F4*
02D9D3C4  40404040  40400038  40404040  00010001  0C00025C  00010001
0C000260  00010001  0C000264  00010001  0C000268  00010001  0C00026C
00010001  0C000270  00010001  0C000274  C6D4C5D9  F0F0F6F5*
02E3E7E3  4000027C  4040001C  40400001  000002C8  000002E0  000002DC
00000048  000002B8  000002B8  000002B8  40404040  40404040  40404040
40404040  40404040  40404040  40404040  C6D4C5D9  F0F0F6F6*
02D9D3C4  40404040  40400038  40404040  00010001  0C000278  00010001
0C00027C  00010001  0C000280  00010001  0C000284  00010001  0C000288
00010001  0C00028C  00010001  0C000290  C6D4C5D9  F0F0F6F7*
02E3E7E3  40000298  4040001C  40400001  000002B8  000002BC  000002C0
000002B8  000002B8  000002E0  000002E4  40404040  40404040  40404040
40404040  40404040  40404040  40404040  C6D4C5D9  F0F0F6F8*
02D9D3C4  40404040  40400038  40404040  00010001  0C000294  00010001
0C000298  00010001  0C00029C  00010001  0C0002A0  00010001  0C0002A4
00010001  0C0002A8  00010001  0C0002AC  C6D4C5D9  F0F0F6F9*
02E3E7E3  400002B4  40400004  40400001  880002B8  40404040  40404040
40404040  40404040  40404040  40404040  40404040  40404040  40404040
40404040  40404040  40404040  40404040  C6D4C5D9  F0F0F7F0**
02E3E7E3  40000408  40400014  40400001  00000000  00000000  0000003D
00000000  00000000  40404040  40404040  40404040  40404040  40404040
40404040  40404040  40404040  40404040  C6D4C5D9  F0F0F7F1*
02D9D3C4  40404040  40400010  40404040  00010001  0C0002B0  00010001
0C0002B4  40404040  40404040  40404040  40404040  40404040  40404040
40404040  40404040  40404040  40404040  C6D4C5D9  F0F0F7F2*
02C5D5C4  40404040  40404040  40404040  40404040  40404040  40404040
0000063A  F1F5F7F3  F460C6D6  F34040F0  F2F0F2F8  F7F0F9F8  40F0F84B
F1F54BF2  F6404040  C6D4C5D9  D9404040  C6D4C5D9  F0F0F7F3**

MEMBER NAME  FMTINT
02C5E2C4  40404040  40400010  40400001  C6D4E3C9  D5E34040  00000000
40000000  40404040  40404040  40404040  40404040  40404040  40404040
40404040  40404040  40404040  40404040  C6D4E3C9  F0F0F0F1*
02E3E7E3  40000000  40400028  40400001  47F0F00C  07C6D4E3  C9D5E340
90ECD00C  184D98CD  F0205040  D00450D0  400807FC  40404040  40404040
40404040  40404040  40404040  40404040  C6D4E3C9  F0F0F0F2*
02C5E2C4  40404040  40400010  40400002  D4E5C3C8  D9404040  02000000
40000000  40404040  40404040  40404040  40404040  40404040  40404040
40404040  40404040  40404040  40404040  C6D4E3C9  F0F0F0F3*
02E3E7E3  40000080  40400014  40400001  00000001  00000004  00000063
00000000  00000000  40404040  40404040  40404040  40404040  40404040
40404040  40404040  40404040  40404040  C6D4E3C9  F0F0F0F4*
02E3E7E3  400000B0  40400008  40400001  00000000  00000000  40404040
40404040  40404040  40404040  40404040  40404040  40404040  40404040
40404040  40404040  40404040  40404040  C6D4E3C9  F0F0F0F5*
02E3E7E3  4000009C  40400004  40400001  E7E7E7E7  40404040  40404040
40404040  40404040  40404040  40404040  40404040  40404040  40404040
40404040  40404040  40404040  40404040  C6D4E3C9  F0F0F0F6*
02E3E7E3  400000BC  40400038  40400001  58B0D08C  58A0D060  4100B004
5000D050  58F0D088  4110D04C  05EF130A  5000D070  130A4000  D06E130A
4000D06C  1BFF58E0  D00007FE  58A0D004  C6D4E3C9  F0F0F0F7*
02E3E7E3  400000F4  40400038  40400001  58E0A00C  58B0A018  5810B004
5820D070  50201000  5830B008  4840D06E  40403000  5850B00C  4860D06C
```

```
40605000  18DA92FF  A00C982C  A01C07FE  C6D4E3C9  F0F0F0F8*
02E3E7E3  4000012C  40400036  40400001  98791004  58207000  5020D070
48208000  4020D06E  48209000  4020D06C  58201000  41302000  41500004
1B255020  D08C5030  D09047F0  D0944040  C6D4E3C9  F0F0F0F9*
02E3E7E3  40000020  4040000C  40400001  0000012C  00000028  000000F0
40404040  40404040  40404040  40404040  40404040  40404040  40404040
40404040  40404040  40404040  40404040  C6D4E3C9  F0F0F1F0**
02E3E7E3  40000074  40400004  40400001  00000084  40404040  40404040
40404040  40404040  40404040  40404040  40404040  40404040  40404040
40404040  40404040  40404040  40404040  C6D4E3C9  F0F0F1F1*
02E3E7E3  4000007C  40400004  40400001  8000009C  40404040  40404040
40404040  40404040  40404040  40404040  40404040  40404040  40404040
40404040  40404040  40404040  40404040  C6D4E3C9  F0F0F1F2*
02D9D3C4  40404040  40400030  40404040  00020001  1C0000B0  00010001
0C000020  00010001  0C000024  00010001  0C000028  00010001  0C000074
00010001  0C00007C  40404040  40404040  C6D4E3C9  F0F0F1F3*
02C5D5C4  40404040  40404040  40404040  40404040  40404040  40404040
00000162  F1F5F7F3  F460C6D6  F34040F0  F2F0F2F8  F7F0F9F8  40F0F84B
F1F54BF3  F0404040  C6D4E3C9  D5E34040  C6D4E3C9  F0F0F1F4**

MEMBER NAME  FMTVER
02C5E2C4  40404040  40400010  40400001  C6D4E3E5  C5D94040  00000000
40000000  40404040  40404040  40404040  40404040  40404040  40404040
40404040  40404040  40404040  40404040  C6D4E3E5  F0F0F0F1*
02E3E7E3  40000000  40400038  40400001  47F0F00C  07C6D4E3  E5C5D940
90ECD00C  184D98CD  F0205040  D00450D0  400807FC  40404040  40404040
021A1940  E2C5D87B  40D5D6E3  40C6D6E4  C6D4E3E5  F0F0F0F2*
02E3E7E3  40000038  40400038  40400001  D5C440C6  D6D940C4  C1E2C840
10031A07  40C6D6D9  D4C1E322  021A18E2  C5D87B40  D5D6E340  C6D6E4D5
C440C6D6  D940C4C1  E2C84010  031A0740  C6D4E3E5  F0F0F0F3*
02E3E7E3  40000070  40400038  40400001  C6D6D9D4  C1E3183C  2202063C
14012202  1A1840D7  C77B40D5  D6E340C6  D6E4D5C4  40C6D6D9  40C4C1E2
C8401003  1A0740C6  D6D9D4C1  E322021A  C6D4E3E5  F0F0F0F4*
02E3E7E3  400000A8  40400038  40400001  17D7C77B  40D5D6E3  40C6D6E4
D5C440C6  D6D940C4  C1E2C840  10031A07  40C6D6D9  D4C1E318  3C22021A
1C40E2C8  C5C5E340  7B40D5D6  E340C6D6  C6D4E3E5  F0F0F0F5*
02E3E7E3  400000E0  40400038  40400001  E4D5C440  C6D6D940  C4C1E2C8
4010031A  0740C6D6  D9D4C1E3  22021A1B  E2C8C5C5  E3407B40  D5D6E340
C6D6E4D5  C440C6D6  D940C4C1  E2C84010  C6D4E3E5  F0F0F0F6*
02E3E7E3  40000118  40400038  40400001  031A0740  C6D6D9D4  C1E3183C
22021A18  40D9C5E5  40D5D6E3  40C6D6E4  D5C440C6  D6D940C4  C1E2C840
10031A07  40C6D6D9  D4C1E322  021A17D9  C6D4E3E5  F0F0F0F7*
02E3E7E3  40000150  40400038  40400001  C5E540D5  D6E340C6  D6E4D5C4
40C6D6D9  40C4C1E2  C8401003  1A0740C6  D6D9D4C1  E3183C22  021A2E40
C5D9D9D6  D97A40C9  D540C2C3  E2D3C9C2  C6D4E3E5  F0F0F0F8*
02E3E7E3  40000188  4040001E  40400001  40D9D6E4  E3C9D5C5  40C9D540
C6D4E3E5  C5D940E2  E4C2D9D6  E4E3C9D5  C5224040  40404040  40404040
40404040  40404040  40404040  40404040  C6D4E3E5  F0F0F0F9*
02E3E7E3  400001A8  40400008  40400001  E7E7E7E7  40404040  40404040
40404040  40404040  40404040  40404040  40404040  40404040  40404040
40404040  40404040  40404040  40404040  C6D4E3E5  F0F0F1F0**
02C5E2C4  40404040  40400010  40400002  C6D4E3C5  D9D94040  05000000
40002D58  40404040  40404040  40404040  40404040  40404040  40404040
40404040  40404040  40404040  40404040  C6D4E3E5  F0F0F1F1*
02E3E7E3  40000220  40400024  40400001  00000000  00000001  00000004
00000032  0000003C  00000063  000000A0  00000000  00000000  40404040
40404040  40404040  40404040  40404040  C6D4E3E5  F0F0F1F2*
02C5E2C4  40404040  40400010  40400003  C9C2C3D6  D47B4040  02000000
40000000  40404040  40404040  40404040  40404040  40404040  40404040
40404040  40404040  40404040  40404040  C6D4E3E5  F0F0F1F3*
02E3E7E3  40000268  4040000C  40400001  FFFFFFC3  00002551  00000000
```

```
40404040  40404040  40404040  40404040  40404040  40404040  40404040
40404040  40404040  40404040  40404040  C6D4E3E5  F0F0F1F4*
02C5E2C4  40404040  40400010  40400004  D2D6D4D7  D9E54040  02000000
40000000  40404040  40404040  40404040  40404040  40404040  40404040
40404040  40404040  40404040  40404040  C6D4E3E5  F0F0F1F5*
02E3E7E3  40000278  40400008  40400001  00000000  00000000  40404040
40404040  40404040  40404040  40404040  40404040  40404040  40404040
40404040  40404040  40404040  40404040  C6D4E3E5  F0F0F1F6*
02E3E7E3  40000284  40400038  40400001  5860D0C0  58A0D0B8  58B0D0BC
5880D080  5870D088  41006004  5000D054  58F0D0CC  4110D054  05EF41E0
000415FE  4720D10A  58EFD04C  07FE5800  C6D4E3E5  F0F0F1F7*
02E3E7E3  400002BC  40400038  40400001  D0A81200  4770D18A  5850B02F
5A50D074  5050B02F  19574730  D31658F0  D0C81800  45E0F004  00000006
00000028  45E0F008  0450D09C  45E0F010  C6D4E3E5  F0F0F1F8*
02E3E7E3  400002F4  40400038  40400001  58F0D0C8  45E0F004  00000000
00000050  45E0F008  0450D09C  45E0F010  58F0D0C8  45E0F000  00000000
00000079  1C4845E0  F1340001  00000125  C6D4E3E5  F0F0F1F9*
02E3E7E3  4000032C  40400038  40400001  A0010100  003C0000  000145E0

MEMBER NAME  FMTVER
F0105890  D0841399  5990D0A0  4770D20E  5850B02F  5A50D074  5050B02F
19574730  D31658F0  D0C81800  45E0F004  C6D4E3E5  F0F0F2F0**
02E3E7E3  40000364  40400008  40400001  00000006  0000007F  40404040
40404040  40404040  40404040  40404040  40404040  40404040  40404040
40404040  40404040  40404040  40404040  C6D4E3E5  F0F0F2F1*
02D9D3C4  40404040  40400038  40404040  00020001  0C000268  00020001
0C00026C  00030001  1C000278  00040001  1C00027C  00010001  0C0002E4
00010001  0C000300  00010001  0C00031C  C6D4E3E5  F0F0F2F2*
02E3E7E3  4000036C  40400038  40400001  45E0F008  0450D09C  45E0F010
58F0D0C8  45E0F004  00000000  000000A6  45E0F008  0450D09C  45E0F010
58F0D0C8  45E0F000  00000000  00000079  C6D4E3E5  F0F0F2F3*
02E3E7E3  400003A4  40400038  40400001  1C4845E0  F1340001  00000125
A0010100  003C0000  000145E0  F0104990  D0964770  D28A5850  B02F5A50
D0745050  B02F1957  4730D316  58F0D0C8  C6D4E3E5  F0F0F2F4*
02E3E7E3  400003DC  40400038  40400001  45E0F004  00000000  000000CE
45E0F008  0450D09C  45E0F010  58F0D0C8  45E0F004  00000000  000000F9
45E0F008  0450D09C  45E0F010  58F0D0C8  C6D4E3E5  F0F0F2F5*
02E3E7E3  40000414  40400038  40400001  45E0F000  00000000  00000079
1C4845E0  F1340001  00000125  A0010100  003C0000  000145E0  F0104990
D0944780  D29A1BFF  58E0D000  07FE5850  C6D4E3E5  F0F0F2F6*
02E3E7E3  4000044C  40400038  40400001  B02F5A50  D0745050  B02F1957
4730D316  58F0D0C8  45E0F004  00000000  00000125  45E0F008  0450D09C
45E0F010  58F0D0C8  45E0F004  00000000  C6D4E3E5  F0F0F2F7*
02E3E7E3  40000484  40400004  40400001  0000014C  40404040  40404040
40404040  40404040  40404040  40404040  40404040  40404040  40404040
40404040  40404040  40404040  40404040  C6D4E3E5  F0F0F2F8*
02D9D3C4  40404040  40400038  40404040  00010001  0C000368  00010001
0C000384  00010001  0C0003A0  00010001  0C0003E4  00010001  0C000400
00010001  0C00041C  00010001  0C000468  C6D4E3E5  F0F0F2F9*
02E3E7E3  40000488  40400038  40400001  45E0F008  0450D09C  45E0F010
58F0D0C8  45E0F000  00000000  00000079  1C4845E0  F1340001  00000125
A0010100  003C0000  000145E0  F0101BFF  C6D4E3E5  F0F0F3F0**
02E3E7E3  400004C0  40400038  40400001  58E0D000  07FE1BFF  58E0D000
07FE58F0  D0C81800  45E0F004  00000006  00000174  45E0F010  1BFF58E0
D00007FE  58D0D004  58E0D00C  92FFD00C  C6D4E3E5  F0F0F3F1*
02E3E7E3  400004F8  40400038  40400001  982CD01C  07FE987A  10045820
70005020  D0A04820  80004020  D0964820  90004020  D0945820  A0005020
D09C5820  10004130  20004150  00041B25  C6D4E3E5  F0F0F3F2*
02E3E7E3  40000530  4040000C  40400001  5020D0C0  5030D0C4  47F0D0D4
40404040  40404040  40404040  40404040  40404040  40404040  40404040
40404040  40404040  40404040  40404040  C6D4E3E5  F0F0F3F3*
```

| | | | | | | |
|---|---|---|---|---|---|---|
| 02E3E7E3 | 40000020 | 40400008 | 40400001 | 000004FE | 000001B0 | 40404040 |
| 40404040 | 40404040 | 40404040 | 40404040 | 40404040 | 40404040 | 40404040 |
| 40404040 | 40404040 | 40404040 | 40404040 | C6D4E3E5 | F0F0F3F4* | |
| 02E3E7E3 | 400001B0 | 40400004 | 40400001 | 000004EC | 40404040 | 40404040 |
| 40404040 | 40404040 | 40404040 | 40404040 | 40404040 | 40404040 | 40404040 |
| 40404040 | 40404040 | 40404040 | 40404040 | C6D4E3E5 | F0F0F3F5* | |
| 02E3E7E3 | 400001FC | 40400008 | 40400001 | 000002BA | 000004CE | 40404040 |
| 40404040 | 40404040 | 40404040 | 40404040 | 40404040 | 40404040 | 40404040 |
| 40404040 | 40404040 | 40404040 | 40404040 | C6D4E3E5 | F0F0F3F6* | |
| 02D9D3C4 | 40404040 | 40400038 | 40404040 | 00010001 | 0C000484 | 00010001 |
| 0C0004A0 | 00010001 | 0C0004DC | 00010001 | 0C000020 | 00010001 | 0C000024 |
| 00010001 | 0C0001B0 | 00010001 | 0C0001FC | C6D4E3E5 | F0F0F3F7* | |
| 02E3E7E3 | 40000208 | 40400014 | 40400001 | 00000224 | 000001A8 | 00000228 |
| 00000224 | 80000258 | 40404040 | 40404040 | 40404040 | 40404040 | 40404040 |
| 40404040 | 40404040 | 40404040 | 40404040 | C6D4E3E5 | F0F0F3F8* | |
| 02E3E7E3 | 40000280 | 40400004 | 40400001 | 00000000 | 40404040 | 40404040 |
| 40404040 | 40404040 | 40404040 | 40404040 | 40404040 | 40404040 | 40404040 |

MEMBER NAME FMTVER

| | | | | | | |
|---|---|---|---|---|---|---|
| 40404040 | 40404040 | 40404040 | 40404040 | C6D4E3E5 | F0F0F3F9* | |
| 02D9D3C4 | 40404040 | 40400030 | 40404040 | 00010001 | 0C000200 | 00010001 |
| 0C000208 | 00010001 | 0C00020C | 00010001 | 0C000210 | 00010001 | 0C000214 |
| 00010001 | 0C000218 | 40404040 | 40404040 | C6D4E3E5 | F0F0F4F0** | |
| 02C5D5C4 | 40404040 | 40404040 | 40404040 | 40404040 | 40404040 | 40404040 |
| 0000053C | F1F5F7F3 | F460C6D6 | F34040F0 | F2F0F2F8 | F7F0F9F8 | 40F0F84B |
| F1F54BF3 | F4404040 | C6D4E3E5 | C5D94040 | C6D4E3E5 | F0F0F4F1** | |

MEMBER NAME FMWRN

| | | | | | | |
|---|---|---|---|---|---|---|
| 02C5E2C4 | 40404040 | 40400010 | 40400001 | C6D4E6D9 | D5404040 | 00000000 |
| 40000000 | 40404040 | 40404040 | 40404040 | 40404040 | 40404040 | 40404040 |
| 40404040 | 40404040 | 40404040 | 40404040 | C6D4E6D9 | F0F0F0F1* | |
| 02E3E7E3 | 40000000 | 40400038 | 40400001 | 47F0F00C | 07C6D4E6 | D9D54040 |
| 90ECD00C | 184D98CD | F0205040 | D00450D0 | 400807FC | 40404040 | 40404040 |
| 021A1C40 | C5D9D9D6 | D940C9D5 | 40C6D4E6 | C6D4E6D9 | F0F0F0F2* | |
| 02E3E7E3 | 40000038 | 40400038 | 40400001 | D9D5404D | E2E4D7C5 | D940E3C5 |
| E7E35D22 | C6D6D9D4 | C1E340C3 | C8C1D9E3 | 40E6C1D9 | D5C9D5C7 | E2404040 |
| C6D6D9D4 | C1E340E6 | C1D9D5C9 | D5C740D4 | C6D4E6D9 | F0F0F0F3* | |
| 02E3E7E3 | 40000070 | 40400020 | 40400001 | C5E2E2C1 | C7C5E240 | C6D6D9D4 |
| C1E340C3 | C8C1D9E3 | 40E6C1D9 | D5C9D5C7 | E2404040 | 40404040 | 40404040 |
| 40404040 | 40404040 | 40404040 | 40404040 | C6D4E6D9 | F0F0F0F4* | |
| 02E3E7E3 | 400002B8 | 40400038 | 40400001 | 00000000 | 00000001 | 00000003 |
| 00000004 | 00000015 | 00000017 | 00000032 | 00000049 | 00000078 | 401DF3B6 |
| 4029FBE7 | 403EF9DB | 40800000 | 41200000 | C6D4E6D9 | F0F0F0F5* | |
| 02C5E2C4 | 40404040 | 40400010 | 40400002 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | C6D4E6D9 | F0F0F0F6* | |
| 02E3E7E3 | 400002F0 | 40400030 | 40400001 | 41280000 | 412C0000 | 41300000 |
| 41400000 | 41473333 | 41480000 | 4154353F | 415C353F | 415E6666 | 42110000 |
| 00000000 | 00000000 | 40404040 | 40404040 | C6D4E6D9 | F0F0F0F7* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C6D4E6D9 | F0F0F0F8* | |
| 02E3E7E3 | 400003D8 | 40400008 | 40400001 | FFFFFFFF | 00000000 | 40404040 |
| 40404040 | 40404040 | 40404040 | 40404040 | 40404040 | 40404040 | 40404040 |
| 40404040 | 40404040 | 40404040 | 40404040 | C6D4E6D9 | F0F0F0F9* | |
| 02C5E2C4 | 40404040 | 40400010 | 40400004 | C3C1C4D3 | D5F14040 | 02000000 |
| 40000000 | 40404040 | 40404040 | 40404040 | 40404040 | 40404040 | 40404040 |
| 40404040 | 40404040 | 40404040 | 40404040 | C6D4E6D9 | F0F0F1F0** | |
| 02C5E2C4 | 40404040 | 40400010 | 40400005 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | C6D4E6D9 | F0F0F1F1* | |

```
02C5E2C4 40404040 40400010 40400006 C8C7C4C1 E3C54040 02000000
40000000 40404040 40404040 40404040 40404040 40404040 40404040
40404040 40404040 40404040 40404040 C6D4E6D9 F0F0F1F2*
02C5E2C4 40404040 40400010 40400007 C8C7E3C9 D4C54040 02000000
40000000 40404040 40404040 40404040 40404040 40404040 40404040
40404040 40404040 40404040 40404040 C6D4E6D9 F0F0F1F3*
02C5E2C4 40404040 40400010 40400008 C9C2C3D6 D47B4040 02000000
40000000 40404040 40404040 40404040 40404040 40404040 40404040
40404040 40404040 40404040 40404040 C6D4E6D9 F0F0F1F4*
02C5E2C4 40404040 40400010 40400009 C9C3D5E3 C5D94040 02000000
40000000 40404040 40404040 40404040 40404040 40404040 40404040
40404040 40404040 40404040 40404040 C6D4E6D9 F0F0F1F5*
02E3E7E3 400003E4 4040001C 40400001 00000000 00000000 00000000
00000000 00000000 00000000 00000000 40404040 40404040 40404040
40404040 40404040 40404040 40404040 C6D4E6D9 F0F0F1F6*
02D9D3C4 40404040 40400038 40404040 00020001 0C0003D8 00030001
1C0003E4 00040001 1C0003E8 00050001 1C0003EC 00060001 1C0003F0
00070001 1C0003F4 00080001 1C0003F8 C6D4E6D9 F0F0F1F7*
02E3E7E3 40000358 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 C6D4E6D9 F0F0F1F8*
02E3E7E3 40000390 40400038 40400001 C45B5BE2 D3C9C340 E5C5D9E2
C9D6D540 E7E74BE7 40404040 40404040 4040C4C1 E3C57A40 E7E761E7
E761E7E7 40404040 4040E3C9 D4C57A40 C6D4E6D9 F0F0F1F9*
02E3E7E3 400003C8 40400008 40400001 E7E77AE7 E77AE7E7 40404040

MEMBER NAME  FMWRN
40404040 40404040 40404040 40404040 40404040 40404040 40404040
40404040 40404040 40404040 40404040 C6D4E6D9 F0F0F2F0**
02E3E7E3 40000414 40400038 40400001 5880D348 58B0D34C 5870D378
4100D310 5000D078 58F0D354 4110D074 05EF58F0 D3644110 D08005EF
58F0D360 4110D084 05EF7800 D2783300 C6D4E6D9 F0F0F2F1*
02E3E7E3 4000044C 40400038 40400001 7000D2B8 7800D280 33007000
D2947800 D2703300 7000D29C 7800D268 33007000 D2A07800 D2807000
D2987800 D2647000 D2A47800 D2747000 C6D4E6D9 F0F0F2F2*
02E3E7E3 40000484 40400038 40400001 D2AC58F0 D35C4110 D08805EF
41E00004 15FE4720 D41058EF D04C07FE 7800D268 7000D2AC 7800D26C
33007000 D37C58F0 D35C4110 D0D005EF C6D4E6D9 F0F0F2F3*
02E3E7E3 400004BC 40400038 40400001 41E00004 15FE4720 D43C58EF
D05407FE 7800D260 7000D2AC 58F0D35C 4110D118 05EF41E0 000415FE
4720D45E 58EFD05C 07FE7800 D2A47000 C6D4E6D9 F0F0F2F4*
02E3E7E3 400004F4 40400038 40400001 D2A858F0 D3584110 D16005EF
7800D2A8 7B00D258 7000D2A8 58F0D358 4110D160 05EF7800 D25C7000
D2AC5800 D2BC1200 4780D508 5890D22C C6D4E6D9 F0F0F2F5*
02E3E7E3 4000052C 40400038 40400001 18A7410A B0005000 D17058F0
D36C4110 D17005EF 5000D2B4 410AB000 5000D190 58F0D35C 4110D178
05EF41E0 000415FE 4720D4D6 58EFD064 C6D4E6D9 F0F0F2F6*
02E3E7E3 40000564 40400038 40400001 07FE7800 D2AC7B00 D2587000
D2AC7800 D2A87B00 D2587000 D2A858F0 D3584110 D16005EF 5A90D22C
5AA0D240 5990D2BC 47C0D49E 58F0D358 C6D4E6D9 F0F0F2F7*
02E3E7E3 4000059C 40400038 40400001 4110D1C0 05EF58F0 D3584110
D1D005EF 7800D284 33007000 D37C58F0 D35C4110 D1E005EF 41E00004
15FE4720 D54058EF D06C07FE 1BFF58E0 C6D4E6D9 F0F0F2F8*
02E3E7E3 400005D4 40400038 40400001 D00007FE 58F0D368 45E0F004
00000006 00000028 45E0F010 1BFF58E0 D00007FE 58D0D004 58E0D00C
92FFD00C 982CD01C 07FE5870 10045820 C6D4E6D9 F0F0F2F9*
02E3E7E3 4000060C 40400026 40400001 70005020 D2BC5820 10004130
20004150 00011B25 5C40D240 1B255020 D34C5030 D35047F0 D3844040
40404040 40404040 40404040 40404040 C6D4E6D9 F0F0F3F0**
02E3E7E3 40000020 40400008 40400001 00000606 00000090 40404040
40404040 40404040 40404040 40404040 40404040 40404040 40404040
```

```
40404040  40404040  40404040  40404040  C6D4E6D9  F0F0F3F1*
02E3E7E3  40000090  40400004  40400001  000005F4  40404040  40404040
40404040  40404040  40404040  40404040  40404040  40404040  40404040
40404040  40404040  40404040  40404040  C6D4E6D9  F0F0F3F2*
02E3E7E3  400000DC  4040000C  40400001  000004A0  000005D8  000004CC
40404040  40404040  40404040  40404040  40404040  40404040  40404040
40404040  40404040  40404040  40404040  C6D4E6D9  F0F0F3F3*
02D9D3C4  40404040  40400038  40404040  00090001  1C0003FC  00010001
0C0005E4  00010001  0C000020  00010001  0C000024  00010001  0C000090
00010001  0C0000DC  00010001  0C0000E0  C6D4E6D9  F0F0F3F4*
02E3E7E3  400000E8  4040001C  40400001  000005D8  000004EE  000005D8
00000566  000005D8  000005D0  000005D8  40404040  40404040  40404040
40404040  40404040  40404040  40404040  C6D4E6D9  F0F0F3F5*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  C6D4E6D9  F0F0F3F6*
02E3E7E3  40000104  40400004  40400001  000002C4  40404040  40404040
40404040  40404040  40404040  40404040  40404040  40404040  40404040
40404040  40404040  40404040  40404040  C6D4E6D9  F0F0F3F7*
02E3E7E3  4000010C  40400018  40400001  80000014  800003C8  800003B4
00000348  0000033C  000002B8  40404040  40404040  40404040  40404040
40404040  40404040  40404040  40404040  C6D4E6D9  F0F0F3F8*
02D9D3C4  40404040  40400038  40404040  00010001  0C000100  00010001
0C000104  00020001  0C00010C  00010001  0C000110  00010001  0C000114

MEMBER NAME  FMWRN
00010001  0C000118  00010001  0C00011C  C6D4E6D9  F0F0F3F9*
02E3E7E3  40000124  4040001C  40400001  000002D8  000002E0  000002DC
00000358  000002B8  000002B8  000002B8  40404040  40404040  40404040
40404040  40404040  40404040  40404040  C6D4E6D9  F0F0F4F0**
02D9D3C4  40404040  40400038  40404040  00010001  0C000120  00010001
0C000124  00010001  0C000128  00010001  0C00012C  00010001  0C000130
00010001  0C000134  00010001  0C000138  C6D4E6D9  F0F0F4F1*
02E3E7E3  40000140  4040001C  40400001  000002B8  000002BC  000002C0
000002B8  000002B8  000002E0  000002E4  40404040  40404040  40404040
40404040  40404040  40404040  40404040  C6D4E6D9  F0F0F4F2*
02D9D3C4  40404040  40400038  40404040  00010001  0C00013C  00010001
0C000140  00010001  0C000144  00010001  0C000148  00010001  0C00014C
00010001  0C000150  00010001  0C000154  C6D4E6D9  F0F0F4F3*
02E3E7E3  4000015C  4040001C  40400001  800002B8  0000040C  0000033C
000002B8  000002C8  000002E0  000002DC  40404040  40404040  40404040
40404040  40404040  40404040  40404040  C6D4E6D9  F0F0F4F4*
02D9D3C4  40404040  40400038  40404040  00010001  0C000158  00010001
0C00015C  00010001  0C000160  00010001  0C000164  00010001  0C000168
00010001  0C00016C  00010001  0C000170  C6D4E6D9  F0F0F4F5*
02E3E7E3  40000178  4040001C  40400001  00000078  000002B8  000002B8
000002B8  000002B8  000002BC  000002C0  40404040  40404040  40404040
40404040  40404040  40404040  40404040  C6D4E6D9  F0F0F4F6*
02D9D3C4  40404040  40400038  40404040  00010001  0C000174  00010001
0C000178  00010001  0C00017C  00010001  0C000180  00010001  0C000184
00010001  0C000188  00010001  0C00018C  C6D4E6D9  F0F0F4F7*
02E3E7E3  40000194  4040001C  40400001  000002B8  000002B8  000002E0
000002E4  800002B8  00000348  0000033C  40404040  40404040  40404040
40404040  40404040  40404040  40404040  C6D4E6D9  F0F0F4F8*
02D9D3C4  40404040  40400038  40404040  00010001  0C000190  00010001
0C000194  00010001  0C000198  00010001  0C00019C  00010001  0C0001A0
00010001  0C0001A4  00010001  0C0001A8  C6D4E6D9  F0F0F4F9*
02E3E7E3  400001B0  4040001C  40400001  000002B8  000002CC  000002E0
000002DC  00000060  000002B8  000002B8  40404040  40404040  40404040
40404040  40404040  40404040  40404040  C6D4E6D9  F0F0F5F0**
02D9D3C4  40404040  40400038  40404040  00010001  0C0001AC  00010001
```

```
0C0001B0  00010001  0C0001B4  00010001  0C0001B8  00010001  0C0001BC
00010001  0C0001C0  00010001  0C0001C4  C6D4E6D9  F0F0F5F1*
02E3E7E3  400001CC  4040001C  40400001  000002B8  000002B8  000002BC
000002C0  000002B8  000002B8  000002E0  40404040  40404040  40404040
40404040  40404040  40404040  40404040  C6D4E6D9  F0F0F5F2*
02D9D3C4  40404040  40400038  40404040  00010001  0C0001C8  00010001
0C0001CC  00010001  0C0001D0  00010001  0C0001D4  00010001  0C0001D8
00010001  0C0001DC  00010001  0C0001E0  C6D4E6D9  F0F0F5F3*
02E3E7E3  400001E8  40400018  40400001  000002E4  800002B8  00000324
00000338  00000328  80000338  40404040  40404040  40404040  40404040
40404040  40404040  40404040  40404040  C6D4E6D9  F0F0F5F4*
02E3E7E3  40000204  40400004  40400001  800002D0  40404040  40404040
40404040  40404040  40404040  40404040  40404040  40404040  40404040
40404040  40404040  40404040  40404040  C6D4E6D9  F0F0F5F5*
02D9D3C4  40404040  40400038  40404040  00010001  0C0001E4  00010001
0C0001E8  00010001  0C0001EC  00010001  0C0001F0  00010001  0C0001F4
00010001  0C0001F8  00010001  0C0001FC  C6D4E6D9  F0F0F5F6*
02E3E7E3  40000208  40400018  40400001  00000348  0000033C  000002B8
00000344  000002E0  000002DC  40404040  40404040  40404040  40404040
40404040  40404040  40404040  40404040  C6D4E6D9  F0F0F5F7*
02E3E7E3  40000224  40400004  40400001  000002B8  40404040  40404040
40404040  40404040  40404040  40404040  40404040  40404040  40404040
40404040  40404040  40404040  40404040  C6D4E6D9  F0F0F5F8*

MEMBER NAME  FMWRN
02D9D3C4  40404040  40400038  40404040  00010001  0C000204  00010001
0C000208  00010001  0C00020C  00010001  0C000210  00010001  0C000214
00010001  0C000218  00010001  0C00021C  C6D4E6D9  F0F0F5F9*
02E3E7E3  40000228  4040001C  40400001  000002B8  000002B8  000002B8
000002BC  000002C0  000002B8  000002B8  40404040  40404040  40404040
40404040  40404040  40404040  40404040  C6D4E6D9  F0F0F6F0**
02D9D3C4  40404040  40400038  40404040  00010001  0C000224  00010001
0C000228  00010001  0C00022C  00010001  0C000230  00010001  0C000234
00010001  0C000238  00010001  0C00023C  C6D4E6D9  F0F0F6F1*
02E3E7E3  40000244  4040001C  40400001  000002E0  000002E4  800002B8
00000324  00000334  00000324  80000338  40404040  40404040  40404040
40404040  40404040  40404040  40404040  C6D4E6D9  F0F0F6F2*
02D9D3C4  40404040  40400038  40404040  00010001  0C000240  00010001
0C000244  00010001  0C000248  00010001  0C00024C  00010001  0C000250
00010001  0C000254  00010001  0C000258  C6D4E6D9  F0F0F6F3*
02E3E7E3  40000260  4040001C  40400001  00000328  00000334  00000328
80000338  0000040C  000002EC  000002B8  40404040  40404040  40404040
40404040  40404040  40404040  40404040  C6D4E6D9  F0F0F6F4*
02D9D3C4  40404040  40400038  40404040  00010001  0C00025C  00010001
0C000260  00010001  0C000264  00010001  0C000268  00010001  0C00026C
00010001  0C000270  00010001  0C000274  C6D4E6D9  F0F0F6F5*
02E3E7E3  4000027C  4040001C  40400001  000002C8  000002E0  000002DC
00000048  000002B8  000002B8  000002B8  40404040  40404040  40404040
40404040  40404040  40404040  40404040  C6D4E6D9  F0F0F6F6*
02D9D3C4  40404040  40400038  40404040  00010001  0C000278  00010001
0C00027C  00010001  0C000280  00010001  0C000284  00010001  0C000288
00010001  0C00028C  00010001  0C000290  C6D4E6D9  F0F0F6F7*
02E3E7E3  40000298  4040001C  40400001  000002B8  000002BC  000002C0
000002B8  000002B8  000002E0  000002E4  40404040  40404040  40404040
40404040  40404040  40404040  40404040  C6D4E6D9  F0F0F6F8*
02D9D3C4  40404040  40400038  40404040  00010001  0C000294  00010001
0C000298  00010001  0C00029C  00010001  0C0002A0  00010001  0C0002A4
00010001  0C0002A8  00010001  0C0002AC  C6D4E6D9  F0F0F6F9*
02E3E7E3  400002B4  40400004  40400001  800002B8  40404040  40404040
40404040  40404040  40404040  40404040  40404040  40404040  40404040
40404040  40404040  40404040  40404040  C6D4E6D9  F0F0F7F0**
```

```
02E3E7E3  40000400  40400014  40400001  00000000  00000000  00000033
00000000  00000000  40404040  40404040  40404040  40404040  40404040
40404040  40404040  40404040  40404040  C6D4E6D9  F0F0F7F1*
02D9D3C4  40404040  40400010  40404040  00010001  0C0002B0  00010001
0C0002B4  40404040  40404040  40404040  40404040  40404040  40404040
40404040  40404040  40404040  40404040  C6D4E6D9  F0F0F7F2*
02C5D5C4  40404040  40404040  40404040  40404040  40404040  40404040
00000632  F1F5F7F3  F460C6D6  F34040F0  F2F0F2F8  F7F0F9F8  40F0F84B
F1F54BF3  F9404040  C6D4E6D9  D5404040  C6D4E6D9  F0F0F7F3**

MEMBER NAME  FPVAL
02C5E2C4  40404040  40400010  40400001  C6D7E5C1  D3404040  00000000
40000000  40404040  40404040  40404040  40404040  40404040  40404040
40404040  40404040  40404040  40404040  C6D7E5C1  F0F0F0F1*
02E3E7E3  40000000  40400038  40400001  47F0F00C  07C6D7E5  C1D34040
90ECD00C  184D98CD  F0205040  D00450D0  400807FC  40404040  40404040
021A23C5  D9D9D6D9  40C9D540  C2C3E2D3  C6D7E5C1  F0F0F0F2*
02E3E7E3  40000038  40400017  40400001  C9C240C9  D540C6D7  E5C1D340
E2E4C2D9  D6E4E3C9  D5C52240  40404040  40404040  40404040  40404040
40404040  40404040  40404040  40404040  C6D7E5C1  F0F0F0F3*
02E3E7E3  40000050  40400030  40400001  4E404040  40404040  4B404040
40404040  60404040  40404040  F9404040  40404040  F0404040  40404040
40404040  40404040  40404040  40404040  C6D7E5C1  F0F0F0F4*
02E3E7E3  400001A0  40400038  40400001  4E000000  00000000  4E000000
80000000  00000000  00000000  00000000  00000001  00000001  00000004
0000000A  00000014  0000003C  00000000  C6D7E5C1  F0F0F0F5*
02C5E2C4  40404040  40400010  40400002  C7C5E340  40404040  02000000
40000000  40404040  40404040  40404040  40404040  40404040  40404040
40404040  40404040  40404040  40404040  C6D7E5C1  F0F0F0F6*
02E3E7E3  400001D8  40400004  40400001  00000000  40404040  40404040
40404040  40404040  40404040  40404040  40404040  40404040  40404040
40404040  40404040  40404040  40404040  C6D7E5C1  F0F0F0F7*
02C5E2C4  40404040  40400010  40400003  C9E2D9C3  C8404040  02000000
40000000  40404040  40404040  40404040  40404040  40404040  40404040
40404040  40404040  40404040  40404040  C6D7E5C1  F0F0F0F8*
02C5E2C4  40404040  40400010  40400004  C6C9E7D7  C97B4040  02000000
40000000  40404040  40404040  40404040  40404040  40404040  40404040
40404040  40404040  40404040  40404040  C6D7E5C1  F0F0F0F9*
02C5E2C4  40404040  40400010  40400005  C9C2C3D6  D47B4040  02000000
40000000  40404040  40404040  40404040  40404040  40404040  40404040
40404040  40404040  40404040  40404040  C6D7E5C1  F0F0F1F0**
02C5E2C4  40404040  40400010  40400006  D2D6D4D7  D9E54040  02000000
40000000  40404040  40404040  40404040  40404040  40404040  40404040
40404040  40404040  40404040  40404040  C6D7E5C1  F0F0F1F1*
02E3E7E3  40000228  40400018  40400001  00000000  00000000  00000000
00000000  00000000  00000000  40404040  40404040  40404040  40404040
40404040  40404040  40404040  40404040  C6D7E5C1  F0F0F1F2*
02E3E7E3  40000208  40400004  40400001  000000F0  40404040  40404040
40404040  40404040  40404040  40404040  40404040  40404040  40404040
40404040  40404040  40404040  40404040  C6D7E5C1  F0F0F1F3*
02E3E7E3  40000244  40400038  40400001  58A0D1BC  5830D13C  5800D130
5000D168  5800D134  5000D16C  5000D170  5800D130  5000D178  5800D134
5000D174  5800D140  5000D160  5890D150  C6D7E5C1  F0F0F1F4*
02E3E7E3  4000027C  40400038  40400001  58B0D140  5990D160  4770D20C
47F0D418  58F0D1AC  4110D07C  05EF41E0  000415FE  4720D226  58EFD04C
07FE5800  D1645900  D1604780  D23647F0  C6D7E5C1  F0F0F1F5*
02E3E7E3  400002B4  40400038  40400001  D2445800  D1601A0B  5000D160
47F0D200  5800D160  5B00D140  5000D160  5860D168  5870D170  5880D16C
5890D174  58B0D178  5800D160  5A00D140  C6D7E5C1  F0F0F1F6*
02E3E7E3  400002EC  40400038  40400001  5000D160  58F0D1A8  4110D090
05EF58F0  D1B84110  D09C05EF  5080D16C  5090D174  50B0D178  41E00004
15FE4720  D2A058EF  D05407FE  58F0D1B8  C6D7E5C1  F0F0F1F7*
```

```
02E3E7E3  40000324  40400038  40400001  4110D0B4  05EF5080  D16C5090
D17450B0  D17841E0  000415FE  4720D2C6  58EFD05C  07FE5800  D18C1200
4750D2DA  5800D190  120047C0  D37A58F0  C6D7E5C1  F0F0F1F8*
02E3E7E3  4000035C  40400038  40400001  D1B84110  D0CC05EF  5080D16C
5090D174  50B0D178  41E00004  15FE4720  D30058EF  D06407FE  5800D184
12004780  D3B858F0  D1B84110  D0E405EF  C6D7E5C1  F0F0F1F9*
02E3E7E3  40000394  40400038  40400001  5080D16C  5090D174  50B0D178

MEMBER NAME  FPVAL
41E00004  15FE4720  D33058EF  D06C07FE  5800D184  12004780  D3BE58F0
D1B84110  D0FC05EF  5080D16C  5090D174  C6D7E5C1  F0F0F2F0**
02E3E7E3  400003CC  40400038  40400001  50B0D178  41E00004  15FE4720
D36058EF  D07407FE  5800D184  12004780  D3B05080  D16C5090  D17450B0
D17847F0  D3C45800  D1345000  D1A01B22  C6D7E5C1  F0F0F2F1*
02E3E7E3  40000404  40400038  40400001  4320D15C  4220D1A3  18595C40
D1481825  5A20D1A0  18925B90  D1885A70  D1401BFF  876FD3AC  5A80D140
47F0D264  58B0D130  47F0D264  18B347F0  C6D7E5C1  F0F0F2F2*
02E3E7E3  4000043C  40400038  40400001  D2641863  47F0D264  5800D178
1BFF870F  D3D85800  D1741300  5000D174  58F0D1B0  4110D114  05EF1800
5700D12C  5000D124  6840D120  6B40D128  C6D7E5C1  F0F0F2F3*
02E3E7E3  40000474  40400038  40400001  5800D174  5700D12C  5000D124
6820D120  6B20D128  38023D04  7000D17C  1BFF58E0  D00007FE  7800D138
7000D17C  1BFF58E0  D00007FE  58F0D1B4  C6D7E5C1  F0F0F2F4*
02E3E7E3  400004AC  40400038  40400001  45E0F004  00000006  00000028
45E0F010  58F0D1B4  45E0F034  05404040  F1F558A0  D00458E0  A00C58B0
A0185810  B0047820  D17C7020  100018DA  C6D7E5C1  F0F0F2F5*
02E3E7E3  400004E4  40400038  40400001  92FFA00C  982CA01C  07FE5870
10047820  70007020  D17C5820  10004130  20004150  00011B25  5020D1BC
5030D1C0  5030D07C  5030D090  47F0D1C4  C6D7E5C1  F0F0F2F6*
02E3E7E3  40000020  40400008  40400001  000004EE  00000080  40404040
40404040  40404040  40404040  40404040  40404040  40404040  40404040
40404040  40404040  40404040  40404040  C6D7E5C1  F0F0F2F7*
02D9D3C4  40404040  40400038  40404040  00020001  1C000228  00030001
1C00022C  00040001  1C000230  00050001  1C000234  00060001  1C000238
00010001  0C0004B4  00010001  0C000020  C6D7E5C1  F0F0F2F8*
02E3E7E3  40000080  40400004  40400001  000004CA  40404040  40404040
40404040  40404040  40404040  40404040  40404040  40404040  40404040
40404040  40404040  40404040  40404040  C6D7E5C1  F0F0F2F9*
02E3E7E3  400000CC  40400018  40400001  000002A6  000004A8  00000320
000004A8  00000346  000004A8  40404040  40404040  40404040  40404040
40404040  40404040  40404040  40404040  C6D7E5C1  F0F0F3F0**
02D9D3C4  40404040  40400038  40404040  00010001  0C000024  00010001
0C000080  00010001  0C0000CC  00010001  0C0000D0  00010001  0C0000D4
00010001  0C0000D8  00010001  0C0000DC  C6D7E5C1  F0F0F3F1*
02E3E7E3  400000E4  40400018  40400001  00000380  000004A8  000003B0
000004A8  000003E0  000004A8  40404040  40404040  40404040  40404040
40404040  40404040  40404040  40404040  C6D7E5C1  F0F0F3F2*
02E3E7E3  40000100  40400004  40400001  000001E0  40404040  40404040
40404040  40404040  40404040  40404040  40404040  40404040  40404040
40404040  40404040  40404040  40404040  C6D7E5C1  F0F0F3F3*
02D9D3C4  40404040  40400038  40404040  00010001  0C0000E0  00010001
0C0000E4  00010001  0C0000E8  00010001  0C0000EC  00010001  0C0000F0
00010001  0C0000F4  00010001  0C0000F8  C6D7E5C1  F0F0F3F4*
02E3E7E3  40000104  4040000C  40400001  000001CC  00000078  800001E4
40404040  40404040  40404040  40404040  40404040  40404040  40404040
40404040  40404040  40404040  40404040  C6D7E5C1  F0F0F3F5*
02E3E7E3  40000114  40400010  40400001  000001E0  800001DC  000001DC
000001C0  40404040  40404040  40404040  40404040  40404040  40404040
40404040  40404040  40404040  40404040  C6D7E5C1  F0F0F3F6*
02D9D3C4  40404040  40400038  40404040  00010001  0C000100  00010001
0C000104  00010001  0C000108  00010001  0C00010C  00010001  0C000114
```

```
00010001  0C000118  00010001  0C00011C  C6D7E5C1  F0F0F3F7*
02E3E7E3  40000124  4040001C  40400001  00000070  000001C0  000001C0
8000020C  000001DC  000001C0  00000068  40404040  40404040  40404040
40404040  40404040  40404040  40404040  C6D7E5C1  F0F0F3F8*
02D9D3C4  40404040  40400038  40404040  00010001  0C000120  00010001
0C000124  00010001  0C000128  00010001  0C00012C  00010001  0C000130

MEMBER NAME  FPVAL
00010001  0C000134  00010001  0C000138  C6D7E5C1  F0F0F3F9*
02E3E7E3  40000140  4040001C  40400001  000001C0  000001C0  80000210
000001DC  000001C0  00000060  000001C0  40404040  40404040  40404040
40404040  40404040  40404040  40404040  C6D7E5C1  F0F0F4F0**
02D9D3C4  40404040  40400038  40404040  00010001  0C00013C  00010001
0C000140  00010001  0C000144  00010001  0C000148  00010001  0C00014C
00010001  0C000150  00010001  0C000154  C6D7E5C1  F0F0F4F1*
02E3E7E3  4000015C  4040001C  40400001  000001C0  80000204  000001DC
000001C0  00000058  000001C0  000001C0  40404040  40404040  40404040
40404040  40404040  40404040  40404040  C6D7E5C1  F0F0F4F2*
02D9D3C4  40404040  40400038  40404040  00010001  0C000158  00010001
0C00015C  00010001  0C000160  00010001  0C000164  00010001  0C000168
00010001  0C00016C  00010001  0C000170  C6D7E5C1  F0F0F4F3*
02E3E7E3  40000178  4040001C  40400001  80000204  000001DC  000001C0
00000050  000001C0  000001C0  80000204  40404040  40404040  40404040
40404040  40404040  40404040  40404040  C6D7E5C1  F0F0F4F4*
02D9D3C4  40404040  40400038  40404040  00010001  0C000174  00010001
0C000178  00010001  0C00017C  00010001  0C000180  00010001  0C000184
00010001  0C000188  00010001  0C00018C  C6D7E5C1  F0F0F4F5*
02E3E7E3  40000194  40400008  40400001  000001C8  800001EC  40404040
40404040  40404040  40404040  40404040  40404040  40404040  40404040
40404040  40404040  40404040  40404040  C6D7E5C1  F0F0F4F6*
02D9D3C4  40404040  40400018  40404040  00010001  0C000190  00010001
0C000194  00010001  0C000198  40404040  40404040  40404040  40404040
40404040  40404040  40404040  40404040  C6D7E5C1  F0F0F4F7*
02C5D5C4  40404040  40404040  40404040  40404040  40404040  40404040
0000051C  F1F5F7F3  F460C6D6  F34040F0  F2F0F2F8  F7F0F9F8  40F0F84B
F1F54BF4  F3404040  C6D7E5C1  D3404040  C6D7E5C1  F0F0F4F8**

MEMBER NAME  FTINFO
02C5E2C4  40404040  40400010  40400001  C6E3C9D5  C6D64040  00000000
40000000  40404040  40404040  40404040  40404040  40404040  40404040
40404040  40404040  40404040  40404040  C6E3C9D5  F0F0F0F1*
02E3E7E3  40000000  40400038  40400001  47F0F00C  07C6E3C9  D5C6D640
90ECD00C  184D98CD  F0205040  D00450D0  400807FC  40404040  40404040
021A2D40  C5D9D9D6  D940C9D5  40C2C3E2  C6E3C9D5  F0F0F0F2*
02E3E7E3  40000038  40400021  40400001  D3C9C240  D9D6E4E3  C9D5C540
C9D540C6  E3C9D5C6  D640E2E4  C2D9D6E4  E3C9D5C5  22404040  40404040
40404040  40404040  40404040  40404040  C6E3C9D5  F0F0F0F3*
02E3E7E3  40000060  40400038  40400001  40404040  40404040  40404040
40404040  D9C5E540  40404040  E3404040  40404040  E2C8C5C5  E3404040
E2C5D87B  40404040  7B404040  40404040  C6E3C9D5  F0F0F0F4*
02E3E7E3  40000098  40400008  40400001  D7C77B40  40404040  40404040
40404040  40404040  40404040  40404040  40404040  40404040  40404040
40404040  40404040  40404040  40404040  C6E3C9D5  F0F0F0F5*
02E3E7E3  400001F8  40400038  40400001  00000000  00000000  4F080000
00000000  00000000  00000000  00000001  00000002  00000003  00000004
00000005  00000006  00000008  00000000  C6E3C9D5  F0F0F0F6*
02C5E2C4  40404040  40400010  40400002  E5F9F940  40404040  05000000
4000003C  40404040  40404040  40404040  40404040  40404040  40404040
40404040  40404040  40404040  40404040  C6E3C9D5  F0F0F0F7*
02E3E7E3  40000230  40400004  40400001  00000000  40404040  40404040
40404040  40404040  40404040  40404040  40404040  40404040  40404040
```

```
40404040  40404040  40404040  40404040  C6E3C9D5  F0F0F0F8*
02E3E7E3  40000418  40400008  40400001  FFFFFFFC  00000000  40404040
40404040  40404040  40404040  40404040  40404040  40404040  40404040
40404040  40404040  40404040  40404040  C6E3C9D5  F0F0F0F9*
02C5E2C4  40404040  40400010  40400003  D4E5C3C8  D9404040  02000000
40000000  40404040  40404040  40404040  40404040  40404040  40404040
40404040  40404040  40404040  40404040  C6E3C9D5  F0F0F1F0**
02E3E7E3  40000424  40400004  40400001  00000000  40404040  40404040
40404040  40404040  40404040  40404040  40404040  40404040  40404040
40404040  40404040  40404040  40404040  C6E3C9D5  F0F0F1F1*
02C5E2C4  40404040  40400010  40400004  C3D4D7D9  E2E24040  02000000
40000000  40404040  40404040  40404040  40404040  40404040  40404040
40404040  40404040  40404040  40404040  C6E3C9D5  F0F0F1F2*
02C5E2C4  40404040  40400010  40400005  C9C2C3D6  D47B4040  02000000
40000000  40404040  40404040  40404040  40404040  40404040  40404040
40404040  40404040  40404040  40404040  C6E3C9D5  F0F0F1F3*
02C5E2C4  40404040  40400010  40400006  C9E2D9C3  C8E54040  02000000
40000000  40404040  40404040  40404040  40404040  40404040  40404040
40404040  40404040  40404040  40404040  C6E3C9D5  F0F0F1F4*
02C5E2C4  40404040  40400010  40400007  E2D7D3E3  E7E34040  02000000
40000000  40404040  40404040  40404040  40404040  40404040  40404040
40404040  40404040  40404040  40404040  C6E3C9D5  F0F0F1F5*
02E3E7E3  4000042C  40400014  40400001  00000000  00000000  00000000
00000000  00000000  40404040  40404040  40404040  40404040  40404040
40404040  40404040  40404040  40404040  C6E3C9D5  F0F0F1F6*
02E3E7E3  40000444  40400038  40400001  5890D37C  58A0D384  58B0D378
5880D184  58F0D390  4110D074  05EF41E0  000415FE  4720D3CE  58EFD04C
07FE5800  D19C5900  D1784750  D45858F0  C6E3C9D5  F0F0F1F7*
02E3E7E3  4000047C  40400038  40400001  D3984110  D08405EF  41E00004
15FE4720  D3F458EF  D05407FE  5800D1A4  12004780  D45858F0  D38C4110
D09C05EF  5800D19C  5900D178  4780D448  C6E3C9D5  F0F0F1F8*
02E3E7E3  400004B4  40400038  40400001  58F0D39C  4110D0A8  05EF7820
D2A87020  D3A03222  4780D448  2B003802  6A00D160  6000D158  5800D15C
5000B038  1BFF58E0  D00007FE  5800D170  C6E3C9D5  F0F0F1F9*
02E3E7E3  400004EC  40400038  40400001  5000B038  1BFF58E0  D00007FE

MEMBER NAME  FTINFO
5800D19C  5900D17C  4750D49A  58F0D398  4110D0BC  05EF41E0  000415FE
4720D47E  58EFD05C  07FE5800  D1A41200  C6E3C9D5  F0F0F2F0**
02E3E7E3  40000524  40400038  40400001  4780D49A  58F0D38C  4110D0D4
05EF1BFF  58E0D000  07FE5980  D19C4730  D4EE58F0  D3984110  D0E005EF
41E00004  15FE4720  D4BC58EF  D06407FE  C6E3C9D5  F0F0F2F1*
02E3E7E3  4000055C  40400038  40400001  5800D1A4  12004780  D4EE58F0
D39C4110  D0F805EF  2B007800  D2A86A00  D1606000  D1585800  D15C4000
B03C1BFF  58E0D000  07FE5800  D19C5900  C6E3C9D5  F0F0F2F2*
02E3E7E3  40000594  40400038  40400001  D17847A0  D5021BFF  58E0D000
07FE58F0  D3984110  D10C05EF  41E00004  15FE4720  D51C58EF  D06C07FE
5800D1A4  12004770  D52E1BFF  58E0D000  C6E3C9D5  F0F0F2F3*
02E3E7E3  400005CC  40400038  40400001  07FE5800  D19C5900  D1784770
D54C58F0  D38C4110  D12405EF  1BFF58E0  D00007FE  5800D19C  5900D17C
4730D580  58F0D38C  4110D130  05EF4100  C6E3C9D5  F0F0F2F4*
02E3E7E3  40000604  40400038  40400001  D1AB5000  D1449280  D14458F0
D38C4110  D13C05EF  1BFF58E0  D00007FE  5800D19C  5900D180  47C0D594
1BFF58E0  D00007FE  4100D1AB  5000D150  C6E3C9D5  F0F0F2F5*
02E3E7E3  4000063C  40400038  40400001  9280D150  58F0D38C  4110D148
05EF1BFF  58E0D000  07FE58F0  D3941800  45E0F004  00000006  00000028
45E0F010  1BFF58E0  D00007FE  58A0D004  C6E3C9D5  F0F0F2F6*
02E3E7E3  40000674  40400038  40400001  58E0A00C  58B0A018  5810B004
5820D194  50201000  18DA92FF  A00C982C  A01C07FE  98781004  58207000
5020D194  58201000  41302000  41500001  C6E3C9D5  F0F0F2F7*
02E3E7E3  400006AC  40400038  40400001  1B255020  D37C5030  D3805030
```

```
D0745820  10084130  20004150  00041B25  5020D384  5030D388  5030D0A4
9280D0A4  5030D0DC  9280D0DC  47F0D3A4  C6E3C9D5  F0F0F2F8*
02E3E7E3  40000020  40400004  40400001  00000694  40404040  40404040
40404040  40404040  40404040  40404040  40404040  40404040  40404040
40404040  40404040  40404040  40404040  C6E3C9D5  F0F0F2F9*
02D9D3C4  40404040  40400038  40404040  00020001  0C000418  00030001
1C00042C  00040001  1C000430  00050001  1C000434  00060001  1C000438
00070001  1C00043C  00010001  0C000660  C6E3C9D5  F0F0F3F0**
02E3E7E3  40000024  40400004  40400001  000000A0  40404040  40404040
40404040  40404040  40404040  40404040  40404040  40404040  40404040
40404040  40404040  40404040  40404040  C6E3C9D5  F0F0F3F1*
02E3E7E3  400000A0  40400004  40400001  00000670  40404040  40404040
40404040  40404040  40404040  40404040  40404040  40404040  40404040
40404040  40404040  40404040  40404040  C6E3C9D5  F0F0F3F2*
02E3E7E3  400000EC  40400014  40400001  0000046E  0000046E  00000494
00000652  0000051E  40404040  40404040  40404040  40404040  40404040
40404040  40404040  40404040  40404040  C6E3C9D5  F0F0F3F3*
02D9D3C4  40404040  40400038  40404040  00010001  0C000020  00010001
0C000024  00010001  0C0000A0  00010001  0C0000EC  00010001  0C0000F0
00010001  0C0000F4  00010001  0C0000F8  C6E3C9D5  F0F0F3F4*
02E3E7E3  40000100  40400014  40400001  00000652  0000055C  00000652
000005BC  00000652  40404040  40404040  40404040  40404040  40404040
40404040  40404040  40404040  40404040  C6E3C9D5  F0F0F3F5*
02E3E7E3  40000118  40400008  40400001  00000234  00000248  40404040
40404040  40404040  40404040  40404040  40404040  40404040  40404040
40404040  40404040  40404040  40404040  C6E3C9D5  F0F0F3F6*
02D9D3C4  40404040  40400038  40404040  00010001  0C0000FC  00010001
0C000100  00010001  0C000104  00010001  0C000108  00010001  0C00010C
00010001  0C000110  00010001  0C000118  C6E3C9D5  F0F0F3F7*
02E3E7E3  40000120  4040001C  40400001  8000023C  00000248  00000210
00000098  0000023C  00000218  80000244  40404040  40404040  40404040
40404040  40404040  40404040  40404040  C6E3C9D5  F0F0F3F8*
02D9D3C4  40404040  40400038  40404040  00010001  0C00011C  00010001
0C000120  00010001  0C000124  00010001  0C000128  00010001  0C00012C

MEMBER NAME  FTINFO
00010001  0C000130  00010001  0C000134  C6E3C9D5  F0F0F3F9*
02E3E7E3  4000013C  40400008  40400001  00000228  00000000  40404040
40404040  40404040  40404040  40404040  40404040  40404040  40404040
40404040  40404040  40404040  40404040  C6E3C9D5  F0F0F4F0**
02E3E7E3  40000148  40400014  40400001  00000248  0000023C  00000090
00000348  80000238  40404040  40404040  40404040  40404040  40404040
40404040  40404040  40404040  40404040  C6E3C9D5  F0F0F4F1*
02D9D3C4  40404040  40400038  40404040  00010001  0C000138  00010001
0C00013C  00020001  0C000140  00010001  0C000148  00010001  0C00014C
00010001  0C000150  00010001  0C000154  C6E3C9D5  F0F0F4F2*
02E3E7E3  4000015C  4040001C  40400001  00000248  00000210  00000088
0000023C  0000021C  80000244  00000228  40404040  40404040  40404040
40404040  40404040  40404040  40404040  C6E3C9D5  F0F0F4F3*
02D9D3C4  40404040  40400038  40404040  00010001  0C000158  00010001
0C00015C  00010001  0C000160  00010001  0C000164  00010001  0C000168
00010001  0C00016C  00010001  0C000170  C6E3C9D5  F0F0F4F4*
02E3E7E3  40000178  40400004  40400001  00000008  40404040  40404040
40404040  40404040  40404040  40404040  40404040  40404040  40404040
40404040  40404040  40404040  40404040  C6E3C9D5  F0F0F4F5*
02E3E7E3  40000180  40400018  40400001  00000248  00000210  00000080
0000023C  00000220  80000244  40404040  40404040  40404040  40404040
40404040  40404040  40404040  40404040  C6E3C9D5  F0F0F4F6*
02D9D3C4  40404040  40400038  40404040  00010001  0C000174  00020001
0C000178  00010001  0C000180  00010001  0C000184  00010001  0C000188
00010001  0C00018C  00010001  0C000190  C6E3C9D5  F0F0F4F7*
```

```
02E3E7E3  40000198  4040001C  40400001  00000248  0000023C  00000078
00000348  80000238  00000248  00000210  40404040  40404040  40404040
40404040  40404040  40404040  40404040  C6E3C9D5  F0F0F4F8*
02D9D3C4  40404040  40400038  40404040  00010001  0C000194  00010001
0C000198  00010001  0C00019C  00010001  0C0001A0  00010001  0C0001A4
00010001  0C0001A8  00010001  0C0001AC  C6E3C9D5  F0F0F4F9*
02E3E7E3  400001B4  4040001C  40400001  00000070  0000023C  00000218
80000244  00000214  0000003A  80000068  40404040  40404040  40404040
40404040  40404040  40404040  40404040  C6E3C9D5  F0F0F5F0**
02D9D3C4  40404040  40400038  40404040  00010001  0C0001B0  00010001
0C0001B4  00010001  0C0001B8  00010001  0C0001BC  00010001  0C0001C0
00010001  0C0001C4  00020001  0C0001C8  C6E3C9D5  F0F0F5F1*
02E3E7E3  400001D0  40400020  40400001  00000214  0000003A  80000060
00000210  0000003A  80000000  00000214  0000003A  40404040  40404040
40404040  40404040  40404040  40404040  C6E3C9D5  F0F0F5F2*
02D9D3C4  40404040  40400038  40404040  00010001  0C0001CC  00010001
0C0001D0  00020001  0C0001D4  00010001  0C0001D8  00010001  0C0001DC
00020001  0C0001E0  00010001  0C0001E8  C6E3C9D5  F0F0F5F3*
02E3E7E3  400001F0  40400004  40400001  80000000  40404040  40404040
40404040  40404040  40404040  40404040  40404040  40404040  40404040
40404040  40404040  40404040  40404040  C6E3C9D5  F0F0F5F4*
02E3E7E3  40000440  40400004  40400001  00000000  40404040  40404040
40404040  40404040  40404040  40404040  40404040  40404040  40404040
40404040  40404040  40404040  40404040  C6E3C9D5  F0F0F5F5*
02D9D3C4  40404040  40400008  40404040  00020001  0C0001EC  40404040
40404040  40404040  40404040  40404040  40404040  40404040  40404040
40404040  40404040  40404040  40404040  C6E3C9D5  F0F0F5F6*
02C5D5C4  40404040  40404040  40404040  40404040  40404040  40404040
000006E4  F1F5F7F3  F460C6D6  F34040F0  F2F0F2F8  F7F0F9F8  40F0F84B
F1F54BF4  F7404040  C6E3C9D5  C6D64040  C6E3C9D5  F0F0F5F7**

MEMBER NAME  GAPLN
02C5E2C4  40404040  40400010  40400001  C7C1D7D3  D5404040  00000000
40000000  40404040  40404040  40404040  40404040  40404040  40404040
40404040  40404040  40404040  40404040  C7C1D7D3  F0F0F0F1*
02E3E7E3  40000000  40400028  40400001  47F0F00C  07C7C1D7  D3D54040
90ECD00C  184D98CD  F0205040  D00450D0  400807FC  40404040  40404040
40404040  40404040  40404040  40404040  C7C1D7D3  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C7C1D7D3  F0F0F0F3*
02E3E7E3  400000C0  40400028  40400001  00000000  00000001  00000002
00000004  00000005  00000006  00000008  41200000  00000000  00000000
40404040  40404040  40404040  40404040  C7C1D7D3  F0F0F0F4*
02C5E2C4  40404040  40400010  40400003  C2E2D6D9  E3404040  02000000
40000000  40404040  40404040  40404040  40404040  40404040  40404040
40404040  40404040  40404040  40404040  C7C1D7D3  F0F0F0F5*
02C5E2C4  40404040  40400010  40400004  D7C9C5D9  C3C54040  02000000
40000000  40404040  40404040  40404040  40404040  40404040  40404040
40404040  40404040  40404040  40404040  C7C1D7D3  F0F0F0F6*
02E3E7E3  40000168  4040000C  40400001  00000000  00000000  00000000
40404040  40404040  40404040  40404040  40404040  40404040  40404040
40404040  40404040  40404040  40404040  C7C1D7D3  F0F0F0F7*
02E3E7E3  40000178  40400008  40400001  00000000  00000000  40404040
40404040  40404040  40404040  40404040  40404040  40404040  40404040
40404040  40404040  40404040  40404040  C7C1D7D3  F0F0F0F8*
02E3E7E3  40000120  40400038  40400001  00000001  00000004  C6D34040
C1404040  00000005  00000004  C6D34040  C1404040  00000001  00000004
C6D34040  C1404040  00000005  00000004  C7C1D7D3  F0F0F0F9*
02E3E7E3  40000158  40400008  40400001  C6D34040  C1404040  40404040
40404040  40404040  40404040  40404040  40404040  40404040  40404040
```

```
40404040  40404040  40404040  40404040  C7C1D7D3  F0F0F1F0**
02E3E7E3  400001B4  40400038  40400001  5830D154  5860D140  58B0D148
5800D0A4  5000D0D8  5800D0F4  5A00D09C  5000D0F4  18505C40  D0B05820
D0A41A25  7800D0C4  7002B000  5850D0F4  C7C1D7D3  F0F0F1F1*
02E3E7E3  400001EC  40400038  40400001  5C40D0B0  5820D0B0  1A257800
D0CC7002  B0005800  D0F45A00  D09C5000  D0F41850  5C40D0B0  5820D0A4
1A257800  D0C87002  B0005850  D0F45C40  C7C1D7D3  F0F0F1F2*
02E3E7E3  40000224  40400038  40400001  D0B05820  D0B01A25  7800D0D0
7002B000  58F0D144  4110D04C  05EF7820  D0C47B20  D0C83022  7840D0CC
7B40D0D0  30447040  D0EC7920  600447A0  C7C1D7D3  F0F0F1F3*
02E3E7E3  4000025C  40400038  40400001  D24058F0  D1444110  D06005EF
7800D0EC  79006004  47A0D256  58F0D144  4110D074  05EF5800  D0A45000
D15C5800  D0B05000  D16C5870  D1785880  C7C1D7D3  F0F0F1F4*
02E3E7E3  40000294  40400038  40400001  D1885890  D09C58A0  D0A07848
B0007040  D1601859  5A50D09C  5050D164  5C40D0B0  18255A20  D0A47822
B0007020  D1683B42  30447827  B0007020  C7C1D7D3  F0F0F1F5*
02E3E7E3  400002CC  40400038  40400001  D1701825  5A20D0B0  7862B000
7060D174  3B263022  7020D0E0  79406004  47A0D2CC  79206004  4750D364
7820D160  7A20D168  7D20D0B4  7020D138  C7C1D7D3  F0F0F1F6*
02E3E7E3  40000304  40400038  40400001  7820D170  7A20D174  7D20D0B4
7020D13C  58F0D150  4110D088  05EF5800  D0D45900  D09C4780  D364580C
D0D41200  4780D338  5800D0D8  5900D0A8  C7C1D7D3  F0F0F1F7*
02E3E7E3  4000033C  40400038  40400001  4770D31C  50A0D0D8  59A0D0D8
4770D32C  1BFF58E0  D00007FE  5800D0AC  5000D0D8  47F0D364  5800D0D8
5900D0AC  4770D348  50A0D0D8  59A0D0D8  C7C1D7D3  F0F0F1F8*
02E3E7E3  40000374  40400038  40400001  4770D358  1BFF58E0  D00007FE
5800D0A8  5000D0D8  47F0D364  1A9A5A70  D1785A80  D1785990  D0F447C0
D2761BFF  58E0D000  07FE58A0  D00458E0  C7C1D7D3  F0F0F1F9*
02E3E7E3  400003AC  40400038  40400001  A00C58B0  A0185810  B0007820

MEMBER NAME  GAPLN
D0C47020  10005820  B0047840  D0CC7040  20005830  B0087860  D0C87060
30005840  B00C7800  D0D07000  40005850  C7C1D7D3  F0F0F2F0**
02E3E7E3  400003E4  40400038  40400001  B0145860  D0F05060  50005870
B01C5880  D0F45080  70005890  B0205800  D0D85000  900018DA  92FFA00C
982CA01C  07FE987B  10007820  70007020  C7C1D7D3  F0F0F2F1*
02E3E7E3  4000041C  40400038  40400001  D0C47820  80007020  D0CC7820
90007020  D0C87820  A0007020  D0D0987A  10145820  70005020  D0F05820
90005020  D0F45820  A0005020  D0D85820  C7C1D7D3  F0F0F2F2*
02E3E7E3  40000454  40400038  40400001  10104130  20004150  00041B25
5C40D0A0  1B255020  D1545030  D1585030  D0885820  10184130  20004150
00041B25  5C40D0A0  1B255020  D1485030  C7C1D7D3  F0F0F2F3*
02E3E7E3  4000048C  40400012  40400001  D14C5030  D0545030  D0685030
D07C47F0  D18C4040  40404040  40404040  40404040  40404040  40404040
40404040  40404040  40404040  40404040  C7C1D7D3  F0F0F2F4*
02E3E7E3  40000020  4040000C  40400001  00000412  00000028  000003A6
40404040  40404040  40404040  40404040  40404040  40404040  40404040
40404040  40404040  40404040  40404040  C7C1D7D3  F0F0F2F5*
02E3E7E3  40000074  40400008  40400001  00000120  000000C8  40404040
40404040  40404040  40404040  40404040  40404040  40404040  40404040
40404040  40404040  40404040  40404040  C7C1D7D3  F0F0F2F6*
02D9D3C4  40404040  40400038  40404040  00020001  0C000168  00030001
1C00016C  00040001  1C000178  00010001  0C000020  00010001  0C000024
00010001  0C000028  00010001  0C000074  C7C1D7D3  F0F0F2F7*
02E3E7E3  40000080  40400010  40400001  000000D8  8000011C  00000150
000000C4  40404040  40404040  40404040  40404040  40404040  40404040
40404040  40404040  40404040  40404040  C7C1D7D3  F0F0F2F8*
02E3E7E3  40000094  4040000C  40400001  000000D8  8000011C  00000140
40404040  40404040  40404040  40404040  40404040  40404040  40404040
40404040  40404040  40404040  40404040  C7C1D7D3  F0F0F2F9*
02D9D3C4  40404040  40400038  40404040  00010001  0C000078  00010001
```

```
0C000080  00010001  0C000084  00010001  0C000088  00010001  0C00008C
00010001  0C000094  00010001  0C000098  C7C1D7D3  F0F0F3F0**
02E3E7E3  400000A0  40400004  40400001  000000C4  40404040  40404040
40404040  40404040  40404040  40404040  40404040  40404040  40404040
40404040  40404040  40404040  40404040  C7C1D7D3  F0F0F3F1*
02E3E7E3  400000A8  40400008  40400001  000000D8  8000011C  40404040
40404040  40404040  40404040  40404040  40404040  40404040  40404040
40404040  40404040  40404040  40404040  C7C1D7D3  F0F0F3F2*
02E3E7E3  400000B4  4040000C  40400001  00000118  00000160  800000FC
40404040  40404040  40404040  40404040  40404040  40404040  40404040
40404040  40404040  40404040  40404040  C7C1D7D3  F0F0F3F3*
02E3E7E3  40000184  40400030  40400001  00000000  00000000  00000000
00000000  00000000  00000000  00000000  00000010  00A80004  01E80004
01EC0004  0000000C  40404040  40404040  C7C1D7D3  F0F0F3F4*
02D9D3C4  40404040  40400038  40404040  00010001  0C00009C  00010001
0C0000A0  00010001  0C0000A8  00010001  0C0000AC  00010001  0C0000B4
00010001  0C0000B8  00010001  0C0000BC  C7C1D7D3  F0F0F3F5*
02C5D5C4  40404040  40404040  40404040  40404040  40404040  40404040
0000049E  F1F5F7F3  F460C6D6  F34040F0  F2F0F2F8  F7F0F9F8  40F0F84B
F1F54BF5  F2404040  C7C1D7D3  D5404040  C7C1D7D3  F0F0F3F6**

MEMBER NAME  GTFLIP
02C5E2C4  40404040  40400010  40400001  C7E3C6D3  C9D74040  00000000
40000000  40404040  40404040  40404040  40404040  40404040  40404040
40404040  40404040  40404040  40404040  C7E3C6D3  F0F0F0F1*
02E3E7E3  40000000  40400038  40400001  47F0F00C  07C7E3C6  D3C9D740
90ECD00C  184D98CD  F0205040  D00450D0  400807FC  40404040  40404040
021A3340  C5D9D9D6  D97A40D5  E4D4C2C5  C7E3C6D3  F0F0F0F2*
02E3E7E3  40000038  40400038  40400001  D940D6C6  40E3C5D4  D7C5D9C1
D9E840D7  D6C9D5E3  E240C5E7  C3C5C5C4  C5C440F1  F0F0F040  C9D51A0F
40D9D6E4  E3C9D5C5  40C7E3C6  D3C9D722  C7E3C6D3  F0F0F0F3*
02E3E7E3  400000E0  40400024  40400001  00000000  00000001  00000002
00000008  00000010  000003E8  00000000  00000000  00000000  40404040
40404040  40404040  40404040  40404040  C7E3C6D3  F0F0F0F4*
02E3E7E3  40000140  40400004  40400001  00000000  40404040  40404040
40404040  40404040  40404040  40404040  40404040  40404040  40404040
40404040  40404040  40404040  40404040  C7E3C6D3  F0F0F0F5*
02E3E7E3  40000148  40400004  40400001  00000000  40404040  40404040
40404040  40404040  40404040  40404040  40404040  40404040  40404040
40404040  40404040  40404040  40404040  C7E3C6D3  F0F0F0F6*
02C5E2C4  40404040  40400010  40400002  D4E5C3C8  D9404040  02000000
40000000  40404040  40404040  40404040  40404040  40404040  40404040
40404040  40404040  40404040  40404040  C7E3C6D3  F0F0F0F7*
02E3E7E3  40000150  40400004  40400001  00000000  40404040  40404040
40404040  40404040  40404040  40404040  40404040  40404040  40404040
40404040  40404040  40404040  40404040  C7E3C6D3  F0F0F0F8*
02C5E2C4  40404040  40400010  40400003  C9C2C3D6  D47B4040  02000000
40000000  40404040  40404040  40404040  40404040  40404040  40404040
40404040  40404040  40404040  40404040  C7E3C6D3  F0F0F0F9*
02C5E2C4  40404040  40400010  40400004  D4E5C3C8  D9D34040  02000000
40000000  40404040  40404040  40404040  40404040  40404040  40404040
40404040  40404040  40404040  40404040  C7E3C6D3  F0F0F1F0**
02E3E7E3  40000158  40400010  40400001  00000000  00000000  00000000
00000000  40404040  40404040  40404040  40404040  40404040  40404040
40404040  40404040  40404040  40404040  C7E3C6D3  F0F0F1F1*
02E3E7E3  40000188  40400038  40400001  5880D0E0  5890D0F4  58A0D0D8
58B0D0D0  5850D114  5800D0A8  5900D084  47C0D15A  58F0D0EC  45E0F004
00000006  00000028  45E0F010  58F0D0EC  C7E3C6D3  F0F0F1F2*
02E3E7E3  400001C0  40400038  40400001  45E0F034  05404040  F4F44100
B0045000  D0504100  80045000  D0549280  D05458F0  D0E84110  D04C05EF
5800D0A8  89000003  5000D0B8  41059000  C7E3C6D3  F0F0F1F3*
```

```
02E3E7E3  400001F8  40400038  40400001  5000D05C  4105A000  5000D060
9280D060  58F0D0F0  4110D058  05EF7800  D09C3200  47C0D1B4  1BFF58E0
D00007FE  5820D074  5870D07C  5880D074  C7E3C6D3  F0F0F1F4*
02E3E7E3  40000230  40400038  40400001  18A218B5  782B9000  3302700B
90001AA8  1AB759A0  D0A847C0  D1C45880  D0E058A0  D0D858B0  D0D05820
D0A88E20  00205D20  D0785870  D0A85C60  C7E3C6D3  F0F0F1F5*
02E3E7E3  40000268  40400038  40400001  D07C1847  5A40D0FC  5850D104
5860D074  18745880  D11458A0  D07418B3  4100D0BC  5000D068  41089000
5000D06C  9280D06C  58F0D0E8  4110D064  C7E3C6D3  F0F0F1F6*
02E3E7E3  400002A0  40400038  40400001  05EF4108  90005000  D0684107
90005000  D06C9280  D06C58F0  D0E84110  D06405EF  41079000  5000D068
4100D0BC  5000D06C  9280D06C  58F0D0E8  C7E3C6D3  F0F0F1F7*
02E3E7E3  400002D8  40400038  40400001  4110D064  05EF5A80  D07C1A75
876AD214  5880D0E0  58A0D0D8  58B0D0D0  5850D114  7820B004  33227840
B0083304  7000B004  7020B008  1BFF58E0  C7E3C6D3  F0F0F1F8*
02E3E7E3  40000310  40400038  40400001  D00007FE  58D0D004  58E0D00C
92FFD00C  982CD01C  07FE987B  10045820  70005020  D0A87820  90007020
D09C5820  10004130  20004150  00041B25  C7E3C6D3  F0F0F1F9*
02E3E7E3  40000348  40400038  40400001  5C40D078  1B255020  D0D85030

MEMBER NAME  GTFLIP
D0DC5820  10084130  20004150  00041B25  5020D0E0  5030D0E4  58201010
41302000  41500004  1B255C40  D0781B25  C7E3C6D3  F0F0F2F0**
02E3E7E3  40000380  40400022  40400001  5020D0F4  5030D0F8  58201014
41302000  41500004  1B255020  D0D05030  D0D447F0  D1184040  40404040
40404040  40404040  40404040  40404040  C7E3C6D3  F0F0F2F1*
02E3E7E3  40000020  40400008  40400001  00000326  00000070  40404040
40404040  40404040  40404040  40404040  40404040  40404040  40404040
40404040  40404040  40404040  40404040  C7E3C6D3  F0F0F2F2*
02E3E7E3  40000070  40400004  40400001  00000314  40404040  40404040
40404040  40404040  40404040  40404040  40404040  40404040  40404040
40404040  40404040  40404040  40404040  C7E3C6D3  F0F0F2F3*
02E3E7E3  400000BC  40400004  40400001  000000F0  40404040  40404040
40404040  40404040  40404040  40404040  40404040  40404040  40404040
40404040  40404040  40404040  40404040  C7E3C6D3  F0F0F2F4*
02D9D3C4  40404040  40400038  40404040  00020001  1C000158  00030001
1C00015C  00040001  1C000160  00010001  0C0001B4  00010001  0C000020
00010001  0C000024  00010001  0C000070  C7E3C6D3  F0F0F2F5*
02E3E7E3  400000C4  40400008  40400001  80000000  00000128  40404040
40404040  40404040  40404040  40404040  40404040  40404040  40404040
40404040  40404040  40404040  40404040  C7E3C6D3  F0F0F2F6*
02E3E7E3  400000D0  40400008  40400001  80000000  000000EC  40404040
40404040  40404040  40404040  40404040  40404040  40404040  40404040
40404040  40404040  40404040  40404040  C7E3C6D3  F0F0F2F7*
02E3E7E3  400000DC  40400004  40400001  80000000  40404040  40404040
40404040  40404040  40404040  40404040  40404040  40404040  40404040
40404040  40404040  40404040  40404040  C7E3C6D3  F0F0F2F8*
02E3E7E3  4000016C  4040001C  40400001  00000004  00000000  FFFFFFF8
00000000  00000000  00000000  0000000C  40404040  40404040  40404040
40404040  40404040  40404040  40404040  C7E3C6D3  F0F0F2F9*
02D9D3C4  40404040  40400018  40404040  00010001  0C0000BC  00010001
0C0000C8  00010001  0C0000D4  40404040  40404040  40404040  40404040
40404040  40404040  40404040  40404040  C7E3C6D3  F0F0F3F0**
02C5D5C4  40404040  40404040  40404040  40404040  40404040  40404040
000003A2  F1F5F7F3  F460C6D6  F34040F0  F2F0F2F8  F7F0F9F8  40F0F84B
F1F54BF5  F6404040  C7E3C6D3  C9D74040  C7E3C6D3  F0F0F3F1**

MEMBER NAME  GRNMRG
02C5E2C4  40404040  40400010  40400001  C7D9D5D4  D9C74040  00000000
40000000  40404040  40404040  40404040  40404040  40404040  40404040
40404040  40404040  40404040  40404040  C7D9D5D4  F0F0F0F1*
```

```
02E3E7E3  40000000  40400038  40400001  47F0F00C  07C7D9D5  D4D9C740
90ECD00C  184D98CD  F0205040  D00450D0  400807FC  40404040  40404040
020A0803  18010A08  0318011A  05C4C1E2  C7D9D5D4  F0F0F0F2*
02E3E7E3  40000038  40400038  40400001  C8401003  1A0740D3  C1E8E4D7
4010041A  1E40C4D6  C5E240D5  D6E340D4  C1E3C3C8  40C1D540  D6D9C9C5
D5E3C1E3  C9D6D518  3222020A  08031801  C7D9D5D4  F0F0F0F3*
02E3E7E3  40000070  40400038  40400001  0A080318  011A05C4  C1E2C840
10031A0D  40D6D9C9  C5D5E3C1  E3C9D6D5  400A0602  1A1740C4  D6C5E240
D5D6E340  D4C1E3C3  C840C140  D3C1E8E4  C7D9D5D4  F0F0F0F4*
02E3E7E3  400000A8  40400038  40400001  D7183222  02064814  0122020A
08031801  0A080318  011A0CD6  D9C9C5D5  E3C1E3C9  D6D5400A  08031A1E
40D5D6E3  40E6C9E3  C8C9D540  E3C8C540  C7D9D5D4  F0F0F0F5*
02E3E7E3  400000E0  40400038  40400001  D3C9D4C9  E3E240D6  C640E2D3
C9C31832  22020A08  0318010A  08031801  1A06D3C1  E8E4D740  10041A26
40C3D6D5  E3C1C9D5  E240D4D6  D9C540E3  C7D9D5D4  F0F0F0F6*
02E3E7E3  40000118  40400019  40400001  C8C1D540  F840D7D3  E840D6D9
C9C5D5E3  C1E3C9D6  D5E21832  22404040  40404040  40404040  40404040
40404040  40404040  40404040  40404040  C7D9D5D4  F0F0F0F7*
02E3E7E3  400001B8  40400038  40400001  00000000  00000000  4F080000
00000000  00000000  00000000  00000001  00000002  00000003  00000004
00000005  00000006  00000008  00000009  C7D9D5D4  F0F0F0F8*
02E3E7E3  400001F0  40400028  40400001  00000010  00000016  00000048
000003E8  00002328  40266666  40800000  42640000  00000000  00000000
40404040  40404040  40404040  40404040  C7D9D5D4  F0F0F0F9*
02C5E2C4  40404040  40400010  40400002  D4E5C3C8  D9404040  02000000
40000000  40404040  40404040  40404040  40404040  40404040  40404040
40404040  40404040  40404040  40404040  C7D9D5D4  F0F0F1F0**
02E3E7E3  40000288  40400004  40400001  00000000  40404040  40404040
40404040  40404040  40404040  40404040  40404040  40404040  40404040
40404040  40404040  40404040  40404040  C7D9D5D4  F0F0F1F1*
02E3E7E3  40000290  40400008  40400001  00000000  00000000  40404040
40404040  40404040  40404040  40404040  40404040  40404040  40404040
40404040  40404040  40404040  40404040  C7D9D5D4  F0F0F1F2*
02C5E2C4  40404040  40400010  40400003  C9C2C3D6  D47B4040  02000000
40000000  40404040  40404040  40404040  40404040  40404040  40404040
40404040  40404040  40404040  40404040  C7D9D5D4  F0F0F1F3*
02E3E7E3  4000029C  40400004  40400001  00000000  40404040  40404040
40404040  40404040  40404040  40404040  40404040  40404040  40404040
40404040  40404040  40404040  40404040  C7D9D5D4  F0F0F1F4*
02E3E7E3  400002A4  40400004  40400001  00000000  40404040  40404040
40404040  40404040  40404040  40404040  40404040  40404040  40404040
40404040  40404040  40404040  40404040  C7D9D5D4  F0F0F1F5*
02E3E7E3  40000234  40400004  40400001  000000C8  40404040  40404040
40404040  40404040  40404040  40404040  40404040  40404040  40404040
40404040  40404040  40404040  40404040  C7D9D5D4  F0F0F1F6*
02E3E7E3  4000026A  40400010  40400001  00000000  00000000  00000000
00000000  40404040  40404040  40404040  40404040  40404040  40404040
40404040  40404040  40404040  40404040  C7D9D5D4  F0F0F1F7*
02E3E7E3  40000388  40400038  40400001  58A0D150  58B0D164  5890D098
7800D0CC  7000D0F0  5090D10C  5800D1AC  5000D218  5850D174  5050D210
5050D214  5800D238  5000D21C  58E0D238  C7D9D5D4  F0F0F1F8*
02E3E7E3  400003C0  40400038  40400001  410EB000  5000D054  9280D054
58F0D158  4110D04C  05EF5820  D1705020  D1FC5800  D23C5000  D22058E0
D23C784E  B0007040  D2005800  D0B85000  C7D9D5D4  F0F0F1F9*
02E3E7E3  400003F8  40400038  40400001  D2045800  D1B05000  D22C5000

MEMBER NAME  GRNMRG
D2245800  D2405000  D22858E0  D240782E  A0007020  D20C3B42  7040D208
30647960  D0CC47C0  D4DC5990  D1184780  C7D9D5D4  F0F0F2F0**
02E3E7E3  40000430  40400038  40400001  D3285C40  D09C1A25  7B22B000
7940D094  41300001  4720D312  1B337920  D0F04120  00014720  D3201B22
```

```
14231BFF  862FD4DC  7800D20C  7900D200  C7D9D5D4  F0F0F2F1*
02E3E7E3  40000468  40400038  40400001  4730D410  5800D114  5900D0FC
4750D348  1BFF58E0  D00007FE  5800D114  1A095000  D1145840  D0B05A40
D2142B00  7804B000  6A00D088  6000D080  C7D9D5D4  F0F0F2F2*
02E3E7E3  400004A0  40400038  40400001  5830D084  10335030  D0F45830
D2045A30  D2142B00  7803B000  6A00D088  6000D080  5800D084  5000D100
58F0D16C  45E0F004  00000000  00000028  C7D9D5D4  F0F0F2F3*
02E3E7E3  400004D8  40400038  40400001  5810D21C  45E0F008  0471B000
5810D220  45E0F008  0471B000  45E0F008  0450D0F4  45E0F008  0450D100
45E0F010  58F0D16C  45E0F000  00000000  C7D9D5D4  F0F0F2F4*
02E3E7E3  40000510  40400038  40400001  000000AC  18A958B0  D0C05880
D15C185B  5C40D114  18391A35  45E0F008  01238000  879AD3E6  58A0D150
58B0D164  5890D098  45E0F010  47F0DBCC  C7D9D5D4  F0F0F2F5*
02E3E7E3  40000548  40400038  40400001  5800D114  5900D0FC  4750D424
1BFF58E0  D00007FE  5800D114  1A095000  D1145840  D2445A40  D2242B00
7804A000  6A00D088  6000D080  5830D084  C7D9D5D4  F0F0F2F6*
02E3E7E3  40000580  40400038  40400001  10335030  D0F458F0  D16C1800
45E0F004  00000000  0000006A  5830D1C0  5A30D224  45E0F008  0473A000
5810D228  45E0F008  0471A000  45E0F008  C7D9D5D4  F0F0F2F7*
02E3E7E3  400005B8  40400038  40400001  0450D0F4  5830D0B0  5A30D224
45E0F008  0473A000  45E0F010  58F0D16C  45E0F000  00000000  000000AC
18A958B0  D0C05880  D15C185B  5C40D114  C7D9D5D4  F0F0F2F8*
02E3E7E3  400005F0  40400038  40400001  18391A35  45E0F008  01238000
879AD4B2  58A0D150  58B0D164  5890D098  45E0F010  47F0DBCC  5090D0E4
5800D170  5000D190  5800D174  5000D188  C7D9D5D4  F0F0F2F9*
02E3E7E3  40000628  40400038  40400001  5800D0C8  13005000  D1B45800
D2485000  D1B85830  D10C5C20  D1B05030  D1C45800  D1745000  D1845000
D17C1803  5A00D0B8  5000D1D4  18035A00  C7D9D5D4  F0F0F3F0**
02E3E7E3  40000660  40400038  40400001  D0B05000  D1A41803  5A00D1C0
5000D1D8  5A30D0B8  5030D1DC  5800D23C  5000D194  5800D24C  5000D1E0
5800D238  5000D1E4  5800D23C  5000D1E8  C7D9D5D4  F0F0F3F1*
02E3E7E3  40000698  40400038  40400001  5800D1BC  5000D1EC  5800D238
5000D1F0  5800D23C  5000D1F4  5800D24C  5000D1F8  5860D174  5880D1B0
18A95890  D15058F0  D1584110  D05805EF  C7D9D5D4  F0F0F3F2*
02E3E7E3  400006D0  40400038  40400001  5800D090  5000D0F8  59A0D0E4
4780D618  7820D148  7020D18C  58E0D194  792EB000  4770D5EE  5850D0E4
1B5A5C40  D1881825  5A20D1A8  58E0D1E0  C7D9D5D4  F0F0F3F3*
02E3E7E3  40000708  40400038  40400001  410EB000  5000D068  4102B000
5000D06C  9280D06C  58F0D158  4110D064  05EF58E0  D1947800  D18C790E
B0004780  DB6058E0  D1E4410E  B0005000  C7D9D5D4  F0F0F3F4*
02E3E7E3  40000740  40400038  40400001  D0549280  D05458F0  D1584110
D04C05EF  5820D0E4  5020D0E8  58E0D1E8  782EB000  5830D17C  5A30D170
5870D10C  188A18A3  18B23862  5890D164  C7D9D5D4  F0F0F3F5*
02E3E7E3  40000778  40400038  40400001  1AB81AA6  5970D110  47C0D654
50B0D0E8  47F0D9A2  59B0D118  47C0D664  50B0D0E8  47F0D6B8  796A9000
4780D640  50B0D0E8  5890D150  58B0D164  C7D9D5D4  F0F0F3F6*
02E3E7E3  400007B0  40400038  40400001  58A0D098  5880D1B0  5800D0E8
5900D118  4730D6B8  18565C40  D0E81825  5A20D170  7822B000  58E0D1D4
7B2E9000  30427020  D11C7940  D0F04750  C7D9D5D4  F0F0F3F7*
02E3E7E3  400007E8  40400038  40400001  D9463222  4730D946  5890D150
58B0D164  58A0D098  5880D1B0  5800D090  4000D0E0  58E0D1A4  782E9000
7020D19C  322247C0  D6FE7C20  D0D47A20  C7D9D5D4  F0F0F3F8*
02E3E7E3  40000820  40400038  40400001  D0D02B00  38026A00  D0886000
D0805800  D0844000  D0E07800  D19C3200  47A0D728  7820D19C  7C20D0D4

MEMBER NAME  GRNMRG
7B20D0D0  2B003802  6A00D088  6000D080  C7D9D5D4  F0F0F3F9*
02E3E7E3  40000858  40400038  40400001  5800D084  4000D0E0  4800D0E0
5900D0C8  4730D740  4800D0E0  5900D1B4  4730D818  5800D114  5900D0FC
4750D760  58A0D150  58B0D164  5890D098  C7D9D5D4  F0F0F4F0**
02E3E7E3  40000890  40400038  40400001  1BFF58E0  D00007FE  5800D114
```

| | | | | | | |
|---|---|---|---|---|---|---|
| 1A0A5000 | D11458E0 | D1B82B00 | 780EB000 | 6A00D088 | 6000D080 | 5830D084 |
| 10335030 | D0F458E0 | D1BC2B00 | 780EB000 | C7D9D5D4 | F0F0F4F1* | |
| 02E3E7E3 | 400008C8 | 40400038 | 40400001 | 6A00D088 | 6000D080 | 5800D084 |
| 5000D100 | 58F0D16C | 45E0F004 | 00000000 | 000000B2 | 5810D1D8 | 45E0F008 |
| 04719000 | 5810D1DC | 45E0F008 | 04719000 | C7D9D5D4 | F0F0F4F2* | |
| 02E3E7E3 | 40000900 | 40400020 | 40400001 | 5810D1A4 | 45E0F008 | 04719000 |
| 45E0F010 | 58F0D16C | 45E0F000 | 00000000 | 000000AC | 40404040 | 40404040 |
| 40404040 | 40404040 | 40404040 | 40404040 | C7D9D5D4 | F0F0F4F3* | |
| 02D9D3C4 | 40404040 | 40400038 | 40404040 | 00020001 | 1C000290 | 00030001 |
| 1C0002A4 | 00010001 | 0C0004D4 | 00010001 | 0C000510 | 00010001 | 0C000594 |
| 00010001 | 0C0005DC | 00010001 | 0C0008E4 | C7D9D5D4 | F0F0F4F4* | |
| 02E3E7E3 | 40000920 | 40400038 | 40400001 | 189A58B0 | D0C05880 | D15C185B |
| 5C40D114 | 18391A35 | 45E0F008 | 01238000 | 879AD7F2 | 5890D150 | 58B0D164 |
| 5880D1B0 | 45E0F010 | 5800D0F8 | 1A0A5000 | C7D9D5D4 | F0F0F4F5* | |
| 02E3E7E3 | 40000958 | 40400038 | 40400001 | D0F84800 | D0E01200 | 4770D834 |
| 5800D0C4 | 4000D0E0 | 5820D0F8 | 89200001 | 4800D0E0 | 4002D11E | 5800D0F8 |
| 5900D0B0 | 47C0D908 | 5800D114 | 5900D0FC | C7D9D5D4 | F0F0F4F6* | |
| 02E3E7E3 | 40000990 | 40400038 | 40400001 | 4750D870 | 58A0D150 | 58B0D164 |
| 5890D098 | 1BFF58E0 | D00007FE | 5800D114 | 1A0A5000 | D11458E0 | D1EC2B00 |
| 780EB000 | 6A00D088 | 6000D080 | 5800D084 | C7D9D5D4 | F0F0F4F7* | |
| 02E3E7E3 | 400009C8 | 40400038 | 40400001 | 5000D100 | 58F0D16C | 45E0F004 |
| 00000000 | 000000F1 | 5810D1F0 | 45E0F008 | 0471B000 | 5810D1F4 | 45E0F008 |
| 0471B000 | 45E0F008 | 0450D100 | 45E0F010 | C7D9D5D4 | F0F0F4F8* | |
| 02E3E7E3 | 40000A00 | 40400038 | 40400001 | 58F0D16C | 45E0F000 | 00000000 |
| 000000AC | 189A58B0 | D0C05880 | D15C185B | 5C40D114 | 18391A35 | 45E0F008 |
| 01238000 | 879AD8E2 | 5890D150 | 58B0D164 | C7D9D5D4 | F0F0F4F9* | |
| 02E3E7E3 | 40000A38 | 40400038 | 40400001 | 5880D1B0 | 45E0F010 | 5820D10C |
| 1A2A5020 | D10C5800 | D1DC1A08 | 5000D1DC | 5800D1D8 | 1A085000 | D1D85800 |
| D1A41A08 | 5000D1A4 | 5800D1D4 | 1A085000 | C7D9D5D4 | F0F0F5F0** | |
| 02E3E7E3 | 40000A70 | 40400038 | 40400001 | D1D45920 | D1104730 | D94647F0 |
| D67058E0 | D1F8410E | B0005000 | D07458F0 | D1584110 | D07005EF | 5800D0F8 |
| 12004730 | DB6058A0 | D15058B0 | D1645890 | C7D9D5D4 | F0F0F5F1* | |
| 02E3E7E3 | 40000AA8 | 40400038 | 40400001 | D0985850 | D10C5C40 | D22C5050 |
| D2305820 | D2041A25 | 5020D234 | 7822A000 | 5850D0E4 | 5C40D210 | 5820D1FC |
| 1A257922 | B0004730 | DA9458A0 | D15058B0 | C7D9D5D4 | F0F0F5F2* | |
| 02E3E7E3 | 40000AE0 | 40400038 | 40400001 | D1645890 | D0985800 | D1145900 |
| D0FC4750 | D9C21BFF | 58E0D000 | 07FE5800 | D1141A09 | 5000D114 | 5850D0E4 |
| 5C40D210 | 5860D0B0 | 1A652B00 | 7806B000 | C7D9D5D4 | F0F0F5F3* | |
| 02E3E7E3 | 40000B18 | 40400038 | 40400001 | 6A00D088 | 6000D080 | 5830D084 |
| 10335030 | D0F45830 | D2041A35 | 2B007803 | B0006A00 | D0886000 | D0805800 |
| D0845000 | D10058F0 | D16C1800 | 45E0F004 | C7D9D5D4 | F0F0F5F4* | |
| 02E3E7E3 | 40000B50 | 40400038 | 40400001 | 00000000 | 00000028 | 5830D218 |
| 1A3545E0 | F0080473 | B0005830 | D1FC1A35 | 45E0F008 | 0473B000 | 45E0F008 |
| 0450D0F4 | 45E0F008 | 0450D100 | 45E0F010 | C7D9D5D4 | F0F0F5F5* | |
| 02E3E7E3 | 40000B88 | 40400038 | 40400001 | 58F0D16C | 45E0F000 | 00000000 |
| 000000AC | 18A958B0 | D0C05880 | D15C185B | 5C40D114 | 18391A35 | 45E0F008 |
| 01238000 | 879ADA6A | 58A0D150 | 58B0D164 | C7D9D5D4 | F0F0F5F6* | |
| 02E3E7E3 | 40000BC0 | 40400038 | 40400001 | 5890D098 | 45E0F010 | 47F0DBCC |
| 5800D114 | 5900D0FC | 4750DAA8 | 1BFF58E0 | D00007FE | 5800D114 | 1A095000 |
| D1145840 | D2445A40 | D2302B00 | 7804A000 | C7D9D5D4 | F0F0F5F7* | |
| 02E3E7E3 | 40000BF8 | 40400038 | 40400001 | 6A00D088 | 6000D080 | 5830D084 |
| 10335030 | D0F458F0 | D16C1800 | 45E0F004 | 00000000 | 0000006A | 5830D1C0 |
| 5A30D230 | 45E0F008 | 0473A000 | 5810D234 | C7D9D5D4 | F0F0F5F8* | |

MEMBER NAME GRNMRG

| | | | | | | |
|---|---|---|---|---|---|---|
| 02E3E7E3 | 40000C30 | 40400038 | 40400001 | 45E0F008 | 0471A000 | 45E0F008 |
| 0450D0F4 | 5830D0B0 | 5A30D230 | 45E0F008 | 0473A000 | 45E0F010 | 58F0D16C |
| 45E0F000 | 00000000 | 000000AC | 18A958B0 | C7D9D5D4 | F0F0F5F9* | |
| 02E3E7E3 | 40000C68 | 40400038 | 40400001 | D0C05880 | D15C185B | 5C40D114 |
| 18391A35 | 45E0F008 | 01238000 | 879ADB36 | 58A0D150 | 58B0D164 | 5890D098 |
| 45E0F010 | 47F0DBCC | 5820D0E4 | 1A2A5020 | C7D9D5D4 | F0F0F6F0** | |

```
02E3E7E3  40000CA0  40400038  40400001  D0E45800  D1F81A06  5000D1F8
5800D1F4  1A065000  D1F45800  D1F01A06  5000D1F0  5800D1EC  1A065000
D1EC5800  D17C1A06  5000D17C  5800D1E8  C7D9D5D4  F0F0F6F1*
02E3E7E3  40000CD8  40400038  40400001  1A065000  D1E85800  D1E41A06
5000D1E4  5800D1E0  1A065000  D1E05800  D1941A06  5000D194  5920D118
47C0D58E  58A0D150  58B0D164  5890D098  C7D9D5D4  F0F0F6F2*
02E3E7E3  40000D10  40400038  40400001  1BFF58E0  D00007FE  58A0D004
58E0A00C  58B0A018  5810B014  5820D114  50201000  18DA92FF  A00C982C
A01C07FE  987B1004  58207000  5020D110  C7D9D5D4  F0F0F6F3*
02E3E7E3  40000D48  40400038  40400001  58209000  5020D118  58701014
58207000  5020D114  58201000  41302000  41500004  1B255C40  D0AC1B25
5020D150  5030D154  58201008  41302000  C7D9D5D4  F0F0F6F4*
02E3E7E3  40000D80  40400034  40400001  41500004  1B255C40  D0BC1B25
5020D164  5030D168  58201010  41302000  41500001  1B255C40  D0C01B25
5020D15C  5030D160  47F0D250  40404040  C7D9D5D4  F0F0F6F5*
02E3E7E3  40000020  40400004  40400001  00000D3C  40404040  40404040
40404040  40404040  40404040  40404040  40404040  40404040  40404040
40404040  40404040  40404040  40404040  C7D9D5D4  F0F0F6F6*
02D9D3C4  40404040  40400038  40404040  00010001  0C00091C  00010001
0C0009D8  00010001  0C000A0C  00010001  0C000B54  00010001  0C000B94
00010001  0C000C18  00010001  0C000C60  C7D9D5D4  F0F0F6F7*
02E3E7E3  40000024  40400004  40400001  00000138  40404040  40404040
40404040  40404040  40404040  40404040  40404040  40404040  40404040
40404040  40404040  40404040  40404040  C7D9D5D4  F0F0F6F8*
02E3E7E3  40000138  40400004  40400001  00000D18  40404040  40404040
40404040  40404040  40404040  40404040  40404040  40404040  40404040
40404040  40404040  40404040  40404040  C7D9D5D4  F0F0F6F9*
02E3E7E3  40000184  40400018  40400001  000001E8  0000027C  80000000
000001F0  00000258  8000026A  40404040  40404040  40404040  40404040
40404040  40404040  40404040  40404040  C7D9D5D4  F0F0F7F0**
02D9D3C4  40404040  40400038  40404040  00010001  0C000020  00010001
0C000024  00010001  0C000138  00010001  0C000184  00010001  0C000188
00010001  0C000190  00010001  0C000194  C7D9D5D4  F0F0F7F1*
02E3E7E3  4000019C  40400004  40400001  000001F0  40404040  40404040
40404040  40404040  40404040  40404040  40404040  40404040  40404040
40404040  40404040  40404040  40404040  C7D9D5D4  F0F0F7F2*
02E3E7E3  400001A4  40400008  40400001  80000000  000001F0  40404040
40404040  40404040  40404040  40404040  40404040  40404040  40404040
40404040  40404040  40404040  40404040  C7D9D5D4  F0F0F7F3*
02E3E7E3  400001B0  40400004  40400001  80000258  40404040  40404040
40404040  40404040  40404040  40404040  40404040  40404040  40404040
40404040  40404040  40404040  40404040  C7D9D5D4  F0F0F7F4*
02E3E7E3  400002A8  40400038  40400001  00000024  00000058  00000000
00000000  00000000  00000000  00000000  00000000  00000000  00000000
00000000  00000000  00000000  00000000  C7D9D5D4  F0F0F7F5*
02E3E7E3  400002E0  40400038  40400001  00000040  00000020  00000018
00000000  00000000  00000068  0000000C  00000000  00000000  00000000
00000000  01F4000B  0214000B  00B0000B  C7D9D5D4  F0F0F7F6*
02E3E7E3  40000318  40400038  40400001  00000000  00B8000C  00000000
02B0000C  00D8000C  00DC000C  00D4000D  00F8000D  00000000  00FC000D
01F0000F  00000000  0000000F  00F00011  C7D9D5D4  F0F0F7F7*
02E3E7E3  40000350  40400038  40400001  00EC0011  00E80011  00000000

MEMBER NAME  GRNMRG
00F40012  01000012  01040012  02AC0013  02C40013  00000078  0000007C
00000028  00000014  00000060  00000098  C7D9D5D4  F0F0F7F8*
02D9D3C4  40404040  40400020  40404040  00010001  0C000198  00010001
0C00019C  00010001  0C0001A8  00010001  0C0001B0  40404040  40404040
40404040  40404040  40404040  40404040  C7D9D5D4  F0F0F7F9*
02C5D5C4  40404040  40404040  40404040  40404040  40404040  40404040
00000DB4  F1F5F7F3  F460C6D6  F34040F0  F2F0F2F8  F7F0F9F8  40F0F84B
```

F1F64BF0 F1404040 C7D9D5D4 D9C74040 C7D9D5D4 F0F0F8F0**

MEMBER NAME GTPRM

| | | | | | | |
|---|---|---|---|---|---|---|
| 02C5E2C4 | 40404040 | 40400010 | 40400001 | C7E3D7D9 | D4404040 | 00000000 |
| 40000000 | 40404040 | 40404040 | 40404040 | 40404040 | 40404040 | 40404040 |
| 40404040 | 40404040 | 40404040 | 40404040 | C7E3D7D9 | F0F0F0F1* | |
| 02E3E7E3 | 40000000 | 40400038 | 40400001 | 47F0F00C | 07C7E3D7 | D9D44040 |
| 90ECD00C | 184D98CD | F0205040 | D00450D0 | 400807FC | 40404040 | 40404040 |
| 021E1A30 | 40404040 | E3C8C540 | C3C8D6D9 | C7E3D7D9 | F0F0F0F2* | |
| 02E3E7E3 | 40000038 | 40400038 | 40400001 | C440C8C5 | C9C7C8E3 | 40E3D6D3 |
| C5D9C1D5 | C3C540C2 | C5C9D5C7 | 40E4E2C5 | C440C9E2 | 40407E40 | 0A0C0622 |
| 021A3040 | 404040E3 | C8C540C3 | C8C1C9D5 | C7E3D7D9 | F0F0F0F3* | |
| 02E3E7E3 | 40000070 | 40400038 | 40400001 | C9D5C740 | E3D6D3C5 | D9C1D5C3 |
| C540C2C5 | C9D5C740 | E4E2C5C4 | 40C9E240 | 40404040 | 407E400A | 0C062202 |
| 1A2D4040 | 4040C7C5 | D5C5D9C9 | C340D6E4 | C7E3D7D9 | F0F0F0F4* | |
| 02E3E7E3 | 400000A8 | 40400038 | 40400001 | E3D7E4E3 | 40E6C9D3 | D340C2C5 |
| 40C3D9C5 | C1E3C5C4 | 40D6D540 | E4D5C9E3 | 40F1F222 | 021A1940 | 404040E2 |
| C5D8E4C5 | D5C3C540 | D6D7E3C9 | D6D540C9 | C7E3D7D9 | F0F0F0F5* | |
| 02E3E7E3 | 400000E0 | 40400038 | 40400001 | E240D6D5 | 22021A1D | 40404040 |
| C2C1E3C3 | C840D7C9 | C5D9C3C5 | 40D6D7E3 | C9D6D540 | C9E240D6 | D522021A |
| 1B404040 | 40D7D3E8 | 40E3C1C2 | D3C54040 | C7E3D7D9 | F0F0F0F6* | |
| 02E3E7E3 | 40000118 | 40400038 | 40400001 | D6D7E3C9 | D6D540C9 | E240D6D5 |
| 22021A17 | 40404040 | D7C9C5D9 | C3C540D6 | D7E3C9D6 | D540C9E2 | 40D6D522 |
| 021A1640 | 404040E2 | E3C9C3D2 | 40D6D7E3 | C7E3D7D9 | F0F0F0F7* | |
| 02E3E7E3 | 40000150 | 40400038 | 40400001 | C9D6D540 | C9E240D6 | D522021A |
| 16404040 | 40D7D3C5 | C6E340D6 | D7E3C9D6 | D540C9E2 | 40D6D522 | 021A2E40 |
| 404040E2 | C5D8E4C5 | D5C3C5E2 | 40E6C9D3 | C7E3D7D9 | F0F0F0F8* | |
| 02E3E7E3 | 40000188 | 4040001E | 40400001 | D340D5D6 | E340C2C5 | 40E5C5D9 |
| C9C6C9C5 | C440C6D6 | D940D6E5 | C5D9D3C1 | D7224040 | 40404040 | 40404040 |
| 40404040 | 40404040 | 40404040 | 40404040 | C7E3D7D9 | F0F0F0F9* | |
| 02E3E7E3 | 400001A8 | 40400038 | 40400001 | D5D6E2C5 | D8404040 | D7D3C5C6 |
| E3404040 | E2E3C9C3 | D2404040 | D7C9C5D9 | C3C54040 | E3C1C2D3 | C5404040 |
| C2D7C5D9 | C3C54040 | E2C5D8E4 | D5C34040 | C7E3D7D9 | F0F0F1F0** | |
| 02E3E7E3 | 400001E0 | 40400020 | 40400001 | C7C5D5C5 | D9C9C340 | C3C8E3D6 |
| D37E4040 | C3E4E3D6 | D37E4040 | 40404040 | 40404040 | 40404040 | 40404040 |
| 40404040 | 40404040 | 40404040 | 40404040 | C7E3D7D9 | F0F0F1F1* | |
| 02C5E2C4 | 40404040 | 40400010 | 40400002 | D6D7E3C9 | D6D54040 | 05000000 |
| 40000020 | 40404040 | 40404040 | 40404040 | 40404040 | 40404040 | 40404040 |
| 40404040 | 40404040 | 40404040 | 40404040 | C7E3D7D9 | F0F0F1F2* | |
| 02E3E7E3 | 400003B8 | 40400030 | 40400001 | 00000000 | 00000000 | 00000001 |
| 00000001 | 00000005 | 00000006 | 00000007 | 00000064 | 3F10624E | 3F28F5C3 |
| 00000000 | 00000000 | 40404040 | 40404040 | C7E3D7D9 | F0F0F1F3* | |
| 02C5E2C4 | 40404040 | 40400010 | 40400003 | E3D6D3C5 | D9404040 | 05000000 |
| 4000000C | 40404040 | 40404040 | 40404040 | 40404040 | 40404040 | 40404040 |
| 40404040 | 40404040 | 40404040 | 40404040 | C7E3D7D9 | F0F0F1F4* | |
| 02C5E2C4 | 40404040 | 40400010 | 40400004 | C6D7E5C1 | D3404040 | 02000000 |
| 40000000 | 40404040 | 40404040 | 40404040 | 40404040 | 40404040 | 40404040 |
| 40404040 | 40404040 | 40404040 | 40404040 | C7E3D7D9 | F0F0F1F5* | |
| 02C5E2C4 | 40404040 | 40400010 | 40400005 | C3C8C1D9 | C6D34040 | 02000000 |
| 40000000 | 40404040 | 40404040 | 40404040 | 40404040 | 40404040 | 40404040 |
| 40404040 | 40404040 | 40404040 | 40404040 | C7E3D7D9 | F0F0F1F6* | |
| 02C5E2C4 | 40404040 | 40400010 | 40400006 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C7E3D7D9 | F0F0F1F7* | |
| 02C5E2C4 | 40404040 | 40400010 | 40400007 | C9E2D9C3 | C8E54040 | 02000000 |
| 40000000 | 40404040 | 40404040 | 40404040 | 40404040 | 40404040 | 40404040 |
| 40404040 | 40404040 | 40404040 | 40404040 | C7E3D7D9 | F0F0F1F8* | |
| 02C5E2C4 | 40404040 | 40400010 | 40400008 | D4E6C7C5 | E3D74040 | 02000000 |
| 40000000 | 40404040 | 40404040 | 40404040 | 40404040 | 40404040 | 40404040 |
| 40404040 | 40404040 | 40404040 | 40404040 | C7E3D7D9 | F0F0F1F9* | |
| 02E3E7E3 | 40000458 | 40400038 | 40400001 | 00000000 | 00000000 | 00000000 |

```
MEMBER NAME  GTPRM
00000000  00000000  00000000  00000000  58B0D25C  58A0D1C0  5890D1E0
58F0D264  4110D0A4  05EF41E0  000415FE  C7E3D7D9  F0F0F2F0**
02E3E7E3  40000490  40400038  40400001  4720D29A  58EFD04C  07FE58F0
D2704110  D0B405EF  58F0D26C  4110D0B8  05EF41E0  000415FE  4720D2BE
58EFD054  07FE5800  D1E81200  4780D2F4  C7E3D7D9  F0F0F2F1*
02E3E7E3  400004C8  40400038  40400001  5880D1E8  5A80D1CC  4108D1F3
5000D0D0  58F0D260  4110D0D0  05EF7800  B0003200  4770D2F4  7800D1DC
7000B000  58F0D26C  4110D0D8  05EF41E0  C7E3D7D9  F0F0F2F2*
02E3E7E3  40000500  40400038  40400001  000415FE  4720D30E  58EFD05C
07FE5800  D1E81200  4780D344  5880D1E8  5A80D1CC  4108D1F3  5000D0F0
58F0D260  4110D0F0  05EF7800  B0043200  C7E3D7D9  F0F0F2F3*
02E3E7E3  40000538  40400038  40400001  4770D344  7800D1D8  7000B004
58F0D26C  4110D0F8  05EF41E0  000415FE  4720D35E  58EFD064  07FE5800
D1E81200  4780D370  58F0D258  50A0F000  C7E3D7D9  F0F0F2F4*
02E3E7E3  40000570  40400038  40400001  58F0D26C  4110D110  05EF41E0
000415FE  4720D38A  58EFD06C  07FE5800  D1E81200  4780D39C  58F0D258
50A0F004  58F0D26C  4110D128  05EF41E0  C7E3D7D9  F0F0F2F5*
02E3E7E3  400005A8  40400038  40400001  000415FE  4720D3B6  58EFD074
07FE5800  D1E81200  4780D3C8  58F0D258  50A0F008  58F0D26C  4110D140
05EF41E0  000415FE  4720D3E2  58EFD07C  C7E3D7D9  F0F0F2F6*
02E3E7E3  400005E0  40400038  40400001  07FE5800  D1E81200  4780D3F4
58F0D258  50A0F00C  58F0D26C  4110D158  05EF41E0  000415FE  4720D40E
58EFD084  07FE5800  D1E81200  4780D420  C7E3D7D9  F0F0F2F7*
02E3E7E3  40000618  40400038  40400001  58F0D258  50A0F010  58F0D26C
4110D170  05EF41E0  000415FE  4720D43A  58EFD08C  07FE5800  D1E81200
4780D44C  58F0D258  50A0F014  58F0D26C  C7E3D7D9  F0F0F2F8*
02E3E7E3  40000650  40400038  40400001  4110D188  05EF41E0  000415FE
4720D466  58EFD094  07FE5800  D1E81200  4780D478  58F0D258  50A0F018
58F0D26C  4110D1A0  05EF41E0  000415FE  C7E3D7D9  F0F0F2F9*
02E3E7E3  40000688  4040002C  40400001  4720D492  58EFD09C  07FE5800
D1E81200  4780D4A4  58F0D258  50A0F01C  58F0D268  45E0F004  00000006
00000028  40404040  40404040  40404040  C7E3D7D9  F0F0F3F0**
02D9D3C4  40404040  40400038  40404040  00020001  0C000458  00030001
0C00045C  00040001  1C000460  00050001  1C000464  00060001  1C000468
00070001  1C00046C  00080001  1C000470  C7E3D7D9  F0F0F3F1*
02E3E7E3  400006B4  40400038  40400001  45E0F008  0470B000  45E0F010
58F0D268  45E0F004  00000006  00000060  45E0F008  0470B004  45E0F010
58F0D258  5800F000  8709D4FC  58F0D268  C7E3D7D9  F0F0F3F2*
02E3E7E3  400006EC  40400038  40400001  45E0F004  00000006  00000097
45E0F010  58F0D258  5800F004  8709D51C  58F0D268  45E0F004  00000006
000000C8  45E0F010  58F0D258  5800F008  C7E3D7D9  F0F0F3F3*
02E3E7E3  40000724  40400038  40400001  8709D53C  58F0D268  45E0F004
00000006  000000E5  45E0F010  58F0D258  5800F00C  8709D55C  58F0D268
45E0F004  00000006  00000106  45E0F010  C7E3D7D9  F0F0F3F4*
02E3E7E3  4000075C  40400038  40400001  58F0D258  5800F010  8709D57C
58F0D268  45E0F004  00000006  00000125  45E0F010  58F0D258  5800F014
8709D59C  58F0D268  45E0F004  00000006  C7E3D7D9  F0F0F3F5*
02E3E7E3  40000794  40400004  40400001  00000140  40404040  40404040
40404040  40404040  40404040  40404040  40404040  40404040  40404040
40404040  40404040  40404040  40404040  C7E3D7D9  F0F0F3F6*
02D9D3C4  40404040  40400038  40404040  00010001  0C0006B0  00010001
0C0006CC  00010001  0C0006F4  00010001  0C000714  00010001  0C000734
00010001  0C000754  00010001  0C000774  C7E3D7D9  F0F0F3F7*
02E3E7E3  40000798  40400038  40400001  45E0F010  58F0D258  5800F018
8709D5BC  58F0D268  45E0F004  00000006  0000015A  45E0F010  58F0D258
5800F01C  8709D5DC  58F0D268  45E0F004  C7E3D7D9  F0F0F3F8*
02E3E7E3  400007D0  4040002A  40400001  00000006  00000174  45E0F010
1BFF58E0  D00007FE  58D0D004  58E0D00C  92FFD00C  982CD01C  07FE47F0
```

MEMBER NAME GTPRM

```
D2744040  40404040  40404040  40404040  C7E3D7D9  F0F0F3F9*
02E3E7E3  40000020  40400008  40400001  000007F6  00000200  40404040
40404040  40404040  40404040  40404040  40404040  40404040  40404040
40404040  40404040  40404040  40404040  C7E3D7D9  F0F0F4F0**
02E3E7E3  40000200  40400004  40400001  000007E4  40404040  40404040
40404040  40404040  40404040  40404040  40404040  40404040  40404040
40404040  40404040  40404040  40404040  C7E3D7D9  F0F0F4F1*
02E3E7E3  4000024C  40400008  40400001  0000049A  000006A4  40404040
40404040  40404040  40404040  40404040  40404040  40404040  40404040
40404040  40404040  40404040  40404040  C7E3D7D9  F0F0F4F2*
02D9D3C4  40404040  40400038  40404040  00010001  0C000794  00010001
0C0007B4  00010001  0C0007D4  00010001  0C000020  00010001  0C000024
00010001  0C000200  00010001  0C00024C  C7E3D7D9  F0F0F4F3*
02E3E7E3  40000254  4040001C  40400001  000004BE  000004F4  0000050E
00000544  0000055E  00000570  0000058A  40404040  40404040  40404040
40404040  40404040  40404040  40404040  C7E3D7D9  F0F0F4F4*
02D9D3C4  40404040  40400038  40404040  00010001  0C000250  00010001
0C000254  00010001  0C000258  00010001  0C00025C  00010001  0C000260
00010001  0C000264  00010001  0C000268  C7E3D7D9  F0F0F4F5*
02E3E7E3  40000270  4040001C  40400001  0000059C  000005B6  000005C8
000005E2  000005F4  0000060E  00000620  40404040  40404040  40404040
40404040  40404040  40404040  40404040  C7E3D7D9  F0F0F4F6*
02D9D3C4  40404040  40400038  40404040  00010001  0C00026C  00010001
0C000270  00010001  0C000274  00010001  0C000278  00010001  0C00027C
00010001  0C000280  00010001  0C000284  C7E3D7D9  F0F0F4F7*
02E3E7E3  4000028C  4040001C  40400001  0000063A  0000064C  00000666
00000678  00000692  000006A4  000003F4  40404040  40404040  40404040
40404040  40404040  40404040  40404040  C7E3D7D9  F0F0F4F8*
02D9D3C4  40404040  40400038  40404040  00010001  0C000288  00010001
0C00028C  00010001  0C000290  00010001  0C000294  00010001  0C000298
00010001  0C00029C  00010001  0C0002A0  C7E3D7D9  F0F0F4F9*
02E3E7E3  400002A8  4040001C  40400001  000003C4  000003D4  800001F8
800003F4  000003F4  000003C4  000001F0  40404040  40404040  40404040
40404040  40404040  40404040  40404040  C7E3D7D9  F0F0F5F0**
02D9D3C4  40404040  40400038  40404040  00010001  0C0002A4  00010001
0C0002A8  00010001  0C0002AC  00010001  0C0002B0  00010001  0C0002B4
00010001  0C0002B8  00010001  0C0002BC  C7E3D7D9  F0F0F5F1*
02E3E7E3  400002C4  4040000C  40400001  000003D4  000003CC  800003E8
40404040  40404040  40404040  40404040  40404040  40404040  40404040
40404040  40404040  40404040  40404040  C7E3D7D9  F0F0F5F2*
02E3E7E3  400002D4  40400010  40400001  80000000  000003F4  000003C4
000001E8  40404040  40404040  40404040  40404040  40404040  40404040
40404040  40404040  40404040  40404040  C7E3D7D9  F0F0F5F3*
02D9D3C4  40404040  40400038  40404040  00010001  0C0002C0  00010001
0C0002C4  00010001  0C0002C8  00010001  0C0002CC  00030001  0C0002D4
00010001  0C0002D8  00010001  0C0002DC  C7E3D7D9  F0F0F5F4*
02E3E7E3  400002E4  4040000C  40400001  000003D4  000003CC  800003E8
40404040  40404040  40404040  40404040  40404040  40404040  40404040
40404040  40404040  40404040  40404040  C7E3D7D9  F0F0F5F5*
02E3E7E3  400002F4  40400010  40400001  80000004  000003F4  000003C4
000001E0  40404040  40404040  40404040  40404040  40404040  40404040
40404040  40404040  40404040  40404040  C7E3D7D9  F0F0F5F6*
02D9D3C4  40404040  40400038  40404040  00010001  0C0002E0  00010001
0C0002E4  00010001  0C0002E8  00010001  0C0002EC  00030001  0C0002F4
00010001  0C0002F8  00010001  0C0002FC  C7E3D7D9  F0F0F5F7*
02E3E7E3  40000304  4040001C  40400001  000003D4  000003D0  800003E8
000003F4  000003C4  000001D8  000003D4  40404040  40404040  40404040
40404040  40404040  40404040  40404040  C7E3D7D9  F0F0F5F8*
```

MEMBER NAME GTPRM

02D9D3C4 40404040 40400038 40404040 00010001 0C000300 00010001
0C000304 00010001 0C000308 00010001 0C00030C 00010001 0C000310
00010001 0C000314 00010001 0C000318 C7E3D7D9 F0F0F5F9*
02E3E7E3 40000320 4040001C 40400001 000003CC 800003E8 000003F4
000003C4 000001D0 000003D4 000003CC 40404040 40404040 40404040
40404040 40404040 40404040 40404040 C7E3D7D9 F0F0F6F0**
02D9D3C4 40404040 40400038 40404040 00010001 0C00031C 00010001
0C000320 00010001 0C000324 00010001 0C000328 00010001 0C00032C
00010001 0C000330 00010001 0C000334 C7E3D7D9 F0F0F6F1*
02E3E7E3 4000033C 4040001C 40400001 800003E8 000003F4 000003C4
000001C8 000003D4 000003C8 800003E8 40404040 40404040 40404040
40404040 40404040 40404040 40404040 C7E3D7D9 F0F0F6F2*
02D9D3C4 40404040 40400038 40404040 00010001 0C000338 00010001
0C00033C 00010001 0C000340 00010001 0C000344 00010001 0C000348
00010001 0C00034C 00010001 0C000350 C7E3D7D9 F0F0F6F3*
02E3E7E3 40000358 4040001C 40400001 000003F4 000003C4 000001C0
000003D4 000003CC 800003E8 000003F4 40404040 40404040 40404040
40404040 40404040 40404040 40404040 C7E3D7D9 F0F0F6F4*
02D9D3C4 40404040 40400038 40404040 00010001 0C000354 00010001
0C000358 00010001 0C00035C 00010001 0C000360 00010001 0C000364
00010001 0C000368 00010001 0C00036C C7E3D7D9 F0F0F6F5*
02E3E7E3 40000374 4040001C 40400001 000003C4 000001B8 000003D4
000003C8 800003E8 000003F4 000003C4 40404040 40404040 40404040
40404040 40404040 40404040 40404040 C7E3D7D9 F0F0F6F6*
02D9D3C4 40404040 40400038 40404040 00010001 0C000370 00010001
0C000374 00010001 0C000378 00010001 0C00037C 00010001 0C000380
00010001 0C000384 00010001 0C000388 C7E3D7D9 F0F0F6F7*
02E3E7E3 40000390 4040001C 40400001 000001B0 000003D4 000003C8
800003E8 000003F4 000003C4 000001A8 40404040 40404040 40404040
40404040 40404040 40404040 40404040 C7E3D7D9 F0F0F6F8*
02D9D3C4 40404040 40400038 40404040 00010001 0C00038C 00010001
0C000390 00010001 0C000394 00010001 0C000398 00010001 0C00039C
00010001 0C0003A0 00010001 0C0003A4 C7E3D7D9 F0F0F6F9*
02E3E7E3 400003AC 4040000C 40400001 000003D4 000003C8 800003E8
40404040 40404040 40404040 40404040 40404040 40404040 40404040
40404040 40404040 40404040 40404040 C7E3D7D9 F0F0F7F0**
02D9D3C4 40404040 40400020 40404040 00010001 0C0003A8 00010001
0C0003AC 00010001 0C0003B0 00010001 0C0003B4 40404040 40404040
40404040 40404040 40404040 40404040 C7E3D7D9 F0F0F7F1*
02C5D5C4 40404040 40404040 40404040 40404040 40404040 40404040
000007FA F1F5F7F3 F460C6D6 F34040F0 F2F0F2F8 F7F0F9F8 40F0F84B
F1F64BF0 F6404040 C7E3D7D9 D4404040 C7E3D7D9 F0F0F7F2**

MEMBER NAME HIDELN

02C5E2C4 40404040 40400010 40400001 C8C9C4C5 D3D54040 00000000
40000000 40404040 40404040 40404040 40404040 40404040 40404040
40404040 40404040 40404040 40404040 C8C9C4C5 F0F0F0F1*
02E3E7E3 40000000 40400038 40400001 47F0F00C 07C8C9C4 C5D3D540
90ECD00C 184D98CD F0205040 D00450D0 400807FC 40404040 40404040
021A3040 40C1D9D9 C1E840D6 E5C5D9C6 C8C9C4C5 F0F0F0F2*
02E3E7E3 40000038 40400024 40400001 D3D6E640 C9D540C8 C9C4C5D3
D54B4040 C3D6D5E3 C1C3E340 D7D9D6C7 D9C1D4D4 C5D9E222 40404040
40404040 40404040 40404040 40404040 C8C9C4C5 F0F0F0F3*
02C5E2C4 40404040 40400010 40400002 E3D6D3C5 D9404040 05000000
4000000C 40404040 40404040 40404040 40404040 40404040 40404040
40404040 40404040 40404040 40404040 C8C9C4C5 F0F0F0F4*
02E3E7E3 40000200 40400034 40400001 00000000 00000000 00000001
00000002 00000003 00000004 00000008 0000000A 3F28F5C3 3FCCCCCD
40FEB852 00000000 00000000 40404040 C8C9C4C5 F0F0F0F5*
02C5E2C4 40404040 40400010 40400003 E4D5C9E3 40404040 02000000

```
40000000 40404040 40404040 40404040 40404040 40404040 40404040
40404040 40404040 40404040 40404040 C8C9C4C5 F0F0F0F6*
02C5E2C4 40404040 40400010 40400004 C7C1D7D3 D5404040 02000000
40000000 40404040 40404040 40404040 40404040 40404040 40404040
40404040 40404040 40404040 40404040 C8C9C4C5 F0F0F0F7*
02C5E2C4 40404040 40400010 40400005 D4E5C3C8 D9404040 02000000
40000000 40404040 40404040 40404040 40404040 40404040 40404040
40404040 40404040 40404040 40404040 C8C9C4C5 F0F0F0F8*
02C5E2C4 40404040 40400010 40400006 C9C2C3D6 D47B4040 02000000
40000000 40404040 40404040 40404040 40404040 40404040 40404040
40404040 40404040 40404040 40404040 C8C9C4C5 F0F0F0F9*
02C5E2C4 40404040 40400010 40400007 C9D5E3C5 D9C34040 02000000
40000000 40404040 40404040 40404040 40404040 40404040 40404040
40404040 40404040 40404040 40404040 C8C9C4C5 F0F0F1F0**
02C5E2C4 40404040 40400010 40400008 D3C9D4C9 E3E54040 02000000
40000000 40404040 40404040 40404040 40404040 40404040 40404040
40404040 40404040 40404040 40404040 C8C9C4C5 F0F0F1F1*
02C5E2C4 40404040 40400010 40400009 D6E5D9D3 C1D74040 02000000
40000000 40404040 40404040 40404040 40404040 40404040 40404040
40404040 40404040 40404040 40404040 C8C9C4C5 F0F0F1F2*
02E3E7E3 40000618 40400020 40400001 00000000 00000000 00000000
00000000 00000000 00000000 00000000 00000000 40404040 40404040
40404040 40404040 40404040 40404040 C8C9C4C5 F0F0F1F3*
02D9D3C4 40404040 40400038 40404040 00020001 0C000618 00030001
1C00061C 00040001 1C000620 00050001 1C000624 00060001 1C000628
00070001 1C00062C 00080001 1C000630 C8C9C4C5 F0F0F1F4*
02C5E2C4 40404040 40400010 4040000A D7C9C5D9 C3C54040 02000000
40000000 40404040 40404040 40404040 40404040 40404040 40404040
40404040 40404040 40404040 40404040 C8C9C4C5 F0F0F1F5*
02C5E2C4 40404040 40400010 4040000B D7D9D6D1 D3D54040 02000000
40000000 40404040 40404040 40404040 40404040 40404040 40404040
40404040 40404040 40404040 40404040 C8C9C4C5 F0F0F1F6*
02E3E7E3 40000638 4040000C 40400001 00000000 00000000 00000000
40404040 40404040 40404040 40404040 40404040 40404040 40404040
40404040 40404040 40404040 40404040 C8C9C4C5 F0F0F1F7*
02E3E7E3 400002C8 40400004 40400001 00000062 40404040 40404040
40404040 40404040 40404040 40404040 40404040 40404040 40404040
40404040 40404040 40404040 40404040 C8C9C4C5 F0F0F1F8*
02E3E7E3 4000066C 40400038 40400001 5860D5B8 58A0D5E0 5890D1A8
5870D1A0 5800D1B0 5000D204 7800D1A4 7000D270 5070D26C 7800D1E4
7000D248 7000D240 7800D1F4 7000D258 C8C9C4C5 F0F0F1F9*
02E3E7E3 400006A4 40400038 40400001 7000D250 7800D1E4 7900D1E8

MEMBER NAME  HIDELN
4730D65C 7800D1E8 7000D240 7800D1E4 7900D1E8 4750D670 7800D1E8
7000D248 7800D1F4 7900D1F8 4730D684 C8C9C4C5 F0F0F2F0**
02E3E7E3 400006DC 40400038 40400001 7800D1F8 7000D250 7800D1F4
7900D1F8 4750D698 7800D1F8 7000D258 7800D1E8 7B00D1E4 7000D1D8
7800D1F8 7B00D1F4 7000D1DC 7800D1A4 C8C9C4C5 F0F0F2F1*
02E3E7E3 40000714 40400038 40400001 7000D1E0 58F0D5BC 4110D06C
05EF5800 D2641B09 5000D210 5090D1D4 7820D1C4 7C20D1D8 7020D5FC
7020D5F0 7820D1C4 7C20D1DC 7020D600 C8C9C4C5 F0F0F2F2*
02E3E7E3 4000074C 40400038 40400001 7020D5F4 5880D1B4 58B0D1AC
5850D1D4 5C40D1B8 18251A28 7842A000 7040D1EC 18255A20 D1B87862
A0007060 D1FC5850 D1D41A59 5050D5F8 C8C9C4C5 F0F0F2F3*
02E3E7E3 40000784 40400038 40400001 5C40D1B8 18251A28 7822A000
7020D1F0 18255A20 D1B87802 A0007000 D2007040 D24C7040 D2447060
D25C7060 D2543942 4730D75C 7020D244 C8C9C4C5 F0F0F2F4*
02E3E7E3 400007BC 40400038 40400001 7800D1EC 7900D1F0 4750D770
7800D1F0 7000D24C 7800D1FC 7900D200 4730D784 7800D200 7000D254
7800D1FC 7900D200 4750D798 7800D200 C8C9C4C5 F0F0F2F5*
```

| | | | | | | |
|---|---|---|---|---|---|---|
| 02E3E7E3 | 400007F4 | 40400038 | 40400001 | 7000D25C | 58F0D5D0 | 4110D078 |
| 05EF5800 | D20C1200 | 4780DAAC | 5080D204 | 7860D1E4 | 7B60D1EC | 30667820 |
| D1F47B20 | D1FC3022 | 7020D218 | 7840D1E8 | C8C9C4C5 | F0F0F2F6* | |
| 02E3E7E3 | 4000082C | 40400038 | 40400001 | 7B40D1F0 | 30447040 | D21C7820 |
| D1F87B20 | D2003022 | 7020D220 | 79606004 | 47A0D810 | 7800D218 | 79006004 |
| 47A0D810 | 79406004 | 47A0D810 | 79206004 | C8C9C4C5 | F0F0F2F7* | |
| 02E3E7E3 | 40000864 | 40400038 | 40400001 | 47A0D810 | 1BFF58E0 | D00007FE |
| 7860D1E4 | 7B60D1F0 | 30667820 | D1F47B20 | D2003022 | 7020D218 | 7840D1E8 |
| 7B40D1EC | 30447040 | D21C7820 | D1F87B20 | C8C9C4C5 | F0F0F2F8* | |
| 02E3E7E3 | 4000089C | 40400038 | 40400001 | D1FC3022 | 7020D220 | 79606004 |
| 47A0D870 | 7800D218 | 79006004 | 47A0D870 | 79406004 | 47A0D870 | 79206004 |
| 47A0D870 | 1BFF58E0 | D00007FE | 5800D1B0 | C8C9C4C5 | F0F0F2F9* | |
| 02E3E7E3 | 400008D4 | 40400038 | 40400001 | 5000D204 | 4100D284 | 5000D0BC |
| 4100D288 | 5000D0C0 | 9280D0C0 | 58F0D5CC | 4110D09C | 05EF41E0 | 000415FE |
| 4720D8A6 | 58EFD04C | 07FE58F0 | D5DC4110 | C8C9C4C5 | F0F0F3F0** | |
| 02E3E7E3 | 4000090C | 40400038 | 40400001 | D0C405EF | 41E00008 | 15FE4720 |
| D8C058EF | D05407FE | 47F0DAAC | 58F0D5DC | 4110D0D8 | 05EF41E0 | 000815FE |
| 4720D8DE | 58EFD060 | 07FE47F0 | DAAC5800 | C8C9C4C5 | F0F0F3F1* | |
| 02E3E7E3 | 40000944 | 40400038 | 40400001 | D1AC5000 | D2041BFF | 58E0D000 |
| 07FE1829 | 58F0D5C4 | 4110D0EC | 05EF58F0 | D5C44110 | D0F805EF | 7800D5FC |
| 7000D5E8 | 7800D600 | 7000D5EC | 5880D1BC | C8C9C4C5 | F0F0F3F2* | |
| 02E3E7E3 | 4000097C | 40400038 | 40400001 | 18B219B8 | 47C0D928 | 5070D234 |
| 19B847C0 | D93247F0 | D95E7820 | D2747A20 | D5E87020 | D2747820 | D2787A20 |
| D5EC7020 | D27858F0 | D5D84110 | D10405EF | C8C9C4C5 | F0F0F3F3* | |
| 02E3E7E3 | 400009B4 | 40400038 | 40400001 | 1AB95990 | D2344780 | D91E58B0 |
| D1AC5880 | D1B41829 | 7800D5F0 | 7000D5E8 | 7800D5F4 | 7000D5EC | 5880D1BC |
| 18B219B8 | 47C0D988 | 5070D238 | 19B847C0 | C8C9C4C5 | F0F0F3F4* | |
| 02E3E7E3 | 400009EC | 40400038 | 40400001 | D99247F0 | D9BE7820 | D27C7B20 |
| D5E87020 | D27C7820 | D2807B20 | D5EC7020 | D28058F0 | D5D84110 | D11405EF |
| 1AB95990 | D2384780 | D97E58B0 | D1AC5880 | C8C9C4C5 | F0F0F3F5* | |
| 02E3E7E3 | 40000A24 | 40400038 | 40400001 | D1B45800 | D2341200 | 4770D9DA |
| 5800D238 | 12004780 | DAAC59B0 | D2344770 | D9EA59B0 | D2384780 | DAAC59B0 |
| D2344770 | DA005800 | D2381200 | 4770DA00 | C8C9C4C5 | F0F0F3F6* | |
| 02E3E7E3 | 40000A5C | 40400038 | 40400001 | 50B0D204 | 5800D234 | 12004770 |
| DA1659B0 | D2384770 | DA1650B0 | D20459B0 | D2044770 | DA261BFF | 58E0D000 |
| 07FE47F0 | DAAC58F0 | D5D44110 | D12405EF | C8C9C4C5 | F0F0F3F7* | |
| 02E3E7E3 | 40000A94 | 40400038 | 40400001 | 7800D23C | 32004780 | DAAC7820 |
| D23C7A20 | D2707020 | D2707920 | D1C847C0 | DA565080 | D2045980 | D2044770 |
| DA661BFF | 58E0D000 | 07FE5820 | D26C1A29 | C8C9C4C5 | F0F0F3F8* | |
| 02E3E7E3 | 40000ACC | 40400038 | 40400001 | 5020D26C | 18328930 | 00037800 |
| D2247003 | D2847800 | D22C7003 | D2881A29 | 5020D26C | 5920D268 | 47C0DA98 |

MEMBER NAME HIDELN

| | | | | | | |
|---|---|---|---|---|---|---|
| 47F0DB50 | 89200003 | 7800D228 | 7002D284 | C8C9C4C5 | F0F0F3F9* | |
| 02E3E7E3 | 40000B04 | 40400038 | 40400001 | 7800D230 | 7002D288 | 5800D5F8 |
| 5000D1D4 | 5900D210 | 47C0D6F8 | 5800D26C | 12004780 | DAD858F0 | D5C04110 |
| D15805EF | 1BFF58E0 | D00007FE | 7820D1C0 | C8C9C4C5 | F0F0F4F0** | |
| 02E3E7E3 | 40000B3C | 40400038 | 40400001 | 7C20D1D8 | 7020D604 | 7A20D1E4 |
| 7020D284 | 7820D1C0 | 7C20D1DC | 7020D608 | 7A20D1F4 | 7020D288 | 58F0D5D8 |
| 4110D17C | 05EF7820 | D1E87B20 | D6047020 | C8C9C4C5 | F0F0F4F1* | |
| 02E3E7E3 | 40000B74 | 40400038 | 40400001 | D2847820 | D1F87B20 | D6087020 |
| D28858F0 | D5D84110 | D18C05EF | 5800D234 | 5900D1AC | 4780DB44 | 5800D238 |
| 5900D1AC | 4770DB48 | 5090D204 | 1BFF58E0 | C8C9C4C5 | F0F0F4F2* | |
| 02E3E7E3 | 40000BAC | 40400038 | 40400001 | D00007FE | 58F0D5C8 | 45E0F004 |
| 00000006 | 00000028 | 45E0F010 | 58F0D5C8 | 45E0F034 | 05404040 | F4F458A0 |
| D00458E0 | A00C58B0 | A0185810 | B0045820 | C8C9C4C5 | F0F0F4F3* | |
| 02E3E7E3 | 40000BE4 | 40400038 | 40400001 | D2645020 | 10005830 | B0087820 |
| D1E47020 | 30005840 | B00C7840 | D1F47040 | 40005850 | B0107860 | D1E87060 |
| 50005860 | B0147800 | D1F87000 | 60005870 | C8C9C4C5 | F0F0F4F4* | |
| 02E3E7E3 | 40000C1C | 40400038 | 40400001 | B0185880 | D2045080 | 700018DA |
| 92FFA00C | 982CA01C | 07FE987B | 10045820 | 70005020 | D2647820 | 80007020 |

```
D1E47820  90007020  D1F47820  A0007020  C8C9C4C5  F0F0F4F5*
02E3E7E3  40000C54  40400038  40400001  D1E87820  B0007020  D1F85870
10185820  70005020  D2045820  10004130  20004150  00041B25  5C40D1AC
1B255020  D5E05030  D5E45030  D1045030  C8C9C4C5  F0F0F4F6*
02E3E7E3  40000C8C  40400012  40400001  D1145030  D1685030  D17C5030
D18C47F0  D60C4040  40404040  40404040  40404040  40404040  40404040
40404040  40404040  40404040  40404040  C8C9C4C5  F0F0F4F7*
02E3E7E3  40000020  40400008  40400001  00000C32  00000060  40404040
40404040  40404040  40404040  40404040  40404040  40404040  40404040
40404040  40404040  40404040  40404040  C8C9C4C5  F0F0F4F8*
02E3E7E3  40000060  40400004  40400001  00000BD2  40404040  40404040
40404040  40404040  40404040  40404040  40404040  40404040  40404040
40404040  40404040  40404040  40404040  C8C9C4C5  F0F0F4F9*
02E3E7E3  400000AC  40400004  40400001  00000906  40404040  40404040
40404040  40404040  40404040  40404040  40404040  40404040  40404040
40404040  40404040  40404040  40404040  C8C9C4C5  F0F0F5F0**
02D9D3C4  40404040  40400038  40404040  00090001  1C000634  000A0001
1C000638  000B0001  1C00063C  00010001  0C000BBC  00010001  0C000020
00010001  0C000024  00010001  0C000060  C8C9C4C5  F0F0F5F1*
02E3E7E3  400000B0  4040001C  40400001  00000A8A  00000920  00000924
00000B0C  0000093E  00000942  00000952  40404040  40404040  40404040
40404040  40404040  40404040  40404040  C8C9C4C5  F0F0F5F2*
02D9D3C4  40404040  40400038  40404040  00010001  0C0000AC  00010001
0C0000B0  00010001  0C0000B4  00010001  0C0000B8  00010001  0C0000BC
00010001  0C0000C0  00010001  0C0000C4  C8C9C4C5  F0F0F5F3*
02E3E7E3  400000CC  4040001C  40400001  00000238  0000023C  80000240
000002A8  000002A0  000002B8  000002B0  40404040  40404040  40404040
40404040  40404040  40404040  40404040  C8C9C4C5  F0F0F5F4*
02D9D3C4  40404040  40400038  40404040  00010001  0C0000C8  00010001
0C0000CC  00010001  0C0000D0  00010001  0C0000D4  00010001  0C0000D8
00010001  0C0000DC  00010001  0C0000E0  C8C9C4C5  F0F0F5F5*
02E3E7E3  400000E8  4040001C  40400001  000002AC  000002A4  000002BC
000002B4  8000026C  00000244  00000254  40404040  40404040  40404040
40404040  40404040  40404040  40404040  C8C9C4C5  F0F0F5F6*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  C8C9C4C5  F0F0F5F7*
02E3E7E3  40000104  40400018  40400001  00000248  00000258  0000024C
0000025C  00000250  00000260  40404040  40404040  40404040  40404040
40404040  40404040  40404040  40404040  C8C9C4C5  F0F0F5F8*

MEMBER NAME  HIDELN
02E3E7E3  40000120  40400008  40400001  80000000  000002E4  40404040
40404040  40404040  40404040  40404040  40404040  40404040  40404040
40404040  40404040  40404040  40404040  C8C9C4C5  F0F0F5F9*
02D9D3C4  40404040  40400038  40404040  00010001  0C000100  00010001
0C000104  00010001  0C000108  00010001  0C00010C  00010001  0C000110
00010001  0C000114  00010001  0C000118  C8C9C4C5  F0F0F6F0**
02E3E7E3  40000128  4040001C  40400001  00000244  00000254  00000248
80000258  000002E4  0000024C  0000025C  40404040  40404040  40404040
40404040  40404040  40404040  40404040  C8C9C4C5  F0F0F6F1*
02D9D3C4  40404040  40400038  40404040  00010001  0C000124  00010001
0C000128  00010001  0C00012C  00010001  0C000130  00010001  0C000134
00010001  0C000138  00010001  0C00013C  C8C9C4C5  F0F0F6F2*
02E3E7E3  40000144  4040001C  40400001  00000250  80000260  00000218
000002D4  800002E4  00000218  000002DC  40404040  40404040  40404040
40404040  40404040  40404040  40404040  C8C9C4C5  F0F0F6F3*
02D9D3C4  40404040  40400038  40404040  00010001  0C000140  00010001
0C000144  00010001  0C000148  00010001  0C00014C  00010001  0C000150
00010001  0C000154  00010001  0C000158  C8C9C4C5  F0F0F6F4*
02E3E7E3  40000160  40400004  40400001  800002E4  40404040  40404040
```

```
40404040  40404040  40404040  40404040  40404040  40404040  40404040
40404040  40404040  40404040  40404040  C8C9C4C5  F0F0F6F5*
02E3E7E3  40000168  4040000C  40400001  000002C4  000002D4  80000294
40404040  40404040  40404040  40404040  40404040  40404040  40404040
40404040  40404040  40404040  40404040  C8C9C4C5  F0F0F6F6*
02E3E7E3  40000178  4040000C  40400001  000002C4  000002DC  80000298
40404040  40404040  40404040  40404040  40404040  40404040  40404040
40404040  40404040  40404040  40404040  C8C9C4C5  F0F0F6F7*
02D9D3C4  40404040  40400038  40404040  00010001  0C00015C  00010001
0C000160  00010001  0C000168  00010001  0C00016C  00010001  0C000170
00010001  0C000178  00010001  0C00017C  C8C9C4C5  F0F0F6F8*
02E3E7E3  40000184  4040001C  40400001  00000244  00000254  00000248
00000258  0000024C  0000025C  00000250  40404040  40404040  40404040
40404040  40404040  40404040  40404040  C8C9C4C5  F0F0F6F9*
02D9D3C4  40404040  40400038  40404040  00010001  0C000180  00010001
0C000184  00010001  0C000188  00010001  0C00018C  00010001  0C000190
00010001  0C000194  00010001  0C000198  C8C9C4C5  F0F0F7F0**
02E3E7E3  400001A0  4040001C  40400001  00000260  0000029C  00000284
0000028C  00000288  80000290  00000244  40404040  40404040  40404040
40404040  40404040  40404040  40404040  C8C9C4C5  F0F0F7F1*
02D9D3C4  40404040  40400038  40404040  00010001  0C00019C  00010001
0C0001A0  00010001  0C0001A4  00010001  0C0001A8  00010001  0C0001AC
00010001  0C0001B0  00010001  0C0001B4  C8C9C4C5  F0F0F7F2*
02E3E7E3  400001BC  4040000C  40400001  00000254  00000248  00000258
40404040  40404040  40404040  40404040  40404040  40404040  40404040
40404040  40404040  40404040  40404040  C8C9C4C5  F0F0F7F3*
02E3E7E3  400001CC  40400010  40400001  000002C4  000002EC  000002CC
80000264  40404040  40404040  40404040  40404040  40404040  40404040
40404040  40404040  40404040  40404040  C8C9C4C5  F0F0F7F4*
02D9D3C4  40404040  40400038  40404040  00010001  0C0001B8  00010001
0C0001BC  00010001  0C0001C0  00010001  0C0001C4  00010001  0C0001CC
00010001  0C0001D0  00010001  0C0001D4  C8C9C4C5  F0F0F7F5*
02E3E7E3  400001E0  4040000C  40400001  000002C4  000002E4  80000294
40404040  40404040  40404040  40404040  40404040  40404040  40404040
40404040  40404040  40404040  40404040  C8C9C4C5  F0F0F7F6*
02E3E7E3  400001F0  4040000C  40400001  000002C4  000002E4  80000298
40404040  40404040  40404040  40404040  40404040  40404040  40404040
40404040  40404040  40404040  40404040  C8C9C4C5  F0F0F7F7*
02E3E7E3  40000648  40400024  40400001  00000000  00000000  00000000
```

MEMBER NAME HIDELN

```
00000000  00000000  00000000  00000000  00000000  00000000  40404040
40404040  40404040  40404040  40404040  C8C9C4C5  F0F0F7F8*
02D9D3C4  40404040  40400038  40404040  00010001  0C0001D8  00010001
0C0001E0  00010001  0C0001E4  00010001  0C0001E8  00010001  0C0001F0
00010001  0C0001F4  00010001  0C0001F8  C8C9C4C5  F0F0F7F9*
02C5D5C4  40404040  40404040  40404040  40404040  40404040  40404040
00000C9E  F1F5F7F3  F460C6D6  F34040F0  F2F0F2F8  F7F0F9F8  40F0F84B
F1F64BF1  F1404040  C8C9C4C5  D3D54040  C8C9C4C5  F0F0F8F0**
```

MEMBER NAME HLDRV

```
02C5E2C4  40404040  40400010  40400001  C8D3C4D9  E5404040  00000000
40000000  40404040  40404040  40404040  40404040  40404040  40404040
40404040  40404040  40404040  40404040  C8D3C4D9  F0F0F0F1*
02E3E7E3  40000000  40400028  40400001  47F0F00C  07C8D3C4  D9E54040
90ECD00C  184D98CD  F0205040  D00450D0  400807FC  40404040  40404040
40404040  40404040  40404040  40404040  C8D3C4D9  F0F0F0F2*
02E3E7E3  40000090  40400028  40400001  00000000  00000001  00000001
00000002  00000003  00000004  00000005  00000006  00000000  00000000
40404040  40404040  40404040  40404040  C8D3C4D9  F0F0F0F3*
02C5E2C4  40404040  40400010  40400002  C8C9C4C5  D3D54040  02000000
```

```
40000000  40404040  40404040  40404040  40404040  40404040  40404040
40404040  40404040  40404040  40404040  C8D3C4D9  F0F0F0F4*
02E3E7E3  400000E8  40400004  40400001  00000000  40404040  40404040
40404040  40404040  40404040  40404040  40404040  40404040  40404040
40404040  40404040  40404040  40404040  C8D3C4D9  F0F0F0F5*
02E3E7E3  400000F0  40400008  40400001  00000000  00000000  40404040
40404040  40404040  40404040  40404040  40404040  40404040  40404040
40404040  40404040  40404040  40404040  C8D3C4D9  F0F0F0F6*
02E3E7E3  400000FC  40400004  40400001  00000000  40404040  40404040
40404040  40404040  40404040  40404040  40404040  40404040  40404040
40404040  40404040  40404040  40404040  C8D3C4D9  F0F0F0F7*
02E3E7E3  40000108  40400038  40400001  58B0D0C0  58A0D068  5890D070
50A0B004  50A0B008  50A0B00C  50A0B010  50A0B014  50A0B018  5800D0B4
1B095000  D0AC1839  5890D06C  58A0D0CC  C8D3C4D9  F0F0F0F8*
02E3E7E3  40000140  40400038  40400001  18835A80  D0701873  5C60D0DC
18275A20  D07C7802  A0007000  D0981827  5A20D0DC  7802A000  7000D0A0
18585C40  D0DC1825  5A20D07C  7802A000  C8D3C4D9  F0F0F0F9*
02E3E7E3  40000178  40400038  40400001  7000D09C  18255A20  D0DC7802
A0007000  D0A458F0  D0C84110  D04C05EF  5800D0A8  5900D074  4770D178
5800D0A8  5900D074  4770D188  5090B008  C8D3C4D9  F0F0F1F0**
02E3E7E3  400001B0  40400038  40400001  5800D0A8  5900D074  4770D1A4
58A0D068  5890D070  1BFF58E0  D00007FE  5800D0A8  5900D070  4770D1B4
5090B004  5800D0A8  5900D078  4770D1C4  C8D3C4D9  F0F0F1F1*
02E3E7E3  400001E8  40400038  40400001  5090B00C  5800D0A8  5900D07C
4770D1D4  5090B010  5800D0A8  5900D080  4770D1E4  5090B014  5800D0A8
5900D084  4770D1F4  5090B018  18385980  C8D3C4D9  F0F0F1F2*
02E3E7E3  40000220  40400038  40400001  D0AC47C0  D11858A0  D0685890
D0701BFF  58E0D000  07FE58A0  D00458E0  A00C58B0  A0185810  B00C5820
D0B85020  100018DA  92FFA00C  982CA01C  C8D3C4D9  F0F0F1F3*
02E3E7E3  40000258  40400038  40400001  07FE987A  10045820  70005020
D0B45820  90005020  D0B85820  10004130  20004150  00041B25  5C40D074
1B255020  D0CC5030  D0D05820  10084130  C8D3C4D9  F0F0F1F4*
02E3E7E3  40000290  40400034  40400001  20004150  00041B25  5C40D074
1B255020  D0D45030  D0D85030  D04C5820  10104130  20004150  00041B25
5020D0C0  5030D0C4  47F0D0E0  40404040  C8D3C4D9  F0F0F1F5*
02E3E7E3  40000020  4040000C  40400001  0000025A  00000028  00000236
40404040  40404040  40404040  40404040  40404040  40404040  40404040
40404040  40404040  40404040  40404040  C8D3C4D9  F0F0F1F6*
02E3E7E3  40000078  40400010  40400001  000000E0  000000C0  000000C8
000000C4  40404040  40404040  40404040  40404040  40404040  40404040
40404040  40404040  40404040  40404040  C8D3C4D9  F0F0F1F7*
02D9D3C4  40404040  40400038  40404040  00020001  1C0000F0  00010001
0C000020  00010001  0C000024  00010001  0C000028  00010001  0C000078
00010001  0C00007C  00010001  0C000080  C8D3C4D9  F0F0F1F8*
02E3E7E3  40000088  40400008  40400001  000000CC  800000D0  40404040
40404040  40404040  40404040  40404040  40404040  40404040  40404040
40404040  40404040  40404040  40404040  C8D3C4D9  F0F0F1F9*
02E3E7E3  40000104  40400004  40400001  00000008  40404040  40404040

MEMBER NAME  HLDRV
40404040  40404040  40404040  40404040  40404040  40404040  40404040
40404040  40404040  40404040  40404040  C8D3C4D9  F0F0F2F0**
02D9D3C4  40404040  40400018  40404040  00010001  0C000084  00010001
0C000088  00010001  0C00008C  40404040  40404040  40404040  40404040
40404040  40404040  40404040  40404040  C8D3C4D9  F0F0F2F1*
02C5D5C4  40404040  40404040  40404040  40404040  40404040  40404040
000002C4  F1F5F7F3  F460C6D6  F34040F0  F2F0F2F8  F7F0F9F8  40F0F84B
F1F64BF1  F6404040  C8D3C4D9  E5404040  C8D3C4D9  F0F0F2F2**

MEMBER NAME  INTDRV
02C5E2C4  40404040  40400010  40400001  C9D5E3C4  D9E54040  00000000
```

```
40000000  40404040  40404040  40404040  40404040  40404040  40404040
40404040  40404040  40404040  40404040  C9D5E3C4  F0F0F0F1*
02E3E7E3  40000000  40400028  40400001  47F0F00C  07C9D5E3  C4D9E540
90ECD00C  184D98CD  F0205040  D00450D0  400807FC  40404040  40404040
40404040  40404040  40404040  40404040  C9D5E3C4  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C9D5E3C4  F0F0F0F3*
02E3E7E3  40000128  40400034  40400001  00000000  00000000  00000000
00000001  00000001  00000002  00000003  00000004  00000008  3FCCCCCD
41100000  00000000  00000000  40404040  C9D5E3C4  F0F0F0F4*
02C5E2C4  40404040  40400010  40400003  E4D5C9E3  40404040  02000000
40000000  40404040  40404040  40404040  40404040  40404040  40404040
40404040  40404040  40404040  40404040  C9D5E3C4  F0F0F0F5*
02E3E7E3  400001D8  40400008  40400001  00000000  00000000  40404040
40404040  40404040  40404040  40404040  40404040  40404040  40404040
40404040  40404040  40404040  40404040  C9D5E3C4  F0F0F0F6*
02E3E7E3  400001E4  40400008  40400001  00000000  00000000  40404040
40404040  40404040  40404040  40404040  40404040  40404040  40404040
40404040  40404040  40404040  40404040  C9D5E3C4  F0F0F0F7*
02E3E7E3  400001F0  40400004  40400001  00000000  40404040  40404040
40404040  40404040  40404040  40404040  40404040  40404040  40404040
40404040  40404040  40404040  40404040  C9D5E3C4  F0F0F0F8*
02C5E2C4  40404040  40400010  40400004  D4E5C3C8  D9404040  02000000
40000000  40404040  40404040  40404040  40404040  40404040  40404040
40404040  40404040  40404040  40404040  C9D5E3C4  F0F0F0F9*
02E3E7E3  400001F8  40400004  40400001  00000000  40404040  40404040
40404040  40404040  40404040  40404040  40404040  40404040  40404040
40404040  40404040  40404040  40404040  C9D5E3C4  F0F0F1F0**
02C5E2C4  40404040  40400010  40400005  C9D5E3C5  D9C34040  02000000
40000000  40404040  40404040  40404040  40404040  40404040  40404040
40404040  40404040  40404040  40404040  C9D5E3C4  F0F0F1F1*
02E3E7E3  40000200  40400008  40400001  00000000  00000000  40404040
40404040  40404040  40404040  40404040  40404040  40404040  40404040
40404040  40404040  40404040  40404040  C9D5E3C4  F0F0F1F2*
02C5E2C4  40404040  40400010  40400006  D3C9D4C9  E3E54040  02000000
40000000  40404040  40404040  40404040  40404040  40404040  40404040
40404040  40404040  40404040  40404040  C9D5E3C4  F0F0F1F3*
02C5E2C4  40404040  40400010  40400007  D7D9C3C4  D9E54040  02000000
40000000  40404040  40404040  40404040  40404040  40404040  40404040
40404040  40404040  40404040  40404040  C9D5E3C4  F0F0F1F4*
02C5E2C4  40404040  40400010  40400008  D7D9D6D1  D3D54040  02000000
40000000  40404040  40404040  40404040  40404040  40404040  40404040
40404040  40404040  40404040  40404040  C9D5E3C4  F0F0F1F5*
02E3E7E3  4000020C  40400014  40400001  00000000  00000000  00000000
00000000  00000000  40404040  40404040  40404040  40404040  40404040
40404040  40404040  40404040  40404040  C9D5E3C4  F0F0F1F6*
02E3E7E3  40000298  40400038  40400001  5860D110  5800D104  5000D16C
5060D134  5800D11C  5000D204  5800D120  5000D20C  5800D23C  5000D248
5800D238  5000D24C  5800D260  5000D250  C9D5E3C4  F0F0F1F7*
02E3E7E3  400002D0  40400038  40400001  5800D264  5000D254  5800D268
5000D258  5800D26C  5000D25C  5880D238  5890D120  58B0D1B4  58A0D1D0
5870D1C8  58E0D248  582E7000  5020D15C  C9D5E3C4  F0F0F1F8*
02E3E7E3  40000308  40400038  40400001  58E0D24C  5A2E7000  5B20D114
5020D168  58E0D250  410EA000  5000D06C  58E0D254  410EA000  5000D070
58E0D258  410EA000  5000D074  58E0D25C  C9D5E3C4  F0F0F1F9*
02E3E7E3  40000340  40400038  40400001  410EA000  5000D078  4100B004

MEMBER NAME  INTDRV
5000D07C  4100B008  5000D080  4100B00C  5000D084  4100B010  5000D088
58F0D1E8  4110D06C • 05EF5800  D1641200  C9D5E3C4  F0F0F2F0**
```

```
02E3E7E3  40000378  40400038  40400001  4770D364  5960D134  4770D364
1BFF58E0  D00007FE  5800D164  12004780  D6B45800  D1045000  D1885800
D1005000  D1605800  D15C5000  D1381830  C9D5E3C4  F0F0F2F1*
02E3E7E3  400003B0  40400038  40400001  1C291803  5A00D11C  5000D208
1A395030  D2105870  D16858B0  D1C058A0  D1F45880  D1DC5800  D1881A06
5000D188  5800D160  1BFF870F  D3CA5800  C9D5E3C4  F0F0F2F2*
02E3E7E3  400003E8  40400038  40400001  D1005000  D16047F0  D68C5850
D1381A56  5050D13C  5C40D120  18355A30  D11C5030  D2141825  5A20D120
5020D218  41008004  5000D090  41008008  C9D5E3C4  F0F0F2F3*
02E3E7E3  40000420  40400038  40400001  5000D094  4100800C  5000D098
41008010  5000D09C  58E0D208  410EB000  5000D0A0  58E0D210  410EB000
5000D0A4  4103B000  5000D0A8  4102B000  C9D5E3C4  F0F0F2F4*
02E3E7E3  40000458  40400038  40400001  5000D0AC  58F0D1E4  4110D090
05EF41E0  000415FE  4720D44E  58EFD04C  07FE7800  D1747000  D19C7800
D1787000  D1A07800  80047000  D14C7800  C9D5E3C4  F0F0F2F5*
02E3E7E3  40000490  40400038  40400001  80087000  D1547800  800C7000
D1507800  80107000  D15858F0  D1F04110  D0B805EF  41E00008  15FE4720
D49858EF  D05407FE  47F0D68C  58E0D208  C9D5E3C4  F0F0F2F6*
02E3E7E3  400004C8  40400038  40400001  782EB000  7020D14C  7020D21C
58E0D210  782EB000  7020D154  7020D220  58E0D214  780EB000  7000D150
58E0D218  780EB000  7000D158  58F0D1F0  C9D5E3C4  F0F0F2F7*
02E3E7E3  40000500  40400038  40400001  4110D0B8  05EF41E0  000815FE
4720D4EE  58EFD060  07FE47F0  D68C5960  D1884770  D52A7840  D19C7B40
D21C3044  7820D1A0  7B20D220  30227020  C9D5E3C4  F0F0F2F8*
02E3E7E3  40000538  40400038  40400001  D18458F0  D1B07940  F00447A0
D52A58F0  D1B07920  F0044750  D68C5800  D10C5000  D1607820  800C7B20
80047020  D1407820  80107B20  80087020  C9D5E3C4  F0F0F2F9*
02E3E7E3  40000570  40400038  40400001  D1447800  D1087000  D14858F0
D1BC4110  D0CC05EF  7820D19C  7020D224  7020D194  7820D1A0  7020D228
7020D198  7800D108  7000D17C  7820D140  C9D5E3C4  F0F0F3F0**
02E3E7E3  400005A8  40400038  40400001  7C20D124  7020D1FC  7020D22C
7820D144  7C20D124  7020D200  7020D230  189658A0  D1C87820  D1947A20
D1FC7020  D1947820  D1987A20  D2007020  C9D5E3C4  F0F0F3F1*
02E3E7E3  400005E0  40400038  40400001  D19858F0  D1EC4110  D0D805EF
5990D164  4780D5A2  58A0D1F4  5800D164  5900D114  4770D5E4  7800D128
7000D17C  7800D224  7000D194  7800D228  C9D5E3C4  F0F0F3F2*
02E3E7E3  40000618  40400038  40400001  7000D198  7800D22C  7000D1FC
7800D230  7000D200  189658A0  D1C87820  D1947B20  D1FC7020  D1947820
D1987B20  D2007020  D19858F0  D1EC4110  C9D5E3C4  F0F0F3F3*
02E3E7E3  40000650  40400038  40400001  D0D805EF  5990D164  4780D60A
58A0D1F4  7800D17C  7900D128  4770D650  5800D164  5900D114  4770D66A
7800D17C  32004770  D6665800  D1645900  C9D5E3C4  F0F0F3F4*
02E3E7E3  40000688  40400038  40400001  D1144780  D66A47F0  D68C5800
D16C1A06  5000D16C  18208920  00034102  A0045000  D0F458F0  D1D84110
D0F005EF  5800D210  5A00D120  5000D210  C9D5E3C4  F0F0F3F5*
02E3E7E3  400006C0  40400038  40400001  5800D208  5A00D120  5000D208
5820D138  1A265020  D1381927  47C0D3AA  5870D1C8  58A0D1D0  58B0D1B4
5890D120  5880D238  5820D134  1A265020  C9D5E3C4  F0F0F3F6*
02E3E7E3  400006F8  40400038  40400001  D1345800  D25C1A08  5000D25C
5800D258  1A085000  D2585800  D2541A08  5000D254  5800D250  1A085000
D2505800  D24C1A09  5000D24C  5800D248  C9D5E3C4  F0F0F3F7*
02E3E7E3  40000730  40400038  40400001  1A095000  D2485920  D17047C0
D2D41BFF  58E0D000  07FE58A0  D00458E0  A00C58B0  A0185810  B00C5820
D1705020  10005830  B0145840  D18C5040  C9D5E3C4  F0F0F3F8*
02E3E7E3  40000768  40400038  40400001  30005850  B0205860  D16C5060
500018DA  92FFA00C  982CA01C  07FE987B  100C5820  70005020  D1705820

MEMBER NAME  INTDRV
90005020  D18C5870  10205820  70005020  C9D5E3C4  F0F0F3F9*
02E3E7E3  400007A0  40400038  40400001  D16C5820  10004130  20004150
00041B25  5020D1DC  5030D1E0  58201004  41302000  41500004  1B255C40
```

```
D1141B25  5020D1C8  5030D1CC  5030D0E4  C9D5E3C4  F0F0F4F0**
02E3E7E3  400007D8  40400038  40400001  58201008  41302000  41500004
1B255C40  D11C1B25  5020D1D0  5030D1D4  58201010  41302000  41500004
1B255C40  D1141B25  5020D1C0  5030D1C4  C9D5E3C4  F0F0F4F1*
02E3E7E3  40000810  40400038  40400001  5030D0DC  58201018  41302000
41500004  1B255020  D1B45030  D1B85820  101C4130  20004150  00041B25
5B20D120  5020D1F4  5030D1F8  47F0D270  C9D5E3C4  F0F0F4F2*
02E3E7E3  40000020  40400004  40400001  00000782  40404040  40404040
40404040  40404040  40404040  40404040  40404040  40404040  40404040
40404040  40404040  40404040  40404040  C9D5E3C4  F0F0F4F3*
02D9D3C4  40404040  40400038  40404040  00020001  0C0001D8  00030001
1C0001E4  00040001  1C000200  00050001  1C00020C  00060001  1C000210
00070001  1C000214  00080001  1C000218  C9D5E3C4  F0F0F4F4*
02E3E7E3  40000024  40400008  40400001  00000028  00000746  40404040
40404040  40404040  40404040  40404040  40404040  40404040  40404040
40404040  40404040  40404040  40404040  C9D5E3C4  F0F0F4F5*
02E3E7E3  40000074  40400014  40400001  00000476  000006B4  000004C0
000004C4  000004C4  40404040  40404040  40404040  40404040  40404040
40404040  40404040  40404040  40404040  C9D5E3C4  F0F0F4F6*
02D9D3C4  40404040  40400038  40404040  00010001  0C000020  00010001
0C000024  00010001  0C000028  00010001  0C000074  00010001  0C000078
00010001  0C00007C  00010001  0C000080  C9D5E3C4  F0F0F4F7*
02E3E7E3  40000088  4040000C  40400001  00000516  00000692  0000051A
40404040  40404040  40404040  40404040  40404040  40404040  40404040
40404040  40404040  40404040  40404040  C9D5E3C4  F0F0F4F8*
02E3E7E3  400000B4  40400004  40400001  8000018C  40404040  40404040
40404040  40404040  40404040  40404040  40404040  40404040  40404040
40404040  40404040  40404040  40404040  C9D5E3C4  F0F0F4F9*
02E3E7E3  400000D8  4040000C  40400001  0000019C  800001A0  000001C4
40404040  40404040  40404040  40404040  40404040  40404040  40404040
40404040  40404040  40404040  40404040  C9D5E3C4  F0F0F5F0**
02D9D3C4  40404040  40400038  40404040  00010001  0C000084  00010001
0C000088  00010001  0C00008C  00010001  0C000090  00010001  0C0000B4
00010001  0C0000D8  00010001  0C0000DC  C9D5E3C4  F0F0F5F1*
02E3E7E3  400000E4  4040001C  40400001  00000174  0000017C  00000178
80000180  00000168  0000016C  80000170  40404040  40404040  40404040
40404040  40404040  40404040  40404040  C9D5E3C4  F0F0F5F2*
02D9D3C4  40404040  40400038  40404040  00010001  0C0000E0  00010001
0C0000E4  00010001  0C0000E8  00010001  0C0000EC  00010001  0C0000F0
00010001  0C0000F4  00010001  0C0000F8  C9D5E3C4  F0F0F5F3*
02E3E7E3  40000100  40400004  40400001  000001BC  40404040  40404040
40404040  40404040  40404040  40404040  40404040  40404040  40404040
40404040  40404040  40404040  40404040  C9D5E3C4  F0F0F5F4*
02E3E7E3  40000108  40400004  40400001  000001B4  40404040  40404040
40404040  40404040  40404040  40404040  40404040  40404040  40404040
40404040  40404040  40404040  40404040  C9D5E3C4  F0F0F5F5*
02E3E7E3  40000110  4040000C  40400001  00000198  8000018C  00000148
40404040  40404040  40404040  40404040  40404040  40404040  40404040
40404040  40404040  40404040  40404040  C9D5E3C4  F0F0F5F6*
02E3E7E3  40000120  40400004  40400001  800001C4  40404040  40404040
40404040  40404040  40404040  40404040  40404040  40404040  40404040
40404040  40404040  40404040  40404040  C9D5E3C4  F0F0F5F7*
02E3E7E3  40000224  40400038  40400001  00000000  00000000  00000000
00000000  00000000  00000000  00000000  00000000  00000000  00000000
00000000  00000000  00000000  00000000  C9D5E3C4  F0F0F5F8*

MEMBER NAME  INTDRV
02E3E7E3  4000025C  40400038  40400001  00000000  00000010  0000000C
014C000B  0368000B  00EC000B  00000000  0000000C  00F0000C  00F4000C
00F8000C  00000014  00000018  0000001C  C9D5E3C4  F0F0F5F9*
02E3E7E3  40000294  40400004  40400001  00000020  40404040  40404040
```

```
40404040  40404040  40404040  40404040  40404040  40404040  40404040
40404040  40404040  40404040  40404040  C9D5E3C4  F0F0F6F0**
02D9D3C4  40404040  40400038  40404040  00010001  0C0000FC  00010001
0C000100  00010001  0C000108  00010001  0C000110  00010001  0C000114
00010001  0C000118  00010001  0C000120  C9D5E3C4  F0F0F6F1*
02C5D5C4  40404040  40404040  40404040  40404040  40404040  40404040
00000848  F1F5F7F3  F460C6D6  F34040F0  F2F0F2F8  F7F0F9F8  40F0F84B
F1F64BF2  F1404040  C9D5E3C4  D9E54040  C9D5E3C4  F0F0F6F2**

MEMBER NAME  INTERC
02C5E2C4  40404040  40400010  40400001  C9D5E3C5  D9C34040  00000000
40000000  40404040  40404040  40404040  40404040  40404040  40404040
40404040  40404040  40404040  40404040  C9D5E3C5  F0F0F0F1*
02E3E7E3  40000000  40400028  40400001  47F0F00C  07C9D5E3  C5D9C340
90ECD00C  184D98CD  F0205040  D00450D0  400807FC  40404040  40404040
40404040  40404040  40404040  40404040  C9D5E3C5  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C9D5E3C5  F0F0F0F3*
02E3E7E3  400000A0  4040001C  40400001  00000000  00000000  41100000
00000000  00000001  00000000  00000000  40404040  40404040  40404040
40404040  40404040  40404040  40404040  C9D5E3C5  F0F0F0F4*
02C5E2C4  40404040  40400010  40400003  C4E2D8D9  E3404040  02000000
40000000  40404040  40404040  40404040  40404040  40404040  40404040
40404040  40404040  40404040  40404040  C9D5E3C5  F0F0F0F5*
02C5E2C4  40404040  40400010  40400004  E4D5C9E3  C4404040  02000000
40000000  40404040  40404040  40404040  40404040  40404040  40404040
40404040  40404040  40404040  40404040  C9D5E3C5  F0F0F0F6*
02C5E2C4  40404040  40400010  40400005  C4C1D9C3  D6E24040  02000000
40000000  40404040  40404040  40404040  40404040  40404040  40404040
40404040  40404040  40404040  40404040  C9D5E3C5  F0F0F0F7*
02C5E2C4  40404040  40400010  40400006  C4C1D9E2  C9D54040  02000000
40000000  40404040  40404040  40404040  40404040  40404040  40404040
40404040  40404040  40404040  40404040  C9D5E3C5  F0F0F0F8*
02E3E7E3  400001E0  40400014  40400001  00000000  00000000  00000000
00000000  00000000  40404040  40404040  40404040  40404040  40404040
40404040  40404040  40404040  40404040  C9D5E3C5  F0F0F0F9*
02E3E7E3  40000214  40400038  40400001  58B0D08C  2B007800  D0946000
D1282B44  7840D0A4  6040D148  2B007800  D0986000  D1302B66  7860D0A8
6060D150  2B007800  D09C6000  D1382B00  C9D5E3C5  F0F0F1F0**
02E3E7E3  4000024C  40400038  40400001  7800D0AC  6000D158  2B007800
D0A06000  D1402B22  7820D0B0  2B466040  D0E06860  D1306B60  D1286060
D0F06860  D1286C60  D1506060  D1D06800  C9D5E3C5  F0F0F1F1*
02E3E7E3  40000284  40400038  40400001  D1306C00  D1486B00  D1D06000
D1006840  D1582B42  6040D0E8  6800D140  6B00D138  6000D0F8  6840D138
2C426040  D1D06800  D1406C00  D1586B00  C9D5E3C5  F0F0F1F2*
02E3E7E3  400002BC  40400038  40400001  D1D06000  D1086860  D0F06060
D1806860  D0E02366  6060D190  6840D0F8  6040D188  6820D0E8  23226020
D1986800  D0786000  D0C058F0  D1C04110  C9D5E3C5  F0F0F1F3*
02E3E7E3  400002F4  40400038  40400001  D04C05EF  58F0D1C0  4110D058
05EF6820  D1806C20  D1886840  D1906C40  D1982A24  6020D1D0  58F0D1C4
4110D064  05EF6000  D0D86820  D0E02C22  C9D5E3C5  F0F0F1F4*
02E3E7E3  4000032C  40400038  40400001  6840D0F0  2C442A24  6020D1D0
58F0D1BC  4110D068  05EF6000  D1D86000  D1706820  D0E82C22  6840D0F8
2C442A24  6020D1D0  58F0D1BC  4110D06C  C9D5E3C5  F0F0F1F5*
02E3E7E3  40000364  40400038  40400001  05EF6000  D1E02820  6000D1A0
6800D1E0  6900D1D8  47A0D358  6020D170  6800D080  23006000  D1D058F0
D1C44110  D07005EF  6000D1D8  58F0D1B8  C9D5E3C5  F0F0F1F6*
02E3E7E3  4000039C  40400038  40400001  2B227820  F0046D20  D1706020
D1D058F0  D1C84110  D07405EF  6000D1E0  28406B40  D1D86820  D1D86B20
D1E06800  D0D86900  D1E04120  00014740  C9D5E3C5  F0F0F1F7*
```

```
02E3E7E3  400003D4  40400038  40400001  D3B01B22  6860D1E0  23666960
D0D84130  00014740  D3C41B33  14236940  D0D84130  00014720  D3D41B33
6920D0D8  41400001  4740D3E2  1B441634  C9D5E3C5  F0F0F1F8*
02E3E7E3  4000040C  40400038  40400001  1623872B  D3F441F0  000458E0
D00007FE  6820D0E0  6C20D0F8  6840D0F0  6C40D0E8  2B246020  D1682022
58F0D1B8  2B447840  F0082924  47A0D426  C9D5E3C5  F0F0F1F9*
02E3E7E3  40000444  40400038  40400001  41F00004  58E0D000  07FE6840

MEMBER NAME  INTERC
D1006C40  D0F86820  D0F06C20  D1082B42  6D40D168  6820D0E0  6C20D108
6860D100  6C60D0E8  2B266D20  D1687040  C9D5E3C5  F0F0F2F0**
02E3E7E3  4000047C  40400038  40400001  D0B47020  D0B81BFF  58E0D000
07FE58A0  D00458E0  A00C58B0  A0185810  B0007820  D0947020  10005820
B0047840  D0A47040  20005830  B0087860  C9D5E3C5  F0F0F2F1*
02E3E7E3  400004B4  40400038  40400001  D0987060  30005840  B00C7800
D0A87000  40005850  B0107820  D09C7020  50005860  B0147840  D0AC7040
60005870  B0187860  D0A07060  70005880  C9D5E3C5  F0F0F2F2*
02E3E7E3  400004EC  40400038  40400001  B01C7800  D0B07000  80005890
B0207820  D0B47020  90005810  B0247840  D0B87040  100018DA  92FFA00C
982CA01C  07FE987B  10007820  70007020  C9D5E3C5  F0F0F2F3*
02E3E7E3  40000524  40400038  40400001  D0947820  80007020  D0A47820
90007020  D0987820  A0007020  D0A87820  B0007020  D09C987B  10147820
70007020  D0AC7820  80007020  D0A07820  C9D5E3C5  F0F0F2F4*
02E3E7E3  4000055C  4040001A  40400001  90007020  D0B07820  A0007020
D0B47820  B0007020  D0B847F0  D1EC4040  40404040  40404040  40404040
40404040  40404040  40404040  40404040  C9D5E3C5  F0F0F2F5*
02E3E7E3  40000020  4040000C  40400001  0000051A  00000028  0000048A
40404040  40404040  40404040  40404040  40404040  40404040  40404040
40404040  40404040  40404040  40404040  C9D5E3C5  F0F0F2F6*
02D9D3C4  40404040  40400038  40404040  00020001  0C0001E0  00030001
1C0001E4  00040001  1C0001E8  00050001  1C0001EC  00060001  1C0001F0
00010001  0C000020  00010001  0C000024  C9D5E3C5  F0F0F2F7*
02E3E7E3  40000074  4040001C  40400001  000001A8  000001B8  800000E8
000001B0  000001C0  800000E8  800001F8  40404040  40404040  40404040
40404040  40404040  40404040  40404040  C9D5E3C5  F0F0F2F8*
02D9D3C4  40404040  40400038  40404040  00010001  0C000028  00010001
0C000074  00010001  0C000078  00010001  0C00007C  00010001  0C000080
00010001  0C000084  00010001  0C000088  C9D5E3C5  F0F0F2F9*
02E3E7E3  40000090  40400010  40400001  800001F8  800001F8  800001F8
800001F8  40404040  40404040  40404040  40404040  40404040  40404040
40404040  40404040  40404040  40404040  C9D5E3C5  F0F0F3F0**
02E3E7E3  400001F4  40400020  40400001  00000000  00000000  00000000
00000000  00000000  00000000  00000000  00000000  40404040  40404040
40404040  40404040  40404040  40404040  C9D5E3C5  F0F0F3F1*
02D9D3C4  40404040  40400028  40404040  00010001  0C00008C  00010001
0C000090  00010001  0C000094  00010001  0C000098  00010001  0C00009C
40404040  40404040  40404040  40404040  C9D5E3C5  F0F0F3F2*
02C5D5C4  40404040  40404040  40404040  40404040  40404040  40404040
00000576  F1F5F7F3  F460C6D6  F34040F0  F2F0F2F8  F7F0F9F8  40F0F84B
F3F94BF5  F8404040  C9D5E3C5  D9C34040  C9D5E3C5  F0F0F3F3**

MEMBER NAME  LIMIT
02C5E2C4  40404040  40400010  40400001  D3C9D4C9  E3404040  00000000
40000000  40404040  40404040  40404040  40404040  40404040  40404040
```

```
40404040  40404040  40404040  40404040  D3C9D4C9  F0F0F0F1*
02E3E7E3  40000000  40400028  40400001  47F0F00C  07D3C9D4  C9E34040
90ECD00C  184D98CD  F0205040  D00450D0  400807FC  40404040  40404040
40404040  40404040  40404040  40404040  D3C9D4C9  F0F0F0F2*
02E3E7E3  40000078  40400014  40400001  00000000  00000001  3E20C49C
00000000  00000000  40404040  40404040  40404040  40404040  40404040
40404040  40404040  40404040  40404040  D3C9D4C9  F0F0F0F3*
02E3E7E3  400000B8  40400038  40400001  7840D058  58B0D050  58A0D054
386450B0  D06C7820  D0643A24  7920D074  47A0D0B8  1BFF58E0  D00007FE
7820D064  3B267920  D07047C0  D0CE1BFF  D3C9D4C9  F0F0F0F4*
02E3E7E3  400000F0  40400038  40400001  58E0D000  07FE7820  D0683A26
7920D07C  47A0D0E4  1BFF58E0  D00007FE  7820D068  3B267920  D07847C0
D0FA1BFF  58E0D000  07FE50A0  D06C1BFF  D3C9D4C9  F0F0F0F5*
02E3E7E3  40000128  40400038  40400001  58E0D000  07FE58A0  D00458E0
A00C58B0  A0185810  B0185820  D06C5020  100018DA  92FFA00C  982CA01C
07FE987B  10007820  70007020  D0747820  D3C9D4C9  F0F0F0F6*
02E3E7E3  40000160  40400036  40400001  80007020  D07C7820  90007020
D0707820  A0007020  D0787820  B0007020  D0649878  10147820  70007020
D0685820  80005020  D06C47F0  D0904040  D3C9D4C9  F0F0F0F7*
02E3E7E3  40000020  4040000C  40400001  00000152  00000028  0000012E
40404040  40404040  40404040  40404040  40404040  40404040  40404040
40404040  40404040  40404040  40404040  D3C9D4C9  F0F0F0F8*
02D9D3C4  40404040  40400018  40404040  00010001  0C000020  00010001
0C000024  00010001  0C000028  40404040  40404040  40404040  40404040
40404040  40404040  40404040  40404040  D3C9D4C9  F0F0F0F9*
02C5D5C4  40404040  40404040  40404040  40404040  40404040  40404040
00000196  F1F5F7F3  F460C6D6  F34040F0  F2F0F2F8  F7F0F9F8  40F0F84B
F4F04BF0  F2404040  D3C9D4C9  E3404040  D3C9D4C9  F0F0F1F0**

MEMBER NAME  LIMITV
02C5E2C4  40404040  40400010  40400001  D3C9D4C9  E3E54040  00000000
40000000  40404040  40404040  40404040  40404040  40404040  40404040
40404040  40404040  40404040  40404040  D3C9D4C9  F0F0F0F1*
02E3E7E3  40000000  40400028  40400001  47F0F00C  07D3C9D4  C9E3E540
90ECD00C  184D98CD  F0205040  D00450D0  400807FC  40404040  40404040
40404040  40404040  40404040  40404040  D3C9D4C9  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  D3C9D4C9  F0F0F0F3*
02E3E7E3  40000078  40400010  40400001  00000000  00000001  00000000
00000000  40404040  40404040  40404040  40404040  40404040  40404040
40404040  40404040  40404040  40404040  D3C9D4C9  F0F0F0F4*
02E3E7E3  400000C0  40400038  40400001  00000000  58B0D058  58A0D050
5890D054  50A0D060  58F0D098  7840F004  33447040  D0647860  D0687B60
D0747820  D06C7B20  D0703964  41300001  D3C9D4C9  F0F0F0F5*
02E3E7E3  400000F8  40400038  40400001  4740D0D6  1B333924  41200001
4740D0E2  1B221623  862BD11A  7860D078  7B60D084  7820D07C  7B20D080
39644130  00014740  D1041B33  39244120  D3C9D4C9  F0F0F0F6*
02E3E7E3  40000130  40400038  40400001  00014740  D1101B22  1623862B
D11A5090  D0601BFF  58E0D000  07FE58A0  D00458E0  A00C58B0  A0185810
B0205820  D0605020  100018DA  92FFA00C  D3C9D4C9  F0F0F0F7*
02E3E7E3  40000168  40400038  40400001  982CA01C  07FE987B  10007820
70007020  D0707820  80007020  D0687820  90007020  D0807820  A0007020
D0787820  B0007020  D074987A  10147820  D3C9D4C9  F0F0F0F8*
02E3E7E3  400001A0  40400022  40400001  70007020  D06C7820  80007020
D0847820  90007020  D07C5820  A0005020  D06047F0  D09C4040  40404040
40404040  40404040  40404040  40404040  D3C9D4C9  F0F0F0F9*
02E3E7E3  40000020  4040000C  40400001  0000016E  00000028  0000014A
```

```
40404040  40404040  40404040  40404040  40404040  40404040  40404040
40404040  40404040  40404040  40404040  D3C9D4C9  F0F0F1F0**
02D9D3C4  40404040  40400020  40404040  00020001  0C0000C0  00010001
0C000020  00010001  0C000024  00010001  0C000028  40404040  40404040
40404040  40404040  40404040  40404040  D3C9D4C9  F0F0F1F1*
02C5D5C4  40404040  40404040  40404040  40404040  40404040  40404040
000001C2  F1F5F7F3  F460C6D6  F34040F0  F2F0F2F8  F7F0F9F8  40F0F84B
F4F04BF0  F6404040  D3C9D4C9  E3E54040  D3C9D4C9  F0F0F1F2**

MEMBER NAME  MAT2
02C5E2C4  40404040  40400010  40400001  D4C1E3F2  40404040  00000000
40000000  40404040  40404040  40404040  40404040  40404040  40404040
40404040  40404040  40404040  40404040  D4C1E3F2  F0F0F0F1*
02E3E7E3  40000000  40400038  40400001  47F0F00C  07D4C1E3  F2404040
90ECD00C  184D98CD  F0205040  D00450D0  400807FC  40404040  40404040
021A08D4  C1E3F25C  40404010  08180806  D4C1E3F2  F0F0F0F2*
02E3E7E3  40000038  40400038  40400001  030C1007  1A025CD4  10062202
1A025CD4  10060604  0C100722  021A025C  D4100606  040C1007  1A025CD5
10062202  1A025CD5  10060604  0C100722  D4C1E3F2  F0F0F0F3*
02E3E7E3  400000C0  40400024  40400001  00000000  00000000  00000000
00000001  00000002  00000003  00000018  00000000  00000000  40404040
40404040  40404040  40404040  40404040  D4C1E3F2  F0F0F0F4*
02E3E7E3  40000100  40400004  40400001  00000000  40404040  40404040
40404040  40404040  40404040  40404040  40404040  40404040  40404040
40404040  40404040  40404040  40404040  D4C1E3F2  F0F0F0F5*
02C5E2C4  40404040  40400010  40400002  C9C2C3D6  D47B4040  02000000
40000000  40404040  40404040  40404040  40404040  40404040  40404040
40404040  40404040  40404040  40404040  D4C1E3F2  F0F0F0F6*
02E3E7E3  40000108  40400004  40400001  00000000  40404040  40404040
40404040  40404040  40404040  40404040  40404040  40404040  40404040
40404040  40404040  40404040  40404040  D4C1E3F2  F0F0F0F7*
02E3E7E3  40000110  40400038  40400001  00000000  58A0D090  58B0D098
6860D050  5890D06C  58F0D0A0  45E0F004  0000000A  00000028  45E0F008
0450D074  45E0F008  0860B020  45E0F008  D4C1E3F2  F0F0F0F8*
02E3E7E3  40000148  40400038  40400001  0860B038  45E0F008  0860B050
45E0F008  0450D074  45E0F010  6960A008  41300001  4780D0FE  1B336960
A0104140  00014780  D10C1B44  14436960  D4C1E3F2  F0F0F0F9*
02E3E7E3  40000180  40400038  40400001  A0184130  00014780  D11C1B33
14348639  D1A458F0  D0A01800  45E0F004  0000000A  00000050  45E0F008
0450D074  45E0F008  0860B040  45E0F008  D4C1E3F2  F0F0F1F0**
02E3E7E3  400001B8  40400038  40400001  0860B058  45E0F008  0860B060
45E0F008  0860D080  45E0F008  0450D074  45E0F010  58F0D0A0  45E0F004
0000000A  00000063  45E0F008  0450D074  D4C1E3F2  F0F0F1F1*
02E3E7E3  400001F0  40400038  40400001  45E0F008  0860A008  45E0F008
0860A010  45E0F008  0860A018  45E0F010  1BFF58E0  D00007FE  58F0D0A0
45E0F004  0000000A  00000043  45E0F008  D4C1E3F2  F0F0F1F2*
02E3E7E3  40000228  40400038  40400001  0450D074  45E0F008  0860B040
45E0F008  0860B058  45E0F008  0860B060  45E0F008  0860D080  45E0F010
1BFF58E0  D00007FE  58D0D004  58E0D00C  D4C1E3F2  F0F0F1F3*
02E3E7E3  40000260  40400038  40400001  92FFD00C  982CD01C  07FE987A
10005820  70005020  D0746820  A0006020  D0805820  10044130  20004150
00081B25  5B20D068  5020D098  5030D09C  D4C1E3F2  F0F0F1F4*
02E3E7E3  40000298  4040001A  40400001  58201008  41302000  41500008
1B255020  D0905030  D09447F0  D0A44040  40404040  40404040  40404040
40404040  40404040  40404040  40404040  D4C1E3F2  F0F0F1F5*
02E3E7E3  40000020  40400008  40400001  0000026A  00000070  40404040
40404040  40404040  40404040  40404040  40404040  40404040  40404040
40404040  40404040  40404040  40404040  D4C1E3F2  F0F0F1F6*
```

| | | | | | | |
|---|---|---|---|---|---|---|
| 02E3E7E3 | 40000070 | 40400004 | 40400001 | 00000258 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F1F7* | |
| 02D9D3C4 | 40404040 | 40400038 | 40404040 | 00020001 | 1C000110 | 00010001 |
| 0C000130 | 00010001 | 0C0001A0 | 00010001 | 0C0001E4 | 00010001 | 0C000220 |
| 00010001 | 0C000020 | 00010001 | 0C000024 | D4C1E3F2 | F0F0F1F8* | |
| 02D9D3C4 | 40404040 | 40400008 | 40404040 | 00010001 | 0C000070 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F1F9* | |
| 02C5D5C4 | 40404040 | 40404040 | 40404040 | 40404040 | 40404040 | 40404040 |

MEMBER NAME MAT2

| | | | | | | |
|---|---|---|---|---|---|---|
| 000002B2 | F1F5F7F3 | F460C6D6 | F34040F0 | F2F0F2F8 | F7F0F9F8 | 40F0F84B |
| F4F04BF1 | F0404040 | D4C1E3F2 | 40404040 | D4C1E3F2 | F0F0F2F0** | |

MEMBER NAME MATMRG

| | | | | | | |
|---|---|---|---|---|---|---|
| 02C5E2C4 | 40404040 | 40400010 | 40400001 | D4C1E3D4 | D9C74040 | 00000000 |
| 40000000 | 40404040 | 40404040 | 40404040 | 40404040 | 40404040 | 40404040 |
| 40404040 | 40404040 | 40404040 | 40404040 | D4C1E3D4 | F0F0F0F1* | |
| 02E3E7E3 | 40000000 | 40400038 | 40400001 | 47F0F00C | 07D4C1E3 | D4D9C740 |
| 90ECD00C | 184D98CD | F0205040 | D00450D0 | 400807FC | 40404040 | 40404040 |
| 020A0803 | 18010A08 | 0318011A | 05C4C1E2 | D4C1E3D4 | F0F0F0F2* | |
| 02E3E7E3 | 40000038 | 40400038 | 40400001 | C8401003 | 1A0740D3 | C1E8E4D7 |
| 4010041A | 1F40C4D6 | C5E240D5 | D6E340D4 | C1E3C3C8 | 40C140D4 | C1E3C5D9 |
| C9C1D340 | C3D6C4C5 | 18322202 | 06481401 | D4C1E3D4 | F0F0F0F3* | |
| 02E3E7E3 | 40000070 | 40400038 | 40400001 | 22020A08 | 0318010A | 08031801 |
| 1A05C4C1 | E2C84010 | 031A0F40 | D4C1E3C5 | D9C9C1D3 | 40C3D6C4 | C5401004 |
| 1A1740C4 | D6C5E240 | D5D6E340 | D4C1E3C3 | D4C1E3D4 | F0F0F0F4* | |
| 02E3E7E3 | 400000A8 | 4040000C | 40400001 | C840C140 | D3C1E8E4 | D7183222 |
| 40404040 | 40404040 | 40404040 | 40404040 | 40404040 | 40404040 | 40404040 |
| 40404040 | 40404040 | 40404040 | 40404040 | D4C1E3D4 | F0F0F0F5* | |
| 02E3E7E3 | 40000120 | 40400038 | 40400001 | 00000000 | 00000000 | 4F080000 |
| 00000000 | 00000001 | 00000002 | 00000003 | 00000004 | 00000005 | 00000006 |
| 00000008 | 00000009 | 00000016 | 00000048 | D4C1E3D4 | F0F0F0F6* | |
| 02E3E7E3 | 40000158 | 4040000C | 40400001 | 40266666 | 00000000 | 00000000 |
| 40404040 | 40404040 | 40404040 | 40404040 | 40404040 | 40404040 | 40404040 |
| 40404040 | 40404040 | 40404040 | 40404040 | D4C1E3D4 | F0F0F0F7* | |
| 02C5E2C4 | 40404040 | 40400010 | 40400002 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D4C1E3D4 | F0F0F0F8* | |
| 02E3E7E3 | 400001A8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F0F9* | |
| 02E3E7E3 | 400001B0 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F0** | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C1E3D4 | F0F0F1F1* | |
| 02E3E7E3 | 400001BC | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F2* | |
| 02E3E7E3 | 400001C4 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F3* | |
| 02E3E7E3 | 40000178 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F4* | |

| | | | | | | |
|---|---|---|---|---|---|---|
| 02E3E7E3 | 4000026C | 40400038 | 40400001 | 58A0D104 | 58B0D0F0 | 5890D078 |
| 5880D0C0 | 7800D0A0 | 7000D0B4 | 5090D0CC | 5800D11C | 5000D160 | 5800D120 |
| 5000D178 | 18605000 | D15C5840 | D1905040 | D4C1E3D4 | F0F0F1F5* | |
| 02E3E7E3 | 400002A4 | 40400038 | 40400001 | D1644104 | A0005000 | D0549280 |
| D05458F0 | D0F84110 | D04C05EF | 5800D124 | 5000D154 | 5830D194 | 5030D168 |
| 7843A000 | 7040D158 | 5850D128 | 5050D14C | D4C1E3D4 | F0F0F1F6* | |
| 02E3E7E3 | 400002DC | 40400038 | 40400001 | 5800D12C | 5000D174 | 5000D16C |
| 5800D198 | 5000D170 | 58E0D198 | 782EB000 | 7020D150 | 38643B62 | 30667960 |
| D0A047C0 | D3F43924 | 4730D31C | 5980D0D4 | D4C1E3D4 | F0F0F1F7* | |
| 02E3E7E3 | 40000314 | 40400038 | 40400001 | 47C0D808 | 5800D0D4 | 1A095000 |
| D0D45810 | D0901A16 | 2B007801 | A0006A00 | D0706000 | D0685870 | D06C1077 |
| 5070D0B8 | 1A562B00 | 7805A000 | 6A00D070 | D4C1E3D4 | F0F0F1F8* | |
| 02E3E7E3 | 4000034C | 40400038 | 40400001 | 6000D068 | 5800D06C | 5000D0C4 |
| 58F0D10C | 45E0F004 | 00000000 | 00000028 | 45E0F008 | 0474A000 | 45E0F008 |
| 0473A000 | 45E0F008 | 0450D0B8 | 45E0F008 | D4C1E3D4 | F0F0F1F9* | |
| 02E3E7E3 | 40000384 | 40400038 | 40400001 | 0450D0C4 | 45E0F010 | 58F0D10C |
| 45E0F000 | 00000000 | 0000006B | 18A958B0 | D09C5880 | D0FC185B | 5C40D0D4 |
| 18391A35 | 45E0F008 | 01238000 | 879AD2EE | D4C1E3D4 | F0F0F2F0** | |
| 02E3E7E3 | 400003BC | 40400038 | 40400001 | 58A0D104 | 58B0D0F0 | 5890D078 |
| 5880D0C0 | 45E0F010 | 47F0D808 | 5980D0D4 | 47C0D808 | 5800D0D4 | 1A095000 |
| D0D45840 | D19C5A40 | D16C2B00 | 7804B000 | D4C1E3D4 | F0F0F2F1* | |
| 02E3E7E3 | 400003F4 | 40400038 | 40400001 | 6A00D070 | 6000D068 | 5830D06C |
| 10335030 | D0B85830 | D0905A30 | D16C2B00 | 7803B000 | 6A00D070 | 6000D068 |
| 5800D06C | 5000D0BC | 58F0D10C | 45E0F004 | D4C1E3D4 | F0F0F2F2* | |
| 02E3E7E3 | 4000042C | 40400038 | 40400001 | 00000000 | 00000071 | 5830D1A0 |
| 5A30D16C | 45E0F008 | 0473B000 | 5810D170 | 45E0F008 | 0471B000 | 45E0F008 |
| 0450D0B8 | 45E0F008 | 0450D0BC | 45E0F010 | D4C1E3D4 | F0F0F2F3* | |
| 02E3E7E3 | 40000464 | 40400038 | 40400001 | 58F0D10C | 45E0F000 | 00000000 |
| 0000006B | 18A958B0 | D09C5880 | D0FC185B | 5C40D0D4 | 18391A35 | 45E0F008 |
| 01238000 | 879AD3C6 | 58A0D104 | 58B0D0F0 | D4C1E3D4 | F0F0F2F4* | |
| 02E3E7E3 | 4000049C | 40400038 | 40400001 | 5890D078 | 5880D0C0 | 45E0F010 |
| 47F0D808 | 5830D174 | 5A30D15C | 5800D090 | 5000D17C | 18205A20 | D16C4103 |
| A0005000 | D05C4102 | B0005000 | D0609280 | D4C1E3D4 | F0F0F2F5* | |
| 02E3E7E3 | 400004D4 | 40400038 | 40400001 | D06058F0 | D0F84110 | D05805EF |
| 5990D0D8 | 4780D808 | 5820D07C | 5020D0AC | 5800D11C | 5000D114 | 5850D0CC |
| 5C40D12C | 5050D130 | 18055A00 | D1285000 | D4C1E3D4 | F0F0F2F6* | |
| 02E3E7E3 | 4000050C | 40400038 | 40400001 | D1385A50 | D0905050 | D13C5800 |
| D1B05000 | D1485830 | D1AC5840 | D1AC5850 | D13C5860 | D1381872 | 5880D120 |
| 5890D1A8 | 18BA58A0 | D0F07820 | D0E07929 | D4C1E3D4 | F0F0F2F7* | |
| 02E3E7E3 | 40000544 | 40400038 | 40400001 | B0004770 | D49E7820 | D0E47924 |
| B0004780 | D6D04109 | B0005000 | D0549280 | D05458F0 | D0F84110 | D04C05EF |
| 5800D0CC | 5A00D078 | 5000D0CC | 5A50D12C | D4C1E3D4 | F0F0F2F8* | |
| 02E3E7E3 | 4000057C | 40400038 | 40400001 | 5A60D12C | 7823B000 | 7B26A000 |
| 30227920 | D0B447C0 | D6D05070 | D0AC58A0 | D10458B0 | D0F05890 | D0785880 |
| D0C05870 | D0CC5C60 | D1745070 | D1885840 | D4C1E3D4 | F0F0F2F9* | |
| 02E3E7E3 | 400005B4 | 40400038 | 40400001 | D14C1A47 | 5040D18C | 5870D0AC |
| 5C60D178 | 5070D180 | 5830D154 | 1A375030 | D1847824 | B0007923 | A0004730 |
| D5F85980 | D0D447C0 | D8085800 | D0D41A09 | D4C1E3D4 | F0F0F3F0** | |
| 02E3E7E3 | 400005EC | 40400038 | 40400001 | 5000D0D4 | 5850D17C | 1A572B00 |
| 7805A000 | 6A00D070 | 6000D068 | 5840D06C | 10445040 | D0B85840 | D14C1A47 |
| 2B007804 | A0006A00 | D0706000 | D0685800 | D4C1E3D4 | F0F0F3F1* | |
| 02E3E7E3 | 40000624 | 40400038 | 40400001 | D06C5000 | D0C458F0 | D10C1800 |
| 45E0F004 | 00000000 | 00000028 | 5840D160 | 1A4745E0 | F0080474 | A00045E0 |
| F0080473 | A00045E0 | F0080450 | D0B845E0 | D4C1E3D4 | F0F0F3F2* | |
| 02E3E7E3 | 4000065C | 4040001C | 40400001 | F0080450 | D0C445E0 | F01058F0 |
| D10C1800 | 45E0F000 | 00000000 | 0000006B | 40404040 | 40404040 | 40404040 |
| 40404040 | 40404040 | 40404040 | 40404040 | D4C1E3D4 | F0F0F3F3* | |

```
02D9D3C4  40404040  40400038  40404040  00020001  1C0001B0  00030001
1C0001C4  00010001  0C000364  00010001  0C000398  00010001  0C000430
00010001  0C000470  00010001  0C000638  D4C1E3D4  F0F0F3F4*
02E3E7E3  40000678  40400038  40400001  18A958B0  D09C5880  D0FC185B
5C40D0D4  18391A35  45E0F008  01238000  879AD5CA  58A0D104  58B0D0F0
5890D078  5880D0C0  45E0F010  47F0D808  D4C1E3D4  F0F0F3F5*
02E3E7E3  400006B0  40400038  40400001  5980D0D4  47C0D808  5800D0D4
1A095000  D0D45840  D19C5A40  D1882B00  7804B000  6A00D070  6000D068
5830D06C  10335030  D0B85830  D17C5A30  D4C1E3D4  F0F0F3F6*
02E3E7E3  400006E8  40400038  40400001  D1882B00  7803B000  6A00D070
6000D068  5800D06C  5000D0BC  58F0D10C  45E0F004  00000000  00000071
5830D1A0  5A30D188  45E0F008  0473B000  D4C1E3D4  F0F0F3F7*
02E3E7E3  40000720  40400038  40400001  5810D18C  45E0F008  0471B000
45E0F008  0450D0B8  45E0F008  0450D0BC  45E0F010  58F0D10C  45E0F000
00000000  0000006B  18A958B0  D09C5880  D4C1E3D4  F0F0F3F8*
02E3E7E3  40000758  40400038  40400001  D0FC185B  5C40D0D4  18391A35
45E0F008  01238000  879AD6A2  58A0D104  58B0D0F0  5890D078  5880D0C0

MEMBER NAME  MATMRG
45E0F010  47F0D808  58E0D148  410EB000  D4C1E3D4  F0F0F3F9*
02E3E7E3  40000790  40400038  40400001  5000D05C  4105A000  5000D060
9280D060  58F0D0F8  4110D058  05EF5A70  D0785800  D1481A08  5000D148
1A381A48  1A985970  D0D847C0  D4865070  D4C1E3D4  F0F0F4F0**
02E3E7E3  400007C8  40400038  40400001  D0AC58A0  D10458B0  D0F05890
D0785880  D0C05800  D0CC5900  D0D047A0  D8085980  D0D447C0  D8085800
D0D41A09  5000D0D4  5850D0CC  5C40D174  D4C1E3D4  F0F0F4F1*
02E3E7E3  40000800  40400038  40400001  5860D19C  1A652B00  7806B000
6A00D070  6000D068  5830D06C  10335030  D0B85830  D17C1A35  2B007803
B0006A00  D0706000  D0685800  D06C5000  D4C1E3D4  F0F0F4F2*
02E3E7E3  40000838  40400038  40400001  D0BC58F0  D10C1800  45E0F004
00000000  00000071  5830D1A0  1A3545E0  F0080473  B0005830  D14C1A35
45E0F008  0473B000  45E0F008  0450D0B8  D4C1E3D4  F0F0F4F3*
02E3E7E3  40000870  40400038  40400001  45E0F008  0450D0BC  45E0F010
58F0D10C  45E0F000  00000000  0000006B  18A958B0  D09C5880  D0FC185B
5C40D0D4  18391A35  45E0F008  01238000  D4C1E3D4  F0F0F4F4*
02E3E7E3  400008A8  40400038  40400001  879AD7DE  58A0D104  58B0D0F0
5890D078  5880D0C0  45E0F010  1BFF58E0  D00007FE  58A0D004  58E0A00C
58B0A018  5810B014  5820D0D4  50201000  D4C1E3D4  F0F0F4F5*
02E3E7E3  400008E0  40400038  40400001  18DA92FF  A00C982C  A01C07FE
987B1004  58207000  5020D0D0  58209000  5020D0D8  58701014  58207000
5020D0D4  58201000  41302000  41500004  D4C1E3D4  F0F0F4F6*
02E3E7E3  40000918  40400038  40400001  1B255C40  D08C1B25  5020D0F0
5030D0F4  58201008  41302000  41500004  1B255C40  D0981B25  5020D104
5030D108  58201010  41302000  41500001  D4C1E3D4  F0F0F4F7*
02E3E7E3  40000950  40400014  40400001  1B255C40  D09C1B25  5020D0FC
5030D100  47F0D1B4  40404040  40404040  40404040  40404040  40404040
40404040  40404040  40404040  40404040  D4C1E3D4  F0F0F4F8*
02E3E7E3  40000020  40400008  40400001  000008EC  000000B8  40404040
40404040  40404040  40404040  40404040  40404040  40404040  40404040
40404040  40404040  40404040  40404040  D4C1E3D4  F0F0F4F9*
02E3E7E3  400000B8  40400004  40400001  000008C8  40404040  40404040
40404040  40404040  40404040  40404040  40404040  40404040  40404040
40404040  40404040  40404040  40404040  D4C1E3D4  F0F0F5F0**
02D9D3C4  40404040  40400038  40404040  00010001  0C000674  00010001
0C00070C  00010001  0C00074C  00010001  0C000848  00010001  0C000888
00010001  0C000020  00010001  0C000024  D4C1E3D4  F0F0F5F1*
02E3E7E3  40000104  40400010  40400001  00000148  00000198  80000000
```

```
0000013C  40404040  40404040  40404040  40404040  40404040  40404040
40404040  40404040  40404040  40404040  D4C1E3D4  F0F0F5F2*
02E3E7E3  40000118  40400004  40400001  80000000  40404040  40404040
40404040  40404040  40404040  40404040  40404040  40404040  40404040
40404040  40404040  40404040  40404040  D4C1E3D4  F0F0F5F3*
02E3E7E3  400001C8  40400038  40400001  00000000  00000000  00000000
00000020  00000058  00000024  00000010  00000018  00000000  00000000
00000000  00000000  00000000  00000000  D4C1E3D4  F0F0F5F4*
02E3E7E3  40000200  40400038  40400001  00000000  00000000  00000000
00000000  00000000  00000000  00000000  00000000  01FC0008  00000000
01A40009  01CC0009  00940009  00000000  D4C1E3D4  F0F0F5F5*
02E3E7E3  40000238  40400034  40400001  009C000A  00000000  0208000A
00B0000A  00000078  0000007C  00000028  00000014  0000000C  000000B0
000000D0  000000D4  000000C8  40404040  D4C1E3D4  F0F0F5F6*
02D9D3C4  40404040  40400020  40404040  00010001  0C0000B8  00010001
0C000104  00010001  0C000108  00010001  0C000110  40404040  40404040
40404040  40404040  40404040  40404040  D4C1E3D4  F0F0F5F7*
02C5D5C4  40404040  40404040  40404040  40404040  40404040  40404040
00000964  F1F5F7F3  F460C6D6  F34040F0  F2F0F2F8  F7F0F9F8  40F0F84B
F4F04BF1  F4404040  D4C1E3D4  D9C74040  D4C1E3D4  F0F0F5F8**

MEMBER NAME  MERGE
02C5E2C4  40404040  40400010  40400001  D4C5D9C7  C5404040  00000000
40000000  40404040  40404040  40404040  40404040  40404040  40404040
40404040  40404040  40404040  40404040  D4C5D9C7  F0F0F0F1*
02E3E7E3  40000000  40400038  40400001  47F0F00C  07D4C5D9  C7C54040
90ECD00C  184D98CD  F0205040  D00450D0  400807FC  40404040  40404040
021A1140  C9D4D7D9  D6D7C5D9  40C3D6C4  D4C5D9C7  F0F0F0F2*
02E3E7E3  40000038  40400038  40400001  C5407E40  10031A09  40C9D540
D4C5D9C7  C522020A  08031801  0A080318  011A09E2  C5D8E4C5  D5C3C540
10041A19  40D5D6E3  40C6D6E4  D5C440C9  D4C5D9C7  F0F0F0F3*
02E3E7E3  40000070  40400038  40400001  D540C140  D7D3E840  E3C1C2D3
C5183222  02064814  0122020A  08031801  0A080318  011A0CD6  D9C9C5D5
E3C1E3C9  D6D5400A  06021A19  40D5D6E3  D4C5D9C7  F0F0F0F4*
02E3E7E3  400000A8  40400038  40400001  40C6D6E4  D5C440C9  D540C140
D7D3E840  E3C1C2D3  C5183222  020A0803  18010A08  0318011A  0ED4C1E3
C5D9C9C1  D340C3D6  C4C54010  041A1940  D4C5D9C7  F0F0F0F5*
02E3E7E3  400000E0  4040001B  40400001  D5D6E340  C6D6E4D5  C440C9D5
40C140D7  D3E840E3  C1C2D3C5  18322240  40404040  40404040  40404040
40404040  40404040  40404040  40404040  D4C5D9C7  F0F0F0F6*
02E3E7E3  40000188  40400038  40400001  00000000  00000000  4F080000
00000000  00000000  00000001  00000002  00000003  00000004  00000005
00000006  00000018  00000048  3F28F5C3  D4C5D9C7  F0F0F0F7*
02E3E7E3  400001C0  40400010  40400001  40800000  41580000  00000000
00000000  40404040  40404040  40404040  40404040  40404040  40404040
40404040  40404040  40404040  40404040  D4C5D9C7  F0F0F0F8*
02C5E2C4  40404040  40400010  40400002  C2E2D6D9  E3404040  02000000
40000000  40404040  40404040  40404040  40404040  40404040  40404040
40404040  40404040  40404040  40404040  D4C5D9C7  F0F0F0F9*
02E3E7E3  40000250  40400004  40400001  00000000  40404040  40404040
40404040  40404040  40404040  40404040  40404040  40404040  40404040
40404040  40404040  40404040  40404040  D4C5D9C7  F0F0F1F0**
02C5E2C4  40404040  40400010  40400003  D4E5C3C8  D9404040  02000000
40000000  40404040  40404040  40404040  40404040  40404040  40404040
40404040  40404040  40404040  40404040  D4C5D9C7  F0F0F1F1*
02E3E7E3  40000258  4040000C  40400001  00000000  00000000  00000000
40404040  40404040  40404040  40404040  40404040  40404040  40404040
40404040  40404040  40404040  40404040  D4C5D9C7  F0F0F1F2*
```

| | | | | | | |
|---|---|---|---|---|---|---|
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C5D9C7 | F0F0F1F3* | |
| 02E3E7E3 | 40000268 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F4* | |
| 02E3E7E3 | 40000270 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F5* | |
| 02E3E7E3 | 400001F4 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F6* | |
| 02E3E7E3 | 4000020C | 40400038 | 40400001 | 00000001 | 00000004 | C6D34040 |
| C1404040 | 00000011 | 00000004 | C6D34040 | C1404040 | 00000015 | 00000004 |
| C6D34040 | C1404040 | 0000000D | 00000004 | D4C5D9C7 | F0F0F1F7* | |
| 02E3E7E3 | 40000244 | 40400008 | 40400001 | C6D34040 | C4404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F8* | |
| 02E3E7E3 | 40000310 | 40400038 | 40400001 | 58B0D168 | 7800D0BC | 7000D0FC |
| 5800D098 | 5000D0D0 | 5000D1D4 | 5800D19C | 5000D1E4 | 5800D18C | 5000D1E8 |
| 5800D194 | 5000D1EC | 5800D18C | 5000D1F0 | D4C5D9C7 | F0F0F1F9* | |
| 02E3E7E3 | 40000348 | 40400038 | 40400001 | 5800D194 | 5000D1F4 | 5800D19C |
| 5000D1F8 | 5000D1FC | 5800D18C | 5000D200 | 5800D194 | 5000D204 | 5800D1BC |
| 5000D208 | 5800D0B4 | 5000D20C | 5890D09C | D4C5D9C7 | F0F0F2F0** | |
| 02E3E7E3 | 40000380 | 40400038 | 40400001 | 58A0D0B4 | 5880D150 | 5850D0D0 |
| 1A595050 | D0D05800 | D20C1A0A | 5000D20C | 5800D208 | 1A0A5000 | D2085800 |
| D2041A0A | 5000D204 | 5800D200 | 1A0A5000 | D4C5D9C7 | F0F0F2F1* | |
| 02E3E7E3 | 400003B8 | 40400038 | 40400001 | D2005800 | D1FC1A0A | 5000D1FC |
| 5800D1F8 | 1A0A5000 | D1F85800 | D1F41A0A | 5000D1F4 | 5800D1F0 | 1A0A5000 |
| D1F05800 | D1EC1A0A | 5000D1EC | 5800D1E8 | D4C5D9C7 | F0F0F2F2* | |
| 02E3E7E3 | 400003F0 | 40400038 | 40400001 | 1A0A5000 | D1E85800 | D1E41A0A |
| 5000D1E4 | 5950D108 | 47C0D30C | 47F0D7B8 | 5820D098 | 5020D104 | 5800D1BC |
| 5000D184 | 1C4A5050 | D1C81835 | 5A30D0A8 | D4C5D9C7 | F0F0F2F3* | |
| 02E3E7E3 | 40000428 | 40400038 | 40400001 | 7803B000 | 7000D1C0 | 5800D194 |
| 5000D180 | 18351A30 | 7803B000 | 7000D1C4 | 5800D18C | 5000D17C | 18351A30 |
| 7803B000 | 7000D1B0 | 5830D1BC | 18625870 | D4C5D9C7 | F0F0F2F4* | |
| 02E3E7E3 | 40000460 | 40400038 | 40400001 | D1D05880 | D1CC189A | 58A0D09C |
| 58B0D150 | 7809B000 | 7900D1C0 | 4770D3CA | 7828B000 | 7020D1B8 | 7920D1C4 |
| 4750D3CA | 7847B000 | 7040D1B4 | 38647B60 | D4C5D9C7 | F0F0F2F5* | |
| 02E3E7E3 | 40000498 | 40400038 | 40400001 | D0C07960 | D1B04730 | D3CA7A40 |
| D0C47940 | D1B04750 | D3CA1266 | 4780D3C8 | 18565C40 | D1841825 | 5A20D180 |
| 7922B000 | 4730D3CA | 186A5AA0 | D09C1A73 | D4C5D9C7 | F0F0F2F6* | |
| 02E3E7E3 | 400004D0 | 40400038 | 40400001 | 1A831A93 | 59A0D0F0 | 47C0D370 |
| 5060D104 | 5880D150 | 58B0D168 | 58A0D0B4 | 5890D09C | 5870D0D0 | 1A795070 |
| D0D85800 | D0A85000 | D17C50A0 | D1845800 | D4C5D9C7 | F0F0F2F7* | |
| 02E3E7E3 | 40000508 | 40400038 | 40400001 | D0A85A00 | D1C85000 | D1885800 |
| D18C5A00 | D1C85000 | D1905800 | D1945A00 | D1C85000 | D1985800 | D1C85A00 |
| D19C5000 | D1A01C6A | 18275A20 | D0A81847 | D4C5D9C7 | F0F0F2F8* | |
| 02E3E7E3 | 40000540 | 40400038 | 40400001 | 5A40D18C | 18575A50 | D1945A70 |
| D19C1839 | 18671875 | 18845890 | D0D818A2 | 5990D108 | 47C0D468 | 47F0D500 |
| 58E0D188 | 782EB000 | 792AB000 | 4770D4EA | D4C5D9C7 | F0F0F2F9* | |
| 02E3E7E3 | 40000578 | 40400038 | 40400001 | 58E0D190 | 782EB000 | 7B28B000 |
| 30227920 | D0FC4730 | D4EA58E0 | D198782E | B0007B27 | B0003022 | 7920D0FC |
| 4730D4EA | 58E0D1A0 | 782EB000 | 7926B000 | D4C5D9C7 | F0F0F3F0** | |
| 02E3E7E3 | 400005B0 | 40400038 | 40400001 | 4770D4EA | 5850D108 | 5C40D184 |
| 18255A20 | D17C410A | B0005000 | D0604102 | B0005000 | D0649280 | D06458F0 |
| D15C4110 | D05C05EF | 5800D108 | 1B035000 | D4C5D9C7 | F0F0F3F1* | |

```
02E3E7E3  400005E8  40400038  40400001  D1081A93  5A60D0B4  5A70D0B4
5A80D0B4  5AA0D0B4  47F0D45C  5880D150  58A0D0B4  5890D09C  5800D104
12004730  D75C58F0  D0EC41E0  000315FE  D4C5D9C7  F0F0F3F2*
02E3E7E3  40000620  40400038  40400001  4720D52E  89F00002  58EFD04C
07FE58B0  D16858F0  D1701800  45E0F004  00000006  00000028  45E0F008
0450D0EC  45E0F010  58F0D170  45E0F034  D4C5D9C7  F0F0F3F3*
02E3E7E3  40000658  40400038  40400001  05404040  F1F55800  D1005900
D0F44750  D56E47F0  D7C65800  D1001A09  5000D100  58E0D1E4  2B00780E
B0006A00  D0906000  D0885800  D08C5000  D4C5D9C7  F0F0F3F4*
02E3E7E3  40000690  40400038  40400001  D0E458F0  D1701800  45E0F004
00000000  0000004A  5810D1E8  45E0F008  0471B000  5810D1EC  45E0F008
0471B000  45E0F008  0450D0E4  45E0F010  D4C5D9C7  F0F0F3F5*
02E3E7E3  400006C8  40400038  40400001  58F0D170  45E0F000  00000000
00000080  18A958B0  D0B85880  D160185B  5C40D100  18391A35  45E0F008
01238000  879AD5E2  5880D150  58B0D168  D4C5D9C7  F0F0F3F6*
02E3E7E3  40000700  40400038  40400001  58A0D0B4  5890D09C  45E0F010
47F0D288  5800D100  5900D0F4  4750D620  47F0D7C6  5800D100  1A095000
D10058F0  D1701800  45E0F004  00000000  D4C5D9C7  F0F0F3F7*
02E3E7E3  40000738  40400038  40400001  00000086  5810D1F0  45E0F008
0471B000  5810D1F4  45E0F008  0471B000  5810D1F8  45E0F008  0471B000
45E0F010  58F0D170  45E0F000  00000000  D4C5D9C7  F0F0F3F8*
02E3E7E3  40000770  40400004  40400001  00000080  40404040  40404040
40404040  40404040  40404040  40404040  40404040  40404040  40404040

MEMBER NAME  MERGE
40404040  40404040  40404040  40404040  D4C5D9C7  F0F0F3F9*
02D9D3C4  40404040  40400038  40404040  00020001  1C000258  00030001
1C00025C  00040001  1C000270  00010001  0C000640  00010001  0C0006A0
00010001  0C0006D4  00010001  0C000738  D4C5D9C7  F0F0F4F0**
02E3E7E3  40000774  40400038  40400001  18A958B0  D0B85880  D160185B
5C40D100  18391A35  45E0F008  01238000  879AD67E  5880D150  58B0D168
58A0D0B4  5890D09C  45E0F010  47F0D288  D4C5D9C7  F0F0F4F1*
02E3E7E3  400007AC  40400038  40400001  5800D100  5900D0F4  4750D6BC
47F0D7C6  5800D100  1A095000  D10058E0  D1FC2B00  780EB000  6A00D090
6000D088  5800D08C  5000D0E0  58F0D170  D4C5D9C7  F0F0F4F2*
02E3E7E3  400007E4  40400038  40400001  45E0F004  00000000  000000C0
5810D200  45E0F008  0471B000  5810D204  45E0F008  0471B000  45E0F008
0450D0E0  45E0F010  58F0D170  45E0F000  D4C5D9C7  F0F0F4F3*
02E3E7E3  4000081C  40400038  40400001  00000000  00000080  18A958B0
D0B85880  D160185B  5C40D100  18391A35  45E0F008  01238000  879AD72E
5880D150  58B0D168  58A0D0B4  5890D09C  D4C5D9C7  F0F0F4F4*
02E3E7E3  40000854  40400038  40400001  45E0F010  47F0D288  5850D104
5C40D1BC  18255A20  D19C58E0  D208410E  B0005000  D06C4102  80005000
D0709280  D07058F0  D15C4110  D06805EF  D4C5D9C7  F0F0F4F5*
02E3E7E3  4000088C  40400038  40400001  18255A20  D1BC58E0  D20C410E
B0005000  D06C4102  80005000  D0709280  D07058F0  D15C4110  D06805EF
47F0D288  58B0D168  58F0D158  4110D074  D4C5D9C7  F0F0F4F6*
02E3E7E3  400008C4  40400038  40400001  05EF58B0  D1681BFF  58E0D000
07FE58A0  D00458E0  A00C58B0  A0185810  B00C5820  D1085020  10005830
B0185840  D1005040  300018DA  92FFA00C  D4C5D9C7  F0F0F4F7*
02E3E7E3  400008FC  40400038  40400001  982CA01C  07FE987B  10045820
70005020  D0F05820  90005020  D1085820  A0005020  D0EC5870  10185820
70005020  D1005820  10004130  20004150  D4C5D9C7  F0F0F4F8*
02E3E7E3  40000934  40400038  40400001  00041B25  5C40D0AC  1B255020
D1505030  D1545820  10084130  20004150  00041B25  5C40D0B0  1B255020
D1685030  D16C5030  D07C5820  10144130  D4C5D9C7  F0F0F4F9*
02E3E7E3  4000096C  4040001A  40400001  20004150  00011B25  5C40D0B8
```

```
1B255020  D1605030  D16447F0  D2104040  40404040  40404040  40404040
40404040  40404040  40404040  40404040  D4C5D9C7  F0F0F5F0**
02E3E7E3  40000020  40400008  40400001  00000902  00000100  40404040
40404040  40404040  40404040  40404040  40404040  40404040  40404040
40404040  40404040  40404040  40404040  D4C5D9C7  F0F0F5F1*
02E3E7E3  40000100  40400004  40400001  000008D2  40404040  40404040
40404040  40404040  40404040  40404040  40404040  40404040  40404040
40404040  40404040  40404040  40404040  D4C5D9C7  F0F0F5F2*
02E3E7E3  4000014C  40400008  40400001  0000062E  0000065E  40404040
40404040  40404040  40404040  40404040  40404040  40404040  40404040
40404040  40404040  40404040  40404040  D4C5D9C7  F0F0F5F3*
02D9D3C4  40404040  40400038  40404040  00010001  0C000770  00010001
0C0007EC  00010001  0C000820  00010001  0C000020  00010001  0C000024
00010001  0C000100  00010001  0C00014C  D4C5D9C7  F0F0F5F4*
02E3E7E3  40000154  4040000C  40400001  00000710  000007AC  000001B4
40404040  40404040  40404040  40404040  40404040  40404040  40404040
40404040  40404040  40404040  40404040  D4C5D9C7  F0F0F5F5*
02E3E7E3  40000164  40400008  40400001  80000000  000001A8  40404040
40404040  40404040  40404040  40404040  40404040  40404040  40404040
40404040  40404040  40404040  40404040  D4C5D9C7  F0F0F5F6*
02E3E7E3  40000170  4040000C  40400001  80000000  0000020C  000001A8
40404040  40404040  40404040  40404040  40404040  40404040  40404040
40404040  40404040  40404040  40404040  D4C5D9C7  F0F0F5F7*
02E3E7E3  40000180  40400004  40400001  000001B4  40404040  40404040
40404040  40404040  40404040  40404040  40404040  40404040  40404040
40404040  40404040  40404040  40404040  D4C5D9C7  F0F0F5F8*

MEMBER NAME  MERGE
02D9D3C4  40404040  40400038  40404040  00010001  0C000150  00010001
0C000154  00010001  0C000158  00010001  0C00015C  00010001  0C000168
00010001  0C000174  00010001  0C000178  D4C5D9C7  F0F0F5F9*
02E3E7E3  40000184  40400004  40400001  80000208  40404040  40404040
40404040  40404040  40404040  40404040  40404040  40404040  40404040
40404040  40404040  40404040  40404040  D4C5D9C7  F0F0F6F0**
02E3E7E3  40000274  40400038  40400001  00000000  00000000  00000000
00000000  00000000  00000000  0000000C  00000000  00000010  00000000
00000008  00000000  00000000  00000000  D4C5D9C7  F0F0F6F1*
02E3E7E3  400002AC  40400038  40400001  00000000  00000000  00000000
00000000  00000014  00000000  00800009  0084000A  00000024  00000020
013C000B  00000000  0000000B  00000000  D4C5D9C7  F0F0F6F2*
02E3E7E3  400002E4  4040002C  40400001  0104000D  00000000  00C4000E
00000000  00B8000E  0000000E  00D0000F  00D4000F  00C8000F  00CC000F
00D8000F  40404040  40404040  40404040  D4C5D9C7  F0F0F6F3*
02D9D3C4  40404040  40400010  40404040  00010001  0C000180  00010001
0C000184  40404040  40404040  40404040  40404040  40404040  40404040
40404040  40404040  40404040  40404040  D4C5D9C7  F0F0F6F4*
02C5D5C4  40404040  40404040  40404040  40404040  40404040  40404040
00000986  F1F5F7F3  F460C6D6  F34040F0  F2F0F2F8  F7F0F9F8  40F0F84B
F4F04BF1  F9404040  D4C5D9C7  C5404040  D4C5D9C7  F0F0F6F5**

MEMBER NAME  MERGE1
02C5E2C4  40404040  40400010  40400001  D4C5D9C7  C5F14040  00000000
40000000  40404040  40404040  40404040  40404040  40404040  40404040
40404040  40404040  40404040  40404040  D4C5D9C7  F0F0F0F1*
02E3E7E3  40000000  40400038  40400001  47F0F00C  07D4C5D9  C7C5F140
90ECD00C  184D98CD  F0205040  D00450D0  400807FC  40404040  40404040
020A0803  18010A08  0318011A  06D3C1E8  D4C5D9C7  F0F0F0F2*
```

```
02E3E7E3  40000038  40400029  40400001  E4D74010  041A1940  D5D6E340
C6D6E4D5  C440C9D5  40C140D7  D3E840E3  C1C2D3C5  18322202  06481401
22404040  40404040  40404040  40404040  D4C5D9C7  F0F0F0F3*
02E3E7E3  400000E0  40400038  40400001  00000000  00000000  4F080000
00000000  00000000  00000001  00000002  00000003  00000004  00000005
00000007  00000008  00000009  00000016  D4C5D9C7  F0F0F0F4*
02E3E7E3  40000118  40400018  40400001  00000048  00000058  3F28F5C3
41580000  00000000  00000000  40404040  40404040  40404040  40404040
40404040  40404040  40404040  40404040  D4C5D9C7  F0F0F0F5*
02C5E2C4  40404040  40400010  40400002  C2E2D6D9  E3404040  02000000
40000000  40404040  40404040  40404040  40404040  40404040  40404040
40404040  40404040  40404040  40404040  D4C5D9C7  F0F0F0F6*
02E3E7E3  400001A8  40400004  40400001  00000000  40404040  40404040
40404040  40404040  40404040  40404040  40404040  40404040  40404040
40404040  40404040  40404040  40404040  D4C5D9C7  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  D4C5D9C7  F0F0F0F8*
02E3E7E3  400001B0  4040000C  40400001  00000000  00000000  00000000
40404040  40404040  40404040  40404040  40404040  40404040  40404040
40404040  40404040  40404040  40404040  D4C5D9C7  F0F0F0F9*
02C5E2C4  40404040  40400010  40400004  C9C2C3D6  D47B4040  02000000
40000000  40404040  40404040  40404040  40404040  40404040  40404040
40404040  40404040  40404040  40404040  D4C5D9C7  F0F0F1F0**
02E3E7E3  400001C0  40400004  40400001  00000000  40404040  40404040
40404040  40404040  40404040  40404040  40404040  40404040  40404040
40404040  40404040  40404040  40404040  D4C5D9C7  F0F0F1F1*
02E3E7E3  400001C8  40400004  40400001  00000000  40404040  40404040
40404040  40404040  40404040  40404040  40404040  40404040  40404040
40404040  40404040  40404040  40404040  D4C5D9C7  F0F0F1F2*
02E3E7E3  40000148  40400004  40400001  000000C8  40404040  40404040
40404040  40404040  40404040  40404040  40404040  40404040  40404040
40404040  40404040  40404040  40404040  D4C5D9C7  F0F0F1F3*
02E3E7E3  40000164  40400038  40400001  00000001  00000004  C6D34040
C1404040  00000005  00000004  C6D34040  C1404040  00000019  00000004
C6D34040  C1404040  00000021  00000004  D4C5D9C7  F0F0F1F4*
02E3E7E3  4000019C  40400008  40400001  C6D34040  C4404040  40404040
40404040  40404040  40404040  40404040  40404040  40404040  40404040
40404040  40404040  40404040  40404040  D4C5D9C7  F0F0F1F5*
02E3E7E3  4000024C  40400038  40400001  58B0D158  7800D0B8  7000D0E8
5800D088  5000D0C8  5000D1C8  5800D1AC  5000D1D0  5800D1B8  5000D1D4
5800D18C  5000D1D8  5800D0A4  5000D1DC  D4C5D9C7  F0F0F1F6*
02E3E7E3  40000284  40400038  40400001  5800D1C4  5000D1E0  5880D08C
5890D0B4  58A0D140  5850D0C8  1A585050  D0C85800  D1E01A09  5000D1E0
5800D1DC  1A095000  D1DC5800  D1D81A09  D4C5D9C7  F0F0F1F7*
02E3E7E3  400002BC  40400038  40400001  5000D1D8  5800D1D4  1A095000
D1D45800  D1D01A09  5000D1D0  5950D0F4  47C0D278  47F0D596  5820D088
5020D0F0  5800D1AC  5000D178  1C495050  D4C5D9C7  F0F0F1F8*
02E3E7E3  400002F4  40400038  40400001  D1BC1835  5A30D098  7803B000
7000D1B0  18355A30  D1847803  B0007000  D1B45800  D18C5000  D1745800
D17C5000  D16C1835  1A307803  B0007000  D4C5D9C7  F0F0F1F9*
02E3E7E3  4000032C  40400038  40400001  D1A05800  D1B85000  D1705830

MEMBER NAME  MERGE1
D1AC1862  5870D17C  5880D184  5890D1C0  58A0D08C  58B0D140  7809B000
7900D1B0  4770D33A  7828B000  7020D1A8  D4C5D9C7  F0F0F2F0**
02E3E7E3  40000364  40400038  40400001  7920D1B4  4750D33A  7867B000
```

| | | | | | | |
|---|---|---|---|---|---|---|
| 7960D1A0 | 4730D33A | 38467A40 | D0BC7940 | D1A04750 | D33A1266 | 4780D338 |
| 18565C40 | D1781825 | 5A20D174 | 7922B000 | D4C5D9C7 | F0F0F2F1* | |
| 02E3E7E3 | 4000039C | 40400038 | 40400001 | 4730D33A | 186A5AA0 | D08C1A73 |
| 1A831A93 | 59A0D0DC | 47C0D2E8 | 5060D0F0 | 58A0D140 | 58B0D158 | 5890D0B4 |
| 5880D08C | 5870D0C8 | 1A785070 | D0D05800 | D4C5D9C7 | F0F0F2F2* | |
| 02E3E7E3 | 400003D4 | 40400038 | 40400001 | D0985000 | D16C5090 | D1745800 |
| D0985A00 | D1BC5000 | D1785800 | D17C5A00 | D1BC5000 | D1805800 | D1845A00 |
| D1BC5000 | D1885800 | D18C5A00 | D1BC5000 | D4C5D9C7 | F0F0F2F3* | |
| 02E3E7E3 | 4000040C | 40400038 | 40400001 | D1901C69 | 18275A20 | D0981847 |
| 5A40D17C | 18575A50 | D1845A70 | D18C1838 | 18671875 | 18845890 | D0D018A2 |
| 5990D0F4 | 47C0D3D8 | 47F0D470 | 58E0D178 | D4C5D9C7 | F0F0F2F4* | |
| 02E3E7E3 | 40000444 | 40400038 | 40400001 | 782EB000 | 792AB000 | 4770D45A |
| 58E0D180 | 782EB000 | 7B28B000 | 30227920 | D0E84730 | D45A58E0 | D188782E |
| B0007B27 | B0003022 | 7920D0E8 | 4730D45A | D4C5D9C7 | F0F0F2F5* | |
| 02E3E7E3 | 4000047C | 40400038 | 40400001 | 58E0D190 | 782EB000 | 7926B000 |
| 4770D45A | 5850D0F4 | 5C40D174 | 18255A20 | D16C410A | B0005000 | D0504102 |
| B0005000 | D0549280 | D05458F0 | D14C4110 | D4C5D9C7 | F0F0F2F6* | |
| 02E3E7E3 | 400004B4 | 40400038 | 40400001 | D04C05EF | 5800D0F4 | 1B035000 |
| D0F41A93 | 5A60D0B4 | 5A70D0B4 | 5A80D0B4 | 5AA0D0B4 | 47F0D3CC | 58A0D140 |
| 5890D0B4 | 5880D08C | 5800D0F0 | 12004730 | D4C5D9C7 | F0F0F2F7* | |
| 02E3E7E3 | 400004EC | 40400038 | 40400001 | D53A5800 | D0EC5900 | D0E04750 |
| D49647F0 | D5A45800 | D0EC1A08 | 5000D0EC | 58E0D1D0 | 2B00780E | B0006A00 |
| D0806000 | D0785800 | D07C5000 | D0E458F0 | D4C5D9C7 | F0F0F2F8* | |
| 02E3E7E3 | 40000524 | 40400038 | 40400001 | D1601800 | 45E0F004 | 00000000 |
| 00000028 | 5810D1D4 | 45E0F008 | 0471B000 | 5810D1D8 | 45E0F008 | 0471B000 |
| 45E0F008 | 0450D0E4 | 45E0F010 | 58F0D160 | D4C5D9C7 | F0F0F2F9* | |
| 02E3E7E3 | 4000055C | 40400038 | 40400001 | 45E0F000 | 00000000 | 0000005B |
| 189818A8 | 58B0D0B0 | 5880D150 | 185B5C40 | D0EC1839 | 1A3545E0 | F0080123 |
| 8000879A | D50C58A0 | D14058B0 | D1585890 | D4C5D9C7 | F0F0F3F0** | |
| 02E3E7E3 | 40000594 | 40400038 | 40400001 | D0B45880 | D08C45E0 | F01047F0 |
| D2305850 | D0F05C40 | D1AC1825 | 5A20D0A4 | 58E0D1DC | 410EB000 | 5000D05C |
| 4102A000 | 5000D060 | 9280D060 | 58F0D14C | D4C5D9C7 | F0F0F3F1* | |
| 02E3E7E3 | 400005CC | 40400038 | 40400001 | 4110D058 | 05EF1825 | 5A20D1AC |
| 58E0D1E0 | 410EB000 | 5000D05C | 4102A000 | 5000D060 | 9280D060 | 58F0D14C |
| 4110D058 | 05EF47F0 | D23058B0 | D15858F0 | D4C5D9C7 | F0F0F3F2* | |
| 02E3E7E3 | 40000604 | 40400038 | 40400001 | D1484110 | D06405EF | 58B0D158 |
| 1BFF58E0 | D00007FE | 58A0D004 | 58E0A00C | 58B0A018 | 5810B00C | 5820D0F4 |
| 50201000 | 5830B014 | 5840D0EC | 50403000 | D4C5D9C7 | F0F0F3F3* | |
| 02E3E7E3 | 4000063C | 40400038 | 40400001 | 18DA92FF | A00C982C | A01C07FE |
| 987B1004 | 58207000 | 5020D0DC | 58209000 | 5020D0F4 | 58701014 | 58207000 |
| 5020D0EC | 58201000 | 41302000 | 41500004 | D4C5D9C7 | F0F0F3F4* | |
| 02E3E7E3 | 40000674 | 40400038 | 40400001 | 1B255C40 | D09C1B25 | 5020D140 |
| 5030D144 | 58201008 | 41302000 | 41500004 | 1B255C40 | D0AC1B25 | 5020D158 |
| 5030D15C | 5030D06C | 58201010 | 41302000 | D4C5D9C7 | F0F0F3F5* | |
| 02E3E7E3 | 400006AC | 40400018 | 40400001 | 41500001 | 1B255C40 | D0B01B25 |
| 5020D150 | 5030D154 | 47F0D1E4 | 40404040 | 40404040 | 40404040 | 40404040 |
| 40404040 | 40404040 | 40404040 | 40404040 | D4C5D9C7 | F0F0F3F6* | |
| 02E3E7E3 | 40000020 | 40400008 | 40400001 | 00000648 | 00000068 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F3F7* | |
| 02E3E7E3 | 40000068 | 40400004 | 40400001 | 00000618 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F3F8* | |
| 02D9D3C4 | 40404040 | 40400038 | 40404040 | 00020001 | 1C0001B0 | 00030001 |
| 1C0001B4 | 00040001 | 1C0001C8 | 00010001 | 0C000530 | 00010001 | 0C000564 |

```
MEMBER NAME  MERGE1
00010001  0C000020  00010001  0C000024  D4C5D9C7  F0F0F3F9*
02E3E7E3  400000B4  40400004  40400001  0000011C  40404040  40404040
40404040  40404040  40404040  40404040  40404040  40404040  40404040
40404040  40404040  40404040  40404040  D4C5D9C7  F0F0F4F0**
02E3E7E3  400000BC  40400008  40400001  80000000  00000100  40404040
40404040  40404040  40404040  40404040  40404040  40404040  40404040
40404040  40404040  40404040  40404040  D4C5D9C7  F0F0F4F1*
02E3E7E3  400000C8  4040000C  40400001  80000000  00000164  00000100
40404040  40404040  40404040  40404040  40404040  40404040  40404040
40404040  40404040  40404040  40404040  D4C5D9C7  F0F0F4F2*
02E3E7E3  400000D8  40400008  40400001  0000011C  8000015C  40404040
40404040  40404040  40404040  40404040  40404040  40404040  40404040
40404040  40404040  40404040  40404040  D4C5D9C7  F0F0F4F3*
02E3E7E3  400001CC  40400038  40400001  00000000  00000000  00000000
00000000  00000000  00000000  00000020  00000000  00000024  00000000
00000010  00000000  00000000  00000000  D4C5D9C7  F0F0F4F4*
02E3E7E3  40000204  40400038  40400001  00000000  00000000  00000000
00000000  00000014  007C000A  0080000A  0000000C  0134000B  00000018
0000001C  00000000  00FC000D  00000000  D4C5D9C7  F0F0F4F5*
02E3E7E3  4000023C  40400010  40400001  00BC000E  00000000  00B0000E
0000000E  40404040  40404040  40404040  40404040  40404040  40404040
40404040  40404040  40404040  40404040  D4C5D9C7  F0F0F4F6*
02D9D3C4  40404040  40400038  40404040  00010001  0C000068  00010001
0C0000B4  00010001  0C0000C0  00010001  0C0000CC  00010001  0C0000D0
00010001  0C0000D8  00010001  0C0000DC  D4C5D9C7  F0F0F4F7*
02C5D5C4  40404040  40404040  40404040  40404040  40404040  40404040
000006C4  F1F5F7F3  F460C6D6  F34040F0  F2F0F2F8  F7F0F9F8  40F0F84B
F4F04BF2  F4404040  D4C5D9C7  C5F14040  D4C5D9C7  F0F0F4F8**

MEMBER NAME  MCHECK
02C5E2C4  40404040  40400010  40400001  D4C3C8C5  C3D24040  00000000
40000000  40404040  40404040  40404040  40404040  40404040  40404040
40404040  40404040  40404040  40404040  D4C3C8C5  F0F0F0F1*
02E3E7E3  40000000  40400038  40400001  47F0F00C  07D4C3C8  C5C3D240
90ECD00C  184D98CD  F0205040  D00450D0  400807FC  40404040  40404040
020A0803  18010A08  0318011A  05C4C1E2  D4C3C8C5  F0F0F0F2*
02E3E7E3  40000038  40400038  40400001  C8401004  1A0740D3  C1E8E4D7
4010041A  0F40D4C1  E3C5D9C9  C1D340C3  D6C4C540  10041A0C  40D5D6E3
40C4C5C6  C9D5C5C4  18322202  06481401  D4C3C8C5  F0F0F0F3*
02E3E7E3  40000070  40400001  40400001  22404040  40404040  40404040
40404040  40404040  40404040  40404040  40404040  40404040  40404040
40404040  40404040  40404040  40404040  D4C3C8C5  F0F0F0F4*
02E3E7E3  400000C8  40400038  40400001  00000000  00000000  4E000000
00000000  4F080000  00000000  4E000000  80000000  00000000  00000001
00000002  00000004  00000006  00000008  D4C3C8C5  F0F0F0F5*
02C5E2C4  40404040  40400010  40400002  D7D4C1E3  D3404040  05000000
40001134  40404040  40404040  40404040  40404040  40404040  40404040
40404040  40404040  40404040  40404040  D4C3C8C5  F0F0F0F6*
02E3E7E3  40000100  4040001C  40400001  00000009  0000000A  00000016
00000048  00000058  00000000  00000000  40404040  40404040  40404040
40404040  40404040  40404040  40404040  D4C3C8C5  F0F0F0F7*
02E3E7E3  40000158  4040000C  40400001  FFFFFFA0  00001130  00000000
40404040  40404040  40404040  40404040  40404040  40404040  40404040
40404040  40404040  40404040  40404040  D4C3C8C5  F0F0F0F8*
02C5E2C4  40404040  40400010  40400003  C9C2C3D6  D47B4040  02000000
40000000  40404040  40404040  40404040  40404040  40404040  40404040
40404040  40404040  40404040  40404040  D4C3C8C5  F0F0F0F9*
02E3E7E3  40000168  40400004  40400001  00000000  40404040  40404040
40404040  40404040  40404040  40404040  40404040  40404040  40404040
40404040  40404040  40404040  40404040  D4C3C8C5  F0F0F1F0**
```

| | | | | | | |
|---|---|---|---|---|---|---|
| 02E3E7E3 | 40000170 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F1F1* | |
| 02E3E7E3 | 40000134 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F1F2* | |
| 02E3E7E3 | 400001CC | 40400038 | 40400001 | 58B0D098 | 58A0D074 | 5890D104 |
| 5800D070 | 5000D0B8 | 50A0D0A4 | 5090D10C | 50B0D114 | 5090D0FC | 50B0D124 |
| 50B0D128 | 5800D140 | 5000D110 | 5800D144 | D4C3C8C5 | F0F0F1F3* | |
| 02E3E7E3 | 40000204 | 40400038 | 40400001 | 5000D130 | 5800D148 | 5000D134 |
| 5800D14C | 5000D138 | 5800D150 | 5000D13C | 189A18AB | 58B0D0F0 | 5800D0B8 |
| 12004780 | D20458E0 | D1102B00 | 780EB000 | D4C3C8C5 | F0F0F1F4* | |
| 02E3E7E3 | 4000023C | 40400038 | 40400001 | 6A00D060 | 6000D050 | 5820D054 |
| 5020D0B0 | 5920D0B8 | 4770D1F8 | 5850D0A4 | 1B595C40 | D1141825 | 5A20D10C |
| 7822B000 | 58E0D110 | 702EB000 | 5800D0B8 | D4C3C8C5 | F0F0F1F5* | |
| 02E3E7E3 | 40000274 | 40400038 | 40400001 | 5900D0B0 | 4780D368 | 5820D128 |
| 5A20D104 | 1842186A | 58B0D0E0 | 58A0D0E4 | 5850D0F0 | 6826B050 | 2B003802 |
| 6A00D060 | 6000D050 | 5870D054 | 2B007804 | D4C3C8C5 | F0F0F1F6* | |
| 02E3E7E3 | 400002AC | 40400038 | 40400001 | 50006A00 | D0606000 | D0505880 |
| D0541987 | 4770D25E | 18095700 | D06C5000 | D05C6820 | D0586B20 | D0687024 |
| 50001987 | 4770D26C | 5080D0B8 | 47F0D368 | D4C3C8C5 | F0F0F1F7* | |
| 02E3E7E3 | 400002E4 | 40400038 | 40400001 | 5A60D098 | 5A90D074 | 5990A000 |
| 47C0D21C | 5080D0B8 | 58B0D0F0 | 58A0D098 | 5890D074 | 5800D0C4 | 5900D0BC |
| 4750D29C | 47F0D3C2 | 5800D0C4 | 1A095000 | D4C3C8C5 | F0F0F1F8* | |
| 02E3E7E3 | 4000031C | 40400038 | 40400001 | D0C458E0 | D1302B00 | 780EB000 |
| 6A00D060 | 6000D050 | 5830D054 | 10335030 | D0B458E0 | D1342B00 | 780EB000 |
| 6A00D060 | 6000D050 | 5800D054 | 5000D0C0 | D4C3C8C5 | F0F0F1F9* | |
| 02E3E7E3 | 40000354 | 40400038 | 40400001 | 58F0D0F8 | 45E0F004 | 00000000 |

MEMBER NAME MCHECK

| | | | | | | |
|---|---|---|---|---|---|---|
| 00000028 | 5810D138 | 45E0F008 | 0471B000 | 5810D13C | 45E0F008 | 0471B000 |
| 45E0F008 | 0450D0B4 | 45E0F008 | 0450D0C0 | D4C3C8C5 | F0F0F2F0** | |
| 02E3E7E3 | 4000038C | 40400038 | 40400001 | 45E0F008 | 0450D0B8 | 45E0F010 |
| 58F0D0F8 | 45E0F000 | 00000000 | 0000006B | 18A958B0 | D0945880 | D0E8185B |
| 5C40D0C4 | 18391A35 | 45E0F008 | 01238000 | D4C3C8C5 | F0F0F2F1* | |
| 02E3E7E3 | 400003C4 | 40400038 | 40400001 | 879AD33A | 58B0D0F0 | 58A0D098 |
| 5890D074 | 45E0F010 | 5800D070 | 5000D0B8 | 58B0D0F0 | 58A0D098 | 5890D074 |
| 5820D0A4 | 1A295020 | D0A45800 | D13C1A0A | D4C3C8C5 | F0F0F2F2* | |
| 02E3E7E3 | 400003FC | 40400038 | 40400001 | 5000D13C | 5800D138 | 1A0A5000 |
| D1385800 | D1341A0A | 5000D134 | 5800D130 | 1A0A5000 | D1305800 | D1281A0A |
| 5000D128 | 5800D110 | 1A0A5000 | D1105920 | D4C3C8C5 | F0F0F2F3* | |
| 02E3E7E3 | 40000434 | 40400038 | 40400001 | D0C847C0 | D1B058B0 | D09858A0 |
| D0745890 | D1041BFF | 58E0D000 | 07FE58A0 | D00458E0 | A00C58B0 | A0185810 |
| B00C5820 | D0C45020 | 100018DA | 92FFA00C | D4C3C8C5 | F0F0F2F4* | |
| 02E3E7E3 | 4000046C | 40400038 | 40400001 | 982CA01C | 07FE9879 | 10045820 |
| 70005020 | D0C85820 | 90005020 | D0C45820 | 10004130 | 20004150 | 00041B25 |
| 5C40D090 | 1B255020 | D0F05030 | D0F45820 | D4C3C8C5 | F0F0F2F5* | |
| 02E3E7E3 | 400004A4 | 4040001E | 40400001 | 10084130 | 20004150 | 00011B25 |
| 5C40D094 | 1B255020 | D0E85030 | D0EC47F0 | D1544040 | 40404040 | 40404040 |
| 40404040 | 40404040 | 40404040 | 40404040 | D4C3C8C5 | F0F0F2F6* | |
| 02E3E7E3 | 40000020 | 40400008 | 40400001 | 00000472 | 00000078 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F2F7* | |
| 02E3E7E3 | 40000078 | 40400004 | 40400001 | 0000044E | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F2F8* | |
| 02D9D3C4 | 40404040 | 40400038 | 40404040 | 00020001 | 0C000158 | 00020001 |
| 0C00015C | 00030001 | 1C000170 | 00010001 | 0C000360 | 00010001 | 0C0003A4 |
| 00010001 | 0C000020 | 00010001 | 0C000024 | D4C3C8C5 | F0F0F2F9* | |
| 02E3E7E3 | 40000174 | 40400038 | 40400001 | 00000000 | 00000000 | 00000018 |
| 00000000 | 00000000 | 00000000 | 00000000 | 00000010 | 00000020 | 00000024 |

```
00000000  00000000  00000000  00000000  D4C3C8C5  F0F0F3F0**
02E3E7E3  400001AC  40400020  40400001  00000000  00000000  00000000
00000070  00000060  00000068  00000078  0000007C  40404040  40404040
40404040  40404040  40404040  40404040  D4C3C8C5  F0F0F3F1*
02D9D3C4  40404040  40400008  40404040  00010001  0C000078  40404040
40404040  40404040  40404040  40404040  40404040  40404040  40404040
40404040  40404040  40404040  40404040  D4C3C8C5  F0F0F3F2*
02C5D5C4  40404040  40404040  40404040  40404040  40404040  40404040
000004C2  F1F5F7F3  F460C6D6  F34040F0  F2F0F2F8  F7F0F9F8  40F0F84B
F4F04BF2  F9404040  D4C3C8C5  C3D24040  D4C3C8C5  F0F0F3F3**

MEMBER NAME  MFGMAIN
02C5E2C4  40404040  40400010  40400001  D4C1C9D5  40404040  00000000
40000000  40404040  40404040  40404040  40404040  40404040  40404040
40404040  40404040  40404040  40404040  D4C1C9D5  F0F0F0F1*
02E3E7E3  40000000  40400038  40400001  47F0F00C  07D4C1C9  D5404040
90ECD00C  9823F020  5030D008  50D03004  07F24040  40404040  40404040
021A3840  40D4E2C9  E9C540E6  C1E240C4  D4C1C9D5  F0F0F0F2*
02E3E7E3  40000038  40400038  40400001  C5C6C9D5  C5C440D3  C1D9C7C5
D940E3C8  C1D540D4  E2C9E9C5  4B4040C3  C8C5C3D2  40C2D3D6  C3D240C4
C1E3C122  021A2640  C3D6D7E8  D9C9C7C8  D4C1C9D5  F0F0F0F3*
02E3E7E3  40000070  40400038  40400001  E3404DC3  5D40F1F9  F8F640E3
C8C540C2  D6C5C9D5  C740C3D6  D4D7C1D5  E81E1A15  40C1D3D3  40D9C9C7
C8E3E240  D9C5E2C5  D9E5C5C4  4B1E1E1A  D4C1C9D5  F0F0F0F4*
02E3E7E3  400000A8  40400038  40400001  0E40E2D3  C9C340E5  C5D9E2C9
D6D54014  041E1E22  02060414  01180106  02140418  01061414  01220218
121A2140  5C5C5C5C  40D5D640  C7C5D6D4  D4C1C9D5  F0F0F0F5*
02E3E7E3  400000E0  40400038  40400001  C5E3D9E8  40C9D540  E5C9C5E6
40D7E540  5C5C5C5C  18322202  06481401  22021812  1A23405C  5C5C5C40
D5D640C1  D9D9E6D6  C8C5C1C4  E240C9D5  D4C1C9D5  F0F0F0F6*
02E3E7E3  40000118  40400038  40400001  40E5C9C5  E640D7E5  405C5C5C
5C183222  021A10D9  C5E3D9C9  E5C540C5  D9D9D6D9  407E4010  031A0B40
C9D540D4  C6C7D4C1  C9D52202  1A0FD9C5  D4C1C9D5  F0F0F0F7*
02E3E7E3  40000150  40400026  40400001  C6C9D3C5  40C5D9D9  D6D9407E
4010031A  0B40C9D5  40D4C6C7  D4C1C9D5  22021A01  40064814  01224040
40404040  40404040  40404040  40404040  D4C1C9D5  F0F0F0F8*
02E3E7E3  40000178  40400020  40400001  E2D3C9C3  40D7D9D6  C3C5E2E2
C9D5C740  C3D6D4D7  D3C5E3C5  C4404040  40404040  40404040  40404040
40404040  40404040  40404040  40404040  D4C1C9D5  F0F0F0F9*
02E3E7E3  40000368  40400038  40400001  00000000  00000001  00000002
00000003  00000004  00000005  00000008  0000000C  00000010  00000014
00000018  00000019  0000002C  00000032  D4C1C9D5  F0F0F1F0**
02C5E2C4  40404040  40400010  40400002  C5D3D4E3  C2D34040  05000000
400D7D28  40404040  40404040  40404040  40404040  40404040  40404040
40404040  40404040  40404040  40404040  D4C1C9D5  F0F0F1F1*
02E3E7E3  400003A0  4040002C  40400001  00000038  0000003C  00000048
00000058  401DF3B6  4029FBE7  403EF9DB  41200000  414CCCCD  00000000
00000000  40404040  40404040  40404040  D4C1C9D5  F0F0F1F2*
02C5E2C4  40404040  40400010  40400003  D7E3C1C2  D3C54040  05000000
40125768  40404040  40404040  40404040  40404040  40404040  40404040
40404040  40404040  40404040  40404040  D4C1C9D5  F0F0F1F3*
02C5E2C4  40404040  40400010  40400004  E2E3C1C3  D2404040  05000000
40040744  40404040  40404040  40404040  40404040  40404040  40404040
40404040  40404040  40404040  40404040  D4C1C9D5  F0F0F1F4*
02E3E7E3  40000478  40400020  40400001  FFFFFFC8  000CD118  FFFFFFEC
00058600  000B0444  00108298  00111ED4  FFFFFFA8  40404040  40404040
40404040  40404040  40404040  40404040  D4C1C9D5  F0F0F1F5*
02D9D3C4  40404040  40400038  40404040  00020001  0C000478  00020001
0C00047C  00030001  0C000480  00030001  0C000484  00030001  0C000488
00030001  0C00048C  00030001  0C000490  D4C1C9D5  F0F0F1F6*
```

```
02C5E2C4  40404040  40400010  40400005  C7D9E4D7  40404040  05000000
4000000C  40404040  40404040  40404040  40404040  40404040  40404040
40404040  40404040  40404040  40404040  D4C1C9D5  F0F0F1F7*
02C5E2C4  40404040  40400010  40400006  D9D4D6C4  C5D34040  05000000
40000018  40404040  40404040  40404040  40404040  40404040  40404040
40404040  40404040  40404040  40404040  D4C1C9D5  F0F0F1F8*
02C5E2C4  40404040  40400010  40400007  C6D4D6C4  C5D34040  05000000
400001F8  40404040  40404040  40404040  40404040  40404040  40404040
40404040  40404040  40404040  40404040  D4C1C9D5  F0F0F1F9*
02C5E2C4  40404040  40400010  40400008  D7C3C5D9  D9404040  05000000

MEMBER NAME  MFGMAIN
40003844  40404040  40404040  40404040  40404040  40404040  40404040
40404040  40404040  40404040  40404040  D4C1C9D5  F0F0F2F0**
02C5E2C4  40404040  40400010  40400009  D7D7D6C9  D5E34040  05000000
40013884  40404040  40404040  40404040  40404040  40404040  40404040
40404040  40404040  40404040  40404040  D4C1C9D5  F0F0F2F1*
02C5E2C4  40404040  40400010  4040000A  E2C5D9D9  D6D94040  05000000
40000004  40404040  40404040  40404040  40404040  40404040  40404040
40404040  40404040  40404040  40404040  D4C1C9D5  F0F0F2F2*
02C5E2C4  40404040  40400010  4040000B  D6D7E3C9  D6D54040  05000000
40000020  40404040  40404040  40404040  40404040  40404040  40404040
40404040  40404040  40404040  40404040  D4C1C9D5  F0F0F2F3*
02E3E7E3  40000498  4040001C  40400001  00000000  FFFFFFFF  FFFFFFEB
FFFFFFBB  FFFFFFF0  00000000  00000000  40404040  40404040  40404040
40404040  40404040  40404040  40404040  D4C1C9D5  F0F0F2F4*
02D9D3C4  40404040  40400038  40404040  00040001  0C000494  00050001
0C000498  00060001  0C00049C  00070001  0C0004A0  00080001  0C0004A4
00090001  0C0004A8  000A0001  0C0004AC  D4C1C9D5  F0F0F2F5*
02C5E2C4  40404040  40400010  4040000C  C6D4E3C5  D9D94040  05000000
40002D58  40404040  40404040  40404040  40404040  40404040  40404040
40404040  40404040  40404040  40404040  D4C1C9D5  F0F0F2F6*
02C5E2C4  40404040  40400010  4040000D  D4E2C9E9  C5404040  05000000
4000000C  40404040  40404040  40404040  40404040  40404040  40404040
40404040  40404040  40404040  40404040  D4C1C9D5  F0F0F2F7*
02C5E2C4  40404040  40400010  4040000E  E2D3C9D5  C5E24040  05000000
40001C24  40404040  40404040  40404040  40404040  40404040  40404040
40404040  40404040  40404040  40404040  D4C1C9D5  F0F0F2F8*
02C5E2C4  40404040  40400010  4040000F  C3C1C4C5  E3404040  02000000
40000000  40404040  40404040  40404040  40404040  40404040  40404040
40404040  40404040  40404040  40404040  D4C1C9D5  F0F0F2F9*
02C5E2C4  40404040  40400010  40400010  C3C1C4E2  E3404040  02000000
40000000  40404040  40404040  40404040  40404040  40404040  40404040
40404040  40404040  40404040  40404040  D4C1C9D5  F0F0F3F0**
02E3E7E3  400004B4  4040001C  40400001  FFFFFFC3  00002551  00000000
FFFFFFE4  00001C20  00000000  00000000  40404040  40404040  40404040
40404040  40404040  40404040  40404040  D4C1C9D5  F0F0F3F1*
02D9D3C4  40404040  40400038  40404040  000B0001  0C0004B0  000C0001
0C0004B4  000C0001  0C0004B8  000D0001  0C0004BC  000E0001  0C0004C0
000E0001  0C0004C4  000F0001  1C0004C8  D4C1C9D5  F0F0F3F2*
02C5E2C4  40404040  40400010  40400011  C6D4C3C8  E3404040  02000000
40000000  40404040  40404040  40404040  40404040  40404040  40404040
40404040  40404040  40404040  40404040  D4C1C9D5  F0F0F3F3*
02C5E2C4  40404040  40400010  40400012  C6E2C5D5  C4404040  02000000
40000000  40404040  40404040  40404040  40404040  40404040  40404040
40404040  40404040  40404040  40404040  D4C1C9D5  F0F0F3F4*
02C5E2C4  40404040  40400010  40400013  C7E3D7D9  D4404040  02000000
40000000  40404040  40404040  40404040  40404040  40404040  40404040
40404040  40404040  40404040  40404040  D4C1C9D5  F0F0F3F5*
02C5E2C4  40404040  40400010  40400014  D4E5C3C8  D9404040  02000000
```

```
40000000  40404040  40404040  40404040  40404040  40404040  40404040
40404040  40404040  40404040  40404040  D4C1C9D5  F0F0F3F6*
02C5E2C4  40404040  40400010  40400015  C2D3C4D4  C6C74040  02000000
40000000  40404040  40404040  40404040  40404040  40404040  40404040
40404040  40404040  40404040  40404040  D4C1C9D5  F0F0F3F7*
02C5E2C4  40404040  40400010  40400016  C2D3C4E2  C5D84040  02000000
40000000  40404040  40404040  40404040  40404040  40404040  40404040
40404040  40404040  40404040  40404040  D4C1C9D5  F0F0F3F8*
02C5E2C4  40404040  40400010  40400017  C3C1C4C6  C9D34040  02000000
40000000  40404040  40404040  40404040  40404040  40404040  40404040

MEMBER NAME  MFGMAIN
40404040  40404040  40404040  40404040  D4C1C9D5  F0F0F3F9*
02E3E7E3  400004D0  4040001C  40400001  00000000  00000000  00000000
00000000  00000000  00000000  00000000  40404040  40404040  40404040
40404040  40404040  40404040  40404040  D4C1C9D5  F0F0F4F0**
02D9D3C4  40404040  40400038  40404040  00100001  1C0004CC  00110001
1C0004D0  00120001  1C0004D4  00130001  1C0004D8  00140001  1C0004DC
00150001  1C0004E0  00160001  1C0004E4  D4C1C9D5  F0F0F4F1*
02C5E2C4  40404040  40400010  40400018  C3C1C4E2  E4D74040  02000000
40000000  40404040  40404040  40404040  40404040  40404040  40404040
40404040  40404040  40404040  40404040  D4C1C9D5  F0F0F4F2*
02C5E2C4  40404040  40400010  40400019  C3C3C4C6  E3E74040  02000000
40000000  40404040  40404040  40404040  40404040  40404040  40404040
40404040  40404040  40404040  40404040  D4C1C9D5  F0F0F4F3*
02C5E2C4  40404040  40400010  4040001A  C3D6E5E2  C5D84040  02000000
40000000  40404040  40404040  40404040  40404040  40404040  40404040
40404040  40404040  40404040  40404040  D4C1C9D5  F0F0F4F4*
02C5E2C4  40404040  40400010  4040001B  C4C5C6C9  D5C54040  02000000
40000000  40404040  40404040  40404040  40404040  40404040  40404040
40404040  40404040  40404040  40404040  D4C1C9D5  F0F0F4F5*
02C5E2C4  40404040  40400010  4040001C  C6C3C8C1  D9E34040  02000000
40000000  40404040  40404040  40404040  40404040  40404040  40404040
40404040  40404040  40404040  40404040  D4C1C9D5  F0F0F4F6*
02C5E2C4  40404040  40400010  4040001D  C7C5D5D6  E4E34040  02000000
40000000  40404040  40404040  40404040  40404040  40404040  40404040
40404040  40404040  40404040  40404040  D4C1C9D5  F0F0F4F7*
02C5E2C4  40404040  40400010  4040001E  C9C2C3D6  D47B4040  02000000
40000000  40404040  40404040  40404040  40404040  40404040  40404040
40404040  40404040  40404040  40404040  D4C1C9D5  F0F0F4F8*
02E3E7E3  400004EC  4040001C  40400001  00000000  00000000  00000000
00000000  00000000  00000000  00000000  40404040  40404040  40404040
40404040  40404040  40404040  40404040  D4C1C9D5  F0F0F4F9*
02D9D3C4  40404040  40400038  40404040  00170001  1C0004E8  00180001
1C0004EC  00190001  1C0004F0  001A0001  1C0004F4  001B0001  1C0004F8
001C0001  1C0004FC  001D0001  1C000500  D4C1C9D5  F0F0F5F0**
02C5E2C4  40404040  40400010  4040001F  D4D6C4E2  D9E34040  02000000
40000000  40404040  40404040  40404040  40404040  40404040  40404040
40404040  40404040  40404040  40404040  D4C1C9D5  F0F0F5F1*
02C5E2C4  40404040  40400010  40400020  D7C3C8C1  D9E34040  02000000
40000000  40404040  40404040  40404040  40404040  40404040  40404040
40404040  40404040  40404040  40404040  D4C1C9D5  F0F0F5F2*
02C5E2C4  40404040  40400010  40400021  D7C3C8C5  C3D24040  02000000
40000000  40404040  40404040  40404040  40404040  40404040  40404040
40404040  40404040  40404040  40404040  D4C1C9D5  F0F0F5F3*
02C5E2C4  40404040  40400010  40400022  E2E2E3C9  C3D24040  02000000
40000000  40404040  40404040  40404040  40404040  40404040  40404040
40404040  40404040  40404040  40404040  D4C1C9D5  F0F0F5F4*
02E3E7E3  40000508  40400010  40400001  00000000  00000000  00000000
00000000  40404040  40404040  40404040  40404040  40404040  40404040
```

```
40404040  40404040  40404040  40404040  D4C1C9D5  F0F0F5F5*
02E3E7E3  400003EC  40400004  40400001  000000C8  40404040  40404040
40404040  40404040  40404040  40404040  40404040  40404040  40404040
40404040  40404040  40404040  40404040  D4C1C9D5  F0F0F5F6*
02E3E7E3  4000052C  40400038  40400001  5860D2F4  5870D30C  5880D2E8
58A0D318  58B0D2FC  5890D22C  58F0D324  5820F004  5B20F000  5020F008
47A0D3D4  58F0D36C  45E0F004  00000006  D4C1C9D5  F0F0F5F7*
02E3E7E3  40000564  40400038  40400001  00000028  45E0F010  58F0D324
5800F008  120047A0  D3F058F0  D36C45E0  F0340540  4040F2F3  58F0D360
1B1105EF  58F0D36C  45E0F004  00000006  D4C1C9D5  F0F0F5F8*

MEMBER NAME  MFGMAIN
02E3E7E3  4000059C  40400038  40400001  00000064  5820D304  45E0F008
04702015  45E0F010  58F0D340  1B1105EF  58B0D308  58A0D300  18965880
D30458F0  D36C1800  45E0F000  10000005  D4C1C9D5  F0F0F5F9*
02E3E7E3  400005D4  40400004  40400001  000000BC  40404040  40404040
40404040  40404040  40404040  40404040  40404040  40404040  40404040
40404040  40404040  40404040  40404040  D4C1C9D5  F0F0F6F0**
02D9D3C4  40404040  40400038  40404040  001E0001  1C000504  001F0001
1C000508  00200001  1C00050C  00210001  1C000510  00220001  1C000514
00010001  0C000564  00010001  0C00059C  D4C1C9D5  F0F0F6F1*
02E3E7E3  400005D8  40400038  40400001  00000528  45E0F00C  00000408
01200004  45E0F00C  00000464  04700002  45E0F00C  0000040C  01200014
45E0F010  58F0D344  4110D054  05EF4100  D4C1C9D5  F0F0F6F2*
02E3E7E3  40000610  40400038  40400001  A0045000  D0644100  D2CC5000
D0689280  D06858F0  D3444110  D06005EF  58F0D334  4110D06C  05EF58F0
D3504110  D07805EF  5800D264  5900D1E0  D4C1C9D5  F0F0F6F3*
02E3E7E3  40000648  40400038  40400001  4780D49E  5800D264  5900D1D4
4780D4C4  47F0D8D8  58009008  5A00D1D4  50009008  5800B1A5  5A00D1D4
5000B1A5  58009008  5900D1D4  4770D4F2  D4C1C9D5  F0F0F6F4*
02E3E7E3  40000680  40400038  40400001  58F0D344  4110D084  05EF58F0
D3584110  D09005EF  5830B1A5  5C20D1E4  4103B1A4  5000D0A8  4100D268
5000D0AC  9280D0AC  58F0D344  4110D0A4  D4C1C9D5  F0F0F6F5*
02E3E7E3  400006B8  40400038  40400001  05EF5830  B1A55C20  D1F44103
B0015000  D0B458F0  D3444110  D0B005EF  58F0D330  1B1105EF  47F0D42E
5880D2E8  58A0D318  58B0D2FC  5890D22C  D4C1C9D5  F0F0F6F6*
02E3E7E3  400006F0  40400038  40400001  58F0D378  4110D0BC  05EF58F0
D3481B11  05EF58F0  D2E05800  F0385900  D1D44730  D5D05850  70455A50
D1D45050  70455950  D25447A0  D78C58F0  D4C1C9D5  F0F0F6F7*
02E3E7E3  40000728  40400038  40400001  D36C1800  45E0F004  00000000
000000CE  45E0F010  58F0D36C  45E0F000  00000000  000000F7  5C40D210
45E0F134  00010000  01257001  01000048  D4C1C9D5  F0F0F6F8*
02E3E7E3  40000760  40400038  40400001  00000001  45E0F010  5800600C
12004730  D6305850  70455A50  D1D45050  70455950  D25447A0  D78C58F0
D36C1800  45E0F004  00000000  000000FD  D4C1C9D5  F0F0F6F9*
02D9D3C4  40404040  40400038  40404040  00010001  0C0005D4  00010001
0C0005D8  00010001  0C0005E0  00010001  0C0005EC  00010001  0C0005F8
00010001  0C000734  00010001  0C000748  D4C1C9D5  F0F0F7F0**
02E3E7E3  40000798  40400038  40400001  45E0F010  58F0D36C  45E0F000
00000000  000000F7  5C40D210  45E0F134  00010000  01257001  01000048
00000001  45E0F010  58F0D2E0  5800F038  D4C1C9D5  F0F0F7F1*
02E3E7E3  400007D0  40400038  40400001  5900D1D4  41300001  47C0D646
1B335800  600C5900  D1D44120  00014740  D6581B22  16238629  D78C5800
A00C8709  D67058F0  D3644110  D0C405EF  D4C1C9D5  F0F0F7F2*
02E3E7E3  40000808  40400038  40400001  58F0D310  5800F010  5900D1D0
41200001  4720D686  1B228729  D69E58F0  D3145800  F0008609  D69E58F0
D3741B11  05EF58F0  D3105800  F0101200  D4C1C9D5  F0F0F7F3*
02E3E7E3  40000840  40400038  40400001  47C0D6B6  58F0D33C  4110D0CC
05EF58F0  D3145800  F0008609  D6FA5800  A0048709  D6FA5800  A00C8709
D6FA5800  A0088609  D6FA5800  70455900  D4C1C9D5  F0F0F7F4*
```

```
02E3E7E3  40000878  40400038  40400001  D1D04120  00014780  D6EC1B22
8729D6FA  58F0D34C  4110D0C4  05EF5800  A00C8709  D73658F0  D3145800
F0008609  D7365800  70455900  D1D04120  D4C1C9D5  F0F0F7F5*
02E3E7E3  400008B0  40400038  40400001  00014780  D7201B22  8729D736
5800A01C  8609D736  58F0D35C  4110D0D0  05EF5800  A0088609  D82658F0
D3704110  D0F405EF  58F0D344  4110D114  D4C1C9D5  F0F0F7F6*
02E3E7E3  400008E8  40400038  40400001  05EF58F0  D3444110  D12005EF
58F0D334  4110D06C  05EF58B0  D1E058F0  D3504110  D12C05EF  59B0D264
4780D76A  58B0D2FC  5800D264  5900D1D4  D4C1C9D5  F0F0F7F7*
02E3E7E3  40000920  40400038  40400001  4770D8D8  58F0D320  5800F02F

MEMBER NAME  MFGMAIN
5900D1D0  41200001  4720D7A2  1B225800  F8035900  D1D04130  00014720
D7B41B33  16325800  70455900  D1D04120  D4C1C9D5  F0F0F7F8*
02E3E7E3  40000958  40400038  40400001  00014720  D7C81B22  16238729
D7D658F0  D3381B11  05EF7800  D2243300  7000D388  7800D228  33007000
D38C58F0  D3544110  D13805EF  41E00004  D4C1C9D5  F0F0F7F9*
02E3E7E3  40000990  40400038  40400001  15FE4720  D80458EF  D04C07FE
58F0D350  4110D180  05EF5800  D2645900  D1E04780  D8045800  D2645900
D1D44770  D9125800  70451200  4730D93E  D4C1C9D5  F0F0F8F0**
02E3E7E3  400009C8  40400038  40400001  58F0D314  5800F000  8709D84A
58F0D36C  45E0F034  05404040  F2F35800  A0148709  D88E5800  A00C8709
D88E58F0  D3145800  F0008609  D88E5800  D4C1C9D5  F0F0F8F1*
02E3E7E3  40000A00  40400038  40400001  A0088609  D88E5800  70455900
D1D04120  00014780  D8801B22  8729D88E  58F0D37C  4110D18C  05EF5800
A0008709  D8CA5800  A00C8709  D8CA5800  D4C1C9D5  F0F0F8F2*
02E3E7E3  40000A38  40400038  40400001  70455900  D1D04120  00014780
D8B01B22  8729D8CA  58F0D314  5800F000  8609D8CA  58F0D368  4110D1B0
05EF58F0  D36C45E0  F0340540  404040F0  D4C1C9D5  F0F0F8F3*
02E3E7E3  40000A70  40400038  40400001  5880D2E8  58A0D318  58B0D2FC
5890D22C  58F0D36C  45E0F004  00000006  00000128  45E0F008  0450D264
45E0F010  58F0D36C  45E0F034  05404040  D4C1C9D5  F0F0F8F4*
02E3E7E3  40000AA8  40400038  40400001  F1F058F0  D36C1800  45E0F004
00000006  0000014B  45E0F008  0450D264  45E0F010  58F0D36C  45E0F034
05404040  F1F15830  70455C20  D2105890  D4C1C9D5  F0F0F8F5*
02E3E7E3  40000AE0  40400038  40400001  D21058A0  D21018B3  188758F0
D36C1800  45E0F004  00000006  0000016D  45E0F134  00010000  01298001
01000048  00000001  45E0F010  879AD952  D4C1C9D5  F0F0F8F6*
02E3E7E3  40000B18  4040002C  40400001  5880D2E8  58A0D318  58B0D2FC
5890D22C  58F0D36C  45E0F034  05404040  F2F358F0  D36C45E0  F0340540
404040F0  40404040  40404040  40404040  D4C1C9D5  F0F0F8F7*
02E3E7E3  40000B46  4040000E  40400001  58F0336C  45E0F040  18D347F0
D3944040  40404040  40404040  40404040  40404040  40404040  40404040
40404040  40404040  40404040  40404040  D4C1C9D5  F0F0F8F8*
02E3E7E3  40000020  40400008  40400001  00000B46  00000198  40404040
40404040  40404040  40404040  40404040  40404040  40404040  40404040
40404040  40404040  40404040  40404040  D4C1C9D5  F0F0F8F9*
02E3E7E3  40000198  40400004  40400001  00000B36  40404040  40404040
40404040  40404040  40404040  40404040  40404040  40404040  40404040
40404040  40404040  40404040  40404040  D4C1C9D5  F0F0F9F0**
02D9D3C4  40404040  40400038  40404040  00010001  0C000794  00010001
0C0007A8  00010001  0C000A8C  00010001  0C000AB8  00010001  0C000AF8
00010001  0C000020  00010001  0C000024  D4C1C9D5  F0F0F9F1*
02E3E7E3  400001E4  40400018  40400001  0000099C  0000099C  00000378
00000000  80000408  00000380  40404040  40404040  40404040  40404040
40404040  40404040  40404040  40404040  D4C1C9D5  F0F0F9F2*
02E3E7E3  40000200  40400008  40400001  80000000  0000040C  40404040
40404040  40404040  40404040  40404040  40404040  40404040  40404040
40404040  40404040  40404040  40404040  D4C1C9D5  F0F0F9F3*
02D9D3C4  40404040  40400038  40404040  00010001  0C000198  00010001
```

```
0C0001E4  00010001  0C0001E8  00010001  0C0001EC  00050001  0C0001F0
00010001  0C0001F4  00010001  0C0001F8  D4C1C9D5  F0F0F9F4*
02E3E7E3  40000208  4040001C  40400001  00000464  80000408  0000036C
000003FC  800003DC  0000038C  00000000  40404040  40404040  40404040
40404040  40404040  40404040  40404040  D4C1C9D5  F0F0F9F5*
02D9D3C4  40404040  40400038  40404040  00010001  0C000204  00010001
0C000208  00010001  0C00020C  00010001  0C000210  00010001  0C000214
00010001  0C000218  00010001  0C00021C  D4C1C9D5  F0F0F9F6*
02E3E7E3  40000224  4040001C  40400001  8000040C  0000036C  00000420
00000400  000003E4  800003F8  0000037C  40404040  40404040  40404040

MEMBER NAME  MFGMAIN
40404040  40404040  40404040  40404040  D4C1C9D5  F0F0F9F7*
02D9D3C4  40404040  40400038  40404040  00060001  0C000220  00010001
0C000224  00010001  0C000228  00010001  0C00022C  00010001  0C000230
00010001  0C000234  00010001  0C000238  D4C1C9D5  F0F0F9F8*
02E3E7E3  40000244  40400008  40400001  80000000  0000038C  40404040
40404040  40404040  40404040  40404040  40404040  40404040  40404040
40404040  40404040  40404040  40404040  D4C1C9D5  F0F0F9F9*
02E3E7E3  40000250  40400018  40400001  8000040C  00000004  80000000
00000004  80000000  800003D0  40404040  40404040  40404040  40404040
40404040  40404040  40404040  40404040  D4C1C9D5  F0F1F0F0**
02D9D3C4  40404040  40400038  40404040  00010001  0C00023C  00010001
0C000248  00010001  0C000250  00090001  0C000254  00090001  0C000258
00040001  0C00025C  00040001  0C000260  D4C1C9D5  F0F1F0F1*
02E3E7E3  40000268  4040001C  40400001  00000004  00000000  00000000
001082A0  001082A8  001082A4  00111EE8  40404040  40404040  40404040
40404040  40404040  40404040  40404040  D4C1C9D5  F0F1F0F2*
02D9D3C4  40404040  40400038  40404040  00010001  0C000264  00040001
0C000268  00040001  0C00026C  00030001  0C000270  00030001  0C000274
00030001  0C000278  00030001  0C00027C  D4C1C9D5  F0F1F0F3*
02E3E7E3  40000284  4040001C  40400001  00000004  80000000  00000370
000003E0  00000000  000007D4  000003E8  40404040  40404040  40404040
40404040  40404040  40404040  40404040  D4C1C9D5  F0F1F0F4*
02D9D3C4  40404040  40400038  40404040  00030001  0C000280  00080001
0C000284  00080001  0C000288  00010001  0C00028C  00010001  0C000290
00030001  0C000294  00030001  0C000298  D4C1C9D5  F0F1F0F5*
02E3E7E3  400002A0  4040001C  40400001  000003F4  000003D8  8000040C
00000378  00000408  80000000  00000380  40404040  40404040  40404040
40404040  40404040  40404040  40404040  D4C1C9D5  F0F1F0F6*
02D9D3C4  40404040  40400038  40404040  00010001  0C00029C  00010001
0C0002A0  00010001  0C0002A4  00010001  0C0002A8  00010001  0C0002AC
00010001  0C0002B0  00050001  0C0002B4  D4C1C9D5  F0F1F0F7*
02E3E7E3  400002BC  4040001C  40400001  00000464  80000004  0000036C
000003FC  800003F0  00000520  00000524  40404040  40404040  40404040
40404040  40404040  40404040  40404040  D4C1C9D5  F0F1F0F8*
02D9D3C4  40404040  40400038  40404040  00010001  0C0002B8  00010001
0C0002BC  00050001  0C0002C0  00010001  0C0002C4  00010001  0C0002C8
00010001  0C0002CC  00010001  0C0002D0  D4C1C9D5  F0F1F0F9*
02E3E7E3  400002D8  4040001C  40400001  00000368  00000394  000003B4
000003B0  00000178  00000368  00000368  40404040  40404040  40404040
40404040  40404040  40404040  40404040  D4C1C9D5  F0F1F1F0**
02D9D3C4  40404040  40400038  40404040  00010001  0C0002D4  00010001
0C0002D8  00010001  0C0002DC  00010001  0C0002E0  00010001  0C0002E4
00010001  0C0002E8  00010001  0C0002EC  D4C1C9D5  F0F1F1F1*
02E3E7E3  400002F4  4040001C  40400001  00000368  00000368  0000036C
00000374  00000368  00000368  000003B4  40404040  40404040  40404040
40404040  40404040  40404040  40404040  D4C1C9D5  F0F1F1F2*
02D9D3C4  40404040  40400038  40404040  00010001  0C0002F0  00010001
0C0002F4  00010001  0C0002F8  00010001  0C0002FC  00010001  0C000300
```

```
00010001  0C000304  00010001  0C000308  D4C1C9D5  F0F1F1F3*
02E3E7E3  40000310  4040001C  40400001  000003B8  80000368  00000370
000003FC  800003F0  00000004  00000000  40404040  40404040  40404040
40404040  40404040  40404040  40404040  D4C1C9D5  F0F1F1F4*
02D9D3C4  40404040  40400038  40404040  00010001  0C00030C  00010001
0C000310  00010001  0C000314  00010001  0C000318  00010001  0C00031C
00010001  0C000320  00040001  0C000324  D4C1C9D5  F0F1F1F5*
02E3E7E3  4000032C  4040001C  40400001  00000000  001082A0  001082A8
001082A4  00111EE8  00000000  80001C20  40404040  40404040  40404040
40404040  40404040  40404040  40404040  D4C1C9D5  F0F1F1F6*

MEMBER NAME  MFGMAIN
02D9D3C4  40404040  40400038  40404040  00040001  0C000328  00030001
0C00032C  00030001  0C000330  00030001  0C000334  00030001  0C000338
00030001  0C00033C  000E0001  0C000340  D4C1C9D5  F0F1F1F7*
02E3E7E3  40000348  4040001C  40400001  00000000  001082A0  001082A8
00111EE8  001082A4  00000004  80000000  40404040  40404040  40404040
40404040  40404040  40404040  40404040  D4C1C9D5  F0F1F1F8*
02D9D3C4  40404040  40400038  40404040  000E0001  0C000344  00030001
0C000348  00030001  0C00034C  00030001  0C000350  00030001  0C000354
00030001  0C000358  00040001  0C00035C  D4C1C9D5  F0F1F1F9*
02E3E7E3  40000518  40400014  40400001  00000000  00000000  00000000
00000000  000006E0  40404040  40404040  40404040  40404040  40404040
40404040  40404040  40404040  40404040  D4C1C9D5  F0F1F2F0**
02D9D3C4  40404040  40400010  40404040  00040001  0C000360  00010001
0C000528  40404040  40404040  40404040  40404040  40404040  40404040
40404040  40404040  40404040  40404040  D4C1C9D5  F0F1F2F1*
02C5D5C4  40000000  40404040  40400001  40404040  40404040  40404040
00000B54  F1F5F7F3  F460C6D6  F34040F0  F2F0F2F8  F7F0F9F8  40F0F84B
F4F04BF3  F3404040  D4C1C9D5  40404040  D4C1C9D5  F0F1F2F2**

MEMBER NAME  MLCHAR
02C5E2C4  40404040  40400010  40400001  D4D3C3C8  C1D94040  00000000
40000000  40404040  40404040  40404040  40404040  40404040  40404040
40404040  40404040  40404040  40404040  D4D3C3C8  F0F0F0F1*
02E3E7E3  40000000  40400038  40400001  47F0F00C  07D4D3C3  C8C1D940
90ECD00C  184D98CD  F0205040  D00450D0  400807FC  40404040  40404040
021A1D40  C5D9D9D6  D940C9D5  40D4D3C3  D4D3C3C8  F0F0F0F2*
02E3E7E3  40000038  40400011  40400001  C8C1D940  4DE2E4D7  C5D940E3
C5E7E35D  22404040  40404040  40404040  40404040  40404040  40404040
40404040  40404040  40404040  40404040  D4D3C3C8  F0F0F0F3*
02E3E7E3  40000238  40400038  40400001  00000000  00000001  00000002
00000003  00000004  00000016  0000002A  00000049  00000078  401DF3B6
4029FBE7  4029FFD6  403EF9DB  40800000  D4D3C3C8  F0F0F0F4*
02E3E7E3  40000270  40400038  40400001  41100000  4110C49C  41200000
4125C28F  41280000  41300000  41304189  41340000  41358106  413820C5
413B53F8  41433333  41480000  414B3333  D4D3C3C8  F0F0F0F5*
02C5E2C4  40404040  40400010  40400002  D9D4D6C4  C5D34040  05000000
40000018  40404040  40404040  40404040  40404040  40404040  40404040
40404040  40404040  40404040  40404040  D4D3C3C8  F0F0F0F6*
02E3E7E3  400002A8  40400010  40400001  415C353F  41A33333  00000000
00000000  40404040  40404040  40404040  40404040  40404040  40404040
40404040  40404040  40404040  40404040  D4D3C3C8  F0F0F0F7*
02C5E2C4  40404040  40400010  40400003  C1D9C3D6  E2404040  02000000
40000000  40404040  40404040  40404040  40404040  40404040  40404040
40404040  40404040  40404040  40404040  D4D3C3C8  F0F0F0F8*
02C5E2C4  40404040  40400010  40400004  C2E2D6D9  E3404040  02000000
40000000  40404040  40404040  40404040  40404040  40404040  40404040
40404040  40404040  40404040  40404040  D4D3C3C8  F0F0F0F9*
02C5E2C4  40404040  40400010  40400005  D4E5C3C8  D9404040  02000000
```

```
40000000  40404040  40404040  40404040  40404040  40404040  40404040
40404040  40404040  40404040  40404040  D4D3C3C8  F0F0F1F0**
02E3E7E3  400003A8  40400010  40400001  FFFFFFFF  00000000  00000000
00000000  40404040  40404040  40404040  40404040  40404040  40404040
40404040  40404040  40404040  40404040  D4D3C3C8  F0F0F1F1*
02C5E2C4  40404040  40400010  40400006  C3C1C4D3  D5F14040  02000000
40000000  40404040  40404040  40404040  40404040  40404040  40404040
40404040  40404040  40404040  40404040  D4D3C3C8  F0F0F1F2*
02C5E2C4  40404040  40400010  40400007  C3C1C4D5  D7C44040  02000000
40000000  40404040  40404040  40404040  40404040  40404040  40404040
40404040  40404040  40404040  40404040  D4D3C3C8  F0F0F1F3*
02C5E2C4  40404040  40400010  40400008  C3C1C4E2  E4D74040  02000000
40000000  40404040  40404040  40404040  40404040  40404040  40404040
40404040  40404040  40404040  40404040  D4D3C3C8  F0F0F1F4*
02C5E2C4  40404040  40400010  40400009  C8C7C4C1  E3C54040  02000000
40000000  40404040  40404040  40404040  40404040  40404040  40404040
40404040  40404040  40404040  40404040  D4D3C3C8  F0F0F1F5*
02E3E7E3  400003BC  40400014  40400001  00000000  00000000  00000000
00000000  00000000  40404040  40404040  40404040  40404040  40404040
40404040  40404040  40404040  40404040  D4D3C3C8  F0F0F1F6*
02D9B3C4  40404040  40400038  40404040  00020001  0C0003A8  00030001
1C0003AC  00040001  1C0003B0  00050001  1C0003BC  00060001  1C0003C0
00070001  1C0003C4  00080001  1C0003C8  D4D3C3C8  F0F0F1F7*
02C5E2C4  40404040  40400010  4040000A  C8C7E3C9  D4C54040  02000000
40000000  40404040  40404040  40404040  40404040  40404040  40404040
40404040  40404040  40404040  40404040  D4D3C3C8  F0F0F1F8*
02C5E2C4  40404040  40400010  4040000B  C9C2C3D6  D47B4040  02000000
40000000  40404040  40404040  40404040  40404040  40404040  40404040
40404040  40404040  40404040  40404040  D4D3C3C8  F0F0F1F9*
02C5E2C4  40404040  40400010  4040000C  C9C3D5E3  C5D94040  02000000

MEMBER NAME  MLCHAR
40000000  40404040  40404040  40404040  40404040  40404040  40404040
40404040  40404040  40404040  40404040  D4D3C3C8  F0F0F2F0**
02E3E7E3  400003D0  4040000C  40400001  00000000  00000000  00000000
40404040  40404040  40404040  40404040  40404040  40404040  40404040
40404040  40404040  40404040  40404040  D4D3C3C8  F0F0F2F1*
02E3E7E3  400002F0  40400038  40400001  00000001  00000002  C3C84040
C1404040  00000008  00000003  C3C84040  C1404040  C4C5E3C1  C9D340D3
C1E8E4D7  407B4040  C5D9D9D6  D9E24040  D4D3C3C8  F0F0F2F2*
02E3E7E3  40000328  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  D4D3C3C8  F0F0F2F3*
02E3E7E3  40000360  40400038  40400001  C45B5BE2  D3C9C340  E5C5D9E2
C9D6D540  E7E74BE7  40404040  40404040  4040C4C1  E3C57A40  E7E761E7
E761E7E7  40404040  4040E3C9  D4C57A40  D4D3C3C8  F0F0F2F4*
02E3E7E3  40000398  40400008  40400001  E7E77AE7  E77AE7E7  40404040
40404040  40404040  40404040  40404040  40404040  40404040  40404040
40404040  40404040  40404040  40404040  D4D3C3C8  F0F0F2F5*
02E3E7E3  400003F0  40400038  40400001  5880D358  58B0D364  5870D394
4100D320  5000D070  58F0D36C  4110D06C  05EF58F0  D3804110  D07805EF
58F0D37C  4110D07C  05EF58F0  D3604110  D4D3C3C8  F0F0F2F6*
02E3E7E3  40000428  40400038  40400001  D08005EF  7800D258  33007000
D2947800  D2443300  7000D26C  7800D22C  33007000  D2747800  D2243300
7000D278  7800D248  7000D270  7800D23C  D4D3C3C8  F0F0F2F7*
02E3E7E3  40000460  40400038  40400001  7000D27C  7800D250  7000D284
58F0D378  4110D094  05EF41E0  000415FE  4720D436  58EFD04C  07FE7800
D2347000  D2847800  D2403300  7000D294  D4D3C3C8  F0F0F2F8*
02E3E7E3  40000498  40400038  40400001  58F0D378  4110D0DC  05EF41E0
000415FE  4720D462  58EFD054  07FE7800  D27C7000  D28058F0  D3704110
```

```
D12405EF  7800D280  7B00D21C  7000D280  D4D3C3C8  F0F0F2F9*
02E3E7E3  400004D0  40400038  40400001  58F0D370  4110D124  05EF7800
D2307000  D2847800  D2383300  7000D294  5890D1EC  18A7410A  B0005000
D13458F0  D3884110  D13405EF  5000D28C  D4D3C3C8  F0F0F3F0**
02E3E7E3  40000508  40400038  40400001  410AB000  5000D154  58F0D378
4110D13C  05EF41E0  000415FE  4720D4DA  58EFD05C  07FE7800  D2847B00
D21C7000  D2847800  D2807B00  D21C7000  D4D3C3C8  F0F0F3F1*
02E3E7E3  40000540  40400038  40400001  D28058F0  D3704110  D12405EF
5A90D1EC  5AA0D200  5990D298  47C0D4A2  58F0D370  4110D184  05EF58F0
D3704110  D19405EF  58F0D370  4110D1A4  D4D3C3C8  F0F0F3F2*
02E3E7E3  40000578  40400038  40400001  05EF58F0  D3704110  D1B405EF
5800D1E8  5000D298  7820D27C  7B20D280  7A20D228  7020D290  7800D220
33007000  D39858F0  D35C4110  D1C405EF  D4D3C3C8  F0F0F3F3*
02E3E7E3  400005B0  40400038  40400001  7D00D228  7000D288  58F0D374
4110D1C8  05EF41E0  000415FE  4720D582  58EFD064  07FE1BFF  58E0D000
07FE58F0  D3841800  45E0F004  00000006  D4D3C3C8  F0F0F3F4*
02E3E7E3  400005E8  40400038  40400001  00000028  45E0F010  5800D1E8
5000D298  1BFF58E0  D00007FE  58A0D004  58E0A00C  58B0A018  5810B004
5820D298  50201000  18DA92FF  A00C982C  D4D3C3C8  F0F0F3F5*
02E3E7E3  40000620  40400034  40400001  A01C07FE  58701004  58207000
5020D298  58201000  41302000  41500001  1B255C40  D2001B25  5020D364
5030D368  5030D088  47F0D3A0  40404040  D4D3C3C8  F0F0F3F6*
02E3E7E3  40000020  40400008  40400001  00000624  00000050  40404040
40404040  40404040  40404040  40404040  40404040  40404040  40404040
40404040  40404040  40404040  40404040  D4D3C3C8  F0F0F3F7*
02E3E7E3  40000050  40400004  40400001  00000600  40404040  40404040
40404040  40404040  40404040  40404040  40404040  40404040  40404040
40404040  40404040  40404040  40404040  D4D3C3C8  F0F0F3F8*
02D9D3C4  40404040  40400038  40404040  00090001  1C0003CC  000A0001
1C0003D0  000B0001  1C0003D4  000C0001  1C0003D8  00010001  0C0005E8

MEMBER NAME  MLCHAR
00010001  0C000020  00010001  0C000024  D4D3C3C8  F0F0F3F9*
02E3E7E3  4000009C  4040001C  40400001  00000486  000005DA  000004B2
000005DA  0000052A  000005DA  000005D2  40404040  40404040  40404040
40404040  40404040  40404040  40404040  D4D3C3C8  F0F0F4F0**
02D9D3C4  40404040  40400038  40404040  00010001  0C000050  00010001
0C00009C  00010001  0C0000A0  00010001  0C0000A4  00010001  0C0000A8
00010001  0C0000AC  00010001  0C0000B0  D4D3C3C8  F0F0F4F1*
02E3E7E3  400000B8  40400008  40400001  000005D2  00000248  40404040
40404040  40404040  40404040  40404040  40404040  40404040  40404040
40404040  40404040  40404040  40404040  D4D3C3C8  F0F0F4F2*
02E3E7E3  400000C4  40400014  40400001  80000014  80000398  80000384
000002F0  00000240  40404040  40404040  40404040  40404040  40404040
40404040  40404040  40404040  40404040  D4D3C3C8  F0F0F4F3*
02D9D3C4  40404040  40400038  40404040  00010001  0C0000B4  00010001
0C0000B8  00010001  0C0000BC  00020001  0C0000C4  00010001  0C0000C8
00010001  0C0000CC  00010001  0C0000D0  D4D3C3C8  F0F0F4F4*
02E3E7E3  400000DC  4040001C  40400001  00000250  800002E8  000002E4
000002D4  00000238  00000258  00000260  40404040  40404040  40404040
40404040  40404040  40404040  40404040  D4D3C3C8  F0F0F4F5*
02D9D3C4  40404040  40400038  40404040  00010001  0C0000D4  00010001
0C0000DC  00010001  0C0000E0  00010001  0C0000E4  00010001  0C0000E8
00010001  0C0000EC  00010001  0C0000F0  D4D3C3C8  F0F0F4F6*
02E3E7E3  400000F8  4040001C  40400001  0000025C  00000328  00000238
00000238  00000238  00000238  0000023C  40404040  40404040  40404040
40404040  40404040  40404040  40404040  D4D3C3C8  F0F0F4F7*
02D9D3C4  40404040  40400038  40404040  00010001  0C0000F4  00010001
0C0000F8  00010001  0C0000FC  00010001  0C000100  00010001  0C000104
00010001  0C000108  00010001  0C00010C  D4D3C3C8  F0F0F4F8*
```

| | | | | | | |
|---|---|---|---|---|---|---|
| 02E3E7E3 | 40000114 | 4040001C | 40400001 | 00000244 | 00000238 | 00000238 |
| 00000260 | 00000268 | 80000238 | 000002E4 | 40404040 | 40404040 | 40404040 |
| 40404040 | 40404040 | 40404040 | 40404040 | D4D3C3C8 | F0F0F4F9* | |
| 02D9D3C4 | 40404040 | 40400038 | 40404040 | 00010001 | 0C000110 | 00010001 |
| 0C000114 | 00010001 | 0C000118 | 00010001 | 0C00011C | 00010001 | 0C000120 |
| 00010001 | 0C000124 | 00010001 | 0C000128 | D4D3C3C8 | F0F0F5F0** | |
| 02E3E7E3 | 40000130 | 4040001C | 40400001 | 000002D4 | 00000238 | 0000024C |
| 00000260 | 0000025C | 00000310 | 00000238 | 40404040 | 40404040 | 40404040 |
| 40404040 | 40404040 | 40404040 | 40404040 | D4D3C3C8 | F0F0F5F1* | |
| 02D9D3C4 | 40404040 | 40400038 | 40404040 | 00010001 | 0C00012C | 00010001 |
| 0C000130 | 00010001 | 0C000134 | 00010001 | 0C000138 | 00010001 | 0C00013C |
| 00010001 | 0C000140 | 00010001 | 0C000144 | D4D3C3C8 | F0F0F5F2* | |
| 02E3E7E3 | 4000014C | 4040001C | 40400001 | 00000238 | 00000238 | 00000238 |
| 0000023C | 00000244 | 00000238 | 00000238 | 40404040 | 40404040 | 40404040 |
| 40404040 | 40404040 | 40404040 | 40404040 | D4D3C3C8 | F0F0F5F3* | |
| 02D9D3C4 | 40404040 | 40400038 | 40404040 | 00010001 | 0C000148 | 00010001 |
| 0C00014C | 00010001 | 0C000150 | 00010001 | 0C000154 | 00010001 | 0C000158 |
| 00010001 | 0C00015C | 00010001 | 0C000160 | D4D3C3C8 | F0F0F5F4* | |
| 02E3E7E3 | 40000168 | 4040001C | 40400001 | 00000260 | 00000268 | 80000238 |
| 000002BC | 000002D0 | 000002C0 | 800002D0 | 40404040 | 40404040 | 40404040 |
| 40404040 | 40404040 | 40404040 | 40404040 | D4D3C3C8 | F0F0F5F5* | |
| 02D9D3C4 | 40404040 | 40400038 | 40404040 | 00010001 | 0C000164 | 00010001 |
| 0C000168 | 00010001 | 0C00016C | 00010001 | 0C000170 | 00010001 | 0C000174 |
| 00010001 | 0C000178 | 00010001 | 0C00017C | D4D3C3C8 | F0F0F5F6* | |
| 02E3E7E3 | 40000188 | 4040001C | 40400001 | 80000250 | 000002E4 | 000002D4 |
| 00000238 | 000002DC | 00000260 | 0000025C | 40404040 | 40404040 | 40404040 |
| 40404040 | 40404040 | 40404040 | 40404040 | D4D3C3C8 | F0F0F5F7* | |
| 02D9D3C4 | 40404040 | 40400038 | 40404040 | 00010001 | 0C000180 | 00010001 |
| 0C000188 | 00010001 | 0C00018C | 00010001 | 0C000190 | 00010001 | 0C000194 |
| 00010001 | 0C000198 | 00010001 | 0C00019C | D4D3C3C8 | F0F0F5F8* | |

MEMBER NAME MLCHAR

| | | | | | | |
|---|---|---|---|---|---|---|
| 02E3E7E3 | 400001A8 | 4040001C | 40400001 | 00000238 | 00000238 | 00000238 |
| 00000238 | 0000023C | 00000244 | 00000238 | 40404040 | 40404040 | 40404040 |
| 40404040 | 40404040 | 40404040 | 40404040 | D4D3C3C8 | F0F0F5F9* | |
| 02D9D3C4 | 40404040 | 40400038 | 40404040 | 00010001 | 0C0001A0 | 00010001 |
| 0C0001A8 | 00010001 | 0C0001AC | 00010001 | 0C0001B0 | 00010001 | 0C0001B4 |
| 00010001 | 0C0001B8 | 00010001 | 0C0001BC | D4D3C3C8 | F0F0F6F0** | |
| 02E3E7E3 | 400001C4 | 4040001C | 40400001 | 00000238 | 00000260 | 00000268 |
| 80000238 | 000002BC | 000002CC | 000002BC | 40404040 | 40404040 | 40404040 |
| 40404040 | 40404040 | 40404040 | 40404040 | D4D3C3C8 | F0F0F6F1* | |
| 02D9D3C4 | 40404040 | 40400038 | 40404040 | 00010001 | 0C0001C0 | 00010001 |
| 0C0001C4 | 00010001 | 0C0001C8 | 00010001 | 0C0001CC | 00010001 | 0C0001D0 |
| 00010001 | 0C0001D4 | 00010001 | 0C0001D8 | D4D3C3C8 | F0F0F6F2* | |
| 02E3E7E3 | 400001E0 | 4040001C | 40400001 | 800002D0 | 000002C4 | 000002CC |
| 000002C4 | 800002D0 | 000002C8 | 000002CC | 40404040 | 40404040 | 40404040 |
| 40404040 | 40404040 | 40404040 | 40404040 | D4D3C3C8 | F0F0F6F3* | |
| 02D9D3C4 | 40404040 | 40400038 | 40404040 | 00010001 | 0C0001DC | 00010001 |
| 0C0001E0 | 00010001 | 0C0001E4 | 00010001 | 0C0001E8 | 00010001 | 0C0001EC |
| 00010001 | 0C0001F0 | 00010001 | 0C0001F4 | D4D3C3C8 | F0F0F6F4* | |
| 02E3E7E3 | 400001FC | 4040001C | 40400001 | 000002C8 | 800002D0 | 000002C0 |
| 000002CC | 000002C0 | 800002D0 | 800003E8 | 40404040 | 40404040 | 40404040 |
| 40404040 | 40404040 | 40404040 | 40404040 | D4D3C3C8 | F0F0F6F5* | |
| 02D9D3C4 | 40404040 | 40400038 | 40404040 | 00010001 | 0C0001F8 | 00010001 |
| 0C0001FC | 00010001 | 0C000200 | 00010001 | 0C000204 | 00010001 | 0C000208 |
| 00010001 | 0C00020C | 00010001 | 0C000210 | D4D3C3C8 | F0F0F6F6* | |
| 02E3E7E3 | 40000218 | 4040001C | 40400001 | 0000029C | 000002A4 | 000002D8 |
| 00000270 | 00000270 | 00000264 | 000002AC | 40404040 | 40404040 | 40404040 |
| 40404040 | 40404040 | 40404040 | 40404040 | D4D3C3C8 | F0F0F6F7* | |
| 02D9D3C4 | 40404040 | 40400038 | 40404040 | 00010001 | 0C000214 | 00010001 |
| 0C000218 | 00010001 | 0C00021C | 00010001 | 0C000220 | 00010001 | 0C000224 |

```
00010001  0C000228  00010001  0C00022C  D4D3C3C8  F0F0F6F8*
02E3E7E3  40000234  40400004  40400001  800002E0  40404040  40404040
40404040  40404040  40404040  40404040  40404040  40404040  40404040
40404040  40404040  40404040  40404040  D4D3C3C8  F0F0F6F9*
02E3E7E3  400003DC  40400014  40400001  00000000  00000000  0000002B
00000000  00000000  40404040  40404040  40404040  40404040  40404040
40404040  40404040  40404040  40404040  D4D3C3C8  F0F0F7F0**
02D9D3C4  40404040  40400010  40404040  00010001  0C000230  00010001
0C000234  40404040  40404040  40404040  40404040  40404040  40404040
40404040  40404040  40404040  40404040  D4D3C3C8  F0F0F7F1*
02C5D5C4  40404040  40404040  40404040  40404040  40404040  40404040
00000654  F1F5F7F3  F460C6D6  F34040F0  F2F0F2F8  F7F0F9F8  40F0F84B
F4F04BF3  F8404040  D4D3C3C8  C1D94040  D4D3C3C8  F0F0F7F2**

MEMBER NAME  MODFUL
02C5E2C4  40404040  40400010  40400001  C3C1C4C6  E4D34040  00000000
40000000  40404040  40404040  40404040  40404040  40404040  40404040
40404040  40404040  40404040  40404040  C3C1C4C6  F0F0F0F1*
02E3E7E3  40000000  40400038  40400001  47F0F00C  07C3C1C4  C6E4D340
90ECD00C  9823F024  184D58D0  F02C9034  D00050D0  400807F2  40404040
40404040  40404040  021A2C40  D4C5E2E2  C3C1C4C6  F0F0F0F2*
02E3E7E3  40000038  40400038  40400001  C1C7C540  7E7E6E40  D4D6C4C5
D340C6E4  D3D340E2  E3C1D9E3  C9D5C740  C140D5C5  E640D4D6  C4C5D322
02100222  02060214  0122021A  15D9C5E3  C3C1C4C6  F0F0F0F3*
02E3E7E3  40000070  40400021  40400001  D9C9E5C5  40C6C9D3  C540C5D9
D9D6D940  7E401003  1A0A40C9  D540D4D6  C4C6E4D3  22404040  40404040
40404040  40404040  40404040  40404040  C3C1C4C6  F0F0F0F4*
02E3E7E3  40000098  40400008  40400001  F0404040  40404040  40404040
40404040  40404040  40404040  40404040  40404040  40404040  40404040
40404040  40404040  40404040  40404040  C3C1C4C6  F0F0F0F5*
02C5E2C4  40404040  40400010  40400002  D4D6C4C9  D5C34040  05000000
40000024  40404040  40404040  40404040  40404040  40404040  40404040
40404040  40404040  40404040  40404040  C3C1C4C6  F0F0F0F6*
02E3E7E3  40000138  40400024  40400001  00000001  00000002  00000004
00000008  0000000A  00000013  00000014  00000000  00000000  40404040
40404040  40404040  40404040  40404040  C3C1C4C6  F0F0F0F7*
02C5E2C4  40404040  40400010  40400003  D6D7E3C9  D6D54040  05000000
40000020  40404040  40404040  40404040  40404040  40404040  40404040
40404040  40404040  40404040  40404040  C3C1C4C6  F0F0F0F8*
02C5E2C4  40404040  40400010  40400004  C3C1C4E2  E3404040  02000000
40000000  40404040  40404040  40404040  40404040  40404040  40404040
40404040  40404040  40404040  40404040  C3C1C4C6  F0F0F0F9*
02C5E2C4  40404040  40400010  40400005  D4E5C3C8  D9404040  02000000
40000000  40404040  40404040  40404040  40404040  40404040  40404040
40404040  40404040  40404040  40404040  C3C1C4C6  F0F0F1F0**
02C5E2C4  40404040  40400010  40400006  C3C1C4C6  C9D34040  02000000
40000000  40404040  40404040  40404040  40404040  40404040  40404040
40404040  40404040  40404040  40404040  C3C1C4C6  F0F0F1F1*
02C5E2C4  40404040  40400010  40400007  C9C2C3D6  D47B4040  02000000
40000000  40404040  40404040  40404040  40404040  40404040  40404040
40404040  40404040  40404040  40404040  C3C1C4C6  F0F0F1F2*
02E3E7E3  40000198  40400038  40400001  FFFFFFFF  00000000  00000000
00000000  00000000  00000000  5890D0F8  58B0D0B4  58F0D10C  45E0F004
00000006  00000030  45E0F010  58A0D0A0  C3C1C4C6  F0F0F1F3*
02E3E7E3  400001D0  40400038  40400001  58F0D0FC  5800F008  860BD146
58F0D108  4110D04C  05EF59A0  D0D04780  D1305800  D0D05900  D0984770
D1FA5800  90215A00  D0985000  902158F0  C3C1C4C6  F0F0F1F4*
02E3E7E3  40000208  4040002C  40400001  D1044110  D05805EF  58F0D104
4110D064  05EF58F0  D1044110  D07005EF  58F0D10C  45E0F004  00000000
00000060  40404040  40404040  40404040  C3C1C4C6  F0F0F1F5*
```

```
02D9D3C4 40404040 40400038 40404040 00020001 0C000198 00030001
0C00019C 00040001 1C0001A0 00050001 1C0001A4 00060001 1C0001A8
00070001 1C0001AC 00010001 0C0001C4 C3C1C4C6 F0F0F1F6*
02E3E7E3 40000234 40400038 40400001 45E0F008 04509021 45E0F010
58F0D10C 45E0F000 00000000 00000064 45E0F134 00010000 0120D0E6
01000002 00000001 45E0F010 58009021 C3C1C4C6 F0F0F1F7*
02E3E7E3 4000026C 40400038 40400001 5900D0A8 47A0D1E6 4100D0E6
5000D080 58F0D104 4110D07C 05EF58F0 D1004110 D08805EF 41F00004
58E0D000 07FE58F0 D10C1800 45E0F004 C3C1C4C6 F0F0F1F8*
02C5E2C4 40404040 40400010 40404040 D4D6C4C6 E4D34040 010002DC
40000001 40404040 40404040 40404040 40404040 40404040 40404040
40404040 40404040 40404040 40404040 C3C1C4C6 F0F0F1F9*
02E3E7E3 400002A4 40400038 40400001 00000006 0000006A 45E0F008

MEMBER NAME  MODFUL
0450D0D0 45E0F010 58F0D10C 45E0F034 05404040 F1F058D0 D00458E0
D00C92FF D00C982C D01C07FE 47F0D110 C3C1C4C6 F0F0F2F0**
02E3E7E3 400002DC 40400020 40400001 47F0F00C 07D4D6C4 C6E4D340
90ECD00C 9823F020 58F0F01C 47F0F014 00000000 40404040 40404040
40404040 40404040 40404040 40404040 C3C1C4C6 F0F0F2F1*
02E3E7E3 40000300 40400016 40400001 00000304 58D0D004 58E0D00C
92FFD00C 982CD01C 07FE4040 40404040 40404040 40404040 40404040
40404040 40404040 40404040 40404040 C3C1C4C6 F0F0F2F2*
02E3E7E3 400002FC 40400004 40400001 00000316 40404040 40404040
40404040 40404040 40404040 40404040 40404040 40404040 40404040
40404040 40404040 40404040 40404040 C3C1C4C6 F0F0F2F3*
02E3E7E3 40000316 40400004 40400001 47F0D110 40404040 40404040
40404040 40404040 40404040 40404040 40404040 40404040 40404040
40404040 40404040 40404040 40404040 C3C1C4C6 F0F0F2F4*
02E3E7E3 40000024 40400004 40400001 000002D8 40404040 40404040
40404040 40404040 40404040 40404040 40404040 40404040 40404040
40404040 40404040 40404040 40404040 C3C1C4C6 F0F0F2F5*
02E3E7E3 4000002C 40400004 40400001 000000A0 40404040 40404040
40404040 40404040 40404040 40404040 40404040 40404040 40404040
40404040 40404040 40404040 40404040 C3C1C4C6 F0F0F2F6*
02D9D3C4 40404040 40400038 40404040 00010001 0C000230 00010001
0C00024C 00010001 0C0002A8 00010001 0C0002F8 00010001 0C000300
00010001 0C0002FC 00010001 0C000024 C3C1C4C6 F0F0F2F7*
02E3E7E3 40000028 40400004 40400001 000002C6 40404040 40404040
40404040 40404040 40404040 40404040 40404040 40404040 40404040
40404040 40404040 40404040 40404040 C3C1C4C6 F0F0F2F8*
02E3E7E3 400000EC 40400018 40400001 0000013C 00000170 80000168
00000144 00000188 80000014 40404040 40404040 40404040 40404040
40404040 40404040 40404040 40404040 C3C1C4C6 F0F0F2F9*
02D9D3C4 40404040 40400038 40404040 00010001 0C00002C 00010001
0C000028 00010001 0C0000EC 00010001 0C0000F0 00010001 0C0000F4
00010001 0C0000F8 00010001 0C0000FC C3C1C4C6 F0F0F3F0**
02E3E7E3 40000104 4040001C 40400001 00000150 00000174 80000000
00000140 00000160 8000001C 00000138 40404040 40404040 40404040
40404040 40404040 40404040 40404040 C3C1C4C6 F0F0F3F1*
02D9D3C4 40404040 40400038 40404040 00020001 0C000100 00010001
0C000104 00010001 0C000108 00020001 0C00010C 00010001 0C000110
00010001 0C000114 00020001 0C000118 C3C1C4C6 F0F0F3F2*
02E3E7E3 40000124 40400010 40400001 80000098 00000174 00000188
80000160 40404040 40404040 40404040 40404040 40404040 40404040
40404040 40404040 40404040 40404040 C3C1C4C6 F0F0F3F3*
02D9D3C4 40404040 40400028 40404040 00010001 0C00011C 00010001
0C000124 00010001 0C000128 00010001 0C00012C 00010001 0C000130
40404040 40404040 40404040 40404040 C3C1C4C6 F0F0F3F4*
02C5D5C4 40404040 40404040 40404040 40404040 40404040 40404040
```

```
0000031A  F1F5F7F3  F460C6D6  F34040F0  F2F0F2F8  F7F0F9F8  40F0F84B
F4F04BF4  F3404040  C3C1C4C6  E4D34040  C3C1C4C6  F0F0F3F5**

MEMBER NAME  MODSRT
02C5E2C4  40404040  40400010  40400001  D4D6C4E2  D9E34040  00000000
40000000  40404040  40404040  40404040  40404040  40404040  40404040
40404040  40404040  40404040  40404040  D4D6C4E2  F0F0F0F1*
02E3E7E3  40000000  40400038  40400001  47F0F00C  07D4D6C4  E2D9E340
90ECD00C  184D98CD  F0205040  D00450D0  400807FC  40404040  40404040
021A2440  C3C1D3D3  40E3D640  D4D6C4E2  D4D6C4E2  F0F0F0F2*
02E3E7E3  40000038  40400038  40400001  D9E340E6  C9E3C840  C9D4D7D9
D6D7C5D9  40D6D7E3  C9D6D522  02060A14  011A04C9  D5C6D606  04140110
02220206  14140122  02060A14  011A04C5  D4D6C4E2  F0F0F0F3*
02E3E7E3  40000070  40400038  40400001  D9D6D906  06140122  02061414
01220206  0A14011A  04D7D9C3  C5060414  01100222  02061414  01220206
0A14011A  04D3E8E4  D7060414  01100222  D4D6C4E2  F0F0F0F4*
02E3E7E3  400000A8  40400038  40400001  02061414  01220206  0A14011A
01E21003  10021A02  F0F10602  14012202  06141401  2202060A  14011A05
E2C5D8F0  60100306  02140122  02061414  D4D6C4E2  F0F0F0F5*
02E3E7E3  400000E0  4040002E  40400001  01220206  0A14011A  04E2E3C3
D2100310  03220206  14140122  02060A14  011A04E2  E3D9E210  03100322
02061414  01224040  40404040  40404040  D4D6C4E2  F0F0F0F6*
02E3E7E3  40000110  40400030  40400001  F0404040  40404040  F0404040
40404040  F0404040  40404040  F0404040  40404040  F0404040  40404040
F0404040  40404040  40404040  40404040  D4D6C4E2  F0F0F0F7*
02C5E2C4  40404040  40400010  40400002  D9D4D6C4  C5D34040  05000000
40000018  40404040  40404040  40404040  40404040  40404040  40404040
40404040  40404040  40404040  40404040  D4D6C4E2  F0F0F0F8*
02E3E7E3  400001F8  4040002C  40400001  00000001  0000000A  0000000C
0000000D  0000000F  00000012  00000013  00000014  00000064  00000000
00000000  40404040  40404040  40404040  D4D6C4E2  F0F0F0F9*
02C5E2C4  40404040  40400010  40400003  D4E5C3C8  D9404040  02000000
40000000  40404040  40404040  40404040  40404040  40404040  40404040
40404040  40404040  40404040  40404040  D4D6C4E2  F0F0F1F0**
02E3E7E3  40000250  40400008  40400001  FFFFFFFF  00000000  40404040
40404040  40404040  40404040  40404040  40404040  40404040  40404040
40404040  40404040  40404040  40404040  D4D6C4E2  F0F0F1F1*
02C5E2C4  40404040  40400010  40400004  C9C2C3D6  D47B4040  02000000
40000000  40404040  40404040  40404040  40404040  40404040  40404040
40404040  40404040  40404040  40404040  D4D6C4E2  F0F0F1F2*
02E3E7E3  4000025C  40400008  40400001  00000000  00000000  40404040
40404040  40404040  40404040  40404040  40404040  40404040  40404040
40404040  40404040  40404040  40404040  D4D6C4E2  F0F0F1F3*
02E3E7E3  40000268  40400038  40400001  00000000  5880D114  58A0D110
58B0D120  5890D0BC  5870D0E8  5860D0D8  58F0D0F0  41E00008  15FE4720
D15C89F0  000258EF  D04C07FE  58F0D128  D4D6C4E2  F0F0F1F4*
02E3E7E3  400002A0  40400038  40400001  45E0F004  00000006  00000028
45E0F010  58F0D128  45E0F034  05404040  F1F558F0  D1281800  45E0F004
00000000  00000050  45E0F134  00010000  D4D6C4E2  F0F0F1F5*
02E3E7E3  400002D8  40400038  40400001  0120A001  0100000A  00000001
45E0F134  00010000  0120A00F  01000004  00000001  45E0F008  0450D0EC
45E0F010  58F0D128  45E0F000  00000000  D4D6C4E2  F0F0F1F6*
02E3E7E3  40000310  40400038  40400001  00000062  45E0F134  00010000
0120B001  01000014  00000001  45E0F010  5990D0EC  47C0D206  4100B013
5000D074  58F0D11C  4110D070  05EF1BFF  D4D6C4E2  F0F0F1F7*
02E3E7E3  40000348  40400038  40400001  58E0D000  07FE58F0  D1281800
45E0F004  00000000  00000068  45E0F134  00010000  0120A001  0100000A
00000001  45E0F134  00010000  0120A00F  D4D6C4E2  F0F0F1F8*
02E3E7E3  40000380  4040001C  40400001  01000006  00000001  45E0F010
58F0D128  45E0F000  00000000  00000078  40404040  40404040  40404040
```

| | | | | | | |
|---|---|---|---|---|---|---|
| 40404040 | 40404040 | 40404040 | 40404040 | D4D6C4E2 | F0F0F1F9* | |
| 02D9D3C4 | 40404040 | 40400038 | 40404040 | 00020001 | 0C000250 | 00030001 |

MEMBER NAME MODSRT

| | | | | | | |
|---|---|---|---|---|---|---|
| 1C00025C | 00040001 | 1C000268 | 00010001 | 0C0002A8 | 00010001 | 0C0002CC |
| 00010001 | 0C000310 | 00010001 | 0C00035C | D4D6C4E2 | F0F0F2F0** | |
| 02E3E7E3 | 4000039C | 40400038 | 40400001 | 45E0F134 | 00010000 | 0120B001 |
| 01000014 | 00000001 | 45E0F010 | 1BFF58E0 | D00007FE | 58F0D128 | 45E0F004 |
| 00000000 | 0000007E | 45E0F134 | 00010000 | D4D6C4E2 | F0F0F2F1* | |
| 02E3E7E3 | 400003D4 | 40400038 | 40400001 | 0120A001 | 0100000A | 00000001 |
| 45E0F134 | 00010000 | 0120A00F | 01000004 | 00000001 | 45E0F008 | 0450D0EC |
| 45E0F010 | 58F0D128 | 45E0F000 | 00000000 | D4D6C4E2 | F0F0F2F2* | |
| 02E3E7E3 | 4000040C | 40400038 | 40400001 | 00000090 | 45E0F134 | 00010000 |
| 0120B001 | 01000014 | 00000001 | 45E0F010 | 197947A0 | D3004100 | B0135000 |
| D08058F0 | D11C4110 | D07C05EF | 1BFF58E0 | D4D6C4E2 | F0F0F2F3* | |
| 02E3E7E3 | 40000444 | 40400038 | 40400001 | D00007FE | 58F0D128 | 45E0F004 |
| 00000000 | 00000096 | 45E0F134 | 00010000 | 0120A001 | 0100000A | 00000001 |
| 45E0F134 | 00010000 | 0120A00F | 01000004 | D4D6C4E2 | F0F0F2F4* | |
| 02E3E7E3 | 4000047C | 40400038 | 40400001 | 00000001 | 45E0F008 | 0450D0EC |
| 45E0F010 | 58F0D128 | 45E0F000 | 00000000 | 000000A8 | 45E0F134 | 00010000 |
| 0120B001 | 01000014 | 00000001 | 45E0F010 | D4D6C4E2 | F0F0F2F5* | |
| 02E3E7E3 | 400004B4 | 40400038 | 40400001 | 5990D0EC | 47C0D38E | 4100B013 |
| 5000D08C | 58F0D11C | 4110D088 | 05EF1BFF | 58E0D000 | 07FE58F0 | D1281800 |
| 45E0F004 | 00000000 | 000000AE | 45E0F134 | D4D6C4E2 | F0F0F2F6* | |
| 02E3E7E3 | 400004EC | 40400030 | 40400001 | 00010000 | 0120A001 | 0100000A |
| 00000001 | 45E0F008 | 0450D0FC | 45E0F008 | 0450D100 | 180005E0 | 5800D118 |
| 5000E00C | 45E0F00C | 40404040 | 40404040 | D4D6C4E2 | F0F0F2F7* | |
| 02E3E7E3 | 40000520 | 40400028 | 40400001 | 01200002 | 45E0F010 | 58F0D128 |
| 45E0F000 | 00000000 | 000000C3 | 180005E0 | 5800D124 | 5000E00C | 45E0F00C |
| 40404040 | 40404040 | 40404040 | 40404040 | D4D6C4E2 | F0F0F2F8* | |
| 02E3E7E3 | 4000054C | 40400038 | 40400001 | 01200014 | 45E0F010 | 5960D0FC |
| 47C0D42E | 4100B00C | 5000D098 | 58F0D11C | 4110D094 | 05EF5990 | D0FC47C0 |
| D4484100 | B00D5000 | D0A458F0 | D11C4110 | D4D6C4E2 | F0F0F2F9* | |
| 02E3E7E3 | 40000584 | 40400038 | 40400001 | D0A005EF | 5990D100 | 47C0D462 |
| 4100B00F | 5000D0B0 | 58F0D11C | 4110D0AC | 05EF1BFF | 58E0D000 | 07FE58F0 |
| D1281800 | 45E0F004 | 00000000 | 000000C9 | D4D6C4E2 | F0F0F3F0** | |
| 02D9D3C4 | 40404040 | 40400038 | 40404040 | 00010001 | 0C000398 | 00010001 |
| 0C0003C8 | 00010001 | 0C00040C | 00010001 | 0C000454 | 00010001 | 0C000498 |
| 00010001 | 0C0004E4 | 00010001 | 0C000534 | D4D6C4E2 | F0F0F3F1* | |
| 02E3E7E3 | 400005BC | 40400038 | 40400001 | 45E0F134 | 00010000 | 0120A001 |
| 0100000A | 00000001 | 45E0F008 | 0450D0F8 | 45E0F134 | 00010000 | 0120A013 |
| 01000002 | 00000001 | 45E0F010 | 58F0D128 | D4D6C4E2 | F0F0F3F2* | |
| 02E3E7E3 | 400005F4 | 4040001C | 40400001 | 45E0F000 | 00000000 | 000000DC |
| 180005E0 | 5800D124 | 5000E00C | 45E0F00C | 40404040 | 40404040 | 40404040 |
| 40404040 | 40404040 | 40404040 | 40404040 | D4D6C4E2 | F0F0F3F3* | |
| 02E3E7E3 | 40000614 | 40400038 | 40400001 | 01200014 | 45E0F010 | 1BFF58E0 |
| D00007FE | 58F0D128 | 45E0F004 | 00000000 | 000000E2 | 45E0F134 | 00010000 |
| 0120A001 | 0100000A | 00000001 | 45E0F008 | D4D6C4E2 | F0F0F3F4* | |
| 02E3E7E3 | 4000064C | 40400038 | 40400001 | 0450D0F8 | 45E0F008 | 0450D0EC |
| 45E0F010 | 58F0D128 | 45E0F000 | 00000000 | 000000F2 | 45E0F134 | 00010000 |
| 0120B001 | 01000014 | 00000001 | 45E0F010 | D4D6C4E2 | F0F0F3F5* | |
| 02E3E7E3 | 40000684 | 40400038 | 40400001 | 1BFF58E0 | D00007FE | 58F0D128 |
| 45E0F004 | 00000000 | 000000F8 | 45E0F134 | 00010000 | 0120A001 | 0100000A |
| 00000001 | 45E0F008 | 0450D0F8 | 45E0F008 | D4D6C4E2 | F0F0F3F6* | |
| 02E3E7E3 | 400006BC | 40400038 | 40400001 | 0450D0EC | 45E0F010 | 58F0D128 |
| 45E0F000 | 00000000 | 00000108 | 45E0F134 | 00010000 | 0120B001 | 01000014 |
| 00000001 | 45E0F010 | 1BFF58E0 | D00007FE | D4D6C4E2 | F0F0F3F7* | |
| 02E3E7E3 | 400006F4 | 40400038 | 40400001 | 58D0D004 | 58E0D00C | 92FFD00C |
| 982CD01C | 07FE987B | 10005820 | 70005020 | D0F05820 | 80005020 | D0EC5820 |
| 90005020 | D0F85820 | A0005020 | D0F45820 | D4D6C4E2 | F0F0F3F8* | |

```
02E3E7E3  4000072C  40400038  40400001  B0005020  D0FC9879  10145820
70005020  D1005820  10184130  20004150  00011B25  5020D114  5030D118

MEMBER NAME  MODSRT
5820101C  41302000  41500001  1B255020  D4D6C4E2  F0F0F3F9*
02E3E7E3  40000764  4040000A  40400001  D1205030  D12447F0  D12C4040
40404040  40404040  40404040  40404040  40404040  40404040  40404040
40404040  40404040  40404040  40404040  D4D6C4E2  F0F0F4F0**
02E3E7E3  40000020  40400008  40400001  00000706  00000140  40404040
40404040  40404040  40404040  40404040  40404040  40404040  40404040
40404040  40404040  40404040  40404040  D4D6C4E2  F0F0F4F1*
02D9D3C4  40404040  40400038  40404040  00010001  0C0005B8  00010001
0C0005FC  00010001  0C000630  00010001  0C000668  00010001  0C000698
00010001  0C0006D0  00010001  0C000020  D4D6C4E2  F0F0F4F2*
02E3E7E3  40000140  40400004  40400001  000006F4  40404040  40404040
40404040  40404040  40404040  40404040  40404040  40404040  40404040
40404040  40404040  40404040  40404040  D4D6C4E2  F0F0F4F3*
02E3E7E3  4000018C  40400018  40400001  0000029C  000002BE  0000034E
000003BC  00000448  000004D6  40404040  40404040  40404040  40404040
40404040  40404040  40404040  40404040  D4D6C4E2  F0F0F4F4*
02D9D3C4  40404040  40400038  40404040  00010001  0C000024  00010001
0C000140  00010001  0C00018C  00010001  0C000190  00010001  0C000194
00010001  0C000198  00010001  0C00019C  D4D6C4E2  F0F0F4F5*
02E3E7E3  400001A4  40400010  40400001  000005AA  00000624  0000068C
000001F8  40404040  40404040  40404040  40404040  40404040  40404040
40404040  40404040  40404040  40404040  D4D6C4E2  F0F0F4F6*
02E3E7E3  400001B8  40400008  40400001  80000138  000001F8  40404040
40404040  40404040  40404040  40404040  40404040  40404040  40404040
40404040  40404040  40404040  40404040  D4D6C4E2  F0F0F4F7*
02E3E7E3  400001C4  40400004  40400001  80000130  40404040  40404040
40404040  40404040  40404040  40404040  40404040  40404040  40404040
40404040  40404040  40404040  40404040  D4D6C4E2  F0F0F4F8*
02D9D3C4  40404040  40400038  40404040  00010001  0C0001A0  00010001
0C0001A4  00010001  0C0001A8  00010001  0C0001AC  00010001  0C0001B0
00010001  0C0001B8  00010001  0C0001BC  D4D6C4E2  F0F0F4F9*
02E3E7E3  400001C8  40400004  40400001  000001F8  40404040  40404040
40404040  40404040  40404040  40404040  40404040  40404040  40404040
40404040  40404040  40404040  40404040  D4D6C4E2  F0F0F5F0**
02E3E7E3  400001D0  40400008  40400001  80000128  000001F8  40404040
40404040  40404040  40404040  40404040  40404040  40404040  40404040
40404040  40404040  40404040  40404040  D4D6C4E2  F0F0F5F1*
02E3E7E3  400001DC  40400008  40400001  80000120  000001F8  40404040
40404040  40404040  40404040  40404040  40404040  40404040  40404040
40404040  40404040  40404040  40404040  D4D6C4E2  F0F0F5F2*
02E3E7E3  400001E8  40400008  40400001  80000118  000001F8  40404040
40404040  40404040  40404040  40404040  40404040  40404040  40404040
40404040  40404040  40404040  40404040  D4D6C4E2  F0F0F5F3*
02D9D3C4  40404040  40400038  40404040  00010001  0C0001C4  00010001
0C0001C8  00010001  0C0001D0  00010001  0C0001D4  00010001  0C0001DC
00010001  0C0001E0  00010001  0C0001E8  D4D6C4E2  F0F0F5F4*
02E3E7E3  400001F4  40400004  40400001  80000110  40404040  40404040
40404040  40404040  40404040  40404040  40404040  40404040  40404040
40404040  40404040  40404040  40404040  D4D6C4E2  F0F0F5F5*
02D9D3C4  40404040  40400010  40404040  00010001  0C0001EC  00010001
0C0001F4  40404040  40404040  40404040  40404040  40404040  40404040
40404040  40404040  40404040  40404040  D4D6C4E2  F0F0F5F6*
02C5D5C4  40404040  40404040  40404040  40404040  40404040  40404040
0000076E  F1F5F7F3  F460C6D6  F34040F0  F2F0F2F8  F7F0F9F8  40F0F84B
F4F04BF4  F7404040  D4D6C4E2  D9E34040  D4D6C4E2  F0F0F5F7**
```

MEMBER NAME NCARD

| | | | | | | |
|---|---|---|---|---|---|---|
| 02C5E2C4 | 40404040 | 40400010 | 40400001 | D5C3C1D9 | C4404040 | 00000000 |
| 40000000 | 40404040 | 40404040 | 40404040 | 40404040 | 40404040 | 40404040 |
| 40404040 | 40404040 | 40404040 | 40404040 | D5C3C1D9 | F0F0F0F1* | |
| 02E3E7E3 | 40000000 | 40400038 | 40400001 | 47F0F00C | 07D5C3C1 | D9C44040 |
| 90ECD00C | 184D98CD | F0205040 | D00450D0 | 400807FC | 40404040 | 40404040 |
| 021A08D7 | E2C8C5D3 | D3404006 | 0210080A | D5C3C1D9 | F0F0F0F2* | |
| 02E3E7E3 | 40000038 | 40400038 | 40400001 | 08041008 | 0A080110 | 080A0801 |
| 22021A08 | D7E2C8C5 | D3D34040 | 06021008 | 0A080410 | 080A0801 | 10080A08 |
| 0118081A | 024ED710 | 061E1A02 | 4ED71006 | D5C3C1D9 | F0F0F0F3* | |
| 02E3E7E3 | 40000070 | 40400005 | 40400001 | 18101008 | 22404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F0F4* | |
| 02E3E7E3 | 40000108 | 40400038 | 40400001 | 00000000 | 00000000 | 41133333 |
| 00000000 | 41C00000 | 00000000 | 00000000 | 00000000 | 00000001 | 00000002 |
| 00000003 | 00000004 | 00000018 | 41100000 | D5C3C1D9 | F0F0F0F5* | |
| 02E3E7E3 | 40000140 | 40400010 | 40400001 | 41133333 | 41C00000 | 00000000 |
| 00000000 | 40404040 | 40404040 | 40404040 | 40404040 | 40404040 | 40404040 |
| 40404040 | 40404040 | 40404040 | 40404040 | D5C3C1D9 | F0F0F0F6* | |
| 02E3E7E3 | 40000188 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F0F7* | |
| 02E3E7E3 | 40000190 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F0F8* | |
| 02E3E7E3 | 40000198 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F0F9* | |
| 02E3E7E3 | 400001A0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F0** | |
| 02E3E7E3 | 400001A8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F1* | |
| 02E3E7E3 | 400001B0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F2* | |
| 02E3E7E3 | 400001B8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F3* | |
| 02C5E2C4 | 40404040 | 40400010 | 40400002 | D4C1E3F2 | 40404040 | 02000000 |
| 40000000 | 40404040 | 40404040 | 40404040 | 40404040 | 40404040 | 40404040 |
| 40404040 | 40404040 | 40404040 | 40404040 | D5C3C1D9 | F0F0F1F4* | |
| 02E3E7E3 | 400001C0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F5* | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D5C3C1D9 | F0F0F1F6* | |
| 02E3E7E3 | 400001C8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D5C3C1D9 | F0F0F1F7* | |
| 02E3E7E3 | 400001FC | 40400038 | 40400001 | 5840D138 | 5850D120 | 5870D118 |
| 5880D110 | 5890D130 | 58A0D128 | 58B0D148 | 5860D178 | 7800D0C4 | 7000D0E8 |
| 5800B004 | 5900D0A8 | 41300001 | 4780D1BE | D5C3C1D9 | F0F0F1F8* | |
| 02E3E7E3 | 40000234 | 40400038 | 40400001 | 1B335800 | B0085900 | D0A84120 |
| 00014780 | D1D01B22 | 16231BFF | 872FD1E0 | 5800D0A8 | 5000B010 | 5800D0E4 |
| 12004770 | D1F25800 | D0A85000 | B0106800 | D5C3C1D9 | F0F0F1F9* | |
| 02E3E7E3 | 4000026C | 40400038 | 40400001 | D0986C00 | D1087000 | D0F86820 |

MEMBER NAME NCARD

| | | | | | | |
|---|---|---|---|---|---|---|
| D1082C22 | 6C20D108 | 6D20D0A0 | 7020D0E0 | 6820D108 | 2C227020 | D0EC5800 |
| B0101200 | 4780D2F8 | 5800B00C | 12004780 | D5C3C1D9 | F0F0F2F0** | |
| 02E3E7E3 | 400002A4 | 40400038 | 40400001 | D29458F0 | D1541800 | 45E0F004 |
| 0000000A | 00000045 | 45E0F008 | 0450D0F0 | 45E0F008 | 0450B004 | 45E0F008 |
| 0860D108 | 45E0F008 | 0450B008 | 45E0F008 | D5C3C1D9 | F0F0F2F1* | |
| 02E3E7E3 | 400002DC | 40400038 | 40400001 | 0470D0E8 | 45E0F008 | 0450B00C |
| 45E0F008 | 0470D0E8 | 45E0F008 | 0450D0F0 | 45E0F008 | 0450D0F0 | 45E0F008 |
| 0450B010 | 45E0F010 | 5800B00C | 12004770 | D5C3C1D9 | F0F0F2F2* | |
| 02E3E7E3 | 40000314 | 40400038 | 40400001 | D2F458F0 | D1541800 | 45E0F004 |
| 0000000A | 00000045 | 45E0F008 | 0450D0F0 | 45E0F008 | 0450B004 | 45E0F008 |
| 0860D108 | 45E0F008 | 0450B008 | 45E0F008 | D5C3C1D9 | F0F0F2F3* | |
| 02E3E7E3 | 4000034C | 40400038 | 40400001 | 0470D0E8 | 45E0F008 | 0450D0F0 |
| 45E0F008 | 0450D0F0 | 45E0F008 | 0450B010 | 45E0F010 | 47F0D3E8 | 5800B008 |
| 12004770 | D30A5800 | D0A85000 | B00C5800 | D5C3C1D9 | F0F0F2F4* | |
| 02E3E7E3 | 40000384 | 40400038 | 40400001 | B00C1200 | 4780D360 | 58F0D154 |
| 45E0F004 | 0000000A | 00000028 | 45E0F008 | 0450D0F0 | 45E0F008 | 0450B004 |
| 45E0F008 | 0860D108 | 45E0F008 | 0450B008 | D5C3C1D9 | F0F0F2F5* | |
| 02E3E7E3 | 400003BC | 40400038 | 40400001 | 45E0F008 | 0470D0E8 | 45E0F008 |
| 0450B00C | 45E0F008 | 0470D0E8 | 45E0F010 | 5800B00C | 12004770 | D3E85800 |
| B0081200 | 4770D3A0 | 58F0D154 | 45E0F004 | D5C3C1D9 | F0F0F2F6* | |
| 02E3E7E3 | 400003F4 | 40400038 | 40400001 | 0000000A | 00000028 | 45E0F008 |
| 0450D0F0 | 45E0F008 | 0450B004 | 45E0F008 | 0860D108 | 45E0F010 | 5800B008 |
| 12004780 | D3E858F0 | D1541800 | 45E0F004 | D5C3C1D9 | F0F0F2F7* | |
| 02E3E7E3 | 4000042C | 40400038 | 40400001 | 0000000A | 00000028 | 45E0F008 |
| 0450D0F0 | 45E0F008 | 0450B004 | 45E0F008 | 0860D108 | 45E0F008 | 0450B008 |
| 45E0F008 | 0470D0E8 | 45E0F010 | 5800B004 | D5C3C1D9 | F0F0F2F8* | |
| 02E3E7E3 | 40000464 | 40400038 | 40400001 | 12004780 | D4465840 | D1681856 |
| 5870D0C0 | 18B51AB4 | 18371A35 | 189318A7 | 68298000 | 6D20D108 | 60298000 |
| 879AD408 | 8756D3FC | 5840D138 | 5850D120 | D5C3C1D9 | F0F0F2F9* | |
| 02E3E7E3 | 4000049C | 40400038 | 40400001 | 5870D118 | 5890D130 | 58A0D128 |
| 58B0D148 | 4100B004 | 5000D04C | 58F0D150 | 4110D04C | 05EF5800 | B0081200 |
| 4780D4C2 | 2B227820 | D0E01856 | 5870D0C0 | D5C3C1D9 | F0F0F3F0** | |
| 02E3E7E3 | 400004D4 | 40400038 | 40400001 | 5890D168 | 6840D090 | 28625880 |
| D1205840 | D1306045 | 400018B5 | 1AB91837 | 1A351893 | 18A76829 | 80002D26 |
| 60298000 | 879AD47E | 5890D168 | 8756D46E | D5C3C1D9 | F0F0F3F1* | |
| 02E3E7E3 | 4000050C | 40400038 | 40400001 | 5840D138 | 5850D120 | 5870D118 |
| 5880D110 | 5890D130 | 58A0D128 | 58B0D148 | 4100B008 | 5000D05C | 58F0D150 |
| 4110D05C | 05EF5800 | B00C1200 | 4780D558 | D5C3C1D9 | F0F0F3F2* | |
| 02E3E7E3 | 40000544 | 40400038 | 40400001 | 6800D090 | 6000A030 | 6800D090 |
| 6000A048 | 6800D090 | 6000A060 | 6800D090 | 6000A058 | 6800D090 | 6000A050 |
| 2B227820 | D0F85840 | D1741856 | 5870D180 | D5C3C1D9 | F0F0F3F3* | |
| 02E3E7E3 | 4000057C | 40400038 | 40400001 | 58A0D0C0 | 28625880 | D12818B5 |
| 1AB4183A | 1A351893 | 68298000 | 2D266029 | 8000879A | D5188756 | D50E5840 |
| D1385850 | D1205870 | D1185880 | D1105890 | D5C3C1D9 | F0F0F3F4* | |
| 02E3E7E3 | 400005B4 | 40400038 | 40400001 | D13058A0 | D12858B0 | D1484100 |
| B00C5000 | D06C58F0 | D1504110 | D06C05EF | 5800B010 | 12004770 | D56A1BFF |
| 58E0D000 | 07FE2B22 | 7820D0EC | 18565870 | D5C3C1D9 | F0F0F3F5* | |
| 02E3E7E3 | 400005EC | 40400038 | 40400001 | D0C05890 | D1682862 | 5880D118 |
| 68254000 | 23026005 | 400018B5 | 1AB91837 | 1A351893 | 18A76829 | 80002D26 |
| 23026009 | 8000879A | D5965890 | D1688756 | D5C3C1D9 | F0F0F3F6* | |
| 02E3E7E3 | 40000624 | 40400038 | 40400001 | D5805850 | D1205870 | D1185880 |
| D1105890 | D13058A0 | D12858B0 | D1484100 | B0105000 | D07C58F0 | D1504110 |
| D07C05EF | 1BFF58E0 | D00007FE | 58A0D004 | D5C3C1D9 | F0F0F3F7* | |
| 02E3E7E3 | 4000065C | 40400038 | 40400001 | 58E0A00C | 58B0A018 | 5810B024 |
| 6820D100 | 60201000 | 18DA92FF | A00C982C | A01C07FE | 987B1000 | 58207000 |
| 5020D0F0 | 98791024 | 68207000 | 6020D100 | D5C3C1D9 | F0F0F3F8* | |
| 02E3E7E3 | 40000694 | 40400038 | 40400001 | 68208000 | 6020D108 | 58209000 |
| 5020D0E4 | 58201004 | 41302000 | 41500004 | 1B255020 | D1485030 | D14C5820 |

```
MEMBER NAME  NCARD
10084130  20004150  00081B25  5B20D0C0  D5C3C1D9  F0F0F3F9*
02E3E7E3  400006CC  40400038  40400001  5020D110  5030D114  5030D050
5820100C  41302000  41500008  1B255B20  D0C05020  D1185030  D11C5030
D0805820  10104130  20004150  00081B25  D5C3C1D9  F0F0F4F0**
02E3E7E3  40000704  40400038  40400001  5B20D0C0  5020D120  5030D124
5030D060  58201014  41302000  41500008  1B255B20  D0C05020  D1285030
D12C5030  D0705820  10184130  20004150  D5C3C1D9  F0F0F4F1*
02E3E7E3  4000073C  40400038  40400001  00081B25  5020D130  5030D134
5030D054  5030D074  5820101C  41302000  41500008  1B255020  D1385030
D13C5030  D0845820  10204130  20004150  D5C3C1D9  F0F0F4F2*
02E3E7E3  40000774  40400014  40400001  00081B25  5020D140  5030D144
5030D064  47F0D184  40404040  40404040  40404040  40404040  40404040
40404040  40404040  40404040  40404040  D5C3C1D9  F0F0F4F3*
02E3E7E3  40000020  40400004  40400001  0000067C  40404040  40404040
40404040  40404040  40404040  40404040  40404040  40404040  40404040
40404040  40404040  40404040  40404040  D5C3C1D9  F0F0F4F4*
02D9D3C4  40404040  40400038  40404040  00020001  1C0001C8  00030001
1C0001CC  00010001  0C0002B4  00010001  0C000324  00010001  0C000398
00010001  0C0003F8  00010001  0C000430  D5C3C1D9  F0F0F4F5*
02E3E7E3  40000024  40400004  40400001  00000078  40404040  40404040
40404040  40404040  40404040  40404040  40404040  40404040  40404040
40404040  40404040  40404040  40404040  D5C3C1D9  F0F0F4F6*
02E3E7E3  40000078  40400004  40400001  00000658  40404040  40404040
40404040  40404040  40404040  40404040  40404040  40404040  40404040
40404040  40404040  40404040  40404040  D5C3C1D9  F0F0F4F7*
02E3E7E3  400000D0  40400004  40400001  80000178  40404040  40404040
40404040  40404040  40404040  40404040  40404040  40404040  40404040
40404040  40404040  40404040  40404040  D5C3C1D9  F0F0F4F8*
02E3E7E3  400000E0  40400004  40400001  80000178  40404040  40404040
40404040  40404040  40404040  40404040  40404040  40404040  40404040
40404040  40404040  40404040  40404040  D5C3C1D9  F0F0F4F9*
02E3E7E3  400000F0  40400004  40400001  80000178  40404040  40404040
40404040  40404040  40404040  40404040  40404040  40404040  40404040
40404040  40404040  40404040  40404040  D5C3C1D9  F0F0F5F0**
02E3E7E3  40000100  40400004  40400001  80000178  40404040  40404040
40404040  40404040  40404040  40404040  40404040  40404040  40404040
40404040  40404040  40404040  40404040  D5C3C1D9  F0F0F5F1*
02E3E7E3  400001D0  4040002C  40400001  00000000  00000000  00000000
00000000  00000048  00000000  00000000  00000030  00000008  00000000
00000010  40404040  40404040  40404040  D5C3C1D9  F0F0F5F2*
02D9D3C4  40404040  40400038  40404040  00010001  0C000020  00010001
0C000024  00010001  0C000078  00010001  0C0000D0  00010001  0C0000E0
00010001  0C0000F0  00010001  0C000100  D5C3C1D9  F0F0F5F3*
02C5D5C4  40404040  40404040  40404040  40404040  40404040  40404040
00000788  F1F5F7F3  F460C6D6  F34040F0  F2F0F2F8  F7F0F9F8  40F0F84B
F4F04BF5  F2404040  D5C3C1D9  C4404040  D5C3C1D9  F0F0F5F4**

MEMBER NAME  NFOUND
02C5E2C4  40404040  40400010  40400001  D5C6D6E4  D5C44040  00000000
40000000  40404040  40404040  40404040  40404040  40404040  40404040
40404040  40404040  40404040  40404040  D5C6D6E4  F0F0F0F1*
02E3E7E3  40000000  40400038  40400001  47F0F00C  07D5C6D6  E4D5C440
90ECD00C  184D98CD  F0205040  D00450D0  400807FC  40404040  40404040
D5D640D4  C1E3C5D9  C9C1D340  C3D6C4C5  D5C6D6E4  F0F0F0F2*
02E3E7E3  40000038  40400038  40400001  E240C6D6  E4D5C440  D5D640D6
D9C9C5D5  E3C1E3C9  D6D5E240  C6D6E4D5  C4404040  D5D640D3  C1E8E4D7
40D5E4D4  C2C5D9E2  40C6D6E4  D5C44040  D5C6D6E4  F0F0F0F3*
02E3E7E3  40000070  40400038  40400001  D5D640E2  C5D8E4C5  D5C3C540
D5E4D4C2  C5D9E240  C6D6E4D5  C4404040  40404040  D5D640C4  C1E2C840
```

```
D5E4D4C2  C5D9E240  C6D6E4D5  C4404040  D5C6D6E4  F0F0F0F4*
02C5E2C4  40404040  40400010  40400002  D7E3C1C2  D3C54040  05000000
40125768  40404040  40404040  40404040  40404040  40404040  40404040
40404040  40404040  40404040  40404040  D5C6D6E4  F0F0F0F5*
02E3E7E3  40000140  40400038  40400001  00000000  00000001  0000000C
00000013  00000014  00000015  00000016  00000017  00000018  00000019
00000048  00000058  00000000  00000000  D5C6D6E4  F0F0F0F6*
02C5E2C4  40404040  40400010  40400003  E2E3C1C3  D2404040  05000000
40040744  40404040  40404040  40404040  40404040  40404040  40404040
40404040  40404040  40404040  40404040  D5C6D6E4  F0F0F0F7*
02C5E2C4  40404040  40400010  40400004  D4E5C3C8  D9404040  02000000
40000000  40404040  40404040  40404040  40404040  40404040  40404040
40404040  40404040  40404040  40404040  D5C6D6E4  F0F0F0F8*
02E3E7E3  400001D0  4040001C  40400001  FFFFFFEC  00058600  000B0444
00108298  FFFFFFA8  00000000  00000000  40404040  40404040  40404040
40404040  40404040  40404040  40404040  D5C6D6E4  F0F0F0F9*
02E3E7E3  40000178  40400004  40400001  000000C8  40404040  40404040
40404040  40404040  40404040  40404040  40404040  40404040  40404040
40404040  40404040  40404040  40404040  D5C6D6E4  F0F0F1F0**
02E3E7E3  40000188  40400038  40400001  40404040  40404040  40404040
40404040  40404040  40404040  40404040  40404040  40404040  40404040
40404040  40404040  40404040  40404040  D5C6D6E4  F0F0F1F1*
02E3E7E3  400001C0  40400010  40400001  40404040  40404040  40404040
40404040  40404040  40404040  40404040  40404040  40404040  40404040
40404040  40404040  40404040  40404040  D5C6D6E4  F0F0F1F2*
02E3E7E3  400001F0  40400038  40400001  5830D130  5860D12C  5880D128
58B0D140  58A0D09C  5890D0D0  5870D0A4  58008014  12004730  D1BA5800
D0D41A0A  5000D0D4  19094730  D3165850  D5C6D6E4  F0F0F1F3*
02E3E7E3  40000228  40400038  40400001  D0D45C40  D0C0182A  1A254102
B0005000  D05058F0  D13C4110  D04C05EF  5850D0D4  5C40D0C0  18271A25
4102B000  5000D05C  58F0D13C  4110D058  D5C6D6E4  F0F0F1F4*
02E3E7E3  40000260  40400038  40400001  05EF5800  87E81200  4730D210
5990D0D4  47C0D316  5800D0D4  1A0A5000  D0D41850  5C40D0C0  182A1A25
4102B000  5000D050  58F0D13C  4110D04C  D5C6D6E4  F0F0F1F5*
02E3E7E3  40000298  40400038  40400001  05EF5850  D0D45C40  D0C01827
1A254102  B0005000  D06858F0  D13C4110  D06405EF  58F0D138  5800F058
12004730  D26A5990  D0D447C0  D3165800  D5C6D6E4  F0F0F1F6*
02E3E7E3  400002D0  40400038  40400001  D0D41A0A  5000D0D4  18505C40
D0C0182A  1A254102  B0005000  D05058F0  D13C4110  D04C05EF  5850D0D4
5C40D0C0  18271A25  4102B000  5000D074  D5C6D6E4  F0F0F1F7*
02E3E7E3  40000308  40400038  40400001  58F0D13C  4110D070  05EF5800
60181200  4730D2C0  5990D0D4  47C0D316  5800D0D4  1A0A5000  D0D41850
5C40D0C0  182A1A25  4102B000  5000D050  D5C6D6E4  F0F0F1F8*
02E3E7E3  40000340  40400038  40400001  58F0D13C  4110D04C  05EF5850
D0D45C40  D0C01827  1A254102  B0005000  D08058F0  D13C4110  D07C05EF
58003018  12004730  D3165990  D0D447C0  D5C6D6E4  F0F0F1F9*
02E3E7E3  40000378  40400038  40400001  D3165800  D0D41A0A  5000D0D4

MEMBER NAME  NFOUND
18505C40  D0C0182A  1A254102  B0005000  D05058F0  D13C4110  D04C05EF
5850D0D4  5C40D0C0  18271A25  4102B000  D5C6D6E4  F0F0F2F0**
02E3E7E3  400003B0  40400038  40400001  5000D08C  58F0D13C  4110D088
05EF1BFF  58E0D000  07FE58A0  D00458E0  A00C58B0  A0185810  B0045820
D0D45020  100018DA  92FFA00C  982CA01C  D5C6D6E4  F0F0F2F1*
02E3E7E3  400003E8  4040002E  40400001  07FE5870  10045820  70005020
D0D45820  10004130  20004150  00011B25  5C40D0C0  1B255020  D1405030
D14447F0  D1484040  40404040  40404040  D5C6D6E4  F0F0F2F2*
02E3E7E3  40000020  40400008  40400001  000003EA  000000A8  40404040
40404040  40404040  40404040  40404040  40404040  40404040  40404040
40404040  40404040  40404040  40404040  D5C6D6E4  F0F0F2F3*
```

```
02D9D3C4  40404040  40400038  40404040  00020001  0C0001D0  00020001
0C0001D4  00020001  0C0001D8  00020001  0C0001DC  00030001  0C0001E0
00040001  1C0001E4  00010001  0C000020  D5C6D6E4  F0F0F2F4*
02E3E7E3  400000A8  40400004  40400001  000003C6  40404040  40404040
40404040  40404040  40404040  40404040  40404040  40404040  40404040
40404040  40404040  40404040  40404040  D5C6D6E4  F0F0F2F5*
02E3E7E3  400000F4  40400004  40400001  00000168  40404040  40404040
40404040  40404040  40404040  40404040  40404040  40404040  40404040
40404040  40404040  40404040  40404040  D5C6D6E4  F0F0F2F6*
02E3E7E3  400000FC  40400008  40400001  80000188  00000154  40404040
40404040  40404040  40404040  40404040  40404040  40404040  40404040
40404040  40404040  40404040  40404040  D5C6D6E4  F0F0F2F7*
02E3E7E3  40000108  40400008  40400001  80000090  00000164  40404040
40404040  40404040  40404040  40404040  40404040  40404040  40404040
40404040  40404040  40404040  40404040  D5C6D6E4  F0F0F2F8*
02E3E7E3  40000114  40400004  40400001  80000070  40404040  40404040
40404040  40404040  40404040  40404040  40404040  40404040  40404040
40404040  40404040  40404040  40404040  D5C6D6E4  F0F0F2F9*
02D9D3C4  40404040  40400038  40404040  00010001  0C000024  00010001
0C0000A8  00010001  0C0000F4  00010001  0C0000FC  00010001  0C000100
00010001  0C000108  00010001  0C00010C  D5C6D6E4  F0F0F3F0**
02E3E7E3  40000118  40400004  40400001  00000158  40404040  40404040
40404040  40404040  40404040  40404040  40404040  40404040  40404040
40404040  40404040  40404040  40404040  D5C6D6E4  F0F0F3F1*
02E3E7E3  40000120  40400008  40400001  80000058  00000154  40404040
40404040  40404040  40404040  40404040  40404040  40404040  40404040
40404040  40404040  40404040  40404040  D5C6D6E4  F0F0F3F2*
02E3E7E3  4000012C  40400008  40400001  80000040  0000015C  40404040
40404040  40404040  40404040  40404040  40404040  40404040  40404040
40404040  40404040  40404040  40404040  D5C6D6E4  F0F0F3F3*
02E3E7E3  40000138  40400004  40400001  80000028  40404040  40404040
40404040  40404040  40404040  40404040  40404040  40404040  40404040
40404040  40404040  40404040  40404040  D5C6D6E4  F0F0F3F4*
02D9D3C4  40404040  40400038  40404040  00010001  0C000114  00010001
0C000118  00010001  0C000120  00010001  0C000124  00010001  0C00012C
00010001  0C000130  00010001  0C000138  D5C6D6E4  F0F0F3F5*
02C5D5C4  40404040  40404040  40404040  40404040  40404040  40404040
00000416  F1F5F7F3  F460C6D6  F34040F0  F2F0F2F8  F7F0F9F8  40F0F84B
F4F04BF5  F6404040  D5C6D6E4  D5C44040  D5C6D6E4  F0F0F3F6**

MEMBER NAME  NSCHT
02C5E2C4  40404040  40400010  40400001  D5E2C3C8  E3404040  00000000
40000000  40404040  40404040  40404040  40404040  40404040  40404040
40404040  40404040  40404040  40404040  D5E2C3C8  F0F0F0F1*
02E3E7E3  40000000  40400038  40400001  47F0F00C  07D5E2C3  C8E34040
90ECD00C  184D98CD  F0205040  D00450D0  400807FC  40404040  40404040
021A1BD4  D6C4C5D3  E240C6D3  C1C7C7C5  D5E2C3C8  F0F0F0F2*
02E3E7E3  40000038  40400038  40400001  C440C6D6  D940E2D3  C9C340D9
E4D51805  1A07C7D9  D6E4D77E  4014041A  086B40E4  E2C5D97E  40060214
041A086B  40C4C1E2  C87E4010  03183222  D5E2C3C8  F0F0F0F3*
02E3E7E3  40000070  40400038  40400001  02065014  0122021A  1C40C5D9
D9D6D940  C9D540D5  E2C3C8E3  404DE2E4  D7C5D940  E3C5E7E3  5D22021A
1F40C5D9  D9D6D940  C9D540D5  E2C3C8E3  D5E2C3C8  F0F0F0F4*
02E3E7E3  400000A8  40400011  40400001  7A40C3C1  D3D340E3  D640C3C1
C4D5E2C8  22404040  40404040  40404040  40404040  40404040  40404040
40404040  40404040  40404040  40404040  D5E2C3C8  F0F0F0F5*
02E3E7E3  400000C0  40400008  40400001  40404040  40404040  40404040
40404040  40404040  40404040  40404040  40404040  40404040  40404040
40404040  40404040  40404040  40404040  D5E2C3C8  F0F0F0F6*
02E3E7E3  40000270  40400038  40400001  00000000  00000001  00000003
```

| | | | | | | |
|---|---|---|---|---|---|---|
| 00000004 | 00000005 | 00000014 | 00000015 | 00000016 | 0000001A | 00000049 |
| 00000050 | 00000078 | 401DF3B6 | 4029FBE7 | D5E2C3C8 | F0F0F0F7* | |
| 02C5E2C4 | 40404040 | 40400010 | 40400002 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | D5E2C3C8 | F0F0F0F8* | |
| 02E3E7E3 | 400002A8 | 40400024 | 40400001 | 403EF9DB | 40400000 | 41280000 |
| 41300000 | 41480000 | 41500000 | 415C353F | 00000000 | 00000000 | 40404040 |
| 40404040 | 40404040 | 40404040 | 40404040 | D5E2C3C8 | F0F0F0F9* | |
| 02C5E2C4 | 40404040 | 40400010 | 40400003 | C6D4D6C4 | C5D34040 | 05000000 |
| 400001F8 | 40404040 | 40404040 | 40404040 | 40404040 | 40404040 | 40404040 |
| 40404040 | 40404040 | 40404040 | 40404040 | D5E2C3C8 | F0F0F1F0** | |
| 02C5E2C4 | 40404040 | 40400010 | 40400004 | C7D9E4D7 | 40404040 | 05000000 |
| 4000000C | 40404040 | 40404040 | 40404040 | 40404040 | 40404040 | 40404040 |
| 40404040 | 40404040 | 40404040 | 40404040 | D5E2C3C8 | F0F0F1F1* | |
| 02C5E2C4 | 40404040 | 40400010 | 40400005 | D5C1D4C5 | 40404040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F2* | |
| 02C5E2C4 | 40404040 | 40400010 | 40400006 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F3* | |
| 02C5E2C4 | 40404040 | 40400010 | 40400007 | C3C1C4D5 | E2C84040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F4* | |
| 02C5E2C4 | 40404040 | 40400010 | 40400008 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F5* | |
| 02C5E2C4 | 40404040 | 40400010 | 40400009 | C8C7C4C1 | E3C54040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F6* | |
| 02E3E7E3 | 400003E8 | 40400020 | 40400001 | FFFFFFFF | FFFFFFEB | 00000000 |
| 00000000 | 00000000 | 00000000 | 00000000 | 00000000 | 40404040 | 40404040 |
| 40404040 | 40404040 | 40404040 | 40404040 | D5E2C3C8 | F0F0F1F7* | |
| 02D9D3C4 | 40404040 | 40400038 | 40404040 | 00020001 | 0C0003E8 | 00030001 |
| 0C0003EC | 00040001 | 0C0003F0 | 00050001 | 1C0003F4 | 00060001 | 1C0003F8 |
| 00070001 | 1C0003FC | 00080001 | 1C000400 | D5E2C3C8 | F0F0F1F8* | |
| 02C5E2C4 | 40404040 | 40400010 | 4040000A | C8C7E3C9 | D4C54040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F1F9* | |
| 02C5E2C4 | 40404040 | 40400010 | 4040000B | C9C2C3D6 | D47B4040 | 02000000 |

MEMBER NAME NSCHT

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | D5E2C3C8 | F0F0F2F0** | |
| 02C5E2C4 | 40404040 | 40400010 | 4040000C | C9C3D5E3 | C5D94040 | 02000000 |
| 40000000 | 40404040 | 40404040 | 40404040 | 40404040 | 40404040 | 40404040 |
| 40404040 | 40404040 | 40404040 | 40404040 | D5E2C3C8 | F0F0F2F1* | |
| 02E3E7E3 | 40000408 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D5E2C3C8 | F0F0F2F2* | |
| 02E3E7E3 | 40000368 | 40400038 | 40400001 | C3D6D7E8 | D9C9C7C8 | E3404DC3 |
| 5D40F1F9 | F8F640E3 | C8C540C2 | D6C5C9D5 | C740C3D6 | D4D7C1D5 | E85BC1D3 |
| D340D9C9 | C7C8E3E2 | 40D9C5E2 | C5D9E5C5 | D5E2C3C8 | F0F0F2F3* | |
| 02E3E7E3 | 400003A0 | 40400038 | 40400001 | C45B5BE2 | D3C9C340 | E5C5D9E2 |
| C9D6D540 | E7E74BE7 | 40404040 | 40404040 | 4040C4C1 | E3C57A40 | E7E761E7 |
| E761E7E7 | 40404040 | 4040E3C9 | D4C57A40 | D5E2C3C8 | F0F0F2F4* | |
| 02E3E7E3 | 400003D8 | 40400008 | 40400001 | E7E77AE7 | E77AE7E7 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F2F5* | |
| 02E3E7E3 | 4000041C | 40400038 | 40400001 | 5860D328 | 5870D320 | 58B0D324 |

| | | | | | | |
|---|---|---|---|---|---|---|
| 5850D1B8 | 5840D1BC | 4100D2E8 | 5000D080 | 58F0D330 | 4110D07C | 05EF58F0 |
| D3404110 | D08805EF | 58F0D33C | 4110D08C | D5E2C3C8 | F0F0F2F6* | |
| 02E3E7E3 | 40000454 | 40400038 | 40400001 | 05EF7800 | D1F83300 | 7000D220 |
| 7800D1F4 | 33007000 | D2287800 | D1F07000 | D21058F0 | D3384110 | D09005EF |
| 41E00004 | 15FE4720 | D3C458EF | D04C07FE | D5E2C3C8 | F0F0F2F7* | |
| 02E3E7E3 | 4000048C | 40400038 | 40400001 | 58F0D32C | 4110D0D8 | 05EF41E0 |
| 000415FE | 4720D3DE | 58EFD054 | 07FE7800 | D1EC7000 | D21058F0 | D3441800 |
| 45E0F004 | 00000000 | 00000028 | 45E0F008 | D5E2C3C8 | F0F0F2F8* | |
| 02E3E7E3 | 400004C4 | 40400038 | 40400001 | 04706000 | 45E0F00C | 00000004 |
| 04700002 | 45E0F008 | 0450D214 | 45E0F010 | 58F0D344 | 45E0F000 | 00000000 |
| 00000070 | 45E0F134 | 00010000 | 0120D22C | D5E2C3C8 | F0F0F2F9* | |
| 02E3E7E3 | 400004FC | 40400038 | 40400001 | 01000050 | 00000001 | 45E0F010 |
| 4100D22C | 5000D0DC | 58F0D348 | 4110D0DC | 05EF5000 | D21858F0 | D3384110 |
| D0E405EF | 41E00004 | 15FE4720 | D47058EF | D5E2C3C8 | F0F0F3F0** | |
| 02E3E7E3 | 40000534 | 40400038 | 40400001 | D05C07FE | 7800D1E8 | 7000D210 |
| 18851894 | 58A0D1AC | 4100D27C | 5000D130 | 4109B001 | 5000D134 | 9280D134 |
| 58F0D330 | 4110D12C | 05EF4100 | D2905000 | D5E2C3C8 | F0F0F3F1* | |
| 02E3E7E3 | 4000056C | 40400038 | 40400001 | D13C58F0 | D3304110 | D13805EF |
| 4100D291 | 5000D148 | 4108B1A4 | 5000D14C | 9280D14C | 58F0D330 | 4110D144 |
| 05EF58F0 | D3384110 | D15005EF | 41E00004 | D5E2C3C8 | F0F0F3F2* | |
| 02E3E7E3 | 400005A4 | 40400038 | 40400001 | 15FE4720 | D4E858EF | D06407FE |
| 7800D210 | 7B00D1E4 | 7000D210 | 5AA0D1AC | 5A80D1B8 | 5A90D1BC | 59A0B1A5 |
| 47C0D480 | 58F0D32C | 4110D198 | 05EF41E0 | D5E2C3C8 | F0F0F3F3* | |
| 02E3E7E3 | 400005DC | 40400038 | 40400001 | 000415FE | 4720D522 | 58EFD06C |
| 07FE58F0 | D3344110 | D19C05EF | 41E00004 | 15FE4720 | D53C58EF | D07407FE |
| 1BFF58E0 | D00007FE | 58F0D344 | 45E0F004 | D5E2C3C8 | F0F0F3F4* | |
| 02E3E7E3 | 40000614 | 40400008 | 40400001 | 00000006 | 00000076 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F3F5* | |
| 02D9D3C4 | 40404040 | 40400038 | 40404040 | 00090001 | 1C000404 | 000A0001 |
| 1C000408 | 000B0001 | 1C00040C | 000C0001 | 1C000410 | 00010001 | 0C0004BC |
| 00040001 | 0C0004CC | 00010001 | 0C0004EC | D5E2C3C8 | F0F0F3F6* | |
| 02E3E7E3 | 4000061C | 40400038 | 40400001 | 45E0F010 | 1BFF58E0 | D00007FE |
| 58F0D344 | 45E0F004 | 00000006 | 00000096 | 45E0F010 | 1BFF58E0 | D00007FE |
| 58D0D004 | 58E0D00C | 92FFD00C | 982CD01C | D5E2C3C8 | F0F0F3F7* | |
| 02E3E7E3 | 40000654 | 40400012 | 40400001 | 07FE5870 | 10005820 | 70005020 |
| D21447F0 | D3544040 | 40404040 | 40404040 | 40404040 | 40404040 | 40404040 |
| 40404040 | 40404040 | 40404040 | 40404040 | D5E2C3C8 | F0F0F3F8* | |
| 02E3E7E3 | 40000020 | 40400008 | 40400001 | 00000656 | 000000C8 | 40404040 |
| 40404040 | 40404040 | 40404040 | 40404040 | 40404040 | 40404040 | 40404040 |

MEMBER NAME NSCHT

| | | | | | | |
|---|---|---|---|---|---|---|
| 40404040 | 40404040 | 40404040 | 40404040 | D5E2C3C8 | F0F0F3F9* | |
| 02E3E7E3 | 400000C8 | 40400004 | 40400001 | 00000644 | 40404040 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F4F0** | |
| 02E3E7E3 | 40000114 | 4040000C | 40400001 | 0000048C | 0000060C | 000004A6 |
| 40404040 | 40404040 | 40404040 | 40404040 | 40404040 | 40404040 | 40404040 |
| 40404040 | 40404040 | 40404040 | 40404040 | D5E2C3C8 | F0F0F4F1* | |
| 02D9D3C4 | 40404040 | 40400038 | 40404040 | 00010001 | 0C000618 | 00010001 |
| 0C000634 | 00010001 | 0C000020 | 00010001 | 0C000024 | 00010001 | 0C0000C8 |
| 00010001 | 0C000114 | 00010001 | 0C000118 | D5E2C3C8 | F0F0F4F2* | |
| 02E3E7E3 | 40000120 | 4040001C | 40400001 | 000004A6 | 00000538 | 0000060C |
| 000005B0 | 0000060C | 000005EA | 000005EA | 40404040 | 40404040 | 40404040 |
| 40404040 | 40404040 | 40404040 | 40404040 | D5E2C3C8 | F0F0F4F3* | |
| 02D9D3C4 | 40404040 | 40400038 | 40404040 | 00010001 | 0C00011C | 00010001 |
| 0C000120 | 00010001 | 0C000124 | 00010001 | 0C000128 | 00010001 | 0C00012C |
| 00010001 | 0C000130 | 00010001 | 0C000134 | D5E2C3C8 | F0F0F4F4* | |
| 02E3E7E3 | 4000013C | 4040000C | 40400001 | 00000604 | 00000628 | 0000027C |
| 40404040 | 40404040 | 40404040 | 40404040 | 40404040 | 40404040 | 40404040 |

| | | | | | | |
|---|---|---|---|---|---|---|
| 40404040 | 40404040 | 40404040 | 40404040 | D5E2C3C8 | F0F0F4F5* | |
| 02E3E7E3 | 4000014C | 40400010 | 40400001 | 80000014 | 800003D8 | 800003C4 |
| 000002E8 | 40404040 | 40404040 | 40404040 | 40404040 | 40404040 | 40404040 |
| 40404040 | 40404040 | 40404040 | 40404040 | D5E2C3C8 | F0F0F4F6* | |
| 02D9D3C4 | 40404040 | 40400038 | 40404040 | 00010001 | 0C000138 | 00010001 |
| 0C00013C | 00010001 | 0C000140 | 00010001 | 0C000144 | 00020001 | 0C00014C |
| 00010001 | 0C000150 | 00010001 | 0C000154 | D5E2C3C8 | F0F0F4F7* | |
| 02E3E7E3 | 4000015C | 4040001C | 40400001 | 000002D8 | 00000270 | 0000029C |
| 000002A4 | 000002A0 | 00000368 | 00000270 | 40404040 | 40404040 | 40404040 |
| 40404040 | 40404040 | 40404040 | 40404040 | D5E2C3C8 | F0F0F4F8* | |
| 02D9D3C4 | 40404040 | 40400038 | 40404040 | 00010001 | 0C000158 | 00010001 |
| 0C00015C | 00010001 | 0C000160 | 00010001 | 0C000164 | 00010001 | 0C000168 |
| 00010001 | 0C00016C | 00010001 | 0C000170 | D5E2C3C8 | F0F0F4F9* | |
| 02E3E7E3 | 40000178 | 4040001C | 40400001 | 00000270 | 00000270 | 00000270 |
| 00000274 | 00000278 | 00000270 | 00000270 | 40404040 | 40404040 | 40404040 |
| 40404040 | 40404040 | 40404040 | 40404040 | D5E2C3C8 | F0F0F5F0** | |
| 02D9D3C4 | 40404040 | 40400038 | 40404040 | 00010001 | 0C000174 | 00010001 |
| 0C000178 | 00010001 | 0C00017C | 00010001 | 0C000180 | 00010001 | 0C000184 |
| 00010001 | 0C000188 | 00010001 | 0C00018C | D5E2C3C8 | F0F0F5F1* | |
| 02E3E7E3 | 40000194 | 40400010 | 40400001 | 000002A4 | 000002A8 | 80000270 |
| 800002EC | 40404040 | 40404040 | 40404040 | 40404040 | 40404040 | 40404040 |
| 40404040 | 40404040 | 40404040 | 40404040 | D5E2C3C8 | F0F0F5F2* | |
| 02E3E7E3 | 400001A8 | 4040000C | 40400001 | 80000298 | 000002E8 | 000002D8 |
| 40404040 | 40404040 | 40404040 | 40404040 | 40404040 | 40404040 | 40404040 |
| 40404040 | 40404040 | 40404040 | 40404040 | D5E2C3C8 | F0F0F5F3* | |
| 02D9D3C4 | 40404040 | 40400038 | 40404040 | 00010001 | 0C000190 | 00010001 |
| 0C000194 | 00010001 | 0C000198 | 00010001 | 0C00019C | 00010001 | 0C0001A0 |
| 00010001 | 0C0001A8 | 00010001 | 0C0001AC | D5E2C3C8 | F0F0F5F4* | |
| 02E3E7E3 | 400001B4 | 4040001C | 40400001 | 00000270 | 000002E0 | 000002A4 |
| 000002A0 | 000002F4 | 00000270 | 00000270 | 40404040 | 40404040 | 40404040 |
| 40404040 | 40404040 | 40404040 | 40404040 | D5E2C3C8 | F0F0F5F5* | |
| 02D9D3C4 | 40404040 | 40400038 | 40404040 | 00010001 | 0C0001B0 | 00010001 |
| 0C0001B4 | 00010001 | 0C0001B8 | 00010001 | 0C0001BC | 00010001 | 0C0001C0 |
| 00010001 | 0C0001C4 | 00010001 | 0C0001C8 | D5E2C3C8 | F0F0F5F6* | |
| 02E3E7E3 | 400001D0 | 4040001C | 40400001 | 00000270 | 00000270 | 00000274 |
| 00000278 | 00000270 | 00000270 | 000002A4 | 40404040 | 40404040 | 40404040 |
| 40404040 | 40404040 | 40404040 | 40404040 | D5E2C3C8 | F0F0F5F7* | |
| 02D9D3C4 | 40404040 | 40400038 | 40404040 | 00010001 | 0C0001CC | 00010001 |
| 0C0001D0 | 00010001 | 0C0001D4 | 00010001 | 0C0001D8 | 00010001 | 0C0001DC |
| 00010001 | 0C0001E0 | 00010001 | 0C0001E4 | D5E2C3C8 | F0F0F5F8* | |

MEMBER NAME NSCHT

| | | | | | | |
|---|---|---|---|---|---|---|
| 02E3E7E3 | 400001EC | 4040000C | 40400001 | 000002A8 | 80000270 | 00000284 |
| 40404040 | 40404040 | 40404040 | 40404040 | 40404040 | 40404040 | 40404040 |
| 40404040 | 40404040 | 40404040 | 40404040 | D5E2C3C8 | F0F0F5F9* | |
| 02E3E7E3 | 400001FC | 40400008 | 40400001 | 80000000 | 00000274 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F6F0** | |
| 02E3E7E3 | 40000208 | 40400008 | 40400001 | 800000C0 | 00000280 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F6F1* | |
| 02E3E7E3 | 40000214 | 40400008 | 40400001 | 80000000 | 000002F0 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F6F2* | |
| 02D9D3C4 | 40404040 | 40400038 | 40404040 | 00010001 | 0C0001E8 | 00010001 |
| 0C0001EC | 00010001 | 0C0001F0 | 00010001 | 0C0001F4 | 00010001 | 0C000200 |
| 00010001 | 0C000208 | 00010001 | 0C00020C | D5E2C3C8 | F0F0F6F3* | |
| 02E3E7E3 | 4000021C | 4040001C | 40400001 | 000002D8 | 00000270 | 00000290 |
| 000002A4 | 000002A0 | 00000344 | 00000270 | 40404040 | 40404040 | 40404040 |
| 40404040 | 40404040 | 40404040 | 40404040 | D5E2C3C8 | F0F0F6F4* | |
| 02D9D3C4 | 40404040 | 40400038 | 40404040 | 00010001 | 0C000218 | 00010001 |

| | | | | | | |
|---|---|---|---|---|---|---|
| 0C00021C | 00010001 | 0C000220 | 00010001 | 0C000224 | 00010001 | 0C000228 |
| 00010001 | 0C00022C | 00010001 | 0C000230 | D5E2C3C8 | F0F0F6F5* | |
| 02E3E7E3 | 40000238 | 4040001C | 40400001 | 00000270 | 00000270 | 00000270 |
| 00000274 | 00000278 | 00000270 | 00000270 | 40404040 | 40404040 | 40404040 |
| 40404040 | 40404040 | 40404040 | 40404040 | D5E2C3C8 | F0F0F6F6* | |
| 02D9D3C4 | 40404040 | 40400038 | 40404040 | 00010001 | 0C000234 | 00010001 |
| 0C000238 | 00010001 | 0C00023C | 00010001 | 0C000240 | 00010001 | 0C000244 |
| 00010001 | 0C000248 | 00010001 | 0C00024C | D5E2C3C8 | F0F0F6F7* | |
| 02E3E7E3 | 40000254 | 40400018 | 40400001 | 000002A4 | 000002A8 | 80000270 |
| 800002D4 | 000002EC | 800002D4 | 40404040 | 40404040 | 40404040 | 40404040 |
| 40404040 | 40404040 | 40404040 | 40404040 | D5E2C3C8 | F0F0F6F8* | |
| 02E3E7E3 | 40000414 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D5E2C3C8 | F0F0F6F9* | |
| 02D9D3C4 | 40404040 | 40400038 | 40404040 | 00010001 | 0C000250 | 00010001 |
| 0C000254 | 00010001 | 0C000258 | 00010001 | 0C00025C | 00010001 | 0C000260 |
| 00010001 | 0C000264 | 00010001 | 0C000268 | D5E2C3C8 | F0F0F7F0** | |
| 02C5D5C4 | 40404040 | 40404040 | 40404040 | 40404040 | 40404040 | 40404040 |
| 00000666 | F1F5F7F3 | F460C6D6 | F34040F0 | F2F0F2F8 | F7F0F9F8 | 40F0F84B |
| F4F14BF0 | F0404040 | D5E2C3C8 | E3404040 | D5E2C3C8 | F0F0F7F1** | |

MEMBER NAME OFFST

| | | | | | | |
|---|---|---|---|---|---|---|
| 02C5E2C4 | 40404040 | 40400010 | 40400001 | D6C6C6E2 | E3404040 | 00000000 |
| 40000000 | 40404040 | 40404040 | 40404040 | 40404040 | 40404040 | 40404040 |
| 40404040 | 40404040 | 40404040 | 40404040 | D6C6C6E2 | F0F0F0F1* | |
| 02E3E7E3 | 40000000 | 40400028 | 40400001 | 47F0F00C | 07D6C6C6 | E2E34040 |
| 90ECD00C | 184D98CD | F0205040 | D00450D0 | 400807FC | 40404040 | 40404040 |
| 40404040 | 40404040 | 40404040 | 40404040 | D6C6C6E2 | F0F0F0F2* | |
| 02C5E2C4 | 40404040 | 40400010 | 40400002 | E4D5C9E3 | C4404040 | 02000000 |
| 40000000 | 40404040 | 40404040 | 40404040 | 40404040 | 40404040 | 40404040 |
| 40404040 | 40404040 | 40404040 | 40404040 | D6C6C6E2 | F0F0F0F3* | |
| 02E3E7E3 | 40000080 | 40400028 | 40400001 | 00000000 | 00000000 | 41300000 |
| 00000000 | 41200000 | 00000000 | 00000002 | 00000003 | 00000000 | 00000000 |
| 40404040 | 40404040 | 40404040 | 40404040 | D6C6C6E2 | F0F0F0F4* | |
| 02E3E7E3 | 40000100 | 40400038 | 40400001 | 00000000 | 6800D058 | 6000D0B8 |
| 6820D060 | 6C20D090 | 6840D0C0 | 2C442C24 | 6840D068 | 6C40D0A0 | 6C40D0C0 |
| 2A246A20 | D0B02302 | 6000D0C8 | 6820D060 | D6C6C6E2 | F0F0F0F5* | |
| 02E3E7E3 | 40000138 | 40400038 | 40400001 | 6C20D088 | 6840D0C0 | 2C442C24 |
| 6840D068 | 6C40D098 | 6C40D0C0 | 2A242802 | 6A00D0A8 | 6000D0D0 | 58F0D0D8 |
| 4110D04C | 05EF1BFF | 58E0D000 | 07FE58A0 | D6C6C6E2 | F0F0F0F6* | |
| 02E3E7E3 | 40000170 | 40400038 | 40400001 | D00458E0 | A00C58B0 | A0185810 |
| B0006820 | D0C86020 | 10005820 | B0046840 | D0D06040 | 200018DA | 92FFA00C |
| 982CA01C | 07FE987B | 10006820 | 70006020 | D6C6C6E2 | F0F0F0F7* | |
| 02E3E7E3 | 400001A8 | 40400038 | 40400001 | D0C86820 | 80006020 | D0D06820 |
| 90006020 | D0C06820 | A0006020 | D0886820 | B0006020 | D098987A | 10146820 |
| 70006020 | D0A86820 | 80006020 | D0906820 | D6C6C6E2 | F0F0F0F8* | |
| 02E3E7E3 | 400001E0 | 40400012 | 40400001 | 90006020 | D0A06820 | A0006020 |
| D0B047F0 | D0DC4040 | 40404040 | 40404040 | 40404040 | 40404040 | 40404040 |
| 40404040 | 40404040 | 40404040 | 40404040 | D6C6C6E2 | F0F0F0F9* | |
| 02E3E7E3 | 40000020 | 4040000C | 40400001 | 0000019E | 00000028 | 0000016E |
| 40404040 | 40404040 | 40404040 | 40404040 | 40404040 | 40404040 | 40404040 |
| 40404040 | 40404040 | 40404040 | 40404040 | D6C6C6E2 | F0F0F1F0** | |
| 02E3E7E3 | 40000074 | 4040000C | 40400001 | 000000F0 | 000000F8 | 800000E0 |
| 40404040 | 40404040 | 40404040 | 40404040 | 40404040 | 40404040 | 40404040 |
| 40404040 | 40404040 | 40404040 | 40404040 | D6C6C6E2 | F0F0F1F1* | |
| 02D9D3C4 | 40404040 | 40400038 | 40404040 | 00020001 | 1C000100 | 00010001 |
| 0C000020 | 00010001 | 0C000024 | 00010001 | 0C000028 | 00010001 | 0C000074 |
| 00010001 | 0C000078 | 00010001 | 0C00007C | D6C6C6E2 | F0F0F1F2* | |
| 02C5D5C4 | 40404040 | 40404040 | 40404040 | 40404040 | 40404040 | 40404040 |
| 000001F2 | F1F5F7F3 | F460C6D6 | F34040F0 | F2F0F2F8 | F7F0F9F8 | 40F0F84B |
| F4F14BF0 | F5404040 | D6C6C6E2 | E3404040 | D6C6C6E2 | F0F0F1F3** | |

```
MEMBER NAME  OPTMZE
02C5E2C4  40404040  40400010  40400001  D6D7E3D4  E9C54040  00000000
40000000  40404040  40404040  40404040  40404040  40404040  40404040
40404040  40404040  40404040  40404040  D6D7E3D4  F0F0F0F1*
02E3E7E3  40000000  40400028  40400001  47F0F00C  07D6D7E3  D4E9C540
90ECD00C  184D98CD  F0205040  D00450D0  400807FC  40404040  40404040
40404040  40404040  40404040  40404040  D6D7E3D4  F0F0F0F2*
02C5E2C4  40404040  40400010  40400002  E2D8D9E3  40404040  02000000
40000000  40404040  40404040  40404040  40404040  40404040  40404040
40404040  40404040  40404040  40404040  D6D7E3D4  F0F0F0F3*
02E3E7E3  400000A0  40400020  40400001  00000000  00000000  00000001
00000001  00000002  00000008  00000000  00000000  40404040  40404040
40404040  40404040  40404040  40404040  D6D7E3D4  F0F0F0F4*
02E3E7E3  40000120  40400008  40400001  00000000  00000000  40404040
40404040  40404040  40404040  40404040  40404040  40404040  40404040
40404040  40404040  40404040  40404040  D6D7E3D4  F0F0F0F5*
02C5E2C4  40404040  40400010  40400003  D4E5C3C8  D9404040  02000000
40000000  40404040  40404040  40404040  40404040  40404040  40404040
40404040  40404040  40404040  40404040  D6D7E3D4  F0F0F0F6*
02E3E7E3  4000012C  40400004  40400001  00000000  40404040  40404040
40404040  40404040  40404040  40404040  40404040  40404040  40404040
40404040  40404040  40404040  40404040  D6D7E3D4  F0F0F0F7*
02C5E2C4  40404040  40400010  40400004  D6D9C4C5  D9404040  02000000
40000000  40404040  40404040  40404040  40404040  40404040  40404040
40404040  40404040  40404040  40404040  D6D7E3D4  F0F0F0F8*
02E3E7E3  40000134  40400008  40400001  00000000  00000000  40404040
40404040  40404040  40404040  40404040  40404040  40404040  40404040
40404040  40404040  40404040  40404040  D6D7E3D4  F0F0F0F9*
02E3E7E3  40000198  40400038  40400001  5880D104  58B0D0FC  58A0D08C
5890D084  7800D07C  7000D0CC  7000D0D4  5990D0C0  4780D43C  5800D0C0
5000D0A4  5800D088  5000D0A0  5800D124  D6D7E3D4  F0F0F1F0**
02E3E7E3  400001D0  40400038  40400001  5000D140  182A50A0  D1445800
D1245000  D11450A0  D11C5800  D15C5000  D14C5000  D1345800  D1605000
D1481882  58B0D104  58A0D0FC  5800D078  D6D7E3D4  F0F0F1F1*
02E3E7E3  40000208  40400038  40400001  5000D0B0  5800D0A0  5000D0BC
5090D0E0  58E0D148  585EB000  5C40D08C  18355A30  D1247820  D0CC7B23
A0003C22  18255A20  D08C7840  D0D47B42  D6D7E3D4  F0F0F1F2*
02E3E7E3  40000240  40400038  40400001  A0003C44  3A247020  D16858F0
D0F84110  D04C05EF  7000D0AC  7803A000  7000D0D0  7802A000  7000D0D8
5800D0A0  5000D098  5800D134  5A00D124  D6D7E3D4  F0F0F1F3*
02E3E7E3  40000278  40400038  40400001  5000D138  5800D134  5A00D08C
5000D13C  5880D124  58A0D08C  58E0D138  583EB000  18531A59  58E0D13C
5A3EB000  1B391C2A  1C4A5050  D1281865  D6D7E3D4  F0F0F1F4*
02E3E7E3  400002B0  40400038  40400001  1A685840  D0BC5850  D0E01879
18865890  D12818B3  5860D0FC  5A70D084  78286000  7020D118  33227A20
D0CC3C22  18391A3A  78436000  7040D120  D6D7E3D4  F0F0F1F5*
02E3E7E3  400002E8  40400038  40400001  33447A40  D0D43C44  3A247020
D16858F0  D0F84110  D05005EF  7000D16C  38207000  D0C47800  D16C7900
D0AC47A0  D3107800  D1187000  D0D07800  D6D7E3D4  F0F0F1F6*
02E3E7E3  40000320  40400038  40400001  D1207000  D0D85840  D0981857
7020D0AC  5800D080  5000D0B0  1A8A879A  D2A05040  D0BC5050  D0E058B0
D1045890  D0845880  D1245820  D0981A29  D6D7E3D4  F0F0F1F7*
02E3E7E3  40000358  40400038  40400001  5020D098  5800D13C  1A0A5000
D13C5800  D1381A0A  5000D138  5920D0C0  47C0D268  58A0D0FC  58B0D104
5890D084  5880D144  7800D0D0  7000D0CC  D6D7E3D4  F0F0F1F8*
02E3E7E3  40000390  40400038  40400001  7800D0D8  7000D0D4  5800D0B0
1BFF870F  D4121878  5C60D0BC  18275A20  D1405852  B0001837  1A385803
B0005000  D0B81C48  18355A30  D1404103  D6D7E3D4  F0F0F1F9*
```

```
02E3E7E3  400003C8  40400038  40400001  A0005000  D05458F0  D1104110

MEMBER NAME  OPTMZE
D05405EF  4100D0F0  5000D064  58E0D148  410EB000  5000D068  9280D068
58F0D10C  4110D060  05EF58E0  D148410E  D6D7E3D4  F0F0F2F0**
02E3E7E3  40000400  40400038  40400001  B0005000  D0644102  B0005000
D0689280  D06858F0  D10C4110  D06005EF  4102B000  5000D064  4100D0F0
5000D068  9280D068  58F0D10C  4110D060  D6D7E3D4  F0F0F2F1*
02E3E7E3  40000438  40400038  40400001  05EF5800  D1345A00  D08C5000
D1345800  D1485A00  D08C5000  D1485820  D0A01A29  5020D0A0  5920D0A4
47C0D1DC  5880D104  58B0D0FC  58A0D08C  D6D7E3D4  F0F0F2F2*
02E3E7E3  40000470  40400038  40400001  5890D084  5850D078  5050D0B0
5800D124  5000D150  50A0D154  58E0D164  583E8000  5030D0A8  18731C6A
5820D124  1A277820  D0CC7B22  B0003C22  D6D7E3D4  F0F0F2F3*
02E3E7E3  400004A8  40400038  40400001  182A1A27  7840D0D4  7B42B000
3C443A24  7020D168  58F0D0F8  4110D06C  05EF7000  D0AC5090  D0E01843
1A4958E0  D15C582E  80005020  D1581A32  D6D7E3D4  F0F0F2F4*
02E3E7E3  400004E0  40400038  40400001  1B391C2A  18141C0A  5010D114
18615A60  D1241845  5850D0E0  18791886  5890D114  18B35860  D0FC5A70
D0847820  D0CC7B28  60003C22  18391A3A  D6D7E3D4  F0F0F2F5*
02E3E7E3  40000518  40400038  40400001  7840D0D4  7B436000  3C443A24
7020D168  58F0D0F8  4110D070  05EF7000  D16C3820  7000D0C4  7800D16C
7900D0AC  47A0D52A  18577020  D0AC5840  D6D7E3D4  F0F0F2F6*
02E3E7E3  40000550  40400038  40400001  D0801A8A  879AD4DE  5040D0B0
5050D0E0  5880D104  58B0D0FC  5890D084  5800D0B0  1BFF860F  D5561BFF
58E0D000  07FE5800  D1585000  D0B85850  D6D7E3D4  F0F0F2F7*
02E3E7E3  40000588  40400038  40400001  D0A85C40  D1545820  D1501A25
4102B000  5000D054  58F0D110  4110D054  05EF1BFF  58E0D000  07FE58D0
D00458E0  D00C92FF  D00C982C  D01C07FE  D6D7E3D4  F0F0F2F8*
02E3E7E3  400005C0  40400038  40400001  98791004  58207000  5020D0E4
58209000  5020D0C0  58201000  41302000  41500004  1B255C40  D0881B25
5020D0FC  5030D100  58201008  41302000  D6D7E3D4  F0F0F2F9*
02E3E7E3  400005F8  40400018  40400001  41500004  1B255C40  D0881B25
5020D104  5030D108  47F0D170  40404040  40404040  40404040  40404040
40404040  40404040  40404040  40404040  D6D7E3D4  F0F0F3F0**
02E3E7E3  40000020  4040000C  40400001  000005C0  00000028  000005AE
40404040  40404040  40404040  40404040  40404040  40404040  40404040
40404040  40404040  40404040  40404040  D6D7E3D4  F0F0F3F1*
02E3E7E3  40000074  40400008  40400001  80000190  80000190  40404040
40404040  40404040  40404040  40404040  40404040  40404040  40404040
40404040  40404040  40404040  40404040  D6D7E3D4  F0F0F3F2*
02D9D3C4  40404040  40400038  40404040  00020001  1C000120  00030001
1C000134  00040001  1C000138  00010001  0C000020  00010001  0C000024
00010001  0C000028  00010001  0C000074  D6D7E3D4  F0F0F3F3*
02E3E7E3  40000080  4040000C  40400001  000000E0  80000108  000000B4
40404040  40404040  40404040  40404040  40404040  40404040  40404040
40404040  40404040  40404040  40404040  D6D7E3D4  F0F0F3F4*
02E3E7E3  40000090  4040000C  40400001  80000000  80000190  80000190
40404040  40404040  40404040  40404040  40404040  40404040  40404040
40404040  40404040  40404040  40404040  D6D7E3D4  F0F0F3F5*
02E3E7E3  4000013C  40400038  40400001  00000000  00000000  00000000
00000000  00000004  00000000  00000000  00000000  00000000  00000000
00000000  00000000  00000000  00000000  D6D7E3D4  F0F0F3F6*
02E3E7E3  40000174  40400024  40400001  00000000  00000000  00000000
00000000  00000010  00000014  0000000C  0090000A  0000000A  40404040
40404040  40404040  40404040  40404040  D6D7E3D4  F0F0F3F7*
02D9D3C4  40404040  40400030  40404040  00010001  0C000078  00010001
0C000080  00010001  0C000084  00010001  0C000088  00010001  0C000094
00010001  0C000098  40404040  40404040  D6D7E3D4  F0F0F3F8*
```

```
02C5D5C4  40404040  40404040  40404040  40404040  40404040  40404040
00000610  F1F5F7F3  F460C6D6  F34040F0  F2F0F2F8  F7F0F9F8  40F0F84B

MEMBER NAME  OPTMZE
F4F14BF0  F9404040  D6D7E3D4  E9C54040  D6D7E3D4  F0F0F3F9**

MEMBER NAME  ONOFF
02C5E2C4  40404040  40400010  40400001  D6D5D6C6  C6404040  00000000
40000000  40404040  40404040  40404040  40404040  40404040  40404040
40404040  40404040  40404040  40404040  D6D5D6C6  F0F0F0F1*
02E3E7E3  40000000  40400038  40400001  47F0F00C  07D6D5D6  C6C64040
90ECD00C  184D98CD  F0205040  D00450D0  400807FC  40404040  40404040
021A2840  40C5D9D9  D6D940C9  D540D7D9  D6D5D6C6  F0F0F0F2*
02E3E7E3  40000038  40400038  40400001  D6D6E340  C2C3E2D3  C9C240D9
D6E4E3C9  D5C54B40  C3D6D5E5  407E400A  0C062202  1A2A4040  40404040
404040D5  E4D4C2C5  D940D6C6  40C4C5C7  D6D5D6C6  F0F0F0F3*
02E3E7E3  40000070  40400038  40400001  D9C5C540  C6D6D940  D7D6D3E8
D5D6D4C9  C1D34040  10031E1A  26404040  40404040  40404040  4040D6E4
E3D7E4E3  40C6D9D6  D440D7D9  D6D6E340  D6D5D6C6  F0F0F0F4*
02E3E7E3  400000A8  40400021  40400001  C6D6D3D3  D6E6E222  021A1040
404040C1  6BE46BE5  6BC3D6D5  E5404006  040A0C06  22404040  40404040
40404040  40404040  40404040  40404040  D6D5D6C6  F0F0F0F5*
02E3E7E3  40000190  40400038  40400001  00000000  00000000  3D68DB8B
AC710CB3  40199999  9999999A  41100000  00000000  41200000  00000000
41300000  00000000  41400000  00000000  D6D5D6C6  F0F0F0F6*
02E3E7E3  400001C8  40400038  40400001  41500000  00000000  41600000
00000000  3F28F5C3  00000000  00000000  00000001  00000002  00000003
00000004  00000005  00000006  00000007  D6D5D6C6  F0F0F0F7*
02C5E2C4  40404040  40400010  40400002  E3D6D3C5  D9404040  05000000
4000000C  40404040  40404040  40404040  40404040  40404040  40404040
40404040  40404040  40404040  40404040  D6D5D6C6  F0F0F0F8*
02E3E7E3  40000200  40400014  40400001  3F28F5C3  41100000  41200000
00000000  00000000  40404040  40404040  40404040  40404040  40404040
40404040  40404040  40404040  40404040  D6D5D6C6  F0F0F0F9*
02C5E2C4  40404040  40400010  40400003  D7D9D6D6  E3404040  02000000
40000000  40404040  40404040  40404040  40404040  40404040  40404040
40404040  40404040  40404040  40404040  D6D5D6C6  F0F0F1F0**
02C5E2C4  40404040  40400010  40400004  E4D5C9E3  C4404040  02000000
40000000  40404040  40404040  40404040  40404040  40404040  40404040
40404040  40404040  40404040  40404040  D6D5D6C6  F0F0F1F1*
02C5E2C4  40404040  40400010  40400005  C9C2C3D6  D47B4040  02000000
40000000  40404040  40404040  40404040  40404040  40404040  40404040
40404040  40404040  40404040  40404040  D6D5D6C6  F0F0F1F2*
02C5E2C4  40404040  40400010  40400006  E2D7C3D6  C5C44040  02000000
40000000  40404040  40404040  40404040  40404040  40404040  40404040
40404040  40404040  40404040  40404040  D6D5D6C6  F0F0F1F3*
02E3E7E3  40000458  40400014  40400001  00000000  00000000  00000000
00000000  00000000  40404040  40404040  40404040  40404040  40404040
40404040  40404040  40404040  40404040  D6D5D6C6  F0F0F1F4*
02E3E7E3  400004B0  40400038  40400001  5860D3C8  5850D128  5840D124
6800D0C8  6000D1E0  2B007800  D1946000  D1E82B00  7800D198  6000D1F0
2B007800  D1486000  D2002B00  7800D150  D6D5D6C6  F0F0F1F5*
02E3E7E3  400004E8  40400038  40400001  6000D210  2B007800  D1586000
D2282B00  7800D160  6000D238  2B007800  D1686000  D2682B00  7800D14C
6000D208  2B007800  D1546000  D2182B00  D6D5D6C6  F0F0F1F6*
02E3E7E3  40000520  40400038  40400001  7800D15C  6000D230  2B007800
D1646000  D2402B00  7800D18C  6000D260  58F0D398  4110D04C  05EF58F0
D3984110  D07005EF  6820D1A0  2C226840  D6D5D6C6  F0F0F1F7*
02E3E7E3  40000558  40400038  40400001  D1A82C44  2A246C20  D1006020
```

```
D2986820  D1A06C20  D1B06840  D1A86C40  D1B82A24  6C20D0E0  6C20D0F8
6020D290  6820D1A0  6C20D1C0  6840D1A8  D6D5D6C6  F0F0F1F8*
02E3E7E3  40000590  40400038  40400001  6C40D1C8  2A246C20  D0E06840
D1B02C44  2A246840  D1B82C44  2A246C20  D0F06020  D2886820  D1A06C20
D1D06840  D1A86C40  D1D82A24  6840D1E8  D6D5D6C6  F0F0F1F9*
02E3E7E3  400005C8  40400038  40400001  6C40D1A0  6860D1F0  6C60D1A8

MEMBER NAME  ONOFF
2A462B24  6840D1B0  6C40D1C0  2A246840  D1B86C40  D1C82A24  6C20D0E0
6C20D0E8  6020D280  6820D1B0  6C20D1D0  D6D5D6C6  F0F0F2F0**
02E3E7E3  40000600  40400038  40400001  6840D1B8  6C40D1D8  2A246840
D1E86C40  D1B06860  D1F06C60  D1B82A46  2B246C20  D0E06840  D1C02C44
2A246840  D1C82C44  2A246C20  D0E06020  D6D5D6C6  F0F0F2F1*
02E3E7E3  40000638  40400038  40400001  D2786820  D1C06C20  D1D06840
D1C86C40  D1D82A24  6840D1E8  6C40D1C0  6860D1F0  6C60D1C8  2A462B24
6C20D0E0  6C20D0D8  6020D270  7820D138  D6D5D6C6  F0F0F2F2*
02E3E7E3  40000670  40400038  40400001  33222B00  38022820  6020D3D0
6800D0E8  6C00D1A0  6000D3A8  6800D0E0  6C00D1B0  6000D3B0  6800D0E8
6C00D1A8  6000D3B8  6800D0E0  6C00D1B8  D6D5D6C6  F0F0F2F3*
02E3E7E3  400006A8  40400038  40400001  6000D3C0  58A0D114  18245040
D16C6800  D1E06900  D1084750  D5F647F0  D7885870  D12C1882  189A18B5
6840D1E0  18271B29  89200003  6862D268  D6D5D6C6  F0F0F2F4*
02E3E7E3  400006E0  40400038  40400001  20662964  47C0D620  5080D16C
47F0D62A  1B8A879A  D6045080  D16C58F0  D38C4110  D09405EF  6800D1F8
220047A0  D64E6800  D1F86900  D3D04750  D6D5D6C6  F0F0F2F5*
02E3E7E3  40000718  40400038  40400001  D64E47F0  D7926800  D0C06000
D258182A  50A0D144  18361876  18831892  58B0D16C  6848D328  6040D3A0
224447C0  D7606940  D0D847A0  D7602824  D6D5D6C6  F0F0F2F6*
02E3E7E3  40000750  40400038  40400001  2C242862  2C646060  D3D86C60
D1A02802  6C00D1B0  2A602804  6C00D1C0  2A066A00  D1D07000  D1746860
D3D86C60  D1A82802  6C00D1B8  2A602804  D6D5D6C6  F0F0F2F7*
02E3E7E3  40000788  40400038  40400001  6C00D1C8  2A606A60  D1D87060
D1782862  6C60D3A8  28046C00  D3B02A60  6A60D1C0  6060D248  6C20D3B8
6C40D3C0  2A246A20  D1C86020  D25058F0  D6D5D6C6  F0F0F2F8*
02E3E7E3  400007C0  40400038  40400001  D3904110  D0B405EF  6820D250
6C20D260  2B447840  D1742B42  6860D248  6C60D260  2B227820  D1782A26
7B40D194  30447B20  D1983022  7020D188  D6D5D6C6  F0F0F2F9*
02E3E7E3  400007F8  40400038  40400001  58F0D388  7940F004  4730D760
58F0D388  7920F004  4730D760  5090D144  5820D144  89200003  6802D328
6C00D0D8  7000D190  1BFF58E0  D00007FE  D6D5D6C6  F0F0F3F0**
02E3E7E3  40000830  40400038  40400001  1A87879A  D6685090  D1446800
D1F82200  4750D778  47F0D788  6800D1E0  6D00D0D0  6000D1E0  47F0D5E0
41F00004  58E0D000  07FE58F0  D3941800  D6D5D6C6  F0F0F3F1*
02E3E7E3  40000868  40400038  40400001  45E0F004  00000006  00000028
45E0F008  0860D1F8  45E0F010  58F0D394  45E0F004  00000006  00000057
45E0F008  0450D16C  45E0F010  188618A6  D6D5D6C6  F0F0F3F2*
02E3E7E3  400008A0  40400014  40400001  58B0D3CC  58F0D394  45E0F004
00000006  000000B0  40404040  40404040  40404040  40404040  40404040
40404040  40404040  40404040  40404040  D6D5D6C6  F0F0F3F3*
02D9D3C4  40404040  40400038  40404040  00020001  0C000458  00030001
1C00045C  00040001  1C000460  00050001  1C000464  00060001  1C000468
00010001  0C000870  00010001  0C00088C  D6D5D6C6  F0F0F3F4*
02E3E7E3  400008B4  40400038  40400001  45E0F008  0868D268  45E0F008
0868D328  45E0F008  0868D350  45E0F008  0860D1F8  45E0F010  878AD7D4
41F00004  58E0D000  07FE58A0  D00458E0  D6D5D6C6  F0F0F3F5*
02E3E7E3  400008EC  40400038  40400001  A00C58B0  A0185810  B0007820
D1947020  10005820  B0047840  D1987040  20005830  B0087860  D1487060
30005840  B00C7800  D14C7000  40005850  D6D5D6C6  F0F0F3F6*
02E3E7E3  40000924  40400038  40400001  B0107820  D1507020  50005860
```

B0147840 D1547040 60005870 B0187860 D1587060 70005880 B01C7800
D15C7000 80005890 B0207820 D1607020 D6D5D6C6 F0F0F3F7*
02E3E7E3 4000095C 40400038 40400001 90005810 B0247840 D1647040
10005820 B0287860 D1687060 20005830 B02C7800 D1907000 30005840
B0307820 D18C7020 400018DA 92FFA00C D6D5D6C6 F0F0F3F8*
02E3E7E3 40000994 40400038 40400001 982CA01C 07FE987B 10007820
70007020 D1947820 80007020 D1987820 90007020 D1487820 A0007020

MEMBER NAME ONOFF
D14C7820 B0007020 D150987B 10147820 D6D5D6C6 F0F0F3F9*
02E3E7E3 400009CC 40400038 40400001 70007020 D1547820 80007020
D1587820 90007020 D15C7820 A0007020 D1607820 B0007020 D1649879
10287820 70007020 D1687820 80007020 D6D5D6C6 F0F0F4F0**
02E3E7E3 40000A04 4040000E 40400001 D1907820 90007020 D18C47F0
D3E04040 40404040 40404040 40404040 40404040 40404040 40404040
40404040 40404040 40404040 40404040 D6D5D6C6 F0F0F4F1*
02E3E7E3 40000020 40400008 40400001 0000099A 000000D0 40404040
40404040 40404040 40404040 40404040 40404040 40404040 40404040
40404040 40404040 40404040 40404040 D6D5D6C6 F0F0F4F2*
02E3E7E3 400000D0 40400004 40400001 000008E6 40404040 40404040
40404040 40404040 40404040 40404040 40404040 40404040 40404040
40404040 40404040 40404040 40404040 D6D5D6C6 F0F0F4F3*
02E3E7E3 4000011C 40400010 40400001 000002D0 000002E0 000002F8
00000308 40404040 40404040 40404040 40404040 40404040 40404040
40404040 40404040 40404040 40404040 D6D5D6C6 F0F0F4F4*
02D9D3C4 40404040 40400038 40404040 00010001 0C0008B0 00010001
0C000020 00010001 0C000024 00010001 0C0000D0 00010001 0C00011C
00010001 0C000120 00010001 0C000124 D6D5D6C6 F0F0F4F5*
02E3E7E3 4000012C 4040001C 40400001 00000338 00000270 00000280
00000290 800002A0 000002D8 000002E8 40404040 40404040 40404040
40404040 40404040 40404040 40404040 D6D5D6C6 F0F0F4F6*
02D9D3C4 40404040 40400038 40404040 00010001 0C000128 00010001
0C00012C 00010001 0C000130 00010001 0C000134 00010001 0C000138
00010001 0C00013C 00010001 0C000140 D6D5D6C6 F0F0F4F7*
02E3E7E3 40000148 4040001C 40400001 00000300 00000310 00000338
00000278 00000288 00000298 800002A8 40404040 40404040 40404040
40404040 40404040 40404040 40404040 D6D5D6C6 F0F0F4F8*
02D9D3C4 40404040 40400038 40404040 00010001 0C000144 00010001
0C000148 00010001 0C00014C 00010001 0C000150 00010001 0C000154
00010001 0C000158 00010001 0C00015C D6D5D6C6 F0F0F4F9*
02E3E7E3 40000164 4040001C 40400001 0000023C 00000340 00000400
00000428 000003D0 00000370 000003A0 40404040 40404040 40404040
40404040 40404040 40404040 40404040 D6D5D6C6 F0F0F5F0**
02D9D3C4 40404040 40400038 40404040 00010001 0C000160 00010001
0C000164 00010001 0C000168 00010001 0C00016C 00010001 0C000170
00010001 0C000174 00010001 0C000178 D6D5D6C6 F0F0F5F1*
02E3E7E3 40000180 40400010 40400001 800002C8 00000318 00000320
80000328 40404040 40404040 40404040 40404040 40404040 40404040
40404040 40404040 40404040 40404040 D6D5D6C6 F0F0F5F2*
02E3E7E3 4000046C 40400038 40400001 00000000 00000000 00000000
00000000 00000000 00000000 00000000 00000000 00000000 00000000
00000000 00000008 00000030 00000000 D6D5D6C6 F0F0F5F3*
02E3E7E3 400004A4 4040000C 40400001 00000000 00000000 00000000
40404040 40404040 40404040 40404040 40404040 40404040 40404040
40404040 40404040 40404040 40404040 D6D5D6C6 F0F0F5F4*
02D9D3C4 40404040 40400028 40404040 00010001 0C00017C 00010001
0C000180 00010001 0C000184 00010001 0C000188 00010001 0C00018C
40404040 40404040 40404040 40404040 D6D5D6C6 F0F0F5F5*
02C5D5C4 40404040 40404040 40404040 40404040 40404040 40404040

```
00000A12  F1F5F7F3  F460C6D6  F34040F0  F2F0F2F8  F7F0F9F8  40F0F84B
F4F14BF1  F3404040  D6D5D6C6  C6404040  D6D5D6C6  F0F0F5F6**

MEMBER NAME  ORDER
02C5E2C4  40404040  40400010  40400001  D6D9C4C5  D9404040  00000000
40000000  40404040  40404040  40404040  40404040  40404040  40404040
40404040  40404040  40404040  40404040  D6D9C4C5  F0F0F0F1*
02E3E7E3  40000000  40400028  40400001  47F0F00C  07D6D9C4  C5D94040
90ECD00C  184D98CD  F0205040  D00450D0  400807FC  40404040  40404040
40404040  40404040  40404040  40404040  D6D9C4C5  F0F0F0F2*
02E3E7E3  400000A8  40400014  40400001  00000001  00000002  00000008
00000000  00000000  40404040  40404040  40404040  40404040  40404040
40404040  40404040  40404040  40404040  D6D9C4C5  F0F0F0F3*
02C5E2C4  40404040  40400010  40400002  D4E5C3C8  D9404040  02000000
40000000  40404040  40404040  40404040  40404040  40404040  40404040
40404040  40404040  40404040  40404040  D6D9C4C5  F0F0F0F4*
02E3E7E3  40003F60  40400004  40400001  00000000  40404040  40404040
40404040  40404040  40404040  40404040  40404040  40404040  40404040
40404040  40404040  40404040  40404040  D6D9C4C5  F0F0F0F5*
02C5E2C4  40404040  40400010  40400003  D4E5C3C8  D9D34040  02000000
40000000  40404040  40404040  40404040  40404040  40404040  40404040
40404040  40404040  40404040  40404040  D6D9C4C5  F0F0F0F6*
02E3E7E3  40003F68  40400008  40400001  00000000  00000000  40404040
40404040  40404040  40404040  40404040  40404040  40404040  40404040
40404040  40404040  40404040  40404040  D6D9C4C5  F0F0F0F7*
02E3E7E3  40003F80  40400038  40400001  58B0C000  58A0C014  5890D080
5880D084  5860C01C  5830C010  5800D09C  5900D098  4770C048  5090D09C
5990D09C  4770C058  1BFF58E0  D00007FE  D6D9C4C5  F0F0F0F8*
02E3E7E3  40003FB8  40400038  40400001  5980D09C  4770C0BE  5820D098
1B298920  00035020  D0A0410A  B0005000  D0504106  B0005000  D0549280
D05458F0  C00C4110  D04C05EF  5850D098  D6D9C4C5  F0F0F0F9*
02E3E7E3  40003FF0  40400038  40400001  5C40D088  18231A25  4102B000
5000D05C  410AB000  5000D060  9280D060  58F0C008  4110D058  05EF1BFF
58E0D000  07FE5820  D09C1B28  89200003  D6D9C4C5  F0F0F1F0**
02E3E7E3  40004028  40400038  40400001  5020D0A4  4100D0B0  5000D068
4106B000  5000D06C  9280D06C  58F0C00C  4110D064  05EF5820  D0985B20
D09C1A29  89200003  5020D0A8  5850D09C  D6D9C4C5  F0F0F1F1*
02E3E7E3  40004060  40400038  40400001  5C40D088  18231A25  410AB000
5000D074  4102B000  5000D078  9280D078  58F0C00C  4110D070  05EF5850
D0985B50  D09C1875  1A781857  5C40D088  D6D9C4C5  F0F0F1F2*
02E3E7E3  40004098  40400038  40400001  18231A25  4102B000  5000D068
4100D0B0  5000D06C  9280D06C  58F0C00C  4110D064  05EF5850  D0985C40
D0881823  1A254102  B0005000  D05C410A  D6D9C4C5  F0F0F1F3*
02E3E7E3  400040D0  40400038  40400001  B0005000  D0609280  D06058F0
C0084110  D05805EF  1BFF58E0  D00007FE  58A0D004  58E0A00C  58B0A018
5810B004  5820D098  50201000  5830B008  D6D9C4C5  F0F0F1F4*
02E3E7E3  40004108  40400038  40400001  5840D09C  50403000  18DA92FF
A00C982C  A01C07FE  58C0D048  98781004  58207000  5020D098  58208000
5020D09C  58201000  41302000  41500004  D6D9C4C5  F0F0F1F5*
02E3E7E3  40004140  40400014  40400001  1B255C40  D0841B25  5020C000
5030C004  47F0C020  40404040  40404040  40404040  40404040  40404040
40404040  40404040  40404040  40404040  D6D9C4C5  F0F0F1F6*
02E3E7E3  40000020  4040000C  40400001  0000411C  00000028  000040EC
40404040  40404040  40404040  40404040  40404040  40404040  40404040
40404040  40404040  40404040  40404040  D6D9C4C5  F0F0F1F7*
02E3E7E3  40000070  40400008  40400001  00003F60  000000C8  40404040
40404040  40404040  40404040  40404040  40404040  40404040  40404040
40404040  40404040  40404040  40404040  D6D9C4C5  F0F0F1F8*
02E3E7E3  4000007C  40400008  40400001  80000000  000000B0  40404040
```

```
40404040  40404040  40404040  40404040  40404040  40404040  40404040
40404040  40404040  40404040  40404040  D6D9C4C5  F0F0F1F9*
02D9D3C4  40404040  40400038  40404040  00020001  1C003F68  00030001

MEMBER NAME  ORDER
1C003F6C  00010001  0C000020  00010001  0C000024  00010001  0C000028
00010001  0C000070  00010001  0C000074  D6D9C4C5  F0F0F2F0**
02E3E7E3  40000088  40400008  40400001  80000000  000000CC  40404040
40404040  40404040  40404040  40404040  40404040  40404040  40404040
40404040  40404040  40404040  40404040  D6D9C4C5  F0F0F2F1*
02E3E7E3  40000094  40400008  40400001  80000000  000000D0  40404040
40404040  40404040  40404040  40404040  40404040  40404040  40404040
40404040  40404040  40404040  40404040  D6D9C4C5  F0F0F2F2*
02E3E7E3  400000A0  40400004  40400001  80000000  40404040  40404040
40404040  40404040  40404040  40404040  40404040  40404040  40404040
40404040  40404040  40404040  40404040  D6D9C4C5  F0F0F2F3*
02E3E7E3  40003F70  40400010  40400001  00000004  0000000C  00000010
00000014  40404040  40404040  40404040  40404040  40404040  40404040
40404040  40404040  40404040  40404040  D6D9C4C5  F0F0F2F4*
02D9D3C4  40404040  40400018  40404040  00010001  0C000080  00010001
0C00008C  00010001  0C000098  40404040  40404040  40404040  40404040
40404040  40404040  40404040  40404040  D6D9C4C5  F0F0F2F5*
02C5D5C4  40404040  40404040  40404040  40404040  40404040  40404040
00004154  F1F5F7F3  F460C6D6  F34040F0  F2F0F2F8  F7F0F9F8  40F0F84B
F4F14BF1  F8404040  D6D9C4C5  D9404040  D6D9C4C5  F0F0F2F6**

MEMBER NAME  OVRLAP
02C5E2C4  40404040  40400010  40400001  D6E5D9D3  C1D74040  00000000
40000000  40404040  40404040  40404040  40404040  40404040  40404040
40404040  40404040  40404040  40404040  D6E5D9D3  F0F0F0F1*
02E3E7E3  40000000  40400028  40400001  47F0F00C  07D6E5D9  D3C1D740
90ECD00C  184D98CD  F0205040  D00450D0  400807FC  40404040  40404040
40404040  40404040  40404040  40404040  D6E5D9D3  F0F0F0F2*
02E3E7E3  400000C8  40400038  40400001  00000000  00000000  4F080000
00000000  00000000  00000001  00000002  00000003  00000004  0000000C
41100000  41200000  41300000  41400000  D6E5D9D3  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  D6E5D9D3  F0F0F0F4*
02E3E7E3  40000100  40400008  40400001  00000000  00000000  40404040
40404040  40404040  40404040  40404040  40404040  40404040  40404040
40404040  40404040  40404040  40404040  D6E5D9D3  F0F0F0F5*
02C5E2C4  40404040  40400010  40400003  E2D8D9E3  40404040  02000000
40000000  40404040  40404040  40404040  40404040  40404040  40404040
40404040  40404040  40404040  40404040  D6E5D9D3  F0F0F0F6*
02C5E2C4  40404040  40400010  40400004  C2E2D6D9  E3404040  02000000
40000000  40404040  40404040  40404040  40404040  40404040  40404040
40404040  40404040  40404040  40404040  D6E5D9D3  F0F0F0F7*
02E3E7E3  400001F0  4040000C  40400001  00000000  00000000  00000000
40404040  40404040  40404040  40404040  40404040  40404040  40404040
40404040  40404040  40404040  40404040  D6E5D9D3  F0F0F0F8*
02E3E7E3  4000017C  40400038  40400001  00000005  00000004  C6D34040
C1404040  00000009  00000004  C6D34040  C1404040  00000005  00000004
C6D34040  C1404040  00000009  00000004  D6E5D9D3  F0F0F0F9*
02E3E7E3  400001B4  40400008  40400001  C6D34040  C1404040  40404040
40404040  40404040  40404040  40404040  40404040  40404040  40404040
40404040  40404040  40404040  40404040  D6E5D9D3  F0F0F1F0**
02E3E7E3  4000021C  40400038  40400001  5870D0D8  7800D0B0  7000D144
7860D0FC  7B60D100  7060D0E0  7840D0F0  7B40D0EC  7040D0E4  7820D0EC
```

```
7C20D100  7800D0F0  7C00D0FC  3B207020  D6E5D9D3  F0F0F1F1*
02E3E7E3  40000254  40400038  40400001  D0E87C60  D0F43804  7C00D104
3A603A62  30667060  D1E47820  D0E03C22  3C443A24  7020D1E8  58F0D1CC
4110D04C  05EF7000  D1EC7800  D1E47D00  D6E5D9D3  F0F0F1F2*
02E3E7E3  4000028C  40400038  40400001  D1EC7000  D12C7820  D0E07C20
D0F87840  D0E47C40  D1083A24  7A20D0E8  30227D20  D1EC7020  D1307860
D1047B60  D1087060  D0E07840  D0F87B40  D6E5D9D3  F0F0F1F3*
02E3E7E3  400002C4  40400038  40400001  D0F47040  D0E47820  D0F47C20
D1087800  D0F87C00  D1043B20  7020D0E8  7C60D0EC  38047C00  D0FC3A60
3A623066  7060D1E4  7820D0E0  3C223C44  D6E5D9D3  F0F0F1F4*
02E3E7E3  400002FC  40400038  40400001  3A247020  D1E858F0  D1CC4110
D05405EF  7000D1EC  7840D1E4  3D407820  D0E07C20  D0F07860  D0E47C60
D1003A26  7A20D0E8  30227D20  D1EC7800  D6E5D9D3  F0F0F1F5*
02E3E7E3  40000334  40400038  40400001  D12C58F0  D1C87900  F0044120
00014720  D3201B22  14227940  F0044130  00014720  D3301B33  14327920
F0044120  00014720  D3401B22  14238727  D6E5D9D3  F0F0F1F6*
02E3E7E3  4000036C  40400038  40400001  D34E1BFF  58E0D000  07FE7800
D0C87000  D1947800  D0EC7000  D1987800  D0FC7000  D19C7800  D0CC7000
D1A07800  D0F07000  D1A47800  D1007000  D6E5D9D3  F0F0F1F7*
02E3E7E3  400003A4  40400038  40400001  D1A87800  D0D07000  D1AC7800
D0F47000  D1B07800  D1047000  D1B47800  D0D47000  D1B87800  D0F87000
D1BC7800  D1087000  D1C058F0  D1D04110  D6E5D9D3  F0F0F1F8*
02E3E7E3  400003DC  40400038  40400001  D05C05EF  7820D0EC  7B20D0F0
30227840  D0FC7B40  D1003044  7040D14C  58F0D1C8  7920F004  47A0D3E6
58F0D1D0  4110D070  05EF7800  D14C58F0  D6E5D9D3  F0F0F1F9*
02E3E7E3  40000414  40400038  40400001  D1C87900  F00447A0  D40058F0

MEMBER NAME  OVRLAP
D1D04110  D08405EF  2B007800  D1946A00  D0A86000  D0A05890  D0A42B00
7800D1A0  6A00D0A8  6000D0A0  5880D0A4  D6E5D9D3  F0F0F2F0**
02E3E7E3  4000044C  40400038  40400001  2B007800  D1AC6A00  D0A86000
D0A058A0  D0A42B00  7800D1B8  6A00D0A8  6000D0A0  58B0D0A4  5990D0B4
41200001  4780D456  1B225990  D0B84130  D6E5D9D3  F0F0F2F1*
02E3E7E3  40000484  40400038  40400001  00014780  D4641B33  16235980
D0B44130  00014780  D4741B33  5980D0B8  41400001  4780D482  1B441634
14238727  D4921BFF  58E0D000  07FE59A0  D6E5D9D3  F0F0F2F2*
02E3E7E3  400004BC  40400038  40400001  D0B44120  00014780  D4A01B22
59A0D0B8  41300001  4780D4AE  1B331623  59B0D0B4  41300001  4780D4BE
1B3359B0  D0B84140  00014780  D4CC1B44  D6E5D9D3  F0F0F2F3*
02E3E7E3  400004F4  40400038  40400001  16341423  8727D4DC  1BFF58E0
D00007FE  7820D1A4  7020D1D4  7840D1B0  7040D1DC  3B247840  D1A87040
D1D87860  D1B47060  D1E03B46  3C223C44  D6E5D9D3  F0F0F2F4*
02E3E7E3  4000052C  40400038  40400001  3A247020  D1E458F0  D1CC4110
D09805EF  7000D1E8  7820D0EC  7B20D0F0  7840D0FC  7B40D100  3C223C44
3A247020  D1E458F0  D1CC4110  D09C05EF  D6E5D9D3  F0F0F2F5*
02E3E7E3  40000564  40400038  40400001  7000D1EC  7800D1E8  7D00D1EC
7000D144  7820D1E8  7B20D1EC  30227840  D0CC58F0  D1C87C40  F0043924
47A0D570  7800D0C8  7000D144  7800D1D4  D6E5D9D3  F0F0F2F6*
02E3E7E3  4000059C  40400038  40400001  7000D118  7800D1D8  7000D120
7800D1DC  7000D11C  7800D1E0  7000D124  1BFF58E0  D00007FE  58A0D004
58E0A00C  58B0A018  5810B000  7820D0EC  D6E5D9D3  F0F0F2F7*
02E3E7E3  400005D4  40400038  40400001  70201000  5820B004  7840D0FC
70402000  5830B008  7860D0F0  70603000  5840B00C  7800D100  70004000
5850B010  7820D0F4  70205000  5860B014  D6E5D9D3  F0F0F2F8*
02E3E7E3  4000060C  40400038  40400001  7840D104  70406000  5870B018
7860D0F8  70607000  5880B01C  7800D108  70008000  5890B020  7820D144
70209000  5810B024  7840D118  70401000  D6E5D9D3  F0F0F2F9*
02E3E7E3  40000644  40400038  40400001  5820B028  7860D120  70602000
5830B02C  7800D11C  70003000  5840B030  7820D124  70204000  18DA92FF
```

```
A00C982C  A01C07FE  987B1000  78207000  D6E5D9D3  F0F0F3F0**
02E3E7E3  4000067C  40400038  40400001  7020D0EC  78208000  7020D0FC
78209000  7020D0F0  7820A000  7020D100  7820B000  7020D0F4  987B1014
78207000  7020D104  78208000  7020D0F8  D6E5D9D3  F0F0F3F1*
02E3E7E3  400006B4  40400038  40400001  78209000  7020D108  7820A000
7020D144  7820B000  7020D118  98791028  78207000  7020D120  78208000
7020D11C  78209000  7020D124  47F0D1F4  D6E5D9D3  F0F0F3F2*
02E3E7E3  40000020  4040000C  40400001  00000674  00000028  000005C0
40404040  40404040  40404040  40404040  40404040  40404040  40404040
40404040  40404040  40404040  40404040  D6E5D9D3  F0F0F3F3*
02E3E7E3  40000074  4040000C  40400001  80000210  80000000  80000210
40404040  40404040  40404040  40404040  40404040  40404040  40404040
40404040  40404040  40404040  40404040  D6E5D9D3  F0F0F3F4*
02D9D3C4  40404040  40400038  40404040  00020001  0C0001F0  00030001
1C0001F4  00040001  1C0001F8  00010001  0C000020  00010001  0C000024
00010001  0C000028  00010001  0C000074  D6E5D9D3  F0F0F3F5*
02E3E7E3  40000080  40400020  40400001  80000000  0000017C  000000E0
000001BC  000000EC  800000E8  000001AC  000000DC  40404040  40404040
40404040  40404040  40404040  40404040  D6E5D9D3  F0F0F3F6*
02D9D3C4  40404040  40400038  40404040  00010001  0C00007C  00010001
0C000084  00010001  0C000088  00010001  0C00008C  00010001  0C000090
00010001  0C000094  00010001  0C000098  D6E5D9D3  F0F0F3F7*
02E3E7E3  400000A0  4040001C  40400001  000001BC  000000EC  800000E8
0000019C  000000DC  000001BC  000000EC  40404040  40404040  40404040
40404040  40404040  40404040  40404040  D6E5D9D3  F0F0F3F8*
02D9D3C4  40404040  40400038  40404040  00010001  0C00009C  00010001
0C0000A0  00010001  0C0000A4  00010001  0C0000A8  00010001  0C0000AC

MEMBER NAME  OVRLAP
00010001  0C0000B0  00010001  0C0000B4  D6E5D9D3  F0F0F3F9*
02E3E7E3  400000BC  4040000C  40400001  800000E8  8000020C  8000020C
40404040  40404040  40404040  40404040  40404040  40404040  40404040
40404040  40404040  40404040  40404040  D6E5D9D3  F0F0F4F0**
02E3E7E3  400001FC  40400020  40400001  00000000  00000000  00000000
00000000  00000000  00000000  00000000  00000000  40404040  40404040
40404040  40404040  40404040  40404040  D6E5D9D3  F0F0F4F1*
02D9D3C4  40404040  40400020  40404040  00010001  0C0000B8  00010001
0C0000BC  00010001  0C0000C0  00010001  0C0000C4  40404040  40404040
40404040  40404040  40404040  40404040  D6E5D9D3  F0F0F4F2*
02C5D5C4  40404040  40404040  40404040  40404040  40404040  40404040
000006EC  F1F5F7F3  F460C6D6  F34040F0  F2F0F2F8  F7F0F9F8  40F0F84B
F4F14BF2  F2404040  D6E5D9D3  C1D74040  D6E5D9D3  F0F0F4F3**

MEMBER NAME  PCHART
02C5E2C4  40404040  40400010  40400001  D7C3C8C1  D9E34040  00000000
40000000  40404040  40404040  40404040  40404040  40404040  40404040
40404040  40404040  40404040  40404040  D7C3C8C1  F0F0F0F1*
02E3E7E3  40000000  40400038  40400001  47F0F00C  07D7C3C8  C1D9E340
90ECD00C  184D98CD  F0205040  D00450D0  400807FC  40404040  40404040
021A19C4  C1E3C140  C3C1D4C5  40C6D9D6  D7C3C8C1  F0F0F0F2*
02E3E7E3  40000038  40400038  40400001  D440D4D6  C4C5D340  7E7E6E40
06141401  1A054040  D6D54006  0214041A  0440C1E3  40060214  0422021A
0DD7C9C5  D9C3C540  D7D6C9D5  E3401005  D7C3C8C1  F0F0F0F3*
02E3E7E3  40000070  40400038  40400001  1A074040  C4C1E2C8  40100418
0A220206  1E140122  021A0561  5CC5D6C6  22021A2F  4040C5D9  D9D6D940
C9D540C1  40C3C1C4  C1D440D9  D6E4E3C9  D7C3C8C1  F0F0F0F4*
02E3E7E3  400000A8  40400038  40400001  D5C540C9  D540D7C3  C8C1D9E3
40E2E4C2  D9D6E4E3  C9D5C522  021A0ED9  C5C6C9D3  C540C5D9  D9D6D97E
4010031A  0A40C9D5  40D7C3C8  C1D9E322  D7C3C8C1  F0F0F0F5*
```

| | | | | | | |
|---|---|---|---|---|---|---|
| 02E3E7E3 | 400002F0 | 40400038 | 40400001 | 00000000 | 00000000 | 00000001 |
| 00000002 | 00000003 | 00000004 | 00000008 | 00000009 | 00000010 | 0000001E |
| 00000049 | 00000058 | 0000005D | 00000070 | D7C3C8C1 | F0F0F0F6* | |
| 02E3E7E3 | 40000328 | 40400038 | 40400001 | 00000080 | 00000098 | 00000BB8 |
| 401DF3B6 | 4029FBE7 | 4029FFD6 | 403EF9DB | 40400000 | 41100000 | 41200000 |
| 41355C29 | 4145BE77 | 414F70A4 | 41555C29 | D7C3C8C1 | F0F0F0F7* | |
| 02E3E7E3 | 40000360 | 40400020 | 40400001 | 4159999A | 418B3333 | 41C00000 |
| 41D40000 | 41F00000 | 42100000 | 00000000 | 00000000 | 40404040 | 40404040 |
| 40404040 | 40404040 | 40404040 | 40404040 | D7C3C8C1 | F0F0F0F8* | |
| 02C5E2C4 | 40404040 | 40400010 | 40400002 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | D7C3C8C1 | F0F0F0F9* | |
| 02C5E2C4 | 40404040 | 40400010 | 40400003 | D6D7E3C9 | D6D54040 | 05000000 |
| 40000020 | 40404040 | 40404040 | 40404040 | 40404040 | 40404040 | 40404040 |
| 40404040 | 40404040 | 40404040 | 40404040 | D7C3C8C1 | F0F0F1F0** | |
| 02C5E2C4 | 40404040 | 40400010 | 40400004 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | D7C3C8C1 | F0F0F1F1* | |
| 02C5E2C4 | 40404040 | 40400010 | 40400005 | C7D9E4D7 | 40404040 | 05000000 |
| 4000000C | 40404040 | 40404040 | 40404040 | 40404040 | 40404040 | 40404040 |
| 40404040 | 40404040 | 40404040 | 40404040 | D7C3C8C1 | F0F0F1F2* | |
| 02C5E2C4 | 40404040 | 40400010 | 40400006 | D4E2C9E9 | C5404040 | 05000000 |
| 4000000C | 40404040 | 40404040 | 40404040 | 40404040 | 40404040 | 40404040 |
| 40404040 | 40404040 | 40404040 | 40404040 | D7C3C8C1 | F0F0F1F3* | |
| 02C5E2C4 | 40404040 | 40400010 | 40400007 | C1D9C3D6 | E2404040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F1F4* | |
| 02E3E7E3 | 40002A60 | 40400020 | 40400001 | 000029A0 | FFFFFFFF | 00000000 |
| FFFFFFA0 | 00001130 | 00000000 | 00000000 | 00000000 | 40404040 | 40404040 |
| 40404040 | 40404040 | 40404040 | 40404040 | D7C3C8C1 | F0F0F1F5* | |
| 02D9D3C4 | 40404040 | 40400038 | 40404040 | 00010001 | 0C002A60 | 00020001 |
| 0C002A64 | 00030001 | 0C002A68 | 00040001 | 0C002A6C | 00040001 | 0C002A70 |
| 00050001 | 0C002A74 | 00060001 | 0C002A78 | D7C3C8C1 | F0F0F1F6* | |
| 02C5E2C4 | 40404040 | 40400010 | 40400008 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F1F7* | |
| 02C5E2C4 | 40404040 | 40400010 | 40400009 | C4C9E3E3 | D6404040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F1F8* | |
| 02C5E2C4 | 40404040 | 40400010 | 4040000A | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F1F9* | |
| 02C5E2C4 | 40404040 | 40400010 | 4040000B | C2C5C7C4 | C5E34040 | 02000000 |

MEMBER NAME PCHART

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | D7C3C8C1 | F0F0F2F0** | |
| 02C5E2C4 | 40404040 | 40400010 | 4040000C | C3C1C4C6 | C9D34040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F2F1* | |
| 02C5E2C4 | 40404040 | 40400010 | 4040000D | C3C1C4D5 | D7C44040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F2F2* | |
| 02C5E2C4 | 40404040 | 40400010 | 4040000E | C3C1C4D5 | E2C84040 | 02000000 |
| 40000000 | 40404040 | 40404040 | 40404040 | 40404040 | 40404040 | 40404040 |
| 40404040 | 40404040 | 40404040 | 40404040 | D7C3C8C1 | F0F0F2F3* | |
| 02E3E7E3 | 40002A80 | 4040001C | 40400001 | 00000000 | 00000000 | 00000000 |
| 00000000 | 00000000 | 00000000 | 00000000 | 40404040 | 40404040 | 40404040 |
| 40404040 | 40404040 | 40404040 | 40404040 | D7C3C8C1 | F0F0F2F4* | |

```
02D9D3C4  40404040  40400038  40404040  00070001  1C002A7C  00080001
1C002A80  00090001  1C002A84  000A0001  1C002A88  000B0001  1C002A8C
000C0001  1C002A90  000D0001  1C002A94  D7C3C8C1  F0F0F2F5*
02C5E2C4  40404040  40400010  4040000F  C3C1C4E2  D7C34040  02000000
40000000  40404040  40404040  40404040  40404040  40404040  40404040
40404040  40404040  40404040  40404040  D7C3C8C1  F0F0F2F6*
02C5E2C4  40404040  40400010  40400010  C3C1C4E2  E4D74040  02000000
40000000  40404040  40404040  40404040  40404040  40404040  40404040
40404040  40404040  40404040  40404040  D7C3C8C1  F0F0F2F7*
02C5E2C4  40404040  40400010  40400011  C5D5C4C4  C5E34040  02000000
40000000  40404040  40404040  40404040  40404040  40404040  40404040
40404040  40404040  40404040  40404040  D7C3C8C1  F0F0F2F8*
02C5E2C4  40404040  40400010  40400012  C8C7C4C1  E3C54040  02000000
40000000  40404040  40404040  40404040  40404040  40404040  40404040
40404040  40404040  40404040  40404040  D7C3C8C1  F0F0F2F9*
02C5E2C4  40404040  40400010  40400013  C8C7E3C9  D4C54040  02000000
40000000  40404040  40404040  40404040  40404040  40404040  40404040
40404040  40404040  40404040  40404040  D7C3C8C1  F0F0F3F0**
02C5E2C4  40404040  40400010  40400014  C9C2C3D6  D47B4040  02000000
40000000  40404040  40404040  40404040  40404040  40404040  40404040
40404040  40404040  40404040  40404040  D7C3C8C1  F0F0F3F1*
02C5E2C4  40404040  40400010  40400015  C9C3D5E3  C5D94040  02000000
40000000  40404040  40404040  40404040  40404040  40404040  40404040
40404040  40404040  40404040  40404040  D7C3C8C1  F0F0F3F2*
02E3E7E3  40002A9C  4040001C  40400001  00000000  00000000  00000000
00000000  00000000  00000000  00000000  40404040  40404040  40404040
40404040  40404040  40404040  40404040  D7C3C8C1  F0F0F3F3*
02D9D3C4  40404040  40400038  40404040  000E0001  1C002A98  000F0001
1C002A9C  00100001  1C002AA0  00110001  1C002AA4  00120001  1C002AA8
00130001  1C002AAC  00140001  1C002AB0  D7C3C8C1  F0F0F3F4*
02C5E2C4  40404040  40400010  40400016  D4D6C4E2  D9E34040  02000000
40000000  40404040  40404040  40404040  40404040  40404040  40404040
40404040  40404040  40404040  40404040  D7C3C8C1  F0F0F3F5*
02C5E2C4  40404040  40400010  40400017  D7C3E3C7  C5E34040  02000000
40000000  40404040  40404040  40404040  40404040  40404040  40404040
40404040  40404040  40404040  40404040  D7C3C8C1  F0F0F3F6*
02C5E2C4  40404040  40400010  40400018  D7E2E3D9  C5E24040  02000000
40000000  40404040  40404040  40404040  40404040  40404040  40404040
40404040  40404040  40404040  40404040  D7C3C8C1  F0F0F3F7*
02E3E7E3  40002AB8  4040000C  40400001  00000000  00000000  00000000
40404040  40404040  40404040  40404040  40404040  40404040  40404040
40404040  40404040  40404040  40404040  D7C3C8C1  F0F0F3F8*
02E3E7E3  400029C0  40400038  40400001  C3D6D7E8  D9C9C7C8  E3404DC3
5D40F1F9  F8F640E3  C8C540C2  D6C5C9D5  C740C3D6  D4D7C1D5  E85BC1D3

MEMBER NAME  PCHART
D340D9C9  C7C8E3E2  40D9C5E2  C5D9E5C5  D7C3C8C1  F0F0F3F9*
02E3E7E3  400029F8  40400038  40400001  C45B5BE2  D3C9C340  E5C5D9E2
C9D6D540  E7E7E7E7  40404040  40404040  4040C4C1  E3C57A40  E7E761E7
E761E7E7  40404040  40E3C9D4  C57A40E7  D7C3C8C1  F0F0F4F0**
02E3E7E3  40002A30  40400028  40400001  E77AE7E7  7AE7E740  5B5BD7C9
C5D9C3C5  40C3C8C1  D9E3E240  D4D6C4C5  D3404040  40404040  40404040
40404040  40404040  40404040  40404040  D7C3C8C1  F0F0F4F1*
02E3E7E3  40002ACC  40400038  40400001  5880C004  58A0C014  58B0C000
5890D298  5860D22C  5850D250  7800D268  33007000  C06458F0  C01C4110
D09405EF  7D00D26C  7000D2C8  58F0C018  D7C3C8C1  F0F0F4F2*
02E3E7E3  40002B04  40400038  40400001  5870F008  1A755800  D2185000
D2A058F0  C05C4110  D09805EF  5800D2D4  12004730  C0CE1BFF  58E0D000
07FE58F0  C04C4110  D0A405EF  58F0C048  D7C3C8C1  F0F0F4F3*
```

| | | | | | | |
|---|---|---|---|---|---|---|
| 02E3E7E3 | 40002B3C | 40400038 | 40400001 | 4110D0A8 | 05EF4100 | B07C5000 |
| D0B04100 | D3345000 | D0B49280 | D0B458F0 | C0284110 | D0AC05EF | 4100B08F |
| 5000D0B0 | 4100D33C | 5000D0B4 | 9280D0B4 | D7C3C8C1 | F0F0F4F4* | |
| 02E3E7E3 | 40002B74 | 40400038 | 40400001 | 58F0C028 | 4110D0AC | 05EF4100 |
| B0685000 | D0BC58F0 | C0284110 | D0B805EF | 58F0C050 | 45E0F004 | 00000009 |
| 00000028 | 45E0F00C | 00000000 | 01200014 | D7C3C8C1 | F0F0F4F5* | |
| 02E3E7E3 | 40002BAC | 40400014 | 40400001 | 45E0F00C | 00000414 | 04500002 |
| 45E0F00C | 0000041C | 40404040 | 40404040 | 40404040 | 40404040 | 40404040 |
| 40404040 | 40404040 | 40404040 | 40404040 | D7C3C8C1 | F0F0F4F6* | |
| 02D9D3C4 | 40404040 | 40400038 | 40404040 | 00150001 | 1C002AB4 | 00160001 |
| 1C002AB8 | 00170001 | 1C002ABC | 00180001 | 1C002AC0 | 00010001 | 0C002B9C |
| 00020001 | 0C002BA4 | 00010001 | 0C002BB0 | D7C3C8C1 | F0F0F4F7* | |
| 02E3E7E3 | 40002BC0 | 40400038 | 40400001 | 04500002 | 45E0F010 | 58F0C008 |
| 5800F008 | 8609C248 | 5800D210 | 5000D2B4 | 5800D2B4 | 5A00D218 | 5000D2B4 |
| 58F0C058 | 4110D0C4 | 05EF58F0 | C0284110 | D7C3C8C1 | F0F0F4F8* | |
| 02E3E7E3 | 40002BF8 | 40400038 | 40400001 | D0E405EF | 58F0C028 | 4110D0F0 |
| 05EF58F0 | C0204110 | D0FC05EF | 58F0C038 | 4110D108 | 05EF41E0 | 000415FE |
| 4720C1CA | 58EFD04C | 07FE7800 | D2907000 | D7C3C8C1 | F0F0F4F9* | |
| 02E3E7E3 | 40002C30 | 40400038 | 40400001 | D2C07800 | D2707000 | B00C7800 |
| D2883300 | 7000B010 | 7800D270 | 7000B014 | 7800D288 | 33007000 | B0187800 |
| D2947000 | D2DC58F0 | C0544110 | D11005EF | D7C3C8C1 | F0F0F5F0** | |
| 02E3E7E3 | 40002C68 | 40400038 | 40400001 | 5000D2BC | 7800D274 | 33007000 |
| C06458F0 | C0404110 | D11805EF | 41E00004 | 15FE4720 | C23058EF | D05407FE |
| 58F0C02C | 1B1105EF | 41E00004 | 15FE4720 | D7C3C8C1 | F0F0F5F1* | |
| 02E3E7E3 | 40002CA0 | 40400038 | 40400001 | C24858EF | D05C07FE | 58F0C060 |
| 4110D160 | 05EF58F0 | C0085800 | F0088609 | C3205800 | D3441000 | 5000D2CC |
| 58F0C050 | 45E0F004 | 00000000 | 0000005E | D7C3C8C1 | F0F0F5F2* | |
| 02E3E7E3 | 40002CD8 | 40400038 | 40400001 | 45E0F008 | 0450D2E8 | 45E0F008 |
| 0450D2CC | 45E0F010 | 58F0C050 | 45E0F000 | 00000000 | 0000007E | 45E0F134 |
| 00010000 | 0120D2FA | 0100001E | 00000001 | D7C3C8C1 | F0F0F5F3* | |
| 02E3E7E3 | 40002D10 | 40400038 | 40400001 | 45E0F010 | 7800D27C | 33007000 |
| C06458F0 | C0404110 | D17005EF | 41E00004 | 15FE4720 | C2D858EF | D06407FE |
| 7820D2C0 | 7A20D2C4 | 7A20D26C | 7B20D264 | D7C3C8C1 | F0F0F5F4* | |
| 02E3E7E3 | 40002D48 | 40400038 | 40400001 | 7020D2C0 | 58F0C044 | 4110D1B8 |
| 05EF41E0 | 000415FE | 4720C306 | 58EFD06C | 07FE58F0 | C0244110 | D1CC05EF |
| 41E00004 | 15FE4720 | C32058EF | D07407FE | D7C3C8C1 | F0F0F5F5* | |
| 02E3E7E3 | 40002D80 | 40400038 | 40400001 | 7820D2C4 | 7A20D2DC | 7A20D26C |
| 7020D2DC | 7820B010 | 7B20D2C4 | 7B20D26C | 7020B010 | 7820B018 | 7B20D2C4 |
| 7B20D26C | 7020B018 | 5800D2A0 | 12004750 | D7C3C8C1 | F0F0F5F6* | |
| 02E3E7E3 | 40002DB8 | 40400038 | 40400001 | C3DE58F0 | C05C4110 | D09805EF |
| 58F0C008 | 5800F008 | 8609C248 | 58F0C03C | 4110D1DC | 05EF41E0 | 000415FE |
| 4720C38A | 58EFD07C | 07FE5970 | D2A84730 | D7C3C8C1 | F0F0F5F7* | |
| 02E3E7E3 | 40002DF0 | 40400038 | 40400001 | C39E5960 | D2AC4780 | C39E47F0 |
| C23058F0 | C0344110 | D1E405EF | 41E00004 | 15FE4720 | C3B858EF | D08407FE |
| 58F0C030 | 4110D204 | 05EF5800 | D2F05900 | D7C3C8C1 | F0F0F5F8* | |

MEMBER NAME PCHART

| | | | | | | |
|---|---|---|---|---|---|---|
| 02E3E7E3 | 40002E28 | 40400038 | 40400001 | D2244780 | C3B85800 | D2F05900 |
| D2184770 | C47447F0 | C17C58F0 | C0085800 | F0088709 | C40058F0 | C0501800 |
| 45E0F004 | 00000009 | 00000084 | 45E0F010 | D7C3C8C1 | F0F0F5F9* | |
| 02E3E7E3 | 40002E60 | 40400038 | 40400001 | 58F0C008 | 5800F008 | 8709C414 |
| 1BFF58E0 | D00007FE | 58F0C034 | 4110D1E4 | 05EF41E0 | 000415FE | 4720C42E |
| 58EFD08C | 07FE58F0 | C0304110 | D20405EF | D7C3C8C1 | F0F0F6F0** | |
| 02E3E7E3 | 40002E98 | 40400038 | 40400001 | 5800D2F0 | 5900D224 | 4780C42E |
| 5800D2F0 | 5900D218 | 4770C474 | 1BFF58E0 | D00007FE | 58F0C050 | 45E0F004 |
| 00000006 | 0000008D | 45E0F010 | 1BFF58E0 | D7C3C8C1 | F0F0F6F1* | |
| 02E3E7E3 | 40002ED0 | 40400038 | 40400001 | D00007FE | 58F0C050 | 45E0F004 |
| 00000006 | 000000C0 | 45E0F008 | 0450D2F0 | 45E0F010 | 58F0C050 | 45E0F034 |
| 05404040 | F1F158D0 | D00458E0 | D00C92FF | D7C3C8C1 | F0F0F6F2* | |

| | | | | | | |
|---|---|---|---|---|---|---|
| 02E3E7E3 | 40002F08 | 40400010 | 40400001 | D00C982C | D01C07FE | 58C0D048 |
| 47F0C06C | 40404040 | 40404040 | 40404040 | 40404040 | 40404040 | 40404040 |
| 40404040 | 40404040 | 40404040 | 40404040 | D7C3C8C1 | F0F0F6F3* | |
| 02E3E7E3 | 40000020 | 40400008 | 40400001 | 00002F10 | 000000E0 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F6F4* | |
| 02D9D3C4 | 40404040 | 40400038 | 40404040 | 00010001 | 0C002BBC | 00010001 |
| 0C002CD4 | 00010001 | 0C002CF8 | 00010001 | 0C002E58 | 00010001 | 0C002EC4 |
| 00010001 | 0C002EE0 | 00010001 | 0C000020 | D7C3C8C1 | F0F0F6F5* | |
| 02E3E7E3 | 400000E0 | 40400004 | 40400001 | 00002EFE | 40404040 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F6F6* | |
| 02E3E7E3 | 40000128 | 40400018 | 40400001 | 00002A60 | 00002C2A | 00002C2A |
| 00002C90 | 00002C90 | 00002CA8 | 40404040 | 40404040 | 40404040 | 40404040 |
| 40404040 | 40404040 | 40404040 | 40404040 | D7C3C8C1 | F0F0F6F7* | |
| 02D9D3C4 | 40404040 | 40400038 | 40404040 | 00010001 | 0C000024 | 00010001 |
| 0C0000E0 | 00010001 | 0C000128 | 00010001 | 0C00012C | 00010001 | 0C000130 |
| 00010001 | 0C000134 | 00010001 | 0C000138 | D7C3C8C1 | F0F0F6F8* | |
| 02E3E7E3 | 40000140 | 4040001C | 40400001 | 00002CA8 | 00002D38 | 00002D38 |
| 00002D66 | 00002D80 | 00002D80 | 00002D80 | 40404040 | 40404040 | 40404040 |
| 40404040 | 40404040 | 40404040 | 40404040 | D7C3C8C1 | F0F0F6F9* | |
| 02D9D3C4 | 40404040 | 40400038 | 40404040 | 00010001 | 0C00013C | 00010001 |
| 0C000140 | 00010001 | 0C000144 | 00010001 | 0C000148 | 00010001 | 0C00014C |
| 00010001 | 0C000150 | 00010001 | 0C000154 | D7C3C8C1 | F0F0F7F0** | |
| 02E3E7E3 | 4000015C | 4040001C | 40400001 | 00002DEA | 00002EB8 | 00002E18 |
| 00002E18 | 00002E8E | 00002E8E | 80002AC4 | 40404040 | 40404040 | 40404040 |
| 40404040 | 40404040 | 40404040 | 40404040 | D7C3C8C1 | F0F0F7F1* | |
| 02D9D3C4 | 40404040 | 40400038 | 40404040 | 00010001 | 0C000158 | 00010001 |
| 0C00015C | 00010001 | 0C000160 | 00010001 | 0C000164 | 00010001 | 0C000168 |
| 00010001 | 0C00016C | 00010001 | 0C000170 | D7C3C8C1 | F0F0F7F2* | |
| 02E3E7E3 | 40000178 | 40400018 | 40400001 | 00000424 | 000003B4 | 80000380 |
| 8000041C | 80000414 | 00000308 | 40404040 | 40404040 | 40404040 | 40404040 |
| 40404040 | 40404040 | 40404040 | 40404040 | D7C3C8C1 | F0F0F7F3* | |
| 02E3E7E3 | 40000194 | 40400008 | 40400001 | 80000000 | 00000304 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F7F4* | |
| 02D9D3C4 | 40404040 | 40400038 | 40404040 | 00010001 | 0C000174 | 00010001 |
| 0C000178 | 00010001 | 0C00017C | 00010001 | 0C000180 | 00010001 | 0C000184 |
| 00010001 | 0C000188 | 00010001 | 0C00018C | D7C3C8C1 | F0F0F7F5* | |
| 02E3E7E3 | 400001A0 | 4040001C | 40400001 | 80000014 | 00000300 | 00000394 |
| 000003AC | 00000398 | 000003B0 | 000003CC | 40404040 | 40404040 | 40404040 |
| 40404040 | 40404040 | 40404040 | 40404040 | D7C3C8C1 | F0F0F7F6* | |
| 02D9D3C4 | 40404040 | 40400038 | 40404040 | 00010001 | 0C000198 | 00020001 |
| 0C0001A0 | 00010001 | 0C0001A4 | 00010001 | 0C0001A8 | 00010001 | 0C0001AC |
| 00010001 | 0C0001B0 | 00010001 | 0C0001B4 | D7C3C8C1 | F0F0F7F7* | |
| 02E3E7E3 | 400001BC | 4040001C | 40400001 | 000003D8 | 800003FD | 00000304 |

MEMBER NAME PCHART

| | | | | | | |
|---|---|---|---|---|---|---|
| 00000390 | 80000000 | 00000308 | 000029A4 | 40404040 | 40404040 | 40404040 |
| 40404040 | 40404040 | 40404040 | 40404040 | D7C3C8C1 | F0F0F7F8* | |
| 02D9D3C4 | 40404040 | 40400038 | 40404040 | 00010001 | 0C0001B8 | 00010001 |
| 0C0001BC | 00010001 | 0C0001C0 | 00010001 | 0C0001C4 | 00010001 | 0C0001C8 |
| 00050001 | 0C0001CC | 00010001 | 0C0001D0 | D7C3C8C1 | F0F0F7F9* | |
| 02E3E7E3 | 400001D8 | 4040001C | 40400001 | 80000004 | 000003FD | 000029A4 |
| 80000390 | 00000328 | 80000328 | 000029C0 | 40404040 | 40404040 | 40404040 |
| 40404040 | 40404040 | 40404040 | 40404040 | D7C3C8C1 | F0F0F8F0** | |
| 02D9D3C4 | 40404040 | 40400038 | 40404040 | 00010001 | 0C0001D4 | 00050001 |
| 0C0001D8 | 00010001 | 0C0001DC | 00010001 | 0C0001E0 | 00010001 | 0C0001E4 |
| 00010001 | 0C0001E8 | 00010001 | 0C0001EC | D7C3C8C1 | F0F0F8F1* | |

```
02E3E7E3  400001F4  4040001C  40400001  8000032C  00002AC4  00000358
000002F0  0000039C  00000338  00000334  40404040  40404040  40404040
40404040  40404040  40404040  40404040  D7C3C8C1  F0F0F8F2*
02D9D3C4  40404040  40400038  40404040  00010001  0C0001F0  00010001
0C0001F4  00010001  0C0001F8  00010001  0C0001FC  00010001  0C000200
00010001  0C000204  00010001  0C000208  D7C3C8C1  F0F0F8F3*
02E3E7E3  40000210  4040001C  40400001  000029C0  000002F0  000002F0
000002F0  000002F0  000002F8  00000300  40404040  40404040  40404040
40404040  40404040  40404040  40404040  D7C3C8C1  F0F0F8F4*
02D9D3C4  40404040  40400038  40404040  00010001  0C00020C  00010001
0C000210  00010001  0C000214  00010001  0C000218  00010001  0C00021C
00010001  0C000220  00010001  0C000224  D7C3C8C1  F0F0F8F5*
02E3E7E3  4000022C  4040001C  40400001  000002F0  000002F0  00000338
00000340  800002F0  00000424  000003B4  40404040  40404040  40404040
40404040  40404040  40404040  40404040  D7C3C8C1  F0F0F8F6*
02D9D3C4  40404040  40400038  40404040  00010001  0C000228  00010001
0C00022C  00010001  0C000230  00010001  0C000234  00010001  0C000238
00010001  0C00023C  00010001  0C000240  D7C3C8C1  F0F0F8F7*
02E3E7E3  40000248  4040001C  40400001  000003C8  800003A4  00002AC4
000003A0  000002F0  00000314  00000338  40404040  40404040  40404040
40404040  40404040  40404040  40404040  D7C3C8C1  F0F0F8F8*
02D9D3C4  40404040  40400038  40404040  00010001  0C000244  00010001
0C000248  00010001  0C00024C  00010001  0C000250  00010001  0C000254
00010001  0C000258  00010001  0C00025C  D7C3C8C1  F0F0F8F9*
02E3E7E3  40000264  4040001C  40400001  00000334  000003DA  000002F0
000002F0  000002F0  000002F0  000002F8  40404040  40404040  40404040
40404040  40404040  40404040  40404040  D7C3C8C1  F0F0F9F0**
02D9D3C4  40404040  40400038  40404040  00010001  0C000260  00010001
0C000264  00010001  0C000268  00010001  0C00026C  00010001  0C000270
00010001  0C000274  00010001  0C000278  D7C3C8C1  F0F0F9F1*
02E3E7E3  40000280  4040001C  40400001  00000300  000002F0  000002F0
00000338  00000340  800002F0  000002F4  40404040  40404040  40404040
40404040  40404040  40404040  40404040  D7C3C8C1  F0F0F9F2*
02D9D3C4  40404040  40400038  40404040  00010001  0C00027C  00010001
0C000280  00010001  0C000284  00010001  0C000288  00010001  0C00028C
00010001  0C000290  00010001  0C000294  D7C3C8C1  F0F0F9F3*
02E3E7E3  4000029C  4040001C  40400001  000002F4  000002F4  000002F4
800003C0  000029AC  000029B4  000003C0  40404040  40404040  40404040
40404040  40404040  40404040  40404040  D7C3C8C1  F0F0F9F4*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  D7C3C8C1  F0F0F9F5*
02E3E7E3  400002B8  4040001C  40400001  80000348  00000388  8000038C
00000364  00000360  000003A8  00000348  40404040  40404040  40404040
40404040  40404040  40404040  40404040  D7C3C8C1  F0F0F9F6*
02D9D3C4  40404040  40400038  40404040  00010001  0C0002B4  00010001
0C0002B8  00010001  0C0002BC  00010001  0C0002C0  00010001  0C0002C4

MEMBER NAME  PCHART
00010001  0C0002C8  00010001  0C0002CC  D7C3C8C1  F0F0F9F7*
02E3E7E3  400002D4  4040001C  40400001  00000348  0000033C  0000036C
800003BC  000002FC  000003D0  800003C4  40404040  40404040  40404040
40404040  40404040  40404040  40404040  D7C3C8C1  F0F0F9F8*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  D7C3C8C1  F0F0F9F9*
02E3E7E3  40002AC4  40400008  40400001  00000000  00000000  40404040
40404040  40404040  40404040  40404040  40404040  40404040  40404040
40404040  40404040  40404040  40404040  D7C3C8C1  F0F1F0F0**
```

```
02D9D3C4  40404040  40400008  40404040  00010001  0C0002EC  40404040
40404040  40404040  40404040  40404040  40404040  40404040  40404040
40404040  40404040  40404040  40404040  D7C3C8C1  F0F1F0F1*
02C5D5C4  40404040  40404040  40404040  40404040  40404040  40404040
00002F18  F1F5F7F3  F460C6D6  F34040F0  F2F0F2F8  F7F0F9F8  40F0F84B
F4F14BF2  F7404040  D7C3C8C1  D9E34040  D7C3C8C1  F0F1F0F2**

MEMBER NAME  PCHECK
02C5E2C4  40404040  40400010  40400001  D7C3C8C5  C3D24040  00000000
40000000  40404040  40404040  40404040  40404040  40404040  40404040
40404040  40404040  40404040  40404040  D7C3C8C5  F0F0F0F1*
02E3E7E3  40000000  40400038  40400001  47F0F00C  07D7C3C8  C5C3D240
90ECD00C  184D98CD  F0205040  D00450D0  400807FC  40404040  40404040
020A0803  18010A08  0318011A  25E3E6D6  D7C3C8C5  F0F0F0F2*
02E3E7E3  40000038  40400038  40400001  40D7C9C5  D9C3C540  D7D6C9D5
E3E240C8  C1E5C540  E2C1D4C5  40C9C47A  4040C9C4  7E401005  18142202
06481401  22020A08  0318010A  08031801  D7C3C8C5  F0F0F0F3*
02E3E7E3  40000070  40400038  40400001  1A254040  40404040  40404040
40E2C5C3  D6D5C440  D7D6C9D5  E3404040  40404040  7A4040C9  C47E4010
05181422  021A0F40  40D7C9C5  D9C3C540  D7C3C8C5  F0F0F0F4*
02E3E7E3  400000A8  4040001A  40400001  D7D6C9D5  E3401005  1A0F4040
C9E240C4  E4D7D3C9  C3C1E3C5  C4224040  40404040  40404040  40404040
40404040  40404040  40404040  40404040  D7C3C8C5  F0F0F0F5*
02E3E7E3  40000128  40400038  40400001  00000000  00000000  4E000000
00000000  4F080000  00000000  4E000000  80000000  00000000  00000001
00000001  00000002  00000003  00000004  D7C3C8C5  F0F0F0F6*
02C5E2C4  40404040  40400010  40400002  D7C3C5D9  D9404040  05000000
40003844  40404040  40404040  40404040  40404040  40404040  40404040
40404040  40404040  40404040  40404040  D7C3C8C5  F0F0F0F7*
02E3E7E3  40000160  40400014  40400001  0000000A  00000010  00000048
00000000  00000000  40404040  40404040  40404040  40404040  40404040
40404040  40404040  40404040  40404040  D7C3C8C5  F0F0F0F8*
02C5E2C4  40404040  40400010  40400003  D6D7E3C9  D6D54040  05000000
40000020  40404040  40404040  40404040  40404040  40404040  40404040
40404040  40404040  40404040  40404040  D7C3C8C5  F0F0F0F9*
02C5E2C4  40404040  40400010  40400004  C2E2D6D9  E3404040  02000000
40000000  40404040  40404040  40404040  40404040  40404040  40404040
40404040  40404040  40404040  40404040  D7C3C8C5  F0F0F1F0**
02C5E2C4  40404040  40400010  40400005  C9C2C3D6  D47B4040  02000000
40000000  40404040  40404040  40404040  40404040  40404040  40404040
40404040  40404040  40404040  40404040  D7C3C8C5  F0F0F1F1*
02C5E2C4  40404040  40400010  40400006  D3C4C6C9  D67B4040  02000000
40000000  40404040  40404040  40404040  40404040  40404040  40404040
40404040  40404040  40404040  40404040  D7C3C8C5  F0F0F1F2*
02E3E7E3  400001B8  40400018  40400001  FFFFFFBB  00000000  00000000
00000000  00000000  00000000  40404040  40404040  40404040  40404040
40404040  40404040  40404040  40404040  D7C3C8C5  F0F0F1F3*
02E3E7E3  40000188  40400004  40400001  000000C8  40404040  40404040
40404040  40404040  40404040  40404040  40404040  40404040  40404040
40404040  40404040  40404040  40404040  D7C3C8C5  F0F0F1F4*
02E3E7E3  4000019C  40400010  40400001  00000001  00000004  C6D34040
C1404040  40404040  40404040  40404040  40404040  40404040  40404040
40404040  40404040  40404040  40404040  D7C3C8C5  F0F0F1F5*
02E3E7E3  40000210  40400038  40400001  5890D104  58B0D0F0  58A0D08C
5870D0A4  5800D080  5000D0B8  58F0D0F4  5800F008  8707D22E  5800D088
5000D0C4  5820D09C  5860D09C  5870D090  D7C3C8C5  F0F0F1F6*
02E3E7E3  40000248  40400038  40400001  58A0D088  18B258F0  D1001800
45E0F000  1000000B  00000160  0000020C  45E0F008  0450D0C8  5880D08C
18388930  00021856  5C40D0C4  1A3545E0  D7C3C8C5  F0F0F1F7*
```

| | | | | | | |
|---|---|---|---|---|---|---|
| 02E3E7E3 | 40000280 | 40400038 | 40400001 | F0080473 | 90001A8A | 198747C0 |
| D1A845E0 | F0080470 | D0B4185B | 5C40D0C4 | 18351A3B | 45E0F008 | 04739000 |
| 45E0F010 | 5800D0C8 | 5700D07C | 5000D06C | D7C3C8C5 | F0F0F1F8* | |
| 02E3E7E3 | 400002B8 | 40400038 | 40400001 | 6820D068 | 6B20D078 | 185B5C40 |
| D0C41835 | 5A30D094 | 70239000 | 5800D0C4 | 1A0A5000 | D0C447F0 | D18658B0 |
| D0F058A0 | D08C5870 | D0A45800 | D0C45B00 | D7C3C8C5 | F0F0F1F9* | |
| 02E3E7E3 | 400002F0 | 40400038 | 40400001 | D0885000 | D0C459A0 | D0C447C0 |

MEMBER NAME PCHECK

| | | | | | | |
|---|---|---|---|---|---|---|
| D23E1BFF | 58E0D000 | 07FE58F0 | D0F84110 | D04C05EF | 58E0D130 | 2B00780E |
| 90006A00 | D0706000 | D0605800 | D0645000 | D7C3C8C5 | F0F0F2F0** | |
| 02E3E7E3 | 40000328 | 40400038 | 40400001 | D0BC5800 | D09C5000 | D10C5800 |
| D1385000 | D1245800 | D13C5000 | D1285800 | D1405000 | D12C188A | 58A0B045 |
| 58E0D124 | 2B00780E | 90006A00 | D0706000 | D7C3C8C5 | F0F0F2F1* | |
| 02E3E7E3 | 40000360 | 40400038 | 40400001 | D0605820 | D0645020 | D0CC5920 |
| D0BC4780 | D2B25020 | D0BC47F0 | D3F059A0 | D0C047A0 | D3A25AA0 | D08858F0 |
| D0FC1800 | 45E0F004 | 00000000 | 00000028 | D7C3C8C5 | F0F0F2F2* | |
| 02D9D3C4 | 40404040 | 40400038 | 40404040 | 00020001 | 0C0001B8 | 00030001 |
| 0C0001BC | 00040001 | 1C0001C0 | 00050001 | 1C0001C4 | 00060001 | 1C0001C8 |
| 00010001 | 0C00025C | 00010001 | 0C000260 | D7C3C8C5 | F0F0F2F3* | |
| 02E3E7E3 | 40000398 | 40400038 | 40400001 | 18785B70 | D0885C60 | D10C1837 |
| 5A30D11C | 45E0F008 | 04739000 | 18375A30 | D12045E0 | F0080473 | 900045E0 |
| F0080450 | D0BC45E0 | F01058F0 | D0FC1800 | D7C3C8C5 | F0F0F2F4* | |
| 02E3E7E3 | 400003D0 | 40400038 | 40400001 | 45E0F000 | 00000000 | 0000005F |
| 187A5C60 | D0A045E0 | F1340001 | 00000127 | B0010100 | 00480000 | 000145E0 |
| F01059A0 | D0C047A0 | D3A25AA0 | D08858F0 | D7C3C8C5 | F0F0F2F5* | |
| 02E3E7E3 | 40000408 | 40400038 | 40400001 | D0FC1800 | 45E0F004 | 00000000 |
| 00000065 | 5810D128 | 45E0F008 | 04719000 | 5810D12C | 45E0F008 | 04719000 |
| 45E0F008 | 0450D0BC | 45E0F010 | 58F0D0FC | D7C3C8C5 | F0F0F2F6* | |
| 02E3E7E3 | 40000440 | 40400038 | 40400001 | 45E0F000 | 00000000 | 0000005F |
| 185A5C40 | D0A045E0 | F1340001 | 00000125 | B0010100 | 00480000 | 000145E0 |
| F01058F0 | D0F45800 | F0081BFF | 870FD3F0 | D7C3C8C5 | F0F0F2F7* | |
| 02E3E7E3 | 40000478 | 40400038 | 40400001 | 5800D084 | 5000D0B8 | 58F0D0FC |
| 45E0F004 | 00000009 | 0000009C | 45E0F008 | 0450D0BC | 45E0F010 | 58F0D0FC |
| 45E0F004 | 00000006 | 0000009C | 45E0F008 | D7C3C8C5 | F0F0F2F8* | |
| 02E3E7E3 | 400004B0 | 40400038 | 40400001 | 0450D0BC | 45E0F010 | 5A80D088 |
| 5800D12C | 5A00D09C | 5000D12C | 5800D128 | 5A00D09C | 5000D128 | 5800D124 |
| 5A00D09C | 5000D124 | 5980D0C4 | 47C0D288 | D7C3C8C5 | F0F0F2F9* | |
| 02E3E7E3 | 400004E8 | 40400038 | 40400001 | 50A0B045 | 58A0D08C | 5870D0A4 |
| 5800D0B8 | 8707D442 | 58F0D0FC | 45E0F034 | 05404040 | F2F31BFF | 58E0D000 |
| 07FE58A0 | D00458E0 | A00C58B0 | A0185810 | D7C3C8C5 | F0F0F3F0** | |
| 02E3E7E3 | 40000520 | 40400038 | 40400001 | B0045820 | D0C45020 | 100018DA |
| 92FFA00C | 982CA01C | 07FE5870 | 10045820 | 70005020 | D0C45820 | 10004130 |
| 20004150 | 00041B25 | 5C40D094 | 1B255020 | D7C3C8C5 | F0F0F3F1* | |
| 02E3E7E3 | 40000558 | 4040000E | 40400001 | D1045030 | D1085030 | D05447F0 |
| D1484040 | 40404040 | 40404040 | 40404040 | 40404040 | 40404040 | 40404040 |
| 40404040 | 40404040 | 40404040 | 40404040 | D7C3C8C5 | F0F0F3F2* | |
| 02E3E7E3 | 40000020 | 40400008 | 40400001 | 00000536 | 000000C8 | 40404040 |
| 40404040 | 40404040 | 40404040 | 40404040 | 40404040 | 40404040 | 40404040 |
| 40404040 | 40404040 | 40404040 | 40404040 | D7C3C8C5 | F0F0F3F3* | |
| 02D9D3C4 | 40404040 | 40400038 | 40404040 | 00010001 | 0C000394 | 00010001 |
| 0C0003D8 | 00010001 | 0C000414 | 00010001 | 0C000448 | 00010001 | 0C00048C |
| 00010001 | 0C0004A8 | 00010001 | 0C000020 | D7C3C8C5 | F0F0F3F4* | |
| 02E3E7E3 | 400000C8 | 40400004 | 40400001 | 00000512 | 40404040 | 40404040 |
| 40404040 | 40404040 | 40404040 | 40404040 | 40404040 | 40404040 | 40404040 |
| 40404040 | 40404040 | 40404040 | 40404040 | D7C3C8C5 | F0F0F3F5* | |
| 02E3E7E3 | 40000114 | 40400008 | 40400001 | 0000019C | 00000150 | 40404040 |
| 40404040 | 40404040 | 40404040 | 40404040 | 40404040 | 40404040 | 40404040 |
| 40404040 | 40404040 | 40404040 | 40404040 | D7C3C8C5 | F0F0F3F6* | |

```
02E3E7E3  40000120  40400008  40400001  00000164  8000018C  40404040
40404040  40404040  40404040  40404040  40404040  40404040  40404040
40404040  40404040  40404040  40404040  D7C3C8C5  F0F0F3F7*
02E3E7E3  400001D4  40400038  40400001  00000000  00000000  00000000
00000000  00000008  0000000C  00000000  00000000  00000000  00000014
00000020  00000024  00000028  0000002C  D7C3C8C5  F0F0F3F8*
02E3E7E3  4000020C  40400004  40400001  000002DE  40404040  40404040
40404040  40404040  40404040  40404040  40404040  40404040  40404040

MEMBER NAME  PCHECK
40404040  40404040  40404040  40404040  D7C3C8C5  F0F0F3F9*
02D9D3C4  40404040  40400038  40404040  00010001  0C000024  00010001
0C0000C8  00010001  0C000114  00010001  0C000118  00010001  0C000120
00010001  0C000124  00010001  0C00020C  D7C3C8C5  F0F0F4F0**
02C5D5C4  40404040  40404040  40404040  40404040  40404040  40404040
00000566  F1F5F7F3  F460C6D6  F34040F0  F2F0F2F8  F7F0F9F8  40F0F84B
F4F14BF3  F2404040  D7C3C8C5  C3D24040  D7C3C8C5  F0F0F4F1**

MEMBER NAME  PCTGET
02C5E2C4  40404040  40400010  40400001  D7C3E3C7  C5E34040  00000000
40000000  40404040  40404040  40404040  40404040  40404040  40404040
40404040  40404040  40404040  40404040  D7C3E3C7  F0F0F0F1*
02E3E7E3  40000000  40400028  40400001  47F0F00C  07D7C3E3  C7C5E340
90ECD00C  184D98CD  F0205040  D00450D0  400807FC  40404040  40404040
40404040  40404040  40404040  40404040  D7C3E3C7  F0F0F0F2*
02E3E7E3  40000090  4040001C  40400001  00000000  00000001  00000002
00000004  00000010  00000000  00000000  40404040  40404040  40404040
40404040  40404040  40404040  40404040  D7C3E3C7  F0F0F0F3*
02C5E2C4  40404040  40400010  40400002  C6E2C7C5  E3404040  02000000
40000000  40404040  40404040  40404040  40404040  40404040  40404040
40404040  40404040  40404040  40404040  D7C3E3C7  F0F0F0F4*
02E3E7E3  400000D0  40400004  40400001  00000000  40404040  40404040
40404040  40404040  40404040  40404040  40404040  40404040  40404040
40404040  40404040  40404040  40404040  D7C3E3C7  F0F0F0F5*
02C5E2C4  40404040  40400010  40400003  D4E5C3C8  D9404040  02000000
40000000  40404040  40404040  40404040  40404040  40404040  40404040
40404040  40404040  40404040  40404040  D7C3E3C7  F0F0F0F6*
02C5E2C4  40404040  40400010  40400004  C9C2C3D6  D47B4040  02000000
40000000  40404040  40404040  40404040  40404040  40404040  40404040
40404040  40404040  40404040  40404040  D7C3E3C7  F0F0F0F7*
02E3E7E3  400000D8  4040000C  40400001  00000000  00000000  00000000
40404040  40404040  40404040  40404040  40404040  40404040  40404040
40404040  40404040  40404040  40404040  D7C3E3C7  F0F0F0F8*
02E3E7E3  40000104  40400038  40400001  58B0D0A8  58A0D06C  5890D0D4
5800D084  12004780  D0FA59A0  D0844780  D1445850  D0941A5A  5C40D078
5820D074  1A254109  B0005000  D0504102  D7C3E3C7  F0F0F0F9*
02E3E7E3  4000013C  40400038  40400001  B0005000  D0549280  D05458F0
D0B44110  D04C05EF  50A0D094  58E0D0D8  580EB000  5000D098  5809B000
5000D090  47F0D1AC  50A0D094  5800D074  D7C3E3C7  F0F0F1F0**
02E3E7E3  40000174  40400038  40400001  5000D0CC  5800D078  5000D0C8
5090D0D0  4109B000  5000D058  58F0D0B0  4110D058  05EF5800  D0841200
4750D244  5800D084  120047C0  D19058F0  D7C3E3C7  F0F0F1F1*
02E3E7E3  400001AC  40400038  40400001  D0B845E0  F0340540  4040F2F5
5820D0C4  5A20D0C8  5802B000  5000D098  58E0D0D0  580EB000  5000D090
5800D074  5000D0C0  5880D078  5800D094  D7C3E3C7  F0F0F1F2*
02E3E7E3  400001E4  40400038  40400001  5A00D06C  5000D094  18505C40
D0781825  5A20D074  4102B000  5000D058  58F0D0B0  4110D058  05EF5800
D0841200  47A0D1F0  47F0D244  5800D084  D7C3E3C7  F0F0F1F3*
02E3E7E3  4000021C  40400038  40400001  120047C0  D21058A0  D06C5890
```

```
D0D458F0   D0B845E0   F0340540   4040F2F5   18585C40   D0941825   5A20D0C4
5892B000   18785C60   D0941847   5A40D0C0   D7C3E3C7   F0F0F1F4*
02E3E7E3   40000254   40400038   40400001   58A4B000   5990D098   4780D23C
47F0D244   59A0D090   4780D1B8   58A0D06C   5890D0D4   5800D094   1B0A5000
D0941BFF   58E0D000   07FE58A0   D00458E0   D7C3E3C7   F0F0F1F5*
02E3E7E3   4000028C   40400038   40400001   A00C58B0   A0185810   B0045820
D0945020   10005830   B0085840   D0845040   300018DA   92FFA00C   982CA01C
07FE9878   10045820   70005020   D0945820   D7C3E3C7   F0F0F1F6*
02E3E7E3   400002C4   40400026   40400001   80005020   D0845820   10004130
20004150   00041B25   5C40D074   1B255020   D0A85030   D0AC47F0   D0BC4040
40404040   40404040   40404040   40404040   D7C3E3C7   F0F0F1F7*
02E3E7E3   40000020   4040000C   40400001   000002B6   00000028   00000286
40404040   40404040   40404040   40404040   40404040   40404040   40404040
40404040   40404040   40404040   40404040   D7C3E3C7   F0F0F1F8*
02E3E7E3   40000074   40400004   40400001   000000A0   40404040   40404040
40404040   40404040   40404040   40404040   40404040   40404040   40404040
40404040   40404040   40404040   40404040   D7C3E3C7   F0F0F1F9*
02E3E7E3   4000007C   40400004   40400001   80000000   40404040   40404040

MEMBER NAME  PCTGET
40404040   40404040   40404040   40404040   40404040   40404040   40404040
40404040   40404040   40404040   40404040   D7C3E3C7   F0F0F2F0**
02E3E7E3   40000084   40400004   40400001   000000A0   40404040   40404040
40404040   40404040   40404040   40404040   40404040   40404040   40404040
40404040   40404040   40404040   40404040   D7C3E3C7   F0F0F2F1*
02D9D3C4   40404040   40400038   40404040   00020001   1C0000D8   00030001
1C0000DC   00040001   1C0000E0   00010001   0C000020   00010001   0C000024
00010001   0C000028   00010001   0C000074   D7C3E3C7   F0F0F2F2*
02E3E7E3   40000088   40400004   40400001   800000AC   40404040   40404040
40404040   40404040   40404040   40404040   40404040   40404040   40404040
40404040   40404040   40404040   40404040   D7C3E3C7   F0F0F2F3*
02E3E7E3   400000E4   40400020   40400001   00000000   00000000   00000008
00000000   00000000   00000000   00000014   00000018   40404040   40404040
40404040   40404040   40404040   40404040   D7C3E3C7   F0F0F2F4*
02D9D3C4   40404040   40400010   40404040   00010001   0C000084   00010001
0C000088   40404040   40404040   40404040   40404040   40404040   40404040
40404040   40404040   40404040   40404040   D7C3E3C7   F0F0F2F5*
02C5D5C4   40404040   40404040   40404040   40404040   40404040   40404040
000002EA   F1F5F7F3   F460C6D6   F34040F0   F2F0F2F8   F7F0F9F8   40F0F84B
F4F14BF3   F6404040   D7C3E3C7   C5E34040   D7C3E3C7   F0F0F2F6**

MEMBER NAME  PIERCE
02C5E2C4   40404040   40400010   40400001   D7C9C5D9   C3C54040   00000000
40000000   40404040   40404040   40404040   40404040   40404040   40404040
40404040   40404040   40404040   40404040   D7C9C5D9   F0F0F0F1*
02E3E7E3   40000000   40400038   40400001   47F0F00C   07D7C9C5   D9C3C540
90ECD00C   184D98CD   F0205040   D00450D0   400807FC   40404040   40404040
021A2A40   40C5D9D9   D6D940C9   D540D7C9   D7C9C5D9   F0F0F0F2*
02E3E7E3   40000038   40400038   40400001   C5D9C3C5   40E3C8C5   40C6C9D9
E2E340C1   D5C440D3   C1E2E340   D7D6C9D5   E31A2540   40404040   4040D6C6
40E3C8C5   40C2D6E4   D5C4C1D9   E840C4D6   D7C9C5D9   F0F0F0F3*
02E3E7E3   40000070   4040000D   40400001   C5E240D5   D6E340D4   C1E3C3C8
22404040   40404040   40404040   40404040   40404040   40404040   40404040
40404040   40404040   40404040   40404040   D7C9C5D9   F0F0F0F4*
02C5E2C4   40404040   40400010   40400002   E3D6D3C5   D9404040   05000000
4000000C   40404040   40404040   40404040   40404040   40404040   40404040
40404040   40404040   40404040   40404040   D7C9C5D9   F0F0F0F5*
02E3E7E3   400000F0   40400018   40400001   00000000   00000000   00000001
00000002   00000000   00000000   40404040   40404040   40404040   40404040
```

```
40404040 40404040 40404040 40404040 D7C9C5D9 F0F0F0F6*
02C5E2C4 40404040 40400010 40400003 C9C2C3D6 D47B4040 02000000
40000000 40404040 40404040 40404040 40404040 40404040 40404040
40404040 40404040 40404040 40404040 D7C9C5D9 F0F0F0F7*
02E3E7E3 40000140 40400008 40400001 00000000 00000000 40404040
40404040 40404040 40404040 40404040 40404040 40404040 40404040
40404040 40404040 40404040 40404040 D7C9C5D9 F0F0F0F8*
02C5E2C4 40404040 40400010 40400004 D7D9D6D1 D3D54040 02000000
40000000 40404040 40404040 40404040 40404040 40404040 40404040
40404040 40404040 40404040 40404040 D7C9C5D9 F0F0F0F9*
02E3E7E3 4000014C 4040000C 40400001 00000000 00000000 00000000
40404040 40404040 40404040 40404040 40404040 40404040 40404040
40404040 40404040 40404040 40404040 D7C9C5D9 F0F0F1F0**
02E3E7E3 40000190 40400038 40400001 5880D0C4 5890D0C0 58B0D0D4
58A0D104 78008004 7000D0B4 78008008 7000D0B8 5800D070 5000D09C
58E0D108 784EB000 185A5C40 D0AC5820 D7C9C5D9 F0F0F1F1*
02E3E7E3 400001C8 40400038 40400001 D1001A25 7B42B000 304458E0
D10C782E B000185A 5C40D0AC 182A1A25 7B22B000 30227020 D0A87940
900447A0 D17E7920 90044750 D1A258F0 D7C9C5D9 F0F0F1F2*
02E3E7E3 40000200 40400038 40400001 D0CC1800 45E0F004 00000006
00000028 45E0F010 58F0D0CC 45E0F034 05404040 F1F55800 D0705000
D0A05800 D0785000 D0885800 D1005000 D7C9C5D9 F0F0F1F3*
02E3E7E3 40000238 40400038 40400001 D0DC50A0 D0F05880 D0785820
D0881A28 5020D090 5020D0FC 5800D088 5900D0AC 4770D1E0 5080D090
5850D088 5C40D104 18355A30 D1005030 D7C9C5D9 F0F0F1F4*
02E3E7E3 40000270 40400038 40400001 D0E05A50 D1045050 D0F45870
D0905C60 D1041897 5A90D100 18475A40 D1045040 D0F84103 B0005000
D05C4105 B0005000 D0604109 B0005000 D7C9C5D9 F0F0F1F5*
02E3E7E3 400002A8 40400038 40400001 D0644104 B0005000 D0689280
D06858F0 D0D04110 D05805EF 41E00008 15FE4720 D25058EF D04C07FE
7823B000 7020D0E8 7920D0B4 47A0D26C D7C9C5D9 F0F0F1F6*
02E3E7E3 400002E0 40400038 40400001 7800D0B4 7909B000 4730D31E
7800D0E8 7900D0B4 47C0D284 7800D0B4 7909B000 4750D31E 7829B000
7020D0EC 7920D0E8 4770D298 47F0D31E D7C9C5D9 F0F0F1F7*
02E3E7E3 40000318 40400038 40400001 7860D0EC 7B60D0E8 7060D08C
7840D0B4 7B40D0E8 58E0D0F4 782EB000 58E0D0F8 780EB000 3B023C40
3D463A24 7020D094 7920D0B8 4770D2D4 D7C9C5D9 F0F0F1F8*
02E3E7E3 40000350 40400038 40400001 47F0D354 58A0D07C 7800D0B4
7900D0E8 4780D2F0 7800D0B4 7900D0EC 4770D2F2 18A87800 D08C3200
47A0D302 183A1C28 13A37800 D0B87900 D7C9C5D9 F0F0F1F9*
02E3E7E3 40000388 40400038 40400001 D09447C0 D314183A 1C2813A3

MEMBER NAME  PIERCE
5800D0A0 1A0A5000 D0A05800 D0FC5000 D0885900 D0AC47C0 D1C25880
D0C45890 D0C058A0 D1045800 D0A01200 D7C9C5D9 F0F0F2F0**
02E3E7E3 400003C0 40400038 40400001 4780D34C 5800D07C 5000D09C
1BFF58E0 D00007FE 5880D0C4 5890D0C0 58A0D104 5800D078 5000D09C
1BFF58E0 D00007FE 58A0D004 58E0A00C D7C9C5D9 F0F0F2F1*
02E3E7E3 400003F8 40400038 40400001 58B0A018 5810B004 5820D0AC
50201000 5830B00C 5840D09C 50403000 18DA92FF A00C982C A01C07FE
98791004 58207000 5020D0AC 58209000 D7C9C5D9 F0F0F2F2*
02E3E7E3 40000430 40400038 40400001 5020D09C 58201000 41302000
41500004 1B255C40 D07C1B25 5020D0D4 5030D0D8 58201008 41302000
41500004 1B255020 D0C45030 D0C85030 D7C9C5D9 F0F0F2F3*
02E3E7E3 40000468 40400006 40400001 D05847F0 D1104040 40404040
40404040 40404040 40404040 40404040 40404040 40404040 40404040
40404040 40404040 40404040 40404040 D7C9C5D9 F0F0F2F4*
02E3E7E3 40000020 40400008 40400001 00000420 00000080 40404040
40404040 40404040 40404040 40404040 40404040 40404040 40404040
```

```
40404040   40404040   40404040   40404040   D7C9C5D9   F0F0F2F5*
02E3E7E3   40000080   40400004   40400001   000003F0   40404040   40404040
40404040   40404040   40404040   40404040   40404040   40404040   40404040
40404040   40404040   40404040   40404040   D7C9C5D9   F0F0F2F6*
02E3E7E3   400000CC   40400004   40400001   000002D0   40404040   40404040
40404040   40404040   40404040   40404040   40404040   40404040   40404040
40404040   40404040   40404040   40404040   D7C9C5D9   F0F0F2F7*
02D9D3C4   40404040   40400038   40404040   00020001   0C000140   00030001
1C00014C   00040001   1C000150   00010001   0C00020C   00010001   0C000020
00010001   0C000024   00010001   0C000080   D7C9C5D9   F0F0F2F8*
02E3E7E3   400000D0   40400008   40400001   000003D4   000003D4   40404040
40404040   40404040   40404040   40404040   40404040   40404040   40404040
40404040   40404040   40404040   40404040   D7C9C5D9   F0F0F2F9*
02E3E7E3   400000E8   40400004   40400001   80000000   40404040   40404040
40404040   40404040   40404040   40404040   40404040   40404040   40404040
40404040   40404040   40404040   40404040   D7C9C5D9   F0F0F3F0**
02E3E7E3   4000015C   40400034   40400001   00000000   00000000   00000000
00000000   00000000   00000000   00000000   00000000   00000000   00000004
00000008   0000000C   00000010   40404040   D7C9C5D9   F0F0F3F1*
02D9D3C4   40404040   40400018   40404040   00010001   0C0000CC   00010001
0C0000D0   00010001   0C0000D4   40404040   40404040   40404040   40404040
40404040   40404040   40404040   40404040   D7C9C5D9   F0F0F3F2*
02C5D5C4   40404040   40404040   40404040   40404040   40404040   40404040
0000046E   F1F5F7F3   F460C6D6   F34040F0   F2F0F2F8   F7F0F9F8   40F0F84B
F4F14BF4   F0404040   D7C9C5D9   C3C54040   D7C9C5D9   F0F0F3F3**

MEMBER NAME  PLYCHT
02C5E2C4   40404040   40400010   40400001   D7D3E8C3   C8E34040   00000000
40000000   40404040   40404040   40404040   40404040   40404040   40404040
40404040   40404040   40404040   40404040   D7D3E8C3   F0F0F0F1*
02E3E7E3   40000000   40400038   40400001   47F0F00C   07D7D3E8   C3C8E340
90ECD00C   184D98CD   F0205040   D00450D0   400807FC   40404040   40404040
021A1C40   C5D9D9D6   D940C9D5   40D7C3C5   D7D3E8C3   F0F0F0F2*
02E3E7E3   40000038   40400030   40400001   D9D9404D   E2E4D7C5   D940E3C5
E7E35D22   D7D3E840   E3C1C2D3   C540C5D9   D9D6D9E2   D7D3E840   E3C1C2D3
C540C5D9   D9D6D9E2   40404040   40404040   D7D3E8C3   F0F0F0F3*
02E3E7E3   400002B0   40400038   40400001   00000000   00000001   00000003
00000004   00000010   0000001A   00000048   00000049   00000078   401DF3B6
4029FBE7   403EF9DB   40800000   41200000   D7D3E8C3   F0F0F0F4*
02C5E2C4   40404040   40400010   40400002   D7C3C5D9   D9404040   05000000
40003844   40404040   40404040   40404040   40404040   40404040   40404040
40404040   40404040   40404040   40404040   D7D3E8C3   F0F0F0F5*
02E3E7E3   400002E8   40400028   40400001   41280000   412C0000   41300000
41473333   41480000   415C353F   415E6666   42110000   00000000   00000000
40404040   40404040   40404040   40404040   D7D3E8C3   F0F0F0F6*
02C5E2C4   40404040   40400010   40400003   D9D4D6C4   C5D34040   05000000
40000018   40404040   40404040   40404040   40404040   40404040   40404040
40404040   40404040   40404040   40404040   D7D3E8C3   F0F0F0F7*
02C5E2C4   40404040   40400010   40400004   D4E5C3C8   D9404040   02000000
40000000   40404040   40404040   40404040   40404040   40404040   40404040
40404040   40404040   40404040   40404040   D7D3E8C3   F0F0F0F8*
02C5E2C4   40404040   40400010   40400005   C3C1C4D3   D5F14040   02000000
40000000   40404040   40404040   40404040   40404040   40404040   40404040
40404040   40404040   40404040   40404040   D7D3E8C3   F0F0F0F9*
02C5E2C4   40404040   40400010   40400006   C3C1C4E2   E4D74040   02000000
40000000   40404040   40404040   40404040   40404040   40404040   40404040
40404040   40404040   40404040   40404040   D7D3E8C3   F0F0F1F0**
02C5E2C4   40404040   40400010   40400007   C8C7C4C1   E3C54040   02000000
40000000   40404040   40404040   40404040   40404040   40404040   40404040
```

```
40404040  40404040  40404040  40404040  D7D3E8C3  F0F0F1F1*
02C5E2C4  40404040  40400010  40400008  C8C7E3C9  D4C54040  02000000
40000000  40404040  40404040  40404040  40404040  40404040  40404040
40404040  40404040  40404040  40404040  D7D3E8C3  F0F0F1F2*
02C5E2C4  40404040  40400010  40400009  C9C2C3D6  D47B4040  02000000
40000000  40404040  40404040  40404040  40404040  40404040  40404040
40404040  40404040  40404040  40404040  D7D3E8C3  F0F0F1F3*
02E3E7E3  400003E0  40400020  40400001  FFFFFFBB  FFFFFFFF  00000000
00000000  00000000  00000000  00000000  00000000  40404040  40404040
40404040  40404040  40404040  40404040  D7D3E8C3  F0F0F1F4*
02D9D3C4  40404040  40400038  40404040  00020001  0C0003E0  00030001
0C0003E4  00040001  1C0003E8  00050001  1C0003EC  00060001  1C0003F0
00070001  1C0003F4  00080001  1C0003F8  D7D3E8C3  F0F0F1F5*
02C5E2C4  40404040  40400010  4040000A  C9C3D5E3  C5D94040  02000000
40000000  40404040  40404040  40404040  40404040  40404040  40404040
40404040  40404040  40404040  40404040  D7D3E8C3  F0F0F1F6*
02E3E7E3  40000400  40400004  40400001  00000000  40404040  40404040
40404040  40404040  40404040  40404040  40404040  40404040  40404040
40404040  40404040  40404040  40404040  D7D3E8C3  F0F0F1F7*
02E3E7E3  40000340  40400038  40400001  4040E740  D3D6C340  4040E840
D3D6C340  40404040  C5D9D9D6  D9E24040  40404040  C3D6D7E8  D9C9C7C8
E3404DC3  5D40F1F9  F8F640E3  C8C540C2  D7D3E8C3  F0F0F1F8*
02E3E7E3  40000378  40400038  40400001  D6C5C9D5  C740C3D6  D4D7C1D5
E85BC1D3  D340D9C9  C7C8E3E2  40D9C5E2  C5D9E5C5  C45B5BE2  D3C9C340
E5C5D9E2  C9D6D540  E7E74BE7  40404040  D7D3E8C3  F0F0F1F9*
02E3E7E3  400003B0  40400028  40400001  40404040  4040C4C1  E3C57A40

MEMBER NAME  PLYCHT
E7E761E7  E761E7E7  40404040  4040E3C9  D4C57A40  E7E77AE7  E77AE7E7
40404040  40404040  40404040  40404040  D7D3E8C3  F0F0F2F0**
02E3E7E3  40000410  40400038  40400001  5880D37C  58B0D378  5870D260
4100D340  5000D078  58F0D380  4110D074  05EF58F0  D3904110  D08005EF
58F0D38C  4110D084  05EF7800  D2943300  D7D3E8C3  F0F0F2F1*
02E3E7E3  40000448  40400038  40400001  7000D2CC  7800D298  33007000
D2AC7800  D28C3300  7000D2B4  7800D288  33007000  D2B87800  D2987000
D2B07800  D2847000  D2BC7800  D2907000  D7D3E8C3  F0F0F2F2*
02E3E7E3  40000480  40400038  40400001  D2C458F0  D3884110  D08805EF
41E00004  15FE4720  D43458EF  D04C07FE  7800D288  7000D2C4  58F0D388
4110D0D0  05EF41E0  000415FE  4720D456  D7D3E8C3  F0F0F2F3*
02E3E7E3  400004B8  40400038  40400001  58EFD054  07FE7800  D2807000
D2C458F0  D3884110  D11805EF  41E00004  15FE4720  D47858EF  D05C07FE
7800D2BC  7000D2C0  58F0D384  4110D160  D7D3E8C3  F0F0F2F4*
02E3E7E3  400004F0  40400038  40400001  05EF7800  D2C07B00  D2787000
D2C058F0  D3844110  D16005EF  7800D27C  7000D2C4  5800B045  12004780
D5225890  D24C18A7  410AB001  5000D170  D7D3E8C3  F0F0F2F5*
02E3E7E3  40000528  40400038  40400001  58F0D398  4110D170  05EF5000
D2C8410A  B0015000  D19058F0  D3884110  D17805EF  41E00004  15FE4720
D4F058EF  D06407FE  7800D2C4  7B00D278  D7D3E8C3  F0F0F2F6*
02E3E7E3  40000560  40400038  40400001  7000D2C4  7800D2C0  7B00D278
7000D2C0  58F0D384  4110D160  05EF5A90  D24C5AA0  D2605990  B04547C0
D4B858F0  D3844110  D1C005EF  58F0D384  D7D3E8C3  F0F0F2F7*
02E3E7E3  40000598  40400038  40400001  4110D1D0  05EF58F0  D3844110
D1E005EF  58F0D384  4110D1F0  05EF7800  D29C3300  7000D3A0  58F0D388
4110D200  05EF41E0  000415FE  4720D56E  D7D3E8C3  F0F0F2F8*
02E3E7E3  400005D0  40400038  40400001  58EFD06C  07FE1BFF  58E0D000
07FE58F0  D3941800  45E0F004  00000006  00000028  45E0F010  1BFF58E0
D00007FE  58D0D004  58E0D00C  92FFD00C  D7D3E8C3  F0F0F2F9*
02E3E7E3  40000608  4040000A  40400001  982CD01C  07FE47F0  D3A84040
40404040  40404040  40404040  40404040  40404040  40404040  40404040
```

```
40404040  40404040  40404040  40404040  D7D3E8C3  F0F0F3F0**
02E3E7E3  40000020  40400008  40400001  0000060E  00000068  40404040
40404040  40404040  40404040  40404040  40404040  40404040  40404040
40404040  40404040  40404040  40404040  D7D3E8C3  F0F0F3F1*
02E3E7E3  40000068  40400004  40400001  000005FC  40404040  40404040
40404040  40404040  40404040  40404040  40404040  40404040  40404040
40404040  40404040  40404040  40404040  D7D3E8C3  F0F0F3F2*
02E3E7E3  400000B4  40400008  40400001  0000049C  000005DE  40404040
40404040  40404040  40404040  40404040  40404040  40404040  40404040
40404040  40404040  40404040  40404040  D7D3E8C3  F0F0F3F3*
02D9D3C4  40404040  40400038  40404040  00090001  1C0003FC  000A0001
1C000400  00010001  0C0005EC  00010001  0C000020  00010001  0C000024
00010001  0C000068  00010001  0C0000B4  D7D3E8C3  F0F0F3F4*
02E3E7E3  400000BC  4040001C  40400001  000004BE  000005DE  000004E0
000005DE  00000558  000005DE  000005D6  40404040  40404040  40404040
40404040  40404040  40404040  40404040  D7D3E8C3  F0F0F3F5*
02D9D3C4  40404040  40400038  40404040  00010001  0C0000B8  00010001
0C0000BC  00010001  0C0000C0  00010001  0C0000C4  00010001  0C0000C8
00010001  0C0000CC  00010001  0C0000D0  D7D3E8C3  F0F0F3F6*
02E3E7E3  400000D8  40400008  40400001  000005DE  000002BC  40404040
40404040  40404040  40404040  40404040  40404040  40404040  40404040
40404040  40404040  40404040  40404040  D7D3E8C3  F0F0F3F7*
02E3E7E3  400000E4  40400014  40400001  80000014  800003D0  800003BC
00000334  0000032C  40404040  40404040  40404040  40404040  40404040
40404040  40404040  40404040  40404040  D7D3E8C3  F0F0F3F8*
02D9D3C4  40404040  40400038  40404040  00010001  0C0000D4  00010001
0C0000D8  00010001  0C0000DC  00030001  0C0000E4  00010001  0C0000E8

MEMBER NAME  PLYCHT
00010001  0C0000EC  00010001  0C0000F0  D7D3E8C3  F0F0F3F9*
02E3E7E3  400000F8  4040001C  40400001  000002B0  000002D0  000002D8
000002D4  00000360  000002B0  000002B0  40404040  40404040  40404040
40404040  40404040  40404040  40404040  D7D3E8C3  F0F0F4F0**
02D9D3C4  40404040  40400038  40404040  00010001  0C0000F4  00010001
0C0000F8  00010001  0C0000FC  00010001  0C000100  00010001  0C000104
00010001  0C000108  00010001  0C00010C  D7D3E8C3  F0F0F4F1*
02E3E7E3  40000114  4040001C  40400001  000002B0  000002B0  000002B4
000002B8  000002B0  000002B0  000002D8  40404040  40404040  40404040
40404040  40404040  40404040  40404040  D7D3E8C3  F0F0F4F2*
02D9D3C4  40404040  40400038  40404040  00010001  0C000110  00010001
0C000114  00010001  0C000118  00010001  0C00011C  00010001  0C000120
00010001  0C000124  00010001  0C000128  D7D3E8C3  F0F0F4F3*
02E3E7E3  40000130  4040001C  40400001  000002DC  800002B0  00000334
0000032C  000002B0  000002C0  000002D8  40404040  40404040  40404040
40404040  40404040  40404040  40404040  D7D3E8C3  F0F0F4F4*
02D9D3C4  40404040  40400038  40404040  00010001  0C00012C  00010001
0C000130  00010001  0C000134  00010001  0C000138  00010001  0C00013C
00010001  0C000140  00010001  0C000144  D7D3E8C3  F0F0F4F5*
02E3E7E3  4000014C  4040001C  40400001  000002D4  00000058  000002B0
000002B0  000002B0  000002B0  000002B4  40404040  40404040  40404040
40404040  40404040  40404040  40404040  D7D3E8C3  F0F0F4F6*
02D9D3C4  40404040  40400038  40404040  00010001  0C000148  00010001
0C00014C  00010001  0C000150  00010001  0C000154  00010001  0C000158
00010001  0C00015C  00010001  0C000160  D7D3E8C3  F0F0F4F7*
02E3E7E3  40000168  4040001C  40400001  000002B8  000002B0  000002B0
000002D8  000002DC  800002B0  00000334  40404040  40404040  40404040
40404040  40404040  40404040  40404040  D7D3E8C3  F0F0F4F8*
02D9D3C4  40404040  40400038  40404040  00010001  0C000164  00010001
0C000168  00010001  0C00016C  00010001  0C000170  00010001  0C000174
```

```
00010001  0C000178  00010001  0C00017C  D7D3E8C3  F0F0F4F9*
02E3E7E3  40000184  4040001C  40400001  0000032C  000002B0  000002C4
000002D8  000002D4  00000340  000002B0  40404040  40404040  40404040
40404040  40404040  40404040  40404040  D7D3E8C3  F0F0F5F0**
02D9D3C4  40404040  40400038  40404040  00010001  0C000180  00010001
0C000184  00010001  0C000188  00010001  0C00018C  00010001  0C000190
00010001  0C000194  00010001  0C000198  D7D3E8C3  F0F0F5F1*
02E3E7E3  400001A0  4040001C  40400001  000002B0  000002B0  000002B0
000002B4  000002B8  000002B0  000002B0  40404040  40404040  40404040
40404040  40404040  40404040  40404040  D7D3E8C3  F0F0F5F2*
02D9D3C4  40404040  40400038  40404040  00010001  0C00019C  00010001
0C0001A0  00010001  0C0001A4  00010001  0C0001A8  00010001  0C0001AC
00010001  0C0001B0  00010001  0C0001B4  D7D3E8C3  F0F0F5F3*
02E3E7E3  400001BC  4040001C  40400001  000002D8  000002DC  800002B0
00000314  00000328  00000318  80000328  40404040  40404040  40404040
40404040  40404040  40404040  40404040  D7D3E8C3  F0F0F5F4*
02D9D3C4  40404040  40400038  40404040  00010001  0C0001B8  00010001
0C0001BC  00010001  0C0001C0  00010001  0C0001C4  00010001  0C0001C8
00010001  0C0001CC  00010001  0C0001D0  D7D3E8C3  F0F0F5F5*
02E3E7E3  400001DC  4040001C  40400001  800002C8  00000334  0000032C
000002B0  00000330  000002D8  000002D4  40404040  40404040  40404040
40404040  40404040  40404040  40404040  D7D3E8C3  F0F0F5F6*
02D9D3C4  40404040  40400038  40404040  00010001  0C0001D4  00010001
0C0001DC  00010001  0C0001E0  00010001  0C0001E4  00010001  0C0001E8
00010001  0C0001EC  00010001  0C0001F0  D7D3E8C3  F0F0F5F7*
02E3E7E3  400001FC  4040001C  40400001  000002B0  000002B0  000002B0
000002B0  000002B4  000002B8  000002B0  40404040  40404040  40404040
40404040  40404040  40404040  40404040  D7D3E8C3  F0F0F5F8*

MEMBER NAME  PLYCHT
02D9D3C4  40404040  40400038  40404040  00010001  0C0001F4  00010001
0C0001FC  00010001  0C000200  00010001  0C000204  00010001  0C000208
00010001  0C00020C  00010001  0C000210  D7D3E8C3  F0F0F5F9*
02E3E7E3  40000218  4040001C  40400001  000002B0  000002D8  000002DC
800002B0  00000314  00000324  00000314  40404040  40404040  40404040
40404040  40404040  40404040  40404040  D7D3E8C3  F0F0F6F0**
02D9D3C4  40404040  40400038  40404040  00010001  0C000214  00010001
0C000218  00010001  0C00021C  00010001  0C000220  00010001  0C000224
00010001  0C000228  00010001  0C00022C  D7D3E8C3  F0F0F6F1*
02E3E7E3  40000234  4040001C  40400001  80000328  0000031C  00000324
0000031C  80000328  00000320  00000324  40404040  40404040  40404040
40404040  40404040  40404040  40404040  D7D3E8C3  F0F0F6F2*
02D9D3C4  40404040  40400038  40404040  00010001  0C000230  00010001
0C000234  00010001  0C000238  00010001  0C00023C  00010001  0C000240
00010001  0C000244  00010001  0C000248  D7D3E8C3  F0F0F6F3*
02E3E7E3  40000250  4040001C  40400001  00000320  80000328  00000318
00000324  00000318  80000328  00000408  40404040  40404040  40404040
40404040  40404040  40404040  40404040  D7D3E8C3  F0F0F6F4*
02D9D3C4  40404040  40400038  40404040  00010001  0C00024C  00010001
0C000250  00010001  0C000254  00010001  0C000258  00010001  0C00025C
00010001  0C000260  00010001  0C000264  D7D3E8C3  F0F0F6F5*
02E3E7E3  4000026C  4040001C  40400001  000002F0  000002B0  000002C0
000002D8  000002D4  00000048  000002B0  40404040  40404040  40404040
40404040  40404040  40404040  40404040  D7D3E8C3  F0F0F6F6*
02D9D3C4  40404040  40400038  40404040  00010001  0C000268  00010001
0C00026C  00010001  0C000270  00010001  0C000274  00010001  0C000278
00010001  0C00027C  00010001  0C000280  D7D3E8C3  F0F0F6F7*
02E3E7E3  40000288  4040001C  40400001  000002B0  000002B0  000002B0
000002B4  000002B8  000002B0  000002B0  40404040  40404040  40404040
```

```
40404040  40404040  40404040  40404040  D7D3E8C3  F0F0F6F8*
02D9D3C4  40404040  40400038  40404040  00010001  0C000284  00010001
0C000288  00010001  0C00028C  00010001  0C000290  00010001  0C000294
00010001  0C000298  00010001  0C00029C  D7D3E8C3  F0F0F6F9*
02E3E7E3  400002A4  4040000C  40400001  000002D8  000002DC  800002B0
40404040  40404040  40404040  40404040  40404040  40404040  40404040
40404040  40404040  40404040  40404040  D7D3E8C3  F0F0F7F0**
02E3E7E3  40000404  4040000C  40400001  00000000  00000000  00000000
40404040  40404040  40404040  40404040  40404040  40404040  40404040
40404040  40404040  40404040  40404040  D7D3E8C3  F0F0F7F1*
02D9D3C4  40404040  40400020  40404040  00010001  0C0002A0  00010001
0C0002A4  00010001  0C0002A8  00010001  0C0002AC  40404040  40404040
40404040  40404040  40404040  40404040  D7D3E8C3  F0F0F7F2*
02C5D5C4  40404040  40404040  40404040  40404040  40404040  40404040
00000612  F1F5F7F3  F460C6D6  F34040F0  F2F0F2F8  F7F0F9F8  40F0F84B
F4F14BF4  F5404040  D7D3E8C3  C8E34040  D7D3E8C3  F0F0F7F3**

MEMBER NAME  PLYWRN
02C5E2C4  40404040  40400010  40400001  D7D3E8E6  D9D54040  00000000
40000000  40404040  40404040  40404040  40404040  40404040  40404040
40404040  40404040  40404040  40404040  D7D3E8E6  F0F0F0F1*
02E3E7E3  40000000  40400038  40400001  47F0F00C  07D7D3E8  E6D9D540
90ECD00C  184D98CD  F0205040  D00450D0  400807FC  40404040  40404040
021A1D40  C5D9D9D6  D940C9D5  40D7D3E8  D7D3E8E6  F0F0F0F2*
02E3E7E3  40000038  40400011  40400001  E6D9D540  4DE2E4D7  C5D940E3
C5E7E35D  22404040  40404040  40404040  40404040  40404040  40404040
40404040  40404040  40404040  40404040  D7D3E8E6  F0F0F0F3*
02E3E7E3  40000050  40400020  40400001  C3C1E4E3  C9D6D540  C3C8C1D9
E3404040  C3C1E4E3  C9D6D540  C3C8C1D9  E3404040  40404040  40404040
40404040  40404040  40404040  40404040  D7D3E8E6  F0F0F0F4*
02E3E7E3  400002B8  40400038  40400001  00000000  00000001  00000003
00000004  0000000D  0000001A  00000048  00000049  00000078  401DF3B6
4029FBE7  403EF9DB  40800000  41200000  D7D3E8E6  F0F0F0F5*
02C5E2C4  40404040  40400010  40400002  D9D4D6C4  C5D34040  05000000
40000018  40404040  40404040  40404040  40404040  40404040  40404040
40404040  40404040  40404040  40404040  D7D3E8E6  F0F0F0F6*
02E3E7E3  400002F0  40400028  40400001  41280000  412C0000  41300000
41473333  41480000  415C353F  415E6666  42110000  00000000  00000000
40404040  40404040  40404040  40404040  D7D3E8E6  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  D7D3E8E6  F0F0F0F8*
02C5E2C4  40404040  40400010  40400004  C3C1C4D3  D5F14040  02000000
40000000  40404040  40404040  40404040  40404040  40404040  40404040
40404040  40404040  40404040  40404040  D7D3E8E6  F0F0F0F9*
02E3E7E3  400003F0  4040000C  40400001  FFFFFFFF  00000000  00000000
40404040  40404040  40404040  40404040  40404040  40404040  40404040
40404040  40404040  40404040  40404040  D7D3E8E6  F0F0F1F0**
02C5E2C4  40404040  40400010  40400005  C3C1C4E2  E4D74040  02000000
40000000  40404040  40404040  40404040  40404040  40404040  40404040
40404040  40404040  40404040  40404040  D7D3E8E6  F0F0F1F1*
02C5E2C4  40404040  40400010  40400006  C8C7C4C1  E3C54040  02000000
40000000  40404040  40404040  40404040  40404040  40404040  40404040
40404040  40404040  40404040  40404040  D7D3E8E6  F0F0F1F2*
02C5E2C4  40404040  40400010  40400007  C8C7E3C9  D4C54040  02000000
40000000  40404040  40404040  40404040  40404040  40404040  40404040
40404040  40404040  40404040  40404040  D7D3E8E6  F0F0F1F3*
02C5E2C4  40404040  40400010  40400008  C9C2C3D6  D47B4040  02000000
40000000  40404040  40404040  40404040  40404040  40404040  40404040
```

```
40404040  40404040  40404040  40404040  D7D3E8E6  F0F0F1F4*
02C5E2C4  40404040  40400010  40400009  C9C3D5E3  C5D94040  02000000
40000000  40404040  40404040  40404040  40404040  40404040  40404040
40404040  40404040  40404040  40404040  D7D3E8E6  F0F0F1F5*
02E3E7E3  40000400  40400018  40400001  00000000  00000000  00000000
00000000  00000000  00000000  40404040  40404040  40404040  40404040
40404040  40404040  40404040  40404040  D7D3E8E6  F0F0F1F6*
02D9D3C4  40404040  40400038  40404040  00020001  0C0003F0  00030001
1C0003F4  00040001  1C000400  00050001  1C000404  00060001  1C000408
00070001  1C00040C  00080001  1C000410  D7D3E8E6  F0F0F1F7*
02E3E7E3  40000350  40400038  40400001  4040E740  D3D6C340  4040E840
D3D6C340  40404040  C5D9D9D6  D9E24040  40404040  C3D6D7E8  D9C9C7C8
E3404DC3  5D40F1F9  F8F640E3  C8C540C2  D7D3E8E6  F0F0F1F8*
02E3E7E3  40000388  40400038  40400001  D6C5C9D5  C740C3D6  D4D7C1D5
E85BC1D3  D340D9C9  C7C8E3E2  40D9C5E2  C5D9E5C5  C45B5BE2  D3C9C340
E5C5D9E2  C9D6D540  E7E74BE7  40404040  D7D3E8E6  F0F0F1F9*
02E3E7E3  400003C0  40400028  40400001  40404040  4040C4C1  E3C57A40

MEMBER NAME  PLYWRN
E7E761E7  E761E7E7  40404040  4040E3C9  D4C57A40  E7E77AE7  E77AE7E7
40404040  40404040  40404040  40404040  D7D3E8E6  F0F0F2F0**
02E3E7E3  40000428  40400038  40400001  5880D380  58B0D388  5870D264
4100D348  5000D078  58F0D384  4110D074  05EF58F0  D39C4110  D08005EF
58F0D398  4110D084  05EF7800  D2943300  D7D3E8E6  F0F0F2F1*
02E3E7E3  40000460  40400038  40400001  7000D2CC  7800D298  33007000
D2AC7800  D28C3300  7000D2B4  7800D288  33007000  D2B87800  D2987000
D2B07800  D2847000  D2BC7800  D2907000  D7D3E8E6  F0F0F2F2*
02E3E7E3  40000498  40400038  40400001  D2C458F0  D3944110  D08805EF
41E00004  15FE4720  D44458EF  D04C07FE  7800D288  7000D2C4  58F0D394
4110D0D0  05EF41E0  000415FE  4720D466  D7D3E8E6  F0F0F2F3*
02E3E7E3  400004D0  40400038  40400001  58EFD054  07FE7800  D2807000
D2C458F0  D3944110  D11805EF  41E00004  15FE4720  D48858EF  D05C07FE
7800D2BC  7000D2C0  58F0D390  4110D160  D7D3E8E6  F0F0F2F4*
02E3E7E3  40000508  40400038  40400001  05EF7800  D2C07B00  D2787000
D2C058F0  D3904110  D16005EF  7800D27C  7000D2C4  5800D2D0  12004780
D5325890  D24C18A7  410AB000  5000D170  D7D3E8E6  F0F0F2F5*
02E3E7E3  40000540  40400038  40400001  58F0D3A4  4110D170  05EF5000
D2C8410A  B0005000  D19058F0  D3944110  D17805EF  41E00004  15FE4720
D50058EF  D06407FE  7800D2C4  7B00D278  D7D3E8E6  F0F0F2F6*
02E3E7E3  40000578  40400038  40400001  7000D2C4  7800D2C0  7B00D278
7000D2C0  58F0D390  4110D160  05EF5A90  D24C5AA0  D2605990  D2D047C0
D4C858F0  D3904110  D1C005EF  58F0D390  D7D3E8E6  F0F0F2F7*
02E3E7E3  400005B0  40400038  40400001  4110D1D0  05EF58F0  D3904110
D1E005EF  58F0D390  4110D1F0  05EF7800  D29C3300  7000D3B0  58F0D394
4110D200  05EF41E0  000415FE  4720D57E  D7D3E8E6  F0F0F2F8*
02E3E7E3  400005E8  40400038  40400001  58EFD06C  07FE1BFF  58E0D000
07FE58F0  D3A01800  45E0F004  00000006  00000028  45E0F010  1BFF58E0
D00007FE  58D0D004  58E0D00C  92FFD00C  D7D3E8E6  F0F0F2F9*
02E3E7E3  40000620  40400032  40400001  982CD01C  07FE5870  10045820
70005020  D2D05820  10004130  20004150  00011B25  5C40D260  1B255020
D3885030  D38C47F0  D3B84040  40404040  D7D3E8E6  F0F0F3F0**
02E3E7E3  40000020  40400008  40400001  00000626  00000070  40404040
40404040  40404040  40404040  40404040  40404040  40404040  40404040
40404040  40404040  40404040  40404040  D7D3E8E6  F0F0F3F1*
02E3E7E3  40000070  40400004  40400001  00000614  40404040  40404040
40404040  40404040  40404040  40404040  40404040  40404040  40404040
40404040  40404040  40404040  40404040  D7D3E8E6  F0F0F3F2*
02E3E7E3  400000BC  4040000C  40400001  000004B4  000005F6  000004D6
40404040  40404040  40404040  40404040  40404040  40404040  40404040
```

| | | | | | | |
|---|---|---|---|---|---|---|
| 40404040 | 40404040 | 40404040 | 40404040 | D7D3E8E6 | F0F0F3F3* | |
| 02D9D3C4 | 40404040 | 40400038 | 40404040 | 00090001 | 1C000414 | 00010001 |
| 0C000604 | 00010001 | 0C000020 | 00010001 | 0C000024 | 00010001 | 0C000070 |
| 00010001 | 0C0000BC | 00010001 | 0C0000C0 | D7D3E8E6 | F0F0F3F4* | |
| 02E3E7E3 | 400000C8 | 4040001C | 40400001 | 000005F6 | 000004F8 | 000005F6 |
| 00000570 | 000005F6 | 000005EE | 000005F6 | 40404040 | 40404040 | 40404040 |
| 40404040 | 40404040 | 40404040 | 40404040 | D7D3E8E6 | F0F0F3F5* | |
| 02D9D3C4 | 40404040 | 40400038 | 40404040 | 00010001 | 0C0000C4 | 00010001 |
| 0C0000C8 | 00010001 | 0C0000CC | 00010001 | 0C0000D0 | 00010001 | 0C0000D4 |
| 00010001 | 0C0000D8 | 00010001 | 0C0000DC | D7D3E8E6 | F0F0F3F6* | |
| 02E3E7E3 | 400000E4 | 40400004 | 40400001 | 000002C4 | 40404040 | 40404040 |
| 40404040 | 40404040 | 40404040 | 40404040 | 40404040 | 40404040 | 40404040 |
| 40404040 | 40404040 | 40404040 | 40404040 | D7D3E8E6 | F0F0F3F7* | |
| 02E3E7E3 | 400000EC | 40400018 | 40400001 | 80000014 | 800003E0 | 800003CC |
| 0000033C | 00000334 | 000002B8 | 40404040 | 40404040 | 40404040 | 40404040 |
| 40404040 | 40404040 | 40404040 | 40404040 | D7D3E8E6 | F0F0F3F8* | |
| 02D9D3C4 | 40404040 | 40400038 | 40404040 | 00010001 | 0C0000E0 | 00010001 |
| 0C0000E4 | 00020001 | 0C0000EC | 00010001 | 0C0000F0 | 00010001 | 0C0000F4 |

MEMBER NAME PLYWRN

| | | | | | | |
|---|---|---|---|---|---|---|
| 00010001 | 0C0000F8 | 00010001 | 0C0000FC | D7D3E8E6 | F0F0F3F9* | |
| 02E3E7E3 | 40000104 | 4040001C | 40400001 | 000002D8 | 000002E0 | 000002DC |
| 00000370 | 000002B8 | 000002B8 | 000002B8 | 40404040 | 40404040 | 40404040 |
| 40404040 | 40404040 | 40404040 | 40404040 | D7D3E8E6 | F0F0F4F0** | |
| 02D9D3C4 | 40404040 | 40400038 | 40404040 | 00010001 | 0C000100 | 00010001 |
| 0C000104 | 00010001 | 0C000108 | 00010001 | 0C00010C | 00010001 | 0C000110 |
| 00010001 | 0C000114 | 00010001 | 0C000118 | D7D3E8E6 | F0F0F4F1* | |
| 02E3E7E3 | 40000120 | 4040001C | 40400001 | 000002B8 | 000002BC | 000002C0 |
| 000002B8 | 000002B8 | 000002E0 | 000002E4 | 40404040 | 40404040 | 40404040 |
| 40404040 | 40404040 | 40404040 | 40404040 | D7D3E8E6 | F0F0F4F2* | |
| 02D9D3C4 | 40404040 | 40400038 | 40404040 | 00010001 | 0C00011C | 00010001 |
| 0C000120 | 00010001 | 0C000124 | 00010001 | 0C000128 | 00010001 | 0C00012C |
| 00010001 | 0C000130 | 00010001 | 0C000134 | D7D3E8E6 | F0F0F4F3* | |
| 02E3E7E3 | 4000013C | 4040001C | 40400001 | 800002B8 | 0000033C | 00000334 |
| 000002B8 | 000002C8 | 000002E0 | 000002DC | 40404040 | 40404040 | 40404040 |
| 40404040 | 40404040 | 40404040 | 40404040 | D7D3E8E6 | F0F0F4F4* | |
| 02D9D3C4 | 40404040 | 40400038 | 40404040 | 00010001 | 0C000138 | 00010001 |
| 0C00013C | 00010001 | 0C000140 | 00010001 | 0C000144 | 00010001 | 0C000148 |
| 00010001 | 0C00014C | 00010001 | 0C000150 | D7D3E8E6 | F0F0F4F5* | |
| 02E3E7E3 | 40000158 | 4040001C | 40400001 | 00000060 | 000002B8 | 000002B8 |
| 000002B8 | 000002B8 | 000002BC | 000002C0 | 40404040 | 40404040 | 40404040 |
| 40404040 | 40404040 | 40404040 | 40404040 | D7D3E8E6 | F0F0F4F6* | |
| 02D9D3C4 | 40404040 | 40400038 | 40404040 | 00010001 | 0C000154 | 00010001 |
| 0C000158 | 00010001 | 0C00015C | 00010001 | 0C000160 | 00010001 | 0C000164 |
| 00010001 | 0C000168 | 00010001 | 0C00016C | D7D3E8E6 | F0F0F4F7* | |
| 02E3E7E3 | 40000174 | 4040001C | 40400001 | 000002B8 | 000002B8 | 000002E0 |
| 000002E4 | 800002B8 | 0000033C | 00000334 | 40404040 | 40404040 | 40404040 |
| 40404040 | 40404040 | 40404040 | 40404040 | D7D3E8E6 | F0F0F4F8* | |
| 02D9D3C4 | 40404040 | 40400038 | 40404040 | 00010001 | 0C000170 | 00010001 |
| 0C000174 | 00010001 | 0C000178 | 00010001 | 0C00017C | 00010001 | 0C000180 |
| 00010001 | 0C000184 | 00010001 | 0C000188 | D7D3E8E6 | F0F0F4F9* | |
| 02E3E7E3 | 40000190 | 4040001C | 40400001 | 000002B8 | 000002CC | 000002E0 |
| 000002DC | 00000350 | 000002B8 | 000002B8 | 40404040 | 40404040 | 40404040 |
| 40404040 | 40404040 | 40404040 | 40404040 | D7D3E8E6 | F0F0F5F0** | |
| 02D9D3C4 | 40404040 | 40400038 | 40404040 | 00010001 | 0C00018C | 00010001 |
| 0C000190 | 00010001 | 0C000194 | 00010001 | 0C000198 | 00010001 | 0C00019C |
| 00010001 | 0C0001A0 | 00010001 | 0C0001A4 | D7D3E8E6 | F0F0F5F1* | |
| 02E3E7E3 | 400001AC | 4040001C | 40400001 | 000002B8 | 000002B8 | 000002BC |
| 000002C0 | 000002B8 | 000002B8 | 000002E0 | 40404040 | 40404040 | 40404040 |

40404040 40404040 40404040 40404040 D7D3E8E6 F0F0F5F2*
02D9D3C4 40404040 40400038 40404040 00010001 0C0001A8 00010001
0C0001AC 00010001 0C0001B0 00010001 0C0001B4 00010001 0C0001B8
00010001 0C0001BC 00010001 0C0001C0 D7D3E8E6 F0F0F5F3*
02E3E7E3 400001C8 40400018 40400001 000002E4 800002B8 0000031C
00000330 00000320 80000330 40404040 40404040 40404040 40404040
40404040 40404040 40404040 40404040 D7D3E8E6 F0F0F5F4*
02E3E7E3 400001E4 40400004 40400001 800002D0 40404040 40404040
40404040 40404040 40404040 40404040 40404040 40404040 40404040
40404040 40404040 40404040 40404040 D7D3E8E6 F0F0F5F5*
02D9D3C4 40404040 40400038 40404040 00010001 0C0001C4 00010001
0C0001C8 00010001 0C0001CC 00010001 0C0001D0 00010001 0C0001D4
00010001 0C0001D8 00010001 0C0001DC D7D3E8E6 F0F0F5F6*
02E3E7E3 400001E8 40400018 40400001 0000033C 00000334 000002B8
00000338 000002E0 000002DC 40404040 40404040 40404040 40404040
40404040 40404040 40404040 40404040 D7D3E8E6 F0F0F5F7*
02E3E7E3 40000204 40400004 40400001 000002B8 40404040 40404040
40404040 40404040 40404040 40404040 40404040 40404040 40404040
40404040 40404040 40404040 40404040 D7D3E8E6 F0F0F5F8*

MEMBER NAME PLYWRN
02D9D3C4 40404040 40400038 40404040 00010001 0C0001E4 00010001
0C0001E8 00010001 0C0001EC 00010001 0C0001F0 00010001 0C0001F4
00010001 0C0001F8 00010001 0C0001FC D7D3E8E6 F0F0F5F9*
02E3E7E3 40000208 4040001C 40400001 000002B8 000002B8 000002B8
000002BC 000002C0 000002B8 000002B8 40404040 40404040 40404040
40404040 40404040 40404040 40404040 D7D3E8E6 F0F0F6F0**
02D9D3C4 40404040 40400038 40404040 00010001 0C000204 00010001
0C000208 00010001 0C00020C 00010001 0C000210 00010001 0C000214
00010001 0C000218 00010001 0C00021C D7D3E8E6 F0F0F6F1*
02E3E7E3 40000224 4040001C 40400001 000002E0 000002E4 800002B8
0000031C 0000032C 0000031C 80000330 40404040 40404040 40404040
40404040 40404040 40404040 40404040 D7D3E8E6 F0F0F6F2*
02D9D3C4 40404040 40400038 40404040 00010001 0C000220 00010001
0C000224 00010001 0C000228 00010001 0C00022C 00010001 0C000230
00010001 0C000234 00010001 0C000238 D7D3E8E6 F0F0F6F3*
02E3E7E3 40000240 4040001C 40400001 00000324 0000032C 00000324
80000330 00000328 0000032C 00000328 40404040 40404040 40404040
40404040 40404040 40404040 40404040 D7D3E8E6 F0F0F6F4*
02D9D3C4 40404040 40400038 40404040 00010001 0C00023C 00010001
0C000240 00010001 0C000244 00010001 0C000248 00010001 0C00024C
00010001 0C000250 00010001 0C000254 D7D3E8E6 F0F0F6F5*
02E3E7E3 4000025C 4040001C 40400001 80000330 00000320 0000032C
00000320 80000330 00000420 000002F0 40404040 40404040 40404040
40404040 40404040 40404040 40404040 D7D3E8E6 F0F0F6F6*
02D9D3C4 40404040 40400038 40404040 00010001 0C000258 00010001
0C00025C 00010001 0C000260 00010001 0C000264 00010001 0C000268
00010001 0C00026C 00010001 0C000270 D7D3E8E6 F0F0F6F7*
02E3E7E3 40000278 4040001C 40400001 000002B8 000002C8 000002E0
000002DC 00000050 000002B8 000002B8 40404040 40404040 40404040
40404040 40404040 40404040 40404040 D7D3E8E6 F0F0F6F8*
02D9D3C4 40404040 40400038 40404040 00010001 0C000274 00010001
0C000278 00010001 0C00027C 00010001 0C000280 00010001 0C000284
00010001 0C000288 00010001 0C00028C D7D3E8E6 F0F0F6F9*
02E3E7E3 40000294 4040001C 40400001 000002B8 000002B8 000002BC
000002C0 000002B8 000002B8 000002E0 40404040 40404040 40404040
40404040 40404040 40404040 40404040 D7D3E8E6 F0F0F7F0**
02D9D3C4 40404040 40400038 40404040 00010001 0C000290 00010001
0C000294 00010001 0C000298 00010001 0C00029C 00010001 0C0002A0

| | | | | | | |
|---|---|---|---|---|---|---|
| 00010001 | 0C0002A4 | 00010001 | 0C0002A8 | D7D3E8E6 | F0F0F7F1* | |
| 02E3E7E3 | 400002B0 | 40400008 | 40400001 | 000002E4 | 800002B8 | 40404040 |
| 40404040 | 40404040 | 40404040 | 40404040 | 40404040 | 40404040 | 40404040 |
| 40404040 | 40404040 | 40404040 | 40404040 | D7D3E8E6 | F0F0F7F2* | |
| 02E3E7E3 | 40000418 | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | D7D3E8E6 | F0F0F7F3* | |
| 02D9D3C4 | 40404040 | 40400018 | 40404040 | 00010001 | 0C0002AC | 00010001 |
| 0C0002B0 | 00010001 | 0C0002B4 | 40404040 | 40404040 | 40404040 | 40404040 |
| 40404040 | 40404040 | 40404040 | 40404040 | D7D3E8E6 | F0F0F7F4* | |
| 02C5D5C4 | 40404040 | 40404040 | 40404040 | 40404040 | 40404040 | 40404040 |
| 00000652 | F1F5F7F3 | F460C6D6 | F34040F0 | F2F0F2F8 | F7F0F9F8 | 40F0F84B |
| F4F14BF5 | F0404040 | D7D3E8E6 | D9D54040 | D7D3E8E6 | F0F0F7F5** | |

MEMBER NAME POINTS

| | | | | | | |
|---|---|---|---|---|---|---|
| 02C5E2C4 | 40404040 | 40400010 | 40400001 | D7D6C9D5 | E3E24040 | 00000000 |
| 40000000 | 40404040 | 40404040 | 40404040 | 40404040 | 40404040 | 40404040 |
| 40404040 | 40404040 | 40404040 | 40404040 | D7D6C9D5 | F0F0F0F1* | |
| 02E3E7E3 | 40000000 | 40400038 | 40400001 | 47F0F00C | 07D7D6C9 | D5E3E240 |
| 90ECD00C | 184D98CD | F0205040 | D00450D0 | 400807FC | 40404040 | 40404040 |
| 021A2640 | C9D5E5C1 | D3C9C440 | C7C5D5C5 | D7D6C9D5 | F0F0F0F2* | |
| 02E3E7E3 | 40000038 | 40400038 | 40400001 | D9C9C340 | E3E8D7C5 | 40C9D540 |
| D7D6C9D5 | E3E2406B | 40C7E37E | 400A0702 | 1A07C9D3 | D6C3407E | 40100322 |
| 021A2340 | C5D9D9D6 | D9407A40 | C3C8C1C9 | D7D6C9D5 | F0F0F0F3* | |
| 02E3E7E3 | 40000070 | 40400038 | 40400001 | D5C9D5C7 | 40C9D540 | D7D6C9D5 |
| E3E240D9 | D6E4E3C9 | D5C52202 | 1A2A40C5 | D9D9D6D9 | 7A40C7E3 | D7E3E240 |
| C1D9D9C1 | E840C6E4 | D3D340C9 | D540D7D6 | D7D6C9D5 | F0F0F0F4* | |
| 02E3E7E3 | 400000A8 | 4040000D | 40400001 | C9D5E3E2 | 40D9D6E4 | E3C9D5C5 |
| 22404040 | 40404040 | 40404040 | 40404040 | 40404040 | 40404040 | 40404040 |
| 40404040 | 40404040 | 40404040 | 40404040 | D7D6C9D5 | F0F0F0F5* | |
| 02E3E7E3 | 40000190 | 40400038 | 40400001 | 00000000 | 00000000 | 4F080000 |
| 00000000 | 00000001 | 00000002 | 00000003 | 00000004 | 00000005 | 00000007 |
| 00000008 | 00000009 | 0000000B | 0000000E | D7D6C9D5 | F0F0F0F6* | |
| 02C5E2C4 | 40404040 | 40400010 | 40400002 | D7E3D3D5 | 40404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F0F7* | |
| 02E3E7E3 | 400001C8 | 4040000C | 40400001 | 00021054 | 00000000 | 00000000 |
| 40404040 | 40404040 | 40404040 | 40404040 | 40404040 | 40404040 | 40404040 |
| 40404040 | 40404040 | 40404040 | 40404040 | D7D6C9D5 | F0F0F0F8* | |
| 02E3E7E3 | 40000238 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7D6C9D5 | F0F0F0F9* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F0** | |
| 02E3E7E3 | 40000244 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D6C9D5 | F0F0F1F1* | |
| 02C5E2C4 | 40404040 | 40400010 | 40400004 | D7E3C1D9 | C3404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F2* | |
| 02C5E2C4 | 40404040 | 40400010 | 40400005 | D7E3E2D7 | D3404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F3* | |
| 02E3E7E3 | 4000024C | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | D7D6C9D5 | F0F0F1F4* | |
| 02C5E2C4 | 40404040 | 40400010 | 40400006 | C9C2C3D6 | D47B4040 | 02000000 |
| 40000000 | 40404040 | 40404040 | 40404040 | 40404040 | 40404040 | 40404040 |

```
40404040  40404040  40404040  40404040  D7D6C9D5  F0F0F1F5*
02E3E7E3  40000260  40400004  40400001  00000000  40404040  40404040
40404040  40404040  40404040  40404040  40404040  40404040  40404040
40404040  40404040  40404040  40404040  D7D6C9D5  F0F0F1F6*
02C5E2C4  40404040  40400010  40400007  D7D9D6D1  D3D54040  02000000
40000000  40404040  40404040  40404040  40404040  40404040  40404040
40404040  40404040  40404040  40404040  D7D6C9D5  F0F0F1F7*
02E3E7E3  40000268  4040000C  40400001  00000000  00000000  00000000
40404040  40404040  40404040  40404040  40404040  40404040  40404040
40404040  40404040  40404040  40404040  D7D6C9D5  F0F0F1F8*
02E3E7E3  400002DC  40400038  40400001  5880D1A8  5890D184  58A0D0E8
50A0D120  5800D0F4  5000D204  5800D100  5000D20C  5800D0F4  5000D1C0
5800D1DC  5000D1C8  5800D100  5000D1CC  D7D6C9D5  F0F0F1F9*
02E3E7E3  40000314  40400038  40400001  5000D214  5000D218  5800D21C

MEMBER NAME  POINTS
5000D208  5800D220  5000D210  58B0D18C  58E0D208  585EB000  5050D130
58E0D210  582EB000  18755C60  D1DC1837  D7D6C9D5  F0F0F2F0**
02E3E7E3  4000034C  40400038  40400001  5A30D0F4  2B007803  80006A00
D0E06000  D0D85800  D0DC5000  D14C1837  5A30D1F4  4100D168  5000D080
41038000  5000D084  9280D084  58F0D194  D7D6C9D5  F0F0F2F1*
02E3E7E3  40000384  40400038  40400001  4110D07C  05EF5870  D1585C60
D1001847  5A40D0F4  41049000  5000D080  41038000  5000D084  9280D084
58F0D194  4110D07C  05EF58E0  D2085800  D7D6C9D5  F0F0F2F2*
02E3E7E3  400003BC  40400038  40400001  D158500E  B0001A0A  5000D158
50A0D11C  5800D218  5A00D0F4  5000D1E0  5C40D1DC  18055A00  D0F45000
D1C41805  5A00D1E4  5000D1F8  18055A00  D7D6C9D5  F0F0F2F3*
02E3E7E3  400003F4  40400038  40400001  D1E85000  D1FC5A50  D1EC5050
D20018B2  58E0D1C4  2B00780E  80006A00  D0E06000  D0D85820  D0DC5020
D154192A  4780D3BC  5920D0F0  4780D4FC  D7D6C9D5  F0F0F2F4*
02E3E7E3  4000042C  40400038  40400001  5920D0F4  4780D526  58F0D1B0
45E0F004  00000006  00000028  5850D130  5C40D1DC  5830D0F4  1A3545E0
F0080473  800045E0  F0080450  D13045E0  D7D6C9D5  F0F0F2F5*
02E3E7E3  40000464  40400038  40400001  F01058F0  D1B045E0  F0340540
4040F1F5  58E0D1C4  410E8000  5000D08C  58F0D180  4110D088  05EF41E0
000415FE  4720D3E2  58EFD04C  07FE58E0  D7D6C9D5  F0F0F2F6*
02E3E7E3  4000049C  40400038  40400001  D1E05820  D15858F0  D18C5B2E
F0005920  D0F04750  D5E25830  D1301B3A  5C20D1C8  5A30D1C0  2B007803
80006A00  D0E06000  D0D85820  D0DC192A  D7D6C9D5  F0F0F2F7*
02E3E7E3  400004D4  40400038  40400001  4770D5E2  5830D158  5B30D0F0
5850D158  5B50D0EC  5050D140  5870D158  1B7A5070  D1385C40  D1CC1825
5A20D1C0  5020D1D0  41029000  5000D0A0  D7D6C9D5  F0F0F2F8*
02E3E7E3  4000050C  40400038  40400001  9280D0A0  58F0D194  4110D098
05EF5C20  D1CC1853  5A50D1C0  18435A40  D1CC5C60  D1CC1837  5A30D1C0
5030D1D4  18275A20  D1CC4105  90005000  D7D6C9D5  F0F0F2F9*
02E3E7E3  40000544  40400038  40400001  D0A84104  90005000  D0AC4103
90005000  D0B04102  90005000  D0B49280  D0B458F0  D1B44110  D0A405EF
41E00008  15FE4720  D4C458EF  D05407FE  D7D6C9D5  F0F0F3F0**
02E3E7E3  4000057C  40400038  40400001  47F0D5E2  58E0D1D0  410E9000
5000D080  58E0D1D4  410E9000  5000D084  9280D084  58F0D194  4110D07C
05EF5800  D1581B0A  5000D158  47F0D5E2  D7D6C9D5  F0F0F3F1*
02E3E7E3  400005B4  40400038  40400001  58E0D1C4  410E8000  5000D08C
58F0D198  4110D088  05EF41E0  000415FE  4720D522  58EFD060  07FE47F0
D5E258E0  D1F82B00  780E8000  6A00D0E0  D7D6C9D5  F0F0F3F2*
02E3E7E3  400005EC  40400038  40400001  6000D0D8  5830D0DC  58E0D1FC
2B00780E  80006A00  D0E06000  D0D85850  D0DC58E0  D2002B00  780E8000
6A00D0E0  6000D0D8  5800D0DC  5000D12C  D7D6C9D5  F0F0F3F3*
02E3E7E3  40000624  40400038  40400001  5C20D1F0  5A30D1C0  5C40D1F4
18255A20  D1C058E0  D1C4410E  80005000  D0BC58F0  D1A04103  F0005000
```

```
D0C058F0  D1B84102  F0005000  D0CC58F0  D7D6C9D5  F0F0F3F4*
02E3E7E3  4000065C  4040002C  40400001  D19C4110  D0B805EF  41E00004
15FE4720  D5BC58EF  D06807FE  47F0D5E2  58F0D1B0  45E0F004  00000006
00000060  40404040  40404040  40404040  D7D6C9D5  F0F0F3F5*
02D9D3C4  40404040  40400038  40404040  00020001  1C000238  00030001
1C00024C  00040001  1C000250  00050001  1C000254  00060001  1C000268
00070001  1C00026C  00010001  0C000440  D7D6C9D5  F0F0F3F6*
02E3E7E3  40000688  40400038  40400001  45E0F010  58F0D1B0  45E0F034
05404040  F1F55800  D1301A0A  5000D130  5800D200  5A00D1DC  5000D200
5800D1FC  5A00D1DC  5000D1FC  5800D1F8  D7D6C9D5  F0F0F3F7*
02E3E7E3  400006C0  40400038  40400001  5A00D1DC  5000D1F8  5800D1C4
5A00D1DC  5000D1C4  5800D158  5900D110  47C0D64A  58F0D1B0  45E0F004
00000006  00000087  45E0F010  58F0D1B0  D7D6C9D5  F0F0F3F8*
02E3E7E3  400006F8  40400038  40400001  45E0F034  05404040  F4F45820
D11C1A2A  5020D11C  192B47C0  D34C58B0  D18C59A0  D1544770  D70E59A0

MEMBER NAME  POINTS
D14C4770  D70E5830  D1585B30  D0EC58E0  D7D6C9D5  F0F0F3F9*
02E3E7E3  40000730  40400038  40400001  D208585E  B0001875  1A7A5C40
D20C1825  5A20D204  41029000  5000D0A0  9280D0A0  58F0D194  4110D098
05EF5C20  D20C1853  5A50D204  18435A40  D7D6C9D5  F0F0F4F0**
02E3E7E3  40000768  40400038  40400001  D20C5C60  D20C1837  5A30D204
18275A20  D20C4105  90005000  D0A84104  90005000  D0AC4103  90005000
D0B04102  90005000  D0B49280  D0B458F0  D7D6C9D5  F0F0F4F1*
02E3E7E3  400007A0  40400038  40400001  D1B44110  D0A405EF  41E00008
15FE4720  D70058EF  D07007FE  47F0D70E  5800D158  1B0A5000  D15858E0
D208582E  B0001872  5C60D20C  18475A40  D7D6C9D5  F0F0F4F2*
02E3E7E3  400007D8  40400038  40400001  D2045870  D1581B7A  5C60D20C
18375A30  D2044104  90005000  D0804103  90005000  D0849280  D08458F0
D1944110  D07C05EF  13225A20  D15858E0  D7D6C9D5  F0F0F4F3*
02E3E7E3  40000810  40400038  40400001  D210502E  B0005820  D1201A2A
5020D120  5800D218  5A00D100  5000D218  5800D210  5A00D100  5000D210
5800D208  5A00D100  5000D208  5920D144  D7D6C9D5  F0F0F4F4*
02E3E7E3  40000848  40400038  40400001  47C0D278  1BFF58E0  D00007FE
58A0D004  58E0A00C  58B0A018  5810B024  5820D158  50201000  18DA92FF
A00C982C  A01C07FE  987B1004  58207000  D7D6C9D5  F0F0F4F5*
02E3E7E3  40000880  40400038  40400001  5020D128  58209000  5020D150
987B1014  58207000  5020D144  58209000  5020D15C  58701024  58207000
5020D158  58201000  41302000  41500004  D7D6C9D5  F0F0F4F6*
02E3E7E3  400008B8  40400038  40400001  1B255C40  D10C1B25  5020D1A8
5030D1AC  58201008  41302000  41500004  1B255C40  D1081B25  5020D1A0
5030D1A4  58201010  41302000  41500004  D7D6C9D5  F0F0F4F7*
02E3E7E3  400008F0  40400038  40400001  1B255C40  D0EC1B25  5020D18C
5030D190  58201018  41302000  41500004  1B255C40  D0F81B25  5020D1B8
5030D1BC  58201020  41302000  41500004  D7D6C9D5  F0F0F4F8*
02E3E7E3  40000928  4040001C  40400001  1B255C40  D0EC1B25  5020D184
5030D188  5030D090  5030D0C4  47F0D224  40404040  40404040  40404040
40404040  40404040  40404040  40404040  D7D6C9D5  F0F0F4F9*
02E3E7E3  40000020  40400008  40400001  00000878  000000B8  40404040
40404040  40404040  40404040  40404040  40404040  40404040  40404040
40404040  40404040  40404040  40404040  D7D6C9D5  F0F0F5F0**
02E3E7E3  400000B8  40400004  40400001  00000854  40404040  40404040
40404040  40404040  40404040  40404040  40404040  40404040  40404040
40404040  40404040  40404040  40404040  D7D6C9D5  F0F0F5F1*
02E3E7E3  40000104  4040000C  40400001  0000049A  00000678  0000057C
40404040  40404040  40404040  40404040  40404040  40404040  40404040
40404040  40404040  40404040  40404040  D7D6C9D5  F0F0F5F2*
02D9D3C4  40404040  40400038  40404040  00010001  0C000684  00010001
0C0006EC  00010001  0C000020  00010001  0C000024  00010001  0C0000B8
```

```
00010001  0C000104  00010001  0C000108  D7D6C9D5  F0F0F5F3*
02E3E7E3  40000110  4040001C  40400001  00000580  0000069A  000005DA
00000678  00000674  00000678  000007B8  40404040  40404040  40404040
40404040  40404040  40404040  40404040  D7D6C9D5  F0F0F5F4*
02D9D3C4  40404040  40400038  40404040  00010001  0C00010C  00010001
0C000110  00010001  0C000114  00010001  0C000118  00010001  0C00011C
00010001  0C000120  00010001  0C000124  D7D6C9D5  F0F0F5F5*
02E3E7E3  4000012C  4040000C  40400001  000007BC  000007C6  000001B8
40404040  40404040  40404040  40404040  40404040  40404040  40404040
40404040  40404040  40404040  40404040  D7D6C9D5  F0F0F5F6*
02E3E7E3  4000013C  40400008  40400001  80000000  00000220  40404040
40404040  40404040  40404040  40404040  40404040  40404040  40404040
40404040  40404040  40404040  40404040  D7D6C9D5  F0F0F5F7*
02E3E7E3  4000014C  4040000C  40400001  80000210  000001B8  00000228
40404040  40404040  40404040  40404040  40404040  40404040  40404040
40404040  40404040  40404040  40404040  D7D6C9D5  F0F0F5F8*

MEMBER NAME  POINTS
02D9D3C4  40404040  40400038  40404040  00010001  0C000128  00010001
0C00012C  00010001  0C000130  00010001  0C000134  00010001  0C000140
00010001  0C00014C  00010001  0C000150  D7D6C9D5  F0F0F5F9*
02E3E7E3  40000158  40400008  40400001  80000000  00000228  40404040
40404040  40404040  40404040  40404040  40404040  40404040  40404040
40404040  40404040  40404040  40404040  D7D6C9D5  F0F0F6F0**
02E3E7E3  4000016C  40400008  40400001  80000000  00000220  40404040
40404040  40404040  40404040  40404040  40404040  40404040  40404040
40404040  40404040  40404040  40404040  D7D6C9D5  F0F0F6F1*
02E3E7E3  40000180  40400004  40400001  00000210  40404040  40404040
40404040  40404040  40404040  40404040  40404040  40404040  40404040
40404040  40404040  40404040  40404040  D7D6C9D5  F0F0F6F2*
02E3E7E3  40000188  40400004  40400001  800001E4  40404040  40404040
40404040  40404040  40404040  40404040  40404040  40404040  40404040
40404040  40404040  40404040  40404040  D7D6C9D5  F0F0F6F3*
02E3E7E3  40000278  40400038  40400001  00000000  00000000  00000000
00000000  00000000  00000000  00000000  00000038  00000000  00000024
0000001C  00000020  0000002C  00000014  D7D6C9D5  F0F0F6F4*
02E3E7E3  400002B0  4040002C  40400001  00000000  00000005  00000000
00B00005  00000005  00000000  00D80006  00BC0006  00C00006  0000000C
00000010  40404040  40404040  40404040  D7D6C9D5  F0F0F6F5*
02D9D3C4  40404040  40400028  40404040  00010001  0C000154  00010001
0C00015C  00010001  0C000170  00010001  0C000180  00010001  0C000188
40404040  40404040  40404040  40404040  D7D6C9D5  F0F0F6F6*
02C5D5C4  40404040  40404040  40404040  40404040  40404040  40404040
00000944  F1F5F7F3  F460C6D6  F34040F0  F2F0F2F8  F7F0F9F8  40F0F84B
F4F14BF5  F6404040  D7D6C9D5  E3E24040  D7D6C9D5  F0F0F6F7**

MEMBER NAME  PRCDRV
02C5E2C4  40404040  40400010  40400001  D7D9C3C4  D9E54040  00000000
40000000  40404040  40404040  40404040  40404040  40404040  40404040
40404040  40404040  40404040  40404040  D7D9C3C4  F0F0F0F1*
02E3E7E3  40000000  40400028  40400001  47F0F00C  07D7D9C3  C4D9E540
90ECD00C  184D98CD  F0205040  D00450D0  400807FC  40404040  40404040
40404040  40404040  40404040  40404040  D7D9C3C4  F0F0F0F2*
02E3E7E3  40000088  40400014  40400001  00000000  00000001  00000002
00000000  00000000  40404040  40404040  40404040  40404040  40404040
40404040  40404040  40404040  40404040  D7D9C3C4  F0F0F0F3*
02E3E7E3  400000C0  40400004  40400001  00000000  40404040  40404040
40404040  40404040  40404040  40404040  40404040  40404040  40404040
40404040  40404040  40404040  40404040  D7D9C3C4  F0F0F0F4*
```

| | | | | | | |
|---|---|---|---|---|---|---|
| 02E3E7E3 | 400000C8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9C3C4 | F0F0F0F5* | |
| 02C5E2C4 | 40404040 | 40400010 | 40400002 | D7C9C5D9 | C3C54040 | 02000000 |
| 40000000 | 40404040 | 40404040 | 40404040 | 40404040 | 40404040 | 40404040 |
| 40404040 | 40404040 | 40404040 | 40404040 | D7D9C3C4 | F0F0F0F6* | |
| 02E3E7E3 | 400000D0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9C3C4 | F0F0F0F7* | |
| 02E3E7E3 | 400000D8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9C3C4 | F0F0F0F8* | |
| 02E3E7E3 | 40000100 | 40400038 | 40400001 | 5830D0A8 | 58A0D098 | 58B0D0A0 |
| 5890D064 | 5800D060 | 5000D078 | 58E0D0C8 | 585EB000 | 5C40D0B8 | 5820D0B4 |
| 1A254102 | A0005000 | D04C58E0 | D0CC410E | D7D9C3C4 | F0F0F0F9* | |
| 02E3E7E3 | 40000138 | 40400038 | 40400001 | B0005000 | D05058F0 | D0B04110 |
| D04C05EF | 5800D07C | 5000D078 | 12004780 | D1365990 | D07C4770 | D13E1BFF |
| 58E0D000 | 07FE5990 | D0804780 | D1D45860 | D7D9C3C4 | F0F0F1F0** | |
| 02E3E7E3 | 40000170 | 40400038 | 40400001 | D0D45870 | D0D05880 | D0685857 |
| B0005C40 | D0B81825 | 5A20D0B4 | 4102A000 | 5000D04C | 4106B000 | 5000D050 |
| 58F0D0B0 | 4110D04C | 05EF5800 | D07C5900 | D7D9C3C4 | F0F0F1F1* | |
| 02E3E7E3 | 400001A8 | 40400038 | 40400001 | D0684770 | D18E5800 | D0605000 |
| D0785990 | D07C4770 | D19A5090 | D0785990 | D07C4770 | D1A647F0 | D1B25800 |
| D07C5900 | D0684770 | D1BA1BFF | 58E0D000 | D7D9C3C4 | F0F0F1F2* | |
| 02E3E7E3 | 400001E0 | 40400038 | 40400001 | 07FE1A89 | 5A60D0B8 | 5A70D0B8 |
| 5980D080 | 47C0D152 | 5800D068 | 5000D078 | 1BFF58E0 | D00007FE | 58A0D004 |
| 58E0A00C | 58B0A018 | 5810B014 | 5820D078 | D7D9C3C4 | F0F0F1F3* | |
| 02E3E7E3 | 40000218 | 40400038 | 40400001 | 50201000 | 18DA92FF | A00C982C |
| A01C07FE | 987A1008 | 58207000 | 5020D084 | 58209000 | 5020D080 | 5820A000 |
| 5020D078 | 58201000 | 41302000 | 41500004 | D7D9C3C4 | F0F0F1F4* | |
| 02E3E7E3 | 40000250 | 40400038 | 40400001 | 1B255020 | D0A85030 | D0AC5030 |
| D0545820 | 10044130 | 20004150 | 00041B25 | 5C40D068 | 1B255020 | D0985030 |
| D09C5820 | 100C4130 | 20004150 | 00041B25 | D7D9C3C4 | F0F0F1F5* | |
| 02E3E7E3 | 40000288 | 40400012 | 40400001 | 5C40D068 | 1B255020 | D0A05030 |
| D0A447F0 | D0D84040 | 40404040 | 40404040 | 40404040 | 40404040 | 40404040 |
| 40404040 | 40404040 | 40404040 | 40404040 | D7D9C3C4 | F0F0F1F6* | |
| 02E3E7E3 | 40000020 | 4040000C | 40400001 | 00000228 | 00000028 | 00000204 |
| 40404040 | 40404040 | 40404040 | 40404040 | 40404040 | 40404040 | 40404040 |
| 40404040 | 40404040 | 40404040 | 40404040 | D7D9C3C4 | F0F0F1F7* | |
| 02E3E7E3 | 40000080 | 40400004 | 40400001 | 800000A4 | 40404040 | 40404040 |
| 40404040 | 40404040 | 40404040 | 40404040 | 40404040 | 40404040 | 40404040 |
| 40404040 | 40404040 | 40404040 | 40404040 | D7D9C3C4 | F0F0F1F8* | |
| 02E3E7E3 | 400000DC | 40400024 | 40400001 | 00000004 | 00000008 | 00000000 |
| 00000000 | 00000000 | 0000000C | 00000010 | 00000014 | 00000018 | 40404040 |
| 40404040 | 40404040 | 40404040 | 40404040 | D7D9C3C4 | F0F0F1F9* | |
| 02D9D3C4 | 40404040 | 40400028 | 40404040 | 00020001 | 1C0000D8 | 00010001 |

MEMBER NAME PRCDRV

| | | | | | | |
|---|---|---|---|---|---|---|
| 0C000020 | 00010001 | 0C000024 | 00010001 | 0C000028 | 00010001 | 0C000080 |
| 40404040 | 40404040 | 40404040 | 40404040 | D7D9C3C4 | F0F0F2F0** | |
| 02C5D5C4 | 40404040 | 40404040 | 40404040 | 40404040 | 40404040 | 40404040 |
| 0000029A | F1F5F7F3 | F460C6D6 | F34040F0 | F2F0F2F8 | F7F0F9F8 | 40F0F84B |
| F4F24BF0 | F3404040 | D7D9C3C4 | D9E54040 | D7D9C3C4 | F0F0F2F1** | |

MEMBER NAME PREBRK

| | | | | | | |
|---|---|---|---|---|---|---|
| 02C5E2C4 | 40404040 | 40400010 | 40400001 | D7D9C5C2 | D9D24040 | 00000000 |
| 40000000 | 40404040 | 40404040 | 40404040 | 40404040 | 40404040 | 40404040 |
| 40404040 | 40404040 | 40404040 | 40404040 | D7D9C5C2 | F0F0F0F1* | |
| 02E3E7E3 | 40000000 | 40400028 | 40400001 | 47F0F00C | 07D7D9C5 | C2D9D240 |

```
90ECD00C  184D98CD  F0205040  D00450D0  400807FC  40404040  40404040
40404040  40404040  40404040  40404040  D7D9C5C2  F0F0F0F2*
02E3E7E3  40000078  4040001C  40400001  00000000  00000001  00000002
00000003  0000000E  00000000  00000000  40404040  40404040  40404040
40404040  40404040  40404040  40404040  D7D9C5C2  F0F0F0F3*
02E3E7E3  400000B8  40400004  40400001  00000000  40404040  40404040
40404040  40404040  40404040  40404040  40404040  40404040  40404040
40404040  40404040  40404040  40404040  D7D9C5C2  F0F0F0F4*
02E3E7E3  400000C0  40400004  40400001  00000000  40404040  40404040
40404040  40404040  40404040  40404040  40404040  40404040  40404040
40404040  40404040  40404040  40404040  D7D9C5C2  F0F0F0F5*
02E3E7E3  400000FC  40400038  40400001  7860D050  58A0D0A4  5800D054
5000D06C  5800D0CC  5000D0C4  5800D0D0  5000D0C8  5880D0BC  5890D0A0
58B0D090  58E0D0C4  585EB000  58E0D0C8  D7D9C5C2  F0F0F0F6*
02E3E7E3  40000134  40400038  40400001  587EB000  1C6A1C4A  18271A29
18351A39  189318B2  5880D098  70698000  879AD124  58B0D090  5890D0A0
5880D0BC  5820D06C  5A20D054  5020D06C  D7D9C5C2  F0F0F0F7*
02E3E7E3  4000016C  40400038  40400001  5800D0C8  1A085000  D0C85800
D0C41A08  5000D0C4  5920D07C  47C0D100  1BFF58E0  D00007FE  58D0D004
58E0D00C  92FFD00C  982CD01C  07FE9879  D7D9C5C2  F0F0F0F8*
02E3E7E3  400001A4  40400038  40400001  10045820  70005020  D0745820
90005020  D07C5820  10004130  20004150  00041B25  5C40D060  1B255020
D0985030  D09C5820  10084130  20004150  D7D9C5C2  F0F0F0F9*
02E3E7E3  400001DC  40400016  40400001  00041B25  5C40D05C  1B255020
D0905030  D09447F0  D0D44040  40404040  40404040  40404040  40404040
40404040  40404040  40404040  40404040  D7D9C5C2  F0F0F1F0**
02E3E7E3  40000020  4040000C  40400001  000001A2  00000028  00000190
40404040  40404040  40404040  40404040  40404040  40404040  40404040
40404040  40404040  40404040  40404040  D7D9C5C2  F0F0F1F1*
02E3E7E3  400000C8  40400034  40400001  00000008  00000038  00000000
00000000  00000000  00000000  00000004  0000000C  00000000  00000000
00000000  00000010  00000014  40404040  D7D9C5C2  F0F0F1F2*
02D9D3C4  40404040  40400018  40404040  00010001  0C000020  00010001
0C000024  00010001  0C000028  40404040  40404040  40404040  40404040
40404040  40404040  40404040  40404040  D7D9C5C2  F0F0F1F3*
02C5D5C4  40404040  40404040  40404040  40404040  40404040  40404040
000001F2  F1F5F7F3  F460C6D6  F34040F0  F2F0F2F8  F7F0F9F8  40F0F84B
F4F24BF0  F7404040  D7D9C5C2  D9D24040  D7D9C5C2  F0F0F1F4**

MEMBER NAME  PROFIL
02C5E2C4  40404040  40400010  40400001  D7D9D6C6  C9D34040  00000000
40000000  40404040  40404040  40404040  40404040  40404040  40404040
40404040  40404040  40404040  40404040  D7D9D6C6  F0F0F0F1*
02E3E7E3  40000000  40400038  40400001  47F0F00C  07D7D9D6  C6C9D340
90ECD00C  184D98CD  F0205040  D00450D0  400807FC  40404040  40404040
C3D6D5C6  D3C9C3E3  C9D5C740  C5E7E3C5  D7D9D6C6  F0F0F0F2*
02E3E7E3  40000038  40400018  40400001  D9C9D6D9  E2404040  5C5C5C40
C3E4E340  D6E4E340  5C5C5C40  40404040  40404040  40404040  40404040
40404040  40404040  40404040  40404040  D7D9D6C6  F0F0F0F3*
02E3E7E3  40000188  40400038  40400001  00000000  00000000  00000001
00000001  00000002  00000003  00000004  00000008  0000000F  00000010
00000015  401DF3B6  4029FBE7  403EF9DB  D7D9D6C6  F0F0F0F4*
02E3E7E3  400001C0  40400008  40400001  00000000  00000000  40404040
40404040  40404040  40404040  40404040  40404040  40404040  40404040
40404040  40404040  40404040  40404040  D7D9D6C6  F0F0F0F5*
02E3E7E3  40000260  40400004  40400001  00000000  40404040  40404040
40404040  40404040  40404040  40404040  40404040  40404040  40404040
40404040  40404040  40404040  40404040  D7D9D6C6  F0F0F0F6*
02E3E7E3  40000268  40400004  40400001  00000000  40404040  40404040
```

```
40404040  40404040  40404040  40404040  40404040  40404040  40404040
40404040  40404040  40404040  40404040  D7D9D6C6  F0F0F0F7*
02C5E2C4  40404040  40400010  40400002  D4E5C3C8  D9404040  02000000
40000000  40404040  40404040  40404040  40404040  40404040  40404040
40404040  40404040  40404040  40404040  D7D9D6C6  F0F0F0F8*
02E3E7E3  40000270  40400004  40400001  00000000  40404040  40404040
40404040  40404040  40404040  40404040  40404040  40404040  40404040
40404040  40404040  40404040  40404040  D7D9D6C6  F0F0F0F9*
02C5E2C4  40404040  40400010  40400003  C3C1C4E2  E4D74040  02000000
40000000  40404040  40404040  40404040  40404040  40404040  40404040
40404040  40404040  40404040  40404040  D7D9D6C6  F0F0F1F0**
02C5E2C4  40404040  40400010  40400004  D7D9D6C6  D3F14040  02000000
40000000  40404040  40404040  40404040  40404040  40404040  40404040
40404040  40404040  40404040  40404040  D7D9D6C6  F0F0F1F1*
02C5E2C4  40404040  40400010  40400005  D7D9D6C6  D3F24040  02000000
40000000  40404040  40404040  40404040  40404040  40404040  40404040
40404040  40404040  40404040  40404040  D7D9D6C6  F0F0F1F2*
02E3E7E3  40000278  40400010  40400001  00000000  00000000  00000000
00000000  40404040  40404040  40404040  40404040  40404040  40404040
40404040  40404040  40404040  40404040  D7D9D6C6  F0F0F1F3*
02E3E7E3  400002F0  40400038  40400001  5890D210  58A0D220  58B0D218
5880D144  5080D178  5800D150  5000D238  5800D154  5000D23C  5800D258
5000D268  5800D15C  5000D26C  5800D280  D7D9D6C6  F0F0F1F4*
02E3E7E3  40000328  40400038  40400001  5000D270  5800D284  5000D274
5800D288  5000D278  5800D28C  5000D27C  5890D15C  58A0D154  58B0D220
5880D210  58E0D268  58F0D218  585EF000  D7D9D6C6  F0F0F1F5*
02E3E7E3  40000360  40400038  40400001  58E0D26C  582EF000  5B20D144
18751C6A  18375A30  D1507823  80007020  D1A47020  D1A01837  1A3A7823
80007020  D1B07020  D1AC1C4A  5050D244  D7D9D6C6  F0F0F1F6*
02E3E7E3  40000398  40400038  40400001  18355A30  D150184A  5870D244
18835890  D14458A0  D14418B2  5860D210  1A741A84  18577868  60007960
D1A447A0  D37C3826  7060D1A4  7960D1A0  D7D9D6C6  F0F0F1F7*
02E3E7E3  400003D0  40400038  40400001  47C0D388  7060D1A0  18255A20
D23C7842  60007940  D1B047A0  D3A03824  7040D1B0  7940D1AC  47C0D3AC
7040D1AC  879AD364  5880D210  58B0D220  D7D9D6C6  F0F0F1F8*
02E3E7E3  40000408  40400038  40400001  58A0D154  5890D15C  58E0D270
7800D1A4  700EB000  58E0D274  7800D1A0  700EB000  58E0D278  7800D1B0
700EB000  58E0D27C  7800D1AC  700EB000  D7D9D6C6  F0F0F1F9*
02E3E7E3  40000440  40400038  40400001  5820D178  5A20D144  5020D178

MEMBER NAME  PROFIL
5800D27C  1A095000  D27C5800  D2781A09  5000D278  5800D274  1A095000
D2745800  D2701A09  5000D270  5800D26C  D7D9D6C6  F0F0F2F0**
02E3E7E3  40000478  40400038  40400001  1A0A5000  D26C5800  D2681A0A
5000D268  5920D19C  47C0D304  5890D210  58A0D220  58B0D218  5880D144
5080D1C0  5080D1BC  5080D1C8  5080D1C4  D7D9D6C6  F0F0F2F1*
02E3E7E3  400004B0  40400038  40400001  5980D19C  4780D6F4  5800D29C
5000D254  5830D298  5860D294  5870D290  5880D15C  5890D148  58A0D15C
58B0D220  7827B000  185A5C40  D1C01825  D7D9D6C6  F0F0F2F2*
02E3E7E3  400004E8  40400038  40400001  5A20D150  7922B000  47A0D4A8
5090D1C0  7826B000  18585C40  D1BC1825  5A20D154  7922B000  47C0D4C4
5090D1BC  7823B000  18585C40  D1C81825  D7D9D6C6  F0F0F2F3*
02E3E7E3  40000520  40400038  40400001  5A20D258  7922B000  47A0D4E0
5090D1C8  58E0D254  782EB000  18585C40  D1C41825  1A287922  B00047C0
D4FE5090  D1C45A90  D1445800  D2541A0A  D7D9D6C6  F0F0F2F4*
02E3E7E3  40000558  40400038  40400001  5000D254  1A3A1A6A  1A7A5990
D19C47C0  D48C5890  D21058A0  D22058B0  D2185880  D1445800  D1C05900
D1BC4120  00014760  D53C1B22  5800D1C0  D7D9D6C6  F0F0F2F5*
02E3E7E3  40000590  40400038  40400001  5900D1C8  41300001  4760D54E
```

```
1B331632  5800D1C0  5900D1C4  41200001  4760D562  1B221623  1BFF862F
D70C4100  D1D45000  D07058E0  D258410E  D7D9D6C6  F0F0F2F6*
02E3E7E3  400005C8  40400038  40400001  B0005000  D0749280  D07458F0
D2284110  D06C05EF  5850D1C0  5C40D154  5820D150  1A2558E0  D258410E
B0005000  D0704102  B0005000  D0749280  D7D9D6C6  F0F0F2F7*
02E3E7E3  40000600  40400038  40400001  D07458F0  D2284110  D06C05EF
4102B000  5000D070  4100D1D4  5000D074  9280D074  58F0D228  4110D06C
05EF4100  D1D45000  D07C58E0  D280410E  D7D9D6C6  F0F0F2F8*
02E3E7E3  40000638  40400038  40400001  A0005000  D0809280  D08058F0
D2284110  D07805EF  5850D1C0  5C40D15C  5820D150  1A2558E0  D280410E
A0005000  D07C4102  A0005000  D0809280  D7D9D6C6  F0F0F2F9*
02E3E7E3  40000670  40400038  40400001  D08058F0  D2284110  D07805EF
4102A000  5000D07C  4100D1D4  5000D080  9280D080  58F0D228  4110D078
05EF58F0  D2304110  D08405EF  41E00004  D7D9D6C6  F0F0F3F0**
02E3E7E3  400006A8  40400038  40400001  15FE4720  D66458EF  D04C07FE
58F0D234  4110D094  05EF41E0  000415FE  4720D67E  58EFD054  07FE5980
D19C4780  D6F45880  D2805890  D15058A0  D7D9D6C6  F0F0F3F1*
02E3E7E3  400006E0  40400038  40400001  D15458B0  D1485860  D2105830
D218185A  5C483000  18251A29  78026000  7000D184  18251A2A  78026000
7000D188  58F0D22C  4110D0A8  05EF41E0  D7D9D6C6  F0F0F3F2*
02E3E7E3  40000718  40400038  40400001  000415FE  4720D6D6  58EFD05C
07FE7800  D1847000  D1F47800  D1887000  D1F85AB0  D1441A8A  59B0D19C
47C0D69E  5890D210  58A0D220  58B0D218  D7D9D6C6  F0F0F3F3*
02E3E7E3  40000750  40400038  40400001  5880D144  1BFF58E0  D00007FE
5800D1C0  5000D1E4  5800D1BC  5000D1E8  5800D1C8  5000D1EC  5800D1C4
5000D1F0  5800D1C0  5000D1FC  5080D194  D7D9D6C6  F0F0F3F4*
02E3E7E3  40000788  40400038  40400001  5800D140  5000D190  5820D150
5830D150  5840D150  5850D15C  5860D154  18B25876  D1E01894  18A45889
D1F81978  4770D768  19784770  D77247F0  D7D9D6C6  F0F0F3F5*
02E3E7E3  400007C0  40400038  40400001  D794879A  D75E5800  D1901BFF
870FD794  5800D194  5A00D144  5000D194  1A341AB4  5073D1F8  8764D756
5890D210  58A0D220  58B0D218  5880D144  D7D9D6C6  F0F0F3F6*
02E3E7E3  400007F8  40400038  40400001  5820D194  89200002  5870D150
5880D154  58A0D150  18B21869  5830D218  18585C47  D1F81825  1A2A5892
30001859  1C481825  1A2A7802  60007000  D7D9D6C6  F0F0F3F7*
02E3E7E3  40000830  40400038  40400001  D1A81825  1A287802  60007000
D1B458F0  D22C4110  D0F005EF  41E00004  15FE4720  D80858EF  D06407FE
7800D1A8  7000D1F4  7800D1B4  7000D1F8  D7D9D6C6  F0F0F3F8*
02E3E7E3  40000868  40400038  40400001  877AD7C4  5890D210  58A0D220
58B0D218  5880D144  41F00004  58E0D000  07FE41F0  000858E0  D00007FE

MEMBER NAME  PROFIL
58A0D004  58E0A00C  58B0A018  5810B004  D7D9D6C6  F0F0F3F9*
02E3E7E3  400008A0  40400038  40400001  5820D18C  50201000  5830B00C
5840D19C  50403000  18DA92FF  A00C982C  A01C07FE  987A1004  58207000
5020D18C  58209000  5020D19C  58201000  D7D9D6C6  F0F0F4F0**
02E3E7E3  400008D8  40400038  40400001  41302000  41500004  1B255C40
D1481B25  5020D210  5030D214  5030D084  5030D094  58201008  41302000
41500004  1B255C40  D1481B25  5020D218  D7D9D6C6  F0F0F4F1*
02E3E7E3  40000910  40400034  40400001  5030D21C  5030D08C  5030D09C
58201010  41302000  41500004  1B255C40  D1501B25  5020D220  5030D224
5030D0A4  9280D0A4  47F0D2A0  40404040  D7D9D6C6  F0F0F4F2*
02E3E7E3  40000020  40400008  40400001  000008C0  00000050  40404040
40404040  40404040  40404040  40404040  40404040  40404040  40404040
40404040  40404040  40404040  40404040  D7D9D6C6  F0F0F4F3*
02E3E7E3  40000050  40400004  40400001  00000890  40404040  40404040
40404040  40404040  40404040  40404040  40404040  40404040  40404040
40404040  40404040  40404040  40404040  D7D9D6C6  F0F0F4F4*
02E3E7E3  4000009C  40400004  40400001  000006B4  40404040  40404040
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | D7D9D6C6 | F0F0F4F5* | |
| 02D9D3C4 | 40404040 | 40400038 | 40404040 | 00020001 | 1C000278 | 00030001 |
| 1C00027C | 00040001 | 1C000280 | 00050001 | 1C000284 | 00010001 | 0C000020 |
| 00010001 | 0C000024 | 00010001 | 0C000050 | D7D9D6C6 | F0F0F4F6* | |
| 02E3E7E3 | 400000A0 | 4040001C | 40400001 | 0000086C | 000006CE | 00000886 |
| 00000726 | 00000736 | 00000858 | 00000868 | 40404040 | 40404040 | 40404040 |
| 40404040 | 40404040 | 40404040 | 40404040 | D7D9D6C6 | F0F0F4F7* | |
| 02D9D3C4 | 40404040 | 40400038 | 40404040 | 00010001 | 0C00009C | 00010001 |
| 0C0000A0 | 00010001 | 0C0000A4 | 00010001 | 0C0000A8 | 00010001 | 0C0000AC |
| 00010001 | 0C0000B0 | 00010001 | 0C0000B4 | D7D9D6C6 | F0F0F4F8* | |
| 02E3E7E3 | 400000BC | 40400004 | 40400001 | 000001A4 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F4F9* | |
| 02E3E7E3 | 400000C4 | 40400008 | 40400001 | 80000000 | 000001AC | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F0** | |
| 02E3E7E3 | 400000D0 | 40400004 | 40400001 | 80000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F1* | |
| 02E3E7E3 | 400000D8 | 40400004 | 40400001 | 000001DC | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F2* | |
| 02E3E7E3 | 400000E0 | 40400004 | 40400001 | 800001EC | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F3* | |
| 02E3E7E3 | 400000E8 | 40400004 | 40400001 | 000001DC | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F4* | |
| 02E3E7E3 | 400000F0 | 40400004 | 40400001 | 000001EC | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F5* | |
| 02E3E7E3 | 400000F8 | 40400004 | 40400001 | 000001D4 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F5F6* | |
| 02D9D3C4 | 40404040 | 40400038 | 40404040 | 00010001 | 0C0000B8 | 00010001 |
| 0C0000BC | 00010001 | 0C0000C8 | 00010001 | 0C0000D8 | 00010001 | 0C0000E0 |
| 00010001 | 0C0000E8 | 00010001 | 0C0000F0 | D7D9D6C6 | F0F0F5F7* | |
| 02E3E7E3 | 400000FC | 4040001C | 40400001 | 000001D8 | 0000018C | 000001A8 |
| 000001B8 | 000001B4 | 00000040 | 0000018C | 40404040 | 40404040 | 40404040 |
| 40404040 | 40404040 | 40404040 | 40404040 | D7D9D6C6 | F0F0F5F8* | |

MEMBER NAME PROFIL

| | | | | | | |
|---|---|---|---|---|---|---|
| 02D9D3C4 | 40404040 | 40400038 | 40404040 | 00010001 | 0C0000F8 | 00010001 |
| 0C0000FC | 00010001 | 0C000100 | 00010001 | 0C000104 | 00010001 | 0C000108 |
| 00010001 | 0C00010C | 00010001 | 0C000110 | D7D9D6C6 | F0F0F5F9* | |
| 02E3E7E3 | 40000118 | 4040001C | 40400001 | 0000018C | 0000018C | 0000018C |
| 00000194 | 0000019C | 0000018C | 0000018C | 40404040 | 40404040 | 40404040 |
| 40404040 | 40404040 | 40404040 | 40404040 | D7D9D6C6 | F0F0F6F0** | |
| 02D9D3C4 | 40404040 | 40400038 | 40404040 | 00010001 | 0C000114 | 00010001 |
| 0C000118 | 00010001 | 0C00011C | 00010001 | 0C000120 | 00010001 | 0C000124 |
| 00010001 | 0C000128 | 00010001 | 0C00012C | D7D9D6C6 | F0F0F6F1* | |
| 02E3E7E3 | 40000134 | 4040001C | 40400001 | 000001B8 | 000001BC | 8000018C |
| 000001F8 | 00000204 | 0000018C | 000001B0 | 40404040 | 40404040 | 40404040 |
| 40404040 | 40404040 | 40404040 | 40404040 | D7D9D6C6 | F0F0F6F2* | |
| 02D9D3C4 | 40404040 | 40400038 | 40404040 | 00010001 | 0C000130 | 00010001 |
| 0C000134 | 00010001 | 0C000138 | 00010001 | 0C00013C | 00010001 | 0C000140 |
| 00010001 | 0C000144 | 00010001 | 0C000148 | D7D9D6C6 | F0F0F6F3* | |
| 02E3E7E3 | 40000150 | 4040001C | 40400001 | 000001B8 | 000001B4 | 00000028 |

```
0000018C  0000018C  0000018C  0000018C  40404040  40404040  40404040
40404040  40404040  40404040  40404040  D7D9D6C6  F0F0F6F4*
02D9D3C4  40404040  40400038  40404040  00010001  0C00014C  00010001
0C000150  00010001  0C000154  00010001  0C000158  00010001  0C00015C
00010001  0C000160  00010001  0C000164  D7D9D6C6  F0F0F6F5*
02E3E7E3  4000016C  4040001C  40400001  00000194  0000019C  0000018C
0000018C  000001B8  000001BC  8000018C  40404040  40404040  40404040
40404040  40404040  40404040  40404040  D7D9D6C6  F0F0F6F6*
02D9D3C4  40404040  40400038  40404040  00010001  0C000168  00010001
0C00016C  00010001  0C000170  00010001  0C000174  00010001  0C000178
00010001  0C00017C  00010001  0C000180  D7D9D6C6  F0F0F6F7*
02E3E7E3  40000288  40400038  40400001  00000000  00000000  00000000
00000000  00000000  00000000  00000000  00000000  0000000C  0108000E
00000000  0000000F  00000000  01D4000F  D7D9D6C6  F0F0F6F8*
02E3E7E3  400002C0  40400030  40400001  0000000F  010C0010  01140010
01200011  00000014  00000018  0000001C  00000020  00000024  00000028
0000002C  00000030  40404040  40404040  D7D9D6C6  F0F0F6F9*
02D9D3C4  40404040  40400008  40404040  00010001  0C000184  40404040
40404040  40404040  40404040  40404040  40404040  40404040  40404040
40404040  40404040  40404040  40404040  D7D9D6C6  F0F0F7F0**
02C5D5C4  40404040  40404040  40404040  40404040  40404040  40404040
00000944  F1F5F7F3  F460C6D6  F34040F0  F2F0F2F8  F7F0F9F8  40F0F84B
F4F24BF1  F3404040  D7D9D6C6  C9D34040  D7D9D6C6  F0F0F7F1**

MEMBER NAME  PROFL1
02C5E2C4  40404040  40400010  40400001  D7D9D6C6  D3F14040  00000000
40000000  40404040  40404040  40404040  40404040  40404040  40404040
40404040  40404040  40404040  40404040  D7D9D6C6  F0F0F0F1*
02E3E7E3  40000000  40400038  40400001  47F0F00C  07D7D9D6  C6D3F140
90ECD00C  184D98CD  F0205040  D00450D0  400807FC  40404040  40404040
C3D6D5C6  D3C9C3E3  C9D5C740  C5E7E3C5  D7D9D6C6  F0F0F0F2*
02E3E7E3  40000038  40400008  40400001  D9C9D6D9  E2404040  40404040
40404040  40404040  40404040  40404040  40404040  40404040  40404040
40404040  40404040  40404040  40404040  D7D9D6C6  F0F0F0F3*
02E3E7E3  400000F0  40400030  40400001  00000000  00000000  00000001
00000001  00000002  00000003  00000015  401DF3B6  4029FBE7  403EF9DB
00000000  00000000  40404040  40404040  D7D9D6C6  F0F0F0F4*
02E3E7E3  40000150  40400004  40400001  00000000  40404040  40404040
40404040  40404040  40404040  40404040  40404040  40404040  40404040
40404040  40404040  40404040  40404040  D7D9D6C6  F0F0F0F5*
02C5E2C4  40404040  40400010  40400002  C3C1C4E2  E4D74040  02000000
40000000  40404040  40404040  40404040  40404040  40404040  40404040
40404040  40404040  40404040  40404040  D7D9D6C6  F0F0F0F6*
02E3E7E3  40000158  40400004  40400001  00000000  40404040  40404040
40404040  40404040  40404040  40404040  40404040  40404040  40404040
40404040  40404040  40404040  40404040  D7D9D6C6  F0F0F0F7*
02C5E2C4  40404040  40400010  40400003  D7C9C5D9  C3C54040  02000000
40000000  40404040  40404040  40404040  40404040  40404040  40404040
40404040  40404040  40404040  40404040  D7D9D6C6  F0F0F0F8*
02E3E7E3  40000160  40400008  40400001  00000000  00000000  40404040
40404040  40404040  40404040  40404040  40404040  40404040  40404040
40404040  40404040  40404040  40404040  D7D9D6C6  F0F0F0F9*
02E3E7E3  400001A0  40400038  40400001  58B0D118  58A0D12C  5890D0D8
5880D128  5870D150  5860D0C0  5800D0B0  5000D0FC  5837B000  58E0D154
580EB000  5000D100  5060D0E0  5080D13C  D7D9D6C6  F0F0F1F0**
02E3E7E3  400001D8  40400038  40400001  50A0D140  1C2A1A38  5030D130
5800D158  5000D148  5800D15C  5000D14C  18BA58A0  D1185890  D11058E0
D148585E  A0005050  D10458E0  D14C1825  D7D9D6C6  F0F0F1F1*
02E3E7E3  40000210  40400038  40400001  5A2EA000  5B20D0BC  18355050
```

| | | | | | | |
|---|---|---|---|---|---|---|
| D0E41C4B | 5A50D128 | 5050D138 | 5840D130 | 185B5870 | D1381883 | 58A0D0BC |
| 18B24104 | 90005000 | D0544107 | 90005000 | D7D9D6C6 | F0F0F1F2* | |
| 02E3E7E3 | 40000248 | 40400038 | 40400001 | D05C58F0 | D1244110 | D05405EF |
| 5960D0EC | 4780D272 | 5080D0E4 | 58A0D118 | 58B0D12C | 5800D0B8 | 5000D0FC |
| 5850D0E4 | 5C40D140 | 18355A30 | D13C1825 | D7D9D6C6 | F0F0F1F3* | |
| 02E3E7E3 | 40000280 | 40400038 | 40400001 | 5A20D140 | 41039000 | 5000D064 |
| 41029000 | 5000D068 | 58F0D120 | 4110D064 | 05EF41E0 | 000415FE | 4720D26E |
| 58EFD04C | 07FE47F0 | D27C1A75 | 878AD1FA | D7D9D6C6 | F0F0F1F4* | |
| 02E3E7E3 | 400002B8 | 40400038 | 40400001 | 5080D0E4 | 58A0D118 | 58B0D12C |
| 5820D0E0 | 5A20D0BC | 5020D0E0 | 5800D14C | 1A0B5000 | D14C5800 | D1481A0B |
| 5000D148 | 5920D0F8 | 47C0D1BE | 58B0D118 | D7D9D6C6 | F0F0F1F5* | |
| 02E3E7E3 | 400002F0 | 40400038 | 40400001 | 58A0D12C | 5890D0D8 | 5880D128 |
| 5870D150 | 5800D0FC | 8609D2D0 | 1BFF58E0 | D00007FE | 41F00004 | 58E0D000 |
| 07FE58D0 | D00458E0 | D00C92FF | D00C982C | D7D9D6C6 | F0F0F1F6* | |
| 02E3E7E3 | 40000328 | 40400038 | 40400001 | D01C07FE | 98791004 | 58207000 |
| 5020D0E8 | 58209000 | 5020D0F8 | 58201000 | 41302000 | 41500004 | 1B255C40 |
| D0C01B25 | 5020D110 | 5030D114 | 58201008 | D7D9D6C6 | F0F0F1F7* | |
| 02E3E7E3 | 40000360 | 4040001C | 40400001 | 41302000 | 41500004 | 1B255C40 |
| D0C01B25 | 5020D118 | 5030D11C | 47F0D160 | 40404040 | 40404040 | 40404040 |
| 40404040 | 40404040 | 40404040 | 40404040 | D7D9D6C6 | F0F0F1F8* | |
| 02E3E7E3 | 40000020 | 40400008 | 40400001 | 0000032C | 00000040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F1F9* | |
| 02E3E7E3 | 40000040 | 40400004 | 40400001 | 0000031A | 40404040 | 40404040 |

MEMBER NAME PROFL1

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | D7D9D6C6 | F0F0F2F0** | |
| 02E3E7E3 | 4000008C | 40400008 | 40400001 | 000002AE | 000002BC | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F1* | |
| 02E3E7E3 | 40000098 | 40400004 | 40400001 | 00000140 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F2* | |
| 02D9D3C4 | 40404040 | 40400038 | 40404040 | 00020001 | 1C000160 | 00030001 |
| 1C000164 | 00010001 | 0C000020 | 00010001 | 0C000024 | 00010001 | 0C000040 |
| 00010001 | 0C00008C | 00010001 | 0C000090 | D7D9D6C6 | F0F0F2F3* | |
| 02E3E7E3 | 400000A0 | 40400004 | 40400001 | 8000012C | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F4* | |
| 02E3E7E3 | 400000AC | 40400018 | 40400001 | 000000F4 | 00000108 | 00000110 |
| 0000010C | 00000028 | 000000F4 | 40404040 | 40404040 | 40404040 | 40404040 |
| 40404040 | 40404040 | 40404040 | 40404040 | D7D9D6C6 | F0F0F2F5* | |
| 02D9D3C4 | 40404040 | 40400038 | 40404040 | 00010001 | 0C000098 | 00010001 |
| 0C0000A0 | 00010001 | 0C0000AC | 00010001 | 0C0000B0 | 00010001 | 0C0000B4 |
| 00010001 | 0C0000B8 | 00010001 | 0C0000BC | D7D9D6C6 | F0F0F2F6* | |
| 02E3E7E3 | 400000C4 | 4040001C | 40400001 | 000000F4 | 000000F4 | 000000F4 |
| 000000FC | 00000104 | 000000F4 | 000000F4 | 40404040 | 40404040 | 40404040 |
| 40404040 | 40404040 | 40404040 | 40404040 | D7D9D6C6 | F0F0F2F7* | |
| 02D9D3C4 | 40404040 | 40400038 | 40404040 | 00010001 | 0C0000C0 | 00010001 |
| 0C0000C4 | 00010001 | 0C0000C8 | 00010001 | 0C0000CC | 00010001 | 0C0000D0 |
| 00010001 | 0C0000D4 | 00010001 | 0C0000D8 | D7D9D6C6 | F0F0F2F8* | |
| 02E3E7E3 | 400000E0 | 4040000C | 40400001 | 00000110 | 00000114 | 800000F4 |
| 40404040 | 40404040 | 40404040 | 40404040 | 40404040 | 40404040 | 40404040 |
| 40404040 | 40404040 | 40404040 | 40404040 | D7D9D6C6 | F0F0F2F9* | |
| 02E3E7E3 | 40000168 | 40400038 | 40400001 | 00000004 | 00000008 | 00000000 |
| 00000000 | 00000000 | 00000008 | 00000000 | 00A80009 | 00880009 | 008C0009 |
| 0000000C | 00000010 | 00000014 | 00000018 | D7D9D6C6 | F0F0F3F0** | |
| 02D9D3C4 | 40404040 | 40400020 | 40404040 | 00010001 | 0C0000DC | 00010001 |

| | | | | | | |
|---|---|---|---|---|---|---|
| 0C0000E0 | 00010001 | 0C0000E4 | 00010001 | 0C0000E8 | 40404040 | 40404040 |
| 40404040 | 40404040 | 40404040 | 40404040 | D7D9D6C6 | F0F0F3F1* | |
| 02C5D5C4 | 40404040 | 40404040 | 40404040 | 40404040 | 40404040 | 40404040 |
| 0000037C | F1F5F7F3 | F460C6D6 | F34040F0 | F2F0F2F8 | F7F0F9F8 | 40F0F84B |
| F4F24BF2 | F0404040 | D7D9D6C6 | D3F14040 | D7D9D6C6 | F0F0F3F2** | |

MEMBER NAME PROFL2

| | | | | | | |
|---|---|---|---|---|---|---|
| 02C5E2C4 | 40404040 | 40400010 | 40400001 | D7D9D6C6 | D3F24040 | 00000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F1* | |
| 02E3E7E3 | 40000000 | 40400038 | 40400001 | 47F0F00C | 07D7D9D6 | C6D3F240 |
| 90ECD00C | 184D98CD | F0205040 | D00450D0 | 400807FC | 40404040 | 40404040 |
| C9D3D3C5 | C7C1D340 | C3E4E3D6 | E4E34040 | D7D9D6C6 | F0F0F0F2* | |
| 02E3E7E3 | 400000E8 | 40400034 | 40400001 | 00000000 | 00000000 | 00000001 |
| 00000001 | 00000002 | 00000003 | 00000004 | 0000000E | 401DF3B6 | 4029FBE7 |
| 403EF9DB | 00000000 | 00000000 | 40404040 | D7D9D6C6 | F0F0F0F3* | |
| 02E3E7E3 | 40000158 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F4* | |
| 02E3E7E3 | 40000160 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F5* | |
| 02C5E2C4 | 40404040 | 40400010 | 40400002 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F6* | |
| 02E3E7E3 | 40000168 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F7* | |
| 02C5E2C4 | 40404040 | 40400010 | 40400003 | D7C9C5D9 | C3C54040 | 02000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F8* | |
| 02E3E7E3 | 40000170 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F9* | |
| 02E3E7E3 | 4000021C | 40400038 | 40400001 | 58B0D0C8 | 5890D0DC | 5860D140 |
| 5800D0B0 | 5000D108 | 5800D0C0 | 5000D0E4 | 50B0D1B4 | 5060D1B8 | 5800D184 |
| 5000D170 | 5060D194 | 5800D1BC | 5000D154 | D7D9D6C6 | F0F0F1F0** | |
| 02E3E7E3 | 40000254 | 40400038 | 40400001 | 5800D1D0 | 5000D1DC | 5800D1D4 |
| 5000D1E0 | 188B5890 | D17858B0 | D12058A0 | D12858E0 | D1DC583E | A0005030 |
| D10C58E0 | D1E01823 | 5A2EA000 | 5B20D0BC | D7D9D6C6 | F0F0F1F1* | |
| 02E3E7E3 | 4000028C | 40400038 | 40400001 | 5020D0F8 | 5800D0C0 | 5000D0E8 |
| 5800D154 | 1A085000 | D17C5800 | D1541A06 | 5000D180 | 5800D154 | 5A00D184 |
| 5000D188 | 5800D154 | 1A095000 | D18C1C26 | D7D9D6C6 | F0F0F1F2* | |
| 02E3E7E3 | 400002C4 | 40400038 | 40400001 | 1A385030 | D1905800 | D1BC5000 |
| D1685090 | D1985800 | D1C05000 | D19C5800 | D1C45000 | D1A05800 | D1C85000 |
| D1A45800 | D1CC5000 | D1A85800 | D1D05000 | D7D9D6C6 | F0F0F1F3* | |
| 02E3E7E3 | 400002FC | 40400038 | 40400001 | D1AC5800 | D1D45000 | D1B05870 |
| D0BC5890 | D19458A0 | D17858B0 | D1305880 | D1285800 | D0E45900 | D0E84780 |
| D48A58E0 | D19C786E | B0007060 | D15858E0 | D7D9D6C6 | F0F0F1F4* | |
| 02E3E7E3 | 40000334 | 40400038 | 40400001 | D17C782E | B0003926 | 41300001 |
| 47C0D30E | 1B3358E0 | D1A0784E | B0007040 | D1603924 | 41200001 | 47A0D326 |
| 1B221423 | 1BFF862F | D35A58E0 | D180782E | D7D9D6C6 | F0F0F1F5* | |
| 02E3E7E3 | 4000036C | 40400038 | 40400001 | B0003926 | 41300001 | 47C0D342 |
| 1B333924 | 41200001 | 47A0D34E | 1B221423 | 1BFF862F | D35A47F0 | D48A58E0 |
| D1A4786E | B0007060 | D16C58E0 | D188782E | D7D9D6C6 | F0F0F1F6* | |
| 02E3E7E3 | 400003A4 | 40400038 | 40400001 | B0003926 | 41300001 | 47C0D37A |
| 1B3358E0 | D1A8784E | B0007040 | D1743924 | 41200001 | 47A0D392 | 1B221423 |
| 1BFF862F | D3C658E0 | D18C782E | B0003926 | D7D9D6C6 | F0F0F1F7* | |
| 02E3E7E3 | 400003DC | 40400038 | 40400001 | 41300001 | 47C0D3AE | 1B333924 |

| | | | | | | |
|---|---|---|---|---|---|---|
| 41200001 | 47A0D3BA | 1B221423 | 1BFF862F | D3C647F0 | D48A58E0 | D1AC585E |
| 800058E0 | D1B0580E | 80005000 | D0FC5820 | D7D9D6C6 | F0F0F1F8* | |
| 02E3E7E3 | 40000414 | 40400038 | 40400001 | D10C5020 | D0EC1C46 | 18355A30 |
| D0C81853 | 5870D190 | 188258A0 | D0BC58B0 | D0F85890 | D1204105 | 90005000 |
| D0544107 | 90005000 | D05C58F0 | D13C4110 | D7D9D6C6 | F0F0F1F9* | |
| 02E3E7E3 | 4000044C | 40400038 | 40400001 | D05405EF | 5800D0F4 | 12004780 |

MEMBER NAME PROFL2

| | | | | | | |
|---|---|---|---|---|---|---|
| D4805080 | D0EC58A0 | D12858B0 | D1205890 | D1785880 | D0C85800 | D0B85000 |
| D1085850 | D0EC5C40 | D1B81835 | 5A30D1B4 | D7D9D6C6 | F0F0F2F0** | |
| 02E3E7E3 | 40000484 | 40400038 | 40400001 | 18255A20 | D1B84103 | B0005000 |
| D0644102 | B0005000 | D06858F0 | D1384110 | D06405EF | 41E00004 | 15FE4720 |
| D47C58EF | D04C07FE | 47F0D500 | 1A76878A | D7D9D6C6 | F0F0F2F1* | |
| 02E3E7E3 | 400004BC | 40400038 | 40400001 | D3FE5080 | D0EC5880 | D12858B0 |
| D13058A0 | D1785890 | D1945870 | D0BC5820 | D0E81A27 | 5020D0E8 | 5800D198 |
| 1A095000 | D1985800 | D1B01A09 | 5000D1B0 | D7D9D6C6 | F0F0F2F2* | |
| 02E3E7E3 | 400004F4 | 40400038 | 40400001 | 5800D1AC | 1A095000 | D1AC5800 |
| D1681A0A | 5000D168 | 5800D1A8 | 1A0A5000 | D1A85800 | D1A41A0A | 5000D1A4 |
| 5800D1A0 | 1A0A5000 | D1A05800 | D19C1A0A | D7D9D6C6 | F0F0F2F3* | |
| 02E3E7E3 | 4000052C | 40400038 | 40400001 | 5000D19C | 5920D104 | 47C0D2E2 |
| 58A0D128 | 58B0D120 | 5890D178 | 5880D0C8 | 5820D0E4 | 5A20D0BC | 5020D0E4 |
| 5800D154 | 1A095000 | D1545800 | D1E01A06 | D7D9D6C6 | F0F0F2F4* | |
| 02E3E7E3 | 40000564 | 40400038 | 40400001 | 5000D1E0 | 5800D1DC | 1A065000 |
| D1DC5920 | D10447C0 | D23A58B0 | D0C85890 | D0DC5800 | D1088709 | D55C41F0 |
| 000458E0 | D00007FE | 1BFF58E0 | D00007FE | D7D9D6C6 | F0F0F2F5* | |
| 02E3E7E3 | 4000059C | 40400038 | 40400001 | 58D0D004 | 58E0D00C | 92FFD00C |
| 982CD01C | 07FE987A | 10045820 | 70005020 | D0F05820 | 90005020 | D1045820 |
| 10004130 | 20004150 | 00041B25 | 5C40D0C0 | D7D9D6C6 | F0F0F2F6* | |
| 02E3E7E3 | 400005D4 | 40400038 | 40400001 | 1B255020 | D1205030 | D1245820 |
| 10084130 | 20004150 | 00041B25 | 5C40D0C0 | 1B255020 | D1285030 | D12C5820 |
| 10104130 | 20004150 | 00041B25 | 5C40D0C8 | D7D9D6C6 | F0F0F2F7* | |
| 02E3E7E3 | 4000060C | 4040000E | 40400001 | 1B255020 | D1305030 | D13447F0 |
| D1E44040 | 40404040 | 40404040 | 40404040 | 40404040 | 40404040 | 40404040 |
| 40404040 | 40404040 | 40404040 | 40404040 | D7D9D6C6 | F0F0F2F8* | |
| 02E3E7E3 | 40000020 | 40400008 | 40400001 | 000005AE | 00000038 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F9* | |
| 02E3E7E3 | 40000038 | 40400004 | 40400001 | 0000059C | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F3F0** | |
| 02E3E7E3 | 40000084 | 40400008 | 40400001 | 000004B4 | 00000538 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F3F1* | |
| 02E3E7E3 | 40000090 | 40400004 | 40400001 | 00000134 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F3F2* | |
| 02D9D3C4 | 40404040 | 40400038 | 40404040 | 00020001 | 1C000170 | 00030001 |
| 1C000174 | 00010001 | 0C000020 | 00010001 | 0C000024 | 00010001 | 0C000038 |
| 00010001 | 0C000084 | 00010001 | 0C000088 | D7D9D6C6 | F0F0F3F3* | |
| 02E3E7E3 | 40000098 | 40400004 | 40400001 | 8000012C | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F3F4* | |
| 02E3E7E3 | 400000A4 | 40400018 | 40400001 | 000000EC | 00000104 | 0000010C |
| 00000108 | 00000028 | 000000EC | 40404040 | 40404040 | 40404040 | 40404040 |
| 40404040 | 40404040 | 40404040 | 40404040 | D7D9D6C6 | F0F0F3F5* | |
| 02D9D3C4 | 40404040 | 40400038 | 40404040 | 00010001 | 0C000090 | 00010001 |
| 0C000098 | 00010001 | 0C0000A4 | 00010001 | 0C0000A8 | 00010001 | 0C0000AC |
| 00010001 | 0C0000B0 | 00010001 | 0C0000B4 | D7D9D6C6 | F0F0F3F6* | |
| 02E3E7E3 | 400000BC | 4040001C | 40400001 | 000000EC | 000000EC | 000000EC |

000000F4 000000FC 000000EC 000000EC 40404040 40404040 40404040
40404040 40404040 40404040 40404040 D7D9D6C6 F0F0F3F7*
02D9D3C4 40404040 40400038 40404040 00010001 0C0000B8 00010001
0C0000BC 00010001 0C0000C0 00010001 0C0000C4 00010001 0C0000C8
00010001 0C0000CC 00010001 0C0000D0 D7D9D6C6 F0F0F3F8*
02E3E7E3 400000D8 4040000C 40400001 0000010C 00000110 800000EC
40404040 40404040 40404040 40404040 40404040 40404040 40404040

MEMBER NAME PROFL2
40404040 40404040 40404040 40404040 D7D9D6C6 F0F0F3F9*
02E3E7E3 40000178 40400038 40400001 00000008 00000000 00000000
00000000 00000000 00000000 00000000 01880008 00880008 008C0008
00000000 018C0009 00900009 00940009 D7D9D6C6 F0F0F4F0**
02E3E7E3 400001B0 40400038 40400001 00000010 00AC0009 00000000
0000000C 00000000 00B0000A 0000000A 00BC000B 00C4000B 0104000B
00C0000D 00CC000D 00C8000D 00D4000D D7D9D6C6 F0F0F4F1*
02E3E7E3 400001E8 40400034 40400001 00D0000D 00E4000D 00E0000D
00000020 00000028 00000024 00000030 0000002C 00000014 00000018
00F8000F 010C000F 0108000F 40404040 D7D9D6C6 F0F0F4F2*
02D9D3C4 40404040 40400020 40404040 00010001 0C0000D4 00010001
0C0000D8 00010001 0C0000DC 00010001 0C0000E0 40404040 40404040
40404040 40404040 40404040 40404040 D7D9D6C6 F0F0F4F3*
02C5D5C4 40404040 40404040 40404040 40404040 40404040 40404040
0000061A F1F5F7F3 F460C6D6 F34040F0 F2F0F2F8 F7F0F9F8 40F0F84B
F4F24BF2 F4404040 D7D9D6C6 D3F24040 D7D9D6C6 F0F0F4F4**

MEMBER NAME PROJAR
02C5E2C4 40404040 40400010 40400001 D7D9D6D1 C1D94040 00000000
40000000 40404040 40404040 40404040 40404040 40404040 40404040
40404040 40404040 40404040 40404040 D7D9D6D1 F0F0F0F1*
02E3E7E3 40000000 40400028 40400001 47F0F00C 07D7D9D6 D1C1D940
90ECD00C 184D98CD F0205040 D00450D0 400807FC 40404040 40404040
40404040 40404040 40404040 40404040 D7D9D6D1 F0F0F0F2*
02E3E7E3 40000098 40400038 40400001 41100000 00000000 41200000
00000000 00000000 00000000 00000000 00000001 00000002 00000003
00000004 00000005 00000006 00000007 D7D9D6D1 F0F0F0F3*
02C5E2C4 40404040 40400010 40400002 E3D6D3C5 D9404040 05000000
4000000C 40404040 40404040 40404040 40404040 40404040 40404040
40404040 40404040 40404040 40404040 D7D9D6D1 F0F0F0F4*
02E3E7E3 400000D0 40400018 40400001 00000008 00000009 00000038
41100000 00000000 00000000 40404040 40404040 40404040 40404040
40404040 40404040 40404040 40404040 D7D9D6D1 F0F0F0F5*
02C5E2C4 40404040 40400010 40400003 C4E2D8D9 E3404040 02000000
40000000 40404040 40404040 40404040 40404040 40404040 40404040
40404040 40404040 40404040 40404040 D7D9D6D1 F0F0F0F6*
02C5E2C4 40404040 40400010 40400004 C4C1D9C3 D6E24040 02000000
40000000 40404040 40404040 40404040 40404040 40404040 40404040
40404040 40404040 40404040 40404040 D7D9D6D1 F0F0F0F7*
02E3E7E3 400001C0 4040000C 40400001 00000000 00000000 00000000
40404040 40404040 40404040 40404040 40404040 40404040 40404040
40404040 40404040 40404040 40404040 D7D9D6D1 F0F0F0F8*
02E3E7E3 400001D0 40400008 40400001 00000000 00000000 40404040
40404040 40404040 40404040 40404040 40404040 40404040 40404040
40404040 40404040 40404040 40404040 D7D9D6D1 F0F0F0F9*
02E3E7E3 400001F8 40400038 40400001 58A0D1A0 58B0D1AC 6800D070
23006000 D1C058F0 D1A84110 D04C05EF 6000D0F8 7860B044 7C60D0B4
2B003806 28606060 D1087820 B0487C20 D7D9D6D1 F0F0F1F0**
02E3E7E3 40000230 40400038 40400001 D0B42B00 38022820 6020D128
7820B04C 7C20D0B4 2B003802 28206020 D1107820 B0507C20 D0B42B00

```
38022820  6020D130  7820B054  7C20D0B4  D7D9D6D1  F0F0F1F1*
02E3E7E3  40000268  40400038  40400001  2B003802  28206020  D1007820
B0587C20  D0B42B00  38022820  6020D120  7820B05C  7C20D0B4  2B003802
28206020  D1407820  A0047C20  D0B42B00  D7D9D6D1  F0F0F1F2*
02E3E7E3  400002A0  40400038  40400001  38022820  6020D118  7840A008
7C40D0B4  2B003804  28406040  D1382B62  20666820  D1282B24  20226020
D17058F0  D1982B44  7840F004  6040D1B8  D7D9D6D1  F0F0F1F3*
02E3E7E3  400002D8  40400038  40400001  296447A0  D2C42924  47A0D2C4
1BFF58E0  D00007FE  6840D110  6B40D118  20446820  D1306B20  D1382022
6020D170  6940D1B8  47A0D2F4  6920D1B8  D7D9D6D1  F0F0F1F4*
02E3E7E3  40000310  40400038  40400001  47A0D2F4  1BFF58E0  D00007FE
6820D100  6B20D118  2C226840  D1206B40  D1382C44  2A246020  D1C058F0
D19C4110  D05005EF  28206B20  D1402022  D7D9D6D1  F0F0F1F5*
02E3E7E3  40000348  40400038  40400001  6920D1B8  47C0D330  1BFF58E0
D00007FE  6820D108  6B20D100  6020D0C8  6840D128  6B40D120  6040D0E0
2C222C44  2A246020  D1C058F0  D19C4110  D7D9D6D1  F0F0F1F6*
02E3E7E3  40000380  40400038  40400001  D05405EF  6000D1C8  6800D0C8
6D00D1C8  6000D0C8  6800D0E0  6D00D1C8  6000D0E0  6820D110  6B20D100
6020D0D0  6840D130  6B40D120  6040D0E8  D7D9D6D1  F0F0F1F7*
02E3E7E3  400003B8  40400038  40400001  2C222C44  2A246020  D1C058F0
D19C4110  D05805EF  6000D1C8  6800D0D0  6D00D1C8  6000D0D0  6800D0E8
6D00D1C8  6000D0E8  6820D118  6B20D100  D7D9D6D1  F0F0F1F8*
02E3E7E3  400003F0  40400038  40400001  6020D0D8  6840D138  6B40D120
6040D0F0  2C222C44  2A246020  D1C058F0  D19C4110  D05C05EF  6000D1C8
6800D0D8  6D00D1C8  6000D0D8  6800D0F0  D7D9D6D1  F0F0F1F9*
02E3E7E3  40000428  40400038  40400001  6D00D1C8  6000D0F0  58F0D1A8

MEMBER NAME  PROJAR
4110D060  05EF6000  D18058F0  D1A84110  D06405EF  6000D188  58F0D1A8
4110D068  05EF6000  D1906800  D0E02200  D7D9D6D1  F0F0F2F0**
02E3E7E3  40000460  40400038  40400001  47A0D44C  6820D078  6C20D0F8
6B20D180  6020D180  6800D0E8  220047A0  D4666820  D0786C20  D0F86B20
D1886020  D1886800  D0F02200  47A0D480  D7D9D6D1  F0F0F2F1*
02E3E7E3  40000498  40400038  40400001  6820D078  6C20D0F8  6B20D190
6020D190  6820D188  6B20D180  6020D150  6800D190  6B00D180  6000D158
222247A0  D4AC6840  D0786C40  D0F82A24  D7D9D6D1  F0F0F2F2*
02E3E7E3  400004D0  40400038  40400001  6020D150  6800D158  220047A0
D4C66820  D0786C20  D0F86A20  D1586020  D1586800  D1586900  D1504730
D4DC41F0  000458E0  D00007FE  1BFF58E0  D7D9D6D1  F0F0F2F3*
02E3E7E3  40000508  40400038  40400001  D00007FE  58D0D004  58E0D00C
92FFD00C  982CD01C  07FE5820  10004130  20004150  00041B25  5020D1A0
5030D1A4  58201004  41302000  41500004  D7D9D6D1  F0F0F2F4*
02E3E7E3  40000540  40400012  40400001  1B255B20  D0B05020  D1AC5030
D1B047F0  D1D04040  40404040  40404040  40404040  40404040  40404040
40404040  40404040  40404040  40404040  D7D9D6D1  F0F0F2F5*
02E3E7E3  40000020  4040000C  40400001  0000051E  00000028  0000050C
40404040  40404040  40404040  40404040  40404040  40404040  40404040
40404040  40404040  40404040  40404040  D7D9D6D1  F0F0F2F6*
02E3E7E3  40000074  40400008  40400001  800001E8  800001E8  40404040
40404040  40404040  40404040  40404040  40404040  40404040  40404040
40404040  40404040  40404040  40404040  D7D9D6D1  F0F0F2F7*
02D9D3C4  40404040  40400038  40404040  00020001  0C0001C0  00030001
1C0001C4  00040001  1C0001D0  00010001  0C000020  00010001  0C000024
00010001  0C000028  00010001  0C000074  D7D9D6D1  F0F0F2F8*
02E3E7E3  4000007C  40400018  40400001  800001E8  800001E8  800001E8
800000F0  800000F8  80000100  40404040  40404040  40404040  40404040
40404040  40404040  40404040  40404040  D7D9D6D1  F0F0F2F9*
02E3E7E3  400001DC  4040001C  40400001  00000000  00000000  00000000
00000000  00000000  00000000  00000000  40404040  40404040  40404040
```

| | | | | | | |
|---|---|---|---|---|---|---|
| 40404040 | 40404040 | 40404040 | 40404040 | D7D9D6D1 | F0F0F3F0** | |
| 02D9D3C4 | 40404040 | 40400038 | 40404040 | 00010001 | 0C000078 | 00010001 |
| 0C00007C | 00010001 | 0C000080 | 00010001 | 0C000084 | 00010001 | 0C000088 |
| 00010001 | 0C00008C | 00010001 | 0C000090 | D7D9D6D1 | F0F0F3F1* | |
| 02C5D5C4 | 40404040 | 40404040 | 40404040 | 40404040 | 40404040 | 40404040 |
| 00000552 | F1F5F7F3 | F460C6D6 | F34040F0 | F2F0F2F8 | F7F0F9F8 | 40F0F84B |
| F4F24BF2 | F9404040 | D7D9D6D1 | C1D94040 | D7D9D6D1 | F0F0F3F2** | |

MEMBER NAME PROJLN

| | | | | | | |
|---|---|---|---|---|---|---|
| 02C5E2C4 | 40404040 | 40400010 | 40400001 | D7D9D6D1 | D3D54040 | 00000000 |
| 40000000 | 40404040 | 40404040 | 40404040 | 40404040 | 40404040 | 40404040 |
| 40404040 | 40404040 | 40404040 | 40404040 | D7D9D6D1 | F0F0F0F1* | |
| 02E3E7E3 | 40000000 | 40400028 | 40400001 | 47F0F00C | 07D7D9D6 | D1D3D540 |
| 90ECD00C | 184D98CD | F0205040 | D00450D0 | 400807FC | 40404040 | 40404040 |
| 40404040 | 40404040 | 40404040 | 40404040 | D7D9D6D1 | F0F0F0F2* | |
| 02C5E2C4 | 40404040 | 40400010 | 40400002 | E3D6D3C5 | D9404040 | 05000000 |
| 4000000C | 40404040 | 40404040 | 40404040 | 40404040 | 40404040 | 40404040 |
| 40404040 | 40404040 | 40404040 | 40404040 | D7D9D6D1 | F0F0F0F3* | |
| 02E3E7E3 | 40000088 | 40400014 | 40400001 | 00000001 | 00000002 | 41100000 |
| 00000000 | 00000000 | 40404040 | 40404040 | 40404040 | 40404040 | 40404040 |
| 40404040 | 40404040 | 40404040 | 40404040 | D7D9D6D1 | F0F0F0F4* | |
| 02C5E2C4 | 40404040 | 40400010 | 40400003 | C4E2D8D9 | E3404040 | 02000000 |
| 40000000 | 40404040 | 40404040 | 40404040 | 40404040 | 40404040 | 40404040 |
| 40404040 | 40404040 | 40404040 | 40404040 | D7D9D6D1 | F0F0F0F5* | |
| 02E3E7E3 | 40000138 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D7D9D6D1 | F0F0F0F6* | |
| 02E3E7E3 | 40000190 | 40400038 | 40400001 | 58B0D118 | 7860D074 | 7C60D068 |
| 2B003806 | 28606060 | D0B87820 | D07C7C20 | D0682B00 | 38022820 | 6020D0C8 |
| 7820D078 | 7C20D068 | 2B003802 | 28206020 | D7D9D6D1 | F0F0F0F7* | |
| 02E3E7E3 | 400001C8 | 40400038 | 40400001 | D0C07820 | D0807C20 | D0682B00 |
| 38022820 | 6020D0D0 | 7820B004 | 7C20D068 | 2B003802 | 28206020 | D0F87840 |
| B0087C40 | D0682B00 | 38042840 | 6040D100 | D7D9D6D1 | F0F0F0F8* | |
| 02E3E7E3 | 40000200 | 40400038 | 40400001 | 2B626060 | D1282066 | 6820D0C8 |
| 2B246020 | D1302022 | 6020D0E8 | 58F0D110 | 2B447840 | F0046040 | D1202964 |
| 47A0D214 | 292447A0 | D21441F0 | 000858E0 | D7D9D6D1 | F0F0F0F9* | |
| 02E3E7E3 | 40000238 | 40400038 | 40400001 | D00007FE | 6840D0C0 | 6B40D0F8 |
| 6040D138 | 20446820 | D0D06B20 | D1006020 | D1402022 | 6020D0E8 | 6940D120 |
| 47A0D24E | 6920D120 | 47A0D24E | 41F00008 | D7D9D6D1 | F0F0F1F0** | |
| 02E3E7E3 | 40000270 | 40400038 | 40400001 | 58E0D000 | 07FE6820 | D0B86B20 |
| D0C02C22 | 6840D0C8 | 6B40D0D0 | 6040D148 | 2C442A24 | 6020D150 | 58F0D114 |
| 4110D04C | 05EF6000 | D1586820 | D1282C22 | D7D9D6D1 | F0F0F1F1* | |
| 02E3E7E3 | 400002A8 | 40400038 | 40400001 | 6840D130 | 2C442A24 | 6020D150 |
| 58F0D114 | 4110D050 | 05EF6000 | D1606820 | D1382C22 | 6840D140 | 2C442A24 |
| 6020D150 | 58F0D114 | 4110D054 | 05EF2820 | D7D9D6D1 | F0F0F1F2* | |
| 02E3E7E3 | 400002E0 | 40400038 | 40400001 | 6A20D160 | 23226A20 | D1582022 |
| 6920D120 | 47C0D2D4 | 1BFF58E0 | D00007FE | 6840D0C0 | 6B40D0B8 | 6860D0B8 |
| 6C60D0D0 | 6820D0C0 | 6C20D0C8 | 2B626820 | D7D9D6D1 | F0F0F1F3* | |
| 02E3E7E3 | 40000318 | 40400038 | 40400001 | D1486C20 | D0F82804 | 6C00D100 |
| 2A202A26 | 20226020 | D1506820 | D1482C22 | 2C442A24 | 6020D158 | 58F0D114 |
| 4110D058 | 05EF6820 | D1502D20 | 6920D120 | D7D9D6D1 | F0F0F1F4* | |
| 02E3E7E3 | 40000350 | 40400038 | 40400001 | 47C0D334 | 1BFF58E0 | D00007FE |
| 41F00004 | 58E0D000 | 07FE58D0 | D00458E0 | D00C92FF | D00C982C | D01C07FE |
| 987A1004 | 78207000 | 7020D074 | 78208000 | D7D9D6D1 | F0F0F1F5* | |
| 02E3E7E3 | 40000388 | 4040002E | 40400001 | 7020D07C | 78209000 | 7020D078 |
| 7820A000 | 7020D080 | 58201000 | 41302000 | 41500004 | 1B255020 | D1185030 |
| D11C47F0 | D1684040 | 40404040 | 40404040 | D7D9D6D1 | F0F0F1F6* | |
| 02E3E7E3 | 40000020 | 4040000C | 40400001 | 00000378 | 00000028 | 00000366 |
| 40404040 | 40404040 | 40404040 | 40404040 | 40404040 | 40404040 | 40404040 |

```
40404040  40404040  40404040  40404040  D7D9D6D1  F0F0F1F7*
02E3E7E3  40000074  4040000C  40400001  80000178  80000178  80000178
40404040  40404040  40404040  40404040  40404040  40404040  40404040
40404040  40404040  40404040  40404040  D7D9D6D1  F0F0F1F8*
02D9D3C4  40404040  40400038  40404040  00020001  0C000138  00030001
1C00013C  00010001  0C000020  00010001  0C000024  00010001  0C000028
00010001  0C000074  00010001  0C000078  D7D9D6D1  F0F0F1F9*
02E3E7E3  40000080  40400004  40400001  80000180  40404040  40404040

MEMBER NAME  PROJLN
40404040  40404040  40404040  40404040  40404040  40404040  40404040
40404040  40404040  40404040  40404040  D7D9D6D1  F0F0F2F0**
02E3E7E3  40000148  40400038  40400001  00000000  00000000  00000000
00000000  00000000  00000000  00000000  00000000  00000000  00000000
00000000  00000000  00000000  00000000  D7D9D6D1  F0F0F2F1*
02E3E7E3  40000180  40400010  40400001  00000000  00000000  00000000
00000000  40404040  40404040  40404040  40404040  40404040  40404040
40404040  40404040  40404040  40404040  D7D9D6D1  F0F0F2F2*
02D9D3C4  40404040  40400010  40404040  00010001  0C00007C  00010001
0C000080  40404040  40404040  40404040  40404040  40404040  40404040
40404040  40404040  40404040  40404040  D7D9D6D1  F0F0F2F3*
02C5D5C4  40404040  40404040  40404040  40404040  40404040  40404040
000003B6  F1F5F7F3  F460C6D6  F34040F0  F2F0F2F8  F7F0F9F8  40F0F84B
F4F24BF3  F3404040  D7D9D6D1  D3D54040  D7D9D6D1  F0F0F2F4**

MEMBER NAME  PROJSP
02C5E2C4  40404040  40400010  40400001  D7D9D6D1  E2D74040  00000000
40000000  40404040  40404040  40404040  40404040  40404040  40404040
40404040  40404040  40404040  40404040  D7D9D6D1  F0F0F0F1*
02E3E7E3  40000000  40400028  40400001  47F0F00C  07D7D9D6  D1E2D740
90ECD00C  184D98CD  F0205040  D00450D0  400807FC  40404040  40404040
40404040  40404040  40404040  40404040  D7D9D6D1  F0F0F0F2*
02E3E7E3  400000F8  40400038  40400001  00000000  00000000  4F080000
00000000  00000000  00000000  00000001  00000001  00000002  00000003
00000004  00000005  00000006  00000007  D7D9D6D1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  D7D9D6D1  F0F0F0F4*
02E3E7E3  40000130  40400010  40400001  00000008  00000009  00000000
00000000  40404040  40404040  40404040  40404040  40404040  40404040
40404040  40404040  40404040  40404040  D7D9D6D1  F0F0F0F5*
02C5E2C4  40404040  40400010  40400003  E4D5C9E3  40404040  02000000
40000000  40404040  40404040  40404040  40404040  40404040  40404040
40404040  40404040  40404040  40404040  D7D9D6D1  F0F0F0F6*
02C5E2C4  40404040  40400010  40400004  D3C9D4C9  E3404040  02000000
40000000  40404040  40404040  40404040  40404040  40404040  40404040
40404040  40404040  40404040  40404040  D7D9D6D1  F0F0F0F7*
02C5E2C4  40404040  40400010  40400005  D6D5D6C6  C6404040  02000000
40000000  40404040  40404040  40404040  40404040  40404040  40404040
40404040  40404040  40404040  40404040  D7D9D6D1  F0F0F0F8*
02C5E2C4  40404040  40400010  40400006  E2D4E7D4  D5404040  02000000
40000000  40404040  40404040  40404040  40404040  40404040  40404040
40404040  40404040  40404040  40404040  D7D9D6D1  F0F0F0F9*
02E3E7E3  400001A0  40400014  40400001  00000000  00000000  00000000
00000000  00000000  40404040  40404040  40404040  40404040  40404040
40404040  40404040  40404040  40404040  D7D9D6D1  F0F0F1F0**
02E3E7E3  400001B8  40400008  40400001  00000000  00000000  40404040
40404040  40404040  40404040  40404040  40404040  40404040  40404040
40404040  40404040  40404040  40404040  D7D9D6D1  F0F0F1F1*
```

```
02E3E7E3  400001C4  40400004  40400001  00000000  40404040  40404040
40404040  40404040  40404040  40404040  40404040  40404040  40404040
40404040  40404040  40404040  40404040  D7D9D6D1  F0F0F1F2*
02E3E7E3  400001CC  40400004  40400001  00000000  40404040  40404040
40404040  40404040  40404040  40404040  40404040  40404040  40404040
40404040  40404040  40404040  40404040  D7D9D6D1  F0F0F1F3*
02E3E7E3  40000208  40400038  40400001  5880D194  5890D178  58A0D19C
58B0D188  5830D1B0  2B007800  A0046A00  D0D86000  D0D05800  D0D45000
D1447800  A00C7000  D1502B00  7800A008  D7D9D6D1  F0F0F1F4*
02E3E7E3  40000240  40400038  40400001  6A00D0D8  6000D0D0  5800D0D4
5000D140  7800A010  7000D14C  7800A018  7000D158  7800A01C  7000D154
7800A020  7000D160  7800A024  7000D15C  D7D9D6D1  F0F0F1F5*
02E3E7E3  40000278  40400038  40400001  7820A014  7020D16C  5800D0E0
5000D12C  32224780  D26E5800  D0E85000  D12C4100  B0045000  D0644100
B0085000  D06858F0  D1804110  D05405EF  D7D9D6D1  F0F0F1F6*
02E3E7E3  400002B0  40400038  40400001  41200001  5720D128  1BFF872F
D29E1BFF  58E0D000  07FE7840  B0047040  D1D83344  7A40800C  30447820
B0087020  D1DC3322  7A208010  30227020  D7D9D6D1  F0F0F1F7*
02E3E7E3  400002E8  40400038  40400001  D1347940  90044730  D2DA7920
90044730  D2DA1BFF  58E0D000  07FE7840  80147B40  D1D83044  78208018
7B20D1DC  30227020  D1347940  90044730  D7D9D6D1  F0F0F1F8*
02E3E7E3  40000320  40400038  40400001  D30A7920  90044730  D30A1BFF
58E0D000  07FE5870  D1445A70  D0EC5070  D1645800  D1405000  D13C7800
D0E47000  D1205970  D1404730  D4705070  D7D9D6D1  F0F0F1F9*
02E3E7E3  40000358  40400038  40400001  D1241C63  5070D1B8  18075A00

MEMBER NAME  PROJSP
D1AC5000  D1C01857  5A50D1B4  18475A40  D0F81827  5A20D108  18075A00
D0F85000  D1D05A70  D1085070  D1D41834  D7D9D6D1  F0F0F2F0**
02E3E7E3  40000390  40400038  40400001  18455850  D1C05860  D1245880
D1B058A0  D1D018B2  5890D1A4  5870D188  5800D12C  1BFF870F  D3DA7805
90007000  D1187804  90007000  D11C58F0  D7D9D6D1  F0F0F2F1*
02E3E7E3  400003C8  40400038  40400001  D17C4110  D07005EF  7820D11C
7C20D16C  33227A23  90007B20  70043022  7020D130  7820D118  7C20D16C
7A2B9000  7B207008  30227020  D13447F0  D7D9D6D1  F0F0F2F2*
02E3E7E3  40000400  40400038  40400001  D3FA782A  90007B20  70043022
7020D130  58E0D1D4  782E9000  7B207008  30227020  D1347800  D13058F0
D1787900  F0044730  D44C7800  D13458F0  D7D9D6D1  F0F0F2F3*
02E3E7E3  40000438  40400038  40400001  D1787900  F0044730  D44C5060
D1245880  D1945890  D17858A0  D19C58B0  D1885830  D1B05800  D1245000
D1387800  D0E47000  D14841F0  000458E0  D7D9D6D1  F0F0F2F4*
02E3E7E3  40000470  40400038  40400001  D00007FE  5800D1D4  1A085000
D1D41AA8  1AB81A38  1A481A58  5A60D0EC  5960D13C  47C0D384  5060D124
5880D194  5890D178  58A0D19C  58B0D188  D7D9D6D1  F0F0F2F5*
02E3E7E3  400004A8  40400038  40400001  5830D1B0  5820D144  5020D124
5800D0F8  5000D1B8  5030D1C4  18535C40  D1441805  5A00D0F8  5000D1BC
18055A00  D1085000  D1C81805  5A00D1AC  D7D9D6D1  F0F0F2F6*
02E3E7E3  400004E0  40400038  40400001  5000D1CC  18055A00  D1B45000
D1D01A53  5050D1D4  18A218B3  5890D1A4  5880D188  58E0D1BC  410E9000
5000D07C  58F0D190  4110D07C  05EF4100  D7D9D6D1  F0F0F2F7*
02E3E7E3  40000518  40400038  40400001  80045000  D0644100  80085000
D06858F0  D1804110  D05405EF  41200001  5720D128  1BFF862F  D630187A
5A70D0EC  5C60D1C4  18575A50  D1B81847  D7D9D6D1  F0F0F2F8*
02E3E7E3  40000550  40400038  40400001  5A40D108  18375A30  D1AC1827
5A20D1B4  41008004  5000D098  41008008  5000D09C  58E0D1BC  410E9000
5000D0A0  58E0D1C8  410E9000  5000D0A4  D7D9D6D1  F0F0F2F9*
02E3E7E3  40000588  40400038  40400001  41059000  5000D0A8  41049000
5000D0AC  58E0D1CC  410E9000  5000D0B0  58E0D1D0  410E9000  5000D0B4
41039000  5000D0B8  41029000  5000D0BC  D7D9D6D1  F0F0F3F0**
```

```
02E3E7E3  400005C0  40400038  40400001  58E0D1D4  410E9000  5000D0C0
58F0D184  4110D098  05EF50A0  D12441E0  000415FE  4720D5C2  58EFD04C
07FE5880  D1945890  D17858A0  D19C58B0  D7D9D6D1  F0F0F3F1*
02E3E7E3  400005F8  40400038  40400001  D1885830  D1B05800  D1245900
D1444770  D5F67800  D1747900  D1504730  D5F61BFF  58E0D000  07FE5800
D1245900  D1404770  D6167800  D1747900  D7D9D6D1  F0F0F3F2*
02E3E7E3  40000630  40400038  40400001  D14C4750  D6161BFF  58E0D000
07FE5800  D1245000  D1387800  D1747000  D14841F0  000458E0  D00007FE
5800D1D4  1A0B5000  D1D45800  D1D01A0B  D7D9D6D1  F0F0F3F3*
02E3E7E3  40000668  40400038  40400001  5000D1D0  5800D1CC  1A0B5000
D1CC5800  D1C81A0B  5000D1C8  5800D1BC  1A0B5000  D1BC5AA0  D0EC59A0
D14047C0  D4D850A0  D1245880  D1945890  D7D9D6D1  F0F0F3F4*
02E3E7E3  400006A0  40400038  40400001  D17858A0  D19C58B0  D1885830
D1B01BFF  58E0D000  07FE58A0  D00458E0  A00C58B0  A0185810  B0145820
D1385020  10005830  B0187820  D1487020  D7D9D6D1  F0F0F3F5*
02E3E7E3  400006D8  40400038  40400001  300018DA  92FFA00C  982CA01C
07FE987A  100C5820  70005020  D1685820  90005020  D1387820  A0007020
D1485820  10004130  20004150  00041B25  D7D9D6D1  F0F0F3F6*
02E3E7E3  40000710  40400038  40400001  5020D188  5030D18C  58201004
41302000  41500004  1B255020  D1945030  D1985820  10084130  20004150
00041B25  5C40D0FC  1B255020  D1A45030  D7D9D6D1  F0F0F3F7*
02E3E7E3  40000748  4040001C  40400001  D1A85820  10104130  20004150
00041B25  5020D19C  5030D1A0  47F0D1E0  40404040  40404040  40404040
40404040  40404040  40404040  40404040  D7D9D6D1  F0F0F3F8*
02E3E7E3  40000020  4040000C  40400001  000006E6  00000028  000006B6
40404040  40404040  40404040  40404040  40404040  40404040  40404040

MEMBER NAME  PROJSP
40404040  40404040  40404040  40404040  D7D9D6D1  F0F0F3F9*
02D9D3C4  40404040  40400038  40404040  00020001  0C0001A0  00030001
1C0001A4  00040001  1C0001A8  00050001  1C0001AC  00060001  1C0001B8
00010001  0C000020  00010001  0C000024  D7D9D6D1  F0F0F4F0**
02E3E7E3  40000074  40400018  40400001  000005EA  00000658  00000180
00000188  0000017C  00000184  40404040  40404040  40404040  40404040
40404040  40404040  40404040  40404040  D7D9D6D1  F0F0F4F1*
02E3E7E3  40000094  40400004  40400001  80000150  40404040  40404040
40404040  40404040  40404040  40404040  40404040  40404040  40404040
40404040  40404040  40404040  40404040  D7D9D6D1  F0F0F4F2*
02D9D3C4  40404040  40400038  40404040  00010001  0C000028  00010001
0C000074  00010001  0C000078  00010001  0C00007C  00010001  0C000080
00010001  0C000084  00010001  0C000088  D7D9D6D1  F0F0F4F3*
02E3E7E3  40000098  4040000C  40400001  00000140  00000144  80000148
40404040  40404040  40404040  40404040  40404040  40404040  40404040
40404040  40404040  40404040  40404040  D7D9D6D1  F0F0F4F4*
02E3E7E3  400000A8  40400010  40400001  00000118  00000194  00000180
00000188  40404040  40404040  40404040  40404040  40404040  40404040
40404040  40404040  40404040  40404040  D7D9D6D1  F0F0F4F5*
02D9D3C4  40404040  40400038  40404040  00010001  0C000094  00010001
0C000098  00010001  0C00009C  00010001  0C0000A0  00010001  0C0000A8
00010001  0C0000AC  00010001  0C0000B0  D7D9D6D1  F0F0F4F6*
02E3E7E3  400000B8  40400008  40400001  0000017C  80000184  40404040
40404040  40404040  40404040  40404040  40404040  40404040  40404040
40404040  40404040  40404040  40404040  D7D9D6D1  F0F0F4F7*
02E3E7E3  400000EC  40400008  40400001  0000019C  80000194  40404040
40404040  40404040  40404040  40404040  40404040  40404040  40404040
40404040  40404040  40404040  40404040  D7D9D6D1  F0F0F4F8*
02E3E7E3  400001D4  40400034  40400001  0000000C  00000014  00000010
00000000  00000000  00000000  00000000  00000000  00000000  00000000
00000000  00000008  00B40008  40404040  D7D9D6D1  F0F0F4F9*
```

```
02D9D3C4  40404040  40400028  40404040  00010001  0C0000B4  00010001
0C0800B8  00010001  0C0000BC  00010001  0C0000EC  00010001  0C0000F0
40404040  40404040  40404040  40404040  D7D9D6D1  F0F0F5F0**
02C5D5C4  40404040  40404040  40404040  40404040  40404040  40404040
00000764  F1F5F7F3  F460C6D6  F34040F0  F2F0F2F8  F7F0F9F8  40F0F84B
F4F24BF3  F7404040  D7D9D6D1  E2D74040  D7D9D6D1  F0F0F5F1**

MEMBER NAME  PSNOTE
02C5E2C4  40404040  40400010  40400001  D7E2D5D6  E3C54040  00000000
40000000  40404040  40404040  40404040  40404040  40404040  40404040
40404040  40404040  40404040  40404040  D7E2D5D6  F0F0F0F1*
02E3E7E3  40000000  40400038  40400001  47F0F00C  07D7E2D5  D6E3C540
90ECD00C  184D98CD  F0205040  D00450D0  400807FC  40404040  40404040
02100422  02140422  021A1C40  C5D9D9D6  D7E2D5D6  F0F0F0F2*
02E3E7E3  40000038  40400038  40400001  D97A40E2  E4D7C5D9  40E3C5E7
E340C9D5  40D7E2D5  D6E3C522  021A1740  C5D9D9D6  D97A40D4  D6C4E5E4
40C9D540  D7E2D5D6  E3C52202  1A1840C5  D7E2D5D6  F0F0F0F3*
02E3E7E3  40000070  40400017  40400001  D9D9D6D9  7A40C5D5  C4D4E5E4
40C9D540  D7E2D5D6  E3C52240  40404040  40404040  40404040  40404040
40404040  40404040  40404040  40404040  D7E2D5D6  F0F0F0F4*
02C5E2C4  40404040  40400010  40400002  C4E5C9C5  E6E24040  05000000
40000004  40404040  40404040  40404040  40404040  40404040  40404040
40404040  40404040  40404040  40404040  D7E2D5D6  F0F0F0F5*
02E3E7E3  40000150  40400028  40400001  00000000  00000001  00000002
00000003  00000004  401DF3B6  4029FBE7  403EF9DB  00000000  00000000
40404040  40404040  40404040  40404040  D7E2D5D6  F0F0F0F6*
02C5E2C4  40404040  40400010  40400003  D4D6C4E5  E4404040  02000000
40000000  40404040  40404040  40404040  40404040  40404040  40404040
40404040  40404040  40404040  40404040  D7E2D5D6  F0F0F0F7*
02E3E7E3  40000198  40400008  40400001  00000000  00000000  40404040
40404040  40404040  40404040  40404040  40404040  40404040  40404040
40404040  40404040  40404040  40404040  D7E2D5D6  F0F0F0F8*
02C5E2C4  40404040  40400010  40400004  D4E5C3C8  D9404040  02000000
40000000  40404040  40404040  40404040  40404040  40404040  40404040
40404040  40404040  40404040  40404040  D7E2D5D6  F0F0F0F9*
02C5E2C4  40404040  40400010  40400005  C3C1C4E2  E4D74040  02000000
40000000  40404040  40404040  40404040  40404040  40404040  40404040
40404040  40404040  40404040  40404040  D7E2D5D6  F0F0F1F0**
02E3E7E3  400001A4  4040000C  40400001  00000000  00000000  00000000
40404040  40404040  40404040  40404040  40404040  40404040  40404040
40404040  40404040  40404040  40404040  D7E2D5D6  F0F0F1F1*
02C5E2C4  40404040  40400010  40400006  C5D5C4D4  E5E44040  02000000
40000000  40404040  40404040  40404040  40404040  40404040  40404040
40404040  40404040  40404040  40404040  D7E2D5D6  F0F0F1F2*
02C5E2C4  40404040  40400010  40400007  C9C2C3D6  D47B4040  02000000
40000000  40404040  40404040  40404040  40404040  40404040  40404040
40404040  40404040  40404040  40404040  D7E2D5D6  F0F0F1F3*
02E3E7E3  400001B4  4040000C  40400001  00000000  00000000  00000000
40404040  40404040  40404040  40404040  40404040  40404040  40404040
40404040  40404040  40404040  40404040  D7E2D5D6  F0F0F1F4*
02E3E7E3  40000194  40400004  40400001  40404040  40404040  40404040
40404040  40404040  40404040  40404040  40404040  40404040  40404040
40404040  40404040  40404040  40404040  D7E2D5D6  F0F0F1F5*
02E3E7E3  400001C0  40400038  40400001  5890D110  58A0D124  58B0D114
58F0D134  45E0F004  00000000  00000028  45E0F008  0450D0F8  45E0F010
58F0D134  45E0F000  00000000  0000002C  D7E2D5D6  F0F0F1F6*
02D9D3C4  40404040  40400038  40404040  00020001  0C000198  00030001
1C0001A4  00040001  1C0001A8  00050001  1C0001B4  00060001  1C0001B8
00070001  1C0001BC  00010001  0C0001D8  D7E2D5D6  F0F0F1F7*
```

```
02E3E7E3  400001F8  40400038  40400001  45E0F008  0470D100  45E0F010
7800B004  7000D0F0  7800B008  7000D0F4  4100D10E  5000D074  58F0D120
4110D070  05EF58F0  D11C4110  D07C05EF  D7E2D5D6  F0F0F1F8*
02E3E7E3  40000230  40400038  40400001  41E00008  15FE4720  D1B858EF
D04C07FE  58F0D12C  4110D080  05EF41E0  000415FE  4720D1D2  58EFD058
07FE5800  D0F85A00  D0CC5000  D0F858F0  D7E2D5D6  F0F0F1F9*
02E3E7E3  40000268  40400038  40400001  D1341800  45E0F004  00000000

MEMBER NAME  PSNOTE
00000028  45E0F008  0450D0FC  45E0F010  58F0D134  45E0F000  00000000
0000002C  45E0F008  0470D100  45E0F010  D7E2D5D6  F0F0F2F0**
02E3E7E3  400002A0  40400038  40400001  7800A004  7000D0F0  7800A008
7000D0F4  58F0D12C  4110D080  05EF41E0  000415FE  4720D242  58EFD060
07FE58F0  D1301B11  05EF41E0  000415FE  D7E2D5D6  F0F0F2F1*
02E3E7E3  400002D8  40400038  40400001  4720D25A  58EFD068  07FE1BFF
58E0D000  07FE58F0  D1341800  45E0F004  00000006  00000030  45E0F010
1BFF58E0  D00007FE  58F0D134  45E0F004  D7E2D5D6  F0F0F2F2*
02E3E7E3  40000310  40400038  40400001  00000006  00000050  45E0F010
1BFF58E0  D00007FE  58F0D134  45E0F004  00000006  0000006B  45E0F010
1BFF58E0  D00007FE  58A0D004  58E0A00C  D7E2D5D6  F0F0F2F3*
02E3E7E3  40000348  40400038  40400001  58B0A018  5810B004  5820D0F8
50201000  5830B010  5840D104  50403000  18DA92FF  A00C982C  A01C07FE
987A1004  58207000  5020D0F8  58209000  D7E2D5D6  F0F0F2F4*
02E3E7E3  40000380  40400038  40400001  5020D0FC  5820A000  5020D104
58201000  41302000  41500004  1B255020  D1145030  D1185820  10084130
20004150  00041B25  5020D124  5030D128  D7E2D5D6  F0F0F2F5*
02E3E7E3  400003B8  40400004  40400001  47F0D138  40404040  40404040
40404040  40404040  40404040  40404040  40404040  40404040  40404040
40404040  40404040  40404040  40404040  D7E2D5D6  F0F0F2F6*
02E3E7E3  40000020  40400008  40400001  00000370  00000088  40404040
40404040  40404040  40404040  40404040  40404040  40404040  40404040
40404040  40404040  40404040  40404040  D7E2D5D6  F0F0F2F7*
02D9D3C4  40404040  40400038  40404040  00010001  0C0001F4  00010001
0C000274  00010001  0C000290  00010001  0C0002F8  00010001  0C000314
00010001  0C000330  00010001  0C000020  D7E2D5D6  F0F0F2F8*
02E3E7E3  40000088  40400004  40400001  00000340  40404040  40404040
40404040  40404040  40404040  40404040  40404040  40404040  40404040
40404040  40404040  40404040  40404040  D7E2D5D6  F0F0F2F9*
02E3E7E3  400000D4  40400018  40400001  00000240  00000308  00000308
0000025A  000002EA  000002CA  40404040  40404040  40404040  40404040
40404040  40404040  40404040  40404040  D7E2D5D6  F0F0F3F0**
02D9D3C4  40404040  40400038  40404040  00010001  0C000024  00010001
0C000088  00010001  0C0000D4  00010001  0C0000D8  00010001  0C0000DC
00010001  0C0000E0  00010001  0C0000E4  D7E2D5D6  F0F0F3F1*
02E3E7E3  400000EC  40400010  40400001  000002EA  000002E2  00000324
00000158  40404040  40404040  40404040  40404040  40404040  40404040
40404040  40404040  40404040  40404040  D7E2D5D6  F0F0F3F2*
02E3E7E3  40000100  4040000C  40400001  80000002  80000194  00000178
40404040  40404040  40404040  40404040  40404040  40404040  40404040
40404040  40404040  40404040  40404040  D7E2D5D6  F0F0F3F3*
02D9D3C4  40404040  40400038  40404040  00010001  0C0000E8  00010001
0C0000EC  00010001  0C0000F0  00010001  0C0000F4  00010001  0C0000F8
00020001  0C000100  00010001  0C000104  D7E2D5D6  F0F0F3F4*
02E3E7E3  4000010C  4040001C  40400001  0000017C  0000018C  00000160
00000168  00000164  00000188  00000150  40404040  40404040  40404040
40404040  40404040  40404040  40404040  D7E2D5D6  F0F0F3F5*
02D9D3C4  40404040  40400038  40404040  00010001  0C000108  00010001
0C00010C  00010001  0C000110  00010001  0C000114  00010001  0C000118
00010001  0C00011C  00010001  0C000120  D7E2D5D6  F0F0F3F6*
```

```
02E3E7E3  40000128  4040001C  40400001  00000150  00000150  00000150
00000154  0000015C  00000150  00000150  40404040  40404040  40404040
40404040  40404040  40404040  40404040  D7E2D5D6  F0F0F3F7*
02D9D3C4  40404040  40400038  40404040  00010001  0C000124  00010001
0C000128  00010001  0C00012C  00010001  0C000130  00010001  0C000134
00010001  0C000138  00010001  0C00013C  D7E2D5D6  F0F0F3F8*
02E3E7E3  40000144  4040000C  40400001  00000168  0000016C  80000150
40404040  40404040  40404040  40404040  40404040  40404040  40404040

MEMBER NAME  PSNOTE
40404040  40404040  40404040  40404040  D7E2D5D6  F0F0F3F9*
02D9D3C4  40404040  40400020  40404040  00010001  0C000140  00010001
0C000144  00010001  0C000148  00010001  0C00014C  40404040  40404040
40404040  40404040  40404040  40404040  D7E2D5D6  F0F0F4F0**
02C5D5C4  40404040  40404040  40404040  40404040  40404040  40404040
000003BC  F1F5F7F3  F460C6D6  F34040F0  F2F0F2F8  F7F0F9F8  40F0F84B
F4F24BF4  F2404040  D7E2D5D6  E3C54040  D7E2D5D6  F0F0F4F1**

MEMBER NAME  PSTRES
02C5E2C4  40404040  40400010  40400001  D7E2E3D9  C5E24040  00000000
40000000  40404040  40404040  40404040  40404040  40404040  40404040
40404040  40404040  40404040  40404040  D7E2E3D9  F0F0F0F1*
02E3E7E3  40000000  40400038  40400001  47F0F00C  07D7E2E3  D9C5E240
90ECD00C  184D98CD  F0205040  D00450D0  400807FC  40404040  40404040
021A1AD7  C9C5D9C3  C540E3C1  C2D3C540  D7E2E3D9  F0F0F0F2*
02E3E7E3  40000038  40400038  40400001  C6D6D940  C4C1E2C8  407B4040
4D10031A  025D5B1A  04D7E37B  4010081A  054040E7  7E400A08  031A0540
40E87E40  0A08031A  015B1A17  D3D6C1C4  D7E2E3D9  F0F0F0F3*
02E3E7E3  40000070  40400038  40400001  40C4C9D9  C5C3E3C9  D6D540C1
D5C7D3C5  407E400A  06021A01  5B1A1ED3  C1E8E4D7  40C4C5C6  C9D5C5C4
40C6D9D6  D440E3D6  D6D340E2  C9C4C55B  D7E2E3D9  F0F0F0F4*
02E3E7E3  400000A8  40400038  40400001  5B180222  02068414  0122021A
2C405C5C  5C5C5C5C  5C5C5C5C  5C5C5C5C  5C5C5C40  E6C1D9D5  C9D5C740
5C5C5C5C  5C5C5C5C  5C5C5C5C  5C5C5C5C  D7E2E3D9  F0F0F0F5*
02E3E7E3  400000E0  40400038  40400001  401E1A20  4040C9D5  E5C1D3C9
C440E2C5  D8E4C5D5  C3C9D5C7  40C6D6D9  40D7D6C9  D5E37B40  10061A0A
4040E2C5  D8E4C5D5  C3C51006  22021A14  D7E2E3D9  F0F0F0F6*
02E3E7E3  40000118  40400038  40400001  C4E4D7D3  C9C3C1E3  C540E2C5
D8E4C5D5  C3C54040  1005180A  2202061E  14012202  0A05011A  016B2202
06061401  22021003  18021005  18011005  D7E2E3D9  F0F0F0F7*
02E3E7E3  40000150  40400038  40400001  18010A06  04180110  04180206
18140118  0A220206  38140122  020A0501  1A016B22  02060614  0122021A
01400A06  021A0340  7E401004  18010A05  D7E2E3D9  F0F0F0F8*
02E3E7E3  40000188  40400038  40400001  011A016C  22020615  14012202
1A08E3D6  E3C1D340  7E401004  18322202  060C1401  22021A20  C5E3407E
404DC5E7  405C40E3  5D404040  40404040  D7E2E3D9  F0F0F0F9*
02E3E7E3  400001C0  40400038  40400001  40404040  40404040  40407E40
0C0B0418  1422021A  20E3D6E3  C1D340E3  C8C9C3D2  D5C5E2E2  40404040
40404040  40404040  4040407E  400A0604  D7E2E3D9  F0F0F1F0**
02E3E7E3  400001F8  40400038  40400001  18011A02  C9D51814  22021A20
D3D6D5C7  C9E3E4C4  C9D5C1D3  40D4D6C4  E4D3E4E2  404DC5F1  5D40C5E7
40407E40  0C0B041A  0440D7E2  C9181422  D7E2E3D9  F0F0F1F1*
02E3E7E3  40000230  40400038  40400001  021A20E3  D9C1D5E2  E5C5D9E2
C540D4D6  C4E4D3E4  E2404040  4DC5F25D  40C5E840  407E400C  0B041A04
40D7E2C9  18142202  1A20E2C8  C5C1D940  D7E2E3D9  F0F0F1F2*
02E3E7E3  40000268  40400038  40400001  D4D6C4E4  D3E4E240  40404040
404DC7F1  F25D40C7  E7E84040  7E400C0B  041A0440  D7E2C918  1422021A
20D7D6C9  E2E2D6D5  7DE240D9  C1E3C9D6  D7E2E3D9  F0F0F1F3*
02E3E7E3  400002A0  40400038  40400001  4040404D  D5E4F1F2  5D40E5E7
```

```
E840407E  400A0504  18142202  1A20D7D6  C9E2E2D6  D57DE240  D9C1E3C9
D6404040  4DD5E4F2  F15D40E5  E8E74040  D7E2E3D9  F0F0F1F4*
02E3E7E3  400002D8  40400038  40400001  7E400A05  04181422  021A20D3
D6D5C7C9  E3E4C4C9  D5C1D340  C34BE34B  C54B40C1  D3D7C8C1  4040E740
407E400C  0B041A0C  40C9D561  C9D561C4  D7E2E3D9  F0F0F1F5*
02E3E7E3  40000310  40400038  40400001  C5C740C6  22021A20  E3D9C1D5
E2E5C5D9  E2C540C3  4BE34BC5  4B404040  C1D3D7C8  C14040E8  40407E40
0C0B041A  0C40C9D5  61C9D561  C4C5C740  D7E2E3D9  F0F0F1F6*
02E3E7E3  40000348  40400038  40400001  C622021A  20C1D7D7  C1D9C5D5
E340E2C8  D940C34B  E34BC54B  40C1D3D7  C8C140E7  E840407E  400C0B04
1A0C40C9  D561C9D5  61C4C5C7  40C62202  D7E2E3D9  F0F0F1F7*
02E3E7E3  40000380  40400038  40400001  06341401  22021A29  E3C8C540
C5D3C5D4  C5D5E3E2  40C9D540  E3C8C540  E2E3C9C6  C6D5C5E2  E240D4C1
E3D9C9E7  40C1D9C5  7A181422  0204060C  D7E2E3D9  F0F0F1F8*
02E3E7E3  400003B8  4040000E  40400001  0B041803  1C180A22  02065A14
01224040  40404040  40404040  40404040  40404040  40404040  40404040
40404040  40404040  40404040  40404040  D7E2E3D9  F0F0F1F9*
02E3E7E3  400003C8  40400038  40400001  E3D6E3C1  D340D7D3  E8E240C2

MEMBER NAME  PSTRES
E840D6D9  C9C5D5E3  C1E3C9D6  D5404040  40404040  C140C25B  C240C440
40404040  40404040  40404040  40404040  D7E2E3D9  F0F0F2F0**
02E3E7E3  40000400  40400028  40400001  40404040  40404040  C9D5E5C1
D3C9C440  E2C5D8E4  C5D5C3C9  D5C74040  40404040  40404040  40404040
40404040  40404040  40404040  40404040  D7E2E3D9  F0F0F2F1*
02E3E7E3  40000E60  40400038  40400001  00000000  00000000  4E000000
00000000  4F080000  00000000  4E000000  80000000  41100000  00000000
00000000  00000000  00000000  00000001  D7E2E3D9  F0F0F2F2*
02E3E7E3  40000E98  40400038  40400001  00000001  00000002  00000003
00000004  00000005  00000006  00000007  00000008  0000000A  0000000B
0000000C  00000010  00000012  00000015  D7E2E3D9  F0F0F2F3*
02E3E7E3  40000ED0  40400038  40400001  00000018  00000019  0000001A
0000001E  0000002A  00000033  00000034  00000038  00000049  00000058
0000005A  00000064  00000083  00000084  D7E2E3D9  F0F0F2F4*
02E3E7E3  40000F08  40400038  40400001  00000098  000000AE  00061A80
0007A120  000927C0  3F2D0E56  3FE978D5  40147AE1  40189375  401DF3B6
401EB852  40200000  40210625  40266666  D7E2E3D9  F0F0F2F5*
02E3E7E3  40000F40  40400038  40400001  4029FBE7  403EF9DB  40400000
40591687  4082D0E5  40991687  40B78D50  40D91687  40F5C28F  40F74BC7
41100000  41102D0E  4111A5E3  411220C5  D7E2E3D9  F0F0F2F6*
02E3E7E3  40000F78  40400038  40400001  4112A3D7  4113A9FC  4113CED9
4114AC08  41160831  411620C5  41163D71  41170E56  41184DD3  411A20C5
411AB852  411D47AE  411EA7F0  411EE148  D7E2E3D9  F0F0F2F7*
02E3E7E3  40000FB0  40400038  40400001  4123AE14  41261893  413672B0
413ED0E5  4140CCCD  41474396  414F4BC7  4152E148  41555C29  4157126F
415BC28F  42640000  00000000  00000000  D7E2E3D9  F0F0F2F8*
02C5E2C4  40404040  40400010  40400002  D9D4D6C4  C5D34040  05000000
40000018  40404040  40404040  40404040  40404040  40404040  40404040
40404040  40404040  40404040  40404040  D7E2E3D9  F0F0F2F9*
02C5E2C4  40404040  40400010  40400003  D6D7E3C9  D6D54040  05000000
40000020  40404040  40404040  40404040  40404040  40404040  40404040
40404040  40404040  40404040  40404040  D7E2E3D9  F0F0F3F0**
02C5E2C4  40404040  40400010  40400004  E2E3C1C3  D2404040  05000000
40040744  40404040  40404040  40404040  40404040  40404040  40404040
40404040  40404040  40404040  40404040  D7E2E3D9  F0F0F3F1*
02C5E2C4  40404040  40400010  40400005  D7D7D6C9  D5E34040  05000000
40013884  40404040  40404040  40404040  40404040  40404040  40404040
40404040  40404040  40404040  40404040  D7E2E3D9  F0F0F3F2*
02C5E2C4  40404040  40400010  40400006  D7D4C1E3  D3404040  05000000
```

```
40001134  40404040  40404040  40404040  40404040  40404040  40404040
40404040  40404040  40404040  40404040  D7E2E3D9  F0F0F3F3*
02C5E2C4  40404040  40400010  40400007  C4C5D9D6  E3404040  02000000
40000000  40404040  40404040  40404040  40404040  40404040  40404040
40404040  40404040  40404040  40404040  D7E2E3D9  F0F0F3F4*
02E3E7E3  400021E0  40400020  40400001  00001688  FFFFFFFF  00000000
FFFFFFA8  FFFFFFF0  FFFFFFA0  00001130  00000000  40404040  40404040
40404040  40404040  40404040  40404040  D7E2E3D9  F0F0F3F5*
02E3E7E3  40002204  40400004  40400001  00000000  40404040  40404040
40404040  40404040  40404040  40404040  40404040  40404040  40404040
40404040  40404040  40404040  40404040  D7E2E3D9  F0F0F3F6*
02D9D3C4  40404040  40400038  40404040  00010001  0C0021E0  00020001
0C0021E4  00030001  0C0021E8  00040001  0C0021EC  00050001  0C0021F0
00060001  0C0021F4  00060001  0C0021F8  D7E2E3D9  F0F0F3F7*
02C5E2C4  40404040  40400010  40400008  D4E5C3C8  D9404040  02000000
40000000  40404040  40404040  40404040  40404040  40404040  40404040
40404040  40404040  40404040  40404040  D7E2E3D9  F0F0F3F8*
02C5E2C4  40404040  40400010  40400009  D5C3C1D9  C4404040  02000000
40000000  40404040  40404040  40404040  40404040  40404040  40404040

MEMBER NAME  PSTRES
40404040  40404040  40404040  40404040  D7E2E3D9  F0F0F3F9*
02C5E2C4  40404040  40400010  4040000A  C3C1C4D3  D5F14040  02000000
40000000  40404040  40404040  40404040  40404040  40404040  40404040
40404040  40404040  40404040  40404040  D7E2E3D9  F0F0F4F0**
02C5E2C4  40404040  40400010  4040000B  C3C1C4E2  E4D74040  02000000
40000000  40404040  40404040  40404040  40404040  40404040  40404040
40404040  40404040  40404040  40404040  D7E2E3D9  F0F0F4F1*
02C5E2C4  40404040  40400010  4040000C  C3C8C1D9  C6D34040  02000000
40000000  40404040  40404040  40404040  40404040  40404040  40404040
40404040  40404040  40404040  40404040  D7E2E3D9  F0F0F4F2*
02C5E2C4  40404040  40400010  4040000D  C3D6D5E2  E3D94040  02000000
40000000  40404040  40404040  40404040  40404040  40404040  40404040
40404040  40404040  40404040  40404040  D7E2E3D9  F0F0F4F3*
02C5E2C4  40404040  40400010  4040000E  C9C2C3D6  D47B4040  02000000
40000000  40404040  40404040  40404040  40404040  40404040  40404040
40404040  40404040  40404040  40404040  D7E2E3D9  F0F0F4F4*
02E3E7E3  40002208  4040001C  40400001  00000000  00000000  00000000
00000000  00000000  00000000  00000000  40404040  40404040  40404040
40404040  40404040  40404040  40404040  D7E2E3D9  F0F0F4F5*
02D9D3C4  40404040  40400038  40404040  00070001  1C002204  00080001
1C002208  00090001  1C00220C  000A0001  1C002210  000B0001  1C002214
000C0001  1C002218  000D0001  1C00221C  D7E2E3D9  F0F0F4F6*
02C5E2C4  40404040  40400010  4040000F  C9C3D5E3  C5D94040  02000000
40000000  40404040  40404040  40404040  40404040  40404040  40404040
40404040  40404040  40404040  40404040  D7E2E3D9  F0F0F4F7*
02C5E2C4  40404040  40400010  40400010  E6D9E3D4  C1E34040  02000000
40000000  40404040  40404040  40404040  40404040  40404040  40404040
40404040  40404040  40404040  40404040  D7E2E3D9  F0F0F4F8*
02E3E7E3  40002224  40400008  40400001  00000000  00000000  40404040
40404040  40404040  40404040  40404040  40404040  40404040  40404040
40404040  40404040  40404040  40404040  D7E2E3D9  F0F0F4F9*
02E3E7E3  40001940  40400030  40400001  E2C5D840  4040D3C1  E8E4D740
E3C8C9C3  D24040D4  C1E3D340  4040D7D3  E840D6D9  C9C5D5E3  C1E3C9D6
D5E24040  40404040  40404040  40404040  D7E2E3D9  F0F0F5F0**
02E3E7E3  40002140  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  D7E2E3D9  F0F0F5F1*
02E3E7E3  40002178  40400038  40400001  C45B5BE2  D3C9C340  E5C5D9E2
```

```
C9D6D540  E7E7E7E7  40404040  40404040  40404040  40404040  40404040
40404040  40404040  40404040  40404040  D7E2E3D9  F0F0F5F2*
02E3E7E3  400021B0  40400028  40400001  40404040  40404040  40404040
40404040  40404040  40404040  40404040  40404040  40404040  40404040
40404040  40404040  40404040  40404040  D7E2E3D9  F0F0F5F3*
02E3E7E3  400022A0  40400038  40400001  5880C010  5890C000  5800DA60
5000DBFC  41009B00  5000D128  58F0C028  4110D124  05EF58E0  C0B05820
C01C580E  20001000  5000DBE4  5800DA8C  D7E2E3D9  F0F0F5F4*
02E3E7E3  400022D8  40400038  40400001  5000C0A0  5800DAA8  5000C0A4
58E0DAA8  583E2000  89300004  2B007803  80046A00  DA486000  DA385800
DA3C5000  DBE87803  80087000  DBD87803  D7E2E3D9  F0F0F5F5*
02E3E7E3  40002310  40400038  40400001  800C7000  DBDC5800  DA705000
DC4C7803  80107000  DC6C58F0  C0401800  45E0F004  00000000  00000028
45E0F008  0450DBE4  45E0F008  0450DBE8  D7E2E3D9  F0F0F5F6*
02E3E7E3  40002348  40400038  40400001  45E0F008  0470DBD8  45E0F008
0470DBDC  45E0F008  0470DC6C  45E0F010  58F0C040  45E0F000  00000000
000000AC  45E0F00C  000010F8  012000AE  D7E2E3D9  F0F0F5F7*
02E3E7E3  40002380  40400038  40400001  45E0F010  58F0C008  5800F008
1BFF860F  C21C58F0  C0444110  D13005EF  5000DC1C  7800DBA8  33007000
C09C58F0  C0344110  D13805EF  41E00004  D7E2E3D9  F0F0F5F8*

MEMBER NAME  PSTRES
02E3E7E3  400023B8  40400038  40400001  15FE4720  C1E458EF  D04C07FE
4100DD52  5000D184  410092B8  5000D188  9280D188  58F0C028  4110D180
05EF58F0  C0344110  D18C05EF  41E00004  D7E2E3D9  F0F0F5F9*
02E3E7E3  400023F0  40400038  40400001  15FE4720  C21C58EF  D05407FE
5800DA64  5000DC64  58E0C0A4  58F0C01C  583EF000  89300004  2B007803
80046A00  DA486000  DA385820  DA3C5020  D7E2E3D9  F0F0F6F0**
02E3E7E3  40002428  40400038  40400001  DC041832  5A30DA64  5030DE50
18325A30  DAE85030  DE541832  5A30DAEC  5030DE58  5A20DAF0  5020DE5C
5800DA64  5000DC5C  7800DBA8  33007000  D7E2E3D9  F0F0F6F1*
02E3E7E3  40002460  40400038  40400001  DE487800  DB507000  DE4C7800
DB847000  DC505800  DA705000  DC007800  DA687000  90105800  DA705000
DBC05800  DA9C5000  C0807820  DB403322  D7E2E3D9  F0F0F6F2*
02E3E7E3  40002498  40400038  40400001  7020C07C  7020C090  7800DBB0
33007000  C0945800  C0B45000  C0845880  DA7C5890  C00C5800  DC5C5A00
DA705000  DC5C58F0  C0384110  D1D405EF  D7E2E3D9  F0F0F6F3*
02E3E7E3  400024D0  40400038  40400001  41E00004  15FE4720  C30058EF
D05C07FE  58E0C084  58F0C01C  587EF000  5C60DACC  2B007807  900C6A00
DA486000  DA385830  DA3C5030  DC182B00  D7E2E3D9  F0F0F6F4*
02E3E7E3  40002508  40400038  40400001  78079010  6A00DA48  6000DA38
5800DA3C  5000DC08  2B007807  90186A00  DA486000  DA385850  DA3C5050
DC445C40  DACC5050  C08858F0  C0146825  D7E2E3D9  F0F0F6F5*
02E3E7E3  40002540  40400038  40400001  F0502B00  38026A00  DA486000
DA385800  DA3C5000  DC0C5800  DBC05900  DA704780  C4885930  DC244770
C48858F0  C0085800  F0081BFF  870FC3E4  D7E2E3D9  F0F0F6F6*
02E3E7E3  40002578  40400034  40400001  58F0C040  45E0F004  00000009
000000B2  45E0F008  0450DC04  45E0F008  0450DC18  45E0F010  58F0C040
45E0F004  00000006  000000B2  40404040  D7E2E3D9  F0F0F6F7*
02D9D3C4  40404040  40400038  40404040  000E0001  1C002220  000F0001
1C002224  00100001  1C002228  00010001  0C002334  00010001  0C002370
00010001  0C002378  00010001  0C002584  D7E2E3D9  F0F0F6F8*
02E3E7E3  400025AC  40400038  40400001  45E0F008  0450DC04  45E0F008
0450DC18  45E0F010  47F0C488  5800DBFC  1BFF860F  C40858F0  C0344110
D1E405EF  41E00004  15FE4720  C40858EF  D7E2E3D9  F0F0F6F9*
02E3E7E3  400025E4  40400038  40400001  D06407FE  5800DA6C  5000DBFC
58F0C040  45E0F004  00000000  00000115  45E0F008  0450DC18  45E0F010
58F0C040  45E0F000  00000000  00000131  D7E2E3D9  F0F0F7F0**
02E3E7E3  4000261C  40400038  40400001  45E0F134  00010000  0120DD7E
```

```
0100001E  00000001  45E0F010  58F0C044  4110D22C  05EF5000  DC1C58F0
C0344110  D23405EF  41E00004  15FE4720  D7E2E3D9  F0F0F7F1*
02E3E7E3  40002654  40400038  40400001  C47C58EF  D06C07FE  7800DC50
7B00DB20  7000DC50  5800DC18  5000DC24  58F0C038  4110D27C  05EF41E0
000415FE  4720C4AA  58EFD074  07FE58E0  D7E2E3D9  F0F0F7F2*
02E3E7E3  4000268C  40400038  40400001  C08458F0  C01C583E  F0005C20
DACC4103  90405000  D28C58F0  C0244110  D28C05EF  5820DC14  89200002
5020C08C  18781892  7860DC6C  7827DE5C  D7E2E3D9  F0F0F7F3*
02E3E7E3  400026C4  40400038  40400001  3B267027  DE5C8778  C4E05890
C00C7800  DA687000  DC705800  DBC05900  DA704770  C51A7820  DE605820
DC008920  000358F0  C0007022  F00458E0  D7E2E3D9  F0F0F7F4*
02E3E7E3  400026FC  40400038  40400001  C08858F0  C014680E  F0586000
C0605800  DC648900  00035000  C0685800  DC648900  00025000  C06C5820
DC008920  00035020  C0705800  C08C5000  D7E2E3D9  F0F0F7F5*
02E3E7E3  40002734  40400038  40400001  C0781858  5870DA70  5880DA8C
18927840  DB405860  C0005800  DC641A07  5000DC64  5800C06C  5A00DA7C
5000C06C  5830C068  1A385030  C0681843  D7E2E3D9  F0F0F7F6*
02E3E7E3  4000276C  40400038  40400001  2B227825  DE5C6023  62E058F0
C0085800  F0181BFF  870FC5B2  682462E0  6C20DA58  23026004  62E058E0
C06C5800  DC44500E  DE7C2B22  7820DC70  D7E2E3D9  F0F0F7F7*
02E3E7E3  400027A4  40400038  40400001  6A20C060  7020DC70  686462E0

MEMBER NAME  PSTRES
18782B22  78276004  29624770  C5E87827  60083A24  70276008  2B227827
60042962  4770C5F8  47F0C61E  8778C5D2  D7E2E3D9  F0F0F7F8*
02E3E7E3  400027DC  40400038  40400001  5870DA70  5800DC00  1A075000
DC005820  C0701A28  5020C070  1A987062  60047042  60085870  DA705A50
DA7C5950  C07847C0  C56A5890  C00C5880  D7E2E3D9  F0F0F7F9*
02E3E7E3  40002814  40400038  40400001  DA7C5800  DA705000  DBF85800
DC145000  DC101908  47C0C650  5080DC10  5820DC10  89200002  5850DA80
5860DA70  18781892  58F0C040  45E0F004  D7E2E3D9  F0F0F8F0**
02E3E7E3  4000284C  40400038  40400001  00000000  00000137  45E0F008
0477DE5C  45E0F010  5800DBF8  1A055000  DC2058F0  C0401800  45E0F000
00000000  0000013F  5810DBF8  45E0F134  D7E2E3D9  F0F0F8F1*
02E3E7E3  40002884  40400014  40400001  00010000  0121DCB7  02001020
00001048  00000E98  40404040  40404040  40404040  40404040  40404040
40404040  40404040  40404040  40404040  D7E2E3D9  F0F0F8F2*
02D9D3C4  40404040  40400038  40404040  00010001  0C0025A8  00010001
0C0025FC  00010001  0C002618  00010001  0C002850  00010001  0C002878
00010001  0800288D  00010001  08002891  D7E2E3D9  F0F0F8F3*
02E3E7E3  40002898  40400038  40400001  00000001  45E0F010  5800DC20
1A065000  DBF88778  C6645890  C00C58F0  C0085800  F0081BFF  860FC910
58F0C040  45E0F004  00000000  00000145  D7E2E3D9  F0F0F8F4*
02E3E7E3  400028D0  40400038  40400001  45E0F008  0450DC4C  45E0F008
0450DC18  45E0F008  0450DC08  45E0F008  0470DC70  45E0F008  0450DC0C
45E0F00C  000010E0  01200018  45E0F010  D7E2E3D9  F0F0F8F5*
02E3E7E3  40002908  40400038  40400001  58F0C040  45E0F000  00000000
00000162  45E0F134  00010000  0120DD7E  01000038  00000001  45E0F010
5800DC14  5A00DC4C  5000DC4C  58F0C044  D7E2E3D9  F0F0F8F6*
02E3E7E3  40002940  40400038  40400001  4110D298  05EF5000  DC1C4100
DE4C5000  D2A458F0  C0344110  D2A005EF  41E00004  15FE4720  C78C58EF
D07C07FE  7820DE4C  7B20DB0C  7020DE4C  D7E2E3D9  F0F0F8F7*
02E3E7E3  40002978  40400038  40400001  5980DC14  47A0C910  5840DA80
5850DA80  5890DC14  194947C0  C7B647F0  C91058F0  C0384110  D2E805EF
41E00004  15FE4720  C7D058EF  D08407FE  D7E2E3D9  F0F0F8F8*
02E3E7E3  400029B0  40400038  40400001  58F0C038  4110D2F8  05EF41E0
000415FE  4720C7EA  58EFD08C  07FE5800  DC5C5A00  DA705000  DC5C5800
DA705000  DBF81829  1B245A20  DA705020  D7E2E3D9  F0F0F8F9*
02E3E7E3  400029E8  40400038  40400001  DC101928  47C0C814  5080DC10
```

```
5820DC10  1A245B20  DA705020  DC108920  00021834  89300002  5860DA70
18731892  58F0C040  45E0F004  00000000  D7E2E3D9  F0F0F9F0**
02E3E7E3  40002A20  40400038  40400001  00000168  45E0F008  0477DE5C
45E0F010  5800DBF8  1A055000  DC2058F0  C0401800  45E0F000  00000000
00000170  5810DBF8  45E0F134  00010000  D7E2E3D9  F0F0F9F1*
02E3E7E3  40002A58  4040000C  40400001  0121DCB7  02001020  00001048
40404040  40404040  40404040  40404040  40404040  40404040  40404040
40404040  40404040  40404040  40404040  D7E2E3D9  F0F0F9F2*
02D9D3C4  40404040  40400038  40404040  00010001  08002895  00010001
0C0028CC  00010001  0C0028FC  00010001  0C002914  00010001  0C002A20
00010001  0C002A48  00010001  08002A5D  D7E2E3D9  F0F0F9F3*
02E3E7E3  40002A64  40400038  40400001  00000E98  00000001  45E0F010
5800DC20  1A065000  DBF88778  C8345890  DC144100  DD975000  D30C4100
DCB85000  D3109280  D31058F0  C0284110  D7E2E3D9  F0F0F9F4*
02E3E7E3  40002A9C  40400038  40400001  D30805EF  58F0C044  4110D314
05EF5000  DC1C4100  DE485000  D31C4100  DE4C5000  D32058F0  C0344110
D31C05EF  41E00004  15FE4720  C8F858EF  D7E2E3D9  F0F0F9F5*
02E3E7E3  40002AD4  40400038  40400001  D09407FE  7820DE4C  7B20DB0C
7020DE4C  5840DC10  5A40DA70  47F0C7AC  5890C00C  5820DBC0  5A20DA70
5020DBC0  5800C084  5A00DA9C  5000C084  D7E2E3D9  F0F0F9F6*
02E3E7E3  40002B0C  40400038  40400001  5920DC48  47C0C2DA  5880C010
5890C000  58F0C008  5800F008  1BFF860F  CAD85800  DC5C5700  DA545000

MEMBER NAME  PSTRES
DA446820  DA406B20  DA507020  C0A87B20  D7E2E3D9  F0F0F9F7*
02E3E7E3  40002B44  40400038  40400001  DB407C20  DB0C3322  7A20DB48
7020DC34  7800DB68  7000DC40  7800DBAC  33007000  DC547800  DB6C3300
7000DC78  58F0C030  4110D364  05EF58F0  D7E2E3D9  F0F0F9F8*
02E3E7E3  40002B7C  40400038  40400001  C0304110  D37405EF  58F0C030
4110D384  05EF7800  DB487000  DC585800  DA705000  DBD45860  DA705890
DC5C58F0  C0304110  D39405EF  7800DC58  D7E2E3D9  F0F0F9F9*
02E3E7E3  40002BB4  40400038  40400001  7B00DB0C  7000DC58  5800DBD4
1A065000  DBD41909  47C0C9C6  5890C000  7820C0A8  7C20DB0C  7800DB3C
3A027000  DC3058F0  C0304110  D3A405EF  D7E2E3D9  F0F1F0F0**
02E3E7E3  40002BEC  40400038  40400001  7800DBA0  33007000  C0B858F0
C0304110  D3B405EF  58F0C030  4110D3C4  05EF7800  DB9C3300  7000C0B8
58F0C030  4110D3D4  05EF7800  DB943300  D7E2E3D9  F0F1F0F1*
02E3E7E3  40002C24  40400038  40400001  7000C0B8  58F0C030  4110D3E4
05EF7800  DB903300  7000C0B8  58F0C030  4110D3F4  05EF5800  DBFC1BFF
870FCA78  1BFF58E0  D00007FE  58F0C030  D7E2E3D9  F0F1F0F2*
02E3E7E3  40002C5C  40400038  40400001  4110D404  05EF58F0  C0304110
D41405EF  7800DB44  33007000  C0B858F0  C0304110  D42405EF  7800DB60
33007000  C0B87800  DB283300  7000C0BC  D7E2E3D9  F0F1F0F3*
02E3E7E3  40002C94  40400038  40400001  58F0C030  4110D434  05EF58F0
C0344110  D44405EF  41E00004  15FE4720  CAD858EF  D09C07FE  58F0C03C
4110D48C  05EF6840  91706820  91886020  D7E2E3D9  F0F1F0F4*
02E3E7E3  40002CCC  40400038  40400001  C0B82D42  6040DCA0  68209180
68609168  28022D06  6000DCA8  2C402344  6A40DA58  2C646D60  DCB06060
DC806820  C0B82C24  6D20DCB0  6020DC88  D7E2E3D9  F0F1F0F5*
02E3E7E3  40002D04  40400038  40400001  680091A8  6D00DCB0  6000DC90
58F0C048  4110D4CC  05EF58F0  C0085800  F0081BFF  870FCB5A  58F0C02C
4110D51C  05EF1BFF  58E0D000  07FE5800  D7E2E3D9  F0F1F0F6*
02E3E7E3  40002D3C  40400038  40400001  DC645700  DA545000  DA446800
DA406B00  DA507000  DC747800  DB703300  7000DC3C  7800DB5C  33007000
C0AC58F0  C0344110  D54C05EF  41E00004  D7E2E3D9  F0F1F0F7*
02E3E7E3  40002D74  40400038  40400001  15FE4720  CBA058EF  D0A407FE
7800DC3C  7B00DB14  7000DC3C  7800DB98  7000DC38  7800C0AC  7000C07C
5820DC00  89200003  5870DA8C  5880DA8C  D7E2E3D9  F0F1F0F8*
02E3E7E3  40002DAC  40400038  40400001  18925860  C0002B00  78076008
```

```
6A00DA48  6000DA38  5830DA3C  5030DC28  18035700  DA545000  DA446820
DA406B20  DA507D20  DC747C20  DBB47020  D7E2E3D9  F0F1F0F9*
02E3E7E3  40002DE4  40400038  40400001  DC2C58F0  C0401800  45E0F004
00000000  00000176  45E0F008  04776004  45E0F008  0450DC28  45E0F008
0470DC2C  45E0F010  58F0C040  45E0F000  D7E2E3D9  F0F1F1F0**
02E3E7E3  40002E1C  40400038  40400001  00000000  0000018D  45E0F134
00010000  0120DD7E  01000015  00000001  45E0F010  58F0C034  4110D594
05EF41E0  000415FE  4720CC76  58EFD0AC  D7E2E3D9  F0F1F1F1*
02E3E7E3  40002E54  40400038  40400001  07FE7800  DC3C7B00  DB147000
DC3C7800  DC387A00  DB147000  DC388778  CBD25880  C0105890  C0007800
DC307900  DC3847A0  CCAE7800  DC387000  D7E2E3D9  F0F1F1F2*
02E3E7E3  40002E8C  40400038  40400001  DC3058F0  C0401800  45E0F004
00000000  00000193  45E0F008  0450DC64  45E0F010  58F0C040  45E0F000
00000000  000001A3  45E0F134  00010000  D7E2E3D9  F0F1F1F3*
02E3E7E3  40002EC4  40400038  40400001  0120DD7E  0100000C  00000001
45E0F010  7800DB78  33007000  C0B858F0  C0344110  D5DC05EF  41E00004
15FE4720  CD1858EF  D0B407FE  7800C0AC  D7E2E3D9  F0F1F1F4*
02E3E7E3  40002EFC  40400038  40400001  7000DE48  7800DB8C  7000DE4C
6800DC80  6C00DCB0  7000DBCC  58F0C040  45E0F004  00000000  000001A9
45E0F008  0470DBCC  45E0F010  58F0C040  D7E2E3D9  F0F1F1F5*
02E3E7E3  40002F34  4040000C  40400001  45E0F000  00000000  0000037F
40404040  40404040  40404040  40404040  40404040  40404040  40404040
40404040  40404040  40404040  40404040  D7E2E3D9  F0F1F1F6*

MEMBER NAME  PSTRES
02D9D3C4  40404040  40400038  40404040  00010001  08002A61  00010001
08002A65  00010001  0C002DF4  00010001  0C002E20  00010001  0C002E9C
00010001  0C002EB8  00010001  0C002F20  D7E2E3D9  F0F1F1F7*
02E3E7E3  40002F40  40400038  40400001  45E0F134  00010000  0120DD7E
01000034  00000001  45E0F010  58F0C044  4110D624  05EF5000  DC1C4100
DE485000  D62C4100  DE4C5000  D63058F0  D7E2E3D9  F0F1F1F8*
02E3E7E3  40002F78  40400038  40400001  C0344110  D62C05EF  41E00004
15FE4720  CDB058EF  D0BC07FE  7820DE4C  7B20DB14  7020DE4C  58F0C040
45E0F004  00000000  000001D2  45E0F008  D7E2E3D9  F0F1F1F9*
02E3E7E3  40002FB0  40400038  40400001  0860DCB0  45E0F010  58F0C040
45E0F000  00000000  0000037F  45E0F134  00010000  0120DD7E  01000034
00000001  45E0F010  58F0C044  4110D674  D7E2E3D9  F0F1F2F0**
02E3E7E3  40002FE8  40400038  40400001  05EF5000  DC1C4100  DE485000
D67C4100  DE4C5000  D68058F0  C0344110  D67C05EF  41E00004  15FE4720
CE3858EF  D0C407FE  7820DE4C  7B20DB14  D7E2E3D9  F0F1F2F1*
02E3E7E3  40003020  40400038  40400001  7020DE4C  58F0C040  45E0F004
00000000  00000201  45E0F008  0860DC80  45E0F010  58F0C040  45E0F000
00000000  0000037F  45E0F134  00010000  D7E2E3D9  F0F1F2F2*
02E3E7E3  40003058  40400038  40400001  0120DD7E  01000034  00000001
45E0F010  58F0C044  4110D6C4  05EF5000  DC1C4100  DE485000  D6CC4100
DE4C5000  D6D058F0  C0344110  D6CC05EF  D7E2E3D9  F0F1F2F3*
02E3E7E3  40003090  40400038  40400001  41E00004  15FE4720  CEC058EF
D0CC07FE  7820DE4C  7B20DB14  7020DE4C  58F0C040  45E0F004  00000000
00000230  45E0F008  0860DC88  45E0F010  D7E2E3D9  F0F1F2F4*
02E3E7E3  400030C8  40400038  40400001  58F0C040  45E0F000  00000000
0000037F  45E0F134  00010000  0120DD7E  01000034  00000001  45E0F010
58F0C044  4110D714  05EF5000  DC1C4100  D7E2E3D9  F0F1F2F5*
02E3E7E3  40003100  40400038  40400001  DE485000  D71C4100  DE4C5000
D72058F0  C0344110  D71C05EF  41E00004  15FE4720  CF4858EF  D0D407FE
7820DE4C  7B20DB14  7020DE4C  58F0C040  D7E2E3D9  F0F1F2F6*
02E3E7E3  40003138  4040000C  40400001  45E0F004  00000000  0000025F
40404040  40404040  40404040  40404040  40404040  40404040  40404040
40404040  40404040  40404040  40404040  D7E2E3D9  F0F1F2F7*
02D9D3C4  40404040  40400038  40404040  00010001  0C002F3C  00010001
```

```
0C002FA8  00010001  0C002FC4  00010001  0C003030  00010001  0C00304C
00010001  0C0030B8  00010001  0C0030D4  D7E2E3D9  F0F1F2F8*
02E3E7E3  40003144  40400038  40400001  45E0F008  0860DC90  45E0F010
58F0C040  45E0F000  00000000  0000037F  45E0F134  00010000  0120DD7E
01000034  00000001  45E0F010  58F0C044  D7E2E3D9  F0F1F2F9*
02E3E7E3  4000317C  40400038  40400001  4110D764  05EF5000  DC1C4100
DE485000  D76C4100  DE4C5000  D77058F0  C0344110  D76C05EF  41E00004
15FE4720  CFD058EF  D0DC07FE  7820DE4C  D7E2E3D9  F0F1F3F0**
02E3E7E3  400031B4  40400038  40400001  7B20DB14  7020DE4C  58F0C040
45E0F004  00000000  0000028E  45E0F008  0860DCA0  45E0F010  58F0C040
45E0F000  00000000  0000037F  45E0F134  D7E2E3D9  F0F1F3F1*
02E3E7E3  400031EC  40400038  40400001  00010000  0120DD7E  01000034
00000001  45E0F010  58F0C044  4110D7B4  05EF5000  DC1C4100  DE485000
D7BC4100  DE4C5000  D7C058F0  C0344110  D7E2E3D9  F0F1F3F2*
02E3E7E3  40003224  40400038  40400001  D7BC05EF  41E00004  15FE4720
B05858EF  D0E407FE  7820DE4C  7B20DB14  7020DE4C  58F0C040  45E0F004
00000000  000002B7  45E0F008  0860DCA8  D7E2E3D9  F0F1F3F3*
02E3E7E3  4000325C  40400038  40400001  45E0F010  58F0C040  45E0F000
00000000  0000037F  45E0F134  00010000  0120DD7E  01000034  00000001
45E0F010  58F0C044  4110D804  05EF5000  D7E2E3D9  F0F1F3F4*
02E3E7E3  40003294  40400038  40400001  DC1C4100  DE485000  D80C4100
DE4C5000  D81058F0  C0344110  D80C05EF  41E00004  15FE4720  B0E058EF
D0EC07FE  7820DE4C  7B20DB14  7020DE4C  D7E2E3D9  F0F1F3F5*
02E3E7E3  400032CC  4040002C  40400001  58F0C040  45E0F004  00000000

MEMBER NAME  PSTRES
000002E0  45E0F008  08609150  45E0F010  58F0C040  45E0F000  00000000
0000037F  40404040  40404040  40404040  D7E2E3D9  F0F1F3F6*
02D9D3C4  40404040  40400038  40404040  00010001  0C003140  00010001
0C00315C  00010001  0C0031C8  00010001  0C0031E4  00010001  0C003250
00010001  0C00326C  00010001  0C0032D8  D7E2E3D9  F0F1F3F7*
02E3E7E3  400032F8  40400038  40400001  45E0F134  00010000  0120DD7E
01000034  00000001  45E0F010  58F0C044  4110D854  05EF5000  DC1C4100
DE485000  D85C4100  DE4C5000  D86058F0  D7E2E3D9  F0F1F3F8*
02E3E7E3  40003330  40400038  40400001  C0344110  D85C05EF  41E00004
15FE4720  B16858EF  D0F407FE  7820DE4C  7B20DB14  7020DE4C  58F0C040
45E0F004  00000000  00000315  45E0F008  D7E2E3D9  F0F1F3F9*
02E3E7E3  40003368  40400038  40400001  08609158  45E0F010  58F0C040
45E0F000  00000000  0000037F  45E0F134  00010000  0120DD7E  01000034
00000001  45E0F010  58F0C044  4110D8A4  D7E2E3D9  F0F1F4F0**
02E3E7E3  400033A0  40400038  40400001  05EF5000  DC1C4100  DE485000
D8AC4100  DE4C5000  D8B058F0  C0344110  D8AC05EF  41E00004  15FE4720
B1F058EF  D0FC07FE  7820DE4C  7B20DB14  D7E2E3D9  F0F1F4F1*
02E3E7E3  400033D8  40400038  40400001  7020DE4C  58F0C040  45E0F004
00000000  0000034A  45E0F008  08609160  45E0F010  58F0C040  45E0F000
00000000  0000037F  45E0F134  00010000  D7E2E3D9  F0F1F4F2*
02E3E7E3  40003410  40400038  40400001  0120DD7E  01000034  00000001
45E0F010  58F0C044  4110D8F4  05EF5000  DC1C4100  DE485000  D8FC4100
DE4C5000  D90058F0  C0344110  D8FC05EF  D7E2E3D9  F0F1F4F3*
02E3E7E3  40003448  40400038  40400001  41E00004  15FE4720  B27858EF
D10407FE  7820DE4C  7B20DB14  7020DE4C  58F0C040  45E0F004  00000000
00000385  45E0F010  58F0C040  45E0F000  D7E2E3D9  F0F1F4F4*
02E3E7E3  40003480  40400038  40400001  00000000  0000037F  45E0F134
00010000  0120DD7E  01000034  00000001  45E0F010  58F0C044  4110D944
05EF5000  DC1C4100  DE485000  D94C58F0  D7E2E3D9  F0F1F4F5*
02E3E7E3  400034B8  40400038  40400001  C0344110  D94C05EF  41E00004
15FE4720  B2F058EF  D10C07FE  7800DB10  33007000  DE4C5870  DA8C5880
DA8C5890  DAA85860  C00058F0  C0401800  D7E2E3D9  F0F1F4F6*
02E3E7E3  400034F0  4040000C  40400001  45E0F004  00000000  000003B4
```

```
40404040  40404040  40404040  40404040  40404040  40404040  40404040
40404040  40404040  40404040  40404040  D7E2E3D9  F0F1F4F7*
02D9D3C4  40404040  40400038  40404040  00010001  0C0032F4  00010001
0C003360  00010001  0C00337C  00010001  0C0033E8  00010001  0C003404
00010001  0C003470  00010001  0C003484  D7E2E3D9  F0F1F4F8*
02E3E7E3  400034FC  40400038  40400001  45E0F008  08676160  45E0F008
08676178  45E0F008  08676190  45E0F008  086761C0  45E0F008  086761D8
45E0F008  086761F0  45E0F010  58F0C040  D7E2E3D9  F0F1F4F9*
02E3E7E3  40003534  40400038  40400001  45E0F000  00000000  000003C0
45E0F134  00010000  0120DD7E  0100005A  00000001  45E0F010  58F0C044
4110D994  05EF5000  DC1C4100  DE485000  D7E2E3D9  F0F1F5F0**
02E3E7E3  4000356C  40400038  40400001  D99C4100  DE4C5000  D9A058F0
C0344110  D99C05EF  41E00004  15FE4720  B3B058EF  D11407FE  7820DE4C
7B20DB14  7020DE4C  8778B30A  5880C010  D7E2E3D9  F0F1F5F1*
02E3E7E3  400035A4  40400038  40400001  5890C000  5870DA8C  5880DA8C
5890DAA8  5860C000  58F0C040  45E0F004  00000000  000003B4  45E0F008
086761C0  45E0F008  086761D8  45E0F008  D7E2E3D9  F0F1F5F2*
02E3E7E3  400035DC  40400038  40400001  086761F0  45E0F008  08676220
45E0F008  08676238  45E0F008  08676250  45E0F010  58F0C040  45E0F000
00000000  000003C0  45E0F134  00010000  D7E2E3D9  F0F1F5F3*
02E3E7E3  40003614  40400038  40400001  0120DD7E  0100005A  00000001
45E0F010  58F0C044  4110D9E4  05EF5000  DC1C4100  DE485000  D9EC4100
DE4C5000  D9F058F0  C0344110  D9EC05EF  D7E2E3D9  F0F1F5F4*
02E3E7E3  4000364C  40400038  40400001  41E00004  15FE4720  B47C58EF
D11C07FE  7820DE4C  7B20DB14  7020DE4C  8778B3D8  5880C010  5890C000

MEMBER NAME  PSTRES
1BFF58E0  D00007FE  58A0D004  58E0A00C  D7E2E3D9  F0F1F5F5*
02E3E7E3  40003684  40400038  40400001  58B0A018  5810B008  5820DBE8
50201000  5830B00C  7820DC30  70203000  18DA92FF  A00C982C  A01C07FE
58C0D048  98791004  58207000  5020DC48  D7E2E3D9  F0F1F5F6*
02E3E7E3  400036BC  40400038  40400001  58208000  5020DBE8  78209000
7020DC30  58201000  41302000  41500004  1B255C40  DA7C1B25  5020C01C
5030C020  41100FFF  41B1C001  47F0C0C0  D7E2E3D9  F0F1F5F7*
02E3E7E3  40000020  40400008  40400001  000036AC  00000428  40404040
40404040  40404040  40404040  40404040  40404040  40404040  40404040
40404040  40404040  40404040  40404040  D7E2E3D9  F0F1F5F8*
02E3E7E3  40000428  40400004  40400001  0000367C  40404040  40404040
40404040  40404040  40404040  40404040  40404040  40404040  40404040
40404040  40404040  40404040  40404040  D7E2E3D9  F0F1F5F9*
02E3E7E3  40000470  40400004  40400001  000021E0  40404040  40404040
40404040  40404040  40404040  40404040  40404040  40404040  40404040
40404040  40404040  40404040  40404040  D7E2E3D9  F0F1F6F0**
02D9D3C4  40404040  40400038  40404040  00010001  0C0034F8  00010001
0C00353C  00010001  0C0035C4  00010001  0C003608  00010001  0C000020
00010001  0C000024  00010001  0C000428  D7E2E3D9  F0F1F6F1*
02E3E7E3  40000474  4040001C  40400001  000023C4  000023E2  000023FC
000023FC  000024E0  000024E0  000025E8  40404040  40404040  40404040
40404040  40404040  40404040  40404040  D7E2E3D9  F0F1F6F2*
02D9D3C4  40404040  40400038  40404040  00010001  0C000470  00010001
0C000474  00010001  0C000478  00010001  0C00047C  00010001  0C000480
00010001  0C000484  00010001  0C000488  D7E2E3D9  F0F1F6F3*
02E3E7E3  40000490  4040001C  40400001  000025E8  0000265C  0000265C
0000268A  0000268A  0000296C  0000296C  40404040  40404040  40404040
40404040  40404040  40404040  40404040  D7E2E3D9  F0F1F6F4*
02D9D3C4  40404040  40400038  40404040  00010001  0C00048C  00010001
0C000490  00010001  0C000494  00010001  0C000498  00010001  0C00049C
00010001  0C0004A0  00010001  0C0004A4  D7E2E3D9  F0F1F6F5*
02E3E7E3  400004AC  4040001C  40400001  000029B0  000029B0  000029CA
```

```
000029CA  00002AD8  00002AD8  00002CB8  40404040  40404040  40404040
40404040  40404040  40404040  40404040  D7E2E3D9  F0F1F6F6*
02D9D3C4  40404040  40400038  40404040  00010001  0C0004A8  00010001
0C0004AC  00010001  0C0004B0  00010001  0C0004B4  00010001  0C0004B8
00010001  0C0004BC  00010001  0C0004C0  D7E2E3D9  F0F1F6F7*
02E3E7E3  400004C8  4040001C  40400001  00002CB8  00002D80  00002D80
00002E56  00002E56  00002EF8  00002EF8  40404040  40404040  40404040
40404040  40404040  40404040  40404040  D7E2E3D9  F0F1F6F8*
02D9D3C4  40404040  40400038  40404040  00010001  0C0004C4  00010001
0C0004C8  00010001  0C0004CC  00010001  0C0004D0  00010001  0C0004D4
00010001  0C0004D8  00010001  0C0004DC  D7E2E3D9  F0F1F6F9*
02E3E7E3  400004E4  4040001C  40400001  00002F90  00002F90  00003018
00003018  000030A0  000030A0  00003128  40404040  40404040  40404040
40404040  40404040  40404040  40404040  D7E2E3D9  F0F1F7F0**
02D9D3C4  40404040  40400038  40404040  00010001  0C0004E0  00010001
0C0004E4  00010001  0C0004E8  00010001  0C0004EC  00010001  0C0004F0
00010001  0C0004F4  00010001  0C0004F8  D7E2E3D9  F0F1F7F1*
02E3E7E3  40000500  4040001C  40400001  00003128  000031B0  000031B0
00003238  00003238  000032C0  000032C0  40404040  40404040  40404040
40404040  40404040  40404040  40404040  D7E2E3D9  F0F1F7F2*
02D9D3C4  40404040  40400038  40404040  00010001  0C0004FC  00010001
0C000500  00010001  0C000504  00010001  0C000508  00010001  0C00050C
00010001  0C000510  00010001  0C000514  D7E2E3D9  F0F1F7F3*
02E3E7E3  4000051C  4040001C  40400001  00003348  00003348  000033D0
000033D0  00003458  00003458  000034D0  40404040  40404040  40404040
40404040  40404040  40404040  40404040  D7E2E3D9  F0F1F7F4*

MEMBER NAME  PSTRES
02D9D3C4  40404040  40400038  40404040  00010001  0C000518  00010001
0C00051C  00010001  0C000520  00010001  0C000524  00010001  0C000528
00010001  0C00052C  00010001  0C000530  D7E2E3D9  F0F1F7F5*
02E3E7E3  40000538  40400018  40400001  00003458  00003590  00003590
0000365C  0000365C  00000EA4  40404040  40404040  40404040  40404040
40404040  40404040  40404040  40404040  D7E2E3D9  F0F1F7F6*
02E3E7E3  40000554  40400004  40400001  80000014  40404040  40404040
40404040  40404040  40404040  40404040  40404040  40404040  40404040
40404040  40404040  40404040  40404040  D7E2E3D9  F0F1F7F7*
02D9D3C4  40404040  40400038  40404040  00010001  0C000534  00010001
0C000538  00010001  0C00053C  00010001  0C000540  00010001  0C000544
00010001  0C000548  00010001  0C00054C  D7E2E3D9  F0F1F7F8*
02E3E7E3  40000558  4040001C  40400001  00002140  80000F08  0000227C
00000FB4  00000E8C  00001044  00000F24  40404040  40404040  40404040
40404040  40404040  40404040  40404040  D7E2E3D9  F0F1F7F9*
02D9D3C4  40404040  40400038  40404040  00020001  0C000554  00010001
0C000558  00010001  0C00055C  00010001  0C000560  00010001  0C000564
00010001  0C000568  00010001  0C00056C  D7E2E3D9  F0F1F8F0**
02E3E7E3  40000574  4040001C  40400001  00000F20  00002140  00000E8C
00000E8C  00000E8C  00000E8C  00000E98  40404040  40404040  40404040
40404040  40404040  40404040  40404040  D7E2E3D9  F0F1F8F1*
02D9D3C4  40404040  40400038  40404040  00010001  0C000570  00010001
0C000574  00010001  0C000578  00010001  0C00057C  00010001  0C000580
00010001  0C000584  00010001  0C000588  D7E2E3D9  F0F1F8F2*
02E3E7E3  40000590  4040001C  40400001  00000EA0  00000E8C  00000E8C
00000F24  00000F30  80000E8C  00000EE0  40404040  40404040  40404040
40404040  40404040  40404040  40404040  D7E2E3D9  F0F1F8F3*
02D9D3C4  40404040  40400038  40404040  00010001  0C00058C  00010001
0C000590  00010001  0C000594  00010001  0C000598  00010001  0C00059C
00010001  0C0005A0  00010001  0C0005A4  D7E2E3D9  F0F1F8F4*
02E3E7E3  400005B0  40400020  40400001  80000000  0000227C  00000FA8
```

```
00000E8C  00000F0C  00000F24  00000F20  000010F8  40404040  40404040
40404040  40404040  40404040  40404040  D7E2E3D9  F0F1F8F5*
02D9D3C4  40404040  40400038  40404040  00010001  0C0005A8  00010001
0C0005B4  00010001  0C0005B8  00010001  0C0005BC  00010001  0C0005C0
00010001  0C0005C4  00010001  0C0005C8  D7E2E3D9  F0F1F8F6*
02E3E7E3  400005D0  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F1F8F7*
02D9D3C4  40404040  40400038  40404040  00010001  0C0005CC  00010001
0C0005D0  00010001  0C0005D4  00010001  0C0005D8  00010001  0C0005DC
00010001  0C0005E0  00010001  0C0005E4  D7E2E3D9  F0F1F8F8*
02E3E7E3  400005EC  4040001C  40400001  00000E8C  00000F24  00000F30
80000E8C  000011A6  00000E98  00000F04  40404040  40404040  40404040
40404040  40404040  40404040  40404040  D7E2E3D9  F0F1F8F9*
02D9D3C4  40404040  40400038  40404040  00010001  0C0005E8  00010001
0C0005EC  00010001  0C0005F0  00010001  0C0005F4  00010001  0C0005F8
00010001  0C0005FC  00010001  0C000600  D7E2E3D9  F0F1F9F0**
02E3E7E3  40000608  4040001C  40400001  80000420  0000225C  00000FB0
00000E8C  00000EC8  00000F40  00000F2C  40404040  40404040  40404040
40404040  40404040  40404040  40404040  D7E2E3D9  F0F1F9F1*
02D9D3C4  40404040  40400038  40404040  00010001  0C000604  00010001
0C000608  00010001  0C00060C  00010001  0C000610  00010001  0C000614
00010001  0C000618  00010001  0C00061C  D7E2E3D9  F0F1F9F2*
02E3E7E3  40000624  4040001C  40400001  00000408  00000E8C  00000E8C
00000E8C  00000E8C  00000E98  00000EA0  40404040  40404040  40404040
40404040  40404040  40404040  40404040  D7E2E3D9  F0F1F9F3*
02D9D3C4  40404040  40400038  40404040  00010001  0C000620  00010001

MEMBER NAME  PSTRES
0C000624  00010001  0C000628  00010001  0C00062C  00010001  0C000630
00010001  0C000634  00010001  0C000638  D7E2E3D9  F0F1F9F4*
02E3E7E3  40000640  4040001C  40400001  00000E8C  00000E8C  00000F40
00000F44  80000E8C  000011A6  80000EDC  40404040  40404040  40404040
40404040  40404040  40404040  40404040  D7E2E3D9  F0F1F9F5*
02D9D3C4  40404040  40400038  40404040  00010001  0C00063C  00010001
0C000640  00010001  0C000644  00010001  0C000648  00010001  0C00064C
00010001  0C000650  00010001  0C000654  D7E2E3D9  F0F1F9F6*
02E3E7E3  4000065C  4040001C  40400001  00002270  00001078  00000E8C
00001044  00000F40  00000F2C  000011A6  40404040  40404040  40404040
40404040  40404040  40404040  40404040  D7E2E3D9  F0F1F9F7*
02D9D3C4  40404040  40400038  40404040  00010001  0C000658  00010001
0C00065C  00010001  0C000660  00010001  0C000664  00010001  0C000668
00010001  0C00066C  00010001  0C000670  D7E2E3D9  F0F1F9F8*
02E3E7E3  40000678  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F1F9F9*
02D9D3C4  40404040  40400038  40404040  00010001  0C000674  00010001
0C000678  00010001  0C00067C  00010001  0C000680  00010001  0C000684
00010001  0C000688  00010001  0C00068C  D7E2E3D9  F0F2F0F0**
02E3E7E3  40000694  4040001C  40400001  00000E8C  00000F40  00000F44
80000E8C  000010E0  00000E98  00000ED0  40404040  40404040  40404040
40404040  40404040  40404040  40404040  D7E2E3D9  F0F2F0F1*
02D9D3C4  40404040  40400038  40404040  00010001  0C000690  00010001
0C000694  00010001  0C000698  00010001  0C00069C  00010001  0C0006A0
00010001  0C0006A4  00010001  0C0006A8  D7E2E3D9  F0F2F0F2*
02E3E7E3  400006B0  40400004  40400001  80000400  40404040  40404040
40404040  40404040  40404040  40404040  40404040  40404040  40404040
40404040  40404040  40404040  40404040  D7E2E3D9  F0F2F0F3*
02E3E7E3  400006B8  40400014  40400001  00001288  8000103C  000011A6
```

| | | | | | | |
|---|---|---|---|---|---|---|
| 80000EEC | 00002274 | 40404040 | 40404040 | 40404040 | 40404040 | 40404040 |
| 40404040 | 40404040 | 40404040 | 40404040 | D7E2E3D9 | F0F2F0F4* | |
| 02E3E7E3 | 400006D0 | 40400004 | 40400001 | 00000E8C | 40404040 | 40404040 |
| 40404040 | 40404040 | 40404040 | 40404040 | 40404040 | 40404040 | 40404040 |
| 40404040 | 40404040 | 40404040 | 40404040 | D7E2E3D9 | F0F2F0F5* | |
| 02D9D3C4 | 40404040 | 40400038 | 40404040 | 00010001 | 0C0006AC | 00010001 |
| 0C0006B0 | 00010001 | 0C0006B8 | 00010001 | 0C0006BC | 00010001 | 0C0006C0 |
| 00010001 | 0C0006C4 | 00010001 | 0C0006C8 | D7E2E3D9 | F0F2F0F6* | |
| 02E3E7E3 | 400006D4 | 4040001C | 40400001 | 00001044 | 00000F24 | 00000F20 |
| 000011A6 | 00000E8C | 00000E8C | 00000E8C | 40404040 | 40404040 | 40404040 |
| 40404040 | 40404040 | 40404040 | 40404040 | D7E2E3D9 | F0F2F0F7* | |
| 02D9D3C4 | 40404040 | 40400038 | 40404040 | 00010001 | 0C0006D0 | 00010001 |
| 0C0006D4 | 00010001 | 0C0006D8 | 00010001 | 0C0006DC | 00010001 | 0C0006E0 |
| 00010001 | 0C0006E4 | 00010001 | 0C0006E8 | D7E2E3D9 | F0F2F0F8* | |
| 02E3E7E3 | 400006F0 | 4040001C | 40400001 | 00000E8C | 00000E98 | 00000EA0 |
| 00000E8C | 00000E8C | 00000F24 | 00000F30 | 40404040 | 40404040 | 40404040 |
| 40404040 | 40404040 | 40404040 | 40404040 | D7E2E3D9 | F0F2F0F9* | |
| 02D9D3C4 | 40404040 | 40400038 | 40404040 | 00010001 | 0C0006EC | 00010001 |
| 0C0006F0 | 00010001 | 0C0006F4 | 00010001 | 0C0006F8 | 00010001 | 0C0006FC |
| 00010001 | 0C000700 | 00010001 | 0C000704 | D7E2E3D9 | F0F2F1F0** | |
| 02E3E7E3 | 4000070C | 4040001C | 40400001 | 80000E8C | 000011A6 | 00000E98 |
| 00000EE4 | 800003F8 | 000010E0 | 00000E98 | 40404040 | 40404040 | 40404040 |
| 40404040 | 40404040 | 40404040 | 40404040 | D7E2E3D9 | F0F2F1F1* | |
| 02D9D3C4 | 40404040 | 40400038 | 40404040 | 00010001 | 0C000708 | 00010001 |
| 0C00070C | 00010001 | 0C000710 | 00010001 | 0C000714 | 00010001 | 0C000718 |
| 00010001 | 0C00071C | 00010001 | 0C000720 | D7E2E3D9 | F0F2F1F2* | |
| 02E3E7E3 | 40000728 | 4040000C | 40400001 | 00000ED0 | 800003F0 | 00000ED0 |
| 40404040 | 40404040 | 40404040 | 40404040 | 40404040 | 40404040 | 40404040 |

MEMBER NAME PSTRES

| | | | | | | |
|---|---|---|---|---|---|---|
| 40404040 | 40404040 | 40404040 | 40404040 | D7E2E3D9 | F0F2F1F3* | |
| 02E3E7E3 | 40000738 | 4040000C | 40400001 | 80000000 | 000011A6 | 80000EE4 |
| 40404040 | 40404040 | 40404040 | 40404040 | 40404040 | 40404040 | 40404040 |
| 40404040 | 40404040 | 40404040 | 40404040 | D7E2E3D9 | F0F2F1F4* | |
| 02E3E7E3 | 4000074C | 40400008 | 40400001 | 00000E8C | 00001044 | 40404040 |
| 40404040 | 40404040 | 40404040 | 40404040 | 40404040 | 40404040 | 40404040 |
| 40404040 | 40404040 | 40404040 | 40404040 | D7E2E3D9 | F0F2F1F5* | |
| 02D9D3C4 | 40404040 | 40400038 | 40404040 | 00010001 | 0C000724 | 00010001 |
| 0C000728 | 00010001 | 0C00072C | 00010001 | 0C000730 | 00010001 | 0C00073C |
| 00010001 | 0C000740 | 00010001 | 0C00074C | D7E2E3D9 | F0F2F1F6* | |
| 02E3E7E3 | 40000754 | 4040001C | 40400001 | 00000F24 | 00000F20 | 000011A6 |
| 00000E8C | 00000E8C | 00000E8C | 00000E8C | 40404040 | 40404040 | 40404040 |
| 40404040 | 40404040 | 40404040 | 40404040 | D7E2E3D9 | F0F2F1F7* | |
| 02D9D3C4 | 40404040 | 40400038 | 40404040 | 00010001 | 0C000750 | 00010001 |
| 0C000754 | 00010001 | 0C000758 | 00010001 | 0C00075C | 00010001 | 0C000760 |
| 00010001 | 0C000764 | 00010001 | 0C000768 | D7E2E3D9 | F0F2F1F8* | |
| 02E3E7E3 | 40000770 | 4040001C | 40400001 | 00000E98 | 00000EA0 | 00000E8C |
| 00000E8C | 00000F24 | 00000F30 | 80000E8C | 40404040 | 40404040 | 40404040 |
| 40404040 | 40404040 | 40404040 | 40404040 | D7E2E3D9 | F0F2F1F9* | |
| 02D9D3C4 | 40404040 | 40400038 | 40404040 | 00010001 | 0C00076C | 00010001 |
| 0C000770 | 00010001 | 0C000774 | 00010001 | 0C000778 | 00010001 | 0C00077C |
| 00010001 | 0C000780 | 00010001 | 0C000784 | D7E2E3D9 | F0F2F2F0** | |
| 02E3E7E3 | 4000078C | 4040001C | 40400001 | 0000107C | 00000F90 | 000010A0 |
| 80000F90 | 0000107C | 00000F80 | 000010A0 | 40404040 | 40404040 | 40404040 |
| 40404040 | 40404040 | 40404040 | 40404040 | D7E2E3D9 | F0F2F2F1* | |
| 02D9D3C4 | 40404040 | 40400038 | 40404040 | 00010001 | 0C000788 | 00010001 |
| 0C00078C | 00010001 | 0C000790 | 00010001 | 0C000794 | 00010001 | 0C000798 |
| 00010001 | 0C00079C | 00010001 | 0C0007A0 | D7E2E3D9 | F0F2F2F2* | |
| 02E3E7E3 | 400007A8 | 4040001C | 40400001 | 80000F80 | 0000107C | 0000105C |

```
000010A0  8000105C  0000107C  00001080  40404040  40404040  40404040
40404040  40404040  40404040  40404040  D7E2E3D9  F0F2F2F3*
02D9D3C4  40404040  40400038  40404040  00010001  0C0007A4  00010001
0C0007A8  00010001  0C0007AC  00010001  0C0007B0  00010001  0C0007B4
00010001  0C0007B8  00010001  0C0007BC  D7E2E3D9  F0F2F2F4*
02E3E7E3  400007C4  4040001C  40400001  000010A0  80001080  0000107C
00001068  0000107C  8000105C  00002298  40404040  40404040  40404040
40404040  40404040  40404040  40404040  D7E2E3D9  F0F2F2F5*
02D9D3C4  40404040  40400038  40404040  00010001  0C0007C0  00010001
0C0007C4  00010001  0C0007C8  00010001  0C0007CC  00010001  0C0007D0
00010001  0C0007D4  00010001  0C0007D8  D7E2E3D9  F0F2F2F6*
02E3E7E3  400007E0  4040001C  40400001  00001068  00002298  8000105C
000010A0  00001068  000010A0  8000105C  40404040  40404040  40404040
40404040  40404040  40404040  40404040  D7E2E3D9  F0F2F2F7*
02D9D3C4  40404040  40400038  40404040  00010001  0C0007DC  00010001
0C0007E0  00010001  0C0007E4  00010001  0C0007E8  00010001  0C0007EC
00010001  0C0007F0  00010001  0C0007F4  D7E2E3D9  F0F2F2F8*
02E3E7E3  400007FC  4040001C  40400001  00002298  00001068  00002298
8000105C  00002298  00001068  00002298  40404040  40404040  40404040
40404040  40404040  40404040  40404040  D7E2E3D9  F0F2F2F9*
02D9D3C4  40404040  40400038  40404040  00010001  0C0007F8  00010001
0C0007FC  00010001  0C000800  00010001  0C000804  00010001  0C000808
00010001  0C00080C  00010001  0C000810  D7E2E3D9  F0F2F3F0**
02E3E7E3  40000818  4040001C  40400001  8000105C  00002298  00001068
00002298  8000105C  00000F8C  00000F5C  40404040  40404040  40404040
40404040  40404040  40404040  40404040  D7E2E3D9  F0F2F3F1*
02D9D3C4  40404040  40400038  40404040  00010001  0C000814  00010001
0C000818  00010001  0C00081C  00010001  0C000820  00010001  0C000824
00010001  0C000828  00010001  0C00082C  D7E2E3D9  F0F2F3F2*

MEMBER NAME  PSTRES
02E3E7E3  40000834  4040001C  40400001  00000F8C  80000F4C  00000F74
00000F54  00000F9C  80000F54  00000FA4  40404040  40404040  40404040
40404040  40404040  40404040  40404040  D7E2E3D9  F0F2F3F3*
02D9D3C4  40404040  40400038  40404040  00010001  0C000830  00010001
0C000834  00010001  0C000838  00010001  0C00083C  00010001  0C000840
00010001  0C000844  00010001  0C000848  D7E2E3D9  F0F2F3F4*
02E3E7E3  40000850  4040001C  40400001  00000F1C  00000FA4  80002298
00002298  0000229C  00000FCC  8000229C  40404040  40404040  40404040
40404040  40404040  40404040  40404040  D7E2E3D9  F0F2F3F5*
02D9D3C4  40404040  40400038  40404040  00010001  0C00084C  00010001
0C000850  00010001  0C000854  00010001  0C000858  00010001  0C00085C
00010001  0C000860  00010001  0C000864  D7E2E3D9  F0F2F3F6*
02E3E7E3  4000086C  4040001C  40400001  00000F7C  00000F58  00000E8C
00000EB0  00000F40  00000F2C  000003E8  40404040  40404040  40404040
40404040  40404040  40404040  40404040  D7E2E3D9  F0F2F3F7*
02D9D3C4  40404040  40400038  40404040  00010001  0C000868  00010001
0C00086C  00010001  0C000870  00010001  0C000874  00010001  0C000878
00010001  0C00087C  00010001  0C000880  D7E2E3D9  F0F2F3F8*
02E3E7E3  40000888  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F2F3F9*
02D9D3C4  40404040  40400038  40404040  00010001  0C000884  00010001
0C000888  00010001  0C00088C  00010001  0C000890  00010001  0C000894
00010001  0C000898  00010001  0C00089C  D7E2E3D9  F0F2F4F0**
02E3E7E3  400008A4  4040001C  40400001  00000E8C  00000F40  00000F44
80000E8C  00001970  000012A8  0000108C  40404040  40404040  40404040
40404040  40404040  40404040  40404040  D7E2E3D9  F0F2F4F1*
02D9D3C4  40404040  40400038  40404040  00010001  0C0008A0  00010001
```

```
0C0008A4  00010001  0C0008A8  00010001  0C0008AC  00010001  0C0008B0
00010001  0C0008B4  00010001  0C0008B8  D7E2E3D9  F0F2F4F2*
02E3E7E3  400008C0  4040001C  40400001  00001278  000017F0  00001850
000018B0  000018F8  000017D8  00001838  40404040  40404040  40404040
40404040  40404040  40404040  40404040  D7E2E3D9  F0F2F4F3*
02D9D3C4  40404040  40400038  40404040  00010001  0C0008BC  00010001
0C0008C0  00010001  0C0008C4  00010001  0C0008C8  00010001  0C0008CC
00010001  0C0008D0  00010001  0C0008D4  D7E2E3D9  F0F2F4F4*
02E3E7E3  400008DC  4040001C  40400001  00001898  000010C0  000010D8
00001014  00001008  80001018  00001970  40404040  40404040  40404040
40404040  40404040  40404040  40404040  D7E2E3D9  F0F2F4F5*
02D9D3C4  40404040  40400038  40404040  00010001  0C0008D8  00010001
0C0008DC  00010001  0C0008E0  00010001  0C0008E4  00010001  0C0008E8
00010001  0C0008EC  00010001  0C0008F0  D7E2E3D9  F0F2F4F6*
02E3E7E3  400008F8  4040001C  40400001  000012A8  0000108C  0000102C
00001000  00001004  0000100C  00001694  40404040  40404040  40404040
40404040  40404040  40404040  40404040  D7E2E3D9  F0F2F4F7*
02D9D3C4  40404040  40400038  40404040  00010001  0C0008F4  00010001
0C0008F8  00010001  0C0008FC  00010001  0C000900  00010001  0C000904
00010001  0C000908  00010001  0C00090C  D7E2E3D9  F0F2F4F8*
02E3E7E3  40000914  4040001C  40400001  00001028  000010D8  000010A8
000010B0  000010B8  000010C8  000010D0  40404040  40404040  40404040
40404040  40404040  40404040  40404040  D7E2E3D9  F0F2F4F9*
02D9D3C4  40404040  40400038  40404040  00010001  0C000910  00010001
0C000914  00010001  0C000918  00010001  0C00091C  00010001  0C000920
00010001  0C000924  00010001  0C000928  D7E2E3D9  F0F2F5F0**
02E3E7E3  40000930  4040001C  40400001  000017D8  000017F0  00001850
000018B0  800018F8  0000102C  00001278  40404040  40404040  40404040
40404040  40404040  40404040  40404040  D7E2E3D9  F0F2F5F1*
02D9D3C4  40404040  40400038  40404040  00010001  0C00092C  00010001

MEMBER NAME  PSTRES
0C000930  00010001  0C000934  00010001  0C000938  00010001  0C00093C
00010001  0C000940  00010001  0C000944  D7E2E3D9  F0F2F5F2*
02E3E7E3  4000094C  4040001C  40400001  000017F0  00001850  000018B0
000018F8  000017D8  00001838  00001898  40404040  40404040  40404040
40404040  40404040  40404040  40404040  D7E2E3D9  F0F2F5F3*
02D9D3C4  40404040  40400038  40404040  00010001  0C000948  00010001
0C00094C  00010001  0C000950  00010001  0C000954  00010001  0C000958
00010001  0C00095C  00010001  0C000960  D7E2E3D9  F0F2F5F4*
02E3E7E3  40000968  4040001C  40400001  000010C0  000010D8  80001008
0000228C  00001064  00000E8C  00000ED4  40404040  40404040  40404040
40404040  40404040  40404040  40404040  D7E2E3D9  F0F2F5F5*
02D9D3C4  40404040  40400038  40404040  00010001  0C000964  00010001
0C000968  00010001  0C00096C  00010001  0C000970  00010001  0C000974
00010001  0C000978  00010001  0C00097C  D7E2E3D9  F0F2F5F6*
02E3E7E3  40000984  4040001C  40400001  00000F24  00000F20  000003C8
00000E8C  00000E8C  00000E8C  00000E8C  40404040  40404040  40404040
40404040  40404040  40404040  40404040  D7E2E3D9  F0F2F5F7*
02D9D3C4  40404040  40400038  40404040  00010001  0C000980  00010001
0C000984  00010001  0C000988  00010001  0C00098C  00010001  0C000990
00010001  0C000994  00010001  0C000998  D7E2E3D9  F0F2F5F8*
02E3E7E3  400009A0  4040001C  40400001  00000E98  00000EA0  00000E8C
00000E8C  00000F24  00000F30  80000E8C  40404040  40404040  40404040
40404040  40404040  40404040  40404040  D7E2E3D9  F0F2F5F9*
02D9D3C4  40404040  40400038  40404040  00010001  0C00099C  00010001
0C0009A0  00010001  0C0009A4  00010001  0C0009A8  00010001  0C0009AC
00010001  0C0009B0  00010001  0C0009B4  D7E2E3D9  F0F2F6F0**
02E3E7E3  400009BC  4040001C  40400001  0000225C  00001064  00000E8C
```

```
00000ECC  00000F24  00000F20  000011A6  40404040  40404040  40404040
40404040  40404040  40404040  40404040  D7E2E3D9  F0F2F6F1*
02D9D3C4  40404040  40400038  40404040  00010001  0C0009B8  00010001
0C0009BC  00010001  0C0009C0  00010001  0C0009C4  00010001  0C0009C8
00010001  0C0009CC  00010001  0C0009D0  D7E2E3D9  F0F2F6F2*
02E3E7E3  400009D8  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F2F6F3*
02D9D3C4  40404040  40400038  40404040  00010001  0C0009D4  00010001
0C0009D8  00010001  0C0009DC  00010001  0C0009E0  00010001  0C0009E4
00010001  0C0009E8  00010001  0C0009EC  D7E2E3D9  F0F2F6F4*
02E3E7E3  400009F4  4040001C  40400001  00000E8C  00000F24  00000F30
80000E8C  00000F60  00002298  00000E8C  40404040  40404040  40404040
40404040  40404040  40404040  40404040  D7E2E3D9  F0F2F6F5*
02D9D3C4  40404040  40400038  40404040  00010001  0C0009F0  00010001
0C0009F4  00010001  0C0009F8  00010001  0C0009FC  00010001  0C000A00
00010001  0C000A04  00010001  0C000A08  D7E2E3D9  F0F2F6F6*
02E3E7E3  40000A10  4040001C  40400001  00000EC0  00000F24  00000F20
000011A6  00000E8C  00000E8C  00000E8C  40404040  40404040  40404040
40404040  40404040  40404040  40404040  D7E2E3D9  F0F2F6F7*
02D9D3C4  40404040  40400038  40404040  00010001  0C000A0C  00010001
0C000A10  00010001  0C000A14  00010001  0C000A18  00010001  0C000A1C
00010001  0C000A20  00010001  0C000A24  D7E2E3D9  F0F2F6F8*
02E3E7E3  40000A2C  4040001C  40400001  00000E8C  00000E98  00000EA0
00000E8C  00000E8C  00000F24  00000F30  40404040  40404040  40404040
40404040  40404040  40404040  40404040  D7E2E3D9  F0F2F6F9*
02D9D3C4  40404040  40400038  40404040  00010001  0C000A28  00010001
0C000A2C  00010001  0C000A30  00010001  0C000A34  00010001  0C000A38
00010001  0C000A3C  00010001  0C000A40  D7E2E3D9  F0F2F7F0**
02E3E7E3  40000A48  4040000C  40400001  80000E8C  000011A6  80000EE8
40404040  40404040  40404040  40404040  40404040  40404040  40404040

MEMBER NAME  PSTRES
40404040  40404040  40404040  40404040  D7E2E3D9  F0F2F7F1*
02E3E7E3  40000A5C  40400010  40400001  00000E8C  00001044  00000F24
00000F20  40404040  40404040  40404040  40404040  40404040  40404040
40404040  40404040  40404040  40404040  D7E2E3D9  F0F2F7F2*
02D9D3C4  40404040  40400038  40404040  00010001  0C000A44  00010001
0C000A48  00010001  0C000A4C  00010001  0C000A50  00010001  0C000A5C
00010001  0C000A60  00010001  0C000A64  D7E2E3D9  F0F2F7F3*
02E3E7E3  40000A6C  4040001C  40400001  000011A6  00000E8C  00000E8C
00000E8C  00000E8C  00000E98  00000EA0  40404040  40404040  40404040
40404040  40404040  40404040  40404040  D7E2E3D9  F0F2F7F4*
02D9D3C4  40404040  40400038  40404040  00010001  0C000A68  00010001
0C000A6C  00010001  0C000A70  00010001  0C000A74  00010001  0C000A78
00010001  0C000A7C  00010001  0C000A80  D7E2E3D9  F0F2F7F5*
02E3E7E3  40000A88  4040001C  40400001  00000E8C  00000E8C  00000F24
00000F30  80000E8C  000011A6  80000EE8  40404040  40404040  40404040
40404040  40404040  40404040  40404040  D7E2E3D9  F0F2F7F6*
02D9D3C4  40404040  40400038  40404040  00010001  0C000A84  00010001
0C000A88  00010001  0C000A8C  00010001  0C000A90  00010001  0C000A94
00010001  0C000A98  00010001  0C000A9C  D7E2E3D9  F0F2F7F7*
02E3E7E3  40000AAC  4040001C  40400001  00000E8C  00001044  00000F24
00000F20  000011A6  00000E8C  00000E8C  40404040  40404040  40404040
40404040  40404040  40404040  40404040  D7E2E3D9  F0F2F7F8*
02D9D3C4  40404040  40400038  40404040  00010001  0C000AA0  00010001
0C000AAC  00010001  0C000AB0  00010001  0C000AB4  00010001  0C000AB8
00010001  0C000ABC  00010001  0C000AC0  D7E2E3D9  F0F2F7F9*
02E3E7E3  40000AC8  4040001C  40400001  00000E8C  00000E8C  00000E98
```

```
00000EA0  00000E8C  00000E8C  00000F24  40404040  40404040  40404040
40404040  40404040  40404040  40404040  D7E2E3D9  F0F2F8F0**
02D9D3C4  40404040  40400038  40404040  00010001  0C000AC4  00010001
0C000AC8  00010001  0C000ACC  00010001  0C000AD0  00010001  0C000AD4
00010001  0C000AD8  00010001  0C000ADC  D7E2E3D9  F0F2F8F1*
02E3E7E3  40000AE4  40400010  40400001  00000F30  80000E8C  000011A6
80000EE8  40404040  40404040  40404040  40404040  40404040  40404040
40404040  40404040  40404040  40404040  D7E2E3D9  F0F2F8F2*
02E3E7E3  40000AFC  4040000C  40400001  00000E8C  00001044  00000F24
40404040  40404040  40404040  40404040  40404040  40404040  40404040
40404040  40404040  40404040  40404040  D7E2E3D9  F0F2F8F3*
02D9D3C4  40404040  40400038  40404040  00010001  0C000AE0  00010001
0C000AE4  00010001  0C000AE8  00010001  0C000AEC  00010001  0C000AF0
00010001  0C000AFC  00010001  0C000B00  D7E2E3D9  F0F2F8F4*
02E3E7E3  40000B08  4040001C  40400001  00000F20  000011A6  00000E8C
00000E8C  00000E8C  00000E8C  00000E98  40404040  40404040  40404040
40404040  40404040  40404040  40404040  D7E2E3D9  F0F2F8F5*
02D9D3C4  40404040  40400038  40404040  00010001  0C000B04  00010001
0C000B08  00010001  0C000B0C  00010001  0C000B10  00010001  0C000B14
00010001  0C000B18  00010001  0C000B1C  D7E2E3D9  F0F2F8F6*
02E3E7E3  40000B24  4040001C  40400001  00000EA0  00000E8C  00000E8C
00000F24  00000F30  80000E8C  000011A6  40404040  40404040  40404040
40404040  40404040  40404040  40404040  D7E2E3D9  F0F2F8F7*
02D9D3C4  40404040  40400038  40404040  00010001  0C000B20  00010001
0C000B24  00010001  0C000B28  00010001  0C000B2C  00010001  0C000B30
00010001  0C000B34  00010001  0C000B38  D7E2E3D9  F0F2F8F8*
02E3E7E3  40000B40  40400004  40400001  80000EE8  40404040  40404040
40404040  40404040  40404040  40404040  40404040  40404040  40404040
40404040  40404040  40404040  40404040  D7E2E3D9  F0F2F8F9*
02E3E7E3  40000B4C  40400018  40400001  00000E8C  00001044  00000F24
00000F20  000011A6  00000E8C  40404040  40404040  40404040  40404040
40404040  40404040  40404040  40404040  D7E2E3D9  F0F2F9F0**

MEMBER NAME  PSTRES
02D9D3C4  40404040  40400038  40404040  00010001  0C000B3C  00010001
0C000B40  00010001  0C000B4C  00010001  0C000B50  00010001  0C000B54
00010001  0C000B58  00010001  0C000B5C  D7E2E3D9  F0F2F9F1*
02E3E7E3  40000B64  4040001C  40400001  00000E8C  00000E8C  00000E8C
00000E98  00000EA0  00000E8C  00000E8C  40404040  40404040  40404040
40404040  40404040  40404040  40404040  D7E2E3D9  F0F2F9F2*
02D9D3C4  40404040  40400038  40404040  00010001  0C000B60  00010001
0C000B64  00010001  0C000B68  00010001  0C000B6C  00010001  0C000B70
00010001  0C000B74  00010001  0C000B78  D7E2E3D9  F0F2F9F3*
02E3E7E3  40000B80  40400014  40400001  00000F24  00000F30  80000E8C
000011A6  80000EE8  40404040  40404040  40404040  40404040  40404040
40404040  40404040  40404040  40404040  D7E2E3D9  F0F2F9F4*
02E3E7E3  40000B9C  40400008  40400001  00000E8C  00001044  40404040
40404040  40404040  40404040  40404040  40404040  40404040  40404040
40404040  40404040  40404040  40404040  D7E2E3D9  F0F2F9F5*
02D9D3C4  40404040  40400038  40404040  00010001  0C000B7C  00010001
0C000B80  00010001  0C000B84  00010001  0C000B88  00010001  0C000B8C
00010001  0C000B90  00010001  0C000B9C  D7E2E3D9  F0F2F9F6*
02E3E7E3  40000BA4  4040001C  40400001  00000F24  00000F20  000011A6
00000E8C  00000E8C  00000E8C  00000E8C  40404040  40404040  40404040
40404040  40404040  40404040  40404040  D7E2E3D9  F0F2F9F7*
02D9D3C4  40404040  40400038  40404040  00010001  0C000BA0  00010001
0C000BA4  00010001  0C000BA8  00010001  0C000BAC  00010001  0C000BB0
00010001  0C000BB4  00010001  0C000BB8  D7E2E3D9  F0F2F9F8*
02E3E7E3  40000BC0  4040001C  40400001  00000E98  00000EA0  00000E8C
```

```
00000E8C  00000F24  00000F30  80000E8C  40404040  40404040  40404040
40404040  40404040  40404040  40404040  D7E2E3D9  F0F2F9F9*
02D9D3C4  40404040  40400038  40404040  00010001  0C000BBC  00010001
0C000BC0  00010001  0C000BC4  00010001  0C000BC8  00010001  0C000BCC
00010001  0C000BD0  00010001  0C000BD4  D7E2E3D9  F0F3F0F0**
02E3E7E3  40000BDC  40400008  40400001  000011A6  80000EE8  40404040
40404040  40404040  40404040  40404040  40404040  40404040  40404040
40404040  40404040  40404040  40404040  D7E2E3D9  F0F3F0F1*
02E3E7E3  40000BEC  40400014  40400001  00000E8C  00001044  00000F24
00000F20  000011A6  40404040  40404040  40404040  40404040  40404040
40404040  40404040  40404040  40404040  D7E2E3D9  F0F3F0F2*
02D9D3C4  40404040  40400038  40404040  00010001  0C000BD8  00010001
0C000BDC  00010001  0C000BE0  00010001  0C000BEC  00010001  0C000BF0
00010001  0C000BF4  00010001  0C000BF8  D7E2E3D9  F0F3F0F3*
02E3E7E3  40000C00  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F3F0F4*
02D9D3C4  40404040  40400038  40404040  00010001  0C000BFC  00010001
0C000C00  00010001  0C000C04  00010001  0C000C08  00010001  0C000C0C
00010001  0C000C10  00010001  0C000C14  D7E2E3D9  F0F3F0F5*
02E3E7E3  40000C1C  40400018  40400001  00000E8C  00000F24  00000F30
80000E8C  000011A6  80000EE8  40404040  40404040  40404040  40404040
40404040  40404040  40404040  40404040  D7E2E3D9  F0F3F0F6*
02E3E7E3  40000C3C  40400004  40400001  00000E8C  40404040  40404040
40404040  40404040  40404040  40404040  40404040  40404040  40404040
40404040  40404040  40404040  40404040  D7E2E3D9  F0F3F0F7*
02D9D3C4  40404040  40400038  40404040  00010001  0C000C18  00010001
0C000C1C  00010001  0C000C20  00010001  0C000C24  00010001  0C000C28
00010001  0C000C2C  00010001  0C000C30  D7E2E3D9  F0F3F0F8*
02E3E7E3  40000C40  4040001C  40400001  00001044  00000F24  00000F20
000011A6  00000E8C  00000E8C  00000E8C  40404040  40404040  40404040
40404040  40404040  40404040  40404040  D7E2E3D9  F0F3F0F9*
02D9D3C4  40404040  40400038  40404040  00010001  0C000C3C  00010001

MEMBER NAME  PSTRES
0C000C40  00010001  0C000C44  00010001  0C000C48  00010001  0C000C4C
00010001  0C000C50  00010001  0C000C54  D7E2E3D9  F0F3F1F0**
02E3E7E3  40000C5C  4040001C  40400001  00000E8C  00000E98  00000EA0
00000E8C  00000E8C  00000F24  00000F30  40404040  40404040  40404040
40404040  40404040  40404040  40404040  D7E2E3D9  F0F3F1F1*
02D9D3C4  40404040  40400038  40404040  00010001  0C000C58  00010001
0C000C5C  00010001  0C000C60  00010001  0C000C64  00010001  0C000C68
00010001  0C000C6C  00010001  0C000C70  D7E2E3D9  F0F3F1F2*
02E3E7E3  40000C78  4040000C  40400001  80000E8C  000011A6  80000EE8
40404040  40404040  40404040  40404040  40404040  40404040  40404040
40404040  40404040  40404040  40404040  D7E2E3D9  F0F3F1F3*
02E3E7E3  40000C8C  40400010  40400001  00000E8C  00001044  00000F24
00000F20  40404040  40404040  40404040  40404040  40404040  40404040
40404040  40404040  40404040  40404040  D7E2E3D9  F0F3F1F4*
02D9D3C4  40404040  40400038  40404040  00010001  0C000C74  00010001
0C000C78  00010001  0C000C7C  00010001  0C000C80  00010001  0C000C8C
00010001  0C000C90  00010001  0C000C94  D7E2E3D9  F0F3F1F5*
02E3E7E3  40000C9C  4040001C  40400001  000011A6  00000E8C  00000E8C
00000E8C  00000E8C  00000E98  00000EA0  40404040  40404040  40404040
40404040  40404040  40404040  40404040  D7E2E3D9  F0F3F1F6*
02D9D3C4  40404040  40400038  40404040  00010001  0C000C98  00010001
0C000C9C  00010001  0C000CA0  00010001  0C000CA4  00010001  0C000CA8
00010001  0C000CAC  00010001  0C000CB0  D7E2E3D9  F0F3F1F7*
02E3E7E3  40000CB8  4040001C  40400001  00000E8C  00000E8C  00000F24
```

```
00000F30  80000E8C  000011A6  80000EE8  40404040  40404040  40404040
40404040  40404040  40404040  40404040  D7E2E3D9  F0F3F1F8*
02D9D3C4  40404040  40400038  40404040  00010001  0C000CB4  00010001
0C000CB8  00010001  0C000CBC  00010001  0C000CC0  00010001  0C000CC4
00010001  0C000CC8  00010001  0C000CCC  D7E2E3D9  F0F3F1F9*
02E3E7E3  40000CDC  4040001C  40400001  00000E8C  00001044  00000F24
00000F20  000011A6  00000E8C  00000E8C  40404040  40404040  40404040
40404040  40404040  40404040  40404040  D7E2E3D9  F0F3F2F0**
02D9D3C4  40404040  40400038  40404040  00010001  0C000CD0  00010001
0C000CDC  00010001  0C000CE0  00010001  0C000CE4  00010001  0C000CE8
00010001  0C000CEC  00010001  0C000CF0  D7E2E3D9  F0F3F2F1*
02E3E7E3  40000CF8  4040001C  40400001  00000E8C  00000E8C  00000E98
00000EA0  00000E8C  00000E8C  00000F24  40404040  40404040  40404040
40404040  40404040  40404040  40404040  D7E2E3D9  F0F3F2F2*
02D9D3C4  40404040  40400038  40404040  00010001  0C000CF4  00010001
0C000CF8  00010001  0C000CFC  00010001  0C000D00  00010001  0C000D04
00010001  0C000D08  00010001  0C000D0C  D7E2E3D9  F0F3F2F3*
02E3E7E3  40000D14  40400010  40400001  00000F30  80000E8C  000011A6
80000EE8  40404040  40404040  40404040  40404040  40404040  40404040
40404040  40404040  40404040  40404040  D7E2E3D9  F0F3F2F4*
02E3E7E3  40000D2C  4040000C  40400001  00000E8C  00001044  00000F24
40404040  40404040  40404040  40404040  40404040  40404040  40404040
40404040  40404040  40404040  40404040  D7E2E3D9  F0F3F2F5*
02D9D3C4  40404040  40400038  40404040  00010001  0C000D10  00010001
0C000D14  00010001  0C000D18  00010001  0C000D1C  00010001  0C000D20
00010001  0C000D2C  00010001  0C000D30  D7E2E3D9  F0F3F2F6*
02E3E7E3  40000D38  4040001C  40400001  00000F20  000011A6  00000E8C
00000E8C  00000E8C  00000E8C  00000E98  40404040  40404040  40404040
40404040  40404040  40404040  40404040  D7E2E3D9  F0F3F2F7*
02D9D3C4  40404040  40400038  40404040  00010001  0C000D34  00010001
0C000D38  00010001  0C000D3C  00010001  0C000D40  00010001  0C000D44
00010001  0C000D48  00010001  0C000D4C  D7E2E3D9  F0F3F2F8*
02E3E7E3  40000D54  4040001C  40400001  00000EA0  00000E8C  00000E8C
00000F24  00000F30  80000E8C  000011A6  40404040  40404040  40404040

MEMBER NAME  PSTRES
40404040  40404040  40404040  40404040  D7E2E3D9  F0F3F2F9*
02D9D3C4  40404040  40400038  40404040  00010001  0C000D50  00010001
0C000D54  00010001  0C000D58  00010001  0C000D5C  00010001  0C000D60
00010001  0C000D64  00010001  0C000D68  D7E2E3D9  F0F3F3F0**
02E3E7E3  40000D70  40400004  40400001  80000EE8  40404040  40404040
40404040  40404040  40404040  40404040  40404040  40404040  40404040
40404040  40404040  40404040  40404040  D7E2E3D9  F0F3F3F1*
02E3E7E3  40000D78  40400018  40400001  00000F28  00000E8C  00001044
00000F24  00000F20  000011A6  40404040  40404040  40404040  40404040
40404040  40404040  40404040  40404040  D7E2E3D9  F0F3F3F2*
02D9D3C4  40404040  40400038  40404040  00010001  0C000D6C  00010001
0C000D70  00010001  0C000D78  00010001  0C000D7C  00010001  0C000D80
00010001  0C000D84  00010001  0C000D88  D7E2E3D9  F0F3F3F3*
02E3E7E3  40000D90  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F3F3F4*
02D9D3C4  40404040  40400038  40404040  00010001  0C000D8C  00010001
0C000D90  00010001  0C000D94  00010001  0C000D98  00010001  0C000D9C
00010001  0C000DA0  00010001  0C000DA4  D7E2E3D9  F0F3F3F5*
02E3E7E3  40000DAC  40400018  40400001  00000E8C  00000F24  00000F30
80000E8C  000011A6  80000EF8  40404040  40404040  40404040  40404040
40404040  40404040  40404040  40404040  D7E2E3D9  F0F3F3F6*
02E3E7E3  40000DCC  40400004  40400001  00000E8C  40404040  40404040
```

```
40404040  40404040  40404040  40404040  40404040  40404040  40404040
40404040  40404040  40404040  40404040  D7E2E3D9  F0F3F3F7*
02D9D3C4  40404040  40400038  40404040  00010001  0C000DA8  00010001
0C000DAC  00010001  0C000DB0  00010001  0C000DB4  00010001  0C000DB8
00010001  0C000DBC  00010001  0C000DC0  D7E2E3D9  F0F3F3F8*
02E3E7E3  40000DD0  4040001C  40400001  00001044  00000F24  00000F20
000011A6  00000E8C  00000E8C  00000E8C  40404040  40404040  40404040
40404040  40404040  40404040  40404040  D7E2E3D9  F0F3F3F9*
02D9D3C4  40404040  40400038  40404040  00010001  0C000DCC  00010001
0C000DD0  00010001  0C000DD4  00010001  0C000DD8  00010001  0C000DDC
00010001  0C000DE0  00010001  0C000DE4  D7E2E3D9  F0F3F4F0**
02E3E7E3  40000DEC  4040001C  40400001  00000E8C  00000E98  00000EA0
00000E8C  00000E8C  00000F24  00000F30  40404040  40404040  40404040
40404040  40404040  40404040  40404040  D7E2E3D9  F0F3F4F1*
02D9D3C4  40404040  40400038  40404040  00010001  0C000DE8  00010001
0C000DEC  00010001  0C000DF0  00010001  0C000DF4  00010001  0C000DF8
00010001  0C000DFC  00010001  0C000E00  D7E2E3D9  F0F3F4F2*
02E3E7E3  40000E08  4040000C  40400001  80000E8C  000011A6  80000EF8
40404040  40404040  40404040  40404040  40404040  40404040  40404040
40404040  40404040  40404040  40404040  D7E2E3D9  F0F3F4F3*
02E3E7E3  40000E1C  40400010  40400001  00000E8C  00001044  00000F24
00000F20  40404040  40404040  40404040  40404040  40404040  40404040
40404040  40404040  40404040  40404040  D7E2E3D9  F0F3F4F4*
02D9D3C4  40404040  40400038  40404040  00010001  0C000E04  00010001
0C000E08  00010001  0C000E0C  00010001  0C000E10  00010001  0C000E1C
00010001  0C000E20  00010001  0C000E24  D7E2E3D9  F0F3F4F5*
02E3E7E3  40000E2C  4040001C  40400001  000011A6  00000E8C  00000E8C
00000E8C  00000E8C  00000E98  00000EA0  40404040  40404040  40404040
40404040  40404040  40404040  40404040  D7E2E3D9  F0F3F4F6*
02D9D3C4  40404040  40400038  40404040  00010001  0C000E28  00010001
0C000E2C  00010001  0C000E30  00010001  0C000E34  00010001  0C000E38
00010001  0C000E3C  00010001  0C000E40  D7E2E3D9  F0F3F4F7*
02E3E7E3  40000E48  40400014  40400001  00000E8C  00000E8C  00000F24
00000F30  80000E8C  40404040  40404040  40404040  40404040  40404040
40404040  40404040  40404040  40404040  D7E2E3D9  F0F3F4F8*

MEMBER NAME  PSTRES
02E3E7E3  4000222C  40400038  40400001  00000000  00000000  00000000
00000000  00000000  00000000  00000000  00000000  00000000  00000000
00000000  00000000  00000000  00000000  D7E2E3D9  F0F3F4F9*
02E3E7E3  40002264  40400038  40400001  00000000  00000000  00000000
00000000  00000000  097000C1  097400C1  097800C1  097C00C1  09C000C2
098400C2  00000014  00000020  098800C2  D7E2E3D9  F0F3F5F0**
02E3E7E3  4000229C  40400004  40400001  09C400C3  40404040  40404040
40404040  40404040  40404040  40404040  40404040  40404040  40404040
40404040  40404040  40404040  40404040  D7E2E3D9  F0F3F5F1*
02D9D3C4  40404040  40400030  40404040  00010001  0C000E44  00010001
0C000E48  00010001  0C000E4C  00010001  0C000E50  00010001  0C000E54
00010001  0C000E58  40404040  40404040  D7E2E3D9  F0F3F5F2*
02C5D5C4  40404040  40404040  40404040  40404040  40404040  40404040
000036F4  F1F5F7F3  F460C6D6  F34040F0  F2F0F2F8  F7F0F9F8  40F0F84B
F4F24BF4  F6404040  D7E2E3D9  C5E24040  D7E2E3D9  F0F3F5F3**

MEMBER NAME  PTARC
02C5E2C4  40404040  40400010  40400001  D7E3C1D9  C3404040  00000000
40000000  40404040  40404040  40404040  40404040  40404040  40404040
40404040  40404040  40404040  40404040  D7E3C1D9  F0F0F0F1*
02E3E7E3  40000000  40400038  40400001  47F0F00C  07D7E3C1  D9C34040
90ECD00C  184D98CD  F0205040  D00450D0  400807FC  40404040  40404040
```

```
021A37C5  D9D9D6D9  40C9D540  E2E4C2D9  D7E3C1D9  F0F0F0F2*
02E3E7E3  40000038  40400038  40400001  D6E4E3C9  D5C540D7  E3C1D9C3
40C4C9C4  40D5D6E3  40C3C8C1  C9D540C1  D5C440E2  C8D6E4D3  C440C8C1
E5C51A0F  C7D6E3D6  40D7D6C9  D5E3C5D9  D7E3C1D9  F0F0F0F3*
02E3E7E3  40000070  40400006  40400001  407E4010  05224040  40404040
40404040  40404040  40404040  40404040  40404040  40404040  40404040
40404040  40404040  40404040  40404040  D7E3C1D9  F0F0F0F4*
02E3E7E3  400000E8  40400038  40400001  00000000  00000000  4E000000
00000000  4F080000  00000000  4E000000  80000000  00000000  00000000
00000001  00000001  00000002  00000003  D7E3C1D9  F0F0F0F5*
02C5E2C4  40404040  40400010  40400002  E3D6D3C5  D9404040  05000000
4000000C  40404040  40404040  40404040  40404040  40404040  40404040
40404040  40404040  40404040  40404040  D7E3C1D9  F0F0F0F6*
02E3E7E3  40000120  4040002C  40400001  00000004  00000005  00000006
00000007  00000008  00000009  00000038  41100000  41200000  00000000
00000000  40404040  40404040  40404040  D7E3C1D9  F0F0F0F7*
02C5E2C4  40404040  40400010  40400003  C3D6E240  40404040  02000000
40000000  40404040  40404040  40404040  40404040  40404040  40404040
40404040  40404040  40404040  40404040  D7E3C1D9  F0F0F0F8*
02E3E7E3  400001C0  40400008  40400001  00000000  00000000  40404040
40404040  40404040  40404040  40404040  40404040  40404040  40404040
40404040  40404040  40404040  40404040  D7E3C1D9  F0F0F0F9*
02C5E2C4  40404040  40400010  40400004  E2C9D540  40404040  02000000
40000000  40404040  40404040  40404040  40404040  40404040  40404040
40404040  40404040  40404040  40404040  D7E3C1D9  F0F0F1F0**
02C5E2C4  40404040  40400010  40400005  E2D8D9E3  40404040  02000000
40000000  40404040  40404040  40404040  40404040  40404040  40404040
40404040  40404040  40404040  40404040  D7E3C1D9  F0F0F1F1*
02C5E2C4  40404040  40400010  40400006  C1D9C3D6  E2404040  02000000
40000000  40404040  40404040  40404040  40404040  40404040  40404040
40404040  40404040  40404040  40404040  D7E3C1D9  F0F0F1F2*
02E3E7E3  400001CC  40400014  40400001  00000000  00000000  00000000
00000000  00000000  40404040  40404040  40404040  40404040  40404040
40404040  40404040  40404040  40404040  D7E3C1D9  F0F0F1F3*
02C5E2C4  40404040  40400010  40400007  C9C2C3D6  D47B4040  02000000
40000000  40404040  40404040  40404040  40404040  40404040  40404040
40404040  40404040  40404040  40404040  D7E3C1D9  F0F0F1F4*
02E3E7E3  400001E4  40400004  40400001  00000000  40404040  40404040
40404040  40404040  40404040  40404040  40404040  40404040  40404040
40404040  40404040  40404040  40404040  D7E3C1D9  F0F0F1F5*
02E3E7E3  400001EC  40400004  40400001  00000000  40404040  40404040
40404040  40404040  40404040  40404040  40404040  40404040  40404040
40404040  40404040  40404040  40404040  D7E3C1D9  F0F0F1F6*
02E3E7E3  400001FC  40400038  40400001  5830D14C  5880D164  58A0D148
58B0D16C  5890D09C  5870D0B8  5860D0A8  78203004  7020D178  7B20B044
30227920  A0044730  D1D47820  30087B20  D7E3C1D9  F0F0F1F7*
02E3E7E3  40000234  40400038  40400001  B0483022  7920A004  4730D1D4
5800D098  5000D120  47F0D200  7820D178  7B20B04C  30227920  A0044730
D6187820  30087B20  B0503022  7920A004  D7E3C1D9  F0F0F1F8*
02E3E7E3  4000026C  40400038  40400001  4730D618  5800D090  5000D120
7800D0C4  33007000  D17C58F0  D1604110  D04C05EF  7000D0E8  7840B05C
7040D104  7800B054  7000D0EC  7800B058  D7E3C1D9  F0F0F1F9*
02E3E7E3  400002A4  40400038  40400001  7000D0F8  7800B044  7000D0F0

MEMBER NAME  PTARC
7800B048  7000D0FC  7800B04C  7000D0F4  7800B050  7000D100  7820A000
3D243322  7A20D0C4  7020D17C  58F0D160  D7E3C1D9  F0F0F2F0**
02E3E7E3  400002DC  40400038  40400001  4110D050  05EF7C00  D0C87000
D12C7820  D0F07B20  D0EC7020  D0D87840  D0FC7B40  D0F87040  D0DC3C22
```

```
3C443A24  7020D17C  58F0D15C  4110D054  D7E3C1D9  F0F0F2F1*
02E3E7E3  40000314  40400038  40400001  05EF7000  D1807800  D0D87D00
D1807000  D0D87800  D0DC7D00  D1807000  D0DC7820  D0F47B20  D0EC7020
D0E07840  D1007B40  D0F87040  D0E43C22  D7E3C1D9  F0F0F2F2*
02E3E7E3  4000034C  40400038  40400001  3C443A24  7020D17C  58F0D15C
4110D058  05EF7000  D1807800  D0E07D00  D1807000  D0E07800  D0E47D00
D1807000  D0E458F0  D1604110  D05C05EF  D7E3C1D9  F0F0F2F3*
02E3E7E3  40000384  40400038  40400001  7000D134  58F0D160  4110D060
05EF7000  D1387800  D0DC3200  47A0D338  7820D0C8  7C20D0E8  7B20D134
7020D134  7800D0E4  320047A0  D3527820  D7E3C1D9  F0F0F2F4*
02E3E7E3  400003BC  40400038  40400001  D0C87C20  D0E87B20  D1387020
D1387820  D1387B20  D1347020  D12847A0  D3707840  D0C87C40  D0E83A24
7020D128  7800D12C  7900D128  47A0D55E  D7E3C1D9  F0F0F2F5*
02E3E7E3  400003F4  40400038  40400001  7820D128  7D20D12C  7A20D0C4
2B003802  6A00D080  6000D070  5820D074  5020D110  18025700  D08C5000
D07C6840  D0786B40  D0887820  D1283D24  D7E3C1D9  F0F0F2F6*
02E3E7E3  4000042C  40400038  40400001  7020D108  5800D120  1BFF860F
D3C83322  7020D108  5800D120  1BFF860F  D3DA7800  D1387000  D11C5800
D1201BFF  870FD3EC  7800D134  7000D11C  D7E3C1D9  F0F0F2F7*
02E3E7E3  40000464  40400038  40400001  5820D110  1B2918A9  18B27800
D1087A00  D11C7000  D11C58F0  D1544110  D06405EF  38207C20  D1047A20
D0EC1857  5C40D130  18251A26  70228000  D7E3C1D9  F0F0F2F8*
02E3E7E3  4000049C  40400038  40400001  58F0D158  4110D064  05EF3820
7C20D104  7A20D0F8  18575C40  D1301825  1A277022  80005800  D1301A0A
5000D130  879AD3F6  58A0D148  58B0D16C  D7E3C1D9  F0F0F2F9*
02E3E7E3  400004D4  40400038  40400001  5890D09C  5800D120  1BFF870F
D4E458F0  D1544110  D06805EF  7820D104  3C207A20  D0EC1857  5C40D130
18261A25  70228000  58F0D158  4110D068  D7E3C1D9  F0F0F3F0**
02E3E7E3  4000050C  40400038  40400001  05EF7820  D1043C20  7A20D0F8
18575C40  D1301827  1A257022  80001857  5C40D130  18261A25  78228000
70203004  18575C40  D1301827  1A257822  D7E3C1D9  F0F0F3F1*
02E3E7E3  40000544  40400038  40400001  80007020  30085800  D1301A09
5000D130  1BFF58E0  D00007FE  58F0D154  4110D06C  05EF7820  D1043C20
7A20D0EC  18575C40  D1301826  1A257022  D7E3C1D9  F0F0F3F2*
02E3E7E3  4000057C  40400038  40400001  800058F0  D1584110  D06C05EF
7820D104  3C207A20  D0F81857  5C40D130  18271A25  70228000  18575C40
D1301826  1A257822  80007020  30041857  D7E3C1D9  F0F0F3F3*
02E3E7E3  400005B4  40400038  40400001  5C40D130  18271A25  78228000
70203008  5800D130  1A095000  D1301BFF  58E0D000  07FE5800  D1201BFF
860FD5BE  18575C40  D1301826  1A257800  D7E3C1D9  F0F0F3F4*
02E3E7E3  400005EC  40400038  40400001  D0F07002  80001857  5C40D130
18271A25  7800D0FC  70028000  18575C40  D1301826  1A257822  80007020
30041857  5C40D130  18271A25  78228000  D7E3C1D9  F0F0F3F5*
02E3E7E3  40000624  40400038  40400001  70203008  5800D130  1A095000
D13047F0  D6101857  5C40D130  18261A25  7800D0F4  70028000  18575C40
D1301827  1A257800  D1007002  80001857  D7E3C1D9  F0F0F3F6*
02E3E7E3  4000065C  40400038  40400001  5C40D130  18261A25  78228000
70203004  18575C40  D1301827  1A257822  80007020  30085800  D1301A09
5000D130  1BFF58E0  D00007FE  58F0D174  D7E3C1D9  F0F0F3F7*
02E3E7E3  40000694  40400038  40400001  45E0F004  00000006  00000028
45E0F008  0450D130  45E0F010  41F00004  58E0D000  07FE58A0  D00458E0
A00C58B0  A0185810  B00C5820  D1305020  D7E3C1D9  F0F0F3F8*
02E3E7E3  400006CC  40400038  40400001  100018DA  92FFA00C  982CA01C
07FE5870  100C5820  70005020  D1305820  10004130  20004150  00041B25

MEMBER NAME  PTARC
5020D14C  5030D150  58201004  41302000  D7E3C1D9  F0F0F3F9*
02E3E7E3  40000704  40400032  40400001  41500004  1B255B20  D0C05020
D16C5030  D1705820  10084130  20004150  00041B25  5C40D0A0  1B255020
```

```
D1645030  D16847F0  D1844040  40404040  D7E3C1D9  F0F0F4F0**
02E3E7E3  40000020  40400004  40400001  000006DA  40404040  40404040
40404040  40404040  40404040  40404040  40404040  40404040  40404040
40404040  40404040  40404040  40404040  D7E3C1D9  F0F0F4F1*
02D9D3C4  40404040  40400038  40404040  00020001  0C0001C0  00030001
1C0001CC  00040001  1C0001D0  00050001  1C0001D4  00060001  1C0001D8
00070001  1C0001EC  00010001  0C00069C  D7E3C1D9  F0F0F4F2*
02E3E7E3  40000024  40400004  40400001  00000078  40404040  40404040
40404040  40404040  40404040  40404040  40404040  40404040  40404040
40404040  40404040  40404040  40404040  D7E3C1D9  F0F0F4F3*
02E3E7E3  40000078  40400004  40400001  000006B6  40404040  40404040
40404040  40404040  40404040  40404040  40404040  40404040  40404040
40404040  40404040  40404040  40404040  D7E3C1D9  F0F0F4F4*
02E3E7E3  400000C4  40400014  40400001  800001F4  800001F4  800001F4
800001F4  80000150  40404040  40404040  40404040  40404040  40404040
40404040  40404040  40404040  40404040  D7E3C1D9  F0F0F4F5*
02D9D3C4  40404040  40400038  40404040  00010001  0C000020  00010001
0C000024  00010001  0C000078  00010001  0C0000C4  00010001  0C0000C8
00010001  0C0000CC  00010001  0C0000D0  D7E3C1D9  F0F0F4F6*
02E3E7E3  400000D8  40400010  40400001  80000158  80000194  800001B0
800001AC  40404040  40404040  40404040  40404040  40404040  40404040
40404040  40404040  40404040  40404040  D7E3C1D9  F0F0F4F7*
02E3E7E3  400001F0  4040000C  40400001  00000000  00000000  00000000
40404040  40404040  40404040  40404040  40404040  40404040  40404040
40404040  40404040  40404040  40404040  D7E3C1D9  F0F0F4F8*
02D9D3C4  40404040  40400028  40404040  00010001  0C0000D4  00010001
0C0000D8  00010001  0C0000DC  00010001  0C0000E0  00010001  0C0000E4
40404040  40404040  40404040  40404040  D7E3C1D9  F0F0F4F9*
02C5D5C4  40404040  40404040  40404040  40404040  40404040  40404040
00000736  F1F5F7F3  F460C6D6  F34040F0  F2F0F2F8  F7F0F9F8  40F0F84B
F4F24BF5  F4404040  D7E3C1D9  C3404040  D7E3C1D9  F0F0F5F0**

MEMBER NAME  PTLN
02C5E2C4  40404040  40400010  40400001  D7E3D3D5  40404040  00000000
40000000  40404040  40404040  40404040  40404040  40404040  40404040
40404040  40404040  40404040  40404040  D7E3D3D5  F0F0F0F1*
02E3E7E3  40000000  40400038  40400001  47F0F00C  07D7E3D3  D5404040
90ECD00C  184D98CD  F0205040  D00450D0  400807FC  40404040  40404040
021A36C5  D9D9D6D9  40C9D540  E2E4C2D9  D7E3D3D5  F0F0F0F2*
02E3E7E3  40000038  40400038  40400001  D6E4E3C9  D5C540D7  E3D3D540
C4C9C440  D5D6E340  C3C8C1C9  D540C1D5  C440E2C8  D6E4D3C4  40C8C1E5
C51A1040  C7D6E3D6  40D7D6C9  D5E3C5D9  D7E3D3D5  F0F0F0F3*
02E3E7E3  40000070  40400006  40400001  407E4010  05224040  40404040
40404040  40404040  40404040  40404040  40404040  40404040  40404040
40404040  40404040  40404040  40404040  D7E3D3D5  F0F0F0F4*
02C5E2C4  40404040  40400010  40400002  E3D6D3C5  D9404040  05000000
4000000C  40404040  40404040  40404040  40404040  40404040  40404040
40404040  40404040  40404040  40404040  D7E3D3D5  F0F0F0F5*
02E3E7E3  400000C8  40400024  40400001  00000001  00000002  00000003
00000004  00000005  00000006  00000038  00000000  00000000  40404040
40404040  40404040  40404040  40404040  D7E3D3D5  F0F0F0F6*
02E3E7E3  40000100  40400008  40400001  00000000  00000000  40404040
40404040  40404040  40404040  40404040  40404040  40404040  40404040
40404040  40404040  40404040  40404040  D7E3D3D5  F0F0F0F7*
02E3E7E3  4000010C  40400004  40400001  00000000  40404040  40404040
40404040  40404040  40404040  40404040  40404040  40404040  40404040
40404040  40404040  40404040  40404040  D7E3D3D5  F0F0F0F8*
02C5E2C4  40404040  40400010  40400003  C9C2C3D6  D47B4040  02000000
40000000  40404040  40404040  40404040  40404040  40404040  40404040
```

40404040 40404040 40404040 40404040 D7E3D3D5 F0F0F0F9*
02E3E7E3 40000114 40400004 40400001 00000000 40404040 40404040
40404040 40404040 40404040 40404040 40404040 40404040 40404040
40404040 40404040 40404040 40404040 D7E3D3D5 F0F0F1F0**
02E3E7E3 4000011C 40400004 40400001 00000000 40404040 40404040
40404040 40404040 40404040 40404040 40404040 40404040 40404040
40404040 40404040 40404040 40404040 D7E3D3D5 F0F0F1F1*
02E3E7E3 40000128 40400038 40400001 5890D094 58A0D08C 58B0D09C
5880D0AC 5870D050 5860D05C 7820A004 7020D0A8 7B20B044 306258F0
D0887960 F0044730 D1367820 A0087B20 D7E3D3D5 F0F0F1F2*
02E3E7E3 40000160 40400038 40400001 B0483062 58F0D088 7960F004
4730D136 7840B04C 18585C40 D07C1826 1A257042 90007820 B0501858
5C40D07C 18281A25 70229000 7040A004 D7E3D3D5 F0F0F1F3*
02E3E7E3 40000198 40400038 40400001 7020A008 5800D07C 1A075000
D07C1BFF 58E0D000 07FE7820 D0A87B20 B04C3062 58F0D088 7960F004
4730D1A0 7820A008 7B20B050 306258F0 D7E3D3D5 F0F0F1F4*
02E3E7E3 400001D0 40400038 40400001 D0887960 F0044730 D1A07840
B0441858 5C40D07C 18261A25 70429000 7820B048 18585C40 D07C1828
1A257022 90007040 A0047020 A0085800 D7E3D3D5 F0F0F1F5*
02E3E7E3 40000208 40400038 40400001 D07C1A07 5000D07C 1BFF58E0
D00007FE 58F0D0A4 45E0F004 00000006 00000028 45E0F008 0450D07C
45E0F010 41F00004 58E0D000 07FE58A0 D7E3D3D5 F0F0F1F6*
02E3E7E3 40000240 40400038 40400001 D00458E0 A00C58B0 A0185810
B00C5820 D07C5020 100018DA 92FFA00C 982CA01C 07FE5870 100C5820
70005020 D07C5820 10004130 20004150 D7E3D3D5 F0F0F1F7*
02E3E7E3 40000278 40400038 40400001 00041B25 5020D08C 5030D090
58201004 41302000 41500004 1B255B20 D0685020 D09C5030 D0A05820
10084130 20004150 00041B25 5C40D054 D7E3D3D5 F0F0F1F8*
02E3E7E3 400002B0 4040000E 40400001 1B255020 D0945030 D09847F0
D0B04040 40404040 40404040 40404040 40404040 40404040 40404040
40404040 40404040 40404040 40404040 D7E3D3D5 F0F0F1F9*
02E3E7E3 40000020 40400008 40400001 00000262 00000078 40404040

MEMBER NAME PTLN 40404040 40404040 40404040 40404040 40404040 40404040 40404040
40404040 40404040 40404040 40404040 D7E3D3D5 F0F0F2F0**
02E3E7E3 40000078 40400004 40400001 0000023E 40404040 40404040
40404040 40404040 40404040 40404040 40404040 40404040 40404040
40404040 40404040 40404040 40404040 D7E3D3D5 F0F0F2F1*
02E3E7E3 40000120 40400008 40400001 00000000 00000008 40404040
40404040 40404040 40404040 40404040 40404040 40404040 40404040
40404040 40404040 40404040 40404040 D7E3D3D5 F0F0F2F2*
02D9D3C4 40404040 40400030 40404040 00020001 0C000100 00030001
1C00011C 00010001 0C000224 00010001 0C000020 00010001 0C000024
00010001 0C000078 40404040 40404040 D7E3D3D5 F0F0F2F3*
02C5D5C4 40404040 40404040 40404040 40404040 40404040 40404040
000002BE F1F5F7F3 F460C6D6 F34040F0 F2F0F2F8 F7F0F9F8 40F0F84B
F4F24BF5 F9404040 D7E3D3D5 40404040 D7E3D3D5 F0F0F2F4**

MEMBER NAME PTSPL

02C5E2C4 40404040 40400010 40400001 D7E3E2D7 D3404040 00000000
40000000 40404040 40404040 40404040 40404040 40404040 40404040
40404040 40404040 40404040 40404040 D7E3E2D7 F0F0F0F1*
02E3E7E3 40000000 40400038 40400001 47F0F00C 07D7E3E2 D7D34040
90ECD00C 184D98CD F0205040 D00450D0 400807FC 40404040 40404040
021A37C5 D9D9D6D9 40C9D540 E2E4C2D9 D7E3E2D7 F0F0F0F2*
02E3E7E3 40000038 40400038 40400001 D6E4E3C9 D5C540D7 E3E2D7D3
40C4C9C4 40D5D6E3 40C3C8C1 C9D540C1 D5C440E2 C8D6E4D3 C440C8C1
E5C51A0F C7D6E3D6 40D7D6C9 D5E3C5D9 D7E3E2D7 F0F0F0F3*

```
02E3E7E3  40000070  40400006  40400001  407E4010  05224040  40404040
40404040  40404040  40404040  40404040  40404040  40404040  40404040
40404040  40404040  40404040  40404040  D7E3E2D7  F0F0F0F4*
02E3E7E3  40000130  40400038  40400001  00000000  00000000  4F080000
00000000  00000000  00000000  00000001  00000002  00000003  00000004
00000005  00000006  00000008  41100000  D7E3E2D7  F0F0F0F5*
02C5E2C4  40404040  40400010  40400002  E3D6D3C5  D9404040  05000000
4000000C  40404040  40404040  40404040  40404040  40404040  40404040
40404040  40404040  40404040  40404040  D7E3E2D7  F0F0F0F6*
02E3E7E3  40000168  40400008  40400001  00000000  00000000  40404040
40404040  40404040  40404040  40404040  40404040  40404040  40404040
40404040  40404040  40404040  40404040  D7E3E2D7  F0F0F0F7*
02E3E7E3  400001C8  40400008  40400001  00000000  00000000  40404040
40404040  40404040  40404040  40404040  40404040  40404040  40404040
40404040  40404040  40404040  40404040  D7E3E2D7  F0F0F0F8*
02C5E2C4  40404040  40400010  40400003  D4E5C3C8  D9404040  02000000
40000000  40404040  40404040  40404040  40404040  40404040  40404040
40404040  40404040  40404040  40404040  D7E3E2D7  F0F0F0F9*
02E3E7E3  400001D4  40400004  40400001  00000000  40404040  40404040
40404040  40404040  40404040  40404040  40404040  40404040  40404040
40404040  40404040  40404040  40404040  D7E3E2D7  F0F0F1F0**
02E3E7E3  400001DC  40400008  40400001  00000000  00000000  40404040
40404040  40404040  40404040  40404040  40404040  40404040  40404040
40404040  40404040  40404040  40404040  D7E3E2D7  F0F0F1F1*
02C5E2C4  40404040  40400010  40400004  C9C2C3D6  D47B4040  02000000
40000000  40404040  40404040  40404040  40404040  40404040  40404040
40404040  40404040  40404040  40404040  D7E3E2D7  F0F0F1F2*
02E3E7E3  400001E8  40400004  40400001  00000000  40404040  40404040
40404040  40404040  40404040  40404040  40404040  40404040  40404040
40404040  40404040  40404040  40404040  D7E3E2D7  F0F0F1F3*
02C5E2C4  40404040  40400010  40400005  E2D7C2D9  C3D24040  02000000
40000000  40404040  40404040  40404040  40404040  40404040  40404040
40404040  40404040  40404040  40404040  D7E3E2D7  F0F0F1F4*
02E3E7E3  400001F0  4040000C  40400001  00000000  00000000  00000000
40404040  40404040  40404040  40404040  40404040  40404040  40404040
40404040  40404040  40404040  40404040  D7E3E2D7  F0F0F1F5*
02E3E7E3  40000220  40400038  40400001  5880D168  5890D150  58A0D154
58B0D170  2B007800  80046A00  D0C06000  D0B85820  D0BC5020  D1082B00
78008008  6A00D0C0  6000D0B8  5800D0BC  D7E3E2D7  F0F0F1F6*
02E3E7E3  40000258  40400038  40400001  5000D104  7800800C  7000D110
78008010  7000D10C  78008014  7000D12C  7820A004  7020D1A4  7B20B00C
30227920  90044730  D33E7820  A0087B20  D7E3E2D7  F0F0F1F7*
02E3E7E3  40000290  40400038  40400001  B0103022  79209004  4730D33E
5800D0C8  5000D100  18A258B0  D1801889  7800D0CC  7000D120  7800D0EC
7000D11C  59A0D108  4770D254  7800D110  D7E3E2D7  F0F0F1F8*
02E3E7E3  400002C8  40400038  40400001  7000D120  59A0D104  4770D264
7800D10C  7000D11C  185A5C40  D1881825  5A20D0DC  4102B000  5000D054
9280D054  58F0D164  4110D04C  05EF189A  D7E3E2D7  F0F0F1F9*
02E3E7E3  40000300  40400038  40400001  5A90D0D0  18795C60  D1881837

MEMBER NAME  PTSPL
5A30D0DC  4103B000  5000D060  9280D060  58F0D164  4110D058  05EF1835
5A30D18C  4103B000  5000D06C  9280D06C  D7E3E2D7  F0F0F2F0**
02E3E7E3  40000338  40400038  40400001  58F0D164  4110D064  05EF1837
5A30D18C  4103B000  5000D078  9280D078  58F0D164  4110D070  05EF1835
5A30D188  4103B000  5000D084  9280D084  D7E3E2D7  F0F0F2F1*
02E3E7E3  40000370  40400038  40400001  58F0D164  4110D07C  05EF58F0
D17C4110  D08805EF  18A95990  D10447C0  D2345880  D1685890  D15058A0
D15458B0  D1707820  B0147020  A0047820  D7E3E2D7  F0F0F2F2*
```

| | | | | | | |
|---|---|---|---|---|---|---|
| 02E3E7E3 | 400003A8 | 40400038 | 40400001 | B0187020 | A0081BFF | 58E0D000 |
| 07FE7820 | D1A47B20 | B0143022 | 79209004 | 4730D49C | 7820A008 | 7B20B018 |
| 30227920 | 90044730 | D49C5800 | D0D05000 | D7E3E2D7 | F0F0F2F3* | |
| 02E3E7E3 | 400003E0 | 40400038 | 40400001 | D1005820 | D1041A20 | 18725C60 |
| D1881837 | 5A30D0DC | 18475A40 | D18C1857 | 5A50D188 | 5860D190 | 18751884 |
| 189318A2 | 58B0D180 | 5830D150 | 5BA0D0D0 | D7E3E2D7 | F0F0F2F4* | |
| 02E3E7E3 | 40000418 | 40400038 | 40400001 | 1A761A86 | 1A9659A0 | D10847A0 |
| D3B247F0 | D4747800 | D0CC7000 | D1207800 | D0EC7000 | D11C59A0 | D1084770 |
| D3D27800 | D1107000 | D12059A0 | D1044770 | D7E3E2D7 | F0F0F2F5* | |
| 02E3E7E3 | 40000450 | 40400038 | 40400001 | D3E27800 | D10C7000 | D11C4109 |
| B0005000 | D0549280 | D05458F0 | D1644110 | D04C05EF | 185A5A50 | D0D05C40 |
| D1881825 | 5A20D0DC | 4102B000 | 5000D060 | D7E3E2D7 | F0F0F2F6* | |
| 02E3E7E3 | 40000488 | 40400038 | 40400001 | 9280D060 | 58F0D164 | 4110D058 |
| 05EF4108 | B0005000 | D06C9280 | D06C58F0 | D1644110 | D06405EF | 18255A20 |
| D18C4102 | B0005000 | D0789280 | D07858F0 | D7E3E2D7 | F0F0F2F7* | |
| 02E3E7E3 | 400004C0 | 40400038 | 40400001 | D1644110 | D07005EF | 4107B000 |
| 5000D084 | 9280D084 | 58F0D164 | 4110D07C | 05EF58F0 | D17C4110 | D08805EF |
| 47F0D39C | 5880D168 | 5890D150 | 58A0D154 | D7E3E2D7 | F0F0F2F8* | |
| 02E3E7E3 | 400004F8 | 40400038 | 40400001 | 58B0D170 | 7820B00C | 7020A004 |
| 7820B010 | 7020A008 | 1BFF58E0 | D00007FE | 58F0D178 | 45E0F004 | 00000006 |
| 00000028 | 45E0F008 | 0450D124 | 45E0F010 | D7E3E2D7 | F0F0F2F9* | |
| 02E3E7E3 | 40000530 | 40400038 | 40400001 | 41F00004 | 58E0D000 | 07FE58A0 |
| D00458E0 | A00C58B0 | A0185810 | B0105820 | D1245020 | 100018DA | 92FFA00C |
| 982CA01C | 07FE9879 | 10105820 | 70005020 | D7E3E2D7 | F0F0F3F0** | |
| 02E3E7E3 | 40000568 | 40400038 | 40400001 | D1245820 | 90005020 | D1285820 |
| 10004130 | 20004150 | 00041B25 | 5020D154 | 5030D158 | 58201004 | 41302000 |
| 41500004 | 1B255020 | D1705030 | D1745820 | D7E3E2D7 | F0F0F3F1* | |
| 02E3E7E3 | 400005A0 | 40400038 | 40400001 | 10084130 | 20004150 | 00041B25 |
| 5020D168 | 5030D16C | 5820100C | 41302000 | 41500004 | 1B255C40 | D0D41B25 |
| 5020D15C | 5030D160 | 5030D0B0 | 58201014 | D7E3E2D7 | F0F0F3F2* | |
| 02E3E7E3 | 400005D8 | 4040001C | 40400001 | 41302000 | 41500004 | 1B255C40 |
| D0E01B25 | 5020D180 | 5030D184 | 47F0D1A8 | 40404040 | 40404040 | 40404040 |
| 40404040 | 40404040 | 40404040 | 40404040 | D7E3E2D7 | F0F0F3F3* | |
| 02E3E7E3 | 40000020 | 40400008 | 40400001 | 0000055E | 00000078 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F3F4* | |
| 02E3E7E3 | 40000078 | 40400004 | 40400001 | 0000053A | 40404040 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F3F5* | |
| 02D9D3C4 | 40404040 | 40400038 | 40404040 | 00020001 | 0C0001C8 | 00030001 |
| 1C0001DC | 00040001 | 1C0001F0 | 00050001 | 1C0001F4 | 00010001 | 0C000520 |
| 00010001 | 0C000020 | 00010001 | 0C000024 | D7E3E2D7 | F0F0F3F6* | |
| 02E3E7E3 | 400000C4 | 40400028 | 40400001 | 00000160 | 000001B8 | 80000000 |
| 00000160 | 000001C0 | 80000000 | 00000160 | 000001A8 | 80000000 | 00000160 |
| 40404040 | 40404040 | 40404040 | 40404040 | D7E3E2D7 | F0F0F3F7* | |
| 02D9D3C4 | 40404040 | 40400038 | 40404040 | 00010001 | 0C000078 | 00010001 |
| 0C0000C4 | 00010001 | 0C0000C8 | 00010001 | 0C0000D0 | 00010001 | 0C0000D4 |
| 00010001 | 0C0000DC | 00010001 | 0C0000E0 | D7E3E2D7 | F0F0F3F8* | |
| 02E3E7E3 | 400000EC | 40400024 | 40400001 | 000001B0 | 80000000 | 00000154 |
| 0000018C | 80000000 | 000001B8 | 000001C0 | 0000018C | 000001A8 | 40404040 |

MEMBER NAME PTSPL

| | | | | | | |
|---|---|---|---|---|---|---|
| 40404040 | 40404040 | 40404040 | 40404040 | D7E3E2D7 | F0F0F3F9* | |
| 02D9D3C4 | 40404040 | 40400038 | 40404040 | 00010001 | 0C0000E8 | 00010001 |
| 0C0000EC | 00010001 | 0C0000F4 | 00010001 | 0C0000F8 | 00010001 | 0C000100 |
| 00010001 | 0C000104 | 00010001 | 0C000108 | D7E3E2D7 | F0F0F4F0** | |
| 02E3E7E3 | 40000110 | 40400018 | 40400001 | 000001B0 | 00000000 | 00000198 |
| 00000194 | 000001A4 | 00000178 | 40404040 | 40404040 | 40404040 | 40404040 |
| 40404040 | 40404040 | 40404040 | 40404040 | D7E3E2D7 | F0F0F4F1* | |

```
02E3E7E3  4000012C  40400004  40400001  8000019C  40404040  40404040
40404040  40404040  40404040  40404040  40404040  40404040  40404040
40404040  40404040  40404040  40404040  D7E3E2D7  F0F0F4F2*
02D9D3C4  40404040  40400038  40404040  00010001  0C00010C  00010001
0C000110  00020001  0C000114  00010001  0C000118  00010001  0C00011C
00010001  0C000120  00010001  0C000124  D7E3E2D7  F0F0F4F3*
02E3E7E3  40000200  40400020  40400001  00000014  0000000C  FFFFFFEC
00000000  00000000  00000000  00000000  00000000  40404040  40404040
40404040  40404040  40404040  40404040  D7E3E2D7  F0F0F4F4*
02D9D3C4  40404040  40400008  40404040  00010001  0C00012C  40404040
40404040  40404040  40404040  40404040  40404040  40404040  40404040
40404040  40404040  40404040  40404040  D7E3E2D7  F0F0F4F5*
02C5D5C4  40404040  40404040  40404040  40404040  40404040  40404040
000005F4  F1F5F7F3  F460C6D6  F34040F0  F2F0F2F8  F7F0F9F8  40F0F84B
F4F34BF0  F3404040  D7E3E2D7  D3404040  D7E3E2D7  F0F0F4F6**

MEMBER NAME  PUTMSG
02C5E2C4  40404040  40400010  40400001  D7E4E3D4  E2C74040  00000000
40000000  40404040  40404040  40404040  40404040  40404040  40404040
40404040  40404040  40404040  40404040  D7E4E3D4  F0F0F0F1*
02E3E7E3  40000000  40400038  40400001  47F0F00C  07D7E4E3  D4E2C740
90ECD00C  184D98CD  F0205040  D00450D0  400807FC  40404040  40404040
02100218  05100318  50220206  2A140122  D7E4E3D4  F0F0F0F2*
02E3E7E3  40000038  40400038  40400001  02100218  05100318  031A0FE4
D5C1C2D3  C540E3D6  40C3C8C1  C9D51832  22021002  18051003  18031A12
C5E7E3C5  D9C9D6D9  40E4D5C4  C5C6C9D5  D7E4E3D4  F0F0F0F3*
02E3E7E3  40000070  40400038  40400001  C5C41832  22021002  18051003
18031A0F  E4D5C1C2  D3C540E3  D640D6D9  C4C5D918  32220210  02180510
0318031A  0EC9D3D3  C5C7C1D3  40C3E4E3  D7E4E3D4  F0F0F0F4*
02E3E7E3  400000A8  40400006  40400001  D6E4E318  32224040  40404040
40404040  40404040  40404040  40404040  40404040  40404040  40404040
40404040  40404040  40404040  40404040  D7E4E3D4  F0F0F0F5*
02E3E7E3  40000100  40400020  40400001  00000000  00000001  00000002
00000003  00000004  0000002A  00000000  00000000  40404040  40404040
40404040  40404040  40404040  40404040  D7E4E3D4  F0F0F0F6*
02C5E2C4  40404040  40400010  40400002  C9C2C3D6  D47B4040  02000000
40000000  40404040  40404040  40404040  40404040  40404040  40404040
40404040  40404040  40404040  40404040  D7E4E3D4  F0F0F0F7*
02E3E7E3  40000138  40400004  40400001  00000000  40404040  40404040
40404040  40404040  40404040  40404040  40404040  40404040  40404040
40404040  40404040  40404040  40404040  D7E4E3D4  F0F0F0F8*
02E3E7E3  40000140  40400038  40400001  00000000  5880D088  58B0D064
58A0D054  5870D058  5860D05C  5800D080  1A0A5000  D0805800  D0781200
4780D0E0  59A0D078  4780D138  5970D078  D7E4E3D4  F0F0F0F9*
02E3E7E3  40000178  40400038  40400001  4780D190  5960D078  4780D1E8
5800D078  5900D060  4780D240  58F0D090  45E0F004  00000000  00000028
45E0F008  0450D074  45E0F008  0450D07C  D7E4E3D4  F0F0F1F0**
02E3E7E3  400001B0  40400038  40400001  45E0F010  58F0D090  45E0F000
00000000  00000032  189A185B  5C40D080  18391A35  45E0F008  01238000
879AD116  45E0F010  1BFF58E0  D00007FE  D7E4E3D4  F0F0F1F1*
02E3E7E3  400001E8  40400038  40400001  58F0D090  45E0F004  00000000
00000038  45E0F008  0450D074  45E0F008  0450D07C  45E0F010  58F0D090
45E0F000  00000000  00000032  189A185B  D7E4E3D4  F0F0F1F2*
02E3E7E3  40000220  40400038  40400001  5C40D080  18391A35  45E0F008
01238000  879AD16E  45E0F010  1BFF58E0  D00007FE  58F0D090  45E0F004
00000000  00000055  45E0F008  0450D074  D7E4E3D4  F0F0F1F3*
02E3E7E3  40000258  40400038  40400001  45E0F008  0450D07C  45E0F010
58F0D090  45E0F000  00000000  00000032  189A185B  5C40D080  18391A35
45E0F008  01238000  879AD1C6  45E0F010  D7E4E3D4  F0F0F1F4*
```

```
02E3E7E3  40000290  40400018  40400001  1BFF58E0  D00007FE  58F0D090
45E0F004  00000000  00000075  40404040  40404040  40404040  40404040
40404040  40404040  40404040  40404040  D7E4E3D4  F0F0F1F5*
02D9D3C4  40404040  40400038  40404040  00020001  1C000140  00010001
0C00019C  00010001  0C0001C0  00010001  0C0001F4  00010001  0C000218
00010001  0C00024C  00010001  0C000270  D7E4E3D4  F0F0F1F6*
02E3E7E3  400002A8  40400038  40400001  45E0F008  0450D074  45E0F008
0450D07C  45E0F010  58F0D090  45E0F000  00000000  00000032  189A185B
5C40D080  18391A35  45E0F008  01238000  D7E4E3D4  F0F0F1F7*
02E3E7E3  400002E0  40400038  40400001  879AD21E  45E0F010  1BFF58E0
D00007FE  58F0D090  45E0F004  00000000  00000092  45E0F008  0450D074
45E0F008  0450D07C  45E0F010  58F0D090  D7E4E3D4  F0F0F1F8*
02E3E7E3  40000318  40400038  40400001  45E0F000  00000000  00000032
189A185B  5C40D080  18391A35  45E0F008  01238000  879AD276  45E0F010
1BFF58E0  D00007FE  58A0D004  58E0A00C  D7E4E3D4  F0F0F1F9*
02E3E7E3  40000350  40400038  40400001  58B0A018  5810B010  5820D080

MEMBER NAME  PUTMSG
50201000  18DA92FF  A00C982C  A01C07FE  987B1000  58207000  5020D078
58208000  5020D074  58209000  5020D07C  D7E4E3D4  F0F0F2F0**
02E3E7E3  40000388  4040002C  40400001  58701010  58207000  5020D080
5820100C  41302000  41500001  1B255C40  D0641B25  5020D088  5030D08C
47F0D094  40404040  40404040  40404040  D7E4E3D4  F0F0F2F1*
02E3E7E3  40000020  40400008  40400001  0000036C  000000B0  40404040
40404040  40404040  40404040  40404040  40404040  40404040  40404040
40404040  40404040  40404040  40404040  D7E4E3D4  F0F0F2F2*
02E3E7E3  400000B0  40400004  40400001  00000348  40404040  40404040
40404040  40404040  40404040  40404040  40404040  40404040  40404040
40404040  40404040  40404040  40404040  D7E4E3D4  F0F0F2F3*
02D9D3C4  40404040  40400038  40404040  00010001  0C0002A4  00010001
0C0002C8  00010001  0C0002FC  00010001  0C000320  00010001  0C000020
00010001  0C000024  00010001  0C0000B0  D7E4E3D4  F0F0F2F4*
02C5D5C4  40404040  40404040  40404040  40404040  40404040  40404040
000003B4  F1F5F7F3  F460C6D6  F34040F0  F2F0F2F8  F7F0F9F8  40F0F84B
F4F34BF0  F8404040  D7E4E3D4  E2C74040  D7E4E3D4  F0F0F2F5**

MEMBER NAME  QUAD
02C5E2C4  40404040  40400010  40400001  D8E4C1C4  40404040  00000000
40000000  40404040  40404040  40404040  40404040  40404040  40404040
40404040  40404040  40404040  40404040  D8E4C1C4  F0F0F0F1*
02E3E7E3  40000000  40400028  40400001  47F0F00C  07D8E4C1  C4404040
90ECD00C  184D98CD  F0205040  D00450D0  400807FC  40404040  40404040
40404040  40404040  40404040  40404040  D8E4C1C4  F0F0F0F2*
02E3E7E3  40000080  40400038  40400001  00000000  00000000  41100000
00000000  3CA7C5AC  00000000  41400000  00000000  41200000  00000000
00000000  00000000  00000001  00000002  D8E4C1C4  F0F0F0F3*
02E3E7E3  400000B8  4040001C  40400001  3CA7C5AC  3D68DB8C  41100000
41200000  41400000  00000000  00000000  40404040  40404040  40404040
40404040  40404040  40404040  40404040  D8E4C1C4  F0F0F0F4*
02C5E2C4  40404040  40400010  40400002  C4E2D8D9  E3404040  02000000
40000000  40404040  40404040  40404040  40404040  40404040  40404040
40404040  40404040  40404040  40404040  D8E4C1C4  F0F0F0F5*
02E3E7E3  40000120  40400004  40400001  00000000  40404040  40404040
40404040  40404040  40404040  40404040  40404040  40404040  40404040
40404040  40404040  40404040  40404040  D8E4C1C4  F0F0F0F6*
02E3E7E3  40000128  40400004  40400001  00000000  40404040  40404040
40404040  40404040  40404040  40404040  40404040  40404040  40404040
40404040  40404040  40404040  40404040  D8E4C1C4  F0F0F0F7*
02E3E7E3  4000013C  40400038  40400001  58B0D0F8  58A0D088  5890D080
```

```
5090D0AC  6800D058  6000B008  6800D058  6000B010  6840D0C0  20446820
D0C82022  7020D0B8  7940D090  4730D19A  D8E4C1C4  F0F0F0F8*
02E3E7E3  40000174  40400038  40400001  7920D090  4730D15C  1BFF58E0
D00007FE  6820D0D0  6D20D0C8  23226020  D0D82222  4750D178  6920D060
47C0D180  1BFF58E0  D00007FE  50A0D0AC  D8E4C1C4  F0F0F0F9*
02E3E7E3  400001AC  40400038  40400001  182A8920  00036800  D0D86002
B0001BFF  58E0D000  07FE6820  D0C82C22  6840D070  6C40D0C0  6C40D0D0
2B246020  D0E847A0  D1BE1BFF  58E0D000  D8E4C1C4  F0F0F1F0**
02E3E7E3  400001E4  40400038  40400001  07FE6820  D0E82022  7920D094
4750D292  6820D0C8  2C226840  D0706C40  D0C06C40  D0D02B24  6020D108
58F0D100  4110D04C  05EF6820  D0C82A20  D8E4C1C4  F0F0F1F1*
02E3E7E3  4000021C  40400038  40400001  6840D078  6C40D0C0  2D242322
6020D0D8  22224750  D2266920  D0604730  D2265800  D0AC1A0A  5000D0AC
18208920  00036022  B0006820  D0C82C22  D8E4C1C4  F0F0F1F2*
02E3E7E3  40000254  40400038  40400001  6840D070  6C40D0C0  6C40D0D0
2B246020  D10858F0  D1004110  D05005EF  28206B20  D0C86840  D0786C40
D0C02D24  6020D0D8  22224750  D26A6920  D8E4C1C4  F0F0F1F3*
02E3E7E3  4000028C  40400038  40400001  D06047C0  D2721BFF  58E0D000
07FE5800  D0AC1A0A  5000D0AC  18208920  00036800  D0D86002  B0001BFF
58E0D000  07FE6840  D0786C40  D0C06820  D8E4C1C4  F0F0F1F4*
02E3E7E3  400002C4  40400038  40400001  D0C82D24  23226020  D0D82222
4750D2B4  6920D060  47C0D2BC  1BFF58E0  D00007FE  50A0D0AC  182A8920
00036800  D0D86002  B0001BFF  58E0D000  D8E4C1C4  F0F0F1F5*
02E3E7E3  400002FC  40400038  40400001  07FE58A0  D00458E0  A00C58B0
A0185810  B0006820  D0C06020  10005820  B0046840  D0C86040  20005830
B0086860  D0D06060  30005840  B0105850  D8E4C1C4  F0F0F1F6*
02E3E7E3  40000334  40400038  40400001  D0AC5050  400018DA  92FFA00C
982CA01C  07FE987B  10006820  70006020  D0C06820  80006020  D0C86820
90006020  D0D05870  10105820  70005020  D8E4C1C4  F0F0F1F7*
02E3E7E3  4000036C  4040001C  40400001  D0AC5820  100C4130  20004150
00081B25  5020D0F8  5030D0FC  47F0D114  40404040  40404040  40404040
40404040  40404040  40404040  40404040  D8E4C1C4  F0F0F1F8*
02E3E7E3  40000020  4040000C  40400001  00000346  00000028  000002FE
40404040  40404040  40404040  40404040  40404040  40404040  40404040
40404040  40404040  40404040  40404040  D8E4C1C4  F0F0F1F9*
02E3E7E3  40000074  40400008  40400001  80000130  80000130  40404040

MEMBER NAME  QUAD
40404040  40404040  40404040  40404040  40404040  40404040  40404040
40404040  40404040  40404040  40404040  D8E4C1C4  F0F0F2F0**
02E3E7E3  4000012C  40400010  40400001  00000000  00000000  00000000
00000000  40404040  40404040  40404040  40404040  40404040  40404040
40404040  40404040  40404040  40404040  D8E4C1C4  F0F0F2F1*
02D9D3C4  40404040  40400030  40404040  00020001  1C000128  00010001
0C000020  00010001  0C000024  00010001  0C000028  00010001  0C000074
00010001  0C000078  40404040  40404040  D8E4C1C4  F0F0F2F2*
02C5D5C4  40404040  40404040  40404040  40404040  40404040  40404040
00000388  F1F5F7F3  F460C6D6  F34040F0  F2F0F2F8  F7F0F9F8  40F0F84B
F4F34BF1  F2404040  D8E4C1C4  40404040  D8E4C1C4  F0F0F2F3**

MEMBER NAME  RANGE
02C5E2C4  40404040  40400010  40400001  D9C1D5C7  C5404040  00000000
40000000  40404040  40404040  40404040  40404040  40404040  40404040
40404040  40404040  40404040  40404040  D9C1D5C7  F0F0F0F1*
02E3E7E3  40000000  40400028  40400001  47F0F00C  07D9C1D5  C7C54040
90ECD00C  184D98CD  F0205040  D00450D0  400807FC  40404040  40404040
40404040  40404040  40404040  40404040  D9C1D5C7  F0F0F0F2*
02C5E2C4  40404040  40400010  40400002  C3C8C5C3  D2404040  02000000
40000000  40404040  40404040  40404040  40404040  40404040  40404040
```

```
40404040  40404040  40404040  40404040  D9C1D5C7  F0F0F0F3*
02E3E7E3  400000A8  40400030  40400001  00000000  00000000  00000001
00000001  00000002  00000005  0000000D  0000000E  00000038  40E66666
00000000  00000000  40404040  40404040  D9C1D5C7  F0F0F0F4*
02C5E2C4  40404040  40400010  40400003  D4E5C3C8  D9404040  02000000
40000000  40404040  40404040  40404040  40404040  40404040  40404040
40404040  40404040  40404040  40404040  D9C1D5C7  F0F0F0F5*
02E3E7E3  40000148  4040000C  40400001  00000000  00000000  00000000
40404040  40404040  40404040  40404040  40404040  40404040  40404040
40404040  40404040  40404040  40404040  D9C1D5C7  F0F0F0F6*
02C5E2C4  40404040  40400010  40400004  D4E5C3C8  D9D34040  02000000
40000000  40404040  40404040  40404040  40404040  40404040  40404040
40404040  40404040  40404040  40404040  D9C1D5C7  F0F0F0F7*
02E3E7E3  40000158  40400004  40400001  00000000  40404040  40404040
40404040  40404040  40404040  40404040  40404040  40404040  40404040
40404040  40404040  40404040  40404040  D9C1D5C7  F0F0F0F8*
02E3E7E3  40000160  40400004  40400001  00000000  40404040  40404040
40404040  40404040  40404040  40404040  40404040  40404040  40404040
40404040  40404040  40404040  40404040  D9C1D5C7  F0F0F0F9*
02E3E7E3  400001CC  40400038  40400001  58B0D150  58A0D08C  5800D0C0
5000D0D8  50A0D0B0  50B0D188  5800D14C  5000D184  50B0D18C  50B0D190
5800D19C  5000D194  5800D1A0  5000D198  D9C1D5C7  F0F0F1F0**
02E3E7E3  40000204  40400038  40400001  5880D0A0  5890D148  18BA58A0
D13058E0  D194585E  A0005050  D0C458E0  D198587E  A0005070  D0D01C68
5070D180  1C481827  1A291835  1A391893  D9C1D5C7  F0F0F1F1*
02E3E7E3  4000023C  40400038  40400001  18A818B2  5880D128  78098000
32004780  D22A47F0  D242879A  D21C58A0  D13058B0  D08C5890  D1485880
D0A047F0  D44658A0  D13058B0  D08C5890  D9C1D5C7  F0F0F1F2*
02E3E7E3  40000274  40400038  40400001  D1485880  D0A05800  D1805A00
D1585000  D16C1858  5C40D0C4  18255A20  D1581A59  5050D170  5850D180
1A595830  D0D05B30  D0C41813  1C085010  D9C1D5C7  F0F0F1F3*
02E3E7E3  400002AC  40400038  40400001  D1785870  D0C41A7B  1C681847
5A40D158  18341845  5850D170  5860D16C  18725880  D0C418AB  58B0D0D0
5890D128  41069000  5000D04C  41079000  D9C1D5C7  F0F0F1F4*
02E3E7E3  400002E4  40400038  40400001  5000D050  58F0D120  4110D04C
05EF4120  00015720  D0BC1BFF  872FD2DC  47F0D348  78259000  7020D15C
32224780  D2F67924  90004770  D2F647F0  D9C1D5C7  F0F0F1F5*
02E3E7E3  4000031C  40400038  40400001  D3484107  90005000  D0609280
D06058F0  D1244110  D05805EF  5800D178  5000D0DC  41079000  5000D068
41039000  5000D06C  9280D06C  58F0D138  D9C1D5C7  F0F0F1F6*
02E3E7E3  40000354  40400038  40400001  4110D064  05EF4106  90005000
D07458F0  D1244110  D07005EF  878AD2B0  58A0D130  58B0D08C  5890D148
5880D0A0  5800D0D0  1B0B5000  D0D45800  D9C1D5C7  F0F0F1F7*
02E3E7E3  4000038C  40400038  40400001  D0805000  D0C85090  D13C5800
D14C5A00  D1905000  D1545860  D150187B  5880D0C4  58B0D0D8  7840D0A4
18585C40  D0A01825  5A20D148  58F0D128  D9C1D5C7  F0F0F1F8*
02E3E7E3  400003C4  40400038  40400001  7862F000  18981A97  18595C40
D0A01835  5A30D148  7963F000  4770D40A  39644750  D40A5800  D0C81BFF
860FD3EC  58E0D154  508EA000  5800D088  D9C1D5C7  F0F0F1F9*
02E3E7E3  400003FC  40400038  40400001  5000D0C8  1AB7185B  1C461835

MEMBER NAME  RANGE
5A30D158  5093A000  47F0D40A  185B1C46  18255A20  D14C5082  A0001AB7
185B1C46  18255A20  D1585092  A0001889  D9C1D5C7  F0F0F2F0**
02E3E7E3  40000434  40400038  40400001  5990D0D4  47C0D38C  50B0D0D8
58B0D08C  5890D148  5880D0A0  5800D0C8  1BFF870F  D4465820  D0D41A2B
5850D0D8  5C40D188  18355A30  D1845023  D9C1D5C7  F0F0F2F1*
02E3E7E3  4000046C  40400038  40400001  A0005820  D0B01A2B  5020D0B0
5800D190  5A00D150  5000D190  5800D198  5A00D150  5000D198  5800D194
```

```
5A00D150  5000D194  5920D0C0  47C0D1EA  D9C1D5C7  F0F0F2F2*
02E3E7E3  400004A4  40400038  40400001  58B0D150  58A0D08C  5800D0D8
5000D0C0  1BFF58E0  D00007FE  58A0D004  58E0A00C  58B0A018  5810B00C
5820D0C0  50201000  18DA92FF  A00C982C  D9C1D5C7  F0F0F2F3*
02E3E7E3  400004DC  40400038  40400001  A01C07FE  98791004  58207000
5020D0CC  58209000  5020D0C0  58201000  41302000  41500004  1B255C40
D09C1B25  5020D128  5030D12C  58201008  D9C1D5C7  F0F0F2F4*
02E3E7E3  40000514  4040001C  40400001  41302000  41500004  1B255C40
D0941B25  5020D130  5030D134  47F0D1A4  40404040  40404040  40404040
40404040  40404040  40404040  40404040  D9C1D5C7  F0F0F2F5*
02E3E7E3  40000020  4040000C  40400001  000004E0  00000028  000004BC
40404040  40404040  40404040  40404040  40404040  40404040  40404040
40404040  40404040  40404040  40404040  D9C1D5C7  F0F0F2F6*
02E3E7E3  4000007C  40400008  40400001  800000E4  000000C8  40404040
40404040  40404040  40404040  40404040  40404040  40404040  40404040
40404040  40404040  40404040  40404040  D9C1D5C7  F0F0F2F7*
02D9D3C4  40404040  40400038  40404040  00020001  1C000148  00030001
1C00014C  00040001  1C000160  00010001  0C000020  00010001  0C000024
00010001  0C000028  00010001  0C00007C  D9C1D5C7  F0F0F2F8*
02E3E7E3  40000084  4040000C  40400001  0000010C  80000000  00000104
40404040  40404040  40404040  40404040  40404040  40404040  40404040
40404040  40404040  40404040  40404040  D9C1D5C7  F0F0F2F9*
02E3E7E3  40000094  40400008  40400001  80000000  000000C8  40404040
40404040  40404040  40404040  40404040  40404040  40404040  40404040
40404040  40404040  40404040  40404040  D9C1D5C7  F0F0F3F0**
02E3E7E3  400000A0  40400004  40400001  8000010C  40404040  40404040
40404040  40404040  40404040  40404040  40404040  40404040  40404040
40404040  40404040  40404040  40404040  D9C1D5C7  F0F0F3F1*
02E3E7E3  40000164  40400038  40400001  00000000  00000000  00000000
00000034  00000008  00000014  00000000  00000004  00000000  00000000
00000000  00000000  00B80007  00000000  D9C1D5C7  F0F0F3F2*
02E3E7E3  4000019C  40400030  40400001  007C0007  02180007  00000000
00A00008  00880008  008C0008  00000000  00A40009  01C00009  01C40009
00000018  0000001C  40404040  40404040  D9C1D5C7  F0F0F3F3*
02D9D3C4  40404040  40400028  40404040  00010001  0C000080  00010001
0C000084  00010001  0C00008C  00010001  0C000098  00010001  0C0000A0
40404040  40404040  40404040  40404040  D9C1D5C7  F0F0F3F4*
02C5D5C4  40404040  40404040  40404040  40404040  40404040  40404040
00000530  F1F5F7F3  F460C6D6  F34040F0  F2F0F2F8  F7F0F9F8  40F0F84B
F4F34BF1  F6404040  D9C1D5C7  C5404040  D9C1D5C7  F0F0F3F5**

MEMBER NAME  RELSPL
02C5E2C4  40404040  40400010  40400001  D9C5D3E2  D7D34040  00000000
40000000  40404040  40404040  40404040  40404040  40404040  40404040
40404040  40404040  40404040  40404040  D9C5D3E2  F0F0F0F1*
02E3E7E3  40000000  40400028  40400001  47F0F00C  07D9C5D3  E2D7D340
90ECD00C  184D98CD  F0205040  D00450D0  400807FC  40404040  40404040
40404040  40404040  40404040  40404040  D9C5D3E2  F0F0F0F2*
02C5E2C4  40404040  40400010  40400002  40404040  40404040  05000000
40000640  40404040  40404040  40404040  40404040  40404040  40404040
40404040  40404040  40404040  40404040  D9C5D3E2  F0F0F0F3*
02E3E7E3  40000078  40400028  40400001  4E000000  00000000  4E000000
80000000  00000001  00000002  00000003  00000004  00000000  00000000
40404040  40404040  40404040  40404040  D9C5D3E2  F0F0F0F4*
02E3E7E3  400000B8  40400038  40400001  FFFFFFFC  58B0D090  5800D07C
5700D05C  5000D054  6820D050  6B20D058  5820D080  89200002  7022B640
5820D080  89200002  7800D088  7002B644  D9C5D3E2  F0F0F0F5*
02E3E7E3  400000F0  40400038  40400001  5800D078  5700D05C  5000D054
6820D050  6B20D058  5820D080  89200002  7022B648  5820D080  89200002
```

```
7800D084  7002B64C  1BFF58E0  D00007FE  D9C5D3E2  F0F0F0F6*
02E3E7E3  40000128  40400038  40400001  58D0D004  58E0D00C  92FFD00C
982CD01C  07FE987B  10005820  70005020  D0805820  80005020  D07C5820
90005020  D0787820  A0007020  D0887820  D9C5D3E2  F0F0F0F7*
02E3E7E3  40000160  4040000A  40400001  B0007020  D08447F0  D0944040
40404040  40404040  40404040  40404040  40404040  40404040  40404040
40404040  40404040  40404040  40404040  D9C5D3E2  F0F0F0F8*
02E3E7E3  40000020  4040000C  40400001  0000013A  00000028  00000128
40404040  40404040  40404040  40404040  40404040  40404040  40404040
40404040  40404040  40404040  40404040  D9C5D3E2  F0F0F0F9*
02D9D3C4  40404040  40400020  40404040  00020001  0C0000B8  00010001
0C000020  00010001  0C000024  00010001  0C000028  40404040  40404040
40404040  40404040  40404040  40404040  D9C5D3E2  F0F0F1F0**
02C5D5C4  40404040  40404040  40404040  40404040  40404040  40404040
0000016A  F1F5F7F3  F460C6D6  F34040F0  F2F0F2F8  F7F0F9F8  40F0F84B
F4F34BF2  F1404040  D9C5D3E2  D7D34040  D9C5D3E2  F0F0F1F1**

MEMBER NAME  RETFMT
02C5E2C4  40404040  40400010  40400001  D9C5E3C6  D4E34040  00000000
40000000  40404040  40404040  40404040  40404040  40404040  40404040
40404040  40404040  40404040  40404040  D9C5E3C6  F0F0F0F1*
02E3E7E3  40000000  40400038  40400001  47F0F00C  07D9C5E3  C6D4E340
90ECD00C  184D98CD  F0205040  D00450D0  400807FC  40404040  40404040
021A20C6  D6D9D4C1  E340D4D6  C4C5D340  D9C5E3C6  F0F0F0F2*
02E3E7E3  40000038  40400038  40400001  D5D6E340  C6D6E4D5  C440C6D6
D940C4C1  E2C84010  03183222  02063214  0122021A  2C404040  E6C1D9D5
C9D5C77A  40C6D6D9  D4C1E340  D4D6C4C5  D9C5E3C6  F0F0F0F3*
02E3E7E3  40000070  40400018  40400001  D340D5D6  E340C6D6  E4D5C440
C6D6D940  C4C1E2C8  40100322  40404040  40404040  40404040  40404040
40404040  40404040  40404040  40404040  D9C5E3C6  F0F0F0F4*
02C5E2C4  40404040  40400010  40400002  D9D4D6C4  C5D34040  05000000
40000018  40404040  40404040  40404040  40404040  40404040  40404040
40404040  40404040  40404040  40404040  D9C5E3C6  F0F0F0F5*
02E3E7E3  400001A0  40400030  40400001  00000001  00000001  00000002
00000004  00000005  00000006  00000008  00000028  00000032  0000003C
00000000  00000000  40404040  40404040  D9C5E3C6  F0F0F0F6*
02C5E2C4  40404040  40400010  40400003  C7D9E4D7  40404040  05000000
4000000C  40404040  40404040  40404040  40404040  40404040  40404040
40404040  40404040  40404040  40404040  D9C5E3C6  F0F0F0F7*
02C5E2C4  40404040  40400010  40400004  E5F9F940  40404040  05000000
4000003C  40404040  40404040  40404040  40404040  40404040  40404040
40404040  40404040  40404040  40404040  D9C5E3C6  F0F0F0F8*
02C5E2C4  40404040  40400010  40400005  C6D4E3C5  D9D94040  05000000
40002D58  40404040  40404040  40404040  40404040  40404040  40404040
40404040  40404040  40404040  40404040  D9C5E3C6  F0F0F0F9*
02C5E2C4  40404040  40400010  40400006  D5C1D4C5  40404040  02000000
40000000  40404040  40404040  40404040  40404040  40404040  40404040
40404040  40404040  40404040  40404040  D9C5E3C6  F0F0F1F0**
02C5E2C4  40404040  40400010  40400007  C3C1C4C5  E3404040  02000000
40000000  40404040  40404040  40404040  40404040  40404040  40404040
40404040  40404040  40404040  40404040  D9C5E3C6  F0F0F1F1*
02C5E2C4  40404040  40400010  40400008  C3C1C4D7  E3404040  02000000
40000000  40404040  40404040  40404040  40404040  40404040  40404040
40404040  40404040  40404040  40404040  D9C5E3C6  F0F0F1F2*
02E3E7E3  40000238  40400020  40400001  FFFFFFFF  00000000  FFFFFFFC
FFFFFFC3  00002551  00000000  00000000  00000000  40404040  40404040
40404040  40404040  40404040  40404040  D9C5E3C6  F0F0F1F3*
02D9D3C4  40404040  40400038  40404040  00020001  0C000238  00030001
0C00023C  00040001  0C000240  00050001  0C000244  00050001  0C000248
```

| | | | | | | |
|---|---|---|---|---|---|---|
| 00060001 | 1C00024C | 00070001 | 1C000250 | D9C5E3C6 | F0F0F1F4* | |
| 02C5E2C4 | 40404040 | 40400010 | 40400009 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F5* | |
| 02C5E2C4 | 40404040 | 40400010 | 4040000A | C5D9C1E2 | C5404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F6* | |
| 02C5E2C4 | 40404040 | 40400010 | 4040000B | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F7* | |
| 02C5E2C4 | 40404040 | 40400010 | 4040000C | D5E2C3C8 | E3404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F8* | |
| 02C5E2C4 | 40404040 | 40400010 | 4040000D | C3C1C4C6 | C9D34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F9* | |
| 02C5E2C4 | 40404040 | 40400010 | 4040000E | C3C1C4D5 | D4C54040 | 02000000 |

MEMBER NAME RETFMT

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | D9C5E3C6 | F0F0F2F0** | |
| 02C5E2C4 | 40404040 | 40400010 | 4040000F | C6D4E3C9 | D5E34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F1* | |
| 02E3E7E3 | 40000258 | 4040001C | 40400001 | 00000000 | 00000000 | 00000000 |
| 00000000 | 00000000 | 00000000 | 00000000 | 40404040 | 40404040 | 40404040 |
| 40404040 | 40404040 | 40404040 | 40404040 | D9C5E3C6 | F0F0F2F2* | |
| 02D9D3C4 | 40404040 | 40400038 | 40404040 | 00080001 | 1C000254 | 00090001 |
| 1C000258 | 000A0001 | 1C00025C | 000B0001 | 1C000260 | 000C0001 | 1C000264 |
| 000D0001 | 1C000268 | 000E0001 | 1C00026C | D9C5E3C6 | F0F0F2F3* | |
| 02C5E2C4 | 40404040 | 40400010 | 40400010 | C6D4E3E5 | C5D94040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F4* | |
| 02C5E2C4 | 40404040 | 40400010 | 40400011 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F5* | |
| 02C5E2C4 | 40404040 | 40400010 | 40400012 | D4D6C4E2 | D9E34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F6* | |
| 02E3E7E3 | 40000274 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D9C5E3C6 | F0F0F2F7* | |
| 02E3E7E3 | 40000228 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D9C5E3C6 | F0F0F2F8* | |
| 02E3E7E3 | 40000280 | 40400038 | 40400001 | 5870D1C0 | 5890D1B4 | 58A0D1B8 |
| 5860D134 | 5830D138 | 5800D158 | 10005000 | D17058F0 | D1F44110 | D06405EF |
| 58F0D1D8 | 4110D084 | 05EF58F0 | D1D84110 | D9C5E3C6 | F0F0F2F9* | |
| 02E3E7E3 | 400002B8 | 40400038 | 40400001 | D09005EF | 58F0D1D0 | 4110D09C |
| 05EF58B0 | D12458F0 | D1E04110 | D0A805EF | 59B0D184 | 4780D242 | 5800D184 |
| 5900D11C | 4770D32E | 5800D160 | 5900D11C | D9C5E3C6 | F0F0F3F0** | |
| 02E3E7E3 | 400002F0 | 40400038 | 40400001 | 4770D2EC | 5880702F | 58F0D1E8 |
| 4110D0B4 | 05EF58F0 | D1CC4110 | D0C405EF | 41E00004 | 15FE4720 | D29458EF |
| D04C07FE | 58F0D1C4 | 4110D0CC | 05EF41E0 | D9C5E3C6 | F0F0F3F1* | |
| 02E3E7E3 | 40000328 | 40400038 | 40400001 | 000415FE | 4720D2AE | 58EFD054 |
| 07FE58F0 | D1C81B11 | 05EF58F0 | D1D44110 | D0D005EF | 41E00004 | 15FE4720 |
| D2D058EF | D05C07FE | 5800D158 | 10005000 | D9C5E3C6 | F0F0F3F2* | |
| 02E3E7E3 | 40000360 | 40400038 | 40400001 | D14C58F0 | D1EC4110 | D0DC05EF |
| 5980702F | 4750D3BC | 4800A03C | 5000D180 | 58F0D1F4 | 4110D0F0 | 05EF58F0 |

```
D1D84110  D08405EF  58F0D1D8  4110D090  D9C5E3C6  F0F0F3F3*
02E3E7E3  40000398  40400038  40400001  05EF58F0  D1E44110  D09C05EF
58F0D1DC  4110D110  05EF1BFF  58E0D000  07FE5820  78035A20  D11C5020
78031926  47C0D348  1BFF58E0  D00007FE  D9C5E3C6  F0F0F3F4*
02E3E7E3  400003D0  40400038  40400001  5800D158  10005000  D14C58F0
D1F01800  45E0F004  00000000  00000028  45E0F008  0450D14C  45E0F010
58F0D1F0  45E0F000  00000000  00000050  D9C5E3C6  F0F0F3F5*
02E3E7E3  40000408  40400038  40400001  18535C40  780345E0  F1340001
00000125  70010100  00320000  000145E0  F01058F0  D1F01800  45E0F004
00000006  00000056  45E0F008  0450D14C  D9C5E3C6  F0F0F3F6*
02E3E7E3  40000440  40400038  40400001  45E0F010  5800D118  5000D168
41F00004  58E0D000  07FE58A0  D00458E0  A00C58B0  A0185810  B0005820
D1585020  10005830  B0045840  D1645040  D9C5E3C6  F0F0F3F7*
02E3E7E3  40000478  40400038  40400001  30005850  B00C5860  D1685060
500018DA  92FFA00C  982CA01C  07FE987A  10005820  70005020  D1585820
80005020  D1645820  90005020  D1605820  D9C5E3C6  F0F0F3F8*
02E3E7E3  400004B0  4040000A  40400001  A0005020  D16847F0  D1F84040
40404040  40404040  40404040  40404040  40404040  40404040  40404040

MEMBER NAME  RETFMT
40404040  40404040  40404040  40404040  D9C5E3C6  F0F0F3F9*
02E3E7E3  40000020  40400004  40400001  00000492  40404040  40404040
40404040  40404040  40404040  40404040  40404040  40404040  40404040
40404040  40404040  40404040  40404040  D9C5E3C6  F0F0F4F0**
02D9D3C4  40404040  40400038  40404040  000F0001  1C000270  00100001
1C000274  00110001  1C000278  00120001  1C00027C  00010001  0C0003E8
00010001  0C000404  00010001  0C000434  D9C5E3C6  F0F0F4F1*
02E3E7E3  40000024  40400004  40400001  00000088  40404040  40404040
40404040  40404040  40404040  40404040  40404040  40404040  40404040
40404040  40404040  40404040  40404040  D9C5E3C6  F0F0F4F2*
02E3E7E3  40000088  40400004  40400001  00000456  40404040  40404040
40404040  40404040  40404040  40404040  40404040  40404040  40404040
40404040  40404040  40404040  40404040  D9C5E3C6  F0F0F4F3*
02E3E7E3  400000D4  40400014  40400001  0000031C  00000336  00000336
00000336  00000358  40404040  40404040  40404040  40404040  40404040
40404040  40404040  40404040  40404040  D9C5E3C6  F0F0F4F4*
02D9D3C4  40404040  40400038  40404040  00010001  0C000020  00010001
0C000024  00010001  0C000088  00010001  0C0000D4  00010001  0C0000D8
00010001  0C0000DC  00010001  0C0000E0  D9C5E3C6  F0F0F4F5*
02E3E7E3  400000E8  4040001C  40400001  00000358  000001B4  000001E4
000001F8  000001EC  00000200  00000208  40404040  40404040  40404040
40404040  40404040  40404040  40404040  D9C5E3C6  F0F0F4F6*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  D9C5E3C6  F0F0F4F7*
02E3E7E3  40000104  4040001C  40400001  000001D8  80000214  000001AC
000001F4  80000000  000001B8  00000230  40404040  40404040  40404040
40404040  40404040  40404040  40404040  D9C5E3C6  F0F0F4F8*
02D9D3C4  40404040  40400038  40404040  00010001  0C000100  00010001
0C000104  00010001  0C000108  00010001  0C00010C  00010001  0C000110
00030001  0C000114  00010001  0C000118  D9C5E3C6  F0F0F4F9*
02E3E7E3  40000120  4040001C  40400001  80000004  00000214  00000230
800001F4  000001A4  0000020C  80000204  40404040  40404040  40404040
40404040  40404040  40404040  40404040  D9C5E3C6  F0F0F5F0**
02D9D3C4  40404040  40400038  40404040  00010001  0C00011C  00030001
0C000120  00010001  0C000124  00010001  0C000128  00010001  0C00012C
00010001  0C000130  00010001  0C000134  D9C5E3C6  F0F0F5F1*
02E3E7E3  4000013C  4040001C  40400001  00000008  00000034  00000038
8000003A  000001A8  80000228  800001DC  40404040  40404040  40404040
```

```
40404040  40404040  40404040  40404040  D9C5E3C6  F0F0F5F2*
02D9D3C4  40404040  40400038  40404040  00010001  0C000138  00040001
0C00013C  00040001  0C000140  00040001  0C000144  00040001  0C000148
00010001  0C00014C  00010001  0C000150  D9C5E3C6  F0F0F5F3*
02E3E7E3  40000158  4040001C  40400001  000001DC  000001DC  800001A4
00000008  00000034  00000038  0000003A  40404040  40404040  40404040
40404040  40404040  40404040  40404040  D9C5E3C6  F0F0F5F4*
02D9D3C4  40404040  40400038  40404040  00010001  0C000154  00010001
0C000158  00010001  0C00015C  00010001  0C000160  00040001  0C000164
00040001  0C000168  00040001  0C00016C  D9C5E3C6  F0F0F5F5*
02E3E7E3  40000174  4040001C  40400001  800001D4  000001B0  000001E4
000001D4  000001EC  00000034  00000208  40404040  40404040  40404040
40404040  40404040  40404040  40404040  D9C5E3C6  F0F0F5F6*
02D9D3C4  40404040  40400038  40404040  00040001  0C000170  00010001
0C000174  00010001  0C000178  00010001  0C00017C  00010001  0C000180
00010001  0C000184  00040001  0C000188  D9C5E3C6  F0F0F5F7*
02E3E7E3  40000190  4040000C  40400001  0000003A  80000214  800001D4
40404040  40404040  40404040  40404040  40404040  40404040  40404040
40404040  40404040  40404040  40404040  D9C5E3C6  F0F0F5F8*

MEMBER NAME  RETFMT
02D9D3C4  40404040  40400020  40404040  00010001  0C00018C  00040001
0C000190  00010001  0C000194  00010001  0C000198  40404040  40404040
40404040  40404040  40404040  40404040  D9C5E3C6  F0F0F5F9*
02C5D5C4  40404040  40404040  40404040  40404040  40404040  40404040
000004BA  F1F5F7F3  F460C6D6  F34040F0  F2F0F2F8  F7F0F9F8  40F0F84B
F4F34BF2  F5404040  D9C5E3C6  D4E34040  D9C5E3C6  F0F0F6F0**

MEMBER NAME  ROOTER
02C5E2C4  40404040  40400010  40400001  D9D6D6E3  C5D94040  00000000
40000000  40404040  40404040  40404040  40404040  40404040  40404040
40404040  40404040  40404040  40404040  D9D6D6E3  F0F0F0F1*
02E3E7E3  40000000  40400028  40400001  47F0F00C  07D9D6D6  E3C5D940
90ECD00C  184D98CD  F0205040  D00450D0  400807FC  40404040  40404040
40404040  40404040  40404040  40404040  D9D6D6E3  F0F0F0F2*
02E3E7E3  40000078  40400020  40400001  00000000  00000000  00000000
00000000  00000001  00000002  00000000  00000000  40404040  40404040
40404040  40404040  40404040  40404040  D9D6D6E3  F0F0F0F3*
02E3E7E3  400000C0  40400004  40400001  00000000  40404040  40404040
40404040  40404040  40404040  40404040  40404040  40404040  40404040
40404040  40404040  40404040  40404040  D9D6D6E3  F0F0F0F4*
02E3E7E3  400000D0  40400038  40400001  58A0D098  6840D050  58B0D060
5870D058  5860D064  5850D068  5070D070  18971887  5070D07C  59B0D080
4750D106  6820A008  6920D088  41300001  D9D6D6E3  F0F0F0F5*
02E3E7E3  40000108  40400038  40400001  47A0D0E6  1B336920  D0904120
000147C0  D0F41B22  14238725  D0FE50B0  D07C1BFF  58E0D000  07FE6820
A0106920  D0884120  000147A0  D1181B22  D9D6D6E3  F0F0F0F6*
02E3E7E3  40000140  40400038  40400001  6920D090  41300001  47C0D126
1B331432  29244120  00014720  D1341B22  14238725  D13C188B  6860A008
6960D088  41200001  47A0D14E  1B226960  D9D6D6E3  F0F0F0F7*
02E3E7E3  40000178  40400038  40400001  D0904130  000147C0  D15C1B33
14322964  41200001  4720D16A  1B221423  8725D172  189B199B  41300001
4780D17E  1B33198B  41200001  4780D18A  D9D6D6E3  F0F0F0F8*
02E3E7E3  400001B0  40400038  40400001  1B221423  8625D1B6  199B4780
D1A65060  D07C50B0  D0701BFF  58E0D000  07FE50B0  D07C50B0  D0701BFF
58E0D000  07FE5060  D07C6960  A0104730  D9D6D6E3  F0F0F0F9*
02E3E7E3  400001E8  40400038  40400001  D1C650B0  D07C5060  D0701BFF
58E0D000  07FE58A0  D00458E0  A00C58B0  A0185810  B0105820  D07C5020
10005830  B0145840  D0705040  300018DA  D9D6D6E3  F0F0F1F0**
```

```
02E3E7E3  40000220  40400038  40400001  92FFA00C  982CA01C  07FE987B
10046820  70006020  D0886820  80006020  D0905820  90005020  D0805820
A0005020  D07C5820  B0005020  D0705820  D9D6D6E3  F0F0F1F1*
02E3E7E3  40000258  40400018  40400001  10004130  20004150  00081B25
5020D098  5030D09C  47F0D0A8  40404040  40404040  40404040  40404040
40404040  40404040  40404040  40404040  D9D6D6E3  F0F0F1F2*
02E3E7E3  40000020  4040000C  40400001  0000022A  00000028  000001FA
40404040  40404040  40404040  40404040  40404040  40404040  40404040
40404040  40404040  40404040  40404040  D9D6D6E3  F0F0F1F3*
02E3E7E3  400000C8  40400008  40400001  00000000  00000000  40404040
40404040  40404040  40404040  40404040  40404040  40404040  40404040
40404040  40404040  40404040  40404040  D9D6D6E3  F0F0F1F4*
02D9D3C4  40404040  40400018  40404040  00010001  0C000020  00010001
0C000024  00010001  0C000028  40404040  40404040  40404040  40404040
40404040  40404040  40404040  40404040  D9D6D6E3  F0F0F1F5*
02C5D5C4  40404040  40404040  40404040  40404040  40404040  40404040
00000270  F1F5F7F3  F460C6D6  F34040F0  F2F0F2F8  F7F0F9F8  40F0F84B
F4F34BF2  F9404040  D9D6D6E3  C5D94040  D9D6D6E3  F0F0F1F6**

MEMBER NAME  RSAME
02C5E2C4  40404040  40400010  40400001  D9E2C1D4  C5404040  00000000
40000000  40404040  40404040  40404040  40404040  40404040  40404040
40404040  40404040  40404040  40404040  D9E2C1D4  F0F0F0F1*
02E3E7E3  40000000  40400028  40400001  47F0F00C  07D9E2C1  D4C54040
90ECD00C  184D98CD  F0205040  D00450D0  400807FC  40404040  40404040
40404040  40404040  40404040  40404040  D9E2C1D4  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  D9E2C1D4  F0F0F0F3*
02E3E7E3  40000078  40400024  40400001  00000000  00000001  00000001
0000000B  0000000C  0000000D  0000000E  00000000  00000000  40404040
40404040  40404040  40404040  40404040  D9E2C1D4  F0F0F0F4*
02E3E7E3  400000D8  40400008  40400001  00000000  00000000  40404040
40404040  40404040  40404040  40404040  40404040  40404040  40404040
40404040  40404040  40404040  40404040  D9E2C1D4  F0F0F0F5*
02E3E7E3  4000011C  40400038  40400001  58B0D0B4  58A0D0C4  5800D050
5000D078  5800D098  5900D09C  4780D118  1BFF58E0  D00007FE  5850D090
5830D094  1C4A1C2A  18051A0A  5000D0D4  D9E2C1D4  F0F0F0F6*
02E3E7E3  40000154  40400038  40400001  18055A00  D0C85000  D0D81805
5A00D0CC  5000D0DC  18655A60  D0D01853  1A5A1843  5A40D0C8  18035A00
D0CC5000  D0EC5A30  D0D05030  D0F01834  D9E2C1D4  F0F0F0F7*
02E3E7E3  4000018C  40400038  40400001  18451856  5860D0DC  5870D0D8
5880D0D4  5890D058  7828B000  7924B000  4780D18C  1BFF58E0  D00007FE
7827B000  7923B000  4780D1A0  1BFF58E0  D9E2C1D4  F0F0F0F8*
02E3E7E3  400001C4  40400038  40400001  D00007FE  7846B000  58E0D0EC
7B4EB000  30647825  B00058E0  D0F07B2E  B0003022  7020D08C  58F0D0B0
7960F004  47C0D1D0  47F0D1DC  58F0D0B0  D9E2C1D4  F0F0F0F9*
02E3E7E3  400001FC  40400038  40400001  7920F004  47C0D1E4  1BFF58E0
D00007FE  1A5A1A6A  1A7A1A8A  5800D0F0  1A0A5000  D0F05800  D0EC1A0A
5000D0EC  1A3A1A4A  5A90D058  5990D098  D9E2C1D4  F0F0F1F0**
02E3E7E3  40000234  40400038  40400001  47C0D178  5800D054  5000D078
1BFF58E0  D00007FE  58A0D004  58E0A00C  58B0A018  5810B018  5820D078
50201000  18DA92FF  A00C982C  A01C07FE  D9E2C1D4  F0F0F1F1*
02E3E7E3  4000026C  40400038  40400001  987B1004  58207000  5020D084
58208000  5020D090  58209000  5020D098  5820A000  5020D094  5820B000
5020D09C  58701018  58207000  5020D078  D9E2C1D4  F0F0F1F2*
02E3E7E3  400002A4  40400020  40400001  58201000  41302000  41500004
1B255C40  D0681B25  5020D0B4  5030D0B8  47F0D0F4  40404040  40404040
40404040  40404040  40404040  40404040  D9E2C1D4  F0F0F1F3*
```

```
02E3E7E3  40000020  4040000C  40400001  0000026C  00000028  00000248
40404040  40404040  40404040  40404040  40404040  40404040  40404040
40404040  40404040  40404040  40404040  D9E2C1D4  F0F0F1F4*
02E3E7E3  400000E4  40400038  40400001  00000000  00000000  00000038
00000034  0000002C  00000030  00000000  00000000  00000000  00000000
00000000  00000000  00000000  00000000  D9E2C1D4  F0F0F1F5*
02D9D3C4  40404040  40400020  40404040  00020001  0C0000D8  00010001
0C000020  00010001  0C000024  00010001  0C000028  40404040  40404040
40404040  40404040  40404040  40404040  D9E2C1D4  F0F0F1F6*
02C5D5C4  40404040  40404040  40404040  40404040  40404040  40404040
000002C4  F1F5F7F3  F460C6D6  F34040F0  F2F0F2F8  F7F0F9F8  40F0F84B
F4F34BF3  F3404040  D9E2C1D4  C5404040  D9E2C1D4  F0F0F1F7**

MEMBER NAME  SEQMRG
02C5E2C4  40404040  40400010  40400001  E2C5D8D4  D9C74040  00000000
40000000  40404040  40404040  40404040  40404040  40404040  40404040
40404040  40404040  40404040  40404040  E2C5D8D4  F0F0F0F1*
02E3E7E3  40000000  40400038  40400001  47F0F00C  07E2C5D8  D4D9C740
90ECD00C  184D98CD  F0205040  D00450D0  400807FC  40404040  40404040
020A0803  18010A08  0318011A  05C4C1E2  E2C5D8D4  F0F0F0F2*
02E3E7E3  40000038  40400038  40400001  C8401003  1A0A40E2  C5D8E4C5
D5C3C540  10041A17  40C4D6C5  E240D5D6  E340D4C1  E3C3C840  C140D3C1
E8E4D718  3222020A  08031801  0A080318  E2C5D8D4  F0F0F0F3*
02E3E7E3  40000070  40400038  40400001  011A05C4  C1E2C840  10031A07
40D3C1E8  E4D74010  041A1A40  C4D6C5E2  40D5D6E3  40D4C1E3  C3C840C1
40E2C5D8  E4C5D5C3  C5183222  02064814  E2C5D8D4  F0F0F0F4*
02E3E7E3  400000A8  40400002  40400001  01224040  40404040  40404040
40404040  40404040  40404040  40404040  40404040  40404040  40404040
40404040  40404040  40404040  40404040  E2C5D8D4  F0F0F0F5*
02E3E7E3  40000118  40400038  40400001  00000000  00000000  4F080000
00000000  00000000  00000001  00000002  00000003  00000004  00000005
00000006  00000008  00000009  00000016  E2C5D8D4  F0F0F0F6*
02E3E7E3  40000150  40400010  40400001  00000048  40266666  00000000
00000000  40404040  40404040  40404040  40404040  40404040  40404040
40404040  40404040  40404040  40404040  E2C5D8D4  F0F0F0F7*
02C5E2C4  40404040  40400010  40400002  D4E5C3C8  D9404040  02000000
40000000  40404040  40404040  40404040  40404040  40404040  40404040
40404040  40404040  40404040  40404040  E2C5D8D4  F0F0F0F8*
02E3E7E3  400001A0  40400004  40400001  00000000  40404040  40404040
40404040  40404040  40404040  40404040  40404040  40404040  40404040
40404040  40404040  40404040  40404040  E2C5D8D4  F0F0F0F9*
02E3E7E3  400001A8  40400008  40400001  00000000  00000000  40404040
40404040  40404040  40404040  40404040  40404040  40404040  40404040
40404040  40404040  40404040  40404040  E2C5D8D4  F0F0F1F0**
02C5E2C4  40404040  40400010  40400003  C9C2C3D6  D47B4040  02000000
40000000  40404040  40404040  40404040  40404040  40404040  40404040
40404040  40404040  40404040  40404040  E2C5D8D4  F0F0F1F1*
02E3E7E3  400001B4  40400004  40400001  00000000  40404040  40404040
40404040  40404040  40404040  40404040  40404040  40404040  40404040
40404040  40404040  40404040  40404040  E2C5D8D4  F0F0F1F2*
02E3E7E3  400001BC  40400004  40400001  00000000  40404040  40404040
40404040  40404040  40404040  40404040  40404040  40404040  40404040
40404040  40404040  40404040  40404040  E2C5D8D4  F0F0F1F3*
02E3E7E3  4000017C  40400004  40400001  000000C8  40404040  40404040
40404040  40404040  40404040  40404040  40404040  40404040  40404040
40404040  40404040  40404040  40404040  E2C5D8D4  F0F0F1F4*
02E3E7E3  4000027C  40400038  40400001  58A0D104  58B0D0F0  5890D07C
5880D0CC  7800D0A4  7000D0B8  5090D0D4  5800D134  5000D184  5800D138
5000D190  5000D180  5800D1AC  5000D188  E2C5D8D4  F0F0F1F5*
```

```
02E3E7E3  400002B4  40400038  40400001  58E0D1AC  410EA000  5000D054
9280D054  58F0D0F8  4110D04C  05EF5800  D13C5000  D1605800  D1B05000
D18C58E0  D1B0784E  A0007040  D1645820  E2C5D8D4  F0F0F1F6*
02E3E7E3  400002EC  40400038  40400001  D1485020  D1685830  D1445030
D16C5030  D1785800  D1B45000  D17C58E0  D1B4782E  B0007020  D1743322
3A247020  D1703062  7960D0A4  47C0D464  E2C5D8D4  F0F0F1F7*
02E3E7E3  40000324  40400038  40400001  5990D0DC  4780D2AA  89300001
1A237B42  B0007940  D0784130  00014720  D2941B33  7920D0B8  41200001
47C0D2A2  1B221423  1BFF862F  D4647800  E2C5D8D4  F0F0F1F8*
02E3E7E3  4000035C  40400038  40400001  D1647900  D1744730  D3905980
D0D847C0  D9805800  D0D81A09  5000D0D8  5840D1B8  5A40D178  2B007804
B0006A00  D0706000  D0685830  D06C1033  E2C5D8D4  F0F0F1F9*
02E3E7E3  40000394  40400038  40400001  5030D0C0  5830D094  5A30D178

MEMBER NAME  SEQMRG
2B007803  B0006A00  D0706000  D0685800  D06C5000  D0BC58F0  D10C1800
45E0F004  00000000  00000028  5830D140  E2C5D8D4  F0F0F2F0**
02E3E7E3  400003CC  40400038  40400001  5A30D178  45E0F008  0473B000
5810D17C  45E0F008  0471B000  45E0F008  0450D0C0  45E0F008  0450D0BC
45E0F010  58F0D10C  45E0F000  00000000  E2C5D8D4  F0F0F2F1*
02E3E7E3  40000404  40400038  40400001  000000A4  18A958B0  D0A05880
D0FC185B  5C40D0D8  18391A35  45E0F008  01238000  879AD362  58A0D104
58B0D0F0  5890D07C  5880D0CC  45E0F010  E2C5D8D4  F0F0F2F2*
02E3E7E3  4000043C  40400038  40400001  47F0D980  5980D0D8  47C0D980
5800D0D8  1A095000  D0D85840  D0945A40  D1802B00  7804A000  6A00D070
6000D068  5830D06C  10335030  D0C05830  E2C5D8D4  F0F0F2F3*
02E3E7E3  40000474  40400038  40400001  D1685A30  D1802B00  7803A000
6A00D070  6000D068  5800D06C  5000D0C8  58F0D10C  45E0F004  00000000
00000066  5810D188  45E0F008  0471A000  E2C5D8D4  F0F0F2F4*
02E3E7E3  400004AC  40400038  40400001  5810D18C  45E0F008  0471A000
45E0F008  0450D0C0  45E0F008  0450D0C8  45E0F010  58F0D10C  45E0F000
00000000  000000A4  18A958B0  D0A05880  E2C5D8D4  F0F0F2F5*
02E3E7E3  400004E4  40400038  40400001  D0FC185B  5C40D0D8  18391A35
45E0F008  01238000  879AD436  58A0D104  58B0D0F0  5890D07C  5880D0CC
45E0F010  47F0D980  5800D140  5000D19C  E2C5D8D4  F0F0F2F6*
02E3E7E3  4000051C  40400038  40400001  18305A30  D1805800  D0945000
D1941820  5A20D178  4103A000  5000D05C  4102B000  5000D060  9280D060
58F0D0F8  4110D058  05EF5990  D0DC4780  E2C5D8D4  F0F0F2F7*
02E3E7E3  40000554  40400038  40400001  D9805820  D0805020  D0B05800
D1345000  D1145800  D13C5000  D1205800  D1485000  D1285800  D1445000
D1305800  D1C45000  D14C5800  D1C85000  E2C5D8D4  F0F0F2F8*
02E3E7E3  4000058C  40400038  40400001  D1505800  D1C45000  D1545800
D1C85000  D1585000  D15C1832  5860D1C0  5880D0D4  5890D138  18BA58A0
D0F07820  D0E87926  B0004770  D5227820  E2C5D8D4  F0F0F2F9*
02E3E7E3  400005C4  40400038  40400001  D0EC58E0  D14C792E  B0004780
D5A84106  B0005000  D0549280  D05458F0  D0F84110  D04C05EF  18785A70
D07C5970  D0C447C0  D5781858  5C40D144  E2C5D8D4  F0F0F3F0**
02E3E7E3  400005FC  40400038  40400001  18255A20  D09458E0  D150410E
B0005000  D05C4102  A0005000  D0609280  D06058F0  D0F84110  D05805EF
47F0D854  58E0D154  782EB000  7020D124  E2C5D8D4  F0F0F3F1*
02E3E7E3  40000634  40400038  40400001  18575C40  D1441825  5A20D148
7B22A000  30427020  D0E47940  D0B847C0  D5DA3222  4750D5DA  18585C40
D1441825  5A20D094  58E0D158  410EB000  E2C5D8D4  F0F0F3F2*
02E3E7E3  4000066C  40400038  40400001  5000D05C  4102A000  5000D060
9280D060  58F0D0F8  4110D058  05EF47F0  D8541887  18575A50  D07C5050
D12C5950  D0C44730  D62C5C40  D1301825  E2C5D8D4  F0F0F3F3*
02E3E7E3  400006A4  40400038  40400001  5A20D128  7820D124  7B22A000
30427020  D0E47940  D0B84730  D61A5030  D0B05080  D0D447F0  D65E3222
47A0D62C  5030D0B0  5080D0D4  47F0D65E  E2C5D8D4  F0F0F3F4*
```

```
02E3E7E3  400006DC  40400038  40400001  18585C40  D1301825  5A20D094
58E0D15C  410EB000  5000D05C  4102A000  5000D060  9280D060  58F0D0F8
4110D058  05EF47F0  D85458A0  D10458B0  E2C5D8D4  F0F0F3F5*
02E3E7E3  40000714  40400038  40400001  D0F05890  D07C5880  D0CC5870
D0B05C60  D1905070  D1A45840  D1601A47  5040D1A8  5870D0D4  5C60D16C
5070D198  5830D168  1A375030  D1A07824  E2C5D8D4  F0F0F3F6*
02E3E7E3  4000074C  40400038  40400001  A0007923  B0004730  D77C5980
D0D847C0  D9805800  D0D81A09  5000D0D8  5850D0B0  5C40D16C  5A50D1B8
2B007805  B0006A00  D0706000  D0685840  E2C5D8D4  F0F0F3F7*
02E3E7E3  40000784  40400038  40400001  D06C1044  5040D0C0  5840D194
1A472B00  7804B000  6A00D070  6000D068  5800D06C  5000D0BC  58F0D10C
45E0F004  00000000  00000028  5840D19C  E2C5D8D4  F0F0F3F8*
02E3E7E3  400007BC  40400038  40400001  1A4745E0  F0080474  B00045E0
F0080473  B00045E0  F0080450  D0C045E0  F0080450  D0BC45E0  F01058F0

MEMBER NAME  SEQMRG
D10C1800  45E0F000  00000000  000000A4  E2C5D8D4  F0F0F3F9*
02D9D3C4  40404040  40400038  40404040  00020001  1C0001A8  00030001
1C0001BC  00010001  0C0003C4  00010001  0C000404  00010001  0C00049C
00010001  0C0004D8  00010001  0C0007B4  E2C5D8D4  F0F0F4F0**
02E3E7E3  400007F4  40400038  40400001  18A958B0  D0A05880  D0FC185B
5C40D0D8  18391A35  45E0F008  01238000  879AD74E  58A0D104  58B0D0F0
5890D07C  5880D0CC  45E0F010  47F0D980  E2C5D8D4  F0F0F4F1*
02E3E7E3  4000082C  40400038  40400001  5980D0D8  47C0D980  5800D0D8
1A095000  D0D85840  D1945A40  D1A42B00  7804A000  6A00D070  6000D068
5830D06C  10335030  D0C05830  D1685A30  E2C5D8D4  F0F0F4F2*
02E3E7E3  40000864  40400038  40400001  D1A42B00  7803A000  6A00D070
6000D068  5800D06C  5000D0C8  58F0D10C  45E0F004  00000000  00000066
5830D184  5A30D1A4  45E0F008  0473A000  E2C5D8D4  F0F0F4F3*
02E3E7E3  4000089C  40400038  40400001  5810D1A8  45E0F008  0471A000
45E0F008  0450D0C0  45E0F008  0450D0C8  45E0F010  58F0D10C  45E0F000
00000000  000000A4  18A958B0  D0A05880  E2C5D8D4  F0F0F4F4*
02E3E7E3  400008D4  40400038  40400001  D0FC185B  5C40D0D8  18391A35
45E0F008  01238000  879AD826  58A0D104  58B0D0F0  5890D07C  5880D0CC
45E0F010  47F0D980  5A30D07C  5800D15C  E2C5D8D4  F0F0F4F5*
02E3E7E3  4000090C  40400038  40400001  1A095000  D15C5800  D1581A09
5000D158  5800D154  1A095000  D1545800  D1501A09  5000D150  5800D14C
1A095000  D14C1A69  5930D0DC  47C0D506  E2C5D8D4  F0F0F4F6*
02E3E7E3  40000944  40400038  40400001  5030D0B0  5080D0D4  58A0D104
58B0D0F0  5890D07C  5880D0CC  5800D0D4  5900D0C4  47A0D980  5850D0D4
1A595050  D0D45980  D0D847C0  D9805800  E2C5D8D4  F0F0F4F7*
02E3E7E3  4000097C  40400038  40400001  D0D81A09  5000D0D8  5C40D16C
5860D194  1A652B00  7806B000  6A00D070  6000D068  5830D06C  10035000
D0C05030  D0BC58F0  D10C1800  45E0F004  E2C5D8D4  F0F0F4F8*
02E3E7E3  400009B4  40400038  40400001  00000000  00000028  5830D19C
1A3545E0  F0080473  B0005830  D1681A35  45E0F008  0473B000  45E0F008
0450D0C0  45E0F008  0450D0BC  45E0F010  E2C5D8D4  F0F0F4F9*
02E3E7E3  400009EC  40400038  40400001  58F0D10C  45E0F000  00000000
000000A4  18A958B0  D0A05880  D0FC185B  5C40D0D8  18391A35  45E0F008
01238000  879AD956  58A0D104  58B0D0F0  E2C5D8D4  F0F0F5F0**
02E3E7E3  40000A24  40400038  40400001  5890D07C  5880D0CC  45E0F010
1BFF58E0  D00007FE  58A0D004  58E0A00C  58B0A018  5810B014  5820D0D8
50201000  18DA92FF  A00C982C  A01C07FE  E2C5D8D4  F0F0F5F1*
02E3E7E3  40000A5C  40400038  40400001  987B1004  58207000  5020D0C4
58209000  5020D0DC  58701014  58207000  5020D0D8  58201000  41302000
41500004  1B255C40  D0901B25  5020D0F0  E2C5D8D4  F0F0F5F2*
02E3E7E3  40000A94  40400038  40400001  5030D0F4  58201008  41302000
41500004  1B255C40  D09C1B25  5020D104  5030D108  58201010  41302000
41500001  1B255C40  D0A01B25  5020D0FC  E2C5D8D4  F0F0F5F3*
```

```
02E3E7E3  40000ACC  40400008  40400001  5030D100  47F0D1CC  40404040
40404040  40404040  40404040  40404040  40404040  40404040  40404040
40404040  40404040  40404040  40404040  E2C5D8D4  F0F0F5F4*
02E3E7E3  40000020  40400008  40400001  00000A5C  000000B0  40404040
40404040  40404040  40404040  40404040  40404040  40404040  40404040
40404040  40404040  40404040  40404040  E2C5D8D4  F0F0F5F5*
02E3E7E3  400000B0  40400004  40400001  00000A38  40404040  40404040
40404040  40404040  40404040  40404040  40404040  40404040  40404040
40404040  40404040  40404040  40404040  E2C5D8D4  F0F0F5F6*
02D9D3C4  40404040  40400038  40404040  00010001  0C0007F0  00010001
0C000888  00010001  0C0008C8  00010001  0C0009B8  00010001  0C0009F8
00010001  0C000020  00010001  0C000024  E2C5D8D4  F0F0F5F7*
02E3E7E3  400000FC  40400010  40400001  00000144  00000198  80000000
00000138  40404040  40404040  40404040  40404040  40404040  40404040
40404040  40404040  40404040  40404040  E2C5D8D4  F0F0F5F8*

MEMBER NAME  SEQMRG
02E3E7E3  40000110  40400004  40400001  80000000  40404040  40404040
40404040  40404040  40404040  40404040  40404040  40404040  40404040
40404040  40404040  40404040  40404040  E2C5D8D4  F0F0F5F9*
02E3E7E3  400001C0  40400038  40400001  00000000  00000000  00000000
00000000  00000000  00000000  00000000  00000000  00000000  00000020
00000058  00000024  0000000C  00000018  E2C5D8D4  F0F0F6F0**
02E3E7E3  400001F8  40400038  40400001  00000010  00000000  00000000
00000000  00000000  00000000  00000000  00000000  02340008  00000000
01DC0009  02040009  00940009  00000000  E2C5D8D4  F0F0F6F1*
02E3E7E3  40000230  40400038  40400001  009C000A  00000000  0260000A
00BC000A  00C0000A  00B8000B  00DC000B  00000000  00E0000B  01E8000D
00000000  00000078  0000007C  00000028  E2C5D8D4  F0F0F6F2*
02E3E7E3  40000268  40400014  40400001  00000014  000000B0  000000D0
000000D4  000000BC  40404040  40404040  40404040  40404040  40404040
40404040  40404040  40404040  40404040  E2C5D8D4  F0F0F6F3*
02D9D3C4  40404040  40400020  40404040  00010001  0C0000B0  00010001
0C0000FC  00010001  0C000100  00010001  0C000108  40404040  40404040
40404040  40404040  40404040  40404040  E2C5D8D4  F0F0F6F4*
02C5D5C4  40404040  40404040  40404040  40404040  40404040  40404040
00000AD4  F1F5F7F3  F460C6D6  F34040F0  F2F0F2F8  F7F0F9F8  40F0F84B
F4F34BF3  F8404040  E2C5D8D4  D9C74040  E2C5D8D4  F0F0F6F5**

MEMBER NAME  SFLIP
02C5E2C4  40404040  40400010  40400001  E2C6D3C9  D7404040  00000000
40000000  40404040  40404040  40404040  40404040  40404040  40404040
40404040  40404040  40404040  40404040  E2C6D3C9  F0F0F0F1*
02E3E7E3  40000000  40400028  40400001  47F0F00C  07E2C6D3  C9D74040
90ECD00C  184D98CD  F0205040  D00450D0  400807FC  40404040  40404040
40404040  40404040  40404040  40404040  E2C6D3C9  F0F0F0F2*
02E3E7E3  40000078  40400018  40400001  41100000  00000000  00000001
00000002  00000000  00000000  40404040  40404040  40404040  40404040
40404040  40404040  40404040  40404040  E2C6D3C9  F0F0F0F3*
02E3E7E3  400000D8  40400004  40400001  00000000  40404040  40404040
40404040  40404040  40404040  40404040  40404040  40404040  40404040
40404040  40404040  40404040  40404040  E2C6D3C9  F0F0F0F4*
02E3E7E3  400000E0  40400004  40400001  00000000  40404040  40404040
40404040  40404040  40404040  40404040  40404040  40404040  40404040
40404040  40404040  40404040  40404040  E2C6D3C9  F0F0F0F5*
02E3E7E3  400000E8  40400004  40400001  00000000  40404040  40404040
40404040  40404040  40404040  40404040  40404040  40404040  40404040
40404040  40404040  40404040  40404040  E2C6D3C9  F0F0F0F6*
02E3E7E3  400000F0  40400004  40400001  00000000  40404040  40404040
```

```
40404040  40404040  40404040  40404040  40404040  40404040  40404040
40404040  40404040  40404040  40404040  E2C6D3C9  F0F0F0F7*
02E3E7E3  400000F8  40400038  40400001  5880D0C8  5890D0C0  58A0D0B8
58B0D0B0  6840D050  6860D078  28046B00  D0706000  D0782804  2B066000
D0706820  90086020  D0A06820  90106020  E2C6D3C9  F0F0F0F8*
02E3E7E3  40000130  40400038  40400001  D0A86820  80086020  90086820
80106020  90106820  D0A06020  80086820  D0A86020  80106800  D0802300
6000D080  6820B008  6020D090  6820B010  E2C6D3C9  F0F0F0F9*
02E3E7E3  40000168  40400038  40400001  6020D098  6820A008  23026000
B0086820  A0102302  6000B010  6820D090  23026000  A0086820  D0982302
6000A010  1BFF58E0  D00007FE  58A0D004  E2C6D3C9  F0F0F1F0**
02E3E7E3  400001A0  40400038  40400001  58E0A00C  58B0A018  5810B010
6820D078  60201000  5820B014  6840D070  60402000  5830B018  6860D080
60603000  18DA92FF  A00C982C  A01C07FE  E2C6D3C9  F0F0F1F1*
02E3E7E3  400001D8  40400038  40400001  98791010  68207000  6020D078
68208000  6020D070  68209000  6020D080  58201000  41302000  41500008
1B255020  D0C05030  D0C45820  10044130  E2C6D3C9  F0F0F1F2*
02E3E7E3  40000210  40400038  40400001  20004150  00081B25  5020D0C8
5030D0CC  58201008  41302000  41500008  1B255020  D0B05030  D0B45820
100C4130  20004150  00081B25  5020D0B8  E2C6D3C9  F0F0F1F3*
02E3E7E3  40000248  40400008  40400001  5030D0BC  47F0D0D0  40404040
40404040  40404040  40404040  40404040  40404040  40404040  40404040
40404040  40404040  40404040  40404040  E2C6D3C9  F0F0F1F4*
02E3E7E3  40000020  4040000C  40400001  000001D8  00000028  0000019C
40404040  40404040  40404040  40404040  40404040  40404040  40404040
40404040  40404040  40404040  40404040  E2C6D3C9  F0F0F1F5*
02D9D3C4  40404040  40400018  40404040  00010001  0C000020  00010001
0C000024  00010001  0C000028  40404040  40404040  40404040  40404040
40404040  40404040  40404040  40404040  E2C6D3C9  F0F0F1F6*
02C5D5C4  40404040  40404040  40404040  40404040  40404040  40404040
00000250  F1F5F7F3  F460C6D6  F34040F0  F2F0F2F8  F7F0F9F8  40F0F84B
F4F34BF4  F3404040  E2C6D3C9  D7404040  E2C6D3C9  F0F0F1F7**

MEMBER NAME  SMXMN
02C5E2C4  40404040  40400010  40400001  E2D4E7D4  D5404040  00000000
40000000  40404040  40404040  40404040  40404040  40404040  40404040
40404040  40404040  40404040  40404040  E2D4E7D4  F0F0F0F1*
02E3E7E3  40000000  40400028  40400001  47F0F00C  07E2D4E7  D4D54040
90ECD00C  184D98CD  F0205040  D00450D0  400807FC  40404040  40404040
40404040  40404040  40404040  40404040  E2D4E7D4  F0F0F0F2*
02E3E7E3  40000138  40400038  40400001  00000000  00000000  00000001
00000001  00000002  00000003  00000004  00000005  3D68DB8C  40FFF972
41100000  41200000  41300000  00000000  E2D4E7D4  F0F0F0F3*
02C5E2C4  40404040  40400010  40400002  E4D5C9E3  40404040  02000000
40000000  40404040  40404040  40404040  40404040  40404040  40404040
40404040  40404040  40404040  40404040  E2D4E7D4  F0F0F0F4*
02E3E7E3  40000170  40400004  40400001  00000000  40404040  40404040
40404040  40404040  40404040  40404040  40404040  40404040  40404040
40404040  40404040  40404040  40404040  E2D4E7D4  F0F0F0F5*
02C5E2C4  40404040  40400010  40400003  C6D9E7D7  D97B4040  02000000
40000000  40404040  40404040  40404040  40404040  40404040  40404040
40404040  40404040  40404040  40404040  E2D4E7D4  F0F0F0F6*
02C5E2C4  40404040  40400010  40400004  E2D7C3D6  C5C64040  02000000
40000000  40404040  40404040  40404040  40404040  40404040  40404040
40404040  40404040  40404040  40404040  E2D4E7D4  F0F0F0F7*
02C5E2C4  40404040  40400010  40400005  E2D7D3D4  C1E74040  02000000
40000000  40404040  40404040  40404040  40404040  40404040  40404040
40404040  40404040  40404040  40404040  E2D4E7D4  F0F0F0F8*
02E3E7E3  40000200  40400014  40400001  00000000  00000000  00000000
```

| | | | | | | |
|---|---|---|---|---|---|---|
| 00000000 | 00000000 | 40404040 | 40404040 | 40404040 | 40404040 | 40404040 |
| 40404040 | 40404040 | 40404040 | 40404040 | E2D4E7D4 | F0F0F0F9* | |
| 02E3E7E3 | 40000264 | 40400038 | 40400001 | 58B0D11C | 5800D110 | 5000D188 |
| 7800D1CC | 32004780 | D25A5800 | D1185000 | D1885800 | D1C81B0B | 5000D154 |
| 5800D210 | 5000D1F0 | 5800D218 | 5000D200 | E2D4E7D4 | F0F0F1F0** | |
| 02E3E7E3 | 4000029C | 40400038 | 40400001 | 18AB58B0 | D1E8183A | 5C20D20C |
| 18435A40 | D128189A | 5A90D11C | 18795C60 | D20C1807 | 5A00D128 | 5000D220 |
| 18835A80 | D2101807 | 5A00D210 | 5000D1FC | E2D4E7D4 | F0F0F1F1* | |
| 02E3E7E3 | 400002D4 | 40400038 | 40400001 | 18535A50 | D20C5050 | D2284104 |
| B0005000 | D04C58E0 | D220410E | B0005000 | D0504108 | B0005000 | D05458E0 |
| D1FC410E | B0005000 | D0584105 | B0005000 | E2D4E7D4 | F0F0F1F2* | |
| 02E3E7E3 | 4000030C | 40400038 | 40400001 | D05C58F0 | D1E04110 | D04C05EF |
| 18035A00 | D2145000 | D2201807 | 5A00D214 | 5000D230 | 5A30D218 | 5030D204 |
| 18275A20 | D2185020 | D20858E0 | D220410E | E2D4E7D4 | F0F0F1F3* | |
| 02E3E7E3 | 40000344 | 40400038 | 40400001 | B0005000 | D07058E0 | D230410E |
| B0005000 | D0744103 | B0005000 | D0784102 | B0005000 | D07C58E0 | D228410E |
| B0005000 | D08058F0 | D1E04110 | D07005EF | E2D4E7D4 | F0F0F1F4* | |
| 02E3E7E3 | 4000037C | 40400038 | 40400001 | 58F0D1E4 | 4110D094 | 05EF58F0 |
| D1E44110 | D0B405EF | 5800D188 | 1BFF870F | D62E7808 | B0007000 | D16058E0 |
| D1FC780E | B0007000 | D1647803 | B0007000 | E2D4E7D4 | F0F0F1F5* | |
| 02E3E7E3 | 400003B4 | 40400038 | 40400001 | D1707802 | B0007000 | D1747800 |
| D1147000 | D14C58F0 | D1D84110 | D0D405EF | 58F0D1D8 | 4110D0E0 | 05EF7800 |
| D1B07900 | D13047A0 | D3D07820 | D1707C20 | E2D4E7D4 | F0F0F1F6* | |
| 02E3E7E3 | 400003EC | 40400038 | 40400001 | D1CC3322 | 7A20D1A8 | 7020D1A8 |
| 7800D1B0 | 7900D134 | 47C0D3EE | 7820D174 | 7C20D1CC | 33227A20 | D1A87020 |
| D1A87800 | D1B07900 | D1304750 | D4547800 | E2D4E7D4 | F0F0F1F7* | |
| 02E3E7E3 | 40000424 | 40400038 | 40400001 | D1B07900 | D1344730 | D4547800 |
| D15C7C00 | D1407000 | D21C58F0 | D1DC4110 | D0EC05EF | 7820D21C | 3C207840 |
| D16C7C40 | D13C7C40 | D1B03A24 | 7A20D17C | E2D4E7D4 | F0F0F1F8* | |
| 02E3E7E3 | 4000045C | 40400038 | 40400001 | 32227820 | D13847A0 | D4443122 |
| 47F0D446 | 30227C20 | D1CC3322 | 7A20D1A8 | 7020D1A8 | 7800D1B4 | 7900D130 |
| 47A0D472 | 7820D170 | 7C20D1CC | 33227A20 | E2D4E7D4 | F0F0F1F9* | |
| 02E3E7E3 | 40000494 | 40400038 | 40400001 | D1AC7020 | D1AC7800 | D1B47900 |

MEMBER NAME SMXMN

| | | | | | | |
|---|---|---|---|---|---|---|
| D13447C0 | D4907820 | D1747C20 | D1CC3322 | 7A20D1AC | 7020D1AC | 7800D1B4 |
| 7900D130 | 4750D4F6 | 7800D1B4 | 7900D134 | E2D4E7D4 | F0F0F2F0** | |
| 02E3E7E3 | 400004CC | 40400038 | 40400001 | 4730D4F6 | 7800D15C | 7C00D140 |
| 7000D21C | 58F0D1DC | 4110D0F4 | 05EF7820 | D21C3C20 | 7840D16C | 7C40D13C |
| 7C40D1B4 | 3A247A20 | D17C3222 | 7820D138 | E2D4E7D4 | F0F0F2F1* | |
| 02E3E7E3 | 40000504 | 40400038 | 40400001 | 47A0D4E6 | 312247F0 | D4E83022 |
| 7C20D1CC | 33227A20 | D1AC7020 | D1AC7800 | D1C07900 | D13047A0 | D5127820 |
| D1607C20 | D1CC7A20 | D1B87020 | D1B87800 | E2D4E7D4 | F0F0F2F2* | |
| 02E3E7E3 | 4000053C | 40400038 | 40400001 | D1C07900 | D13447C0 | D52E7820 |
| D1647C20 | D1CC7A20 | D1B87020 | D1B87800 | D1C07900 | D1304750 | D5927800 |
| D1C07900 | D1344730 | D5927800 | D1587C00 | E2D4E7D4 | F0F0F2F3* | |
| 02E3E7E3 | 40000574 | 40400038 | 40400001 | D1407000 | D21C58F0 | D1DC4110 |
| D0FC05EF | 7820D21C | 3C207840 | D1687C40 | D13C7C40 | D1C03A24 | 7A20D178 |
| 32227820 | D13847A0 | D5843122 | 47F0D586 | E2D4E7D4 | F0F0F2F4* | |
| 02E3E7E3 | 400005AC | 40400038 | 40400001 | 30227C20 | D1CC7A20 | D1B87020 |
| D1B87800 | D1C47900 | D13047A0 | D5AE7820 | D1607C20 | D1CC7A20 | D1BC7020 |
| D1BC7800 | D1C47900 | D13447C0 | D5CA7820 | E2D4E7D4 | F0F0F2F5* | |
| 02E3E7E3 | 400005E4 | 40400038 | 40400001 | D1647C20 | D1CC7A20 | D1BC7020 |
| D1BC7800 | D1C47900 | D1304750 | D62E7800 | D1C47900 | D1344730 | D62E7800 |
| D1587C00 | D1407000 | D21C58F0 | D1DC4110 | E2D4E7D4 | F0F0F2F6* | |
| 02E3E7E3 | 4000061C | 40400038 | 40400001 | D10405EF | 7820D21C | 3C207840 |
| D1687C40 | D13C7C40 | D1C43A24 | 7A20D178 | 32227820 | D13847A0 | D6203122 |
| 47F0D622 | 30227C20 | D1CC7A20 | D1BC7020 | E2D4E7D4 | F0F0F2F7* | |
| 02E3E7E3 | 40000654 | 40400038 | 40400001 | D1BC59A0 | D11C4730 | D65A7800 |

D1A87000 D1907800 D1AC7000 D1947800 D1B87000 D1987800 D1BC7000
D19C47F0 D6AA7800 D1A87900 D19047C0 E2D4E7D4 F0F0F2F8*
02E3E7E3 4000068C 40400038 40400001 D66E7800 D1A87000 D1907800
D1AC7900 D19447A0 D6827800 D1AC7000 D1947800 D1B87900 D19847C0
D6967800 D1B87000 D1987800 D1BC7900 E2D4E7D4 F0F0F2F9*
02E3E7E3 400006C4 40400038 40400001 D19C47A0 D6AA7800 D1BC7000
D19C18A9 5990D154 47C0D27A 58B0D11C 1BFF58E0 D00007FE 58A0D004
58E0A00C 58B0A018 5810B00C 7820D194 E2D4E7D4 F0F0F3F0**
02E3E7E3 400006FC 40400038 40400001 70201000 5820B010 7840D19C
70402000 5830B014 7860D190 70603000 5840B018 7800D198 70004000
18DA92FF A00C982C A01C07FE 987B1004 E2D4E7D4 F0F0F3F1*
02E3E7E3 40000734 40400038 40400001 58207000 5020D1C8 78208000
7020D1CC 78209000 7020D194 7820A000 7020D19C 7820B000 7020D190
58701018 78207000 7020D198 58201000 E2D4E7D4 F0F0F3F2*
02E3E7E3 4000076C 4040001C 40400001 41302000 41500004 1B255C40
D12C1B25 5020D1E8 5030D1EC 47F0D23C 40404040 40404040 40404040
40404040 40404040 40404040 40404040 E2D4E7D4 F0F0F3F3*
02E3E7E3 40000020 4040000C 40400001 00000730 00000028 000006E8
40404040 40404040 40404040 40404040 40404040 40404040 40404040
40404040 40404040 40404040 40404040 E2D4E7D4 F0F0F3F4*
02E3E7E3 40000088 40400004 40400001 00000180 40404040 40404040
40404040 40404040 40404040 40404040 40404040 40404040 40404040
40404040 40404040 40404040 40404040 E2D4E7D4 F0F0F3F5*
02D9D3C4 40404040 40400038 40404040 00020001 1C000200 00030001
1C000204 00040001 1C000208 00050001 1C00020C 00010001 0C000020
00010001 0C000024 00010001 0C000028 E2D4E7D4 F0F0F3F6*
02E3E7E3 4000008C 4040000C 40400001 00000190 000001A0 800001A8
40404040 40404040 40404040 40404040 40404040 40404040 40404040
40404040 40404040 40404040 40404040 E2D4E7D4 F0F0F3F7*
02E3E7E3 400000AC 40400010 40400001 00000184 00000194 000001A4
800001AC 40404040 40404040 40404040 40404040 40404040 40404040
40404040 40404040 40404040 40404040 E2D4E7D4 F0F0F3F8*
02D9D3C4 40404040 40400038 40404040 00010001 0C000088 00010001
0C00008C 00010001 0C000090 00010001 0C000094 00010001 0C0000AC

MEMBER NAME SMXMN 00010001 0C0000B0 00010001 0C0000B4 E2D4E7D4 F0F0F3F9*
02E3E7E3 400000BC 4040001C 40400001 00000180 00000190 000001A0
000001A8 000001D0 000001D8 000001D4 40404040 40404040 40404040
40404040 40404040 40404040 40404040 E2D4E7D4 F0F0F4F0**
02D9D3C4 40404040 40400038 40404040 00010001 0C0000B8 00010001
0C0000BC 00010001 0C0000C0 00010001 0C0000C4 00010001 0C0000C8
00010001 0C0000CC 00010001 0C0000D0 E2D4E7D4 F0F0F4F1*
02E3E7E3 400000D8 4040001C 40400001 800001DC 00000184 00000194
000001A4 000001AC 000001E0 000001E8 40404040 40404040 40404040
40404040 40404040 40404040 40404040 E2D4E7D4 F0F0F4F2*
02D9D3C4 40404040 40400038 40404040 00010001 0C0000D4 00010001
0C0000D8 00010001 0C0000DC 00010001 0C0000E0 00010001 0C0000E4
00010001 0C0000E8 00010001 0C0000EC E2D4E7D4 F0F0F4F3*
02E3E7E3 400000F4 4040001C 40400001 000001E4 800001EC 00000188
00000198 80000174 0000018C 0000019C 40404040 40404040 40404040
40404040 40404040 40404040 40404040 E2D4E7D4 F0F0F4F4*
02D9D3C4 40404040 40400038 40404040 00010001 0C0000F0 00010001
0C0000F4 00010001 0C0000F8 00010001 0C0000FC 00010001 0C000100
00010001 0C000104 00010001 0C000108 E2D4E7D4 F0F0F4F5*
02E3E7E3 40000110 4040001C 40400001 80000174 000001D8 80000164
000001DC 80000164 000001E8 80000164 40404040 40404040 40404040
40404040 40404040 40404040 40404040 E2D4E7D4 F0F0F4F6*
02D9D3C4 40404040 40400038 40404040 00010001 0C00010C 00010001

```
0C000110  00010001  0C000114  00010001  0C000118  00010001  0C00011C
00010001  0C000120  00010001  0C000124  E2D4E7D4  F0F0F4F7*
02E3E7E3  4000012C  40400008  40400001  000001EC  80000164  40404040
40404040  40404040  40404040  40404040  40404040  40404040  40404040
40404040  40404040  40404040  40404040  E2D4E7D4  F0F0F4F8*
02E3E7E3  40000218  40400038  40400001  00000000  00000000  00000000
00000000  00000000  00000000  00E0000B  00000014  0000000C  00000008
00000010  00F4000B  0198000B  019C000B  E2D4E7D4  F0F0F4F9*
02E3E7E3  40000250  40400014  40400001  00000000  0154000B  00000000
0158000B  00000000  40404040  40404040  40404040  40404040  40404040
40404040  40404040  40404040  40404040  E2D4E7D4  F0F0F5F0**
02D9D3C4  40404040  40400018  40404040  00010001  0C000128  00010001
0C00012C  00010001  0C000130  40404040  40404040  40404040  40404040
40404040  40404040  40404040  40404040  E2D4E7D4  F0F0F5F1*
02C5D5C4  40404040  40404040  40404040  40404040  40404040  40404040
00000788  F1F5F7F3  F460C6D6  F34040F0  F2F0F2F8  F7F0F9F8  40F0F84B
F4F34BF4  F7404040  E2D4E7D4  D5404040  E2D4E7D4  F0F0F5F2**

MEMBER NAME  SPBRCK
02C5E2C4  40404040  40400010  40400001  E2D7C2D9  C3D24040  00000000
40000000  40404040  40404040  40404040  40404040  40404040  40404040
40404040  40404040  40404040  40404040  E2D7C2D9  F0F0F0F1*
02E3E7E3  40000000  40400028  40400001  47F0F00C  07E2D7C2  D9C3D240
90ECD00C  184D98CD  F0205040  D00450D0  400807FC  40404040  40404040
40404040  40404040  40404040  40404040  E2D7C2D9  F0F0F0F2*
02E3E7E3  40000278  40400038  40400001  3CA7C5AC  00000000  41300000
00000000  41200000  00000000  00000000  00000000  00000000  00000000
00000001  00000002  00000003  00000004  E2D7C2D9  F0F0F0F3*
02E3E7E3  400002B0  4040000C  40400001  3CA7C5AC  00000000  00000000
40404040  40404040  40404040  40404040  40404040  40404040  40404040
40404040  40404040  40404040  40404040  E2D7C2D9  F0F0F0F4*
02E3E7E3  40000480  40400004  40400001  00000000  40404040  40404040
40404040  40404040  40404040  40404040  40404040  40404040  40404040
40404040  40404040  40404040  40404040  E2D7C2D9  F0F0F0F5*
02C5E2C4  40404040  40400010  40400002  D8E4C1C4  40404040  02000000
40000000  40404040  40404040  40404040  40404040  40404040  40404040
40404040  40404040  40404040  40404040  E2D7C2D9  F0F0F0F6*
02E3E7E3  40000488  40400004  40400001  00000000  40404040  40404040
40404040  40404040  40404040  40404040  40404040  40404040  40404040
40404040  40404040  40404040  40404040  E2D7C2D9  F0F0F0F7*
02C5E2C4  40404040  40400010  40400003  E2C6D3C9  D7404040  02000000
40000000  40404040  40404040  40404040  40404040  40404040  40404040
40404040  40404040  40404040  40404040  E2D7C2D9  F0F0F0F8*
02E3E7E3  40000490  40400008  40400001  00000000  00000000  40404040
40404040  40404040  40404040  40404040  40404040  40404040  40404040
40404040  40404040  40404040  40404040  E2D7C2D9  F0F0F0F9*
02E3E7E3  4000049C  40400008  40400001  00000000  00000000  40404040
40404040  40404040  40404040  40404040  40404040  40404040  40404040
40404040  40404040  40404040  40404040  E2D7C2D9  F0F0F1F0**
02C5E2C4  40404040  40400010  40400004  E4D5C9E3  C4404040  02000000
40000000  40404040  40404040  40404040  40404040  40404040  40404040
40404040  40404040  40404040  40404040  E2D7C2D9  F0F0F1F1*
02E3E7E3  400004A8  40400004  40400001  00000000  40404040  40404040
40404040  40404040  40404040  40404040  40404040  40404040  40404040
40404040  40404040  40404040  40404040  E2D7C2D9  F0F0F1F2*
02C5E2C4  40404040  40400010  40400005  E5C1D3E4  C5404040  02000000
40000000  40404040  40404040  40404040  40404040  40404040  40404040
40404040  40404040  40404040  40404040  E2D7C2D9  F0F0F1F3*
02C5E2C4  40404040  40400010  40400006  C3C8D6D9  C4E84040  02000000
```

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | E2D7C2D9 | F0F0F1F4* | |
| 02C5E2C4 | 40404040 | 40400010 | 40400007 | D9D6D6E3 | C5D94040 | 02000000 |
| 40000000 | 40404040 | 40404040 | 40404040 | 40404040 | 40404040 | 40404040 |
| 40404040 | 40404040 | 40404040 | 40404040 | E2D7C2D9 | F0F0F1F5* | |
| 02C5E2C4 | 40404040 | 40400010 | 40400008 | E2D7C3D6 | C5C44040 | 02000000 |
| 40000000 | 40404040 | 40404040 | 40404040 | 40404040 | 40404040 | 40404040 |
| 40404040 | 40404040 | 40404040 | 40404040 | E2D7C2D9 | F0F0F1F6* | |
| 02C5E2C4 | 40404040 | 40400010 | 40400009 | E2E6C9E3 | C3C84040 | 02000000 |
| 40000000 | 40404040 | 40404040 | 40404040 | 40404040 | 40404040 | 40404040 |
| 40404040 | 40404040 | 40404040 | 40404040 | E2D7C2D9 | F0F0F1F7* | |
| 02E3E7E3 | 400004B0 | 40400018 | 40400001 | 00000000 | 00000000 | 00000000 |
| 00000000 | 00000000 | 00000000 | 40404040 | 40404040 | 40404040 | 40404040 |
| 40404040 | 40404040 | 40404040 | 40404040 | E2D7C2D9 | F0F0F1F8* | |
| 02D9D3C4 | 40404040 | 40400038 | 40404040 | 00020001 | 1C000490 | 00030001 |
| 1C00049C | 00040001 | 1C0004B0 | 00050001 | 1C0004B4 | 00060001 | 1C0004B8 |
| 00070001 | 1C0004BC | 00080001 | 1C0004C0 | E2D7C2D9 | F0F0F1F9* | |
| 02C5E2C4 | 40404040 | 40400010 | 4040000A | E6C9E3C8 | C9D54040 | 02000000 |

MEMBER NAME SPBRCK

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | E2D7C2D9 | F0F0F2F0** | |
| 02C5E2C4 | 40404040 | 40400010 | 4040000B | E6C9E3D6 | E4E34040 | 02000000 |
| 40000000 | 40404040 | 40404040 | 40404040 | 40404040 | 40404040 | 40404040 |
| 40404040 | 40404040 | 40404040 | 40404040 | E2D7C2D9 | F0F0F2F1* | |
| 02E3E7E3 | 400004C8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7C2D9 | F0F0F2F2* | |
| 02E3E7E3 | 40000518 | 40400038 | 40400001 | 5840D478 | 5850D460 | 5860D458 |
| 58B0D480 | 58A0D278 | 5890D27C | 5880D270 | 5870D28C | 2B227820 | 40046020 |
| D3C02B22 | 78204008 | 6020D3C8 | 2B227820 | E2D7C2D9 | F0F0F2F3* | |
| 02E3E7E3 | 40000550 | 40400038 | 40400001 | B0046020 | D3D02B22 | 7820B008 |
| 6020D3D8 | 2B227820 | D2C46020 | D3586020 | D3882B22 | 78206004 | 6020D390 |
| 2B227820 | 60086020 | D3982B22 | 78205004 | E2D7C2D9 | F0F0F2F4* | |
| 02E3E7E3 | 40000588 | 40400038 | 40400001 | 6020D3A0 | 2B227820 | 50086020 |
| D3A82B00 | 7800D2AC | 6000D310 | 2B007800 | D2C86000 | D3782B00 | 7800D2BC |
| 6000D370 | 2B007800 | D2C06000 | D38059A0 | E2D7C2D9 | F0F0F2F5* | |
| 02E3E7E3 | 400005C0 | 40400038 | 40400001 | D2984770 | D5A858F0 | D4744110 |
| D04C05EF | 6800D378 | 6000D350 | 6800D370 | 6000D360 | 6820D3C0 | 6020D430 |
| 6820D3C8 | 6020D438 | 6820D3D0 | 6020D440 | E2D7C2D9 | F0F0F2F6* | |
| 02E3E7E3 | 400005F8 | 40400038 | 40400001 | 6820D3D8 | 6020D448 | 5080D2B4 |
| 4100D430 | 5000D068 | 4100D440 | 5000D06C | 4100D390 | 5000D070 | 4100D3A0 |
| 5000D074 | 58F0D498 | 4110D068 | 05EF4100 | E2D7C2D9 | F0F0F2F7* | |
| 02E3E7E3 | 40000630 | 40400038 | 40400001 | D4385000 | D08C4100 | D4485000 |
| D0904100 | D3985000 | D0944100 | D3A85000 | D09858F0 | D4984110 | D08C05EF |
| 6820D258 | 6C20D2D0 | 6020D4D8 | 6860D378 | E2D7C2D9 | F0F0F2F8* | |
| 02E3E7E3 | 40000668 | 40400038 | 40400001 | 2C666060 | D4B82C26 | 6840D260 |
| 6C40D2E0 | 6040D4E0 | 6C40D378 | 2A246A20 | D2F06020 | D4106820 | D2586C20 |
| D2D82C62 | 6840D260 | 6C40D2E8 | 28046C00 | E2D7C2D9 | F0F0F2F9* | |
| 02E3E7E3 | 400006A0 | 40400038 | 40400001 | D3782A60 | 6A60D2F8 | 6060D418 |
| 6800D370 | 2C006000 | D4C06860 | D4D82C60 | 6060D4D8 | 6800D4E0 | 6C00D370 |
| 6860D4D8 | 2A606A60 | D2F06060 | D4206C20 | E2D7C2D9 | F0F0F3F0** | |
| 02E3E7E3 | 400006D8 | 40400038 | 40400001 | D4C06C40 | D3702A24 | 6A20D2F8 |
| 6020D428 | 4100D410 | 5000D0B0 | 4100D418 | 5000D0B4 | 58F0D488 | 4110D0B0 |
| 05EF4100 | D4205000 | D0B04100 | D4285000 | E2D7C2D9 | F0F0F3F1* | |
| 02E3E7E3 | 40000710 | 40400038 | 40400001 | D0B458F0 | D4884110 | D0B005EF |
| 6820D4B8 | 6C20D378 | 6840D2D0 | 2C426860 | D2E06C60 | D4B82A46 | 6860D2F0 |
| 6C60D378 | 2A466A40 | D3006040 | D4306C20 | E2D7C2D9 | F0F0F3F2* | |
| 02E3E7E3 | 40000748 | 40400038 | 40400001 | D2D86840 | D2E86C40 | D4B82A24 |

```
6840D2F8  6C40D378  2A246A20  D3086020  D4386820  D4C06C20  D3706840
D2D02C42  6860D2E0  6C60D4C0  2A466860  E2D7C2D9  F0F0F3F3*
02E3E7E3  40000780  40400038  40400001  D2F06C60  D3702A46  6A40D300
6040D440  6C20D2D8  6840D2E8  6C40D4C0  2A246840  D2F86C40  D3702A24
6A20D308  6020D448  6820D380  6C20D418  E2D7C2D9  F0F0F3F4*
02E3E7E3  400007B8  40400038  40400001  23226A20  D4306020  D3E06820
D3806C20  D4106A20  D4386020  D3E86840  D4406040  D4C86820  D3806C20
D4282322  2A246020  D3F06820  D4486020  E2D7C2D9  F0F0F3F5*
02E3E7E3  400007F0  40400038  40400001  D4D06860  D3806C60  D4202A62
6060D3F8  6040D3D0  6020D3D8  58B0D46C  6860D2D0  6C60D258  6060D4D8
6840D350  2C442C64  6820D2E0  6C20D260  E2D7C2D9  F0F0F3F6*
02E3E7E3  40000828  40400038  40400001  28026C00  D3502A60  6A60D2F0
6060D410  6860D2D8  6C60D258  6060D4E0  2C646840  D2E86C40  D2602804
6C00D350  2A606A60  D2F86060  D4186800  E2D7C2D9  F0F0F3F7*
02E3E7E3  40000860  40400038  40400001  D3602C00  6000D4E8  6860D4D8
2C606060  D4D82802  6C00D360  6820D4D8  2A206A20  D2F06020  D4206820
D4E06C20  D4E86C40  D3602A24  6A20D2F8  E2D7C2D9  F0F0F3F8*
02E3E7E3  40000898  40400038  40400001  6020D428  4100D410  5000D0B0
4100D418  5000D0B4  58F0D488  4110D0B0  05EF4100  D4205000  D0B04100

MEMBER NAME  SPBRCK
D4285000  D0B458F0  D4884110  D0B005EF  E2D7C2D9  F0F0F3F9*
02E3E7E3  400008D0  40400038  40400001  6820D380  6C20D418  23226A20
D4306020  D3E06820  D3806C20  D4106A20  D4386020  D3E86820  D3806C20
D4282322  6A20D440  6020D3F0  6820D380  E2D7C2D9  F0F0F4F0**
02E3E7E3  40000908  40400038  40400001  6C20D420  6A20D448  6020D3F8
6820D3F0  6B20D3E0  4770D902  58F0D49C  4110D0BC  05EF58F0  D4904110
D11005EF  6820D2D0  6C20D258  6C20D368  E2D7C2D9  F0F0F4F1*
02E3E7E3  40000940  40400038  40400001  6840D2D8  6C40D258  2B246020
D3286820  D2E06C20  D2606C20  D3686840  D2E86C40  D2602B24  6020D330
6820D2F0  6C20D368  6B20D2F8  6020D338  E2D7C2D9  F0F0F4F2*
02E3E7E3  40000978  40400038  40400001  58F0D468  4110D11C  05EF59A0
D2B04130  00014780  D9681B33  6820D3B0  6020D4A8  6840D3B8  6040D4B0
29244120  00014740  D9841B22  16238627  E2D7C2D9  F0F0F4F3*
02E3E7E3  400009B0  40400038  40400001  D9926040  D3B06020  D3B858F0
D4944110  D13005EF  5820D2A8  89200003  6802D3A8  6000D348  58F0D48C
4110D148  05EF5080  D2A45800  D2A01200  E2D7C2D9  F0F0F4F4*
02E3E7E3  400009E8  40400038  40400001  4770D9CE  58F0D4A0  4110D184
05EF59A0  D2A04770  D9E058F0  D4A44110  D1F005EF  5800D2A4  12004780
D7E45990  D2A44770  D9FE58B0  D4801BFF  E2D7C2D9  F0F0F4F5*
02E3E7E3  40000A20  40400038  40400001  58E0D000  07FE6800  D3B86000
D34858F0  D48C4110  D14805EF  50A0D294  5800D2A0  12004770  DA2858F0
D4A04110  D18405EF  59A0D2A0  4770DA3A  E2D7C2D9  F0F0F4F6*
02E3E7E3  40000A58  40400038  40400001  58F0D4A4  4110D1F0  05EF5800
D2A41200  4780D7E4  58B0D480  5990D2A4  4770DA58  1BFF58E0  D00007FE
1BFF58E0  D00007FE  58A0D004  58E0A00C  E2D7C2D9  F0F0F4F7*
02E3E7E3  40000A90  40400038  40400001  58B0A018  5810B008  7820D2C4
70201000  5820B014  7840D2AC  70402000  5830B018  7860D2C8  70603000
5840B01C  7800D2BC  70004000  5850B020  E2D7C2D9  F0F0F4F8*
02E3E7E3  40000AC8  40400038  40400001  7820D2C0  70205000  5860B02C
5870D29C  50706000  18DA92FF  A00C982C  A01C07FE  987B1008  78207000
7020D2C4  7820A000  7020D2AC  7820B000  E2D7C2D9  F0F0F4F9*
02E3E7E3  40000B00  40400038  40400001  7020D2C8  987B101C  78207000
7020D2BC  78208000  7020D2C0  58209000  5020D298  5870102C  58207000
5020D29C  58201000  41302000  41500004  E2D7C2D9  F0F0F5F0**
02E3E7E3  40000B38  40400038  40400001  1B255020  D4785030  D47C5820
10044130  20004150  00041B25  5020D480  5030D484  5820100C  41302000
41500004  1B255020  D4585030  D45C5820  E2D7C2D9  F0F0F5F1*
02E3E7E3  40000B70  40400038  40400001  10104130  20004150  00041B25
```

```
5020D460  5030D464  58201028  41302000  41500004  1B255C40  D27C1B25
5020D46C  5030D470  5030D198  47F0D4F0  E2D7C2D9  F0F0F5F2*
02E3E7E3  40000020  4040000C  40400001  00000AE8  00000028  00000A88
40404040  40404040  40404040  40404040  40404040  40404040  40404040
40404040  40404040  40404040  40404040  E2D7C2D9  F0F0F5F3*
02E3E7E3  40000074  40400008  40400001  000003E8  000003F8  40404040
40404040  40404040  40404040  40404040  40404040  40404040  40404040
40404040  40404040  40404040  40404040  E2D7C2D9  F0F0F5F4*
02D9D3C4  40404040  40400038  40404040  00090001  1C0004C4  000A0001
1C0004C8  000B0001  1C0004CC  00010001  0C000020  00010001  0C000024
00010001  0C000028  00010001  0C000074  E2D7C2D9  F0F0F5F5*
02E3E7E3  4000007C  40400014  40400001  000003B8  000003C8  000003A0
00000398  800003A8  40404040  40404040  40404040  40404040  40404040
40404040  40404040  40404040  40404040  E2D7C2D9  F0F0F5F6*
02E3E7E3  400000A0  40400008  40400001  00000380  000002F8  40404040
40404040  40404040  40404040  40404040  40404040  40404040  40404040
40404040  40404040  40404040  40404040  E2D7C2D9  F0F0F5F7*
02D9D3C4  40404040  40400038  40404040  00010001  0C000078  00010001
0C00007C  00010001  0C000080  00010001  0C000084  00010001  0C000088
00010001  0C00008C  00010001  0C0000A0  E2D7C2D9  F0F0F5F8*

MEMBER NAME  SPBRCK
02E3E7E3  400000A8  4040000C  40400001  00000308  00000318  80000328
40404040  40404040  40404040  40404040  40404040  40404040  40404040
40404040  40404040  40404040  40404040  E2D7C2D9  F0F0F5F9*
02E3E7E3  400000C4  40400010  40400001  00000380  00000300  00000310
00000320  40404040  40404040  40404040  40404040  40404040  40404040
40404040  40404040  40404040  40404040  E2D7C2D9  F0F0F6F0**
02D9D3C4  40404040  40400038  40404040  00010001  0C0000A4  00010001
0C0000A8  00010001  0C0000AC  00010001  0C0000B0  00010001  0C0000C4
00010001  0C0000C8  00010001  0C0000CC  E2D7C2D9  F0F0F6F1*
02E3E7E3  400000D4  40400004  40400001  80000330  40404040  40404040
40404040  40404040  40404040  40404040  40404040  40404040  40404040
40404040  40404040  40404040  40404040  E2D7C2D9  F0F0F6F2*
02E3E7E3  400000E0  40400018  40400001  80000348  000002F8  00000308
00000318  00000328  00000300  40404040  40404040  40404040  40404040
40404040  40404040  40404040  40404040  E2D7C2D9  F0F0F6F3*
02D9D3C4  40404040  40400038  40404040  00010001  0C0000D0  00010001
0C0000D4  00010001  0C0000E0  00010001  0C0000E4  00010001  0C0000E8
00010001  0C0000EC  00010001  0C0000F0  E2D7C2D9  F0F0F6F4*
02E3E7E3  400000F8  4040001C  40400001  00000310  00000320  00000330
00000458  000003B8  000003C8  00000438  40404040  40404040  40404040
40404040  40404040  40404040  40404040  E2D7C2D9  F0F0F6F5*
02D9D3C4  40404040  40400038  40404040  00010001  0C0000F4  00010001
0C0000F8  00010001  0C0000FC  00010001  0C000100  00010001  0C000104
00010001  0C000108  00010001  0C00010C  E2D7C2D9  F0F0F6F6*
02E3E7E3  40000114  4040001C  40400001  00000448  00000408  000003A8
000002DC  00000388  00000378  000003B0  40404040  40404040  40404040
40404040  40404040  40404040  40404040  E2D7C2D9  F0F0F6F7*
02D9D3C4  40404040  40400038  40404040  00010001  0C000110  00010001
0C000114  00010001  0C000118  00010001  0C00011C  00010001  0C000120
00010001  0C000124  00010001  0C000128  E2D7C2D9  F0F0F6F8*
02E3E7E3  40000130  4040001C  40400001  000003E8  800003F8  00000408
00000390  80000380  00000350  00000358  40404040  40404040  40404040
40404040  40404040  40404040  40404040  E2D7C2D9  F0F0F6F9*
02D9D3C4  40404040  40400038  40404040  00010001  0C00012C  00010001
0C000130  00010001  0C000134  00010001  0C000138  00010001  0C00013C
00010001  0C000140  00010001  0C000144  E2D7C2D9  F0F0F7F0**
02E3E7E3  4000014C  4040001C  40400001  00000360  000003D8  800002D8
```

```
000003D8  00000378  00000388  000002D8  40404040  40404040  40404040
40404040  40404040  40404040  40404040  E2D7C2D9  F0F0F7F1*
02D9D3C4  40404040  40400038  40404040  00010001  0C000148  00010001
0C00014C  00010001  0C000150  00010001  0C000154  00010001  0C000158
00010001  0C00015C  00010001  0C000160  E2D7C2D9  F0F0F7F2*
02E3E7E3  40000168  4040001C  40400001  000002D0  800002BC  000002F8
00000308  00000318  00000328  00000300  40404040  40404040  40404040
40404040  40404040  40404040  40404040  E2D7C2D9  F0F0F7F3*
02D9D3C4  40404040  40400038  40404040  00010001  0C000164  00010001
0C000168  00010001  0C00016C  00010001  0C000170  00010001  0C000174
00010001  0C000178  00010001  0C00017C  E2D7C2D9  F0F0F7F4*
02E3E7E3  40000184  4040001C  40400001  00000310  00000320  00000330
00000370  00000428  00000408  000003A8  40404040  40404040  40404040
40404040  40404040  40404040  40404040  E2D7C2D9  F0F0F7F5*
02D9D3C4  40404040  40400038  40404040  00010001  0C000180  00010001
0C000184  00010001  0C000188  00010001  0C00018C  00010001  0C000190
00010001  0C000194  00010001  0C000198  E2D7C2D9  F0F0F7F6*
02E3E7E3  400001A0  4040001C  40400001  00000338  000002C8  800002DC
00000458  00000408  000003E8  000003F8  40404040  40404040  40404040
40404040  40404040  40404040  40404040  E2D7C2D9  F0F0F7F7*
02D9D3C4  40404040  40400038  40404040  00010001  0C00019C  00010001

MEMBER NAME  SPBRCK
0C0001A0  00010001  0C0001A4  00010001  0C0001A8  00010001  0C0001AC
00010001  0C0001B0  00010001  0C0001B4  E2D7C2D9  F0F0F7F8*
02E3E7E3  400001BC  40400004  40400001  000002C4  40404040  40404040
40404040  40404040  40404040  40404040  40404040  40404040  40404040
40404040  40404040  40404040  40404040  E2D7C2D9  F0F0F7F9*
02E3E7E3  400001C4  40400018  40400001  00000378  00000388  00000398
00000370  000002BC  000002CC  40404040  40404040  40404040  40404040
40404040  40404040  40404040  40404040  E2D7C2D9  F0F0F8F0**
02D9D3C4  40404040  40400038  40404040  00010001  0C0001B8  00010001
0C0001BC  00010001  0C0001C4  00010001  0C0001C8  00010001  0C0001CC
00010001  0C0001D0  00010001  0C0001D4  E2D7C2D9  F0F0F8F1*
02E3E7E3  400001DC  4040001C  40400001  000002F8  00000308  00000318
00000328  00000300  00000310  00000320  40404040  40404040  40404040
40404040  40404040  40404040  40404040  E2D7C2D9  F0F0F8F2*
02D9D3C4  40404040  40400038  40404040  00010001  0C0001D8  00010001
0C0001DC  00010001  0C0001E0  00010001  0C0001E4  00010001  0C0001E8
00010001  0C0001EC  00010001  0C0001F0  E2D7C2D9  F0F0F8F3*
02E3E7E3  400001F8  4040001C  40400001  00000330  000003B8  000003C8
000003A8  000002DC  00000438  00000448  40404040  40404040  40404040
40404040  40404040  40404040  40404040  E2D7C2D9  F0F0F8F4*
02D9D3C4  40404040  40400038  40404040  00010001  0C0001F4  00010001
0C0001F8  00010001  0C0001FC  00010001  0C000200  00010001  0C000204
00010001  0C000208  00010001  0C00020C  E2D7C2D9  F0F0F8F5*
02E3E7E3  40000214  4040001C  40400001  800003B0  00000458  00000370
00000428  00000388  000002CC  00000378  40404040  40404040  40404040
40404040  40404040  40404040  40404040  E2D7C2D9  F0F0F8F6*
02D9D3C4  40404040  40400038  40404040  00010001  0C000210  00010001
0C000214  00010001  0C000218  00010001  0C00021C  00010001  0C000220
00010001  0C000224  00010001  0C000228  E2D7C2D9  F0F0F8F7*
02E3E7E3  40000230  4040001C  40400001  000002F8  00000308  00000318
00000328  00000300  00000310  00000320  40404040  40404040  40404040
40404040  40404040  40404040  40404040  E2D7C2D9  F0F0F8F8*
02D9D3C4  40404040  40400038  40404040  00010001  0C00022C  00010001
0C000230  00010001  0C000234  00010001  0C000238  00010001  0C00023C
00010001  0C000240  00010001  0C000244  E2D7C2D9  F0F0F8F9*
02E3E7E3  4000024C  4040001C  40400001  00000330  000003F8  00000380
```

```
000003B0  000003B8  000003C8  000003A8  40404040  40404040  40404040
40404040  40404040  40404040  40404040  E2D7C2D9  F0F0F9F0**
02D9D3C4  40404040  40400038  40404040  00010001  0C000248  00010001
0C00024C  00010001  0C000250  00010001  0C000254  00010001  0C000258
00010001  0C00025C  00010001  0C000260  E2D7C2D9  F0F0F9F1*
02E3E7E3  40000268  40400010  40400001  000002DC  00000438  00000448
800003E8  40404040  40404040  40404040  40404040  40404040  40404040
40404040  40404040  40404040  40404040  E2D7C2D9  F0F0F9F2*
02E3E7E3  400004D0  40400038  40400001  00000000  00000000  00000000
00000000  00000000  00000000  00000000  00000000  00000000  00000000
00000000  00000000  00000000  00000000  E2D7C2D9  F0F0F9F3*
02E3E7E3  40000508  40400010  40400001  00000000  00000000  00000000
00000000  40404040  40404040  40404040  40404040  40404040  40404040
40404040  40404040  40404040  40404040  E2D7C2D9  F0F0F9F4*
02D9D3C4  40404040  40400028  40404040  00010001  0C000264  00010001
0C000268  00010001  0C00026C  00010001  0C000270  00010001  0C000274
40404040  40404040  40404040  40404040  E2D7C2D9  F0F0F9F5*
02C5D5C4  40404040  40404040  40404040  40404040  40404040  40404040
00000BA8  F1F5F7F3  F460C6D6  F34040F0  F2F0F2F8  F7F0F9F8  40F0F84B
F4F34BF5  F2404040  E2D7C2D9  C3D24040  E2D7C2D9  F0F0F9F6**

MEMBER NAME  SPCOEF
02C5E2C4  40404040  40400010  40400001  E2D7C3D6  C5C64040  00000000
40000000  40404040  40404040  40404040  40404040  40404040  40404040
40404040  40404040  40404040  40404040  E2D7C3D6  F0F0F0F1*
02E3E7E3  40000000  40400028  40400001  47F0F00C  07E2D7C3  D6C5C640
90ECD00C  184D98CD  F0205040  D00450D0  400807FC  40404040  40404040
40404040  40404040  40404040  40404040  E2D7C3D6  F0F0F0F2*
02E3E7E3  40000078  40400010  40400001  41200000  41300000  00000000
00000000  40404040  40404040  40404040  40404040  40404040  40404040
40404040  40404040  40404040  40404040  E2D7C3D6  F0F0F0F3*
02E3E7E3  400000B0  40400038  40400001  7860D050  7800D078  7C00D080
7000D068  7820D070  7B20D074  3C267840  D0787C40  D0803A24  7840D07C
7C40D080  38023A04  7000D060  7820D074  E2D7C3D6  F0F0F0F4*
02E3E7E3  400000E8  40400038  40400001  7B20D070  7C20D054  38467C40
D0683B24  7840D07C  7C40D080  38023B04  7000D064  7800D070  7000D06C
1BFF58E0  D00007FE  58A0D004  58E0A00C  E2D7C3D6  F0F0F0F5*
02E3E7E3  40000120  40400038  40400001  58B0A018  5810B014  7820D060
70201000  5820B018  7840D064  70402000  5830B01C  7860D068  70603000
5840B020  7800D06C  70004000  18DA92FF  E2D7C3D6  F0F0F0F6*
02E3E7E3  40000158  40400038  40400001  A00C982C  A01C07FE  987B1000
78207000  7020D070  78208000  7020D074  78209000  7020D078  7820A000
7020D07C  7820B000  7020D080  987A1014  E2D7C3D6  F0F0F0F7*
02E3E7E3  40000190  40400024  40400001  78207000  7020D060  78208000
7020D064  78209000  7020D068  7820A000  7020D06C  47F0D088  40404040
40404040  40404040  40404040  40404040  E2D7C3D6  F0F0F0F8*
02E3E7E3  40000020  4040000C  40400001  00000160  00000028  00000118
40404040  40404040  40404040  40404040  40404040  40404040  40404040
40404040  40404040  40404040  40404040  E2D7C3D6  F0F0F0F9*
02D9D3C4  40404040  40400018  40404040  00010001  0C000020  00010001
0C000024  00010001  0C000028  40404040  40404040  40404040  40404040
40404040  40404040  40404040  40404040  E2D7C3D6  F0F0F1F0**
02C5D5C4  40404040  40404040  40404040  40404040  40404040  40404040
000001B4  F1F5F7F3  F460C6D6  F34040F0  F2F0F2F8  F7F0F9F8  40F0F84B
F4F34BF5  F8404040  E2D7C3D6  C5C64040  E2D7C3D6  F0F0F1F1**

MEMBER NAME  SPCOED
02C5E2C4  40404040  40400010  40400001  E2D7C3D6  C5C44040  00000000
40000000  40404040  40404040  40404040  40404040  40404040  40404040
```

```
40404040  40404040  40404040  40404040  E2D7C3D6  F0F0F0F1*
02E3E7E3  40000000  40400028  40400001  47F0F00C  07E2D7C3  D6C5C440
90ECD00C  184D98CD  F0205040  D00450D0  400807FC  40404040  40404040
40404040  40404040  40404040  40404040  E2D7C3D6  F0F0F0F2*
02E3E7E3  40000078  40400018  40400001  41200000  00000000  41300000
00000000  00000000  00000000  40404040  40404040  40404040  40404040
40404040  40404040  40404040  40404040  E2D7C3D6  F0F0F0F3*
02E3E7E3  400000E0  40400038  40400001  6860D050  6800D0A0  6C00D0B0
6000D080  6820D090  6B20D098  2C266840  D0A06C40  D0B02A24  6840D0A8
6C40D0B0  28022A04  6000D070  6820D098  E2D7C3D6  F0F0F0F4*
02E3E7E3  40000118  40400038  40400001  6B20D090  6C20D058  28466C40
D0802B24  6840D0A8  6C40D0B0  28022B04  6000D078  6800D090  6000D088
1BFF58E0  D00007FE  58A0D004  58E0A00C  E2D7C3D6  F0F0F0F5*
02E3E7E3  40000150  40400038  40400001  58B0A018  5810B014  6820D070
60201000  5820B018  6840D078  60402000  5830B01C  6860D080  60603000
5840B020  6800D088  60004000  18DA92FF  E2D7C3D6  F0F0F0F6*
02E3E7E3  40000188  40400038  40400001  A00C982C  A01C07FE  987B1000
68207000  6020D090  68208000  6020D098  68209000  6020D0A0  6820A000
6020D0A8  6820B000  6020D0B0  987A1014  E2D7C3D6  F0F0F0F7*
02E3E7E3  400001C0  40400024  40400001  68207000  6020D070  68208000
6020D078  68209000  6020D080  6820A000  6020D088  47F0D0B8  40404040
40404040  40404040  40404040  40404040  E2D7C3D6  F0F0F0F8*
02E3E7E3  40000020  4040000C  40400001  00000190  00000028  00000148
40404040  40404040  40404040  40404040  40404040  40404040  40404040
40404040  40404040  40404040  40404040  E2D7C3D6  F0F0F0F9*
02D9D3C4  40404040  40400018  40404040  00010001  0C000020  00010001
0C000024  00010001  0C000028  40404040  40404040  40404040  40404040
40404040  40404040  40404040  40404040  E2D7C3D6  F0F0F1F0**
02C5D5C4  40404040  40404040  40404040  40404040  40404040  40404040
000001E4  F1F5F7F3  F460C6D6  F34040F0  F2F0F2F8  F7F0F9F8  40F0F84B
F4F44BF0  F3404040  E2D7C3D6  C5C44040  E2D7C3D6  F0F0F1F1**

MEMBER NAME  SPLIT
02C5E2C4  40404040  40400010  40400001  E2D7D3C9  E3404040  00000000
40000000  40404040  40404040  40404040  40404040  40404040  40404040
40404040  40404040  40404040  40404040  E2D7D3C9  F0F0F0F1*
02E3E7E3  40000000  40400038  40400001  47F0F00C  07E2D7D3  C9E34040
90ECD00C  184D98CD  F0205040  D00450D0  400807FC  40404040  40404040
021A2340  E2D7D3C9  E3406040  C4C9C440  E2D7D3C9  F0F0F0F2*
02E3E7E3  40000038  40400038  40400001  D5D6E340  C3C8C1C9  D540E3D6
40D7D9C5  E5C9D6E4  E2401002  10021002  22021A1F  40E2D7D3  C9E34060
40C4C9C4  40D5D6E3  40C3C8C1  C9D540E3  E2D7D3C9  F0F0F0F3*
02E3E7E3  40000070  40400038  40400001  D640D5C5  E7E34010  02100310
0222021A  1DE2E3D6  D740D6C3  C3E4D9C5  C440C9D5  40E2D7D3  C9E340D9
D6E4E3C9  D5C52202  1A1540C3  C8C5C3D2  E2D7D3C9  F0F0F0F4*
02E3E7E3  400000A8  40400010  40400001  40D3D6C7  C9C340C9  D540E2D7
D3C9E322  40404040  40404040  40404040  40404040  40404040  40404040
40404040  40404040  40404040  40404040  E2D7D3C9  F0F0F0F5*
02E3E7E3  40000188  40400038  40400001  00000000  00000000  4E000000
00000000  4F080000  00000000  4E000000  80000000  00000000  00000000
00000000  00000001  00000001  00000002  E2D7D3C9  F0F0F0F6*
02E3E7E3  400001C0  40400038  40400001  00000003  00000004  00000005
00000006  00000009  0000000A  0000000B  0000000C  0000000D  0000000E
0000002C  00000038  41100000  41400000  E2D7D3C9  F0F0F0F7*
02C5E2C4  40404040  40400010  40400002  E3D6D3C5  D9404040  05000000
4000000C  40404040  40404040  40404040  40404040  40404040  40404040
40404040  40404040  40404040  40404040  E2D7D3C9  F0F0F0F8*
02E3E7E3  400001F8  40400008  40400001  00000000  00000000  40404040
40404040  40404040  40404040  40404040  40404040  40404040  40404040
```

| | | | | | | |
|---|---|---|---|---|---|---|
| 40404040 | 40404040 | 40404040 | 40404040 | E2D7D3C9 | F0F0F0F9* | |
| 02C5E2C4 | 40404040 | 40400010 | 40400003 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | E2D7D3C9 | F0F0F1F0** | |
| 02C5E2C4 | 40404040 | 40400010 | 40400004 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | E2D7D3C9 | F0F0F1F1* | |
| 02E3E7E3 | 40000320 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | E2D7D3C9 | F0F0F1F2* | |
| 02E3E7E3 | 40000330 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F0F1F3* | |
| 02C5E2C4 | 40404040 | 40400010 | 40400005 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E2D7D3C9 | F0F0F1F4* | |
| 02E3E7E3 | 4000033C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F0F1F5* | |
| 02C5E2C4 | 40404040 | 40400010 | 40400006 | D7D9D6D1 | C1D94040 | 02000000 |
| 40000000 | 40404040 | 40404040 | 40404040 | 40404040 | 40404040 | 40404040 |
| 40404040 | 40404040 | 40404040 | 40404040 | E2D7D3C9 | F0F0F1F6* | |
| 02E3E7E3 | 40000344 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F0F1F7* | |
| 02C5E2C4 | 40404040 | 40400010 | 40400007 | D7D9D6D1 | D3D54040 | 02000000 |
| 40000000 | 40404040 | 40404040 | 40404040 | 40404040 | 40404040 | 40404040 |
| 40404040 | 40404040 | 40404040 | 40404040 | E2D7D3C9 | F0F0F1F8* | |
| 02E3E7E3 | 40000350 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | E2D7D3C9 | F0F0F1F9* | |
| 02E3E7E3 | 40000278 | 40400030 | 40400001 | 00000035 | 00000004 | C6D34040 |

MEMBER NAME SPLIT

| | | | | | | |
|---|---|---|---|---|---|---|
| C1404040 | 00000029 | 00000004 | C6D34040 | C1404040 | 0000002D | 00000004 |
| C6D34040 | C1404040 | 40404040 | 40404040 | E2D7D3C9 | F0F0F2F0** | |
| 02E3E7E3 | 40000438 | 40400038 | 40400001 | 5880D290 | 5890D268 | 58A0D2A0 |
| 58B0D284 | 5800D0F0 | 5000D1BC | 5800D10C | 5000D330 | 5800D134 | 5000D328 |
| 18505C40 | D1485820 | D10C1A25 | 7802B000 | E2D7D3C9 | F0F0F2F1* | |
| 02E3E7E3 | 40000470 | 40400038 | 40400001 | 7900D13C | 4770D3C8 | 5800D0FC |
| 5000D1BC | 5800D184 | 5A00D100 | 5000D1B4 | 5800D148 | 5A00D100 | 5000D194 |
| 5820D37C | 5020D32C | 5850D148 | 5C40D328 | E2D7D3C9 | F0F0F2F2* | |
| 02E3E7E3 | 400004A8 | 40400038 | 40400001 | 5830D37C | 1A357803 | B0007900 |
| D13847A0 | D4245800 | D1B05700 | D0EC5000 | D0DC6820 | D0D86B20 | D0E85850 |
| D1485C40 | D3281A25 | 7022B000 | 5850D148 | E2D7D3C9 | F0F0F2F3* | |
| 02E3E7E3 | 400004E0 | 40400038 | 40400001 | 5C40D328 | 5820D330 | 1A254102 |
| B0005000 | D0689280 | D06858F0 | D2784110 | D06005EF | 5830D1B4 | 5C20D134 |
| 5850D194 | 5C40D134 | 5A30D10C | 18255A20 | E2D7D3C9 | F0F0F2F4* | |
| 02E3E7E3 | 40000518 | 40400038 | 40400001 | D10C1893 | 18A2410A | B0005000 |
| D0749280 | D07458F0 | D2784110 | D06C05EF | 410AB000 | 5000D07C | 58F0D278 |
| 4110D078 | 05EF58F0 | D2784110 | D08405EF | E2D7D3C9 | F0F0F2F5* | |
| 02E3E7E3 | 40000550 | 40400038 | 40400001 | 5AA0D134 | 19A947C0 | D4665890 |
| D26858A0 | D2A05800 | D1BC1BFF | 870FD540 | 5850D148 | 5C40D328 | 5820D308 |
| 1A252B00 | 7802B000 | 6A00D0E0 | 6000D0D0 | E2D7D3C9 | F0F0F2F6* | |
| 02E3E7E3 | 40000588 | 40400038 | 40400001 | 5850D0D4 | 5050D19C | 5800D1A8 |
| 5A00D100 | 5000D1A8 | 18305C20 | D1305A30 | D3305C40 | D1305820 | D3301A25 |
| 4103A000 | 5000D094 | 4102A000 | 5000D098 | E2D7D3C9 | F0F0F2F7* | |
| 02E3E7E3 | 400005C0 | 40400038 | 40400001 | 9280D098 | 58F0D278 | 4110D090 |
| 05EF5800 | D1A85700 | D0EC5000 | D0DC6820 | D0D86B20 | D0E85850 | D1485A50 |

```
D1005C40  D3285820  D3081A25  7022B000  E2D7D3C9  F0F0F2F8*
02E3E7E3  400005F8  40400038  40400001  5800D30C  5000D338  5800D2B0
5000D334  18305C20  D14C5A30  D30C5823  80005A20  D1005850  D14C5C40
D2B05830  D30C1A35  50238000  5830D14C  E2D7D3C9  F0F0F2F9*
02E3E7E3  40000630  40400038  40400001  5A30D100  18735C60  D2B01847
5A40D10C  18275A20  D30C5870  D1005880  D2B01894  18A318B2  5860D290
58296000  1A275029  6000582B  60001A27  E2D7D3C9  F0F0F3F0**
02E3E7E3  40000668  40400038  40400001  502B6000  1AA71AB8  1A9859A0
D16C47C0  D5A05880  D2905890  D26858A0  D2A058B0  D2845830  D14C5C20
D3345A30  D3385823  80005B20  D1005850  E2D7D3C9  F0F0F3F1*
02E3E7E3  400006A0  40400038  40400001  D14C5C40  D3345830  D3301A35
59238000  4770D6DE  5830D124  5030D33C  58F0D27C  7840F004  5850D148
5C40D328  5820D124  1A257042  B0005820  E2D7D3C9  F0F0F3F2*
02E3E7E3  400006D8  40400038  40400001  D2AC5020  D3407820  F0085870
D1485C60  D3285840  D2AC1A47  7024B000  5870D148  5A70D100  5C60D328
5840D334  1A477044  B0005870  D1485A70  E2D7D3C9  F0F0F3F3*
02E3E7E3  40000710  40400038  40400001  D1005C60  D3285840  D2B41A47
7024B000  5800D1BC  1BFF870F  DD865800  D17C5700  D0EC5000  D0DC6820
D0D86B20  D0E85850  D19C5C40  D1305860  E2D7D3C9  F0F0F3F4*
02E3E7E3  40000748  40400038  40400001  D3301A65  7026A000  1A357800
D1A47003  A0005800  D17C5700  D0EC5000  D0DC6820  D0D86B20  D0E85850
D1A85C40  D1305830  D3381A35  7023A000  E2D7D3C9  F0F0F3F5*
02E3E7E3  40000780  40400038  40400001  5850D1A8  5C40D130  1A257800
D1A47002  A00047F0  DD865850  D14C5C40  D3345820  D3301A25  58028000
5900D148  4780DA3E  5850D148  5B50D100  E2D7D3C9  F0F0F3F6*
02E3E7E3  400007B8  40400038  40400001  5050D1A0  5800D124  5000D348
5C40D328  5050D344  5820D124  1A257822  B0007020  D3545870  D1485C60
D3285820  D1241A27  7B22B000  30227920  E2D7D3C9  F0F0F3F7*
02E3E7E3  400007F0  40400038  40400001  90044730  D7645820  D2AC1A25
7822B000  5850D148  5C40D328  5820D2AC  1A257B22  B0003022  79209004
47C0D7B8  5820D334  5A20D344  7822B000  E2D7D3C9  F0F0F3F8*
02E3E7E3  40000828  40400038  40400001  7020D350  5850D148  5C40D328
5820D348  1A257B22  B0003022  79209004  4730D896  5820D2B4  5A20D344

MEMBER NAME  SPLIT
7822B000  5850D148  5C40D328  5820D2AC  E2D7D3C9  F0F0F3F9*
02E3E7E3  40000860  40400038  40400001  1A257B22  B0003022  79209004
4730D896  58F0D27C  7840F004  5850D148  5C40D328  5820D334  1A257042
B0007820  F0085850  D1485C40  D3285820  E2D7D3C9  F0F0F4F0**
02E3E7E3  40000898  40400038  40400001  D2B41A25  7022B000  5850D148
5A50D100  5C40D328  5820D348  1A257042  B0005820  D2AC5020  D34C5850
D1485A50  D1005C40  D3285830  D2AC1A35  E2D7D3C9  F0F0F4F1*
02E3E7E3  400008D0  40400038  40400001  7023B000  5800D1BC  1BFF870F
DD865800  D17C5700  D0EC5000  D0DC6820  D0D86B20  D0E85850  D19C5C40
D1305830  D3381A35  7023A000  1A257800  E2D7D3C9  F0F0F4F2*
02E3E7E3  40000908  40400038  40400001  D1A47002  A0005800  D17C5700
D0EC5000  D0DC6820  D0D86B20  D0E85850  D1A85C40  D1305820  D3301A25
7022A000  5850D1A8  5C40D130  5820D348  E2D7D3C9  F0F0F4F3*
02E3E7E3  40000940  40400038  40400001  1A257800  D1A47002  A00047F0
DD865850  D1485C40  D3285820  D3341A25  7820D350  7B22B000  30227920
90044730  D8DE5820  D2B45A20  D3447822  E2D7D3C9  F0F0F4F4*
02E3E7E3  40000978  40400038  40400001  B0005850  D1485C40  D3285820
D2B41A25  7B22B000  30227920  900447C0  D9265850  D1485C40  D3285820
D3341A25  7820D354  7B22B000  30227920  E2D7D3C9  F0F0F4F5*
02E3E7E3  400009B0  40400038  40400001  90044730  DA045820  D2AC5A20
D3447822  B0005850  D1485C40  D3285820  D2B41A25  7B22B000  30227920
90044730  DA0458F0  D27C7840  F0045850  E2D7D3C9  F0F0F4F6*
02E3E7E3  400009E8  40400038  40400001  D1485C40  D3285820  D3481A25
7042B000  5820D2AC  5020D358  7820F008  5850D148  5C40D328  5830D2AC
```

```
1A357023 B0005850 D1485A50 D1005C40 E2D7D3C9 F0F0F4F7*
02E3E7E3 40000A20 40400038 40400001 D3285830 D3341A35 7043B000
5850D148 5A50D100 5C40D328 5830D2B4 1A357023 B0005800 D1BC1BFF
870FDD86 5800D17C 5700D0EC 5000D0DC E2D7D3C9 F0F0F4F8*
02E3E7E3 40000A58 40400038 40400001 6820D0D8 6B20D0E8 5850D19C
5C40D130 5830D330 1A357023 A0005830 D3481A35 7800D1A4 7003A000
5800D17C 5700D0EC 5000D0DC 6820D0D8 E2D7D3C9 F0F0F4F9*
02E3E7E3 40000A90 40400038 40400001 6B20D0E8 5850D1A8 5C40D130
5830D338 1A357023 A0005850 D1A85C40 D1301A25 7800D1A4 7002A000
47F0DD86 58F0D28C 45E0F004 00000006 E2D7D3C9 F0F0F5F0**
02E3E7E3 40000AC8 40400038 40400001 00000028 45E0F008 0450D100
45E0F008 0450D148 45E0F008 0450D14C 45E0F010 58F0D28C 45E0F034
05404040 F1F55850 D1485A50 D1045050 E2D7D3C9 F0F0F5F1*
02E3E7E3 40000B00 40400038 40400001 D1A05800 D1245000 D3605C40
D3285050 D35C5820 D1241A25 7822B000 7020D36C 5870D148 5C60D328
5820D124 1A277B22 B0003022 79209004 E2D7D3C9 F0F0F5F2*
02E3E7E3 40000B38 40400038 40400001 4730DAAA 5820D2AC 1A257822
B0005850 D1485C40 D3285820 D2AC1A25 7B22B000 30227920 900447C0
DAFE5820 D3345A20 D35C7822 B0007020 E2D7D3C9 F0F0F5F3*
02E3E7E3 40000B70 40400038 40400001 D3685850 D1485C40 D3285820
D3601A25 7B22B000 30227920 90044730 DBDC5820 D2B45A20 D35C7822
B0005850 D1485C40 D3285820 D2AC1A25 E2D7D3C9 F0F0F5F4*
02E3E7E3 40000BA8 40400038 40400001 7B22B000 30227920 90044730
DBDC58F0 D27C7840 F0045850 D1485C40 D3285820 D3601A25 7042B000
5820D2AC 5020D364 7820F008 5850D148 E2D7D3C9 F0F0F5F5*
02E3E7E3 40000BE0 40400038 40400001 5C40D328 5830D2AC 1A357023
B0005850 D1485A50 D1005C40 D3285830 D3341A35 7043B000 5850D148
5A50D100 5C40D328 5830D2B4 1A357023 E2D7D3C9 F0F0F5F6*
02E3E7E3 40000C18 40400038 40400001 B0005800 D1BC1BFF 870FDD86
5800D17C 5700D0EC 5000D0DC 6820D0D8 6B20D0E8 5850D19C 5C40D130
5830D330 1A357023 A0005830 D3601A35 E2D7D3C9 F0F0F5F7*
02E3E7E3 40000C50 40400038 40400001 7800D1A4 7003A000 5800D17C
5700D0EC 5000D0DC 6820D0D8 6B20D0E8 5850D1A8 5C40D130 5830D338
1A357023 A0005850 D1A85C40 D1301A25 E2D7D3C9 F0F0F5F8*

MEMBER NAME  SPLIT
02E3E7E3 40000C88 40400038 40400001 7800D1A4 7002A000 47F0DD86
5850D148 5C40D328 5820D334 1A257820 D3687B22 B0003022 79209004
4730DC24 5820D2B4 5A20D35C 7822B000 E2D7D3C9 F0F0F5F9*
02E3E7E3 40000CC0 40400038 40400001 5850D148 5C40D328 5820D2B4
1A257B22 B0003022 79209004 47C0DC6C 5850D148 5C40D328 5820D334
1A257820 D36C7B22 B0003022 79209004 E2D7D3C9 F0F0F6F0**
02E3E7E3 40000CF8 40400038 40400001 4730DD4A 5820D2AC 5A20D35C
7822B000 5850D148 5C40D328 5820D2B4 1A257B22 B0003022 79209004
4730DD4A 58F0D27C 7840F004 5850D148 E2D7D3C9 F0F0F6F1*
02E3E7E3 40000D30 40400038 40400001 5C40D328 5820D334 1A257042
B0007820 F0085850 D1485C40 D3285820 D2B41A25 7022B000 5850D148
5A50D100 5C40D328 5820D360 1A257042 E2D7D3C9 F0F0F6F2*
02E3E7E3 40000D68 40400038 40400001 B0005820 D2AC5020 D3705850
D1485A50 D1005C40 D3285830 D2AC1A35 7023B000 5800D1BC 1BFF870F
DD865800 D17C5700 D0EC5000 D0DC6820 E2D7D3C9 F0F0F6F3*
02E3E7E3 40000DA0 40400038 40400001 D0D86B20 D0E85850 D19C5C40
D1305830 D3381A35 7023A000 1A257800 D1A47002 A0005800 D17C5700
D0EC5000 D0DC6820 D0D86B20 D0E85850 E2D7D3C9 F0F0F6F4*
02E3E7E3 40000DD8 40400038 40400001 D1A85C40 D1305820 D3301A25
7022A000 5850D1A8 5C40D130 5820D360 1A257800 D1A47002 A00047F0
DD8658F0 D28C1800 45E0F004 00000006 E2D7D3C9 F0F0F6F5*
02E3E7E3 40000E10 40400004 40400001 00000055 40404040 40404040
40404040 40404040 40404040 40404040 40404040 40404040 40404040
```

| | | | | | | |
|---|---|---|---|---|---|---|
| 40404040 | 40404040 | 40404040 | 40404040 | E2D7D3C9 | F0F0F6F6* | |
| 02D9D3C4 | 40404040 | 40400038 | 40404040 | 00020001 | 0C000320 | 00030001 |
| 1C000324 | 00040001 | 1C000330 | 00050001 | 1C000344 | 00060001 | 1C000350 |
| 00070001 | 1C000354 | 00010001 | 0C000AC8 | E2D7D3C9 | F0F0F6F7* | |
| 02E3E7E3 | 40000E14 | 40400038 | 40400001 | 45E0F008 | 0450D104 | 45E0F008 |
| 0450D148 | 45E0F008 | 0450D14C | 45E0F010 | 58F0D28C | 45E0F034 | 05404040 |
| F1F55800 | D2AC5000 | D3785850 | D14C5C40 | E2D7D3C9 | F0F0F6F8* | |
| 02E3E7E3 | 40000E4C | 40400038 | 40400001 | D3345820 | D2AC1A25 | 58528000 |
| 5050D170 | 5870D14C | 5C60D334 | 5820D2AC | 1A275832 | 80005870 | D14C5C60 |
| D3345820 | D3341A27 | 5A328000 | 5B30D100 | E2D7D3C9 | F0F0F6F9* | |
| 02E3E7E3 | 40000E84 | 40400038 | 40400001 | 5030D188 | 5820D304 | 5020D374 |
| 5870D148 | 5C60D328 | 5840D304 | 1A477804 | B0003200 | 4780C432 | 5870D148 |
| 5C60D328 | 18421A47 | 7800D0F8 | 7004B000 | E2D7D3C9 | F0F0F7F0** | |
| 02E3E7E3 | 40000EBC | 40400038 | 40400001 | 5870D148 | 5A70D100 | 5C60D328 |
| 1A277800 | D0F87002 | B0005870 | D1485C60 | D3285820 | D3301A27 | 2B007802 |
| B0006A00 | D0E06000 | D0D05800 | D0D45000 | E2D7D3C9 | F0F0F7F1* | |
| 02E3E7E3 | 40000EF4 | 40400038 | 40400001 | D1685870 | D1485A70 | D1005C60 |
| D3285820 | D3301A27 | 2B007802 | B0006A00 | D0E06000 | D0D05800 | D0D45000 |
| D18C5800 | D10C5000 | D2C45800 | D1345000 | E2D7D3C9 | F0F0F7F2* | |
| 02E3E7E3 | 40000F2C | 40400038 | 40400001 | D2BC5820 | D1305020 | D2C85800 |
| D1345000 | D2A85800 | D3045000 | D2CC5800 | D30C5000 | D2D45870 | D19C5C60 |
| D1305800 | D30C1A07 | 5000D310 | 5800D10C | E2D7D3C9 | F0F0F7F3* | |
| 02E3E7E3 | 40000F64 | 40400038 | 40400001 | 1A075000 | D3145800 | D1245000 |
| D2E85800 | D2AC5000 | D2F01A07 | 5000D318 | 5A70D124 | 5070D31C | 18135C00 |
| D1345010 | D3205C40 | D1345050 | D2B85A50 | E2D7D3C9 | F0F0F7F4* | |
| 02E3E7E3 | 40000F9C | 40400038 | 40400001 | D1345050 | D2C018A2 | 58B0D2A0 |
| 5890D270 | 5880D284 | 58E0D2C0 | 782E9000 | 7020D2FC | 2B003802 | 6A00D0E0 |
| 6000D0D0 | 5820D0D4 | 5850D14C | 5C40D2B0 | E2D7D3C9 | F0F0F7F5* | |
| 02E3E7E3 | 40000FD4 | 40400038 | 40400001 | 18355A30 | D10C58F0 | D2905A23 |
| F0005B20 | D1005020 | D1805920 | D1484770 | C3625820 | D2B85A20 | D1307822 |
| 90007020 | D1F05820 | D2B85A20 | D3007822 | E2D7D3C9 | F0F0F7F6* | |
| 02E3E7E3 | 4000100C | 40400038 | 40400001 | 90007020 | D1F45820 | D0F45020 |
| D1905830 | D10C5860 | D1085870 | D1345880 | D1685890 | D10018A2 | 58B0D284 |
| 185A5A50 | D1481C47 | 18255A20 | D1247802 | E2D7D3C9 | F0F0F7F7* | |
| 02E3E7E3 | 40001044 | 40400038 | 40400001 | B0007000 | D158185A | 5A50D148 |

MEMBER NAME SPLIT

| | | | | | | |
|---|---|---|---|---|---|---|
| 1C471825 | 5A20D2AC | 7802B000 | 7000D160 | 185A5A50 | D1481C47 | 18255A20 |
| D2B07802 | B0007000 | D15C185A | 5A50D148 | E2D7D3C9 | F0F0F7F8* | |
| 02E3E7E3 | 4000107C | 40400038 | 40400001 | 1C471825 | 5A20D2B4 | 7802B000 |
| 7000D164 | 19894780 | C0141986 | 4780C036 | 50A0D190 | 5880D284 | 5890D270 |
| 58B0D2A0 | 58A0D2C8 | 5800D168 | 5900D10C | E2D7D3C9 | F0F0F7F9* | |
| 02E3E7E3 | 400010B4 | 40400038 | 40400001 | 4780C0D0 | 5880D290 | 5890D268 |
| 58A0D2A0 | 58B0D284 | 47F0C2E6 | 58F0D29C | 4110D09C | 05EF50A0 | D19041E0 |
| 000815FE | 4720C032 | 58EFD04C | 07FE47F0 | E2D7D3C9 | F0F0F8F0** | |
| 02E3E7E3 | 400010EC | 40400038 | 40400001 | C0BC185A | 5A50D148 | 5C40D2A8 |
| 18251A23 | 4102B000 | 5000D0B4 | 9280D0B4 | 58F0D298 | 4110D0B0 | 05EF50A0 |
| D19041E0 | 000415FE | 4720C06E | 58EFD058 | E2D7D3C9 | F0F0F8F1* | |
| 02E3E7E3 | 40001124 | 40400038 | 40400001 | 07FE47F0 | C0BC5880 | D2845890 |
| D27058B0 | D2A058A0 | D2C85850 | D1905A50 | D1485C40 | D2BC1825 | 5A20D304 |
| 7800D138 | 70028000 | 5800D190 | 5900D100 | E2D7D3C9 | F0F0F8F2* | |
| 02E3E7E3 | 4000115C | 40400038 | 40400001 | 4770C0B8 | 58E0D2C0 | 782E9000 |
| 7A20D138 | 702E9000 | 47F0C37E | 19A94770 | C0CA50A0 | D19047F0 | C37E18A9 |
| 47F0DF7C | 5820D2B8 | 5A20D308 | 2B007802 | E2D7D3C9 | F0F0F8F3* | |
| 02E3E7E3 | 40001194 | 40400038 | 40400001 | 90006A00 | D0E06000 | D0D05850 |
| D0D45050 | D1741C4A | 5050D2E4 | 18255A20 | D3047842 | B0007040 | D2D0187A |
| 5C60D1A8 | 18275A20 | D2C47942 | B0004130 | E2D7D3C9 | F0F0F8F4* | |
| 02E3E7E3 | 400011CC | 40400038 | 40400001 | 00014720 | C11C1B33 | 58E0D310 |
| 782EB000 | 7020D2D8 | 181A5C00 | D1A81861 | 5A60D2C4 | 7926B000 | 41200001 |

```
4780C142  1B221423  1BFF862F  C334187A  E2D7D3C9  F0F0F8F5*
02E3E7E3  40001204  40400038  40400001  5C60D1A8  18275A20  D2C47942
B0004130  00014740  C1641B33  181A5C00  D1A81861  5A60D2C4  7926B000
41200001  4780C17E  1B221423  1BFF862F  E2D7D3C9  F0F0F8F6*
02E3E7E3  4000123C  40400038  40400001  C31A58E0  D314782E  B0007020
D2E03924  41300001  4740C19E  1B33181A  5C00D1A8  18615A60  D2D47926
B0004120  00014780  C1B81B22  14231BFF  E2D7D3C9  F0F0F8F7*
02E3E7E3  40001274  40400038  40400001  862FC31A  39244130  00014720
C1CC1B33  181A5C00  D1A81861  5A60D2D4  7926B000  41200001  4780C1E6
1B221423  1BFF862F  C3341825  1A2A7842  E2D7D3C9  F0F0F8F8*
02E3E7E3  400012AC  40400038  40400001  B0007040  D2EC185A  5C40D1A8
18255A20  D1247942  B0004130  00014720  C2141B33  58E0D318  782EB000
7020D2F4  187A5C60  D1A81847  5A40D124  E2D7D3C9  F0F0F8F9*
02E3E7E3  400012E4  40400038  40400001  7924B000  41200001  4780C23A
1B221423  1BFF862F  C334185A  5C40D1A8  18255A20  D2E87942  B0004130
00014740  C25C1B33  187A5C60  D1A81847  E2D7D3C9  F0F0F9F0**
02E3E7E3  4000131C  40400038  40400001  5A40D2E8  7924B000  41200001
4780C276  1B221423  1BFF862F  C31A58E0  D31C782E  B0007020  D2F83924
41300001  4740C296  1B33187A  5C60D1A8  E2D7D3C9  F0F0F9F1*
02E3E7E3  40001354  40400038  40400001  18475A40  D2F07924  B0004120
00014780  C2B01B22  14231BFF  862FC31A  39244130  00014720  C2C41B33
187A5C60  D1A81847  5A40D2F0  7924B000  E2D7D3C9  F0F0F9F2*
02E3E7E3  4000138C  40400038  40400001  41200001  4780C2DE  1B221423
1BFF862F  C3345880  D2905890  D26858A0  D2A058B0  D28458F0  D28C1800
45E0F004  00000006  0000007E  45E0F010  E2D7D3C9  F0F0F9F3*
02E3E7E3  400013C4  40400038  40400001  58F0D28C  45E0F034  05404040
F1F55850  D1485C40  D2BC1825  5A20D2CC  7800D138  70028000  47F0C37E
5850D148  5A50D100  5C40D2BC  18255A20  E2D7D3C9  F0F0F9F4*
02E3E7E3  400013FC  40400038  40400001  D2CC7800  D1387002  800058E0
D2C0782E  90007A20  D138702E  900047F0  C37E5800  D1805900  D1484750
C37E7820  D2FC7A20  D13858E0  D2C0702E  E2D7D3C9  F0F0F9F5*
02E3E7E3  40001434  40400038  40400001  90005880  D2845890  D27058B0
D2A058A0  D2C85800  D2C05A00  D1345000  D2C05820  D2B85A20  D1345020
D2B85920  D32047C0  DEF85880  D2905890  E2D7D3C9  F0F0F9F6*
02E3E7E3  4000146C  40400038  40400001  D26858A0  D2A058B0  D2845850
D14C5C40  D3345820  D3341A25  58028000  5900D100  4770C3E0  1BFF58E0
```

MEMBER NAME  SPLIT

```
D00007FE  5830D14C  5C20D334  5840D378  E2D7D3C9  F0F0F9F7*
02E3E7E3  400014A4  40400038  40400001  1A435834  80005C20  D3285A30
D3305850  D14C5C40  D3345820  D3341A25  58F0D270  4103F000  5000D0C0
41028000  5000D0C8  9280D0C8  58F0D26C  E2D7D3C9  F0F0F9F8*
02E3E7E3  400014DC  40400038  40400001  4110D0B8  05EF1BFF  58E0D000
07FE5800  D1345000  D2A81870  5C60D188  5850D170  5C40D134  18275A20
D1341835  5A30D134  189358A0  D13418B2  E2D7D3C9  F0F0F9F9*
02E3E7E3  40001514  40400038  40400001  7840D138  5870D270  18687869
70002B00  38066A00  D0E06000  D0D05820  D0D45850  D14C5C40  D2B01835
5A30D10C  5A236000  18825B80  D1005980  E2D7D3C9  F0F1F0F0**
02E3E7E3  4000154C  40400038  40400001  D1484750  C4C85980  D1484770
C4B858F0  D28C1800  45E0F004  00000006  0000009F  45E0F010  5980D148
4780C4C8  38263A24  70297000  879AC466  E2D7D3C9  F0F1F0F1*
02E3E7E3  40001584  40400038  40400001  5880D290  5890D268  58A0D2A0
58B0D284  1BFF58E0  D00007FE  58A0D004  58E0A00C  58B0A018  5810B000
5820D148  50201000  5830B004  5840D14C  E2D7D3C9  F0F1F0F2*
02E3E7E3  400015BC  40400038  40400001  50403000  5850B014  5860D1A8
50605000  5870B024  5880D17C  50807000  5890B02C  5800D1B0  50009000
18DA92FF  A00C982C  A01C07FE  58C0D048  E2D7D3C9  F0F1F0F3*
02E3E7E3  400015F4  40400038  40400001  987B1000  58207000  5020D148
58208000  5020D14C  5820A000  5020D184  987B1014  58207000  5020D1A8
```

| | | | | | | |
|---|---|---|---|---|---|---|
| 58209000 | 5020D16C | 987B1024 | 58207000 | E2D7D3C9 | F0F1F0F4* | |
| 02E3E7E3 | 4000162C | 40400038 | 40400001 | 5020D17C | 78208000 | 7020D1A4 |
| 58209000 | 5020D1B0 | 58701034 | 58207000 | 5020D1B8 | 58201008 | 41302000 |
| 41500004 | 1B255C40 | D12C1B25 | 5020D284 | E2D7D3C9 | F0F1F0F5* | |
| 02E3E7E3 | 40001664 | 40400038 | 40400001 | 5030D288 | 58201010 | 41302000 |
| 41500004 | 1B255C40 | D1201B25 | 5020D2A0 | 5030D2A4 | 58201018 | 41302000 |
| 41500004 | 1B255C40 | D1101B25 | 5020D290 | E2D7D3C9 | F0F1F0F6* | |
| 02E3E7E3 | 4000169C | 40400038 | 40400001 | 5030D294 | 58201020 | 41302000 |
| 41500004 | 1B255020 | D27C5030 | D2805820 | 10304130 | 20004150 | 00041B25 |
| 5C40D12C | 1B255020 | D2705030 | D27447F0 | E2D7D3C9 | F0F1F0F7* | |
| 02E3E7E3 | 400016D4 | 40400002 | 40400001 | D3804040 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F0F8* | |
| 02E3E7E3 | 40000020 | 40400008 | 40400001 | 000015F0 | 000000B8 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F0F9* | |
| 02E3E7E3 | 400000B8 | 40400004 | 40400001 | 0000159C | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F1F0** | |
| 02E3E7E3 | 40000100 | 40400008 | 40400001 | 000010B8 | 000010EA | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F1F1* | |
| 02D9D3C4 | 40404040 | 40400038 | 40404040 | 00010001 | 0C000E10 | 00010001 |
| 0C0013BC | 00010001 | 0C001568 | 00010001 | 0C000020 | 00010001 | 0C000024 |
| 00010001 | 0C0000B8 | 00010001 | 0C000100 | E2D7D3C9 | F0F1F1F2* | |
| 02E3E7E3 | 40000108 | 40400020 | 40400001 | 0000112A | 00001174 | 00001126 |
| 0000112A | 000001EC | 000002B0 | 80000000 | 000001EC | 40404040 | 40404040 |
| 40404040 | 40404040 | 40404040 | 40404040 | E2D7D3C9 | F0F1F1F3* | |
| 02D9D3C4 | 40404040 | 40400038 | 40404040 | 00010001 | 0C000104 | 00010001 |
| 0C000108 | 00010001 | 0C00010C | 00010001 | 0C000110 | 00010001 | 0C000114 |
| 00010001 | 0C000118 | 00010001 | 0C00011C | E2D7D3C9 | F0F1F1F4* | |
| 02E3E7E3 | 40000128 | 4040000C | 40400001 | 000002E8 | 80000000 | 000001EC |
| 40404040 | 40404040 | 40404040 | 40404040 | 40404040 | 40404040 | 40404040 |
| 40404040 | 40404040 | 40404040 | 40404040 | E2D7D3C9 | F0F1F1F5* | |
| 02E3E7E3 | 40000138 | 40400014 | 40400001 | 800002B0 | 000001EC | 000002B0 |
| 800002E8 | 000001E8 | 40404040 | 40404040 | 40404040 | 40404040 | 40404040 |
| 40404040 | 40404040 | 40404040 | 40404040 | E2D7D3C9 | F0F1F1F6* | |

MEMBER NAME SPLIT

| | | | | | | |
|---|---|---|---|---|---|---|
| 02D9D3C4 | 40404040 | 40400038 | 40404040 | 00010001 | 0C000124 | 00010001 |
| 0C000128 | 00010001 | 0C000130 | 00010001 | 0C000138 | 00010001 | 0C00013C |
| 00010001 | 0C000140 | 00010001 | 0C000144 | E2D7D3C9 | F0F1F1F7* | |
| 02E3E7E3 | 40000150 | 40400024 | 40400001 | 80000000 | 000002A8 | 00000210 |
| 00000218 | 00000214 | 8000021C | 000002A8 | 80000000 | 00000278 | 40404040 |
| 40404040 | 40404040 | 40404040 | 40404040 | E2D7D3C9 | F0F1F1F8* | |
| 02D9D3C4 | 40404040 | 40400038 | 40404040 | 00010001 | 0C000148 | 00010001 |
| 0C000154 | 00010001 | 0C000158 | 00010001 | 0C00015C | 00010001 | 0C000160 |
| 00010001 | 0C000164 | 00010001 | 0C000168 | E2D7D3C9 | F0F1F1F9* | |
| 02E3E7E3 | 40000174 | 40400004 | 40400001 | 000001C0 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F2F0** | |
| 02E3E7E3 | 4000017C | 40400008 | 40400001 | 000001EC | 80000000 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F2F1* | |
| 02E3E7E3 | 40000360 | 40400038 | 40400001 | 00000000 | 00000010 | 00000014 |
| 00000018 | 00000000 | 00000000 | 00000000 | 00000000 | 00000000 | 00000000 |
| 00000000 | 00000000 | 00000000 | 00000000 | E2D7D3C9 | F0F1F2F2* | |
| 02E3E7E3 | 40000398 | 40400038 | 40400001 | 00000000 | 00000000 | 00000000 |
| 00000000 | 00000000 | 00000000 | 00000000 | 00000000 | 00000030 | 00000028 |

```
00000024  00000008  016C0008  00000000  E2D7D3C9  F0F1F2F3*
02E3E7E3  400003D0  40400038  40400001  00000008  00000000  00000008
00000000  00F80009  00000000  00000009  0104000A  0120000B  011C000B
0194000B  00000000  0164000D  0000000D  E2D7D3C9  F0F1F2F4*
02E3E7E3  40000408  40400030  40400001  00000000  0160000E  0124000E
0128000F  012C000F  0148000F  014C000F  00000000  01DC000F  0000000F
00000000  00000034  40404040  40404040  E2D7D3C9  F0F1F2F5*
02D9D3C4  40404040  40400018  40404040  00010001  0C000170  00010001
0C000174  00010001  0C00017C  40404040  40404040  40404040  40404040
40404040  40404040  40404040  40404040  E2D7D3C9  F0F1F2F6*
02C5D5C4  40404040  40404040  40404040  40404040  40404040  40404040
000016D6  F1F5F7F3  F460C6D6  F34040F0  F2F0F2F8  F7F0F9F8  40F0F84B
F4F44BF0  F8404040  E2D7D3C9  E3404040  E2D7D3C9  F0F1F2F7**

MEMBER NAME  SPLMAX
02C5E2C4  40404040  40400010  40400001  E2D7D3D4  C1E74040  00000000
40000000  40404040  40404040  40404040  40404040  40404040  40404040
40404040  40404040  40404040  40404040  E2D7D3D4  F0F0F0F1*
02E3E7E3  40000000  40400028  40400001  47F0F00C  07E2D7D3  D4C1E740
90ECD00C  184D98CD  F0205040  D00450D0  400807FC  40404040  40404040
40404040  40404040  40404040  40404040  E2D7D3D4  F0F0F0F2*
02C5E2C4  40404040  40400010  40400002  D8E4C1C4  40404040  02000000
40000000  40404040  40404040  40404040  40404040  40404040  40404040
40404040  40404040  40404040  40404040  E2D7D3D4  F0F0F0F3*
02E3E7E3  40000088  40400034  40400001  41100000  00000000  00000000
00000000  00000001  00000002  00000003  00000008  41100000  41200000
41300000  00000000  00000000  40404040  E2D7D3D4  F0F0F0F4*
02E3E7E3  40000158  40400004  40400001  00000000  40404040  40404040
40404040  40404040  40404040  40404040  40404040  40404040  40404040
40404040  40404040  40404040  40404040  E2D7D3D4  F0F0F0F5*
02E3E7E3  40000188  40400038  40400001  58A0D07C  5860D070  7820D088
7C20D094  2B003802  28206020  D0D07820  D0847C20  D0982B00  38022820
6020D0D8  7820D080  7C20D09C  2B003802  E2D7D3D4  F0F0F0F6*
02E3E7E3  400001C0  40400038  40400001  28206020  D0E07840  D0A07820
D0987A20  D0947A20  D09C7A20  D0A05840  D0745040  D0BC7040  D0E87800
D06C7000  D0EC7020  D0F07800  D0807000  E2D7D3D4  F0F0F0F7*
02E3E7E3  400001F8  40400038  40400001  D0F458F0  D1304110  D04C05EF
5800D0B8  12004780  D25A6800  D1186000  D1381834  89300003  5850D0B8
89500003  18741883  189A18B5  1A761A8A  E2D7D3D4  F0F0F0F8*
02E3E7E3  40000230  40400038  40400001  6829D110  28422C42  6040D150
2C422B66  7860D094  2C646060  D1582B66  7860D098  6C60D150  6840D158
2A462B66  7860D09C  6C60D138  2A462B66  E2D7D3D4  F0F0F0F9*
02E3E7E3  40000268  40400038  40400001  7860D0A0  2A467048  D0E06C20
D0607028  D0E4879A  D2045070  D0BC7800  D0E87000  D0B07800  D0EC7000
D0C07800  D0E87000  D0B47800  D0EC7000  E2D7D3D4  F0F0F1F0**
02E3E7E3  400002A0  40400038  40400001  D0C45820  D0BC8920  00035880
D14C18B2  7868D0E0  7960D0B0  47C0D29C  7808D0E4  7000D0C0  7960D0B0
47C0D2A8  7060D0B0  7960D0B4  47A0D2B8  E2D7D3D4  F0F0F1F1*
02E3E7E3  400002D8  40400038  40400001  7808D0E4  7000D0C4  7960D0B4
47A0D2C4  7060D0B4  878AD288  1BFF58E0  D00007FE  58A0D004  58E0A00C
58B0A018  5810B010  7820D0B0  70201000  E2D7D3D4  F0F0F1F2*
02E3E7E3  40000310  40400038  40400001  5820B014  7840D0C0  70402000
5830B018  7860D0B4  70603000  5840B01C  7800D0C4  70004000  18DA92FF
A00C982C  A01C07FE  987B1000  78207000  E2D7D3D4  F0F0F1F3*
02E3E7E3  40000348  40400038  40400001  7020D094  78208000  7020D098
78209000  7020D09C  7820A000  7020D0A0  7820B000  7020D0B0  98791014
78207000  7020D0C0  78208000  7020D0B4  E2D7D3D4  F0F0F1F4*
02E3E7E3  40000380  4040000C  40400001  78209000  7020D0C4  47F0D160
40404040  40404040  40404040  40404040  40404040  40404040  40404040
```

```
40404040  40404040  40404040  40404040  E2D7D3D4  F0F0F1F5*
02E3E7E3  40000020  4040000C  40400001  00000340  00000028  000002F8
40404040  40404040  40404040  40404040  40404040  40404040  40404040
40404040  40404040  40404040  40404040  E2D7D3D4  F0F0F1F6*
02E3E7E3  40000074  40400010  40400001  000000F8  00000100  00000108
00000140  40404040  40404040  40404040  40404040  40404040  40404040
40404040  40404040  40404040  40404040  E2D7D3D4  F0F0F1F7*
02D9D3C4  40404040  40400038  40404040  00020001  1C000158  00010001
0C000020  00010001  0C000024  00010001  0C000028  00010001  0C000074
00010001  0C000078  00010001  0C00007C  E2D7D3D4  F0F0F1F8*
02E3E7E3  40000084  40400004  40400001  800000E0  40404040  40404040
40404040  40404040  40404040  40404040  40404040  40404040  40404040
40404040  40404040  40404040  40404040  E2D7D3D4  F0F0F1F9*
02E3E7E3  4000015C  4040002C  40400001  00000000  00000000  00000000

MEMBER NAME  SPLMAX
00000000  00000000  00000000  00000010  00000000  00000000  00000000
00000000  40404040  40404040  40404040  E2D7D3D4  F0F0F2F0**
02D9D3C4  40404040  40400010  40404040  00010001  0C000080  00010001
0C000084  40404040  40404040  40404040  40404040  40404040  40404040
40404040  40404040  40404040  40404040  E2D7D3D4  F0F0F2F1*
02C5D5C4  40404040  40404040  40404040  40404040  40404040  40404040
0000038C  F1F5F7F3  F460C6D6  F34040F0  F2F0F2F8  F7F0F9F8  40F0F84B
F4F44BF1  F5404040  E2D7D3D4  C1E74040  E2D7D3D4  F0F0F2F2**

MEMBER NAME  SPLTXT
02C5E2C4  40404040  40400010  40400001  E2D7D3E3  E7E34040  00000000
40000000  40404040  40404040  40404040  40404040  40404040  40404040
40404040  40404040  40404040  40404040  E2D7D3E3  F0F0F0F1*
02E3E7E3  40000000  40400038  40400001  47F0F00C  07E2D7D3  E3E7E340
90ECD00C  184D98CD  F0205040  D00450D0  400807FC  40404040  40404040
021A2040  D9C1D9D9  E840C6E4  D3D340C9  E2D7D3E3  F0F0F0F2*
02E3E7E3  40000038  40400038  40400001  D540E2E4  C2D9D6E4  E3C9D5C5
40E2D7D3  E3E7E322  021A2540  C5D9D9D6  D940C9D5  40C2C3E2  D3C9C240
C9D540E2  D7D3E3E7  E340E2E4  C2D9D6E4  E2D7D3E3  F0F0F0F3*
02E3E7E3  40000070  40400005  40400001  E3C9D5C5  22404040  40404040
40404040  40404040  40404040  40404040  40404040  40404040  40404040
40404040  40404040  40404040  40404040  E2D7D3E3  F0F0F0F4*
02E3E7E3  40000078  40400020  40400001  40404040  40404040  F9404040
40404040  F0404040  40404040  60404040  40404040  40404040  40404040
40404040  40404040  40404040  40404040  E2D7D3E3  F0F0F0F5*
02E3E7E3  40000180  40400038  40400001  00000000  00000000  4E000000
00000000  4F080000  00000000  4E000000  80000000  00000000  00000000
00000000  00000001  00000001  00000190  E2D7D3E3  F0F0F0F6*
02C5E2C4  40404040  40400010  40400002  C6D3E340  40404040  02000000
40000000  40404040  40404040  40404040  40404040  40404040  40404040
40404040  40404040  40404040  40404040  E2D7D3E3  F0F0F0F7*
02E3E7E3  400001B8  40400008  40400001  00000000  00000000  40404040
40404040  40404040  40404040  40404040  40404040  40404040  40404040
40404040  40404040  40404040  40404040  E2D7D3E3  F0F0F0F8*
02C5E2C4  40404040  40400010  40400003  C9E2D9C3  C8404040  02000000
40000000  40404040  40404040  40404040  40404040  40404040  40404040
40404040  40404040  40404040  40404040  E2D7D3E3  F0F0F0F9*
02E3E7E3  40000220  40400008  40400001  00000000  00000000  40404040
40404040  40404040  40404040  40404040  40404040  40404040  40404040
40404040  40404040  40404040  40404040  E2D7D3E3  F0F0F1F0**
02C5E2C4  40404040  40400010  40400004  D4E5C3C8  D9404040  02000000
40000000  40404040  40404040  40404040  40404040  40404040  40404040
40404040  40404040  40404040  40404040  E2D7D3E3  F0F0F1F1*
```

| | | | | | | |
|---|---|---|---|---|---|---|
| 02C5E2C4 | 40404040 | 40400010 | 40400005 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E2D7D3E3 | F0F0F1F2* | |
| 02E3E7E3 | 4000022C | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | E2D7D3E3 | F0F0F1F3* | |
| 02C5E2C4 | 40404040 | 40400010 | 40400006 | D2D6D4D7 | D9E54040 | 02000000 |
| 40000000 | 40404040 | 40404040 | 40404040 | 40404040 | 40404040 | 40404040 |
| 40404040 | 40404040 | 40404040 | 40404040 | E2D7D3E3 | F0F0F1F4* | |
| 02E3E7E3 | 4000023C | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F1F5* | |
| 02E3E7E3 | 40000258 | 40400038 | 40400001 | 5860D118 | 5850D120 | 5800D10C |
| 5000D154 | 7800D110 | 7000D14C | 5060D140 | 5800D108 | 5000D170 | 5840D114 |
| 58A0D10C | 58B0D18C | 5800D140 | 5900D148 | E2D7D3E3 | F0F0F1F6* | |
| 02E3E7E3 | 40000290 | 40400038 | 40400001 | 47C0D204 | 1BFF58E0 | D00007FE |
| 58F0D194 | 4110D06C | 05EF41E0 | 000415FE | 4720D21E | 58EFD04C | 07FE5800 |
| D1301200 | 4770D230 | 1BFF58E0 | D00007FE | E2D7D3E3 | F0F0F1F7* | |
| 02E3E7E3 | 400002C8 | 40400038 | 40400001 | 8645D29E | 5800D170 | 8605D2A2 |
| 58F0D194 | 4110D080 | 05EF41E0 | 000415FE | 4720D256 | 58EFD054 | 07FE5830 |
| D1301B36 | 5030D138 | 5930D134 | 41300001 | E2D7D3E3 | F0F0F1F8* | |
| 02E3E7E3 | 40000300 | 40400038 | 40400001 | 4760D26E | 1B335030 | D1B059A0 |
| D1344120 | 00014780 | D2801B22 | 16235020 | D1B48725 | D28E5840 | D1145800 |
| D1B48605 | D2A25800 | D1145000 | D1705840 | E2D7D3E3 | F0F0F1F9* | |
| 02E3E7E3 | 40000338 | 40400038 | 40400001 | D1085820 | D1301A26 | 5020D150 |

MEMBER NAME SPLTXT

| | | | | | | |
|---|---|---|---|---|---|---|
| 183A50A0 | D144188A | 189318A2 | 410AB000 | 5000D094 | 58F0D1A8 | 4110D094 |
| 05EF5090 | D14441E0 | 000415FE | 4720D2DE | E2D7D3E3 | F0F0F2F0** | |
| 02E3E7E3 | 40000370 | 40400038 | 40400001 | 58EFD05C | 07FE410A | B0005000 |
| D0AC58F0 | D1A84110 | D0AC05EF | 5090D144 | 41E00004 | 15FE4720 | D30458EF |
| D06407FE | 5980D164 | 41300001 | 4720D312 | E2D7D3E3 | F0F0F2F1* | |
| 02E3E7E3 | 400003A8 | 40400038 | 40400001 | 1B335980 | D1684120 | 00014740 |
| D3201B22 | 16321998 | 41700001 | 4780D32E | 1B771437 | 8735D33C | 5090D144 |
| 47F0D4AE | 59A0D148 | 41300001 | 4720D34A | E2D7D3E3 | F0F0F2F2* | |
| 02E3E7E3 | 400003E0 | 40400038 | 40400001 | 1B331827 | 14238725 | D35A5090 |
| D14447F0 | D4AE59A0 | D14847C0 | D36A5090 | D14447F0 | D3B85800 | D1641200 |
| 47A0D37C | 5090D144 | 47F0D3B8 | 5800D168 | E2D7D3E3 | F0F0F2F3* | |
| 02E3E7E3 | 40000418 | 40400038 | 40400001 | 120047C0 | D38E5090 | D14447F0 |
| D3B85A90 | D1184109 | D1735000 | D0C8410A | B0005000 | D0CC9280 | D0CC58F0 |
| D1984110 | D0C405EF | 5AA0D118 | 47F0D2B8 | E2D7D3E3 | F0F0F2F4* | |
| 02E3E7E3 | 40000450 | 40400038 | 40400001 | 58A0D10C | 7800D14C | 7000D160 |
| 58F0D188 | 4110D0D0 | 05EF5800 | D1541A06 | 5000D154 | 5900D11C | 47C0D3E4 |
| 47F0D508 | 5820D154 | 89200002 | 7800D14C | E2D7D3E3 | F0F0F2F5* | |
| 02E3E7E3 | 40000488 | 40400038 | 40400001 | 58F0D19C | 7002F000 | 8645D4C6 |
| 5800D170 | 8705D4C6 | 2B007800 | D1606A00 | D0F86000 | D0E85820 | D0EC5020 |
| D1BC1A26 | 5020D158 | 2B007800 | D14C6A00 | E2D7D3E3 | F0F0F2F6* | |
| 02E3E7E3 | 400004C0 | 40400038 | 40400001 | D0F86000 | D0E85820 | D0EC5020 |
| D1B81802 | 1B065000 | D13C7800 | D1607900 | D14C47C0 | D4501A26 | 5020D158 |
| 7800D160 | 7900D14C | 47C0D466 | 5800D1BC | E2D7D3E3 | F0F0F2F7* | |
| 02E3E7E3 | 400004F8 | 40400038 | 40400001 | 1B065000 | D13C5870 | D11C5890 |
| D15818A6 | 58B0D13C | 5880D19C | 5800D154 | 1A0A5000 | D1541907 | 47C0D48C |
| 47F0D508 | 18095700 | D1045000 | D0F46820 | E2D7D3E3 | F0F0F2F8* | |
| 02E3E7E3 | 40000530 | 40400038 | 40400001 | D0F06B20 | D1005820 | D1548920 |
| 00027022 | 8000879A | D47858B0 | D18C58A0 | D10C5800 | D1085000 | D1705840 |
| D11447F0 | D4CA5840 | D1081896 | 58B0D144 | E2D7D3E3 | F0F0F2F9* | |
| 02E3E7E3 | 40000568 | 40400038 | 40400001 | 4109D173 | 5000D0E0 | 58F0D198 |
| 4110D0DC | 05EF5A90 | D118199B | 47C0D4D0 | 58B0D18C | 5800D144 | 5A00D150 |
| 5000D140 | 47F0D1F0 | 1BFF58E0 | D00007FE | E2D7D3E3 | F0F0F3F0** | |

```
02E3E7E3  400005A0  40400038  40400001  58F0D1A4  45E0F004  00000006
00000028  45E0F010  58F0D1A4  45E0F034  05404040  F4F458F0  D1A41800
45E0F004  00000006  0000004C  45E0F010  E2D7D3E3  F0F0F3F1*
02E3E7E3  400005D8  40400038  40400001  58F0D1A4  45E0F034  05404040
F1F558A0  D00458E0  A00C58B0  A0185810  B0045820  D1485020  10005830
B0084340  D1284240  30005850  B0105860  E2D7D3E3  F0F0F3F2*
02E3E7E3  40000610  40400038  40400001  D1545060  500018DA  92FFA00C
982CA01C  07FE987A  10045820  70005020  D1484320  80004220  D1285820
A0005020  D1545820  10004130  20004150  E2D7D3E3  F0F0F3F3*
02E3E7E3  40000648  4040002E  40400001  00011B25  5020D18C  5030D190
5030D06C  5030D080  5820100C  41302000  41500004  1B255020  D19C5030
D1A047F0  D1C04040  40404040  40404040  E2D7D3E3  F0F0F3F4*
02E3E7E3  40000020  40400004  40400001  00000622  40404040  40404040
40404040  40404040  40404040  40404040  40404040  40404040  40404040
40404040  40404040  40404040  40404040  E2D7D3E3  F0F0F3F5*
02D9D3C4  40404040  40400038  40404040  00020001  1C000220  00030001
1C00022C  00040001  1C000230  00050001  1C00023C  00060001  1C000240
00010001  0C0005AC  00010001  0C0005D0  E2D7D3E3  F0F0F3F6*
02E3E7E3  40000024  40400004  40400001  00000098  40404040  40404040
40404040  40404040  40404040  40404040  40404040  40404040  40404040
40404040  40404040  40404040  40404040  E2D7D3E3  F0F0F3F7*
02E3E7E3  40000098  40400004  40400001  000005E6  40404040  40404040
40404040  40404040  40404040  40404040  40404040  40404040  40404040
40404040  40404040  40404040  40404040  E2D7D3E3  F0F0F3F8*
02E3E7E3  400000E4  40400014  40400001  000002B6  00000598  000002EE
00000598  00000376  40404040  40404040  40404040  40404040  40404040

MEMBER NAME  SPLTXT
40404040  40404040  40404040  40404040  E2D7D3E3  F0F0F3F9*
02D9D3C4  40404040  40400038  40404040  00010001  0C000020  00010001
0C000024  00010001  0C000098  00010001  0C0000E4  00010001  0C0000E8
00010001  0C0000EC  00010001  0C0000F0  E2D7D3E3  F0F0F4F0**
02E3E7E3  400000F8  4040000C  40400001  000005C2  0000039C  000005C2
40404040  40404040  40404040  40404040  40404040  40404040  40404040
40404040  40404040  40404040  40404040  E2D7D3E3  F0F0F4F1*
02E3E7E3  40000108  40400010  40400001  000001D8  000001E0  000001C0
800001C8  40404040  40404040  40404040  40404040  40404040  40404040
40404040  40404040  40404040  40404040  E2D7D3E3  F0F0F4F2*
02D9D3C4  40404040  40400038  40404040  00010001  0C0000F4  00010001
0C0000F8  00010001  0C0000FC  00010001  0C000100  00010001  0C000108
00010001  0C00010C  00010001  0C000110  E2D7D3E3  F0F0F4F3*
02E3E7E3  4000011C  40400010  40400001  000001D8  000001E0  00000090
800001CC  40404040  40404040  40404040  40404040  40404040  40404040
40404040  40404040  40404040  40404040  E2D7D3E3  F0F0F4F4*
02E3E7E3  40000130  4040000C  40400001  000001B0  00000088  000001B0
40404040  40404040  40404040  40404040  40404040  40404040  40404040
40404040  40404040  40404040  40404040  E2D7D3E3  F0F0F4F5*
02D9D3C4  40404040  40400038  40404040  00010001  0C000114  00010001
0C00011C  00010001  0C000120  00010001  0C000124  00010001  0C000128
00010001  0C000130  00010001  0C000134  E2D7D3E3  F0F0F4F6*
02E3E7E3  4000013C  40400008  40400001  000001B0  800001FC  40404040
40404040  40404040  40404040  40404040  40404040  40404040  40404040
40404040  40404040  40404040  40404040  E2D7D3E3  F0F0F4F7*
02E3E7E3  40000148  40400014  40400001  000001B0  00000080  000001B0
000001B0  80000200  40404040  40404040  40404040  40404040  40404040
40404040  40404040  40404040  40404040  E2D7D3E3  F0F0F4F8*
02D9D3C4  40404040  40400038  40404040  00010001  0C000138  00010001
0C00013C  00010001  0C000140  00010001  0C000148  00010001  0C00014C
00010001  0C000150  00010001  0C000154  E2D7D3E3  F0F0F4F9*
```

| | | | | | | |
|---|---|---|---|---|---|---|
| 02E3E7E3 | 4000015C | 40400004 | 40400001 | 000001B0 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F5F0** | |
| 02E3E7E3 | 40000164 | 40400014 | 40400001 | 80000000 | 0000020C | 000001DC |
| 800001E4 | 000001B0 | 40404040 | 40404040 | 40404040 | 40404040 | 40404040 |
| 40404040 | 40404040 | 40404040 | 40404040 | E2D7D3E3 | F0F0F5F1* | |
| 02E3E7E3 | 4000017C | 40400004 | 40400001 | 80000078 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F5F2* | |
| 02E3E7E3 | 40000244 | 40400014 | 40400001 | 00000000 | 00000000 | 00000000 |
| 00000000 | 00000000 | 40404040 | 40404040 | 40404040 | 40404040 | 40404040 |
| 40404040 | 40404040 | 40404040 | 40404040 | E2D7D3E3 | F0F0F5F3* | |
| 02D9D3C4 | 40404040 | 40400038 | 40404040 | 00010001 | 0C000158 | 00010001 |
| 0C00015C | 00010001 | 0C000168 | 00010001 | 0C00016C | 00010001 | 0C000170 |
| 00010001 | 0C000174 | 00010001 | 0C00017C | E2D7D3E3 | F0F0F5F4* | |
| 02C5D5C4 | 40404040 | 40404040 | 40404040 | 40404040 | 40404040 | 40404040 |
| 00000676 | F1F5F7F3 | F460C6D6 | F34040F0 | F2F0F2F8 | F7F0F9F8 | 40F0F84B |
| F4F44BF2 | F0404040 | E2D7D3E3 | E7E34040 | E2D7D3E3 | F0F0F5F5** | |

MEMBER NAME SSTICK

| | | | | | | |
|---|---|---|---|---|---|---|
| 02C5E2C4 | 40404040 | 40400010 | 40400001 | E2E2E3C9 | C3D24040 | 00000000 |
| 40000000 | 40404040 | 40404040 | 40404040 | 40404040 | 40404040 | 40404040 |
| 40404040 | 40404040 | 40404040 | 40404040 | E2E2E3C9 | F0F0F0F1* | |
| 02E3E7E3 | 40000000 | 40400028 | 40400001 | 47F0F00C | 07E2E2E3 | C9C3D240 |
| 90ECD00C | 184D98CD | F0205040 | D00450D0 | 400807FC | 40404040 | 40404040 |
| 40404040 | 40404040 | 40404040 | 40404040 | E2E2E3C9 | F0F0F0F2* | |
| 02E3E7E3 | 400000C8 | 40400038 | 40400001 | 00000000 | 00000000 | 4E000000 |
| 00000000 | 4F080000 | 00000000 | 4E000000 | 80000000 | 00000000 | 00000001 |
| 00000002 | 00000003 | 00000004 | 00000006 | E2E2E3C9 | F0F0F0F3* | |
| 02C5E2C4 | 40404040 | 40400010 | 40400002 | C5D3D4E3 | C2D34040 | 05000000 |
| 400D7D28 | 40404040 | 40404040 | 40404040 | 40404040 | 40404040 | 40404040 |
| 40404040 | 40404040 | 40404040 | 40404040 | E2E2E3C9 | F0F0F0F4* | |
| 02E3E7E3 | 40000100 | 40400020 | 40400001 | 0000000C | 00000016 | 00000018 |
| 00000020 | 0000002C | 00000038 | 00000000 | 00000000 | 40404040 | 40404040 |
| 40404040 | 40404040 | 40404040 | 40404040 | E2E2E3C9 | F0F0F0F5* | |
| 02C5E2C4 | 40404040 | 40400010 | 40400003 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F0F6* | |
| 02E3E7E3 | 40000170 | 40400014 | 40400001 | FFFFFFC8 | 000CD118 | 0000DA70 |
| 00000000 | 00000000 | 40404040 | 40404040 | 40404040 | 40404040 | 40404040 |
| 40404040 | 40404040 | 40404040 | 40404040 | E2E2E3C9 | F0F0F0F7* | |
| 02E3E7E3 | 40000188 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F0F8* | |
| 02E3E7E3 | 40000190 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F0F9* | |
| 02E3E7E3 | 40000198 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F1F0** | |
| 02C5E2C4 | 40404040 | 40400010 | 40400004 | E2E3D2C2 | D3C44040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F1F1* | |
| 02E3E7E3 | 400001A0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F1F2* | |
| 02C5E2C4 | 40404040 | 40400010 | 40400005 | E2E3D2D4 | D6C44040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F1F3* | |

```
02E3E7E3 400001A8 40400008 40400001 00000000 00000000 40404040
40404040 40404040 40404040 40404040 40404040 40404040 40404040
40404040 40404040 40404040 40404040 E2E2E3C9 F0F0F1F4*
02E3E7E3 40000150 40400020 40400001 00000015 00000004 C6D34040
C1404040 00000011 00000004 C6D34040 C1404040 40404040 40404040
40404040 40404040 40404040 40404040 E2E2E3C9 F0F0F1F5*
02E3E7E3 400001E0 40400038 40400001 5870D170 5880D178 58B0D14C
58A0D0C4 5890D0D8 5860D1B4 50A0D120 5800D114 12004770 D1E61BFF
58E0D000 07FE58F0 D1544110 D04C05EF E2E2E3C9 F0F0F1F6*
02E3E7E3 40000218 40400038 40400001 50A0B030 183A50A0 D1042B00
78067000 6A00D0B0 6000D0A0 5820D0A4 50A0B030 10425040 B0381843
18521869 5870D1B4 188918BA 58A0D14C E2E2E3C9 F0F0F1F7*
02E3E7E3 40000250 40400038 40400001 2B0058F0 D1707807 F0006A00
D0B06000 D0A05890 D0A41995 4780D266 183B5B36 A0245036 A0285A40
D0C45A80 D0D85A60 D0D850B8 A0241859 E2E2E3C9 F0F0F1F8*
02E3E7E3 40000288 40400038 40400001 10295028 A02C5AB0 D0C45A70
D19C59B0 D11847C0 D2285040 D1045870 D1705880 D17858B0 D14C58A0
D0C45890 D0D85860 D1B41859 5C40D104 E2E2E3C9 F0F0F1F9*
02E3E7E3 400002C0 40400038 40400001 5820D118 5B25B024 1A2A5025

MEMBER NAME  SSTICK
B0285800 D0D05000 D1945800 D19C5000 D1901825 5050D1B0 186918A2
18B91897 5880D148 5800D1A8 5000D1A4 E2E2E3C9 F0F0F2F0**
02E3E7E3 400002F8 40400038 40400001 5830D0C4 5870D1AC 58B0D178
58A0D14C 5806A02C 5700D0BC 5000D0AC 6820D0A8 6B20D0B8 58E0D1A4
792EB000 4770D36A 5800D0C0 5000D11C E2E2E3C9 F0F0F2F1*
02E3E7E3 40000330 40400038 40400001 5856A024 5C40D19C 18255A20
D0D04102 90005000 D0604106 A0285000 D0644107 B0005000 D07C58F0
D1804110 D06005EF 5800D11C 12004780 E2E2E3C9 F0F0F2F2*
02E3E7E3 40000368 40400038 40400001 D36A5856 A0245C40 D1901825
5A20D1A0 41029000 5000D088 4107B000 5000D08C 58F0D184 4110D088
05EF5A30 D0C45A70 D0E05800 D1A45A00 E2E2E3C9 F0F0F2F3*
02E3E7E3 400003A0 40400038 40400001 D0E05000 D1A45930 D11447C0
D2E058B0 D0D858A0 D1B01A6B 196A47C0 D2C85870 D1705880 D17858B0
D14C58A0 D0C45890 D0D85860 D1B41BFF E2E2E3C9 F0F0F2F4*
02E3E7E3 400003D8 40400038 40400001 58E0D000 07FE58A0 D00458E0
A00C58B0 A0185810 B00C5820 D1105020 10005830 B0145840 D10C5040
30005850 B0205860 D1145060 500018DA E2E2E3C9 F0F0F2F5*
02E3E7E3 40000410 40400038 40400001 92FFA00C 982CA01C 07FE987B
10045820 70005020 D1185820 90005020 D110987A 10145820 70005020
D10C5820 A0005020 D1145820 10004130 E2E2E3C9 F0F0F2F6*
02E3E7E3 40000448 40400038 40400001 20004150 00041B25 5C40D0DC
1B255020 D1705030 D1745820 10084130 20004150 00041B25 5C40D0C8
1B255020 D1585030 D15C5030 D0685820 E2E2E3C9 F0F0F2F7*
02E3E7E3 40000480 40400038 40400001 10104130 20004150 00041B25
5C40D0C8 1B255020 D1605030 D1645030 D0705820 10184130 20004150
00041B25 5C40D0D0 1B255020 D1685030 E2E2E3C9 F0F0F2F8*
02E3E7E3 400004B8 4040002A 40400001 D16C5030 D0785820 101C4130
20004150 00041B25 5C40D0D4 1B255020 D1785030 D17C5030 D05447F0
D1B84040 40404040 40404040 40404040 E2E2E3C9 F0F0F2F9*
02E3E7E3 40000020 40400008 40400001 0000041A 00000028 40404040
40404040 40404040 40404040 40404040 40404040 40404040 40404040
40404040 40404040 40404040 40404040 E2E2E3C9 F0F0F3F0**
02D9D3C4 40404040 40400038 40404040 00020001 0C000170 00020001
0C000174 00020001 0C000178 00030001 1C00017C 00040001 1C0001A8
00050001 1C0001AC 00010001 0C000020 E2E2E3C9 F0F0F3F1*
02E3E7E3 40000028 40400004 40400001 000003DE 40404040 40404040
40404040 40404040 40404040 40404040 40404040 40404040 40404040
40404040 40404040 40404040 40404040 E2E2E3C9 F0F0F3F2*
```

```
02E3E7E3  40000074  40400008  40400001  00000150  000000F0  40404040
40404040  40404040  40404040  40404040  40404040  40404040  40404040
40404040  40404040  40404040  40404040  E2E2E3C9  F0F0F3F3*
02E3E7E3  40000080  40400008  40400001  00000108  8000013C  40404040
40404040  40404040  40404040  40404040  40404040  40404040  40404040
40404040  40404040  40404040  40404040  E2E2E3C9  F0F0F3F4*
02E3E7E3  40000094  40400004  40400001  00000138  40404040  40404040
40404040  40404040  40404040  40404040  40404040  40404040  40404040
40404040  40404040  40404040  40404040  E2E2E3C9  F0F0F3F5*
02E3E7E3  4000009C  40400004  40400001  00000134  40404040  40404040
40404040  40404040  40404040  40404040  40404040  40404040  40404040
40404040  40404040  40404040  40404040  E2E2E3C9  F0F0F3F6*
02D9D3C4  40404040  40400038  40404040  00010001  0C000024  00010001
0C000028  00010001  0C000074  00010001  0C000078  00010001  0C000080
00010001  0C000084  00010001  0C000094  E2E2E3C9  F0F0F3F7*
02E3E7E3  400000A8  40400008  40400001  00000004  80000144  40404040
40404040  40404040  40404040  40404040  40404040  40404040  40404040
40404040  40404040  40404040  40404040  E2E2E3C9  F0F0F3F8*
02E3E7E3  400000B8  40400010  40400001  00000004  00000144  0000DA8C
80000148  40404040  40404040  40404040  40404040  40404040  40404040
```

MEMBER NAME SSTICK

```
40404040  40404040  40404040  40404040  E2E2E3C9  F0F0F3F9*
02E3E7E3  400001B0  40400030  40400001  00000000  00000000  00000000
00000000  00000000  00000058  00000008  00000000  00000030  0000001C
00000000  00000060  40404040  40404040  E2E2E3C9  F0F0F4F0**
02D9D3C4  40404040  40400038  40404040  00010001  0C00009C  00020001
0C0000A8  00010001  0C0000AC  00020001  0C0000B8  00010001  0C0000BC
00020001  0C0000C0  00010001  0C0000C4  E2E2E3C9  F0F0F4F1*
02C5D5C4  40404040  40404040  40404040  40404040  40404040  40404040
000004E2  F1F5F7F3  F460C6D6  F34040F0  F2F0F2F8  F7F0F9F8  40F0F84B
F4F44BF2  F4404040  E2E2E3C9  C3D24040  E2E2E3C9  F0F0F4F2**
```

MEMBER NAME STKBLD

```
02C5E2C4  40404040  40400010  40400001  E2E3D2C2  D3C44040  00000000
40000000  40404040  40404040  40404040  40404040  40404040  40404040
40404040  40404040  40404040  40404040  E2E3D2C2  F0F0F0F1*
02E3E7E3  40000000  40400028  40400001  47F0F00C  07E2E3D2  C2D3C440
90ECD00C  184D98CD  F0205040  D00450D0  400807FC  40404040  40404040
40404040  40404040  40404040  40404040  E2E3D2C2  F0F0F0F2*
02E3E7E3  40000130  40400038  40400001  00000000  00000000  4E000000
00000000  4F080000  00000000  4E000000  80000000  00000000  00000000
00000001  00000002  00000003  00000004  E2E3D2C2  F0F0F0F3*
02C5E2C4  40404040  40400010  40400002  C2E2D6D9  E3404040  02000000
40000000  40404040  40404040  40404040  40404040  40404040  40404040
40404040  40404040  40404040  40404040  E2E3D2C2  F0F0F0F4*
02E3E7E3  40000168  4040002C  40400001  00000005  00000006  00000007
00000008  00000010  00000015  00000016  40400000  41200000  00000000
00000000  40404040  40404040  40404040  E2E3D2C2  F0F0F0F5*
02C5E2C4  40404040  40400010  40400003  C4C5D9D6  E3404040  02000000
40000000  40404040  40404040  40404040  40404040  40404040  40404040
40404040  40404040  40404040  40404040  E2E3D2C2  F0F0F0F6*
02C5E2C4  40404040  40400010  40400004  C4D3D3C9  D4404040  02000000
40000000  40404040  40404040  40404040  40404040  40404040  40404040
40404040  40404040  40404040  40404040  E2E3D2C2  F0F0F0F7*
02C5E2C4  40404040  40400010  40400005  C4E2D8D9  E3404040  02000000
40000000  40404040  40404040  40404040  40404040  40404040  40404040
40404040  40404040  40404040  40404040  E2E3D2C2  F0F0F0F8*
02E3E7E3  40000BF0  40400014  40400001  00000000  00000000  00000000
```

```
00000000  00000000  40404040  40404040  40404040  40404040  40404040
40404040  40404040  40404040  40404040  E2E3D2C2  F0F0F0F9*
02E3E7E3  40000C08  40400004  40400001  00000000  40404040  40404040
40404040  40404040  40404040  40404040  40404040  40404040  40404040
40404040  40404040  40404040  40404040  E2E3D2C2  F0F0F1F0**
02C5E2C4  40404040  40400010  40400006  D4E5C3C8  D9404040  02000000
40000000  40404040  40404040  40404040  40404040  40404040  40404040
40404040  40404040  40404040  40404040  E2E3D2C2  F0F0F1F1*
02E3E7E3  40000C10  40400004  40400001  00000000  40404040  40404040
40404040  40404040  40404040  40404040  40404040  40404040  40404040
40404040  40404040  40404040  40404040  E2E3D2C2  F0F0F1F2*
02E3E7E3  40000C18  40400008  40400001  00000000  00000000  40404040
40404040  40404040  40404040  40404040  40404040  40404040  40404040
40404040  40404040  40404040  40404040  E2E3D2C2  F0F0F1F3*
02E3E7E3  40000C24  40400004  40400001  00000000  40404040  40404040
40404040  40404040  40404040  40404040  40404040  40404040  40404040
40404040  40404040  40404040  40404040  E2E3D2C2  F0F0F1F4*
02C5E2C4  40404040  40400010  40400007  C9D5E3C4  D9E54040  02000000
40000000  40404040  40404040  40404040  40404040  40404040  40404040
40404040  40404040  40404040  40404040  E2E3D2C2  F0F0F1F5*
02E3E7E3  40000C2C  40400004  40400001  00000000  40404040  40404040
40404040  40404040  40404040  40404040  40404040  40404040  40404040
40404040  40404040  40404040  40404040  E2E3D2C2  F0F0F1F6*
02C5E2C4  40404040  40400010  40400008  D4E5C3C8  D9D34040  02000000
40000000  40404040  40404040  40404040  40404040  40404040  40404040
40404040  40404040  40404040  40404040  E2E3D2C2  F0F0F1F7*
02C5E2C4  40404040  40400010  40400009  D7D9C3C4  D9E54040  02000000
40000000  40404040  40404040  40404040  40404040  40404040  40404040
40404040  40404040  40404040  40404040  E2E3D2C2  F0F0F1F8*
02E3E7E3  40000C34  4040000C  40400001  00000000  00000000  00000000
40404040  40404040  40404040  40404040  40404040  40404040  40404040
40404040  40404040  40404040  40404040  E2E3D2C2  F0F0F1F9*
02D9D3C4  40404040  40400038  40404040  00020001  1C000BF0  00030001

MEMBER NAME  STKBLD
1C000BF4  00040001  1C000BF8  00050001  1C000BFC  00060001  1C000C18
00070001  1C000C34  00080001  1C000C38  E2E3D2C2  F0F0F2F0**
02E3E7E3  4000021C  40400020  40400001  00000001  00000004  C6D34040
C1404040  00000005  00000004  C6D34040  C1404040  40404040  40404040
40404040  40404040  40404040  40404040  E2E3D2C2  F0F0F2F1*
02E3E7E3  40000580  40400010  40400001  00000001  00000004  C6D34040
C1404040  40404040  40404040  40404040  40404040  40404040  40404040
40404040  40404040  40404040  40404040  E2E3D2C2  F0F0F2F2*
02E3E7E3  40000CCC  40400038  40400001  58A0DBFC  58B0DBF4  5890DC80
7800D12C  7000D19C  7000D1A0  2B007809  A0006A00  D1186000  D1085800
D10C5000  D1BC4100  B0045000  D04C4100  E2E3D2C2  F0F0F2F3*
02E3E7E3  40000D04  40400038  40400001  B0085000  D0504100  B00C5000
D0544100  B0105000  D0584100  D5685000  D05C4100  D56C5000  D0604100
D5705000  D0644100  D5745000  D0689280  E2E3D2C2  F0F0F2F4*
02E3E7E3  40000D3C  40400038  40400001  D06858F0  DBD04110  D04C05EF
5800D130  5000D16C  5800D13C  5000DC58  5800DC30  5000DC54  5090DC6C
5800DC84  5000DC70  5800DC88  5000DC74  E2E3D2C2  F0F0F2F5*
02E3E7E3  40000D74  40400038  40400001  5800DC8C  5000DC78  5800DC90
5000DC7C  58B0DBE0  5890DBD8  5880DBF4  58E0DC6C  2B00780E  A0006A00
D1186000  D1085820  D10C5020  D1B85920  E2E3D2C2  F0F0F2F6*
02E3E7E3  40000DAC  40400038  40400001  D1BC4780  DD967800  D1A07000
D19C5020  D1BC58E0  DC70410E  A0005000  D0749280  D07458F0  DBF04110
D06C05EF  4850D1F0  5050D180  4800D1F2  E2E3D2C2  F0F0F2F7*
02E3E7E3  40000DE4  40400038  40400001  5000D17C  18755C60  D14C1827
```

```
5A20D13C  5020DC5C  5C40D150  18355A30  D13C4102  B0005000  D07C58F0
DBE84103  F0005000  D08058F0  DC0C4110  E2E3D2C2  F0F0F2F8*
02E3E7E3  40000E1C  40400038  40400001  D07805EF  78208004  7020D578
78208008  7020D57C  4102B000  5000D0A8  58F0DC14  4110D09C  05EF5800
D1845900  D1344770  DE485820  D1945A20  E2E3D2C2  F0F0F2F9*
02E3E7E3  40000E54  40400038  40400001  D1305020  D1948920  00034102
D5785000  D0B858F0  DBF04110  D0B405EF  7820800C  7020D578  78208010
7020D57C  58E0DC5C  410EB000  5000D0A8  E2E3D2C2  F0F0F3F0**
02E3E7E3  40000E8C  40400038  40400001  58F0DC14  4110D09C  05EF5800
D1845900  D1344770  DE9C5820  D1945A20  D1305020  D1948920  00034102
D5785000  D0B858F0  DBF04110  D0B405EF  E2E3D2C2  F0F0F3F1*
02E3E7E3  40000EC4  40400038  40400001  5800D194  12004780  C1A058F0
DBC84110  D0C005EF  5800D194  5900D130  4780C1A0  5820D194  8E200020
5D20D134  18035700  D1245000  D1146820  E2E3D2C2  F0F0F3F2*
02E3E7E3  40000EFC  40400038  40400001  D1106B20  D1202B00  38026A00
D1186000  D1085820  D10C8920  00015920  D1944780  DF727820  D5807A20
D5887D20  D1607020  D5787820  D5847A20  E2E3D2C2  F0F0F3F3*
02E3E7E3  40000F34  40400038  40400001  D58C7D20  D1607020  D57C58E0
DC5C410E  B0005000  D0A858F0  DC144110  D09C05EF  5800D184  5900D134
4780DF66  5820D194  5B20D130  89200003  E2E3D2C2  F0F0F3F4*
02E3E7E3  40000F6C  40400038  40400001  5020D1B0  4100D580  5000D0D8
4100D588  5000D0DC  9280D0DC  58F0DC10  4110D0D4  05EF5800  D1945B00
D1305000  D1945800  D1285000  D1A82B00  E2E3D2C2  F0F0F3F5*
02E3E7E3  40000FA4  40400038  40400001  78008004  6000D1D0  2B007800
80086000  D1E05820  D1948920  00035830  D1305860  D13C5870  D14C5880
D1285890  D1A858A0  D14C18B2  1A931A86  E2E3D2C2  F0F0F3F6*
02E3E7E3  40000FDC  40400038  40400001  2B227827  D5782B44  7847D57C
23226A20  D1D02C22  23446A40  D1E02C44  2A246020  DC9858F0  DBD44110
D0E005EF  7008D234  877ADFB0  5090D1A8  E2E3D2C2  F0F0F3F7*
02E3E7E3  40001014  40400038  40400001  5880DBF4  5890DBD8  58A0DBFC
58B0DBE0  58F0DBC8  4110D0E4  05EF58E0  DC74410E  A0005000  D0F858F0
DBCC4110  D0F805EF  5820D1A8  5B20D130  E2E3D2C2  F0F0F3F8*
02E3E7E3  4000104C  40400038  40400001  5020D1A8  5800D130  5000D170
5800DC1C  5000DC18  58E0DC78  780EA000  7000DC34  58E0DC7C  780EA000

MEMBER NAME  STKBLD
7000DC3C  5800D1B8  5700D124  5000D114  E2E3D2C2  F0F0F3F9*
02E3E7E3  40001084  40400038  40400001  6800D110  6B00D120  7000DC44
5800D190  89000002  5000DC4C  5800D13C  5000DC50  5830D130  5860DC1C
5880D14C  189258A0  D13C58B0  D1345820  E2E3D2C2  F0F0F4F0**
02E3E7E3  400010BC  40400038  40400001  D1701A23  58E0DC50  780ED234
7000DC20  89200002  7802D234  7000DC24  187A5880  DC1858B0  DC4C7840
D1A07860  D19C5890  DC045800  D1C41A03  E2E3D2C2  F0F0F4F1*
02E3E7E3  400010F4  40400038  40400001  5000D1C4  18501C46  18251A2A
7800DC20  70029000  18565C40  D1C41825  5A20D14C  7800DC24  70029000
18565C40  D1C41825  5A20DC28  70629000  E2E3D2C2  F0F0F4F2*
02E3E7E3  4000112C  40400038  40400001  7A60D15C  396447C0  C1103846
18585C40  D1C41825  5A20D150  7800DC34  70029000  7827D210  18585C40
D1C41825  5A20DC38  70229000  18585C40  E2E3D2C2  F0F0F4F3*
02E3E7E3  40001164  40400038  40400001  D1C41825  5A20DC2C  7800DC3C
70029000  18585C40  D1C41825  5A20DC40  7800D12C  70029000  18585C40
D1C41825  1A287800  DC447002  9000877A  E2E3D2C2  F0F0F4F4*
02E3E7E3  4000119C  40400038  40400001  C0C67040  D1A058B0  D1345890
D1A85880  D14C5800  DC501A08  5000DC50  5820D170  1A2B5020  D1701929
47C0C092  5880DBF4  5890DBD8  58A0DBFC  E2E3D2C2  F0F0F4F5*
02E3E7E3  400011D4  40400038  40400001  58B0DBE0  5820D16C  5A20D130
5020D16C  5800DC7C  5A00DC30  5000DC7C  5800DC78  5A00DC30  5000DC78
5800DC74  5A00DC30  5000DC74  5800DC70  E2E3D2C2  F0F0F4F6*
02E3E7E3  4000120C  40400038  40400001  5A00DC30  5000DC70  5800DC6C
```

| | | | | | | |
|---|---|---|---|---|---|---|
| 5A00DC30 | 5000DC6C | 5920D1C0 | 47C0DD68 | 58A0DBFC | 58B0DBF4 | 5890DC80 |
| 1BFF58E0 | D00007FE | 58A0D004 | 58E0A00C | E2E3D2C2 | F0F0F4F7* | |
| 02E3E7E3 | 40001244 | 40400038 | 40400001 | 58B0A018 | 5810B00C | 5820D1B4 |
| 50201000 | 5830B024 | 5840D1C4 | 50403000 | 18DA92FF | A00C982C | A01C07FE |
| 58C0D048 | 987B1004 | 58207000 | 5020D1C0 | E2E3D2C2 | F0F0F4F8* | |
| 02E3E7E3 | 4000127C | 40400038 | 40400001 | 58209000 | 5020D1B4 | 987B1014 |
| 58207000 | 5020D1AC | 58701024 | 58207000 | 5020D1C4 | 58201000 | 41302000 |
| 41500004 | 1B255C40 | D1581B25 | 5020DBFC | E2E3D2C2 | F0F0F4F9* | |
| 02E3E7E3 | 400012B4 | 40400038 | 40400001 | 5030DC00 | 58201008 | 41302000 |
| 41500004 | 1B255C40 | D1341B25 | 5020DBD8 | 5030DBDC | 5030D088 | 5030D0A0 |
| 58201010 | 41302000 | 41500004 | 1B255C40 | E2E3D2C2 | F0F0F5F0** | |
| 02E3E7E3 | 400012EC | 40400038 | 40400001 | D1341B25 | 5020DBE0 | 5030DBE4 |
| 58201018 | 41302000 | 41500004 | 1B255C40 | D13C1B25 | 5020DBE8 | 5030DBEC |
| 5820101C | 41302000 | 41500004 | 1B255020 | E2E3D2C2 | F0F0F5F1* | |
| 02E3E7E3 | 40001324 | 4040002A | 40400001 | DBF45030 | DBF85030 | D0785820 |
| 10204130 | 20004150 | 00041B25 | 5C40D14C | 1B255020 | DC045030 | DC0847F0 |
| DCA44040 | 40404040 | 40404040 | 40404040 | E2E3D2C2 | F0F0F5F2* | |
| 02E3E7E3 | 40000020 | 4040000C | 40400001 | 0000126C | 00000028 | 0000123C |
| 40404040 | 40404040 | 40404040 | 40404040 | 40404040 | 40404040 | 40404040 |
| 40404040 | 40404040 | 40404040 | 40404040 | E2E3D2C2 | F0F0F5F3* | |
| 02E3E7E3 | 40000070 | 40400004 | 40400001 | 00001028 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F4* | |
| 02E3E7E3 | 40000090 | 40400010 | 40400001 | 80000000 | 00000164 | 00000218 |
| 80000000 | 40404040 | 40404040 | 40404040 | 40404040 | 40404040 | 40404040 |
| 40404040 | 40404040 | 40404040 | 40404040 | E2E3D2C2 | F0F0F5F5* | |
| 02E3E7E3 | 400000AC | 40400004 | 40400001 | 000001A4 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F6* | |
| 02D9D3C4 | 40404040 | 40400038 | 40404040 | 00090001 | 1C000C3C | 00010001 |
| 0C000020 | 00010001 | 0C000024 | 00010001 | 0C000028 | 00010001 | 0C000070 |
| 00010001 | 0C000094 | 00010001 | 0C000098 | E2E3D2C2 | F0F0F5F7* | |
| 02E3E7E3 | 400000B4 | 40400014 | 40400001 | 000001DC | 00000590 | 000005A8 |
| 800001BC | 000005A0 | 40404040 | 40404040 | 40404040 | 40404040 | 40404040 |
| 40404040 | 40404040 | 40404040 | 40404040 | E2E3D2C2 | F0F0F5F8* | |

MEMBER NAME STKBLD

| | | | | | | |
|---|---|---|---|---|---|---|
| 02E3E7E3 | 400000CC | 40400004 | 40400001 | 000001DC | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F9* | |
| 02E3E7E3 | 400000D4 | 40400004 | 40400001 | 000001A4 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F0** | |
| 02D9D3C4 | 40404040 | 40400038 | 40404040 | 00010001 | 0C0000AC | 00010001 |
| 0C0000B4 | 00010001 | 0C0000B8 | 00010001 | 0C0000BC | 00010001 | 0C0000C0 |
| 00010001 | 0C0000C4 | 00010001 | 0C0000CC | E2E3D2C2 | F0F0F6F1* | |
| 02E3E7E3 | 400000D8 | 40400008 | 40400001 | 800001AC | 00000174 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F2* | |
| 02E3E7E3 | 400000E4 | 40400014 | 40400001 | 800005A0 | 0000021C | 0000015C |
| 000005A8 | 00000174 | 40404040 | 40404040 | 40404040 | 40404040 | 40404040 |
| 40404040 | 40404040 | 40404040 | 40404040 | E2E3D2C2 | F0F0F6F3* | |
| 02D9D3C4 | 40404040 | 40400038 | 40404040 | 00010001 | 0C0000D4 | 00010001 |
| 0C0000D8 | 00010001 | 0C0000DC | 00010001 | 0C0000E4 | 00010001 | 0C0000E8 |
| 00010001 | 0C0000EC | 00010001 | 0C0000F0 | E2E3D2C2 | F0F0F6F4* | |
| 02E3E7E3 | 400000F8 | 40400008 | 40400001 | 800001BC | 000001D8 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F5* | |
| 02E3E7E3 | 40000104 | 40400018 | 40400001 | 80000000 | 80000CC0 | 00000580 |

```
00000158  00000260  00000164  40404040  40404040  40404040  40404040
40404040  40404040  40404040  40404040  E2E3D2C2  F0F0F6F6*
02D9D3C4  40404040  40400038  40404040  00010001  0C0000F4  00010001
0C0000F8  00010001  0C0000FC  00010001  0C000108  00010001  0C00010C
00010001  0C000110  00010001  0C000114  E2E3D2C2  F0F0F6F7*
02E3E7E3  4000011C  40400004  40400001  800001D0  40404040  40404040
40404040  40404040  40404040  40404040  40404040  40404040  40404040
40404040  40404040  40404040  40404040  E2E3D2C2  F0F0F6F8*
02E3E7E3  40000124  40400008  40400001  0000023C  800001B8  40404040
40404040  40404040  40404040  40404040  40404040  40404040  40404040
40404040  40404040  40404040  40404040  E2E3D2C2  F0F0F6F9*
02E3E7E3  40000C40  40400038  40400001  00000000  00000020  00000000
00000000  0000000C  00000018  00000058  00000000  00000014  00000000
0000001C  00000000  00000000  00000000  E2E3D2C2  F0F0F7F0**
02E3E7E3  40000C78  40400038  40400001  00000000  0174000E  00000000
0178000F  00000054  00000040  00000000  01580010  015C0010  00000000
00000011  01200011  00000064  000000AC  E2E3D2C2  F0F0F7F1*
02E3E7E3  40000CB0  4040001C  40400001  00000098  00000070  00000068
01380011  01D80011  00000000  029C0012  40404040  40404040  40404040
40404040  40404040  40404040  40404040  E2E3D2C2  F0F0F7F2*
02D9D3C4  40404040  40400020  40404040  00010001  0C000118  00010001
0C00011C  00010001  0C000124  00010001  0C000128  40404040  40404040
40404040  40404040  40404040  40404040  E2E3D2C2  F0F0F7F3*
02C5D5C4  40404040  40404040  40404040  40404040  40404040  40404040
0000134E  F1F5F7F3  F460C6D6  F34040F0  F2F0F2F8  F7F0F9F8  40F0F84B
F4F44BF2  F9404040  E2E3D2C2  D3C44040  E2E3D2C2  F0F0F7F4**

MEMBER NAME  STKCAL
02C5E2C4  40404040  40400010  40400001  E2E3D2C3  C1D34040  00000000
40000000  40404040  40404040  40404040  40404040  40404040  40404040
40404040  40404040  40404040  40404040  E2E3D2C3  F0F0F0F1*
02E3E7E3  40000000  40400028  40400001  47F0F00C  07E2E3D2  C3C1D340
90ECD00C  184D98CD  F0205040  D00450D0  400807FC  40404040  40404040
40404040  40404040  40404040  40404040  E2E3D2C3  F0F0F0F2*
02E3E7E3  400000E0  40400038  40400001  00000000  00000000  4E000000
00000000  4F080000  00000000  4E000000  80000000  00000000  00000000
41100000  00000000  42B40000  00000000  E2E3D2C3  F0F0F0F3*
02E3E7E3  40000118  40400038  40400001  00000000  00000000  00000001
00000002  00000003  00000004  00000005  00000006  00000007  00000008
00000018  00000058  41100000  425A0000  E2E3D2C3  F0F0F0F4*
02C5E2C4  40404040  40400010  40400002  E3D6D3C5  D9404040  05000000
4000000C  40404040  40404040  40404040  40404040  40404040  40404040
40404040  40404040  40404040  40404040  E2E3D2C3  F0F0F0F5*
02E3E7E3  40000150  4040000C  40400001  42B40000  00000000  00000000
40404040  40404040  40404040  40404040  40404040  40404040  40404040
40404040  40404040  40404040  40404040  E2E3D2C3  F0F0F0F6*
02C5E2C4  40404040  40400010  40400003  D7D4C1E3  D3404040  05000000
40001134  40404040  40404040  40404040  40404040  40404040  40404040
40404040  40404040  40404040  40404040  E2E3D2C3  F0F0F0F7*
02C5E2C4  40404040  40400010  40400004  C2E2D6D9  E3404040  02000000
40000000  40404040  40404040  40404040  40404040  40404040  40404040
40404040  40404040  40404040  40404040  E2E3D2C3  F0F0F0F8*
02E3E7E3  40000F20  40400014  40400001  00000000  FFFFFFA0  00001130
00000000  00000000  40404040  40404040  40404040  40404040  40404040
40404040  40404040  40404040  40404040  E2E3D2C3  F0F0F0F9*
02C5E2C4  40404040  40400010  40400005  E4D5C9E3  C4404040  02000000
40000000  40404040  40404040  40404040  40404040  40404040  40404040
40404040  40404040  40404040  40404040  E2E3D2C3  F0F0F1F0**
02E3E7E3  40000F38  40400004  40400001  00000000  40404040  40404040
```

```
40404040  40404040  40404040  40404040  40404040  40404040  40404040
40404040  40404040  40404040  40404040  E2E3D2C3  F0F0F1F1*
02C5E2C4  40404040  40400010  40400006  C3D6D5E2  E3D94040  02000000
40000000  40404040  40404040  40404040  40404040  40404040  40404040
40404040  40404040  40404040  40404040  E2E3D2C3  F0F0F1F2*
02E3E7E3  40000F40  40400008  40400001  00000000  00000000  40404040
40404040  40404040  40404040  40404040  40404040  40404040  40404040
40404040  40404040  40404040  40404040  E2E3D2C3  F0F0F1F3*
02C5E2C4  40404040  40400010  40400007  C4C1D9C3  D6E24040  02000000
40000000  40404040  40404040  40404040  40404040  40404040  40404040
40404040  40404040  40404040  40404040  E2E3D2C3  F0F0F1F4*
02E3E7E3  40000F4C  40400008  40400001  00000000  00000000  40404040
40404040  40404040  40404040  40404040  40404040  40404040  40404040
40404040  40404040  40404040  40404040  E2E3D2C3  F0F0F1F5*
02E3E7E3  400001E8  40400010  40400001  00000001  00000004  C6D34040
C1404040  40404040  40404040  40404040  40404040  40404040  40404040
40404040  40404040  40404040  40404040  E2E3D2C3  F0F0F1F6*
02E3E7E3  40000FF8  40400038  40400001  5890DF1C  58A0DF08  58B0DEF8
5880DF38  7820A00C  7B20A004  2B003802  6000D188  7820A010  7B20A008
2B003802  6000D190  6800D0D8  6000D198  E2E3D2C3  F0F0F1F7*
02E3E7E3  40001030  40400038  40400001  58F0DF18  4110D04C  05EF5800
D0F05000  D1545080  DF445800  DF645000  DF505830  DF645860  D0F81878
5880D0F8  7840B004  58A0DF10  5800D154  E2E3D2C3  F0F0F1F8*
02E3E7E3  40001068  40400038  40400001  12004780  C07A1828  7803A000
7000DF60  5870D118  58A0DF40  18B27820  DF607B2A  90003062  396447A0
C06E47F0  C0AA1AB8  1AA759B0  D15447C0  E2E3D2C3  F0F0F1F9*
02E3E7E3  400010A0  40400038  40400001  C05A58A0  DF1058B0  DEF85870

MEMBER NAME  STKCAL
DF385800  D1541A08  5000D154  58E0DF50  782EA000  5850D154  5C40D118
18255A20  D1047022  900058A0  DF1058B0  E2E3D2C3  F0F0F2F0**
02E3E7E3  400010D8  40400038  40400001  DEF85870  DF381A68  5800DF50
1A075000  DF501A37  5960D150  47C0C03C  58A0DF08  58B0DEF8  5880DF38
5080DF44  5800DF68  5000DF50  5830DF68  E2E3D2C3  F0F0F2F1*
02E3E7E3  40001110  40400038  40400001  5860D0F8  18785880  D0F87840
B00458A0  DF101828  7803A000  7000DF5C  5870D118  58A0DF40  18B27820
DF5C7B2A  90003062  396447A0  C12247F0  E2E3D2C3  F0F0F2F2*
02E3E7E3  40001148  40400038  40400001  C15E1AB8  1AA759B0  D15447C0
C10E58A0  DF1058B0  DEF85870  DF385800  D1541A08  5000D154  58E0DF50
782EA000  5850D154  5C40D118  18255A20  E2E3D2C3  F0F0F2F3*
02E3E7E3  40001180  40400038  40400001  D1047022  900058A0  DF1058B0
DEF85870  DF381A68  5800DF50  1A075000  DF501A37  5960D150  47C0C0FA
58A0DF08  58B0DEF8  5880DF38  58F0DF04  E2E3D2C3  F0F0F2F4*
02E3E7E3  400011B8  40400038  40400001  4110D058  05EF58F0  DF284110
D06C05EF  6000D1A0  6800D190  220047A0  C1B86800  D1A02300  6000D1A0
6800D1A0  6C00D0E8  6000DFB8  6800D0E0  E2E3D2C3  F0F0F2F5*
02E3E7E3  400011F0  40400038  40400001  23006000  DFC058F0  DF284110
D07005EF  6000DFC8  6800DFB8  6D00DFC8  6000D1A0  5820D0F8  5800DF40
5000DF2C  7800D124  33007000  DF305860  E2E3D2C3  F0F0F2F6*
02E3E7E3  40001228  40400038  40400001  D0F81878  5880DFB0  189258A0
DF7058B0  DF102B22  7828B000  6B20D1A0  702AB000  786AB000  7960D124
47C0C236  38267B20  D128702A  B000784A  E2E3D2C3  F0F0F2F7*
02E3E7E3  40001260  40400038  40400001  B0007940  DF304730  C24C3824
7A20D128  702AB000  1A961A87  1AA75990  D15047C0  C2125890  DF1C58A0
DF0858B0  DEF85880  DF385830  D1545B30  E2E3D2C3  F0F0F2F8*
02E3E7E3  40001298  40400038  40400001  D0F85800  D1045000  DF2C5800
D1185000  DF7C1C20  5030DF88  5800D118  5000DF84  5800DF40  5000DF8C
5080DF90  5800DF64  5000DF94  5800DF68  E2E3D2C3  F0F0F2F9*
02E3E7E3  400012D0  40400038  40400001  5000DF98  5800DFB4  5000DF9C
```

```
5800DF6C  5000DFA0  5080DFA4  5850DF78  5860DF74  5870DF3C  5890D0F0
58A0D118  58B0DF1C  5880DEF8  5090D158  E2E3D2C3  F0F0F3F0**
02E3E7E3  40001308  40400038  40400001  58E0DF8C  782EB000  7A208004
5090DF44  5090DF48  5850DF70  5860DF6C  5870DF68  5880DF64  5890D0F8
58A0DF38  386258B0  DF107968  B00047C0  E2E3D2C3  F0F0F3F1*
02E3E7E3  40001340  40400038  40400001  C3667967  B00047A0  C3665800
D1585A00  D0F85000  D1585820  DF485A20  D1145020  DF485840  DF445A40
D1045040  DF442B00  7806B000  6A00D0C8  E2E3D2C3  F0F0F3F2*
02E3E7E3  40001378  40400038  40400001  6000D0B8  5830D0BC  5034D1CC
2B227825  B0006022  D7185A90  D0F81A5A  1A6A1A7A  1A8A5990  D15047C0
C3125880  DEF858B0  DF1C58A0  D1185890  E2E3D2C3  F0F0F3F3*
02E3E7E3  400013B0  40400038  40400001  D0F05870  DF3C5860  DF745850
DF785800  D1581200  4780C424  58F0DF24  4110D074  05EF6860  D5D86820
D5F06020  DFB82D62  6820D5E8  6840D5D0  E2E3D2C3  F0F0F3F4*
02E3E7E3  400013E8  40400038  40400001  28022D04  2C602366  6A60D0E0
2C466D40  D1A86820  DFB82C26  6D20D1A8  6860D1A8  58E0DF90  706EB000
5800D158  5700D0D4  5000D0C4  6860D0C0  E2E3D2C3  F0F0F3F5*
02E3E7E3  40001420  40400038  40400001  6B60D0D0  58E0DF94  706EB000
58E0DF98  704EB000  58E0DF9C  702EB000  58E0DFA0  7800D0F4  700EB000
47F0C468  58E0DFA4  7800D0F4  700EB000  E2E3D2C3  F0F0F3F6*
02E3E7E3  40001458  40400038  40400001  5820DF84  1A267800  D0F47002
B0005820  DF841A27  7800D0F4  7002B000  5820DF84  1A257800  D0F47002
B0005820  DF841A2A  7800D0F4  7002B000  E2E3D2C3  F0F0F3F7*
02E3E7E3  40001490  40400038  40400001  5800DFA4  1A0A5000  DFA45800
DFA01A0A  5000DFA0  5800DF9C  1A0A5000  DF9C5800  DF981A0A  5000DF98
5800DF94  1A0A5000  DF945800  DF901A0A  E2E3D2C3  F0F0F3F8*
02E3E7E3  400014C8  40400038  40400001  5000DF90  5800DF8C  1A0A5000
DF8C5820  DF841A2A  5020DF84  5920DF88  47C0C2DC  5890DF1C  58A0DF08

MEMBER NAME  STKCAL
58B0DEF8  5880DF38  1BFF58E0  D00007FE  E2E3D2C3  F0F0F3F9*
02E3E7E3  40001500  40400038  40400001  58A0D004  58E0A00C  58B0A018
5810B00C  5820D154  50201000  5830B014  6820D188  60203000  5840B018
6840D190  60404000  5850B01C  6860D1A0  E2E3D2C3  F0F0F4F0**
02E3E7E3  40001538  40400038  40400001  60605000  18DA92FF  A00C982C
A01C07FE  58C0D048  987B1004  58207000  5020D150  58209000  5020D154
98791014  68207000  6020D188  68208000  E2E3D2C3  F0F0F4F1*
02E3E7E3  40001570  40400038  40400001  6020D190  68209000  6020D1A0
58201000  41302000  41500004  1B255C40  D1141B25  5020DF10  5030DF14
58201008  41302000  41500004  1B255C40  E2E3D2C3  F0F0F4F2*
02E3E7E3  400015A8  4040002A  40400001  D10C1B25  5020DF1C  5030DF20
5030D060  58201010  41302000  41500004  1B255020  DF085030  DF0C47F0
DFD04040  40404040  40404040  40404040  E2E3D2C3  F0F0F4F3*
02E3E7E3  40000020  40400004  40400001  00001548  40404040  40404040
40404040  40404040  40404040  40404040  40404040  40404040  40404040
40404040  40404040  40404040  40404040  E2E3D2C3  F0F0F4F4*
02D9D3C4  40404040  40400038  40404040  00020001  0C000F20  00030001
0C000F24  00030001  0C000F28  00040001  1C000F2C  00050001  1C000F40
00060001  1C000F4C  00070001  1C000F50  E2E3D2C3  F0F0F4F5*
02E3E7E3  40000024  40400008  40400001  00000028  00001500  40404040
40404040  40404040  40404040  40404040  40404040  40404040  40404040
40404040  40404040  40404040  40404040  E2E3D2C3  F0F0F4F6*
02E3E7E3  40000070  40400014  40400001  00001028  000001B0  000001B8
800001C0  000001E8  40404040  40404040  40404040  40404040  40404040
40404040  40404040  40404040  40404040  E2E3D2C3  F0F0F4F7*
02D9D3C4  40404040  40400038  40404040  00010001  0C000020  00010001
0C000024  00010001  0C000028  00010001  0C000070  00010001  0C000074
00010001  0C000078  00010001  0C00007C  E2E3D2C3  F0F0F4F8*
02E3E7E3  40000084  40400004  40400001  00000120  40404040  40404040
```

```
40404040  40404040  40404040  40404040  40404040  40404040  40404040
40404040  40404040  40404040  40404040  E2E3D2C3  F0F0F4F9*
02E3E7E3  4000008C  40400018  40400001  00000140  8000017C  800001B0
80000FE8  00000748  000001F8  40404040  40404040  40404040  40404040
40404040  40404040  40404040  40404040  E2E3D2C3  F0F0F5F0**
02D9D3C4  40404040  40400038  40404040  00010001  0C000080  00010001
0C000084  00010001  0C00008C  00010001  0C000090  00010001  0C000094
00010001  0C000098  00010001  0C00009C  E2E3D2C3  F0F0F5F1*
02E3E7E3  400000A4  4040001C  40400001  00000180  000001D8  000005F8
00000658  000006B8  00000700  000005E0  40404040  40404040  40404040
40404040  40404040  40404040  40404040  E2E3D2C3  F0F0F5F2*
02D9D3C4  40404040  40400038  40404040  00010001  0C0000A0  00010001
0C0000A4  00010001  0C0000A8  00010001  0C0000AC  00010001  0C0000B0
00010001  0C0000B4  00010001  0C0000B8  E2E3D2C3  F0F0F5F3*
02E3E7E3  400000C0  4040001C  40400001  00000640  000006A0  00000198
000001D0  00000168  00000164  8000016C  40404040  40404040  40404040
40404040  40404040  40404040  40404040  E2E3D2C3  F0F0F5F4*
02D9D3C4  40404040  40400038  40404040  00010001  0C0000BC  00010001
0C0000C0  00010001  0C0000C4  00010001  0C0000C8  00010001  0C0000CC
00010001  0C0000D0  00010001  0C0000D4  E2E3D2C3  F0F0F5F5*
02E3E7E3  40000F54  40400038  40400001  00000000  00000000  00000000
00000020  00000010  0000001C  00000000  00000000  00000000  00000000
00000000  00000000  00000000  00000000  E2E3D2C3  F0F0F5F6*
02E3E7E3  40000F8C  40400038  40400001  00000024  00000028  00000030
0000003C  0000000C  00000014  00000000  00000000  00000000  03CC0007
00000000  03700008  00000000  03DC0008  E2E3D2C3  F0F0F5F7*
02E3E7E3  40000FC4  40400034  40400001  00000000  03E80008  00000000
03F40008  00000000  00000034  0000002C  00000008  02740008  00000000
03580009  00000000  03A80009  40404040  E2E3D2C3  F0F0F5F8*

MEMBER NAME  STKCAL
02D9D3C4  40404040  40400008  40404040  00010001  0C0000D8  40404040
40404040  40404040  40404040  40404040  40404040  40404040  40404040
40404040  40404040  40404040  40404040  E2E3D2C3  F0F0F5F9*
02C5D5C4  40404040  40404040  40404040  40404040  40404040  40404040
000015D2  F1F5F7F3  F460C6D6  F34040F0  F2F0F2F8  F7F0F9F8  40F0F84B
F4F44BF3  F4404040  E2E3D2C3  C1D34040  E2E3D2C3  F0F0F6F0**

MEMBER NAME  STKEPL
02C5E2C4  40404040  40400010  40400001  E2E3D2C5  D7D34040  00000000
40000000  40404040  40404040  40404040  40404040  40404040  40404040
40404040  40404040  40404040  40404040  E2E3D2C5  F0F0F0F1*
02E3E7E3  40000000  40400038  40400001  47F0F00C  07E2E3D2  C5D7D340
90ECD00C  184D98CD  F0205040  D00450D0  400807FC  40404040  40404040
020A0401  22021404  22020A08  011A015B  E2E3D2C5  F0F0F0F2*
02E3E7E3  40000038  40400038  40400001  0A09031A  015B0A09  03220206
07140422  C4C9E2E3  C1D5C3C5  5BE77E5B  E87E4040  C54DF15D  5CE35BC5
4DF15D5B  C54DF25D  5CE35BC5  4DF25D40  E2E3D2C5  F0F0F0F3*
02E3E7E3  40000070  40400008  40400001  E740F1F0  4AF64040  40404040
40404040  40404040  40404040  40404040  40404040  40404040  40404040
40404040  40404040  40404040  40404040  E2E3D2C5  F0F0F0F4*
02E3E7E3  40000300  40400038  40400001  00000000  00000000  4F080000
00000000  00000000  00000000  00000001  00000002  00000003  00000004
00000005  00000006  00000008  0000000E  E2E3D2C5  F0F0F0F5*
02E3E7E3  40000338  40400038  40400001  00000016  00000017  0000001C
00000058  00000384  000F4240  3E418937  401DF3B6  4029FBE7  402E147B
403EF9DB  406D9168  40BD70A4  41100000  E2E3D2C5  F0F0F0F6*
02E3E7E3  40000370  40400038  40400001  4111999A  4119999A  411D70A4
412570A4  4136147B  41491EB8  41A00000  41E00000  41EF0A3D  41F2E148
```

```
41F70A3D  41FB0A3D  42180000  42184CCD  E2E3D2C5  F0F0F0F7*
02C5E2C4  40404040  40400010  40400002  D7D4C1E3  D3404040  05000000
40001134  40404040  40404040  40404040  40404040  40404040  40404040
40404040  40404040  40404040  40404040  E2E3D2C5  F0F0F0F8*
02E3E7E3  400003A8  4040000C  40400001  45F42400  00000000  00000000
40404040  40404040  40404040  40404040  40404040  40404040  40404040
40404040  40404040  40404040  40404040  E2E3D2C5  F0F0F0F9*
02C5E2C4  40404040  40400010  40400003  C3C1C4D3  E3404040  02000000
40000000  40404040  40404040  40404040  40404040  40404040  40404040
40404040  40404040  40404040  40404040  E2E3D2C5  F0F0F1F0**
02E3E7E3  40000430  40400010  40400001  FFFFFFA0  00001130  00000000
00000000  40404040  40404040  40404040  40404040  40404040  40404040
40404040  40404040  40404040  40404040  E2E3D2C5  F0F0F1F1*
02E3E7E3  40000444  40400004  40400001  00000000  40404040  40404040
40404040  40404040  40404040  40404040  40404040  40404040  40404040
40404040  40404040  40404040  40404040  E2E3D2C5  F0F0F1F2*
02C5E2C4  40404040  40400010  40400004  C3C1C4D3  D5F14040  02000000
40000000  40404040  40404040  40404040  40404040  40404040  40404040
40404040  40404040  40404040  40404040  E2E3D2C5  F0F0F1F3*
02E3E7E3  4000044C  40400004  40400001  00000000  40404040  40404040
40404040  40404040  40404040  40404040  40404040  40404040  40404040
40404040  40404040  40404040  40404040  E2E3D2C5  F0F0F1F4*
02C5E2C4  40404040  40400010  40400005  C3C1C4E2  E4D74040  02000000
40000000  40404040  40404040  40404040  40404040  40404040  40404040
40404040  40404040  40404040  40404040  E2E3D2C5  F0F0F1F5*
02C5E2C4  40404040  40400010  40400006  C3D4D7D9  E2E24040  02000000
40000000  40404040  40404040  40404040  40404040  40404040  40404040
40404040  40404040  40404040  40404040  E2E3D2C5  F0F0F1F6*
02C5E2C4  40404040  40400010  40400007  C9C2C3D6  D47B4040  02000000
40000000  40404040  40404040  40404040  40404040  40404040  40404040
40404040  40404040  40404040  40404040  E2E3D2C5  F0F0F1F7*
02E3E7E3  40000454  40400010  40400001  00000000  00000000  00000000
00000000  40404040  40404040  40404040  40404040  40404040  40404040
40404040  40404040  40404040  40404040  E2E3D2C5  F0F0F1F8*
02E3E7E3  400004C0  40400038  40400001  5870D3D4  58B0D3EC  58A0D2C8
58F0D3C0  4110D07C  05EF7800  D29C7000  D3745820  D3705B20  D2A0183A
5840D3F4  185A186B  5880D2A0  5890D438  E2E3D2C5  F0F0F1F9*
02E3E7E3  400004F8  40400038  40400001  58A0D2A0  18B27829  70007C24

MEMBER NAME  STKEPL
70007D20  D3307020  D3683842  7B40D374  30447940  D2D84750  D4F47020
D3747B20  D3287020  D35C198A  4780D4E4  E2E3D2C5  F0F0F2F0**
02E3E7E3  40000530  40400038  40400001  41057000  5000D088  58F0D3DC
4110D080  05EF4105  70005000  D0904105  70005000  D09858F0  D3DC4110
D09005EF  7800D35C  7000D360  78037000  E2E3D2C5  F0F0F2F1*
02E3E7E3  40000568  40400038  40400001  7000D354  1A361A56  1A461A96
878AD486  58B0D3EC  58A0D2C8  5800D2AC  5000D420  50B0D424  185B5C40
D3705820  D2AC1A25  41027000  5000D088  E2E3D2C5  F0F0F2F2*
02E3E7E3  400005A0  40400038  40400001  58F0D3DC  4110D080  05EF7800
D3083300  7000D428  7800D318  33007000  D4307800  D3003300  7000D42C
58F0D3DC  4110D0A0  05EF58F0  D3C04110  E2E3D2C5  F0F0F2F3*
02E3E7E3  400005D8  40400038  40400001  D0B005EF  7800D29C  7000D374
5820D370  5B20D2A0  184B185A  5860D438  5880D2A0  189A58A0  D2A018B2
78267000  7D20D330  7020D368  38427B40  E2E3D2C5  F0F0F2F4*
02E3E7E3  40000610  40400038  40400001  D3743044  7940D2D8  4750D5F2
7020D374  7B20D328  7020D35C  198A4780  D5E24109  70005000  D08858F0
D3DC4110  D08005EF  41097000  5000D090  E2E3D2C5  F0F0F2F5*
02E3E7E3  40000648  40400038  40400001  41097000  5000D098  58F0D3DC
4110D090  05EF7800  D35C7000  D3607805  70007000  D3541A54  1A941A64
```

```
878AD588  58B0D3EC  58A0D2C8  5850D370  E2E3D2C5  F0F0F2F6*
02E3E7E3  40000680  40400038  40400001  5C40D424  5820D420  1A254102
70005000  D08858F0  D3DC4110  D08005EF  7800D31C  33007000  D44058F0
D3DC4110  D0B405EF  58F0D3C0  4110D0C4  E2E3D2C5  F0F0F2F7*
02E3E7E3  400006B8  40400038  40400001  05EF7800  D29C7000  D3745820
D3705B20  D2A0183A  5840D3F4  185A186B  5880D2A0  5890D43C  58A0D2A0
18B27829  70007C24  70007D20  D3307020  E2E3D2C5  F0F0F2F8*
02E3E7E3  400006F0  40400038  40400001  D3683842  7B40D374  30447940
D2D84750  D6D87020  D3747B20  D3287020  D35C198A  4780D6C8  41057000
5000D088  58F0D3DC  4110D080  05EF4105  E2E3D2C5  F0F0F2F9*
02E3E7E3  40000728  40400038  40400001  70005000  D0904105  70005000
D09858F0  D3DC4110  D09005EF  7800D35C  7000D360  78037000  7000D354
1A361A56  1A461A96  878AD66A  58B0D3EC  E2E3D2C5  F0F0F3F0**
02E3E7E3  40000760  40400038  40400001  58A0D2C8  5850D370  5C40D424
5820D420  1A254102  70005000  D08858F0  D3DC4110  D08005EF  7800D320
33007000  D44058F0  D3DC4110  D0C805EF  E2E3D2C5  F0F0F3F1*
02E3E7E3  40000798  40400038  40400001  58F0D3C0  4110D0D8  05EF7800
D29C7000  D3745820  D3705B20  D2A0184B  185A5860  D43C5880  D2A0189A
58A0D2A0  18B27826  70007D20  D3307020  E2E3D2C5  F0F0F3F2*
02E3E7E3  400007D0  40400038  40400001  D3683842  7B40D374  30447940
D2D84750  D7B87020  D3747B20  D3287020  D35C198A  4780D7A8  41097000
5000D088  58F0D3DC  4110D080  05EF4109  E2E3D2C5  F0F0F3F3*
02E3E7E3  40000808  40400038  40400001  70005000  D0904109  70005000
D09858F0  D3DC4110  D09005EF  7800D35C  7000D360  78057000  7000D354
1A541A94  1A64878A  D74E58B0  D3EC58A0  E2E3D2C5  F0F0F3F4*
02E3E7E3  40000840  40400038  40400001  D2C85850  D3705C40  D4245820
D4201A25  41027000  5000D088  58F0D3DC  4110D080  05EF7800  D3243300
7000D440  58F0D3DC  4110D0DC  05EF7820  E2E3D2C5  F0F0F3F5*
02E3E7E3  40000878  40400038  40400001  D3283322  7020D360  7020D434
7800D29C  7000D368  58F0D3C0  4110D0D8  05EF7800  D2F03300  7000D3F8
7800D2EC  33007000  D3FC186B  58A0D2C0  E2E3D2C5  F0F0F3F6*
02E3E7E3  400008B0  40400034  40400001  58B0D2A0  18565C40  D3701835
5A30D2AC  41037000  5000D0F4  58F0D3DC  4110D0EC  05EF58F0  D3E81800
45E0F004  00000000  00000028  40404040  E2E3D2C5  F0F0F3F7*
02D9D3C4  40404040  40400038  40404040  00020001  0C000430  00020001
0C000434  00030001  1C000438  00040001  1C000454  00050001  1C000458
00060001  1C00045C  00070001  1C000460  E2E3D2C5  F0F0F3F8*
02E3E7E3  400008E4  40400038  40400001  45E0F008  0470D368  45E0F010
58F0D3E8  45E0F000  00000000  0000002D  45E0F00C  00000408  04700007

MEMBER NAME  STKEPL
45E0F010  7800D360  7A00D2E4  7000D440  E2E3D2C5  F0F0F3F9*
02E3E7E3  4000091C  40400038  40400001  58F0D3E0  4110D0FC  05EF41E0
000415FE  4720D8BE  58EFD04C  07FE7800  D3687A00  D2F47000  D3687800
D3607A00  D2F47000  D3605AB0  D2A019BA  E2E3D2C5  F0F0F4F0**
02E3E7E3  40000954  40400038  40400001  47C0D83C  58B0D3EC  58A0D2C8
7800D2F8  33007000  D4407800  D3143300  7000D444  58F0D3E0  4110D144
05EF41E0  000415FE  4720D916  58EFD054  E2E3D2C5  F0F0F4F1*
02E3E7E3  4000098C  40400038  40400001  07FE7800  D30C3300  7000D440
58F0D3E0  4110D18C  05EF41E0  000415FE  4720D93A  58EFD05C  07FE7800
D2FC3300  7000D440  7800D32C  33007000  E2E3D2C5  F0F0F4F2*
02E3E7E3  400009C4  40400038  40400001  D44458F0  D3E04110  D1D405EF
41E00004  15FE4720  D96858EF  D06407FE  5850D370  5C40D424  5820D420
1A257822  70007D20  D3102B00  38026A00  E2E3D2C5  F0F0F4F3*
02E3E7E3  400009FC  40400038  40400001  D2906000  D2885820  D28C5A20
D2A47800  D29C7000  D3547800  D3043300  7000D3F8  7800D434  7000D3FC
7800D32C  33007000  D400186B  189258B0  E2E3D2C5  F0F0F4F4*
02E3E7E3  40000A34  40400038  40400001  D2A058A0  D3C45880  D3CC19B9
4770D9E0  18565C40  D3701825  5A20D2AC  78027000  7000D354  5850D36C
```

```
5C40D3F4  18255A20  D3F07802  80007000  E2E3D2C5  F0F0F4F5*
02E3E7E3  40000A6C  40400038  40400001  D37C59B0  D2A04770  DA067800
D3F87000  D37C58F0  D3DC4110  D21C05EF  2B447840  D3542864  6C60D380
2B227820  A0042A26  7020D358  6C40D388  E2E3D2C5  F0F0F4F6*
02E3E7E3  40000AA4  40400038  40400001  2B227820  A0082A24  7020D364
58F0D3E8  45E0F004  00000000  00000031  45E0F008  0470D354  45E0F008
0470D358  45E0F008  0470D364  45E0F010  E2E3D2C5  F0F0F4F7*
02E3E7E3  40000ADC  40400038  40400001  58F0D3E8  45E0F000  00000000
00000042  45E0F00C  00000408  04700007  45E0F010  58F0D3E4  4110D22C
05EF41E0  000415FE  4720DA9E  58EFD06C  E2E3D2C5  F0F0F4F8*
02E3E7E3  40000B14  40400038  40400001  07FE58F0  D3E04110  D23C05EF
41E00004  15FE4720  DAB858EF  D07407FE  7800D354  7A00D310  7000D354
5AB0D2A0  19B947C0  D9C658B0  D3EC58A0  E2E3D2C5  F0F0F4F9*
02E3E7E3  40000B4C  40400038  40400001  D2C858F0  D3C04110  D07C05EF
1BFF58E0  D00007FE  58A0D004  58E0A00C  58B0A018  5810B00C  5820D370
50201000  18DA92FF  A00C982C  A01C07FE  E2E3D2C5  F0F0F5F0**
02E3E7E3  40000B84  40400038  40400001  987B1004  58207000  5020D36C
58209000  5020D370  98781014  68207000  6020D380  68208000  6020D388
58201000  41302000  41500004  1B255C40  E2E3D2C5  F0F0F5F1*
02E3E7E3  40000BBC  40400038  40400001  D2B81B25  5020D3CC  5030D3D0
58201008  41302000  41500004  1B255C40  D2B41B25  5020D3D4  5030D3D8
58201010  41302000  41500004  1B255020  E2E3D2C5  F0F0F5F2*
02E3E7E3  40000BF4  4040000A  40400001  D3C45030  D3C847F0  D4484040
40404040  40404040  40404040  40404040  40404040  40404040  40404040
40404040  40404040  40404040  40404040  E2E3D2C5  F0F0F5F3*
02E3E7E3  40000020  40400008  40400001  00000B84  00000078  40404040
40404040  40404040  40404040  40404040  40404040  40404040  40404040
40404040  40404040  40404040  40404040  E2E3D2C5  F0F0F5F4*
02D9D3C4  40404040  40400038  40404040  00010001  0C0008E0  00010001
0C0008FC  00010001  0C000904  00010001  0C000ABC  00010001  0C000AE8
00010001  0C000AF0  00010001  0C000020  E2E3D2C5  F0F0F5F5*
02E3E7E3  40000078  40400004  40400001  00000B60  40404040  40404040
40404040  40404040  40404040  40404040  40404040  40404040  40404040
40404040  40404040  40404040  40404040  E2E3D2C5  F0F0F5F6*
02E3E7E3  400000C4  40400018  40400001  00000936  00000936  0000098E
000009E0  000009B2  000009E0  40404040  40404040  40404040  40404040
40404040  40404040  40404040  40404040  E2E3D2C5  F0F0F5F7*
02D9D3C4  40404040  40400038  40404040  00010001  0C000024  00010001
0C000078  00010001  0C0000C4  00010001  0C0000C8  00010001  0C0000CC
00010001  0C0000D0  00010001  0C0000D4  E2E3D2C5  F0F0F5F8*

MEMBER NAME  STKEPL
02E3E7E3  400000DC  4040001C  40400001  000009E0  000009E0  00000B16
00000000  00000B30  00000B30  80000310  40404040  40404040  40404040
40404040  40404040  40404040  40404040  E2E3D2C5  F0F0F5F9*
02D9D3C4  40404040  40400038  40404040  00010001  0C0000D8  00010001
0C0000DC  00010001  0C0000E0  00010001  0C0000E4  00010001  0C0000E8
00010001  0C0000EC  00010001  0C0000F0  E2E3D2C5  F0F0F6F0**
02E3E7E3  400000F8  40400008  40400001  000003CC  000003D8  40404040
40404040  40404040  40404040  40404040  40404040  40404040  40404040
40404040  40404040  40404040  40404040  E2E3D2C5  F0F0F6F1*
02E3E7E3  40000104  40400004  40400001  800003D8  40404040  40404040
40404040  40404040  40404040  40404040  40404040  40404040  40404040
40404040  40404040  40404040  40404040  E2E3D2C5  F0F0F6F2*
02E3E7E3  4000010C  40400004  40400001  000003D8  40404040  40404040
40404040  40404040  40404040  40404040  40404040  40404040  40404040
40404040  40404040  40404040  40404040  E2E3D2C5  F0F0F6F3*
02E3E7E3  40000114  4040000C  40400001  800003D4  000004A0  000004A8
40404040  40404040  40404040  40404040  40404040  40404040  40404040
```

```
40404040  40404040  40404040  40404040  E2E3D2C5  F0F0F6F4*
02D9D3C4  40404040  40400038  40404040  00010001  0C0000F4  00010001
0C0000F8  00010001  0C0000FC  00010001  0C000104  00010001  0C00010C
00010001  0C000114  00010001  0C000118  E2E3D2C5  F0F0F6F5*
02E3E7E3  40000120  4040001C  40400001  000004A4  800004A8  80000320
000004A0  000004B8  000004A4  800004B8  40404040  40404040  40404040
40404040  40404040  40404040  40404040  E2E3D2C5  F0F0F6F6*
02D9D3C4  40404040  40400038  40404040  00010001  0C00011C  00010001
0C000120  00010001  0C000124  00010001  0C000128  00010001  0C00012C
00010001  0C000130  00010001  0C000134  E2E3D2C5  F0F0F6F7*
02E3E7E3  4000013C  4040001C  40400001  80000318  000004A0  000004B8
000004A4  800004B8  80000324  000004A0  40404040  40404040  40404040
40404040  40404040  40404040  40404040  E2E3D2C5  F0F0F6F8*
02D9D3C4  40404040  40400038  40404040  00010001  0C000138  00010001
0C00013C  00010001  0C000140  00010001  0C000144  00010001  0C000148
00010001  0C00014C  00010001  0C000150  E2E3D2C5  F0F0F6F9*
02E3E7E3  40000158  40400014  40400001  000004B8  000004A4  800004B8
00000470  000003D8  40404040  40404040  40404040  40404040  40404040
40404040  40404040  40404040  40404040  E2E3D2C5  F0F0F7F0**
02E3E7E3  40000170  40400008  40400001  800003D8  00000474  40404040
40404040  40404040  40404040  40404040  40404040  40404040  40404040
40404040  40404040  40404040  40404040  E2E3D2C5  F0F0F7F1*
02D9D3C4  40404040  40400038  40404040  00010001  0C000154  00010001
0C000158  00010001  0C00015C  00010001  0C000160  00010001  0C000164
00010001  0C000168  00010001  0C000170  E2E3D2C5  F0F0F7F2*
02E3E7E3  40000178  4040001C  40400001  000004B8  00000310  00000324
00000358  00000354  00000408  00000310  40404040  40404040  40404040
40404040  40404040  40404040  40404040  E2E3D2C5  F0F0F7F3*
02D9D3C4  40404040  40400038  40404040  00010001  0C000174  00010001
0C000178  00010001  0C00017C  00010001  0C000180  00010001  0C000184
00010001  0C000188  00010001  0C00018C  E2E3D2C5  F0F0F7F4*
02E3E7E3  40000194  4040001C  40400001  00000310  00000310  00000318
0000031C  0000031C  00000310  00000310  40404040  40404040  40404040
40404040  40404040  40404040  40404040  E2E3D2C5  F0F0F7F5*
02D9D3C4  40404040  40400038  40404040  00010001  0C000190  00010001
0C000194  00010001  0C000198  00010001  0C00019C  00010001  0C0001A0
00010001  0C0001A4  00010001  0C0001A8  E2E3D2C5  F0F0F7F6*
02E3E7E3  400001B0  4040001C  40400001  00000358  00000360  80000310
000004B8  000004BC  00000348  0000032C  40404040  40404040  40404040
40404040  40404040  40404040  40404040  E2E3D2C5  F0F0F7F7*
02D9D3C4  40404040  40400038  40404040  00010001  0C0001AC  00010001

MEMBER NAME  STKEPL
0C0001B0  00010001  0C0001B4  00010001  0C0001B8  00010001  0C0001BC
00010001  0C0001C0  00010001  0C0001C4  E2E3D2C5  F0F0F7F8*
02E3E7E3  400001CC  4040001C  40400001  00000358  00000354  00000070
00000310  00000310  00000310  00000318  40404040  40404040  40404040
40404040  40404040  40404040  40404040  E2E3D2C5  F0F0F7F9*
02D9D3C4  40404040  40400038  40404040  00010001  0C0001C8  00010001
0C0001CC  00010001  0C0001D0  00010001  0C0001D4  00010001  0C0001D8
00010001  0C0001DC  00010001  0C0001E0  E2E3D2C5  F0F0F8F0**
02E3E7E3  400001E8  4040001C  40400001  0000031C  0000031C  00000310
00000310  00000358  00000360  80000310  40404040  40404040  40404040
40404040  40404040  40404040  40404040  E2E3D2C5  F0F0F8F1*
02D9D3C4  40404040  40400038  40404040  00010001  0C0001E4  00010001
0C0001E8  00010001  0C0001EC  00010001  0C0001F0  00010001  0C0001F4
00010001  0C0001F8  00010001  0C0001FC  E2E3D2C5  F0F0F8F2*
02E3E7E3  40000204  4040001C  40400001  000004B8  000004A8  00000310
0000033C  00000358  00000354  00000058  40404040  40404040  40404040
```

```
40404040  40404040  40404040  40404040  E2E3D2C5  F0F0F8F3*
02D9D3C4  40404040  40400038  40404040  00010001  0C000200  00010001
0C000204  00010001  0C000208  00010001  0C00020C  00010001  0C000210
00010001  0C000214  00010001  0C000218  E2E3D2C5  F0F0F8F4*
02E3E7E3  40000220  4040001C  40400001  00000310  00000310  00000310
00000310  00000318  00000320  00000310  40404040  40404040  40404040
40404040  40404040  40404040  40404040  E2E3D2C5  F0F0F8F5*
02D9D3C4  40404040  40400038  40404040  00010001  0C00021C  00010001
0C000220  00010001  0C000224  00010001  0C000228  00010001  0C00022C
00010001  0C000230  00010001  0C000234  E2E3D2C5  F0F0F8F6*
02E3E7E3  4000023C  4040001C  40400001  00000310  00000358  00000360
80000310  000004B8  000004BC  00000310  40404040  40404040  40404040
40404040  40404040  40404040  40404040  E2E3D2C5  F0F0F8F7*
02D9D3C4  40404040  40400038  40404040  00010001  0C000238  00010001
0C00023C  00010001  0C000240  00010001  0C000244  00010001  0C000248
00010001  0C00024C  00010001  0C000250  E2E3D2C5  F0F0F8F8*
02E3E7E3  40000258  4040001C  40400001  00000334  00000358  00000354
00000048  00000310  00000310  00000310  40404040  40404040  40404040
40404040  40404040  40404040  40404040  E2E3D2C5  F0F0F8F9*
02D9D3C4  40404040  40400038  40404040  00010001  0C000254  00010001
0C000258  00010001  0C00025C  00010001  0C000260  00010001  0C000264
00010001  0C000268  00010001  0C00026C  E2E3D2C5  F0F0F9F0**
02E3E7E3  40000274  4040001C  40400001  00000318  0000031C  00000320
00000310  00000310  00000358  00000360  40404040  40404040  40404040
40404040  40404040  40404040  40404040  E2E3D2C5  F0F0F9F1*
02D9D3C4  40404040  40400038  40404040  00010001  0C000270  00010001
0C000274  00010001  0C000278  00010001  0C00027C  00010001  0C000280
00010001  0C000284  00010001  0C000288  E2E3D2C5  F0F0F9F2*
02E3E7E3  40000290  4040001C  40400001  80000310  000003CC  00000474
000003CC  800003F4  00000408  00000340  40404040  40404040  40404040
40404040  40404040  40404040  40404040  E2E3D2C5  F0F0F9F3*
02D9D3C4  40404040  40400038  40404040  00010001  0C00028C  00010001
0C000290  00010001  0C000294  00010001  0C000298  00010001  0C00029C
00010001  0C0002A0  00010001  0C0002A4  E2E3D2C5  F0F0F9F4*
02E3E7E3  400002AC  4040001C  40400001  00000408  800003C4  000003CC
00000478  00000310  000003C4  00000358  40404040  40404040  40404040
40404040  40404040  40404040  40404040  E2E3D2C5  F0F0F9F5*
02D9D3C4  40404040  40400038  40404040  00010001  0C0002A8  00010001
0C0002AC  00010001  0C0002B0  00010001  0C0002B4  00010001  0C0002B8
00010001  0C0002BC  00010001  0C0002C0  E2E3D2C5  F0F0F9F6*
02E3E7E3  400002C8  4040001C  40400001  00000354  00000408  00000310
00000310  00000310  00000318  0000031C  40404040  40404040  40404040

MEMBER NAME  STKEPL
40404040  40404040  40404040  40404040  E2E3D2C5  F0F0F9F7*
02D9D3C4  40404040  40400038  40404040  00010001  0C0002C4  00010001
0C0002C8  00010001  0C0002CC  00010001  0C0002D0  00010001  0C0002D4
00010001  0C0002D8  00010001  0C0002DC  E2E3D2C5  F0F0F9F8*
02E3E7E3  400002E4  40400018  40400001  00000320  00000310  00000310
00000358  00000360  80000310  40404040  40404040  40404040  40404040
40404040  40404040  40404040  40404040  E2E3D2C5  F0F0F9F9*
02E3E7E3  40000464  40400038  40400001  00000018  0000000C  00000020
00000000  00000000  00000000  00000000  00000014  00000000  00000000
00000000  00000000  00000010  02500030  E2E3D2C5  F0F1F0F0**
02E3E7E3  4000049C  40400024  40400001  02F40030  00000000  027C0031
025C0031  03080031  00000028  0000002C  02640032  02A80032  40404040
40404040  40404040  40404040  40404040  E2E3D2C5  F0F1F0F1*
02D9D3C4  40404040  40400038  40404040  00010001  0C0002E0  00010001
0C0002E4  00010001  0C0002E8  00010001  0C0002EC  00010001  0C0002F0
```

```
00010001  0C0002F4  00010001  0C0002F8  E2E3D2C5  F0F1F0F2*
02C5D5C4  40404040  40404040  40404040  40404040  40404040  40404040
00000BFE  F1F5F7F3  F460C6D6  F34040F0  F2F0F2F8  F7F0F9F8  40F0F84B
F4F44BF3  F9404040  E2E3D2C5  D7D34040  E2E3D2C5  F0F1F0F3**

MEMBER NAME  STKGAG
02C5E2C4  40404040  40400010  40400001  E2E3D2C7  C1C74040  00000000
40000000  40404040  40404040  40404040  40404040  40404040  40404040
40404040  40404040  40404040  40404040  E2E3D2C7  F0F0F0F1*
02E3E7E3  40000000  40400038  40400001  47F0F00C  07E2E3D2  C7C1C740
90ECD00C  184D98CD  F0205040  D00450D0  400807FC  40404040  40404040
020A0401  22021404  22021004  22020A08  E2E3D2C7  F0F0F0F2*
02E3E7E3  40000038  40400014  40400001  011A015B  0A09031A  015B0A09
03220206  07140422  40404040  40404040  40404040  40404040  40404040
40404040  40404040  40404040  40404040  E2E3D2C7  F0F0F0F3*
02E3E7E3  40000050  40400038  40400001  C4C9E2E3  C1D5C3C5  5BE77E5B
E87E4040  D5E4D4C2  C5D940D6  C640D7D3  C9C5E240  E3C8C9C3  D2D5C5E2
E2406140  F1F04040  E3C8C9C3  D2D5C5E2  E2E3D2C7  F0F0F0F4*
02E3E7E3  40000088  40400008  40400001  E2404040  40404040  40404040
40404040  40404040  40404040  40404040  40404040  40404040  40404040
40404040  40404040  40404040  40404040  E2E3D2C7  F0F0F0F5*
02E3E7E3  400003C8  40400038  40400001  00000000  00000000  4F080000
00000000  00000000  00000000  00000001  00000002  00000003  00000004
00000006  00000008  00000009  0000000A  E2E3D2C7  F0F0F0F6*
02E3E7E3  40000400  40400038  40400001  0000000E  0000000F  00000016
0000001C  00000058  00000384  3E418937  4019999A  401DF3B6  4029FBE7
402E147B  403EF9DB  406D9168  40BD70A4  E2E3D2C7  F0F0F0F7*
02E3E7E3  40000438  40400038  40400001  41100000  4111999A  41177CEE
4119999A  411E6666  41233333  412570A4  41291687  41A00000  41AC7AE1
41C5999A  41E00000  41FB3333  42113333  E2E3D2C7  F0F0F0F8*
02C5E2C4  40404040  40400010  40400002  D7D4C1E3  D3404040  05000000
40001134  40404040  40404040  40404040  40404040  40404040  40404040
40404040  40404040  40404040  40404040  E2E3D2C7  F0F0F0F9*
02E3E7E3  40000470  40400014  40400001  42128000  42180000  42184CCD
00000000  00000000  40404040  40404040  40404040  40404040  40404040
40404040  40404040  40404040  40404040  E2E3D2C7  F0F0F1F0**
02C5E2C4  40404040  40400010  40400003  C3C1C4D3  E3404040  02000000
40000000  40404040  40404040  40404040  40404040  40404040  40404040
40404040  40404040  40404040  40404040  E2E3D2C7  F0F0F1F1*
02E3E7E3  40000510  40400010  40400001  FFFFFFA0  00001130  00000000
00000000  40404040  40404040  40404040  40404040  40404040  40404040
40404040  40404040  40404040  40404040  E2E3D2C7  F0F0F1F2*
02E3E7E3  40000524  40400004  40400001  00000000  40404040  40404040
40404040  40404040  40404040  40404040  40404040  40404040  40404040
40404040  40404040  40404040  40404040  E2E3D2C7  F0F0F1F3*
02C5E2C4  40404040  40400010  40400004  C3C1C4D3  D5F14040  02000000
40000000  40404040  40404040  40404040  40404040  40404040  40404040
40404040  40404040  40404040  40404040  E2E3D2C7  F0F0F1F4*
02E3E7E3  4000052C  40400004  40400001  00000000  40404040  40404040
40404040  40404040  40404040  40404040  40404040  40404040  40404040
40404040  40404040  40404040  40404040  E2E3D2C7  F0F0F1F5*
02C5E2C4  40404040  40400010  40400005  C3C1C4E2  E4D74040  02000000
40000000  40404040  40404040  40404040  40404040  40404040  40404040
40404040  40404040  40404040  40404040  E2E3D2C7  F0F0F1F6*
02C5E2C4  40404040  40400010  40400006  C3D4D7D9  E2E24040  02000000
40000000  40404040  40404040  40404040  40404040  40404040  40404040
40404040  40404040  40404040  40404040  E2E3D2C7  F0F0F1F7*
02C5E2C4  40404040  40400010  40400007  C9C2C3D6  D47B4040  02000000
40000000  40404040  40404040  40404040  40404040  40404040  40404040
```

```
40404040  40404040  40404040  40404040  E2E3D2C7  F0F0F1F8*
02E3E7E3  40000534  40400010  40400001  00000000  00000000  00000000
00000000  40404040  40404040  40404040  40404040  40404040  40404040
40404040  40404040  40404040  40404040  E2E3D2C7  F0F0F1F9*
02E3E7E3  400005A4  40400038  40400001  58B0D49C  58A0D4B8  5890D37C

MEMBER NAME  STKGAG
58F0D488  4110D08C  05EF7800  D34C7000  D4385820  D4345B20  D350184A
18595860  D4CC5870  D3501889  58A0D350  E2E3D2C7  F0F0F2F0**
02E3E7E3  400005DC  40400038  40400001  18B25890  D49C7826  90007020
D42C3842  7B40D438  30447940  D3884750  D5BC7020  D4387C20  D3C87B20
D3E47020  D418197A  4780D5AC  41089000  E2E3D2C7  F0F0F2F1*
02E3E7E3  40000614  40400038  40400001  5000D098  58F0D4A4  4110D090
05EF4108  90005000  D0A04108  90005000  D0A858F0  D4A44110  D0A005EF
7800D418  7000D41C  78059000  7000D410  E2E3D2C7  F0F0F2F2*
02E3E7E3  4000064C  40400038  40400001  1A541A84  1A64877A  D55258B0
D49C58A0  D4B85890  D37C5800  D35C5000  D4F850A0  D4FC185A  5C40D434
5820D35C  1A254102  B0005000  D09858F0  E2E3D2C7  F0F0F2F3*
02E3E7E3  40000684  40400038  40400001  D4A44110  D09005EF  7800D3AC
33007000  D4E87800  D3D03300  7000D500  7800D3CC  33007000  D50458F0
D4A44110  D0B005EF  7820D3E4  33227020  E2E3D2C7  F0F0F2F4*
02E3E7E3  400006BC  40400038  40400001  D41C7020  D4F47800  D34C7000
D42C5800  D3485000  D42458F0  D4884110  D0C005EF  7800D3A4  33007000
D4D47820  D3B03322  7020D4D8  7020D4F0  E2E3D2C7  F0F0F2F5*
02E3E7E3  400006F4  40400038  40400001  7800D3BC  33007000  D4DC7800
D3A03300  7000D4E0  7800D3B8  33007000  D4E4187A  5880D378  58A0D36C
58B0D350  5890D49C  18575C40  D4341835  E2E3D2C7  F0F0F2F6*
02E3E7E3  4000072C  40400030  40400001  5A30D35C  41039000  5000D0CC
58F0D4A4  4110D0C4  05EF58F0  D4A44110  D0D405EF  58F0D4B0  45E0F004
00000000  00000028  40404040  40404040  E2E3D2C7  F0F0F2F7*
02D9D3C4  40404040  40400038  40404040  00020001  0C000510  00020001
0C000514  00030001  1C000518  00040001  1C000534  00050001  1C000538
00060001  1C00053C  00070001  1C000540  E2E3D2C7  F0F0F2F8*
02E3E7E3  4000075C  40400038  40400001  45E0F008  0470D42C  45E0F010
58F0D4B0  45E0F000  00000000  0000002D  45E0F00C  000004E8  04700007
45E0F010  7800D41C  7A00D398  7000D4D0  E2E3D2C7  F0F0F2F9*
02E3E7E3  40000794  40400038  40400001  58F0D4A8  4110D0E4  05EF41E0
000415FE  4720D71E  58EFD04C  07FE7800  D42C7A00  D38C7000  D42C58F0
D4B01800  45E0F004  00000000  00000031  E2E3D2C7  F0F0F3F0**
02E3E7E3  400007CC  40400038  40400001  45E0F008  0450D424  45E0F010
58F0D4B0  45E0F000  00000000  0000002D  45E0F00C  000004E8  04700007
45E0F010  58F0D4A8  4110D12C  05EF41E0  E2E3D2C7  F0F0F3F1*
02E3E7E3  40000804  40400038  40400001  000415FE  4720D782  58EFD054
07FE5800  D4241A0A  5000D424  7800D41C  7A00D3A8  7000D41C  5AB0D350
19B847C0  D69458B0  D49C58A0  D4B85890  E2E3D2C7  F0F0F3F2*
02E3E7E3  4000083C  40400038  40400001  D37C7800  D3D43300  7000D4EC
58F0D4A8  4110D174  05EF41E0  000415FE  4720D7D2  58EFD05C  07FE7800
D3E03300  7000D50C  58F0D4A8  4110D1BC  E2E3D2C7  F0F0F3F3*
02E3E7E3  40000874  40400038  40400001  05EF41E0  000415FE  4720D7F6
58EFD064  07FE7800  D3C43300  7000D50C  58F0D4A8  4110D204  05EF41E0
000415FE  4720D81A  58EFD06C  07FE7800  E2E3D2C7  F0F0F3F4*
02E3E7E3  400008AC  40400038  40400001  D3B43300  7000D50C  7800D3E8
33007000  D51058F0  D4A84110  D24C05EF  41E00004  15FE4720  D84858EF
D07407FE  7800D3C0  33007000  D50C58F0  E2E3D2C7  F0F0F3F5*
02E3E7E3  400008E4  40400038  40400001  D4A44110  D29405EF  5850D434
5C40D4FC  5820D4F8  1A257822  B0007D20  D3C82B00  38026A00  D3406000
D3385820  D33C5A20  D3547800  D34C7000  E2E3D2C7  F0F0F3F6*
02E3E7E3  4000091C  40400038  40400001  D4107800  D50C7000  D4D07800
D4F47000  D4D47800  D3E83300  7000D4D8  186A1892  58B0D350  58A0D48C
```

5880D494 5870D49C 19B94770 D8D61856 E2E3D2C7 F0F0F3F7*
02E3E7E3 40000954 40400038 40400001 5C40D434 18255A20 D35C7802
70007000 D4105850 D4305C40 D4CC1825 5A20D4C8 78028000 7000D440
59B0D350 4770D8FC 7800D4D0 7000D440 E2E3D2C7 F0F0F3F8*
02E3E7E3 4000098C 40400038 40400001 58F0D4A4 4110D2A4 05EF2B44
7840D410 28646C60 D4482B22 7820A004 2A267020 D4146C40 D4502B22

MEMBER NAME STKGAG

7820A008 2A247020 D42058F0 D4B01800 E2E3D2C7 F0F0F3F9*
02E3E7E3 400009C4 40400038 40400001 45E0F004 00000000 00000035
45E0F008 0470D410 45E0F008 0470D414 45E0F008 0470D420 45E0F010
58F0D4B0 45E0F000 00000000 00000046 E2E3D2C7 F0F0F4F0**
02D9D3C4 40404040 40400038 40404040 00010001 0C000758 00010001
0C000774 00010001 0C00077C 00010001 0C0007C8 00010001 0C0007E4
00010001 0C0007EC 00010001 0C0009CC E2E3D2C7 F0F0F4F1*
02E3E7E3 400009FC 40400038 40400001 45E0F00C 000004E8 04700007
45E0F010 58F0D4AC 4110D2B4 05EF41E0 000415FE 4720D996 58EFD07C
07FE58F0 D4A84110 D2C405EF 41E00004 E2E3D2C7 F0F0F4F2*
02E3E7E3 40000A34 40400038 40400001 15FE4720 D9B058EF D08407FE
7800D410 7A00D3C8 7000D410 5AB0D350 19B947C0 D8BC58B0 D49C58A0
D4B85890 D37C58F0 D4884110 D30C05EF E2E3D2C7 F0F0F4F3*
02E3E7E3 40000A6C 40400038 40400001 7800D34C 7000D428 5820D434
5B20D350 184A1859 5860D508 5870D350 188958A0 D35018B2 5890D49C
78269000 7020D408 38427B40 D4283044 E2E3D2C7 F0F0F4F4*
02E3E7E3 40000AA4 40400038 40400001 7940D388 4750DA6E 7020D428
7D20D3C8 7B20D3E4 7020D418 197A4780 DA5E4108 90005000 D09858F0
D4A44110 D09005EF 41089000 5000D0A0 E2E3D2C7 F0F0F4F5*
02E3E7E3 40000ADC 40400038 40400001 41089000 5000D0A8 58F0D4A4
4110D0A0 05EF7800 D4187000 D41C7805 90007000 D4101A54 1A841A64
877ADA04 58B0D49C 58A0D4B8 5890D37C E2E3D2C7 F0F0F4F6*
02E3E7E3 40000B14 40400038 40400001 5850D434 5C40D4FC 5820D4F8
1A254102 B0005000 D09858F0 D4A44110 D09005EF 7800D3C4 33007000
D50C58F0 D4A44110 D31005EF 58F0D488 E2E3D2C7 F0F0F4F7*
02E3E7E3 40000B4C 40400038 40400001 4110D320 05EF7800 D34C7000
D4385820 D4345B20 D350184A 18595860 D4CC5870 D3501889 58A0D350
18B25890 D49C7826 90007020 D42C3842 E2E3D2C7 F0F0F4F8*
02E3E7E3 40000B84 40400038 40400001 7B40D438 30447940 D3884750
DB507020 D4387B20 D3E47020 D418197A 4780DB40 41089000 5000D098
58F0D4A4 4110D090 05EF4108 90005000 E2E3D2C7 F0F0F4F9*
02E3E7E3 40000BBC 40400038 40400001 D0A04108 90005000 D0A858F0
D4A44110 D0A005EF 7800D418 7000D41C 78059000 7000D410 1A541A84
1A64877A DAEA58B0 D49C58A0 D4B85890 E2E3D2C7 F0F0F5F0**
02E3E7E3 40000BF4 40400038 40400001 D37C5850 D4345C40 D4FC5820
D4F81A25 4102B000 5000D098 58F0D4A4 4110D090 05EF7800 D3DC3300
7000D50C 7800D3D8 33007000 D51058F0 E2E3D2C7 F0F0F5F1*
02E3E7E3 40000C2C 40400038 40400001 D4A44110 D32405EF 58F0D488
4110D08C 05EF1BFF 58E0D000 07FE58A0 D00458E0 A00C58B0 A0185810
B00C5820 D4345020 100018DA 92FFA00C E2E3D2C7 F0F0F5F2*
02E3E7E3 40000C64 40400038 40400001 982CA01C 07FE987B 10045820
70005020 D4305820 90005020 D4349878 10146820 70006020 D4486820
80006020 D4505820 10004130 20004150 E2E3D2C7 F0F0F5F3*
02E3E7E3 40000C9C 40400038 40400001 00041B25 5C40D364 1B255020
D4945030 D4985820 10084130 20004150 00041B25 5C40D360 1B255020
D49C5030 D4A05820 10104130 20004150 E2E3D2C7 F0F0F5F4*
02E3E7E3 40000CD4 40400010 40400001 00041B25 5020D48C 5030D490
47F0D514 40404040 40404040 40404040 40404040 40404040 40404040
40404040 40404040 40404040 40404040 E2E3D2C7 F0F0F5F5*
02E3E7E3 40000020 40400008 40400001 00000C6A 00000090 40404040
40404040 40404040 40404040 40404040 40404040 40404040 40404040

```
40404040  40404040  40404040  40404040  E2E3D2C7  F0F0F5F6*
02E3E7E3  40000090  40400004  40400001  00000C46  40404040  40404040
40404040  40404040  40404040  40404040  40404040  40404040  40404040
40404040  40404040  40404040  40404040  E2E3D2C7  F0F0F5F7*
02E3E7E3  400000DC  4040000C  40400001  000007AE  000007AE  00000812
40404040  40404040  40404040  40404040  40404040  40404040  40404040
40404040  40404040  40404040  40404040  E2E3D2C7  F0F0F5F8*

MEMBER NAME  STKGAG
02D9D3C4  40404040  40400038  40404040  00010001  0C0009F8  00010001
0C000A00  00010001  0C000020  00010001  0C000024  00010001  0C000090
00010001  0C0000DC  00010001  0C0000E0  E2E3D2C7  F0F0F5F9*
02E3E7E3  400000E8  4040001C  40400001  00000812  00000862  000008D8
00000886  000008D8  000008AA  000008D8  40404040  40404040  40404040
40404040  40404040  40404040  40404040  E2E3D2C7  F0F0F6F0**
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  E2E3D2C7  F0F0F6F1*
02E3E7E3  40000104  4040001C  40400001  000008D8  000008D8  00000A26
00000000  00000A40  00000A40  800003D8  40404040  40404040  40404040
40404040  40404040  40404040  40404040  E2E3D2C7  F0F0F6F2*
02D9D3C4  40404040  40400038  40404040  00010001  0C000100  00010001
0C000104  00010001  0C000108  00010001  0C00010C  00010001  0C000110
00010001  0C000114  00010001  0C000118  E2E3D2C7  F0F0F6F3*
02E3E7E3  40000120  40400008  40400001  000004A0  000004AC  40404040
40404040  40404040  40404040  40404040  40404040  40404040  40404040
40404040  40404040  40404040  40404040  E2E3D2C7  F0F0F6F4*
02E3E7E3  4000012C  40400004  40400001  800004AC  40404040  40404040
40404040  40404040  40404040  40404040  40404040  40404040  40404040
40404040  40404040  40404040  40404040  E2E3D2C7  F0F0F6F5*
02E3E7E3  40000134  40400004  40400001  000004AC  40404040  40404040
40404040  40404040  40404040  40404040  40404040  40404040  40404040
40404040  40404040  40404040  40404040  E2E3D2C7  F0F0F6F6*
02E3E7E3  4000013C  4040000C  40400001  800004A8  00000578  00000590
40404040  40404040  40404040  40404040  40404040  40404040  40404040
40404040  40404040  40404040  40404040  E2E3D2C7  F0F0F6F7*
02D9D3C4  40404040  40400038  40404040  00010001  0C00011C  00010001
0C000120  00010001  0C000124  00010001  0C00012C  00010001  0C000134
00010001  0C00013C  00010001  0C000140  E2E3D2C7  F0F0F6F8*
02E3E7E3  40000148  40400014  40400001  00000578  80000594  800003EC
00000564  000004AC  40404040  40404040  40404040  40404040  40404040
40404040  40404040  40404040  40404040  E2E3D2C7  F0F0F6F9*
02E3E7E3  40000160  40400008  40400001  800004AC  00000568  40404040
40404040  40404040  40404040  40404040  40404040  40404040  40404040
40404040  40404040  40404040  40404040  E2E3D2C7  F0F0F7F0**
02D9D3C4  40404040  40400038  40404040  00010001  0C000144  00010001
0C000148  00010001  0C00014C  00010001  0C000150  00010001  0C000154
00010001  0C000158  00010001  0C000160  E2E3D2C7  F0F0F7F1*
02E3E7E3  40000168  4040001C  40400001  000004AC  0000056C  800004AC
00000570  00000560  000003D8  000003EC  40404040  40404040  40404040
40404040  40404040  40404040  40404040  E2E3D2C7  F0F0F7F2*
02D9D3C4  40404040  40400038  40404040  00010001  0C000164  00010001
0C000168  00010001  0C00016C  00010001  0C000170  00010001  0C000174
00010001  0C000178  00010001  0C00017C  E2E3D2C7  F0F0F7F3*
02E3E7E3  40000184  4040001C  40400001  00000424  00000420  000004E8
000003D8  000003D8  000003D8  000003E0  40404040  40404040  40404040
40404040  40404040  40404040  40404040  E2E3D2C7  F0F0F7F4*
02D9D3C4  40404040  40400038  40404040  00010001  0C000180  00010001
0C000184  00010001  0C000188  00010001  0C00018C  00010001  0C000190
```

| | | | | | | |
|---|---|---|---|---|---|---|
| 00010001 | 0C000194 | 00010001 | 0C000198 | E2E3D2C7 | F0F0F7F5* | |
| 02E3E7E3 | 400001A0 | 4040001C | 40400001 | 000003E4 | 000003E4 | 000003D8 |
| 000003D8 | 00000424 | 0000042C | 800003D8 | 40404040 | 40404040 | 40404040 |
| 40404040 | 40404040 | 40404040 | 40404040 | E2E3D2C7 | F0F0F7F6* | |
| 02D9D3C4 | 40404040 | 40400038 | 40404040 | 00010001 | 0C00019C | 00010001 |
| 0C0001A0 | 00010001 | 0C0001A4 | 00010001 | 0C0001A8 | 00010001 | 0C0001AC |
| 00010001 | 0C0001B0 | 00010001 | 0C0001B4 | E2E3D2C7 | F0F0F7F7* | |
| 02E3E7E3 | 400001BC | 4040001C | 40400001 | 00000574 | 00000560 | 000003D8 |

MEMBER NAME STKGAG

| | | | | | | |
|---|---|---|---|---|---|---|
| 000003EC | 00000424 | 00000420 | 000004E8 | 40404040 | 40404040 | 40404040 |
| 40404040 | 40404040 | 40404040 | 40404040 | E2E3D2C7 | F0F0F7F8* | |
| 02D9D3C4 | 40404040 | 40400038 | 40404040 | 00010001 | 0C0001B8 | 00010001 |
| 0C0001BC | 00010001 | 0C0001C0 | 00010001 | 0C0001C4 | 00010001 | 0C0001C8 |
| 00010001 | 0C0001CC | 00010001 | 0C0001D0 | E2E3D2C7 | F0F0F7F9* | |
| 02E3E7E3 | 400001D8 | 4040001C | 40400001 | 000003D8 | 000003D8 | 000003D8 |
| 000003E0 | 000003E4 | 000003E4 | 000003D8 | 40404040 | 40404040 | 40404040 |
| 40404040 | 40404040 | 40404040 | 40404040 | E2E3D2C7 | F0F0F8F0** | |
| 02D9D3C4 | 40404040 | 40400038 | 40404040 | 00010001 | 0C0001D4 | 00010001 |
| 0C0001D8 | 00010001 | 0C0001DC | 00010001 | 0C0001E0 | 00010001 | 0C0001E4 |
| 00010001 | 0C0001E8 | 00010001 | 0C0001EC | E2E3D2C7 | F0F0F8F1* | |
| 02E3E7E3 | 400001F4 | 4040001C | 40400001 | 000003D8 | 00000424 | 0000042C |
| 800003D8 | 00000578 | 0000057C | 00000414 | 40404040 | 40404040 | 40404040 |
| 40404040 | 40404040 | 40404040 | 40404040 | E2E3D2C7 | F0F0F8F2* | |
| 02D9D3C4 | 40404040 | 40400038 | 40404040 | 00010001 | 0C0001F0 | 00010001 |
| 0C0001F4 | 00010001 | 0C0001F8 | 00010001 | 0C0001FC | 00010001 | 0C000200 |
| 00010001 | 0C000204 | 00010001 | 0C000208 | E2E3D2C7 | F0F0F8F3* | |
| 02E3E7E3 | 40000210 | 4040001C | 40400001 | 000003F8 | 00000424 | 00000420 |
| 00000080 | 000003D8 | 000003D8 | 000003D8 | 40404040 | 40404040 | 40404040 |
| 40404040 | 40404040 | 40404040 | 40404040 | E2E3D2C7 | F0F0F8F4* | |
| 02D9D3C4 | 40404040 | 40400038 | 40404040 | 00010001 | 0C00020C | 00010001 |
| 0C000210 | 00010001 | 0C000214 | 00010001 | 0C000218 | 00010001 | 0C00021C |
| 00010001 | 0C000220 | 00010001 | 0C000224 | E2E3D2C7 | F0F0F8F5* | |
| 02E3E7E3 | 4000022C | 4040001C | 40400001 | 000003E0 | 000003E4 | 000003E4 |
| 000003D8 | 000003D8 | 00000424 | 0000042C | 40404040 | 40404040 | 40404040 |
| 40404040 | 40404040 | 40404040 | 40404040 | E2E3D2C7 | F0F0F8F6* | |
| 02D9D3C4 | 40404040 | 40400038 | 40404040 | 00010001 | 0C000228 | 00010001 |
| 0C00022C | 00010001 | 0C000230 | 00010001 | 0C000234 | 00010001 | 0C000238 |
| 00010001 | 0C00023C | 00010001 | 0C000240 | E2E3D2C7 | F0F0F8F7* | |
| 02E3E7E3 | 40000248 | 4040001C | 40400001 | 800003D8 | 00000578 | 0000059C |
| 00000414 | 00000400 | 00000424 | 00000420 | 40404040 | 40404040 | 40404040 |
| 40404040 | 40404040 | 40404040 | 40404040 | E2E3D2C7 | F0F0F8F8* | |
| 02D9D3C4 | 40404040 | 40400038 | 40404040 | 00010001 | 0C000244 | 00010001 |
| 0C000248 | 00010001 | 0C00024C | 00010001 | 0C000250 | 00010001 | 0C000254 |
| 00010001 | 0C000258 | 00010001 | 0C00025C | E2E3D2C7 | F0F0F8F9* | |
| 02E3E7E3 | 40000264 | 4040001C | 40400001 | 00000070 | 000003D8 | 000003D8 |
| 000003D8 | 000003E0 | 000003E4 | 000003E4 | 40404040 | 40404040 | 40404040 |
| 40404040 | 40404040 | 40404040 | 40404040 | E2E3D2C7 | F0F0F9F0** | |
| 02D9D3C4 | 40404040 | 40400038 | 40404040 | 00010001 | 0C000260 | 00010001 |
| 0C000264 | 00010001 | 0C000268 | 00010001 | 0C00026C | 00010001 | 0C000270 |
| 00010001 | 0C000274 | 00010001 | 0C000278 | E2E3D2C7 | F0F0F9F1* | |
| 02E3E7E3 | 40000280 | 4040001C | 40400001 | 000003D8 | 000003D8 | 00000424 |
| 0000042C | 800003D8 | 0000059C | 0000057C | 40404040 | 40404040 | 40404040 |
| 40404040 | 40404040 | 40404040 | 40404040 | E2E3D2C7 | F0F0F9F2* | |
| 02D9D3C4 | 40404040 | 40400038 | 40404040 | 00010001 | 0C00027C | 00010001 |
| 0C000280 | 00010001 | 0C000284 | 00010001 | 0C000288 | 00010001 | 0C00028C |
| 00010001 | 0C000290 | 00010001 | 0C000294 | E2E3D2C7 | F0F0F9F3* | |
| 02E3E7E3 | 4000029C | 4040001C | 40400001 | 00000414 | 00000404 | 00000424 |
| 00000420 | 00000060 | 000003D8 | 000003D8 | 40404040 | 40404040 | 40404040 |

```
40404040  40404040  40404040  40404040  E2E3D2C7  F0F0F9F4*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  E2E3D2C7  F0F0F9F5*
02E3E7E3  400002B8  4040001C  40400001  000003D8  000003E0  000003E4
000003E4  000003D8  000003D8  00000424  40404040  40404040  40404040
40404040  40404040  40404040  40404040  E2E3D2C7  F0F0F9F6*
02D9D3C4  40404040  40400038  40404040  00010001  0C0002B4  00010001
0C0002B8  00010001  0C0002BC  00010001  0C0002C0  00010001  0C0002C4

MEMBER NAME  STKGAG
00010001  0C0002C8  00010001  0C0002CC  E2E3D2C7  F0F0F9F7*
02E3E7E3  400002D4  4040001C  40400001  0000042C  800003D8  0000059C
000005A0  000003D8  00000400  00000424  40404040  40404040  40404040
40404040  40404040  40404040  40404040  E2E3D2C7  F0F0F9F8*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  E2E3D2C7  F0F0F9F9*
02E3E7E3  400002F0  4040001C  40400001  00000420  00000050  000003D8
000003D8  000003D8  000003E0  000003E4  40404040  40404040  40404040
40404040  40404040  40404040  40404040  E2E3D2C7  F0F1F0F0**
02D9D3C4  40404040  40400038  40404040  00010001  0C0002EC  00010001
0C0002F0  00010001  0C0002F4  00010001  0C0002F8  00010001  0C0002FC
00010001  0C000300  00010001  0C000304  E2E3D2C7  F0F1F0F1*
02E3E7E3  4000030C  4040001C  40400001  000003E8  000003D8  000003D8
00000424  0000042C  800003D8  00000580  40404040  40404040  40404040
40404040  40404040  40404040  40404040  E2E3D2C7  F0F1F0F2*
02D9D3C4  40404040  40400038  40404040  00010001  0C000308  00010001
0C00030C  00010001  0C000310  00010001  0C000314  00010001  0C000318
00010001  0C00031C  00010001  0C000320  E2E3D2C7  F0F1F0F3*
02E3E7E3  40000328  4040001C  40400001  00000584  00000580  8000059C
000004A0  00000564  000004A0  800004D0  40404040  40404040  40404040
40404040  40404040  40404040  40404040  E2E3D2C7  F0F1F0F4*
02D9D3C4  40404040  40400038  40404040  00010001  0C000324  00010001
0C000328  00010001  0C00032C  00010001  0C000330  00010001  0C000334
00010001  0C000338  00010001  0C00033C  E2E3D2C7  F0F1F0F5*
02E3E7E3  40000344  4040001C  40400001  000004E8  0000040C  000004E8
80000494  000004A0  00000568  000003D8  40404040  40404040  40404040
40404040  40404040  40404040  40404040  E2E3D2C7  F0F1F0F6*
02D9D3C4  40404040  40400038  40404040  00010001  0C000340  00010001
0C000344  00010001  0C000348  00010001  0C00034C  00010001  0C000350
00010001  0C000354  00010001  0C000358  E2E3D2C7  F0F1F0F7*
02E3E7E3  40000360  4040001C  40400001  00000494  00000424  00000420
000004E8  000003D8  000003D8  000003D8  40404040  40404040  40404040
40404040  40404040  40404040  40404040  E2E3D2C7  F0F1F0F8*
02D9D3C4  40404040  40400038  40404040  00010001  0C00035C  00010001
0C000360  00010001  0C000364  00010001  0C000368  00010001  0C00036C
00010001  0C000370  00010001  0C000374  E2E3D2C7  F0F1F0F9*
02E3E7E3  4000037C  4040001C  40400001  000003E0  000003E4  000003E8
000003D8  000003D8  00000424  0000042C  40404040  40404040  40404040
40404040  40404040  40404040  40404040  E2E3D2C7  F0F1F1F0**
02D9D3C4  40404040  40400038  40404040  00010001  0C000378  00010001
0C00037C  00010001  0C000380  00010001  0C000384  00010001  0C000388
00010001  0C00038C  00010001  0C000390  E2E3D2C7  F0F1F1F1*
02E3E7E3  40000398  4040001C  40400001  800003D8  800003E0  0000059C
00000590  0000059C  80000594  800003E8  40404040  40404040  40404040
40404040  40404040  40404040  40404040  E2E3D2C7  F0F1F1F2*
02D9D3C4  40404040  40400038  40404040  00010001  0C000394  00010001
0C000398  00010001  0C00039C  00010001  0C0003A0  00010001  0C0003A4
```

```
00010001  0C0003A8  00010001  0C0003AC  E2E3D2C7  F0F1F1F3*
02E3E7E3  400003B4  40400010  40400001  00000578  0000059C  00000578
800005A0  40404040  40404040  40404040  40404040  40404040  40404040
40404040  40404040  40404040  40404040  E2E3D2C7  F0F1F1F4*
02E3E7E3  40000544  40400038  40400001  00000000  00000018  00000000
00000000  00000000  0000000C  00000020  00000000  00000000  00000000
00000000  00000000  00000042  03140042  E2E3D2C7  F0F1F1F5*
02E3E7E3  4000057C  40400028  40400001  00000042  00000042  00000000
030C0044  02FC0044  00000000  00000046  00000024  031C0046  00000000
40404040  40404040  40404040  40404040  E2E3D2C7  F0F1F1F6*

MEMBER NAME  STKGAG
02D9D3C4  40404040  40400028  40404040  00010001  0C0003B0  00010001
0C0003B4  00010001  0C0003B8  00010001  0C0003BC  00010001  0C0003C0
40404040  40404040  40404040  40404040  E2E3D2C7  F0F1F1F7*
02C5D5C4  40404040  40404040  40404040  40404040  40404040  40404040
00000CE4  F1F5F7F3  F460C6D6  F34040F0  F2F0F2F8  F7F0F9F8  40F0F84B
F4F44BF4  F4404040  E2E3D2C7  C1C74040  E2E3D2C7  F0F1F1F8**

MEMBER NAME  STKMOD
02C5E2C4  40404040  40400010  40400001  E2E3D2D4  D6C44040  00000000
40000000  40404040  40404040  40404040  40404040  40404040  40404040
40404040  40404040  40404040  40404040  E2E3D2D4  F0F0F0F1*
02E3E7E3  40000000  40400038  40400001  47F0F00C  07E2E3D2  D4D6C440
90ECD00C  184D98CD  F0205040  D00450D0  400807FC  40404040  40404040
021A05C4  C1E2C840  10031A06  4040C9C4  E2E3D2D4  F0F0F0F2*
02E3E7E3  40000038  40400038  40400001  7E401002  22020610  14012202
1A09D3C9  D5C540E7  F17E400A  0A041A05  40E8F17E  400A0A04  1A0A5B40
40404040  E7F27E40  0A0A041A  0540E8F2  E2E3D2D4  F0F0F0F3*
02E3E7E3  40000070  40400038  40400001  7E400A0A  04180522  02064614
0122021A  17D3D6C1  C440C4C9  D9C5C3E3  C9D6D540  C1D5C7D3  C5407E40
0A080218  3722021A  0ED9C5C6  C9D3C540  E2E3D2D4  F0F0F0F4*
02E3E7E3  400000A8  40400016  40400001  C5D9D9D6  D97E4010  031A0A40
C9D540E2  E3D2D4D6  C4224040  40404040  40404040  40404040  40404040
40404040  40404040  40404040  40404040  E2E3D2D4  F0F0F0F5*
02E3E7E3  400003F8  40400038  40400001  00000000  00000000  4F080000
00000000  00000000  00000000  00000001  00000002  00000003  00000004
00000005  00000006  00000007  00000008  E2E3D2D4  F0F0F0F6*
02E3E7E3  40000430  40400038  40400001  00000010  00000046  00000049
00000058  0000005D  00000070  00000080  00000098  401DF3B6  4029FBE7
4029FFD6  403EF9DB  4091EB85  41100000  E2E3D2D4  F0F0F0F7*
02C5E2C4  40404040  40400010  40400002  C7D9E4D7  40404040  05000000
4000000C  40404040  40404040  40404040  40404040  40404040  40404040
40404040  40404040  40404040  40404040  E2E3D2D4  F0F0F0F8*
02E3E7E3  40000468  40400028  40400001  411CCCCD  41200000  4121EB85
4126B852  41300000  41400000  41500000  421A0000  00000000  00000000
40404040  40404040  40404040  40404040  E2E3D2D4  F0F0F0F9*
02C5E2C4  40404040  40400010  40400003  D7D4C1E3  D3404040  05000000
40001134  40404040  40404040  40404040  40404040  40404040  40404040
40404040  40404040  40404040  40404040  E2E3D2D4  F0F0F1F0**
02C5E2C4  40404040  40400010  40400004  D9D4D6C4  C5D34040  05000000
40000018  40404040  40404040  40404040  40404040  40404040  40404040
40404040  40404040  40404040  40404040  E2E3D2D4  F0F0F1F1*
02C5E2C4  40404040  40400010  40400005  C3C1C4E2  E3404040  02000000
40000000  40404040  40404040  40404040  40404040  40404040  40404040
40404040  40404040  40404040  40404040  E2E3D2D4  F0F0F1F2*
02C5E2C4  40404040  40400010  40400006  D4E5C3C8  D9404040  02000000
40000000  40404040  40404040  40404040  40404040  40404040  40404040
40404040  40404040  40404040  40404040  E2E3D2D4  F0F0F1F3*
```

```
02E3E7E3  40000618  4040001C  40400001  00000000  FFFFFFA0  00001130
FFFFFFFF  00000000  00000000  00000000  40404040  40404040  40404040
40404040  40404040  40404040  40404040  E2E3D2D4  F0F0F1F4*
02E3E7E3  40000638  40400004  40400001  00000000  40404040  40404040
40404040  40404040  40404040  40404040  40404040  40404040  40404040
40404040  40404040  40404040  40404040  E2E3D2D4  F0F0F1F5*
02C5E2C4  40404040  40400010  40400007  C3C1C4C6  C9D34040  02000000
40000000  40404040  40404040  40404040  40404040  40404040  40404040
40404040  40404040  40404040  40404040  E2E3D2D4  F0F0F1F6*
02E3E7E3  40000640  40400004  40400001  00000000  40404040  40404040
40404040  40404040  40404040  40404040  40404040  40404040  40404040
40404040  40404040  40404040  40404040  E2E3D2D4  F0F0F1F7*
02C5E2C4  40404040  40400010  40400008  C3C1C4D5  D7C44040  02000000
40000000  40404040  40404040  40404040  40404040  40404040  40404040
40404040  40404040  40404040  40404040  E2E3D2D4  F0F0F1F8*
02E3E7E3  40000648  40400008  40400001  00000000  00000000  40404040
40404040  40404040  40404040  40404040  40404040  40404040  40404040
40404040  40404040  40404040  40404040  E2E3D2D4  F0F0F1F9*
02D9D3C4  40404040  40400038  40404040  00020001  0C000618  00030001

MEMBER NAME  STKMOD
0C00061C  00030001  0C000620  00040001  0C000624  00050001  1C000628
00060001  1C00062C  00070001  1C000648  E2E3D2D4  F0F0F2F0**
02C5E2C4  40404040  40400010  40400009  C3C1C4D5  E2C84040  02000000
40000000  40404040  40404040  40404040  40404040  40404040  40404040
40404040  40404040  40404040  40404040  E2E3D2D4  F0F0F2F1*
02C5E2C4  40404040  40400010  4040000A  C3C1C4E2  E4D74040  02000000
40000000  40404040  40404040  40404040  40404040  40404040  40404040
40404040  40404040  40404040  40404040  E2E3D2D4  F0F0F2F2*
02C5E2C4  40404040  40400010  4040000B  C8C7C4C1  E3C54040  02000000
40000000  40404040  40404040  40404040  40404040  40404040  40404040
40404040  40404040  40404040  40404040  E2E3D2D4  F0F0F2F3*
02C5E2C4  40404040  40400010  4040000C  C8C7E3C9  D4C54040  02000000
40000000  40404040  40404040  40404040  40404040  40404040  40404040
40404040  40404040  40404040  40404040  E2E3D2D4  F0F0F2F4*
02C5E2C4  40404040  40400010  4040000D  C9C2C3D6  D47B4040  02000000
40000000  40404040  40404040  40404040  40404040  40404040  40404040
40404040  40404040  40404040  40404040  E2E3D2D4  F0F0F2F5*
02C5E2C4  40404040  40400010  4040000E  C9C3D5E3  C5D94040  02000000
40000000  40404040  40404040  40404040  40404040  40404040  40404040
40404040  40404040  40404040  40404040  E2E3D2D4  F0F0F2F6*
02C5E2C4  40404040  40400010  4040000F  D4D6C4E2  D9E34040  02000000
40000000  40404040  40404040  40404040  40404040  40404040  40404040
40404040  40404040  40404040  40404040  E2E3D2D4  F0F0F2F7*
02E3E7E3  40000650  4040001C  40400001  00000000  00000000  00000000
00000000  00000000  00000000  00000000  40404040  40404040  40404040
40404040  40404040  40404040  40404040  E2E3D2D4  F0F0F2F8*
02D9D3C4  40404040  40400038  40404040  00080001  1C00064C  00090001
1C000650  000A0001  1C000654  000B0001  1C000658  000C0001  1C00065C
000D0001  1C000660  000E0001  1C000664  E2E3D2D4  F0F0F2F9*
02C5E2C4  40404040  40400010  40400010  E2E3D2C3  C1D34040  02000000
40000000  40404040  40404040  40404040  40404040  40404040  40404040
40404040  40404040  40404040  40404040  E2E3D2D4  F0F0F3F0**
02C5E2C4  40404040  40400010  40400011  E2E3D2C5  D7D34040  02000000
40000000  40404040  40404040  40404040  40404040  40404040  40404040
40404040  40404040  40404040  40404040  E2E3D2D4  F0F0F3F1*
02C5E2C4  40404040  40400010  40400012  E2E3D2C7  C1C74040  02000000
40000000  40404040  40404040  40404040  40404040  40404040  40404040
40404040  40404040  40404040  40404040  E2E3D2D4  F0F0F3F2*
```

| | | | | | | |
|---|---|---|---|---|---|---|
| 02C5E2C4 | 40404040 | 40400010 | 40400013 | E2E3D2E2 | E3D24040 | 02000000 |
| 40000000 | 40404040 | 40404040 | 40404040 | 40404040 | 40404040 | 40404040 |
| 40404040 | 40404040 | 40404040 | 40404040 | E2E3D2D4 | F0F0F3F3* | |
| 02E3E7E3 | 4000066C | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | E2E3D2D4 | F0F0F3F4* | |
| 02E3E7E3 | 40000578 | 40400038 | 40400001 | C3D6D7E8 | D9C9C7C8 | E3404DC3 |
| 5D40F1F9 | F8F640E3 | C8C540C2 | D6C5C9D5 | C740C3D6 | D4D7C1D5 | E85BC1D3 |
| D340D9C9 | C7C8E3E2 | 40D9C5E2 | C5D9E5C5 | E2E3D2D4 | F0F0F3F5* | |
| 02E3E7E3 | 400005B0 | 40400038 | 40400001 | C45B5BE2 | D3C9C340 | E5C5D9E2 |
| C9D6D540 | E7E7E7E7 | 40404040 | 40404040 | 4040C4C1 | E3C57A40 | E7E761E7 |
| E761E7E7 | 40404040 | 40E3C9D4 | C57A40E7 | E2E3D2D4 | F0F0F3F6* | |
| 02E3E7E3 | 400005E8 | 40400028 | 40400001 | E77AE7E7 | 7AE7E740 | 5B5BE2E3 |
| C9C3D240 | D4D6C4C5 | D3404040 | 40404040 | 40404040 | 40404040 | 40404040 |
| 40404040 | 40404040 | 40404040 | 40404040 | E2E3D2D4 | F0F0F3F7* | |
| 02E3E7E3 | 400006A0 | 40400038 | 40400001 | 5860D564 | 5870D580 | 5880D570 |
| 5890D558 | 58A0D578 | 5800D40C | 5900D350 | 47A0D608 | 1BFF58E0 | D00007FE |
| 7820D3DC | 30222B00 | 38026A00 | D3406000 | E2E3D2D4 | F0F0F3F8* | |
| 02E3E7E3 | 400006D8 | 40400038 | 40400001 | D3385800 | D33C5000 | D3EC2B00 |
| 78008014 | 6A00D340 | 6000D338 | 5800D33C | 5000D3E0 | 58F0D5A8 | 4110D094 |

MEMBER NAME STKMOD

| | | | | | | |
|---|---|---|---|---|---|---|
| 05EF58F0 | D56C4110 | D0B405EF | 58F0D56C | E2E3D2D4 | F0F0F3F9* | |
| 02E3E7E3 | 40000710 | 40400038 | 40400001 | 4110D0C0 | 05EF58F0 | D5684110 |
| D0CC05EF | 58F0D590 | 4110D0D8 | 05EF41E0 | 000415FE | 4720D67A | 58EFD04C |
| 07FE58F0 | D59C4110 | D0E005EF | 58F0D598 | E2E3D2D4 | F0F0F4F0** | |
| 02E3E7E3 | 40000748 | 40400038 | 40400001 | 4110D0E4 | 05EF4100 | D5145000 |
| D0EC4100 | D49C5000 | D0F09280 | D0F058F0 | D56C4110 | D0E805EF | 4100D527 |
| 5000D0EC | 4100D4A4 | 5000D0F0 | 9280D0F0 | E2E3D2D4 | F0F0F4F1* | |
| 02E3E7E3 | 40000780 | 40400038 | 40400001 | 58F0D56C | 4110D0E8 | 05EF4100 |
| D5005000 | D0F858F0 | D56C4110 | D0F405EF | 58F0D5A0 | 45E0F004 | 00000000 |
| 00000028 | 45E0F008 | 0450D3EC | 45E0F008 | E2E3D2D4 | F0F0F4F2* | |
| 02E3E7E3 | 400007B8 | 40400038 | 40400001 | 0450D3E0 | 45E0F010 | 58F0D5A0 |
| 45E0F000 | 00000000 | 0000003D | 45E0F134 | 00010000 | 0120D53F | 01000010 |
| 00000001 | 45E0F010 | 58F0D5A4 | 4110D100 | E2E3D2D4 | F0F0F4F3* | |
| 02E3E7E3 | 400007F0 | 40400038 | 40400001 | 05EF5000 | D3F47800 | D3BC3300 |
| 7000D5BC | 7800D3A0 | 33007000 | D5C058F0 | D5944110 | D10805EF | 41E00004 |
| 15FE4720 | D76458EF | D05407FE | 58F0D5A0 | E2E3D2D4 | F0F0F4F4* | |
| 02E3E7E3 | 40000828 | 4040000C | 40400001 | 45E0F004 | 00000000 | 00000043 |
| 40404040 | 40404040 | 40404040 | 40404040 | 40404040 | 40404040 | 40404040 |
| 40404040 | 40404040 | 40404040 | 40404040 | E2E3D2D4 | F0F0F4F5* | |
| 02D9D3C4 | 40404040 | 40400038 | 40404040 | 000F0001 | 1C000668 | 00100001 |
| 1C00066C | 00110001 | 1C000670 | 00120001 | 1C000674 | 00130001 | 1C000678 |
| 00010001 | 0C0007A8 | 00010001 | 0C0007CC | E2E3D2D4 | F0F0F4F6* | |
| 02E3E7E3 | 40000834 | 40400038 | 40400001 | 45E0F134 | 00010000 | 04708004 |
| 01000004 | 00000004 | 45E0F010 | 58F0D5A0 | 45E0F000 | 00000000 | 00000078 |
| 45E0F134 | 00010000 | 0120D438 | 01000046 | E2E3D2D4 | F0F0F4F7* | |
| 02E3E7E3 | 4000086C | 40400038 | 40400001 | 00000001 | 45E0F010 | 58F0D5A4 |
| 4110D150 | 05EF5000 | D3F87800 | D3A83300 | 7000D5C4 | 58F0D594 | 4110D158 |
| 05EF41E0 | 000415FE | 4720D7E6 | 58EFD05C | E2E3D2D4 | F0F0F4F8* | |
| 02E3E7E3 | 400008A4 | 40400038 | 40400001 | 07FE58F0 | D5AC4110 | D1A005EF |
| 58F0D5B8 | 4110D1C0 | 05EF58F0 | D5B44110 | D1CC05EF | 5850D410 | 5C40D5CC |
| 5830D35C | 1A357823 | 70007A20 | D3AC7020 | E2E3D2D4 | F0F0F4F9* | |
| 02E3E7E3 | 400008DC | 40400038 | 40400001 | D3D45850 | D40C5C40 | D5D45830 |
| D5D01A35 | 7840D3C4 | 7A43A000 | 7A40D3B8 | 7040D400 | 7A20D3C0 | 7020D3FC |
| 7800D3C4 | 33007000 | D5C858F0 | D58C4110 | E2E3D2D4 | F0F0F5F0** | |
| 02E3E7E3 | 40000914 | 40400038 | 40400001 | D1E805EF | 41E00004 | 15FE4720 |
| D86858EF | D06407FE | 58B0D35C | 58F0D588 | 4110D208 | 05EF59B0 | D4144780 |
| D86C5800 | D4145900 | D3504770 | D9CE58F0 | E2E3D2D4 | F0F0F5F1* | |

```
02E3E7E3 4000094C 40400038 40400001 D5A84110 D21405EF 58F0D56C
4110D0B4 05EF58F0 D56C4110 D0C005EF 58F0D568 4110D0CC 05EF58F0
D5904110 D0D805EF 41E00004 15FE4720 E2E3D2D4 F0F0F5F2*
02E3E7E3 40000984 40400038 40400001 D8CC58EF D06C07FE 58F0D594
4110D234 05EF41E0 000415FE 4720D8E6 58EFD074 07FE58F0 D5944110
D27C05EF 41E00004 15FE4720 D90058EF E2E3D2D4 F0F0F5F3*
02E3E7E3 400009BC 40400038 40400001 D07C07FE 58F0D5A0 45E0F004
00000000 0000007E 45E0F008 0860D430 45E0F010 58F0D5A0 45E0F000
00000000 00000078 45E0F134 00010000 E2E3D2D4 F0F0F5F4*
02E3E7E3 400009F4 40400038 40400001 0120D438 01000046 00000001
45E0F010 58F0D5A4 4110D150 05EF5000 D3F87800 D3B43300 7000D5D8
58F0D594 4110D2C4 05EF41E0 000415FE E2E3D2D4 F0F0F5F5*
02E3E7E3 40000A2C 40400038 40400001 4720D976 58EFD084 07FE58F0
D58C4110 D30C05EF 41E00004 15FE4720 D99058EF D08C07FE 58F0D5B8
4110D32C 05EF58F0 D5B04110 D1CC05EF E2E3D2D4 F0F0F5F6*
02E3E7E3 40000A64 40400038 40400001 58B0D35C 58F0D588 4110D208
05EF59B0 D4144780 D9A85800 D4145900 D3504770 D9CE1BFF 58E0D000
07FE58F0 D5A01800 45E0F004 00000006 E2E3D2D4 F0F0F5F7*
02E3E7E3 40000A9C 40400038 40400001 0000009E 45E0F008 0450D414
45E0F010 58F0D5A0 45E0F034 05404040 F1F158A0 D00458E0 A00C58B0
A0185810 B0007820 D3DC7020 10005820 E2E3D2D4 F0F0F5F8*

MEMBER NAME  STKMOD
02E3E7E3 40000AD4 40400038 40400001 B00C5830 D40C5030 20005840
B0145850 D4105050 400018DA 92FFA00C 982CA01C 07FE987B 10007820
70007020 D3DC5820 A0005020 D40C5870 E2E3D2D4 F0F0F5F9*
02E3E7E3 40000B0C 40400038 40400001 10145820 70005020 D4105820
10044130 20004150 00041B25 5020D570 5030D574 5030D1B0 5030D1DC
58201008 41302000 41500004 1B255C40 E2E3D2D4 F0F0F6F0**
02E3E7E3 40000B44 40400038 40400001 D36C1B25 5020D578 5030D57C
5030D1A0 5030D1C0 5030D1CC 5030D32C 58201010 41302000 41500004
1B255C40 D3641B25 5020D580 5030D584 E2E3D2D4 F0F0F6F1*
02E3E7E3 40000B7C 4040000C 40400001 5030D1A8 5030D1D4 47F0D5E0
40404040 40404040 40404040 40404040 40404040 40404040 40404040
40404040 40404040 40404040 40404040 E2E3D2D4 F0F0F6F2*
02E3E7E3 40000020 40400008 40400001 00000AF6 000000C0 40404040
40404040 40404040 40404040 40404040 40404040 40404040 40404040
40404040 40404040 40404040 40404040 E2E3D2D4 F0F0F6F3*
02E3E7E3 400000C0 40400004 40400001 00000ABA 40404040 40404040
40404040 40404040 40404040 40404040 40404040 40404040 40404040
40404040 40404040 40404040 40404040 E2E3D2D4 F0F0F6F4*
02D9D3C4 40404040 40400038 40404040 00010001 0C000830 00010001
0C000858 00010001 0C0009CC 00010001 0C0009E8 00010001 0C000A9C
00010001 0C000020 00010001 0C000024 E2E3D2D4 F0F0F6F5*
02E3E7E3 4000010C 4040001C 40400001 0000073A 0000073A 00000824
00000824 000008A6 000008A6 00000928 40404040 40404040 40404040
40404040 40404040 40404040 40404040 E2E3D2D4 F0F0F6F6*
02D9D3C4 40404040 40400038 40404040 00010001 0C0000C0 00010001
0C00010C 00010001 0C000110 00010001 0C000114 00010001 0C000118
00010001 0C00011C 00010001 0C000120 E2E3D2D4 F0F0F6F7*
02E3E7E3 40000128 4040001C 40400001 00000928 0000098C 0000098C
000009A6 000009A6 000009C0 00000A36 40404040 40404040 40404040
40404040 40404040 40404040 40404040 E2E3D2D4 F0F0F6F8*
02D9D3C4 40404040 40400038 40404040 00010001 0C000124 00010001
0C000128 00010001 0C00012C 00010001 0C000130 00010001 0C000134
00010001 0C000138 00010001 0C00013C E2E3D2D4 F0F0F6F9*
02E3E7E3 40000144 4040001C 40400001 00000A36 00000A36 00000A50
00000A50 00000428 000004A0 000004AC 40404040 40404040 40404040
40404040 40404040 40404040 40404040 E2E3D2D4 F0F0F7F0**
```

```
02D9D3C4 40404040 40400038 40404040 00010001 0C000140 00010001
0C000144 00010001 0C000148 00010001 0C00014C 00010001 0C000150
00010001 0C000154 00010001 0C000158 E2E3D2D4 F0F0F7F1*
02E3E7E3 40000160 4040001C 40400001 000004A4 000004B0 000004C8
00000498 80000548 0000041C 000004A8 40404040 40404040 40404040
40404040 40404040 40404040 40404040 E2E3D2D4 F0F0F7F2*
02D9D3C4 40404040 40400038 40404040 00010001 0C00015C 00010001
0C000160 00010001 0C000164 00010001 0C000168 00010001 0C00016C
00010001 0C000170 00010001 0C000174 E2E3D2D4 F0F0F7F3*
02E3E7E3 4000017C 4040001C 40400001 80000000 0000042C 0000056C
80000004 00000548 0000056C 800004A8 40404040 40404040 40404040
40404040 40404040 40404040 40404040 E2E3D2D4 F0F0F7F4*
02D9D3C4 40404040 40400038 40404040 00010001 0C000178 00020001
0C00017C 00010001 0C000180 00010001 0C000184 00020001 0C000188
00010001 0C00018C 00010001 0C000190 E2E3D2D4 F0F0F7F5*
02E3E7E3 40000198 40400014 40400001 00000448 80000448 80000564
8000055C 0000042C 40404040 40404040 40404040 40404040 40404040
40404040 40404040 40404040 40404040 E2E3D2D4 F0F0F7F6*
02E3E7E3 400001B0 40400008 40400001 80000000 0000041C 40404040
40404040 40404040 40404040 40404040 40404040 40404040 40404040
40404040 40404040 40404040 40404040 E2E3D2D4 F0F0F7F7*
02E3E7E3 400001BC 40400004 40400001 80000014 40404040 40404040

MEMBER NAME  STKMOD
40404040 40404040 40404040 40404040 40404040 40404040 40404040
40404040 40404040 40404040 40404040 E2E3D2D4 F0F0F7F8*
02D9D3C4 40404040 40400038 40404040 00010001 0C000194 00010001
0C000198 00010001 0C00019C 00010001 0C0001A0 00010001 0C0001A4
00010001 0C0001A8 00010001 0C0001B4 E2E3D2D4 F0F0F7F9*
02E3E7E3 400001C0 4040001C 40400001 00000578 8000044C 0000067C
00000680 00000408 000004B4 00000454 40404040 40404040 40404040
40404040 40404040 40404040 40404040 E2E3D2D4 F0F0F8F0**
02D9D3C4 40404040 40400038 40404040 00040001 0C0001BC 00010001
0C0001C0 00010001 0C0001C4 00010001 0C0001C8 00010001 0C0001CC
00010001 0C0001D0 00010001 0C0001D4 E2E3D2D4 F0F0F8F1*
02E3E7E3 400001DC 4040001C 40400001 00000450 00000578 00000408
00000408 00000408 00000408 00000410 40404040 40404040 40404040
40404040 40404040 40404040 40404040 E2E3D2D4 F0F0F8F2*
02D9D3C4 40404040 40400038 40404040 00010001 0C0001D8 00010001
0C0001DC 00010001 0C0001E0 00010001 0C0001E4 00010001 0C0001E8
00010001 0C0001EC 00010001 0C0001F0 E2E3D2D4 F0F0F8F3*
02E3E7E3 400001F8 4040001C 40400001 00000418 00000408 00000408
00000454 0000045C 80000408 000004F8 40404040 40404040 40404040
40404040 40404040 40404040 40404040 E2E3D2D4 F0F0F8F4*
02D9D3C4 40404040 40400038 40404040 00010001 0C0001F4 00010001
0C0001F8 00010001 0C0001FC 00010001 0C000200 00010001 0C000204
00010001 0C000208 00010001 0C00020C E2E3D2D4 F0F0F8F5*
02E3E7E3 40000214 4040001C 40400001 80000434 00000470 00000684
00000408 000004B8 00000454 00000450 40404040 40404040 40404040
40404040 40404040 40404040 40404040 E2E3D2D4 F0F0F8F6*
02D9D3C4 40404040 40400038 40404040 00010001 0C000210 00010001
0C000214 00010001 0C000218 00010001 0C00021C 00010001 0C000220
00010001 0C000224 00010001 0C000228 E2E3D2D4 F0F0F8F7*
02E3E7E3 40000230 4040001C 40400001 000004F8 00000408 00000408
00000408 00000408 00000410 00000418 40404040 40404040 40404040
40404040 40404040 40404040 40404040 E2E3D2D4 F0F0F8F8*
02D9D3C4 40404040 40400038 40404040 00010001 0C00022C 00010001
0C000230 00010001 0C000234 00010001 0C000238 00010001 0C00023C
00010001 0C000240 00010001 0C000244 E2E3D2D4 F0F0F8F9*
```

| | | | | | | |
|---|---|---|---|---|---|---|
| 02E3E7E3 | 4000024C | 40400014 | 40400001 | 00000408 | 00000408 | 00000454 |
| 0000045C | 80000408 | 40404040 | 40404040 | 40404040 | 40404040 | 40404040 |
| 40404040 | 40404040 | 40404040 | 40404040 | E2E3D2D4 | F0F0F9F0** | |
| 02E3E7E3 | 40000264 | 40400004 | 40400001 | 000004CC | 40404040 | 40404040 |
| 40404040 | 40404040 | 40404040 | 40404040 | 40404040 | 40404040 | 40404040 |
| 40404040 | 40404040 | 40404040 | 40404040 | E2E3D2D4 | F0F0F9F1* | |
| 02E3E7E3 | 4000026C | 40400004 | 40400001 | 000004D0 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2D4 | F0F0F9F2* | |
| 02D9D3C4 | 40404040 | 40400038 | 40404040 | 00010001 | 0C000248 | 00010001 |
| 0C00024C | 00010001 | 0C000250 | 00010001 | 0C000254 | 00010001 | 0C000258 |
| 00010001 | 0C00025C | 00010001 | 0C000264 | E2E3D2D4 | F0F0F9F3* | |
| 02E3E7E3 | 40000274 | 4040000C | 40400001 | 000004E0 | 000004E8 | 800004F0 |
| 40404040 | 40404040 | 40404040 | 40404040 | 40404040 | 40404040 | 40404040 |
| 40404040 | 40404040 | 40404040 | 40404040 | E2E3D2D4 | F0F0F9F4* | |
| 02E3E7E3 | 40000284 | 40400008 | 40400001 | 000004CC | 80000420 | 40404040 |
| 40404040 | 40404040 | 40404040 | 40404040 | 40404040 | 40404040 | 40404040 |
| 40404040 | 40404040 | 40404040 | 40404040 | E2E3D2D4 | F0F0F9F5* | |
| 02E3E7E3 | 40000290 | 40400004 | 40400001 | 000004CC | 40404040 | 40404040 |
| 40404040 | 40404040 | 40404040 | 40404040 | 40404040 | 40404040 | 40404040 |
| 40404040 | 40404040 | 40404040 | 40404040 | E2E3D2D4 | F0F0F9F6* | |
| 02E3E7E3 | 40000298 | 40400004 | 40400001 | 000004D0 | 40404040 | 40404040 |
| 40404040 | 40404040 | 40404040 | 40404040 | 40404040 | 40404040 | 40404040 |

MEMBER NAME STKMOD

| | | | | | | |
|---|---|---|---|---|---|---|
| 40404040 | 40404040 | 40404040 | 40404040 | E2E3D2D4 | F0F0F9F7* | |
| 02D9D3C4 | 40404040 | 40400038 | 40404040 | 00010001 | 0C00026C | 00010001 |
| 0C000274 | 00010001 | 0C000278 | 00010001 | 0C00027C | 00010001 | 0C000284 |
| 00010001 | 0C000288 | 00010001 | 0C000290 | E2E3D2D4 | F0F0F9F8* | |
| 02E3E7E3 | 400002A0 | 4040001C | 40400001 | 000004E0 | 800004E8 | 00000494 |
| 00000688 | 0000040C | 00000464 | 00000464 | 40404040 | 40404040 | 40404040 |
| 40404040 | 40404040 | 40404040 | 40404040 | E2E3D2D4 | F0F0F9F9* | |
| 02D9D3C4 | 40404040 | 40400038 | 40404040 | 00010001 | 0C000298 | 00010001 |
| 0C0002A0 | 00010001 | 0C0002A4 | 00010001 | 0C0002A8 | 00010001 | 0C0002AC |
| 00010001 | 0C0002B0 | 00010001 | 0C0002B4 | E2E3D2D4 | F0F1F0F0** | |
| 02E3E7E3 | 400002BC | 4040001C | 40400001 | 00000458 | 000004C0 | 800004BC |
| 00000414 | 000004D4 | 800004C4 | 0000042C | 40404040 | 40404040 | 40404040 |
| 40404040 | 40404040 | 40404040 | 40404040 | E2E3D2D4 | F0F1F0F1* | |
| 02D9D3C4 | 40404040 | 40400038 | 40404040 | 00010001 | 0C0002B8 | 00010001 |
| 0C0002BC | 00010001 | 0C0002C0 | 00010001 | 0C0002C4 | 00010001 | 0C0002C8 |
| 00010001 | 0C0002CC | 00010001 | 0C0002D0 | E2E3D2D4 | F0F1F0F2* | |
| 02E3E7E3 | 400002D8 | 4040001C | 40400001 | 000004A0 | 000004AC | 000004A4 |
| 000004B0 | 000004C8 | 00000498 | 80000548 | 40404040 | 40404040 | 40404040 |
| 40404040 | 40404040 | 40404040 | 40404040 | E2E3D2D4 | F0F1F0F3* | |
| 02D9D3C4 | 40404040 | 40400038 | 40404040 | 00010001 | 0C0002D4 | 00010001 |
| 0C0002D8 | 00010001 | 0C0002DC | 00010001 | 0C0002E0 | 00010001 | 0C0002E4 |
| 00010001 | 0C0002E8 | 00010001 | 0C0002EC | E2E3D2D4 | F0F1F0F4* | |
| 02E3E7E3 | 400002F4 | 4040001C | 40400001 | 0000067C | 00000680 | 00000408 |
| 000004B4 | 00000454 | 00000450 | 00000578 | 40404040 | 40404040 | 40404040 |
| 40404040 | 40404040 | 40404040 | 40404040 | E2E3D2D4 | F0F1F0F5* | |
| 02D9D3C4 | 40404040 | 40400038 | 40404040 | 00010001 | 0C0002F0 | 00010001 |
| 0C0002F4 | 00010001 | 0C0002F8 | 00010001 | 0C0002FC | 00010001 | 0C000300 |
| 00010001 | 0C000304 | 00010001 | 0C000308 | E2E3D2D4 | F0F1F0F6* | |
| 02E3E7E3 | 40000310 | 4040001C | 40400001 | 00000408 | 00000408 | 00000408 |
| 00000408 | 00000410 | 00000418 | 00000408 | 40404040 | 40404040 | 40404040 |
| 40404040 | 40404040 | 40404040 | 40404040 | E2E3D2D4 | F0F1F0F7* | |
| 02D9D3C4 | 40404040 | 40400038 | 40404040 | 00010001 | 0C00030C | 00010001 |
| 0C000310 | 00010001 | 0C000314 | 00010001 | 0C000318 | 00010001 | 0C00031C |
| 00010001 | 0C000320 | 00010001 | 0C000324 | E2E3D2D4 | F0F1F0F8* | |

```
02E3E7E3  4000032C  4040001C  40400001  00000408  00000454  0000045C
80000408  00000470  00000684  00000408  40404040  40404040  40404040
40404040  40404040  40404040  40404040  E2E3D2D4  F0F1F0F9*
02D9D3C4  40404040  40400038  40404040  00010001  0C000328  00010001
0C00032C  00010001  0C000330  00010001  0C000334  00010001  0C000338
00010001  0C00033C  00010001  0C000340  E2E3D2D4  F0F1F1F0**
02E3E7E3  40000348  4040001C  40400001  000004B8  00000454  00000450
000004F8  00000408  00000408  00000408  40404040  40404040  40404040
40404040  40404040  40404040  40404040  E2E3D2D4  F0F1F1F1*
02D9D3C4  40404040  40400038  40404040  00010001  0C000344  00010001
0C000348  00010001  0C00034C  00010001  0C000350  00010001  0C000354
00010001  0C000358  00010001  0C00035C  E2E3D2D4  F0F1F1F2*
02E3E7E3  40000364  4040001C  40400001  00000408  00000410  00000418
00000408  00000408  00000454  0000045C  40404040  40404040  40404040
40404040  40404040  40404040  40404040  E2E3D2D4  F0F1F1F3*
02D9D3C4  40404040  40400038  40404040  00010001  0C000360  00010001
0C000364  00010001  0C000368  00010001  0C00036C  00010001  0C000370
00010001  0C000374  00010001  0C000378  E2E3D2D4  F0F1F1F4*
02E3E7E3  40000380  4040001C  40400001  80000408  00000470  00000698
00000408  000004B8  00000454  00000450  40404040  40404040  40404040
40404040  40404040  40404040  40404040  E2E3D2D4  F0F1F1F5*
02D9D3C4  40404040  40400038  40404040  00010001  0C00037C  00010001
0C000380  00010001  0C000384  00010001  0C000388  00010001  0C00038C
00010001  0C000390  00010001  0C000394  E2E3D2D4  F0F1F1F6*

MEMBER NAME  STKMOD
02E3E7E3  4000039C  4040001C  40400001  000004F8  00000408  00000408
00000408  00000408  00000410  00000418  40404040  40404040  40404040
40404040  40404040  40404040  40404040  E2E3D2D4  F0F1F1F7*
02D9D3C4  40404040  40400038  40404040  00010001  0C000398  00010001
0C00039C  00010001  0C0003A0  00010001  0C0003A4  00010001  0C0003A8
00010001  0C0003AC  00010001  0C0003B0  E2E3D2D4  F0F1F1F8*
02E3E7E3  400003B8  4040001C  40400001  00000408  00000408  00000454
0000045C  80000408  00000494  00000688  40404040  40404040  40404040
40404040  40404040  40404040  40404040  E2E3D2D4  F0F1F1F9*
02D9D3C4  40404040  40400038  40404040  00010001  0C0003B4  00010001
0C0003B8  00010001  0C0003BC  00010001  0C0003C0  00010001  0C0003C4
00010001  0C0003C8  00010001  0C0003CC  E2E3D2D4  F0F1F2F0**
02E3E7E3  400003D4  40400018  40400001  0000040C  00000464  00000464
00000458  000004C0  800004BC  40404040  40404040  40404040  40404040
40404040  40404040  40404040  40404040  E2E3D2D4  F0F1F2F1*
02E3E7E3  400003F0  40400004  40400001  000004CC  40404040  40404040
40404040  40404040  40404040  40404040  40404040  40404040  40404040
40404040  40404040  40404040  40404040  E2E3D2D4  F0F1F2F2*
02D9D3C4  40404040  40400038  40404040  00010001  0C0003D0  00010001
0C0003D4  00010001  0C0003D8  00010001  0C0003DC  00010001  0C0003E0
00010001  0C0003E4  00010001  0C0003E8  E2E3D2D4  F0F1F2F3*
02E3E7E3  400003F4  40400004  40400001  80000428  40404040  40404040
40404040  40404040  40404040  40404040  40404040  40404040  40404040
40404040  40404040  40404040  40404040  E2E3D2D4  F0F1F2F4*
02E3E7E3  4000067C  40400024  40400001  00000000  00000000  00000000
00000000  00000018  0000000C  00000020  00000000  00000000  40404040
40404040  40404040  40404040  40404040  E2E3D2D4  F0F1F2F5*
02D9D3C4  40404040  40400010  40404040  00010001  0C0003F0  00010001
0C0003F4  40404040  40404040  40404040  40404040  40404040  40404040
40404040  40404040  40404040  40404040  E2E3D2D4  F0F1F2F6*
02C5D5C4  40404040  40404040  40404040  40404040  40404040  40404040
00000B88  F1F5F7F3  F460C6D6  F34040F0  F2F0F2F8  F7F0F9F8  40F0F84B
F4F44BF4  F9404040  E2E3D2D4  D6C44040  E2E3D2D4  F0F1F2F7**
```

MEMBER NAME STKSTK

| | | | | | | |
|---|---|---|---|---|---|---|
| 02C5E2C4 | 40404040 | 40400010 | 40400001 | E2E3D2E2 | E3D24040 | 00000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F1* | |
| 02E3E7E3 | 40000000 | 40400038 | 40400001 | 47F0F00C | 07E2E3D2 | E2E3D240 |
| 90ECD00C | 184D98CD | F0205040 | D00450D0 | 400807FC | 40404040 | 40404040 |
| 020A0602 | 1A016B10 | 041A026B | D310041A | E2E3D2E2 | F0F0F0F2* | |
| 02E3E7E3 | 40000038 | 40400029 | 40400001 | 026BE210 | 04220206 | 17140122 |
| 021A1940 | 40C5D9D9 | D6D940C9 | D540C3C1 | D3D340C9 | D540E2E3 | D2E2E3D2 |
| 22404040 | 40404040 | 40404040 | 40404040 | E2E3D2E2 | F0F0F0F3* | |
| 02E3E7E3 | 400000F0 | 40400038 | 40400001 | 00000000 | 00000000 | 4F080000 |
| 00000000 | 00000001 | 00000002 | 00000003 | 00000004 | 00000006 | 00000008 |
| 0000000A | 00000017 | 00000058 | 40400000 | E2E3D2E2 | F0F0F0F4* | |
| 02C5E2C4 | 40404040 | 40400010 | 40400002 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | E2E3D2E2 | F0F0F0F5* | |
| 02E3E7E3 | 40000128 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2E3D2E2 | F0F0F0F6* | |
| 02C5E2C4 | 40404040 | 40400010 | 40400003 | E2D8D9E3 | 40404040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F7* | |
| 02C5E2C4 | 40404040 | 40400010 | 40400004 | C3C1C4E3 | E7D34040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F8* | |
| 02E3E7E3 | 400001C8 | 40400010 | 40400001 | FFFFFFA0 | 00001130 | 00000000 |
| 00000000 | 40404040 | 40404040 | 40404040 | 40404040 | 40404040 | 40404040 |
| 40404040 | 40404040 | 40404040 | 40404040 | E2E3D2E2 | F0F0F0F9* | |
| 02C5E2C4 | 40404040 | 40400010 | 40400005 | C3D4D7D9 | E2E24040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F1F0** | |
| 02C5E2C4 | 40404040 | 40400010 | 40400006 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F1F1* | |
| 02E3E7E3 | 400001DC | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | E2E3D2E2 | F0F0F1F2* | |
| 02E3E7E3 | 40000238 | 40400038 | 40400001 | 58B0D16C | 58A0D184 | 50A0D194 |
| 5800D1BC | 5000D1A4 | 5800D1C0 | 5000D1A8 | 5800D1C4 | 5000D1AC | 5860D1B8 |
| 5870D1B4 | 5880D1B0 | 5890D098 | 7828B000 | E2E3D2E2 | F0F0F1F3* | |
| 02E3E7E3 | 40000270 | 40400038 | 40400001 | 7020D14C | 7827B000 | 7020D150 |
| 7846B000 | 7040D154 | 7020D158 | 7840D14C | 7040D180 | 7A40D0BC | 7040D144 |
| 7020D148 | 58E0D1A4 | 2B00780E | B0006A00 | E2E3D2E2 | F0F0F1F4* | |
| 02E3E7E3 | 400002A8 | 40400038 | 40400001 | D0906000 | D0885850 | D08C5C40 |
| D0B85820 | D1606825 | 20502B00 | 38026A00 | D0906000 | D0885800 | D08C5000 |
| D0DC58E0 | D1A82B00 | 780EB000 | 6A00D090 | E2E3D2E2 | F0F0F1F5* | |
| 02E3E7E3 | 400002E0 | 40400038 | 40400001 | 6000D088 | 5800D08C | 5000D0EC |
| 58E0D1AC | 2B00780E | B0006A00 | D0906000 | D0885800 | D08C5000 | D0E458F0 |
| D17C1800 | 45E0F004 | 00000000 | 00000028 | E2E3D2E2 | F0F0F1F6* | |
| 02E3E7E3 | 40000318 | 40400038 | 40400001 | 5830D0E0 | 89300002 | 5A30D194 |
| 45E0F008 | 0473B000 | 45E0F008 | 0450D0DC | 45E0F008 | 0450D0EC | 45E0F008 |
| 0450D0E4 | 45E0F010 | 58F0D17C | 45E0F000 | E2E3D2E2 | F0F0F1F7* | |
| 02E3E7E3 | 40000350 | 40400008 | 40400001 | 00000000 | 0000003E | 40404040 |
| 40404040 | 40404040 | 40404040 | 40404040 | 40404040 | 40404040 | 40404040 |
| 40404040 | 40404040 | 40404040 | 40404040 | E2E3D2E2 | F0F0F1F8* | |
| 02D9D3C4 | 40404040 | 40400038 | 40404040 | 00020001 | 0C0001C8 | 00020001 |
| 0C0001CC | 00030001 | 1C0001D0 | 00040001 | 1C0001DC | 00050001 | 1C0001E0 |
| 00060001 | 1C0001E4 | 00010001 | 0C000314 | E2E3D2E2 | F0F0F1F9* | |

```
02E3E7E3  40000358  40400038  40400001  45E0F134  00010000  0120D0FC

MEMBER NAME  STKSTK
01000017  00000001  45E0F010  58F0D178  4110D05C  05EF41E0  000415FE
4720D322  58EFD04C  07FE7820  D1807B20  E2E3D2E2  F0F0F2F0**
02E3E7E3  40000390  40400038  40400001  D1547840  D1507B40  D1583C22
3C443A24  7020D1C8  58F0D168  4110D06C  05EF7900  D0BC4750  D38058F0
D1744110  D07005EF  41E00004  15FE4720  E2E3D2E2  F0F0F2F1*
02E3E7E3  400003C8  40400038  40400001  D36858EF  D05407FE  47F0D380
58F0D17C  45E0F004  00000006  00000044  45E0F010  5A90D098  5800D194
1A0A5000  D1945800  D1AC1A0A  5000D1AC  E2E3D2E2  F0F0F2F2*
02E3E7E3  40000400  40400038  40400001  5800D1A8  1A0A5000  D1A85800
D1A41A0A  5000D1A4  1A6A1A7A  1A8A5990  D0F447C0  D2041BFF  58E0D000
07FE58D0  D00458E0  D00C92FF  D00C982C  E2E3D2E2  F0F0F2F3*
02E3E7E3  40000438  40400038  40400001  D01C07FE  98781004  58207000
5020D0F4  58208000  5020D0E0  58201000  41302000  41500004  1B255C40
D0AC1B25  5020D16C  5030D170  47F0D1D0  E2E3D2E2  F0F0F2F4*
02E3E7E3  40000020  40400008  40400001  0000043C  00000068  40404040
40404040  40404040  40404040  40404040  40404040  40404040  40404040
40404040  40404040  40404040  40404040  E2E3D2E2  F0F0F2F5*
02E3E7E3  40000068  40400004  40400001  0000042A  40404040  40404040
40404040  40404040  40404040  40404040  40404040  40404040  40404040
40404040  40404040  40404040  40404040  E2E3D2E2  F0F0F2F6*
02E3E7E3  400000B4  4040000C  40400001  0000038A  000003D4  000003D0
40404040  40404040  40404040  40404040  40404040  40404040  40404040
40404040  40404040  40404040  40404040  E2E3D2E2  F0F0F2F7*
02D9D3C4  40404040  40400038  40404040  00010001  0C000354  00010001
0C0003E0  00010001  0C000020  00010001  0C000024  00010001  0C000068
00010001  0C0000B4  00010001  0C0000B8  E2E3D2E2  F0F0F2F8*
02E3E7E3  400000C0  4040001C  40400001  000003D4  00000164  0000011C
00000164  80000150  80000230  000001B4  40404040  40404040  40404040
40404040  40404040  40404040  40404040  E2E3D2E2  F0F0F2F9*
02D9D3C4  40404040  40400038  40404040  00010001  0C0000BC  00010001
0C0000C0  00010001  0C0000C4  00010001  0C0000C8  00010001  0C0000CC
00010001  0C0000D0  00010001  0C0000D4  E2E3D2E2  F0F0F3F0**
02E3E7E3  400000DC  40400010  40400001  000001AC  000001BC  00000150
80000164  40404040  40404040  40404040  40404040  40404040  40404040
40404040  40404040  40404040  40404040  E2E3D2E2  F0F0F3F1*
02E3E7E3  400001E8  40400038  40400001  00000000  00000020  0000000C
00000010  00000018  00000000  00000000  00000000  00000000  00000000
00000000  00000000  00000024  0000002C  E2E3D2E2  F0F0F3F2*
02E3E7E3  40000220  40400018  40400001  00000028  00000030  00000038
00000040  00000000  00800009  40404040  40404040  40404040  40404040
40404040  40404040  40404040  40404040  E2E3D2E2  F0F0F3F3*
02D9D3C4  40404040  40400028  40404040  00010001  0C0000D8  00010001
0C0000DC  00010001  0C0000E0  00010001  0C0000E4  00010001  0C0000E8
40404040  40404040  40404040  40404040  E2E3D2E2  F0F0F3F4*
02C5D5C4  40404040  40404040  40404040  40404040  40404040  40404040
00000470  F1F5F7F3  F460C6D6  F34040F0  F2F0F2F8  F7F0F9F8  40F0F84B
F4F44BF5  F4404040  E2E3D2E2  E3D24040  E2E3D2E2  F0F0F3F5**

MEMBER NAME  STMODL
02C5E2C4  40404040  40400010  40400001  E2E3D4D6  C4D34040  00000000
40000000  40404040  40404040  40404040  40404040  40404040  40404040
40404040  40404040  40404040  40404040  E2E3D4D6  F0F0F0F1*
02E3E7E3  40000000  40400038  40400001  47F0F00C  07E2E3D4  D6C4D340
90ECD00C  184D98CD  F0205040  D00450D0  400807FC  40404040  40404040
021A1C40  4040C9D5  E5C1D3C9  C440C9D6  E2E3D4D6  F0F0F0F2*
02E3E7E3  40000038  40400038  40400001  D7E340C9  D540E2E3  D4D6C4D3
```

```
407E4010  0422021A  2CD9C5C6  C9D3C540  C5D9D9D6  D940C9D5  40C3D9C5
C1E3C9D5  C740E2C5  D8E4C5D5  C3C5E26B  E2E3D4D6  F0F0F0F3*
02E3E7E3  40000070  40400027  40400001  40C5D9D9  D6D9407E  40100322
021A0FC4  D9C1E6C9  D5C740C9  C440C9E2  404D0614  14011A01  5D1E2240
40404040  40404040  40404040  40404040  E2E3D4D6  F0F0F0F4*
02E3E7E3  40000148  40400038  40400001  00000000  00000000  4F080000
00000000  00000000  00000000  00000001  00000002  00000004  00000014
000000B4  41100000  41A00000  42B40000  E2E3D4D6  F0F0F0F5*
02C5E2C4  40404040  40400010  40400002  E5F9F940  40404040  05000000
4000003C  40404040  40404040  40404040  40404040  40404040  40404040
40404040  40404040  40404040  40404040  E2E3D4D6  F0F0F0F6*
02E3E7E3  40000180  4040000C  40400001  00000000  00000000  00000000
40404040  40404040  40404040  40404040  40404040  40404040  40404040
40404040  40404040  40404040  40404040  E2E3D4D6  F0F0F0F7*
02C5E2C4  40404040  40400010  40400003  40404040  40404040  05000000
400007D0  40404040  40404040  40404040  40404040  40404040  40404040
40404040  40404040  40404040  40404040  E2E3D4D6  F0F0F0F8*
02C5E2C4  40404040  40400010  40400004  C1D9C3D6  E2404040  02000000
40000000  40404040  40404040  40404040  40404040  40404040  40404040
40404040  40404040  40404040  40404040  E2E3D4D6  F0F0F0F9*
02C5E2C4  40404040  40400010  40400005  C3C1C4C6  C9D34040  02000000
40000000  40404040  40404040  40404040  40404040  40404040  40404040
40404040  40404040  40404040  40404040  E2E3D4D6  F0F0F1F0**
02C5E2C4  40404040  40400010  40400006  C9C2C3D6  D47B4040  02000000
40000000  40404040  40404040  40404040  40404040  40404040  40404040
40404040  40404040  40404040  40404040  E2E3D4D6  F0F0F1F1*
02C5E2C4  40404040  40400010  40400007  D7E2D5D6  E3C54040  02000000
40000000  40404040  40404040  40404040  40404040  40404040  40404040
40404040  40404040  40404040  40404040  E2E3D4D6  F0F0F1F2*
02C5E2C4  40404040  40400010  40400008  D9C5E3C6  D4E34040  02000000
40000000  40404040  40404040  40404040  40404040  40404040  40404040
40404040  40404040  40404040  40404040  E2E3D4D6  F0F0F1F3*
02E3E7E3  400001C8  4040001C  40400001  FFFFFFFC  FFFFFFFC  00000000
00000000  00000000  00000000  00000000  40404040  40404040  40404040
40404040  40404040  40404040  40404040  E2E3D4D6  F0F0F1F4*
02E3E7E3  400001EC  40400038  40400001  5890D134  58B0D130  58A0D0C8
5880D0D0  5870D0EC  5860D0C0  7800D0DC  33007000  D14C58F0  D1384110
D07805EF  7000D0F8  58F0D104  41E00004  E2E3D4D6  F0F0F1F5*
02E3E7E3  40000224  40400020  40400001  15FE4720  D19C89F0  000258EF
D04C07FE  58F0D140  45E0F004  00000006  00000028  40404040  40404040
40404040  40404040  40404040  40404040  E2E3D4D6  F0F0F1F6*
02D9D3C4  40404040  40400038  40404040  00020001  0C0001C8  00030001
0C0001CC  00040001  1C0001D0  00050001  1C0001D4  00060001  1C0001D8
00070001  1C0001DC  00080001  1C0001E0  E2E3D4D6  F0F0F1F7*
02E3E7E3  40000244  40400038  40400001  45E0F008  0450D104  45E0F010
58F0D140  45E0F034  05404040  F1F550A0  D0FC58F0  D1484110  D07C05EF
41E00004  15FE4720  D1E458EF  D06007FE  E2E3D4D6  F0F0F1F8*
02E3E7E3  4000027C  40400038  40400001  4100B02C  5000D08C  9280D08C
58F0D138  4110D08C  05EF3820  7D20D0F8  7C20D0E4  7020D110  7800B030
320047A0  D2183322  7020D110  7820D110  E2E3D4D6  F0F0F1F9*
02E3E7E3  400002B4  40400038  40400001  7C20D0E0  2B003802  6A00D0B8

MEMBER NAME  STMODL
6000D0B0  5800D0B4  5000D114  58F0D144  4110D090  05EF1BFF  58E0D000
07FE1BFF  58E0D000  07FE58F0  D13C4110  E2E3D4D6  F0F0F2F0**
02E3E7E3  400002EC  40400038  40400001  D0A405EF  5980D11C  4780D24E
59A0D11C  4770D3E8  58F0D140  45E0F004  0000000D  0000007C  45E0F134
00010000  01209488  01000014  00000001  E2E3D4D6  F0F0F2F1*
02E3E7E3  40000324  40400038  40400001  45E0F010  5800D0CC  5000D0FC
```

```
58F0D148  4110D07C  05EF41E0  000415FE  4720D2B2  58EFD068  07FE58F0
D1444110  D09005EF  1BFF58E0  D00007FE  E2E3D4D6  F0F0F2F2*
02E3E7E3  4000035C  40400038  40400001  5800D10C  8607D310  58F0D13C
4110D0A4  05EF5980  D11C4780  D2C459A0  D11C4770  D3E858F0  D1401800
45E0F004  0000000D  0000007C  45E0F134  E2E3D4D6  F0F0F2F3*
02E3E7E3  40000394  40400038  40400001  00010000  01209488  01000014
00000001  45E0F010  50A0D0FC  5060D10C  58F0D148  4110D07C  05EF41E0
000415FE  4720D332  58EFD070  07FE4100  E2E3D4D6  F0F0F2F4*
02E3E7E3  400003CC  40400038  40400001  B02C5000  D08C9280  D08C58F0
D1384110  D08C05EF  38207D20  D0F87C20  D0E47020  D1107800  B0303200
47A0D366  33227020  D1107820  D1107C20  E2E3D4D6  F0F0F2F5*
02E3E7E3  40000404  40400038  40400001  D0E02B00  38026A00  D0B86000
D0B05800  D0B45000  D11458F0  D1444110  D09005EF  1BFF58E0  D00007FE
1BFF58E0  D00007FE  58F0D13C  4110D0A4  E2E3D4D6  F0F0F2F6*
02E3E7E3  4000043C  40400038  40400001  05EF5980  D11C4780  D39C59A0
D11C4770  D3E858F0  D1401800  45E0F004  0000000D  0000007C  45E0F134
00010000  01209488  01000014  00000001  E2E3D4D6  F0F0F2F7*
02E3E7E3  40000474  40400038  40400001  45E0F010  1BFF58E0  D00007FE
58F0D140  45E0F004  00000006  0000004A  45E0F008  0450D11C  45E0F010
58F0D140  45E0F034  05404040  F2F158A0  E2E3D4D6  F0F0F2F8*
02E3E7E3  400004AC  40400038  40400001  D00458E0  A00C58B0  A0185810
B0005820  D1085020  10005830  B0045840  D1005040  30005850  B00C5860
D10C5060  500018DA  92FFA00C  982CA01C  E2E3D4D6  F0F0F2F9*
02E3E7E3  400004E4  4040002A  40400001  07FE987A  10005820  70005020
D1085820  80005020  D1005820  90005020  D1045820  A0005020  D10C47F0
D1544040  40404040  40404040  40404040  E2E3D4D6  F0F0F3F0**
02E3E7E3  40000020  40400008  40400001  000004E6  00000098  40404040
40404040  40404040  40404040  40404040  40404040  40404040  40404040
40404040  40404040  40404040  40404040  E2E3D4D6  F0F0F3F1*
02E3E7E3  40000098  40400004  40400001  000004AA  40404040  40404040
40404040  40404040  40404040  40404040  40404040  40404040  40404040
40404040  40404040  40404040  40404040  E2E3D4D6  F0F0F3F2*
02D9D3C4  40404040  40400038  40404040  00010001  0C000240  00010001
0C00030C  00010001  0C00038C  00010001  0C00045C  00010001  0C00048C
00010001  0C000020  00010001  0C000024  E2E3D4D6  F0F0F3F3*
02E3E7E3  400000E4  4040001C  40400001  00000234  0000025E  000002E6
0000035C  00000434  0000027C  000002DE  40404040  40404040  40404040
40404040  40404040  40404040  40404040  E2E3D4D6  F0F0F3F4*
02D9D3C4  40404040  40400038  40404040  00010001  0C000098  00010001
0C0000E4  00010001  0C0000E8  00010001  0C0000EC  00010001  0C0000F0
00010001  0C0000F4  00010001  0C0000F8  E2E3D4D6  F0F0F3F5*
02E3E7E3  40000100  4040001C  40400001  0000034A  00000354  000003CA
0000042C  800001E4  00000198  000001A0  40404040  40404040  40404040
40404040  40404040  40404040  40404040  E2E3D4D6  F0F0F3F6*
02D9D3C4  40404040  40400038  40404040  00010001  0C0000FC  00010001
0C000100  00010001  0C000104  00010001  0C000108  00010001  0C00010C
00010001  0C000110  00010001  0C000114  E2E3D4D6  F0F0F3F7*
02E3E7E3  4000011C  40400020  40400001  00000194  800001A4  80000000
00000000  00000034  00000008  000001A0  800001AC  40404040  40404040
40404040  40404040  40404040  40404040  E2E3D4D6  F0F0F3F8*
02D9D3C4  40404040  40400038  40404040  00010001  0C000118  00010001
0C00011C  00010001  0C000120  00020001  0C000128  00020001  0C00012C

MEMBER NAME  STMODL
00020001  0C000130  00010001  0C000134  E2E3D4D6  F0F0F3F9*
02E3E7E3  4000013C  4040000C  40400001  00000164  000001B4  800001B0
40404040  40404040  40404040  40404040  40404040  40404040  40404040
40404040  40404040  40404040  40404040  E2E3D4D6  F0F0F4F0**
02E3E7E3  400001E4  40400008  40400001  00000000  00000000  40404040
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | E2E3D4D6 | F0F0F4F1* | |
| 02D9D3C4 | 40404040 | 40400020 | 40404040 | 00010001 | 0C000138 | 00010001 |
| 0C00013C | 00010001 | 0C000140 | 00010001 | 0C000144 | 40404040 | 40404040 |
| 40404040 | 40404040 | 40404040 | 40404040 | E2E3D4D6 | F0F0F4F2* | |
| 02C5D5C4 | 40404040 | 40404040 | 40404040 | 40404040 | 40404040 | 40404040 |
| 0000050E | F1F5F7F3 | F460C6D6 | F34040F0 | F2F0F2F8 | F7F0F9F8 | 40F0F84B |
| F4F44BF5 | F9404040 | E2E3D4D6 | C4D34040 | E2E3D4D6 | F0F0F4F3** | |

MEMBER NAME SWITCH

| | | | | | | |
|---|---|---|---|---|---|---|
| 02C5E2C4 | 40404040 | 40400010 | 40400001 | E2E6C9E3 | C3C84040 | 00000000 |
| 40000000 | 40404040 | 40404040 | 40404040 | 40404040 | 40404040 | 40404040 |
| 40404040 | 40404040 | 40404040 | 40404040 | E2E6C9E3 | F0F0F0F1* | |
| 02E3E7E3 | 40000000 | 40400028 | 40400001 | 47F0F00C | 07E2E6C9 | E3C3C840 |
| 90ECD00C | 184D98CD | F0205040 | D00450D0 | 400807FC | 40404040 | 40404040 |
| 40404040 | 40404040 | 40404040 | 40404040 | E2E6C9E3 | F0F0F0F2* | |
| 02E3E7E3 | 400000C8 | 4040002C | 40400001 | 41300000 | 00000000 | 41200000 |
| 00000000 | 00000000 | 00000001 | 00000002 | 00000003 | 00000004 | 00000000 |
| 00000000 | 40404040 | 40404040 | 40404040 | E2E6C9E3 | F0F0F0F3* | |
| 02E3E7E3 | 400001D0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F0F4* | |
| 02E3E7E3 | 400001D8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F0F5* | |
| 02E3E7E3 | 400001E0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F0F6* | |
| 02E3E7E3 | 400001E8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F0F7* | |
| 02C5E2C4 | 40404040 | 40400010 | 40400002 | E4D5C9E3 | C4404040 | 02000000 |
| 40000000 | 40404040 | 40404040 | 40404040 | 40404040 | 40404040 | 40404040 |
| 40404040 | 40404040 | 40404040 | 40404040 | E2E6C9E3 | F0F0F0F8* | |
| 02E3E7E3 | 400001F0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F0F9* | |
| 02E3E7E3 | 400001F8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F1F0** | |
| 02E3E7E3 | 40000204 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F1F1* | |
| 02C5E2C4 | 40404040 | 40400010 | 40400003 | E2D7C3D6 | C5C44040 | 02000000 |
| 40000000 | 40404040 | 40404040 | 40404040 | 40404040 | 40404040 | 40404040 |
| 40404040 | 40404040 | 40404040 | 40404040 | E2E6C9E3 | F0F0F1F2* | |
| 02E3E7E3 | 4000020C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E6C9E3 | F0F0F1F3* | |
| 02E3E7E3 | 40000214 | 40400038 | 40400001 | 00000000 | 5840D1C8 | 5850D1DC |
| 5860D1D4 | 5870D1C0 | 5880D1B8 | 5890D1B0 | 58A0D1A8 | 58B0D1E4 | 5830D0D0 |
| 5930D0B4 | 4780D2BC | 5800D0B4 | 5000D0D0 | E2E6C9E3 | F0F0F1F4* | |
| 02E3E7E3 | 4000024C | 40400038 | 40400001 | 68208008 | 6020D180 | 68207008 |
| 6020D190 | 68208010 | 60208008 | 6820D180 | 60208010 | 68207010 | 60207008 |
| 6820D190 | 60207010 | 6820B008 | 6020D160 | E2E6C9E3 | F0F0F1F5* | |
| 02E3E7E3 | 40000284 | 40400038 | 40400001 | 6820B018 | 6020D170 | 6820B010 |
| 6020B008 | 6820D160 | 6020B010 | 6820B020 | 6020B018 | 6820D170 | 6020B020 |
| 6820A008 | 6020D140 | 68209008 | 6020D150 | E2E6C9E3 | F0F0F1F6* | |
| 02E3E7E3 | 400002BC | 40400038 | 40400001 | 6820A010 | 23026000 | A0086820 |

```
D1406020  A0106820  90102302  60009008  6820D150  60209010  47F0D358
5800D0B0  5000D0D0  68208008  6020D180  E2E6C9E3  F0F0F1F7*
02E3E7E3  400002F4  40400038  40400001  68207008  6020D190  68208010
60208008  6820D180  60208010  68207010  60207008  6820D190  60207010
6820B008  6020D160  6820B018  6020D170  E2E6C9E3  F0F0F1F8*
02E3E7E3  4000032C  40400038  40400001  6820B010  6020B008  6820D160
6020B010  6820B020  6020B018  6820D170  6020B020  6820A008  6020D140
68209008  6020D150  6820A010  6020A008  E2E6C9E3  F0F0F1F9*
02E3E7E3  40000364  40400038  40400001  6820D140  23026000  A0106820

MEMBER NAME  SWITCH
90106020  90086820  D1502302  60009010  41008008  5000D04C  41007008
5000D050  4100A008  5000D054  41009008  E2E6C9E3  F0F0F2F0**
02E3E7E3  4000039C  40400038  40400001  5000D058  58F0D1EC  4110D04C
05EF4100  80105000  D0704100  70105000  D0744100  A0105000  D0784100
90105000  D07C58F0  D1EC4110  D07005EF  E2E6C9E3  F0F0F2F1*
02E3E7E3  400003D4  40400038  40400001  6800D130  23006000  D1306820
D0A06C20  D0D86840  D1202C44  2C246840  D0A86C40  D0E86C40  D1202A24
6A20D0F8  60206008  6820D0A0  6C20D0E0  E2E6C9E3  F0F0F2F2*
02E3E7E3  4000040C  40400038  40400001  6840D120  2C442C24  6840D0A8
6C40D0F0  6C40D120  2A246A20  D1006020  60106820  D0A06C20  D0D86840
D1282C44  2C246840  D0A86C40  D0E86C40  E2E6C9E3  F0F0F2F3*
02E3E7E3  40000444  40400038  40400001  D1282A24  6A20D0F8  60205008
6820D0A0  6C20D0E0  6840D128  2C442C24  6840D0A8  6C40D0F0  6C40D128
2A246A20  D1006020  50104100  60085000  E2E6C9E3  F0F0F2F4*
02E3E7E3  4000047C  40400038  40400001  D0944100  60105000  D09858F0
D1D04110  D09405EF  41005008  5000D094  41005010  5000D098  58F0D1D0
4110D094  05EF6820  D1306C20  60102322  E2E6C9E3  F0F0F2F5*
02E3E7E3  400004B4  40400038  40400001  6A20B008  60204008  6820D130
6C206008  6A20B010  60204010  6820D130  6C205010  23226A20  B0186020
40186820  D1306C20  50086A20  B0206020  E2E6C9E3  F0F0F2F6*
02E3E7E3  400004EC  40400038  40400001  40201BFF  58E0D000  07FE58A0
D00458E0  A00C58B0  A0185810  B0006820  D0D86020  10005820  B0046840
D0E86040  20005830  B0086860  D0F86060  E2E6C9E3  F0F0F2F7*
02E3E7E3  40000524  40400038  40400001  30005840  B00C6800  D1086000
40005850  B0106820  D0E06020  50005860  B0146840  D0F06040  60005870
B0186860  D1006060  70005880  B01C6800  E2E6C9E3  F0F0F2F8*
02E3E7E3  4000055C  40400038  40400001  D1106000  80005890  B0386820
D1306020  90005810  B03C5820  D0D05020  10005830  B0486840  D1386040
300018DA  92FFA00C  982CA01C  07FE987B  E2E6C9E3  F0F0F2F9*
02E3E7E3  40000594  40400038  40400001  10006820  70006020  D0D86820
80006020  D0E86820  90006020  D0F86820  A0006020  D1086820  B0006020
D0E0987B  10146820  70006020  D0F06820  E2E6C9E3  F0F0F3F0**
02E3E7E3  400005CC  40400038  40400001  80006020  D1006820  90006020
D110987B  10386820  70006020  D1305820  80005020  D0D06820  90006020
D1286820  A0006020  D1206820  B0006020  E2E6C9E3  F0F0F3F1*
02E3E7E3  40000604  40400038  40400001  D1385820  10204130  20004150
00081B25  5020D1E4  5030D1E8  58201024  41302000  41500008  1B255020
D1A85030  D1AC5820  10284130  20004150  E2E6C9E3  F0F0F3F2*
02E3E7E3  4000063C  40400038  40400001  00081B25  5020D1B0  5030D1B4
5820102C  41302000  41500008  1B255020  D1D45030  D1D85820  10304130
20004150  00081B25  5020D1DC  5030D1E0  E2E6C9E3  F0F0F3F3*
02E3E7E3  40000674  40400038  40400001  58201034  41302000  41500008
1B255020  D1C85030  D1CC5820  104C4130  20004150  00081B25  5020D1B8
5030D1BC  58201050  41302000  41500008  E2E6C9E3  F0F0F3F4*
02E3E7E3  400006AC  4040000E  40400001  1B255020  D1C05030  D1C447F0
D1F04040  40404040  40404040  40404040  40404040  40404040  40404040
40404040  40404040  40404040  40404040  E2E6C9E3  F0F0F3F5*
02E3E7E3  40000020  4040000C  40400001  00000592  00000028  000004F6
```

```
40404040  40404040  40404040  40404040  40404040  40404040  40404040
40404040  40404040  40404040  40404040  E2E6C9E3  F0F0F3F6*
02E3E7E3  40000084  4040000C  40400001  00000160  00000100  00000110
40404040  40404040  40404040  40404040  40404040  40404040  40404040
40404040  40404040  40404040  40404040  E2E6C9E3  F0F0F3F7*
02D9D3C4  40404040  40400038  40404040  00020001  1C0001F8  00030001
1C000214  00010001  0C000020  00010001  0C000024  00010001  0C000028
00010001  0C000084  00010001  0C000088  E2E6C9E3  F0F0F3F8*
02E3E7E3  40000090  40400008  40400001  00000120  80000130  40404040
40404040  40404040  40404040  40404040  40404040  40404040  40404040

MEMBER NAME  SWITCH
40404040  40404040  40404040  40404040  E2E6C9E3  F0F0F3F9*
02E3E7E3  400000A8  40400014  40400001  00000160  00000108  00000118
00000128  80000138  40404040  40404040  40404040  40404040  40404040
40404040  40404040  40404040  40404040  E2E6C9E3  F0F0F4F0**
02D9D3C4  40404040  40400038  40404040  00010001  0C00008C  00010001
0C000090  00010001  0C000094  00010001  0C0000A8  00010001  0C0000AC
00010001  0C0000B0  00010001  0C0000B4  E2E6C9E3  F0F0F4F1*
02E3E7E3  400000C4  40400004  40400001  80000140  40404040  40404040
40404040  40404040  40404040  40404040  40404040  40404040  40404040
40404040  40404040  40404040  40404040  E2E6C9E3  F0F0F4F2*
02D9D3C4  40404040  40400010  40404040  00010001  0C0000B8  00010001
0C0000C4  40404040  40404040  40404040  40404040  40404040  40404040
40404040  40404040  40404040  40404040  E2E6C9E3  F0F0F4F3*
02C5D5C4  40404040  40404040  40404040  40404040  40404040  40404040
000006BA  F1F5F7F3  F460C6D6  F34040F0  F2F0F2F8  F7F0F9F8  40F0F84B
F4F54BF0  F3404040  E2E6C9E3  C3C84040  E2E6C9E3  F0F0F4F4**

MEMBER NAME  TXTNFO
02C5E2C4  40404040  40400010  40400001  E3E7E3D5  C6D64040  00000000
40000000  40404040  40404040  40404040  40404040  40404040  40404040
40404040  40404040  40404040  40404040  E3E7E3D5  F0F0F0F1*
02E3E7E3  40000000  40400038  40400001  47F0F00C  07E3E7E3  D5C6D640
90ECD00C  184D98CD  F0205040  D00450D0  400807FC  40404040  40404040
021A2E40  C5D9D9D6  D97A40C9  D540C2C3  E3E7E3D5  F0F0F0F2*
02E3E7E3  40000038  40400022  40400001  E2D3C9C2  40D9D6E4  E3C9D5C5
40C9D540  E3E7E3D5  C6D640E2  E4C2D9D6  E4E3C9D5  C5224040  40404040
40404040  40404040  40404040  40404040  E3E7E3D5  F0F0F0F3*
02E3E7E3  40000060  40400008  40400001  6B404040  40404040  40404040
40404040  40404040  40404040  40404040  40404040  40404040  40404040
40404040  40404040  40404040  40404040  E3E7E3D5  F0F0F0F4*
02C5E2C4  40404040  40400010  40400002  C6D3E340  40404040  02000000
40000000  40404040  40404040  40404040  40404040  40404040  40404040
40404040  40404040  40404040  40404040  E3E7E3D5  F0F0F0F5*
02E3E7E3  40000100  40400018  40400001  00000000  00000000  00000001
00000002  00000000  00000000  40404040  40404040  40404040  40404040
40404040  40404040  40404040  40404040  E3E7E3D5  F0F0F0F6*
02C5E2C4  40404040  40400010  40400003  C9E2D9C3  C8404040  02000000
40000000  40404040  40404040  40404040  40404040  40404040  40404040
40404040  40404040  40404040  40404040  E3E7E3D5  F0F0F0F7*
02E3E7E3  40000180  40400008  40400001  00000000  00000000  40404040
40404040  40404040  40404040  40404040  40404040  40404040  40404040
40404040  40404040  40404040  40404040  E3E7E3D5  F0F0F0F8*
02C5E2C4  40404040  40400010  40400004  C3D4D7D9  E2E24040  02000000
40000000  40404040  40404040  40404040  40404040  40404040  40404040
40404040  40404040  40404040  40404040  E3E7E3D5  F0F0F0F9*
02E3E7E3  4000018C  40400008  40400001  00000000  00000000  40404040
40404040  40404040  40404040  40404040  40404040  40404040  40404040
```

```
40404040  40404040  40404040  40404040  E3E7E3D5  F0F0F1F0**
02C5E2C4  40404040  40400010  40400005  C9C2C3D6  D47B4040  02000000
40000000  40404040  40404040  40404040  40404040  40404040  40404040
40404040  40404040  40404040  40404040  E3E7E3D5  F0F0F1F1*
02E3E7E3  40000198  40400038  40400001  00000000  00000000  58A0D128
58B0D11C  58F0D130  4110D05C  05EF41E0  000415FE  4720D15A  58EFD04C
07FE47F0  D16841F0  000458E0  D00007FE  E3E7E3D5  F0F0F1F2*
02E3E7E3  400001D0  40400038  40400001  58F0D124  4110D06C  05EF41E0
000415FE  4720D182  58EFD054  07FE5800  D0B01200  4770D196  41F00004
58E0D000  07FE5800  D0B05B00  D0A05000  E3E7E3D5  F0F0F1F3*
02E3E7E3  40000208  40400038  40400001  D0B858F0  D1184110  D08005EF
7800D0C0  32004770  D1C041F0  000458E0  D00007FE  7800D0C0  7000A004
5820D0BC  5B20D0B0  5020D0B4  4770D1E2  E3E7E3D5  F0F0F1F4*
02E3E7E3  40000240  40400038  40400001  41F00004  58E0D000  07FE58E0
D0B0410E  D0CC5000  D08C58F0  D1184110  D08C05EF  7800D0C0  32004770
D20C41F0  000458E0  D00007FE  7820D0C0  E3E7E3D5  F0F0F1F5*
02E3E7E3  40000278  40400038  40400001  30227020  A0081BFF  58E0D000
07FE58F0  D1341800  45E0F004  00000006  00000028  45E0F010  41F00004
58E0D000  07FE58A0  D00458E0  A00C58B0  E3E7E3D5  F0F0F1F6*
02E3E7E3  400002B0  40400038  40400001  A0185810  B0045820  D0C45020
100018DA  92FFA00C  982CA01C  07FE9878  10045820  70005020  D0C45820
10004130  20004150  00011B25  5020D11C  E3E7E3D5  F0F0F1F7*
02E3E7E3  400002E8  40400022  40400001  5030D120  5030D05C  58201008
41302000  41500004  1B255020  D1285030  D12C47F0  D1384040  40404040
40404040  40404040  40404040  40404040  E3E7E3D5  F0F0F1F8*
02E3E7E3  40000020  40400008  40400001  000002CA  00000068  40404040
40404040  40404040  40404040  40404040  40404040  40404040  40404040
40404040  40404040  40404040  40404040  E3E7E3D5  F0F0F1F9*
02E3E7E3  40000068  40400004  40400001  000002A6  40404040  40404040

MEMBER NAME  TXTNFO
40404040  40404040  40404040  40404040  40404040  40404040  40404040
40404040  40404040  40404040  40404040  E3E7E3D5  F0F0F2F0**
02D9D3C4  40404040  40400038  40404040  00020001  1C000180  00030001
1C00018C  00040001  1C000198  00050001  1C00019C  00010001  0C000294
00010001  0C000020  00010001  0C000024  E3E7E3D5  F0F0F2F1*
02E3E7E3  400000B4  40400010  40400001  000001C2  000001C6  000001EA
00000286  40404040  40404040  40404040  40404040  40404040  40404040
40404040  40404040  40404040  40404040  E3E7E3D5  F0F0F2F2*
02E3E7E3  400000C8  4040000C  40400001  0000012C  00000134  80000124
40404040  40404040  40404040  40404040  40404040  40404040  40404040
40404040  40404040  40404040  40404040  E3E7E3D5  F0F0F2F3*
02D9D3C4  40404040  40400038  40404040  00010001  0C000068  00010001
0C0000B4  00010001  0C0000B8  00010001  0C0000BC  00010001  0C0000C0
00010001  0C0000C8  00010001  0C0000CC  E3E7E3D5  F0F0F2F4*
02E3E7E3  400000D4  4040001C  40400001  00000134  00000108  00000124
00000060  80000118  00000134  00000120  40404040  40404040  40404040
40404040  40404040  40404040  40404040  E3E7E3D5  F0F0F2F5*
02D9D3C4  40404040  40400038  40404040  00010001  0C0000D0  00010001
0C0000D4  00010001  0C0000D8  00010001  0C0000DC  00010001  0C0000E0
00010001  0C0000E4  00010001  0C0000E8  E3E7E3D5  F0F0F2F6*
02E3E7E3  400000F0  40400004  40400001  80000128  40404040  40404040
40404040  40404040  40404040  40404040  40404040  40404040  40404040
40404040  40404040  40404040  40404040  E3E7E3D5  F0F0F2F7*
02E3E7E3  400000F8  40400008  40400001  0000011C  80000128  40404040
40404040  40404040  40404040  40404040  40404040  40404040  40404040
40404040  40404040  40404040  40404040  E3E7E3D5  F0F0F2F8*
02D9D3C4  40404040  40400020  40404040  00010001  0C0000EC  00010001
0C0000F0  00010001  0C0000F8  00010001  0C0000FC  40404040  40404040
```

```
40404040  40404040  40404040  40404040  E3E7E3D5  F0F0F2F9*
02C5D5C4  40404040  40404040  40404040  40404040  40404040  40404040
0000030A  F1F5F7F3  F460C6D6  F34040F0  F2F0F2F8  F7F0F9F8  40F0F84B
F4F54BF0  F8404040  E3E7E3D5  C6D64040  E3E7E3D5  F0F0F3F0**

MEMBER NAME  UNIT
02C5E2C4  40404040  40400010  40400001  E4D5C9E3  40404040  00000000
40000000  40404040  40404040  40404040  40404040  40404040  40404040
40404040  40404040  40404040  40404040  E4D5C9E3  F0F0F0F1*
02E3E7E3  40000000  40400028  40400001  47F0F00C  07E4D5C9  E3404040
90ECD00C  184D98CD  F0205040  D00450D0  400807FC  40404040  40404040
40404040  40404040  40404040  40404040  E4D5C9E3  F0F0F0F2*
02C5E2C4  40404040  40400010  40400002  E2D8D9E3  40404040  02000000
40000000  40404040  40404040  40404040  40404040  40404040  40404040
40404040  40404040  40404040  40404040  E4D5C9E3  F0F0F0F3*
02E3E7E3  40000078  4040000C  40400001  00000002  00000000  00000000
40404040  40404040  40404040  40404040  40404040  40404040  40404040
40404040  40404040  40404040  40404040  E4D5C9E3  F0F0F0F4*
02E3E7E3  400000A0  40400004  40400001  00000000  40404040  40404040
40404040  40404040  40404040  40404040  40404040  40404040  40404040
40404040  40404040  40404040  40404040  E4D5C9E3  F0F0F0F5*
02E3E7E3  400000AC  40400038  40400001  7820D05C  3C227840  D0603C44
3A247840  D0643C44  3A247020  D07C58F0  D0784110  D04C05EF  7000D080
7800D05C  7D00D080  7000D05C  7800D060  E4D5C9E3  F0F0F0F6*
02E3E7E3  400000E4  40400038  40400001  7D00D080  7000D060  7800D064
7D00D080  7000D064  1BFF58E0  D00007FE  58A0D004  58E0A00C  58B0A018
5810B000  7820D05C  70201000  5820B004  E4D5C9E3  F0F0F0F7*
02E3E7E3  4000011C  40400038  40400001  7840D060  70402000  5830B008
7860D064  70603000  18DA92FF  A00C982C  A01C07FE  98791000  78207000
7020D05C  78208000  7020D060  78209000  E4D5C9E3  F0F0F0F8*
02E3E7E3  40000154  40400008  40400001  7020D064  47F0D084  40404040
40404040  40404040  40404040  40404040  40404040  40404040  40404040
40404040  40404040  40404040  40404040  E4D5C9E3  F0F0F0F9*
02E3E7E3  40000020  4040000C  40400001  0000013C  00000028  00000100
40404040  40404040  40404040  40404040  40404040  40404040  40404040
40404040  40404040  40404040  40404040  E4D5C9E3  F0F0F1F0**
02E3E7E3  40000074  40400004  40400001  800000A4  40404040  40404040
40404040  40404040  40404040  40404040  40404040  40404040  40404040
40404040  40404040  40404040  40404040  E4D5C9E3  F0F0F1F1*
02E3E7E3  400000A4  40400008  40400001  00000000  00000000  40404040
40404040  40404040  40404040  40404040  40404040  40404040  40404040
40404040  40404040  40404040  40404040  E4D5C9E3  F0F0F1F2*
02D9D3C4  40404040  40400028  40404040  00020001  1C0000A0  00010001
0C000020  00010001  0C000024  00010001  0C000028  00010001  0C000074
40404040  40404040  40404040  40404040  E4D5C9E3  F0F0F1F3*
02C5D5C4  40404040  40404040  40404040  40404040  40404040  40404040
0000015C  F1F5F7F3  F460C6D6  F34040F0  F2F0F2F8  F7F0F9F8  40F0F84B
F4F54BF1  F2404040  E4D5C9E3  40404040  E4D5C9E3  F0F0F1F4**

MEMBER NAME  UNITD
02C5E2C4  40404040  40400010  40400001  E4D5C9E3  C4404040  00000000
40000000  40404040  40404040  40404040  40404040  40404040  40404040
40404040  40404040  40404040  40404040  E4D5C9E3  F0F0F0F1*
02E3E7E3  40000000  40400028  40400001  47F0F00C  07E4D5C9  E3C44040
90ECD00C  184D98CD  F0205040  D00450D0  400807FC  40404040  40404040
40404040  40404040  40404040  40404040  E4D5C9E3  F0F0F0F2*
02C5E2C4  40404040  40400010  40400002  C4E2D8D9  E3404040  02000000
40000000  40404040  40404040  40404040  40404040  40404040  40404040
40404040  40404040  40404040  40404040  E4D5C9E3  F0F0F0F3*
```

```
02E3E7E3  40000078  40400014  40400001  00000000  00000000  00000002
00000000  00000000  40404040  40404040  40404040  40404040  40404040
40404040  40404040  40404040  40404040  E4D5C9E3  F0F0F0F4*
02E3E7E3  400000B8  40400004  40400001  00000000  40404040  40404040
40404040  40404040  40404040  40404040  40404040  40404040  40404040
40404040  40404040  40404040  40404040  E4D5C9E3  F0F0F0F5*
02E3E7E3  400000D4  40400038  40400001  6800D050  6000D078  6820D068
2C226840  D0702C44  2A246840  D0782C44  2A246020  D09858F0  D0904110
D04C05EF  6000D0A0  6800D068  6D00D0A0  E4D5C9E3  F0F0F0F6*
02E3E7E3  4000010C  40400038  40400001  6000D068  6800D070  6D00D0A0
6000D070  6800D078  6D00D0A0  6000D078  1BFF58E0  D00007FE  58A0D004
58E0A00C  58B0A018  5810B000  6820D068  E4D5C9E3  F0F0F0F7*
02E3E7E3  40000144  40400038  40400001  60201000  5820B004  6840D070
60402000  5830B008  6860D078  60603000  18DA92FF  A00C982C  A01C07FE
98791000  68207000  6020D068  68208000  E4D5C9E3  F0F0F0F8*
02E3E7E3  4000017C  40400010  40400001  6020D070  68209000  6020D078
47F0D0AC  40404040  40404040  40404040  40404040  40404040  40404040
40404040  40404040  40404040  40404040  E4D5C9E3  F0F0F0F9*
02E3E7E3  40000020  4040000C  40400001  0000016C  00000028  00000130
40404040  40404040  40404040  40404040  40404040  40404040  40404040
40404040  40404040  40404040  40404040  E4D5C9E3  F0F0F1F0**
02E3E7E3  40000074  40400004  40400001  800000C0  40404040  40404040
40404040  40404040  40404040  40404040  40404040  40404040  40404040
40404040  40404040  40404040  40404040  E4D5C9E3  F0F0F1F1*
02E3E7E3  400000BC  40400018  40400001  00000000  00000000  00000000
00000000  00000000  00000000  40404040  40404040  40404040  40404040
40404040  40404040  40404040  40404040  E4D5C9E3  F0F0F1F2*
02D9D3C4  40404040  40400028  40404040  00020001  1C0000B8  00010001
0C000020  00010001  0C000024  00010001  0C000028  00010001  0C000074
40404040  40404040  40404040  40404040  E4D5C9E3  F0F0F1F3*
02C5D5C4  40404040  40404040  40404040  40404040  40404040  40404040
0000018C  F1F5F7F3  F460C6D6  F34040F0  F2F0F2F8  F7F0F9F8  40F0F84B
F4F54BF1  F5404040  E4D5C9E3  C4404040  E4D5C9E3  F0F0F1F4**

MEMBER NAME  UPDTE1
02C5E2C4  40404040  40400010  40400001  E4D7C4E3  C5F14040  00000000
40000000  40404040  40404040  40404040  40404040  40404040  40404040
40404040  40404040  40404040  40404040  E4D7C4E3  F0F0F0F1*
02E3E7E3  40000000  40400038  40400001  47F0F00C  07E4D7C4  E3C5F140
90ECD00C  184D98CD  F0205040  D00450D0  400807FC  40404040  40404040
021A2240  E4D7C4E3  C5F16B40  E2C5C3E3  E4D7C4E3  F0F0F0F2*
02E3E7E3  40000038  40400016  40400001  C9D6D540  C5D3C5D4  C5D5E340
D5D6E340  C6D6E4D5  C4224040  40404040  40404040  40404040  40404040
40404040  40404040  40404040  40404040  E4D7C4E3  F0F0F0F3*
02E3E7E3  400000B0  4040001C  40400001  00000000  00000001  00000002
00000005  0000000E  00000000  00000000  40404040  40404040  40404040
40404040  40404040  40404040  40404040  E4D7C4E3  F0F0F0F4*
02E3E7E3  40000108  40400004  40400001  00000000  40404040  40404040
40404040  40404040  40404040  40404040  40404040  40404040  40404040
40404040  40404040  40404040  40404040  E4D7C4E3  F0F0F0F5*
02C5E2C4  40404040  40400010  40400002  C9C2C3D6  D47B4040  02000000
40000000  40404040  40404040  40404040  40404040  40404040  40404040
40404040  40404040  40404040  40404040  E4D7C4E3  F0F0F0F6*
02E3E7E3  40000110  40400004  40400001  00000000  40404040  40404040
40404040  40404040  40404040  40404040  40404040  40404040  40404040
40404040  40404040  40404040  40404040  E4D7C4E3  F0F0F0F7*
02C5E2C4  40404040  40400010  40400003  E4D7C4E3  C5F24040  02000000
40000000  40404040  40404040  40404040  40404040  40404040  40404040
40404040  40404040  40404040  40404040  E4D7C4E3  F0F0F0F8*
```

```
02E3E7E3  40000118  40400008  40400001  00000000  00000000  40404040
40404040  40404040  40404040  40404040  40404040  40404040  40404040
40404040  40404040  40404040  40404040  E4D7C4E3  F0F0F0F9*
02E3E7E3  40000124  40400004  40400001  00000000  40404040  40404040
40404040  40404040  40404040  40404040  40404040  40404040  40404040
40404040  40404040  40404040  40404040  E4D7C4E3  F0F0F1F0**
02E3E7E3  4000015C  40400038  40400001  5880D0CC  58A0D0B8  58B0D0C0
5890D064  18295090  D07C1849  5850D0DC  5890D104  58A0D100  18B2587A
80005869  80005970  D0804730  D1525960  E4D7C4E3  F0F0F1F1*
02E3E7E3  40000194  40400038  40400001  D0804750  D15250B0  D07C47F0
D1921AB4  1A951AA5  59B0D084  47C0D132  50B0D07C  58A0D0B8  58B0D0C0
5890D064  58F0D0C8  45E0F004  00000006  E4D7C4E3  F0F0F1F2*
02E3E7E3  400001CC  40400038  40400001  00000028  45E0F010  58F0D0C8
45E0F034  05404040  F1F558A0  D0B858B0  D0C05890  D0645800  D07C5000
D0A45800  D0D85000  D0F05870  D07C5C60  E4D7C4E3  F0F0F1F3*
02E3E7E3  40000204  40400038  40400001  D0DC5830  D0D81A37  58238000
5020D0F4  5800D0E0  5000D0F8  18401A47  58348000  5030D0FC  1B234770
D1E61BFF  58E0D000  07FE5820  D0805B20  E4D7C4E3  F0F0F1F4*
02E3E7E3  4000023C  40400038  40400001  D0F41A29  5020D098  5820D0FC
5B20D0F4  1A295020  D0945850  D0F45C40  D1085820  D0F01A25  4102B000
5000D050  58F0D0D4  4110D04C  05EF1BFF  E4D7C4E3  F0F0F1F5*
02E3E7E3  40000274  40400038  40400001  58E0D000  07FE58A0  D00458E0
A00C58B0  A0185810  B0185820  D0A05020  100018DA  92FFA00C  982CA01C
07FE987B  10085820  70005020  D08C5820  E4D7C4E3  F0F0F1F6*
02E3E7E3  400002AC  40400038  40400001  80005020  D0805820  A0005020
D0845820  B0005020  D0A05820  10004130  20004150  00041B25  5020D0B8
5030D0BC  5030D04C  58201004  41302000  E4D7C4E3  F0F0F1F7*
02E3E7E3  400002E4  40400034  40400001  41500004  1B255C40  D0701B25
5020D0C0  5030D0C4  58201010  41302000  41500004  1B255C40  D06C1B25
5020D0CC  5030D0D0  47F0D10C  40404040  E4D7C4E3  F0F0F1F8*
02E3E7E3  40000020  40400008  40400001  0000029E  00000050  40404040
40404040  40404040  40404040  40404040  40404040  40404040  40404040
40404040  40404040  40404040  40404040  E4D7C4E3  F0F0F1F9*
02E3E7E3  40000050  40400004  40400001  0000027A  40404040  40404040

MEMBER NAME  UPDTE1
40404040  40404040  40404040  40404040  40404040  40404040  40404040
40404040  40404040  40404040  40404040  E4D7C4E3  F0F0F2F0**
02E3E7E3  400000A4  40400008  40400001  000000E4  000000E8  40404040
40404040  40404040  40404040  40404040  40404040  40404040  40404040
40404040  40404040  40404040  40404040  E4D7C4E3  F0F0F2F1*
02D9D3C4  40404040  40400038  40404040  00020001  1C000118  00030001
1C000124  00010001  0C0001CC  00010001  0C000020  00010001  0C000024
00010001  0C000050  00010001  0C0000A4  E4D7C4E3  F0F0F2F2*
02E3E7E3  400000AC  40400004  40400001  800000F0  40404040  40404040
40404040  40404040  40404040  40404040  40404040  40404040  40404040
40404040  40404040  40404040  40404040  E4D7C4E3  F0F0F2F3*
02E3E7E3  40000128  40400034  40400001  00000004  00000014  00000008
00000000  00000000  00000000  00000000  00000000  00000000  00000000
00000018  0000001C  00000038  40404040  E4D7C4E3  F0F0F2F4*
02D9D3C4  40404040  40400010  40404040  00010001  0C0000A8  00010001
0C0000AC  40404040  40404040  40404040  40404040  40404040  40404040
40404040  40404040  40404040  40404040  E4D7C4E3  F0F0F2F5*
02C5D5C4  40404040  40404040  40404040  40404040  40404040  40404040
00000318  F1F5F7F3  F460C6D6  F34040F0  F2F0F2F8  F7F0F9F8  40F0F84B
F4F54BF1  F9404040  E4D7C4E3  C5F14040  E4D7C4E3  F0F0F2F6**

MEMBER NAME  UPDTE2
02C5E2C4  40404040  40400010  40400001  E4D7C4E3  C5F24040  00000000
```

```
40000000  40404040  40404040  40404040  40404040  40404040  40404040
40404040  40404040  40404040  40404040  E4D7C4E3  F0F0F0F1*
02E3E7E3  40000000  40400028  40400001  47F0F00C  07E4D7C4  E3C5F240
90ECD00C  184D98CD  F0205040  D00450D0  400807FC  40404040  40404040
40404040  40404040  40404040  40404040  E4D7C4E3  F0F0F0F2*
02E3E7E3  40000078  40400038  40400001  4E000000  00000000  4E000000
80000000  00000000  00000000  00000001  00000001  00000002  00000003
00000004  00000005  00000006  0000000D  E4D7C4E3  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  E4D7C4E3  F0F0F0F4*
02E3E7E3  400000B0  4040000C  40400001  0000000E  00000000  00000000
40404040  40404040  40404040  40404040  40404040  40404040  40404040
40404040  40404040  40404040  40404040  E4D7C4E3  F0F0F0F5*
02E3E7E3  400000F0  40400008  40400001  00000000  00000000  40404040
40404040  40404040  40404040  40404040  40404040  40404040  40404040
40404040  40404040  40404040  40404040  E4D7C4E3  F0F0F0F6*
02E3E7E3  400000FC  40400004  40400001  00000000  40404040  40404040
40404040  40404040  40404040  40404040  40404040  40404040  40404040
40404040  40404040  40404040  40404040  E4D7C4E3  F0F0F0F7*
02E3E7E3  400001A8  40400038  40400001  58A0D0D4  58B0D0C8  7860B004
5890D0F0  5880D06C  5800D060  5000D0A8  5000D098  5980D0A0  4770D1B0
5800D068  5000D0A8  5800D0A0  5900D0AC  E4D7C4E3  F0F0F0F8*
02E3E7E3  400001E0  40400038  40400001  4770D1C4  5800D068  5000D098
5800D098  1BFF860F  D2F85850  D0A01A58  5050D094  5800D170  5000D104
5090D108  1C495050  D0F858F0  D0CC7840  E4D7C4E3  F0F0F0F9*
02E3E7E3  40000218  40400038  40400001  F0047040  D0FC5820  D1701A25
33447A42  A0003044  5800D174  5000D10C  7820F008  7020D100  5820D174
1A253322  7A22A000  30227020  D0B43946  E4D7C4E3  F0F0F1F0**
02E3E7E3  40000250  40400038  40400001  47A0D232  39264750  D4285800
D1785000  D1101820  5A20D0F8  7842A000  7B40D0FC  30445800  D17C5000
D1181820  5A20D0F8  7822A000  7B20D100  E4D7C4E3  F0F0F1F1*
02E3E7E3  40000288  40400038  40400001  30227020  D0B43946  47A0D272
39264750  D4285800  D0A81BFF  870FD2F8  5850D0AC  5050D094  5C40D108
5050D114  5820D104  1A257842  A0007B40  E4D7C4E3  F0F0F1F2*
02E3E7E3  400002C0  40400038  40400001  D0FC3044  5820D10C  1A257822
A0007B20  D1003022  7020D0B4  394647A0  D2BC3926  4750D606  5820D110
5A20D114  7842A000  7B40D0FC  30445820  E4D7C4E3  F0F0F1F3*
02E3E7E3  400002F8  40400038  40400001  D1185A20  D1147822  A0007B20
D1003022  7020D0B4  394647A0  D2F03926  4750D606  1BFF58E0  D00007FE
5850D0A0  1B585050  D0945800  D1705000  E4D7C4E3  F0F0F1F4*
02E3E7E3  40000330  40400038  40400001  D1285090  D12C1C49  5050D11C
58F0D0CC  7840F004  7040D120  5820D170  1A253344  7A42A000  30445800
D1745000  D1307820  F0087020  D1245820  E4D7C4E3  F0F0F1F5*
02E3E7E3  40000368  40400038  40400001  D1741A25  33227A22  A0003022
7020D0B4  394647A0  D35C3926  4750D606  5800D178  5000D134  18205A20
D11C7842  A0007B40  D1203044  5800D17C  E4D7C4E3  F0F0F1F6*
02E3E7E3  400003A0  40400038  40400001  5000D13C  18205A20  D11C7822
A0007B20  D1243022  7020D0B4  394647A0  D39C3926  4750D606  5800D098
1BFF860F  D3AE1BFF  58E0D000  07FE5080  E4D7C4E3  F0F0F1F7*
02E3E7E3  400003D8  40400038  40400001  D0941858  5C40D12C  5050D138
5820D128  1A257842  A0007B40  D1203044  5820D130  1A257822  A0007B20
D1243022  7020D0B4  394647A0  D3EC3926  E4D7C4E3  F0F0F1F8*
02E3E7E3  40000410  40400038  40400001  4750D428  5820D134  5A20D138
7842A000  7B40D120  30445820  D13C5A20  D1387822  A0007B20  D1243022
7020D0B4  394647A0  D4203926  4750D428  E4D7C4E3  F0F0F1F9*
02E3E7E3  40000448  40400038  40400001  1BFF58E0  D00007FE  5850D094
```

MEMBER NAME  UPDTE2

| | | | | | | |
|---|---|---|---|---|---|---|
| 5050D0A4 | 5820D0EC | 5020D140 | 18395090 | D1441879 | 5C60D0A0 | 5840D0EC |
| 1A477804 | A0003200 | 4780D466 | 1C431A25 | E4D7C4E3 | F0F0F2F0** | |
| 02E3E7E3 | 40000480 | 40400038 | 40400001 | 7822A000 | 7020D154 | 32224770 |
| D55C5850 | D0A05C40 | D1445820 | D1401A25 | 7802A000 | 32004770 | D49A5850 |
| D0A45C40 | D1445820 | D1401A25 | 5020D14C | E4D7C4E3 | F0F0F2F1* | |
| 02E3E7E3 | 400004B8 | 40400038 | 40400001 | 7802A000 | 32004780 | D4F45850 |
| D0A45C40 | D1445820 | D1401A25 | 5020D148 | 7822A000 | 7020D150 | 32224780 |
| D4D25850 | D0A05C40 | D1445820 | D1401A25 | E4D7C4E3 | F0F0F2F2* | |
| 02E3E7E3 | 400004F0 | 40400038 | 40400001 | 7802A000 | 32004780 | D53E5850 |
| D0A05C40 | D1445820 | D1401A25 | 7822A000 | 58E0D148 | 702EA000 | 1BFF58E0 |
| D00007FE | 5800D0B8 | 5700D05C | 5000D054 | E4D7C4E3 | F0F0F2F3* | |
| 02E3E7E3 | 40000528 | 40400038 | 40400001 | 6820D050 | 6B20D058 | 5850D0A0 |
| 5C40D144 | 5820D140 | 1A257022 | A0005800 | D0B85700 | D05C5000 | D0546820 |
| D0506B20 | D05858E0 | D14C702E | A0001BFF | E4D7C4E3 | F0F0F2F4* | |
| 02E3E7E3 | 40000560 | 40400038 | 40400001 | 58E0D000 | 07FE5850 | D0A05C40 |
| D1445820 | D1401A25 | 7800D150 | 7002A000 | 1BFF58E0 | D00007FE | 18295830 |
| D0EC1869 | 18781882 | 58B0D0A4 | 7840D154 | E4D7C4E3 | F0F0F2F5* | |
| 02E3E7E3 | 40000598 | 40400038 | 40400001 | 185B1C46 | 18955A90 | D0EC7869 |
| A0003266 | 4770D59C | 58B0D0C8 | 7860B004 | 5890D0F0 | 5880D06C | 1BFF58E0 |
| D00007FE | 39644780 | D5BA58B0 | D0C87860 | E4D7C4E3 | F0F0F2F6* | |
| 02E3E7E3 | 400005D0 | 40400038 | 40400001 | B0045890 | D0F05880 | D06C1BFF |
| 58E0D000 | 07FE1858 | 5C40D0A0 | 18251A23 | 7962A000 | 4770D5E4 | 58B0D0C8 |
| 7860B004 | 5890D0F0 | 5880D06C | 1BFF58E0 | E4D7C4E3 | F0F0F2F7* | |
| 02E3E7E3 | 40000608 | 40400038 | 40400001 | D00007FE | 18585C40 | D0A01825 |
| 1A237822 | A0007029 | A0001AB7 | 59B0D0AC | 47C0D602 | 18B747F0 | D5705850 |
| D0945050 | D0A45820 | D0EC5020 | D1581839 | E4D7C4E3 | F0F0F2F8* | |
| 02E3E7E3 | 40000640 | 40400038 | 40400001 | 5090D15C | 18795C60 | D0A05840 |
| D0EC1A47 | 7804A000 | 32004780 | D6441C43 | 1A257822 | A0007020 | D16C3222 |
| 4770D73A | 5850D0A0 | 5C40D15C | 5820D158 | E4D7C4E3 | F0F0F2F9* | |
| 02E3E7E3 | 40000678 | 40400038 | 40400001 | 1A257802 | A0003200 | 4770D678 |
| 5850D0A4 | 5C40D15C | 5820D158 | 1A255020 | D1647802 | A0003200 | 4780D6D2 |
| 5850D0A4 | 5C40D15C | 5820D158 | 1A255020 | E4D7C4E3 | F0F0F3F0** | |
| 02E3E7E3 | 400006B0 | 40400038 | 40400001 | D1607822 | A0007020 | D1683222 |
| 4780D6B0 | 5850D0A0 | 5C40D15C | 5820D158 | 1A257802 | A0003200 | 4780D71C |
| 5850D0A0 | 5C40D15C | 5820D158 | 1A257822 | E4D7C4E3 | F0F0F3F1* | |
| 02E3E7E3 | 400006E8 | 40400038 | 40400001 | A00058E0 | D160702E | A0001BFF |
| 58E0D000 | 07FE5800 | D0B85700 | D05C5000 | D0546820 | D0506B20 | D0585850 |
| D0A05C40 | D15C5820 | D1581A25 | 7022A000 | E4D7C4E3 | F0F0F3F2* | |
| 02E3E7E3 | 40000720 | 40400038 | 40400001 | 5800D0B8 | 5700D05C | 5000D054 |
| 6820D050 | 6B20D058 | 58E0D164 | 702EA000 | 1BFF58E0 | D00007FE | 5850D0A0 |
| 5C40D15C | 5820D158 | 1A257800 | D1687002 | E4D7C4E3 | F0F0F3F3* | |
| 02E3E7E3 | 40000758 | 40400038 | 40400001 | A0001BFF | 58E0D000 | 07FE1829 |
| 5830D0EC | 18691878 | 188258B0 | D0A47840 | D16C185B | 1C461895 | 5A90D0EC |
| 7869A000 | 32664770 | D77A58B0 | D0C87860 | E4D7C4E3 | F0F0F3F4* | |
| 02E3E7E3 | 40000790 | 40400038 | 40400001 | B0045890 | D0F05880 | D06C1BFF |
| 58E0D000 | 07FE3964 | 4780D798 | 58B0D0C8 | 7860B004 | 5890D0F0 | 5880D06C |
| 1BFF58E0 | D00007FE | 18585C40 | D0A01825 | E4D7C4E3 | F0F0F3F5* | |
| 02E3E7E3 | 400007C8 | 40400038 | 40400001 | 1A237962 | A0004770 | D7C258B0 |
| D0C87860 | B0045890 | D0F05880 | D06C1BFF | 58E0D000 | 07FE1858 | 5C40D0A0 |
| 18251A23 | 7822A000 | 7029A000 | 1BB7180B | E4D7C4E3 | F0F0F3F6* | |
| 02E3E7E3 | 40000800 | 40400038 | 40400001 | 5700D05C | 5000D054 | 6820D050 |
| 6B20D058 | 32224770 | D7F258B0 | D0AC47F0 | D74E58A0 | D00458E0 | A00C58B0 |
| A0185810 | B0105820 | D0B85020 | 100018DA | E4D7C4E3 | F0F0F3F7* | |
| 02E3E7E3 | 40000838 | 40400038 | 40400001 | 92FFA00C | 982CA01C | 07FE9879 |
| 10085820 | 70005020 | D0AC5820 | 80005020 | D0A05820 | 90005020 | D0B85820 |
| 10004130 | 20004150 | 00041B25 | 5020D0CC | E4D7C4E3 | F0F0F3F8* | |
| 02E3E7E3 | 40000870 | 40400024 | 40400001 | 5030D0D0 | 58201004 | 41302000 |
| 41500004 | 1B255C40 | D0881B25 | 5020D0D4 | 5030D0D8 | 47F0D180 | 40404040 |

```
MEMBER NAME  UPDTE2
40404040  40404040  40404040  40404040  E4D7C4E3  F0F0F3F9*
02E3E7E3  40000020  4040000C  40400001  00000842  00000028  0000081E
40404040  40404040  40404040  40404040  40404040  40404040  40404040
40404040  40404040  40404040  40404040  E4D7C4E3  F0F0F4F0**
02E3E7E3  40000104  40400038  40400001  00000000  00000000  00000000
00000000  00000034  00000038  00000000  00000000  00000000  00000000
00000000  00000000  00000000  00000000  E4D7C4E3  F0F0F4F1*
02E3E7E3  4000013C  40400038  40400001  00000000  00000000  00000000
00000000  00000000  00000000  00000000  00000000  00000000  00000000
00680005  00700006  007C0007  00740008  E4D7C4E3  F0F0F4F2*
02E3E7E3  40000174  40400034  40400001  01200008  0094000A  012C000A
0080000A  022C000C  00000000  0124000C  00000000  00AC000E  0000000C
00000010  00000014  00000018  40404040  E4D7C4E3  F0F0F4F3*
02D9D3C4  40404040  40400020  40404040  00020001  0C0000F0  00010001
0C000020  00010001  0C000024  00010001  0C000028  40404040  40404040
40404040  40404040  40404040  40404040  E4D7C4E3  F0F0F4F4*
02C5D5C4  40404040  40404040  40404040  40404040  40404040  40404040
00000894  F1F5F7F3  F460C6D6  F34040F0  F2F0F2F8  F7F0F9F8  40F0F84B
F5F04BF1  F8404040  E4D7C4E3  C5F24040  E4D7C4E3  F0F0F4F5**

MEMBER NAME  VALUE
02C5E2C4  40404040  40400010  40400001  E5C1D3E4  C5404040  00000000
40000000  40404040  40404040  40404040  40404040  40404040  40404040
40404040  40404040  40404040  40404040  E5C1D3E4  F0F0F0F1*
02E3E7E3  40000000  40400028  40400001  47F0F00C  07E5C1D3  E4C54040
90ECD00C  184D98CD  F0205040  D00450D0  400807FC  40404040  40404040
40404040  40404040  40404040  40404040  E5C1D3E4  F0F0F0F2*
02C5E2C4  40404040  40400010  40400002  C4C9E2E3  40404040  02000000
40000000  40404040  40404040  40404040  40404040  40404040  40404040
40404040  40404040  40404040  40404040  E5C1D3E4  F0F0F0F3*
02E3E7E3  400000A8  40400020  40400001  00000000  00000000  00000000
00000001  00000002  00000003  00000000  00000000  40404040  40404040
40404040  40404040  40404040  40404040  E5C1D3E4  F0F0F0F4*
02C5E2C4  40404040  40400010  40400003  D6C6C6E2  E3404040  02000000
40000000  40404040  40404040  40404040  40404040  40404040  40404040
40404040  40404040  40404040  40404040  E5C1D3E4  F0F0F0F5*
02E3E7E3  40000150  40400008  40400001  00000000  00000000  40404040
40404040  40404040  40404040  40404040  40404040  40404040  40404040
40404040  40404040  40404040  40404040  E5C1D3E4  F0F0F0F6*
02E3E7E3  4000015C  40400008  40400001  00000000  00000000  40404040
40404040  40404040  40404040  40404040  40404040  40404040  40404040
40404040  40404040  40404040  40404040  E5C1D3E4  F0F0F0F7*
02E3E7E3  40000168  40400038  40400001  58A0D12C  58B0D138  6800D080
6000D100  6000D108  6800D110  22004780  D16858F0  D1344110  D04C05EF
6820D0F8  2C226C20  D0F86C20  D0B06840  E5C1D3E4  F0F0F0F8*
02E3E7E3  400001A0  40400038  40400001  D0F82C44  6C40D0C0  2A246840
D0D06C40  D0F82A24  6A20D0E0  6020B008  6820D0F8  2C226C20  D0F86C20
D0B86840  D0F82C44  6C40D0C8  2A246840  E5C1D3E4  F0F0F0F9*
02E3E7E3  400001D8  40400038  40400001  D0D86C40  D0F82A24  6A20D0E8
6020B010  6820D100  6C20D110  6A20B008  6020D118  6820D108  6C20D110
6A20B010  6020D120  58F0D128  4110D070  E5C1D3E4  F0F0F1F0**
02E3E7E3  40000210  40400038  40400001  05EF1BFF  58E0D000  07FE58A0
D00458E0  A00C58B0  A0185810  B0006820  D0B06020  10005820  B0046840
D0C06040  20005830  B0086860  D0D06060  E5C1D3E4  F0F0F1F1*
02E3E7E3  40000248  40400038  40400001  30005840  B0106800  D0B86000
40005850  B0146820  D0C86020  50005860  B0186840  D0D86040  60005870
B0206860  D0F86060  70005880  B0306800  E5C1D3E4  F0F0F1F2*
02E3E7E3  40000280  40400038  40400001  D0F06000  80005890  B0345800
```

| | | | | | | |
|---|---|---|---|---|---|---|
| D0A05000 | 900018DA | 92FFA00C | 982CA01C | 07FE987B | 10006820 | 70006020 |
| D0B06820 | 80006020 | D0C06820 | 90006020 | E5C1D3E4 | F0F0F1F3* | |
| 02E3E7E3 | 400002B8 | 40400038 | 40400001 | D0D06820 | A0006020 | D0E06820 |
| B0006020 | D0B8987B | 10146820 | 70006020 | D0C86820 | 80006020 | D0D86820 |
| 90006020 | D0E86820 | A0006020 | D0F8987A | E5C1D3E4 | F0F0F1F4* | |
| 02E3E7E3 | 400002F0 | 40400038 | 40400001 | 102C6820 | 70006020 | D1106820 |
| 80006020 | D0F05820 | 90005020 | D0A05820 | A0005020 | D0A85820 | 10244130 |
| 20004150 | 00081B25 | 5020D138 | 5030D13C | E5C1D3E4 | F0F0F1F5* | |
| 02E3E7E3 | 40000328 | 4040001E | 40400001 | 58201028 | 41302000 | 41500008 |
| 1B255020 | D12C5030 | D1305030 | D07447F0 | D1404040 | 40404040 | 40404040 |
| 40404040 | 40404040 | 40404040 | 40404040 | E5C1D3E4 | F0F0F1F6* | |
| 02E3E7E3 | 40000020 | 4040000C | 40400001 | 0000029E | 00000028 | 0000021A |
| 40404040 | 40404040 | 40404040 | 40404040 | 40404040 | 40404040 | 40404040 |
| 40404040 | 40404040 | 40404040 | 40404040 | E5C1D3E4 | F0F0F1F7* | |
| 02E3E7E3 | 40000074 | 4040000C | 40400001 | 00000128 | 00000130 | 00000120 |
| 40404040 | 40404040 | 40404040 | 40404040 | 40404040 | 40404040 | 40404040 |
| 40404040 | 40404040 | 40404040 | 40404040 | E5C1D3E4 | F0F0F1F8* | |
| 02D9D3C4 | 40404040 | 40400038 | 40404040 | 00020001 | 1C000150 | 00030001 |
| 1C00015C | 00010001 | 0C000020 | 00010001 | 0C000024 | 00010001 | 0C000028 |
| 00010001 | 0C000074 | 00010001 | 0C000078 | E5C1D3E4 | F0F0F1F9* | |
| 02E3E7E3 | 40000080 | 4040001C | 40400001 | 000000D8 | 000000E8 | 000000F8 |

MEMBER NAME VALUE

| | | | | | | |
|---|---|---|---|---|---|---|
| 000000E0 | 000000F0 | 80000100 | 00000140 | 40404040 | 40404040 | 40404040 |
| 40404040 | 40404040 | 40404040 | 40404040 | E5C1D3E4 | F0F0F2F0** | |
| 02D9D3C4 | 40404040 | 40400038 | 40404040 | 00010001 | 0C00007C | 00010001 |
| 0C000080 | 00010001 | 0C000084 | 00010001 | 0C000088 | 00010001 | 0C00008C |
| 00010001 | 0C000090 | 00010001 | 0C000094 | E5C1D3E4 | F0F0F2F1* | |
| 02E3E7E3 | 400000A0 | 40400008 | 40400001 | 00000118 | 800000C8 | 40404040 |
| 40404040 | 40404040 | 40404040 | 40404040 | 40404040 | 40404040 | 40404040 |
| 40404040 | 40404040 | 40404040 | 40404040 | E5C1D3E4 | F0F0F2F2* | |
| 02D9D3C4 | 40404040 | 40400018 | 40404040 | 00010001 | 0C000098 | 00010001 |
| 0C0000A0 | 00010001 | 0C0000A4 | 40404040 | 40404040 | 40404040 | 40404040 |
| 40404040 | 40404040 | 40404040 | 40404040 | E5C1D3E4 | F0F0F2F3* | |
| 02C5D5C4 | 40404040 | 40404040 | 40404040 | 40404040 | 40404040 | 40404040 |
| 00000346 | F1F5F7F3 | F460C6D6 | F34040F0 | F2F0F2F8 | F7F0F9F8 | 40F0F84B |
| F5F04BF2 | F4404040 | E5C1D3E4 | C5404040 | E5C1D3E4 | F0F0F2F4** | |

MEMBER NAME VDASH

| | | | | | | |
|---|---|---|---|---|---|---|
| 02C5E2C4 | 40404040 | 40400010 | 40400001 | E5C4C1E2 | C8404040 | 00000000 |
| 40000000 | 40404040 | 40404040 | 40404040 | 40404040 | 40404040 | 40404040 |
| 40404040 | 40404040 | 40404040 | 40404040 | E5C4C1E2 | F0F0F0F1* | |
| 02E3E7E3 | 40000000 | 40400038 | 40400001 | 47F0F00C | 07E5C4C1 | E2C84040 |
| 90ECD00C | 184D98CD | F0205040 | D00450D0 | 400807FC | 40404040 | 40404040 |
| 020A0803 | 18010A08 | 0318011A | 05C4C1E2 | E5C4C1E2 | F0F0F0F2* | |
| 02E3E7E3 | 40000038 | 40400038 | 40400001 | C8401003 | 1A1340C8 | C1E240D5 |
| D640D7C1 | C7C540D5 | E4D4C2C5 | D9181422 | 02064814 | 0122020A | 08031801 |
| 0A080318 | 011A05C4 | C1E2C840 | 10031A06 | E5C4C1E2 | F0F0F0F3* | |
| 02E3E7E3 | 40000070 | 40400038 | 40400001 | 40D7C1C7 | C5401002 | 1A1040C1 |
| D3D9C5C1 | C4E840C4 | C5C6C9D5 | C5C41814 | 22020648 | 14012202 | 0A080318 |
| 010A0803 | 18011A05 | C4C1E2C8 | 4010031A | E5C4C1E2 | F0F0F0F4* | |
| 02E3E7E3 | 400000A8 | 4040002A | 40400001 | 2640C4C5 | C6C9D5C5 | C440C1E2 |
| 40C140D3 | C5C6E340 | C1D5C440 | D9C9C7C8 | E340C8C1 | D5C440D7 | C1D9E318 |
| 14224040 | 40404040 | 40404040 | 40404040 | E5C4C1E2 | F0F0F0F5* | |
| 02E3E7E3 | 40000130 | 40400034 | 40400001 | 00000000 | 00000000 | 4F080000 |
| 00000000 | 00000000 | 00000001 | 00000002 | 00000003 | 00000004 | 00000005 |
| 00000048 | 00000000 | 00000000 | 40404040 | E5C4C1E2 | F0F0F0F6* | |
| 02C5E2C4 | 40404040 | 40400010 | 40400002 | D4E5C3C8 | D9404040 | 02000000 |
| 40000000 | 40404040 | 40404040 | 40404040 | 40404040 | 40404040 | 40404040 |

```
40404040  40404040  40404040  40404040  E5C4C1E2  F0F0F0F7*
02E3E7E3  400001E0  40400004  40400001  00000000  40404040  40404040
40404040  40404040  40404040  40404040  40404040  40404040  40404040
40404040  40404040  40404040  40404040  E5C4C1E2  F0F0F0F8*
02C5E2C4  40404040  40400010  40400003  C9C2C3D6  D47B4040  02000000
40000000  40404040  40404040  40404040  40404040  40404040  40404040
40404040  40404040  40404040  40404040  E5C4C1E2  F0F0F0F9*
02E3E7E3  400001E8  40400008  40400001  00000000  00000000  40404040
40404040  40404040  40404040  40404040  40404040  40404040  40404040
40404040  40404040  40404040  40404040  E5C4C1E2  F0F0F1F0**
02E3E7E3  400001F4  40400004  40400001  00000000  40404040  40404040
40404040  40404040  40404040  40404040  40404040  40404040  40404040
40404040  40404040  40404040  40404040  E5C4C1E2  F0F0F1F1*
02E3E7E3  40000184  40400004  40400001  000000C8  40404040  40404040
40404040  40404040  40404040  40404040  40404040  40404040  40404040
40404040  40404040  40404040  40404040  E5C4C1E2  F0F0F1F2*
02E3E7E3  40000190  40400038  40400001  40404040  40404040  40404040
40404040  40404040  40404040  40404040  40404040  40404040  40404040
40404040  40404040  40404040  40404040  E5C4C1E2  F0F0F1F3*
02E3E7E3  400001C8  40400010  40400001  40404040  40404040  40404040
40404040  40404040  40404040  40404040  40404040  40404040  40404040
40404040  40404040  40404040  40404040  E5C4C1E2  F0F0F1F4*
02E3E7E3  40000268  40400038  40400001  5880D114  58B0D06C  50B0D08C
5800D14C  5000D12C  189B58B0  D15058A0  D1085800  D08C1A09  5000D0A0
185B5C40  D08C5050  D18C1835  1A3B7803  E5C4C1E2  F0F0F1F5*
02E3E7E3  400002A0  40400038  40400001  A0003200  4770D29C  5800D0B4
5900D0AC  4750D1E0  47F0D6AE  5800D0B4  1A095000  D0B41870  5C60D080
18371A39  41038000  5000D050  58F0D110  E5C4C1E2  F0F0F1F6*
02E3E7E3  400002D8  40400038  40400001  4110D04C  05EF1865  5A60D14C
2B007806  A0006A00  D0606000  D0585830  D05C1033  5030D098  58F0D11C
45E0F004  00000000  00000028  18355A30  E5C4C1E2  F0F0F1F7*
02E3E7E3  40000310  40400038  40400001  D15C45E0  F0080473  A0001835
5A30D160  45E0F008  0473A000  45E0F008  0450D098  45E0F010  58F0D11C
45E0F000  00000000  00000054  18A958B0  E5C4C1E2  F0F0F1F8*
02E3E7E3  40000348  40400038  40400001  D080185B  5C40D0B4  18391A35
45E0F008  01238000  879AD272  58A0D108  58B0D150  5890D06C  45E0F010
47F0D692  5800D0A0  5900D0A4  4730D692  E5C4C1E2  F0F0F1F9*
02E3E7E3  40000380  40400038  40400001  5800D0A0  5000D090  183B5C20

MEMBER NAME  VDASH
D08C1803  5A00D14C  5000D154  18031A0B  5000D158  18035A00  D15C5000
D1641803  5A00D160  5000D168  18035A00  E5C4C1E2  F0F0F2F0**
02E3E7E3  400003B8  40400038  40400001  D15C5000  D16C5A30  D1605030
D170185B  5C40D0A0  18055A00  D14C5000  D1741805  1A0B5000  D1781835
5A30D15C  5030D17C  18255A20  D1605020  E5C4C1E2  F0F0F2F1*
02E3E7E3  400003F0  40400038  40400001  D1805030  D1845020  D188186B
18A958B0  D0AC5870  D10858E0  D154782E  70007020  D14058E0  D174784E
70007040  D1303924  4770D4DC  58E0D178  E5C4C1E2  F0F0F2F2*
02E3E7E3  40000428  40400038  40400001  782E7000  7020D134  58E0D158
792E7000  4770D644  59B0D0B4  4730D370  47F0D6AE  5800D0B4  1A0A5000
D0B41850  5C40D080  18351A3A  41038000  E5C4C1E2  F0F0F2F3*
02E3E7E3  40000460  40400038  40400001  5000D050  58F0D110  4110D04C
05EF2B00  7800D130  6A00D060  6000D058  5830D05C  10335030  D0982B00
7800D134  6A00D060  6000D058  5800D05C  E5C4C1E2  F0F0F2F4*
02E3E7E3  40000498  40400038  40400001  5000D09C  58F0D11C  45E0F004
00000000  0000005A  5810D17C  45E0F008  04717000  5810D180  45E0F008
04717000  45E0F008  0450D098  45E0F008  E5C4C1E2  F0F0F2F5*
02E3E7E3  400004D0  40400038  40400001  0450D09C  45E0F010  58F0D11C
45E0F000  00000000  0000008D  189A58B0  D080185B  5C40D0B4  18391A35
```

45E0F008 01238000 879AD416 58B0D0AC E5C4C1E2 F0F0F2F6*
02E3E7E3 40000508 40400038 40400001 45E0F010 59B0D0B4 4730D440
47F0D6AE 5800D0B4 1A0A5000 D0B41850 5C40D080 18351A3A 41038000
5000D050 58F0D110 4110D04C 05EF58F0 E5C4C1E2 F0F0F2F7*
02E3E7E3 40000540 40400038 40400001 D11C1800 45E0F004 00000000
0000005A 5810D164 45E0F008 04717000 5810D168 45E0F008 04717000
45E0F008 0450D098 45E0F008 0450D09C E5C4C1E2 F0F0F2F8*
02E3E7E3 40000578 40400014 40400001 45E0F010 58F0D11C 45E0F000
00000000 0000008D 40404040 40404040 40404040 40404040 40404040
40404040 40404040 40404040 40404040 E5C4C1E2 F0F0F2F9*
02D9D3C4 40404040 40400038 40404040 00020001 1C0001E8 00030001
1C0001F4 00010001 0C000308 00010001 0C000340 00010001 0C0004A8
00010001 0C0004E4 00010001 0C00054C E5C4C1E2 F0F0F3F0**
02E3E7E3 4000058C 40400038 40400001 189A58B0 D080185B 5C40D0B4
18391A35 45E0F008 01238000 879AD4BA 58B0D0AC 45E0F010 47F0D644
2B007800 D1306A00 D0606000 D0585830 E5C4C1E2 F0F0F3F1*
02E3E7E3 400005C4 40400038 40400001 D05C1033 5030D098 2B007800
D1406A00 D0606000 D0585840 D05C1044 19344770 D64459B0 D0B44730
D51A47F0 D6AE5800 D0B41A0A 5000D0B4 E5C4C1E2 F0F0F3F2*
02E3E7E3 400005FC 40400038 40400001 18505C40 D0801835 1A3A4103
80005000 D05058F0 D1104110 D04C05EF 58F0D11C 45E0F004 00000000
00000093 5810D184 45E0F008 04717000 E5C4C1E2 F0F0F3F3*
02E3E7E3 40000634 40400038 40400001 5810D188 45E0F008 04717000
45E0F008 0450D098 45E0F010 58F0D11C 45E0F000 00000000 0000008D
189A58B0 D080185B 5C40D0B4 18391A35 E5C4C1E2 F0F0F3F4*
02E3E7E3 4000066C 40400038 40400001 45E0F008 01238000 879AD58A
58B0D0AC 45E0F010 59B0D0B4 4730D5B4 47F0D6AE 5800D0B4 1A0A5000
D0B41850 5C40D080 18351A3A 41038000 E5C4C1E2 F0F0F3F5*
02E3E7E3 400006A4 40400038 40400001 5000D050 58F0D110 4110D04C
05EF58F0 D11C1800 45E0F004 00000000 00000093 5810D16C 45E0F008
04717000 5810D170 45E0F008 04717000 E5C4C1E2 F0F0F3F6*
02E3E7E3 400006DC 40400038 40400001 45E0F008 0450D098 45E0F010
58F0D11C 45E0F000 00000000 0000008D 189A58B0 D080185B 5C40D0B4
18391A35 45E0F008 01238000 879AD626 E5C4C1E2 F0F0F3F7*
02E3E7E3 40000714 40400038 40400001 58B0D0AC 45E0F010 5820D090
1A2A5020 D0905800 D1881A06 5000D188 5800D184 1A065000 D1845800
D1801A06 5000D180 5800D17C 1A065000 E5C4C1E2 F0F0F3F8*
02E3E7E3 4000074C 40400038 40400001 D17C5800 D1781A06 5000D178
5800D174 1A065000 D1745920 D0A447C0 D32E58A0 D10858B0 D1505890

MEMBER NAME VDASH
D06C5800 D0A05000 D08C5900 D0A447C0 E5C4C1E2 F0F0F3F9*
02E3E7E3 40000784 40400038 40400001 D1AE58B0 D06C1BFF 58E0D000
07FE58A0 D00458E0 A00C58B0 A0185810 B00C5820 D0B45020 100018DA
92FFA00C 982CA01C 07FE9879 10045820 E5C4C1E2 F0F0F4F0**
02E3E7E3 400007BC 40400038 40400001 70005020 D0A45820 90005020
D0B45820 10004130 20004150 00041B25 5C40D07C 1B255020 D1085030
D10C5820 10084130 20004150 00011B25 E5C4C1E2 F0F0F4F1*
02E3E7E3 400007F4 40400012 40400001 5C40D080 1B255020 D1145030
D11847F0 D1904040 40404040 40404040 40404040 40404040 40404040
40404040 40404040 40404040 40404040 E5C4C1E2 F0F0F4F2*
02E3E7E3 40000020 40400008 40400001 000007B6 000000D8 40404040
40404040 40404040 40404040 40404040 40404040 40404040 40404040
40404040 40404040 40404040 40404040 E5C4C1E2 F0F0F4F3*
02E3E7E3 400000D8 40400004 40400001 00000792 40404040 40404040
40404040 40404040 40404040 40404040 40404040 40404040 40404040
40404040 40404040 40404040 40404040 E5C4C1E2 F0F0F4F4*
02D9D3C4 40404040 40400038 40404040 00010001 0C000588 00010001
0C000624 00010001 0C000658 00010001 0C0006C0 00010001 0C0006F4

| | | | | | | |
|---|---|---|---|---|---|---|
| 00010001 | 0C000020 | 00010001 | 0C000024 | E5C4C1E2 | F0F0F4F5* | |
| 02E3E7E3 | 40000124 | 40400004 | 40400001 | 00000158 | 40404040 | 40404040 |
| 40404040 | 40404040 | 40404040 | 40404040 | 40404040 | 40404040 | 40404040 |
| 40404040 | 40404040 | 40404040 | 40404040 | E5C4C1E2 | F0F0F4F6* | |
| 02E3E7E3 | 4000012C | 40400004 | 40400001 | 80000190 | 40404040 | 40404040 |
| 40404040 | 40404040 | 40404040 | 40404040 | 40404040 | 40404040 | 40404040 |
| 40404040 | 40404040 | 40404040 | 40404040 | E5C4C1E2 | F0F0F4F7* | |
| 02E3E7E3 | 400001F8 | 40400038 | 40400001 | 00000000 | 00000000 | 00000000 |
| 00000000 | 00000000 | 00000000 | 00000000 | 00000000 | 00000000 | 00000000 |
| 00000000 | 00000008 | 00000014 | 00000000 | E5C4C1E2 | F0F0F4F8* | |
| 02E3E7E3 | 40000230 | 40400038 | 40400001 | 00000000 | 0000000C | 00000010 |
| 00000000 | 00000000 | 00000000 | 006C0007 | 01100007 | 00000000 | 010C0008 |
| 00740008 | 00C40009 | 00C80009 | 00000000 | E5C4C1E2 | F0F0F4F9* | |
| 02D9D3C4 | 40404040 | 40400018 | 40404040 | 00010001 | 0C0000D8 | 00010001 |
| 0C000124 | 00010001 | 0C00012C | 40404040 | 40404040 | 40404040 | 40404040 |
| 40404040 | 40404040 | 40404040 | 40404040 | E5C4C1E2 | F0F0F5F0** | |
| 02C5D5C4 | 40404040 | 40404040 | 40404040 | 40404040 | 40404040 | 40404040 |
| 00000806 | F1F5F7F3 | F460C6D6 | F34040F0 | F2F0F2F8 | F7F0F9F8 | 40F0F84B |
| F5F04BF2 | F9404040 | E5C4C1E2 | C8404040 | E5C4C1E2 | F0F0F5F1** | |

MEMBER NAME VERIFY

| | | | | | | |
|---|---|---|---|---|---|---|
| 02C5E2C4 | 40404040 | 40400010 | 40400001 | E5C5D9C9 | C6E84040 | 00000000 |
| 40000000 | 40404040 | 40404040 | 40404040 | 40404040 | 40404040 | 40404040 |
| 40404040 | 40404040 | 40404040 | 40404040 | E5C5D9C9 | F0F0F0F1* | |
| 02E3E7E3 | 40000000 | 40400038 | 40400001 | 47F0F00C | 07E5C5D9 | C9C6E840 |
| 90ECD00C | 184D98CD | F0205040 | D00450D0 | 400807FC | 40404040 | 40404040 |
| 02100418 | 050A0903 | 18020A09 | 03220206 | E5C5D9C9 | F0F0F0F2* | |
| 02E3E7E3 | 40000038 | 40400038 | 40400001 | 1D140122 | 021A2F40 | E3C8C540 |
| C5D5C440 | D6C640E3 | C8C540C1 | D9D9D6E6 | 40C8C5C1 | C440C9E2 | 40D5D6E3 |
| 40D6D540 | C1D540C5 | D3C5D4C5 | D5E31A06 | E5C5D9C9 | F0F0F0F3* | |
| 02E3E7E3 | 40000070 | 4040000C | 40400001 | 40E7E840 | 7E400602 | 0A0C0522 |
| 40404040 | 40404040 | 40404040 | 40404040 | 40404040 | 40404040 | 40404040 |
| 40404040 | 40404040 | 40404040 | 40404040 | E5C5D9C9 | F0F0F0F4* | |
| 02E3E7E3 | 40000080 | 40400038 | 40400001 | C1D9D9D6 | E640C8C5 | C1C440C5 |
| D9D9D6D9 | E2404040 | 40404040 | D3C1E8E4 | D7407B40 | 40404040 | 4040E740 |
| 40404040 | 40404040 | 40E84040 | 40404040 | E5C5D9C9 | F0F0F0F5* | |
| 02E3E7E3 | 400003B0 | 40400038 | 40400001 | 00000000 | 00000000 | 4E000000 |
| 00000000 | 4F080000 | 00000000 | 4E000000 | 80000000 | 00000000 | 00000001 |
| 00000002 | 00000003 | 00000004 | 00000005 | E5C5D9C9 | F0F0F0F6* | |
| 02E3E7E3 | 400003E8 | 40400038 | 40400001 | 00000006 | 00000007 | 00000008 |
| 00000009 | 0000000A | 0000000B | 0000000C | 0000000D | 0000000E | 00000011 |
| 00000014 | 00000018 | 0000001A | 0000001D | E5C5D9C9 | F0F0F0F7* | |
| 02E3E7E3 | 40000420 | 40400038 | 40400001 | 0000002C | 00000038 | 0000003A |
| 00000049 | 00000078 | 401DF3B6 | 4029FBE7 | 403EF9DB | 40800000 | 40E04189 |
| 4123CED9 | 4124CCCD | 4125DF3B | 41266666 | E5C5D9C9 | F0F0F0F8* | |
| 02C5E2C4 | 40404040 | 40400010 | 40400002 | C6D8E3C5 | D57B4040 | 02000000 |
| 40000000 | 40404040 | 40404040 | 40404040 | 40404040 | 40404040 | 40404040 |
| 40404040 | 40404040 | 40404040 | 40404040 | E5C5D9C9 | F0F0F0F9* | |
| 02C5E2C4 | 40404040 | 40400010 | 40400003 | C5D3D4E3 | C2D34040 | 05000000 |
| 400D7D28 | 40404040 | 40404040 | 40404040 | 40404040 | 40404040 | 40404040 |
| 40404040 | 40404040 | 40404040 | 40404040 | E5C5D9C9 | F0F0F1F0** | |
| 02E3E7E3 | 40000458 | 40400028 | 40400001 | 4128CCCD | 412A0C4A | 412C0000 |
| 412F525F | 41326666 | 41480000 | 415C353F | 42110000 | 00000000 | 00000000 |
| 40404040 | 40404040 | 40404040 | 40404040 | E5C5D9C9 | F0F0F1F1* | |
| 02C5E2C4 | 40404040 | 40400010 | 40400004 | E2D7D3D7 | E3E24040 | 05000000 |
| 40030D44 | 40404040 | 40404040 | 40404040 | 40404040 | 40404040 | 40404040 |
| 40404040 | 40404040 | 40404040 | 40404040 | E5C5D9C9 | F0F0F1F2* | |
| 02C5E2C4 | 40404040 | 40400010 | 40400005 | D7E3C1C2 | D3C54040 | 05000000 |
| 40125768 | 40404040 | 40404040 | 40404040 | 40404040 | 40404040 | 40404040 |

```
40404040  40404040  40404040  40404040  E5C5D9C9  F0F0F1F3*
02C5E2C4  40404040  40400010  40400006  E3D6D3C5  D9404040  05000000
4000000C  40404040  40404040  40404040  40404040  40404040  40404040
40404040  40404040  40404040  40404040  E5C5D9C9  F0F0F1F4*
02E3E7E3  40000630  40400020  40400001  FFFFFFC8  000CD118  FFFFFFEC
FFFFFFEC  00058600  000B0444  00108298  00000000  40404040  40404040
40404040  40404040  40404040  40404040  E5C5D9C9  F0F0F1F5*
02D9D3C4  40404040  40400038  40404040  00030001  0C000630  00030001
0C000634  00040001  0C000638  00050001  0C00063C  00050001  0C000640
00050001  0C000644  00050001  0C000648  E5C5D9C9  F0F0F1F6*
02C5E2C4  40404040  40400010  40400007  D9D4D6C4  C5D34040  05000000
40000018  40404040  40404040  40404040  40404040  40404040  40404040
40404040  40404040  40404040  40404040  E5C5D9C9  F0F0F1F7*
02C5E2C4  40404040  40400010  40400008  C2E2D6D9  E3404040  02000000
40000000  40404040  40404040  40404040  40404040  40404040  40404040
40404040  40404040  40404040  40404040  E5C5D9C9  F0F0F1F8*
02C5E2C4  40404040  40400010  40400009  D4E5C3C8  D9404040  02000000
40000000  40404040  40404040  40404040  40404040  40404040  40404040
40404040  40404040  40404040  40404040  E5C5D9C9  F0F0F1F9*
02E3E7E3  40000650  4040000C  40400001  FFFFFFFF  00000000  00000000

MEMBER NAME  VERIFY
40404040  40404040  40404040  40404040  40404040  40404040  40404040
40404040  40404040  40404040  40404040  E5C5D9C9  F0F0F2F0**
02C5E2C4  40404040  40400010  4040000A  C3C1C4D3  D5F14040  02000000
40000000  40404040  40404040  40404040  40404040  40404040  40404040
40404040  40404040  40404040  40404040  E5C5D9C9  F0F0F2F1*
02C5E2C4  40404040  40400010  4040000B  C3C1C4E2  E4D74040  02000000
40000000  40404040  40404040  40404040  40404040  40404040  40404040
40404040  40404040  40404040  40404040  E5C5D9C9  F0F0F2F2*
02C5E2C4  40404040  40400010  4040000C  C8C7C4C1  E3C54040  02000000
40000000  40404040  40404040  40404040  40404040  40404040  40404040
40404040  40404040  40404040  40404040  E5C5D9C9  F0F0F2F3*
02C5E2C4  40404040  40400010  4040000D  C8C7E3C9  D4C54040  02000000
40000000  40404040  40404040  40404040  40404040  40404040  40404040
40404040  40404040  40404040  40404040  E5C5D9C9  F0F0F2F4*
02E3E7E3  40000660  40400014  40400001  00000000  00000000  00000000
00000000  00000000  40404040  40404040  40404040  40404040  40404040
40404040  40404040  40404040  40404040  E5C5D9C9  F0F0F2F5*
02D9D3C4  40404040  40400038  40404040  00060001  0C00064C  00070001
0C000650  00080001  1C000654  00090001  1C000660  000A0001  1C000664
000B0001  1C000668  000C0001  1C00066C  E5C5D9C9  F0F0F2F6*
02C5E2C4  40404040  40400010  4040000E  C9C2C3D6  D47B4040  02000000
40000000  40404040  40404040  40404040  40404040  40404040  40404040
40404040  40404040  40404040  40404040  E5C5D9C9  F0F0F2F7*
02C5E2C4  40404040  40400010  4040000F  D7D9D6D1  C1D94040  02000000
40000000  40404040  40404040  40404040  40404040  40404040  40404040
40404040  40404040  40404040  40404040  E5C5D9C9  F0F0F2F8*
02C5E2C4  40404040  40400010  40400010  D7D9D6D1  D3D54040  02000000
40000000  40404040  40404040  40404040  40404040  40404040  40404040
40404040  40404040  40404040  40404040  E5C5D9C9  F0F0F2F9*
02C5E2C4  40404040  40400010  40400011  D7D9D6D1  E2D74040  02000000
40000000  40404040  40404040  40404040  40404040  40404040  40404040
40404040  40404040  40404040  40404040  E5C5D9C9  F0F0F3F0**
02E3E7E3  40000674  40400010  40400001  00000000  00000000  00000000
00000000  40404040  40404040  40404040  40404040  40404040  40404040
40404040  40404040  40404040  40404040  E5C5D9C9  F0F0F3F1*
02E3E7E3  40000528  40400030  40400001  00000003  00000002  C9C94040
C1404040  00000005  00000004  C6D34040  C1404040  00000009  00000004
```

```
C6D34040  C1404040  40404040  40404040  E5C5D9C9  F0F0F3F2*
02E3E7E3  40000568  40400038  40400001  D3C1E8E4  D740C1D9  D9D6E6E2
40D5D6E3  40D6D540  C5D3C5D4  C5D5E3E2  5BE740E8  40C7C9E5  C5D540C9
D540E5C9  C5E640C3  D6D6D9C4  C9D5C1E3  E5C5D9C9  F0F0F3F3*
02E3E7E3  400005A0  40400008  40400001  C5E24040  40404040  40404040
40404040  40404040  40404040  40404040  40404040  40404040  40404040
40404040  40404040  40404040  40404040  E5C5D9C9  F0F0F3F4*
02E3E7E3  400005B0  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  E5C5D9C9  F0F0F3F5*
02E3E7E3  400005E8  40400038  40400001  C45B5BE2  D3C9C340  E5C5D9E2
C9D6D540  E7E74BE7  40404040  40404040  4040C4C1  E3C57A40  E7E761E7
E761E7E7  40404040  4040E3C9  D4C57A40  E5C5D9C9  F0F0F3F6*
02E3E7E3  40000620  40400008  40400001  E7E77AE7  E77AE7E7  40404040
40404040  40404040  40404040  40404040  40404040  40404040  40404040
40404040  40404040  40404040  40404040  E5C5D9C9  F0F0F3F7*
02E3E7E3  400006B4  40400038  40400001  58A0D598  58B0D590  58F0D59C
4110D090  05EF4100  D5405000  D0A858F0  D5A84110  D0A405EF  5800D318
5000D430  7800D390  33007000  D4A87800  E5C5D9C9  F0F0F3F8*
02E3E7E3  400006EC  40400038  40400001  D3947000  D4AC5800  D31C5000
D3C85880  D34858A0  D57C5890  D5785800  D3C85900  B00C47C0  D65E47F0

MEMBER NAME  VERIFY
DD901838  5C20D3C8  5030D5E8  4103B004  E5C5D9C9  F0F0F3F9*
02E3E7E3  40000724  40400038  40400001  5000D0B8  9280D0B8  58F0D5A8
4110D0B0  05EF7823  B0087020  D4A07823  B00C7020  D4A45800  D31C5000
D3D04800  D4684000  D5D85800  D5EC5000  E5C5D9C9  F0F0F4F0**
02E3E7E3  4000075C  40400038  40400001  D5E05800  D3585000  D5E458A0
D36C58B0  D5A058E0  D5E0585E  B0005050  D42C58E0  D5E4580E  B0005000
D4081875  1C6A2B00  78079008  6A00D308  E5C5D9C9  F0F0F4F1*
02E3E7E3  40000794  40400038  40400001  6000D2F8  5820D2FC  4920D5D8
4770D826  18255050  D3CC1C4A  188518A2  58B0D580  5860D57C  2B007808
90046A00  D3086000  D2F85870  D2FC7808  E5C5D9C9  F0F0F4F2*
02E3E7E3  400007CC  40400038  40400001  900C7000  D3D47808  90107000
D3DC7808  90147000  D3D87808  90187000  D3E05970  D31C4770  D75858F0
D5C44110  D0BC05EF  50A0D3CC  41E00008  E5C5D9C9  F0F0F4F3*
02E3E7E3  40000804  40400038  40400001  15FE4720  D75858EF  D04C07FE
5970D324  4770D78A  41089004  5000D0D4  9280D0D4  58F0D5C0  4110D0D0
05EF50A0  D3CC41E0  000415FE  4720D78A  E5C5D9C9  F0F0F4F4*
02E3E7E3  4000083C  40400038  40400001  58EFD058  07FE2B00  7808901C
6A00D308  6000D2F8  5850D2FC  5050D3E8  2B007808  90206A00  D3086000
D2F85800  D2FC5000  D4142B00  78089024  E5C5D9C9  F0F0F4F5*
02E3E7E3  40000874  40400038  40400001  6A00D308  6000D2F8  5830D2FC
5030D3EC  5970D328  4770D812  5C40D358  5C20D368  41089004  5000D0DC
4105B004  5000D0E0  41036004  5000D0E8  E5C5D9C9  F0F0F4F6*
02E3E7E3  400008AC  40400038  40400001  58F0D5C8  4110D0D8  05EF50A0
D3CC41E0  000415FE  4720D812  58EFD060  07FE5A80  D36C5AA0  D31C59A0
D40847C0  D70050A0  D3CC58B0  D5A058A0  E5C5D9C9  F0F0F4F7*
02E3E7E3  400008E4  40400038  40400001  D36C5880  D3485820  D3D05A20
D31C5020  D3D05800  D5E41A08  5000D5E4  5800D5E0  1A085000  D5E05920
D44047C0  D6B658A0  D57C58B0  D5905880  E5C5D9C9  F0F0F4F8*
02E3E7E3  4000091C  40400038  40400001  D34858F0  D5BC1800  45E0F004
00000006  0000003C  45E0F00C  00000558  04700002  45E0F010  5800D430
5A00D31C  5000D430  4800D466  5000D434  E5C5D9C9  F0F0F4F9*
02E3E7E3  40000954  40400010  40400001  58F0D5BC  45E0F004  00000000
00000028  40404040  40404040  40404040  40404040  40404040  40404040
40404040  40404040  40404040  40404040  E5C5D9C9  F0F0F5F0**
02D9D3C4  40404040  40400038  40404040  000D0001  1C000670  000E0001
1C000674  000F0001  1C000678  00100001  1C00067C  00110001  1C000680
```

```
00010001  0C00092C  00010001  0C000934  E5C5D9C9  F0F0F5F1*
02E3E7E3  40000964  40400038  40400001  45E0F008  0450D434  5810D5E8
45E0F008  0471B008  5810D5E8  45E0F008  0471B00C  45E0F010  58F0D5BC
45E0F000  00000000  00000036  45E0F00C  E5C5D9C9  F0F0F5F2*
02E3E7E3  4000099C  40400038  40400001  00000500  0120001E  45E0F010
7820D4AC  7B20D388  7020D4AC  4100D4A8  5000D0F4  4100D4AC  5000D0F8
58F0D5B0  4110D0F4  05EF41E0  000415FE  E5C5D9C9  F0F0F5F3*
02E3E7E3  400009D4  40400038  40400001  4720D926  58EFD068  07FE5830
D3C85A30  D31C5030  D3C85930  B00C47C0  D93E47F0  DD901C28  4103B004
5000D144  9280D144  58F0D5A8  4110D13C  E5C5D9C9  F0F0F5F4*
02E3E7E3  40000A0C  40400038  40400001  05EF7843  B0087B40  D4A03044
7823B00C  7B20D4A4  30227020  D41C58F0  D5947940  F0044730  D99258F0
D5947920  F0044730  D9924820  D4684920  E5C5D9C9  F0F0F5F5*
02E3E7E3  40000A44  40400038  40400001  D46C4780  D92647F0  DD8C58A0
D57C58B0  D5905880  D3485830  90385A30  D31C5030  90381858  5C40D3D0
18251A28  5800D31C  58F0D5A0  5002F000  E5C5D9C9  F0F0F5F6*
02E3E7E3  40000A7C  40400038  40400001  5C20D36C  5870D3CC  5C60D36C
41039004  5000D14C  41079004  5000D150  9280D150  58F0D5A8  4110D148
05EF5830  90385C20  D36C4103  902C5000  E5C5D9C9  F0F0F5F7*
02E3E7E3  40000AB4  40400038  40400001  D15858E0  D5E8410E  B0085000
D15C9280  D15C58F0  D5A84110  D15405EF  4820D466  18025700  D3145000
D3046820  D3006B20  D3105830  90385C20  E5C5D9C9  F0F0F5F8*

MEMBER NAME  VERIFY
02E3E7E3  40000AEC  40400038  40400001  D36C7023  90285800  D3D05700
D3145000  D3046820  D3006B20  D3107023  90345A50  D3285840  D3CC58F0
D5A05B45  F0005A40  D31C1804  5700D314  E5C5D9C9  F0F0F5F9*
02E3E7E3  40000B24  40400038  40400001  5000D304  6820D300  6B20D310
70239038  5850A02C  5A50D31C  5050A02C  2B007807  90246A00  D3086000
D2F85830  D2FC5C40  D3685C20  D3684105  E5C5D9C9  F0F0F6F0**
02E3E7E3  40000B5C  40400038  40400001  A0045000  D1644103  A0045000
D1689280  D16858F0  D5A84110  D16005EF  5800A02C  5700D314  5000D304
6820D300  6B20D310  58309038  5C20D36C  E5C5D9C9  F0F0F6F1*
02E3E7E3  40000B94  40400038  40400001  70239024  5800D404  5700D314
5000D304  6820D300  6B20D310  5830A02C  5C20D368  7023A028  7800D420
7003A02C  7800D4A0  7000D5D0  7800D4A4  E5C5D9C9  F0F0F6F2*
02E3E7E3  40000BCC  40400038  40400001  7000D5D4  5870D31C  5880D5E8
58A0D3C8  5860D594  47F0DBA8  58309038  1A375030  90381853  5C40D36C
1B375C20  D36C4105  90045000  D14C4103  E5C5D9C9  F0F0F6F3*
02E3E7E3  40000C04  40400038  40400001  90045000  D1509280  D15058F0
D5A84110  D14805EF  58309038  5C20D36C  4103902C  5000D158  4108B008
5000D15C  9280D15C  58F0D5A8  4110D154  E5C5D9C9  F0F0F6F4*
02E3E7E3  40000C3C  40400038  40400001  05EF4820  D4661802  5700D314
5000D304  6820D300  6B20D310  58309038  5C20D36C  70239028  1AA75A80
D34859A0  B00C47C0  DBBE50A0  D3C847F0  E5C5D9C9  F0F0F6F5*
02E3E7E3  40000C74  40400038  40400001  DD904108  B0045000  D1449280
D14458F0  D5A84110  D13C05EF  7848B008  7B40D5D0  30447828  B00C7B20
D5D43022  7020D41C  4820D46A  4020D466  E5C5D9C9  F0F0F6F6*
02E3E7E3  40000CAC  40400038  40400001  79406004  47C0DC04  50A0D3C8
47F0DC24  79206004  47C0DC14  50A0D3C8  47F0DC24  4820D468  4920D46C
4780DB2C  50A0D3C8  58A0D57C  5880D348  E5C5D9C9  F0F0F6F7*
02E3E7E3  40000CE4  40400038  40400001  47F0D64E  58A0D57C  58B0D590
5880D348  58709038  5A70D31C  50709038  18585C40  D3D01825  1A285800
D31C58F0  D5A05002  F0005C60  D36C5830  E5C5D9C9  F0F0F6F8*
02E3E7E3  40000D1C  40400038  40400001  D3CC5C20  D36C4107  90045000
D14C4103  90045000  D1509280  D15058F0  D5A84110  D14805EF  58709038
5C60D36C  18385C20  D3C84107  902C5000  E5C5D9C9  F0F0F6F9*
02E3E7E3  40000D54  40400038  40400001  D1584103  B0085000  D15C9280
D15C58F0  D5A84110  D15405EF  4820D466  18025700  D3145000  D3046820
```

```
D3006B20  D3105830  90385C20  D36C7023  E5C5D9C9  F0F0F7F0**
02E3E7E3  40000D8C  40400038  40400001  90285800  D3D05700  D3145000
D3046820  D3006B20  D3107023  90345A50  D3285840  D3CC58F0  D5A05B45
F0005A40  D31C1804  5700D314  5000D304  E5C5D9C9  F0F0F7F1*
02E3E7E3  40000DC4  40400038  40400001  6820D300  6B20D310  70239038
5830D3C8  5A30D31C  5030D3C8  5930B00C  47C0DD30  47F0DD90  1C284103
B0045000  D1449280  D14458F0  D5A84110  E5C5D9C9  F0F0F7F2*
02E3E7E3  40000DFC  40400038  40400001  D13C05EF  7843B008  7B40D4A0
30447823  B00C7B20  D4A43022  7020D41C  4820D46A  4020D466  58F0D594
7940F004  4730DD8C  58F0D594  7920F004  E5C5D9C9  F0F0F7F3*
02E3E7E3  40000E34  40400038  40400001  4730DD8C  4820D468  4920D46C
4780DC30  47F0D64E  58A0D598  58B0D590  5820D430  5A20D320  7800D3A4
33007000  D3F07800  D3A47000  D3F47800  E5C5D9C9  F0F0F7F4*
02E3E7E3  40000E6C  40400038  40400001  D38C3300  7000D3F8  7800D38C
7000D3FC  7800D3A0  7000D424  7800D5F0  7000D428  7800D3B0  7000D400
58F0D5AC  4110D16C  05EF5890  D31C58A0  E5C5D9C9  F0F0F7F5*
02E3E7E3  40000EA4  40400038  40400001  D31C18B2  7800D428  7B00D388
7000D428  58F0D5AC  4110D17C  05EF879A  DDF058A0  D59858B0  D59058F0
D5AC4110  D18C05EF  58F0D5AC  4110D19C  E5C5D9C9  F0F0F7F6*
02E3E7E3  40000EDC  40400038  40400001  05EF58F0  D5AC4110  D1AC05EF
58F0D5AC  4110D1BC  05EF58F0  D5B84110  D1CC05EF  58F0D5B4  4110D1D0
05EF7800  D3B83300  7000D4A0  7800D3B4  E5C5D9C9  F0F0F7F7*
02E3E7E3  40000F14  40400038  40400001  7000D4A4  4100D4A0  5000D1D4

MEMBER NAME  VERIFY
4100D4A4  5000D1D8  58F0D5B0  4110D1D4  05EF41E0  000415FE  4720DE8A
58EFD070  07FE7800  D3983300  7000D4A0  E5C5D9C9  F0F0F7F8*
02E3E7E3  40000F4C  40400038  40400001  7800D3AC  7000D4A4  4100D4A0
5000D21C  4100D4A4  5000D220  58F0D5B0  4110D21C  05EF41E0  000415FE
4720DEC6  58EFD078  07FE7800  D39C3300  E5C5D9C9  F0F0F7F9*
02E3E7E3  40000F84  40400038  40400001  7000D4A0  7800D394  7000D4A4
4100D4A0  5000D264  4100D4A4  5000D268  58F0D5B0  4110D264  05EF41E0
000415FE  4720DF02  58EFD080  07FE58A0  E5C5D9C9  F0F0F8F0**
02E3E7E3  40000FBC  40400038  40400001  D59858B0  D5907800  D3BC3300
7000D5F4  58F0D5B0  4110D2AC  05EF41E0  000415FE  4720DF2E  58EFD088
07FE1BFF  58E0D000  07FE58A0  D00458E0  E5C5D9C9  F0F0F8F1*
02E3E7E3  40000FF4  40400038  40400001  A00C58B0  A0185810  B0085820
D4305020  100018DA  92FFA00C  982CA01C  07FE9878  10045820  70005020
D4405820  80005020  D4305820  10004130  E5C5D9C9  F0F0F8F2*
02E3E7E3  4000102C  4040001A  40400001  20004150  00041B25  5C40D324
1B255020  D5A05030  D5A447F0  D5FC4040  40404040  40404040  40404040
40404040  40404040  40404040  40404040  E5C5D9C9  F0F0F8F3*
02E3E7E3  40000020  40400008  40400001  00001012  000000B8  40404040
40404040  40404040  40404040  40404040  40404040  40404040  40404040
40404040  40404040  40404040  40404040  E5C5D9C9  F0F0F8F4*
02E3E7E3  400000B8  40400004  40400001  00000FEE  40404040  40404040
40404040  40404040  40404040  40404040  40404040  40404040  40404040
40404040  40404040  40404040  40404040  E5C5D9C9  F0F0F8F5*
02E3E7E3  40000104  40400008  40400001  00000810  00000CE8  40404040
40404040  40404040  40404040  40404040  40404040  40404040  40404040
40404040  40404040  40404040  40404040  E5C5D9C9  F0F0F8F6*
02D9D3C4  40404040  40400038  40404040  00010001  0C000960  00010001
0C000994  00010001  0C00099C  00010001  0C000020  00010001  0C000024
00010001  0C0000B8  00010001  0C000104  E5C5D9C9  F0F0F8F7*
02E3E7E3  4000010C  4040001C  40400001  00000810  00000842  00000CE8
000008CA  00000A4E  000009DE  00000FBA  40404040  40404040  40404040
40404040  40404040  40404040  40404040  E5C5D9C9  F0F0F8F8*
02D9D3C4  40404040  40400038  40404040  00010001  0C000108  00010001
0C00010C  00010001  0C000110  00010001  0C000114  00010001  0C000118
```

00010001 0C00011C 00010001 0C000120 E5C5D9C9 F0F0F8F9*
02E3E7E3 40000128 4040001C 40400001 00000F42 00000FBA 00000F7E
00000FBA 00000FBA 00000FBA 00000FE6 40404040 40404040 40404040
40404040 40404040 40404040 40404040 E5C5D9C9 F0F0F9F0**
02D9D3C4 40404040 40400038 40404040 00010001 0C000124 00010001
0C000128 00010001 0C00012C 00010001 0C000130 00010001 0C000134
00010001 0C000138 00010001 0C00013C E5C5D9C9 F0F0F9F1*
02E3E7E3 40000144 4040001C 40400001 00000FE6 00000528 000003DC
001082A8 00000400 801082A4 000003E0 40404040 40404040 40404040
40404040 40404040 40404040 40404040 E5C5D9C9 F0F0F9F2*
02D9D3C4 40404040 40400038 40404040 00010001 0C000140 00010001
0C000144 00010001 0C000148 00010001 0C00014C 00050001 0C000150
00010001 0C000154 00050001 0C000158 E5C5D9C9 F0F0F9F3*
02E3E7E3 40000164 40400020 40400001 80000014 000003E0 0000051E
80000000 00000558 0000048C 00000494 00000490 40404040 40404040
40404040 40404040 40404040 40404040 E5C5D9C9 F0F0F9F4*
02D9D3C4 40404040 40400038 40404040 00010001 0C00015C 00070001
0C000164 00010001 0C000168 00010001 0C00016C 00010001 0C000174
00010001 0C000178 00010001 0C00017C E5C5D9C9 F0F0F9F5*
02E3E7E3 40000184 40400010 40400001 80000498 00000558 80000000
00000558 40404040 40404040 40404040 40404040 40404040 40404040
40404040 40404040 40404040 40404040 E5C5D9C9 F0F0F9F6*
02E3E7E3 4000019C 40400004 40400001 000004CC 40404040 40404040
40404040 40404040 40404040 40404040 40404040 40404040 40404040

MEMBER NAME VERIFY
40404040 40404040 40404040 40404040 E5C5D9C9 F0F0F9F7*
02E3E7E3 400001A4 40400008 40400001 000004BC 800004D8 40404040
40404040 40404040 40404040 40404040 40404040 40404040 40404040
40404040 40404040 40404040 40404040 E5C5D9C9 F0F0F9F8*
02E3E7E3 400001B4 40400004 40400001 000003D0 40404040 40404040
40404040 40404040 40404040 40404040 40404040 40404040 40404040
40404040 40404040 40404040 40404040 E5C5D9C9 F0F0F9F9*
02D9D3C4 40404040 40400038 40404040 00010001 0C000180 00010001
0C000184 00010001 0C000188 00010001 0C000190 00010001 0C00019C
00010001 0C0001A4 00010001 0C0001A8 E5C5D9C9 F0F1F0F0**
02E3E7E3 400001B8 4040001C 40400001 0000041C 00000438 00000434
00000500 000003D0 000003D0 000003D0 40404040 40404040 40404040
40404040 40404040 40404040 40404040 E5C5D9C9 F0F1F0F1*
02D9D3C4 40404040 40400038 40404040 00010001 0C0001B4 00010001
0C0001B8 00010001 0C0001BC 00010001 0C0001C0 00010001 0C0001C4
00010001 0C0001C8 00010001 0C0001CC E5C5D9C9 F0F1F0F2*
02E3E7E3 400001D4 4040001C 40400001 000003D0 000003D4 000003DC
000003D0 000003D0 00000438 0000043C 40404040 40404040 40404040
40404040 40404040 40404040 40404040 E5C5D9C9 F0F1F0F3*
02D9D3C4 40404040 40400038 40404040 00010001 0C0001D0 00010001
0C0001D4 00010001 0C0001D8 00010001 0C0001DC 00010001 0C0001E0
00010001 0C0001E4 00010001 0C0001E8 E5C5D9C9 F0F1F0F4*
02E3E7E3 400001F0 40400014 40400001 800003D0 000003E0 00000522
80000000 00000424 40404040 40404040 40404040 40404040 40404040
40404040 40404040 40404040 40404040 E5C5D9C9 F0F1F0F5*
02E3E7E3 40000208 40400008 40400001 80000000 000003F0 40404040
40404040 40404040 40404040 40404040 40404040 40404040 40404040
40404040 40404040 40404040 40404040 E5C5D9C9 F0F1F0F6*
02E3E7E3 40000214 40400008 40400001 80000000 00000420 40404040
40404040 40404040 40404040 40404040 40404040 40404040 40404040
40404040 40404040 40404040 40404040 E5C5D9C9 F0F1F0F7*
02E3E7E3 40000220 40400008 40400001 80000000 000004A8 40404040
40404040 40404040 40404040 40404040 40404040 40404040 40404040

| | | | | | | |
|---|---|---|---|---|---|---|
| 40404040 | 40404040 | 40404040 | 40404040 | E5C5D9C9 | F0F1F0F8* | |
| 02D9D3C4 | 40404040 | 40400038 | 40404040 | 00010001 | 0C0001EC | 00010001 |
| 0C0001F0 | 00010001 | 0C0001F4 | 00010001 | 0C0001F8 | 00010001 | 0C000200 |
| 00010001 | 0C00020C | 00010001 | 0C000218 | E5C5D9C9 | F0F1F0F9* | |
| 02E3E7E3 | 40000228 | 4040001C | 40400001 | 000004B8 | 000004AC | 800004B8 |
| 000004A8 | 000004E0 | 000004AC | 800004E0 | 40404040 | 40404040 | 40404040 |
| 40404040 | 40404040 | 40404040 | 40404040 | E5C5D9C9 | F0F1F1F0** | |
| 02D9D3C4 | 40404040 | 40400038 | 40404040 | 00010001 | 0C000224 | 00010001 |
| 0C000228 | 00010001 | 0C00022C | 00010001 | 0C000230 | 00010001 | 0C000234 |
| 00010001 | 0C000238 | 00010001 | 0C00023C | E5C5D9C9 | F0F1F1F1* | |
| 02E3E7E3 | 40000244 | 4040001C | 40400001 | 000004A8 | 000004B8 | 000004A8 |
| 800004E0 | 000004AC | 000004B8 | 000004AC | 40404040 | 40404040 | 40404040 |
| 40404040 | 40404040 | 40404040 | 40404040 | E5C5D9C9 | F0F1F1F2* | |
| 02D9D3C4 | 40404040 | 40400038 | 40404040 | 00010001 | 0C000240 | 00010001 |
| 0C000244 | 00010001 | 0C000248 | 00010001 | 0C00024C | 00010001 | 0C000250 |
| 00010001 | 0C000254 | 00010001 | 0C000258 | E5C5D9C9 | F0F1F1F3* | |
| 02E3E7E3 | 40000260 | 4040001C | 40400001 | 800004E0 | 000004B0 | 000004DC |
| 000004B0 | 800004E0 | 000004B4 | 000004DC | 40404040 | 40404040 | 40404040 |
| 40404040 | 40404040 | 40404040 | 40404040 | E5C5D9C9 | F0F1F1F4* | |
| 02D9D3C4 | 40404040 | 40400038 | 40404040 | 00010001 | 0C00025C | 00010001 |
| 0C000260 | 00010001 | 0C000264 | 00010001 | 0C000268 | 00010001 | 0C00026C |
| 00010001 | 0C000270 | 00010001 | 0C000274 | E5C5D9C9 | F0F1F1F5* | |
| 02E3E7E3 | 4000027C | 40400010 | 40400001 | 000004B4 | 800004E0 | 80000620 |
| 8000060C | 40404040 | 40404040 | 40404040 | 40404040 | 40404040 | 40404040 |
| 40404040 | 40404040 | 40404040 | 40404040 | E5C5D9C9 | F0F1F1F6* | |

MEMBER NAME VERIFY

| | | | | | | |
|---|---|---|---|---|---|---|
| 02E3E7E3 | 40000294 | 4040000C | 40400001 | 000003D0 | 00000430 | 00000438 |
| 40404040 | 40404040 | 40404040 | 40404040 | 40404040 | 40404040 | 40404040 |
| 40404040 | 40404040 | 40404040 | 40404040 | E5C5D9C9 | F0F1F1F7* | |
| 02D9D3C4 | 40404040 | 40400038 | 40404040 | 00010001 | 0C000278 | 00010001 |
| 0C00027C | 00010001 | 0C000280 | 00010001 | 0C000284 | 00010001 | 0C000288 |
| 00010001 | 0C000294 | 00010001 | 0C000298 | E5C5D9C9 | F0F1F1F8* | |
| 02E3E7E3 | 400002A0 | 4040001C | 40400001 | 00000434 | 000005B0 | 000003D0 |
| 000003D0 | 000003D0 | 000003D0 | 000003D4 | 40404040 | 40404040 | 40404040 |
| 40404040 | 40404040 | 40404040 | 40404040 | E5C5D9C9 | F0F1F1F9* | |
| 02D9D3C4 | 40404040 | 40400038 | 40404040 | 00010001 | 0C00029C | 00010001 |
| 0C0002A0 | 00010001 | 0C0002A4 | 00010001 | 0C0002A8 | 00010001 | 0C0002AC |
| 00010001 | 0C0002B0 | 00010001 | 0C0002B4 | E5C5D9C9 | F0F1F2F0** | |
| 02E3E7E3 | 400002BC | 40400018 | 40400001 | 000003DC | 000003D0 | 000003D0 |
| 00000438 | 0000043C | 800003D0 | 40404040 | 40404040 | 40404040 | 40404040 |
| 40404040 | 40404040 | 40404040 | 40404040 | E5C5D9C9 | F0F1F2F1* | |
| 02E3E7E3 | 400002DC | 40400004 | 40400001 | 000003D0 | 40404040 | 40404040 |
| 40404040 | 40404040 | 40404040 | 40404040 | 40404040 | 40404040 | 40404040 |
| 40404040 | 40404040 | 40404040 | 40404040 | E5C5D9C9 | F0F1F2F2* | |
| 02D9D3C4 | 40404040 | 40400038 | 40404040 | 00010001 | 0C0002B8 | 00010001 |
| 0C0002BC | 00010001 | 0C0002C0 | 00010001 | 0C0002C4 | 00010001 | 0C0002C8 |
| 00010001 | 0C0002CC | 00010001 | 0C0002D0 | E5C5D9C9 | F0F1F2F3* | |
| 02E3E7E3 | 400002E0 | 4040001C | 40400001 | 00000428 | 00000438 | 00000434 |
| 00000568 | 000003D0 | 000003D0 | 000003D0 | 40404040 | 40404040 | 40404040 |
| 40404040 | 40404040 | 40404040 | 40404040 | E5C5D9C9 | F0F1F2F4* | |
| 02D9D3C4 | 40404040 | 40400038 | 40404040 | 00010001 | 0C0002DC | 00010001 |
| 0C0002E0 | 00010001 | 0C0002E4 | 00010001 | 0C0002E8 | 00010001 | 0C0002EC |
| 00010001 | 0C0002F0 | 00010001 | 0C0002F4 | E5C5D9C9 | F0F1F2F5* | |
| 02E3E7E3 | 400002FC | 4040001C | 40400001 | 000003D0 | 000003D4 | 000003DC |
| 000003D0 | 000003D0 | 00000438 | 0000043C | 40404040 | 40404040 | 40404040 |
| 40404040 | 40404040 | 40404040 | 40404040 | E5C5D9C9 | F0F1F2F6* | |
| 02D9D3C4 | 40404040 | 40400038 | 40404040 | 00010001 | 0C0002F8 | 00010001 |
| 0C0002FC | 00010001 | 0C000300 | 00010001 | 0C000304 | 00010001 | 0C000308 |

```
00010001  0C00030C  00010001  0C000310  E5C5D9C9  F0F1F2F7*
02E3E7E3  40000318  40400004  40400001  800003D0  40404040  40404040
40404040  40404040  40404040  40404040  40404040  40404040  40404040
40404040  40404040  40404040  40404040  E5C5D9C9  F0F1F2F8*
02E3E7E3  40000324  40400018  40400001  000003D0  00000418  00000438
00000434  00000098  000003D0  40404040  40404040  40404040  40404040
40404040  40404040  40404040  40404040  E5C5D9C9  F0F1F2F9*
02D9D3C4  40404040  40400038  40404040  00010001  0C000314  00010001
0C000318  00010001  0C000324  00010001  0C000328  00010001  0C00032C
00010001  0C000330  00010001  0C000334  E5C5D9C9  F0F1F3F0**
02E3E7E3  4000033C  4040001C  40400001  000003D0  000003D0  000003D0
000003D4  000003DC  000003D0  000003D0  40404040  40404040  40404040
40404040  40404040  40404040  40404040  E5C5D9C9  F0F1F3F1*
02D9D3C4  40404040  40400038  40404040  00010001  0C000338  00010001
0C00033C  00010001  0C000340  00010001  0C000344  00010001  0C000348
00010001  0C00034C  00010001  0C000350  E5C5D9C9  F0F1F3F2*
02E3E7E3  40000358  4040001C  40400001  00000438  0000043C  800003D0
000006AC  00000460  000003D0  0000040C  40404040  40404040  40404040
40404040  40404040  40404040  40404040  E5C5D9C9  F0F1F3F3*
02D9D3C4  40404040  40400038  40404040  00010001  0C000354  00010001
0C000358  00010001  0C00035C  00010001  0C000360  00010001  0C000364
00010001  0C000368  00010001  0C00036C  E5C5D9C9  F0F1F3F4*
02E3E7E3  40000374  4040001C  40400001  00000438  00000434  00000080
000003D0  000003D0  000003D0  000003D0  40404040  40404040  40404040
40404040  40404040  40404040  40404040  E5C5D9C9  F0F1F3F5*
02D9D3C4  40404040  40400038  40404040  00010001  0C000370  00010001

MEMBER NAME  VERIFY
0C000374  00010001  0C000378  00010001  0C00037C  00010001  0C000380
00010001  0C000384  00010001  0C000388  E5C5D9C9  F0F1F3F6*
02E3E7E3  40000390  4040001C  40400001  000003D4  000003DC  000003D0
000003D0  00000438  0000043C  800003D0  40404040  40404040  40404040
40404040  40404040  40404040  40404040  E5C5D9C9  F0F1F3F7*
02D9D3C4  40404040  40400038  40404040  00010001  0C00038C  00010001
0C000390  00010001  0C000394  00010001  0C000398  00010001  0C00039C
00010001  0C0003A0  00010001  0C0003A4  E5C5D9C9  F0F1F3F8*
02E3E7E3  40000684  40400030  40400001  00000000  00000000  00000000
00000000  00000000  00000000  00000000  00000000  00000010  4130CCCD
00000000  00000000  40404040  40404040  E5C5D9C9  F0F1F3F9*
02D9D3C4  40404040  40400008  40404040  00010001  0C0003A8  40404040
40404040  40404040  40404040  40404040  40404040  40404040  40404040
40404040  40404040  40404040  40404040  E5C5D9C9  F0F1F4F0**
02C5D5C4  40404040  40404040  40404040  40404040  40404040  40404040
00001046  F1F5F7F3  F460C6D6  F34040F0  F2F0F2F8  F7F0F9F8  40F0F84B
F5F04BF3  F3404040  E5C5D9C9  C6E84040  E5C5D9C9  F0F1F4F1**

MEMBER NAME  VLAYUP
02C5E2C4  40404040  40400010  40400001  E5D3C1E8  E4D74040  00000000
40000000  40404040  40404040  40404040  40404040  40404040  40404040
40404040  40404040  40404040  40404040  E5D3C1E8  F0F0F0F1*
02E3E7E3  40000000  40400038  40400001  47F0F00C  07E5D3C1  E8E4D740
90ECD00C  184D98CD  F0205040  D00450D0  400807FC  40404040  40404040
020A0803  18010A08  0318011A  05C4C1E2  E5D3C1E8  F0F0F0F2*
02E3E7E3  40000038  40400038  40400001  C8401003  1A0740D3  C1E8E4D7
4010041A  1040C1D3  D9C5C1C4  E840C4C5  C6C9D5C5  C4183222  02064814
0122020A  08031801  0A080318  011A05C4  E5D3C1E8  F0F0F0F3*
02E3E7E3  40000070  40400038  40400001  C1E2C840  10031A07  40D3C1E8
E4D74010  041A1340  E4D5D4C1  E3C3C8C5  C440D4C1  E3C5D9C9  C1D31832
22020A08  0318010A  08031801  1A05C4C1  E5D3C1E8  F0F0F0F4*
```

```
02E3E7E3  400000A8  40400038  40400001  E2C84010  031A0740  D3C1E8E4
D7401004  1A1740E4  D5D4C1E3  C3C8C5C4  40D6D9C9  C5D5E3C1  E3C9D6D5
E2183222  020A0803  18010A08  0318011A  E5D3C1E8  F0F0F0F5*
02E3E7E3  400000E0  40400037  40400001  05C4C1E2  C8401003  1A0740D3
C1E8E4D7  4010041A  1F40C1D3  D9C5C1C4  E840C4C5  C6C9D5C5  C46B40E2
C1D4C540  E2C5D8E4  C5D5C3C5  18322240  E5D3C1E8  F0F0F0F6*
02E3E7E3  40000198  40400038  40400001  00000000  00000000  4F080000
00000000  00000000  00000001  00000002  00000003  00000004  00000006
00000008  00000009  00000010  00000016  E5D3C1E8  F0F0F0F7*
02C5E2C4  40404040  40400010  40400002  D7C3C5D9  D9404040  05000000
40003844  40404040  40404040  40404040  40404040  40404040  40404040
40404040  40404040  40404040  40404040  E5D3C1E8  F0F0F0F8*
02E3E7E3  400001D0  40400010  40400001  00000048  00000058  00000000
00000000  40404040  40404040  40404040  40404040  40404040  40404040
40404040  40404040  40404040  40404040  E5D3C1E8  F0F0F0F9*
02C5E2C4  40404040  40400010  40400003  C2E2D6D9  E3404040  02000000
40000000  40404040  40404040  40404040  40404040  40404040  40404040
40404040  40404040  40404040  40404040  E5D3C1E8  F0F0F1F0**
02E3E7E3  40000228  4040000C  40400001  FFFFFFBB  00000000  00000000
40404040  40404040  40404040  40404040  40404040  40404040  40404040
40404040  40404040  40404040  40404040  E5D3C1E8  F0F0F1F1*
02C5E2C4  40404040  40400010  40400004  C9C2C3D6  D47B4040  02000000
40000000  40404040  40404040  40404040  40404040  40404040  40404040
40404040  40404040  40404040  40404040  E5D3C1E8  F0F0F1F2*
02E3E7E3  40000238  40400004  40400001  00000000  40404040  40404040
40404040  40404040  40404040  40404040  40404040  40404040  40404040
40404040  40404040  40404040  40404040  E5D3C1E8  F0F0F1F3*
02C5E2C4  40404040  40400010  40400005  C9E2D9C3  C8E54040  02000000
40000000  40404040  40404040  40404040  40404040  40404040  40404040
40404040  40404040  40404040  40404040  E5D3C1E8  F0F0F1F4*
02E3E7E3  40000240  40400008  40400001  00000000  00000000  40404040
40404040  40404040  40404040  40404040  40404040  40404040  40404040
40404040  40404040  40404040  40404040  E5D3C1E8  F0F0F1F5*
02E3E7E3  400001F4  40400004  40400001  000000C8  40404040  40404040
40404040  40404040  40404040  40404040  40404040  40404040  40404040
40404040  40404040  40404040  40404040  E5D3C1E8  F0F0F1F6*
02E3E7E3  40000208  40400020  40400001  00000005  00000004  C6D34040
C1404040  0000000D  00000004  C6D34040  C1404040  40404040  40404040
40404040  40404040  40404040  40404040  E5D3C1E8  F0F0F1F7*
02E3E7E3  4000029C  40400038  40400001  58B0D120  58A0D174  5890D178
58F0D114  4110D054  05EF5800  D0945000  D0C85800  D0A85000  D1385800
D0BC5000  D14C5800  D0B05000  D14050A0  E5D3C1E8  F0F0F1F8*
02E3E7E3  400002D4  40400038  40400001  D1505090  D15450A0  D1685090
D16C5880  D0B85890  D0DC58A0  D1105850  D0C85A50  D0945050  D0CC5950
D0E84730  D80E5870  D0C85C60  D0BC5070  E5D3C1E8  F0F0F1F9*
02E3E7E3  4000030C  40400038  40400001  D1305C40  D0BC5050  D1341835

MEMBER NAME  VLAYUP
5A30D0A8  5030D158  7843B000  7040D13C  18375A30  D0A87943  B0004770
D80E1837  5A30D0B0  5030D148  18155A10  E5D3C1E8  F0F0F2F0**
02E3E7E3  40000344  40400038  40400001  D0B05010  D15C7821  B0007020
D1447923  B0004770  D80E1837  5A30D170  7863B000  18355A30  D1707963
B0004780  D6D65990  D0E44730  D26647F0  E5D3C1E8  F0F0F2F1*
02E3E7E3  4000037C  40400038  40400001  D81E5800  D0E45A00  D0945000
D0E42B00  38046A00  D0886000  D0805830  D0841033  5030D0D8  2B003802
6A00D088  6000D080  5800D084  5000D0E0  E5D3C1E8  F0F0F2F2*
02E3E7E3  400003B4  40400038  40400001  58F0D128  45E0F004  00000000
00000028  18355A30  D1745030  D16045E0  F0080473  B0001835  5A30D178
5030D164  45E0F008  0473B000  45E0F008  E5D3C1E8  F0F0F2F3*
```

```
02E3E7E3  400003EC  40400038  40400001  0450D0D8  45E0F008  0450D0E0
45E0F010  58F0D128  45E0F000  00000000  0000005C  5890D094  58A0D094
18B85880  D118185B  5C40D0E4  18391A35  E5D3C1E8  F0F0F2F4*
02E3E7E3  40000424  40400038  40400001  45E0F008  01238000  879AD302
58A0D110  58B0D120  5890D0DC  5880D0B8  45E0F010  5800D0C8  5900D094
4780D35A  58E0D148  782EB000  5850D0C8  E5D3C1E8  F0F0F2F5*
02E3E7E3  4000045C  40400038  40400001  5B50D094  5C40D14C  18355A30
D1407923  B0004780  D4005990  D0E44730  D36647F0  D81E5800  D0E45A00
D0945000  D0E458F0  D1281800  45E0F004  E5D3C1E8  F0F0F2F6*
02E3E7E3  40000494  40400038  40400001  00000000  00000028  5830D130
5A30D150  45E0F008  0473B000  5830D130  5A30D154  45E0F008  0473B000
45E0F008  0450D0D8  45E0F008  0450D0E0  E5D3C1E8  F0F0F2F7*
02E3E7E3  400004CC  40400014  40400001  45E0F010  58F0D128  45E0F000
00000000  0000005C  40404040  40404040  40404040  40404040  40404040
40404040  40404040  40404040  40404040  E5D3C1E8  F0F0F2F8*
02D9D3C4  40404040  40400038  40404040  00020001  0C000228  00030001
1C00022C  00040001  1C000240  00050001  1C000244  00010001  0C0003C0
00010001  0C000408  00010001  0C000498  E5D3C1E8  F0F0F2F9*
02E3E7E3  400004E0  40400038  40400001  5890D094  58A0D094  18B85880
D118185B  5C40D0E4  18391A35  45E0F008  01238000  879AD3D6  58A0D110
58B0D120  5890D0DC  5880D0B8  45E0F010  E5D3C1E8  F0F0F3F0**
02E3E7E3  40000518  40400038  40400001  5830D134  5A30D17C  7823B000
5830D130  5A30D17C  7923B000  4780D556  5990A045  4730D428  47F0D81E
5850A045  5A50D094  5050A045  58E0D158  E5D3C1E8  F0F0F3F1*
02E3E7E3  40000550  40400038  40400001  2B00780E  B0006A00  D0886000
D0805830  D0841033  5030D0D8  58E0D15C  2B00780E  B0006A00  D0886000
D0805800  D0845000  D0E058F0  D1281800  E5D3C1E8  F0F0F3F2*
02E3E7E3  40000588  40400038  40400001  45E0F004  00000000  00000062
5810D160  45E0F008  0471B000  5810D164  45E0F008  0471B000  45E0F008
0450D0D8  45E0F008  0450D0E0  45E0F010  E5D3C1E8  F0F0F3F3*
02E3E7E3  400005C0  40400038  40400001  58F0D128  45E0F000  00000000
0000005C  18751C68  45E0F134  00010000  0127A001  01000048  00000001
45E0F010  19594750  D4DE47F0  D81E5A50  E5D3C1E8  F0F0F3F4*
02E3E7E3  400005F8  40400038  40400001  D0945050  A04558F0  D1281800
45E0F004  00000000  00000062  5830D130  5A30D150  45E0F008  0473B000
5830D130  5A30D154  45E0F008  0473B000  E5D3C1E8  F0F0F3F5*
02E3E7E3  40000630  40400038  40400001  45E0F008  0450D0D8  45E0F008
0450D0E0  45E0F010  58F0D128  45E0F000  00000000  0000005C  1C4845E0
F1340001  00000125  A0010100  00480000  E5D3C1E8  F0F0F3F6*
02E3E7E3  40000668  40400038  40400001  000145E0  F0105840  D1305A40
D1805830  D1345A30  D1804104  B0005000  D0684103  B0005000  D07058F0
D12C4110  D06805EF  41E00004  15FE4720  E5D3C1E8  F0F0F3F7*
02E3E7E3  400006A0  40400038  40400001  D59058EF  D04C07FE  5800D0D4
12004770  D80E5990  A0454730  D5A647F0  D81E5850  A0455A50  D0945050
A04558E0  D1582B00  780EB000  6A00D088  E5D3C1E8  F0F0F3F8*
02E3E7E3  400006D8  40400038  40400001  6000D080  5830D084  10335030
D0D858E0  D15C2B00  780EB000  6A00D088  6000D080  5800D084  5000D0E0

MEMBER NAME  VLAYUP
58F0D128  45E0F004  00000000  00000099  E5D3C1E8  F0F0F3F9*
02E3E7E3  40000710  40400038  40400001  5810D160  45E0F008  0471B000
5810D164  45E0F008  0471B000  45E0F008  0450D0D8  45E0F008  0450D0E0
45E0F010  58F0D128  45E0F000  00000000  E5D3C1E8  F0F0F4F0**
02E3E7E3  40000748  40400038  40400001  0000005C  18751C68  45E0F134
00010000  0127A001  01000048  00000001  45E0F010  19594750  D65A47F0
D81E5A50  D0945050  A04558F0  D1281800  E5D3C1E8  F0F0F4F1*
02E3E7E3  40000780  4040000C  40400001  45E0F004  00000000  00000099
40404040  40404040  40404040  40404040  40404040  40404040  40404040
40404040  40404040  40404040  40404040  E5D3C1E8  F0F0F4F2*
```

```
02D9D3C4  40404040  40400038  40404040  00010001  0C0004DC  00010001
0C000590  00010001  0C0005CC  00010001  0C00060C  00010001  0C000650
00010001  0C00070C  00010001  0C000748  E5D3C1E8  F0F0F4F3*
02E3E7E3  4000078C  40400038  40400001  5830D130  5A30D150  45E0F008
0473B000  5830D130  5A30D154  45E0F008  0473B000  45E0F008  0450D0D8
45E0F008  0450D0E0  45E0F010  58F0D128  E5D3C1E8  F0F0F4F4*
02E3E7E3  400007C4  40400038  40400001  45E0F000  00000000  0000005C
1C4845E0  F1340001  00000125  A0010100  00480000  000145E0  F01047F0
D80E5990  A0454730  D6E247F0  D81E5850  E5D3C1E8  F0F0F4F5*
02E3E7E3  400007FC  40400038  40400001  A0455A50  D0945050  A0452B00
7800D13C  6A00D088  6000D080  5830D084  10335030  D0D82B00  7800D144
6A00D088  6000D080  5800D084  5000D0E0  E5D3C1E8  F0F0F4F6*
02E3E7E3  40000834  40400038  40400001  58F0D128  45E0F004  00000000
000000D4  5830D134  5A30D174  45E0F008  0473B000  5830D134  5A30D178
45E0F008  0473B000  45E0F008  0450D0D8  E5D3C1E8  F0F0F4F7*
02E3E7E3  4000086C  40400038  40400001  45E0F008  0450D0E0  45E0F010
58F0D128  45E0F000  00000000  0000005C  18751C68  45E0F134  00010000
0127A001  01000048  00000001  45E0F010  E5D3C1E8  F0F0F4F8*
02E3E7E3  400008A4  40400038  40400001  19594750  D79647F0  D81E5A50
D0945050  A04558F0  D1281800  45E0F004  00000000  000000D4  5830D130
5A30D168  45E0F008  0473B000  5830D130  E5D3C1E8  F0F0F4F9*
02E3E7E3  400008DC  40400038  40400001  5A30D16C  45E0F008  0473B000
45E0F008  0450D0D8  45E0F008  0450D0E0  45E0F010  58F0D128  45E0F000
00000000  0000005C  1C4845E0  F1340001  E5D3C1E8  F0F0F5F0**
02E3E7E3  40000914  40400038  40400001  00000125  A0010100  00480000
000145E0  F0105800  D0CC5000  D0C85900  D0E847C0  D1D658B0  D12058A0
D1745890  D1781BFF  58E0D000  07FE58A0  E5D3C1E8  F0F0F5F1*
02E3E7E3  4000094C  40400038  40400001  D00458E0  A00C58B0  A0185810
B0045820  D0E85020  10005830  B00C5840  D0E45040  300018DA  92FFA00C
982CA01C  07FE9879  10045820  70005020  E5D3C1E8  F0F0F5F2*
02E3E7E3  40000984  40400038  40400001  D0E85820  90005020  D0E45820
10004130  20004150  00041B25  5C40D0B4  1B255020  D1205030  D1245030
D05C5820  10084130  20004150  00011B25  E5D3C1E8  F0F0F5F3*
02E3E7E3  400009BC  40400012  40400001  5C40D0B8  1B255020  D1185030
D11C47F0  D1844040  40404040  40404040  40404040  40404040  40404040
40404040  40404040  40404040  40404040  E5D3C1E8  F0F0F5F4*
02E3E7E3  40000020  40400008  40400001  0000097A  00000118  40404040
40404040  40404040  40404040  40404040  40404040  40404040  40404040
40404040  40404040  40404040  40404040  E5D3C1E8  F0F0F5F5*
02D9D3C4  40404040  40400038  40404040  00010001  0C000788  00010001
0C0007CC  00010001  0C000840  00010001  0C000884  00010001  0C0008C4
00010001  0C000908  00010001  0C000020  E5D3C1E8  F0F0F5F6*
02E3E7E3  40000118  40400004  40400001  0000094A  40404040  40404040
40404040  40404040  40404040  40404040  40404040  40404040  40404040
40404040  40404040  40404040  40404040  E5D3C1E8  F0F0F5F7*
02E3E7E3  40000164  40400010  40400001  000006A8  00000926  00000208
000001B0  40404040  40404040  40404040  40404040  40404040  40404040
40404040  40404040  40404040  40404040  E5D3C1E8  F0F0F5F8*

MEMBER NAME  VLAYUP
02E3E7E3  40000178  40400008  40400001  000001D4  80000200  40404040
40404040  40404040  40404040  40404040  40404040  40404040  40404040
40404040  40404040  40404040  40404040  E5D3C1E8  F0F0F5F9*
02D9D3C4  40404040  40400038  40404040  00010001  0C000024  00010001
0C000118  00010001  0C000164  00010001  0C000168  00010001  0C00016C
00010001  0C000170  00010001  0C000178  E5D3C1E8  F0F0F6F0**
02E3E7E3  40000184  40400004  40400001  000001AC  40404040  40404040
40404040  40404040  40404040  40404040  40404040  40404040  40404040
40404040  40404040  40404040  40404040  E5D3C1E8  F0F0F6F1*
```

```
02E3E7E3  4000018C  4040000C  40400001  000001C8  000001C8  800001EC
40404040  40404040  40404040  40404040  40404040  40404040  40404040
40404040  40404040  40404040  40404040  E5D3C1E8  F0F0F6F2*
02E3E7E3  40000248  40400038  40400001  00000000  00000000  00000000
00000000  00000000  00000000  00000000  00000000  00000000  00000000
00000000  00000000  00000000  00000000  E5D3C1E8  F0F0F6F3*
02E3E7E3  40000280  4040001C  40400001  00000000  0000000A  0000000C
00000020  00000024  00000018  00000040  40404040  40404040  40404040
40404040  40404040  40404040  40404040  E5D3C1E8  F0F0F6F4*
02D9D3C4  40404040  40400028  40404040  00010001  0C00017C  00010001
0C000184  00010001  0C00018C  00010001  0C000190  00010001  0C000194
40404040  40404040  40404040  40404040  E5D3C1E8  F0F0F6F5*
02C5D5C4  40404040  40404040  40404040  40404040  40404040  40404040
000009CE  F1F5F7F3  F460C6D6  F34040F0  F2F0F2F8  F7F0F9F8  40F0F84B
F5F04BF4  F1404040  E5D3C1E8  E4D74040  E5D3C1E8  F0F0F6F6**

MEMBER NAME  VSEQU
02C5E2C4  40404040  40400010  40400001  E5E2C5D8  E4404040  00000000
40000000  40404040  40404040  40404040  40404040  40404040  40404040
40404040  40404040  40404040  40404040  E5E2C5D8  F0F0F0F1*
02E3E7E3  40000000  40400038  40400001  47F0F00C  07E5E2C5  D8E44040
90ECD00C  184D98CD  F0205040  D00450D0  400807FC  40404040  40404040
020A0803  18010A08  0318011A  05C4C1E2  E5E2C5D8  F0F0F0F2*
02E3E7E3  40000038  4040002D  40400001  C8401003  1A0A40E2  C5D8E4C5
D5C3C540  10041A10  40C1D3D9  C5C1C4E8  40C4C5C6  C9D5C5C4  18322202
06481401  22404040  40404040  40404040  E5E2C5D8  F0F0F0F3*
02E3E7E3  400000C8  40400038  40400001  00000000  00000000  4F080000
00000000  00000001  00000002  00000003  00000004  00000005  00000006
00000018  00000048  00000000  00000000  E5E2C5D8  F0F0F0F4*
02C5E2C4  40404040  40400010  40400002  C2E2D6D9  E3404040  02000000
40000000  40404040  40404040  40404040  40404040  40404040  40404040
40404040  40404040  40404040  40404040  E5E2C5D8  F0F0F0F5*
02E3E7E3  40000148  40400004  40400001  00000000  40404040  40404040
40404040  40404040  40404040  40404040  40404040  40404040  40404040
40404040  40404040  40404040  40404040  E5E2C5D8  F0F0F0F6*
02C5E2C4  40404040  40400010  40400003  C9C2C3D6  D47B4040  02000000
40000000  40404040  40404040  40404040  40404040  40404040  40404040
40404040  40404040  40404040  40404040  E5E2C5D8  F0F0F0F7*
02E3E7E3  40000150  40400008  40400001  00000000  00000000  40404040
40404040  40404040  40404040  40404040  40404040  40404040  40404040
40404040  40404040  40404040  40404040  E5E2C5D8  F0F0F0F8*
02E3E7E3  4000015C  40400004  40400001  00000000  40404040  40404040
40404040  40404040  40404040  40404040  40404040  40404040  40404040
40404040  40404040  40404040  40404040  E5E2C5D8  F0F0F0F9*
02E3E7E3  40000118  40400004  40400001  000000C8  40404040  40404040
40404040  40404040  40404040  40404040  40404040  40404040  40404040
40404040  40404040  40404040  40404040  E5E2C5D8  F0F0F1F0**
02E3E7E3  40000124  40400020  40400001  00000011  00000004  C6D34040
C1404040  00000005  00000004  C6D34040  C1404040  40404040  40404040
40404040  40404040  40404040  40404040  E5E2C5D8  F0F0F1F1*
02E3E7E3  40000190  40400038  40400001  58B0D0E0  58A0D070  58F0D0E8
4110D04C  05EF50A0  D0985800  D1185000  D1005800  D11C5000  D1085800
D1205000  D1105800  D1245000  D1145880  E5E2C5D8  F0F0F1F2*
02E3E7E3  400001C8  40400038  40400001  D0885890  D0B05850  D0981A5A
5050D09C  5950D0AC  4730D318  18785C60  D0985070  D0F81C48  5050D0FC
18355A30  D1187863  B0001837  5A30D118  E5E2C5D8  F0F0F1F3*
02E3E7E3  40000200  40400038  40400001  7963B000  4770D318  18355A30
D11C7823  B0007020  D10C1837  5A30D11C  7923B000  4770D318  5990D0B8
4730D1C8  47F0D328  5800D0B8  1A0A5000  E5E2C5D8  F0F0F1F4*
```

```
02E3E7E3  40000238  40400038  40400001  D0B82B00  38066A00  D0686000
D0605830  D0641033  5030D0A8  2B003802  6A00D068  6000D060  5800D064
5000D0A4  58F0D0F4  45E0F004  00000000  E5E2C5D8  F0F0F1F5*
02E3E7E3  40000270  40400038  40400001  00000028  18355A30  D12045E0
F0080473  B0001835  5A30D124  45E0F008  0473B000  45E0F008  0450D0A8
45E0F008  0450D0A4  45E0F010  58F0D0F4  E5E2C5D8  F0F0F1F6*
02E3E7E3  400002A8  40400038  40400001  45E0F000  00000000  0000005F
189A58B0  D08C5880  D0EC185B  5C40D0B8  18391A35  45E0F008  01238000
879AD256  58B0D0E0  5890D0B0  5880D088  E5E2C5D8  F0F0F1F7*
02E3E7E3  400002E0  40400038  40400001  45E0F010  5990D0B8  4730D288
47F0D328  5800D0B8  1A0A5000  D0B858F0  D0F41800  45E0F004  00000000
00000028  5830D0F8  5A30D110  45E0F008  E5E2C5D8  F0F0F1F8*
02E3E7E3  40000318  40400038  40400001  0473B000  5830D0F8  5A30D114
45E0F008  0473B000  45E0F008  0450D0A8  45E0F008  0450D0A4  45E0F010
58F0D0F4  45E0F000  00000000  0000005F  E5E2C5D8  F0F0F1F9*
02E3E7E3  40000350  40400038  40400001  189A58B0  D08C5880  D0EC185B

MEMBER NAME  VSEQU
5C40D0B8  18391A35  45E0F008  01238000  879AD2F2  58B0D0E0  5890D0B0
5880D088  45E0F010  5800D09C  5000D098  E5E2C5D8  F0F0F2F0**
02E3E7E3  40000388  40400038  40400001  5900D0AC  47C0D166  58B0D0E0
1BFF58E0  D00007FE  58A0D004  58E0A00C  58B0A018  5810B004  5820D0AC
50201000  5830B00C  5840D0B8  50403000  E5E2C5D8  F0F0F2F1*
02E3E7E3  400003C0  40400038  40400001  18DA92FF  A00C982C  A01C07FE
98791004  58207000  5020D0AC  58209000  5020D0B8  58201000  41302000
41500004  1B255C40  D0841B25  5020D0E0  E5E2C5D8  F0F0F2F2*
02E3E7E3  400003F8  40400028  40400001  5030D0E4  5030D054  58201008
41302000  41500001  1B255C40  D08C1B25  5020D0EC  5030D0F0  47F0D128
40404040  40404040  40404040  40404040  E5E2C5D8  F0F0F2F3*
02E3E7E3  40000020  40400008  40400001  000003CC  00000068  40404040
40404040  40404040  40404040  40404040  40404040  40404040  40404040
40404040  40404040  40404040  40404040  E5E2C5D8  F0F0F2F4*
02D9D3C4  40404040  40400038  40404040  00020001  1C000150  00030001
1C00015C  00010001  0C000270  00010001  0C0002B0  00010001  0C000308
00010001  0C00034C  00010001  0C000020  E5E2C5D8  F0F0F2F5*
02E3E7E3  40000068  40400004  40400001  0000039C  40404040  40404040
40404040  40404040  40404040  40404040  40404040  40404040  40404040
40404040  40404040  40404040  40404040  E5E2C5D8  F0F0F2F6*
02E3E7E3  400000B4  40400008  40400001  00000124  000000DC  40404040
40404040  40404040  40404040  40404040  40404040  40404040  40404040
40404040  40404040  40404040  40404040  E5E2C5D8  F0F0F2F7*
02E3E7E3  400000C0  40400008  40400001  000000F0  80000114  40404040
40404040  40404040  40404040  40404040  40404040  40404040  40404040
40404040  40404040  40404040  40404040  E5E2C5D8  F0F0F2F8*
02E3E7E3  40000160  40400030  40400001  00000000  00000000  00000000
00000000  00000000  00000000  00000000  00000000  00000014  00000008
0000000C  00000010  40404040  40404040  E5E2C5D8  F0F0F2F9*
02D9D3C4  40404040  40400030  40404040  00010001  0C000024  00010001
0C000068  00010001  0C0000B4  00010001  0C0000B8  00010001  0C0000C0
00010001  0C0000C4  40404040  40404040  E5E2C5D8  F0F0F3F0**
02C5D5C4  40404040  40404040  40404040  40404040  40404040  40404040
00000420  F1F5F7F3  F460C6D6  F34040F0  F2F0F2F8  F7F0F9F8  40F0F84B
F5F04BF4  F6404040  E5E2C5D8  E4404040  E5E2C5D8  F0F0F3F1**

MEMBER NAME  WARRAY
02C5E2C4  40404040  40400010  40400001  E6C1D9D9  C1E84040  00000000
40000000  40404040  40404040  40404040  40404040  40404040  40404040
40404040  40404040  40404040  40404040  E6C1D9D9  F0F0F0F1*
02E3E7E3  40000000  40400038  40400001  47F0F00C  07E6C1D9  D9C1E840
```

```
90ECD00C  184D98CD  F0205040  D00450D0  400807FC  40404040  40404040
021A2040  5C5C5C5C  5C5C5C5C  5C40C4C1  E6C1D9D9  F0F0F0F2*
02E3E7E3  40000038  40400038  40400001  E2C840E3  C1C2D3C5  405C5C5C
5C5C5C5C  5C5C5C22  021A0640  4040C940  7E10041A  0340D47E  0A04011A
0340C47E  0A06011A  0440E77E  400A0703  E6C1D9D9  F0F0F0F3*
02E3E7E3  40000070  40400038  40400001  1A0440E8  7E400A07  031A0440
D77E400A  04012202  1A24405C  5C5C5C5C  5C5C5C5C  40E2C5D8  E4C5D5C3
C540E3C1  C2D3C540  5C5C5C5C  5C5C5C5C  E6C1D9D9  F0F0F0F4*
02E3E7E3  400000A8  40400038  40400001  5C5C2202  1A064040  40C97E40
10041A04  40D47E40  0A04011A  0440E27E  400A0601  1A0440E7  7E400A07
031A0440  E87E400A  07031A04  40C47E40  E6C1D9D9  F0F0F0F5*
02E3E7E3  400000E0  40400038  40400001  0A06011A  0440D77E  400A0401
22021A21  405C5C5C  5C5C5C5C  5C5C40C7  D9C1C9D5  40E3C1C2  D3C5405C
5C5C5C5C  5C5C5C5C  5C22021A  06404040  E6C1D9D9  F0F0F0F6*
02E3E7E3  40000118  40400038  40400001  C97E4010  041A0440  D47E400A
04011A04  40C77E40  0A06011A  0440E77E  400A0703  1A0440E8  7E400A07
031A0440  C47E400A  06011A04  40D77E40  E6C1D9D9  F0F0F0F7*
02E3E7E3  40000150  40400038  40400001  0A040122  021A2440  5C5C5C5C
5C5C5C5C  5C40D4C1  E3C5D9C9  C1D340E3  C1C2D3C5  405C5C5C  5C5C5C5C
5C5C5C22  021A0640  4040C97E  4010041A  E6C1D9D9  F0F0F0F8*
02E3E7E3  40000188  40400038  40400001  0440D47E  400A0401  1A0440D4
7E400A06  011A0440  E77E400A  07031A04  40E87E40  0A07031A  0440C47E
400A0601  1A0440D7  7E400A04  0122021A  E6C1D9D9  F0F0F0F9*
02E3E7E3  400001C0  40400038  40400001  20405C5C  5C5C5C5C  5C5C5C40
D7D3E840  E3C1C2D3  C540405C  5C5C5C5C  5C5C5C5C  5C220210  051A08D3
C1E8E4D7  407B4010  041A05E7  40E8407E  E6C1D9D9  F0F0F1F0**
02E3E7E3  400001F8  40400006  40400001  06020A0A  04224040  40404040
40404040  40404040  40404040  40404040  40404040  40404040  40404040
40404040  40404040  40404040  40404040  E6C1D9D9  F0F0F1F1*
02C5E2C4  40404040  40400010  40400002  D7E3C1C2  D3C54040  05000000
40125768  40404040  40404040  40404040  40404040  40404040  40404040
40404040  40404040  40404040  40404040  E6C1D9D9  F0F0F1F2*
02E3E7E3  40000258  4040002C  40400001  00000001  00000002  00000003
00000004  00000005  00000006  0000000C  00000014  00000018  00000000
00000000  40404040  40404040  40404040  E6C1D9D9  F0F0F1F3*
02C5E2C4  40404040  40400010  40400003  D4E5C3C8  D9404040  02000000
40000000  40404040  40404040  40404040  40404040  40404040  40404040
40404040  40404040  40404040  40404040  E6C1D9D9  F0F0F1F4*
02C5E2C4  40404040  40400010  40400004  C9C2C3D6  D47B4040  02000000
40000000  40404040  40404040  40404040  40404040  40404040  40404040
40404040  40404040  40404040  40404040  E6C1D9D9  F0F0F1F5*
02E3E7E3  400002A0  40400038  40400001  FFFFFFEC  00058600  000B0444
00108298  00000000  00000000  5860D0A4  5870D0A0  58A0D058  58F0D0B4
45E0F004  00000006  00000028  45E0F010  E6C1D9D9  F0F0F1F6*
02E3E7E3  400002D8  40400020  40400001  50A0D088  5880D074  58907014
18B758F0  D0B41800  45E0F004  00000006  0000004C  40404040  40404040
40404040  40404040  40404040  40404040  E6C1D9D9  F0F0F1F7*
02D9D3C4  40404040  40400038  40404040  00020001  0C0002A0  00020001
0C0002A4  00020001  0C0002A8  00020001  0C0002AC  00030001  1C0002B0
00040001  1C0002B4  00010001  0C0002D0  E6C1D9D9  F0F0F1F8*
02E3E7E3  400002F8  40400038  40400001  45E0F008  0450D088  18585C40
D08845E0  F1340001  00000475  B0040100  00050000  000445E0  F0105830
D0881A3A  5030D088  193947C0  D0E658F0  E6C1D9D9  F0F0F1F9*
02E3E7E3  40000330  40400038  40400001  D0B41800  45E0F004  00000006

MEMBER NAME  WARRAY
00000083  45E0F010  50A0D088  5880D078  589077E8  18B758F0  D0B41800
45E0F004  00000006  000000AB  45E0F008  E6C1D9D9  F0F0F2F0**
02E3E7E3  40000368  40400038  40400001  0450D088  18585C40  D08845E0
```

```
F1340001  00000475  B7D40100  00060000  000445E0  F0105830  D0881A3A
5030D088  193947C0  D15258F0  D0B41800  E6C1D9D9  F0F0F2F1*
02E3E7E3  400003A0  40400038  40400001  45E0F004  00000006  000000ED
45E0F010  50A0D088  5880D078  58906018  18B658F0  D0B41800  45E0F004
00000006  00000112  45E0F008  0450D088  E6C1D9D9  F0F0F2F2*
02E3E7E3  400003D8  40400038  40400001  18585C40  D08845E0  F1340001
00000475  B0040100  00060000  000445E0  F0105830  D0881A3A  5030D088
193947C0  D1BE58F0  D0B41800  45E0F004  E6C1D9D9  F0F0F2F3*
02E3E7E3  40000410  40400038  40400001  00000006  00000154  45E0F010
50A0D088  5880D078  58F0D0A8  5890F018  58B0D0A8  58F0D0B4  45E0F004
00000006  0000017C  45E0F008  0450D088  E6C1D9D9  F0F0F2F4*
02E3E7E3  40000448  40400038  40400001  18585C40  D08845E0  F1340001
00000475  B0040100  00060000  000445E0  F0105830  D0881A3A  5030D088
193947C0  D23058F0  D0B41800  45E0F004  E6C1D9D9  F0F0F2F5*
02E3E7E3  40000480  40400008  40400001  00000006  000001BE  40404040
40404040  40404040  40404040  40404040  40404040  40404040  40404040
40404040  40404040  40404040  40404040  E6C1D9D9  F0F0F2F6*
02D9D3C4  40404040  40400038  40404040  00010001  0C0002F4  00010001
0C00033C  00010001  0C000360  00010001  0C0003A8  00010001  0C0003CC
00010001  0C000414  00010001  0C00043C  E6C1D9D9  F0F0F2F7*
02E3E7E3  40000488  40400038  40400001  45E0F010  50A0D088  5890D070
58B0D0AC  18595C40  D0884105  B0045000  D0549280  D05458F0  D0B04110
D04C05EF  58F0D0B4  45E0F004  00000006  E6C1D9D9  F0F0F2F8*
02E3E7E3  400004C0  40400038  40400001  000001E2  45E0F008  0450D088
45E0F008  0240D090  45E0F008  0475B008  45E0F008  0475B00C  45E0F010
5830D088  1A3A5030  D0885930  B00C47C0  E6C1D9D9  F0F0F2F9*
02E3E7E3  400004F8  40400020  40400001  D2981BFF  58E0D000  07FE58D0
D00458E0  D00C92FF  D00C982C  D01C07FE  47F0D0B8  40404040  40404040
40404040  40404040  40404040  40404040  E6C1D9D9  F0F0F3F0**
02E3E7E3  40000020  40400008  40400001  00000514  00000200  40404040
40404040  40404040  40404040  40404040  40404040  40404040  40404040
40404040  40404040  40404040  40404040  E6C1D9D9  F0F0F3F1*
02E3E7E3  40000200  40400004  40400001  00000502  40404040  40404040
40404040  40404040  40404040  40404040  40404040  40404040  40404040
40404040  40404040  40404040  40404040  E6C1D9D9  F0F0F3F2*
02E3E7E3  4000024C  4040000C  40400001  00000264  00000290  80000000
40404040  40404040  40404040  40404040  40404040  40404040  40404040
40404040  40404040  40404040  40404040  E6C1D9D9  F0F0F3F3*
02D9D3C4  40404040  40400038  40404040  00010001  0C000484  00010001
0C0004C0  00010001  0C000020  00010001  0C000024  00010001  0C000200
00010001  0C00024C  00010001  0C000250  E6C1D9D9  F0F0F3F4*
02C5D5C4  40404040  40404040  40404040  40404040  40404040  40404040
00000518  F1F5F7F3  F460C6D6  F34040F0  F2F0F2F8  F7F0F9F8  40F0F84B
F5F04BF5  F1404040  E6C1D9D9  C1E84040  E6C1D9D9  F0F0F3F5**

MEMBER NAME  WITHIN
02C5E2C4  40404040  40400010  40400001  E6C9E3C8  C9D54040  00000000
40000000  40404040  40404040  40404040  40404040  40404040  40404040
40404040  40404040  40404040  40404040  E6C9E3C8  F0F0F0F1*
02E3E7E3  40000000  40400028  40400001  47F0F00C  07E6C9E3  C8C9D540
90ECD00C  184D98CD  F0205040  D00450D0  400807FC  40404040  40404040
40404040  40404040  40404040  40404040  E6C9E3C8  F0F0F0F2*
02E3E7E3  400000C8  4040001C  40400001  00000000  00000001  00000002
00000003  00000004  00000000  00000000  40404040  40404040  40404040
40404040  40404040  40404040  40404040  E6C9E3C8  F0F0F0F3*
02E3E7E3  40000170  40400004  40400001  00000000  40404040  40404040
40404040  40404040  40404040  40404040  40404040  40404040  40404040
40404040  40404040  40404040  40404040  E6C9E3C8  F0F0F0F4*
02E3E7E3  40000178  40400004  40400001  00000000  40404040  40404040
```

```
40404040  40404040  40404040  40404040  40404040  40404040  40404040
40404040  40404040  40404040  40404040  E6C9E3C8  F0F0F0F5*
02E3E7E3  40000180  40400004  40400001  00000000  40404040  40404040
40404040  40404040  40404040  40404040  40404040  40404040  40404040
40404040  40404040  40404040  40404040  E6C9E3C8  F0F0F0F6*
02E3E7E3  40000188  40400004  40400001  00000000  40404040  40404040
40404040  40404040  40404040  40404040  40404040  40404040  40404040
40404040  40404040  40404040  40404040  E6C9E3C8  F0F0F0F7*
02E3E7E3  40000190  40400004  40400001  00000000  40404040  40404040
40404040  40404040  40404040  40404040  40404040  40404040  40404040
40404040  40404040  40404040  40404040  E6C9E3C8  F0F0F0F8*
02E3E7E3  40000198  40400004  40400001  00000000  40404040  40404040
40404040  40404040  40404040  40404040  40404040  40404040  40404040
40404040  40404040  40404040  40404040  E6C9E3C8  F0F0F0F9*
02E3E7E3  400001A0  40400004  40400001  00000000  40404040  40404040
40404040  40404040  40404040  40404040  40404040  40404040  40404040
40404040  40404040  40404040  40404040  E6C9E3C8  F0F0F1F0**
02E3E7E3  400001A8  40400004  40400001  00000000  40404040  40404040
40404040  40404040  40404040  40404040  40404040  40404040  40404040
40404040  40404040  40404040  40404040  E6C9E3C8  F0F0F1F1*
02C5E2C4  40404040  40400010  40400002  E2E6C9E3  C3C84040  02000000
40000000  40404040  40404040  40404040  40404040  40404040  40404040
40404040  40404040  40404040  40404040  E6C9E3C8  F0F0F1F2*
02E3E7E3  400001B0  40400004  40400001  00000000  40404040  40404040
40404040  40404040  40404040  40404040  40404040  40404040  40404040
40404040  40404040  40404040  40404040  E6C9E3C8  F0F0F1F3*
02E3E7E3  400001B8  40400004  40400001  00000000  40404040  40404040
40404040  40404040  40404040  40404040  40404040  40404040  40404040
40404040  40404040  40404040  40404040  E6C9E3C8  F0F0F1F4*
02E3E7E3  400001C0  40400038  40400001  5830D148  5880D168  5890D160
58A0D170  58B0D188  5870D194  5860D0A4  5960D0C8  4770D1C6  58F0D190
4110D04C  05EF5800  D0BC5900  D0A84780  E6C9E3C8  F0F0F1F5*
02E3E7E3  400001F8  40400038  40400001  D28E6800  D1206900  D1284780
D24E6820  A0181857  5C40D0C0  5820D0B0  1A257022  80006820  A0201857
5C40D0C0  18271A25  70228000  5800D0C0  E6C9E3C8  F0F0F1F6*
02E3E7E3  40000230  40400038  40400001  1A065000  D0C06820  B0186020
B0086820  B0206020  B0106820  90086020  B0186820  90106020  B0206800
D1206000  D1186800  D1286000  D1205800  E6C9E3C8  F0F0F1F7*
02E3E7E3  40000268  40400038  40400001  D0A05000  D0C41BFF  58E0D000
07FE6820  A0181857  5C40D0C0  5820D0B0  1A257022  80006820  A0201857
5C40D0C0  18271A25  70228000  5800D0C0  E6C9E3C8  F0F0F1F8*
02E3E7E3  400002A0  40400038  40400001  1A065000  D0C05800  D0A85000
D0C41BFF  58E0D000  07FE5060  D0C41BFF  58E0D000  07FE58A0  D00458E0
A00C58B0  A0185810  B0105820  D0C05020  E6C9E3C8  F0F0F1F9*
02E3E7E3  400002D8  40400038  40400001  10005830  B0186820  D1186020

MEMBER NAME  WITHIN
30005840  B01C6840  D1206040  40005850  B02C5860  D0C45060  50005870
B0306860  D0D06060  70005880  B0346800  E6C9E3C8  F0F0F2F0**
02E3E7E3  40000310  40400038  40400001  D0E06000  80005890  B0386820
D0F06020  90005810  B03C6840  D1006040  10005820  B0406860  D0D86060
20005830  B0446800  D0E86000  30005840  E6C9E3C8  F0F0F2F1*
02E3E7E3  40000348  40400038  40400001  B0486820  D0F86020  40005850
B04C6840  D1086040  50005860  B0586860  D1306060  60005870  B05C5880
D0C85080  70005890  B0686800  D1386000  E6C9E3C8  F0F0F2F2*
02E3E7E3  40000380  40400038  40400001  900018DA  92FFA00C  982CA01C
07FE987B  10105820  70005020  D0C06820  90006020  D1186820  A0006020
D1206820  B0006020  D128987B  10246820  E6C9E3C8  F0F0F2F3*
02E3E7E3  400003B8  40400038  40400001  70006020  D1105820  80005020
```

```
D0BC5820  90005020  D0C46820  A0006020  D0D06820  B0006020  D0E0987B
10386820  70006020  D0F06820  80006020  E6C9E3C8  F0F0F2F4*
02E3E7E3  400003F0  40400038  40400001  D1006820  90006020  D0D86820
A0006020  D0E86820  B0006020  D0F8987B  104C6820  70006020  D1086820
A0006020  D1305820  B0005020  D0C85870  E6C9E3C8  F0F0F2F5*
02E3E7E3  40000428  40400038  40400001  10686820  70006020  D1385820
10004130  20004150  00081B25  5020D188  5030D18C  5030D06C  58201004
41302000  41500008  1B255020  D1705030  E6C9E3C8  F0F0F2F6*
02E3E7E3  40000460  40400038  40400001  D1745030  D0805820  10084130
20004150  00081B25  5020D158  5030D15C  5030D098  5820100C  41302000
41500008  1B255020  D1605030  D1645030  E6C9E3C8  F0F0F2F7*
02E3E7E3  40000498  40400038  40400001  D09C9280  D09C5820  10144130
20004150  00041B25  5C40D0A8  1B255020  D1685030  D16C5820  10504130
20004150  00081B25  5020D148  5030D14C  E6C9E3C8  F0F0F2F8*
02E3E7E3  400004D0  40400038  40400001  5030D070  58201054  41302000
41500008  1B255020  D1505030  D1545030  D0745820  10604130  20004150
00081B25  5020D178  5030D17C  5030D078  E6C9E3C8  F0F0F2F9*
02E3E7E3  40000508  4040001E  40400001  58201064  41302000  41500008
1B255020  D1805030  D1845030  D07C47F0  D1984040  40404040  40404040
40404040  40404040  40404040  40404040  E6C9E3C8  F0F0F3F0**
02E3E7E3  40000020  4040000C  40400001  0000038E  00000028  000002C2
40404040  40404040  40404040  40404040  40404040  40404040  40404040
40404040  40404040  40404040  40404040  E6C9E3C8  F0F0F3F1*
02E3E7E3  40000074  40400010  40400001  000000F8  00000108  00000118
00000128  40404040  40404040  40404040  40404040  40404040  40404040
40404040  40404040  40404040  40404040  E6C9E3C8  F0F0F3F2*
02D9D3C4  40404040  40400038  40404040  00020001  1C0001B8  00010001
0C000020  00010001  0C000024  00010001  0C000028  00010001  0C000074
00010001  0C000078  00010001  0C00007C  E6C9E3C8  F0F0F3F3*
02E3E7E3  40000084  40400010  40400001  00000100  00000110  00000120
00000130  40404040  40404040  40404040  40404040  40404040  40404040
40404040  40404040  40404040  40404040  E6C9E3C8  F0F0F3F4*
02E3E7E3  400000AC  4040000C  40400001  00000158  000000F0  00000148
40404040  40404040  40404040  40404040  40404040  40404040  40404040
40404040  40404040  40404040  40404040  E6C9E3C8  F0F0F3F5*
02D9D3C4  40404040  40400038  40404040  00010001  0C000080  00010001
0C000084  00010001  0C000088  00010001  0C00008C  00010001  0C000090
00010001  0C0000AC  00010001  0C0000B0  E6C9E3C8  F0F0F3F6*
02E3E7E3  400000B8  40400008  40400001  00000140  00000160  40404040
40404040  40404040  40404040  40404040  40404040  40404040  40404040
40404040  40404040  40404040  40404040  E6C9E3C8  F0F0F3F7*
02E3E7E3  400001BC  40400004  40400001  00000008  40404040  40404040
40404040  40404040  40404040  40404040  40404040  40404040  40404040
40404040  40404040  40404040  40404040  E6C9E3C8  F0F0F3F8*
02D9D3C4  40404040  40400018  40404040  00010001  0C0000B4  00010001
0C0000B8  00010001  0C0000BC  40404040  40404040  40404040  40404040

MEMBER NAME  WITHIN
40404040  40404040  40404040  40404040  E6C9E3C8  F0F0F3F9*
02C5D5C4  40404040  40404040  40404040  40404040  40404040  40404040
00000526  F1F5F7F3  F460C6D6  F34040F0  F2F0F2F8  F7F0F9F8  40F0F84B
F5F04BF5  F5404040  E6C9E3C8  C9D54040  E6C9E3C8  F0F0F4F0**

MEMBER NAME  WITOUT
02C5E2C4  40404040  40400010  40400001  E6C9E3D6  E4E34040  00000000
40000000  40404040  40404040  40404040  40404040  40404040  40404040
40404040  40404040  40404040  40404040  E6C9E3D6  F0F0F0F1*
02E3E7E3  40000000  40400028  40400001  47F0F00C  07E6C9E3  D6E4E340
90ECD00C  184D98CD  F0205040  D00450D0  400807FC  40404040  40404040
```

```
40404040  40404040  40404040  40404040  E6C9E3D6  F0F0F0F2*
02E3E7E3  400000C8  4040001C  40400001  00000000  00000001  00000002
00000003  00000004  00000000  00000000  40404040  40404040  40404040
40404040  40404040  40404040  40404040  E6C9E3D6  F0F0F0F3*
02E3E7E3  40000168  40400004  40400001  00000000  40404040  40404040
40404040  40404040  40404040  40404040  40404040  40404040  40404040
40404040  40404040  40404040  40404040  E6C9E3D6  F0F0F0F4*
02E3E7E3  40000170  40400004  40400001  00000000  40404040  40404040
40404040  40404040  40404040  40404040  40404040  40404040  40404040
40404040  40404040  40404040  40404040  E6C9E3D6  F0F0F0F5*
02E3E7E3  40000178  40400004  40400001  00000000  40404040  40404040
40404040  40404040  40404040  40404040  40404040  40404040  40404040
40404040  40404040  40404040  40404040  E6C9E3D6  F0F0F0F6*
02E3E7E3  40000180  40400004  40400001  00000000  40404040  40404040
40404040  40404040  40404040  40404040  40404040  40404040  40404040
40404040  40404040  40404040  40404040  E6C9E3D6  F0F0F0F7*
02E3E7E3  40000188  40400004  40400001  00000000  40404040  40404040
40404040  40404040  40404040  40404040  40404040  40404040  40404040
40404040  40404040  40404040  40404040  E6C9E3D6  F0F0F0F8*
02E3E7E3  40000190  40400004  40400001  00000000  40404040  40404040
40404040  40404040  40404040  40404040  40404040  40404040  40404040
40404040  40404040  40404040  40404040  E6C9E3D6  F0F0F0F9*
02E3E7E3  40000198  40400004  40400001  00000000  40404040  40404040
40404040  40404040  40404040  40404040  40404040  40404040  40404040
40404040  40404040  40404040  40404040  E6C9E3D6  F0F0F1F0**
02C5E2C4  40404040  40400010  40400002  E2E6C9E3  C3C84040  02000000
40000000  40404040  40404040  40404040  40404040  40404040  40404040
40404040  40404040  40404040  40404040  E6C9E3D6  F0F0F1F1*
02E3E7E3  400001A0  40400004  40400001  00000000  40404040  40404040
40404040  40404040  40404040  40404040  40404040  40404040  40404040
40404040  40404040  40404040  40404040  E6C9E3D6  F0F0F1F2*
02E3E7E3  400001A8  40400038  40400001  00000000  5840D170  5850D168
5860D158  5870D150  5880D148  5890D140  58A0D178  58B0D160  5830D0A4
5820D0A0  5930D0C8  4770D216  58F0D180  E6C9E3D6  F0F0F1F3*
02E3E7E3  400001E0  40400038  40400001  4110D04C  05EF6820  D1102C22
6C20D110  6C20D0D0  6840D110  2C446C40  D0E02A24  6840D0F0  6C40D110
2A246A20  D1006020  B0086820  D1102C22  E6C9E3D6  F0F0F1F4*
02E3E7E3  40000218  40400038  40400001  6C20D110  6C20D0D8  6840D110
2C446C40  D0E82A24  6840D0F8  6C40D110  2A246A20  D1086020  B0106820
B0086020  A0186820  B0106020  A0206800  E6C9E3D6  F0F0F1F5*
02E3E7E3  40000250  40400038  40400001  D1106000  D1205020  D0BC1BFF
58E0D000  07FE58A0  D00458E0  A00C58B0  A0185810  B00C6820  D1206020
10005820  B0105830  D0BC5030  20005840  E6C9E3D6  F0F0F1F6*
02E3E7E3  40000288  40400038  40400001  B0146840  D1186040  40005850
B0186860  D0D06060  50005860  B01C6800  D0E06000  60005870  B0206820
D0F06020  70005880  B0246840  D1006040  E6C9E3D6  F0F0F1F7*
02E3E7E3  400002C0  40400038  40400001  80005890  B0286860  D0D86060
90005810  B02C6800  D0E86000  10005820  B0306820  D0F86020  20005830
B0346840  D1086040  30005840  B0406860  E6C9E3D6  F0F0F1F8*
02E3E7E3  400002F8  40400038  40400001  D1306060  40005850  B04C6800
D1286000  50005860  B0505870  D0C85070  600018DA  92FFA00C  982CA01C
07FE987B  10046820  70006020  D1106820  E6C9E3D6  F0F0F1F9*
02E3E7E3  40000330  40400038  40400001  90006020  D1205820  A0005020

MEMBER NAME  WITOUT
D0BC6820  B0006020  D118987B  10186820  70006020  D0D06820  80006020
D0E06820  90006020  D0F06820  A0006020  E6C9E3D6  F0F0F2F0**
02E3E7E3  40000368  40400038  40400001  D1006820  B0006020  D0D8987B
102C6820  70006020  D0E86820  80006020  D0F86820  90006020  D108987B
```

```
103C7820  70007020  D0C46820  80006020  E6C9E3D6  F0F0F2F1*
02E3E7E3  400003A0  40400038  40400001  D130987B  104C6820  70006020
D1285820  80005020  D0C85820  10004130  20004150  00081B25  5020D178
5030D17C  5030D06C  58201008  41302000  E6C9E3D6  F0F0F2F2*
02E3E7E3  400003D8  40400038  40400001  41500008  1B255020  D1605030
D1645820  10384130  20004150  00081B25  5020D158  5030D15C  5030D09C
9280D09C  58201044  41302000  41500008  E6C9E3D6  F0F0F2F3*
02E3E7E3  40000410  40400038  40400001  1B255020  D1405030  D1445030
D0705820  10484130  20004150  00081B25  5020D148  5030D14C  5030D074
58201054  41302000  41500008  1B255020  E6C9E3D6  F0F0F2F4*
02E3E7E3  40000448  40400038  40400001  D1685030  D16C5030  D0785820
10584130  20004150  00081B25  5020D170  5030D174  5030D07C  5820105C
41302000  41500008  1B255020  D1505030  E6C9E3D6  F0F0F2F5*
02E3E7E3  40000480  4040000A  40400001  D1545030  D09847F0  D1844040
40404040  40404040  40404040  40404040  40404040  40404040  40404040
40404040  40404040  40404040  40404040  E6C9E3D6  F0F0F2F6*
02E3E7E3  40000020  4040000C  40400001  00000322  00000028  00000262
40404040  40404040  40404040  40404040  40404040  40404040  40404040
40404040  40404040  40404040  40404040  E6C9E3D6  F0F0F2F7*
02E3E7E3  40000074  40400010  40400001  000000F8  00000108  00000118
00000128  40404040  40404040  40404040  40404040  40404040  40404040
40404040  40404040  40404040  40404040  E6C9E3D6  F0F0F2F8*
02D9D3C4  40404040  40400038  40404040  00020001  1C0001A8  00010001
0C000020  00010001  0C000024  00010001  0C000028  00010001  0C000074
00010001  0C000078  00010001  0C00007C  E6C9E3D6  F0F0F2F9*
02E3E7E3  40000084  40400010  40400001  00000100  00000110  00000120
00000130  40404040  40404040  40404040  40404040  40404040  40404040
40404040  40404040  40404040  40404040  E6C9E3D6  F0F0F3F0**
02E3E7E3  400000A8  4040000C  40400001  000000E8  00000150  000000F0
40404040  40404040  40404040  40404040  40404040  40404040  40404040
40404040  40404040  40404040  40404040  E6C9E3D6  F0F0F3F1*
02D9D3C4  40404040  40400038  40404040  00010001  0C000080  00010001
0C000084  00010001  0C000088  00010001  0C00008C  00010001  0C000090
00010001  0C0000A8  00010001  0C0000AC  E6C9E3D6  F0F0F3F2*
02E3E7E3  400000B4  4040000C  40400001  00000148  00000140  00000158
40404040  40404040  40404040  40404040  40404040  40404040  40404040
40404040  40404040  40404040  40404040  E6C9E3D6  F0F0F3F3*
02D9D3C4  40404040  40400020  40404040  00010001  0C0000B0  00010001
0C0000B4  00010001  0C0000B8  00010001  0C0000BC  40404040  40404040
40404040  40404040  40404040  40404040  E6C9E3D6  F0F0F3F4*
02C5D5C4  40404040  40404040  40404040  40404040  40404040  40404040
0000048A  F1F5F7F3  F460C6D6  F34040F0  F2F0F2F8  F7F0F9F8  40F0F84B
F5F14BF0  F1404040  E6C9E3D6  E4E34040  E6C9E3D6  F0F0F3F5**

MEMBER NAME  WPIERC
02C5E2C4  40404040  40400010  40400001  E6D7C9C5  D9C34040  00000000
40000000  40404040  40404040  40404040  40404040  40404040  40404040
40404040  40404040  40404040  40404040  E6D7C9C5  F0F0F0F1*
02E3E7E3  40000000  40400038  40400001  47F0F00C  07E6D7C9  C5D9C340
90ECD00C  184D98CD  F0205040  D00450D0  400807FC  40404040  40404040
021A2140  5C5C5C5C  5C5C5C5C  5C40D7C5  E6D7C9C5  F0F0F0F2*
02E3E7E3  40000038  40400038  40400001  D9C3C540  E3C1C2D3  C5405C5C
5C5C5C5C  5C5C5C5C  22021A05  4040C97E  4010041A  0440C47E  400A0601
1A0440D7  7E400A06  011A0440  E27E400A  E6D7C9C5  F0F0F0F3*
02E3E7E3  40000070  40400038  40400001  06011A04  40D37E40  0A06011A
0440D47E  400A0603  1E18051A  0540E740  7E400A07  031A0540  E8407E40
0A07031A  0640D3C3  407E4006  04240822  E6D7C9C5  F0F0F0F4*
02E3E7E3  400000F8  40400010  40400001  00000001  0000000B  00000000
00000000  40404040  40404040  40404040  40404040  40404040  40404040
```

```
40404040  40404040  40404040  40404040  E6D7C9C5  F0F0F0F5*
02C5E2C4  40404040  40400010  40400002  C9C2C3D6  D47B4040  02000000
40000000  40404040  40404040  40404040  40404040  40404040  40404040
40404040  40404040  40404040  40404040  E6D7C9C5  F0F0F0F6*
02E3E7E3  40000118  40400004  40400001  00000000  40404040  40404040
40404040  40404040  40404040  40404040  40404040  40404040  40404040
40404040  40404040  40404040  40404040  E6D7C9C5  F0F0F0F7*
02E3E7E3  40000120  40400004  40400001  00000000  40404040  40404040
40404040  40404040  40404040  40404040  40404040  40404040  40404040
40404040  40404040  40404040  40404040  E6D7C9C5  F0F0F0F8*
02E3E7E3  4000013C  40400038  40400001  5880D070  58B0D050  58A0D084
5850D07C  58F0D078  45E0F004  00000006  00000028  45E0F010  50B0D064
189B58F0  D0781800  45E0F004  00000006  E6D7C9C5  F0F0F0F9*
02E3E7E3  40000174  40400038  40400001  0000004D  45E0F008  0450D064
18755C60  D06418B7  1AB5184A  1A471894  45E0F008  04798000  879AD0E8
5890D050  45E0F010  5830D064  1A395030  E6D7C9C5  F0F0F1F0**
02E3E7E3  400001AC  40400038  40400001  D0645930  D06847C0  D0BE58B0
D0501BFF  58E0D000  07FE58D0  D00458E0  D00C92FF  D00C982C  D01C07FE
58701004  58207000  5020D068  58201000  E6D7C9C5  F0F0F1F1*
02E3E7E3  400001E4  4040001C  40400001  41302000  41500004  1B255C40
D0541B25  5020D070  5030D074  47F0D094  40404040  40404040  40404040
40404040  40404040  40404040  40404040  E6D7C9C5  F0F0F1F2*
02E3E7E3  40000020  40400008  40400001  000001D4  000000A8  40404040
40404040  40404040  40404040  40404040  40404040  40404040  40404040
40404040  40404040  40404040  40404040  E6D7C9C5  F0F0F1F3*
02E3E7E3  400000A8  40400004  40400001  000001C2  40404040  40404040
40404040  40404040  40404040  40404040  40404040  40404040  40404040
40404040  40404040  40404040  40404040  E6D7C9C5  F0F0F1F4*
02E3E7E3  40000124  40400018  40400001  0000002C  00000000  00000004
00000000  00000000  00000000  40404040  40404040  40404040  40404040
40404040  40404040  40404040  40404040  E6D7C9C5  F0F0F1F5*
02D9D3C4  40404040  40400030  40404040  00020001  1C000120  00010001
0C000158  00010001  0C000174  00010001  0C000020  00010001  0C000024
00010001  0C0000A8  40404040  40404040  E6D7C9C5  F0F0F1F6*
02C5D5C4  40404040  40404040  40404040  40404040  40404040  40404040
00000200  F1F5F7F3  F460C6D6  F34040F0  F2F0F2F8  F7F0F9F8  40F0F84B
F5F14BF0  F6404040  E6D7C9C5  D9C34040  E6D7C9C5  F0F0F1F7**

MEMBER NAME  WRTMAT
02C5E2C4  40404040  40400010  40400001  E6D9E3D4  C1E34040  00000000
40000000  40404040  40404040  40404040  40404040  40404040  40404040
40404040  40404040  40404040  40404040  E6D9E3D4  F0F0F0F1*
02E3E7E3  40000000  40400038  40400001  47F0F00C  07E6D9E3  D4C1E340
90ECD00C  184D98CD  F0205040  D00450D0  400807FC  40404040  40404040
021A3640  5C5C5C5C  5C5C5C5C  5C5C5C5C  E6D9E3D4  F0F0F0F2*
02E3E7E3  40000038  40400038  40400001  5C5C5C5C  5C5C5C5C  5C5C5C5C
5C5C5C5C  5C5C5C5C  5C5C5C5C  5C5C5C5C  5C5C5C5C  5C5C5C5C  5C5C5C5C
5C22021A  0740D7D6  C9D5E340  10061A01  E6D9E3D4  F0F0F0F3*
02E3E7E3  40000070  40400038  40400001  4006020A  0A021A06  40C4C1E2
C8401005  1A034040  4D061414  011A015D  22021A25  404040E3  C8C9E240
D7C9C5D9  C3C540D7  D6C9D5E3  40D7C9C5  E6D9E3D4  F0F0F0F4*
02E3E7E3  400000A8  40400038  40400001  D9C3C5E2  40D5D640  D7D3C9C5
E222021A  01401003  22021A01  400C0702  1A01400C  08031A01  4004040C
07021A01  401C0C09  041A0140  04020C07  E6D9E3D4  F0F0F0F5*
02E3E7E3  400000E0  40400038  40400001  021A0140  1C22021A  01401003
22021A01  400A0C04  0A0A0210  0322021A  034040F1  1E1A0740  D7D6C9D5
E3401006  1A014006  020A0A02  1A0640C4  E6D9E3D4  F0F0F0F6*
02E3E7E3  40000118  40400038  40400001  C1E2C840  10051A03  40404D06
1414011A  015D2202  1A2740C1  E5C5D9C1  C7C540D3  C1D4C9D5  C1E3C540
```

D7D9D6D7 C5D9E3C9 C5E240C6 D6D940D7 E6D9E3D4 F0F0F0F7*
02E3E7E3 40000150 40400038 40400001 D6C9D5E3 4022021A 20E3D6E3
C1D340E3 C8C9C3D2 D5C5E2E2 40404040 40404040 40404040 4040407E
400A0603 18011A02 C9D51814 22021A20 E6D9E3D4 F0F0F0F8*
02E3E7E3 40000188 40400038 40400001 D3D6D5C7 C9E3E4C4 C9D5C1D3
40D4D6C4 E4D3E4E2 404DC5F1 5D40C5E7 40407E40 0C0B041A 0440D7E2
C9181422 021A20E3 D9C1D5E2 E5C5D9E2 E6D9E3D4 F0F0F0F9*
02E3E7E3 400001C0 40400038 40400001 C540D4D6 C4E4D3E4 E2404040
4DC5F25D 40C5E840 407E400C 0B041A04 40D7E2C9 18142202 1A20E2C8
C5C1D940 D4D6C4E4 D3E4E240 40404040 E6D9E3D4 F0F0F1F0**
02E3E7E3 400001F8 40400038 40400001 404DC7F1 F25D40C7 E7E84040
7E400C0B 041A0440 D7E2C918 1422021A 20D7D6C9 E2E2D6D5 7DE240D9
C1E3C9D6 4040404D D5E4F1F2 5D40E5E7 E6D9E3D4 F0F0F1F1*
02E3E7E3 40000230 40400038 40400001 E840407E 400A0504 18142202
1A20D7D6 C9E2E2D6 D57DE240 D9C1E3C9 D6404040 4DD5E4F2 F15D40E5
E8E74040 7E400A05 04181422 021A20D3 E6D9E3D4 F0F0F1F2*
02E3E7E3 40000268 40400038 40400001 D6D5C7C9 E3E4C4C9 D5C1D340
C34BE34B C54B40C1 D3D7C8C1 4040E740 407E400C 0B041A0C 40C9D561
C9D561C4 C5C740C6 22021A20 E3D9C1D5 E6D9E3D4 F0F0F1F3*
02E3E7E3 400002A0 40400038 40400001 E2E5C5D9 E2C540C3 4BE34BC5
4B404040 C1D3D7C8 C14040E8 40407E40 0C0B041A 0C40C9D5 61C9D561
C4C5C740 C622021A 20C1D7D7 C1D9C5D5 E6D9E3D4 F0F0F1F4*
02E3E7E3 400002D8 40400038 40400001 E340E2C8 D940C34B E34BC54B
40C1D3D7 C8C140E7 E840407E 400C0B04 1A0C40C9 D561C9D5 61C4C5C7
40C62202 1A01F01A 27606060 60606060 E6D9E3D4 F0F0F1F5*
02E3E7E3 40000310 40400038 40400001 60606060 6040C160 D4C1E3D9
C9E74060 60606060 60606060 60606060 60606060 22021A01 40080106
030C0D04 22021A01 F01A2760 60606060 E6D9E3D4 F0F0F1F6*
02E3E7E3 40000348 40400038 40400001 60606060 60606040 C260D4C1
E3D9C9E7 40606060 60606060 60606060 60606060 60602202 1A01F01A
27606060 60606060 60606060 6040C460 E6D9E3D4 F0F0F1F7*
02E3E7E3 40000380 40400038 40400001 D4C1E3D9 C9E74060 60606060
60606060 60606060 60606060 22021A01 F01A2760 60606060 60606060
60606040 E260D4C1 E3D9C9E7 40606060 E6D9E3D4 F0F0F1F8*
02E3E7E3 400003B8 40400038 40400001 60606060 60606060 60606060
60602202 1A1E40E3 D6E3C1D3 40D7D3C9 C5E240C2 E840D6D9 C9C5D5E3
C1E3C9D6 D5407E40 10052202 1A024040 E6D9E3D4 F0F0F1F9*
02E3E7E3 400003F0 40400013 40400001 0A06011A 03407E40 10041801

MEMBER NAME WRTMAT

0A05011A 016C2240 40404040 40404040 40404040 40404040 40404040
40404040 40404040 40404040 40404040 E6D9E3D4 F0F0F2F0**
02E3E7E3 40000458 40400038 40400001 00000000 00000000 4E000000
00000000 4F080000 00000000 4E000000 80000000 00000001 00000002
00000003 00000009 0000000B 00000014 E6D9E3D4 F0F0F2F1*
02C5E2C4 40404040 40400010 40400002 D9D4D6C4 C5D34040 05000000
40000018 40404040 40404040 40404040 40404040 40404040 40404040
40404040 40404040 40404040 40404040 E6D9E3D4 F0F0F2F2*
02E3E7E3 40000490 40400018 40400001 00000018 00000058 00000064
42640000 00000000 00000000 40404040 40404040 40404040 40404040
40404040 40404040 40404040 40404040 E6D9E3D4 F0F0F2F3*
02C5E2C4 40404040 40400010 40400003 D7D4C1E3 D3404040 05000000
40001134 40404040 40404040 40404040 40404040 40404040 40404040
40404040 40404040 40404040 40404040 E6D9E3D4 F0F0F2F4*
02E3E7E3 40000510 40400010 40400001 FFFFFFFF FFFFFFA0 00001130
00000000 40404040 40404040 40404040 40404040 40404040 40404040
40404040 40404040 40404040 40404040 E6D9E3D4 F0F0F2F5*
02E3E7E3 40000524 40400004 40400001 00000000 40404040 40404040
40404040 40404040 40404040 40404040 40404040 40404040 40404040

```
40404040  40404040  40404040  40404040  E6D9E3D4  F0F0F2F6*
02E3E7E3  4000052C  40400004  40400001  00000000  40404040  40404040
40404040  40404040  40404040  40404040  40404040  40404040  40404040
40404040  40404040  40404040  40404040  E6D9E3D4  F0F0F2F7*
02E3E7E3  40000534  40400004  40400001  00000000  40404040  40404040
40404040  40404040  40404040  40404040  40404040  40404040  40404040
40404040  40404040  40404040  40404040  E6D9E3D4  F0F0F2F8*
02E3E7E3  4000053C  40400004  40400001  00000000  40404040  40404040
40404040  40404040  40404040  40404040  40404040  40404040  40404040
40404040  40404040  40404040  40404040  E6D9E3D4  F0F0F2F9*
02E3E7E3  40000544  40400004  40400001  00000000  40404040  40404040
40404040  40404040  40404040  40404040  40404040  40404040  40404040
40404040  40404040  40404040  40404040  E6D9E3D4  F0F0F3F0**
02E3E7E3  4000054C  40400004  40400001  00000000  40404040  40404040
40404040  40404040  40404040  40404040  40404040  40404040  40404040
40404040  40404040  40404040  40404040  E6D9E3D4  F0F0F3F1*
02C5E2C4  40404040  40400010  40400004  C9C2C3D6  D47B4040  02000000
40000000  40404040  40404040  40404040  40404040  40404040  40404040
40404040  40404040  40404040  40404040  E6D9E3D4  F0F0F3F2*
02E3E7E3  40000554  40400004  40400001  00000000  40404040  40404040
40404040  40404040  40404040  40404040  40404040  40404040  40404040
40404040  40404040  40404040  40404040  E6D9E3D4  F0F0F3F3*
02E3E7E3  4000055C  40400004  40400001  00000000  40404040  40404040
40404040  40404040  40404040  40404040  40404040  40404040  40404040
40404040  40404040  40404040  40404040  E6D9E3D4  F0F0F3F4*
02E3E7E3  4000057C  40400038  40400001  7840D094  58B0D158  58F0D154
45E0F004  00000009  00000028  45E0F010  58F0D154  45E0F004  00000009
00000062  45E0F008  0450D0B4  45E0F008  E6D9E3D4  F0F0F3F5*
02E3E7E3  400005B4  40400038  40400001  0470D0A8  45E0F008  0470D0AC
45E0F008  0450D0C4  5820D108  45E0F134  00010000  01202001  01000014
00000001  45E0F010  5800D0C8  5900D070  E6D9E3D4  F0F0F3F6*
02E3E7E3  400005EC  40400028  40400001  47A0D1FC  58F0D154  45E0F004
00000009  0000008D  45E0F010  58F0D154  45E0F004  00000009  000000B6
40404040  40404040  40404040  40404040  E6D9E3D4  F0F0F3F7*
02D9D3C4  40404040  40400038  40404040  00020001  0C000510  00030001
0C000514  00030001  0C000518  00040001  1C00055C  00010001  0C000590
00010001  0C0005A4  00010001  0C0005FC  E6D9E3D4  F0F0F3F8*
02E3E7E3  40000614  40400038  40400001  5820D110  45E0F008  04502000
45E0F010  58F0D110  5850F000  5C40D08C  5890D08C  58A0D08C  18B55870

MEMBER NAME  WRTMAT
D10C58F0  D1541800  45E0F004  00000009  E6D9E3D4  F0F0F3F9*
02E3E7E3  4000064C  40400038  40400001  000000BD  45E0F134  00010000
08697008  01000009  00000008  45E0F010  879AD236  58B0D158  58F0D154
45E0F004  00000009  000000E6  45E0F008  E6D9E3D4  F0F0F4F0**
02E3E7E3  40000684  40400038  40400001  0450D0C8  45E0F010  5890D15C
18AB58B0  D0705880  D13C5870  D10C5860  D14C58F0  D1541800  45E0F004
00000009  000000ED  58598000  5C40D08C  E6D9E3D4  F0F0F4F1*
02E3E7E3  400006BC  40400038  40400001  45E0F008  08657058  45E0F008
086A6000  45E0F008  04598000  45E0F010  5AB0D070  5AA0D158  5A90D15C
59B0D0C8  47C0D29A  58B0D158  58F0D154  E6D9E3D4  F0F0F4F2*
02E3E7E3  400006F4  40400038  40400001  45E0F004  00000009  000000FA
45E0F008  0450D0B4  45E0F008  0470D0A8  45E0F008  0470D0AC  45E0F008
0450D0C4  5820D108  45E0F134  00010000  E6D9E3D4  F0F0F4F3*
02E3E7E3  4000072C  40400038  40400001  01202001  01000014  00000001
45E0F010  58F0D154  45E0F004  00000009  0000012B  45E0F010  58F0D154
45E0F004  00000009  00000156  45E0F008  E6D9E3D4  F0F0F4F4*
02E3E7E3  40000764  40400018  40400001  0860D100  45E0F010  58F0D154
45E0F004  00000009  00000185  40404040  40404040  40404040  40404040
```

```
40404040  40404040  40404040  40404040  E6D9E3D4  F0F0F4F5*
02D9D3C4  40404040  40400038  40404040  00010001  0C000610  00010001
0C00064C  00010001  0C00067C  00010001  0C0006B0  00010001  0C0006FC
00010001  0C000748  00010001  0C00075C  E6D9E3D4  F0F0F4F6*
02E3E7E3  4000077C  40400038  40400001  45E0F008  0860D0D8  45E0F010
58F0D154  45E0F004  00000009  000001B4  45E0F008  0860D0E0  45E0F010
58F0D154  45E0F004  00000009  000001E3  E6D9E3D4  F0F0F4F7*
02E3E7E3  400007B4  40400038  40400001  45E0F008  0860D0E8  45E0F010
58F0D154  45E0F004  00000009  00000212  45E0F008  0860D0F0  45E0F010
58F0D154  45E0F004  00000009  0000023B  E6D9E3D4  F0F0F4F8*
02E3E7E3  400007EC  40400038  40400001  45E0F008  0860D0F8  45E0F010
58F0D154  45E0F004  00000009  00000264  5820D114  45E0F008  08602008
45E0F010  58F0D154  45E0F004  00000009  E6D9E3D4  F0F0F4F9*
02E3E7E3  40000824  40400024  40400001  00000299  5820D114  45E0F008
08602010  45E0F010  58F0D154  45E0F004  00000009  000002CE  40404040
40404040  40404040  40404040  40404040  E6D9E3D4  F0F0F5F0**
02D9D3C4  40404040  40400038  40404040  00010001  0C000778  00010001
0C000794  00010001  0C0007B0  00010001  0C0007CC  00010001  0C0007E8
00010001  0C000804  00010001  0C000824  E6D9E3D4  F0F0F5F1*
02E3E7E3  40000848  40400038  40400001  5820D114  45E0F008  08602018
45E0F010  58F0D154  45E0F004  00000009  00000303  45E0F010  189B18AB
58B0D088  5880D11C  58F0D154  45E0F004  E6D9E3D4  F0F0F5F2*
02E3E7E3  40000880  40400038  40400001  00000009  00000331  45E0F134
00010000  08698018  01000003  00000018  45E0F010  879AD470  58B0D158
58F0D154  45E0F004  00000009  0000033D  E6D9E3D4  F0F0F5F3*
02E3E7E3  400008B8  40400038  40400001  45E0F010  189B18AB  58B0D088
5880D124  58F0D154  45E0F004  00000009  00000331  45E0F134  00010000
08698018  01000003  00000018  45E0F010  E6D9E3D4  F0F0F5F4*
02E3E7E3  400008F0  40400038  40400001  879AD4C0  58B0D158  58F0D154
45E0F004  00000009  0000036B  45E0F010  189B18AB  58B0D088  5880D12C
58F0D154  45E0F004  00000009  00000331  E6D9E3D4  F0F0F5F5*
02E3E7E3  40000928  40400030  40400001  45E0F134  00010000  08698018
01000003  00000018  45E0F010  879AD510  58B0D158  58F0D154  45E0F004
00000009  00000399  40404040  40404040  E6D9E3D4  F0F0F5F6*
02D9D3C4  40404040  40400038  40404040  00010001  0C000844  00010001
0C000864  00010001  0C000884  00010001  0C0008B4  00010001  0C0008D4
00010001  0C000904  00010001  0C000924  E6D9E3D4  F0F0F5F7*
02E3E7E3  40000958  40400038  40400001  45E0F010  189B18AB  58B0D16C
5880D134  58F0D154  45E0F004  00000009  00000331  45E0F134  00010000
08698018  01000002  00000018  45E0F010  E6D9E3D4  F0F0F5F8*

MEMBER NAME  WRTMAT
02E3E7E3  40000990  40400038  40400001  879AD560  58B0D158  5800D0C8
5700D06C  5000D05C  6860D058  6B60D068  58F0D154  45E0F004  00000009
000003C7  45E0F008  0450D0C8  45E0F010  E6D9E3D4  F0F0F5F9*
02E3E7E3  400009C8  40400038  40400001  5830D070  5860D070  187B5890
D17058A0  D16C18B3  5880D144  2B00780A  80006A00  D0606000  D0505830
D0545030  D0BC1803  5700D06C  5000D05C  E6D9E3D4  F0F0F6F0**
02E3E7E3  40000A00  40400038  40400001  6820D058  6B20D068  3D263C24
7020D0C0  58F0D154  45E0F004  00000009  000003EB  45E0F008  04798000
45E0F008  0450D0BC  45E0F008  0470D0C0  E6D9E3D4  F0F0F6F1*
02E3E7E3  40000A38  40400038  40400001  45E0F010  1AB61A97  1AA759B0
D0B047C0  D5D858B0  D1581BFF  58E0D000  07FE58A0  D00458E0  A00C58B0
A0185810  B0085820  D0C85020  100018DA  E6D9E3D4  F0F0F6F2*
02E3E7E3  40000A70  40400038  40400001  92FFA00C  982CA01C  07FE987B
10085820  70005020  D0C85820  80005020  D0B47820  90007020  D0A87820
A0007020  D0AC5820  B0005020  D0C4987B  E6D9E3D4  F0F0F6F3*
02E3E7E3  40000AA8  40400038  40400001  10205820  70005020  D0B06820
80006020  D1006820  90006020  D0D86820  A0006020  D0E06820  B0006020
```

| | | | | | | |
|---|---|---|---|---|---|---|
| D0E8987B | 10346820 | 70006020 | D0F06820 | E6D9E3D4 | F0F0F6F4* | |
| 02E3E7E3 | 40000AE0 | 40400038 | 40400001 | 80006020 | D0F85820 | 10004130 |
| 20004150 | 00081B25 | 5020D14C | 5030D150 | 58201004 | 41302000 | 41500004 |
| 1B255020 | D13C5030 | D1405820 | 101C4130 | E6D9E3D4 | F0F0F6F5* | |
| 02E3E7E3 | 40000B18 | 40400038 | 40400001 | 20004150 | 00041B25 | 5C40D074 |
| 1B255020 | D1445030 | D1485820 | 103C4130 | 20004150 | 00081B25 | 5020D114 |
| 5030D118 | 58201040 | 41302000 | 41500008 | E6D9E3D4 | F0F0F6F6* | |
| 02E3E7E3 | 40000B50 | 40400038 | 40400001 | 1B255B20 | D0885020 | D11C5030 |
| D1205820 | 10444130 | 20004150 | 00081B25 | 5B20D088 | 5020D124 | 5030D128 |
| 58201048 | 41302000 | 41500008 | 1B255B20 | E6D9E3D4 | F0F0F6F7* | |
| 02E3E7E3 | 40000B88 | 40400028 | 40400001 | D0885020 | D12C5030 | D1305820 |
| 104C4130 | 20004150 | 00081B25 | 5B20D088 | 5020D134 | 5030D138 | 47F0D174 |
| 40404040 | 40404040 | 40404040 | 40404040 | E6D9E3D4 | F0F0F6F8* | |
| 02E3E7E3 | 40000020 | 40400008 | 40400001 | 00000A7A | 00000408 | 40404040 |
| 40404040 | 40404040 | 40404040 | 40404040 | 40404040 | 40404040 | 40404040 |
| 40404040 | 40404040 | 40404040 | 40404040 | E6D9E3D4 | F0F0F6F9* | |
| 02E3E7E3 | 40000408 | 40400004 | 40400001 | 00000A56 | 40404040 | 40404040 |
| 40404040 | 40404040 | 40404040 | 40404040 | 40404040 | 40404040 | 40404040 |
| 40404040 | 40404040 | 40404040 | 40404040 | E6D9E3D4 | F0F0F7F0** | |
| 02E3E7E3 | 40000560 | 4040001C | 40400001 | 00000008 | 00000004 | 00000000 |
| 00000000 | 00000000 | 00000010 | 0000000C | 40404040 | 40404040 | 40404040 |
| 40404040 | 40404040 | 40404040 | 40404040 | E6D9E3D4 | F0F0F7F1* | |
| 02D9D3C4 | 40404040 | 40400038 | 40404040 | 00010001 | 0C000954 | 00010001 |
| 0C000974 | 00010001 | 0C0009B8 | 00010001 | 0C000A1C | 00010001 | 0C000020 |
| 00010001 | 0C000024 | 00010001 | 0C000408 | E6D9E3D4 | F0F0F7F2* | |
| 02C5D5C4 | 40404040 | 40404040 | 40404040 | 40404040 | 40404040 | 40404040 |
| 00000BB0 | F1F5F7F3 | F460C6D6 | F34040F0 | F2F0F2F8 | F7F0F9F8 | 40F0F84B |
| F5F14BF1 | F1404040 | E6D9E3D4 | C1E34040 | E6D9E3D4 | F0F0F7F3** | |

MEMBER NAME WSARY

| | | | | | | |
|---|---|---|---|---|---|---|
| 02C5E2C4 | 40404040 | 40400010 | 40400001 | E6E2C1D9 | E8404040 | 00000000 |
| 40000000 | 40404040 | 40404040 | 40404040 | 40404040 | 40404040 | 40404040 |
| 40404040 | 40404040 | 40404040 | 40404040 | E6E2C1D9 | F0F0F0F1* | |
| 02E3E7E3 | 40000000 | 40400038 | 40400001 | 47F0F00C | 07E6E2C1 | D9E84040 |
| 90ECD00C | 184D98CD | F0205040 | D00450D0 | 400807FC | 40404040 | 40404040 |
| 021A2140 | 5C5C5C5C | 5C5C5C5C | 5C40E2E3 | E6E2C1D9 | F0F0F0F2* | |
| 02E3E7E3 | 40000038 | 40400038 | 40400001 | C1C3D240 | E3C1C2D3 | C5405C5C |
| 5C5C5C5C | 5C5C5C5C | 22021A05 | 4040C97E | 4010041A | 0440D47E | 400A0401 |
| 1A0440C4 | 7E400A06 | 011A0440 | E27E400A | E6E2C1D9 | F0F0F0F3* | |
| 02E3E7E3 | 40000070 | 40400038 | 40400001 | 06011A04 | 40D37E40 | 0A05011A |
| 0440C17E | 400A0703 | 1A0440D4 | 7E400A06 | 011A0440 | D77E400A | 04011A05 |
| 40E7407E | 400A0703 | 1A0540E8 | 407E400A | E6E2C1D9 | F0F0F0F4* | |
| 02E3E7E3 | 400000A8 | 40400038 | 40400001 | 07031A04 | 40E77E40 | 0A07031A |
| 0440E87E | 400A0703 | 1E180A1A | 03E67E40 | 0A07031A | 0440E57E | 400A0703 |
| 1A0440C4 | 7E400A04 | 011A0440 | C57E400A | E6E2C1D9 | F0F0F0F5* | |
| 02E3E7E3 | 400000E0 | 40400021 | 40400001 | 04011A05 | 40D3C37E | 40060524 |
| 081A0740 | D7D5E340 | 7E400A05 | 011A0240 | 7B0A0501 | 22404040 | 40404040 |
| 40404040 | 40404040 | 40404040 | 40404040 | E6E2C1D9 | F0F0F0F6* | |
| 02C5E2C4 | 40404040 | 40400010 | 40400002 | E2E3C1C3 | D2404040 | 05000000 |
| 40040744 | 40404040 | 40404040 | 40404040 | 40404040 | 40404040 | 40404040 |
| 40404040 | 40404040 | 40404040 | 40404040 | E6E2C1D9 | F0F0F0F7* | |
| 02E3E7E3 | 40000158 | 40400014 | 40400001 | 00000001 | 00000016 | 00000058 |
| 00000000 | 00000000 | 40404040 | 40404040 | 40404040 | 40404040 | 40404040 |
| 40404040 | 40404040 | 40404040 | 40404040 | E6E2C1D9 | F0F0F0F8* | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E6E2C1D9 | F0F0F0F9* | |
| 02E3E7E3 | 40000180 | 40400038 | 40400001 | FFFFFFA8 | 00000000 | 58B0D078 |
| 58A0D050 | 5890B058 | 5880D058 | 58F0D07C | 45E0F004 | 00000006 | 00000028 |

```
45E0F010  50A0D068  58F0D07C  45E0F004  E6E2C1D9  F0F0F1F0**
02E3E7E3  400001B8  40400038  40400001  00000006  0000004D  45E0F008
0450D068  18585C40  D06845E0  F1340001  00000475  B0040100  00160000
000445E0  F0105830  D0681A3A  5030D068  E6E2C1D9  F0F0F1F1*
02E3E7E3  400001F0  40400024  40400001  193947C0  D0A81BFF  58E0D000
07FE58D0  D00458E0  D00C92FF  D00C982C  D01C07FE  47F0D080  40404040
40404040  40404040  40404040  40404040  E6E2C1D9  F0F0F1F2*
02E3E7E3  40000020  40400008  40400001  00000210  00000108  40404040
40404040  40404040  40404040  40404040  40404040  40404040  40404040
40404040  40404040  40404040  40404040  E6E2C1D9  F0F0F1F3*
02E3E7E3  40000108  40400004  40400001  000001FE  40404040  40404040
40404040  40404040  40404040  40404040  40404040  40404040  40404040
40404040  40404040  40404040  40404040  E6E2C1D9  F0F0F1F4*
02D9D3C4  40404040  40400038  40404040  00020001  0C000180  00030001
1C000184  00010001  0C0001A4  00010001  0C0001BC  00010001  0C000020
00010001  0C000024  00010001  0C000108  E6E2C1D9  F0F0F1F5*
02C5D5C4  40404040  40404040  40404040  40404040  40404040  40404040
00000214  F1F5F7F3  F460C6D6  F34040F0  F2F0F2F8  F7F0F9F8  40F0F34B
F5F14BF1  F7404040  E6E2C1D9  E8404040  E6E2C1D9  F0F0F1F6**
```

We claim:

1. A system to aid in the design and manufacture of composite parts, the composite parts fabricated from a plurality of plies of material assembled and cured in a desired orientation and arrangement to form the part, the system comprising:

a central processing unit;

input means communicating with the central processing unit;

storage means communicating with the central processing unit;

means for inputting and storing information regarding the shape, orientation and location of the plies within the composite part;

means for isolating and defining individual plies within the part; and means for allowing pierce point interrogation of the composite part to determine the structural properties at selected points on the part.

2. A system to aid in the design and manufacture of composite parts, the composite parts fabricated from a plurality of plies of material assembled and cured in a desired orientation and arrangement to form the part, the system comprising:

a central processing unit;

input means communicating with the central processing unit;

storage means communicating with the central processing unit;

means for inputting and storing information regarding the shape, orientation and location of the plies within the composite part;

means for isolating and defining individual plies within the part; and means for interfacing with a finite element modeler to allow structural analysis of the complete part.

3. A system to aid in the design and manufacture of composite parts, the composite parts fabricated from a plurality of plies of material assembled and cured in a desired orientation and arrangement to form the part, the system comprising:

a central processing unit;

input means communicating with the central processing unit;

storage means communicating with the central processing unit;

means for inputting and storing information regarding the shape, orientation and location of the plies within the composite part;

means for isolating and defining individual plies within the part; and means for calculating the weight and centroid of the composite part.

4. A system to aid in the design and manufacture of composite parts, the composite parts fabricated from a plurality of plies of material assembled and cured in a desired orientation and arrangement to form the part, the system comprising:

a central processing unit;

input means communicating with the central processing unit;

storage means communicating with the central processing unit;

means for inputting and storing information regarding the shape, orientation and location of the plies within the composite part;

means for isolating and defining individual plies within the part; and means for selecting a desired cross section through a part and generating ply layer and thickness plots for the selected cross section.

* * * * *